US011283916B2

(12) United States Patent
Coffman et al.

(10) Patent No.: US 11,283,916 B2
(45) Date of Patent: Mar. 22, 2022

(54) METHODS AND INTERFACES FOR CONFIGURING A DEVICE IN ACCORDANCE WITH AN AUDIO TONE SIGNAL

(71) Applicant: Apple Inc., Cupertino, CA (US)

(72) Inventors: Patrick L. Coffman, San Francisco, CA (US); David Chance Graham, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/807,604

(22) Filed: Mar. 3, 2020

(65) Prior Publication Data

US 2020/0201495 A1 Jun. 25, 2020

Related U.S. Application Data

(63) Continuation of application No. 16/702,968, filed on Dec. 4, 2019, which is a continuation of application
(Continued)

(51) Int. Cl.
*H04M 1/72442* (2021.01)
*G06F 3/0482* (2013.01)
(Continued)

(52) U.S. Cl.
CPC ...... *H04M 1/72442* (2021.01); *G06F 3/0414* (2013.01); *G06F 3/0482* (2013.01);
(Continued)

(58) Field of Classification Search
CPC .................. H04R 29/007; H04R 27/00; H04R 2227/003; H04R 2227/05; G06F 3/165;
(Continued)

(56) References Cited

U.S. PATENT DOCUMENTS 5,202,961 A 4/1993 Mills et al.
5,305,435 A 4/1994 Bronson
(Continued)

FOREIGN PATENT DOCUMENTS

AU 2007100826 A4 9/2007
AU 2008100011 A4 2/2008
(Continued)

OTHER PUBLICATIONS

Intention to Grant received for Danish Patent Application No. PA201770406, dated Feb. 6, 2020, 3 pages.
(Continued)

*Primary Examiner* — Eric J Yoon
(74) *Attorney, Agent, or Firm* — Dentons US LLP

(57) ABSTRACT

The present disclosure generally relates to interfaces and techniques for media playback on one or more devices. In accordance with some embodiments, an electronic device includes a display, one or more processors, and memory. The electronic device receives user input and, in response to receiving the user input, displays, on the display, a multi-device interface that includes: one or more indicators associated with a plurality of available playback devices that are connected to the device and available to initiate playback of media from the device, and a media playback status of the plurality of available playback devices.

99 Claims, 336 Drawing Sheets

Related U.S. Application Data

No. 15/910,263, filed on Mar. 2, 2018, now Pat. No. 10,992,795.

(60) Provisional application No. 62/507,202, filed on May 16, 2017, provisional application No. 62/507,208, filed on May 16, 2017, provisional application No. 62/514,932, filed on Jun. 4, 2017, provisional application No. 62/622,122, filed on Jan. 25, 2018.

(51) Int. Cl.
*G06F 3/04847* (2022.01)
*G06F 3/0488* (2022.01)
*G06F 3/16* (2006.01)
*G06F 3/041* (2006.01)
*H04M 1/72412* (2021.01)

(52) U.S. Cl.
CPC ........ *G06F 3/0488* (2013.01); *G06F 3/04847* (2013.01); *G06F 3/165* (2013.01); *G06F 2203/04104* (2013.01); *H04M 1/72412* (2021.01)

(58) Field of Classification Search
CPC .... G06F 3/167; G06F 3/0482; G06F 3/04847; G06F 3/0488; H04N 21/47217; H04N 21/43615; G08C 23/02
See application file for complete search history.

(56) References Cited

U.S. PATENT DOCUMENTS 5,333,266 A 7/1994 Boaz et al.
5,347,628 A 9/1994 Welch et al.
5,404,316 A 4/1995 Klingler et al.
5,463,725 A 10/1995 Henckel et al.
5,495,566 A 2/1996 Kwatinetz
5,513,342 A 4/1996 Leong et al.
5,519,828 A 5/1996 Rayner
5,521,841 A 5/1996 Arman et al.
5,557,724 A 9/1996 Sampat et al.
5,568,603 A 10/1996 Chen et al.
5,611,060 A 3/1997 Belfiore et al.
5,614,940 A 3/1997 Cobbley et al.
5,682,326 A 10/1997 Klingler et al.
5,684,970 A 11/1997 Asuma et al.
5,692,213 A 11/1997 Harrison et al.
5,726,687 A 3/1998 Belfiore et al.
5,732,184 A 3/1998 Chao et al.
5,745,096 A 4/1998 Ludolph et al.
5,751,260 A 5/1998 Nappi et al.
5,754,174 A 5/1998 Carpenter et al.
5,758,180 A 5/1998 Duffy et al.
5,760,767 A 6/1998 Shore et al.
5,760,772 A 6/1998 Austin
5,778,053 A 7/1998 Skarbo et al.
5,793,366 A 8/1998 Proehl et al.
5,841,971 A 11/1998 Longginou et al.
5,864,868 A 1/1999 Contois
5,872,566 A 2/1999 Bates et al.
5,872,922 A 2/1999 Hogan et al.
5,874,958 A 2/1999 Ludolph
5,880,725 A 3/1999 Southgate
5,880,733 A 3/1999 Horvitz et al.
5,892,507 A 4/1999 Moorby
5,936,623 A 8/1999 Amro
5,999,173 A 12/1999 Ubillos
6,011,537 A 1/2000 Slotznick
6,023,275 A 2/2000 Horvitz et al.
6,026,389 A 2/2000 Nakajima et al.
6,031,529 A 2/2000 Migos et al.
6,061,062 A 5/2000 Venolia
6,072,503 A 6/2000 Tani et al.
6,081,256 A 6/2000 Martin et al.
6,094,197 A 7/2000 Buxton et al.
6,115,037 A 9/2000 Sumiyoshi et al.
6,118,450 A 9/2000 Proehl et al.
6,140,987 A 10/2000 Stein et al.
6,166,736 A 12/2000 Hugh
6,204,840 B1 3/2001 Petelycky et al.
6,208,342 B1 3/2001 Mugura et al.
6,236,400 B1 5/2001 Guerrero
6,262,724 B1 7/2001 Crow et al.
6,308,187 B1 10/2001 DeStefano
6,310,613 B1 10/2001 Tanaka et al.
6,317,784 B1 11/2001 Mackintosh et al.
6,323,846 B1 11/2001 Westerman et al.
6,332,147 B1 12/2001 Moran et al.
6,351,765 B1 2/2002 Pietropaolo et al.
6,362,837 B1 3/2002 Ginn
6,363,395 B1 3/2002 Tanaka et al.
6,366,296 B1 4/2002 Boreczky et al.
6,369,835 B1 4/2002 Lin
6,393,430 B1 5/2002 Van et al.
6,393,462 B1 5/2002 Mullen-schultz
6,446,080 B1 9/2002 Van Ryzin et al.
6,452,609 B1 9/2002 Katinsky et al.
6,456,305 B1 9/2002 Qureshi et al.
6,477,117 B1 11/2002 Narayanaswami et al.
6,489,951 B1 12/2002 Wong et al.
6,504,934 B1 1/2003 Kasai et al.
6,515,681 B1 2/2003 Knight
6,515,988 B1 2/2003 Eldridge et al.
6,538,665 B2 3/2003 Crow et al.
6,544,295 B1 4/2003 Bodnar et al.
6,556,222 B1 4/2003 Narayanaswami
6,570,557 B1 5/2003 Westerman et al.
6,577,330 B1 6/2003 Tsuda et al.
6,584,479 B2 6/2003 Chang et al.
6,587,127 B1 7/2003 Stojakovic et al.
6,600,936 B1 7/2003 Kärkkäinen et al.
6,674,452 B1 1/2004 Kraft et al.
6,677,932 B1 1/2004 Westerman
6,677,965 B1 1/2004 Ullmann et al.
6,725,427 B2 4/2004 Freeman et al.
6,833,848 B1 12/2004 Wolff et al.
6,834,371 B1 12/2004 Jensen et al.
6,850,256 B2 2/2005 Crow et al.
6,922,147 B1 7/2005 Viksnins et al.
6,975,306 B2 12/2005 Hinckley et al.
7,081,905 B1 7/2006 Raghunath
7,091,964 B2 8/2006 Wong et al.
7,111,240 B2 9/2006 Crow et al.
7,191,411 B2 3/2007 Moehrle
7,240,297 B1 7/2007 Anderson et al.
7,315,984 B2 1/2008 Crow et al.
7,318,196 B2 1/2008 Crow et al.
7,370,244 B2 5/2008 Breitling et al.
7,415,720 B2 8/2008 Jung
7,441,207 B2 10/2008 Filner
7,454,192 B1 11/2008 Zhu
7,458,025 B2 11/2008 Crow et al.
7,479,949 B2 1/2009 Jobs et al.
7,492,350 B2 2/2009 Fabre et al.
7,526,728 B2 4/2009 Apparao et al.
7,546,470 B2 6/2009 Schultz
7,571,014 B1 8/2009 Lambourne et al.
7,581,186 B2 8/2009 Dowdy et al.
7,596,761 B2 9/2009 Lemay et al.
7,656,393 B2 2/2010 King et al.
7,710,393 B2 5/2010 Tsuk et al.
7,730,223 B1 6/2010 Bavor et al.
7,750,893 B2 7/2010 Hashimoto et al.
7,831,054 B2 11/2010 Ball et al.
7,860,936 B1 12/2010 Newstadt et al.
7,996,792 B2 8/2011 Anzures et al.
8,042,157 B2 10/2011 Bennett et al.
8,046,804 B2 10/2011 Kelts
8,060,571 B2 11/2011 Rao
8,060,825 B2 11/2011 Chaudhri et al.
8,077,157 B2 12/2011 Sengupta et al.
8,116,807 B2 2/2012 Matas
8,146,019 B2 3/2012 Kim et al.

(56) References Cited

U.S. PATENT DOCUMENTS 8,171,137 B1 5/2012 Parks et al.
8,196,043 B2 6/2012 Crow et al.
8,217,906 B2 7/2012 Sinclair
8,224,894 B1 7/2012 Parks et al.
8,225,191 B1 7/2012 Kalman
8,234,395 B2 7/2012 Millington
8,260,879 B2 9/2012 Chan
8,264,465 B2 9/2012 Grant et al.
8,280,539 B2 10/2012 Jehan et al.
8,290,603 B1 10/2012 Lambourne
8,386,563 B2 2/2013 Parks et al.
8,392,259 B2 3/2013 Macgillivray et al.
8,392,617 B1 3/2013 Weber et al.
8,434,133 B2 4/2013 Kulkarni et al.
8,458,780 B1 * 6/2013 Takkallapally ......... H04L 63/10 713/168
8,467,766 B2 6/2013 Rackley, III et al.
8,478,363 B2 7/2013 Levien et al.
8,478,816 B2 7/2013 Parks et al.
8,564,543 B2 10/2013 Chaudhri
8,572,513 B2 10/2013 Chaudhri et al.
8,587,528 B2 11/2013 Chaudhri
8,589,823 B2 11/2013 Lemay et al.
8,613,070 B1 12/2013 Borzycki et al.
8,624,836 B1 1/2014 Miller et al.
8,682,722 B1 3/2014 Des Jardins et al.
8,689,128 B2 4/2014 Chaudhri et al.
8,698,762 B2 4/2014 Wagner et al.
8,718,556 B2 5/2014 Lee et al.
8,736,557 B2 5/2014 Chaudhri et al.
8,769,624 B2 7/2014 Cotterill
8,812,601 B2 8/2014 Hsieh et al.
8,830,181 B1 9/2014 Clark et al.
8,860,674 B2 10/2014 Lee et al.
8,875,046 B2 10/2014 Jitkoff
8,886,710 B2 11/2014 Evans et al.
8,914,840 B2 12/2014 Reisman
8,984,431 B2 3/2015 Newman et al.
9,002,322 B2 4/2015 Cotterill
9,084,003 B1 7/2015 Sanio et al.
9,095,779 B2 8/2015 Chan et al.
9,134,902 B2 9/2015 Kang et al.
9,185,062 B1 11/2015 Yang et al.
9,195,219 B2 11/2015 Hong et al.
9,244,584 B2 1/2016 Fino
9,247,363 B2 1/2016 Triplett et al.
9,251,787 B1 2/2016 Hart et al.
9,269,083 B1 2/2016 Jarajapu et al.
9,294,853 B1 3/2016 Dhaundiyal
9,319,782 B1 4/2016 Hilmes et al.
9,395,905 B2 7/2016 Wherry
9,450,812 B2 9/2016 Lee et al.
9,489,106 B2 11/2016 Chaudhri et al.
9,519,413 B2 12/2016 Bates
9,549,323 B2 1/2017 Lee et al.
9,582,178 B2 2/2017 Grant et al.
9,680,927 B2 6/2017 Miller et al.
9,680,982 B2 6/2017 Fiedler
9,794,720 B1 10/2017 Kadri
9,798,443 B1 10/2017 Gray
9,820,323 B1 11/2017 Young et al.
9,846,685 B2 12/2017 Li
9,847,999 B2 12/2017 Van Os et al.
9,898,250 B1 2/2018 Williams et al.
9,954,989 B2 4/2018 Zhou
9,967,401 B2 5/2018 Coffman et al.
10,055,094 B2 8/2018 Li et al.
10,089,607 B2 10/2018 Ziat et al.
10,142,122 B1 11/2018 Hill et al.
10,178,234 B2 1/2019 Coffman et al.
10,182,138 B2 1/2019 Motika et al.
10,225,711 B2 3/2019 Parks et al.
10,237,141 B2 3/2019 Sasaki et al.
10,248,779 B2 4/2019 Song et al.
10,284,980 B1 5/2019 Woo et al.
10,299,300 B1 5/2019 Young
10,303,422 B1 5/2019 Woo et al.
10,310,725 B2 6/2019 Smith et al.
10,334,054 B2 6/2019 Van Os et al.
10,417,037 B2 9/2019 Gruber et al.
10,436,977 B2 10/2019 Bergman et al.
10,454,781 B2 10/2019 Sasaki et al.
10,511,456 B2 12/2019 Smith et al.
10,524,300 B2 12/2019 Ueda et al.
10,749,967 B2 8/2020 Van Os et al.
10,779,085 B1 9/2020 Carrigan
10,833,887 B2 11/2020 Wu
11,079,913 B1 8/2021 Kim et al.
2001/0030597 A1 10/2001 Inoue et al.
2001/0031622 A1 10/2001 Kivela et al.
2001/0039497 A1 11/2001 Hubbard
2001/0043514 A1 11/2001 Kita
2001/0049627 A1 12/2001 Simpson
2001/0050687 A1 12/2001 Iida et al.
2002/0002039 A1 1/2002 Qureshey et al.
2002/0015024 A1 2/2002 Westerman et al.
2002/0048224 A1 4/2002 Dygert et al.
2002/0054158 A1 5/2002 Asami
2002/0054164 A1 5/2002 Uemura
2002/0057262 A1 5/2002 Patrick et al.
2002/0059295 A1 5/2002 Ludtke et al.
2002/0068600 A1 6/2002 Chihara et al.
2002/0080151 A1 6/2002 Venolia
2002/0116276 A1 8/2002 Ottley
2002/0122066 A1 9/2002 Bates et al.
2002/0137565 A1 9/2002 Blanco
2002/0142734 A1 10/2002 Wickstead
2002/0154173 A1 10/2002 Etgen et al.
2002/0191028 A1 12/2002 Senechalle et al.
2002/0198909 A1 12/2002 Huynh et al.
2003/0028382 A1 2/2003 Chambers et al.
2003/0028639 A1 2/2003 Yamamoto et al.
2003/0030673 A1 2/2003 Ho
2003/0052901 A1 3/2003 Fukuchi
2003/0055977 A1 3/2003 Miller
2003/0067908 A1 4/2003 Mattaway et al.
2003/0076301 A1 4/2003 Tsuk et al.
2003/0079057 A1 4/2003 Ruskin et al.
2003/0097358 A1 5/2003 Mendez et al.
2003/0097413 A1 5/2003 Vishik et al.
2003/0112938 A1 6/2003 Kanakubo et al.
2003/0122787 A1 7/2003 Zimmerman et al.
2003/0128192 A1 7/2003 Van Os
2003/0182139 A1 9/2003 Harris et al.
2003/0188183 A1 10/2003 Lee et al.
2003/0229900 A1 12/2003 Reisman
2004/0019640 A1 1/2004 Bartram et al.
2004/0027371 A1 2/2004 Jaeger
2004/0032955 A1 2/2004 Hashimoto et al.
2004/0055446 A1 3/2004 Robbin et al.
2004/0056837 A1 3/2004 Koga et al.
2004/0073432 A1 4/2004 Stone
2004/0100479 A1 5/2004 Nakano et al.
2004/0104896 A1 6/2004 Suraqui
2004/0122683 A1 6/2004 Grossman et al.
2004/0125088 A1 7/2004 Zimmerman et al.
2004/0130581 A1 7/2004 Howard et al.
2004/0139398 A1 7/2004 Testa et al.
2004/0140956 A1 7/2004 Kushler et al.
2004/0155907 A1 8/2004 Yamaguchi et al.
2004/0168118 A1 8/2004 Wong et al.
2004/0181695 A1 9/2004 Walker et al.
2004/0189714 A1 9/2004 Fox et al.
2004/0235520 A1 11/2004 Cadiz et al.
2004/0237048 A1 11/2004 Tojo et al.
2004/0242200 A1 12/2004 Maeoka et al.
2004/0250217 A1 12/2004 Tojo et al.
2004/0261010 A1 12/2004 Matsuishi
2004/0268400 A1 12/2004 Barde et al.
2005/0012723 A1 1/2005 Pallakoff
2005/0021418 A1 1/2005 Marcus et al.
2005/0024341 A1 2/2005 Gillespie et al.
2005/0052458 A1 3/2005 Lambert
2005/0071188 A1 3/2005 Thuerk

(56) References Cited

U.S. PATENT DOCUMENTS

| | | | |
|---|---|---|---|
| 2005/0093868 | A1 | 5/2005 | Hinckley |
| 2005/0097135 | A1 | 5/2005 | Epperson et al. |
| 2005/0144452 | A1 | 6/2005 | Lynch et al. |
| 2005/0144568 | A1 | 6/2005 | Gruen et al. |
| 2005/0146534 | A1 | 7/2005 | Fong et al. |
| 2005/0160372 | A1 | 7/2005 | Gruen et al. |
| 2005/0162402 | A1 | 7/2005 | Watanachote |
| 2005/0177445 | A1 | 8/2005 | Church |
| 2005/0181774 | A1 | 8/2005 | Miyata |
| 2005/0192924 | A1 | 9/2005 | Drucker et al. |
| 2005/0210412 | A1 | 9/2005 | Matthews et al. |
| 2005/0216839 | A1 | 9/2005 | Salvucci |
| 2005/0229112 | A1 | 10/2005 | Clay et al. |
| 2005/0240756 | A1 | 10/2005 | Mayer |
| 2005/0275628 | A1 | 12/2005 | Balakrishnan et al. |
| 2006/0001645 | A1 | 1/2006 | Drucker et al. |
| 2006/0002523 | A1 | 1/2006 | Bettis et al. |
| 2006/0020637 | A1 | 1/2006 | Kedem |
| 2006/0020904 | A1 | 1/2006 | Aaltonen et al. |
| 2006/0026535 | A1 | 2/2006 | Hotelling et al. |
| 2006/0026536 | A1 | 2/2006 | Hotelling et al. |
| 2006/0038796 | A1 | 2/2006 | Hinckley et al. |
| 2006/0050054 | A1 | 3/2006 | Liang et al. |
| 2006/0085751 | A1 | 4/2006 | O'Brien et al. |
| 2006/0085766 | A1 | 4/2006 | Dominowska et al. |
| 2006/0125799 | A1 | 6/2006 | Hillis et al. |
| 2006/0132456 | A1 | 6/2006 | Anson |
| 2006/0132460 | A1 | 6/2006 | Kolmykov-Zotov et al. |
| 2006/0132469 | A1 | 6/2006 | Lai et al. |
| 2006/0146074 | A1 | 7/2006 | Harrison |
| 2006/0148455 | A1 | 7/2006 | Kim |
| 2006/0156239 | A1 | 7/2006 | Jobs et al. |
| 2006/0161621 | A1 | 7/2006 | Rosenberg |
| 2006/0161870 | A1 | 7/2006 | Hotelling et al. |
| 2006/0161871 | A1 | 7/2006 | Hotelling et al. |
| 2006/0176278 | A1 | 8/2006 | Mathews et al. |
| 2006/0178110 | A1 | 8/2006 | Nurminen et al. |
| 2006/0185005 | A1 | 8/2006 | Graves et al. |
| 2006/0197753 | A1 | 9/2006 | Hotelling |
| 2006/0206709 | A1 | 9/2006 | Labrou et al. |
| 2006/0217104 | A1 | 9/2006 | Cho |
| 2006/0224882 | A1 | 10/2006 | Chin |
| 2006/0227106 | A1 | 10/2006 | Hashimoto et al. |
| 2006/0236847 | A1 | 10/2006 | Withop |
| 2006/0246874 | A1 | 11/2006 | Sullivan |
| 2006/0256090 | A1 | 11/2006 | Huppi |
| 2006/0258289 | A1 | 11/2006 | Dua |
| 2006/0268020 | A1 | 11/2006 | Han |
| 2006/0271425 | A1 | 11/2006 | Goodman et al. |
| 2006/0271864 | A1 | 11/2006 | Satterfield et al. |
| 2006/0271867 | A1 | 11/2006 | Wang et al. |
| 2006/0279541 | A1 | 12/2006 | Kim et al. |
| 2006/0281449 | A1 | 12/2006 | Kun et al. |
| 2006/0286971 | A1 | 12/2006 | Maly et al. |
| 2006/0288226 | A1 | 12/2006 | Kowal |
| 2007/0011614 | A1 | 1/2007 | Crow et al. |
| 2007/0013671 | A1 | 1/2007 | Zadesky et al. |
| 2007/0027682 | A1 | 2/2007 | Bennett |
| 2007/0033295 | A1 | 2/2007 | Marriott |
| 2007/0053268 | A1 | 3/2007 | Crandall et al. |
| 2007/0070045 | A1 | 3/2007 | Sung et al. |
| 2007/0070066 | A1 | 3/2007 | Bakhash |
| 2007/0073649 | A1 | 3/2007 | Kikkoji et al. |
| 2007/0085841 | A1 | 4/2007 | Tsuk et al. |
| 2007/0097090 | A1 | 5/2007 | Battles |
| 2007/0097093 | A1 | 5/2007 | Ohshita et al. |
| 2007/0113294 | A1 | 5/2007 | Field et al. |
| 2007/0115933 | A1 | 5/2007 | Muhamed et al. |
| 2007/0124680 | A1 | 5/2007 | Robbin et al. |
| 2007/0126715 | A1 | 6/2007 | Funamoto |
| 2007/0136679 | A1 | 6/2007 | Yang |
| 2007/0136778 | A1 | 6/2007 | Birger et al. |
| 2007/0143495 | A1 | 6/2007 | Porat |
| 2007/0150842 | A1 | 6/2007 | Chaudhri et al. |
| 2007/0152979 | A1 | 7/2007 | Jobs et al. |
| 2007/0157089 | A1 | 7/2007 | Van Os et al. |
| 2007/0157094 | A1 | 7/2007 | Lemay et al. |
| 2007/0162963 | A1 | 7/2007 | Penet et al. |
| 2007/0168369 | A1 | 7/2007 | Bruns |
| 2007/0168413 | A1 | 7/2007 | Barletta et al. |
| 2007/0180492 | A1 | 8/2007 | Hassan et al. |
| 2007/0186106 | A1 | 8/2007 | Ting et al. |
| 2007/0186235 | A1 | 8/2007 | Jarman et al. |
| 2007/0191008 | A1 | 8/2007 | Bucher et al. |
| 2007/0192744 | A1 | 8/2007 | Reponen |
| 2007/0198111 | A1 | 8/2007 | Oetzel et al. |
| 2007/0226645 | A1 | 9/2007 | Kongqiao et al. |
| 2007/0226778 | A1 | 9/2007 | Pietruszka |
| 2007/0229221 | A1 | 10/2007 | Saotome |
| 2007/0260547 | A1 | 11/2007 | Little |
| 2007/0283011 | A1 | 12/2007 | Rakowski et al. |
| 2008/0011827 | A1 | 1/2008 | Little et al. |
| 2008/0016368 | A1 | 1/2008 | Adams |
| 2008/0016468 | A1 | 1/2008 | Chambers et al. |
| 2008/0016537 | A1 | 1/2008 | Little et al. |
| 2008/0027947 | A1 | 1/2008 | Pritchett et al. |
| 2008/0034011 | A1 | 2/2008 | Cisler et al. |
| 2008/0034289 | A1 | 2/2008 | Doepke et al. |
| 2008/0036743 | A1 | 2/2008 | Westerman et al. |
| 2008/0037951 | A1 | 2/2008 | Cho et al. |
| 2008/0040786 | A1 | 2/2008 | Chang et al. |
| 2008/0055264 | A1 | 3/2008 | Anzures et al. |
| 2008/0062141 | A1 | 3/2008 | Chandhri |
| 2008/0066016 | A1 | 3/2008 | Dowdy et al. |
| 2008/0075368 | A1 | 3/2008 | Kuzmin |
| 2008/0081558 | A1 | 4/2008 | Dunko et al. |
| 2008/0082939 | A1 | 4/2008 | Nash et al. |
| 2008/0084400 | A1 | 4/2008 | Rosenberg |
| 2008/0094367 | A1 | 4/2008 | Van De Ven et al. |
| 2008/0109764 | A1 | 5/2008 | Linnamaki |
| 2008/0114678 | A1 | 5/2008 | Bennett et al. |
| 2008/0114980 | A1 | 5/2008 | Sridhar |
| 2008/0122794 | A1 | 5/2008 | Koiso et al. |
| 2008/0122796 | A1 | 5/2008 | Jobs et al. |
| 2008/0126935 | A1 | 5/2008 | Blomgren |
| 2008/0147735 | A1 | 6/2008 | Sloo |
| 2008/0155417 | A1 | 6/2008 | Vallone et al. |
| 2008/0155474 | A1 | 6/2008 | Duhig et al. |
| 2008/0158170 | A1 | 7/2008 | Herz et al. |
| 2008/0160974 | A1 | 7/2008 | Vartiainen et al. |
| 2008/0163127 | A1 | 7/2008 | Newell et al. |
| 2008/0165141 | A1 | 7/2008 | Christie |
| 2008/0165152 | A1 | 7/2008 | Forstall et al. |
| 2008/0165153 | A1 | 7/2008 | Platzer et al. |
| 2008/0168384 | A1 | 7/2008 | Platzer et al. |
| 2008/0168395 | A1 | 7/2008 | Ording et al. |
| 2008/0168403 | A1 | 7/2008 | Westerman et al. |
| 2008/0190266 | A1 | 8/2008 | Kim et al. |
| 2008/0208762 | A1 | 8/2008 | Arthur et al. |
| 2008/0214163 | A1 | 9/2008 | Onyon et al. |
| 2008/0222546 | A1 | 9/2008 | Mudd et al. |
| 2008/0225007 | A1 | 9/2008 | Nakadaira et al. |
| 2008/0225013 | A1 | 9/2008 | Muylkens et al. |
| 2008/0229409 | A1 | 9/2008 | Miller et al. |
| 2008/0250319 | A1 | 10/2008 | Lee et al. |
| 2008/0259829 | A1 | 10/2008 | Rosenblatt |
| 2008/0273712 | A1 | 11/2008 | Eichfeld et al. |
| 2008/0273713 | A1 | 11/2008 | Hartung et al. |
| 2008/0282202 | A1 | 11/2008 | Sunday |
| 2008/0285772 | A1 | 11/2008 | Haulick et al. |
| 2008/0292074 | A1 | 11/2008 | Boni et al. |
| 2008/0313257 | A1 | 12/2008 | Allen et al. |
| 2008/0320391 | A1 | 12/2008 | Lemay et al. |
| 2009/0002335 | A1 | 1/2009 | Chaudhri |
| 2009/0002396 | A1 | 1/2009 | Andrews et al. |
| 2009/0006958 | A1 | 1/2009 | Pohjola et al. |
| 2009/0007188 | A1 | 1/2009 | Omernick |
| 2009/0031375 | A1 | 1/2009 | Sullivan et al. |
| 2009/0054044 | A1 | 2/2009 | Ikemori et al. |
| 2009/0058822 | A1 | 3/2009 | Chaudhri |
| 2009/0060170 | A1 | 3/2009 | Coughlan et al. |
| 2009/0063851 | A1 | 3/2009 | Nijdam |
| 2009/0075694 | A1 | 3/2009 | Kim et al. |
| 2009/0077491 | A1 | 3/2009 | Kim |

(56) References Cited

U.S. PATENT DOCUMENTS

| | | | |
|---|---|---|---|
| 2009/0094681 | A1 | 4/2009 | Sadler et al. |
| 2009/0100383 | A1 | 4/2009 | Sunday et al. |
| 2009/0119754 | A1 | 5/2009 | Schubert |
| 2009/0122149 | A1 | 5/2009 | Ishii |
| 2009/0125571 | A1 | 5/2009 | Kiilerich et al. |
| 2009/0128500 | A1 | 5/2009 | Sinclair |
| 2009/0135678 | A1 | 5/2009 | Godat |
| 2009/0140960 | A1 | 6/2009 | Mahowald et al. |
| 2009/0140991 | A1 | 6/2009 | Takasaki et al. |
| 2009/0144391 | A1 | 6/2009 | Jung et al. |
| 2009/0144451 | A1 | 6/2009 | Cabezas et al. |
| 2009/0144623 | A1 | 6/2009 | Jung |
| 2009/0153289 | A1 | 6/2009 | Hope et al. |
| 2009/0158390 | A1 | 6/2009 | Guan |
| 2009/0164581 | A1 | 6/2009 | Bove et al. |
| 2009/0165107 | A1 | 6/2009 | Tojo et al. |
| 2009/0174677 | A1 | 7/2009 | Gehani et al. |
| 2009/0174680 | A1 | 7/2009 | Anzures et al. |
| 2009/0177966 | A1 | 7/2009 | Chaudhri |
| 2009/0187423 | A1 | 7/2009 | Kim |
| 2009/0187981 | A1 | 7/2009 | Pan et al. |
| 2009/0193514 | A1 | 7/2009 | Adams et al. |
| 2009/0195497 | A1 | 8/2009 | Fitzgerald et al. |
| 2009/0198359 | A1 | 8/2009 | Chaudhri |
| 2009/0199119 | A1 | 8/2009 | Park et al. |
| 2009/0199130 | A1 | 8/2009 | Tsern et al. |
| 2009/0199188 | A1 | 8/2009 | Fujimaki |
| 2009/0204920 | A1 | 8/2009 | Beverley et al. |
| 2009/0204929 | A1 | 8/2009 | Baurmann et al. |
| 2009/0228938 | A1 | 9/2009 | White et al. |
| 2009/0231960 | A1 | 9/2009 | Hutcheson |
| 2009/0241169 | A1 | 9/2009 | Dhand et al. |
| 2009/0244015 | A1 | 10/2009 | Sengupta et al. |
| 2009/0248737 | A1 | 10/2009 | Shukla et al. |
| 2009/0265417 | A1 | 10/2009 | Svendsen et al. |
| 2009/0271744 | A1 | 10/2009 | Anders |
| 2009/0304205 | A1 | 12/2009 | Hardacker et al. |
| 2009/0307633 | A1 | 12/2009 | Haughay et al. |
| 2009/0311993 | A1 | 12/2009 | Horodezky |
| 2009/0322695 | A1 | 12/2009 | Cho et al. |
| 2010/0001967 | A1 | 1/2010 | Yoo |
| 2010/0004031 | A1 | 1/2010 | Kim |
| 2010/0005421 | A1 | 1/2010 | Yoshioka |
| 2010/0023449 | A1 | 1/2010 | Skowronek et al. |
| 2010/0042654 | A1 | 2/2010 | Heller et al. |
| 2010/0042835 | A1 | 2/2010 | Lee et al. |
| 2010/0058228 | A1 | 3/2010 | Park |
| 2010/0058253 | A1 | 3/2010 | Son |
| 2010/0082481 | A1 | 4/2010 | Lin et al. |
| 2010/0085379 | A1 | 4/2010 | Hishikawa et al. |
| 2010/0088634 | A1 | 4/2010 | Tsuruta et al. |
| 2010/0088639 | A1 | 4/2010 | Yach et al. |
| 2010/0094834 | A1 | 4/2010 | Svendsen |
| 2010/0106647 | A1 | 4/2010 | Raman |
| 2010/0107229 | A1 | 4/2010 | Najafi et al. |
| 2010/0122195 | A1 | 5/2010 | Hwang |
| 2010/0131978 | A1 | 5/2010 | Friedlander et al. |
| 2010/0159995 | A1 | 6/2010 | Stallings et al. |
| 2010/0174644 | A1 | 7/2010 | Rosano et al. |
| 2010/0174993 | A1 | 7/2010 | Pennington et al. |
| 2010/0178873 | A1 | 7/2010 | Lee et al. |
| 2010/0205563 | A1 | 8/2010 | Haapsaari et al. |
| 2010/0223542 | A1 | 9/2010 | Vuong et al. |
| 2010/0229094 | A1 | 9/2010 | Nakajima et al. |
| 2010/0231534 | A1 | 9/2010 | Chaudhri et al. |
| 2010/0231535 | A1 | 9/2010 | Chaudhri et al. |
| 2010/0231536 | A1 | 9/2010 | Chaudhri et al. |
| 2010/0231537 | A1 | 9/2010 | Pisula et al. |
| 2010/0235729 | A1 | 9/2010 | Kocienda et al. |
| 2010/0248823 | A1 | 9/2010 | Smith |
| 2010/0250376 | A1 | 9/2010 | Nandiraju |
| 2010/0251304 | A1 | 9/2010 | Donoghue et al. |
| 2010/0257484 | A1 | 10/2010 | Nakamura et al. |
| 2010/0259482 | A1 | 10/2010 | Ball |
| 2010/0269156 | A1 | 10/2010 | Hohlfeld et al. |
| 2010/0272250 | A1 | 10/2010 | Yap et al. |
| 2010/0283743 | A1 | 11/2010 | Coddington |
| 2010/0284389 | A1 | 11/2010 | Ramsay et al. |
| 2010/0296678 | A1 | 11/2010 | Kuhn-Rahloff et al. |
| 2010/0299436 | A1 | 11/2010 | Khalid et al. |
| 2010/0299639 | A1 | 11/2010 | Ramsay et al. |
| 2010/0302172 | A1 | 12/2010 | Wilairat et al. |
| 2010/0306657 | A1 | 12/2010 | Derbyshire et al. |
| 2010/0318917 | A1 | 12/2010 | Holladay et al. |
| 2010/0321201 | A1 | 12/2010 | Huang et al. |
| 2010/0325239 | A1 | 12/2010 | Khedouri et al. |
| 2011/0010470 | A1 | 1/2011 | Hulbert et al. |
| 2011/0016089 | A1 | 1/2011 | Freedman et al. |
| 2011/0029750 | A1 | 2/2011 | Jang et al. |
| 2011/0029891 | A1 | 2/2011 | Kim et al. |
| 2011/0035799 | A1 | 2/2011 | Handler |
| 2011/0041102 | A1 | 2/2011 | Kim |
| 2011/0054268 | A1 | 3/2011 | Fidacaro et al. |
| 2011/0059769 | A1 | 3/2011 | Brunolli |
| 2011/0065384 | A1 | 3/2011 | Cader et al. |
| 2011/0071656 | A1 | 3/2011 | Mckiel, Jr. |
| 2011/0081923 | A1 | 4/2011 | Bednar et al. |
| 2011/0082902 | A1 | 4/2011 | Rottler et al. |
| 2011/0088086 | A1 | 4/2011 | Swink et al. |
| 2011/0106671 | A1 | 5/2011 | Minnis et al. |
| 2011/0126148 | A1 | 5/2011 | Krishnaraj et al. |
| 2011/0130168 | A1 | 6/2011 | Vendrow et al. |
| 2011/0131537 | A1 | 6/2011 | Cho et al. |
| 2011/0138166 | A1 | 6/2011 | Peszek et al. |
| 2011/0138295 | A1 | 6/2011 | Momchilov et al. |
| 2011/0142234 | A1 | 6/2011 | Rogers |
| 2011/0149874 | A1 | 6/2011 | Reif |
| 2011/0159469 | A1 | 6/2011 | Hwang et al. |
| 2011/0159927 | A1 | 6/2011 | Choi |
| 2011/0163971 | A1 | 7/2011 | Wagner et al. |
| 2011/0164042 | A1 | 7/2011 | Chaudhri |
| 2011/0164269 | A1 | 7/2011 | Kamishiro |
| 2011/0179386 | A1 | 7/2011 | Shaffer et al. |
| 2011/0187497 | A1 | 8/2011 | Chin |
| 2011/0209099 | A1 | 8/2011 | Hinckley et al. |
| 2011/0214158 | A1 | 9/2011 | Pasquero et al. |
| 2011/0225426 | A1 | 9/2011 | Agarwal et al. |
| 2011/0231914 | A1 | 9/2011 | Hung |
| 2011/0242002 | A1 | 10/2011 | Kaplan et al. |
| 2011/0246942 | A1 | 10/2011 | Misawa |
| 2011/0250895 | A1 | 10/2011 | Wohlert et al. |
| 2011/0275358 | A1 | 11/2011 | Faenger |
| 2011/0279852 | A1 | 11/2011 | Oda et al. |
| 2011/0281568 | A1 | 11/2011 | Le Clech |
| 2011/0291971 | A1 | 12/2011 | Masaki et al. |
| 2011/0302493 | A1 | 12/2011 | Runstedler et al. |
| 2011/0314398 | A1 | 12/2011 | Yano et al. |
| 2011/0319056 | A1 | 12/2011 | Toy et al. |
| 2011/0320450 | A1 | 12/2011 | Liu et al. |
| 2012/0004920 | A1 | 1/2012 | Kelly et al. |
| 2012/0005708 | A1 | 1/2012 | Kelts |
| 2012/0011437 | A1 | 1/2012 | James et al. |
| 2012/0016678 | A1 | 1/2012 | Gruber et al. |
| 2012/0024947 | A1 | 2/2012 | Naelon et al. |
| 2012/0036556 | A1 | 2/2012 | Lebeau et al. |
| 2012/0040719 | A1 | 2/2012 | Lee et al. |
| 2012/0044062 | A1 | 2/2012 | Jersa et al. |
| 2012/0050185 | A1 | 3/2012 | Davydov et al. |
| 2012/0051560 | A1 | 3/2012 | Sanders |
| 2012/0054278 | A1 | 3/2012 | Taleb et al. |
| 2012/0059813 | A1 | 3/2012 | Sejnoha |
| 2012/0066632 | A1 | 3/2012 | Sundermeyer et al. |
| 2012/0066731 | A1 | 3/2012 | Vasquez et al. |
| 2012/0079126 | A1 | 3/2012 | Evans et al. |
| 2012/0084697 | A1 | 4/2012 | Reeves |
| 2012/0088477 | A1 | 4/2012 | Cassidy et al. |
| 2012/0089951 | A1 | 4/2012 | Cassidy |
| 2012/0096069 | A1 | 4/2012 | Chan |
| 2012/0096076 | A1 | 4/2012 | Chan et al. |
| 2012/0096386 | A1 | 4/2012 | Baumann et al. |
| 2012/0105358 | A1 | 5/2012 | Momeyer et al. |
| 2012/0110455 | A1 | 5/2012 | Sharma et al. |
| 2012/0115608 | A1 | 5/2012 | Pfeifer et al. |
| 2012/0129496 | A1 | 5/2012 | Park et al. |

(56) References Cited

U.S. PATENT DOCUMENTS

2012/0131459 A1 5/2012 Ilama-Vaquero et al.
2012/0143694 A1 6/2012 Zargahi et al.
2012/0178431 A1 7/2012 Gold
2012/0210226 A1 8/2012 Mccoy et al.
2012/0214458 A1 8/2012 Levien et al.
2012/0215684 A1 8/2012 Kidron
2012/0222092 A1 8/2012 Rabii
2012/0223890 A1 9/2012 Borovsky et al.
2012/0223959 A1 9/2012 Lengeling et al.
2012/0260169 A1 10/2012 Schwartz et al.
2012/0269361 A1 10/2012 Bhow et al.
2012/0272145 A1 10/2012 Ryan et al.
2012/0272230 A1 10/2012 Lee
2012/0284297 A1 11/2012 Aguera-arcas et al.
2012/0284673 A1 11/2012 Lamb et al.
2012/0290657 A1 11/2012 Parks et al.
2012/0290943 A1 11/2012 Toney et al.
2012/0294118 A1 11/2012 Haulick et al.
2012/0297017 A1 11/2012 Livshits et al.
2012/0304111 A1 11/2012 Queru et al.
2012/0311444 A1 12/2012 Chaudhri
2012/0323868 A1 12/2012 Robbin et al.
2012/0324390 A1 12/2012 Tao et al.
2013/0005487 A1 1/2013 Frazzini et al.
2013/0007203 A1 1/2013 Szu
2013/0007617 A1 1/2013 Mackenzie et al.
2013/0017846 A1 1/2013 Schoppe
2013/0024932 A1 1/2013 Toebes et al.
2013/0027289 A1 1/2013 Choi et al.
2013/0027341 A1 1/2013 Mastandrea
2013/0031217 A1 1/2013 Rajapakse
2013/0041790 A1 2/2013 Murugesan et al.
2013/0046893 A1 2/2013 Hauser et al.
2013/0047084 A1 2/2013 Sanders et al.
2013/0047233 A1 2/2013 Fisk et al.
2013/0051755 A1 2/2013 Brown et al.
2013/0053107 A1 2/2013 Kang et al.
2013/0054697 A1 2/2013 Cha et al.
2013/0055082 A1 2/2013 Fino et al.
2013/0063364 A1 3/2013 Moore
2013/0073286 A1 3/2013 Bastea-Forte et al.
2013/0073584 A1 3/2013 Kuper et al.
2013/0074194 A1 3/2013 White et al.
2013/0080177 A1 3/2013 Chen
2013/0080516 A1 3/2013 Bologh
2013/0080525 A1 3/2013 Aoki et al.
2013/0080955 A1 3/2013 Reimann et al.
2013/0082819 A1 4/2013 Cotterill
2013/0086637 A1 4/2013 Cotterill et al.
2013/0094666 A1 4/2013 Haaff et al.
2013/0094770 A1 4/2013 Lee et al.
2013/0102281 A1 4/2013 Kanda et al.
2013/0102298 A1 4/2013 Goodman et al.
2013/0111407 A1 5/2013 Mullen
2013/0113822 A1 5/2013 Putrevu et al.
2013/0115932 A1 5/2013 Williams et al.
2013/0117693 A1 5/2013 Anderson et al.
2013/0120254 A1 5/2013 Mun et al.
2013/0132865 A1 5/2013 Li
2013/0138272 A1 5/2013 Louise-Babando et al.
2013/0141514 A1 6/2013 Chao et al.
2013/0145303 A1 6/2013 Prakash et al.
2013/0159858 A1 6/2013 Joffray et al.
2013/0166332 A1 6/2013 Hammad
2013/0173699 A1 7/2013 Parks et al.
2013/0173794 A1 7/2013 Agerbak et al.
2013/0174044 A1 7/2013 Hill
2013/0189963 A1 7/2013 Epp et al.
2013/0191220 A1 7/2013 Dent et al.
2013/0191454 A1 7/2013 Oliver et al.
2013/0191911 A1 7/2013 Dellinger et al.
2013/0194476 A1 8/2013 Shimosato
2013/0205375 A1 8/2013 Woxblom et al.
2013/0212212 A1 8/2013 Addepalli et al.
2013/0222270 A1 8/2013 Winkler et al.
2013/0223821 A1 8/2013 Issa et al.
2013/0239202 A1 9/2013 Adams et al.
2013/0244615 A1 9/2013 Miller
2013/0246522 A1 9/2013 Bilinski et al.
2013/0246916 A1 9/2013 Reimann et al.
2013/0254574 A1 9/2013 Zacchio et al.
2013/0262857 A1 10/2013 Neuman et al.
2013/0282180 A1 10/2013 Layton
2013/0283161 A1 10/2013 Reimann et al.
2013/0283199 A1 10/2013 Selig et al.
2013/0298024 A1 11/2013 Rhee et al.
2013/0304758 A1 11/2013 Gruber et al.
2013/0311597 A1 11/2013 Arrouye et al.
2013/0311986 A1 11/2013 Arrouye et al.
2013/0311997 A1 11/2013 Gruber et al.
2013/0318158 A1 11/2013 Teng et al.
2013/0318249 A1 11/2013 Mcdonough et al.
2013/0322634 A1 12/2013 Bennett et al.
2013/0324081 A1 12/2013 Gargi et al.
2013/0325967 A1 12/2013 Parks et al.
2013/0329924 A1 12/2013 Fleizach et al.
2013/0332162 A1 12/2013 Keen
2013/0332560 A1 12/2013 Knight et al.
2013/0333006 A1 12/2013 Tapling et al.
2013/0339343 A1 12/2013 Hierons et al.
2013/0346068 A1 12/2013 Solem et al.
2013/0346859 A1 12/2013 Bates et al.
2014/0003597 A1 1/2014 Lazaridis et al.
2014/0006562 A1 1/2014 Handa et al.
2014/0026188 A1 1/2014 Gubler
2014/0032706 A1 1/2014 Kuscher et al.
2014/0033035 A1 1/2014 Crow et al.
2014/0037107 A1 2/2014 Marino et al.
2014/0040742 A1 2/2014 Park et al.
2014/0047020 A1 2/2014 Matus et al.
2014/0047382 A1 2/2014 Kim et al.
2014/0049447 A1 2/2014 Choi
2014/0058860 A1 2/2014 Roh et al.
2014/0064155 A1 3/2014 Evans et al.
2014/0068751 A1 3/2014 Last
2014/0075130 A1 3/2014 Bansal et al.
2014/0075311 A1 3/2014 Boettcher et al.
2014/0082136 A1 3/2014 Garcia Puga et al.
2014/0082715 A1 3/2014 Grajek et al.
2014/0089196 A1 3/2014 Paya et al.
2014/0095965 A1 4/2014 Li
2014/0122730 A1 5/2014 Burch et al.
2014/0136481 A1 5/2014 Quan et al.
2014/0136986 A1 5/2014 Martin et al.
2014/0139637 A1 5/2014 Mistry et al.
2014/0149884 A1 5/2014 Flynn et al.
2014/0155031 A1 6/2014 Lee et al.
2014/0157160 A1 6/2014 Cudak et al.
2014/0165012 A1 6/2014 Shen et al.
2014/0168696 A1 6/2014 Matsuhara et al.
2014/0171064 A1 6/2014 Das
2014/0173447 A1 6/2014 Das et al.
2014/0176298 A1 6/2014 Kumar et al.
2014/0181202 A1 6/2014 Gossain
2014/0181654 A1 6/2014 Kumar et al.
2014/0189589 A1 7/2014 Kim et al.
2014/0207707 A1 7/2014 Na et al.
2014/0223490 A1 8/2014 Pan et al.
2014/0247229 A1 9/2014 Cho et al.
2014/0258292 A1 9/2014 Thramann et al.
2014/0267002 A1 9/2014 Luna
2014/0267911 A1 9/2014 Grant et al.
2014/0270183 A1 9/2014 Luna
2014/0282103 A1 9/2014 Crandall
2014/0282240 A1 9/2014 Flynn et al.
2014/0283018 A1 9/2014 Dadu et al.
2014/0298432 A1 10/2014 Brown
2014/0310348 A1 10/2014 Keskitalo et al.
2014/0320387 A1 10/2014 Eriksson et al.
2014/0320425 A1 10/2014 Jeong et al.
2014/0325447 A1 10/2014 Jin et al.
2014/0335789 A1 11/2014 Malamud et al.
2014/0337791 A1 11/2014 Agnetta et al.
2014/0337931 A1 11/2014 Cotterill

(56) References Cited

U.S. PATENT DOCUMENTS

2014/0344904 A1 11/2014 Venkataramani et al.
2014/0359140 A1 12/2014 Shankarraman
2014/0359454 A1 12/2014 Lee et al.
2014/0359637 A1 12/2014 Yan
2014/0359709 A1 12/2014 Nasser et al.
2014/0363024 A1 12/2014 Apodaca
2014/0364056 A1 12/2014 Alsina et al.
2014/0365904 A1 12/2014 Kim et al.
2014/0372309 A1 12/2014 Bullard et al.
2014/0375577 A1 12/2014 Yeh et al.
2014/0380187 A1 12/2014 Lewin et al.
2015/0012435 A1 1/2015 Wright et al.
2015/0019944 A1 1/2015 Kalgi
2015/0020081 A1 1/2015 Cho et al.
2015/0032812 A1 1/2015 Dudley
2015/0039494 A1 2/2015 Sinton et al.
2015/0049591 A1 2/2015 Adams et al.
2015/0051913 A1 2/2015 Choi
2015/0052222 A1 2/2015 Farrell et al.
2015/0058744 A1 2/2015 Dhingra et al.
2015/0067803 A1 3/2015 Alduaiji
2015/0081072 A1 3/2015 Kallai et al.
2015/0095175 A1 4/2015 Dua
2015/0111559 A1 4/2015 Leaver et al.
2015/0113407 A1 4/2015 Hoffert et al.
2015/0120545 A1 4/2015 Fiore et al.
2015/0130737 A1 5/2015 Im et al.
2015/0135282 A1 5/2015 Kong et al.
2015/0138101 A1 5/2015 Park et al.
2015/0143419 A1 5/2015 Bhagwat et al.
2015/0148927 A1 5/2015 Georges et al.
2015/0149599 A1 5/2015 Caunter et al.
2015/0154589 A1 6/2015 Li
2015/0154676 A1 6/2015 Matousek et al.
2015/0160856 A1 6/2015 Jang et al.
2015/0163188 A1 6/2015 Faaborg et al.
2015/0177914 A1 6/2015 Coyner et al.
2015/0179008 A1 6/2015 Sung et al.
2015/0189426 A1 7/2015 Pang
2015/0193069 A1 7/2015 Di Censo et al.
2015/0193392 A1 7/2015 Greenblatt et al.
2015/0195133 A1 7/2015 Sheets et al.
2015/0199967 A1 7/2015 Reddy et al.
2015/0205511 A1 7/2015 Vinna et al.
2015/0215128 A1 7/2015 Pal
2015/0215398 A1 7/2015 Murphy et al.
2015/0223005 A1 8/2015 Hardman et al.
2015/0229650 A1 8/2015 Grigg et al.
2015/0229750 A1 8/2015 Zhou et al.
2015/0242073 A1 8/2015 Munoz et al.
2015/0242597 A1 8/2015 Danciu
2015/0242611 A1 8/2015 Cotterill
2015/0242837 A1 8/2015 Yarbrough et al.
2015/0243163 A1 8/2015 Shoemake
2015/0248268 A1 9/2015 Kumar et al.
2015/0249540 A1 9/2015 Khalil et al.
2015/0253960 A1 9/2015 Lin et al.
2015/0254661 A1 9/2015 Lanc
2015/0256957 A1 9/2015 Kim et al.
2015/0261493 A1 9/2015 Lemmon et al.
2015/0271120 A1 9/2015 Langholz
2015/0278799 A1 10/2015 Palanisamy
2015/0286694 A1 10/2015 Kaplinger et al.
2015/0295921 A1 10/2015 Cao
2015/0302856 A1 10/2015 Kim et al.
2015/0304330 A1 10/2015 Soamboonsrup et al.
2015/0309768 A1 10/2015 Van Der Heide
2015/0312299 A1 10/2015 Chen et al.
2015/0319006 A1 11/2015 Plummer et al.
2015/0339466 A1 11/2015 Gao et al.
2015/0347010 A1 12/2015 Yang et al.
2015/0348002 A1 12/2015 Van et al.
2015/0350296 A1 12/2015 Yang et al.
2015/0350297 A1 12/2015 Yang et al.
2015/0350448 A1 12/2015 Coffman et al.
2015/0355879 A1 12/2015 Beckhardt et al.
2015/0356278 A1 12/2015 Britt et al.
2015/0358043 A1 12/2015 Jeong et al.
2015/0365400 A1 12/2015 Cox
2015/0378522 A1 12/2015 Butts et al.
2016/0004393 A1 1/2016 Faaborg et al.
2016/0004417 A1 1/2016 Bates
2016/0004499 A1 1/2016 Kim et al.
2016/0005024 A1 1/2016 Harrell
2016/0006745 A1 1/2016 Furuichi et al.
2016/0012417 A1 1/2016 Mizon
2016/0014266 A1 1/2016 Bhatt
2016/0026429 A1 1/2016 Triplett
2016/0026779 A1 1/2016 Grigg et al.
2016/0028869 A1 1/2016 Bhatt
2016/0034887 A1 2/2016 Lee
2016/0043962 A1 2/2016 Kim et al.
2016/0048705 A1 2/2016 Yang
2016/0050199 A1 2/2016 Ganesan
2016/0050476 A1 2/2016 Patil
2016/0054710 A1 2/2016 Kim et al.
2016/0062487 A1 3/2016 Foss et al.
2016/0062567 A1 3/2016 Yang et al.
2016/0062606 A1 3/2016 Vega et al.
2016/0070244 A1 3/2016 Cipollo et al.
2016/0073197 A1 3/2016 Hammer et al.
2016/0073482 A1 3/2016 Fok et al.
2016/0077734 A1 3/2016 Buxton et al.
2016/0086176 A1 3/2016 Henrique et al.
2016/0088039 A1 3/2016 Millington et al.
2016/0092072 A1 3/2016 So et al.
2016/0092665 A1 3/2016 Cowan et al.
2016/0127799 A1 5/2016 Alsina et al.
2016/0132864 A1 5/2016 Shah et al.
2016/0134488 A1 5/2016 Straub et al.
2016/0134942 A1 5/2016 Lo
2016/0150624 A1 5/2016 Meerbeek et al.
2016/0156992 A1 6/2016 Kuper
2016/0171482 A1 6/2016 Muncey et al.
2016/0173318 A1 6/2016 Ha et al.
2016/0173617 A1 6/2016 Allinson
2016/0189451 A1 6/2016 Yoo et al.
2016/0202866 A1 7/2016 Zambetti
2016/0209939 A1 7/2016 Zambetti et al.
2016/0210983 A1 7/2016 Amada et al.
2016/0231902 A1 8/2016 Sirpal et al.
2016/0239167 A1 8/2016 Reimann et al.
2016/0241543 A1 8/2016 Jung et al.
2016/0246566 A1 8/2016 Fullerton et al.
2016/0253145 A1 9/2016 Lee et al.
2016/0259656 A1 9/2016 Sumner et al.
2016/0259936 A1 9/2016 Mukherjee et al.
2016/0267779 A1 9/2016 Kuang
2016/0277903 A1 9/2016 Poosala et al.
2016/0291924 A1 10/2016 Bierbower et al.
2016/0295340 A1 10/2016 Baker et al.
2016/0299669 A1 10/2016 Bates et al.
2016/0314451 A1 10/2016 Martin
2016/0320849 A1 11/2016 Koo
2016/0342386 A1 11/2016 Kallai et al.
2016/0345039 A1 11/2016 Billmeyer
2016/0345172 A1 11/2016 Cotterill
2016/0351191 A1 12/2016 Lehtiniemi et al.
2016/0360344 A1 12/2016 Shim et al.
2016/0366481 A1 12/2016 Lim et al.
2016/0366531 A1 12/2016 Popova
2016/0378961 A1 12/2016 Park
2016/0381476 A1 12/2016 Gossain et al.
2017/0010782 A1 1/2017 Chaudhri et al.
2017/0013562 A1 1/2017 Lim et al.
2017/0017531 A1 1/2017 Choi et al.
2017/0031552 A1 2/2017 Lin
2017/0031648 A1 2/2017 So et al.
2017/0041727 A1 2/2017 Reimann
2017/0054731 A1 2/2017 Cotterill
2017/0068402 A1 3/2017 Lochhead et al.
2017/0068507 A1 3/2017 Kim et al.
2017/0070346 A1 3/2017 Lombardi et al.
2017/0078294 A1 3/2017 Medvinsky

(56) References Cited

U.S. PATENT DOCUMENTS

| | | | |
|---|---|---|---|
| 2017/0083494 A1 | 3/2017 | Yun et al. | |
| 2017/0092270 A1 | 3/2017 | Newendorp et al. | |
| 2017/0097621 A1 | 4/2017 | Ackmann et al. | |
| 2017/0115940 A1 | 4/2017 | Byeon | |
| 2017/0134553 A1 | 5/2017 | Jeon et al. | |
| 2017/0134567 A1 | 5/2017 | Jeon et al. | |
| 2017/0185373 A1 | 6/2017 | Kim et al. | |
| 2017/0192730 A1 | 7/2017 | Yang et al. | |
| 2017/0195772 A1 | 7/2017 | Han et al. | |
| 2017/0206779 A1 | 7/2017 | Lee et al. | |
| 2017/0227935 A1 | 8/2017 | Su et al. | |
| 2017/0235545 A1 | 8/2017 | Millington et al. | |
| 2017/0242653 A1* | 8/2017 | Lang | H04R 3/00 |
| 2017/0251314 A1 | 8/2017 | Pye et al. | |
| 2017/0285788 A1 | 10/2017 | Park et al. | |
| 2017/0289249 A1 | 10/2017 | Knight et al. | |
| 2017/0134872 A1 | 11/2017 | Silva et al. | |
| 2017/0322713 A1 | 11/2017 | Hwang et al. | |
| 2017/0339151 A1 | 11/2017 | Van Os et al. | |
| 2017/0357425 A1 | 12/2017 | Smith et al. | |
| 2017/0357434 A1 | 12/2017 | Coffman et al. | |
| 2017/0357477 A1 | 12/2017 | Im et al. | |
| 2017/0357973 A1 | 12/2017 | Van Os et al. | |
| 2017/0359189 A1 | 12/2017 | Smith et al. | |
| 2017/0359191 A1 | 12/2017 | Smith et al. | |
| 2018/0067904 A1 | 3/2018 | Li | |
| 2018/0069957 A1 | 3/2018 | Mushikabe et al. | |
| 2018/0101297 A1 | 4/2018 | Yang et al. | |
| 2018/0109629 A1 | 4/2018 | Van Os et al. | |
| 2018/0228003 A1 | 8/2018 | O'driscoll et al. | |
| 2018/0234549 A1 | 8/2018 | Coffman et al. | |
| 2018/0302790 A1 | 10/2018 | Cotterill | |
| 2018/0329585 A1 | 11/2018 | Carrigan et al. | |
| 2018/0329586 A1 | 11/2018 | Sundstrom et al. | |
| 2018/0332559 A1 | 11/2018 | Gudivada et al. | |
| 2018/0335903 A1 | 11/2018 | Coffman et al. | |
| 2018/0337924 A1 | 11/2018 | Graham et al. | |
| 2018/0341448 A1 | 11/2018 | Behzadi et al. | |
| 2018/0351762 A1 | 12/2018 | Iyengar et al. | |
| 2018/0364665 A1 | 12/2018 | Clymer et al. | |
| 2019/0012069 A1 | 1/2019 | Bates | |
| 2019/0012073 A1 | 1/2019 | Hwang | |
| 2019/0025943 A1 | 1/2019 | Jobs et al. | |
| 2019/0028419 A1 | 1/2019 | Sullivan | |
| 2019/0056854 A1 | 2/2019 | Azzolin et al. | |
| 2019/0102145 A1 | 4/2019 | Wilberding et al. | |
| 2019/0124203 A1 | 4/2019 | Coffman et al. | |
| 2019/0124510 A1 | 4/2019 | Cotterill | |
| 2019/0129661 A1 | 5/2019 | Hirota et al. | |
| 2019/0149972 A1 | 5/2019 | Parks et al. | |
| 2019/0163329 A1 | 5/2019 | Yang et al. | |
| 2019/0278900 A1 | 9/2019 | Yang et al. | |
| 2019/0289079 A1 | 9/2019 | Van Os et al. | |
| 2019/0294406 A1 | 9/2019 | Bierbower et al. | |
| 2019/0306607 A1 | 10/2019 | Clayton et al. | |
| 2019/0361729 A1 | 11/2019 | Gruber et al. | |
| 2020/0104018 A1 | 4/2020 | Coffman et al. | |
| 2020/0120503 A1 | 4/2020 | Cotterill | |
| 2020/0201491 A1 | 6/2020 | Coffman et al. | |
| 2020/0213437 A1 | 7/2020 | Bhatt | |
| 2020/0225817 A1 | 7/2020 | Coffman et al. | |
| 2020/0366742 A1 | 11/2020 | Van Os et al. | |
| 2020/0379711 A1 | 12/2020 | Graham et al. | |
| 2020/0379712 A1 | 12/2020 | Carrigan | |
| 2020/0379713 A1 | 12/2020 | Carrigan | |
| 2020/0379714 A1 | 12/2020 | Graham et al. | |
| 2020/0379716 A1 | 12/2020 | Carrigan et al. | |
| 2020/0379729 A1 | 12/2020 | Graham et al. | |
| 2020/0379730 A1 | 12/2020 | Graham et al. | |
| 2020/0382332 A1 | 12/2020 | Carrigan et al. | |
| 2020/0413197 A1 | 12/2020 | Carrigan et al. | |
| 2021/0011588 A1 | 1/2021 | Coffman et al. | |
| 2021/0011613 A1 | 1/2021 | Pisula et al. | |
| 2021/0064317 A1 | 3/2021 | Juenger et al. | |
| 2021/0065134 A1 | 3/2021 | Chhabra et al. | |
| 2021/0173431 A1 | 6/2021 | Yang et al. | |
| 2021/0181903 A1 | 6/2021 | Carrigan et al. | |
| 2021/0255819 A1 | 8/2021 | Graham et al. | |
| 2021/0263702 A1 | 8/2021 | Carrigan | |
| 2021/0272118 A1 | 9/2021 | Van Os et al. | |

FOREIGN PATENT DOCUMENTS

| | | | |
|---|---|---|---|
| AU | 2014100584 | A4 | 7/2014 |
| CA | 2876587 | A1 | 2/2014 |
| CN | 1263425 | A | 8/2000 |
| CN | 1274439 | A | 11/2000 |
| CN | 1341889 | A | 3/2002 |
| CN | 1452739 | A | 10/2003 |
| CN | 1525723 | A | 9/2004 |
| CN | 1620677 | A | 5/2005 |
| CN | 1797295 | A | 7/2006 |
| CN | 1813240 | A | 8/2006 |
| CN | 1846221 | A | 10/2006 |
| CN | 1863281 | A | 11/2006 |
| CN | 1908981 | A | 2/2007 |
| CN | 101002167 | A | 7/2007 |
| CN | 101022395 | A | 8/2007 |
| CN | 101268470 | A | 9/2008 |
| CN | 101299694 | A | 11/2008 |
| CN | 101321156 | A | 12/2008 |
| CN | 101341718 | A | 1/2009 |
| CN | 101350938 | A | 1/2009 |
| CN | 101359291 | A | 2/2009 |
| CN | 101409743 | A | 4/2009 |
| CN | 101488138 | A | 7/2009 |
| CN | 100530059 | C | 8/2009 |
| CN | 101501657 | A | 8/2009 |
| CN | 101610155 | A | 12/2009 |
| CN | 101625620 | A | 1/2010 |
| CN | 101673207 | A | 3/2010 |
| CN | 101854278 | A | 10/2010 |
| CN | 101877748 | A | 11/2010 |
| CN | 101882409 | A | 11/2010 |
| CN | 101931655 | A | 12/2010 |
| CN | 101976171 | A | 2/2011 |
| CN | 102065148 | A | 5/2011 |
| CN | 102164213 | A | 8/2011 |
| CN | 102209321 | A | 10/2011 |
| CN | 102262506 | A | 11/2011 |
| CN | 102281294 | A | 12/2011 |
| CN | 102301323 | A | 12/2011 |
| CN | 102396205 | A | 3/2012 |
| CN | 102508707 | A | 6/2012 |
| CN | 102707994 | A | 10/2012 |
| CN | 102737313 | A | 10/2012 |
| CN | 102740146 | A | 10/2012 |
| CN | 102750066 | A | 10/2012 |
| CN | 102750086 | A | 10/2012 |
| CN | 102754071 | A | 10/2012 |
| CN | 102866828 | A | 1/2013 |
| CN | 102902453 | A | 1/2013 |
| CN | 102905181 | A | 1/2013 |
| CN | 103067625 | A | 4/2013 |
| CN | 103069378 | A | 4/2013 |
| CN | 103139370 | A | 6/2013 |
| CN | 103250138 | A | 8/2013 |
| CN | 103260079 | A | 8/2013 |
| CN | 103458215 | A | 12/2013 |
| CN | 103558916 | A | 2/2014 |
| CN | 103582873 | A | 2/2014 |
| CN | 103593154 | A | 2/2014 |
| CN | 103765385 | A | 4/2014 |
| CN | 103793138 | A | 5/2014 |
| CN | 103853328 | A | 6/2014 |
| CN | 103870255 | A | 6/2014 |
| CN | 104106036 | A | 10/2014 |
| CN | 104166458 | A | 11/2014 |
| CN | 104335234 | A | 2/2015 |
| CN | 105549947 | A | 5/2016 |
| CN | 105794231 | A | 7/2016 |
| CN | 105940678 | A | 9/2016 |
| CN | 106030700 | A | 10/2016 |
| CN | 106062810 | A | 10/2016 |

(56) References Cited

FOREIGN PATENT DOCUMENTS

| | | | |
|---|---|---|---|
| CN | 106383645 | A | 2/2017 |
| EP | 459174 | A2 | 12/1991 |
| EP | 0564247 | A1 | 10/1993 |
| EP | 684543 | A1 | 11/1995 |
| EP | 0844555 | A2 | 5/1998 |
| EP | 0871177 | A2 | 10/1998 |
| EP | 0880091 | A2 | 11/1998 |
| EP | 0881563 | A2 | 12/1998 |
| EP | 1079371 | A1 | 2/2001 |
| EP | 1133119 | A2 | 9/2001 |
| EP | 1186987 | A2 | 3/2002 |
| EP | 1215575 | A2 | 6/2002 |
| EP | 1357458 | A2 | 10/2003 |
| EP | 1469374 | A1 | 10/2004 |
| EP | 1615109 | A2 | 1/2006 |
| EP | 1705883 | A1 | 9/2006 |
| EP | 1760584 | A1 | 3/2007 |
| EP | 1942401 | A1 | 7/2008 |
| EP | 2018032 | A1 | 1/2009 |
| EP | 2247087 | A1 | 11/2010 |
| EP | 2409214 | A1 | 1/2012 |
| EP | 2420925 | A2 | 2/2012 |
| EP | 2523109 | A1 | 11/2012 |
| EP | 2632193 | A2 | 8/2013 |
| EP | 2674889 | A2 | 12/2013 |
| EP | 2725473 | A1 | 4/2014 |
| EP | 2733579 | A2 | 5/2014 |
| EP | 2750062 | A2 | 7/2014 |
| EP | 2770673 | A1 | 8/2014 |
| EP | 2770708 | A1 | 8/2014 |
| EP | 2891049 | A1 | 7/2015 |
| EP | 2892240 | A1 | 7/2015 |
| EP | 2891049 | A4 | 3/2016 |
| EP | 3032537 | A2 | 6/2016 |
| EP | 3038427 | A1 | 6/2016 |
| EP | 3057342 | A1 | 8/2016 |
| EP | 3073703 | A1 | 9/2016 |
| EP | 3138300 | A1 | 3/2017 |
| EP | 3276905 | A1 | 1/2018 |
| EP | 3379853 | A1 | 9/2018 |
| EP | 3445058 | A1 | 2/2019 |
| GB | 2402105 | A | 12/2004 |
| GB | 2466038 | A | 6/2010 |
| GB | 2505476 | A | 3/2014 |
| JP | 5-266169 | A | 10/1993 |
| JP | 8-147138 | A | 6/1996 |
| JP | 8-166783 | A | 6/1996 |
| JP | 9-97154 | A | 4/1997 |
| JP | 9-258947 | A | 10/1997 |
| JP | 10-198517 | A | 7/1998 |
| JP | 10-232757 | A | 9/1998 |
| JP | 11-272391 | A | 10/1999 |
| JP | 2000-101879 | A | 4/2000 |
| JP | 2000-105772 | A | 4/2000 |
| JP | 2000-122957 | A | 4/2000 |
| JP | 2000-163193 | A | 6/2000 |
| JP | 2000-200092 | A | 7/2000 |
| JP | 2000-231371 | A | 8/2000 |
| JP | 2000-259477 | A | 9/2000 |
| JP | 2000-284879 | A | 10/2000 |
| JP | 2000-347921 | A | 12/2000 |
| JP | 2001-202176 | A | 7/2001 |
| JP | 2001-306375 | A | 11/2001 |
| JP | 2001-331758 | A | 11/2001 |
| JP | 2002-82745 | A | 3/2002 |
| JP | 2002-288125 | A | 10/2002 |
| JP | 2002-288690 | A | 10/2002 |
| JP | 2002-342356 | A | 11/2002 |
| JP | 2002-351768 | A | 12/2002 |
| JP | 2003-30245 | A | 1/2003 |
| JP | 2003-43978 | A | 2/2003 |
| JP | 2003-52019 | A | 2/2003 |
| JP | 2003-62975 | A | 3/2003 |
| JP | 2003-264621 | A | 9/2003 |
| JP | 2003-330586 | A | 11/2003 |
| JP | 2003-330613 | A | 11/2003 |
| JP | 2004-38895 | A | 2/2004 |
| JP | 2004-104813 | A | 4/2004 |
| JP | 2004-192573 | A | 7/2004 |
| JP | 2004-348601 | A | 12/2004 |
| JP | 2004-356816 | A | 12/2004 |
| JP | 2005-44036 | A | 2/2005 |
| JP | 2005-507112 | A | 3/2005 |
| JP | 2005-190108 | A | 7/2005 |
| JP | 2006-166248 | A | 6/2006 |
| JP | 2006-295753 | A | 10/2006 |
| JP | 2007-41976 | A | 2/2007 |
| JP | 2007-304854 | A | 11/2007 |
| JP | 2007-534009 | A | 11/2007 |
| JP | 2008-26439 | A | 2/2008 |
| JP | 2009-17486 | A | 1/2009 |
| JP | 2009-93206 | A | 4/2009 |
| JP | 2009-239867 | A | 10/2009 |
| JP | 2009-296577 | A | 12/2009 |
| JP | 2009-543166 | A | 12/2009 |
| JP | 2009-543228 | A | 12/2009 |
| JP | 2010-503082 | A | 1/2010 |
| JP | 2010-503922 | A | 2/2010 |
| JP | 2010-245940 | A | 10/2010 |
| JP | 2010-257118 | A | 11/2010 |
| JP | 2010-271779 | A | 12/2010 |
| JP | 2011-65590 | A | 3/2011 |
| JP | 2011-118662 | A | 6/2011 |
| JP | 2011-209786 | A | 10/2011 |
| JP | 2011-237857 | A | 11/2011 |
| JP | 2012-168966 | A | 9/2012 |
| JP | 2013-506225 | A | 2/2013 |
| JP | 2013-93699 | A | 5/2013 |
| JP | 2013-98613 | A | 5/2013 |
| JP | 2013-530433 | A | 7/2013 |
| JP | 2013-530458 | A | 7/2013 |
| JP | 2013-175188 | A | 9/2013 |
| JP | 2014-503861 | A | 2/2014 |
| JP | 2014-512044 | A | 5/2014 |
| JP | 2014-110638 | A | 6/2014 |
| JP | 2014-131359 | A | 7/2014 |
| JP | 2015-8001 | A | 1/2015 |
| JP | 2015-14923 | A | 1/2015 |
| JP | 2015-501022 | A | 1/2015 |
| JP | 2015-520456 | A | 7/2015 |
| JP | 2015-524974 | A | 8/2015 |
| JP | 2015-526776 | A | 9/2015 |
| JP | 6023162 | B2 | 11/2016 |
| KR | 10-2003-0030384 | A | 4/2003 |
| KR | 10-2005-0072071 | A | 7/2005 |
| KR | 10-2007-0101893 | A | 10/2007 |
| KR | 10-2007-0120125 | A | 12/2007 |
| KR | 10-0805341 | B1 | 2/2008 |
| KR | 10-2009-0089472 | A | 8/2009 |
| KR | 10-1253392 | B1 | 4/2013 |
| KR | 10-2013-0063019 | A | 6/2013 |
| KR | 10-2013-0075783 | A | 7/2013 |
| KR | 10-2013-0082190 | A | 7/2013 |
| KR | 10-2013-0108563 | A | 10/2013 |
| KR | 10-2013-0141688 | A | 12/2013 |
| KR | 10-1342208 | B1 | 12/2013 |
| KR | 10-2014-0031283 | A | 3/2014 |
| KR | 10-2014-0137400 | A | 12/2014 |
| KR | 10-2016-0045633 | A | 4/2016 |
| KR | 10-2017-0008601 | A | 1/2017 |
| KR | 10-1820573 | B1 | 1/2018 |
| KR | 10-2019-0014495 | A | 2/2019 |
| KR | 10-2019-0057414 | A | 5/2019 |
| MX | 336834 | B | 2/2016 |
| TW | 201131471 | A | 9/2011 |
| TW | 201137722 | A | 11/2011 |
| TW | 201316247 | A | 4/2013 |
| TW | 201324310 | A | 6/2013 |
| TW | 201403363 | A | 1/2014 |
| TW | 201409345 | A | 3/2014 |
| TW | 201415345 | A | 4/2014 |
| TW | 201416959 | A | 5/2014 |
| WO | 1999/44114 | A1 | 9/1999 |
| WO | 2002/01864 | A1 | 1/2002 |

(56) References Cited

FOREIGN PATENT DOCUMENTS

| | | | |
|---|---|---|---|
| WO | 03/036457 | A2 | 5/2003 |
| WO | 2003/054832 | A1 | 7/2003 |
| WO | 2003/062975 | A1 | 7/2003 |
| WO | 2003/062976 | A1 | 7/2003 |
| WO | 2004/095414 | A1 | 11/2004 |
| WO | 2005/031608 | A2 | 4/2005 |
| WO | 2005/053225 | A1 | 6/2005 |
| WO | 2005/109829 | A1 | 11/2005 |
| WO | 2006/011139 | A2 | 2/2006 |
| WO | 2006/020304 | A2 | 2/2006 |
| WO | 2006/020305 | A2 | 2/2006 |
| WO | 2006/130234 | A2 | 12/2006 |
| WO | 2007/073422 | A1 | 6/2007 |
| WO | 2007/102110 | A2 | 9/2007 |
| WO | 2007/142703 | A1 | 12/2007 |
| WO | 2007/149731 | A1 | 12/2007 |
| WO | 2008/033853 | A2 | 3/2008 |
| WO | 2008/085742 | A2 | 7/2008 |
| WO | 2009/086599 | A1 | 7/2009 |
| WO | 2009/097592 | A1 | 8/2009 |
| WO | 2010/087988 | A1 | 8/2010 |
| WO | 2010/107661 | A1 | 9/2010 |
| WO | 2010/120972 | A1 | 10/2010 |
| WO | 2010/128442 | A2 | 11/2010 |
| WO | 2011/041427 | A2 | 4/2011 |
| WO | 2011/084857 | A1 | 7/2011 |
| WO | 2011/126502 | A1 | 10/2011 |
| WO | 2011/149231 | A2 | 12/2011 |
| WO | 2012/004288 | A1 | 1/2012 |
| WO | 2012/006494 | A1 | 1/2012 |
| WO | 2012/028773 | A1 | 3/2012 |
| WO | 2012/050927 | A2 | 4/2012 |
| WO | 2012/051052 | A1 | 4/2012 |
| WO | 2012/126078 | A1 | 9/2012 |
| WO | 2012/154748 | A1 | 11/2012 |
| WO | 2012/166352 | A1 | 12/2012 |
| WO | 2012/170446 | A2 | 12/2012 |
| WO | 2013/000150 | A1 | 1/2013 |
| WO | 2013/026023 | A1 | 2/2013 |
| WO | 2013/048880 | A1 | 4/2013 |
| WO | 2013/049346 | A1 | 4/2013 |
| WO | 2013/097895 | A1 | 7/2013 |
| WO | 2013/097896 | A1 | 7/2013 |
| WO | 2013/111239 | A1 | 8/2013 |
| WO | 2013/132144 | A1 | 9/2013 |
| WO | 2013/135270 | A1 | 9/2013 |
| WO | 2013/137503 | A1 | 9/2013 |
| WO | 2013/153405 | A2 | 10/2013 |
| WO | 2013/169842 | A2 | 11/2013 |
| WO | 2013/169846 | A1 | 11/2013 |
| WO | 2013/169875 | A2 | 11/2013 |
| WO | 2013/173504 | A1 | 11/2013 |
| WO | 2013/173838 | A2 | 11/2013 |
| WO | 2013/176847 | A1 | 11/2013 |
| WO | 2014/021967 | A1 | 2/2014 |
| WO | 2014/030320 | A1 | 2/2014 |
| WO | 2014/032461 | A1 | 3/2014 |
| WO | 2014/078965 | A1 | 5/2014 |
| WO | 2014/107469 | A2 | 7/2014 |
| WO | 2014/115605 | A1 | 7/2014 |
| WO | 2014/147297 | A1 | 9/2014 |
| WO | 2013/173504 | A8 | 12/2014 |
| WO | 2014/197279 | A1 | 12/2014 |
| WO | 2015/062410 | A1 | 5/2015 |
| WO | 2015/076930 | A1 | 5/2015 |
| WO | 2015/124831 | A1 | 8/2015 |
| WO | 2015/134692 | A1 | 9/2015 |
| WO | 2016/033400 | A1 | 3/2016 |
| WO | 2017/058442 | A1 | 4/2017 |
| WO | 2017/147081 | A1 | 8/2017 |
| WO | 2018/098136 | A1 | 5/2018 |
| WO | 2018/144339 | A2 | 8/2018 |
| WO | 2018/213401 | A1 | 11/2018 |

OTHER PUBLICATIONS

Office Action received for Danish Patent Application No. PA201770406, dated Feb. 27, 2018, 7 pages.
Office Action received for Danish Patent Application No. PA201770406, dated Jan. 25, 2019, 8 pages.
Search Report and Written Opinion received for Danish Patent Application No. PA201770406, dated Jun. 22, 2017, 11 pages.
Office Action received for Danish Patent Application No. PA201770406, dated Mar. 26, 2019, 3 pages.
Non-Final Office Action received for U.S. Appl. No. 16/702,968, dated Apr. 8, 2020, 20 pages.
Jarvie, "Alexa plays me music", Available online at: https://www.youtube.com/watch?v=bR2ZC8Sy8YQ, Feb. 23, 2015, 1 page.
Advisory Action received for U.S. Appl. No. 10/308,315, dated Jul. 10, 2006, 3 pages.
Advisory Action received for U.S. Appl. No. 12/395,537, dated Apr. 26, 2012, 4 pages.
Advisory Action received for U.S. Appl. No. 12/566,673, dated Jun. 12, 2013, 3 pages.
Advisory Action received for U.S. Appl. No. 13/038,217, dated Dec. 8, 2014, 3 pages.
Advisory Action received for U.S. Appl. No. 13/587,850, dated May 15, 2015, 2 pages.
Advisory Action received for U.S. Appl. No. 15/730,610, dated Oct. 24, 2019, 5 pages.
Appeal Brief received for U.S. Appl. No. 11/522,167 mailed on Nov. 23, 2010, 65 pages.
Apple, "Iphone User's Guide", iPhone first generation, Available at: http://pocketpccentral.net/iphone/products/1 g_iphone.htm, Jun. 29, 2007, 124 pages.
Benjamin, Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Bennett, Stephen, "ES2: Logic's Most Sophisticated Virtual Analogue Synth", Logic Notes & Techniques, Jun. 2007, 6 pages.
Bove, Tony, "iPod & iTunes for Dummies", Wiley Publishing, Inc., 6th Edition, 2008, pp. 143-182.
Butler, Travis, "Portable MP3: The Nomad Jukebox", available at http://tidbits.com/article/6261, Jan. 8, 2001, 4 pages.
Call Me, "0:24 / 3:22 Samsung R3 højttaler giver dig en lækker 360 graders lydoplevelse—med WiFi og Bluetooth | Call me", Available Online at: <https://www.youtube.com/watch?v=4Uv_sOhrlro>, Sep. 22, 2016, 3 pages.
Cipriani, "How to use Spotify's Offline mode on iPhone", XP055533907, retrieved from the Internet: URL: https://www.cnet.com/how-to/how-to-use-spotifys-offline-mode-on-iphone/, Aug. 1, 2011, 5 pages.
Corrected Notice of Allowance received for U.S. Appl. No. 14/830,629, dated Feb. 13, 2019, 3 pages.
Decision on Appeal received for U.S. Appl. No. 12/566,673, mailed on Dec. 18, 2019, 10 pages.
Decision on Appeal received for U.S. Appl. No. 13/587,850, mailed on Aug. 28, 2019, 21 pages.
Decision on Appeal received for U.S. Appl. No. 13/587,850, mailed on Oct. 21, 2019, 3 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for European Patent Application No. 10712824.1, dated May 17, 2018, 3 pages.
Decision to Grant received for European Patent Application No. 12181537.7, dated Mar. 3, 2016, 2 pages.
Decision to Grant received for Japanese Patent Application No. 2014-017726, dated Dec. 7, 2015, 6 pages.
Decision to Refuse received for European Patent Application No. 07842262.3, dated Dec. 21, 2018, 8 pages.

(56) References Cited

OTHER PUBLICATIONS

Decision to Refuse received for European Patent Application No. 10177096.4, dated Feb. 13, 2019, 4 pages.
Decision to Refuse received for European Patent Application No. 12753631.6, dated Feb. 20, 2019, 20 pages.
Detroitborg, "Apple Music: Walkthrough", YouTube Video, online available at: https://www.youtube.com/watch?v=NLgjodiAtbQ, Jun. 30, 2015, 1 page.
Digital Video Editor, IBM Technical Disclosure Bulletin, vol. 35, No. 2, Jul. 1, 1992, 6 pages.
Enright, Andrew Coulter, "Dissatisfaction Sows Innovation", Available at http://web.archive.org/web/20051225123312/http://thetreehouseandthecave.blogspot.com/2004/12/dissatisfaction-sows-innovation.html, Dec. 29, 2004, 6 pages.
Enright, Andrew Coulter, "Meet Cover Flow", Available online at http://web.archive.org/web/20060111073239/thetreehouseandthecave.blogspot.com/2005/08/meet-coverflow.html, Aug. 13, 2005, 2 pages.
Enright, Andrew Coulter, "Visual Browsing on an iBook Ds", Available online at:—<http://web.archive.org/web/20060111175609/thetreehouseandthecave.blogspot.com/2004/12/visual-browsing-on-i book-ds.html>, Dec. 29, 2004, 2 pages.
Examiner's Answer to Appeal Brief received for U.S. Appl. No. 11/522,167 mailed on Feb. 15, 2011, 13 pages.
Examiner's Answer to Appeal Brief received for U.S. Appl. No. 12/566,673, mailed on Nov. 17, 2017, 10 pages.
Extended European Search Report (includes Partial European Search Report and European Search Opinion) received for European Patent Application No. 12181537.7, dated Mar. 27, 2014, 7 pages.
Extended European Search Report (includes Partial European Search Report and European Search Opinion) received for European Patent Application No. 13184872.3, dated Dec. 5, 2013, 9 pages.
Extended European Search Report for European Application No. 10177099.8, dated Oct. 18, 2010, 7 pages.
Extended European Search Report received for European Patent Application No. 10177096.4, dated Oct. 18, 2010, 9 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 19169980.0, dated Jul. 2, 2019, 8 pages.
Extended European Search Report received for European Patent Application No. 19207753.5, dated Dec. 18, 2019, 9 pages.
Final Office Action received for U.S. Appl. No. 09/293,507, dated Apr. 24, 2002, 12 pages.
Final Office Action received for U.S. Appl. No. 09/293,507, dated Feb. 14, 2001, 10 pages.
Final Office Action received for U.S. Appl. No. 10/308,315, dated Apr. 6, 2005, 10 pages.
Final Office Action received for U.S. Appl. No. 10/308,315, dated Mar. 9, 2006, 10 pages.
Final Office Action received for U.S. Appl. No. 10/308,315, dated Mar. 23, 2007, 12 pages.
Final Office Action received for U.S. Appl. No. 11/459,591, dated Jan. 13, 2009, 11 pages.
Final Office Action received for U.S. Appl. No. 11/522,167, dated Aug. 5, 2009, 9 pages.
Final Office Action received for U.S. Appl. No. 11/522,167, dated Jul. 23, 2010, 11 pages.
Final Office Action received for U.S. Appl. No. 11/522,167, dated Jun. 3, 2013, 18 pages.
Final Office Action received for U.S. Appl. No. 11/522,167, dated Oct. 15, 2008, 10 pages.
Final Office Action received for U.S. Appl. No. 11/767,409, dated Jul. 17, 2012, 24 pages.
Final Office Action received for U.S. Appl. No. 11/767,409, dated Mar. 16, 2011, 15 pages, 15 pages.
Final Office Action received for U.S. Appl. No. 11/960,674, dated May 12, 2011, 10 pages.
Final Office Action received for U.S. Appl. No. 11/983,059, dated Jun. 6, 2011, 11 pages.
Final Office Action received for U.S. Appl. No. 12/215,651, dated Jul. 6, 2012, 27 pages.
Final Office Action received for U.S. Appl. No. 12/395,537, dated Feb. 3, 2012, 15 pages.
Final Office Action received for U.S. Appl. No. 12/395,537, dated Jun. 29, 2015, 17 pages.
Final Office Action received for U.S. Appl. No. 12/395,537, dated Nov. 14, 2013, 22 pages.
Final Office Action received for U.S. Appl. No. 12/395,541, dated Dec. 28, 2011, 16 pages.
Final Office Action received for U.S. Appl. No. 12/566,669, dated Nov. 23, 2012, 29 pages.
Final Office Action received for U.S. Appl. No. 12/566,671, dated Dec. 20, 2012, 20 pages.
Final Office Action received for U.S. Appl. No. 12/566,673, dated Aug. 12, 2016, 28 pages.
Final Office Action received for U.S. Appl. No. 12/566,673, dated Jan. 17, 2013, 22 pages.
Final Office Action received for U.S. Appl. No. 12/566,673, dated Mar. 25, 2014, 19 pages.
Final Office Action received for U.S. Appl. No. 13/038,217, dated May 6, 2014, 11 pages.
Final Office Action received for U.S. Appl. No. 13/333,890, dated Feb. 13, 2014, 19 pages.
Final Office Action received for U.S. Appl. No. 13/333,890, dated Oct. 2, 2015, 21 pages.
Final Office Action received for U.S. Appl. No. 13/333,900, dated Dec. 19, 2014, 15 pages.
Final Office Action received for U.S. Appl. No. 13/333,900, dated Nov. 7, 2013, 14 pages.
Final Office Action received for U.S. Appl. No. 13/489,245, dated Mar. 28, 2014, 23 pages.
Final Office Action received for U.S. Appl. No. 13/489,245, dated Oct. 16, 2019, 25 pages.
Final Office Action received for U.S. Appl. No. 13/489,245, dated Sep. 27, 2018, 25 pages.
Final Office Action received for U.S. Appl. No. 13/587,850, dated May 3, 2016, 31 pages.
Final Office Action received for U.S. Appl. No. 13/587,850, dated Nov. 28, 2014, 22 pages.
Final Office Action received for U.S. Appl. No. 14/045,544, dated May 6, 2016, 26 pages.
Final Office Action received for U.S. Appl. No. 14/830,629, dated Apr. 16, 2018, 27 pages.
Final Office Action received for U.S. Appl. No. 15/730,610, dated Aug. 6, 2019, 28 pages.
Final Office Action received for U.S. Appl. No. 15/910,263, dated Aug. 28, 2019, 32 pages.
Final Office Action received in U.S. Appl. No. 12/547,401, dated Feb. 11, 2013, 13 pages.
Final Office Action received in U.S. Appl. No. 12/547,401, dated Jun. 28, 2010, 19 pages.
Finkelstein, Ellen, "Temporarily Override Object Snap Settings", AutoCAD Tips Blog, Apr. 9, 2007, 4 pages.
Fox 11 Los Angeles, "Review: Samsung Radiant R3 Wireless Speakers", Available Online at: <https://www.youtube.com/watch?v=ZBICVE1WdKE>, Jan. 19, 2016, 3 pages.
"Free Virtual Classic Analogue Mono Synth,Samsara Cycle Audio Releases" DEISK-O, Jan. 2, 2011, 3 pages.
Google, "Google Home smart speaker", Google Home Help, Listen to music, Datasheet [online], Available Online at:—<https://web.archive.org/web/20170326051235/https:/support.google.com/googlehome/answer/7030379?hl=en&ref_topic=7030084>, Mar. 26, 2017, 3 pages.
Hoffberger, Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
How-To: iTunes in the Cloud,available at <http://y2kemo.com/2011/06/how-to-itunes-in-the-cloud/>, Jun. 9, 2011, 4 pages.
Hughes, Neil, "Apple Explores Merging Cloud Content with Locally Stored Media Library", Available at <http://appleinsider.com/articles/

(56) References Cited

OTHER PUBLICATIONS

11/02/10/apple_explores_merging_cloud_content_with_locally_stored_media_library.html>, Feb. 10, 2011, 2 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.
Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770408, dated Nov. 30, 2018, 3 pages.
Intention to Grant received for European Patent Application No. 10712824.1, dated Jan. 5, 2018, 9 pages.
Intention to Grant Received for European Patent Application No. 12181537.7, dated Sep. 22, 2015, 7 pages.
Intention to Grant received for European Patent Application No. 13184872.3, dated Feb. 11, 2019, 7 pages.
International Preliminary Report on Patentability received for PCT Patent Application No. PCT/US00/010441, dated Feb. 14, 2001, 3 pages.
International Preliminary Report on Patentability received for PCT Patent Application No. PCT/US2006/062714, dated Jul. 8, 2008, 6 pages.
International Preliminary Report on Patentability received for PCT Patent Application No. PCT/US2007/078180, dated Mar. 17, 2009, 6 pages.
International Preliminary Report on Patentability received for PCT Patent Application No. PCT/US2007/088914, dated Jul. 7, 2009, 8 pages.
International Preliminary Report on Patentability received for PCT Patent Application No. PCT/US2010/027088, dated Sep. 29, 2011, 7 pages.
International Preliminary Report on Patentability received for PCT Patent Application No. PCT/US2012/025314, dated Sep. 12, 2013, 8 pages.
International Preliminary Report on Patentability received for PCT Patent Application No. PCT/US2012/051432, dated Feb. 27, 2014, 10 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2018/032158, dated Nov. 21, 2019, 12 pages.
International Preliminary Report on Patentability received for PCT Patent Application No. PCT/US2018/032904, dated Nov. 28, 2019, 14 pages.
International Search Report and Written Opinion received for PCT Patent Application No. PCT/US00/10441, dated Jul. 11, 2000, 2 pages.
International Search Report and Written Opinion received for PCT Patent Application No. PCT/US2007/078180, dated Mar. 3, 2008, 8 pages.
International Search Report and Written Opinion received for PCT Patent Application No. PCT/US2007/088914, dated Jun. 23, 2008, 10 pages.
International Search Report and Written Opinion received for PCT Patent Application No. PCT/US2010/027088, dated Jun. 18, 2010, 8 pages.
International Search Report and Written Opinion received for PCT Patent Application No. PCT/US2012/025314, dated May 14, 2012, 10 pages.
International Search Report and Written Opinion received for PCT Patent Application No. PCT/US2012/051432, dated Oct. 29, 2012, 12 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2018/032158, dated Nov. 2, 2018, 19 pages.
International Search Report and Written Opinion received for PCT Patent Application No. PCT/US2018/032904, dated Oct. 1, 2018, 21 pages.
Invitation to Pay Addition Fees and Partial International Search Report received for PCT Patent Application No. PCT/US2018/032904, dated Jul. 31, 2018, 18 pages.
Invitation to Pay Additional Fees received for PCT Patent Application No. PCT/US2018/032158, dated Sep. 10, 2018, 16 pages.
Kanter, David, "Start Download Automatically Sync Your (New) Music, Apps, and iBooks Across Your iDevices with iCloud", Available online at: https://appadvice.com/appnn/2011/06/automatically-sync-music-apps-ibooks-idevices-icloud, Jun. 8, 2011, 6 pages.
Kim, et al., "An Energy Efficient Transmission Scheme for Real-Time Data in Wireless Sensor Networks", Sensors, vol. 15, May 20, 2015, 25 pages.
Mac Fan, "Chapter 4: The True Character of Apple's Genuine Cloud—Your Personal Data Always Exist in There, Regardless of Your Location", Mainichi Communications Inc., vol. 19, No. 8, Aug. 1, 2011, 8 pages.
Mcelhearn, Kirk, "iTunes 10.3 Offers Automatic Downloads and Access to Purchases", Available at <http://web.archive.org/web/20110613084837/http://www.tidbits.com/article/12235>, Jun. 8, 2011, 5 pages.
Minutes of the Oral Proceedings received for European Patent Application No. 00923491.5, mailed on May 11, 2011, 65 pages.
Minutes of the Oral Proceedings received for European Patent Application No. 12753631.6, mailed on Feb. 20, 2019, 3 pages.
Miser, Brad, "Sams Teach Yourself iTunes® 10 in 10 Minutes", SAMS Publishing, Dec. 30, 2010, pp. 65 and 67-69.
Non-Final Office Action received for U.S. Appl. No. 12/395,537, dated Dec. 14, 2015, 18 pages.
Non-Final Office Action received for U.S. Appl. No. 09/293,507, dated Aug. 1, 2001, 13 pages.
Non-Final Office Action received for U.S. Appl. No. 09/293,507, dated Jun. 22, 2000, 11 pages.
Non-Final Office Action received for U.S. Appl. No. 09/293,508, dated Jun. 30, 2000, 10 pages.
Non-Final Office Action received for U.S. Appl. No. 10/308,315, dated Aug. 8, 2005, 12 pages.
Non-Final Office Action received for U.S. Appl. No. 10/374,013, dated Feb. 1, 2007, 8 pages.
Non-Final Office Action received for U.S. Appl. No. 11/459,591, dated Jul. 29, 2008, 15 pages.
Non-Final Office Action received for U.S. Appl. No. 11/521,740, dated Dec. 27, 2007, 8 pages.
Non-Final Office Action received for U.S. Appl. No. 11/522,167, dated Dec. 6, 2012, 15 pages.
Non-Final Office Action received for U.S. Appl. No. 11/522,167, dated Feb. 5, 2009, 9 pages.
Non-Final Office Action received for U.S. Appl. No. 11/522,167, dated Jan. 20, 2010, 10 pages.
Non-Final Office Action received for U.S. Appl. No. 11/522,167, dated May 2, 2007, 8 pages.
Non-Final Office Action received for U.S. Appl. No. 11/522,167, dated Oct. 19, 2007, 10 pages.
Non-Final Office Action received for U.S. Appl. No. 11/767,409, dated Aug. 29, 2011, 18 pages.
Non-Final Office Action received for U.S. Appl. No. 11/767,409, dated Feb. 9, 2012, 20 pages.
Non-Final Office Action received for U.S. Appl. No. 11/767,409, dated Nov. 23, 2010, 12 pages.
Non-Final Office Action received for U.S. Appl. No. 11/960,674, dated Oct. 27, 2010, 7 pages.

(56) References Cited

OTHER PUBLICATIONS

Non-Final Office Action received for U.S. Appl. No. 11/983,059, dated Dec. 30, 2010, 11 pages.
Non-Final Office Action received for U.S. Appl. No. 12/215,651, dated Aug. 15, 2013, 27 pages.
Non-Final Office Action received for U.S. Appl. No. 12/215,651, dated Feb. 2, 2012, 18 pages.
Non-Final Office Action received for U.S. Appl. No. 12/395,537, dated Aug. 15, 2011, 17 pages.
Non-Final Office Action received for U.S. Appl. No. 12/395,537, dated Jan. 5, 2015, 20 pages.
Non-Final Office Action received for U.S. Appl. No. 12/395,537, dated Jul. 8, 2013, 22 pages.
Non-Final Office Action received for U.S. Appl. No. 12/395,541, dated Jul. 26, 2011, 15 pages.
Non-Final Office Action received for U.S. Appl. No. 12/395,541, dated Mar. 14, 2013, 23 pages.
Non-Final Office Action received for U.S. Appl. No. 12/566,669, dated Apr. 17, 2014, 27 pages.
Non-Final Office Action received for U.S. Appl. No. 12/566,669, dated Jun. 19, 2012, 30 pages.
Non-Final Office Action received for U.S. Appl. No. 12/566,671, dated May 23, 2012, 21 pages.
Non-Final Office Action received for U.S. Appl. No. 12/566,672, dated Nov. 8, 2012, 11 pages.
Non-Final Office Action received for U.S. Appl. No. 12/566,673, dated Jun. 7, 2012, 17 pages.
Non-Final Office Action received for U.S. Appl. No. 12/566,673, dated Mar. 26, 2015, 19 pages.
Non-Final Office Action received for U.S. Appl. No. 12/566,673, dated Sep. 13, 2013, 18 pages.
Non-Final Office Action received for U.S. Appl. No. 13/038,217, dated Sep. 13, 2013, 16 pages.
Non-Final Office Action received for U.S. Appl. No. 13/333,890, dated Aug. 30, 2013, 20 pages.
Non-Final Office Action received for U.S. Appl. No. 13/333,890, dated Jun. 5, 2015, 20 pages.
Non-Final Office Action received for U.S. Appl. No. 13/333,890, dated May 1, 2013, 26 pages.
Non-Final Office Action received for U.S. Appl. No. 13/333,900, dated Mar. 19, 2013, 17 pages.
Non-Final Office Action received for U.S. Appl. No. 13/333,900, dated May 23, 2014, 19 pages.
Non-Final Office Action received for U.S. Appl. No. 13/489,245, dated Apr. 8, 2019, 27 pages.
Non-Final Office Action received for U.S. Appl. No. 13/489,245, dated Dec. 27, 2017, 22 pages.
Non-Final Office Action received for U.S. Appl. No. 13/489,245, dated Nov. 20, 2013, 25 pages.
Non-Final Office Action received for U.S. Appl. No. 13/587,850, dated Apr. 7, 2014, 18 pages.
Non-Final Office Action received for U.S. Appl. No. 13/587,850, dated Oct. 8, 2015, 29 pages.
Non-Final Office Action received for U.S. Appl. No. 14/045,544, dated Oct. 6, 2015, 20 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 15/274,963, dated Mar. 13, 2018, 23 pages.
Non-Final Office Action received for U.S. Appl. No. 15/730,610, dated Feb. 1, 2019, 22 pages.
Non-Final Office Action received for U.S. Appl. No. 15/910,263, dated Mar. 4, 2019, 26 pages.
Non-Final Office Action received for U.S. Appl. No. 16/584,743, dated Feb. 6, 2020, 15 pages.
Non-Final Office Action received for U.S. Appl. No. 10/308,315, dated Jul. 28, 2004, 10 pages.
Non-Final Office Action received for U.S. Appl. No. 12/566,673, dated Dec. 16, 2015, 23 pages.
Non-Final Office Action received in U.S. Appl. No. 12/547,401, dated Jan. 8, 2010, 12 pages.
Notice of Acceptance received for Australian Patent Application No. 2016201454, dated Mar. 1, 2018, 3 pages.
Notice of Acceptance received for Australian Patent Application No. 2018223051, dated Oct. 30, 2018, 3 pages.
Notice of Acceptance received for Australian Patent Application No. 2018236872, dated Jul. 9, 2019, 3 pages.
Notice of Allowance and Search Report received for Taiwanese Patent Application No. 104128687, dated Jun. 7, 2016, 4 pages.
Notice of Allowance Received for Canadian Patent Application No. 2,661,200, dated Aug. 20, 2014, 1 page.
Notice of Allowance received for Canadian Patent Application No. 2,882,403, dated Oct. 31, 2018, 1 page.
Notice of Allowance received for Chinese Patent Application No. 201210308569.5, dated May 31, 2016, 4 pages.
Notice of Allowance received for Chinese Patent Application No. 201280040169.9, dated Sep. 4, 2018, 3 pages.
Notice of Allowance received for Chinese Patent Application No. 201410449822.8, dated Mar. 5, 2019, 2 pages.
Notice of Allowance received for Danish Patent Application No. PA201770408, dated Feb. 8, 2019, 2 pages.
Notice of Allowance received for Japanese Patent Application No. 2012-500842, dated Jun. 20, 2014, 3 pages.
Notice of Allowance received for Japanese Patent Application No. 2014-148065, dated Jan. 12, 2016, 6 pages.
Notice of Allowance received for Japanese Patent Application No. 2014-526255, dated Jan. 7, 2016, 6 pages.
Notice of Allowance received for Japanese Patent Application No. 2016-001259, dated Jul. 27, 2018, 4 pages.
Notice of Allowance received for Japanese Patent Application No. 2016-017400, dated Dec. 16, 2016, 3 pages.
Notice of Allowance received for Japanese Patent Application No. 2016-022175, dated Jan. 12, 2018, 4 pages.
Notice of allowance received for Korean Patent Application No. 10-2013-7028489, dated Jan. 25, 2016, 5 pages.
Notice of Allowance received for Korean Patent Application No. 10-2014-7006538, dated May 19, 2016, 3 pages.
Notice of Allowance received for Korean Patent Application No. 1020167025395, dated Oct. 26, 2016, 5 pages.
Notice of Allowance received for Korean Patent Application No. 10-2017-7035057, dated May 31, 2018, 4 pages.
Notice of Allowance received for Mexican Patent Application No. MX/a/2014/001761, dated Sep. 11, 2015, 3 pages.
Notice of Allowance received for Mexican Patent Application No. MX/a/2016/001209, dated Mar. 26, 2018, 3 pages.
Notice of Allowance received for U.S. Appl. No. 09/293,507, dated Jul. 25, 2002, 6 pages.
Notice of Allowance received for U.S. Appl. No. 09/293,508, dated Feb. 13, 2001, 5 pages.
Notice of Allowance received for U.S. Appl. No. 10/308,315, dated Aug. 27, 2007, 6 pages.
Notice of Allowance received for U.S. Appl. No. 10/374,013, dated Aug. 27, 2007, 6 pages.
Notice of Allowance received for U.S. Appl. No. 10/374,445, dated May 5, 2006, 7 pages.
Notice of Allowance received for U.S. Appl. No. 10/374,831, dated Sep. 10, 2004, 8 pages.
Notice of Allowance received for U.S. Appl. No. 11/459,591, dated May 21, 2009, 9 pages.
Notice of Allowance received for U.S. Appl. No. 11/521,740, dated Jul. 24, 2008, 7 pages.
Notice of Allowance received for U.S. Appl. No. 11/767,409, dated Jun. 12, 2013, 14 pages.
Notice of Allowance received for U.S. Appl. No. 11/960,674, dated Sep. 2, 2011, 7 pages.
Notice of Allowance received for U.S. Appl. No. 11/983,059, dated Feb. 10, 2012, 8 pages.
Notice of Allowance received for U.S. Appl. No. 12/215,651, dated Feb. 6, 2014, 5 pages.

(56) References Cited

OTHER PUBLICATIONS

Notice of Allowance received for U.S. Appl. No. 12/395,537 dated Jun. 29, 2016, 14 pages.
Notice of Allowance received for U.S. Appl. No. 12/395,541, dated Aug. 22, 2013, 8 pages.
Notice of Allowance received for U.S. Appl. No. 12/395,541, dated Sep. 12, 2013, 2 pages.
Notice of Allowance received for U.S. Appl. No. 12/547,401, dated Jul. 22, 2013, 8 pages.
Notice of Allowance received for U.S. Appl. No. 12/566,669, dated Nov. 6, 2014, 12 pages.
Notice of Allowance received for U.S. Appl. No. 12/566,671, dated Apr. 12, 2013, 11 pages.
Notice of Allowance received for U.S. Appl. No. 12/566,671, dated Dec. 18, 2013, 11 pages.
Notice of Allowance received for U.S. Appl. No. 12/566,672, dated Jun. 24, 2013, 8 pages.
Notice of Allowance received for U.S. Appl. No. 12/566,672, dated Mar. 1, 2013, 7 pages.
Notice of Allowance received for U.S. Appl. No. 12/566,673, dated Feb. 26, 2020, 7 pages.
Notice of Allowance received for U.S. Appl. No. 13/333,900, dated Apr. 13, 2015, 9 pages.
Notice of Allowance received for U.S. Appl. No. 13/333,900, dated Dec. 1, 2015, 2 pages.
Notice of Allowance received for U.S. Appl. No. 13/333,900, dated Sep. 15, 2015, 7 pages.
Notice of Allowance received for U.S. Appl. No. 13/587,850, dated Feb. 27, 2020, 5 pages.
Notice of Allowance received for U.S. Appl. No. 13/587,850, dated Nov. 8, 2019, 6 pages.
Notice of Allowance received for U.S. Appl. No. 14/830,629, dated Oct. 17, 2018, 8 pages.
Notice of Allowance received for U.S. Appl. No. 15/274,963, dated Jul. 6, 2018, 10 pages.
Notice of Grant received for Chinese Patent Application No. 200780033722.5, dated Jun. 19, 2014, 4 pages.
Notice of Non-Compliant Amendment received for U.S. Appl. No. 11/522,167 dated May 14, 2008, 4 pages.
Office Action received for Australian Patent Application No. 2012296381, dated Jan. 21, 2016, 5 pages.
Office Action received for Australian Patent Application No. 2012296381, dated Mar. 4, 2016, 4 pages.
Office Action received for Australian Patent Application No. 2012296381, dated Mar. 6, 2015, 4 pages.
Office Action received for Australian Patent Application No. 2016201454, dated Mar. 29, 2017, 3 pages.
Office Action received for Australian Patent Application No. 2018203624, dated Feb. 5, 2020, 4 pages.
Office Action received for Australian Patent Application No. 2018203624, dated Mar. 15, 2019, 6 pages.
Office Action received for Australian Patent Application No. 2018203624, dated Oct. 30, 2019, 5 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Brazilian Patent Application No. BR112014003009-0, dated Oct. 29, 2019, 6 pages.
Office Action Received for Canadian Patent Application No. 2,661,200, dated Jan. 3, 2013, 5 pages.
Office Action received for Canadian Patent Application No. 2,661,200, dated Jun. 9, 2010, 3 pages.
Office Action Received for Canadian Patent Application No. 2,661,200, dated Nov. 1, 2011, 4 pages.
Office Action received for Canadian Patent Application No. 2,661,200, dated Nov. 14, 2013, 2 pages.
Office Action received for Canadian Patent Application No. 2,882,403, dated Apr. 2, 2015, 5 pages.
Office Action received for Canadian Patent Application No. 2,882,403, dated Sep. 15, 2017, 5 pages.
Office Action received for Chinese Patent Application No. 201210308569.5, dated Feb. 5, 2016, 3 pages.
Office Action received for Chinese Patent Application No. 201210308569.5, dated Nov. 19, 2014, 24 pages.
Office Action received for Chinese Patent Application No. 201210308569.5, dated Sep. 1, 2015, 39 pages.
Office Action received for Chinese Patent Application No. 201280040169.9, dated Jun. 1, 2016, 10 pages.
Office Action received for Chinese Patent Application No. 201280040169.9, dated Mar. 31, 2017, 13 pages.
Office Action received for Chinese Patent Application No. 201280040169.9, dated May 14, 2018, 6 pages.
Office Action received for Chinese Patent Application No. 201280040169.9, dated Sep. 20, 2017, 14 pages.
Office Action received for Chinese Patent Application No. 201410449822.8, dated Dec. 2, 2016, 9 pages.
Office Action received for Chinese Patent Application No. 201410449822.8, dated May 4, 2018, 12 pages.
Office Action received for Chinese Patent Application No. 201410449822.8, dated Nov. 20, 2018, 11 pages.
Office Action received for Chinese Patent Application No. 201410449822.8, dated Sep. 30, 2017, 20 pages.
Office Action received for Chinese Patent Application No. 201580046339.8, dated Feb. 26, 2019, 18 pages.
Office Action received for Chinese Patent Application No. 201580046339.8, dated Oct. 31, 2019, 9 pages.
Office Action received for Chinese Patent Application No. 201811539259.8, dated Sep. 18, 2019, 12 pages.
Office Action received for Chinese Patent Application No. 201811539260.0, dated Oct. 8, 2019, 14 pages.
Office Action received for Chinese Patent Application No. 201880001436.9, dated Apr. 28, 2019, 19 pages.
Office Action received for Chinese Patent Application No. 201880001436.9, dated Nov. 6, 2019, 24 pages.
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770408, dated Dec. 21, 2017, 6 pages.
Office Action received for Danish Patent Application No. PA201770408, dated Jun. 20, 2017, 9 pages.

(56) References Cited

OTHER PUBLICATIONS

Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for European Patent Application No. 00923491.5, dated Jan. 11, 2010, 6 pages.
Office Action received for European Patent Application No. 00923491.5, dated Mar. 12, 2007, 9 pages.
Office Action received for European Patent Application No. 00923491.5, dated Sep. 11, 2007, 5 pages.
Office Action received for European Patent Application No. 07842262.3, dated Feb. 16, 2017, 6 Pages.
Office Action received for European Patent Application No. 07842262.3, dated Sep. 8, 2011, 5 pages.
Office Action received for European Patent Application No. 10177096.4, dated Feb. 20, 2012, 6 pages.
Office Action received for European Patent Application No. 10177096.4, dated Jul. 26, 2017, 8 pages.
Office Action received for European Patent Application No. 10177096.4, dated Jun. 7, 2018, 14 pages.
Office Action received for European Patent Application No. 10177096.4, dated Mar. 21, 2013, 9 pages.
Office Action received for European Patent Application No. 10177099.8, dated Feb. 20, 2012, 5 pages.
Office Action received for European Patent Application No. 10712824.1, dated Jun. 23, 2014, 7 pages.
Office Action received for European Patent Application No. 12753631.6, dated Jul. 10, 2017, 6 pages.
Office Action received for European Patent Application No. 13184872.3, dated May 18, 2018, 8 pages.
Office Action received for European Patent Application No. 18197583.0, dated Feb. 28, 2020, 8 pages.
Office Action received for European Patent Application No. 18197589.7, dated Oct. 1, 2019, 5 pages.
Office Action received for European Patent Application No. 19169980.0, dated Mar. 4, 2020, 6 pages.
Office Action received for European Patent Application No. 10712824.1, dated Mar. 1, 2016, 11 pages.
Office Action Received for Indian Patent Application No. 717/CHENP/2014, dated Feb. 7, 2019, 5 pages.
Office Action Received for Japanese Patent Application No. 2012500842, dated Jan. 31, 2014, 5 pages.
Office Action received for Japanese Patent Application No. 2014-148065, dated Sep. 7, 2015, 5 pages.
Office Action received for Japanese Patent Application No. 2014-17726, dated Feb. 9, 2015, 4 pages.
Office Action received for Japanese Patent Application No. 2014-526255, dated Jun. 12, 2015, 5 pages.
Office Action received for Japanese Patent Application No. 2016-001259, dated Feb. 23, 2018, 11 pages.
Office Action received for Japanese Patent Application No. 2016-001259, dated Jan. 6, 2017, 6 pages.
Office Action received for Japanese Patent Application No. 2016-001259, dated Nov. 13, 2017, 10 Pages.
Office Action received for Japanese Patent Application No. 2016-022175, dated Apr. 10, 2017, 11 pages.
Office Action received for Japanese Patent Application No. 2018-119170, dated May 10, 2019, 8 pages.
Office Action received for Korean Patent Application No. 10-2013-7028487, dated Feb. 18, 2016, 8 pages.
Office Action Received for Korean Patent Application No. 10-2013-7028487, dated Jun. 5, 2015, 9 pages.
Office Action received for Korean Patent Application No. 10-2013-7028487, dated Jun. 13, 2016, 6 pages.
Office Action received for Korean Patent Application No. 10-2013-7028489, dated Jun. 4, 2015, 4 pages.
Office Action received for Korean Patent Application No. 10-2014-7006538, dated Jul. 31, 2015, 8 pages.
Office Action received for Korean Patent Application No. 10-2016-7022902, dated Sep. 4, 2017, 3 pages.
Office Action received for Korean Patent Application No. 10-2017-7035057, dated Mar. 21, 2018, 10 pages.
Office Action received for Mexican Patent Application No. MX/a/2016/001209, dated Apr. 20, 2017, 5 pages.
Office Action received for Mexican Patent Application No. MX/a/2016/001209, dated Aug. 25, 2016, 4 pages.
Office Action received for Mexican Patent Application No. MX/a/2016/001209, dated Sep. 13, 2017, 5 pages.
On-Line Definition for "Playback", American Heritage Dictionary of the English Language, 4th Edition, 2000, 1 page.
Partial European Search Report received for European Patent Application No. 18197583.0, dated Jan. 14, 2019, 18 pages.
Plaisant, et al., "Touchscreen Toggle Switches: Push or slide? Design Issues and Usability Study", Technical Report CAR-TR-521, CS-TR-2557, Nov. 1990, pp. 1-10.
Planet Quark, "See Everything Your Mac Printed", XP055533938, retrieved from the Internet: URL: https://www.planetquark.com/2011/05/19/see-everything-your-mac-printed/#.XjkfQsgzZGM, May 19, 2011, 7 pages.
Quick Time Movie Player Ver. 2.1.2.59, Current Time Indicator Dragging Operation,Ver, 2.1.2.59, 1996, 1 page.
RealOne Player Version 2.0 Screen Dumps, 2002, 4 pages.
Restriction Requirement received for U.S. Appl. No. 11/767,409, dated Sep. 21, 2010, 8 pages.
Restriction Requirement received for U.S. Appl. No. 12/215,651, dated Sep. 28, 2011, 11 pages.
Restriction Requirement received for U.S. Appl. No. 12/395,541, dated May 27, 2011, 6 pages.
Richards, "TN Audio Mixer and Master Volume Control with Automatic Configuration", Technical Disclosure Bulletin, vol. 37, No. 01, Jan. 1, 1994, pp. 485-486.
Ricker, Thomas, "iTunes (in the Cloud) 10.3 beta available for download, we go hands-on", retrieved from the internet: https://www.engadget.com/2011/06/07/itunes-in-the-cloud-10-3-beta-available-for-download-we-go-ha/, 2011, 12 pages.
Samsung, "Samsung R3 Wireless 360° Smart Speaker", User Manual ver. 1.0 (English), User manual [online], Available Online at: <https://www.samsung.com/uk/support/model/WAM3500/XU/>, Dec. 16, 2016, 3 pages.
SANGEET007, "PartyShare—turn your Xperia into a jukebox", online available at:—"https://forum.xda-developers.com/crossdevice-dev/sony/app-partyshare-xperia-jukebox-t2877807", Sep. 15, 2014, 5 pages.
Sawyer, Brian, "Get with the CoverFlow", Available online at <https://briansawyer.net/2005/12/08/get-with-the-coverflow/>, Dec. 9, 2005, pp. 1-2.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.

(56) References Cited

OTHER PUBLICATIONS

Search Report and Opinion received for Danish Patent Application No. PA201870598, dated Dec. 5, 2018, 8 pages.
Search Report received for Danish Patent Application No. PA201770404, dated Jun. 20, 2017, 8 Pages.
Search Report received for Danish Patent Application No. PA201770409, dated Jun. 20, 2017, 9 Pages.
Search Report received for European Patent Application No. 00923491.5, dated Jun. 2, 2006, 6 pages.
Search Report received for European Patent Application No. 00923491.5, dated Mar. 6, 2006, 4 pages.
Seifert, Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Seifi, Joe, "Pianist Pro Review", available at <http://www.appsafari.com/productivity/11529/pianist-pro/>, Apr. 24, 2010, 9 pages.
Smarttricks, "Top 3 Music Player for Android", Available online at: <https://www.youtube.com/watch?v=He7RTn4CL34>, Feb. 22, 2017, 4 pages.
Summon to Attend Oral Proceeding received for European Patent Application No. 10177099.8 mailed on Mar. 20, 2013, 9 Pages.
Summons to attend oral proceedings received for European Patent Application No. 00923491.5, mailed on Jan. 27, 2011, 10 pages.
Summons to Attend Oral Proceedings received for European Patent Application No. 07842262.3, mailed on Jun. 25, 2018, 9 pages.
Summons to Attend Oral Proceedings received for European Patent Application No. 12753631.6, mailed on Jul. 6, 2018, 5 pages.
Summons to Attend Oral Proceedings received for European Patent Application No. 12753631.6, mailed on May 8, 2018, 9 pages.
Summons to Attend Oral Proceedings received for European Patent Application No. 10177096.4, mailed on Sep. 21, 2018, 12 pages.
Summons to Oral Proceedings received for German Patent Application No. 112007002143.8 mailed on Nov. 28, 2018, 13 pages.
Tedeschi, Bob, "Stoking a Music Fan's Fancy with Apps That Rock", available at <http://www.nytimes.com/2010/05/20/technology/personaltech/20smart.html>, May 19, 2010, 3 pages.
The Single Keyboard Piano, available at <http://web.archive.org/web/20100926023929/http://moocowmusic.com/PianistPro/Manual/ManualSingleKeyboardPiano.html>, Sep. 26, 2010, 3 pages.
The Single Keyboard Piano, available at: <http://moocowmusic.com/PianistPro/Manual/ManualSingleKeyboardPiano.html>, Sep. 26, 2010, 4 pages.
Whitehouse, Ben, "Coverflow: Better Digital Music Navigation", Whitehouse&Company, Online Available at <http://wandco.com/2005/08/coverflow-better-digital-music-navigation/>, Aug. 15, 2005, pp. 1-3.
Windows Media Player for Windows XP version 8.0, 2001, 2 pages.
Woolsey, Amanda, "Apple Watch Tips—How to Add and Play Music", Available online at: <https://www.youtube.com/watch?v=E0QEuqMaoi8>, Apr. 26, 2015, 3 pages.
Yamaguchi, Yuu, "Useful Freeware and Shareware Information", Pick Up Onlineware, 23th, MdN, vol. 146, MdN Corporation, Jun. 6, 2006, pp. 135.
ITjungles, "iPhone 6: How to Pair with Another Bluetooth Device", Available Online at: https://www.youtube.com/watch?v=9setanYtHAk, Aug. 5, 2015, 3 pages.
Non-Final Office Action received for U.S. Appl. No. 15/730,610, dated Apr. 15, 2020, 36 pages.
Summons to attend Oral proceedings received for European Patent Application No. 18197589.7, mailed on Apr. 9, 2020, 7 pages.
Office Action received for Chinese Patent Application No. 201811539259.8, dated Apr. 3, 2020, 10 pages (6 pages of English Translation and 4 pages of Official Copy).
Office Action received for Chinese Patent Application No. 201910164962.3, dated Apr. 8, 2020, 25 pages (13 pages of English Translation and 12 pages of Official Copy).
Partial European Search Report received for European Patent Application No. 20158824.1, dated May 8, 2020, 14 pages.
Sonos, "Sonos Controller App for iPad Product Guide", Available online at: https://www.sonos.com/documents/productguides/en/iPadGuide_EN.pdf, Nov. 2014, 47 pages.
Corrected Notice of Allowance received for U.S. Appl. No. 13/587,850, dated Apr. 1, 2020, 2 pages.
Corrected Notice of Allowance received for U.S. Appl. No. 13/587,850, dated Mar. 23, 2020, 2 pages.
Office Action received for Australian Patent Application No. 2018203624, dated Mar. 11, 2020, 5 pages.
Crutnacker, "Amazon Echo Tips and Tricks: Playing Music Demonstration", Available Online at: https://www.youtube.com/watch?v=W_bqq2ynUll, Nov. 4, 2015, 1 page.
Final Office Action received for U.S. Appl. No. 16/702,968, dated Jul. 27, 2020, 21 pages.
Non-Final Office Action received for U.S. Appl. No. 16/263,280, dated Jul. 27, 2020, 11 pages.
Non-Final Office Action received for U.S. Appl. No. 16/803,849, dated Jul. 13, 2020, 23 pages.
Decision to Grant received for Danish Patent Application No. PA201770406, dated May 15, 2020, 2 pages.
Notice of Allowance received for Chinese Patent Application No. 201880001436.9, dated May 8, 2020, 3 pages (2 pages of English Translation and 1 page of Official Copy).
Applicant Initiated Interview Summary received for U.S. Appl. No. 16/702,968, dated Jul. 1, 2020, 5 pages.
Office Action received for Chinese Patent Application No. 201580046339.8, dated Jun. 3, 2020, 19 pages (10 pages of English Translation and 9 pages of Official Copy).
Office Action received for Chinese Patent Application No. 201811539260.0, dated Jun. 3, 2020, 8 pages (5 pages of English Translation and 3 pages of Official Copy).
Non-Final Office Action received for U.S. Appl. No. 15/910,263, dated Jun. 15, 2020, 38 pages.
Final Office Action received for U.S. Appl. No. 16/422,736, dated Jan. 11, 2021, 39 pages.
Office Action received for Korean Patent Application No. 10-2020-0024632, dated Dec. 29, 2020, 11 pages (5 pages of English Translation and 6 pages of Official Copy).
Invitation to Pay Search Fees received for European Patent Application No. 18728002.9, dated Sep. 2, 2020, 8 pages.
Advisory Action received for U.S. Appl. No. 16/422,736, dated Mar. 12, 2021, 3 pages.
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Examiner's Answer to Appeal Brief received for U.S. Appl. No. 14/641,298, mailed on Mar. 22, 2021, 19 pages.
Minutes of the Oral Proceedings received for European Patent Application No. 18197583.0, mailed on Mar. 9, 2021, 6 pages.
Non-Final Office Action received for U.S. Appl. No. 16/836,571, dated Mar. 25, 2021, 28 pages.
Notice of Allowance received for Chinese Patent Application No. 201811539260.0, dated Mar. 15, 2021, 2 pages (1 page of English Translation and 1 page of Official Copy).
Notice of Allowance received for Chinese Patent Application No. 201910475434.X, dated Mar. 10, 2021, 2 pages (1 page of English Translation and 1 page of Official Copy).
Notice of Allowance received for U.S. Appl. No. 15/433,320, dated Apr. 1, 2021, 19 pages.
Notice of Allowance received for U.S. Appl. No. 16/583,981, dated Mar. 26, 2021, 10 pages.
Notice of Allowance received for U.S. Appl. No. 16/583,989, dated Apr. 1, 2021, 5 pages.
Notice of Allowance received for U.S. Appl. No. 16/584,490, dated Mar. 26, 2021, 13 pages.
Office Action received for Australian Patent Application No. 2021201403, dated Mar. 16, 2021, 3 pages.
Office Action received for Chinese Patent Application No. 201711292804.3, dated Feb. 23, 2021, 17 pages (8 pages of English Translation and 9 pages of Official Copy).
Office Action received for Danish Patent Application No. PA202070560, dated Mar. 10, 2021, 7 pages.

(56) References Cited

OTHER PUBLICATIONS

Advisory Action received for U.S. Appl. No. 14/863,099, dated Sep. 8, 2016, 3 pages.
Advisory Action received for U.S. Appl. No. 16/583,989, dated Sep. 22, 2020, 5 pages.
Advisory Action received for U.S. Appl. No. 15/250,152, dated Mar. 25, 2019, 5 pages.
Akhgari Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Applicant Initiated Interview Summary received for U.S. Appl. No. 14/641,304, dated Dec. 2, 2019, 5 pages.
Applicant Initiated Interview Summary received for U.S. Appl. No. 14/641,304, dated Jul. 28, 2020, 5 pages.
Applicant Initiated Interview Summary received for U.S. Appl. No. 15/433,320, dated Feb. 11, 2020, 5 pages.
Applicant Initiated Interview Summary received for U.S. Appl. No. 16/583,989, dated Aug. 3, 2020, 6 pages.
Applicant Initiated Interview Summary received for U.S. Appl. No. 16/583,994, dated Apr. 3, 2020, 5 pages.
Applicant Initiated Interview Summary received for U.S. Appl. No. 16/584,490, dated Jul. 28, 2020, 4 pages.
Applicant-Initiated Interview Summary received for U.S. Appl. No. 15/433,320, dated Nov. 25, 2020, 4 pages.
Applicant-Initiated Interview Summary received for U.S. Appl. No. 15/730,610, dated Aug. 25, 2020, 6 pages.
Applicant-Initiated Interview Summary received for U.S. Appl. No. 15/910,263, dated Nov. 18, 2020, 6 pages.
Applicant-Initiated Interview Summary received for U.S. Appl. No. 16/263,280, dated Nov. 25, 2020, 3 pages.
Applicant-Initiated Interview Summary received for U.S. Appl. No. 16/422,736, dated Sep. 28, 2020, 3 pages.
Applicant-Initiated Interview Summary received for U.S. Appl. No. 16/583,981, dated Mar. 9, 2020, 5 pages.
Applicant-Initiated Interview Summary received for U.S. Appl. No. 16/583,981, dated Sep. 14, 2020, 6 pages.
Applicant-Initiated Interview Summary received for U.S. Appl. No. 16/583,994, dated Nov. 24, 2020, 4 pages.
Applicant-Initiated Interview Summary received for U.S. Appl. No. 16/584,490, dated Jan. 31, 2020, 4 pages.
Applicant-Initiated Interview Summary received for U.S. Appl. No. 16/584,743, dated May 1, 2020, 5 pages.
Applicant-Initiated Interview Summary received for U.S. Appl. No. 16/586,002, dated Apr. 28, 2020, 5 pages.
Applicant-Initiated Interview Summary received for U.S. Appl. No. 16/702,968, dated Sep. 28, 2020, 6 pages.
Applicant-Initiated Interview Summary received for U.S. Appl. No. 16/803,849, dated Aug. 21, 2020, 5 pages.
Applicant-Initiated Interview Summary received for U.S. Appl. No. 16/803,849, dated Dec. 21, 2020, 5 pages.
Applicant-Initiated Interview Summary received for U.S. Appl. No. 16/922,675, dated Dec. 16, 2020, 3 pages.
Applicant-Initiated Interview Summary received for U.S. Appl. No. 16/922,675, dated Nov. 2, 2020, 3 pages.
Applicant-Initiated Interview Summary received for U.S. Appl. No. 17/031,833, dated Dec. 21, 2020, 5 pages.
Beard Chris, "Mozilla Labs Introducing Weave", available online at <https://blog.mozilla.org/labs/2007/12/introducing-weave, Dec. 21, 2007, 57 pages.
Bell Killian, "Twitter Notifications, iCloud Tabs & Location-Based Reminders Appear in Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.
Certificate of Examination received for Australian Patent Application No. 2018101014, dated Mar. 20, 2019, 2 pages.
Certification of Examination received for Australian Patent Application No. 2017100553, dated Jan. 17, 2018, 2 pages.
Chan Christine, "Handoff Your Browser to Your iPhone or iPad! Plus A Chance to Win a Copy!", Apr. 12, 2011, 2 pages.
Corrected Notice of Allowance received for U.S. Appl. No. 14/719,217, dated Apr. 22, 2019, 2 pages.
Corrected Notice of Allowance received for U.S. Appl. No. 14/719,217, dated Mar. 20, 2019, 2 pages.
Corrected Notice of Allowance received for U.S. Appl. No. 15/269,801, dated Oct. 3, 2017, 4 pages.
Corrected Notice of Allowance received for U.S. Appl. No. 15/730,610, dated Nov. 27, 2020, 3 pages.
Corrected Notice of Allowance received for U.S. Appl. No. 15/845,794, dated Feb. 25, 2019, 2 pages.
Corrected Notice of Allowance received for U.S. Appl. No. 15/952,736, dated Nov. 19, 2018, 2 pages.
Corrected Notice of Allowance received for U.S. Appl. No. 16/229,959, dated Mar. 3, 2020, 3 pages.
Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision to Grant received for Danish Patent Application No. PA201670628, dated Nov. 20, 2017, 2 pages.
Decision to Grant received for Danish Patent Application No. PA201770782, dated Oct. 25, 2019, 2 pages.
Decision to Grant received for European Patent Application No. 12773460.6, dated Jun. 27, 2019, 2 pages.
Decision to Grant received for European Patent Application No. 13171047.7, dated Jun. 27, 2019, 2 pages.
Decision to Grant received for European Patent Application No. 15711969.4, dated Sep. 26, 2019, 2 pages.
Decision to Grant received for European Patent Application No. 15713062.6, dated Apr. 11, 2019, 2 pages.
Decision to Grant received for European Patent Application No. 15724160.5, dated Jun. 14, 2018, 2 pages.
Decision to Grant received for German Patent Application No. 102015208532.5, dated Sep. 22, 2020, 10 pages (1 page of English Translation and 9 pages of Official Copy).
Decision to Grant received for Japanese Patent Application No. 2017-075031, dated Jul. 1, 2019, 3 pages (1 page of English Translation and 2 pages of Official Copy).
Decision to Refuse received for European Patent Application No. 12770400.5, dated Nov. 8, 2018, 12 pages.
Dharmasena Anusha, "iMessage-send as text message Option", YouTube, Available online at: <https://www.youtube.com/watch?v=hXG-MdIW6FA>, Feb. 18, 2013, 1 page.
Dybwad Barb, "Google Chrome Gets Bookmark Syncing", available online at "http://mashable.com/2009/11/02/chrome-bookmark-sync/", Nov. 3, 2009, 6 pages.
Evaluation Report for Utility Model Patent received for Chinese Patent Application No. 201620051290.7, completed on Sep. 19, 2016, 11 pages (6 pages of English translation and 5 pages of Official Copy).
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 15/128,952, mailed on Jan. 8, 2020, 9 pages.
Examiner's Initiated Interview Summary received for U.S. Appl. No. 14/641,298, dated Mar. 10, 2020, 4 pages.
Examiner's Pre-Review Report received for Japanese Patent Application No. 2018-080122, dated Feb. 25, 2020, 6 pages (3 pages of English Translation and 3 pages of Official Copy).
Extended European Search Report for European Application No. 17813737.8, dated Nov. 22, 2019, 9 pages.
Extended European Search Report received for European Patent Application No. 13171047.7, dated Oct. 29, 2014, 8 pages.

(56) References Cited

OTHER PUBLICATIONS

Extended European Search Report received for European Patent Application No. 17799904.2, dated Jul. 30, 2018, 7 pages.
Extended European Search Report received for European Patent Application No. 18178147.7, dated Oct. 4, 2018, 8 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19186538.5, dated Oct. 9, 2019, 10 pages.
Extended European Search Report received for European Patent Application No. 19203942.8, dated Apr. 1, 2020, 10 pages.
Feng Lipeng, "Bound for computer lovers", Dec. 31, 2009, 2 pages (Official Copy Only) (See Communication under 37 CFR § 1.98(a) (3)).
Final Office Action received for U.S. Appl. No. 14/503,327, dated May 18, 2017, 10 pages.
Final Office Action received for U.S. Appl. No. 13/248,882, dated Dec. 4, 2013, 22 pages.
Final Office Action received for U.S. Appl. No. 13/492,057, dated Apr. 8, 2016, 29 pages.
Final Office Action received for U.S. Appl. No. 13/492,057, dated Mar. 30, 2015, 18 pages.
Final Office Action received for U.S. Appl. No. 14/285,378, dated Jul. 23, 2015, 19 pages.
Final Office Action received for U.S. Appl. No. 14/641,289, dated Jul. 1, 2016, 32 pages.
Final Office Action received for U.S. Appl. No. 14/641,298, dated Jun. 26, 2020, 50 pages.
Final Office Action received for U.S. Appl. No. 14/641,298, dated May 16, 2019, 50 pages.
Final Office Action received for U.S. Appl. No. 14/641,298, dated Oct. 4, 2017, 30 pages.
Final Office Action received for U.S. Appl. No. 14/641,304, dated Oct. 15, 2019, 21 pages.
Final Office Action received for U.S. Appl. No. 14/719,217, dated Feb. 23, 2017, 37 pages.
Final Office Action received for U.S. Appl. No. 14/774,664, dated Aug. 25, 2017, 23 pages.
Final Office Action received for U.S. Appl. No. 14/841,455, dated Nov. 6, 2018, 14 Pages.
Final Office Action received for U.S. Appl. No. 14/863,099, dated Apr. 21, 2016, 20 pages.
Final Office Action received for U.S. Appl. No. 15/128,952, dated Jul. 18, 2018, 19 pages.
Final Office Action received for U.S. Appl. No. 15/433,320, dated Dec. 31, 2019, 30 pages.
Final Office Action received for U.S. Appl. No. 16/583,981, dated Apr. 16, 2020, 19 pages.
Final Office Action received for U.S. Appl. No. 16/583,989, dated Jul. 10, 2020, 23 pages.
Final Office Action received for U.S. Appl. No. 16/583,994, dated Jul. 23, 2020, 16 pages.
Final Office Action received for U.S. Appl. No. 16/584,490, dated May 1, 2020, 48 pages.
Final Office Action received for U.S. Appl. No. 16/803,849, dated Sep. 24, 2020, 29 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Final Office Action received for U.S. Appl. No. 14/641,304, dated Jul. 24, 2018, 19 pages.
Firefox Sync—Take Your Bookmarks, Tabs and Personal Information with You, available online at https://web.archive.org/web/20120601020556/http://support.mozilla.org/en-US/kb/firefox-sync-take-your-bookmarks-and-tabs-with-you?redirectlocale=en-US&redirectslug=what-firefox-sync, Jun. 1, 2012, 3 pages.
Frakes Dan, "How to Get Started with Airplay", available at: https://www.macworld.com/article/2039770/how-to-get-started-with-airplay.html, Macworld, May 27, 2013, 8 pages.
G Pad, LG's Latest UIs That Shine More Lightly on the G-Pad, Online available at: http://bungq.com/1014, Nov. 19, 2013, 38 pages (2 pages of English Translation and 36 pages of Official Copy).
Google Labs, "Google Browser Sync", available online at "https://web.archive.org/web/20120518050142/http://www.google.com/tools/firefox/browse rsync/faq.html", May 18, 2012, 5 pages.
Hein Buster, "iOS 5 Allows Users to Delete Music Directly From iPhone/iPad", Online available at: https://www.cultofmac.com/99990/ios-5-al lows-users-to-delete-music-directly-from-iphoneipad/, Jun. 9, 2011, 7 pages.
Intention to Grant received for Danish Patent Application No. PA201670628, dated Aug. 28, 2017, 2 pages.
Intention to Grant received for Danish Patent Application No. PA201770782, dated Aug. 8, 2019, 2 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
Intention to Grant received for European Patent Application No. 13171047.7, dated Jan. 23, 2019, 8 pages.
Intention to Grant received for European Patent Application No. 15711969.4, dated May 29, 2019, 11 pages.
Intention to Grant received for European Patent Application No. 15713062.6, dated Mar. 25, 2019, 7 pages.
Intention to Grant received for European Patent Application No. 15713062.6, dated Oct. 8, 2018, 8 pages.
Intention to Grant received for European Patent Application No. 15719347.5, dated Dec. 8, 2020, 7 pages.
Intention to Grant received for European Patent Application No. 15724160.5, dated Mar. 7, 2018, 8 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2013/044710, dated Dec. 18, 2014, 11 pages.
International Preliminary Report on Patentability received for PCT Patent Application No. PCT/US2014/027882, dated Sep. 24, 2015, 8 pages.
International Preliminary Report on Patentability Received for PCT Patent Application No. PCT/US2015/019306, dated Dec. 15, 2016, 10 pages.
International Preliminary Report on Patentability Received for PCT Patent Application No. PCT/US2015/019309, dated Dec. 15, 2016, 10 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2016/021012, dated Sep. 21, 2017, 11 Pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/032240, dated Nov. 29, 2018, 29 pages.

(56) References Cited

OTHER PUBLICATIONS

International Search Report and Written Opinion received for PCT Application No. PCT/US2015/019309, dated Jun. 25, 2015, 15 pages.
International Search Report and Written Opinion received for PCT Patent Application No. PCT/US17/31086, dated Sep. 8, 2017, 15 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2013/044710, dated Aug. 15, 2013, 11 pages.
International Search Report and Written Opinion received for PCT Patent Application No. PCT/US2014/027882, dated Oct. 10, 2014, 11 pages.
International Search Report and Written Opinion received for PCT Patent Application No. PCT/US2015/019306, dated Jun. 17, 2015, 15 pages.
International Search Report and Written Opinion received for PCT Patent Application No. PCT/US2015/019317, dated Aug. 25, 2015, 24 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2016/021012, dated Jun. 2, 2016, 15 pages.
International Search Report and Written Opinion received for PCT Patent Application No. PCT/US2017/032240, dated Sep. 21, 2017, 33 pages.
International Search Report and written Opinion received for PCT Patent Application No. PCT/US2020/024390, dated Aug. 17, 2020, 22 pages.
International Search Report and Written Opinion received for PCT Patent Application No. PCT/US2020/024390, dated Oct. 23, 2020, 26 pages.
International Search Report and Written Opinion received for PCT Patent Application No. PCT/US2020/026044, dated Sep. 9, 2020, 26 pages.
International Search Report and Written Opinion received for PCT Patent Application No. PCT/US2020/035446, dated Nov. 10, 2020, 20 pages.
International Search Report and Written Opinion received for PCT Patent Application No. PCT/US2020/035488, dated Nov. 17, 2020, 21 pages.
Invitation to Pay Addition Fees received for PCT Patent Application No. PCT/US2014/027882, dated Aug. 5, 2014, 2 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fees received for PCT Patent Application No. PCT/US2020/024390, dated Jun. 26, 2020, 15 pages.
Invitation to Pay Additional Fees received for PCT Patent Application No. PCT/US2015/019317, dated May 22, 2015, 7 pages.
Invitation to Pay Additional Fees received for PCT Patent Application No. PCT/US2020/026044, dated Jun. 25, 2020, 12 pages.
Invitation to Pay Additional Fees received for PCT Patent Application No. PCT/US2020/035446, dated Sep. 11, 2020, 12 pages.
Invitation to Pay Additional Fees received for PCT Patent Application No. PCT/US2020/035488, dated Sep. 23, 2020, 15 pages.
Invitation to Pay Search Fees received for European Patent Application No. 20719301.2, dated Dec. 17, 2020, 5 pages.
Kimura Ryoji, "Keynote presentation practice guide for iPad & iPhone", K.K. Rutles, first edition, Feb. 29, 2012, 4 pages (Official Copy Only) (See Communication under 37 CFR § 1.98(a) (3)).
Kinect Gesture Commands-Kinect Voice Commands, Xbox Wire, Available Online At: <https://hwcdn.libsyn.com/p/4/4/c/44c89c7f273167b4/Xbox_One_Kinect_Voice_Gesture.pdf?c_id=6458139&cs id=6458139&expiration=1555411736&hwt=fe78eb09654ea677c9fbf836d2ed82b >, 2013, 2 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Mackie Simon, "Emulate Safari's Reader Mode in Other Browsers with Readability", available online at "https://gigaom.com/2010/06/21/emulate-safaris-reader-mode-in-other-browsers-with-readability/", Jun. 21, 2010, 5 pages.
Minutes of Oral Hearing received for German Patent Application No. 102015208532.5, mailed on Dec. 13, 2019, 21 pages (3 pages of English Translation and 18 pages of Official Copy).
Minutes of the Oral Proceedings received for European Application No. 12770400.5, mailed on Nov. 6, 2018, 7 pages.
Minutes of the Oral Proceedings received for European Application No. 15711969.4, mailed on May 16, 2019, 7 pages.
Mozilla Services, "Firefox Sync Terms of Service (for versions prior to Firefox 29)", available online at <https://services.mozilla.com/tos/>, Aug. 19, 2010, 4 pages.
NBC News, "NBC News—YouTube Democratic Debate (full)", Online available at:—https://www.youtube.com/watch?v=ti2Nokog1J4, Jan. 17, 2016, 1 page.
Non-Final Office Action received for U.S. Appl. No. 15/952,736, dated Jun. 1, 2018, 12 pages.
Non-Final Office Action received for U.S. Appl. No. 13/492,057, dated Dec. 17, 2015, 25 pages.
Non-Final Office Action received for U.S. Appl. No. 14/503,327, dated Sep. 12, 2016, 10 pages.
Non-Final Office Action received for U.S. Appl. No. 13/492,057, dated Jul. 8, 2014, 14 pages.
Non-Final Office Action received for U.S. Appl. No. 14/641,289, dated Jul. 16, 2015, 31 pages.
Non-Final Office Action received for U.S. Appl. No. 14/641,289, dated Mar. 11, 2016, 26 pages.
Non-Final Office Action received for U.S. Appl. No. 14/841,455, dated Apr. 25, 2018, 13 pages.
Non-Final Office Action received for U.S. Appl. No. 14/641,304, dated Sep. 11, 2017, 18 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/641,298, dated Mar. 6, 2017, 26 pages.
Non-Final Office Action received for U.S. Appl. No. 14/641,298, dated Nov. 29, 2019, 47 pages.
Non-Final Office Action received for U.S. Appl. No. 14/641,298, dated Sep. 19, 2018, 41 pages.
Non-Final Office Action received for U.S. Appl. No. 14/641,304, dated Feb. 27, 2019, 18 pages.
Non-Final Office Action received for U.S. Appl. No. 14/641,304, dated Mar. 4, 2020, 21 pages.
Non-Final Office Action received for U.S. Appl. No. 14/642,366, dated Aug. 24, 2015, 7 pages.

(56) References Cited

OTHER PUBLICATIONS

Non-Final Office Action received for U.S. Appl. No. 14/719,217, dated Jul. 26, 2018, 40 pages.
Non-Final Office Action received for U.S. Appl. No. 14/719,217, dated Jul. 28, 2016, 28 pages.
Non-Final Office Action received for U.S. Appl. No. 14/774,664, dated Mar. 7, 2017, 23 pages.
Non-Final Office Action received for U.S. Appl. No. 14/863,099, dated Dec. 2, 2015, 12 pages.
Non-Final Office Action received for U.S. Appl. No. 15/128,952, dated Apr. 1, 2019, 20 pages.
Non-Final Office Action received for U.S. Appl. No. 15/128,952, dated Dec. 29, 2017, 13 pages.
Non-Final Office Action received for U.S. Appl. No. 15/134,638, dated Sep. 20, 2016, 6 pages.
Non-Final Office Action received for U.S. Appl. No. 15/269,801, dated Dec. 30, 2016, 17 pages.
Non-Final Office Action received for U.S. Appl. No. 15/433,320, dated Jul. 31, 2020, 13 pages.
Non-Final Office Action received for U.S. Appl. No. 15/620,666, dated Mar. 28, 2018, 14 pages.
Non-Final Office Action received for U.S. Appl. No. 15/845,794, dated Oct. 15, 2018, 8 pages.
Non-Final Office Action received for U.S. Appl. No. 16/229,959, dated Oct. 31, 2019, 10 pages.
Non-Final Office Action received for U.S. Appl. No. 16/422,736, dated Jun. 23, 2020, 24 pages.
Non-Final Office Action received for U.S. Appl. No. 16/434,865, dated Jan. 16, 2020, 9 pages.
Non-Final Office Action received for U.S. Appl. No. 16/583,981, dated Dec. 6, 2019, 14 pages.
Non-Final Office Action received for U.S. Appl. No. 16/583,989, dated Jan. 24, 2020, 20 pages.
Non-Final Office Action received for U.S. Appl. No. 16/583,994, dated Dec. 30, 2019, 14 pages.
Non-Final Office Action received for U.S. Appl. No. 16/584,490, dated Dec. 10, 2019, 27 pages.
Non-Final Office Action received for U.S. Appl. No. 16/586,002, dated Feb. 20, 2020, 15 pages.
Non-Final Office Action received for U.S. Appl. No. 16/670,949, dated Dec. 9, 2020, 11 pages.
Non-Final Office Action received for U.S. Appl. No. 16/723,583, dated Aug. 13, 2020, 13 pages.
Non-Final Office Action received for U.S. Appl. No. 16/922,675, dated Aug. 13, 2020, 17 pages.
Non-Final Office Action received for U.S. Appl. No. 17/031,833, dated Dec. 7, 2020, 13 pages.
Non-Final Office Action received for U.S. Appl. No. 14/841,455, dated Apr. 11, 2019, 13 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Notice of Acceptance received for Australian Patent Application No. 2015201884, dated Oct. 4, 2016, 3 pages.
Notice of Acceptance received for Australian Patent Application No. 2015267671, dated Apr. 4, 2018, 3 pages.
Notice of Acceptance received for Australian Patent Application No. 2016230001, dated May 25, 2018, 3 pages.
Notice of Acceptance received for Australian Patent Application No. 2017266867, dated Mar. 6, 2019, 3 pages.
Notice of Acceptance received for Australian Patent Application No. 2017284013, dated Aug. 26, 2020, 3 pages.
Notice of Acceptance received for Australian Patent Application No. 2018202751, dated Sep. 4, 2019, 3 pages.
Notice of Acceptance received for Australian Patent Application No. 2018220115, dated Jun. 29, 2020, 3 pages.
Notice of Acceptance received for Australian Patent Application No. 2018229544, dated May 4, 2020, 3 pages.
Notice of Acceptance received for Australian Patent Application No. 2019203473, dated Nov. 7, 2019, 3 pages.
Notice of Allowance Action received for U.S. Appl. No. 14/641,304, dated Sep. 9, 2020, 15 pages.
Notice of Allowance received for Chinese Patent Application No. 201280047459.6, dated Jan. 31, 2018, 2 pages (1 page of English Translation and 1 page of Official Copy).
Notice of Allowance received for Chinese Patent Application No. 201580028491.3, dated Mar. 29, 2019, 2 pages (1 page of English Translation and 1 page of Official Copy).
Notice of Allowance received for Chinese Patent Application No. 201580028505.1, dated Sep. 19, 2019, 2 pages (1 page of English Translation and 1 page of Official Copy).
Notice of Allowance received for Chinese Patent Application No. 201620051290.7, dated Jun. 22, 2016, 2 Pages (Official Copy Only) (See Communication under 37 CFR § 1.98(a) (3)).
Notice of Allowance received for Chinese Patent Application No. 201680011682.3, dated Aug. 5, 2020, 2 pages (1 page of English Translation and 1 page of Official Copy).
Notice of Allowance received for Chinese Patent Application No. 201780002398.4, dated Jun. 17, 2019, 2 pages (1 page of English Translation and 1 page of Official Copy).
Notice of Allowance received for Chinese Patent Application No. 201810338038.8, dated Jun. 30, 2020, 2 pages (1 page of English Translation and 1 page of Official Copy).
Notice of Allowance received for Chinese Patent Application No. 201520364847.8, dated Nov. 5, 2015, 9 pages (7 page of English Translation and 2 pages of Official Copy).
Notice of Allowance received for Japanese Patent Application No. 2015-095183, dated Apr. 21, 2017, 3 pages (Official Copy Only) (See Communication under 37 CFR § 1.98(a) (3)).
Notice of Allowance received for Japanese Patent Application No. 2016-569669, dated Mar. 19, 2018, 4 pages (1 page of English translation and 3 pages of Official Copy).
Notice of Allowance received for Japanese Patent Application No. 2017-101107, dated Jun. 3, 2019, 5 pages (1 page of English Translation and 4 pages of Official Copy).
Notice of Allowance received for Japanese Patent Application No. 2017-543762, dated Mar. 30, 2020, 4 pages (1 page of English Translation and 3 pages of Official Copy).
Notice of Allowance received for Japanese Patent Application No. 2018-560107, dated Dec. 6, 2019, 4 pages (1 page of English Translation and 3 pages of Official Copy).
Notice of Allowance received for Japanese Patent Application No. 2019-116580, dated Oct. 2, 2020, 4 pages (1 page of English Translation and 3 pages of Official Copy).
Notice of Allowance received for Japanese Patent Application No. 2019-238894, dated Oct. 5, 2020, 4 pages (1 page of English Translation and 3 pages of Official Copy).
Notice of Allowance received for Korean Patent Application No. 10-2015-0072162, dated Dec. 27, 2017, 4 pages (2 pages of English Translation and 2 pages of Official copy).
Notice of Allowance received for Korean Patent Application No. 10-2016-7032902, dated Sep. 7, 2018, 3 pages (1 page of English Translation and 2 pages of Official Copy).
Notice of Allowance received for Korean Patent Application No. 10-2016-7035555, dated Sep. 23, 2019, 3 pages (1 page of English Translation and 2 pages of Official Copy).
Notice of Allowance received for Korean Patent Application No. 10-2017-7012145, dated Oct. 30, 2019, 3 pages (1 page of English Translation and 2 pages of Official Copy).
Notice of Allowance received for Korean Patent Application No. 10-2017-7022905, dated Jul. 31, 2019, 4 pages (2 pages of English Translation and 2 pages of Official Copy).
Notice of Allowance received for Korean Patent Application No. 10-2018-0035949, dated Nov. 28, 2019, 3 pages (1 page of English Translation and 2 pages of Official Copy).

(56) References Cited

OTHER PUBLICATIONS

Notice of Allowance received for Korean Patent Application No. 10-2018-7033301, dated Feb. 20, 2019, 5 pages (2 Pages of English Translation and 3 Pages of Official Copy).
Notice of Allowance received for Korean Patent Application No. 10-2018-7035747, dated Dec. 9, 2020, 5 pages (2 pages of English Translation and 3 pages of Official Copy).
Notice of Allowance received for Korean Patent Application No. 10-2019-7014494, dated Mar. 19, 2020, 4 pages (1 page of English Translation and 3 pages of Official Copy).
Notice of Allowance received for Korean Patent Application No. 10-2020-7002929, dated Nov. 26, 2020, 3 pages (1 page of English Translation and 2 pages of Official Copy).
Notice of Allowance received for Korean Patent Application No. 10-2020-7017803, dated Nov. 5, 2020, 6 pages (2 pages of English Translation and 4 pages of Official Copy).
Notice of Allowance received for Korean Patent Application No. 10-2014-7008348, dated Feb. 21, 2019, 5 pages (2 Pages of English Translation and 3 Pages of Official Copy).
Notice of Allowance received for Taiwanese Patent Application No. 102120412, dated Oct. 28, 2015, 5 pages (2 pages of English Translation and 3 pages of Official copy).
Notice of Allowance received for Taiwanese Patent Application No. 104108223, dated Jan. 10, 2017, 3 pages (Official Copy Only) (See Communication under 37 CFR § 1.98(a) (3)).
Notice of Allowance received for Taiwanese Patent Application No. 104114953, dated Oct. 17, 2017, 3 pages (Official Copy Only) (See Communication under 37 CFR § 1.98(a) (3)).
Notice of Allowance Received for Taiwanese Patent Application No. 104117041, dated Feb. 24, 2017, 3 pages. (Official Copy Only) (See Communication under 37 CFR § 1.98(a) (3)).
Notice of Allowance received for Taiwanese Patent Application No. 106144804, dated Jun. 27, 2018, 6 pages (2 pages of English Translation and 4 pages of Official copy).
Notice of Allowance received for Taiwanese Patent Application No. 104117042, dated Nov. 17, 2017, 5 pages (2 Pages of English Translation and 3 Pages of Official Copy).
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 13/492,057, dated Jan. 3, 2017, 5 pages.
Notice of Allowance received for U.S. Appl. No. 13/492,057, dated May 18, 2017, 3 pages.
Notice of Allowance received for U.S. Appl. No. 14/285,378, dated May 19, 2016, 10 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/641,289, dated Aug. 24, 2017, 6 Pages.
Notice of Allowance received for U.S. Appl. No. 14/641,289, dated Dec. 12, 2017, 5 pages.
Notice of Allowance received for U.S. Appl. No. 14/642,366, dated Jan. 14, 2016, 8 pages.
Notice of Allowance received for U.S. Appl. No. 14/719,217, dated Feb. 13, 2019, 13 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/730,610, dated Oct. 21, 2020, 29 pages.
Notice of Allowance received for U.S. Appl. No. 15/845,794, dated Feb. 14, 2019, 6 pages.
Notice of Allowance received for U.S. Appl. No. 15/945,610, dated May 20, 2019, 7 pages.
Notice of Allowance received for U.S. Appl. No. 15/952,736, dated Sep. 11, 2018, 16 pages.
Notice of Allowance received for U.S. Appl. No. 16/131,767, dated Sep. 6, 2019, 7 pages.
Notice of Allowance received for U.S. Appl. No. 16/229,959, dated Dec. 4, 2019, 6 pages.
Notice of Allowance received for U.S. Appl. No. 16/434,865, dated Apr. 7, 2020, 5 pages.
Notice of Allowance received for U.S. Appl. No. 16/584,490, dated Aug. 27, 2020, 13 pages.
Notice of Allowance received for U.S. Appl. No. 16/584,743, dated Aug. 7, 2020, 8 pages.
Notice of Allowance received for U.S. Appl. No. 16/584,743, dated Nov. 16, 2020, 7 pages.
Notice of Allowance received for U.S. Appl. No. 16/586,002, dated Jun. 9, 2020, 5 pages.
Notice of Allowance received for U.S. Appl. No. 14/841,455, dated Oct. 22, 2019, 10 pages.
Office Action received for Australian Patent Application No. 2016230001, dated Feb. 7, 2018, 3 pages.
Office Action received for European Patent Application No. 15711969.4, dated Nov. 17, 2017, 9 pages.
Office Action received for Australian Patent Application No. 2015201884, dated Oct. 12, 2015, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015267671, dated Apr. 5, 2017, 2 pages.
Office Action received for Australian Patent Application No. 2015302298, dated Apr. 4, 2018, 3 pages.
Office Action received for Australian Patent Application No. 2015302298, dated Jul. 20, 2018, 3 pages.
Office Action received for Australian Patent Application No. 2015302298, dated Sep. 14, 2017, 3 pages.
Office Action received for Australian Patent Application No. 2015302298, dated Sep. 4, 2018, 5 pages.
Office Action received for Australian Patent Application No. 2016266010, dated Aug. 23, 2018, 4 pages.
Office Action received for Australian Patent Application No. 2016266010, dated May 4, 2018, 4 pages.
Office Action received for Australian Patent Application No. 2016266010, dated Nov. 28, 2018, 5 pages.
Office Action received for Australian Patent Application No. 2016266010, dated Nov. 30, 2017, 5 pages.
Office Action received for Australian Patent Application No. 2017100553, dated Aug. 4, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017266867, dated Dec. 6, 2018, 3 pages.
Office Action received for Australian Patent Application No. 2017284013, dated Mar. 19, 2020, 3 pages.
Office Action received for Australian Patent Application No. 2018101014, dates Jan. 18, 2019, 5 pages.
Office Action received for Australian Patent Application No. 2018101014, dated Sep. 19, 2018, 4 pages.
Office Action received for Australian Patent Application No. 2018202751, dated Apr. 2, 2019, 4 pages.
Office Action received for Australian Patent Application No. 2018220115, dated Apr. 21, 2020, 3 pages.
Office Action received for Australian Patent Application No. 2018220115, dated Oct. 4, 2019, 3 pages.

(56) References Cited

OTHER PUBLICATIONS

Office Action received for Australian Patent Application No. 2018229544, dated Nov. 15, 2019, 4 pages.
Office Action received for Australian Patent Application No. 2018271366, dated Feb. 25, 2020, 5 pages.
Office Action received for Australian Patent Application No. 2018271366, dated Oct. 26, 2020, 5 pages.
Office Action received for Australian Patent Application No. 2019203473, dated Oct. 25, 2019, 2 pages.
Office Action received for Australian Patent Application No. 2020257092, dated Nov. 30, 2020, 6 pages.
Office Action received for Chinese Patent Application No. 201510288981.9, dated Jul. 1, 2019, 16 pages (8 pages of English Translation and 8 pages of Official Copy).
Office Action received for Chinese Patent Application No. 201510288981.9, dated Jul. 3, 2018, 19 pages (8 pages of English Translation and 11 pages of official copy).
Office Action received for Chinese Patent Application No. 201510288981.9, dated Mar. 6, 2019, 20 pages (10 pages of English Translation and 10 pages of Official Copy).
Office Action received for Chinese Patent Application No. 201580028491.3, dated Oct. 8, 2018, 9 pages (3 pages of English Translation and 6 pages of Official Copy).
Office Action received for Chinese Patent Application No. 201580028505.1, dated Jan. 16, 2019, 15 pages (5 pages of English Translation and 10 pages of Official Copy).
Office Action received for Chinese Patent Application No. 201580028505.1, dated Jun. 20, 2019, 7 pages (3 pages of English Translation and 4 pages of Official Copy).
Office Action received for Chinese Patent Application No. 201580043701.6, dated Dec. 24, 2018, 20 pages (5 pages of English Translation and 15 pages of Official copy).
Office Action received for Chinese Patent Application No. 201580043701.6, dated Nov. 4, 2019, 20 pages (6 pages of English Translation and 14 pages of Official Copy).
Office Action received for Chinese Patent Application No. 201580043701.6, dated Oct. 12, 2020, 22 pages (5 pages of English Translation and 17 pages of Official Copy).
Office Action received for Chinese Patent Application No. 201580046339.8, dated Oct. 19, 2020, 12 pages (4 pages of English Translation and 8 pages of Official Copy).
Office Action received for Chinese Patent Application No. 201680011682.3, dated Dec. 2, 2019, 14 pages (7 pages of English Translation and 7 pages of Official Copy).
Office Action received for Chinese Patent Application No. 201711292804.3, dated Aug. 5, 2020, 26 pages (16 pages of English Translation and 10 pages of Official Copy).
Office Action received for Chinese Patent Application No. 201780002398.4, dated Feb. 27, 2019, 6 pages (3 pages of English Translation and 3 pages of Official Copy).
Office Action received for Chinese Patent Application No. 201780002398.4, dated Sep. 12, 2018, 17 pages (5 pages of English Translation and 12 pages of Official Copy).
Office Action received for Chinese Patent Application No. 201810338038.8, dated Jan. 21, 2020, 26 pages (13 pages of English Translation and 13 pages of Official Copy).
Office Action received for Chinese Patent Application No. 201810338038.8, dated May 14, 2019, 26 pages (13 pages of English Translation and 13 pages of Official Copy).
Office Action received for Chinese Patent Application No. 201810338826.7, dated Apr. 3, 2019, 21 pages (13 pages of English Translation and 8 pages of Official Copy).
Office Action received for Chinese Patent Application No. 201810338826.7, dated Jan. 16, 2020, 16 Pages (10 pages of English Translation and 6 pages of Official Copy).
Office Action received for Chinese Patent Application No. 201810338826.7, dated Oct. 21, 2019, 19 pages (12 pages of English Translation and 7 pages of Official Copy).
Office Action received for Chinese Patent Application No. 201811460172.1, dated Jan. 21, 2020, 17 pages (8 pages of English Translation and 9 pages of Official Copy).
Office Action received for Chinese Patent Application No. 201811460172.1, dated Oct. 14, 2020, 7 pages (4 pages of English Translation and 3 pages of Official Copy).
Office Action received for Chinese Patent Application No. 201910164962.3, dated Sep. 18, 2020, 19 pages (6 pages of English Translation and 13 pages of Official Copy).
Office Action received for Chinese Patent Application No. 201910475434.X, dated Dec. 4, 2019, 14 pages (8 pages of English Translation and 6 pages of Official Copy).
Office Action received for Chinese Patent Application No. 201910475434.X, dated Jun. 3, 2020, 9 pages (5 pages of English Translation and 4 pages of Official Copy).
Office Action received for Chinese Patent Application No. 201910475434.X, dated Oct. 30, 2020, 9 pages (5 pages of English Translation and 4 pages of Official Copy).
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application No. PA201570256, dated Oct. 10, 2016, 3 pages.
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201970533, dated Jul. 17, 2020, 6 pages.
Office Action received for Danish Patent Application No. PA202070560, dated Dec. 11, 2020, 7 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 13171047.7, dated May 24, 2017, 7 pages.
Office Action received for European Patent Application No. 15713062.6, dated Dec. 6, 2017, 7 pages.
Office Action received for European Patent Application No. 15719347.5, dated Apr. 9, 2020, 4 pages.
Office Action received for European Patent Application No. 15719347.5, dated Jun. 17, 2019, 4 pages.
Office Action received for European Patent Application No. 16710590.7, dated Mar. 15, 2019, 10 pages.
Office Action received for European Patent Application No. 17799904.2, dated Oct. 21, 2020, 6 pages.
Office Action received for European Patent Application No. 18178147.7, dates Mar. 20, 2020, 4 pages.
Office Action received for European Patent Application No. 18208881.5, dated Jun. 11, 2019, 5 pages.
Office Action received for European Patent Application No. 18728002.9, dated Dec. 14, 2020, 15 pages.
Office Action received for European Patent Application No. 19150528.8, dated Jul. 1, 2020, 6 pages.
Office Action received for European Patent Application No. 19186538.5, dated Oct. 12, 2020, 7 pages.

(56) References Cited

OTHER PUBLICATIONS

Office Action received for German Patent Application No. 102015208532.5, dated Apr. 1, 2019, 20 pages (10 pages of English Translation and 10 pages of Official Copy).
Office Action received for German Patent Application No. 102015208532.5, dated Apr. 21, 2020, 3 pages (1 page of English Translation and 2 pages of Official Copy).
Office Action received for German Patent Application No. 102015208532.5, dated Aug. 21, 2019, 15 pages (5 pages of English Translation and 10 pages of Official Copy).
Office Action received for Hong Kong Patent Application No. 151051633, dated Jun. 5, 2015, 11 pages (Official Copy Only) (See Communication under 37 CFR § 1.98(a) (3)).
Office Action received for Japanese Patent Application No. 2015-095183, dated Jun. 3, 2016, 13 pages (6 pages of English Translation and 7 pages of Official copy).
Office Action received for Japanese Patent Application No. 2017-075031, dated Jul. 30, 2018, 16 pages (8 pages of English Translation and 8 pages of Official Copy).
Office Action received for Japanese Patent Application No. 2017-101107, dated Sep. 7, 2018, 14 pages (7 pages of English Translation and 7 pages of Official Copy).
Office Action received for Japanese Patent Application No. 2017-507413, dated Feb. 22, 2019, 11 pages (5 pages of English Translation and 6 pages of Official Copy).
Office Action received for Japanese Patent Application No. 2017-507413, dated Jul. 22, 2019, 4 pages (1 page of English Translation and 3 pages of Official Copy).
Office Action received for Japanese Patent Application No. 2017-507413, dated May 25, 2018, 14 pages (7 pages of English Translation and 7 pages of Official Copy).
Office Action received for Japanese Patent Application No. 2017-543762, dated Apr. 2019, 5 pages (2 pages of English Translation and 3 pages of Official copy).
Office Action received for Japanese Patent Application No. 2017-543762, dated Jul. 9, 2018, 8 pages (4 pages of English Translation and 4 pages of Official Copy).
Office Action received for Japanese Patent Application No. 2018-080122, dated Aug. 9, 2019, 5 pages (2 pages of English Translation and 3 pages of Official Copy).
Office Action received for Japanese Patent Application No. 2018-080122, dated Jan. 28, 2019, 11 pages (6 pages of English Translation and 5 pages of Official Copy).
Office Action received for Japanese Patent Application No. 2018-560107, dated Jun. 14, 2019, 26 pages (13 pages of English Translation and 13 pages of Official Copy).
Office Action received for Japanese Patent Application No. 2019-124728, dated Sep. 18, 2020, 6 pages (3 pages of English Translation and 3 pages of Official Copy).
Office Action received for Japanese Patent Application No. 2019-238894, dated Mar. 6, 2020, 7 pages (3 pages of English Translation and 4 pages of Official Copy).
Office Action received for Korean Patent Application No. 10-2014-7008348, dated Jan. 22, 2019, 16 pages (1 page of English Translation and 15 pages of Official Copy).
Office Action received for Korean Patent Application No. 10-2015-0072162, dated Apr. 20, 2016, 11 pages (6 pages of English Translation and 5 pages of Official Copy).
Office Action received for Korean Patent Application No. 10-2015-0072162, dated Feb. 27, 2017, 12 pages (6 pages of English Translation and 6 pages of Official Copy).
Office Action received for Korean Patent Application No. 10-2016-7035555, dated Dec. 26, 2017, 5 pages (2 pages of English Translation and 3 pages of Official Copy).
Office Action received for Korean Patent Application No. 10-2016-7035555, dated Jul. 18, 2019, 9 pages (4 pages of English Translation and 5 pages of Official Copy).
Office Action received for Korean Patent Application No. 10-2016-7035555, dated Sep. 18, 2018, 9 pages (4 pages of English Translation and 5 pages of Official Copy).
Office Action received for Korean Patent Application No. 10-2017-7012145, dated Jul. 18, 2019, 5 pages (2 Pages of English Translation and 3 Pages of Official Copy).
Office Action received for Korean Patent Application No. 10-2017-7012145, dated Sep. 13, 2018, 6 pages (3 pages of English Translation and 3 pages of Official Copy).
Office Action received for Korean Patent Application No. 10-2017-7022905, dated Oct. 22, 2018, 9 pages (4 pages of English Translation and 5 pages of official copy).
Office Action received for Korean Patent Application No. 10-2018-0035949, dated Apr. 24, 2019, 9 pages (4 pages of English Translation and 5 pages of Official Copy).
Office Action received for Korean Patent Application No. 10-2018-0035949, dated Dec. 24, 2018, 7 pages (3 pages of English Translation and 4 pages of Official Copy).
Office Action received for Korean Patent Application No. 10-2018-0035949, dated Jun. 20, 2018, 9 pages (4 pages of English Translation and 5 pages of Official Copy).
Office Action received for Korean Patent Application No. 10-2018-7033301, dated Dec. 14, 2018, 6 pages (2 pages of English Translation and 4 pages of Official Copy).
Office Action received for Korean Patent Application No. 10-2018-7035747, dated Apr. 9, 2020, 11 pages (5 pages of English Translation and 6 pages of Official Copy).
Office Action received for Korean Patent Application No. 10-2018-7035747, dated Oct. 14, 2020, 6 pages (3 pages of English Translation and 3 pages of Official Copy).
Office Action received for Korean Patent Application No. 10-2019-7014494, dated Jun. 14, 2019, 11 pages (5 pages of English Translation and 6 pages of Official Copy).
Office Action received for Korean Patent Application No. 10-2020-0024632, dated May 18, 2020, 11 pages (5 pages of English Translation and 6 pages of Official Copy).
Office Action received for Korean Patent Application No. 10-2020-7002929, dated Mar. 22, 2020, 5 pages (2 pages of English Translation and 3 pages of Official Copy).
Office Action received for Korean Patent Application No. 10-2020-7031319, dated Dec. 8, 2020, 14 pages (6 pages of English Translation and 8 pages of Official Copy).
Office Action received for Taiwanese Patent Application No. 102120412, dated Feb. 25, 2015, 15 pages (6 pages of English Translation and 9 pages of Official Copy).
Office Action received for Taiwanese Patent Application No. 104108223, dated Apr. 25, 2016, 10 pages (5 pages of English Translation and 5 pages of Official copy).
Office Action received for Taiwanese Patent Application No. 104114953, dated Feb. 18, 2017, 9 pages (4 pages of English Translation and 5 pages of Official copy).
Office Action received for Taiwanese Patent Application No. 104114953, dated Jun. 8, 2016, 11 pages (5 pages of English Translation and 6 pages of Official copy).
Office Action Received for Taiwanese Patent Application No. 104117041, dated Aug. 22, 2016, 6 pages (3 pages of English Translation and 3 pages of Official Copy).
Office Action received for Taiwanese Patent Application No. 104117042, dated Apr. 20, 2017, 18 pages (7 pages of English Translation and 11 pages of Official Copy).
Q Pair, Posting of a blog, Online Available at: <http://www.leaderyou.co.kr/2595>, Dec. 7, 2013, 41 pages (23 page of English Translation and 18 pages of Official Copy).
QPair, online available at: http://mongri.net/entry/G-Pad-83-Qpair, Retrieved on Mar. 6, 2017, Dec. 20, 2013, 22 pages (10 pages of English translation and 12 pages of Official Copy).
Result of Consultation received for European Patent Application No. 16710590.7, dated Dec. 7, 2020, 4 pages.
Result of Consultation received for European Patent Application No. 18197589.7, dated Dec. 1, 2020, 9 pages.
Result of Consultation received for European Patent Application No. 18197589.7, dated Dec. 17, 2020, 6 pages.
Rev. Some Culture, “It’s super easy for middle-aged and elderly people to learn compute”, Jul. 31, 2013, 2 pages (Official Copy Only) (See Communication under 37 CFR § 1.98(a) (3)).

(56) References Cited

OTHER PUBLICATIONS

Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Search Report and Opinion received for Danish Patent Application No. PA201970533, dated Oct. 25, 2019, 9 pages.
Search Report received for Netherlands Patent Application No. 2014737, dated Oct. 29, 2015, 9 pages.
Shankland Stephen, "Chrome OS Gets 'Ok Google' Voice Search Control", available online at <http://www.cnet.com/news/chrome-os-gets-ok-google-voice-search-control/>, May 21, 2014, 4 pages.
Smith Eddie, "The experts guide to Instapaper", available online at "http://www.macworld.com/article/1166898/the_experts_guide_to_instapaper.html", May 23, 2012, 8 pages.
Summons to Attend Oral Proceedings received for European Patent Application No. 12770400.5, mailed on Mar. 19, 2018, 10 pages.
Summons to Attend Oral Proceedings received for European Patent Application No. 13171047.7, mailed on Jul. 9, 2018, 12 pages.
Summons to Attend Oral Proceedings received for European Patent Application No. 15711969.4, mailed on Oct. 22, 2018, 12 pages.
Summons to Attend Oral Proceedings received for European Patent Application No. 19169980.0, mailed on Dec. 3, 2020, 8 pages.
Supplemental Notice of Allowance received for U.S. Appl. No. 16/584,743, dated Nov. 25, 2020, 2 pages.
Vanhemert Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.
Wikipedia, "QR code", Available online at: https://en.wikipedia.org/w/index.php?title=OR_code&oldid=452939488, Sep. 28, 2011, pp. 1-9.
WZ Science Alliance, "Very simple geriatrics computer and Internet bestselling upgrade", Sep. 30, 2013, 3 pages (Official Copy Only) (See Communication under 37 CFR § 1.98(a) (3)).
Office Action received for Chinese Patent Application No. 201811539260.0, dated Nov. 4, 2020, 9 pages (5 pages of English Translation and 4 pages of Official Copy).
Applicant-Intiated Interview Summary received for U.S. Appl. No. 16/723,583, dated Dec. 28, 2020, 6 pages.
Corrected Notice of Allowance received for U.S. Appl. No. 16/584,743, dated Dec. 30, 2020, 3 pages.
Decision on Appeal received for U.S. Appl. No. 15/128,952, mailed on Dec. 28, 2020, 23 pages.
Non-Final Office Action received for U.S. Appl. No. 16/583,994, dated Dec. 23, 2020, 17 pages.
Notice of Allowance received for U.S. Appl. No. 16/583,989, dated Dec. 24, 2020, 7 pages.
Office Action received for Japanese Patent Application No. 2018-080122, dated Nov. 27, 2020, 16 pages (8 pages of English Translation and 8 pages of Official Copy).
Office Action received for Chinese Patent Application No. 201811539259.8, dated Sep. 3, 2020, 10 pages (6 pages of English Translation and 4 pages of Official Copy).
Office Action received for Chinese Patent Application No. 202010125114.4, dated Aug. 21, 2020, 16 pages (8 pages of English Translation and 8 pages of Official Copy).
Office Action received for European Patent Application No. 19207753.5, dated Nov. 12, 2020, 5 pages.
Extended European Search Report received for European Patent Application No. 20158824.1, dated Aug. 10, 2020, 13 pages.
Summons to Attend Oral Proceedings received for European Patent Application No. 18197583.0, mailed on Aug. 14, 2020, 12 pages.
Applicant-Initiated Interview Summary received for U.S. Appl. No. 16/670,949, dated Apr. 6, 2021, 2 pages.
Corrected Notice of Allowance received for U.S. Appl. No. 16/583,981, dated Apr. 6, 2021, 3 pages.
Decision to Grant received for Japanese Patent Application No. 2019-124728, dated Apr. 2, 2021, 4 pages (1 page of English Translation and 3 pages of Official Copy).
Notice of Allowance received for Korean Patent Application No. 10-2021-7005691, dated Mar. 29, 2021, 3 pages (1 page of English Translation and 2 page of Official Copy).
Office Action received for Chinese Patent Application No. 202010125114.4, dated Mar. 1, 2021, 15 pages (9 pages of English Translation and 6 pages of Official Copy).
Supplemental Notice of Allowance received for U.S. Appl. No. 16/584,490, dated Apr. 13, 2021, 2 pages.
Office Action received for Australian Patent Application No. 2019268111, dated Oct. 27, 2020, 7 pages.
Board Opinion received for Chinese Patent Application No. 201510288981.9, dated Jan. 4, 2021, 21 pages (9 pages of English Translation and 12 pages of Official Copy).
Final Office Action received for U.S. Appl. No. 17/031,833, dated Jan. 26, 2021, 17 pages.
Intention to Grant received for European Patent Application No. 18197589.7, dated Jan. 21, 2021, 8 pages.
LG G Pad 8.3 Tablet Q Remote User, Available at:—<https://mushroomprincess.tistory.com/1320>, Dec. 26, 2013, 37 pages (20 page of English Translation and 17 pages of Official Copy).
Notice of Allowance received for Chinese Patent Application No. 201811460172.1, dated Jan. 11, 2021, 2 pages (1 page of English Translation and 1 page of Official Copy).
Notice of Allowance received for U.S. Appl. No. 15/910,263, dated Jan. 22, 2021, 33 pages.
Notice of Allowance received for U.S. Appl. No. 16/922,675, dated Jan. 21, 2021, 7 pages.
Office Action received for Australian Patent Application No. 2018271366, dated Jan. 19, 2021, 5 pages.
Office Action received for Chinese Patent Application No. 201911128105.4, dated Jan. 4, 2021, 14 pages (7 page of English Translation and 7 pages of Official Copy).
Office Action received for European Patent Application No. 20719301.2, dated Jan. 28, 2021, 15 pages.
Office Action received for Japanese Patent Application No. 2019-124728, dated Dec. 14, 2020, 4 pages (2 pages of English Translation and 2 pages of Official Copy).
Applicant-Initiated Interview Summary received for U.S. Appl. No. 16/422,736, dated Feb. 24, 2021, 3 pages.
Final Office Action received for U.S. Appl. No. 16/263,280, dated Mar. 4, 2021, 13 pages.
Notice of Acceptance received for Australian Patent Application No. 2019268111, dated Feb. 18, 2021, 3 pages.
Office Action received for Australian Patent Application No. 2020257092, dated Mar. 3, 2021, 7 pages.
Office Action received for Chinese Patent Application No. 201910164962.3, dated Jan. 12, 2021, 14 pages (7 pages of English Translation and 7 pages of Official Copy).
Result of consultation received for European Patent Application No. 18197583.0, dated Feb. 24, 2021, 3 pages.
Office Action received for Chinese Patent Application No. 201911128105.4, dated Jul. 3, 2020, 18 pages (9 pages of English Translation and 9 pages of Official Copy).
Brief Communication Regarding Oral Proceedings received for European Patent Application No. 18197583.0, mailed on Feb. 18, 2021, 2 pages.
Corrected Notice of Allowance received for U.S. Appl. No. 15/910,263, dated Feb. 10, 2021, 3 pages.
Final Office Action received for U.S. Appl. No. 16/723,583, dated Feb. 5, 2021, 15 pages.
Notice of Allowance received for U.S. Appl. No. 15/910,263, dated Feb. 18, 2021, 3 pages.
Intention to Grant received for Danish Patent Application No. PA202070560, dated Apr. 26, 2021, 2 pages.
Office Action received for European Patent Application No. 19207753.5, dated May 10, 2021, 4 pages.

(56) References Cited

OTHER PUBLICATIONS

Office Action received for Chinese Patent Application No. 201911128105.4, dated Apr. 8, 2021, 10 pages (5 pages of English Translation and 5 pages of Official Copy).
Office Action received for European Patent Application No. 20158824.1, dated May 18, 2021, 10 pages.
Applicant-Initiated Interview Summary received for U.S. Appl. No. 16/836,571, dated Jul. 7, 2021, 6 pages.
Board Decision received for Chinese Patent Application No. 201580046339.8, dated Jun. 22, 2021, 12 pages (1 page of English Translation and 11 pages of Official Copy).
Corrected Notice of Allowance received for U.S. Appl. No. 16/583,994, dated Jul. 6, 2021, 3 pages.
Corrected Notice of Allowance received for U.S. Appl. No. 16/702,968, dated Jun. 28, 2021, 4 pages.
Decision to Grant received for European Patent Application No. 15719347.5, dated Jun. 24, 2021, 2 pages.
Invitation to Pay Search Fees received for European Patent Application No. 18733381.0, dated Jun. 30, 2021, 4 pages.
Notice of Allowance received for U.S. Appl. No. 16/583,994, dated Jun. 24, 2021, 10 pages.
Office Action received for Chinese Patent Application No. 201810338040.5, dated Jun. 3, 2021, 25 pages (15 pages of English Translation and 10 pages of Official Copy).
Office Action received for Chinese Patent Application No. 201810339290.0, dated Jun. 4, 2021, 20 pages (11 pages of English Translation and 9 pages of Official Copy).
Office Action received for Chinese Patent Application No. 202010125114.4, dated Jun. 7, 2021, 7 pages (4 pages of English Translation and 3 pages of Official Copy).
Summons to Attend Oral Proceedings received for European Patent Application No. 18178147.7, dated Jun. 28, 2021, 8 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Corrected Notice of Allowance received for U.S. Appl. No. 16/263,280, dated Aug. 5, 2021, 4 pages.
Final Office Action received for U.S. Appl. No. 17/026,818, dated Jan. 29, 2021, 21 pages.
Non-Final Office Action received for U.S. Appl. No. 17/026,818, dated Nov. 25, 2020, 20 pages.
Non-Final Office Action received for U.S. Appl. No. 17/223,794, dated Jun. 16, 2021, 32 pages.
Notice of Allowance received for Japanese Patent Application No. 2020-558885, dated Jul. 26, 2021, 4 pages (1 page of English Translation and 3 pages of Official Copy).
Notice of Allowance received for Korean Patent Application No. 10-2020-0024632, dated Jul. 26, 2021, 3 pages (1 page of English Translation and 2 pages of Official Copy).
Notice of Allowance received for U.S. Appl. No. 16/987,003, dated Aug. 18, 2021, 9 pages.
Notice of Allowance received for U.S. Appl. No. 17/026,818, dated May 13, 2021, 10 pages.
Office Action received for Australian Patent Application No. 2021204454, dated Aug. 9, 2021, 7 pages.
Office Action received for Chinese Patent Application No. 201811367893.8, dated Jun. 21, 2021, 18 pages (8 pages of English Translation and 10 pages of Official Copy).
Search Report and Opinion received for Danish Patent Application No. PA202070617, dated Dec. 23, 2020, 8 pages.
Board Decision received for Chinese Patent Application No. 201580043701.6, dated Aug. 19, 2021, 2 pages (1 page of English Translation and 1 page of Official Copy).
Corrected Notice of Allowance received for U.S. Appl. No. 16/987,003, dated Sep. 1, 2021, 3 pages.
Office Action received for Korean Patent Application No. 10-2021-7021047, dated Aug. 13, 2021, 5 pages (2 pages of English Translation and 3 pages of Official Copy).
Androidcentral, "How Do I Respond to Group Messages from Notification Bar?", Available online at: https://forums.androidcentral .com/ask-question/952030-how-do-i-respond-group-messages-notification-bar.html, Mar. 25, 2019, 3 pages.
Applicant-Initiated Interview Summary received for U.S. Appl. No. 16/263,280, dated Apr. 26, 2021, 2 pages.
Applicant-Initiated Interview Summary received for U.S. Appl. No. 16/583,994, dated May 28, 2021, 5 pages.
Applicant-Initiated Interview Summary received for U.S. Appl. No. 17/031,833, dated May 24, 2021, 6 pages.
Board Decision received for Chinese Patent Application No. 201510288981.9, dated May 6, 2021, 31 pages (3 pages of English Translation and 28 pages of Official Copy).
Board Opinion received for Chinese Patent Application No. 201580046339.8, dated Mar. 19, 2021, 11 pages (3 pages of English Translation and 8 pages of Official Copy).
Brief Communication Regarding Oral Proceedings received for European Patent Application No. 19169980.0, dated Jun. 17, 2021, 2 pages.
COMPUTERADV, "Sonos App Navigation & Menu on iPhone", Available online at https://www.youtube.com/watch?v=Jhz9XvWQ204, Aug. 4, 2015, 1 page.
Corrected Notice of Allowance received for U.S. Appl. No. 16/583,981, dated May 17, 2021, 3 pages.
Corrected Notice of Allowance received for U.S. Appl. No. 16/702,968, dated Jun. 8, 2021, 3 pages.
Corrected Notice of Allowance received for U.S. Appl. No. 16/702,968, dated Jun. 16, 2021, 4 pages.
Corrected Notice of Allowance received for U.S. Appl. No. 16/702,968, dated May 26, 2021, 4 pages.
Corrected Notice of Allowance received for U.S. Appl. No. 16/702,968, dated May 28, 2021, 4 pages.
"Customize Notifications and Content on Your Galaxy Phone's Lock Screen", Online Available at: https://www.samsung.com/US/support/answer/ANS00062636, Oct. 4, 2017, 5 pages.
Decision to Grant received for European Patent Application No. 18197589.7, dated Jun. 10, 2021, 2 pages.
Examiner Allowance Proposal received for U.S. Appl. No. 16/807,604, dated Apr. 12, 2021, 3 pages.
Examiner Proposed Amendment received for U.S. Appl. No. 16/803,849, dated Apr. 22, 2021, 4 pages.
Gookin Dan, "Lock Screen Settings on Your Android Phone", Online Available at https://www.dummies.com/consumer-electronics/smartphones/droid/lock-screen-settings-on-your-android-phone/, Sep. 23, 2015, 6 pages.
Intention to Grant received for European Patent Application No. 15719347.5, dated Jun. 8, 2021, 7 pages.
Intention to Grant received for European Patent Application No. 15719347.5, dated May 11, 2021, 8 pages.
Intention to Grant received for European Patent Application No. 16710590.7, dated Jun. 14, 2021, 8 pages.
Non-Final Office Action received for U.S. Appl. No. 16/803,849, dated May 14, 2021, 34 pages.
Non-Final Office Action received for U.S. Appl. No. 16/922,675, dated May 4, 2021, 23 pages.
Non-Final Office Action received for U.S. Appl. No. 16/987,003, dated May 10, 2021, 20 pages.
Notice of Allowance received for Japanese Patent Application No. 2018-080122, dated May 7, 2021, 28 pages (1 page of English Translation and 27 pages of Official Copy).
Notice of Allowance received for Korean Patent Application No. 10-2020-7031319, dated Apr. 6, 2021, 5 pages (2 pages of English Translation and 3 pages of Official Copy).
Notice of Allowance received for U.S. Appl. No. 16/702,968, dated Apr. 21, 2021, 20 pages.
Notice of Allowance received for U.S. Appl. No. 16/263,280, dated Jun. 8, 2021, 8 pages.
Notice of Allowance received for U.S. Appl. No. 16/422,736, dated Apr. 20, 2021, 12 pages.
Notice of Allowance received for U.S. Appl. No. 16/422,736, dated Jun. 15, 2021, 13 pages.
Notice of Allowance received for U.S. Appl. No. 16/670,949, dated May 27, 2021, 7 pages.

(56) References Cited

OTHER PUBLICATIONS

Notice of Allowance received for U.S. Appl. No. 16/888,775, dated Jun. 3, 2021, 11 pages.
Notice of Allowance received for U.S. Appl. No. 17/031,833, dated Jun. 25, 2021, 15 pages.
Notice of Hearing received for Indian Patent Application No. 717/CHENP/2014, dated May 5, 2021, 3 pages.
Office Action received for Chinese Patent Application No. 201580043701.6, dated May 8, 2021, 10 pages (1 page of English Translation and 9 pages of Official Copy).
Office Action received for Danish Patent Application No. PA201970533, dated Apr. 20, 2021, 2 pages.
Office Action received for European Patent Application No. 17813737.8, dated Apr. 16, 2021, 7 pages.
Office Action received for European Patent Application No. 18208881.5, dated May 7, 2021, 6 pages.
Punchkick Interactive, "Punchkick hands-on review: Fitbit Surge", URL: https://www.youtube.com/watch?v=K2G7aebUYcA, Mar. 25, 2015, 3 pages.
Rossignol Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.
"Smart Home App—What is the Widget", Online Available at: https://support.vivint.eom/s/article/Vivint-Smart-Home-App-What-is-the-Widget, Jan. 26, 2019, 4 pages.
Stroud Forrest, "Screen Lock Meaning & Definition", Online Available at: https://www.webopedia.com/definitions/screen-lock, Jan. 30, 2014, 3 pages.
Corrected Notice of Allowance received for U.S. Appl. No. 16/422,736, dated Jul. 9, 2021, 2 pages.
Decision to Refuse received for European Patent Application No. 19169980.0, dated Jul. 15, 2021, 4 pages.
Extended European Search Report received for European Patent Application No. 21166718.3, dated Jul. 6, 2021, 11 pages.
Notice of Allowance received for Brazilian Patent Application No. BR112014003009-0, dated Jun. 15, 2021, 3 pages (1 page of English Translation and 2 pages of Official Copy).
Office Action received for Australian Patent Application No. 2020207785, dated Jul. 13, 2021, 3 pages.
Office Action received for Australian Patent Application No. 2020273355, dated Jul. 6, 2021, 3 pages.
Corrected Notice of Allowance received for U.S. Appl. No. 17/031,833, dated Aug. 2, 2021, 3 pages.
Extended European Search Report received for European Patent Application No. 21160991.2, dated Jul. 16, 2021, 14 pages.
Intention to Grant received for European Patent Application No. 18197583.0, dated Jul. 23, 2021, 9 pages.
Notice of Allowance received for Korean Patent Application No. 10-2021-7020549, dated Jul. 13, 2021, 3 pages (1 page of English Translation and 2 pages of Official Copy).
Notice of Allowance received for U.S. Appl. No. 16/888,775, dated Jul. 26, 2021, 5 pages.
Applicant-Initiated Interview Summary received for U.S. Appl. No. 16/922,675, dated Sep. 3, 2021, 2 pages.
Applicant-Initiated Interview Summary received for U.S. Appl. No. 17/223,794, dated Sep. 7, 2021, 3 pages.
Corrected Notice of Allowance received for U.S. Appl. No. 16/670,949, dated Sep. 8, 2021, 2 pages.
Intention to Grant received for European Patent Application No. 19207753.5, dated Sep. 3, 2021, 8 pages.
Non-Final Office Action received for U.S. Appl. No. 16/679,967, dated Sep. 2, 2021, 12 pages.
Non-Final Office Action received for U.S. Appl. No. 16/921,551, dated Sep. 8, 2021, 7 pages.
Notice of Acceptance received for Australian Patent Application No. 2020257092, dated Aug. 27, 2021, 3 pages.
Notice of Allowance received for U.S. Appl. No. 16/670,949, dated Sep. 14, 2021, 7 pages.
Notice of Allowance received for U.S. Appl. No. 16/836,571, dated Sep. 8, 2021, 25 pages.
Notice of Allowance received for U.S. Appl. No. 17/031,833, dated Sep. 20, 2021, 6 pages.
Office Action received for Australian Patent Application No. 2020239711, dated Sep. 13, 2021, 5 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Senicar et al., "User-Centered Design and Development of an Intelligent Light Switch for Sensor Systems", Technical Gazette, vol. 26, No. 2, available online at: https://hrcak.srce.hr/file/320403, 2019, pp. 339-345.

* cited by examiner (A)

Figure 7B:
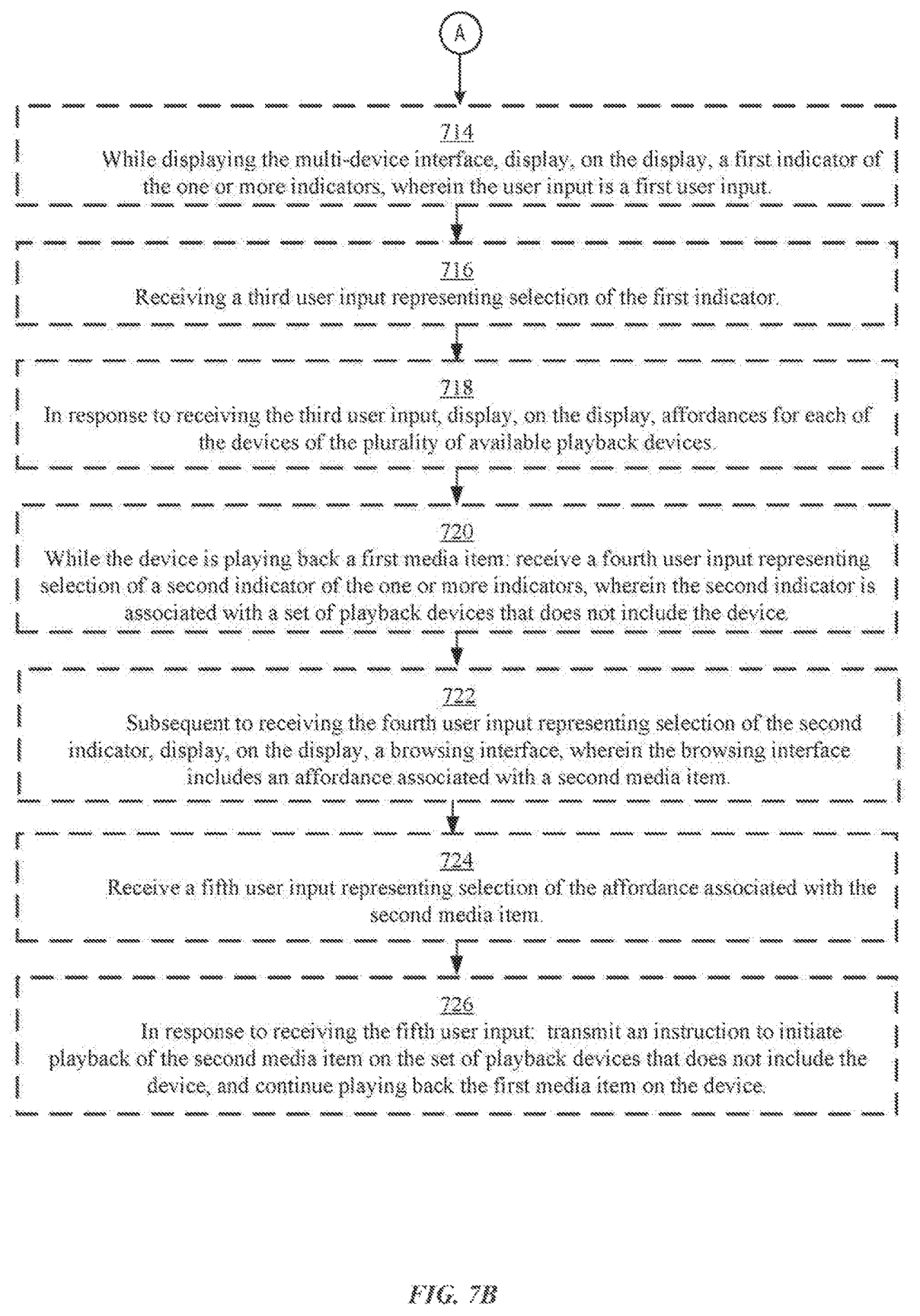

714
While displaying the multi-device interface, display, on the display, a first indicator of the one or more indicators, wherein the user input is a first user input.

716
Receiving a third user input representing selection of the first indicator.

718
In response to receiving the third user input, display, on the display, affordances for each of the devices of the plurality of available playback devices.

720
While the device is playing back a first media item: receive a fourth user input representing selection of a second indicator of the one or more indicators, wherein the second indicator is associated with a set of playback devices that does not include the device.

722
Subsequent to receiving the fourth user input representing selection of the second indicator, display, on the display, a browsing interface, wherein the browsing interface includes an affordance associated with a second media item.

724
Receive a fifth user input representing selection of the affordance associated with the second media item.

726
In response to receiving the fifth user input: transmit an instruction to initiate playback of the second media item on the set of playback devices that does not include the device, and continue playing back the first media item on the device.

Figure 13B:
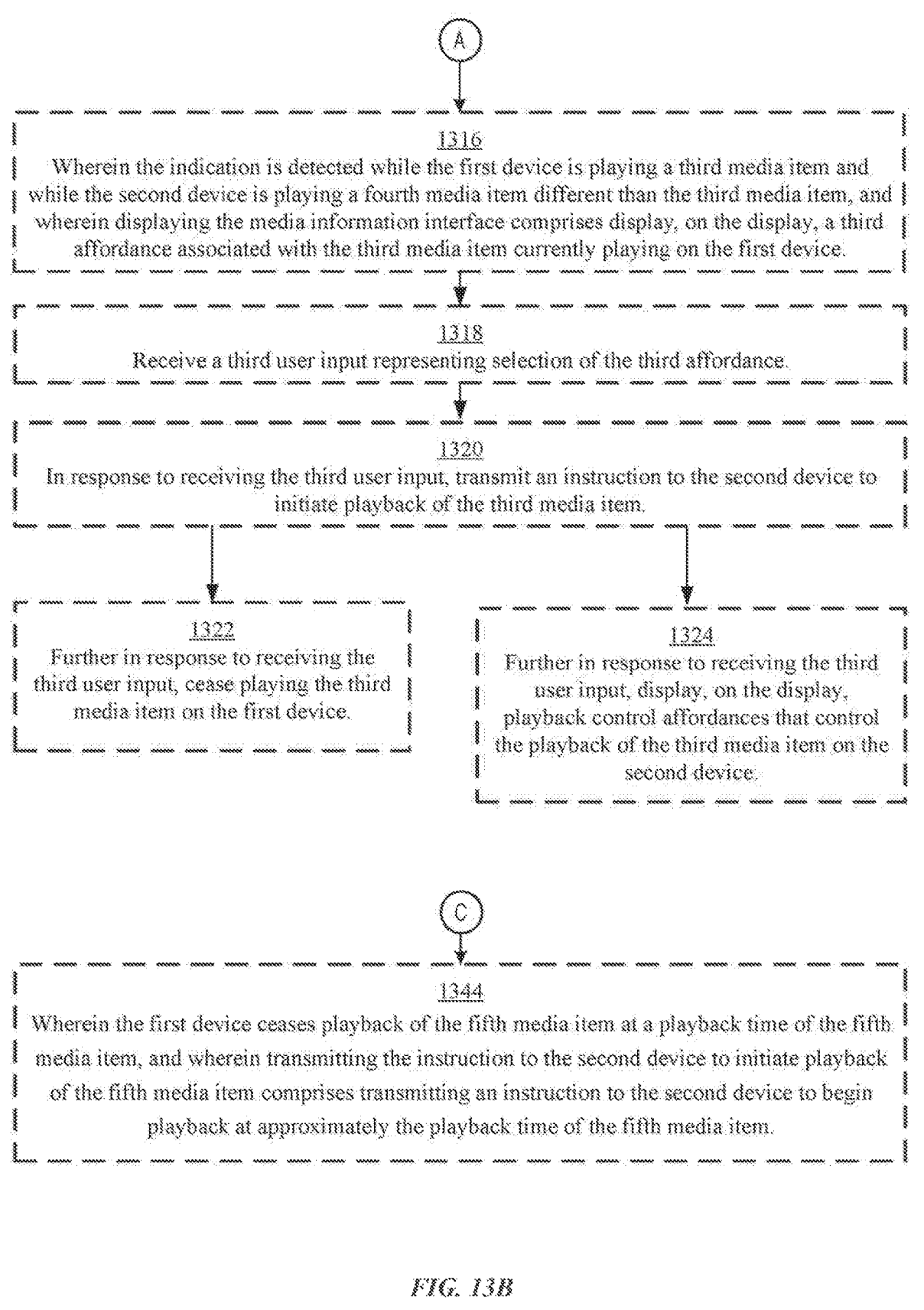

1316
Wherein the indication is detected while the first device is playing a third media item and while the second device is playing a fourth media item different than the third media item, and wherein displaying the media information interface comprises display, on the display, a third affordance associated with the third media item currently playing on the first device.

1318
Receive a third user input representing selection of the third affordance.

1320
In response to receiving the third user input, transmit an instruction to the second device to initiate playback of the third media item.

1322
Further in response to receiving the third user input, cease playing the third media item on the first device.

1324
Further in response to receiving the third user input, display, on the display, playback control affordances that control the playback of the third media item on the second device.

C

1344
Wherein the first device ceases playback of the fifth media item at a playback time of the fifth media item, and wherein transmitting the instruction to the second device to initiate playback of the fifth media item comprises transmitting an instruction to the second device to begin playback at approximately the playback time of the fifth media item.

Figure 13F:
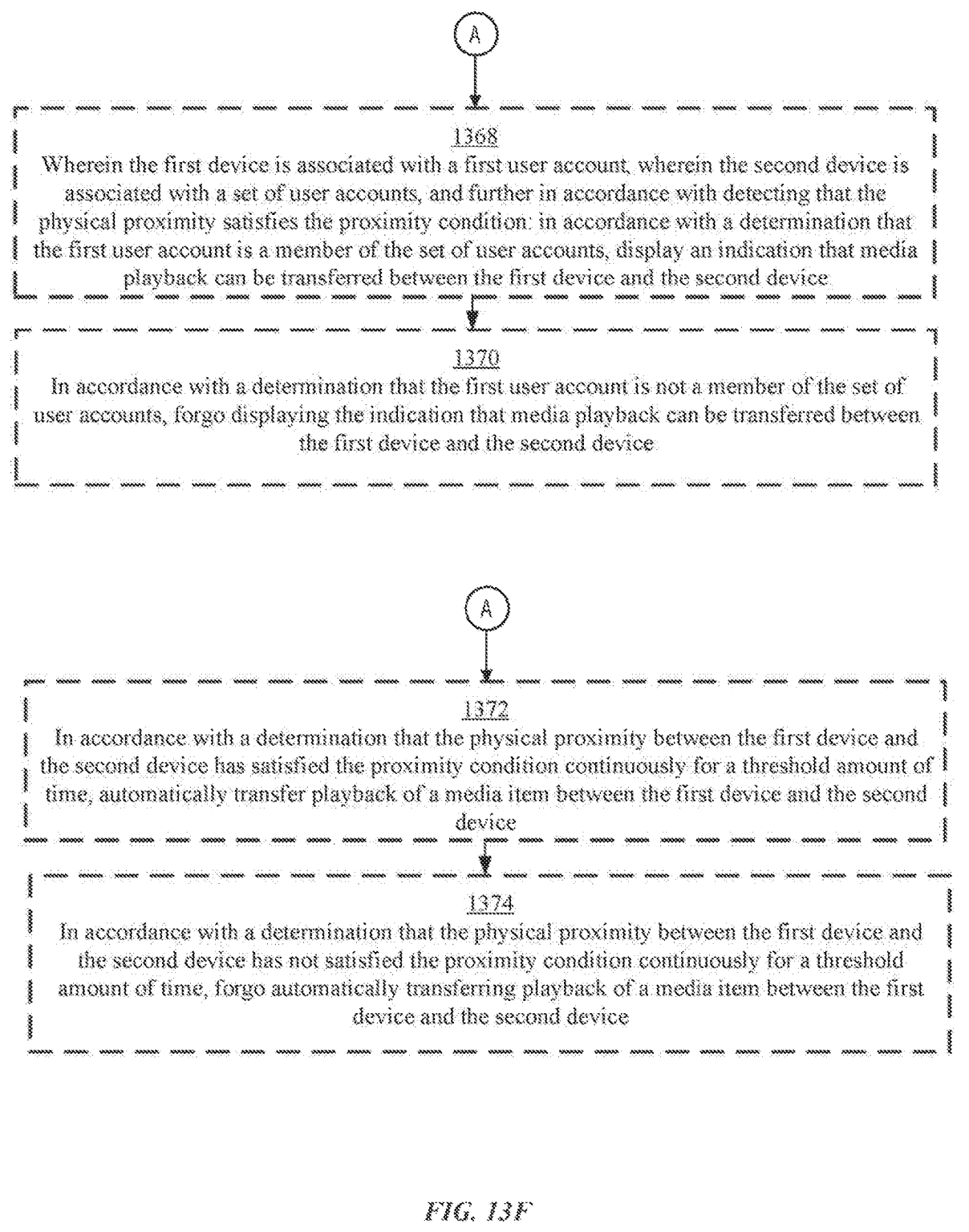

1368
Wherein the first device is associated with a first user account, wherein the second device is associated with a set of user accounts, and further in accordance with detecting that the physical proximity satisfies the proximity condition: in accordance with a determination that the first user account is a member of the set of user accounts, display an indication that media playback can be transferred between the first device and the second device 1370
In accordance with a determination that the first user account is not a member of the set of user accounts, forgo displaying the indication that media playback can be transferred between the first device and the second device

A

1372
In accordance with a determination that the physical proximity between the first device and the second device has satisfied the proximity condition continuously for a threshold amount of time, automatically transfer playback of a media item between the first device and the second device 1374
In accordance with a determination that the physical proximity between the first device and the second device has not satisfied the proximity condition continuously for a threshold amount of time, forgo automatically transferring playback of a media item between the first device and the second device

Figure 15B:
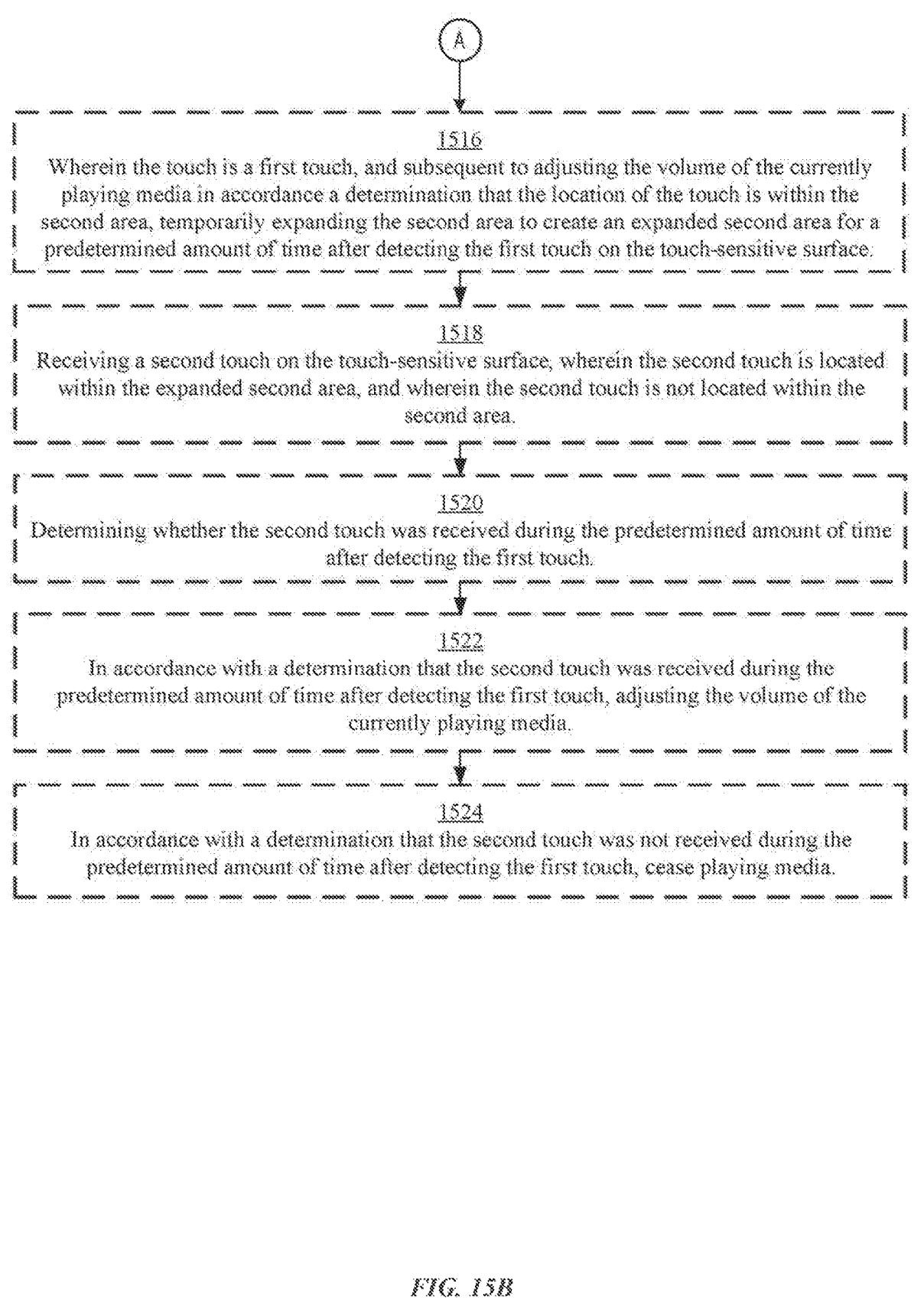

1516
Wherein the touch is a first touch, and subsequent to adjusting the volume of the currently playing media in accordance a determination that the location of the touch is within the second area, temporarily expanding the second area to create an expanded second area for a predetermined amount of time after detecting the first touch on the touch-sensitive surface.

1518
Receiving a second touch on the touch-sensitive surface, wherein the second touch is located within the expanded second area, and wherein the second touch is not located within the second area.

1520
Determining whether the second touch was received during the predetermined amount of time after detecting the first touch.

1522
In accordance with a determination that the second touch was received during the predetermined amount of time after detecting the first touch, adjusting the volume of the currently playing media.

1524
In accordance with a determination that the second touch was not received during the predetermined amount of time after detecting the first touch, cease playing media.

*FIG. 19B*
1900
1902
10:09
WATCH
CAMERA
WEATHER
CLOCK
12
3
6
MUSIC
HOME
PHONE
MESSAGES
MAIL
BROWSER

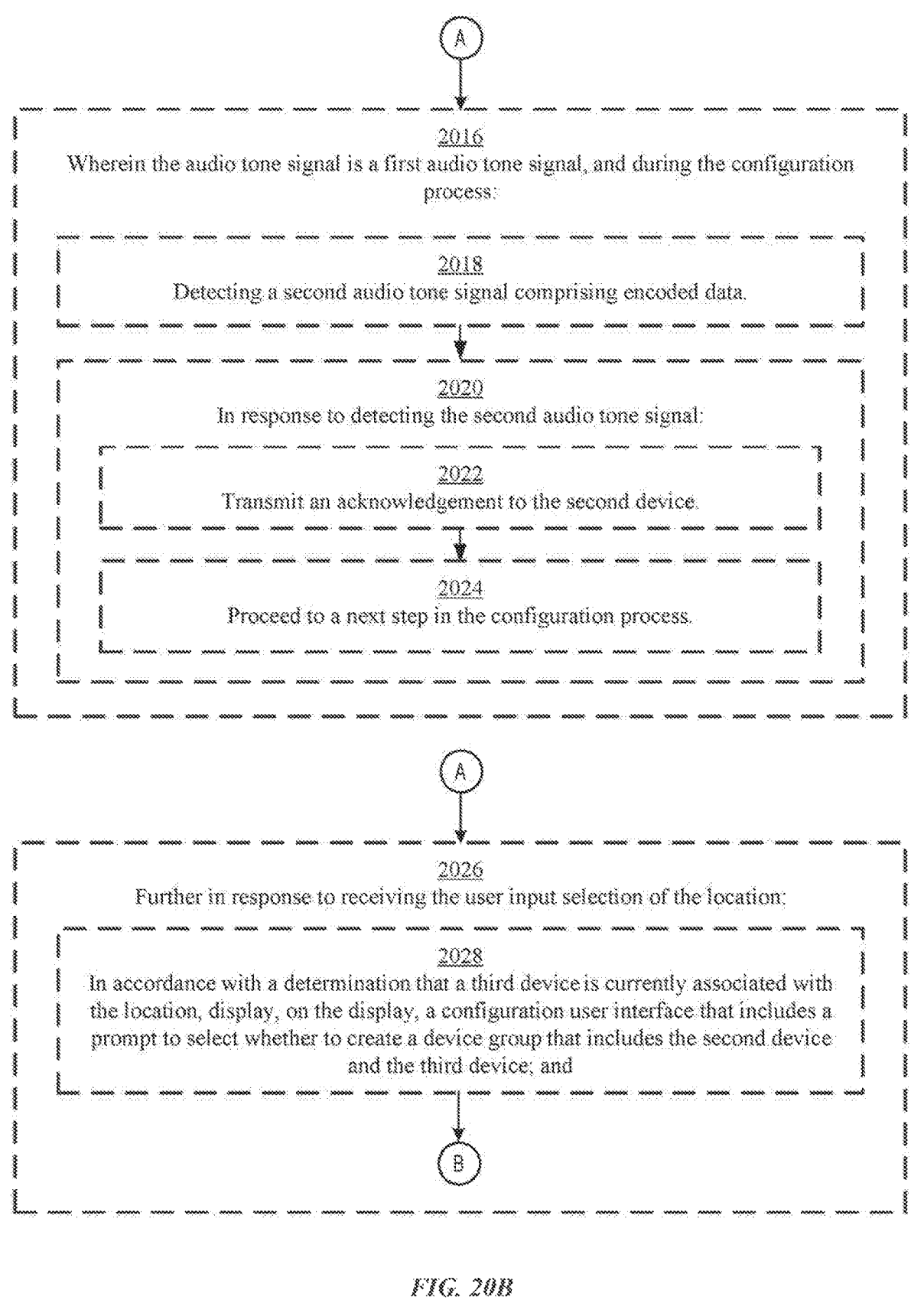

2016
Wherein the audio tone signal is a first audio tone signal, and during the configuration process:

2018
Detecting a second audio tone signal comprising encoded data.

2020
In response to detecting the second audio tone signal:

2022
Transmit an acknowledgement to the second device.

2024
Proceed to a next step in the configuration process.

(A)

2026
Further in response to receiving the user input selection of the location:

2028
In accordance with a determination that a third device is currently associated with the location, display, on the display, a configuration user interface that includes a prompt to select whether to create a device group that includes the second device and the third device; and (B)

*FIG. 20B*

Figure 20C:
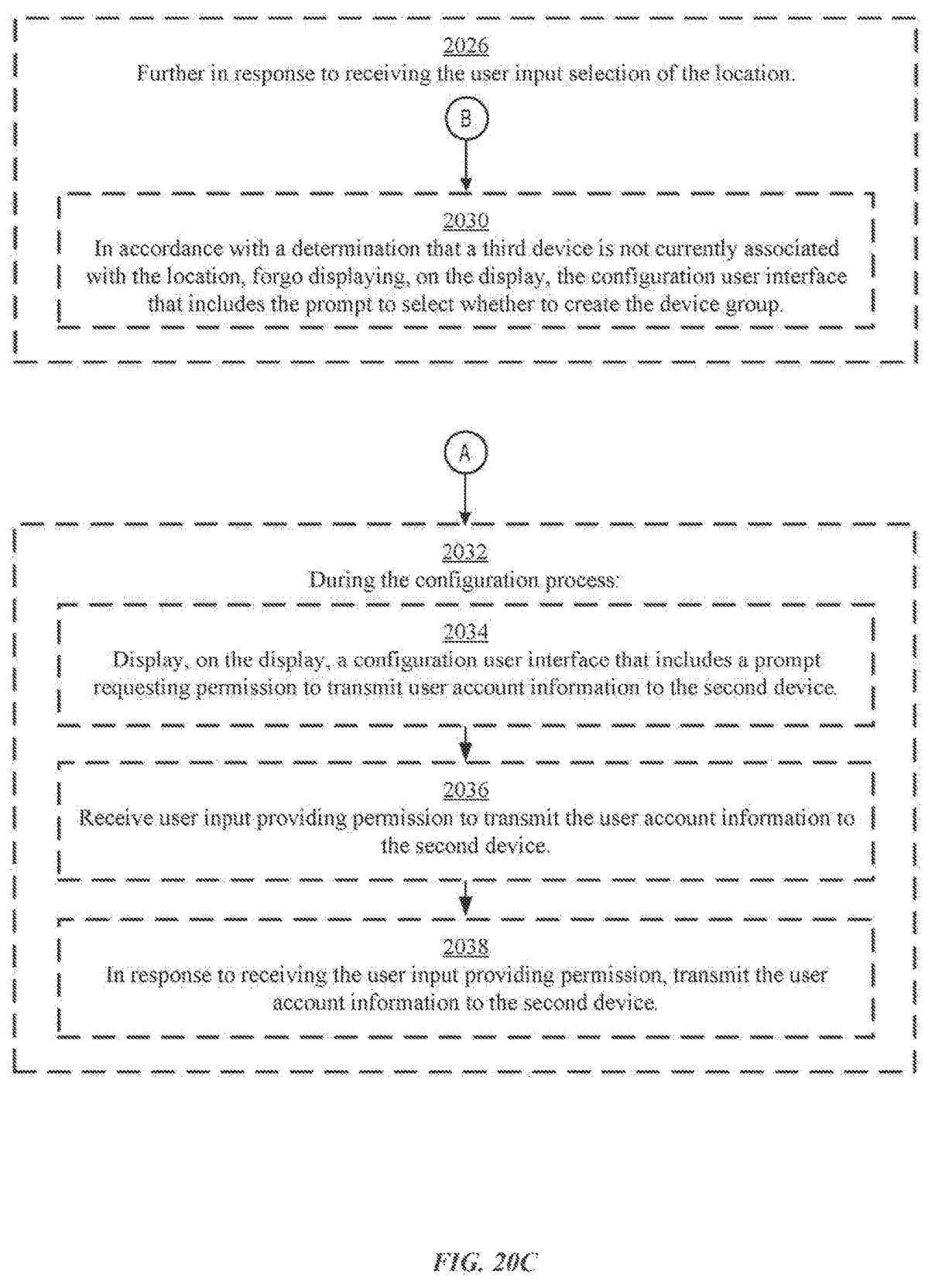

2026
Further in response to receiving the user input selection of the location.

(B)

2030
In accordance with a determination that a third device is not currently associated with the location, forgo displaying, on the display, the configuration user interface that includes the prompt to select whether to create the device group.

(A)

2032
During the configuration process:

2034
Display, on the display, a configuration user interface that includes a prompt requesting permission to transmit user account information to the second device.

2036
Receive user input providing permission to transmit the user account information to the second device.

2038
In response to receiving the user input providing permission, transmit the user account information to the second device.

Figure 26B:
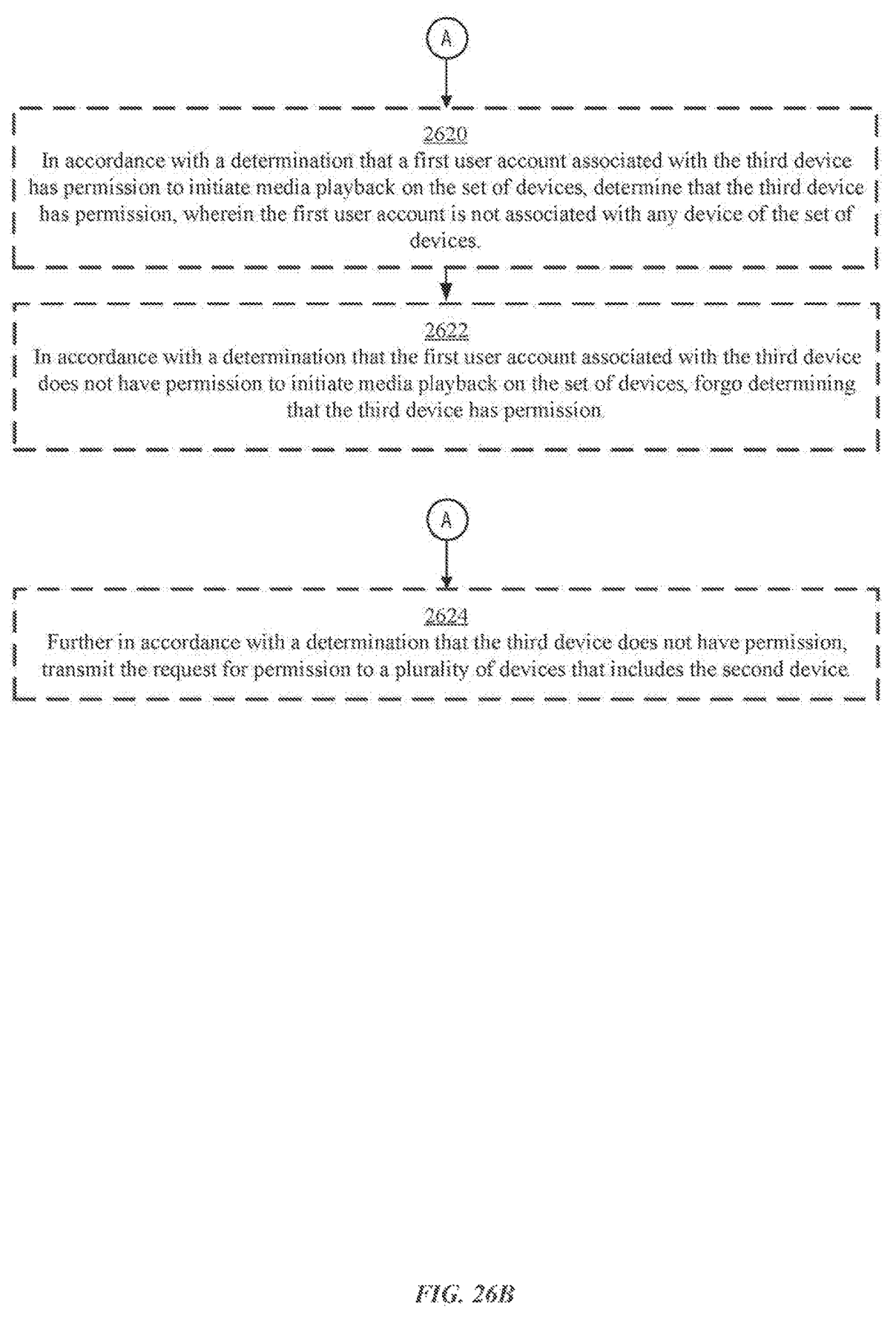

2620
In accordance with a determination that a first user account associated with the third device has permission to initiate media playback on the set of devices, determine that the third device has permission, wherein the first user account is not associated with any device of the set of devices.

2622
In accordance with a determination that the first user account associated with the third device does not have permission to initiate media playback on the set of devices, forgo determining that the third device has permission.

A

2624
Further in accordance with a determination that the third device does not have permission, transmit the request for permission to a plurality of devices that includes the second device.

Figure 28B:
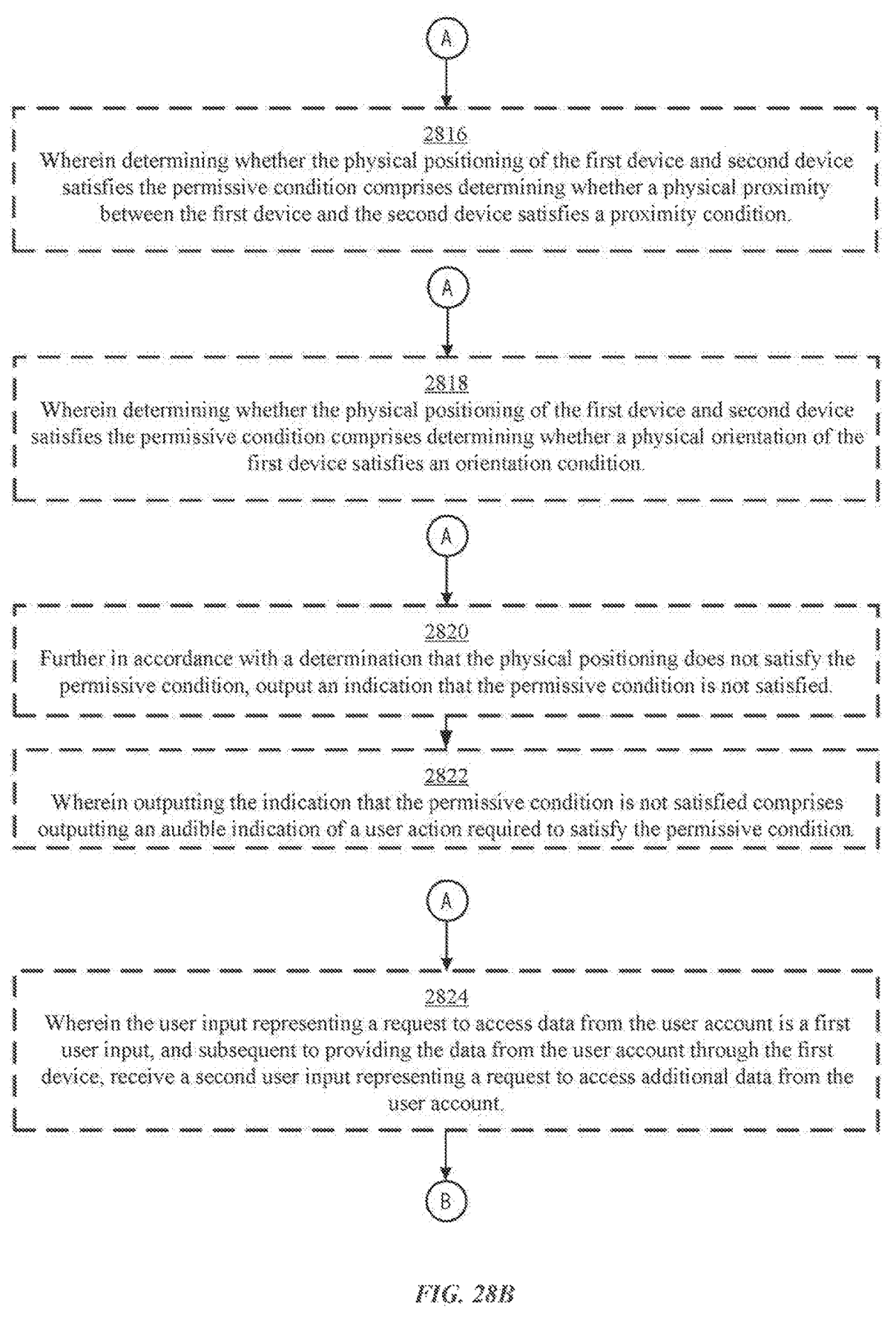

2816
Wherein determining whether the physical positioning of the first device and second device satisfies the permissive condition comprises determining whether a physical proximity between the first device and the second device satisfies a proximity condition.

(A)

2818
Wherein determining whether the physical positioning of the first device and second device satisfies the permissive condition comprises determining whether a physical orientation of the first device satisfies an orientation condition.

(A)

2820
Further in accordance with a determination that the physical positioning does not satisfy the permissive condition, output an indication that the permissive condition is not satisfied.

2822
Wherein outputting the indication that the permissive condition is not satisfied comprises outputting an audible indication of a user action required to satisfy the permissive condition.

(A)

2824
Wherein the user input representing a request to access data from the user account is a first user input, and subsequent to providing the data from the user account through the first device, receive a second user input representing a request to access additional data from the user account.

Figure 36C:
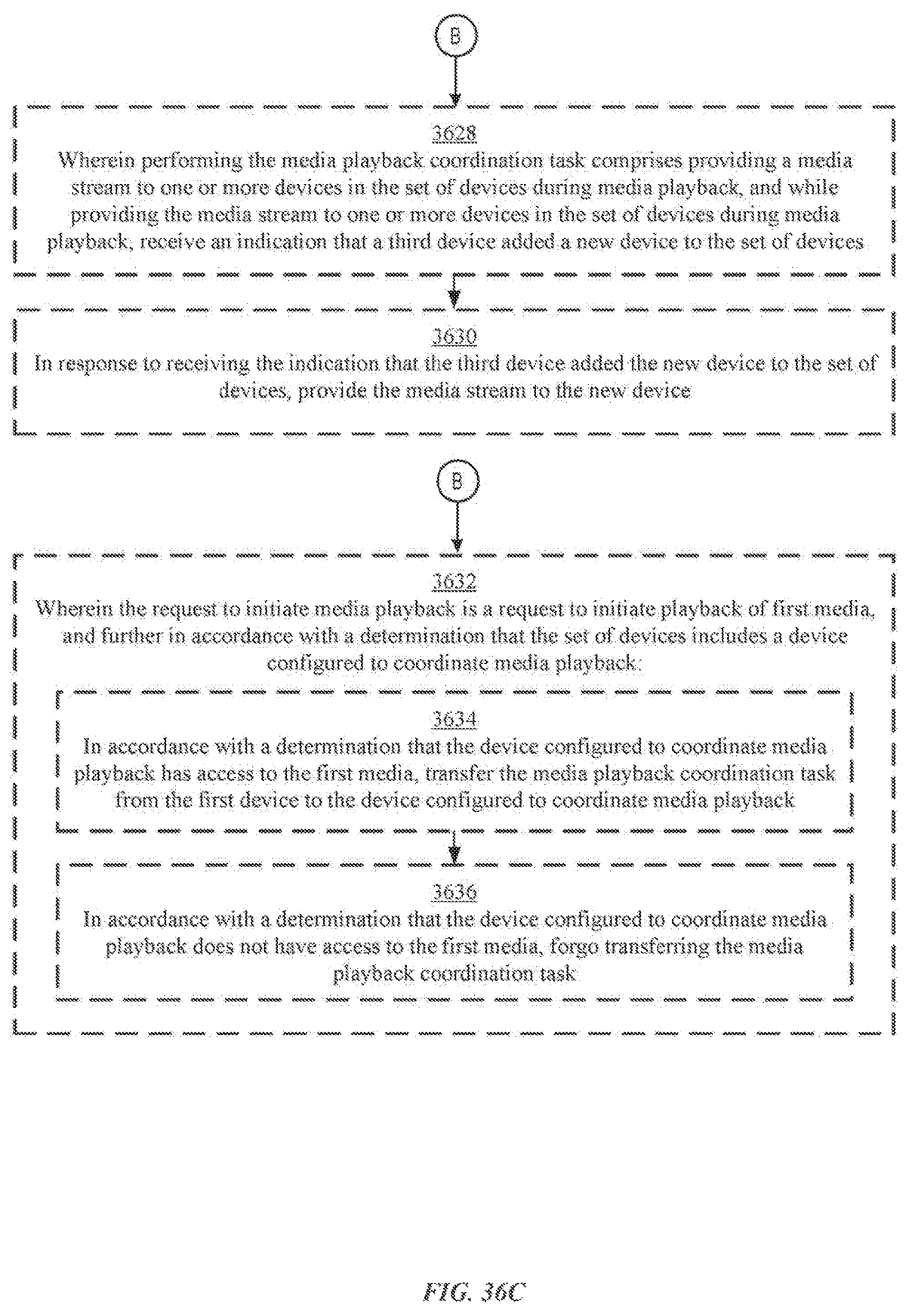

3628
Wherein performing the media playback coordination task comprises providing a media stream to one or more devices in the set of devices during media playback, and while providing the media stream to one or more devices in the set of devices during media playback, receive an indication that a third device added a new device to the set of devices 3630
In response to receiving the indication that the third device added the new device to the set of devices, provide the media stream to the new device

B

3632
Wherein the request to initiate media playback is a request to initiate playback of first media, and further in accordance with a determination that the set of devices includes a device configured to coordinate media playback:

3634
In accordance with a determination that the device configured to coordinate media playback has access to the first media, transfer the media playback coordination task from the first device to the device configured to coordinate media playback 3636
In accordance with a determination that the device configured to coordinate media playback does not have access to the first media, forgo transferring the media playback coordination task

| | |
|---|---|
| POWER SOURCE | BATTERY |
| NETWORK PERFORMANCE | LOW |
| CONNECTION TO KITCHEN DEVICE | — |
| CONNECTION TO LIVING ROOM 1 DEVICE | LOW |
| CONNECTION TO LIVING ROOM 2 DEVICE | LOW |
| CONNECTION TO BEDROOM DEVICE | MODERATE |

3714B

| | |
|---|---|
| POWER SOURCE | NON-BATTERY |
| NETWORK PERFORMANCE | HIGH |
| CONNECTION TO KITCHEN DEVICE | HIGH |
| CONNECTION TO LIVING ROOM 1 DEVICE | — |
| CONNECTION TO LIVING ROOM 2 DEVICE | HIGH |
| CONNECTION TO BEDROOM DEVICE | MODERATE |

3714C

| | |
|---|---|
| POWER SOURCE | BATTERY |
| NETWORK PERFORMANCE | MODERATE |
| CONNECTION TO KITCHEN DEVICE | MODERATE |
| CONNECTION TO LIVING ROOM 1 DEVICE | HIGH |
| CONNECTION TO LIVING ROOM 2 DEVICE | — |
| CONNECTION TO BEDROOM DEVICE | MODERATE |

3714D

| | |
|---|---|
| POWER SOURCE | NON-BATTERY |
| NETWORK PERFORMANCE | HIGH |
| CONNECTION TO KITCHEN DEVICE | HIGH |
| CONNECTION TO LIVING ROOM 1 DEVICE | HIGH |
| CONNECTION TO LIVING ROOM 2 DEVICE | HIGH |
| CONNECTION TO BEDROOM DEVICE | HIGH |

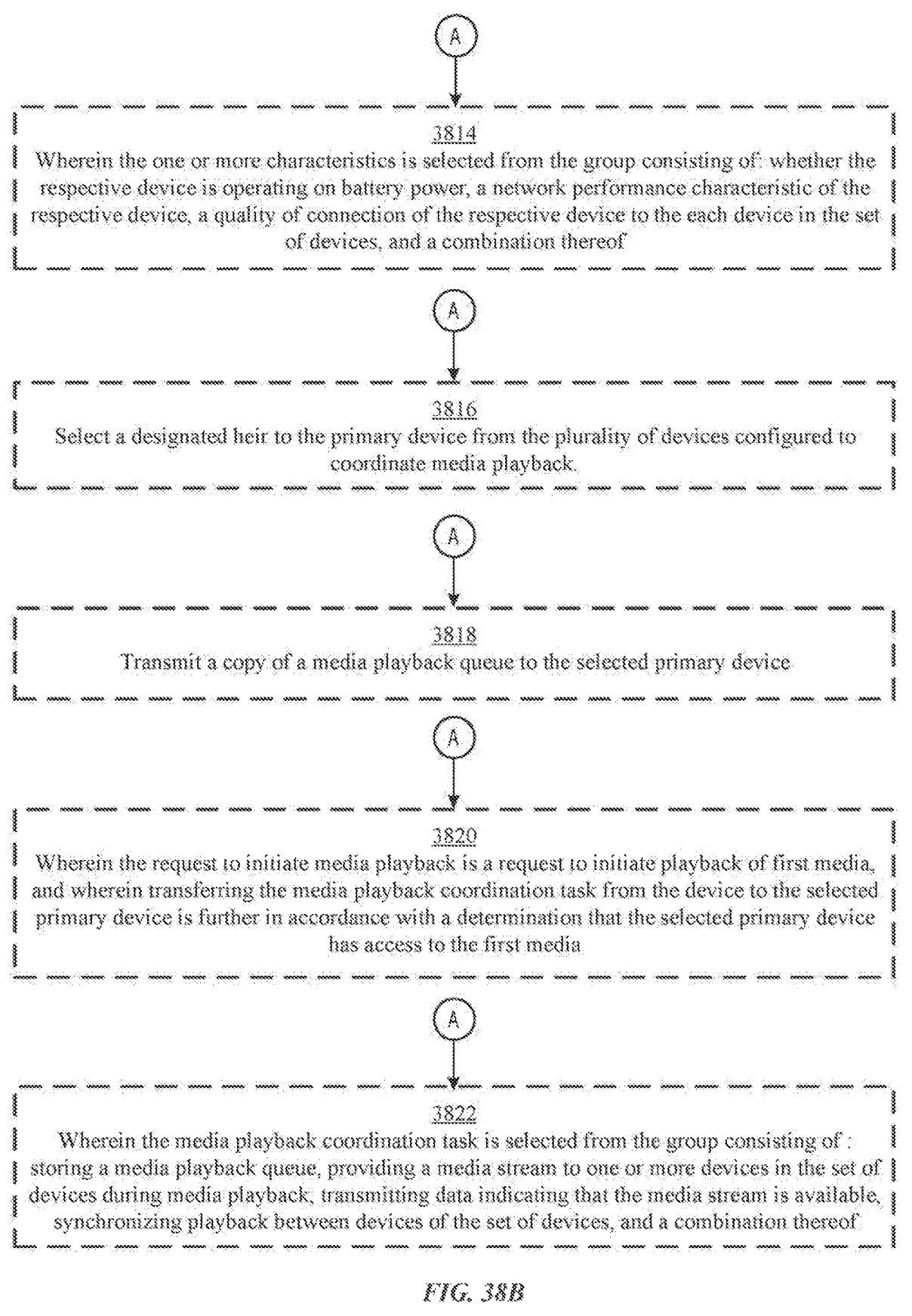

3814
Wherein the one or more characteristics is selected from the group consisting of: whether the respective device is operating on battery power, a network performance characteristic of the respective device, a quality of connection of the respective device to the each device in the set of devices, and a combination thereof

A

3816
Select a designated heir to the primary device from the plurality of devices configured to coordinate media playback.

A

3818
Transmit a copy of a media playback queue to the selected primary device

A

3820
Wherein the request to initiate media playback is a request to initiate playback of first media, and wherein transferring the media playback coordination task from the device to the selected primary device is further in accordance with a determination that the selected primary device has access to the first media

A

3822
Wherein the media playback coordination task is selected from the group consisting of : storing a media playback queue, providing a media stream to one or more devices in the set of devices during media playback, transmitting data indicating that the media stream is available, synchronizing playback between devices of the set of devices, and a combination thereof

*FIG. 38B*

METHODS AND INTERFACES FOR CONFIGURING A DEVICE IN ACCORDANCE WITH AN AUDIO TONE SIGNAL

CROSS-REFERENCE TO RELATED APPLICATIONS

This application is a continuation of U.S. patent application Ser. No. 16/702,968, entitled "METHODS AND INTERFACES FOR HOME MEDIA CONTROL", filed on Dec. 4, 2019, which is a continuation of U.S. patent application Ser. No. 15/910,263, entitled "METHODS AND INTERFACES FOR HOME MEDIA CONTROL", filed on Mar. 2, 2018, which claims priority to U.S. provisional patent application 62/507,202, entitled "METHODS AND INTERFACES FOR HOME MEDIA CONTROL", filed on May 16, 2017, U.S. provisional patent application 62/507,208, entitled "METHODS AND INTERFACES FOR HOME MEDIA CONTROL", filed on May 16, 2017, U.S. provisional patent application 62/514,932, entitled "METHODS AND INTERFACES FOR HOME MEDIA CONTROL", filed on Jun. 4, 2017, and U.S. provisional patent application 62/622,122, entitled "METHODS AND INTERFACES FOR HOME MEDIA CONTROL", filed on Jan. 25, 2018. The contents of which are hereby incorporated by reference in their entirety.

This application also relates to Denmark Patent Application No. PA 2017 70392, entitled "METHODS AND INTERFACES FOR HOME MEDIA CONTROL", filed on May 29, 2017, Denmark Patent Application No. PA 2017 70401, entitled "METHODS AND INTERFACES FOR HOME MEDIA CONTROL", filed on May 29, 2017, Denmark Patent Application No. PA 2017 70402, entitled "METHODS AND INTERFACES FOR HOME MEDIA CONTROL", filed on May 29, 2017, Denmark Patent Application No. PA 2017 70403, entitled "METHODS AND INTERFACES FOR HOME MEDIA CONTROL", filed on May 29, 2017, Denmark Patent Application No. PA 2017 70404, entitled "METHODS AND INTERFACES FOR HOME MEDIA CONTROL", filed on May 29, 2017, Denmark Patent Application No. PA 2017 70406, entitled "METHODS AND INTERFACES FOR HOME MEDIA CONTROL", filed on May 29, 2017, Denmark Patent Application No. PA 2017 70408, entitled "METHODS AND INTERFACES FOR HOME MEDIA CONTROL", filed on May 29, 2017, Denmark Patent Application No. PA 2017 70409, entitled "METHODS AND INTERFACES FOR HOME MEDIA CONTROL", filed on May 29, 2017, and Denmark Patent Application No. PA 2017 70410, entitled "METHODS AND INTERFACES FOR HOME MEDIA CONTROL", filed on May 29, 2017, the contents of each of which are hereby incorporated by reference in their entirety.

This application also relates to the U.S. patent application Ser. No. 14/300,120 entitled "MULTI-CHANNEL LOUDSPEAKER MATCHING VARIABLE DIRECTIVITY," filed on Jun. 9, 2014, the content of which is hereby incorporated by reference in its entirety, and included in the Appendix. This application also relates to the U.S. patent application Ser. No. 14/732,711 entitled "MULTI-MICROPHONE SPEECH RECOGNITION SYSTEMS AND RELATED TECHNIQUES," filed on Jun. 6, 2015, the content of which is hereby incorporated by reference in its entirety, and included in the Appendix. This application also relates to the U.S. patent application Ser. No. 14/732,715 entitled "MULTI-MICROPHONE SPEECH RECOGNITION TECHNIQUES AND RELATED SYSTEMS," filed on Jun. 6, 2015. This application also relates to the U.S. patent application Ser. No. 14/869,760 entitled "MODAL BASED ARCHITECTURE FOR CONTROLLING THE DIRECTIVITY OF LOUDSPEAKER ARRAYS," filed on Sep. 29, 2015, the content of which is hereby incorporated by reference in its entirety, and included in the Appendix. This application also relates to the U.S. patent application Ser. No. 15/266,956 entitled "INTELLIGENT AUTOMATED ASSISTANT FOR MEDIA EXPLORATION," filed on Sep. 15, 2016. This application also relates to the U.S. patent application Ser. No. 15/268,338 entitled "INTELLIGENT DEVICE ARBITRATION AND CONTROL," filed on Sep. 16, 2016, the content of which is hereby incorporated by reference in its entirety, and included in the Appendix. This application also relates to the U.S. patent application Ser. No. 15/272,214 entitled "INTELLIGENT LIST READING," filed on Sep. 21, 2016. This application also relates to the U.S. patent application Ser. No. 15/275,077 entitled "PRESSURE GRADIENT MICROPHONE FOR MEASURING AN ACOUSTIC CHARACTERISTIC OF A LOUDSPEAKER," filed on Sep. 23, 2016. This application also relates to the U.S. patent application Ser. No. 15/385,606 entitled "INTELLIGENT AUTOMATED ASSISTANT," filed on Dec. 20, 2016, the content of which is hereby incorporated by reference in its entirety, and included in the Appendix. This application also relates to the U.S. patent application Ser. No. 15/504,312 entitled "A ROTATIONALLY SYMMETRIC SPEAKER ARRAY," filed on Aug. 18, 2014. This application also relates to the U.S. patent application Ser. No. 15/514,455 entitled "METHOD TO DETERMINE LOUDSPEAKER CHANGE OF PLACEMENT," filed on Sep. 25, 2015. This application also relates to the U.S. patent application Ser. No. 15/583,949 entitled "A ROTATIONALLY SYMMETRIC SPEAKER ARRAY," filed on May 1, 2017. This application also relates to the U.S. patent application Ser. No. 15/593,887 entitled "SPATIAL AUDIO RENDERING FOR BEAMFORMING LOUDSPEAKER ARRAY," filed on May 12, 2017, the content of which is hereby incorporated by reference in its entirety, and included in the Appendix. This application also relates to the U.S. Patent Application No. 62/004,111 entitled "MULTI-CHANNEL LOUDSPEAKER MATCHING USING VARIABLE DIRECTIVITY," filed on May 28, 2014. This application also relates to the U.S. Patent Application No. 62/057,989 entitled "MODAL BASED ARCHITECTURE FOR CONTROLLING THE DIRECTIVITY OF LOUDSPEAKER ARRAYS," filed on Sep. 30, 2014. This application also relates to the U.S. Patent Application No. 62/057,999 entitled "METHOD TO DETERMINE LOUDSPEAKER CHANGE OF PLACEMENT," filed on Sep. 30, 2014. This application also relates to the U.S. Patent Application No. 62/346,236 entitled "IN IELLIGENT LIST READING," filed on Jun. 6, 2016. This application also relates to the U.S. Patent Application No. 62/347,480 entitled "INTELLIGENT AUTOMATED ASSISTANT FOR MEDIA EXPLORATION," filed on Jun. 8, 2016. This application also relates to the U.S. Patent Application No. 62/348,896 entitled "INTELLIGENT DEVICE ARBITRATION AND CONTROL," filed on Jun. 11, 2016. This application also relates to the U.S. Patent Application No. 62/399,165 entitled "AUDIO DRIVER AND POWER SUPPLY UNIT ARCHITECTURE," filed on Sep. 23, 2016. This application also relates to the U.S. Patent Application No. 62/399,229 entitled "MULTI-LOBE MAGNET FOR SUBWOOFER," filed on Sep. 23, 2016. This application also relates to the U.S. Patent Application No. 62/399,232 entitled "INTEL- LIGENT AUTOMATED ASSISTANT," filed on Sep. 23, 2016. This application also relates to the U.S. Patent Application No. 62/399,262 entitled "FORWARD BACK VOLUME OF AIR FOR AUDIO DRIVER," filed on Sep. 23, 2016. This application also relates to the U.S. Patent Application No. 62/399,288 entitled "UPPER HOUSING COMPONENT ARCHITECTURE," filed on Sep. 23, 2016. This application also relates to the U.S. Patent Application No. 62/399,293 entitled "AUDIO DRIVER EXIT GEOMETRY," filed on Sep. 23, 2016. This application also relates to the U.S. Patent Application No. 62/402,836 entitled "SPATIAL AUDIO RENDERING STRATEGIES FOR BEAMFORMING LOUD SPEAKER ARRAY," filed on Sep. 30, 2016. This application also relates to the U.S. Patent Application No. 62/506,912 entitled "MANAGING MEDIA COLLECTIONS USING DIRECTED ACYCLIC GRAPHS," filed on May 16, 2017. This application also relates to the U.S. Patent Application No. 62/507,007 entitled "SPEAKER," filed on May 16, 2017. This application also relates to the U.S. Patent Application No. 62/507,100 entitled "TRANSFERRING PLAYBACK QUEUES BETWEEN DEVICES," filed on May 16, 2017. This application also relates to the U.S. Patent Application No. 62/507,151 entitled "FAR-FIELD EXTENSION FOR DIGITAL ASSISTANT SERVICES," filed on May 16, 2017, the content of which is hereby incorporated by reference in its entirety, and included in the Appendix. This application also relates to the U.S. Patent Application No. 62/507,056 entitled "PROVIDING AN AUDITORY-BASED INTERFACE OF A DIGITAL ASSISTANT," filed on May 16, 2017. This application also relates to the U.S. Patent Application No. 62/506,871 entitled "METHODS AND SYSTEMS FOR PHONETIC MATCHING IN DIGITAL ASSISTANT SERVICE," filed on May 16, 2017. This application also relates to the U.S. Patent Application No. 62/507,042 entitled "DETECTING A TRIGGER OF A DIGITAL ASSISTANT," filed on May 16, 2017. This application also relates to the U.S. Patent Application No. 62/506,981 entitled "INTELLIGENT AUTOMATED ASSISTANT FOR MEDIA EXPLORATION," filed on May 16, 2017. This application also relates to the U.S. patent application Ser. No. 15/967,089 entitled "SPATIALLY DUCKING AUDIO PRODUCED THROUGH A BEAMFORMING LOUDSPEAKER ARRAY," filed on Apr. 30, 2018. This application also relates to the U.S. patent application Ser. No. 15/613,127 entitled "MULTI-CHANNEL SPEECH SIGNAL ENHANCEMENT FOR ROBUST VOICE TRIGGER DETECTION AND AUTOMATIC SPEECH RECOGNITION," filed on Jun. 2, 2017. This application also relates to the U.S. patent application Ser. No. 15/613,040 entitled "LOUDSPEAKER ORIENTATION SYSTEMS," filed on Jun. 2, 2017. This application also relates to the U.S. patent application Ser. No. 15/619,058 entitled "AUDIO SYSTEMS WITH SMOOTH DIRECTIVITY TRANSITIONS," filed on Jun. 9, 2017. This application also relates to the U.S. patent application Ser. No. 15/613,198 entitled "AUDIO SYSTEMS WITH ACTIVE FEEDBACK ACOUSTIC ECHO CANCELLATION," filed on Jun. 3, 2017. This application also relates to the U.S. Patent Application No. 62/507,150 entitled "TECHNIQUES FOR VERIFYING USER INTENT AND SECURELY CONFIGURING COMPUTER DEVICES," filed on May 16, 2017. This application also relates to the U.S. Patent Application No. 62/507,187 entitled "TECHNIQUES FOR REPAIRING AN INOPERABLE AUXILIARY DEVICE USING ANOTHER DEVICE," filed on May 16, 2017. The content of each of the above-listed related applications are hereby incorporated by reference in their entirety.

FIELD

The present disclosure relates generally to computer user interfaces, and more specifically to techniques for managing media playback devices.

BACKGROUND

The number of electronic devices, and particularly smart devices, in users' homes continues to increase. These devices are increasingly being interconnected with each other, are increasingly more capable, and are performing more complex tasks. As such, these devices are increasingly expected to have thoughtfully-designed user interfaces.

BRIEF SUMMARY

Some techniques for managing media playback devices using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing media playback devices. Such methods and interfaces optionally complement or replace other methods for managing media playback devices. Such methods and interfaces reduce the cognitive burden on a user and produce a more efficient human-machine interface. For battery-operated computing devices, such methods and interfaces conserve power and increase the time between battery charges. Such methods and interfaces can reduce the number of unnecessary, extraneous, or repetitive user inputs. Further, such methods and interfaces can reduce the battery usage by a display or speaker of an electronic device.

In accordance with some embodiments, a method is performed at a device with a display. The method comprises: receiving a user input; and in response to receiving the user input, displaying, on the display, a multi-device interface that includes: one or more indicators associated with a plurality of available playback devices that are connected to the device and available to initiate playback of media from the device, and a media playback status of the plurality of available playback devices.

In accordance with some embodiments, a non-transitory computer-readable storage medium is described. The non-transitory computer-readable storage medium stores one or more programs configured to be executed by one or more processors of an electronic device with a display, the one or more programs including instructions for: receiving a user input; and in response to receiving the user input, displaying, on the display, a multi-device interface that includes: one or more indicators associated with a plurality of available playback devices that are connected to the device and available to initiate playback of media from the device, and a media playback status of the plurality of available playback devices.

In accordance with some embodiments, an electronic device is described. The electronic device comprises: a display; one or more processors; and memory storing one or more programs configured to be executed by the one or more processors, the one or more programs including instructions for: receiving a user input; and in response to receiving the user input, displaying, on the display, a multi-device interface that includes: one or more indicators associated with a plurality of available playback devices that are connected to the device and available to initiate playback of media from the device, and a media playback status of the plurality of available playback devices.

In accordance with some embodiments, an electronic device is described. The electronic device comprises: a display; means for receiving a user input; and means for, responsive to receiving the user input, displaying, on the display, a multi-device interface that includes: one or more indicators associated with a plurality of available playback devices that are connected to the device and available to initiate playback of media from the device, and a media playback status of the plurality of available playback devices.

In accordance with some embodiments, a transitory computer-readable storage medium is described. The transitory computer-readable storage medium stores one or more programs configured to be executed by one or more processors of an electronic device with a display, the one or more programs including instructions for: receiving a user input; and in response to receiving the user input, displaying, on the display, a multi-device interface that includes: one or more indicators associated with a plurality of available playback devices that are connected to the device and available to initiate playback of media from the device, and a media playback status of the plurality of available playback devices.

In accordance with some embodiments, a method is performed at a device with a display. The method comprises: displaying, on the display, a first current media interface for the device, wherein the first current media interface includes: a representation of a first media item available for playback on the device, and a playback device selection affordance; receiving a first user input representing selection of the playback device selection affordance; in response to receiving the first user input, displaying, on the display, one or more affordances associated with a plurality of available playback devices connected to the device; receiving a second user input representing selection of the one or more affordances associated with the plurality of available playback devices; and in response to receiving the second user input, configuring the device to initiate playback on the plurality of available playback devices.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying, on the display, a first current media interface for the device, wherein the first current media interface includes: a representation of a first media item available for playback on the device, and a playback device selection affordance; receiving a first user input representing selection of the playback device selection affordance; in response to receiving the first user input, displaying, on the display, one or more affordances associated with a plurality of available playback devices connected to the device; receiving a second user input representing selection of the one or more affordances associated with the plurality of available playback devices; and in response to receiving the second user input, configuring the device to initiate playback on the plurality of available playback devices.

In accordance with some embodiments, an electronic device is described. The electronic device comprises: a display; one or more processors; and memory storing one or more programs configured to be executed by the one or more processors, the one or more programs including instructions for: displaying, on the display, a first current media interface for the device, wherein the first current media interface includes: a representation of a first media item available for playback on the device, and a playback device selection affordance; receiving a first user input representing selection of the playback device selection affordance; in response to receiving the first user input, displaying, on the display, one or more affordances associated with a plurality of available playback devices connected to the device; receiving a second user input representing selection of the one or more affordances associated with the plurality of available playback devices; and in response to receiving the second user input, configuring the device to initiate playback on the plurality of available playback devices.

In accordance with some embodiments, an electronic device is described. The electronic device comprises: a display; means for displaying, on the display, a first current media interface for the device, wherein the first current media interface includes: a representation of a first media item available for playback on the device, and a playback device selection affordance; means for receiving a first user input representing selection of the playback device selection affordance; means for, responsive to receiving the first user input, displaying, on the display, one or more affordances associated with a plurality of available playback devices connected to the device; means for receiving a second user input representing selection of the one or more affordances associated with the plurality of available playback devices; and means for, responsive to receiving the second user input, configuring the device to initiate playback on the plurality of available playback devices.

In accordance with some embodiments, a transitory computer-readable storage medium is described. The transitory computer-readable storage medium stores one or more programs configured to be executed by one or more processors of an electronic device with a display, the one or more programs including instructions for: displaying, on the display, a first current media interface for the device, wherein the first current media interface includes: a representation of a first media item available for playback on the device, and a playback device selection affordance; receiving a first user input representing selection of the playback device selection affordance; in response to receiving the first user input, displaying, on the display, one or more affordances associated with a plurality of available playback devices connected to the device; receiving a second user input representing selection of the one or more affordances associated with the plurality of available playback devices; and in response to receiving the second user input, configuring the device to initiate playback on the plurality of available playback devices.

In accordance with some embodiments, a method is performed at a first device. The method comprises: detecting an indication that a physical proximity between the first device and a second device satisfies a proximity condition, wherein the first device is connected to the second device via a communication link; in accordance with detecting the indication, audibly outputting an audio tone signal, wherein the audio tone signal is out-of-band to the communication link; subsequent to outputting the audio tone signal, determining whether a response audio tone signal from the second device has been received; in accordance with a determination that the response audio tone signal from the second device has been received, proceeding to a next step in a configuration process; and in accordance with a determination that the response audio tone signal from the second device has not been received, forgoing proceeding to the next step in the configuration process.

In accordance with some embodiments, a non-transitory computer-readable storage medium is described. The non-transitory computer-readable storage medium stores one or more programs configured to be executed by one or more processors of an electronic device, the one or more programs including instructions for: detecting an indication that a physical proximity between the first device and a second device satisfies a proximity condition, wherein the first device is connected to the second device via a communication link; in accordance with detecting the indication, audibly outputting an audio tone signal, wherein the audio tone signal is out-of-band to the communication link; subsequent to outputting the audio tone signal, determining whether a response audio tone signal from the second device has been received; in accordance with a determination that the response audio tone signal from the second device has been received, proceeding to a next step in a configuration process; and in accordance with a determination that the response audio tone signal from the second device has not been received, forgoing proceeding to the next step in the configuration process.

In accordance with some embodiments, an electronic device is described. The electronic device comprises: one or more processors; and memory storing one or more programs configured to be executed by the one or more processors, the one or more programs including instructions for: detecting an indication that a physical proximity between the first device and a second device satisfies a proximity condition, wherein the first device is connected to the second device via a communication link; in accordance with detecting the indication, audibly outputting an audio tone signal, wherein the audio tone signal is out-of-band to the communication link; subsequent to outputting the audio tone signal, determining whether a response audio tone signal from the second device has been received; in accordance with a determination that the response audio tone signal from the second device has been received, proceeding to a next step in a configuration process; and in accordance with a determination that the response audio tone signal from the second device has not been received, forgoing proceeding to the next step in the configuration process.

In accordance with some embodiments, an electronic device is described. The electronic device comprises: means for detecting an indication that a physical proximity between the first device and a second device satisfies a proximity condition, wherein the first device is connected to the second device via a communication link; means for, in accordance with detecting the indication, audibly outputting an audio tone signal, wherein the audio tone signal is out-of-band to the communication link; means for, subsequent to outputting the audio tone signal, determining whether a response audio tone signal from the second device has been received; means for, in accordance with a determination that the response audio tone signal from the second device has been received, proceeding to a next step in a configuration process; and means for, in accordance with a determination that the response audio tone signal from the second device has not been received, forgoing proceeding to the next step in the configuration process.

In accordance with some embodiments, a transitory computer-readable storage medium is described. The transitory computer-readable storage medium stores one or more programs configured to be executed by one or more processors of an electronic device, the one or more programs including instructions for: detecting an indication that a physical proximity between the first device and a second device satisfies a proximity condition, wherein the first device is connected to the second device via a communication link; in accordance with detecting the indication, audibly outputting an audio tone signal, wherein the audio tone signal is out-of-band to the communication link; subsequent to outputting the audio tone signal, determining whether a response audio tone signal from the second device has been received; in accordance with a determination that the response audio tone signal from the second device has been received, proceeding to a next step in a configuration process; and in accordance with a determination that the response audio tone signal from the second device has not been received, forgoing proceeding to the next step in the configuration process.

In accordance with some embodiments, a method is performed at a first device with a display. The method comprises: detecting, while connected to a second device, an indication that a physical proximity between the first device and the second device satisfies a proximity condition; and in accordance with detecting that the physical proximity satisfies the proximity condition, displaying, on the display, a media information interface.

In accordance with some embodiments, a non-transitory computer-readable storage medium is described. The non-transitory computer-readable storage medium stores one or more programs configured to be executed by one or more processors of an electronic device with a display, wherein the electronic device is a first device, the one or more programs including instructions for: detecting, while connected to a second device, an indication that a physical proximity between the first device and the second device satisfies a proximity condition; and in accordance with detecting that the physical proximity satisfies the proximity condition, displaying, on the display, a media information interface.

In accordance with some embodiments, an electronic device is described. The electronic device comprises: a display; one or more processors; and memory storing one or more programs configured to be executed by the one or more processors, the one or more programs including instructions for: detecting, while connected to a second device, an indication that a physical proximity between the electronic device and the second device satisfies a proximity condition; and in accordance with detecting that the physical proximity satisfies the proximity condition, displaying, on the display, a media information interface.

In accordance with some embodiments, an electronic device is described. The electronic device comprises: a display; means for detecting, while connected to a second device, an indication that a physical proximity between the electronic device and the second device satisfies a proximity condition; and means for in accordance with detecting that the physical proximity satisfies the proximity condition, displaying, on the display, a media information interface.

In accordance with some embodiments, a transitory computer-readable storage medium is described. The transitory computer-readable storage medium stores one or more programs configured to be executed by one or more processors of an electronic device with a display, wherein the electronic device is a first device, the one or more programs including instructions for: detecting, while connected to a second device, an indication that a physical proximity between the first device and the second device satisfies a proximity condition; and in accordance with detecting that the physical proximity satisfies the proximity condition, displaying, on the display, a media information interface.

In accordance with some embodiments, a method is performed at a device with a touch-sensitive surface. The method comprises: detecting a touch on the touch-sensitive surface; in response to detecting the touch on the touch-sensitive surface, determining whether the device is currently playing media; in accordance with a determination that the device is currently playing media: determining whether a location of the touch is within a first area of the touch-sensitive surface or within a second area of the touch-sensitive surface, wherein the first area and the second area are non-overlapping; in accordance with a determination that the location of the touch is within the first area of the touch-sensitive surface, ceasing playing media; and in accordance with a determination that the location of the touch is within the second area of the touch-sensitive surface, adjusting a volume of the currently playing media; and in accordance with a determination that the device is not currently playing media, initiating playback of media.

In accordance with some embodiments, a non-transitory computer-readable storage medium is described. The non-transitory computer-readable storage medium stores one or more programs configured to be executed by one or more processors of an electronic device with a touch-sensitive surface, the one or more programs including instructions for: detecting a touch on the touch-sensitive surface; in response to detecting the touch on the touch-sensitive surface, determining whether the device is currently playing media; in accordance with a determination that the device is currently playing media: determining whether a location of the touch is within a first area of the touch-sensitive surface or within a second area of the touch-sensitive surface, wherein the first area and the second area are non-overlapping; in accordance with a determination that the location of the touch is within the first area of the touch-sensitive surface, ceasing playing media; and in accordance with a determination that the location of the touch is within the second area of the touch-sensitive surface, adjusting a volume of the currently playing media; and in accordance with a determination that the device is not currently playing media, initiating playback of media.

In accordance with some embodiments, an electronic device is described. The electronic device comprises: a touch-sensitive surface; one or more processors; and memory storing one or more programs configured to be executed by the one or more processors, the one or more programs including instructions for: detecting a touch on the touch-sensitive surface; in response to detecting the touch on the touch-sensitive surface, determining whether the device is currently playing media; in accordance with a determination that the device is currently playing media: determining whether a location of the touch is within a first area of the touch-sensitive surface or within a second area of the touch-sensitive surface, wherein the first area and the second area are non-overlapping; in accordance with a determination that the location of the touch is within the first area of the touch-sensitive surface, ceasing playing media; and in accordance with a determination that the location of the touch is within the second area of the touch-sensitive surface, adjusting a volume of the currently playing media; and in accordance with a determination that the device is not currently playing media, initiating playback of media.

In accordance with some embodiments, an electronic device is described. The electronic device comprises: a touch-sensitive surface; means for detecting a touch on the touch-sensitive surface; means for, responsive to detecting the touch on the touch-sensitive surface, determining whether the device is currently playing media; means for, in accordance with a determination that the device is currently playing media: determining whether a location of the touch is within a first area of the touch-sensitive surface or within a second area of the touch-sensitive surface, wherein the first area and the second area are non-overlapping; in accordance with a determination that the location of the touch is within the first area of the touch-sensitive surface, ceasing playing media; and in accordance with a determination that the location of the touch is within the second area of the touch-sensitive surface, adjusting a volume of the currently playing media; and means for, in accordance with a determination that the device is not currently playing media, initiating playback of media.

In accordance with some embodiments, a transitory computer-readable storage medium is described. The transitory computer-readable storage medium stores one or more programs configured to be executed by one or more processors of an electronic device with a touch-sensitive surface, the one or more programs including instructions for: detecting a touch on the touch-sensitive surface; in response to detecting the touch on the touch-sensitive surface, determining whether the device is currently playing media; in accordance with a determination that the device is currently playing media: determining whether a location of the touch is within a first area of the touch-sensitive surface or within a second area of the touch-sensitive surface, wherein the first area and the second area are non-overlapping; in accordance with a determination that the location of the touch is within the first area of the touch-sensitive surface, ceasing playing media; and in accordance with a determination that the location of the touch is within the second area of the touch-sensitive surface, adjusting a volume of the currently playing media; and in accordance with a determination that the device is not currently playing media, initiating playback of media.

In accordance with some embodiments, a method is performed at a first device. The method comprises: receiving a first request to queue a first media item for playback on a set of devices, wherein the set of devices includes the first device; adding the first media item to a playback queue; receiving a second request to queue a second media item for playback on the set of devices; adding the second media item to the playback queue; accessing the first media item from a first media streaming service; initiating playback of the first media item on the set of devices; accessing the second media item from a second media streaming service different than the first media streaming service; and initiating playback of the second media item on the set of devices.

In accordance with some embodiments, a non-transitory computer-readable storage medium is described. The non-transitory computer-readable storage medium stores one or more programs configured to be executed by one or more processors of an electronic device, wherein the electronic device is a first device, the one or more programs including instructions for: receiving a first request to queue a first media item for playback on a set of devices, wherein the set of devices includes the first device; adding the first media item to a playback queue; receiving a second request to queue a second media item for playback on the set of devices; adding the second media item to the playback queue; accessing the first media item from a first media streaming service; initiating playback of the first media item on the set of devices; accessing the second media item from a second media streaming service different than the first media streaming service; and initiating playback of the second media item on the set of devices.

In accordance with some embodiments, an electronic device is described. The electronic device comprises: one or more processors; and memory storing one or more programs configured to be executed by the one or more processors, the one or more programs including instructions for: receiving a first request to queue a first media item for playback on a set of devices, wherein the set of devices includes the electronic device; adding the first media item to a playback queue; receiving a second request to queue a second media item for playback on the set of devices; adding the second media item to the playback queue; accessing the first media item from a first media streaming service; initiating playback of the first media item on the set of devices; accessing the second media item from a second media streaming service different than the first media streaming service; and initiating playback of the second media item on the set of devices.

In accordance with some embodiments, an electronic device is described. The electronic device comprises: means for receiving a first request to queue a first media item for playback on a set of devices, wherein the set of devices includes the electronic device; means for adding the first media item to a playback queue; means for receiving a second request to queue a second media item for playback on the set of devices; means for adding the second media item to the playback queue; means for accessing the first media item from a first media streaming service; means for initiating playback of the first media item on the set of devices; means for accessing the second media item from a second media streaming service different than the first media streaming service; and means for initiating playback of the second media item on the set of devices.

In accordance with some embodiments, a transitory computer-readable storage medium is described. The transitory computer-readable storage medium stores one or more programs configured to be executed by one or more processors of an electronic device, wherein the electronic device is a first device, the one or more programs including instructions for: receiving a first request to queue a first media item for playback on a set of devices, wherein the set of devices includes the first device; adding the first media item to a playback queue; receiving a second request to queue a second media item for playback on the set of devices; adding the second media item to the playback queue; accessing the first media item from a first media streaming service; initiating playback of the first media item on the set of devices; accessing the second media item from a second media streaming service different than the first media streaming service; and initiating playback of the second media item on the set of devices.

In accordance with some embodiments, a method is performed at a first device. The method comprises: receiving, from a second device associated with a first user, a first request to queue a first media item for playback on a set of devices, wherein the set of devices includes the first device; adding the first media item to a playback queue; receiving, from a third device associated with a second user, a second request to queue a second media item for playback on the set of devices, wherein the second user is different than the first; adding the second media item to the playback queue; initiating playback of the first media item on the set of devices; and initiating playback of the second media item on the set of devices.

In accordance with some embodiments, a non-transitory computer-readable storage medium is described. The non-transitory computer-readable storage medium stores one or more programs configured to be executed by one or more processors of an electronic device, wherein the electronic device is a first device, the one or more programs including instructions for: receiving, from a second device associated with a first user, a first request to queue a first media item for playback on a set of devices, wherein the set of devices includes the first device; adding the first media item to a playback queue; receiving, from a third device associated with a second user, a second request to queue a second media item for playback on the set of devices, wherein the second user is different than the first; adding the second media item to the playback queue; initiating playback of the first media item on the set of devices; and initiating playback of the second media item on the set of devices.

In accordance with some embodiments, an electronic device is described. The electronic device comprises: one or more processors; and memory storing one or more programs configured to be executed by the one or more processors, the one or more programs including instructions for: receiving, from a second device associated with a first user, a first request to queue a first media item for playback on a set of devices, wherein the set of devices includes the electronic device; adding the first media item to a playback queue; receiving, from a third device associated with a second user, a second request to queue a second media item for playback on the set of devices, wherein the second user is different than the first; adding the second media item to the playback queue; initiating playback of the first media item on the set of devices; and initiating playback of the second media item on the set of devices.

In accordance with some embodiments, an electronic device is described. The electronic device comprises: means for receiving, from a second device associated with a first user, a first request to queue a first media item for playback on a set of devices, wherein the set of devices includes the electronic device; means for adding the first media item to a playback queue; means for receiving, from a third device associated with a second user, a second request to queue a second media item for playback on the set of devices, wherein the second user is different than the first; means for adding the second media item to the playback queue; means for initiating playback of the first media item on the set of devices; and means for initiating playback of the second media item on the set of devices.

In accordance with some embodiments, a transitory computer-readable storage medium is described. The transitory computer-readable storage medium stores one or more programs configured to be executed by one or more processors of an electronic device, wherein the electronic device is a first device, the one or more programs including instructions for: receiving, from a second device associated with a first user, a first request to queue a first media item for playback on a set of devices, wherein the set of devices includes the first device; adding the first media item to a playback queue; receiving, from a third device associated with a second user, a second request to queue a second media item for playback on the set of devices, wherein the second user is different than the first; adding the second media item to the playback queue; initiating playback of the first media item on the set of devices; and initiating playback of the second media item on the set of devices.

In accordance with some embodiments, a method is performed at a first device with a display. The method comprises: detecting an audio tone signal indicative of a pairing handshake with a second device, wherein the first device is connected to the second device via a communication link, and wherein the audio tone signal is out-of-band to the communication link; in accordance with detecting the audio tone signal, initiating, on the first device, a configuration process for configuring the second device; during the configuration process, displaying, on the display, a configuration user interface that includes a prompt to select a location; receiving user input selection of a location; and in response to receiving the user input, configuring the second device to be associated with the location.

In accordance with some embodiments, a non-transitory computer-readable storage medium is described. The non-transitory computer-readable storage medium stores one or more programs configured to be executed by one or more processors of an electronic device with a display, wherein the electronic device is a first device, the one or more programs including instructions for: detecting an audio tone signal indicative of a pairing handshake with a second device, wherein the first device is connected to the second device via a communication link, and wherein the audio tone signal is out-of-band to the communication link; in accordance with detecting the audio tone signal, initiating, on the first device, a configuration process for configuring the second device; during the configuration process, displaying, on the display, a configuration user interface that includes a prompt to select a location; receiving user input selection of a location; and in response to receiving the user input, configuring the second device to be associated with the location.

In accordance with some embodiments, an electronic device is described. The electronic device comprises: a display; one or more processors; and memory storing one or more programs configured to be executed by the one or more processors, the one or more programs including instructions for: detecting an audio tone signal indicative of a pairing handshake with a second device, wherein the electronic device is connected to the second device via a communication link, and wherein the audio tone signal is out-of-band to the communication link; in accordance with detecting the audio tone signal, initiating, on the electronic device, a configuration process for configuring the second device; during the configuration process, displaying, on the display, a configuration user interface that includes a prompt to select a location; receiving user input selection of a location; and in response to receiving the user input, configuring the second device to be associated with the location.

In accordance with some embodiments, an electronic device is described. The electronic device comprises: a display; means for detecting an audio tone signal indicative of a pairing handshake with a second device, wherein the electronic device is connected to the second device via a communication link, and wherein the audio tone signal is out-of-band to the communication link; means for, in accordance with detecting the audio tone signal, initiating, on the electronic device, a configuration process for configuring the second device; means for, during the configuration process, displaying, on the display, a configuration user interface that includes a prompt to select a location; means for receiving user input selection of a location; and means for, responsive to receiving the user input, configuring the second device to be associated with the location.

In accordance with some embodiments, a transitory computer-readable storage medium is described. The transitory computer-readable storage medium stores one or more programs configured to be executed by one or more processors of an electronic device with a display, wherein the electronic device is a first device, the one or more programs including instructions for: detecting an audio tone signal indicative of a pairing handshake with a second device, wherein the first device is connected to the second device via a communication link, and wherein the audio tone signal is out-of-band to the communication link; in accordance with detecting the audio tone signal, initiating, on the first device, a configuration process for configuring the second device; during the configuration process, displaying, on the display, a configuration user interface that includes a prompt to select a location; receiving user input selection of a location; and in response to receiving the user input, configuring the second device to be associated with the location.

In accordance with some embodiments, a method is performed at a device. The method comprises: while outputting an audible signal from the device, detecting a user input voice command from a voice command source; in response to detecting the user input voice command, determining a spatial position of the voice command source relative to the device; and while continuing to output the audible signal, adjusting the output of the audible signal based on the spatial position of the voice command source.

In accordance with some embodiments, a non-transitory computer-readable storage medium is described. The non-transitory computer-readable storage medium stores one or more programs configured to be executed by one or more processors of an electronic device, the one or more programs including instructions for: while outputting an audible signal from the device, detecting a user input voice command from a voice command source; in response to detecting the user input voice command, determining a spatial position of the voice command source relative to the device; and while continuing to output the audible signal, adjusting the output of the audible signal based on the spatial position of the voice command source.

In accordance with some embodiments, an electronic device is described. The electronic device comprises: one or more processors; and memory storing one or more programs configured to be executed by the one or more processors, the one or more programs including instructions for: while outputting an audible signal from the device, detecting a user input voice command from a voice command source; in response to detecting the user input voice command, determining a spatial position of the voice command source relative to the device; and while continuing to output the audible signal, adjusting the output of the audible signal based on the spatial position of the voice command source.

In accordance with some embodiments, an electronic device is described. The electronic device comprises: means for, while outputting an audible signal from the device, detecting a user input voice command from a voice command source; means for, responsive to detecting the user input voice command, determining a spatial position of the voice command source relative to the device; and means for, while continuing to output the audible signal, adjusting the output of the audible signal based on the spatial position of the voice command source.

In accordance with some embodiments, a transitory computer-readable storage medium is described. The transitory computer-readable storage medium stores one or more programs configured to be executed by one or more processors of an electronic device, the one or more programs including instructions for: while outputting an audible signal from the device, detecting a user input voice command from a voice command source; in response to detecting the user input voice command, determining a spatial position of the voice command source relative to the device; and while continuing to output the audible signal, adjusting the output of the audible signal based on the spatial position of the voice command source.

In accordance with some embodiments, a method is performed at a first device associated with a first user account. The method comprises: detecting that a second device associated with a second user account is connected to the first device, wherein the first user account is associated with a first media preference profile; wherein the second user account is associated with a second media preference profile different than the first media preference profile; and initiating playback of media based on the first media preference profile and the second media preference profile.

In accordance with some embodiments, a non-transitory computer-readable storage medium is described. The non-transitory computer-readable storage medium stores one or more programs configured to be executed by one or more processors of an electronic device, wherein the electronic device is a first device associated with a first user account, wherein the first user account is associated with a first media preference profile, the one or more programs including instructions for: detecting that a second device associated with a second user account is connected to the first device, wherein the second user account is associated with a second media preference profile different than the first media preference profile; and initiating playback of media based on the first media preference profile and the second media preference profile.

In accordance with some embodiments, an electronic device is described. The electronic device comprises: one or more processors; and memory storing one or more programs configured to be executed by the one or more processors, the one or more programs including instructions for: detecting that a second device associated with a second user account is connected to the electronic device, wherein the electronic device is associated with a first user account, wherein the first user account is associated with a first media preference profile: wherein the second user account is associated with a second media preference profile different than the first media preference profile; and initiating playback of media based on the first media preference profile and the second media preference profile.

In accordance with some embodiments, an electronic device is described. The electronic device comprises: means for detecting that a second device associated with a second user account is connected to the electronic device, wherein the electronic device is associated with a first user account, wherein the first user account is associated with a first media preference profile: wherein the second user account is associated with a second media preference profile different than the first media preference profile; and means for initiating playback of media based on the first media preference profile and the second media preference profile.

In accordance with some embodiments, a transitory computer-readable storage medium is described. The transitory computer-readable storage medium stores one or more programs configured to be executed by one or more processors of an electronic device, wherein the electronic device is a first device associated with a first user account, wherein the first user account is associated with a first media preference profile, the one or more programs including instructions for: detecting that a second device associated with a second user account is connected to the first device, wherein the second user account is associated with a second media preference profile different than the first media preference profile; and initiating playback of media based on the first media preference profile and the second media preference profile.

In accordance with some embodiments, a method is performed at a first device. The method comprises: receiving a request, from a third device, to initiate media playback on at least one device of a set of devices, wherein the set of devices comprises the first device and a second device, wherein the third device is not a member of the set of devices, and wherein the third device is connected to the first device; in response to receiving the request: in accordance with a determination that the third device has permission to initiate media playback on the at least one device of set of devices, initiating media playback on the set of devices; and in accordance with a determination that the third device does not have permission to initiate media playback on the at least one device of set of devices: transmitting a request for permission to the second device; and in response to receiving permission from the second device, initiating media playback on the at least one device of the set of devices.

In accordance with some embodiments, a non-transitory computer-readable storage medium is described. The non-transitory computer-readable storage medium stores one or more programs configured to be executed by one or more processors of an electronic device, wherein the electronic device is a first device, the one or more programs including instructions for: receiving a request, from a third device, to initiate media playback on at least one device of a set of devices, wherein the set of devices comprises the first device and a second device, wherein the third device is not a member of the set of devices, and wherein the third device is connected to the first device; in response to receiving the request: in accordance with a determination that the third device has permission to initiate media playback on the at least one device of set of devices, initiating media playback on the set of devices; and in accordance with a determination that the third device does not have permission to initiate media playback on the at least one device of set of devices: transmitting a request for permission to the second device; and in response to receiving permission from the second device, initiating media playback on the at least one device of the set of devices.

In accordance with some embodiments, an electronic device is described. The electronic device comprises: one or more processors; and memory storing one or more programs configured to be executed by the one or more processors, the one or more programs including instructions for: receiving a request, from a third device, to initiate media playback on at least one device of a set of devices, wherein the set of devices comprises the electronic device and a second device, wherein the third device is not a member of the set of devices, and wherein the third device is connected to the electronic device; in response to receiving the request: in accordance with a determination that the third device has permission to initiate media playback on the at least one device of set of devices, initiating media playback on the set of devices; and in accordance with a determination that the third device does not have permission to initiate media playback on the at least one device of set of devices: transmitting a request for permission to the second device; and in response to receiving permission from the second device, initiating media playback on the at least one device of the set of devices.

In accordance with some embodiments, an electronic device is described. The electronic device comprises: means for receiving a request, from a third device, to initiate media playback on at least one device of a set of devices, wherein the set of devices comprises the electronic device and a second device, wherein the third device is not a member of the set of devices, and wherein the third device is connected to the electronic device; means for, responsive to receiving the request: in accordance with a determination that the third device has permission to initiate media playback on the at least one device of set of devices, initiating media playback on the set of devices; and in accordance with a determination that the third device does not have permission to initiate media playback on the at least one device of set of devices: transmitting a request for permission to the second device; and in response to receiving permission from the second device, initiating media playback on the at least one device of the set of devices.

In accordance with some embodiments, a transitory computer-readable storage medium is described. The transitory computer-readable storage medium stores one or more programs configured to be executed by one or more processors of an electronic device, wherein the electronic device is a first device, the one or more programs including instructions for: receiving a request, from a third device, to initiate media playback on at least one device of a set of devices, wherein the set of devices comprises the first device and a second device, wherein the third device is not a member of the set of devices, and wherein the third device is connected to the first device; in response to receiving the request: in accordance with a determination that the third device has permission to initiate media playback on the at least one device of set of devices, initiating media playback on the set of devices; and in accordance with a determination that the third device does not have permission to initiate media playback on the at least one device of set of devices: transmitting a request for permission to the second device; and in response to receiving permission from the second device, initiating media playback on the at least one device of the set of devices.

In accordance with some embodiments, a method is performed at a first device associated with a user account. The method comprises: receiving user input representing a request to access data from the user account; in response to receiving the user input, determining whether a physical positioning of the first device and a second device associated with the user account satisfies a permissive condition; in accordance with a determination that the physical positioning satisfies the permissive condition, providing the data from the user account through the first device; and in accordance with a determination that the physical positioning does not satisfy the permissive condition, forgoing providing the data from the user account through the first device.

In accordance with some embodiments, a non-transitory computer-readable storage medium is described. The non-transitory computer-readable storage medium stores one or more programs configured to be executed by one or more processors of an electronic device, wherein the electronic device is a first electronic device associated with a user account, the one or more programs including instructions for: receiving user input representing a request to access data from the user account; in response to receiving the user input, determining whether a physical positioning of the electronic device and a second device associated with the user account satisfies a permissive condition; in accordance with a determination that the physical positioning satisfies the permissive condition, providing the data from the user account through the electronic device; and in accordance with a determination that the physical positioning does not satisfy the permissive condition, forgoing providing the data from the user account through the electronic device.

In accordance with some embodiments, an electronic device is described. The electronic device comprises: one or more processors; and memory storing one or more programs configured to be executed by the one or more processors, the one or more programs including instructions for: receiving user input representing a request to access data from a user account, wherein the electronic device is associated with the user account; in response to receiving the user input, determining whether a physical positioning of the electronic device and a second device associated with the user account satisfies a permissive condition; in accordance with a determination that the physical positioning satisfies the permissive condition, providing the data from the user account through the electronic device; and in accordance with a determination that the physical positioning does not satisfy the permissive condition, forgoing providing the data from the user account through the electronic device.

In accordance with some embodiments, an electronic device is described. The electronic device comprises: means for receiving user input representing a request to access data from a user account, wherein the electronic device is associated with the user account; means for, responsive to receiving the user input, determining whether a physical positioning of the electronic device and a second device associated with the user account satisfies a permissive condition; means for, in accordance with a determination that the physical positioning satisfies the permissive condition, providing the data from the user account through the electronic device; and means for, in accordance with a determination that the physical positioning does not satisfy the permissive condition, forgoing providing the data from the user account through the electronic device.

In accordance with some embodiments, a transitory computer-readable storage medium is described. The transitory computer-readable storage medium stores one or more programs configured to be executed by one or more processors of an electronic device, wherein the electronic device is a first electronic device associated with a user account, the one or more programs including instructions for: receiving user input representing a request to access data from the user account; in response to receiving the user input, determining whether a physical positioning of the electronic device and a second device associated with the user account satisfies a permissive condition; in accordance with a determination that the physical positioning satisfies the permissive condition, providing the data from the user account through the electronic device; and in accordance with a determination that the physical positioning does not satisfy the permissive condition, forgoing providing the data from the user account through the electronic device.

In accordance with some embodiments, a method is performed at a first device. The method comprises: receiving a command to initiate playback of media on a set of devices comprising the first device and a second device; in response to receiving the command, initiating synchronized playback of the media on the set of devices, wherein the second device is designated as a primary device configured to coordinate the playback of the media on the set of devices, and wherein the first device is configured to be a designated heir to the primary device.

In accordance with some embodiments, a non-transitory computer-readable storage medium is described. The non-transitory computer-readable storage medium stores one or more programs configured to be executed by one or more processors of an electronic device, wherein the electronic device is a first device, the one or more programs including instructions for: receiving a command to initiate playback of media on a set of devices comprising the first device and a second device; in response to receiving the command, initiating synchronized playback of the media on the set of devices, wherein the second device is designated as a primary device configured to coordinate the playback of the media on the set of devices, and wherein the first device is configured to be a designated heir to the primary device.

In accordance with some embodiments, an electronic device is described. The electronic device comprises: one or more processors; and memory storing one or more programs configured to be executed by the one or more processors, the one or more programs including instructions for: receiving a command to initiate playback of media on a set of devices comprising the electronic device and a second device; in response to receiving the command, initiating synchronized playback of the media on the set of devices, wherein the second device is designated as a primary device configured to coordinate the playback of the media on the set of devices, and wherein the electronic device is configured to be a designated heir to the primary device.

In accordance with some embodiments, an electronic device is described. The electronic device comprises: means for receiving a command to initiate playback of media on a set of devices comprising the electronic device and a second device; means for, responsive to receiving the command, initiating synchronized playback of the media on the set of devices, wherein the second device is designated as a primary device configured to coordinate the playback of the media on the set of devices, and wherein the electronic device is configured to be a designated heir to the primary device.

In accordance with some embodiments, a transitory computer-readable storage medium is described. The transitory computer-readable storage medium stores one or more programs configured to be executed by one or more processors of an electronic device, wherein the electronic device is a first device, the one or more programs including instructions for: receiving a command to initiate playback of media on a set of devices comprising the first device and a second device; in response to receiving the command, initiating synchronized playback of the media on the set of devices, wherein the second device is designated as a primary device configured to coordinate the playback of the media on the set of devices, and wherein the first device is configured to be a designated heir to the primary device.

In accordance with some embodiments, a method is performed at a first device of a set of devices associated with a first user account. The method comprises: receiving an audible output trigger event; determining that a first user, associated with the first user account, is located within an audible output range of a device of the set of devices; in accordance with a determination that the first user is within the audible output range of the first device, and in accordance with an occurrence of the audible output trigger event, outputting an audible output; and in accordance with a determination that the first user is within the audible output range of a second device, and in accordance with an occurrence of the audible output trigger event, forgoing outputting the audible output.

In accordance with some embodiments, a non-transitory computer-readable storage medium is described. The non-transitory computer-readable storage medium stores one or more programs configured to be executed by one or more processors of an electronic device, wherein the electronic device is a first device of a set of devices associated with a first user account, the one or more programs including instructions for: receiving an audible output trigger event; determining that a first user, associated with the first user account, is located within an audible output range of a device of the set of devices; in accordance with a determination that the first user is within the audible output range of the first device, and in accordance with an occurrence of the audible output trigger event, outputting an audible output; and in accordance with a determination that the first user is within the audible output range of a second device, and in accordance with an occurrence of the audible output trigger event, forgoing outputting the audible output.

In accordance with some embodiments, an electronic device is described. The electronic device comprises: one or more processors; and memory storing one or more programs configured to be executed by the one or more processors, the one or more programs including instructions for: receiving an audible output trigger event; determining that a first user, associated with a first user account, is located within an audible output range of a device of a set of devices associated with the first user account, wherein the electronic device is a first device of the set of devices; in accordance with a determination that the first user is within the audible output range of the first device, and in accordance with an occurrence of the audible output trigger event, outputting an audible output; and in accordance with a determination that the first user is within the audible output range of a second device, and in accordance with an occurrence of the audible output trigger event, forgoing outputting the audible output.

In accordance with some embodiments, an electronic device is described. The electronic device comprises: means for receiving an audible output trigger event; means for determining that a first user, associated with a first user account, is located within an audible output range of a device of a set of devices associated with the first user account, wherein the electronic device is a first device of the set of devices; means for, in accordance with a determination that the first user is within the audible output range of the first device, and in accordance with an occurrence of the audible output trigger event, outputting an audible output; and means for, in accordance with a determination that the first user is within the audible output range of a second device, and in accordance with an occurrence of the audible output trigger event, forgoing outputting the audible output.

In accordance with some embodiments, a transitory computer-readable storage medium is described. The transitory computer-readable storage medium stores one or more programs configured to be executed by one or more processors of an electronic device, wherein the electronic device is a first device of a set of devices associated with a first user account, the one or more programs including instructions for: receiving an audible output trigger event; determining that a first user, associated with the first user account, is located within an audible output range of a device of the set of devices; in accordance with a determination that the first user is within the audible output range of the first device, and in accordance with an occurrence of the audible output trigger event, outputting an audible output; and in accordance with a determination that the first user is within the audible output range of a second device, and in accordance with an occurrence of the audible output trigger event, forgoing outputting the audible output.

In accordance with some embodiments, a method is performed at a first device. The method comprises: receiving a user input voice command representing a request to output a signal representative of media currently being played back by a second device that is connected to the first device; in response to receiving the user input, transmitting a request for information regarding the media currently being played back by the second device; receiving the information regarding the media currently being played back by the second device; and in accordance with receiving the information regarding the media currently being played back by the second device, and while the second device continues playback of at least one component of the media, initiating output of at least one component of the signal representative of the media currently being played back by the second device.

In accordance with some embodiments, a non-transitory computer-readable storage medium is described. The non-transitory computer-readable storage medium stores one or more programs configured to be executed by one or more processors of an electronic device, wherein the electronic device is a first device, the one or more programs including instructions for: receiving a user input voice command representing a request to output a signal representative of media currently being played back by a second device that is connected to the first device; in response to receiving the user input, transmitting a request for information regarding the media currently being played back by the second device; receiving the information regarding the media currently being played back by the second device; and in accordance with receiving the information regarding the media currently being played back by the second device, and while the second device continues playback of at least one component of the media, initiating output of at least one component of the signal representative of the media currently being played back by the second device.

In accordance with some embodiments, an electronic device is described. The electronic device comprises: one or more processors; and memory storing one or more programs configured to be executed by the one or more processors, the one or more programs including instructions for: receiving a user input voice command representing a request to output a signal representative of media currently being played back by a second device that is connected to the electronic device; in response to receiving the user input, transmitting a request for information regarding the media currently being played back by the second device; receiving the information regarding the media currently being played back by the second device; and in accordance with receiving the information regarding the media currently being played back by the second device, and while the second device continues playback of at least one component of the media, initiating output of at least one component of the signal representative of the media currently being played back by the second device.

In accordance with some embodiments, an electronic device is described. The electronic device comprises: means for receiving a user input voice command representing a request to output a signal representative of media currently being played back by a second device that is connected to the electronic device; means for, responsive to receiving the user input, transmitting a request for information regarding the media currently being played back by the second device; means for receiving the information regarding the media currently being played back by the second device; and means for, in accordance with receiving the information regarding the media currently being played back by the second device, and while the second device continues playback of at least one component of the media, initiating output of at least one component of the signal representative of the media currently being played back by the second device.

In accordance with some embodiments, a transitory computer-readable storage medium is described. The transitory computer-readable storage medium stores one or more programs configured to be executed by one or more processors of an electronic device, wherein the electronic device is a first device, the one or more programs including instructions for: receiving a user input voice command representing a request to output a signal representative of media currently being played back by a second device that is connected to the first device; in response to receiving the user input, transmitting a request for information regarding the media currently being played back by the second device; receiving the information regarding the media currently being played back by the second device; and in accordance with receiving the information regarding the media currently being played back by the second device, and while the second device continues playback of at least one component of the media, initiating output of at least one component of the signal representative of the media currently being played back by the second device.

In accordance with some embodiments, a method is performed at a first device. The method comprises: receiving a request to initiate media playback on a set of devices that does not include the first device; in response to receiving the request, and while the first device is coordinating media playback, determining whether the set of devices includes a device configured to coordinate media playback; in accordance with a determination that the set of devices includes a device configured to coordinate media playback, transferring a media playback coordination task from the first device to the device configured to coordinate media playback; and in accordance with a determination that the set of devices does not include a device configured to coordinate media playback, forgoing transferring the media playback coordination task.

In accordance with some embodiments, a non-transitory computer-readable storage medium is described. The non-transitory computer-readable storage medium stores one or more programs configured to be executed by one or more processors of an electronic device, wherein the electronic device is a first device, the one or more programs including instructions for: receiving a request to initiate media playback on a set of devices that does not include the first device; in response to receiving the request, and while the first device is coordinating media playback, determining whether the set of devices includes a device configured to coordinate media playback; in accordance with a determination that the set of devices includes a device configured to coordinate media playback, transferring a media playback coordination task from the first device to the device configured to coordinate media playback; and in accordance with a determination that the set of devices does not include a device configured to coordinate media playback, forgoing transferring the media playback coordination task.

In accordance with some embodiments, an electronic device is described. The electronic device comprises: one or more processors; and memory storing one or more programs configured to be executed by the one or more processors, the one or more programs including instructions for: receiving a request to initiate media playback on a set of devices that does not include the electronic device; in response to receiving the request, and while the electronic device is coordinating media playback, determining whether the set of devices includes a device configured to coordinate media playback; in accordance with a determination that the set of devices includes a device configured to coordinate media playback, transferring a media playback coordination task from the electronic device to the device configured to coordinate media playback; and in accordance with a determination that the set of devices does not include a device configured to coordinate media playback, forgoing transferring the media playback coordination task.

In accordance with some embodiments, an electronic device is described. The electronic device comprises: means for receiving a request to initiate media playback on a set of devices that does not include the electronic device; means for, responsive to receiving the request, and while the electronic device is coordinating media playback, determining whether the set of devices includes a device configured to coordinate media playback; means for, in accordance with a determination that the set of devices includes a device configured to coordinate media playback, transferring a media playback coordination task from the electronic device to the device configured to coordinate media playback; and means for, in accordance with a determination that the set of devices does not include a device configured to coordinate media playback, forgoing transferring the media playback coordination task.

In accordance with some embodiments, a transitory computer-readable storage medium is described. The transitory computer-readable storage medium stores one or more programs configured to be executed by one or more processors of an electronic device, wherein the electronic device is a first device, the one or more programs including instructions for: receiving a request to initiate media playback on a set of devices that does not include the first device; in response to receiving the request, and while the first device is coordinating media playback, determining whether the set of devices includes a device configured to coordinate media playback; in accordance with a determination that the set of devices includes a device configured to coordinate media playback, transferring a media playback coordination task from the first device to the device configured to coordinate media playback; and in accordance with a determination that the set of devices does not include a device configured to coordinate media playback, forgoing transferring the media playback coordination task.

In accordance with some embodiments, a method is performed at a device. The method comprises: receiving a request to initiate media playback on a set of devices connected to the device; in response to receiving the request, and while the device is coordinating media playback, determining, for each device of a plurality of devices configured to coordinate media playback and connected to the set of devices, one or more device characteristics; selecting, based at least in part on the one or more characteristics of each device of the plurality of devices configured to coordinate media playback, a primary device from among the plurality of devices configured to coordinate media playback; and transferring a media playback coordination task from the device to the primary device configured to coordinate media playback.

In accordance with some embodiments, a non-transitory computer-readable storage medium is described. The non-transitory computer-readable storage medium stores one or more programs configured to be executed by one or more processors of an electronic device, the one or more programs including instructions for: receiving a request to initiate media playback on a set of devices connected to the device; in response to receiving the request, and while the device is coordinating media playback, determining, for each device of a plurality of devices configured to coordinate media playback and connected to the set of devices, one or more device characteristics; selecting, based at least in part on the one or more characteristics of each device of the plurality of devices configured to coordinate media playback, a primary device from among the plurality of devices configured to coordinate media playback; and transferring a media playback coordination task from the device to the primary device configured to coordinate media playback.

In accordance with some embodiments, an electronic device is described. The electronic device comprises: one or more processors; and memory storing one or more programs configured to be executed by the one or more processors, the one or more programs including instructions for: receiving a request to initiate media playback on a set of devices connected to the device; in response to receiving the request, and while the device is coordinating media playback, determining, for each device of a plurality of devices configured to coordinate media playback and connected to the set of devices, one or more device characteristics; selecting, based at least in part on the one or more characteristics of each device of the plurality of devices configured to coordinate media playback, a primary device from among the plurality of devices configured to coordinate media playback; and transferring a media playback coordination task from the device to the primary device configured to coordinate media playback.

In accordance with some embodiments, an electronic device is described. The electronic device comprises: means for receiving a request to initiate media playback on a set of devices connected to the device; means for, responsive to receiving the request, and while the device is coordinating media playback, determining, for each device of a plurality of devices configured to coordinate media playback and connected to the set of devices, one or more device characteristics; means for selecting, based at least in part on the one or more characteristics of each device of the plurality of devices configured to coordinate media playback, a primary device from among the plurality of devices configured to coordinate media playback; and means for transferring a media playback coordination task from the device to the primary device configured to coordinate media playback.

In accordance with some embodiments, a transitory computer-readable storage medium is described. The transitory computer-readable storage medium stores one or more programs configured to be executed by one or more processors of an electronic device, the one or more programs including instructions for: receiving a request to initiate media playback on a set of devices connected to the device; in response to receiving the request, and while the device is coordinating media playback, determining, for each device of a plurality of devices configured to coordinate media playback and connected to the set of devices, one or more device characteristics; selecting, based at least in part on the one or more characteristics of each device of the plurality of devices configured to coordinate media playback, a primary device from among the plurality of devices configured to coordinate media playback; and transferring a media playback coordination task from the device to the primary device configured to coordinate media playback.

In accordance with some embodiments, a method is performed at a first device with a display. The method comprises: establishing a communication link with a second device; subsequent to establishing the communication link with the second device, initiating a configuration process for configuring the second device; during the configuration process: displaying, on the display, a configuration user interface that includes a prompt to select a location; receiving user input selection of a location; and in response to receiving the user input, configuring the second device to be associated with the location; detecting an audio tone signal indicative of a pairing handshake with the second device, wherein the audio tone signal is out-of-band to the communication link; and in accordance with detecting the audio tone signal, proceeding to a next step in the configuration process for configuring the second device.

In accordance with some embodiments, a non-transitory computer-readable storage medium is described. The non-transitory computer-readable storage medium stores one or more programs configured to be executed by one or more processors of an electronic device with a display, wherein the electronic device is a first device, the one or more programs including instructions for: establishing a communication link with a second device; subsequent to establishing the communication link with the second device, initiating a configuration process for configuring the second device; during the configuration process: displaying, on the display, a configuration user interface that includes a prompt to select a location; receiving user input selection of a location; and in response to receiving the user input, configuring the second device to be associated with the location; detecting an audio tone signal indicative of a pairing handshake with the second device, wherein the audio tone signal is out-of-band to the communication link; and in accordance with detecting the audio tone signal, proceeding to a next step in the configuration process for configuring the second device.

In accordance with some embodiments, an electronic device is described. The electronic device comprises: a display; one or more processors; and memory storing one or more programs configured to be executed by the one or more processors, the one or more programs including instructions for: establishing a communication link with a second device; subsequent to establishing the communication link with the second device, initiating a configuration process for configuring the second device; during the configuration process: displaying, on the display, a configuration user interface that includes a prompt to select a location; receiving user input selection of a location; and in response to receiving the user input, configuring the second device to be associated with the location; detecting an audio tone signal indicative of a pairing handshake with the second device, wherein the audio tone signal is out-of-band to the communication link; and in accordance with detecting the audio tone signal, proceeding to a next step in the configuration process for configuring the second device.

In accordance with some embodiments, an electronic device is described. The electronic device comprises: a display; means for establishing a communication link with a second device; subsequent to establishing the communication link with the second device, means for initiating a configuration process for configuring the second device; during the configuration process: means for displaying, on the display, a configuration user interface that includes a prompt to select a location; means for receiving user input selection of a location; and means for, responsive to receiving the user input, configuring the second device to be associated with the location; means for detecting an audio tone signal indicative of a pairing handshake with the second device, wherein the audio tone signal is out-of-band to the communication link; and in accordance with detecting the audio tone signal, means for proceeding to a next step in the configuration process for configuring the second device.

In accordance with some embodiments, a transitory computer-readable storage medium is described. The transitory computer-readable storage medium stores one or more programs configured to be executed by one or more processors of an electronic device with a display, the one or more programs including instructions for: establishing a communication link with a second device; subsequent to establishing the communication link with the second device, initiating a configuration process for configuring the second device; during the configuration process: displaying, on the display, a configuration user interface that includes a prompt to select a location; receiving user input selection of a location; and in response to receiving the user input, configuring the second device to be associated with the location; detecting an audio tone signal indicative of a pairing handshake with the second device, wherein the audio tone signal is out-of-band to the communication link; and in accordance with detecting the audio tone signal, proceeding to a next step in the configuration process for configuring the second device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing media playback devices, thereby increasing the effectiveness, efficiency, and user satisfaction with such devices. Such methods and interfaces may complement or replace other methods for managing media playback devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7D is a flow diagram illustrating a process for playing back media in accordance with some embodiments.

FIGS. 13A-13F is a flow diagram illustrating a process for viewing media information in accordance with some embodiments.

FIGS. 15A-15C is a flow diagram illustrating a process for controlling an electronic device in accordance with some embodiments.

FIGS. 20A-20C is a flow diagram illustrating a process for configuring an electronic device in accordance with some embodiments.

FIGS. 26A-26B is a flow diagram illustrating a process for playing back media in accordance with some embodiments.

FIGS. 28A-28C is a flow diagram illustrating a process for providing access to an electronic device in accordance with some embodiments.

FIGS. 36A-36C is a flow diagram illustrating a process for managing media playback in accordance with some embodiments.

FIGS. 37A-37D illustrate exemplary techniques and user interfaces for controlling media playback in accordance with some embodiments.

FIGS. 38A-38B is a flow diagram illustrating a process for managing media playback in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing media playback devices. For example, methods and techniques for transferring playback between devices are described below. Such techniques can reduce the cognitive burden on a user who accesses event notifications, thereby enhancing productivity. Further, such techniques can reduce processor and battery power otherwise wasted on redundant user inputs.

Figure 8A:
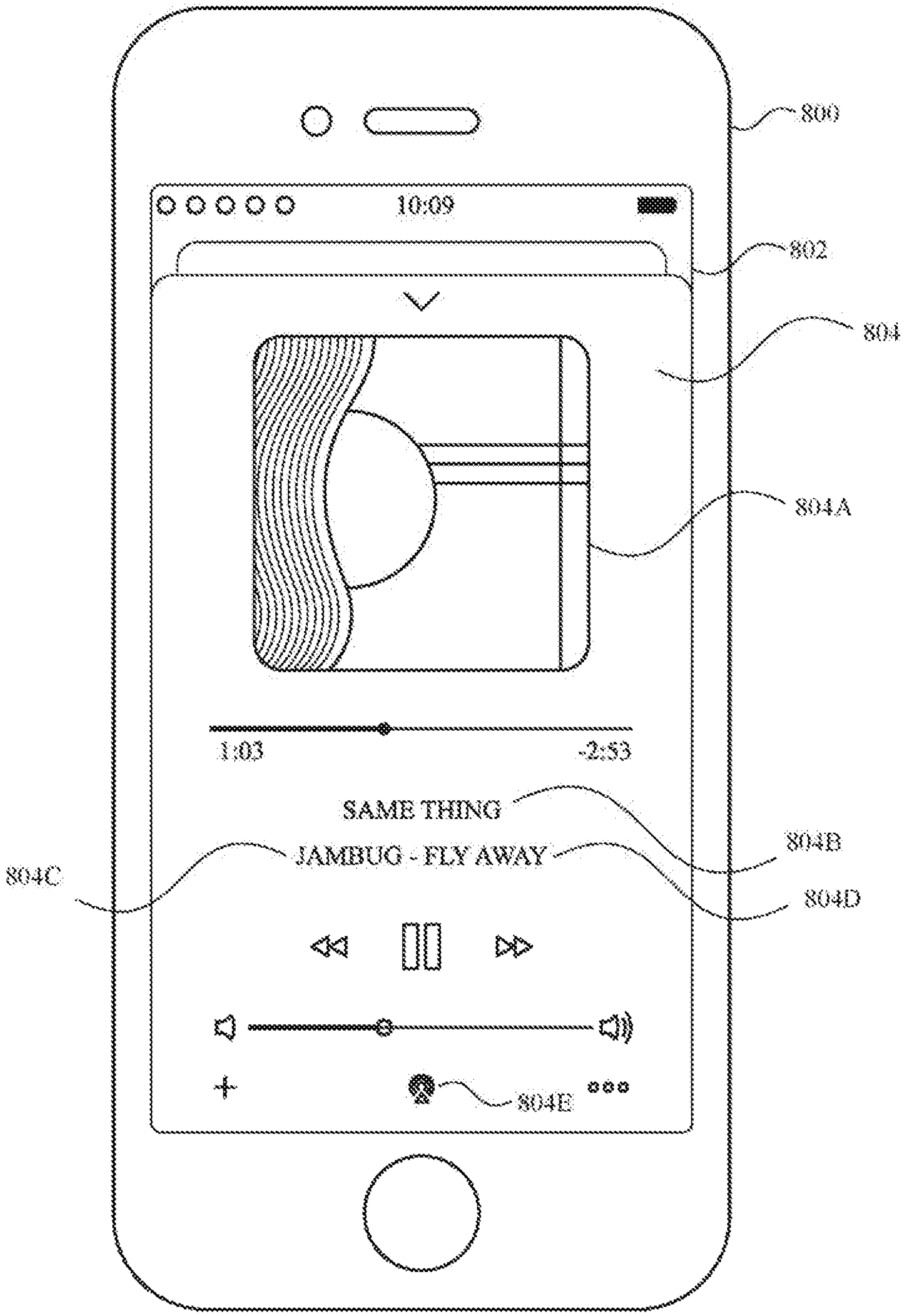
FIGS. 8A-8P illustrate exemplary techniques and user interfaces for playing back media in accordance with some embodiments.
Figure 9A:
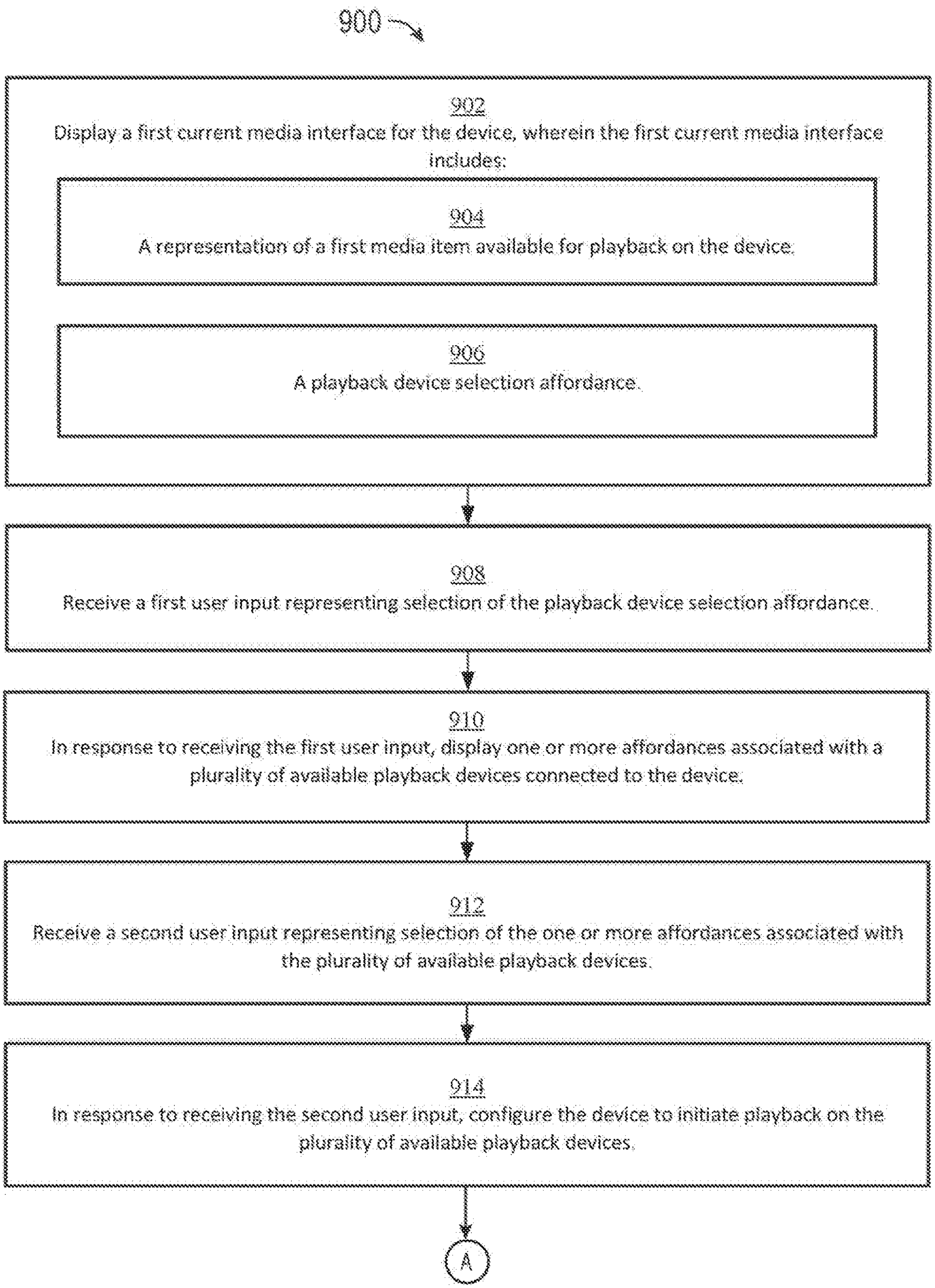
FIGS. 9A-9C is a flow diagram illustrating a process for playing back media in accordance with some embodiments.
Figure 9B:
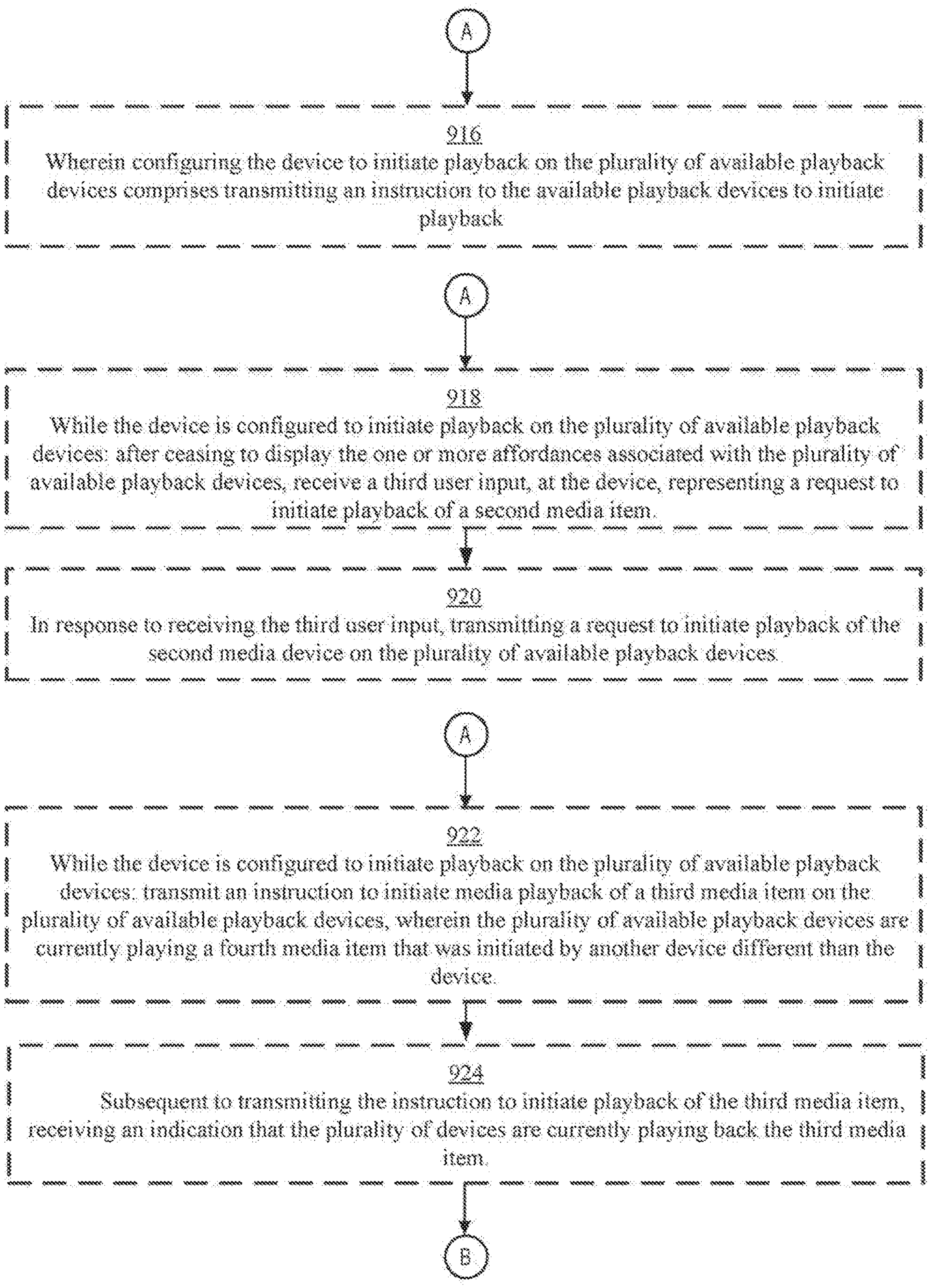
Figure 9C:
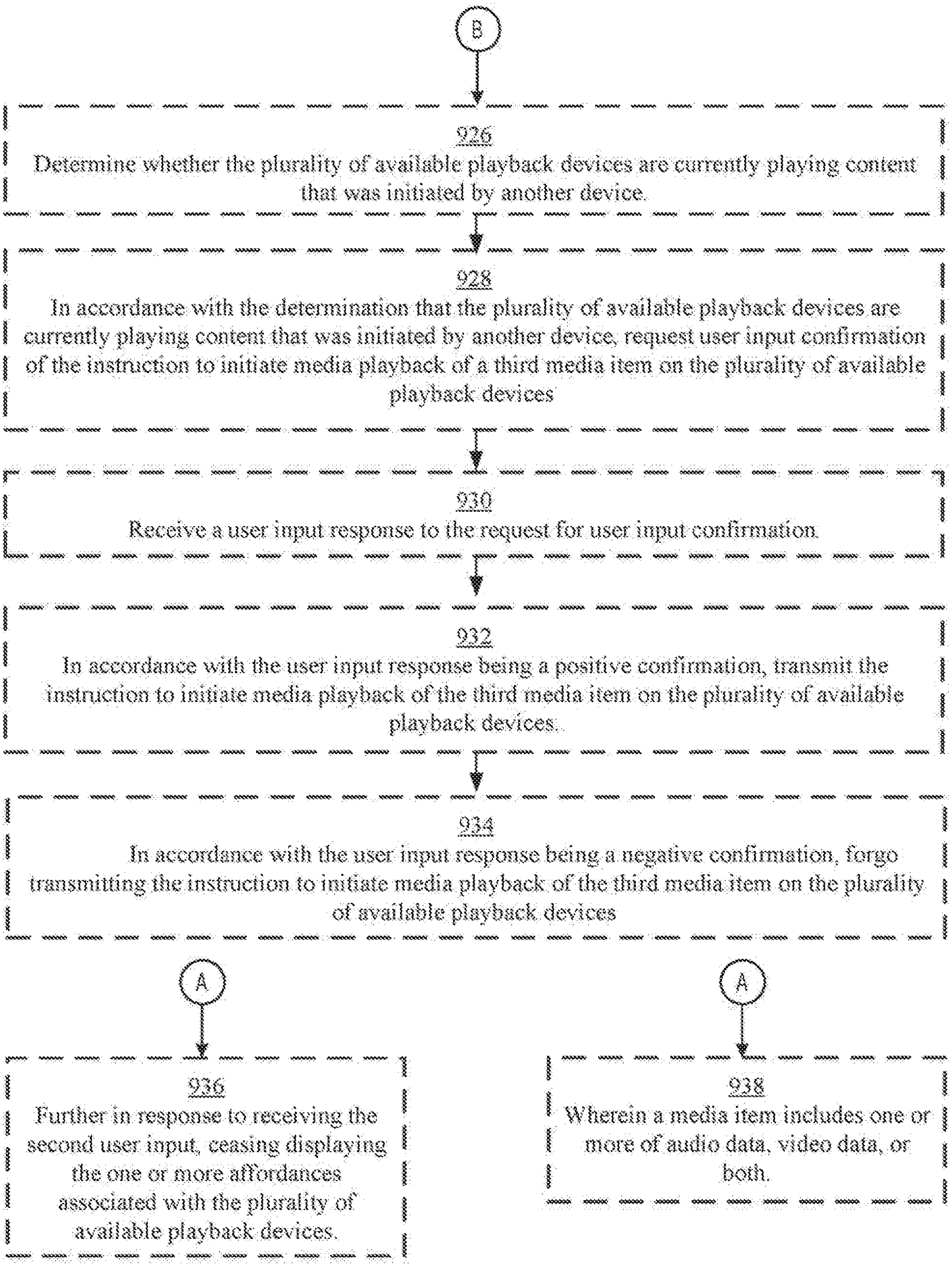
Figure 10A:
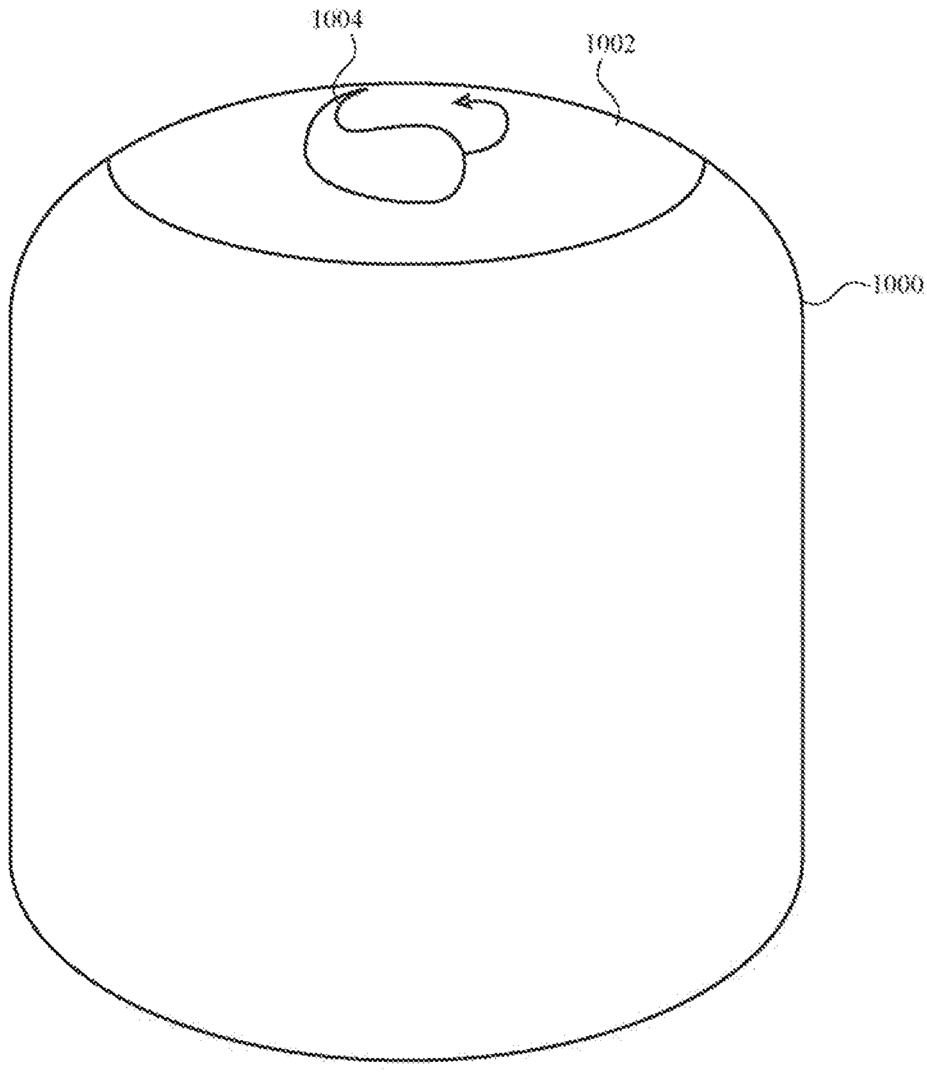
FIGS. 10A-10O illustrate exemplary techniques and user interfaces for in accordance with some embodiments.
Figure 10B:
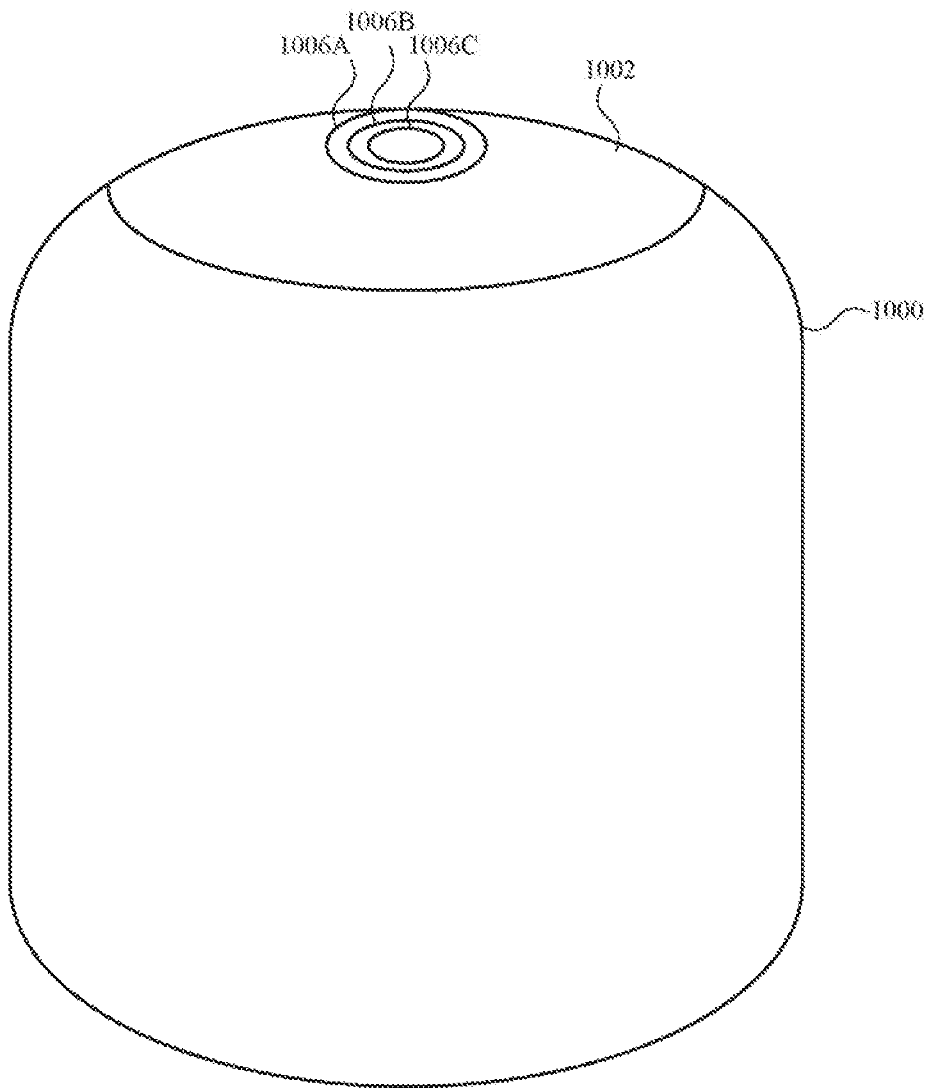
Figure 12A:
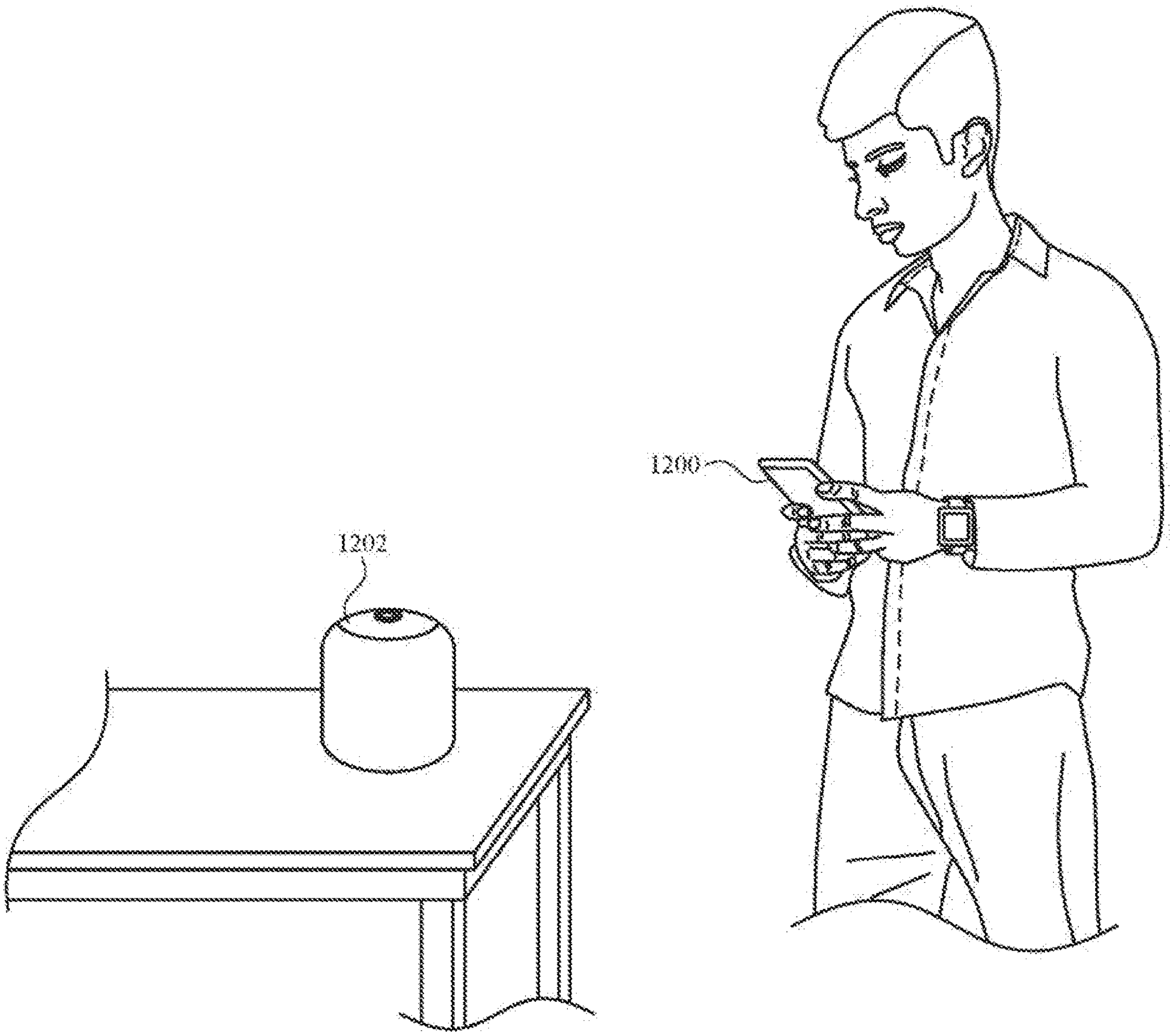
FIGS. 12A-12AM illustrate exemplary techniques and user interfaces for viewing media information in accordance with some embodiments.
Figure 14A:
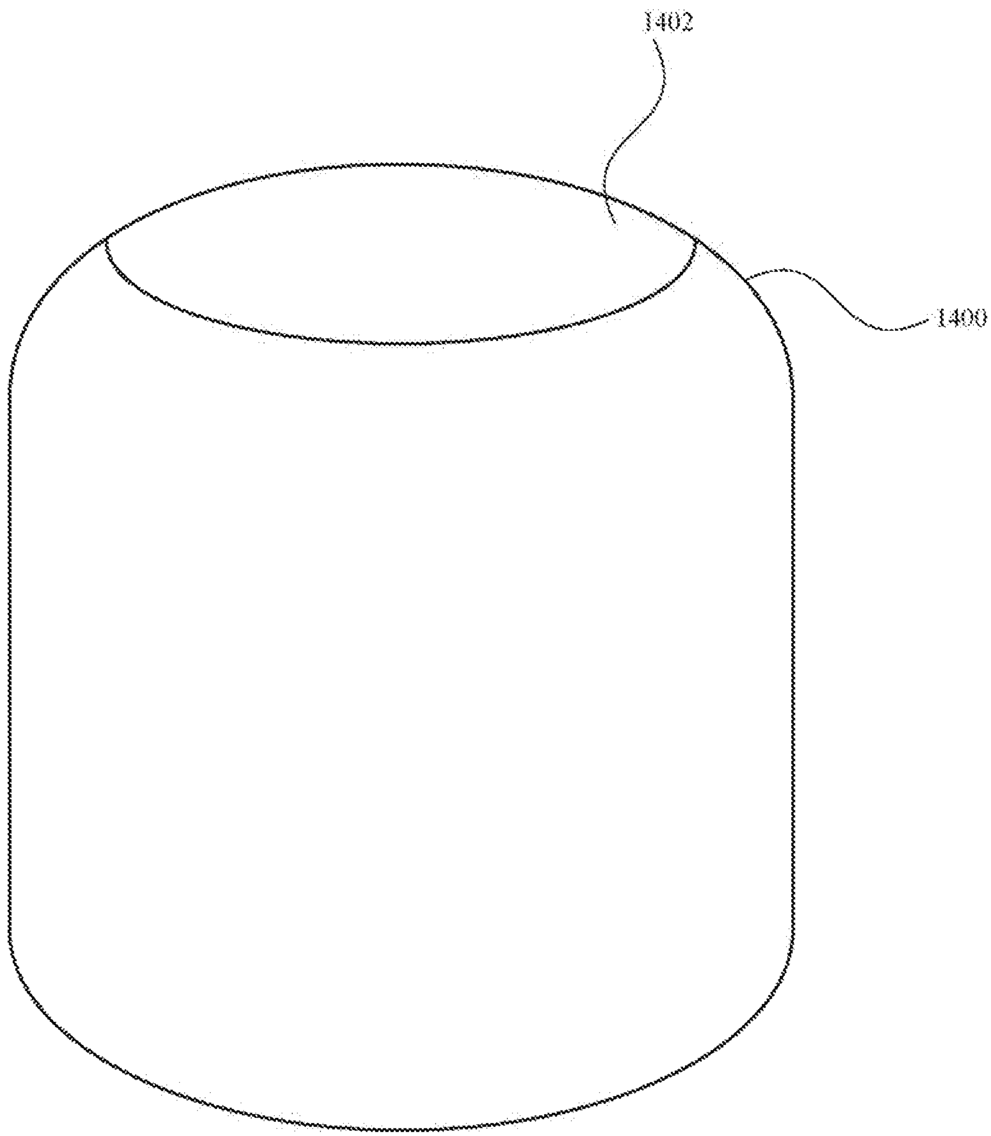
FIGS. 14A-14T illustrate exemplary techniques and user interfaces for controlling an electronic device in accordance with some embodiments.
Figure 15A:
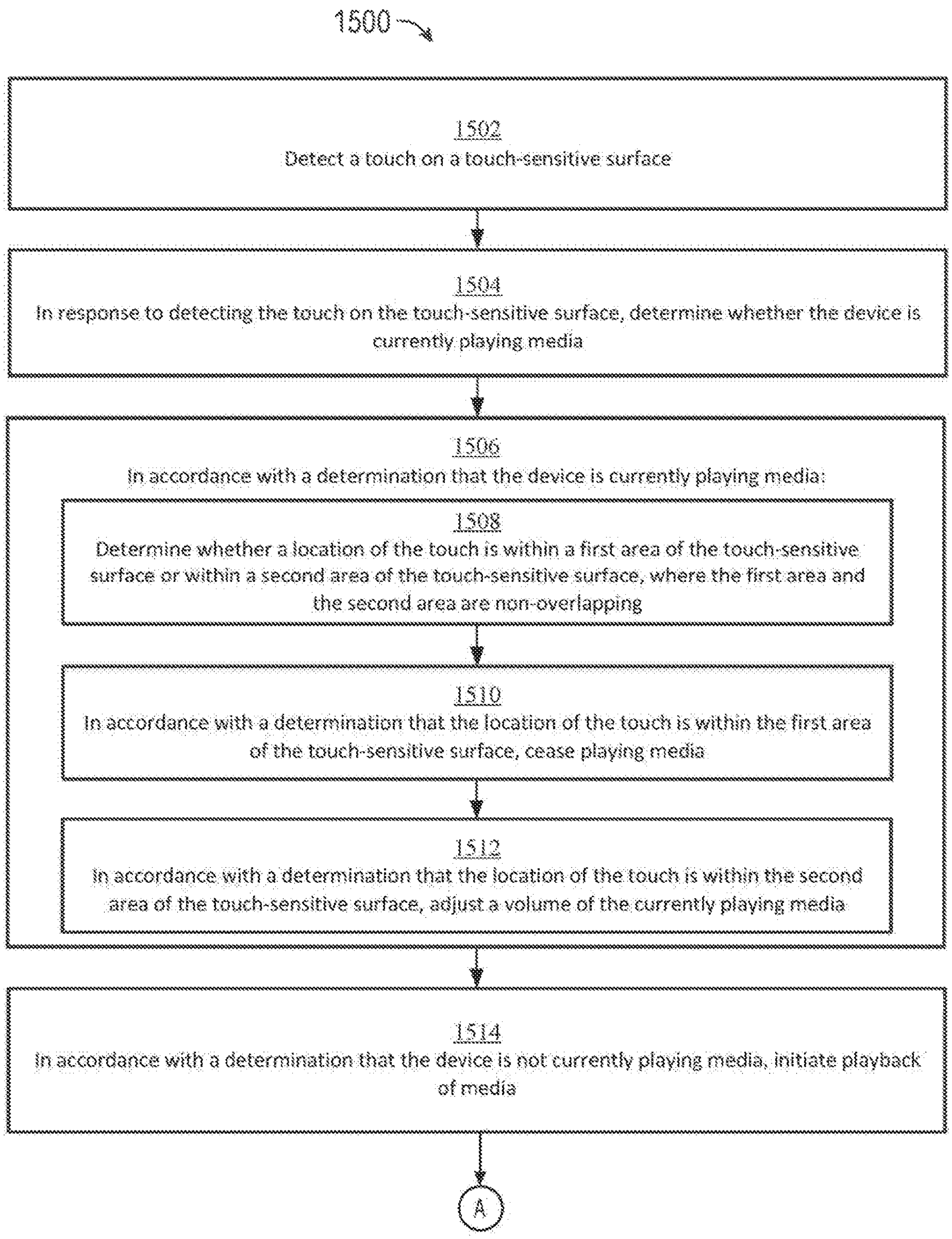
Figure 15C:
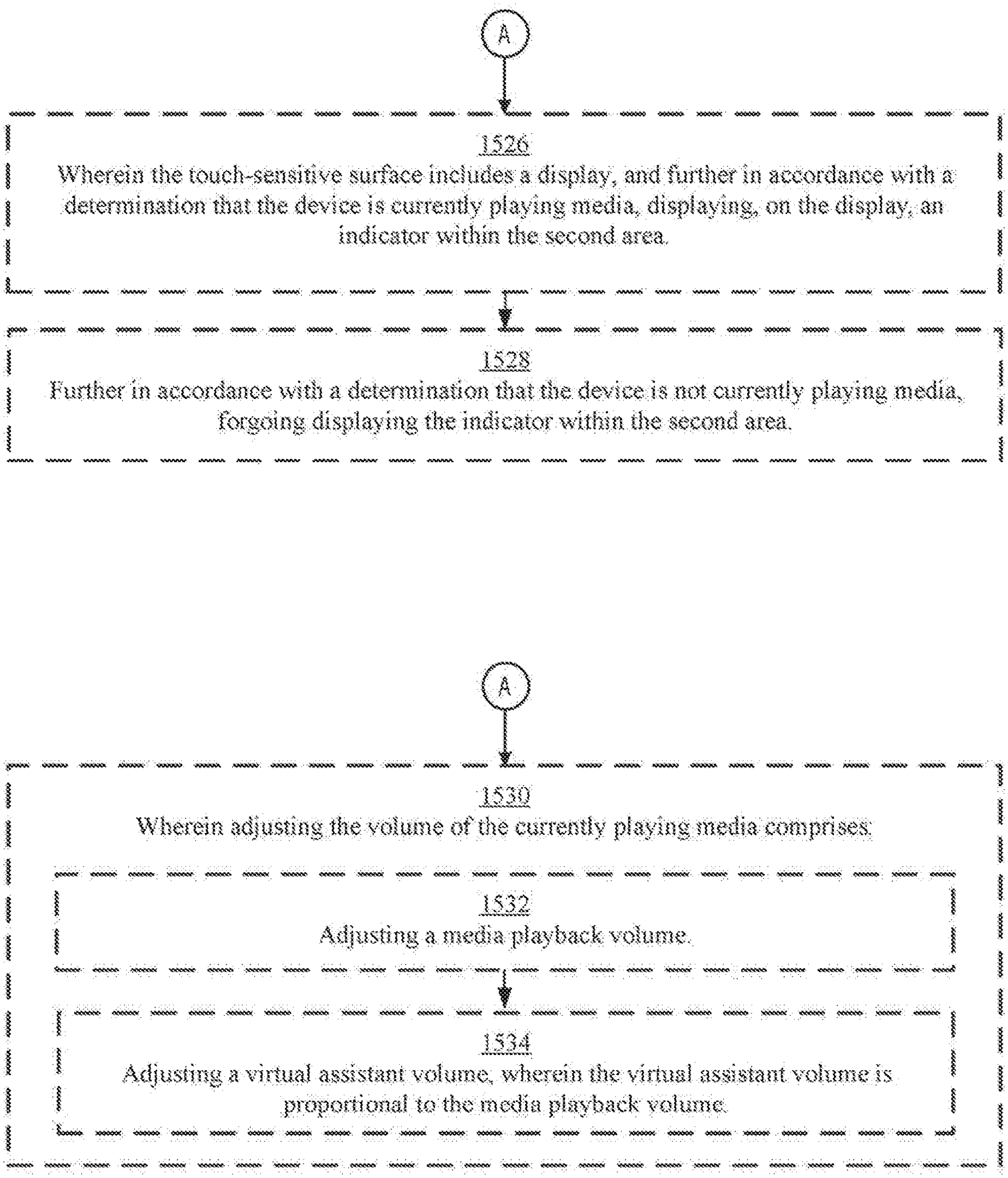
Figure 16A:
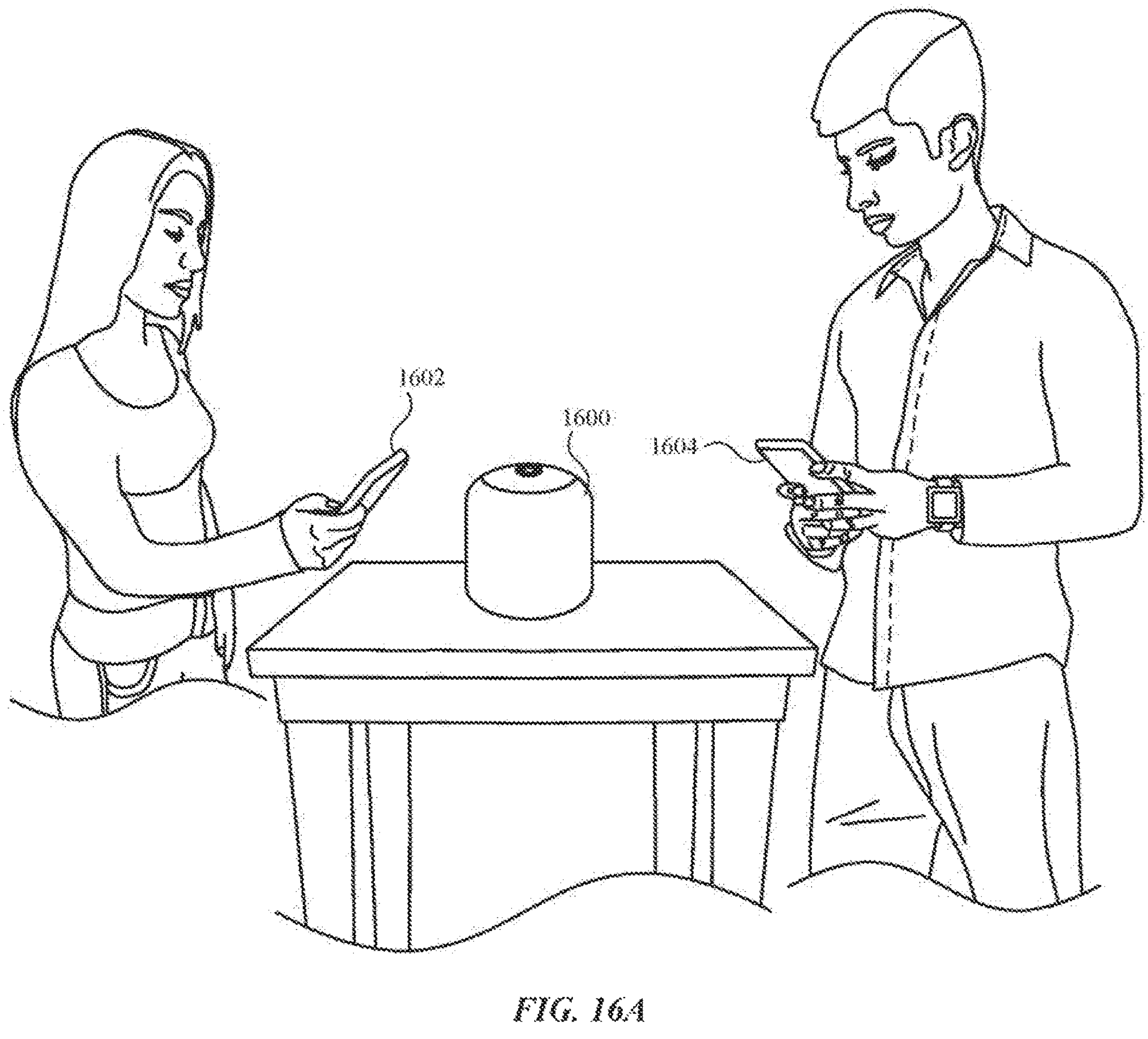
FIGS. 16A-16P illustrate exemplary techniques and user interfaces for managing a playback queue in accordance with some embodiments.
Figure 16B:
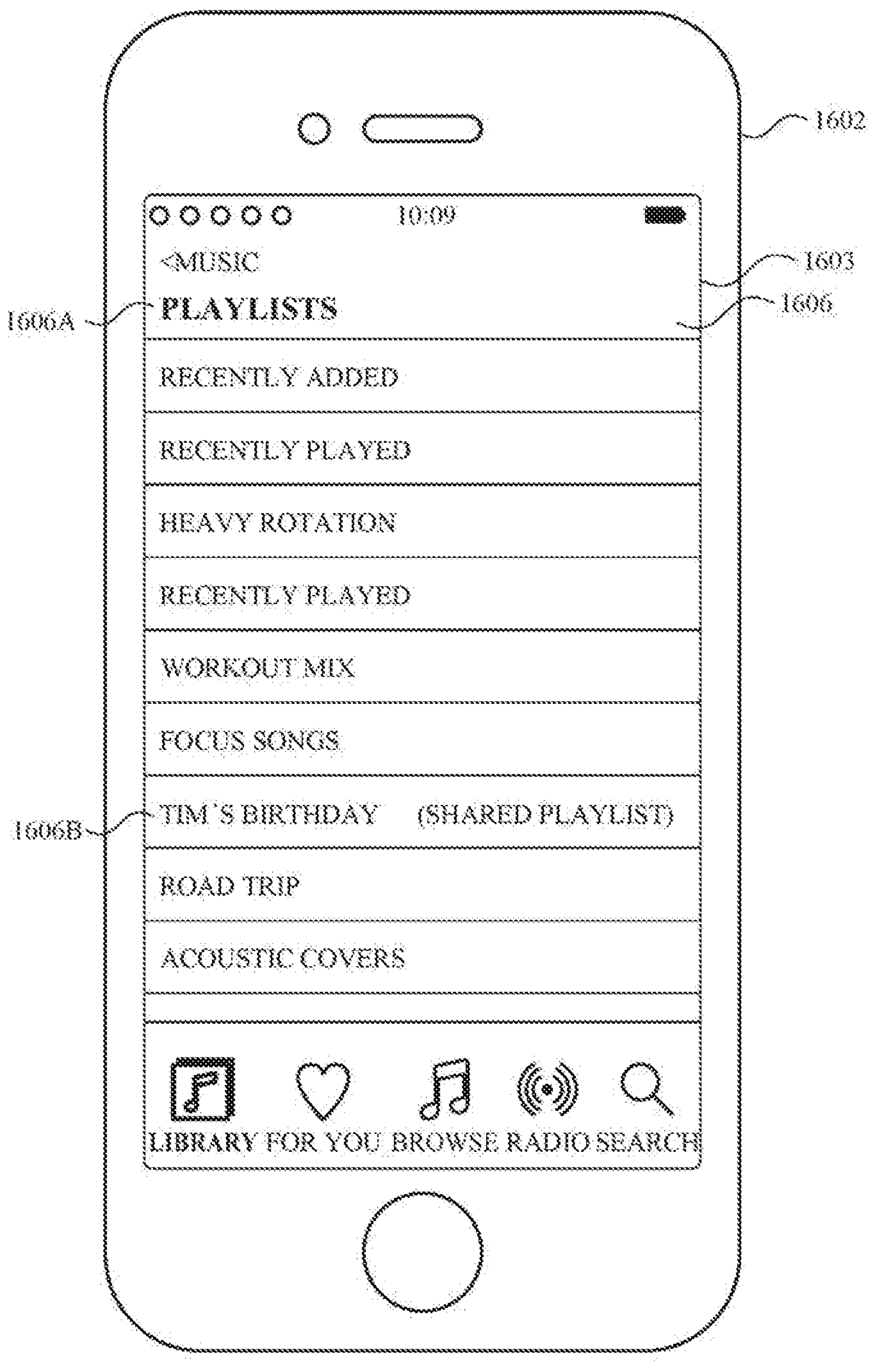
Figure 16C:
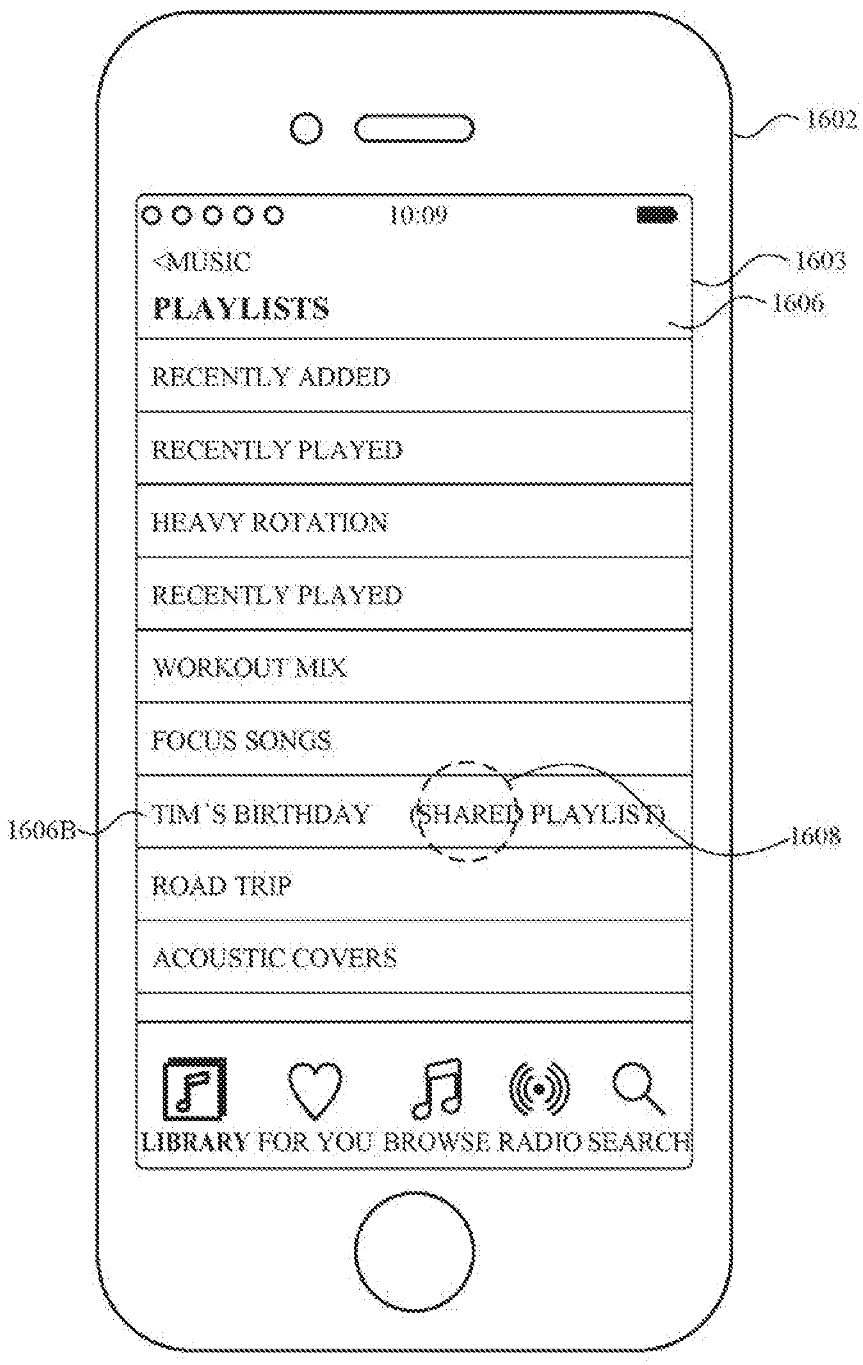
Figure 16P:
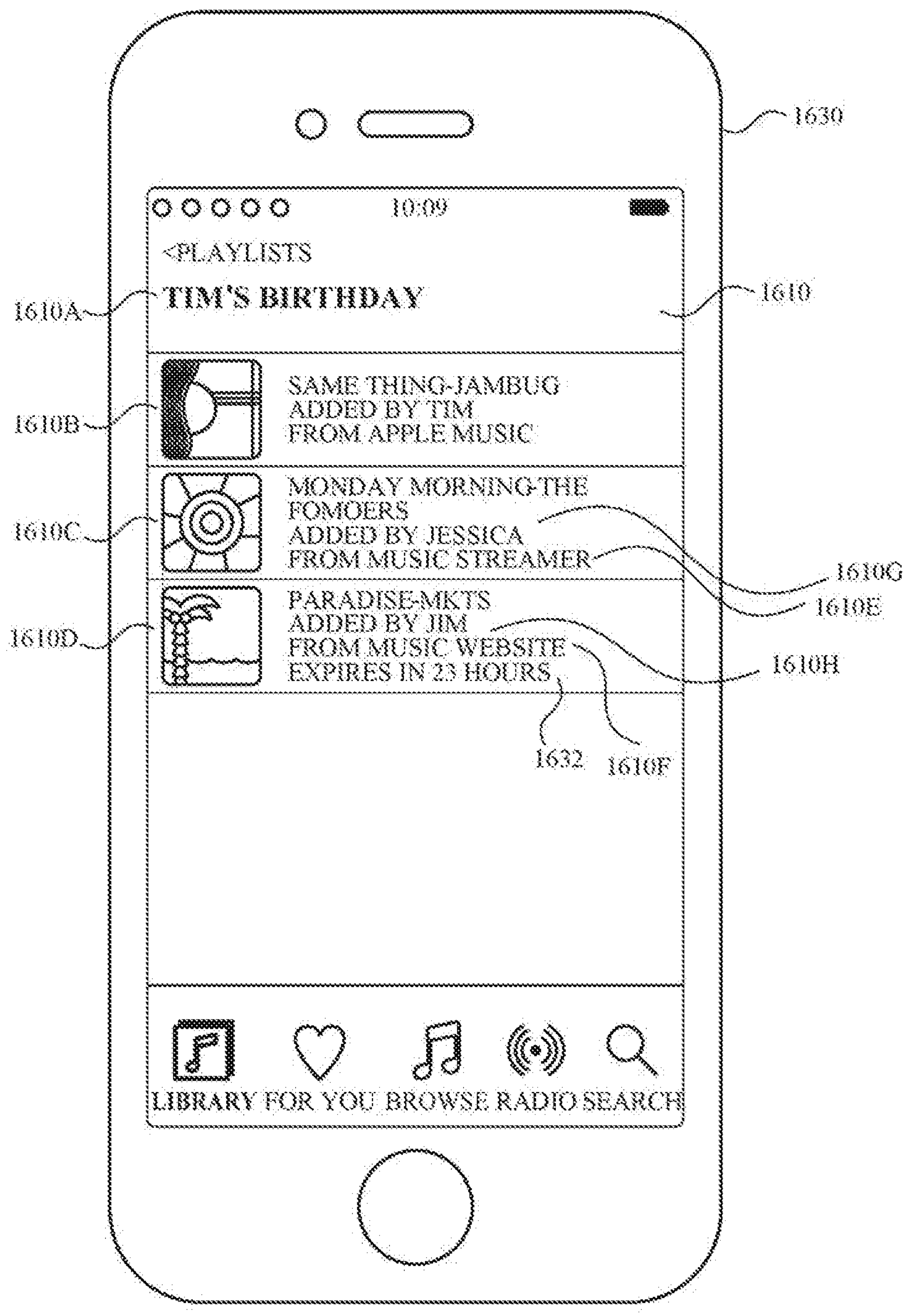
Figure 17A:
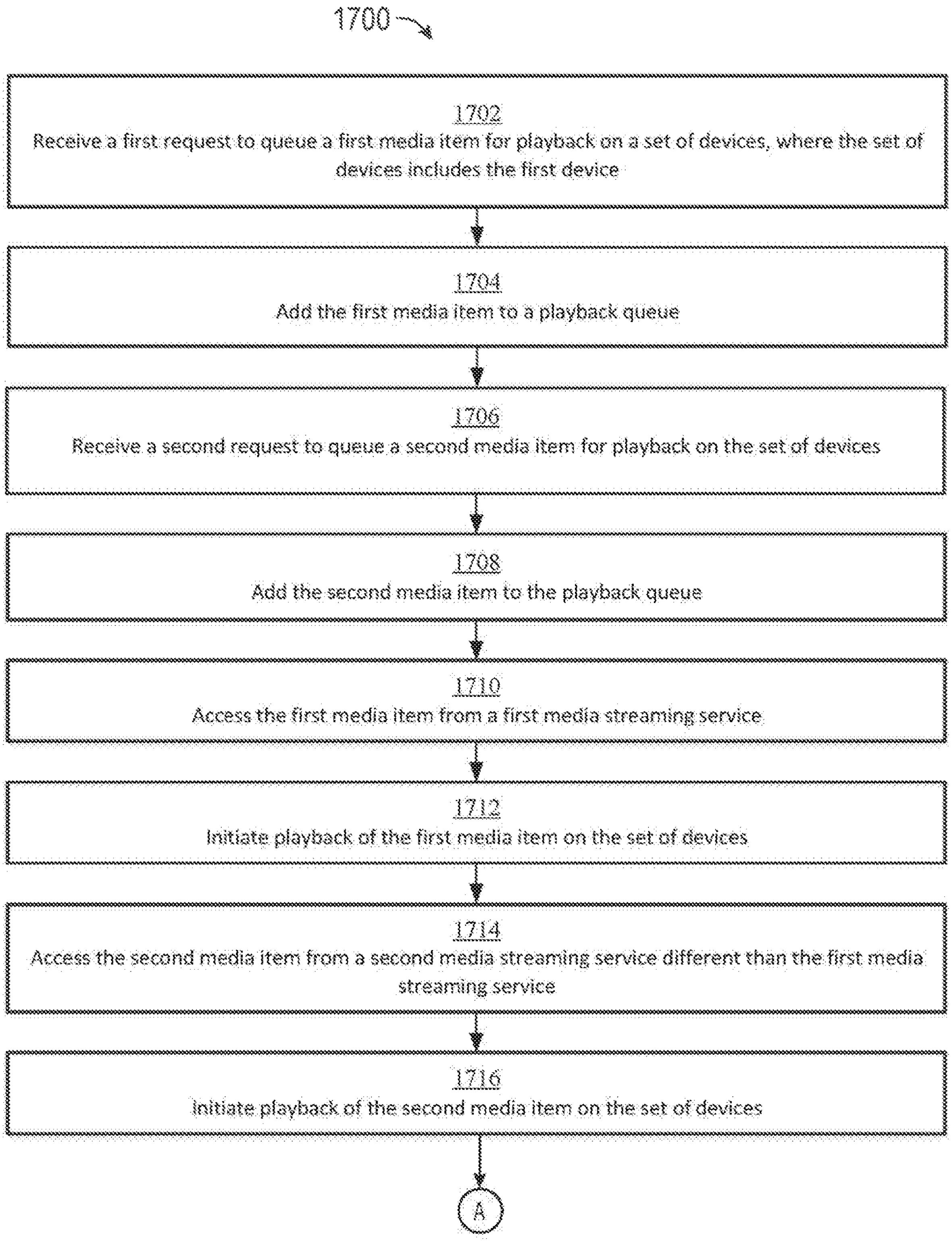
FIGS. 17A-17C is a flow diagram illustrating a process for managing a playback queue in accordance with some embodiments.
Figure 17B:
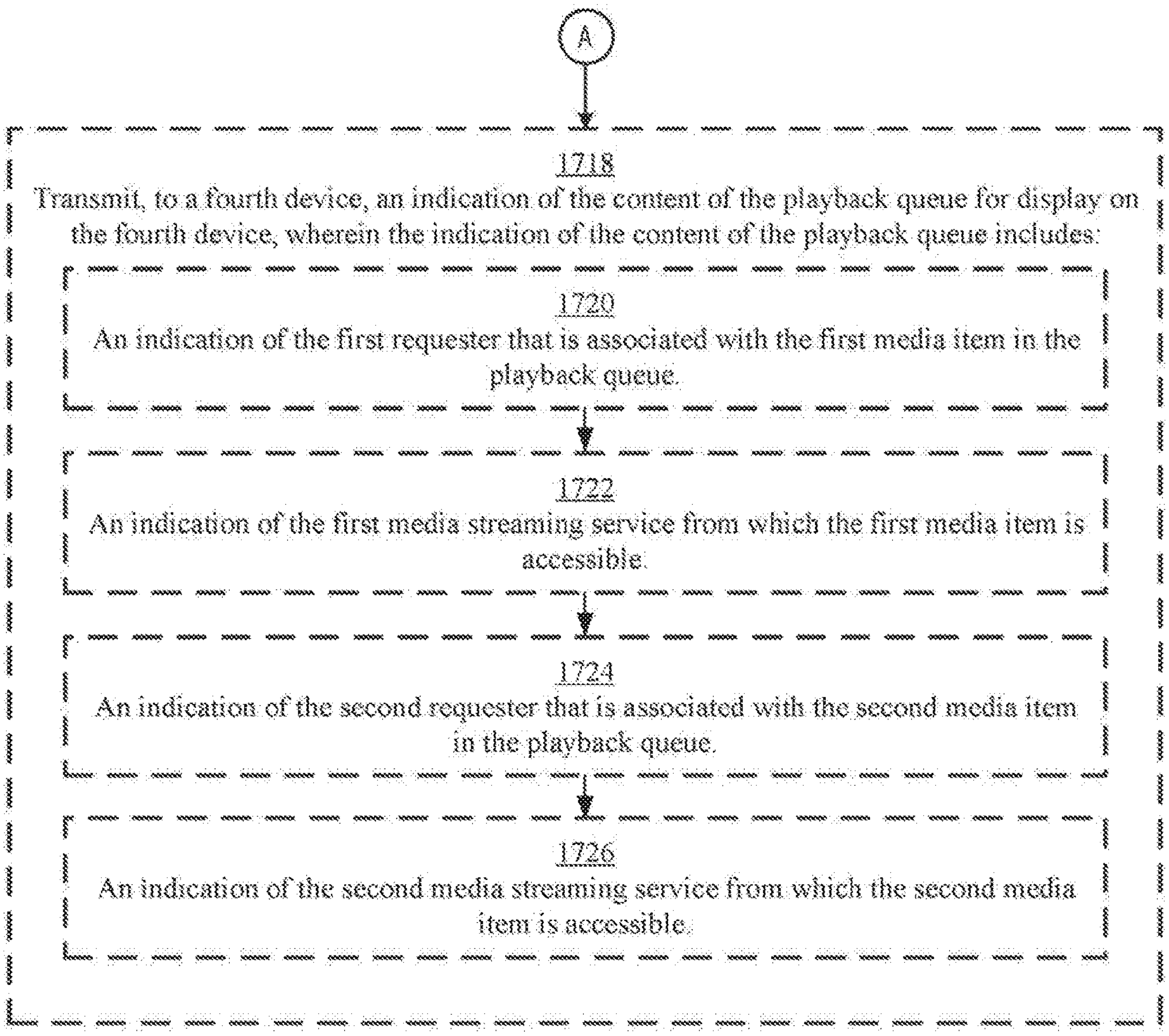
Figure 17C:
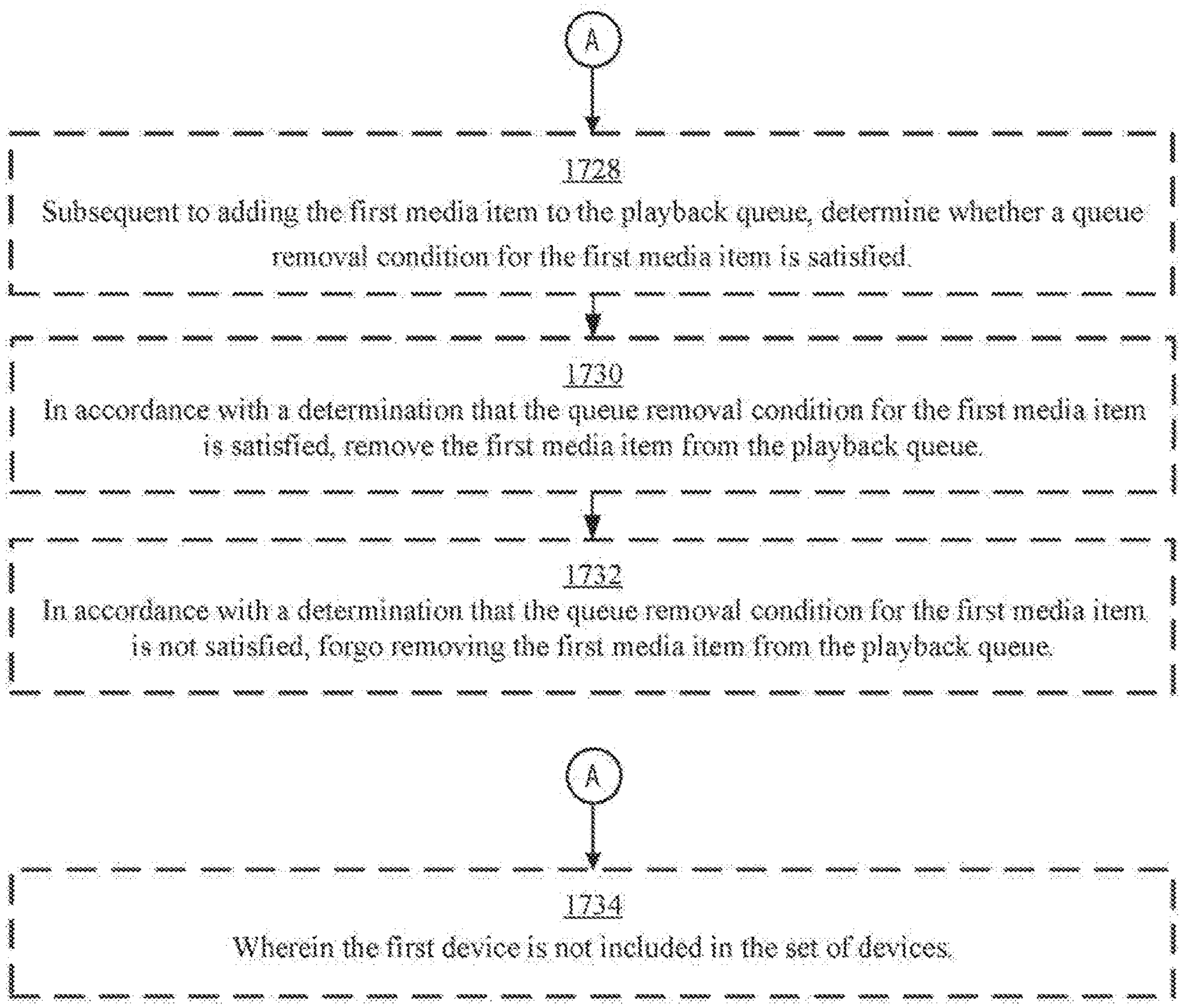
Figure 18A:
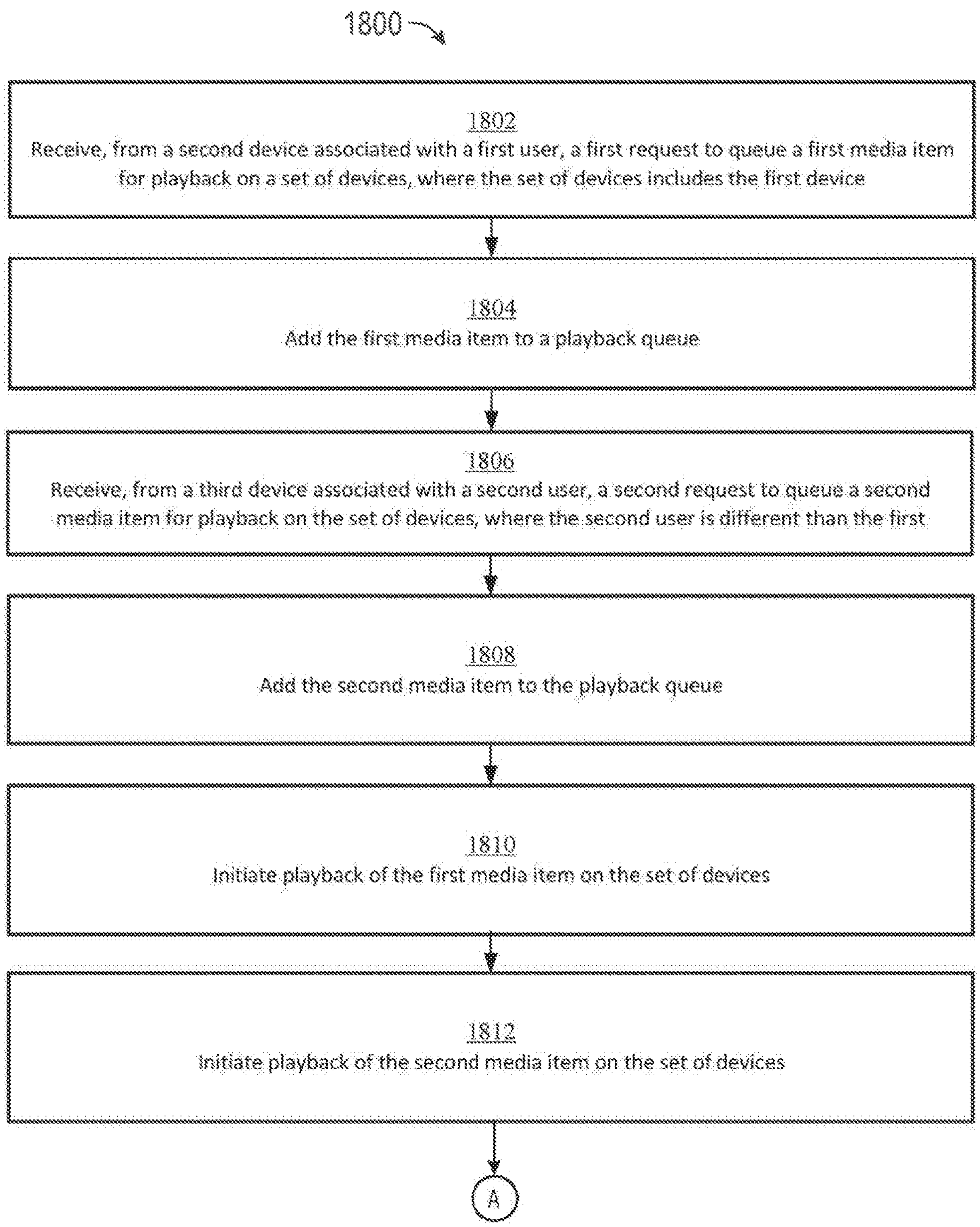
FIGS. 18A-18C is a flow diagram illustrating a process for managing a playback queue in accordance with some embodiments.
Figure 18B:
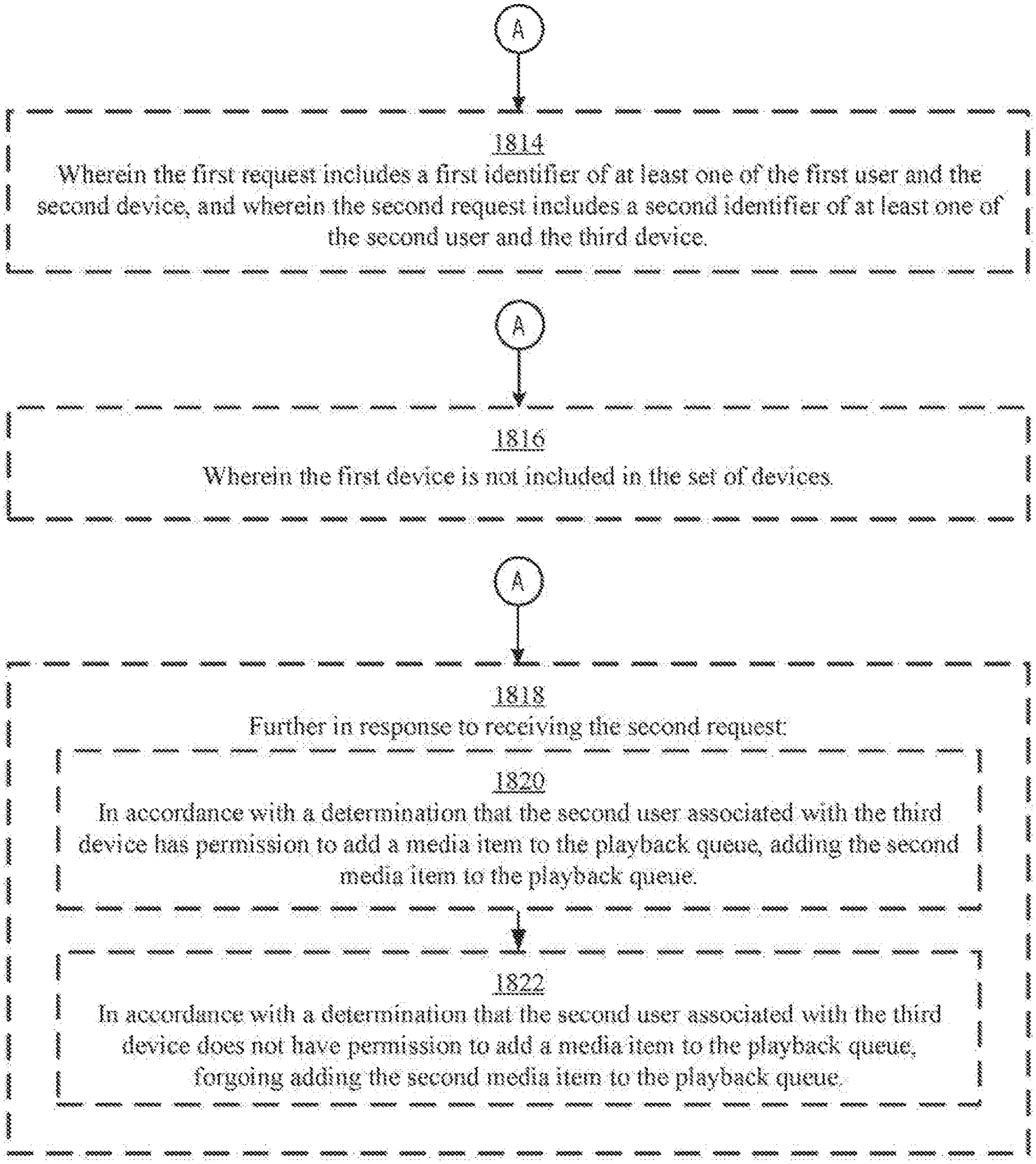
Figure 18C:
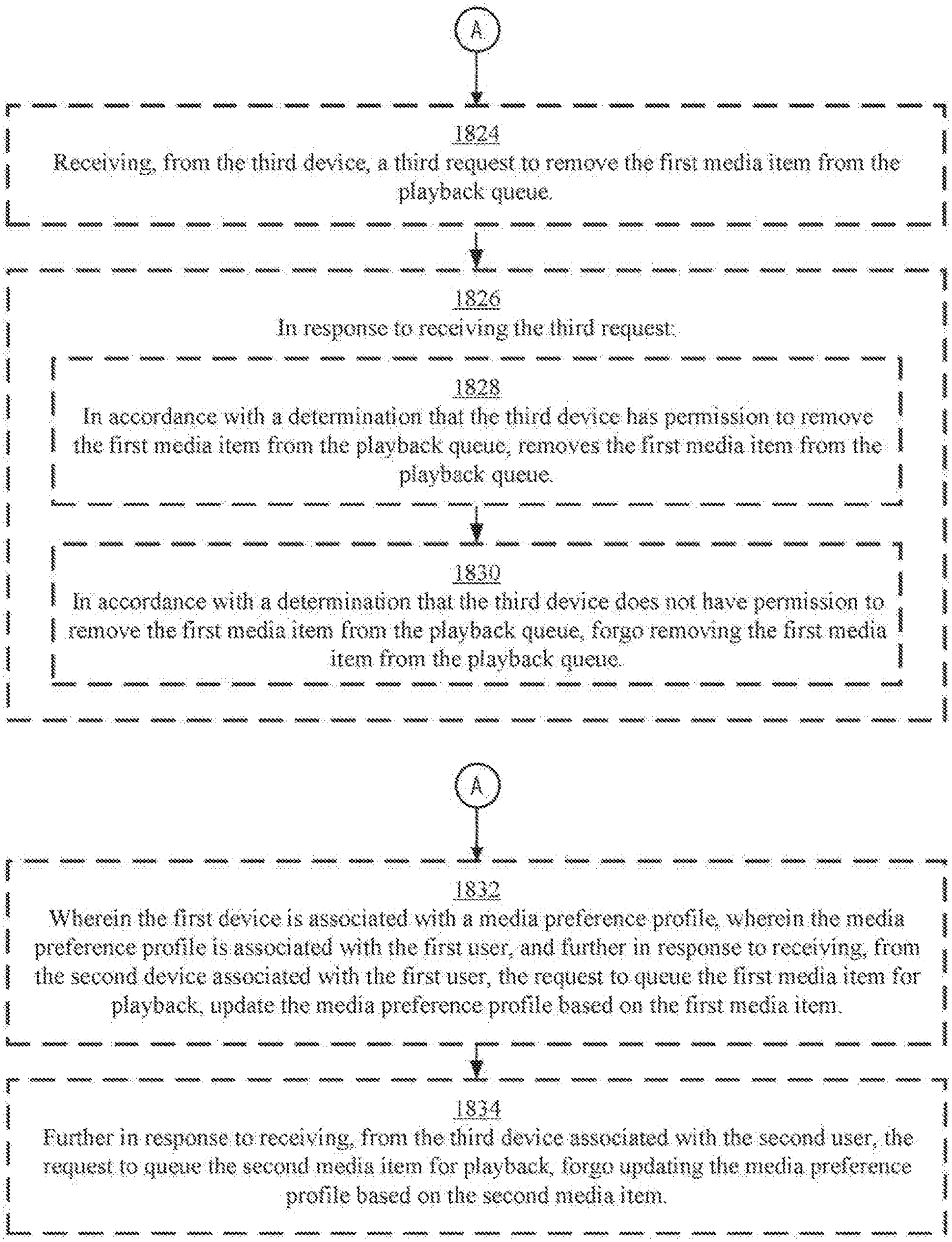
Figure 19A:
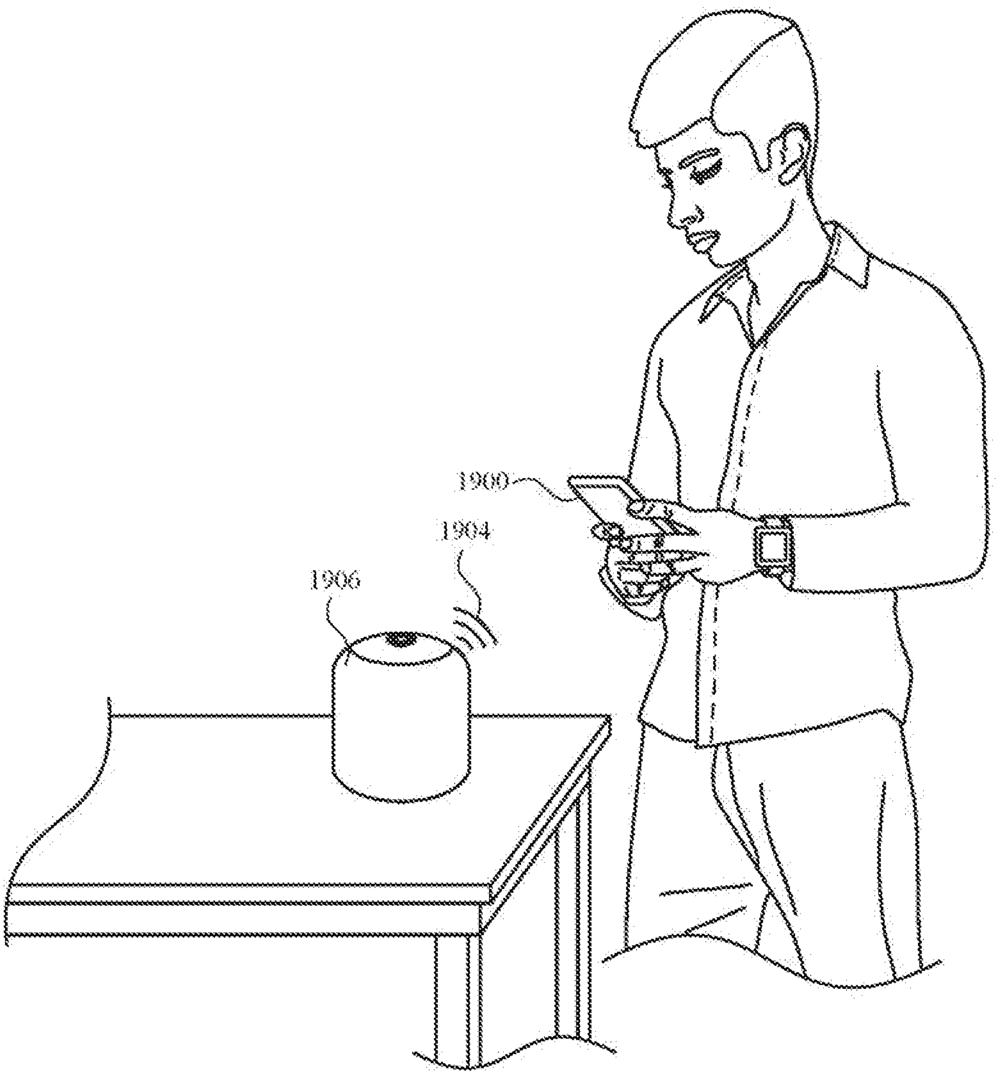
FIGS. 19A-19AL illustrate exemplary techniques and user interfaces for configuring an electronic device in accordance with some embodiments.
Figure 20A:
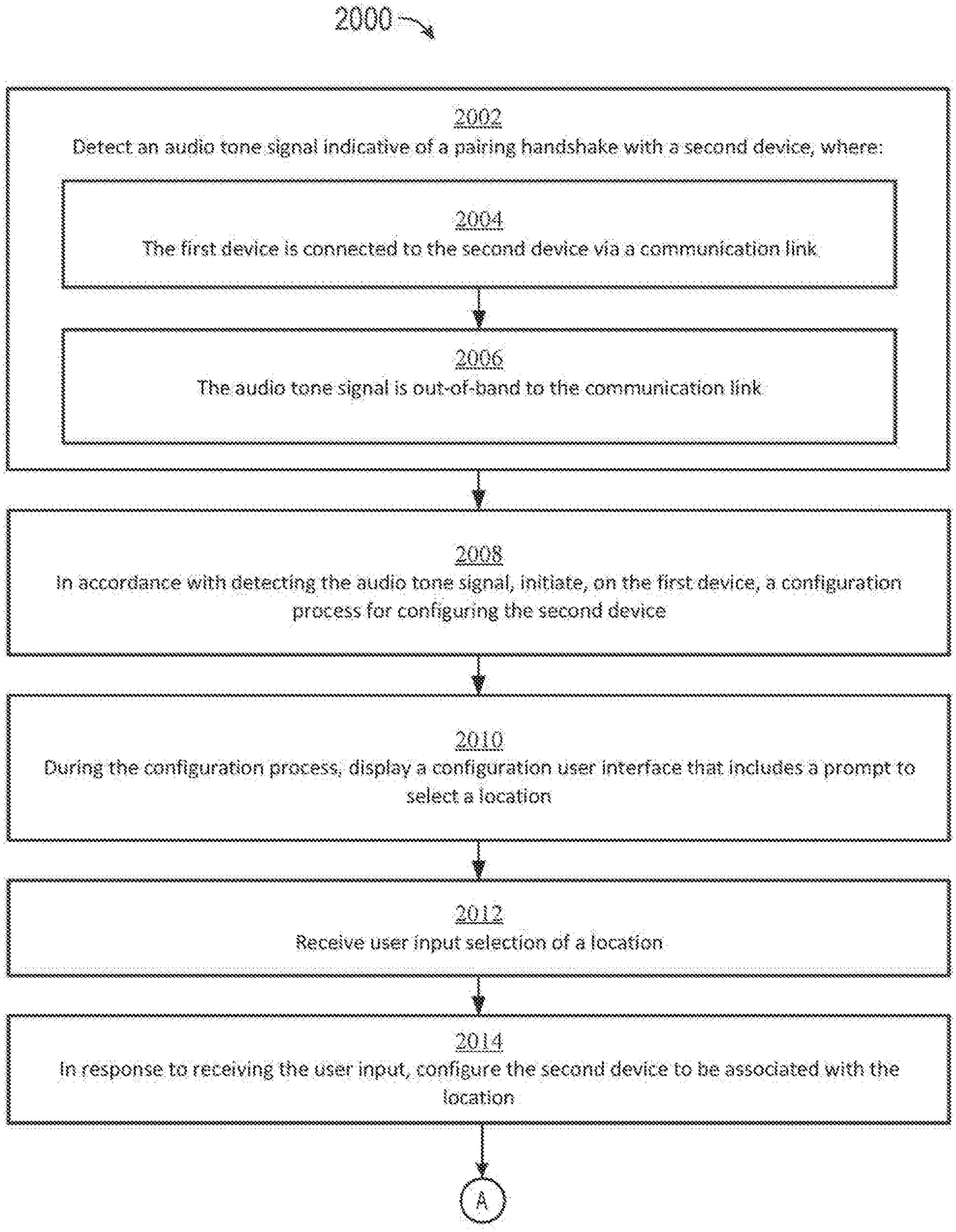
Figure 30A:
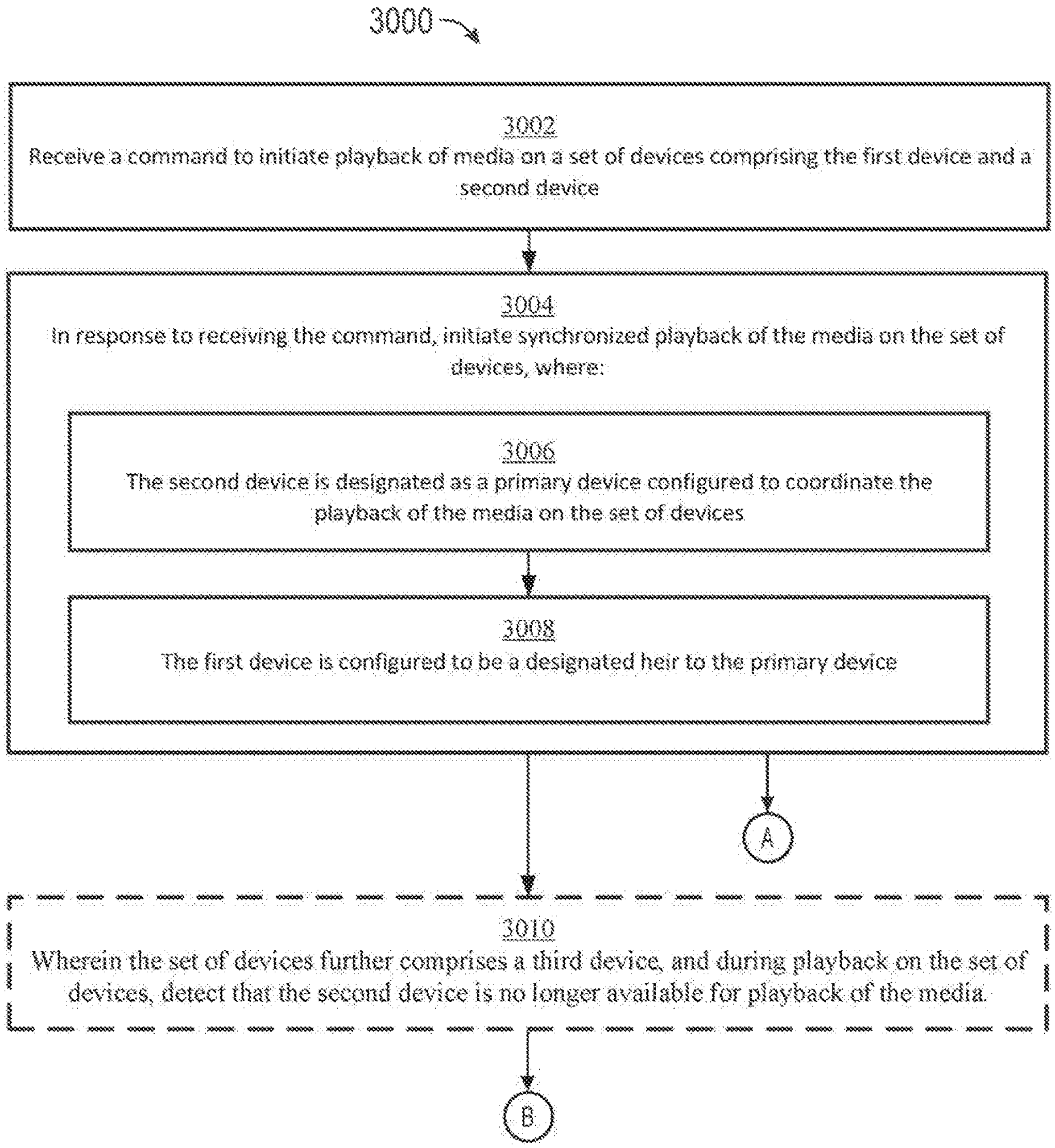
FIGS. 30A-30C is a flow diagram illustrating a process for managing media playback in accordance with some embodiments.
Figure 30B:
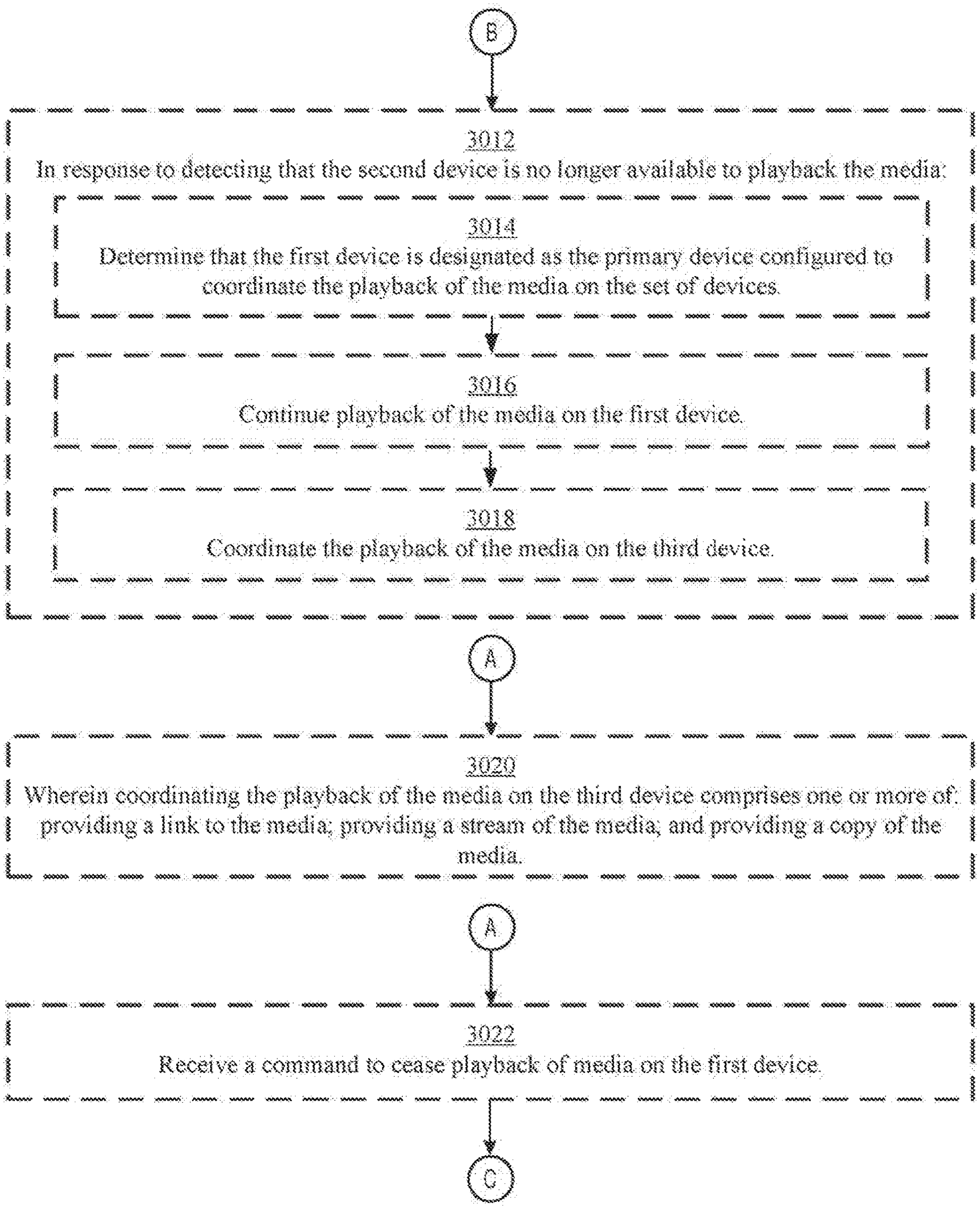
Figure 30C:
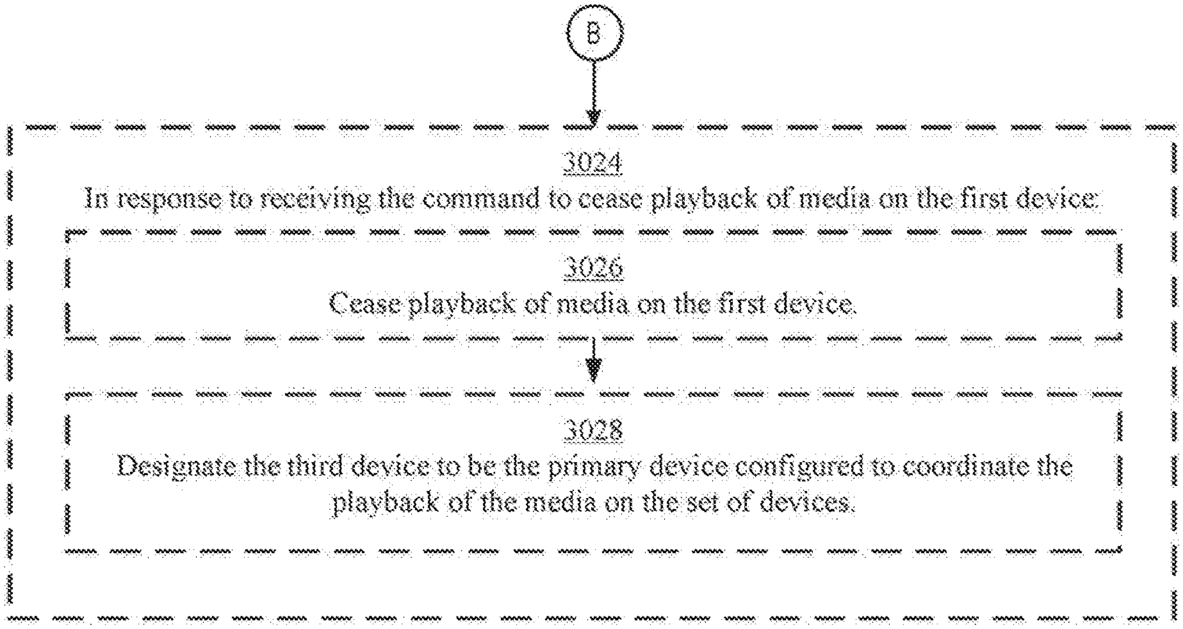
Figure 31A:
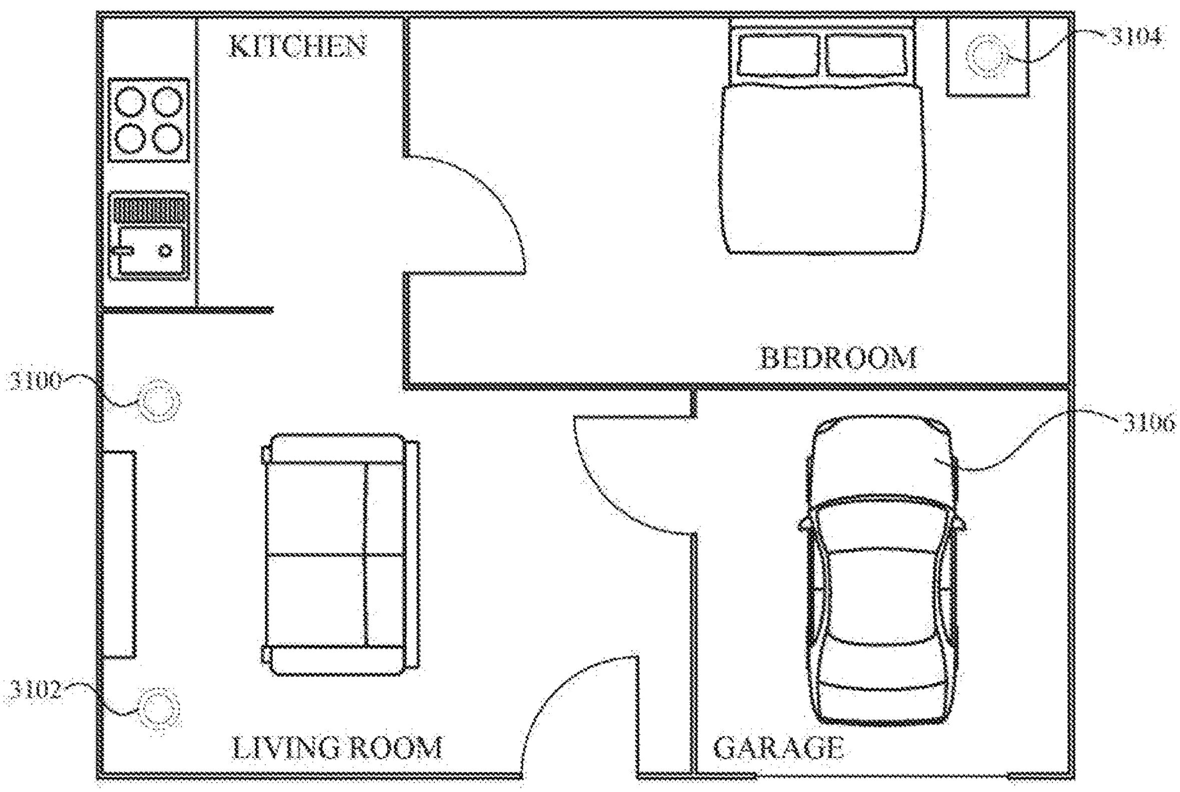
FIGS. 31A-31N illustrate exemplary techniques and user interfaces for providing output in accordance with some embodiments.
Figure 31N:
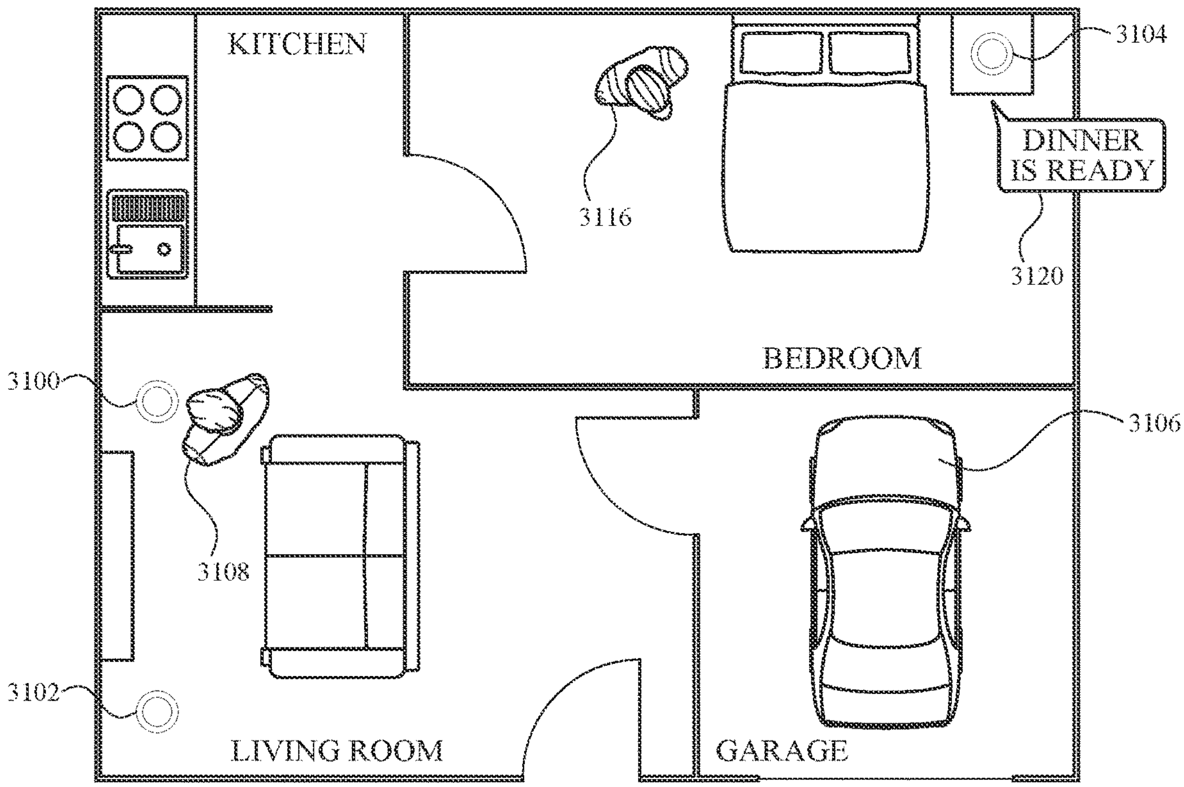
Figure 32A:
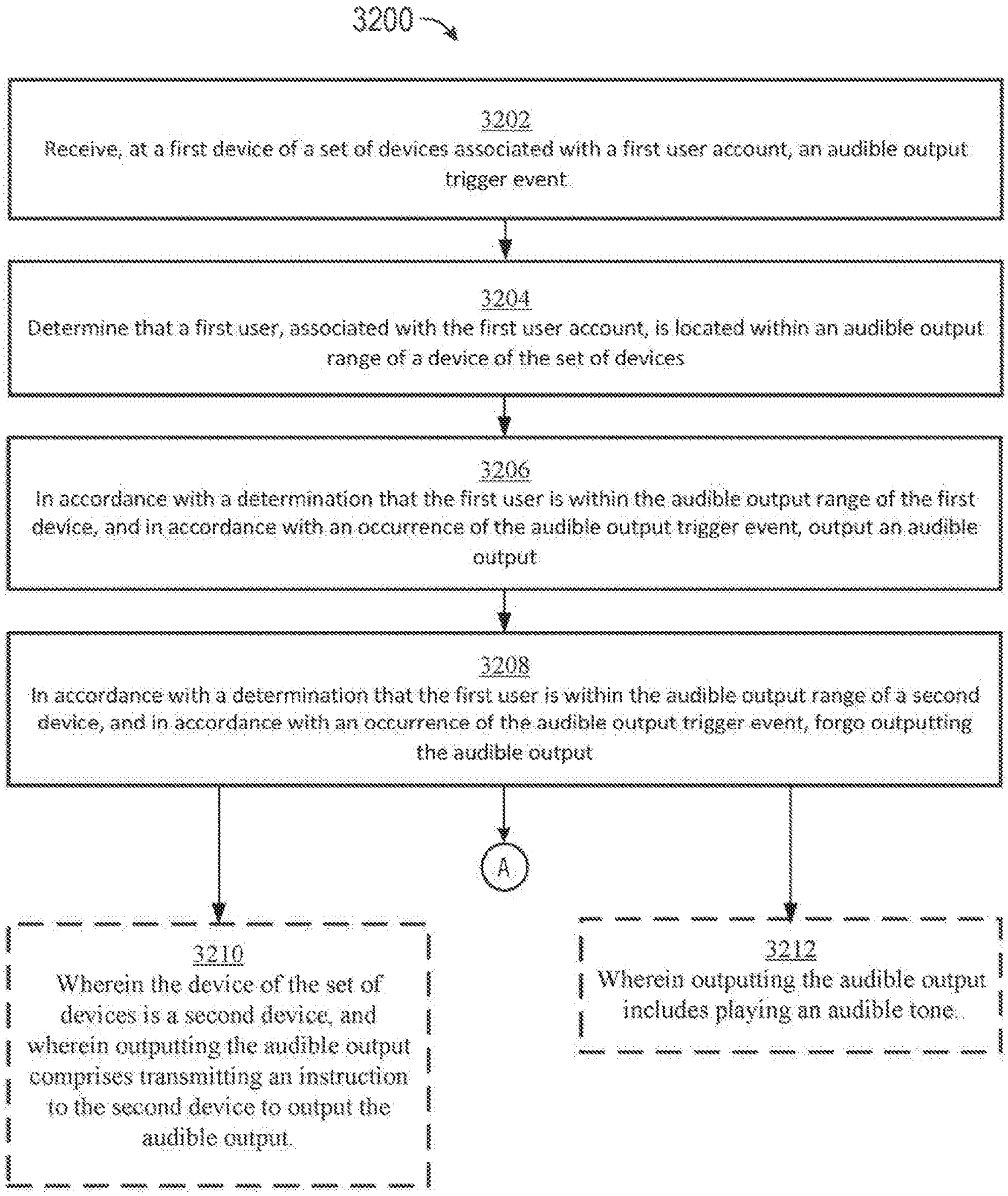
FIGS. 32A-32C is a flow diagram illustrating a process for providing output in accordance with some embodiments.
Figure 32B:
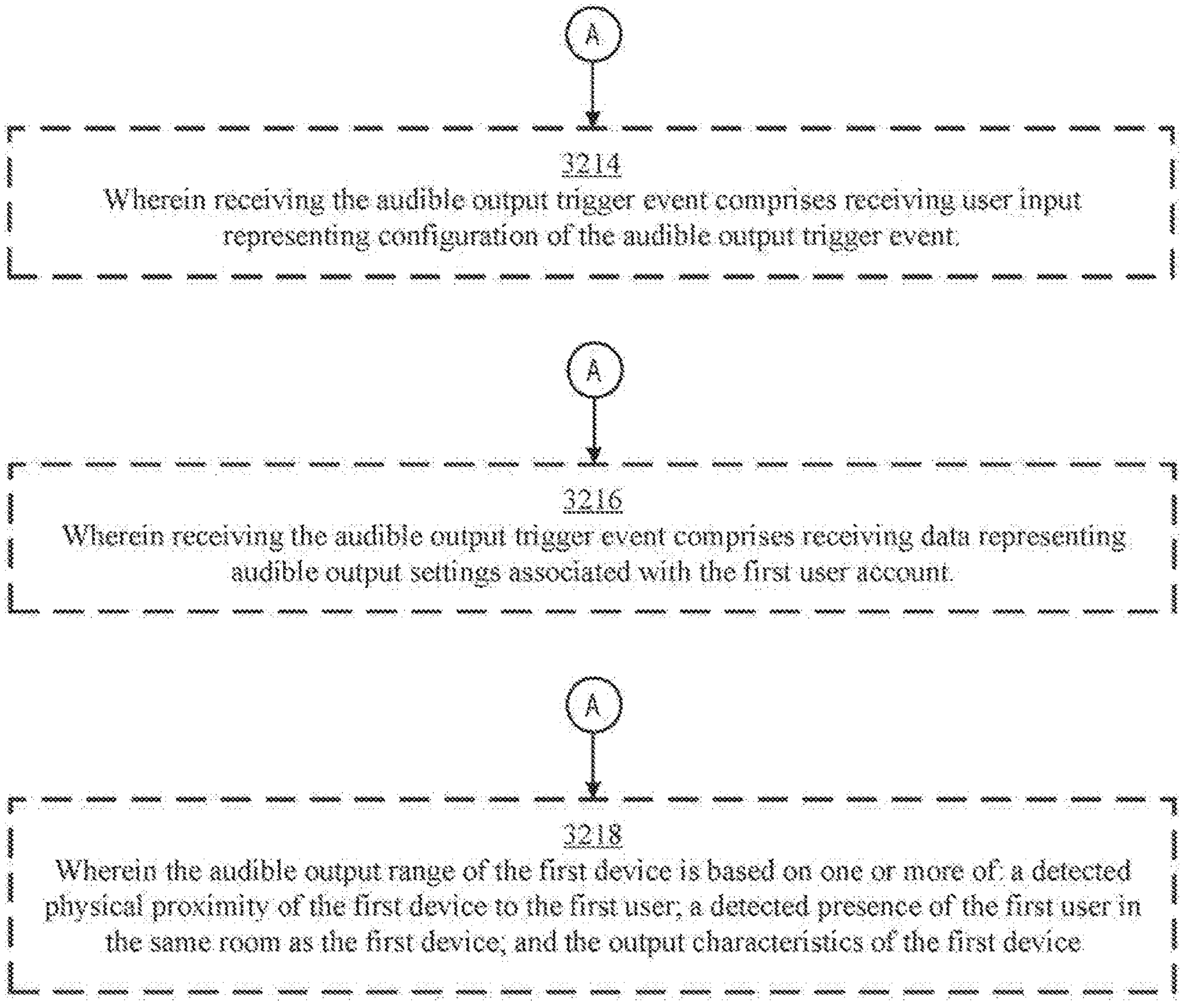
Figure 32C:
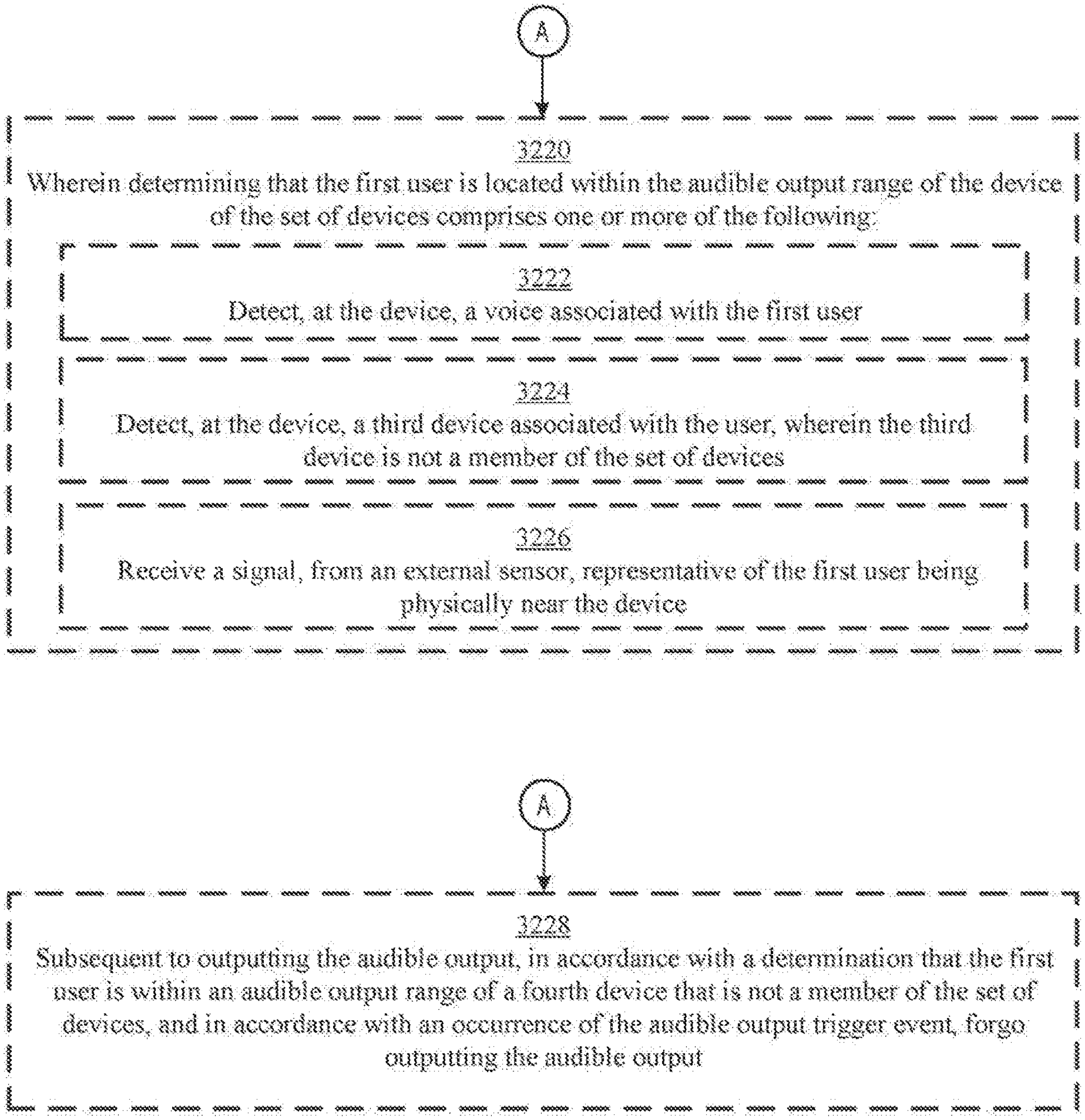

Below, FIGS. 1A-1B, 2, 3, 4A-4B, and 5A-5H provide a description of exemplary devices for performing the techniques for managing event notifications. FIGS. 6A-6AR illustrate exemplary techniques and user interfaces for playing back media in accordance with some embodiments. FIGS. 7A-7D is a flow diagram illustrating a process for playing back media in accordance with some embodiments. The user interfaces in FIGS. 6A-6AR are used to illustrate the processes described below, including the processes in FIGS. 7A-7D. FIGS. 8A-8P illustrate exemplary techniques and user interfaces for playing back media in accordance with some embodiments. FIGS. 9A-9C is a flow diagram illustrating a process for playing back media in accordance with some embodiments. The user interfaces in FIGS. 8A-8P are used to illustrate the processes described below, including the processes in FIGS. 9A-9C. FIGS. 10A-10O illustrate exemplary techniques and user interfaces for in accordance with some embodiments. FIGS. 11A-11D is a flow diagram illustrating a process for displaying content in accordance with some embodiments. The user interfaces in FIGS. 10A-10O are used to illustrate the processes described below, including the processes in FIGS. 11A-11D. FIGS. 12A-12AM illustrate exemplary techniques and user interfaces for viewing media information in accordance with some embodiments. FIGS. 13A-13F is a flow diagram illustrating a process for viewing media information in accordance with some embodiments. The user interfaces in FIGS. 12A-12AM are used to illustrate the processes described below, including the processes in FIGS. 13A-13F. FIGS. 14A-14T illustrate exemplary techniques and user interfaces for controlling an electronic device in accordance with some embodiments. FIGS. 15A-15C is a flow diagram illustrating a process for controlling an electronic device in accordance with some embodiments. The user interfaces in FIGS. 14A-14T are used to illustrate the processes described below, including the processes in FIGS. 15A-15C. FIGS. 16A-16P illustrate exemplary techniques and user interfaces for managing a playback queue in accordance with some embodiments. FIGS. 17A-17C is a flow diagram illustrating a process for managing a playback queue in accordance with some embodiments. FIGS. 18A-18C is a flow diagram illustrating a process for managing a playback queue in accordance with some embodiments. The user interfaces in FIGS. 16A-16P are used to illustrate the processes described below, including the processes in FIGS. 17A-17C and 18A-18C. FIGS. 19A-19AL illustrate exemplary techniques and user interfaces for configuring an electronic device in accordance with some embodiments. FIGS. 20A-20C is a flow diagram illustrating a process for configuring an electronic device in accordance with some embodiments. The user interfaces in FIGS. 19A-19AL are used to illustrate the processes described below, including the processes in FIGS. 20A-20C. FIGS. 21A-21I illustrate exemplary techniques and user interfaces for adjusting an audible output of an electronic device in accordance with some embodiments. FIGS. 22A-22B is a flow diagram illustrating a process for adjusting an audible output of an electronic device in accordance with some embodiments. The user interfaces in FIGS. 21A-21I are used to illustrate the processes described below, including the processes in FIGS. 22A-22B. FIGS. 23A-23K illustrate exemplary techniques and user interfaces for managing a playback queue in accordance with some embodiments. FIGS. 24A-24B is a flow diagram illustrating a process for managing a playback queue in accordance with some embodiments. The user interfaces in FIGS. 23A-23K are used to illustrate the processes described below, including the processes in 24A-24B. FIGS. 25A-25I illustrate exemplary techniques and user interfaces for playing back media in accordance with some embodiments. FIGS. 26A-26B is a flow diagram illustrating a process for playing back media in accordance with some embodiments. The user interfaces in FIGS. 25A-25I are used to illustrate the processes described below, including the processes in FIGS. 26A-26B. FIGS. 27A-27E illustrate exemplary techniques and user interfaces for providing access to an electronic device in accordance with some embodiments. FIGS. 28A-28C is a flow diagram illustrating a process for providing access to an electronic device in accordance with some embodiments. The user interfaces in FIGS. 27A-27E are used to illustrate the processes described below, including the processes in FIGS. 28A-28C. FIGS. 29A-29I illustrate exemplary techniques and user interfaces for managing media playback in accordance with some embodiments. FIGS. 30A-30C is a flow diagram illustrating a process for managing media playback in accordance with some embodiments. The user interfaces in FIGS. 29A-29I are used to illustrate the processes described below, including the processes in FIGS. 30A-30C. FIGS. 31A-31N illustrate exemplary techniques and user interfaces for providing output in accordance with some embodiments. FIGS. 32A-32C is a flow diagram illustrating a process for providing output in accordance with some embodiments. The user interfaces in FIGS. 31A-31N are used to illustrate the processes described below, including the processes in FIGS. 32A-32C. FIGS. 33A-33G illustrate exemplary techniques and user interfaces for controlling media playback in accordance with some embodiments. FIGS. 34A-34B is a flow diagram illustrating a process for controlling media playback in accordance with some embodiments. The user interfaces in FIGS. 33A-33G are used to illustrate the processes described below, including the processes in FIGS. 34A-34B. FIGS. 35A-35J illustrate exemplary techniques and user interfaces for managing media playback in accordance with some embodiments. FIGS. 36A-36C is a flow diagram illustrating a process for managing media playback in accordance with some embodiments. The user interfaces in FIGS. 35A-35J are used to illustrate the processes described below, including the processes in FIGS. 36A-36C. FIGS. 37A-37D illustrate exemplary techniques and user interfaces for managing media playback in accordance with some embodiments. FIGS. 38A-38B is a flow diagram illustrating a process for managing media playback in accordance with some embodiments. The user interfaces in FIGS. 37A-37D are used to illustrate the processes described below, including the processes in FIGS. 38A-38B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
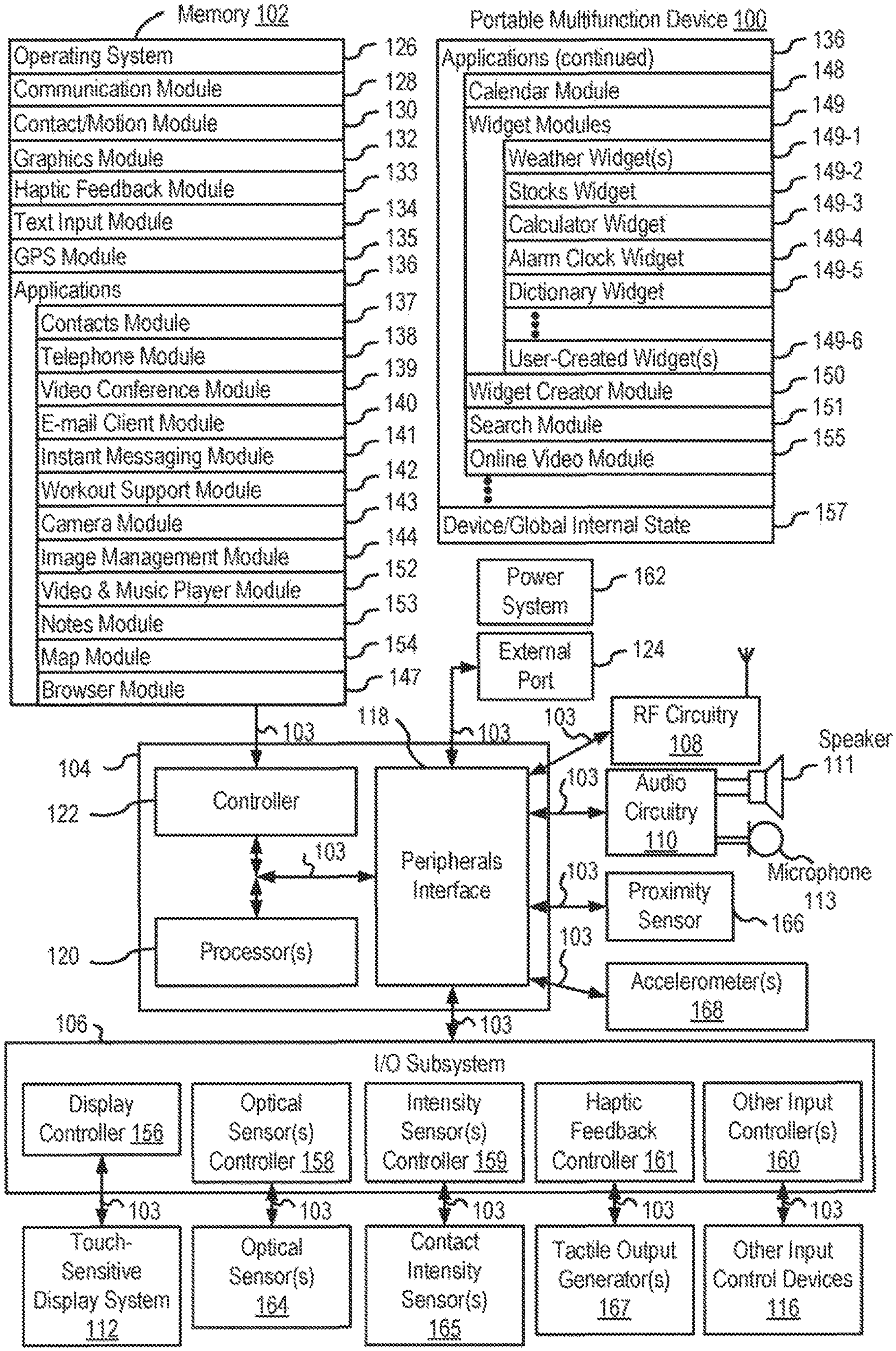
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed unlink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
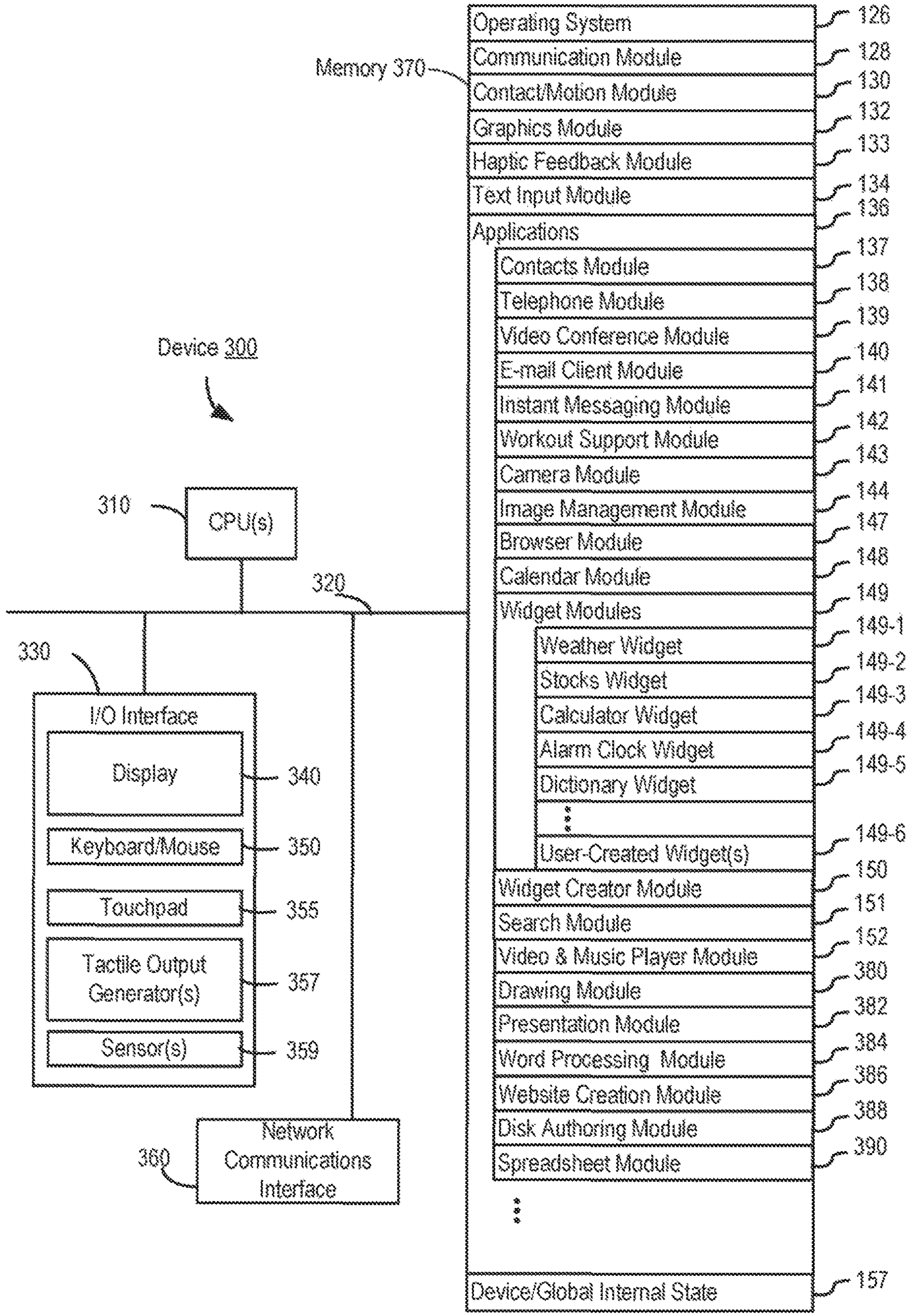
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
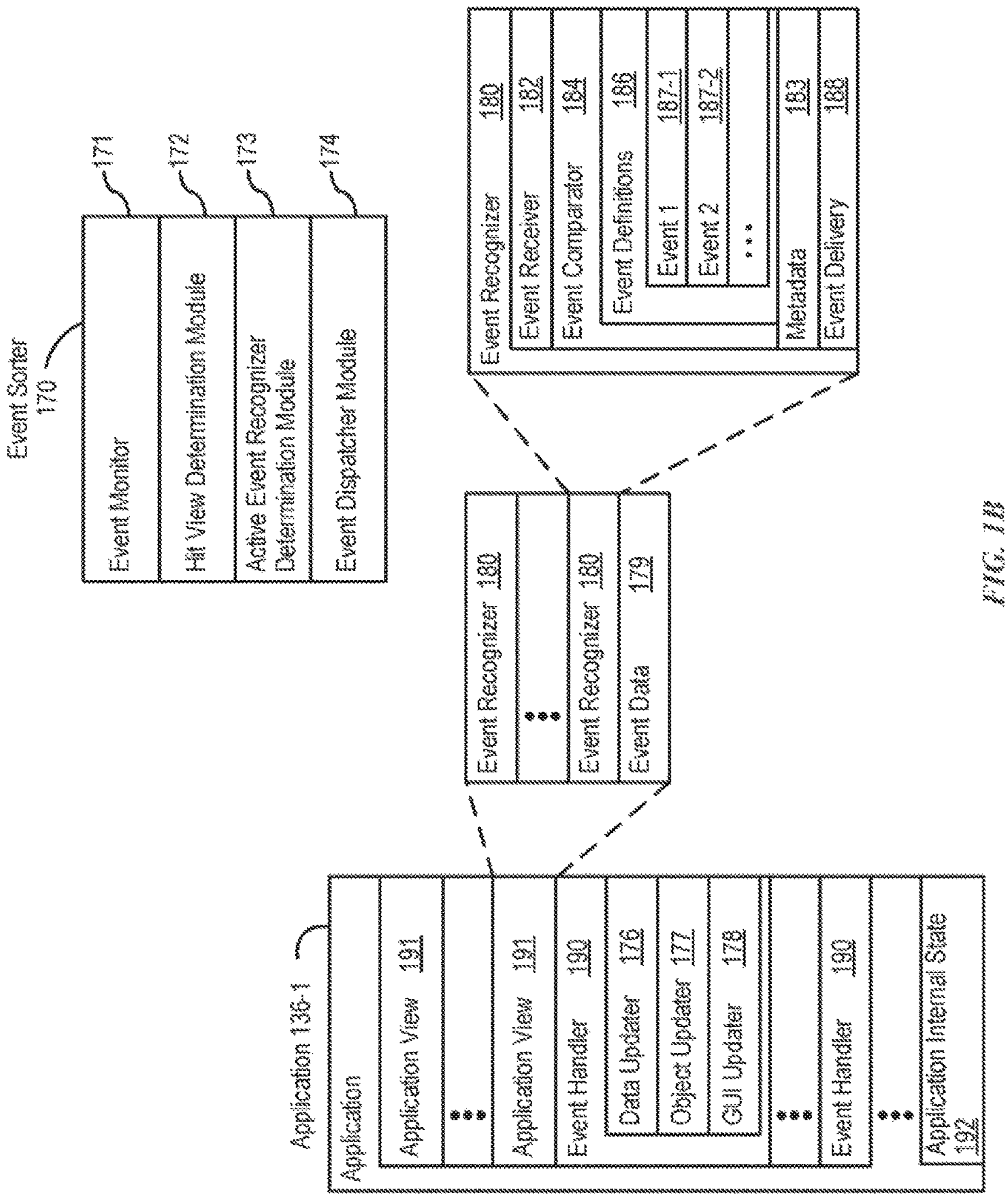
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
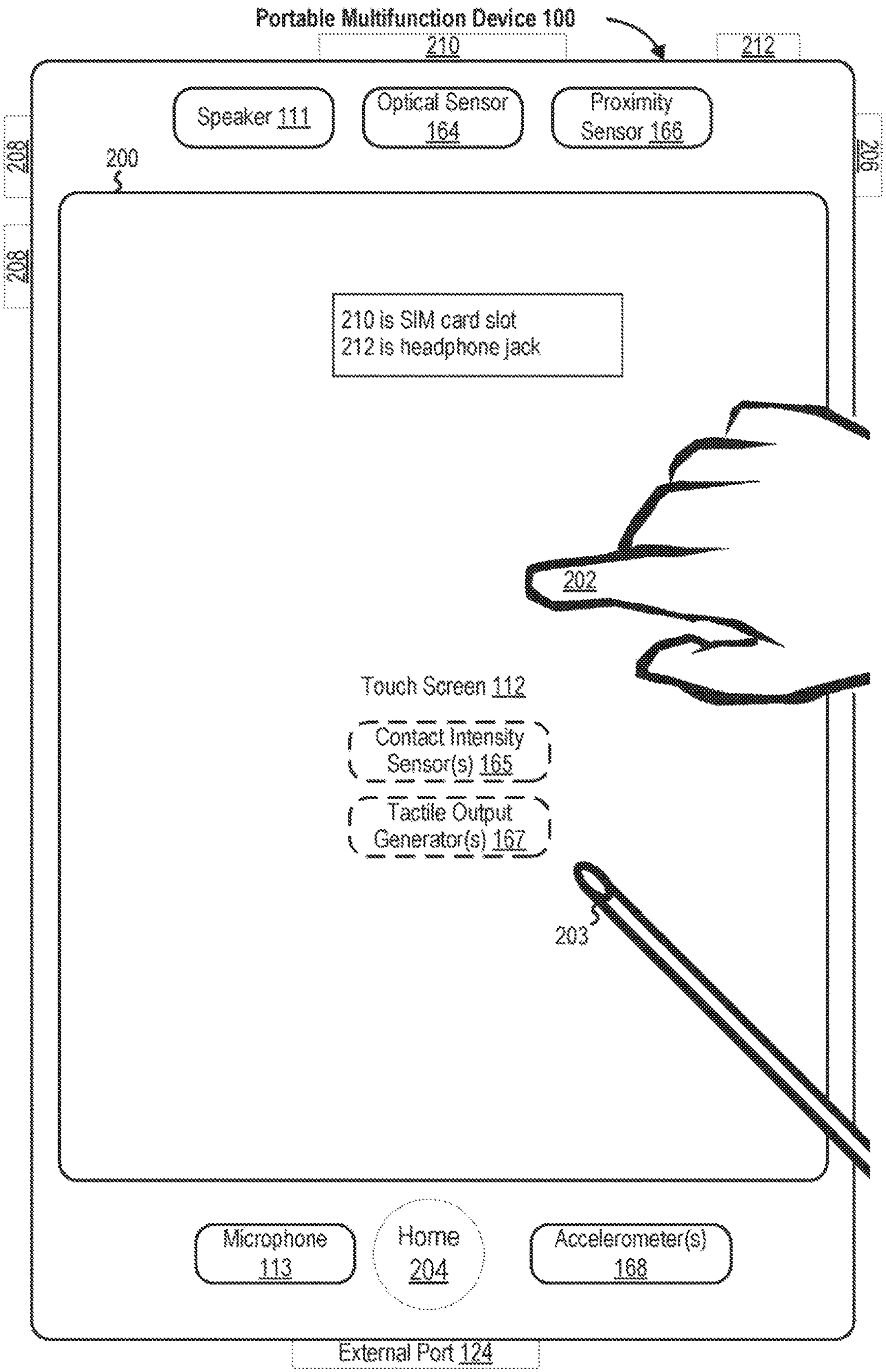
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
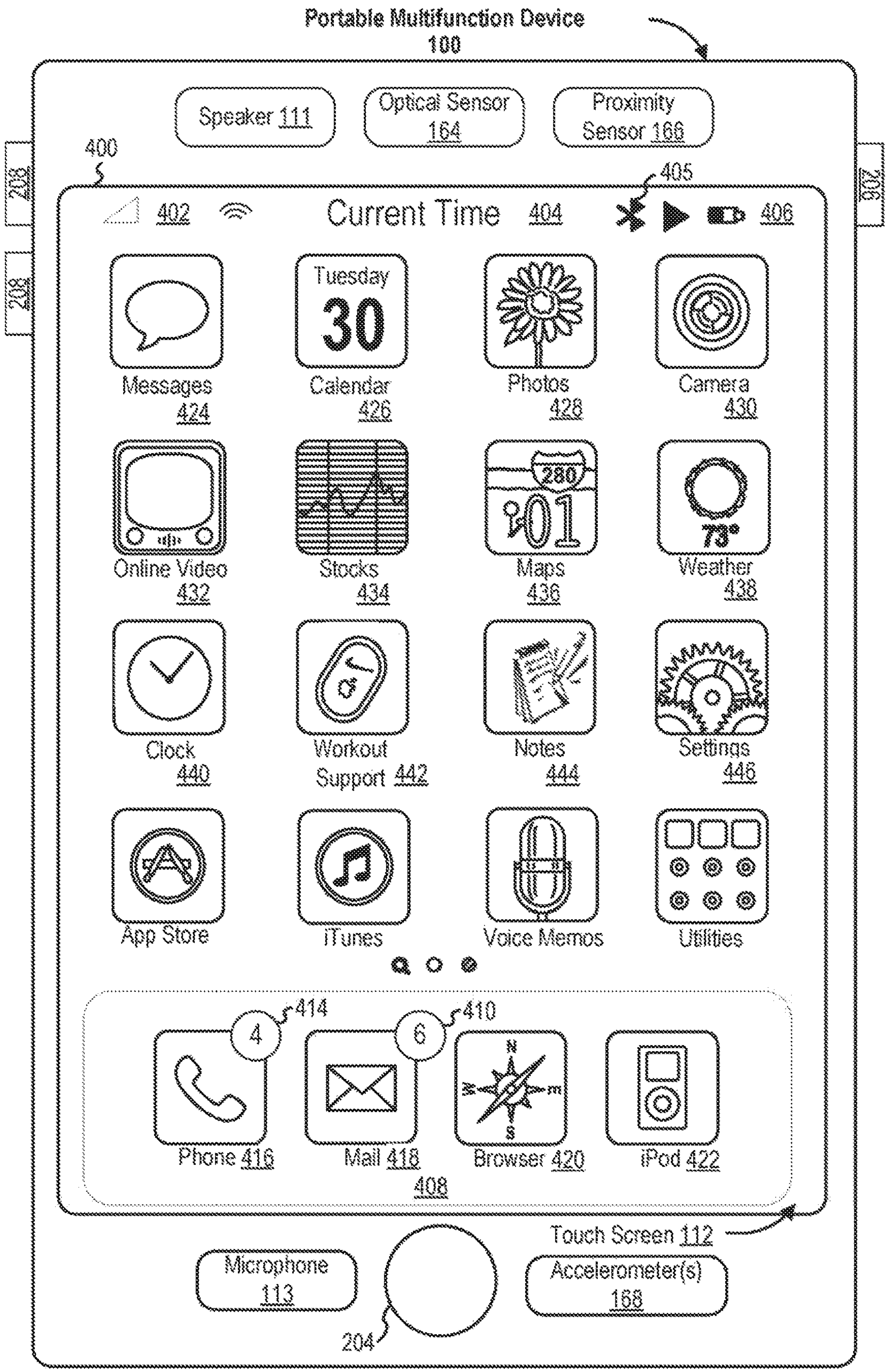
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
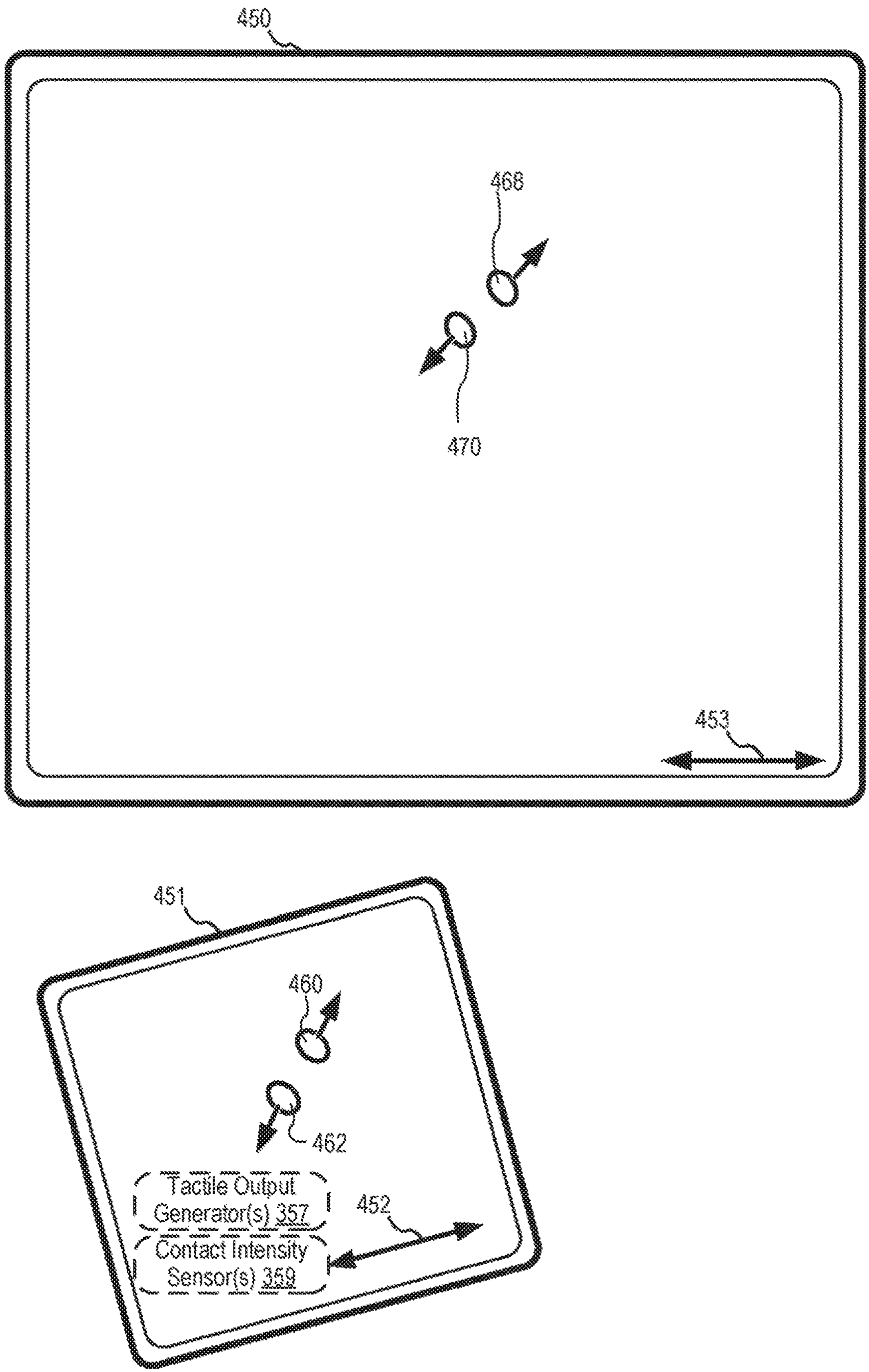
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
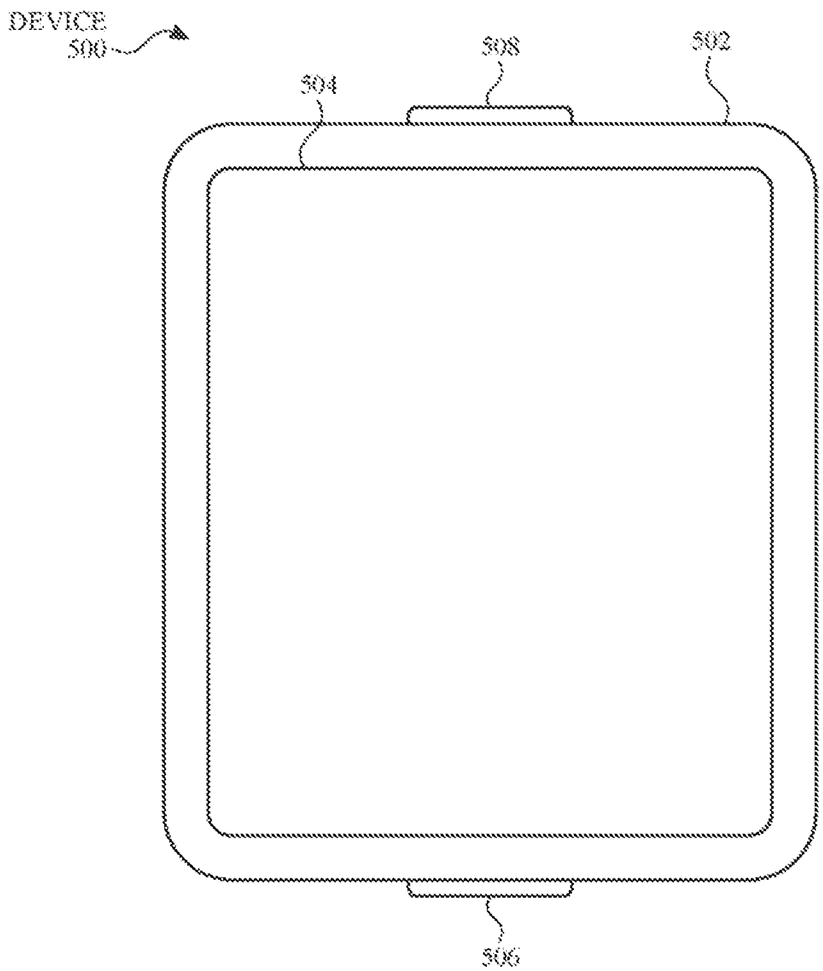
FIG. 5A illustrates a personal electronic device in accordance with some embodiments.
Figure 6A:
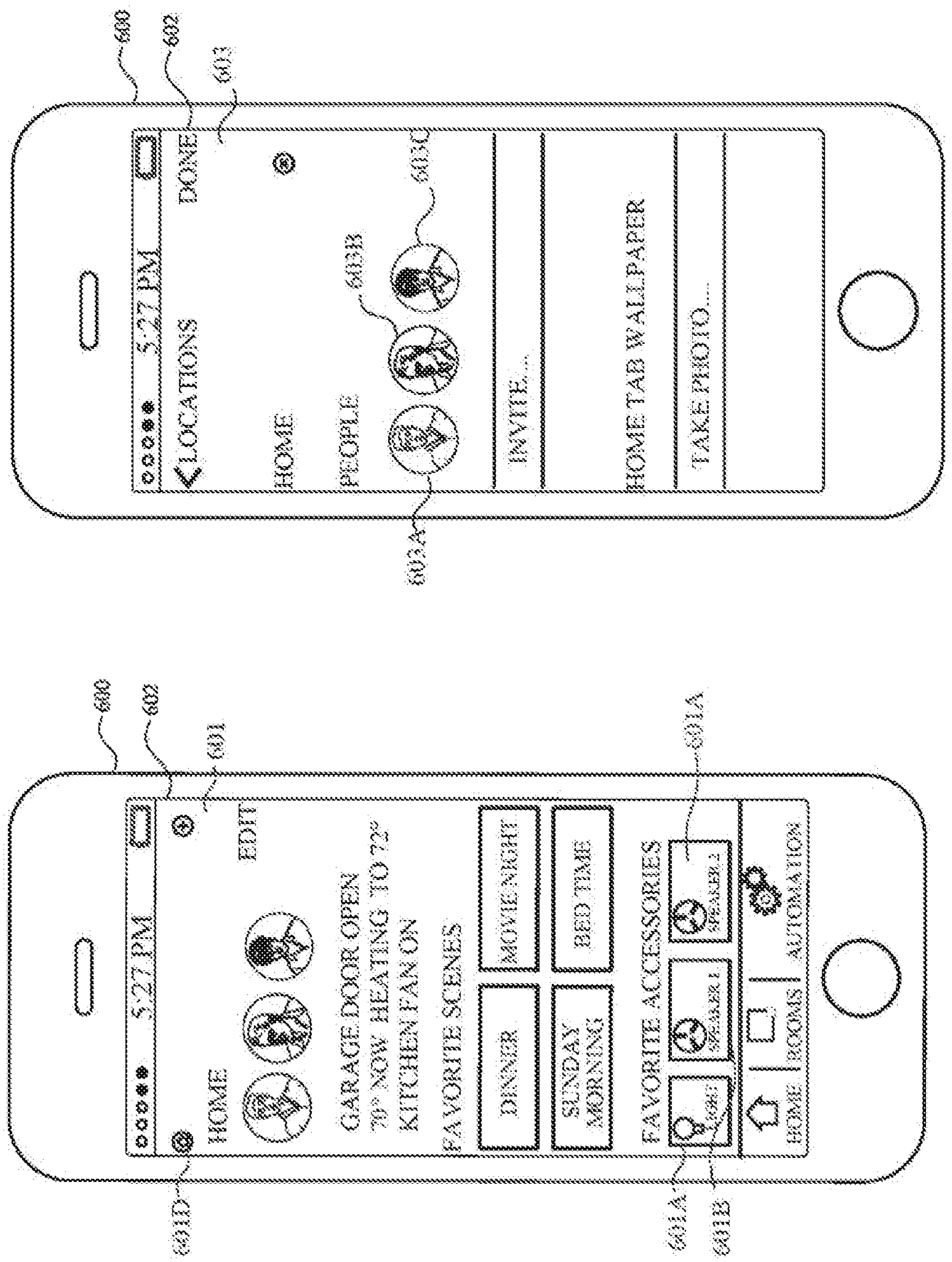
FIGS. 6A-6AR illustrate exemplary techniques and user interfaces for playing back media in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
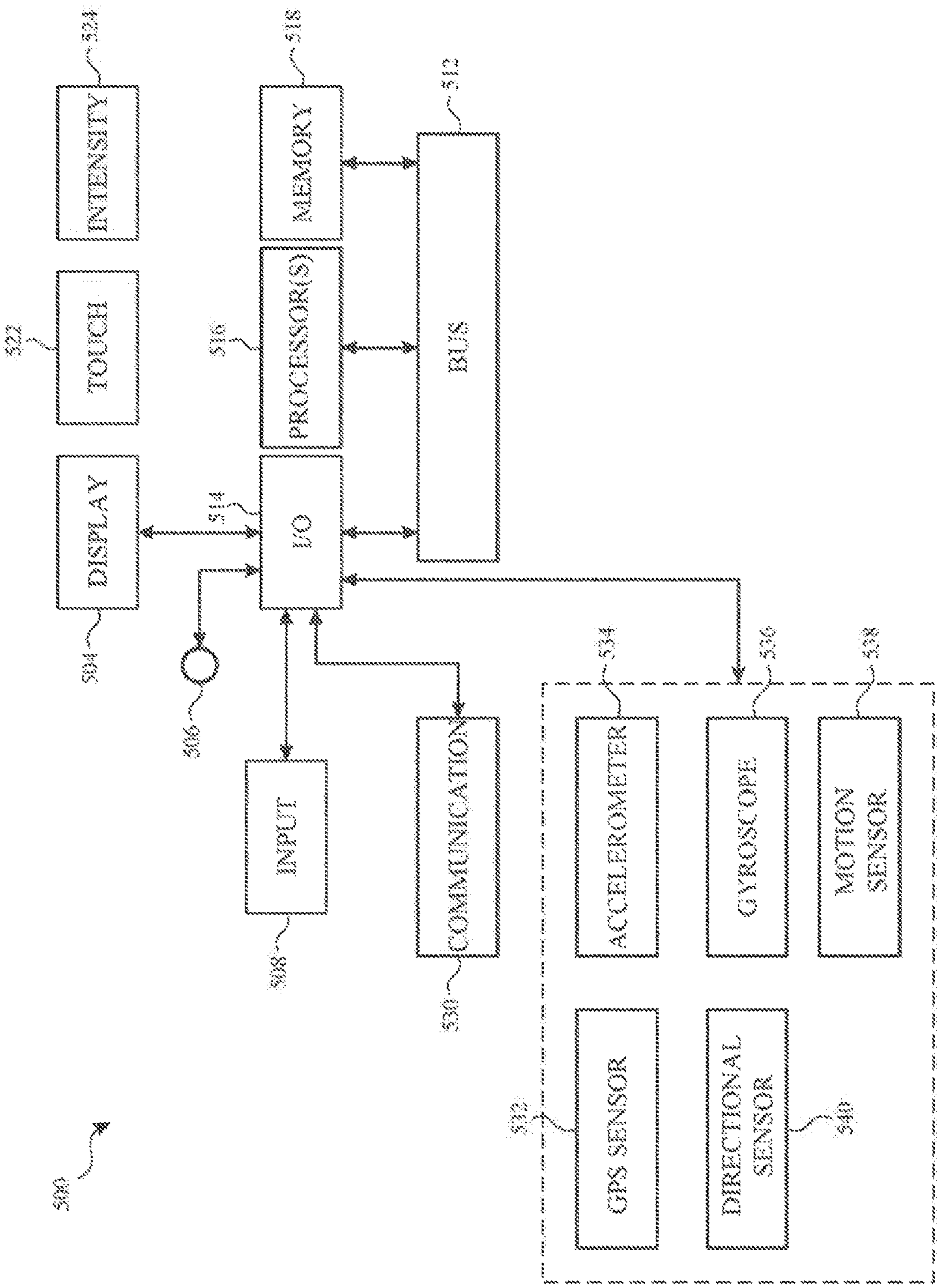
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, 1700, 1800, 2000, 2200, 2400, 2600, 2800, 3000, 3200, 3400, 3600, and 3800 (FIGS. 7, 9, 11, 13, 15, 17, 18, 20, 22, 24, 26, 28, 30, 32, 34, 36, and 38). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
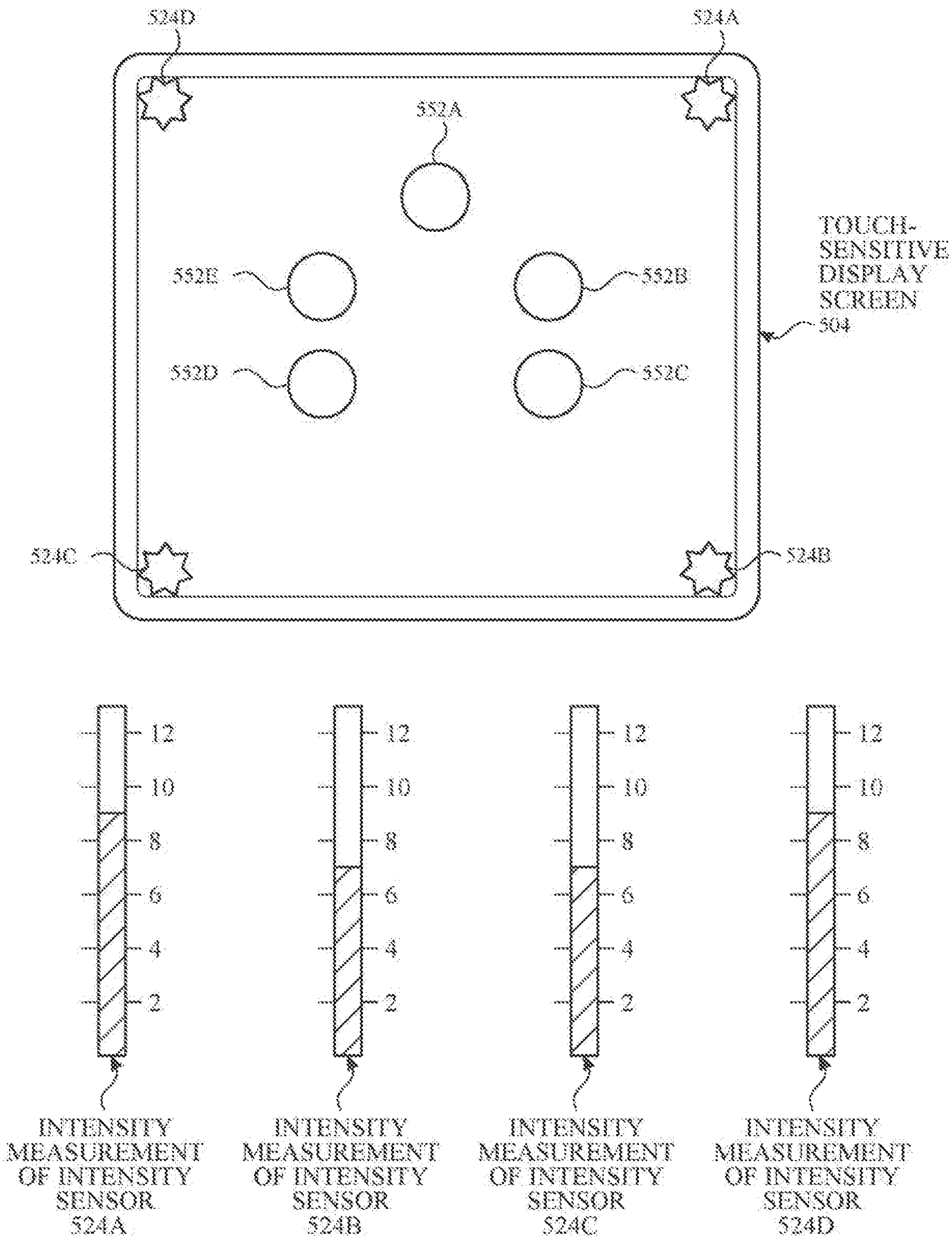
FIGS. 5C-5D illustrate exemplary components of a personal electronic device having a touch-sensitive display and intensity sensors in accordance with some embodiments.
Figure 5D:
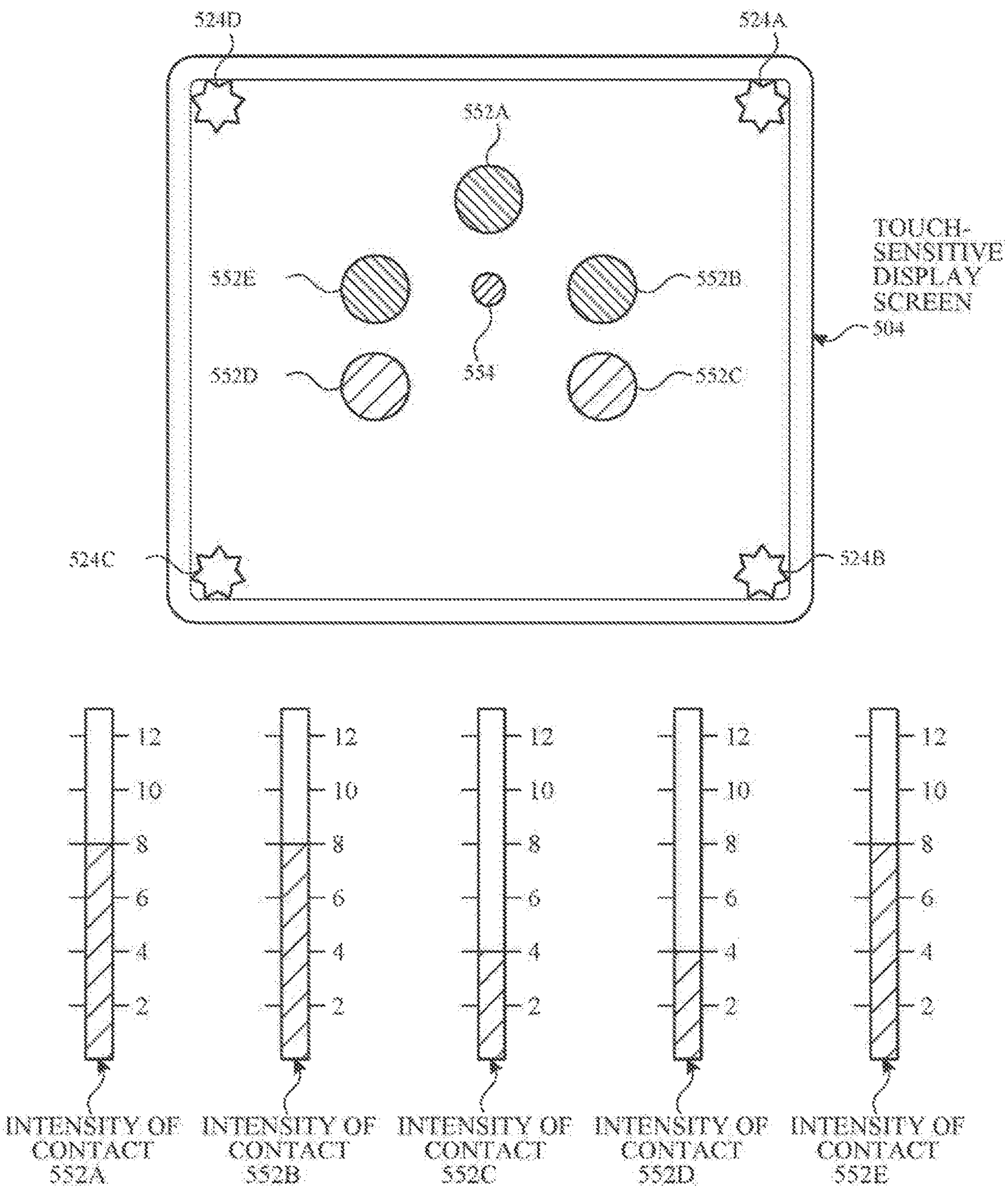

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
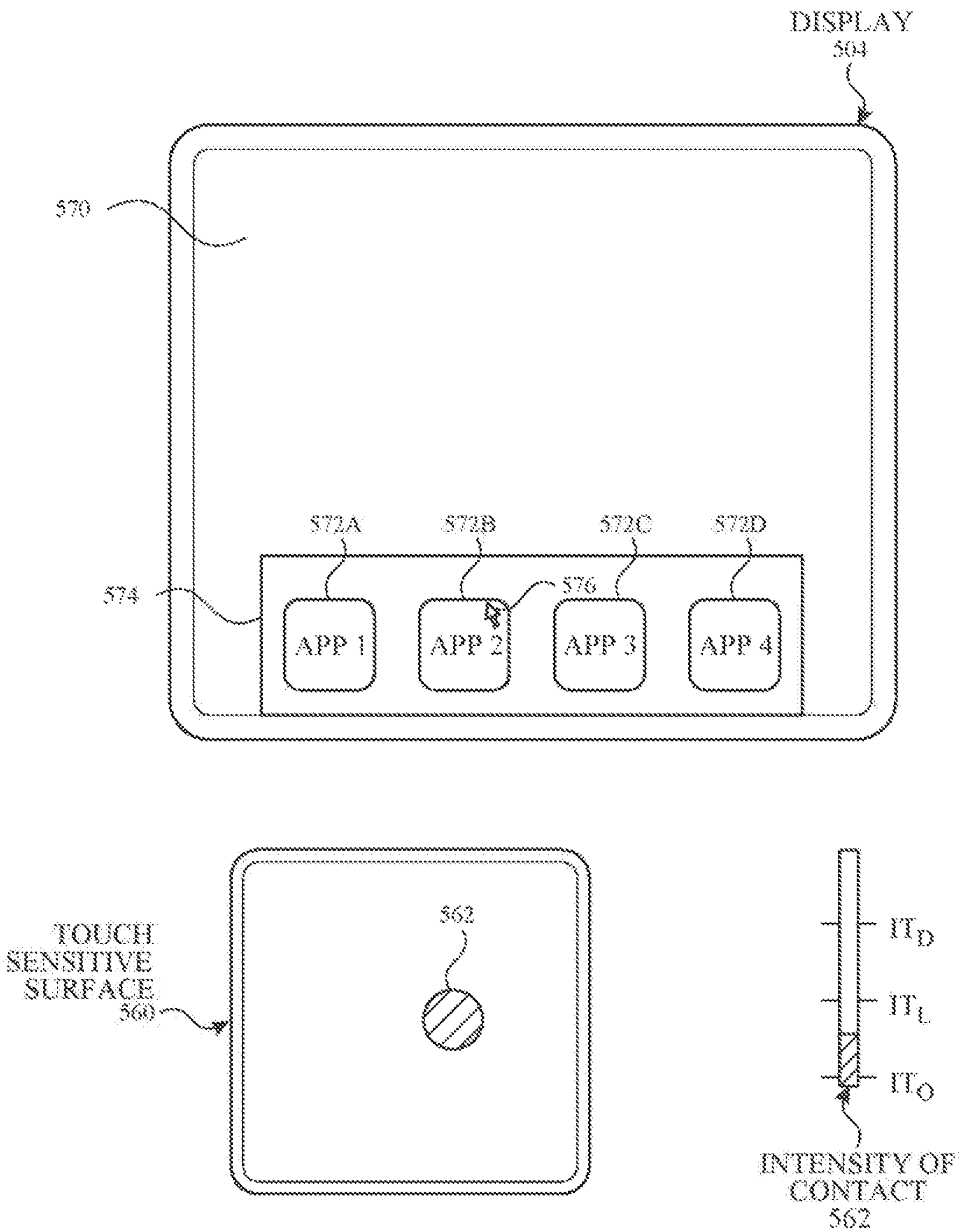
FIGS. 5E-5H illustrate exemplary components and user interfaces of a personal electronic device in accordance with some embodiments.
Figure 5F:
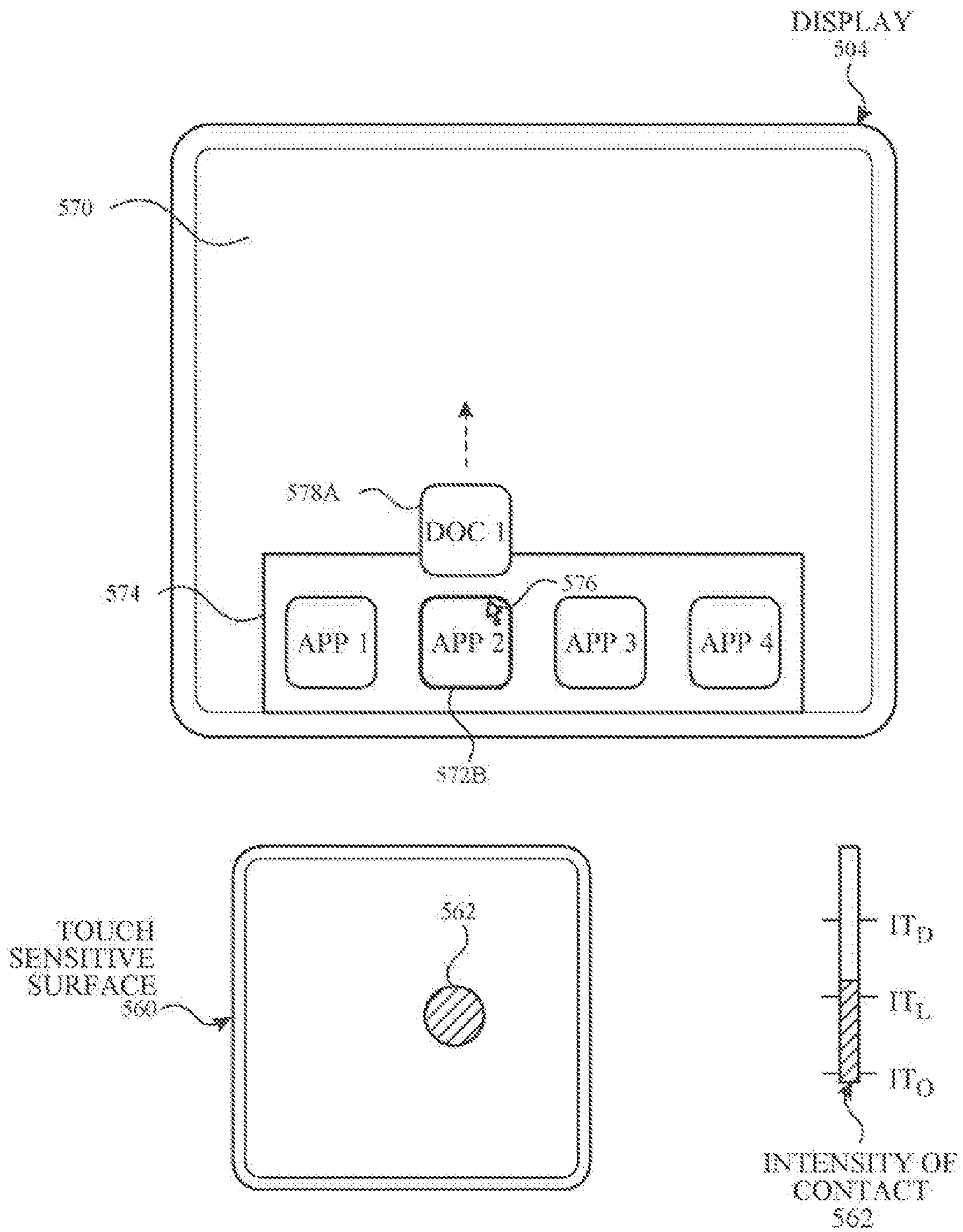
Figure 5G:
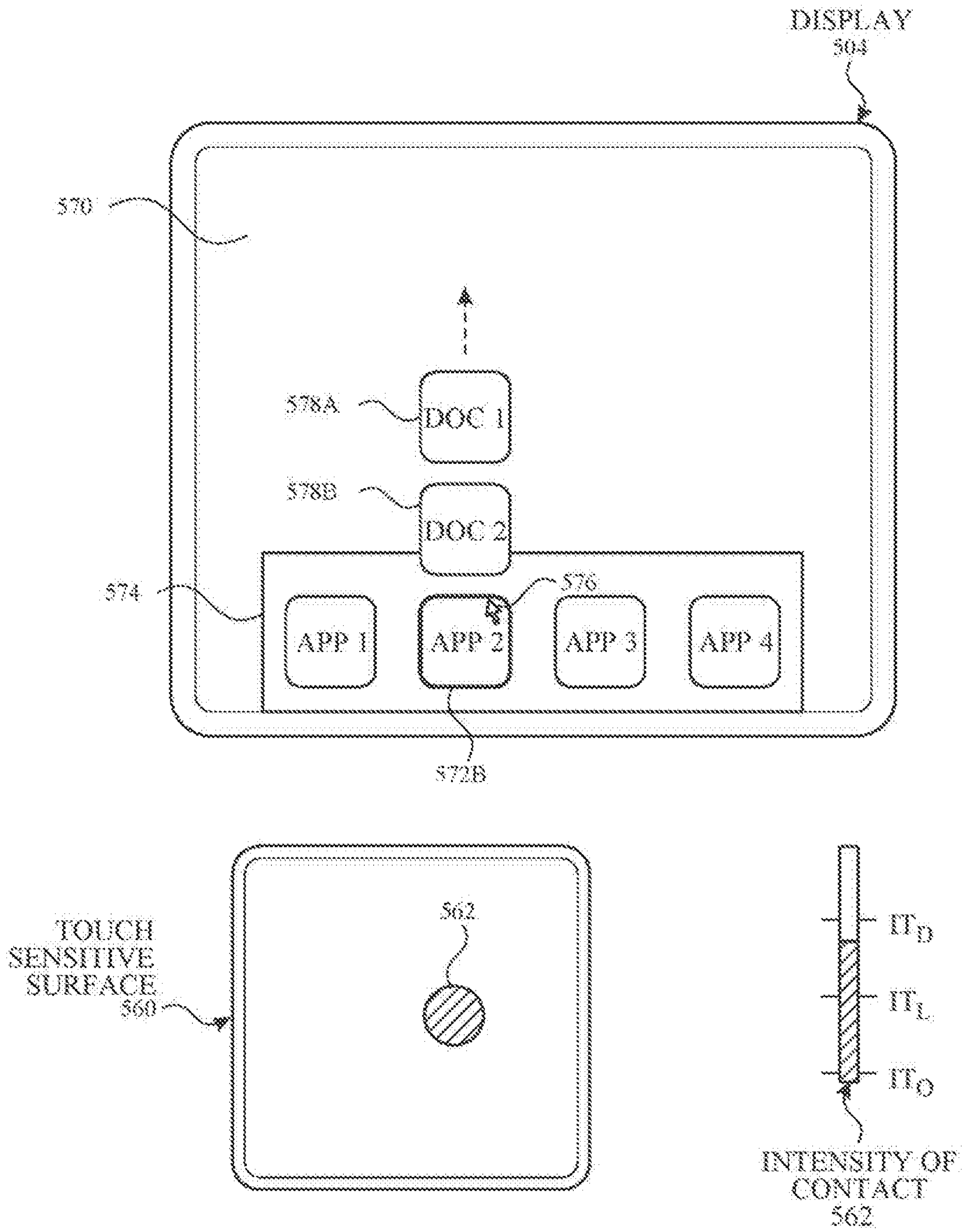
Figure 5H:
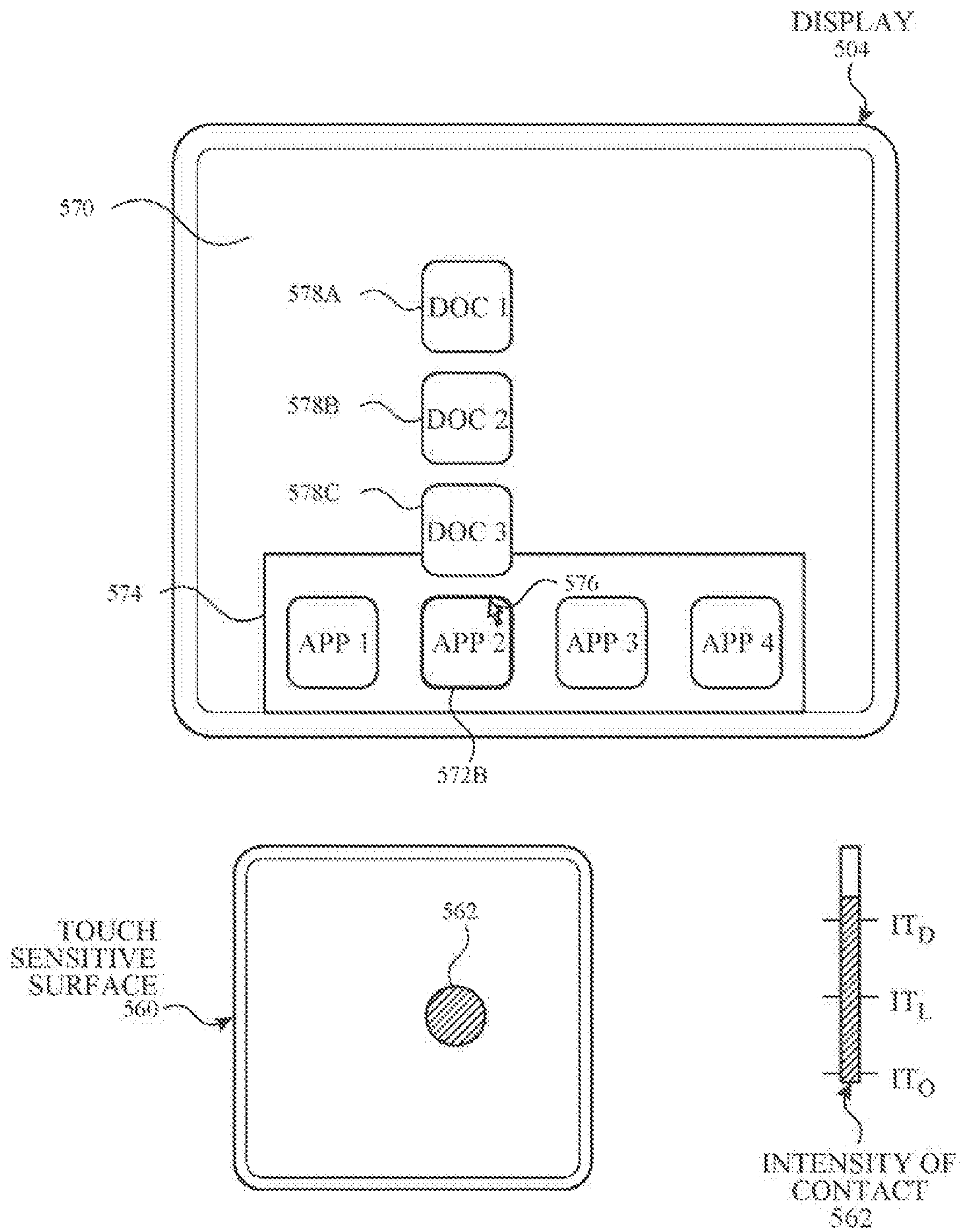

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5I:
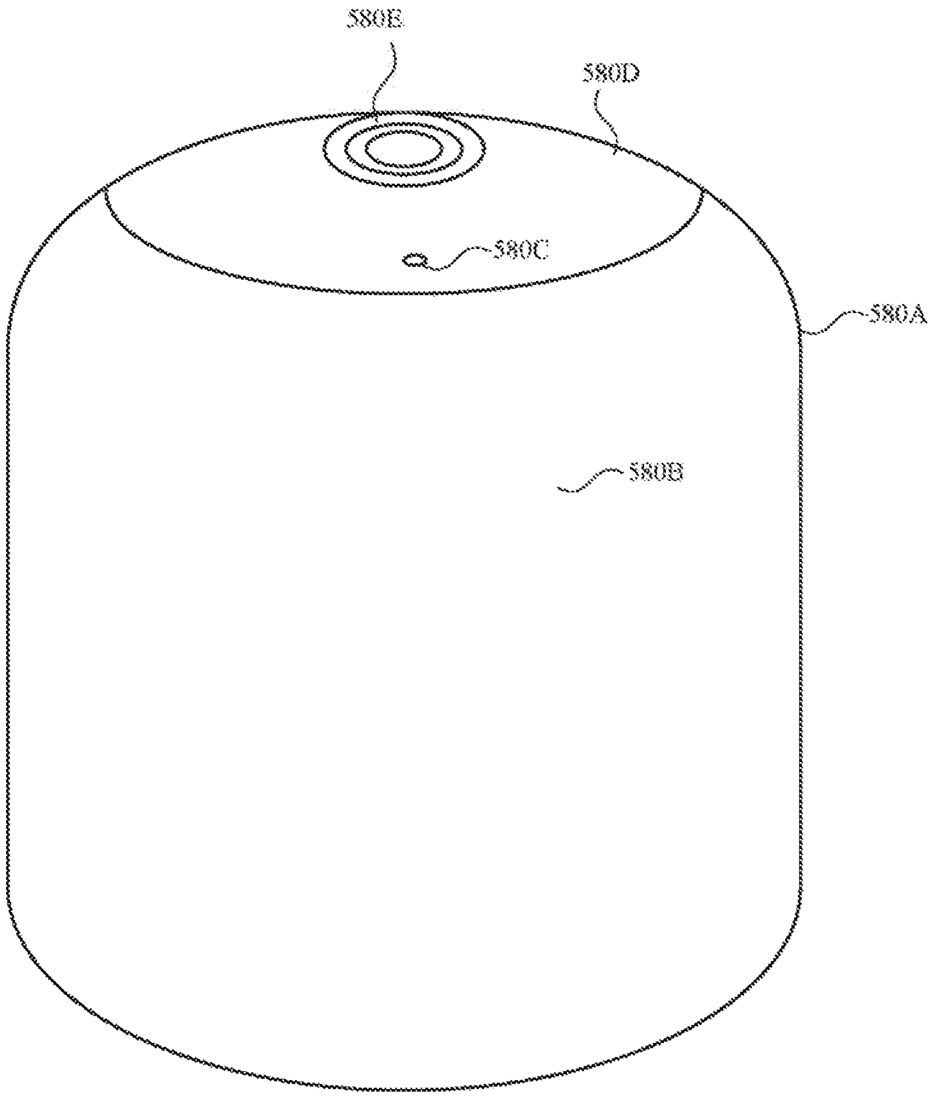
FIG. 5I illustrates an electronic device in accordance with some embodiments.

FIG. 5I illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5J:
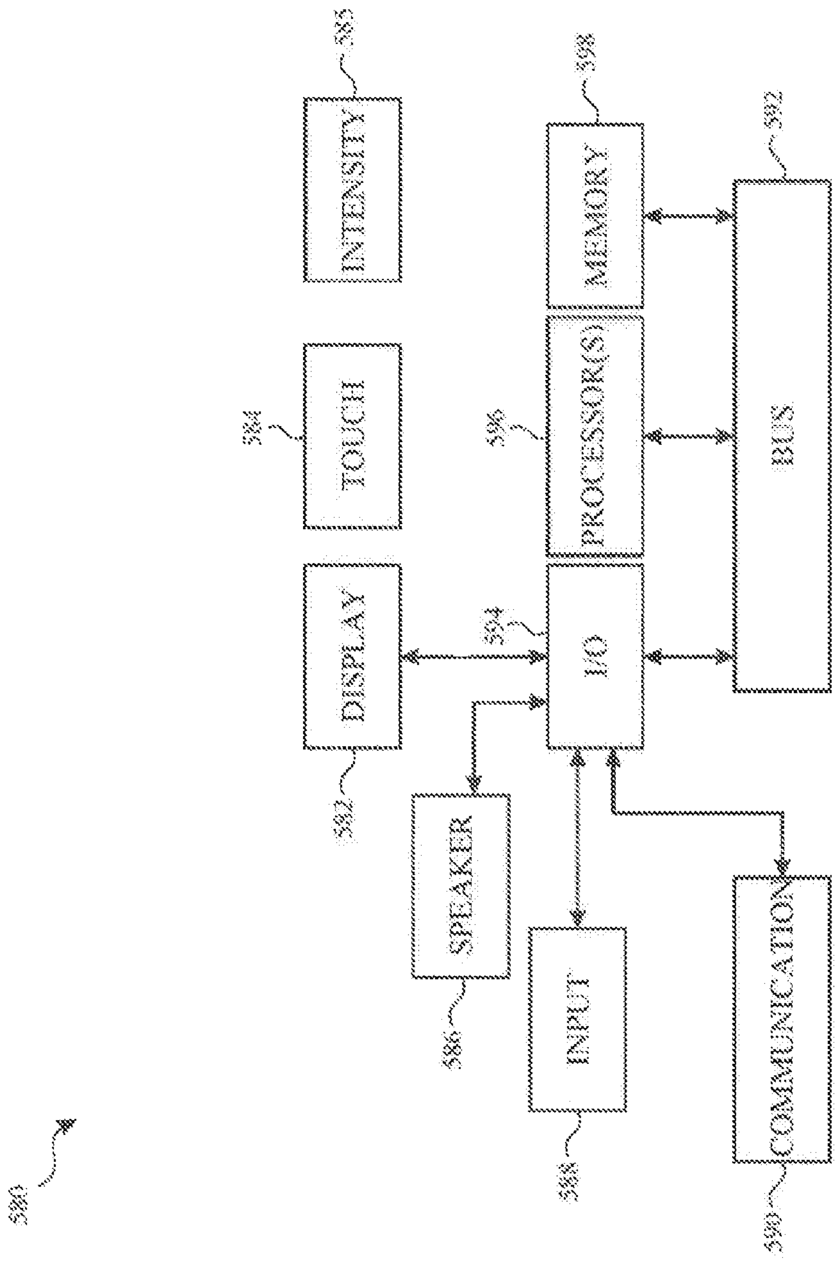
FIG. 5J is a block diagram illustrating an electronic device in accordance with some embodiments.

FIG. 5J depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 700, 900, 1100, 1300, 1500, 1700, 1800, 2000, 2200, 2400, 2600, 2800, 3000, 3200, 3400, 3600, and 3800 (FIGS. 7, 9, 11, 13, 15, 17, 18, 20, 22, 24, 26, 28, 30, 32, 34, 36, and 38). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5J, but can include other or additional components in multiple configurations.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AR illustrate exemplary user interfaces for accessing media playback status of a plurality of available playback devices, in accordance with some embodiments. The user interfaces in these figures are used to illustrate the processes described below, including the processes in FIGS. 7A-7D.

Figure 6B:
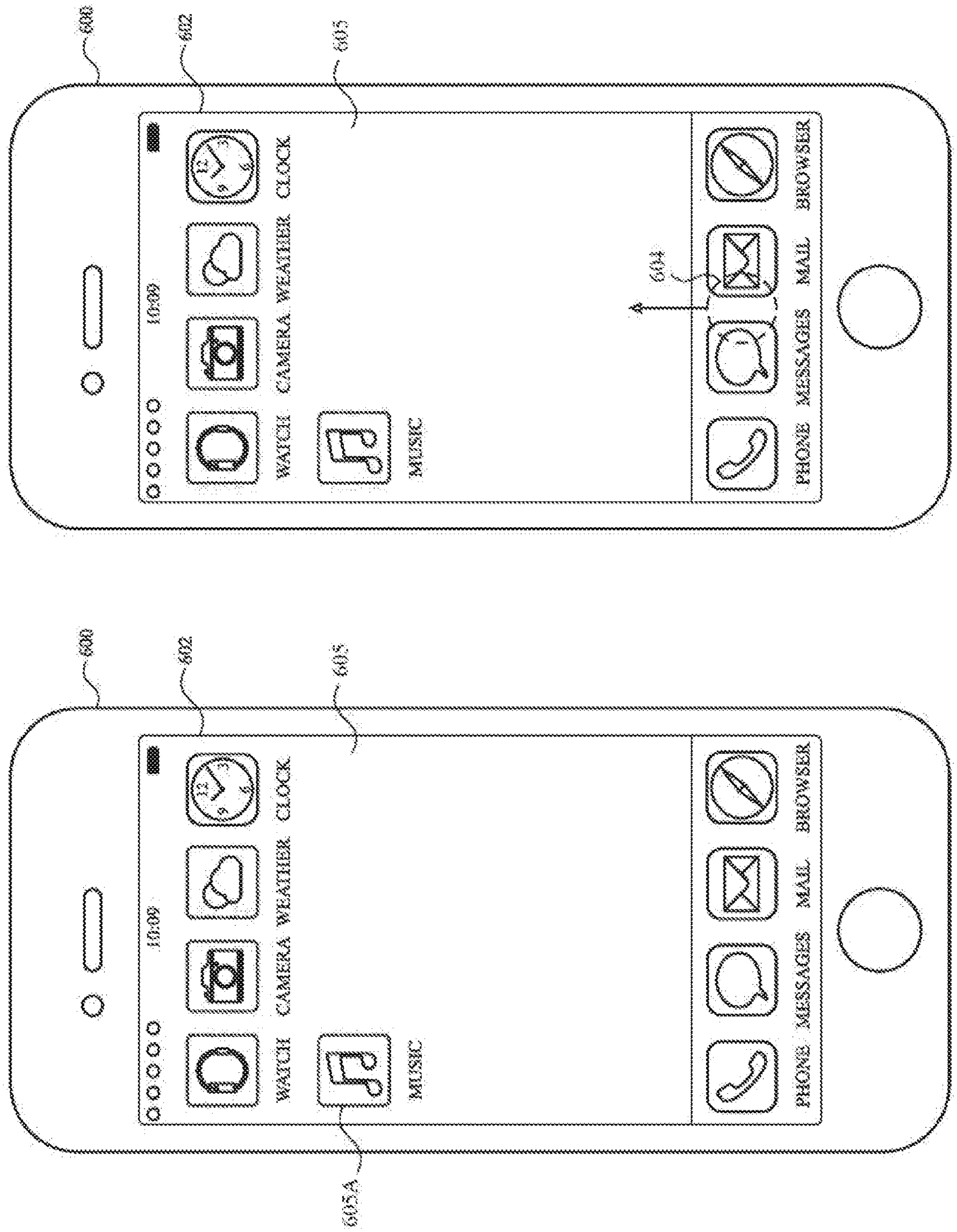

FIGS. 6A-6B illustrate exemplary user interfaces for managing and controlling a group of devices. In some embodiments, the group of devices includes devices that are placed throughout a user's home to perform various functions. Such functions can include controlling smart devices (e.g., light bulbs, thermostats, media devices), configuring home automation, and controlling home entertainment.

FIG. 6A depicts home summary screen 601 (on display 602 of device 600), which represents an exemplary interface for a home control application (also referred to as a "device management application") executing on device 600. In some embodiments, device 600 includes one or more features of device 100, 300, or 500. An example of a home control application is "Home" (by Apple Inc., of Cupertino, Calif., USA). The home summary screen 601 includes scenes (e.g., pre-configured collection of settings for one more home devices) that have been stored, as well as an indication of devices in the user's home (also referred to as "home devices" or the like). The home devices are represented by indicators 601A-601C. Indicator 601A corresponds to the device named "Smart Speaker 1" in the room "Living Room". Indicator 601B corresponds to the device named "Smart Speaker 2" in the room "Kitchen". Indicator 601C corresponds to the device named "Smart Bulb" in the room "Bedroom". Exemplary interfaces and techniques for a home control application described in U.S. Patent Application 62/349,057, "User Interface for Managing Controllable External Devices," filed Jun. 12, 2016, which is hereby incorporated by reference in its entirety.

FIG. 6A also depicts exemplary home configuration screen 603, which illustrates an exemplary interface for managing configuration settings associated with the home devices represented in home summary screen 601. In some examples, device 600 displays home configuration screen 603 in response to user input selection of affordance 601D at home summary screen 601. At home configuration screen 603, a user can edit the name of the home ("Home" in this example), edit the members of a home (e.g., Users 1, 2, and 3 in this example), include notes to other members, among other functions. As can be seen, the "Home" in this example includes three members, User 1 (represented by indicator 603A), User 2 (represented by indicator 603B), and User 3 (represented by indicator 603C). In some examples, Users 1-3 represent users that live in the location that physically includes the home devices, collectively referred to as the "Home". Thus, Users 1-3 are members of the home. Being a member of a home (or other location), in some examples, provides the users with permission to control devices associated with the home. The users can control the home devices using one or more personal devices associated with at least one of the users. In some examples, a device is associated with a user when it is logged into an account associated with (e.g., owned by) the user. For example, devices that are logged into one or more user accounts associated with exemplary Users 1-3 described above are associated with at least one user, and specifically, at least one user of the Home (e.g., home devices).

FIG. 6B depicts exemplary user interfaces of a portable electronic device 600. Device home screen 605, displayed on display 602, is an exemplary default home screen of device 600. Device home screen 605 includes affordances associated with applications stored on the device. For example, affordance 605A corresponds to a music application. Selection of affordance 605A, in some examples, causes the device to display a user interface of the corresponding music application. FIG. 6B also depicts exemplary user input 604, received by device 600 while displaying screen 603. In this example, user input 604 is a swipe gesture (e.g., touch input followed by a drag) on a touch-sensitive display 602 of device 600. In the example depicted in FIG. 6B, the user input 604 is a swipe gesture from an edge of the touch-sensitive display 602. In some embodiments, user input 604 is an arcuate swipe gesture. For example, an arcuate swipe gesture is a gesture than includes both a horizontal component (e.g., x-direction) and a vertical component (e.g., y-direction) that satisfy arcuate criteria. For instance, user input 604 can be a touch and drag on a touch-sensitive surface that traces the form of a quarter-circle. In response to input 604, device 600 displays a Control Center interface (e.g., FIGS. 6C and 6D).

Figure 6C:
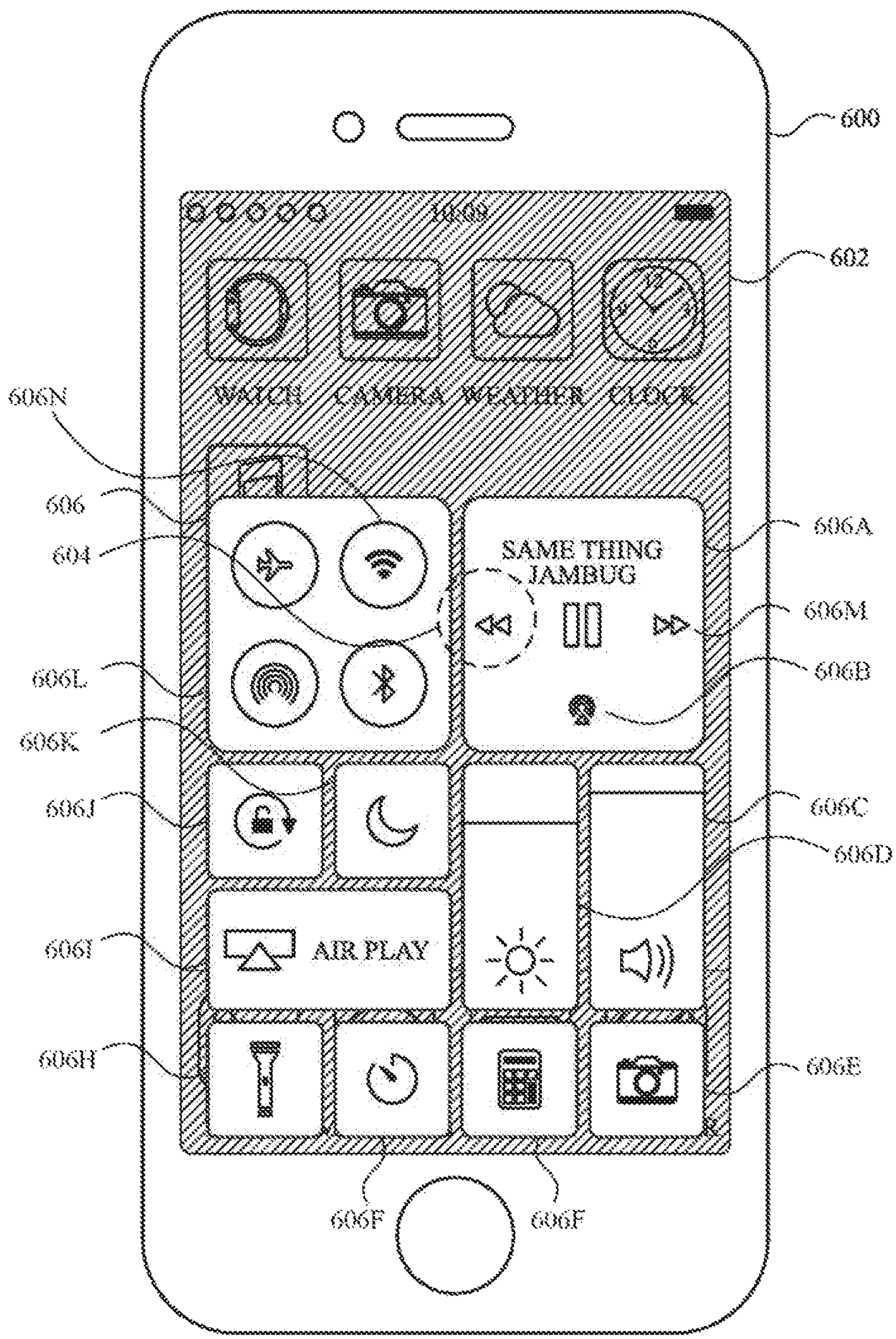

FIG. 6C illustrates an exemplary control center interface. Control center interface 606 includes various affordances for controlling various functions and/or components of device 600. In the example depicted, control center interface 606 includes exemplary illustrations of: a media control interface 606A, a volume control interface 606C, a screen brightness control interface 606D, a camera affordance 606E, a calculator affordance 606F, a timer affordance 606G, a flashlight affordance 606H, a wireless media streaming affordance 6061, a screen rotation lock affordance 606J, a do not disturb affordance 606K, wireless antenna control interface 606L. Exemplary media control interface 606A includes media playback controls 606M (e.g., previous track, pause/play, next track) and a device selection affordance 606B. Exemplary wireless antenna control affordances 606L includes an affordance 606N for toggling (e.g., turning on and turning off) a Wi-Fi function of device 600.

Figure 6D:
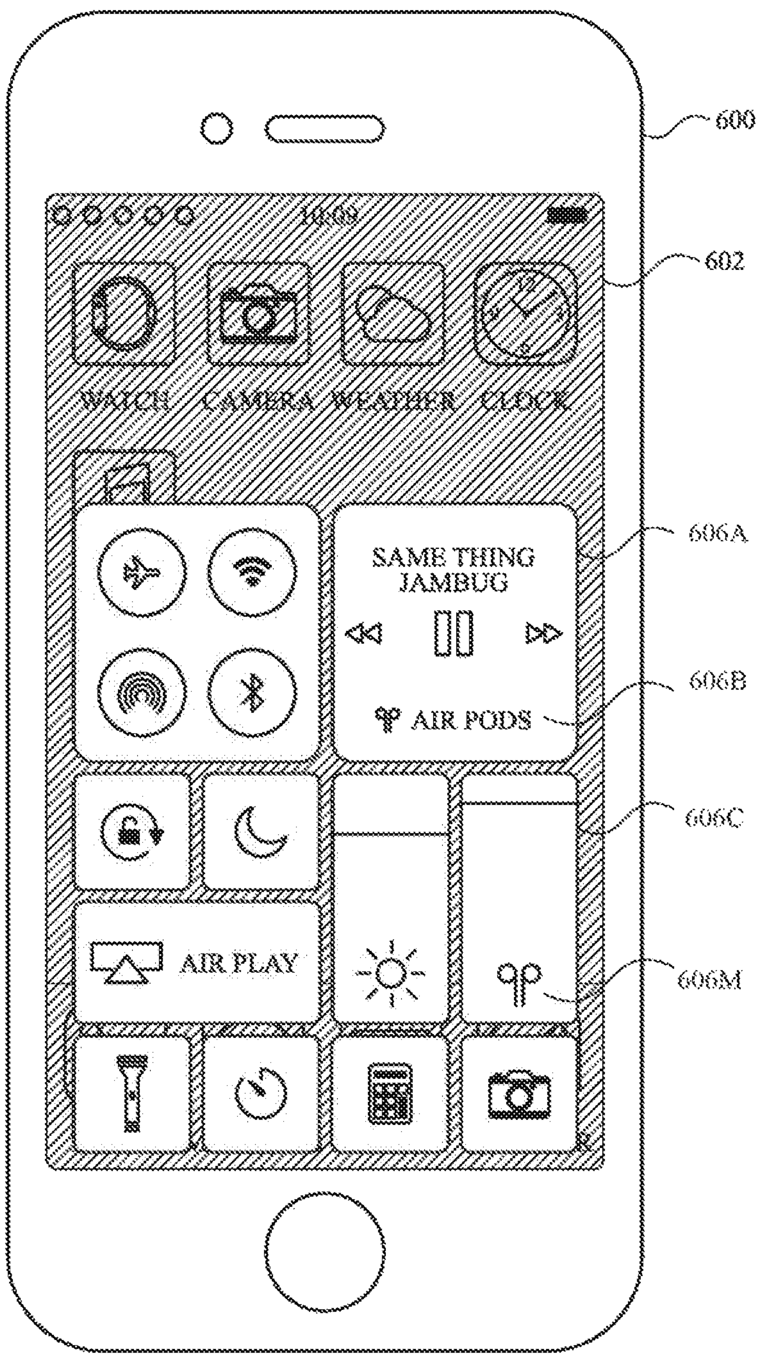

FIG. 6D illustrates another exemplary Control Center interface 606 when device 600 is playing back media through an external device. As shown in FIG. 6D, the device selection affordance 606B includes an indication that the media that is currently being played back (e.g., the song track "Same Thing" by the artist "Jambug") is being played back though an external device (or devices) named "AirPods". Thus, the media control interface 606A indicates the media currently being played (otherwise referred to as being played back, currently playing back, or the like) as well as the device on which the audio output is being routed. In this case, the audio output is generated by wireless personal earbuds ("AirPods" by Apple Inc. of Cupertino, Calif. USA). FIG. 6D also shows volume control affordance 606C including an indicator 606M representative of the "AirPods" device, indicating that the volume control affordance 606C can be used to adjust the volume of the audio output of the external device "AirPods".

Figure 6E:
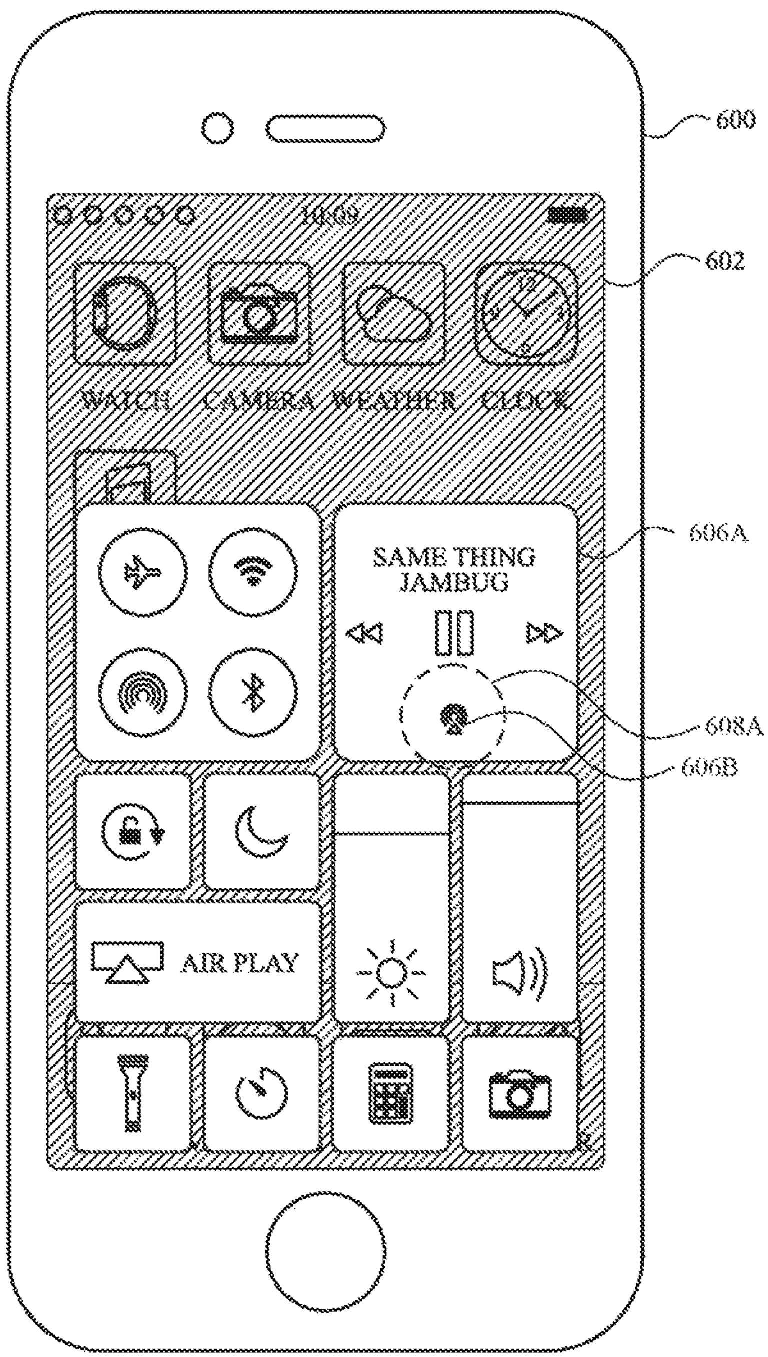

FIG. 6E illustrates the exemplary Control Center interface, as shown in FIG. 6C, but with a user input 608A on device selection affordance 606B. In some embodiments, device 600 displays a multi-device interface (e.g., as shown in FIG. 6J) in response to receiving user input 608A. For example, user input 608A is a touch on the device selection affordance (e.g., also referred to as a "tap" or a "press").

Figure 6F:
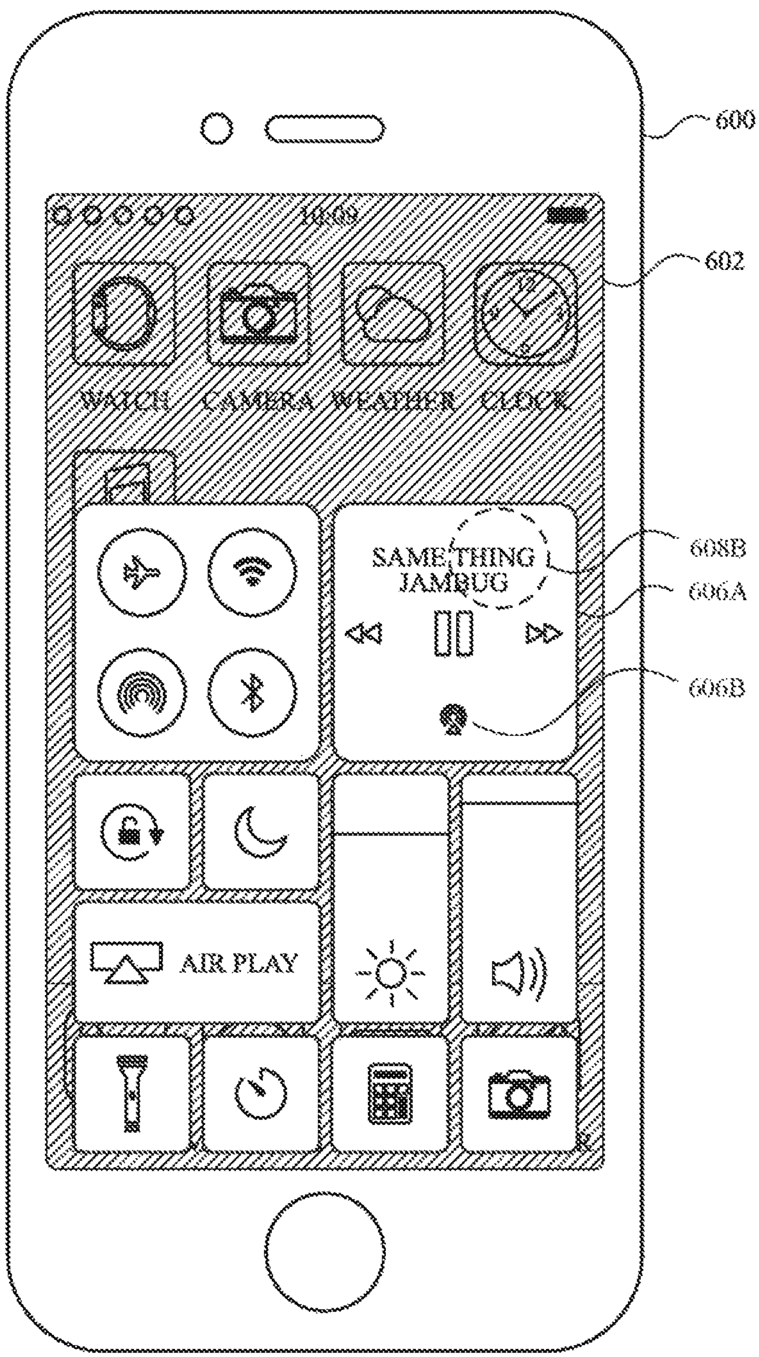

FIG. 6F illustrates the exemplary Control Center interface, as shown in FIG. 6C, but with a user input 608B at a location on the media control interface 606A. In some embodiments, device 600 displays a multi-device interface (e.g., as shown in FIG. 6J) in response to receiving user input 608B. In some examples, user input 608B is a deep press (e.g., a touch having a characteristic intensity that meets an intensity-dependent criteria). In some examples, an intensity-dependent criteria is whether a characteristic intensity of a touch exceeds a threshold intensity. In some examples, user input 608B is a tap and hold (e.g., a touch input that is continuously detected on a touch-sensitive surface of device 600 for greater than a threshold length of time). In some examples, the user input 608B (e.g., whether a deep press, or a tap and hold input) can be received at any location (e.g., completely or partially within) on media control interface 606A. For example, in response to receiving the user input 606B on a playback control affordance (e.g., 606M), the device 600 performs an operation different than it would had the user input been a tap (e.g., the device 600 performs a second operation, rather than a playback control operation such as pausing playback).

Figure 6G:
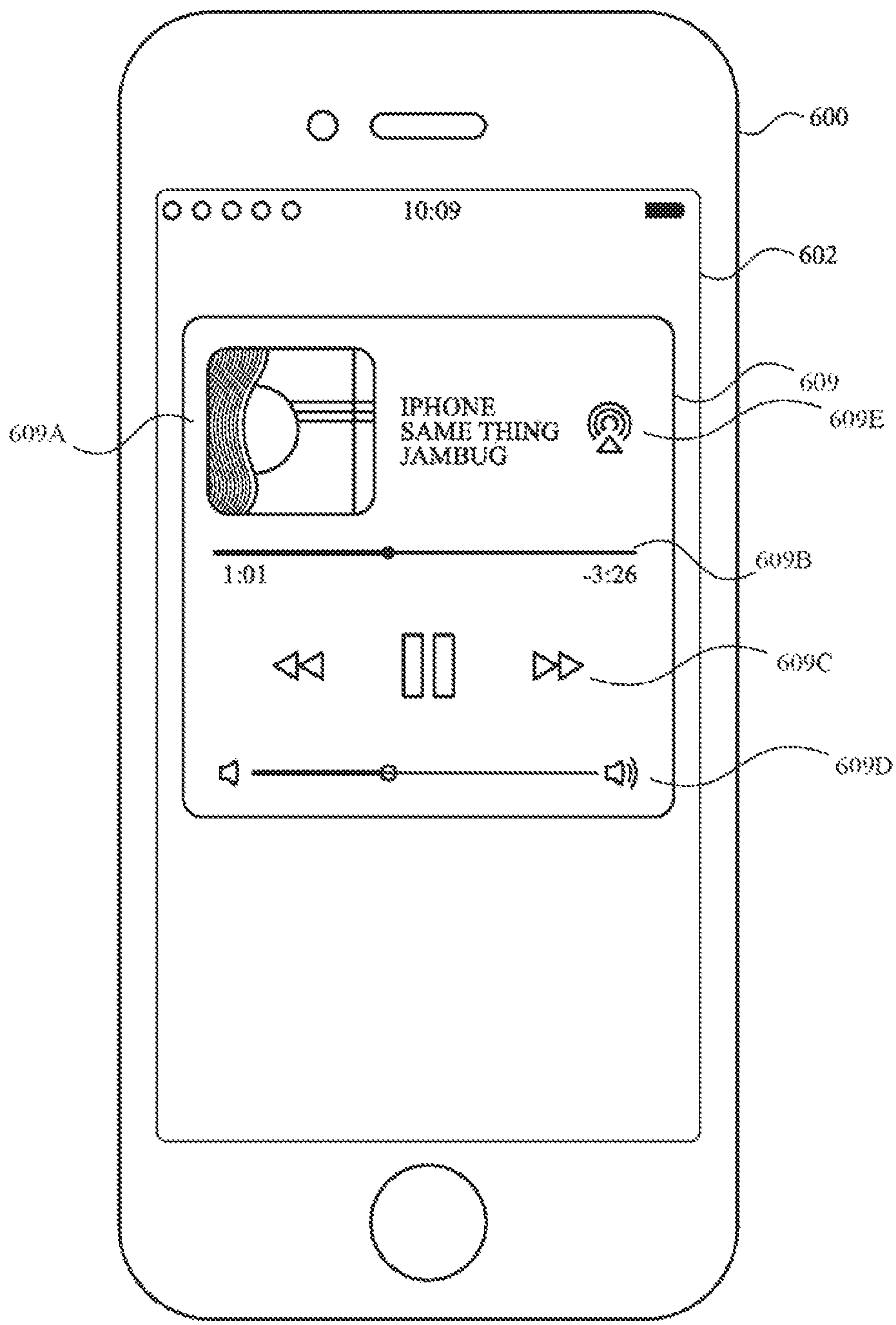

FIG. 6G illustrates an exemplary expanded media control interface for a device. In some embodiments, device 600 displays expanded media control interface 609 of FIG. 6G in response to receiving user input 608B. As shown, the expanded media control interface 609 includes an indicator 609A representing media that is currently being played back on the device 600. In this example, the device 600 is named "iPhone" and is currently playing the media track "Same Thing" by the artist "Jambug". Indicator 609A includes a graphic to the left of the track name, representing an album cover associated with the media track. The graphic included in the indicator 609A, in some examples, can be any graphic that is associated with a media track or that can otherwise provide a visual representation of the currently playing media. For example, other appropriate graphic indicators include, but are not limited to, an artist photo, an album cover, a movie cover, a movie poster, a stylized depiction of text, or the like. The exemplary expanded media control interface 609 includes a media progress indicator 609B (e.g., depicting temporal progress through the media track (time elapsed), and the amount of time until the end of the current media (time remaining)). Exemplary expanded media control interface 609 also includes playback control affordances 609C (e.g., that function similar or the same to those described above), volume control affordance 609D (e.g., that function similar or the same to those described above), and a device selection affordance 609E.

Figure 6H:
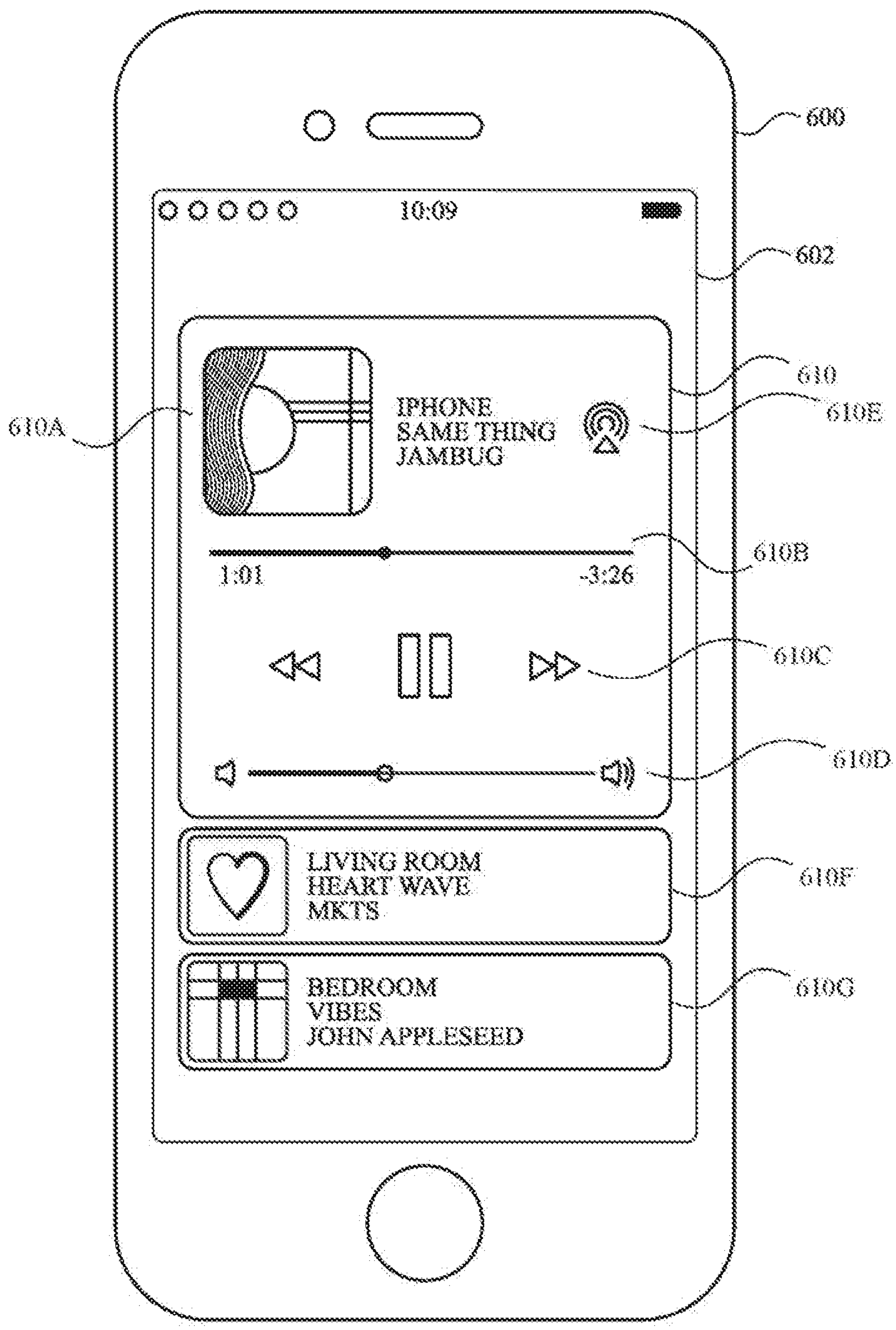
Figure 6I:
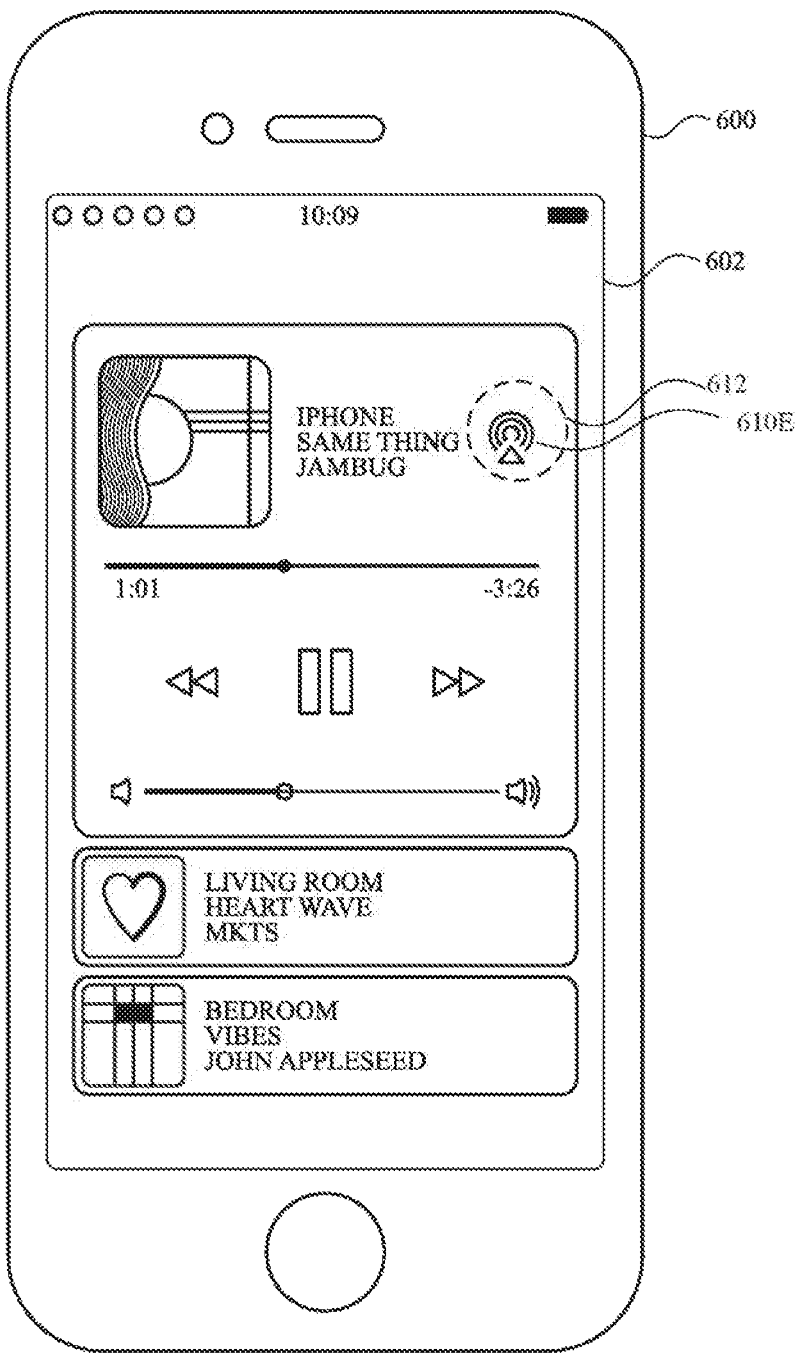
Figure 6J:
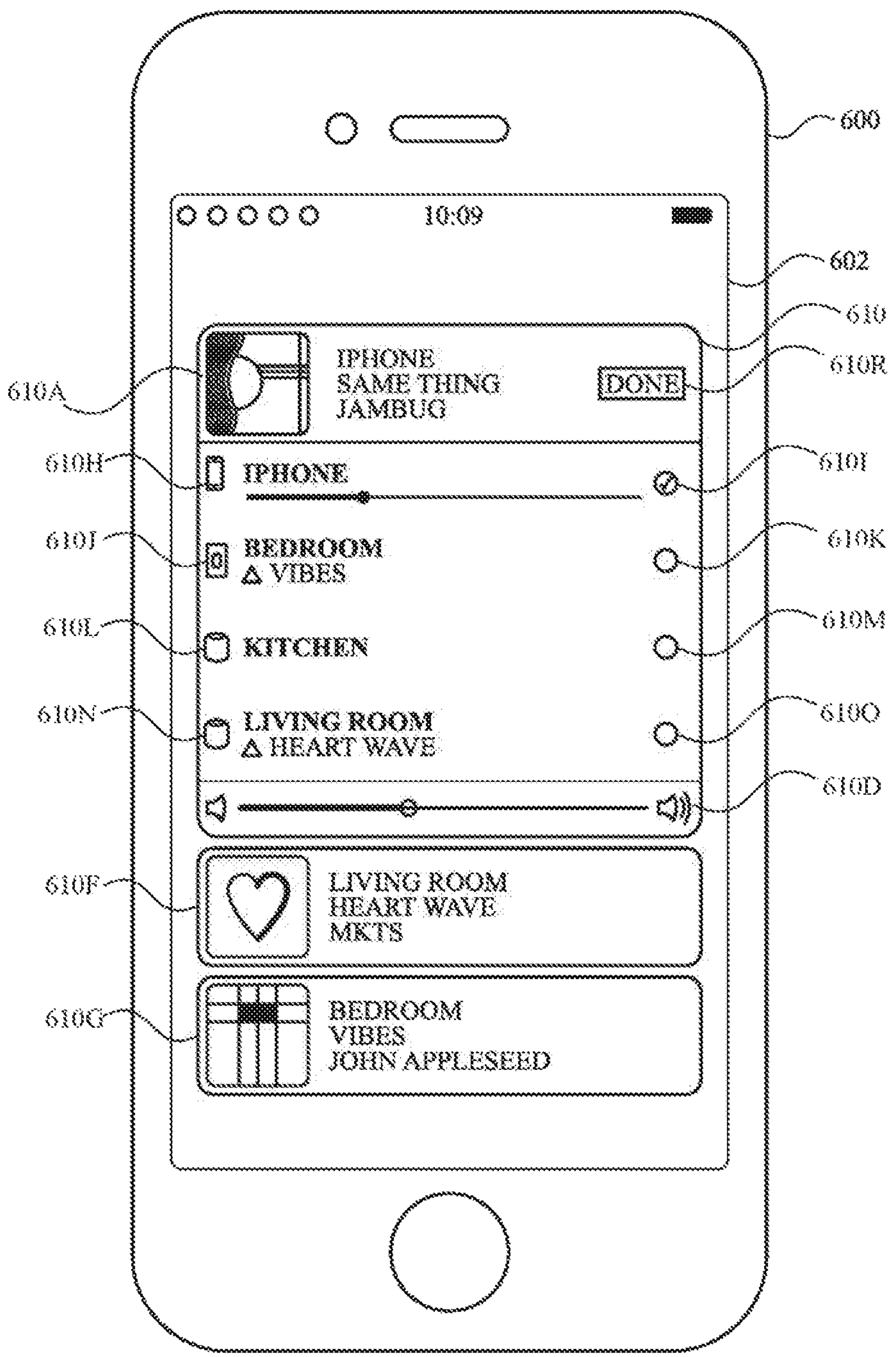

FIGS. 6H-6N illustrate exemplary multi-device interfaces in accordance with some embodiments. FIG. 6H depicts an exemplary multi-device interface 610 that includes affordances 610B-610D for the current device 600. In some embodiments, device 600 displays multi-device interface 610 in response to receiving user input 608A. In some embodiments, device 600 displays multi-device interface 610 in response to receiving user input 608B.

As shown in FIG. 6H, multi-device interface 610 includes, as described above regarding expanded media control interface 609, an indicator 610A representing media (that is currently being played back on the device 600, which is named "iPhone"), a media progress indicator 610B (e.g., depicting temporal progress through the media track (time elapsed), and the amount of time until the end of the current media (time remaining)). Exemplary multi-device interface 610 also includes playback control affordances 610C (e.g., that function similar or the same to those described above), volume control affordance 610D (e.g., that function similar or the same to those described above), and a device selection affordance 610E. In contrast to the expanded media control interface 609 of FIG. 6G, multi-device interface 610 provides the user with information on the media playback status of multiple devices, as well as the ability to affect the same.

As shown in FIG. 6H, multi-device interface 610 also includes indicators associated with other playback devices. Indicator 610F corresponds to the one or more devices that are named (or in a set of devices named) "Living Room". In some embodiments, a set of devices can include one or more devices. The set of devices can be assigned the name "Living Room" based on their location within the user's home. For example, when configuring (e.g., using device 600 and a home control application) the one or more devices in the set named Living Room (e.g., before first use), the name "Living Room" is assigned to the one or more devices in the set. Thus, when selecting or viewing the playback status of devices throughout the home, the user is provided an intuitive identification of the set of devices by location. In some embodiments, the name of a device or a device set is a default name. For example, if a device is not configured by a user to have a specific name, the device can simply be named "Device 1" or "Device 1—Living Room" if the location is associated (e.g., by a user or automatically). In some embodiments, the name of a device or a device set is a user-configured name. For example, the user selects a name from a predefined set of names. In some examples, the name displayed for a device (e.g., in a multi-device interface) is the location of the device. For example, a device can be named (e.g., in a configuration setting or a home control application) "Tim's Speaker" but appear as "Tim's Room" based on a location associated with the device. In some embodiments, a set of devices is a custom name. For example, the user can assign personalized names to device sets, such as "Tim's Room". In some embodiments, a name other than a location name is used. For example, the user can give a set of devices an arbitrary name.

In this example, the set of devices named Living Room and represented by indicator 610F are currently playing back the media item titled "Heart Wave" by the artist "MKTS", which are indicated inside of indicator 610F. In some embodiments, a media item is one or more of a song, a video, a podcast, an audio stream, a video stream, an audio file, a video file, an e-book (e.g., also referred to as an electronic book), a text document, a webpage, a phone call, a video call, or the like. Indicator 610G corresponds to the set of devices named or included in the set named "Bedroom", which are currently playing back the song titled "Vibes" by artist "John Appleseed". In some embodiments, an indicator for a set of devices (e.g., indicator 610F and 610G) is displayed (e.g., in a multi-device interface) even when the corresponding set of devices is not currently playing back media. In some embodiments, an indicator for a set of devices (e.g., indicator 610F and 610G) is displayed (e.g., in a multi-device interface) even when fewer than all devices in the corresponding set of devices are currently playing back media. For example, if the set of Living Room devices includes three devices (e.g., three smart speaker devices, such as device 580), and only one of the devices is currently playing a media item (e.g., "Heart Wave" by "MKTS"), the corresponding indicator in the multi-device interface still includes an identification of currently playing back media (e.g., "Heart Wave" by "MKTS" is displayed inside of indicator 610F for the device set "Living Room").

In some embodiments, if individual devices of the set of devices are concurrently playing back different media items, the multi-device interface displays an indication that multiple media items are playing on the devices of a set of devices. For example, the multi-device interface can include a single indicator for the set (e.g., 610F) and an identification that multiple media items are being played back on those devices (e.g., "1 movie, 1 song"). For example, the multi-device interface can include two indicators (e.g., 610F) for the set and an identification of each respective media item being played back (e.g., an indicator like 610F for each media item, both identified as "Living Room", or identified as "Living Room—Device 1" and "Living Room—Device 2").

A set of devices can also be referred to as a set of "available playback devices". In some embodiments, available playback devices include one or more (e.g., remote, external) devices on which a current device (e.g., device 600) can control or affect playback (e.g., using a multi-device interface such as 610). For example, as shown in FIG. 6H, if the set of devices named Living Room includes three external devices (e.g., 580 of FIG. 5I) that are connected to device 600 via a communication link (e.g., Bluetooth, Wi-Fi, or the like), and can be controlled by instructions issued by device 600 (e.g., representing user input), the devices in the set named Living Room are "available playback devices". In some embodiments, affecting or controlling playback on an available playback device is subject to conditions or restrictions. For example, device 600 can see the devices in the Living Room represented by indicator 610F, but modifying the playback status of those devices can be subject to permission (e.g., if the media being played back on the Living Room devices was initiated by another device or user). In some embodiments, available playback devices include the current device. For example, in the example of the Living Room including three devices, a plurality of available devices includes device 600 as well as the three living room devices, for a total of at least four devices. Thus, multi-device interface 610 provides a convenient interface that provides an indication of what is currently playing on the current device, as well as on other devices.

In some embodiments, one or more devices automatically detect another device. In some embodiments, the devices then form a network between themselves. For example, two devices (e.g., 580) can detect each other after booting up for the first time (e.g., straight out of the box, without configuration by a user), establish a connection link between themselves (e.g., and between device 600), and appear in a multi-device interface (e.g., with a name such as "Speaker 1", and/or a location such as "No Location"). In some embodiments, the device (e.g., 580) is configured to part of a user's home (e.g., the home devices). One of skill in the art will appreciate that a variety of techniques can be used to interconnect and/or transmit information between devices (e.g., 580, 600), which are all intended to be within the scope of this disclosure, and thus additional details are not included here.

In FIG. 6I, device 600 receives user input 612 representing selection of device selection affordance 610E. For example, user input 612 can be a tap or touch on a location associated with the displayed device selection affordance 610E.

FIG. 6J illustrates an exemplary multi-device user interface, in accordance with some embodiments. In some embodiments, device 600 displays multi-device interface 610 in response to receiving user input 608B. In some embodiments, device 600 displays multi-device interface 610 in response to receiving user input 612. In some examples, a multi-device interface is displayed in response to selection of a device selection affordance (e.g., 610E of FIG. 6I) in any media application.

As shown in FIG. 6J, multi-device interface 610 includes individual indicators 610H-610O for each device of the available playback devices. In the depicted example, the individual indicators are visually associated with the indicator 610A (which identifies the media item "Same Thing" by "Jambug", as well as the devices currently playing back the media, in this case only the device named "iPhone"). Indicator 610H identifies the current device (named "iPhone") and includes the selection indicator 610I. In this example, selection indicator 610I includes a checkmark, which indicates that the device 610H is currently playing back the media of indicator 610A. Indicator 610J identifies the set of devices named "Bedroom" and includes indicator 610K, which does not include a checkmark (e.g., the Bedroom set of devices is not currently playing back the media track "Same Thing" by "Jambug"). Indicator 610J also includes an indication that the Bedroom set of devices are currently playing back other media. For example, in FIG. 6J, the indicator 610J includes the title of the track "Vibes". The visual indication communicates to the user that the Bedroom devices set is currently busy. If the user wishes to add the Bedroom device set to the current playback of "Same Thing" by "Jambug" (e.g., by selecting indicator 610K), doing so would interrupt media that is currently playing in the Bedroom. Indicator 610L identifies the set of devices named "Kitchen" and includes indicator 610M, which does not include a checkmark (e.g., the Kitchen set of devices is not currently playing back the media track "Same Thing" by "Jambug"). Indicator 610N identifies the set of devices named "Living Room" and includes indicator 610O, which does not include a checkmark (e.g., the Living Room set of devices is not currently playing back the media track "Same Thing" by "Jambug"). Indicator 610N also includes an indication that the Living Room set of devices are currently playing back other media. For example, in FIG. 6J, the indicator 610J includes the title of the track "Vibes".

As shown in FIG. 6J, the individual indicators are visually associated with the indicator 610A. As can be seen, the individual indicators 610H-610O are included within the box outline of indicator 610A. In some examples, this provides a visual indication that the multi-device interface is currently "targeted" or "focused" on the "media session" identified by indicator 610A. In some embodiments, a media session includes a device and a media item. In the example shown in FIG. 6J, indicator 610A represents a media session that includes the media item "Same Thing" by "Jambug", and the device "iPhone" (e.g., device 600). In some embodiments, a media session includes a plurality of devices. In some embodiments, a media session includes a plurality of media items. For example, a media session can include playback of a playlist or other collection of multiple media items. Visually associating the indicators for individual devices with an indicator for a media session, visually indicates that selecting an individual device will add a device to that media session. This visual indication is useful, for example, when there are multiple concurrent media sessions within the user's home. For example, indicators 610F and 610G represent, respectively, other media sessions (e.g., that represent playback of different media on different devices).

As shown in FIG. 6J, the indicators for individual devices have replaced the media playback control affordances (e.g., 610B-610D). In some embodiments, indicators for individual devices and media playback control affordances are concurrently displayed.

In some embodiments, an indicator associated with a set of devices or an individual device includes an identification of a user who initiated playback of media on, respectively, the set of devices or the individual device. For example, with reference to FIG. 6J, when media session in the Bedroom was initiated by a user (e.g., Steve), other than the user (e.g., Tim) that is currently associated with device 600, one or more of indicator 610G or indicator 610J can identify the user who initiated media playback in the Bedroom—for example, "Steve is playing Vibes by John Appleseed".

The multi-device interface 610 of FIG. 6J also includes affordance 610R. For example, selection of affordance 61OR can cause the indicators for individual devices to cease being displayed (and, for example, the media playback control affordances are again displayed). In some examples, if the device 600 received selection of one or more individual indicators 610K, 610M, or 610O (e.g., user input that causes device 600 to display checkmarks inside of the indicators), selection of affordance 610R causes the device 600, in response, to initiate media playback on the corresponding selected devices. In some embodiments, device 600 initiates playback in response to the selection of one or more individual indicators 610K, 610M, or 610O.

Figure 6K:
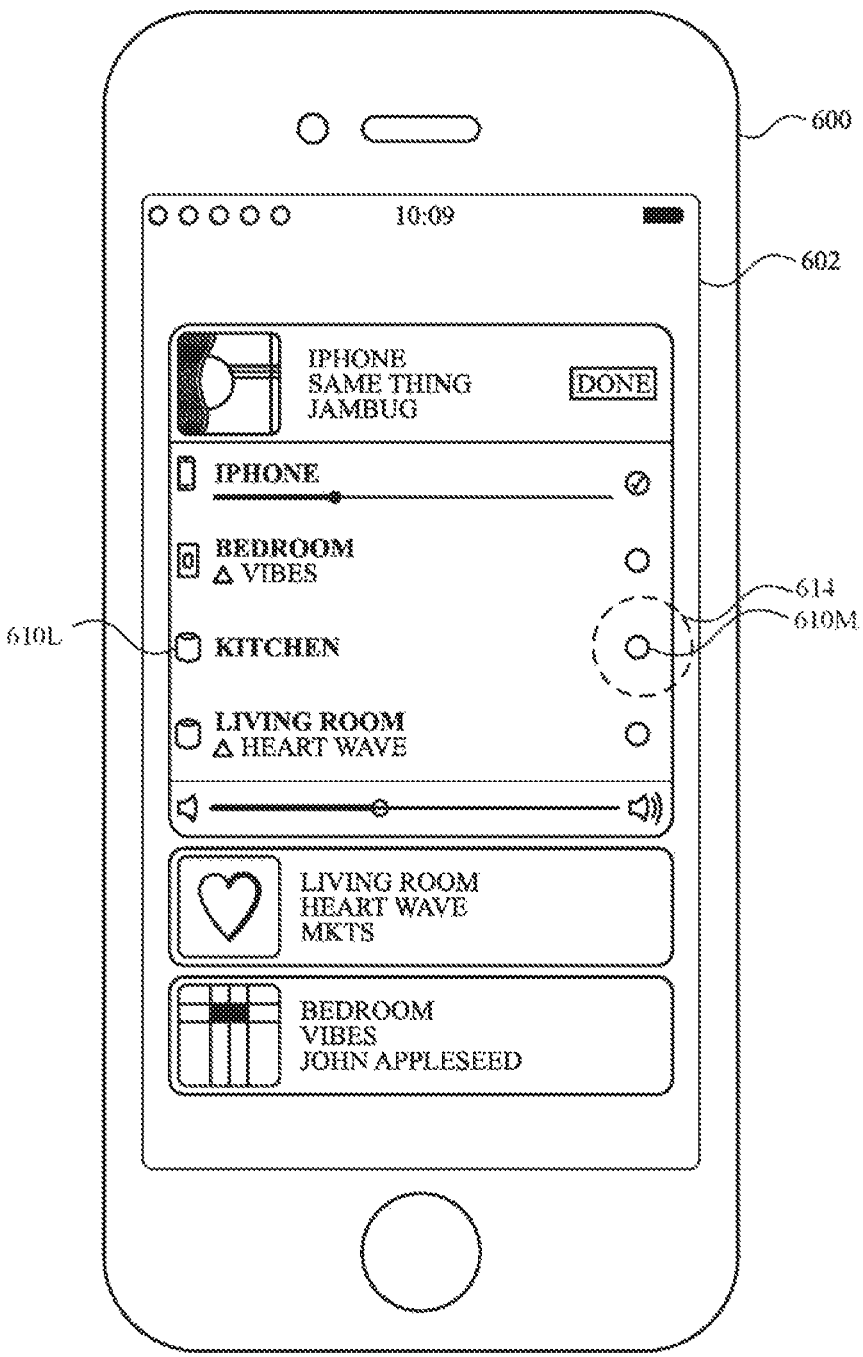

FIG. 6K illustrates device 600 receiving selection of an individual indicator for a device of the available playback devices. User input 614 is received on indicator 610, associated with the Kitchen set of devices (represented by 610L). In some examples, user input 614 is a tap or touch on a location associated with indicator 610M. In some examples, user input 614 is a deep press on a location associated with indicator 610M.

Figure 6L:
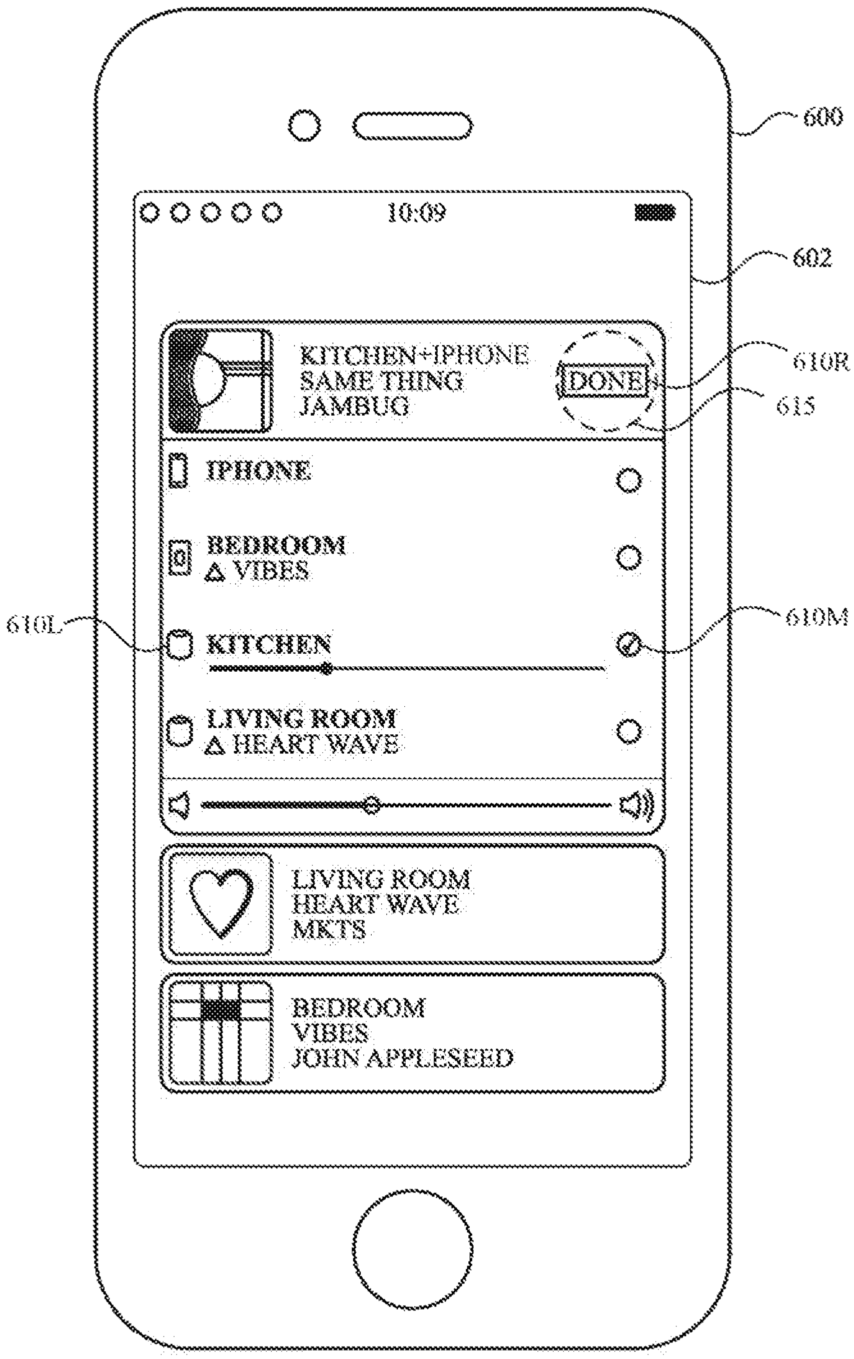

FIG. 6L illustrates an exemplary multi-device interface 610 after receiving selection (e.g., user input 614) of an individual indicator for a device of the available playback devices. As can be seen in FIG. 6L, the indicator 610A now includes an indication ("Kitchen+iPhone") that the current media session includes the Kitchen set of devices and the device named iPhone (e.g., device 600). Further, indicator 610L has been updated to include an individual volume control affordance, and indicator 610M now includes a checkmark. In some examples, the Kitchen device set is added to the current media session of indicator 610A in response to user input selection of their associated indicator 610M. In some examples, an additional user input (e.g., user input 615) on affordance 610R causes the Kitchen devices to be added to the current media session of indicator 610A.

Figure 6M:
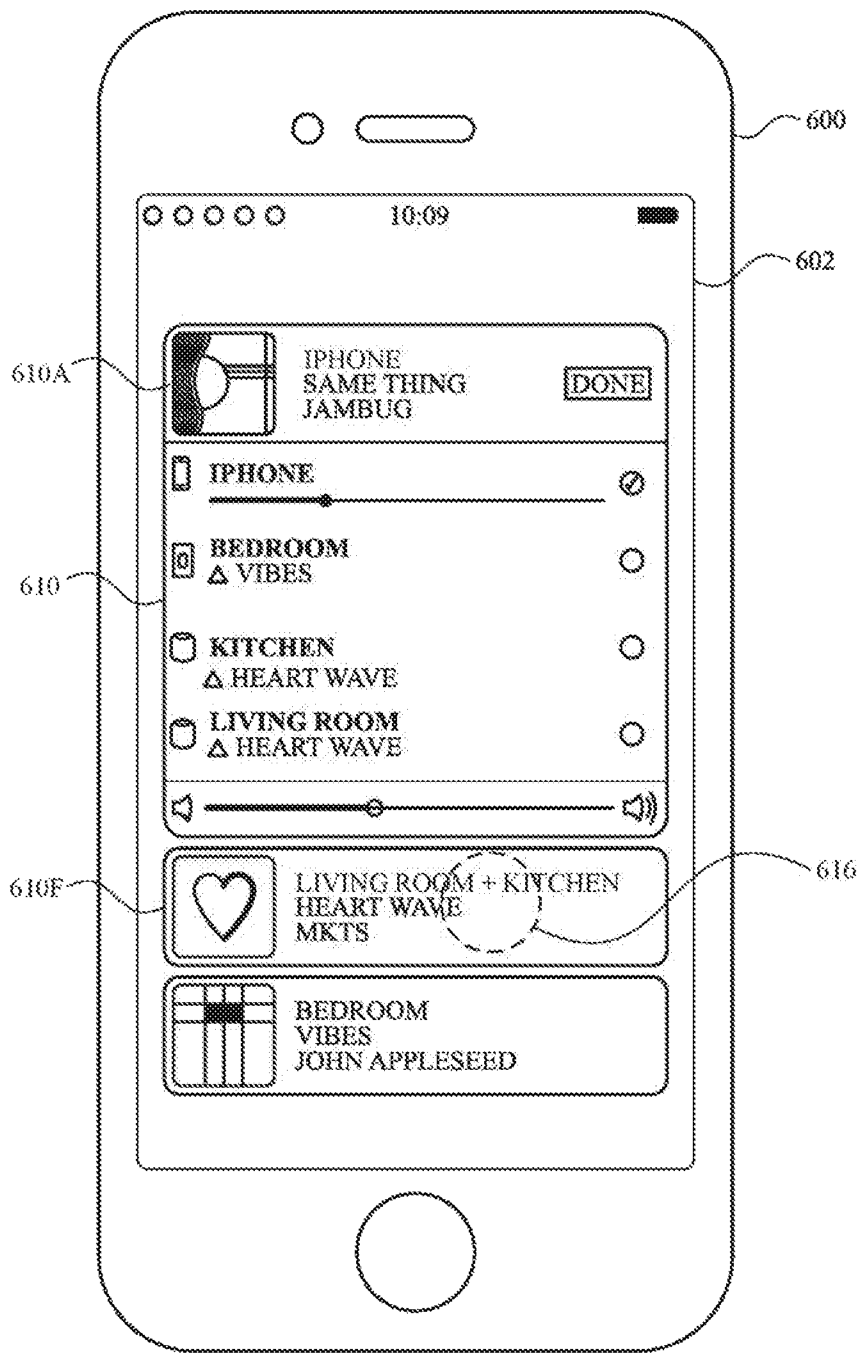
Figure 6N:
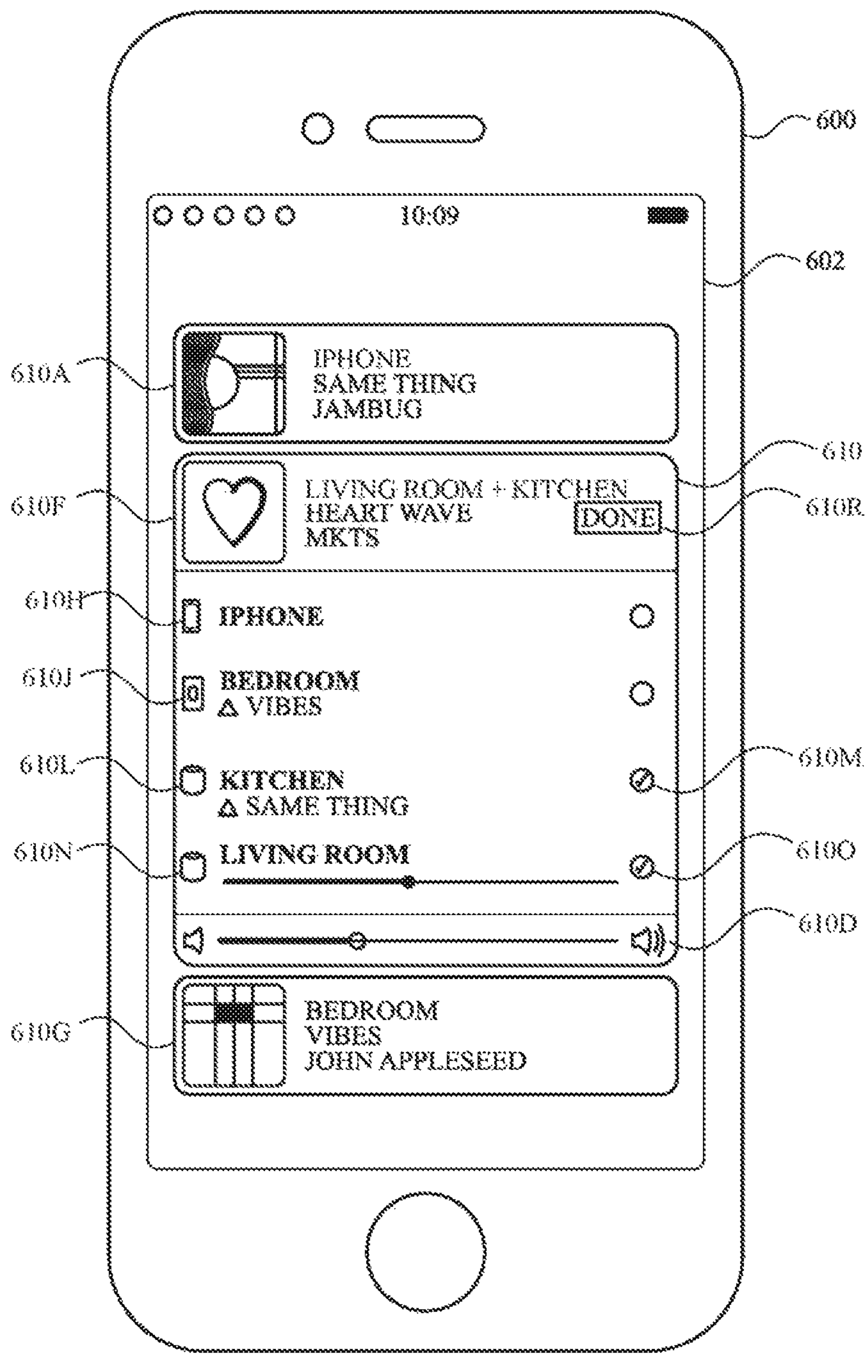

FIG. 6M-6N illustrate switching between media sessions using an exemplary multi-device interface when. In FIG. 6M, multi-device interface 610 is shown, with a first media session associated with indicator 610A (e.g., playback of "Same Thing" by artists "Jambug" on the device "iPhone"). As shown in FIG. 6M, device 600 receives user input 616 associated with indicator 610F, which is associated with a second media session (e.g., playback of "Heart Wave" by artists "MKTS" on the "Living Room" set of devices). In some examples, user input 616 is a tap or touch at a location associated with indicator 610F. In some examples, user input 616 is a deep press at a location associated with indicator 610F.

In some embodiments, in response to user input 616, the device 600 updates the display of the multi-device interface to "focus" (also referred to as "target") the second media session. For example, FIG. 6N depicts indicator 610A, associated with the first media session, as minimized (e.g., with no visually associated indicators for individual available playback devices or media playback controls). However, indicator 610F has been expanded to include individual indicators for each device of the plurality of available playback devices. Alternatively, or in addition, an expanded indicator for a media session (e.g., indicator 610F of FIG. 6N) can include media playback control affordances. As shown in FIG. 6N, indicators 610H, 610J, 610L, and 610N are now visually associated with indicator 610F for the second media session on the Living Room set of devices. Notably, indicators 610M and 610O now include checkmarks, indicating that they are part of the currently-selected media session (e.g., associated with the expanded indicator 610F).

Switching between media sessions can be referred to as "retargeting", "targeting", "refocusing", "focusing", or the like. Thus, the selection of indicator 610F can be referred to as "focusing" the current device 600 or "focusing" the multi-device interface 610 on a set of devices or a media session.

As shown above with respect to FIGS. 6H to 6N, a multi-device interface can be used to view a media playback status of a plurality of available playback devices. Additionally, a multi-device interface can be used to view what each device in a set of available playback devices is currently playing back. Further, individual devices can be added or removed from a media session using the multi-device interface. In addition to the examples shown in FIGS. 6H to 6N, other exemplary techniques for invoking and interacting with the multi-device interface can be used, as described below.

Figure 6O:
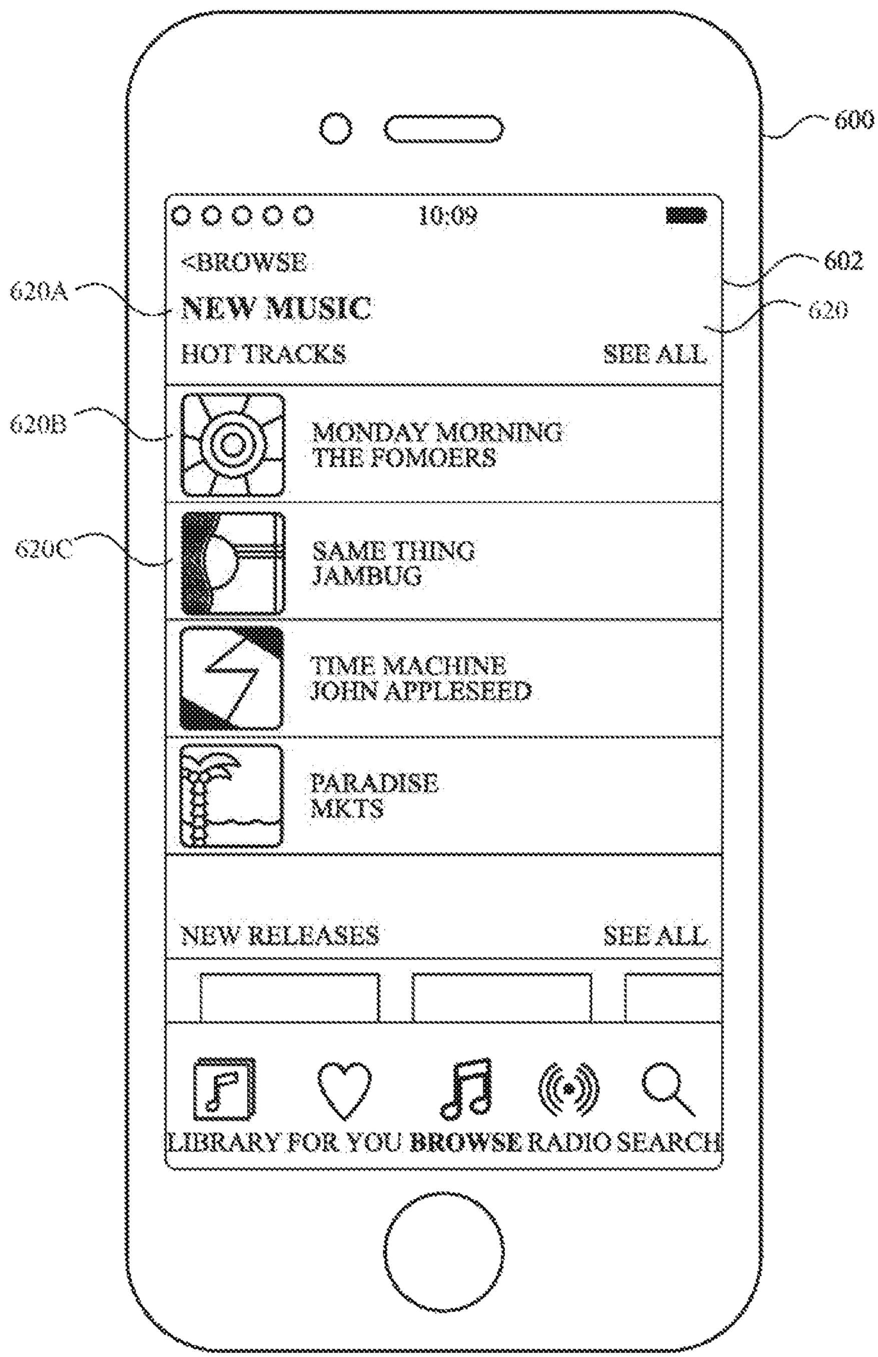

FIGS. 6O-6Y illustrate exemplary techniques for interacting with a multi-device user interface, in accordance with some embodiments. FIGS. 6O-6R illustrate an exemplary technique for initiating playback directly onto one or more dynamically-selected external devices. FIG. 6O illustrates an exemplary browsing interface. Browsing interface 620 depicts an interface for browsing media items. For example, a user can use a browsing interface to find and select one or more media items for playback. Exemplary browsing interfaces include interfaces for browsing a music library, a video library, media content available for streaming, or the like. In this example, the browsing interface 620 is a music browsing interface. Indicator 620A shows that the device is displaying a list of media items (e.g., a playlist) titled "New Music". Media item 620B (also referred to as song 620B) is a song titled "Monday Morning" by artist "The Fomoers".

Figure 6P:
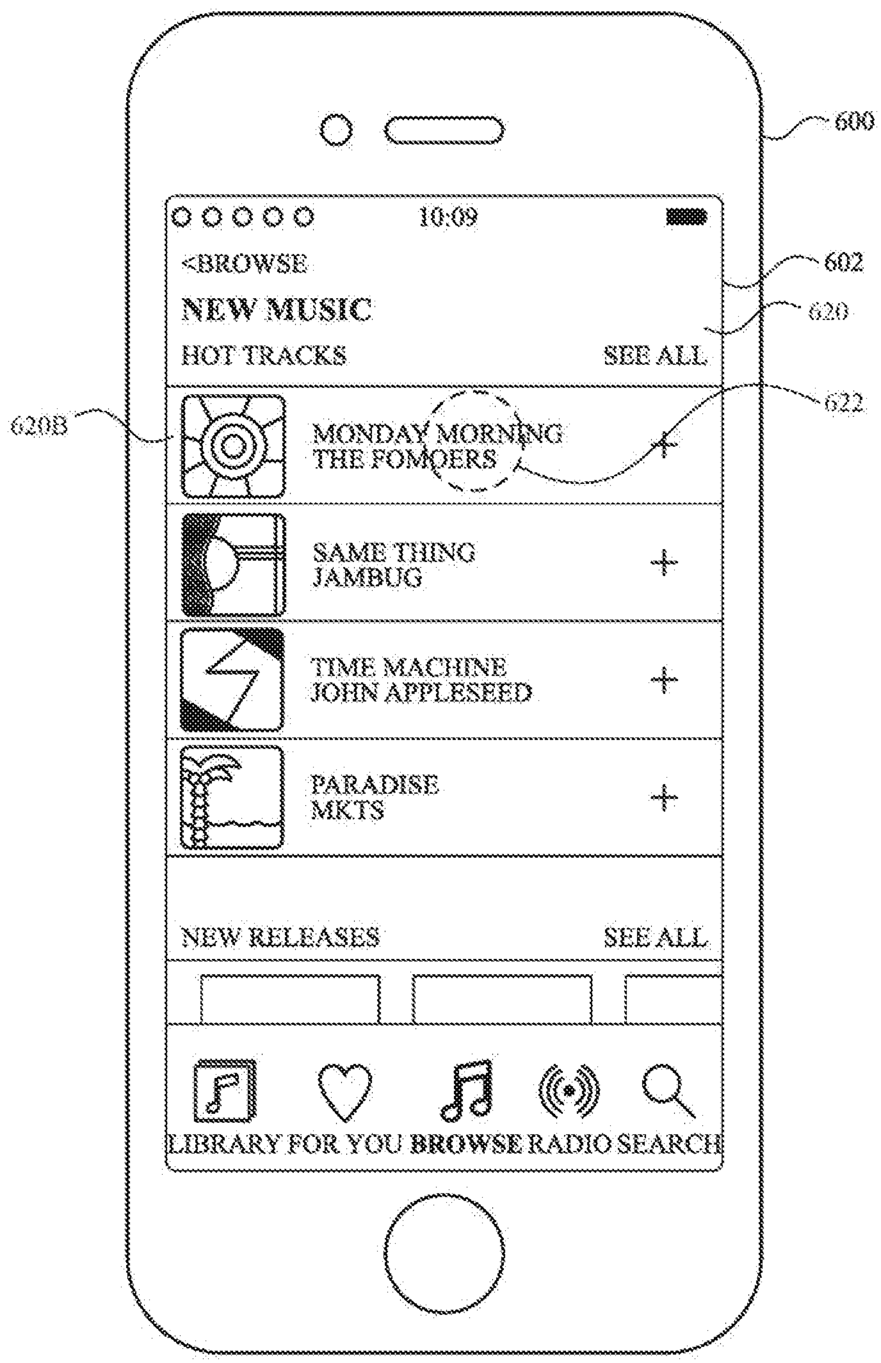

In FIG. 6P, device 600 receives user input 622 on song 620B. In some examples, user input representing selection of a media item (e.g., a tap on a song) causes playback of the song to initiate on the current device. For example, if device 600 is currently only "targeting" itself, then a tap on a media item causes playback to initiate on device 600. For further example, if device 600 is currently targeting itself and the device set "Living Room", then a tap on a media item causes playback to initiate on device 600 and the set of devices named "Living Room". In some examples, a deep press user input or a tap and hold user input on a media item causes device 600 to perform a secondary operation (e.g., other than immediately initiate playback of the corresponding media item on the targeted device or devices). In some examples, the secondary operation allows, before playback of the corresponding media is initiated, selection of one or more devices that the user would like to initiate media playback on. In this way, the user can begin playback directly on the desired set of devices, without needing to first initiate playback on a current device (e.g., device 600) and then transfer playback to one or more external devices (e.g., through a cumbersome arrangement of interfaces). One of the drawbacks of first initiating playback on the current device (e.g., a personal device) and then transferring playback to other devices (e.g., a home theater system) is that by the time media playback is initiated on the desired set of devices, the media item has already begun playing on the device—if playing back for a room full of listeners, such a scenario is undesirable. Even if playback is restarted (manually or automatically) in response to or after transferring playback to the desired set of devices, the original device that initiated playback will have wasted device resources by starting the playback of the song when such operation was not desired by the user. In some examples, a tap input invokes the primary operation, and a deep press or a tap and hold input invokes the secondary operation. One of skill in the art would recognize that any two user inputs, recognizable by a device as different types of user input, can be used to invoke respective primary and secondary operations.

Figure 6Q:
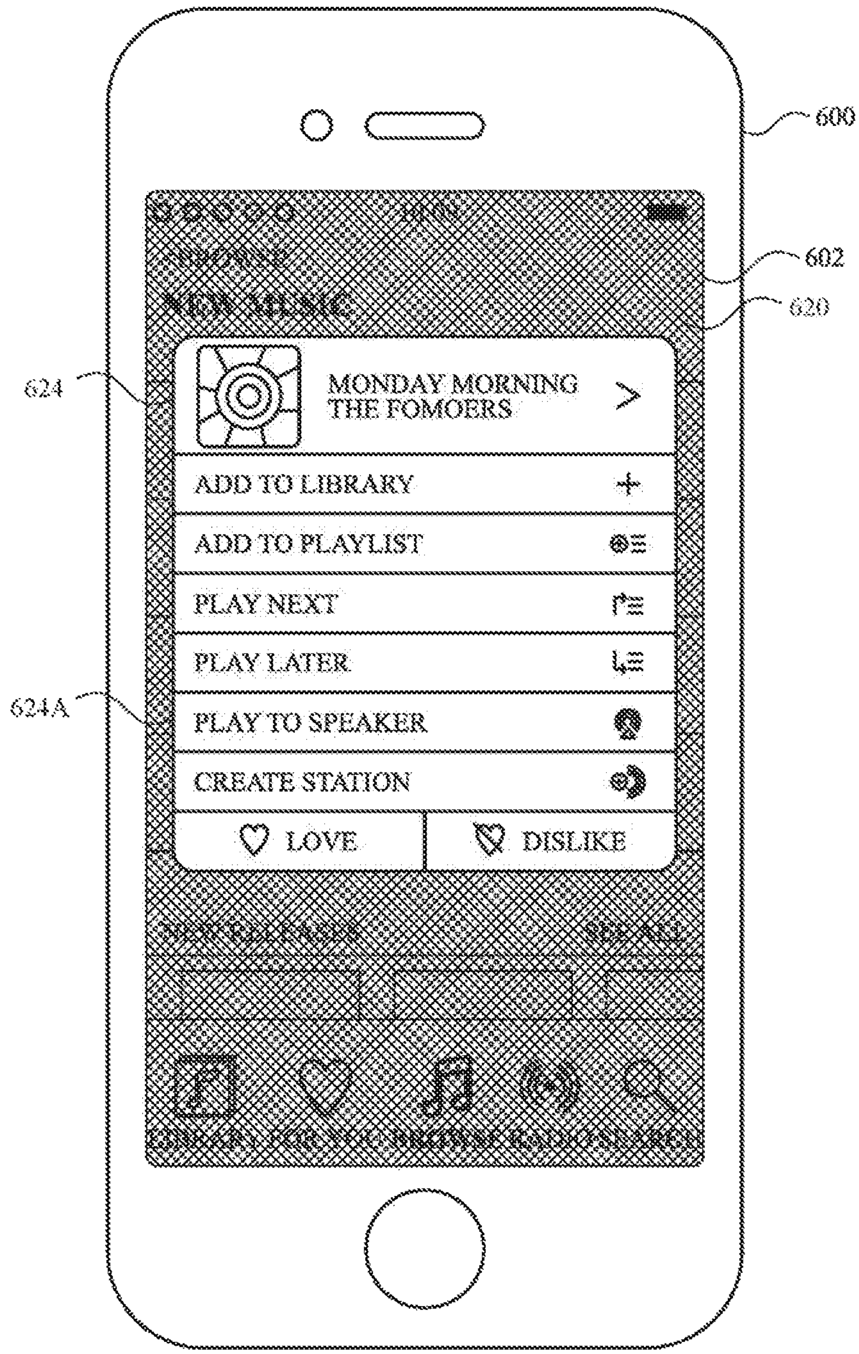
Figure 6R:
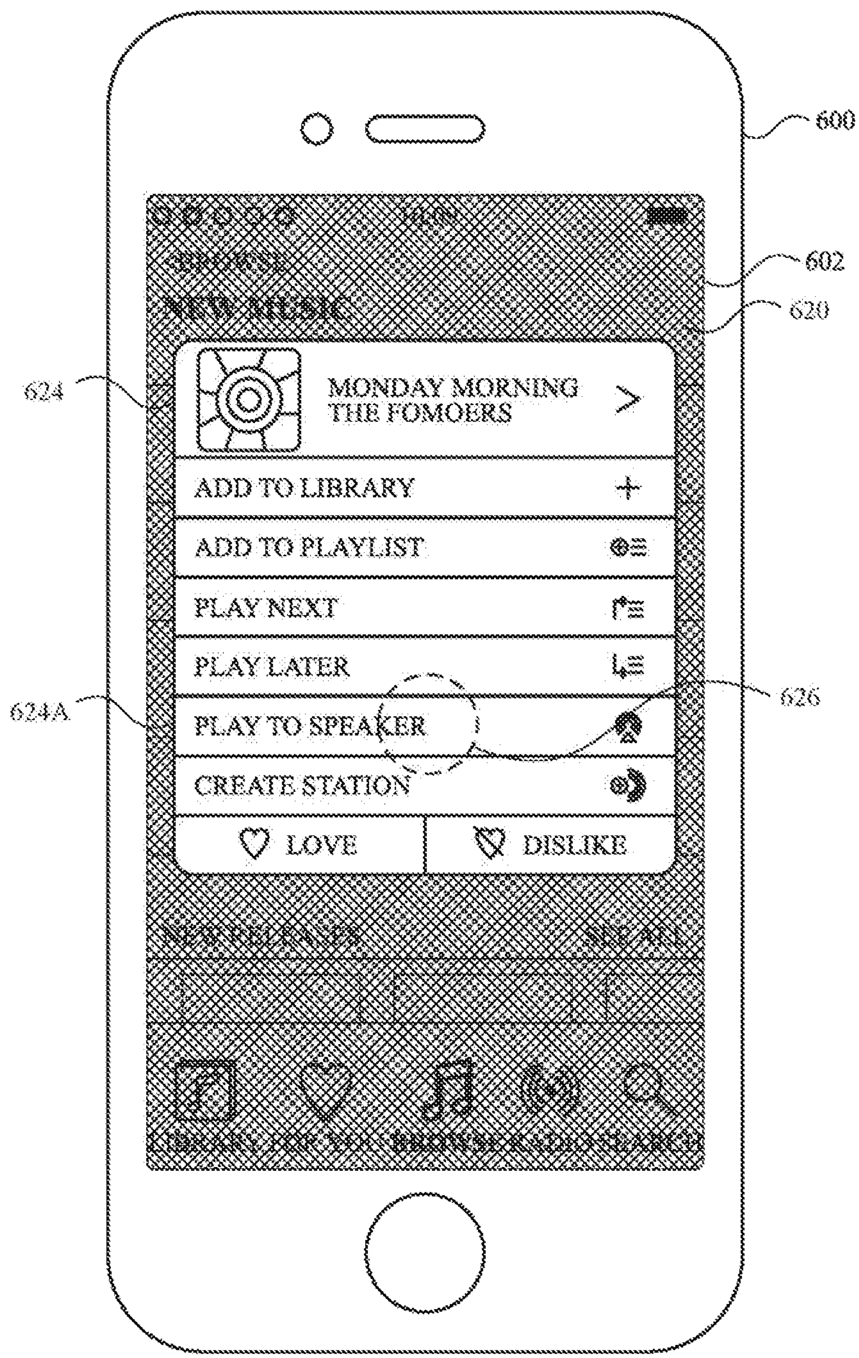

FIG. 6Q illustrates an exemplary media item menu. For example, media item menu 624 is displayed in response to user input 622, which is a deep press or a tap and hold input (e.g., invoking a secondary operation on a media item). Menu 624 includes a list of possible actions that can be selected for the media item 620B (the song titled "Monday Morning" by "The Fomoers"). Media item menu 624 includes play to speaker affordance 624A. In FIG. 6R, device 600 receives user input 626 on the play to speaker affordance 624A. For example, user input 626 is a tap. In some examples, in response to receiving the user input 626 representing selection of the play to speaker affordance 624A, device 600 displays a multi-device interface (e.g., similar to multi-device interface 610 of FIG. 6J) for selecting one or more desired devices to initiate playback on. For example, a multi-device interface can be displayed that includes an indicator (e.g., 610A) for a media session that includes the media item "Monday Morning" by "The Fomoers" and no selected devices (e.g., no devices with indicators that include checkmarks). In this example, after selection of the one or more desired devices (e.g., to add them to the media session), playback is then initiated on the desired devices (e.g., device 600 initiates playback on itself and/or transmits and instruction to other devices in the set of desired devices). In this example, a user input (e.g., 622) associated with a media item is used to invoke a multi-device interface (e.g., 610) so that one or more external devices can be selected before device 600 initiates playback of the media. Thus, device 600 initiates playback of the media item (e.g., "Monday Morning" as shown in FIG. 6P)

from the beginning (e.g., from the start of the song) on the selected one or more external devices, rather than first initiating playback on device 600 and then subsequently transferring playback (e.g., during playback).

Figure 6S:
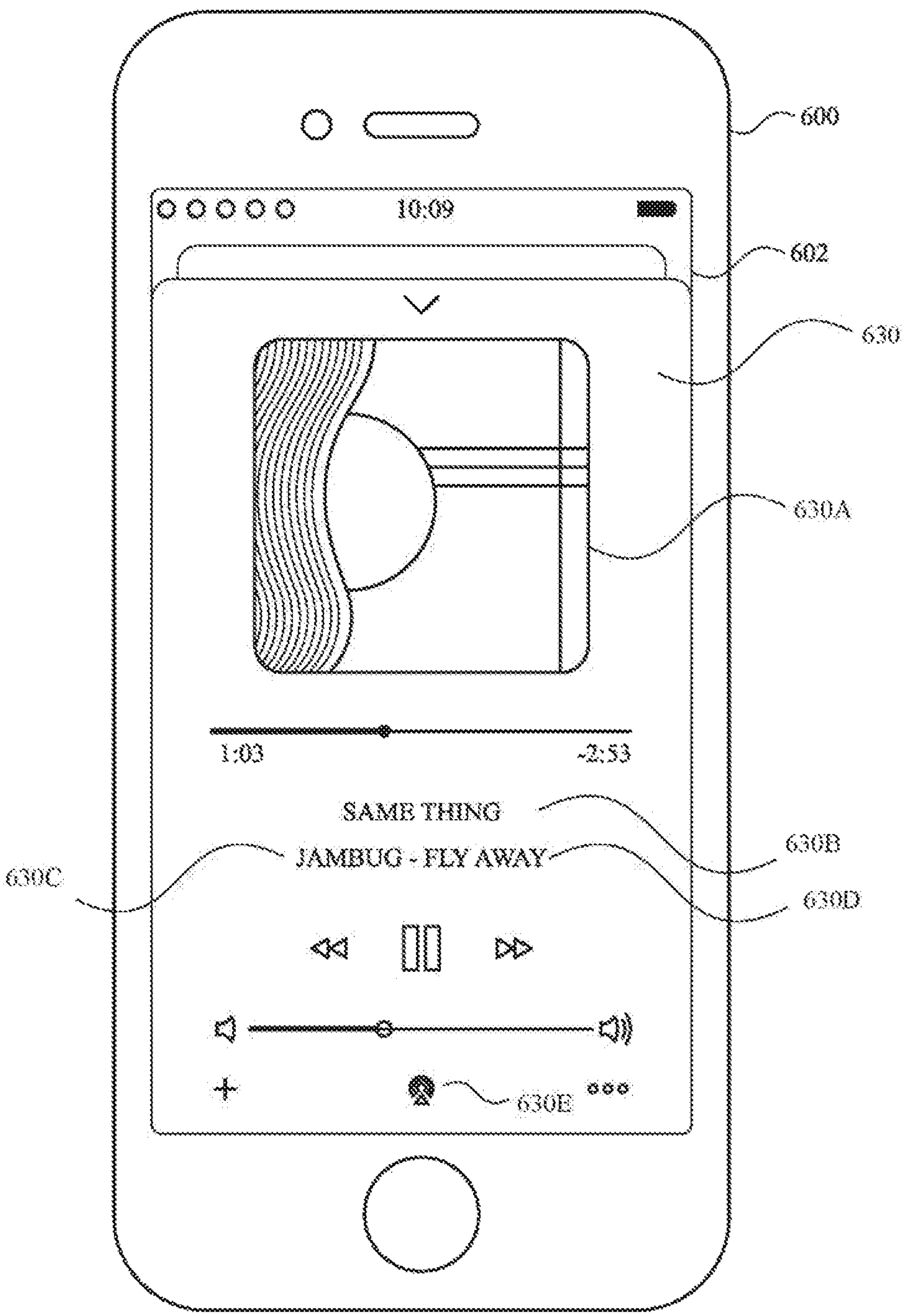

FIGS. 6S-6Y illustrate exemplary techniques for providing an indication of a device's focus. FIG. 6S illustrates an exemplary current media interface. Current media interface 630 (also referred to as a "now playing interface") identifies a media item that is currently being played back. Current media interface 630 includes album art 630A, media identifier 630B (song title "Same Thing"), media identifier 630C (artist "Jambug"), media identifier 630D (album "Fly Away"), and device selection affordance 630E. As shown in FIG. 6S, the device selection affordance 630E does not include an identifier for another device. Thus, in this example, the media item identified in the current media interface 630A is currently playing back on the current device, device 600. In some examples, the media identified by the currently media interface is currently being played back on other devices (e.g., in addition to the current device, or a set that excludes the current device).

Figure 6T:
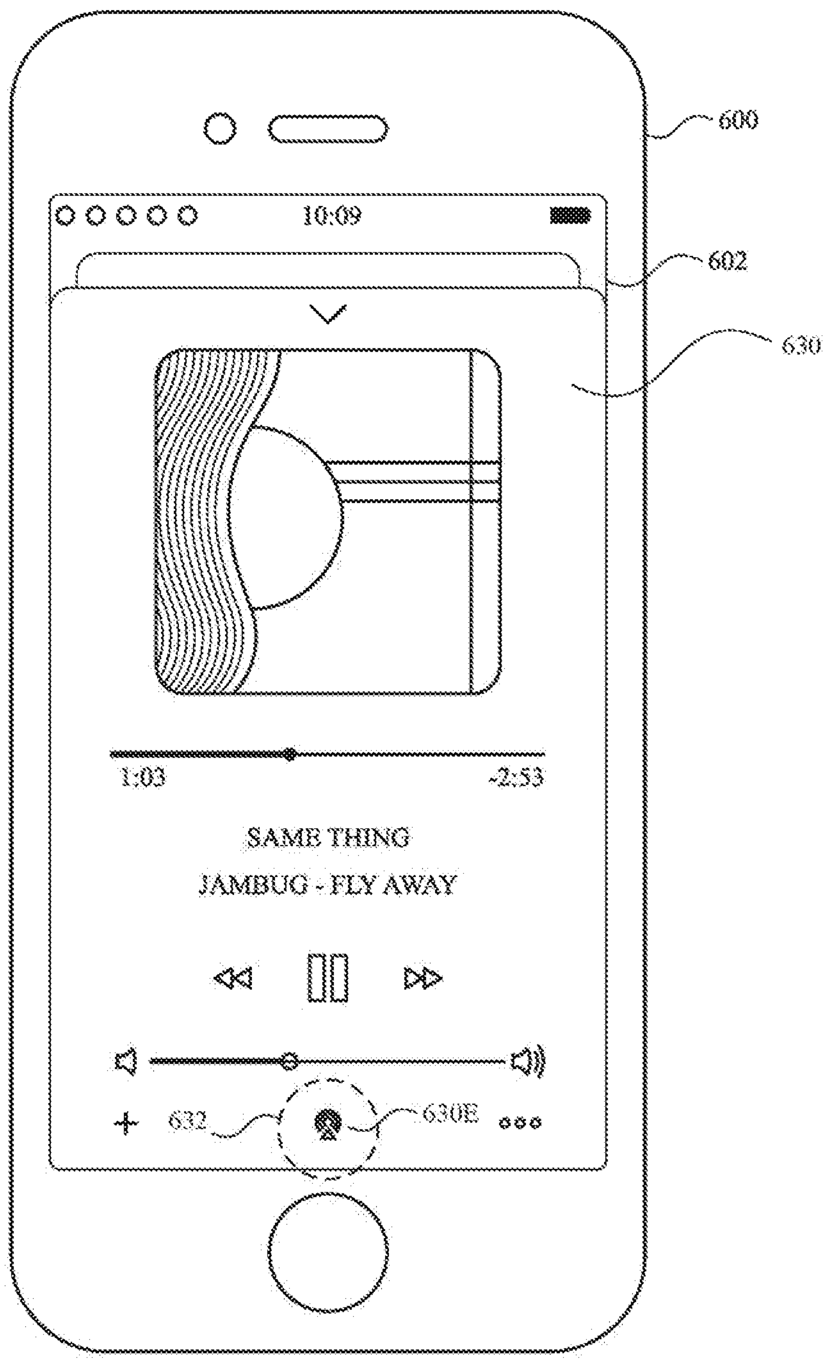
Figure 6U:
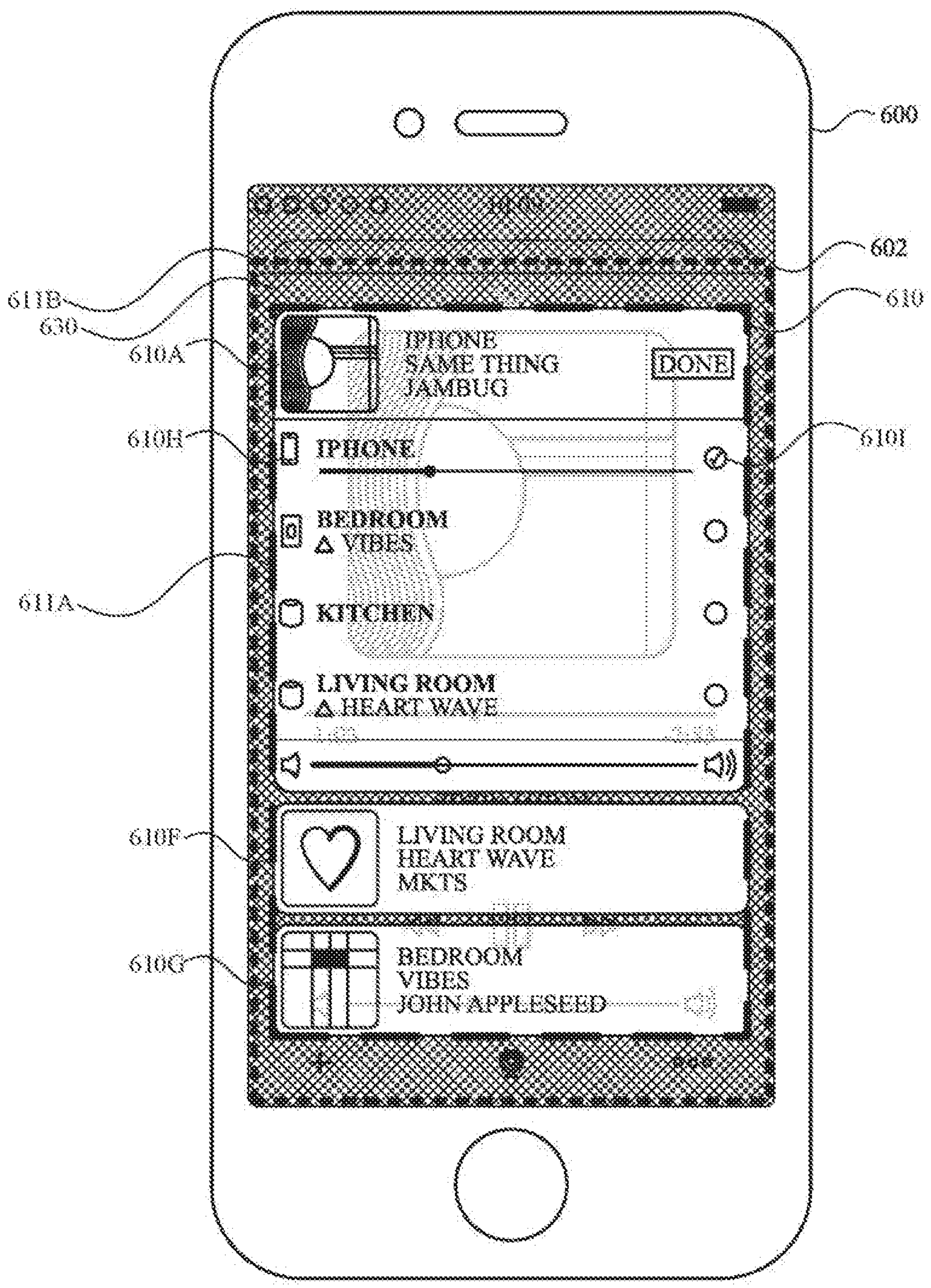

At FIG. 6T, device 600 receives user input 632 on device selection affordance 630E. In response to receiving user input 632, at FIG. 6U the device displays multi-device interface 610. As can be seen in FIG. 6U, a first region 611A (e.g., shown bordered by a first dotted line pattern, for illustration purposes) of the display includes the multi-device interface 610, and a second region 611B (e.g., shown bordered by a second dotted line pattern, for illustration purposes) of the display includes a visible indication of the content displayed prior to displaying the multi-device interface. In this case, the content displayed prior to displaying the multi-device interface is the current media interface 630. For example, the album art 630A is visible through the multi-device interface. In this example, the first region is visually overlaid on the second region.

Figure 6V:
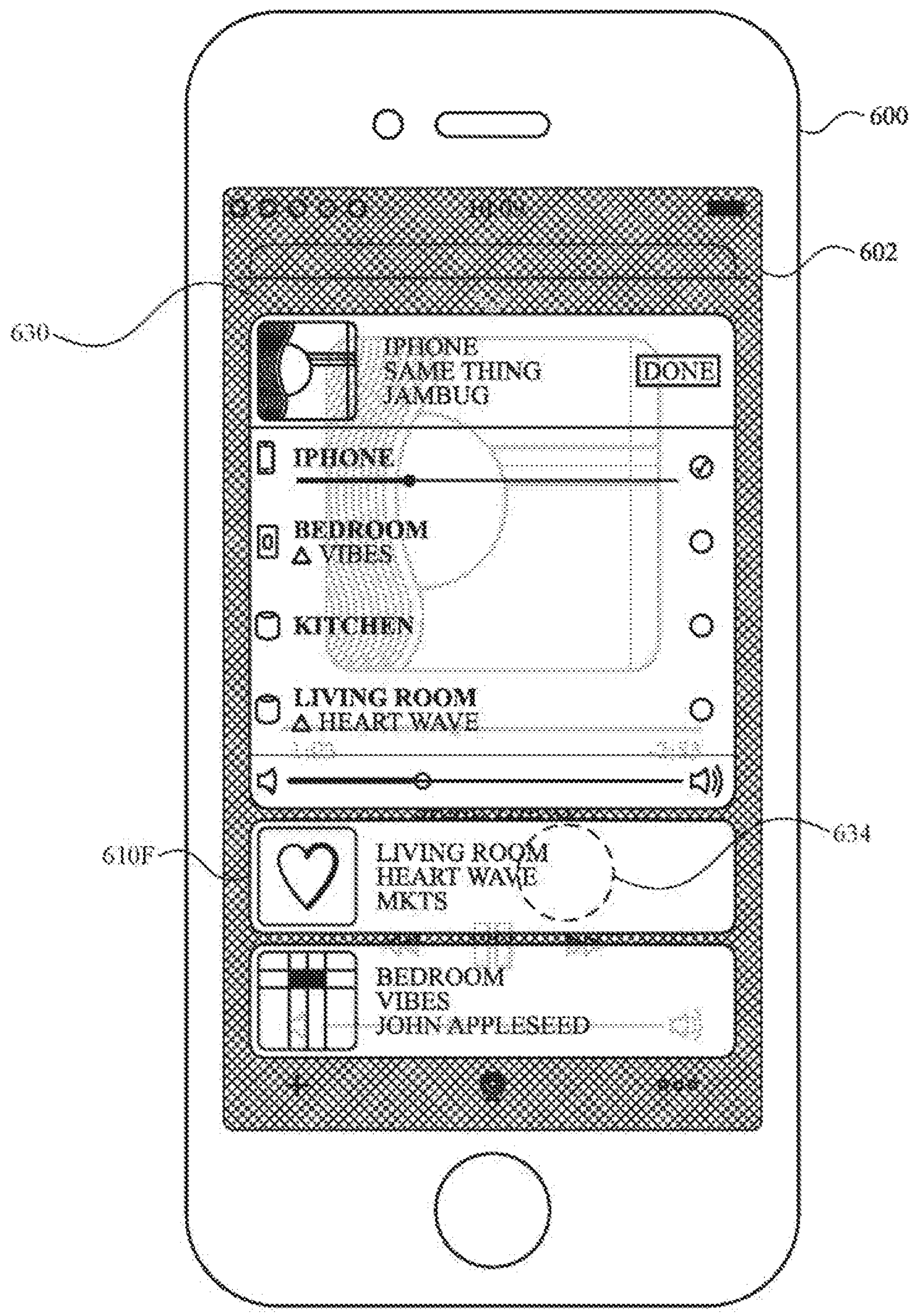

At FIG. 6V, device 600 receives a user input 634 on indicator 610F. In some examples, user input 634 is a tap or touch at a location associated with indicator 610F. In some examples, user input 634 is a deep press at a location associated with indicator 610F.

Figure 6W:
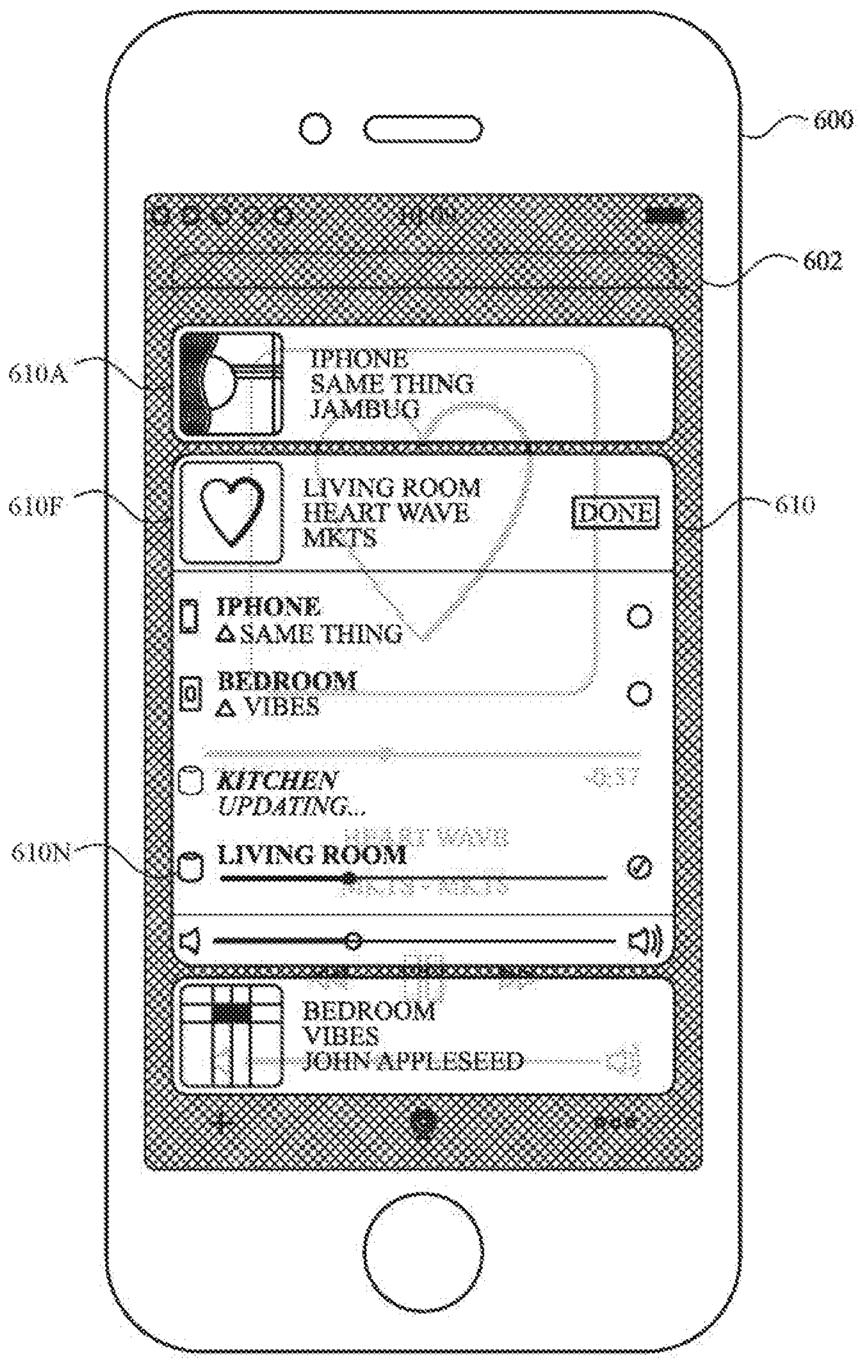

As shown in as shown in FIG. 6W, in some examples, in response to user input 634, device 600 displays multi-device interface 610 with the indicator 610F expanded to shown individual indicators for devices in the set of available playback devices as visually associated with indicator 610F. Thus, device 600 is now focused on the media session that includes the device set Living Room. As can be seen, current media interface 636 (described below) is visible (through the multi-device interface 610) in FIG. 6W. Notably, as seen in FIG. 6W, in response to input 634, device 600 ceases to display the visual indications associated with current media interface 630 and displays, instead, visual indications associated with current media interface 636. This is substitution of current media interfaces is indicative of the device changing the targeted media session from the session associated with indicator 610A to the session associated with indicator 610F (FIG. 6U).

Figure 6X:
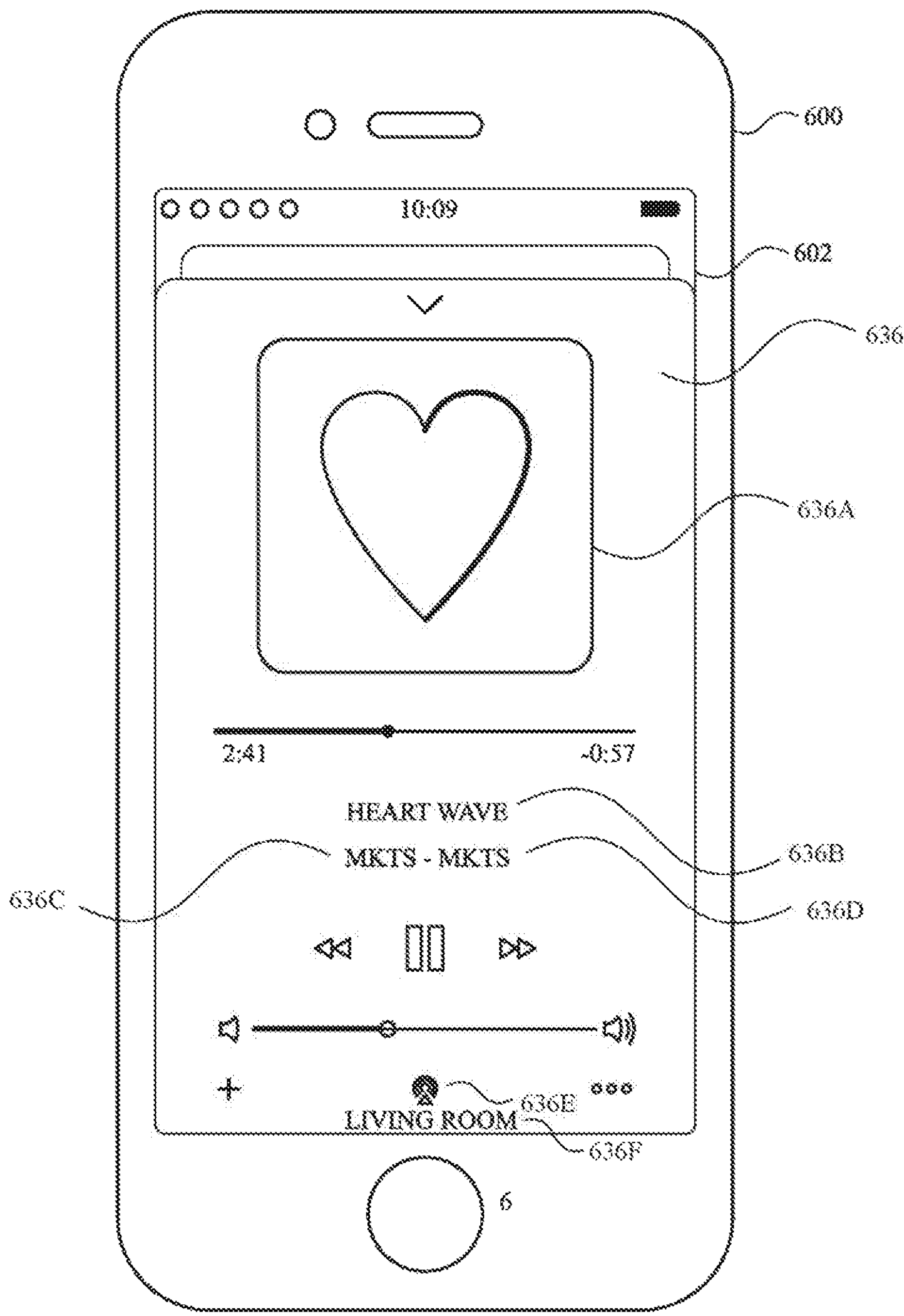

As shown in as shown in FIG. 6X, in some examples, in response to user input 634, device 600 ceases displaying multi-device interface 610 and displays the current media interface 636. Thus, FIG. 6X illustrates an alternative response by device 600 to receiving user input 634. Current media interface 636, similar to interface 630, includes album art 636A, media identifier 636B (song title "Heart Wave"), media identifier 636C (artist "MKTS"), media identifier 636D (album "MKTS"), and device selection affordance 636E. However, each of the indicators has been updated to reflect that the media item and devices of the selected media session has changed (e.g., because device 600 is now targeted to a media session that includes a different set of devices). Notably, device selection affordance 636E includes an identifier 636F, which identifies the currently targeted device. As shown in FIG. 6X, identifier 636F includes the text "Living Room" indicating that the current media interface 636 is a current media interface for media currently playing back on the set of devices named Living Room.

Figure 6Y:
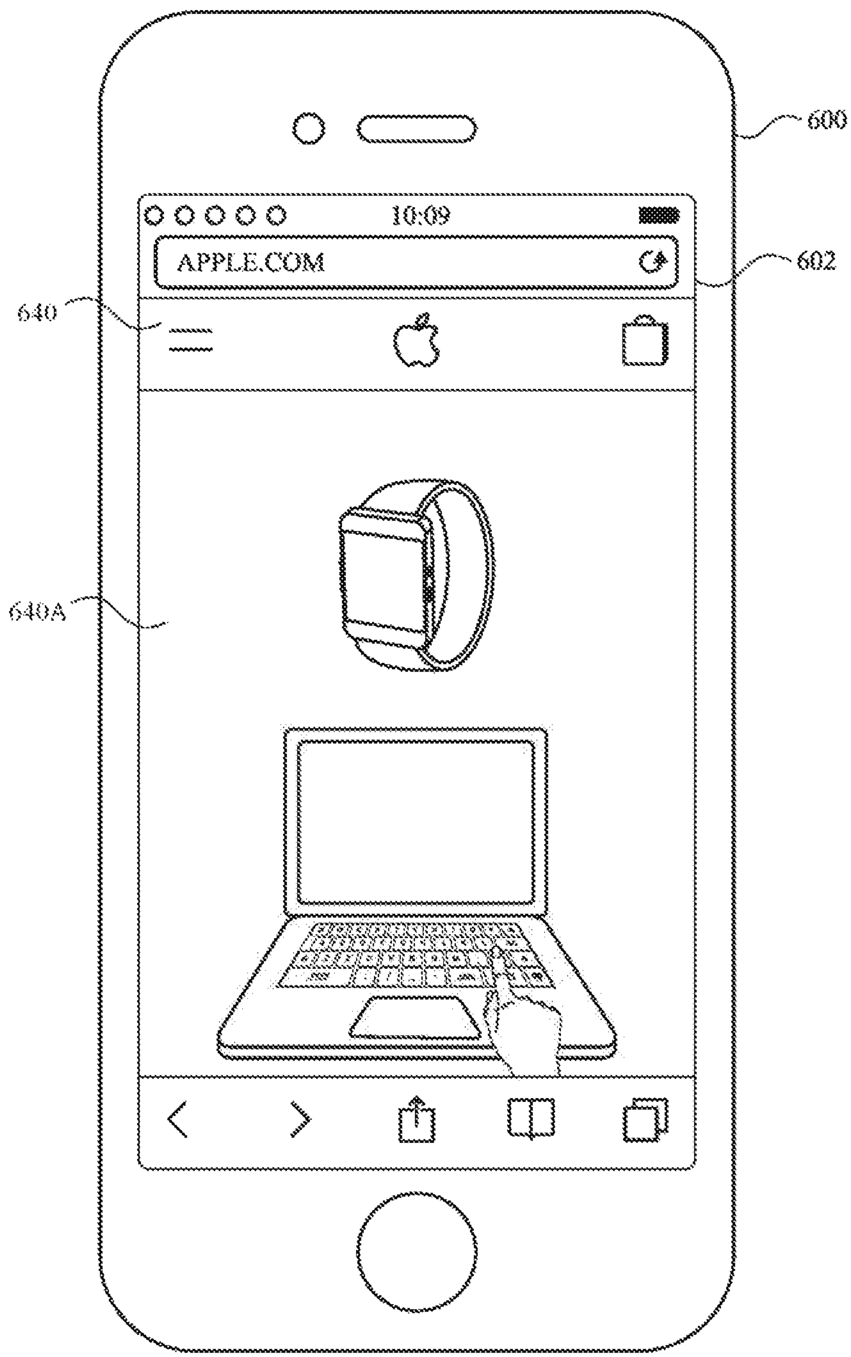
Figure 6Z:
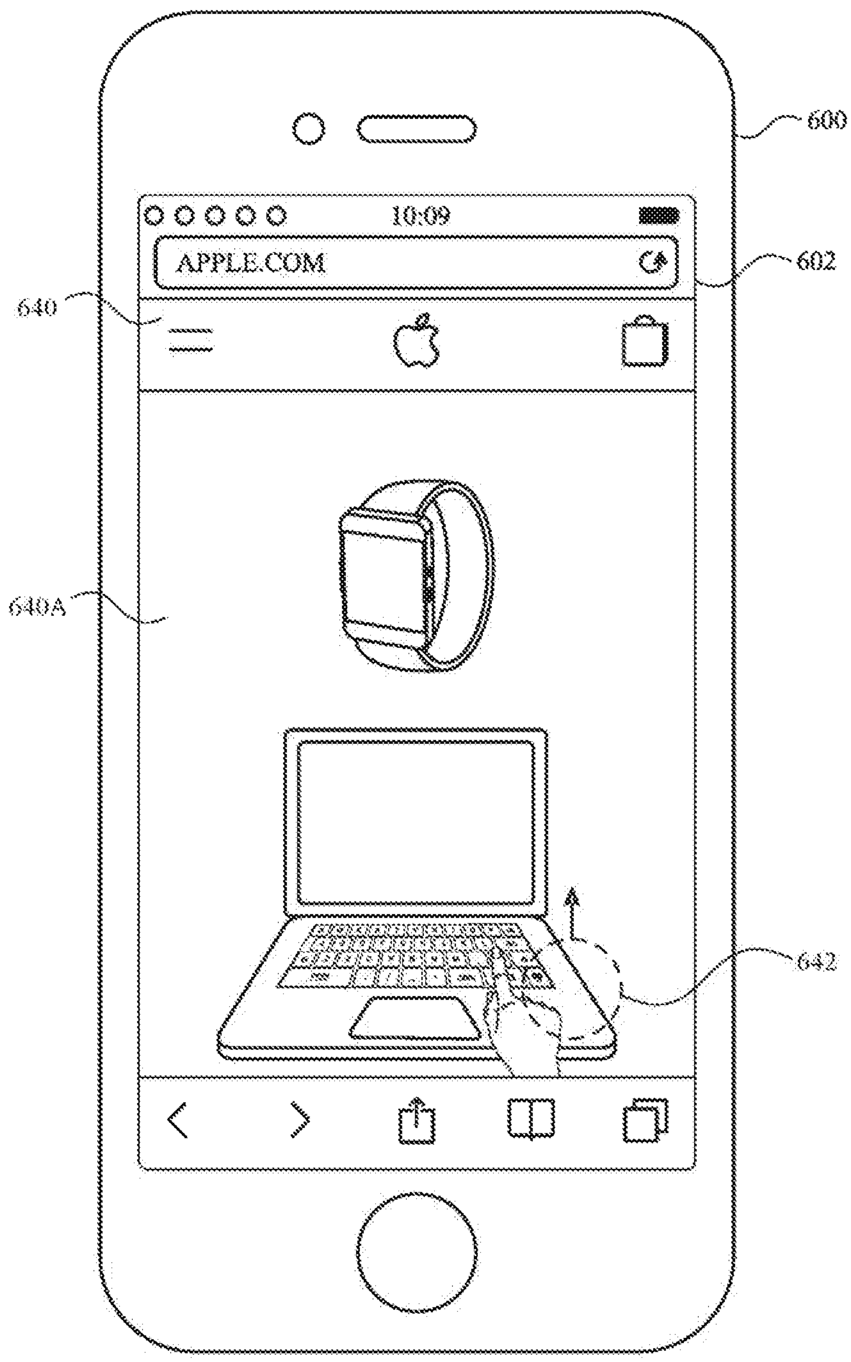
Figure 6A:
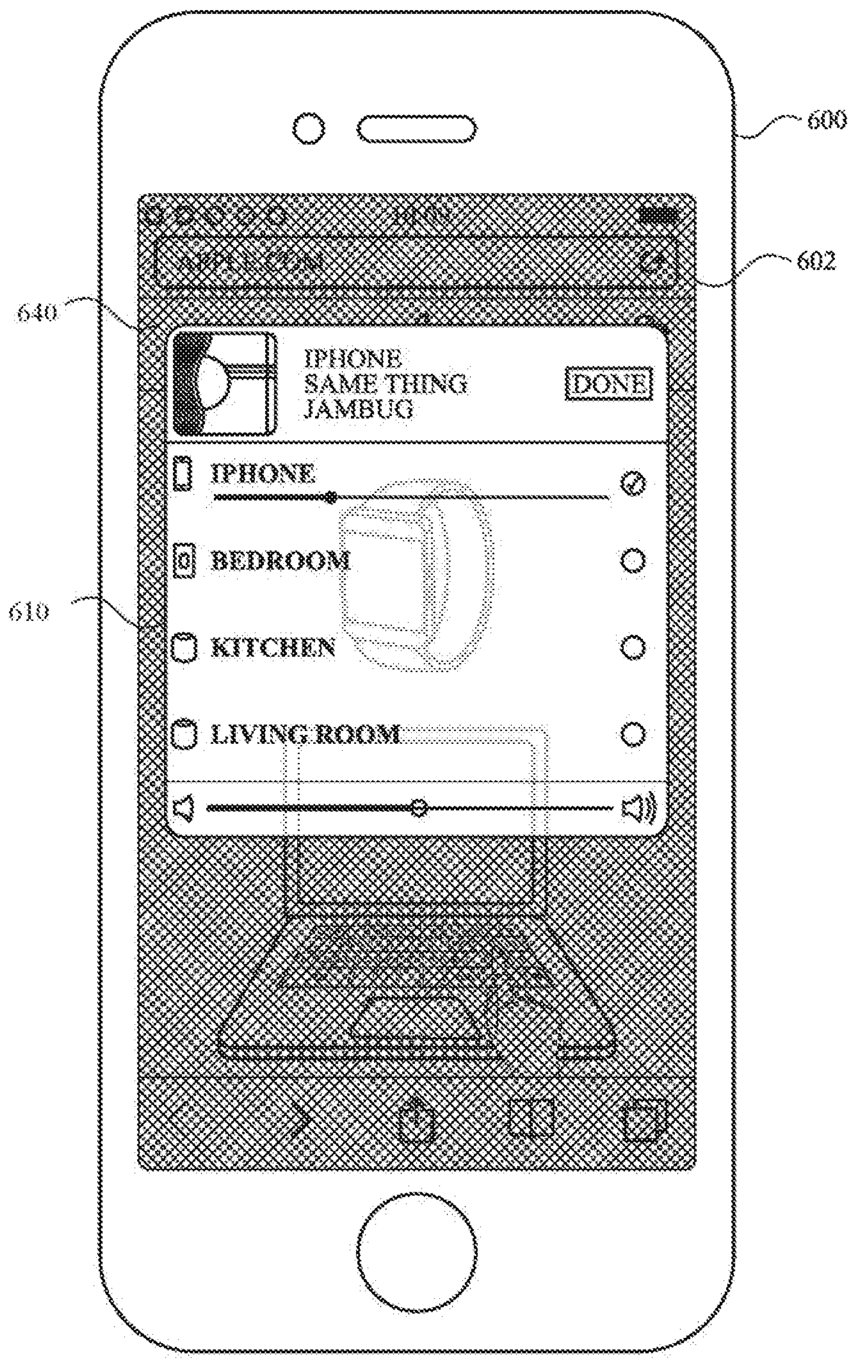
Figure 6A:
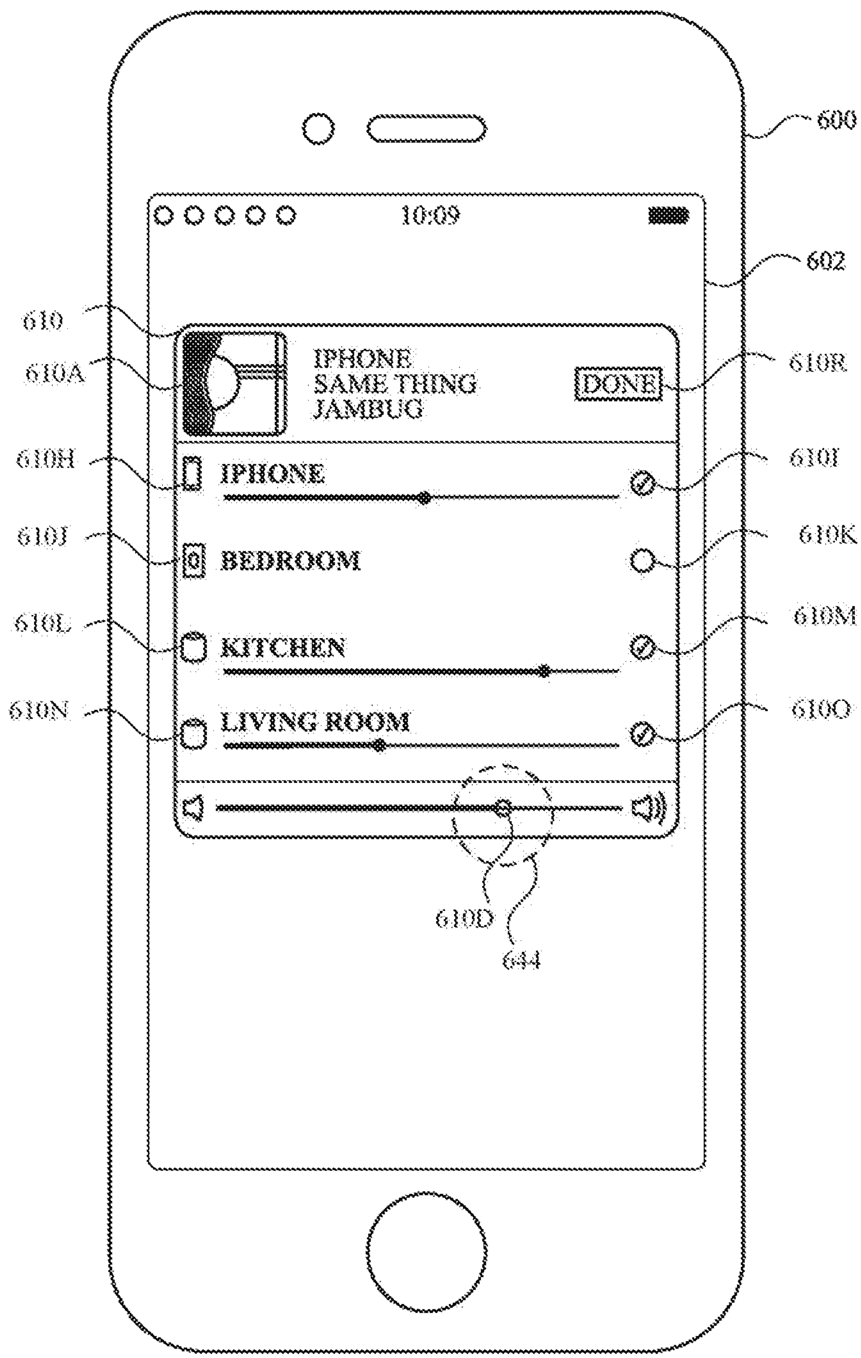
Figure 6A:
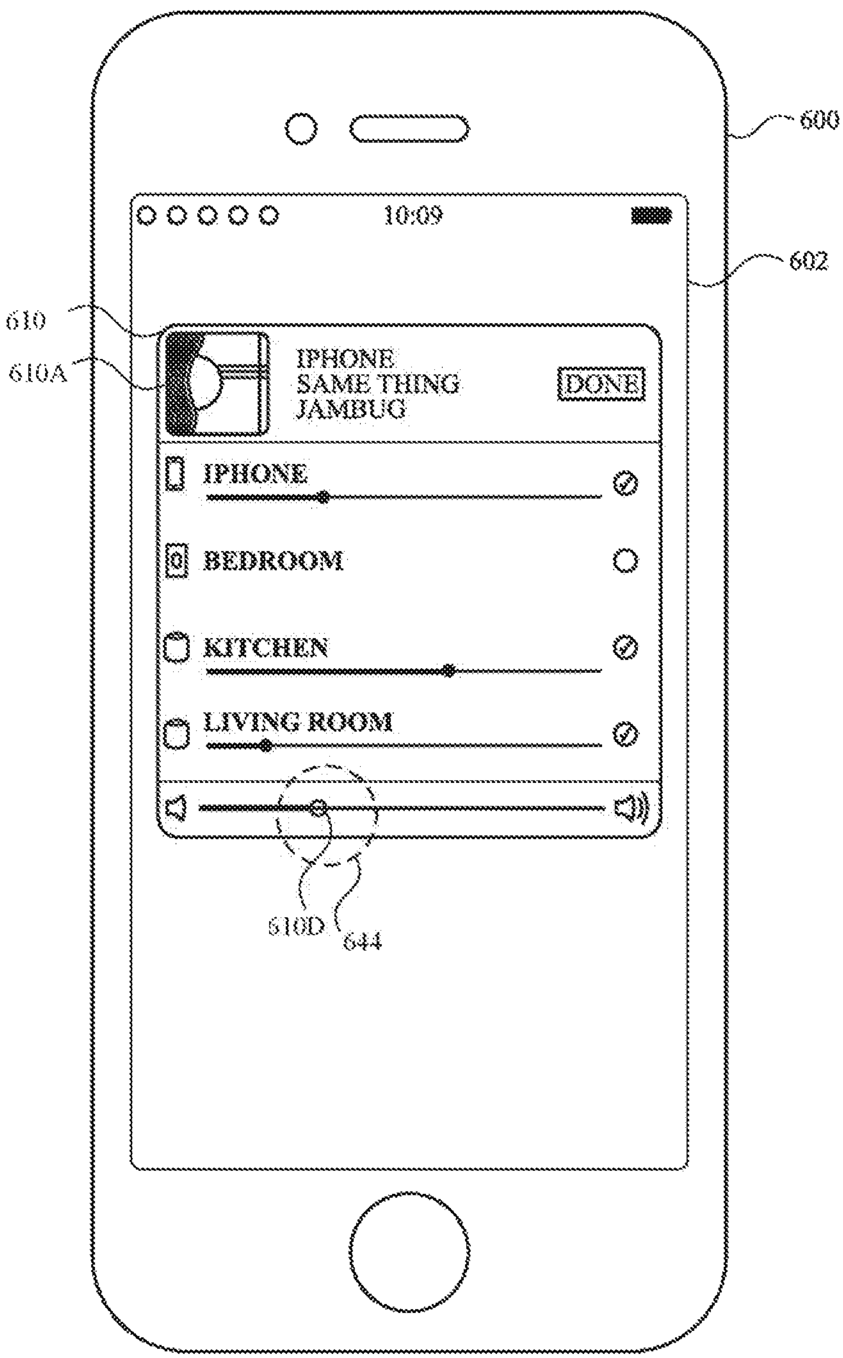
Figure 6A:
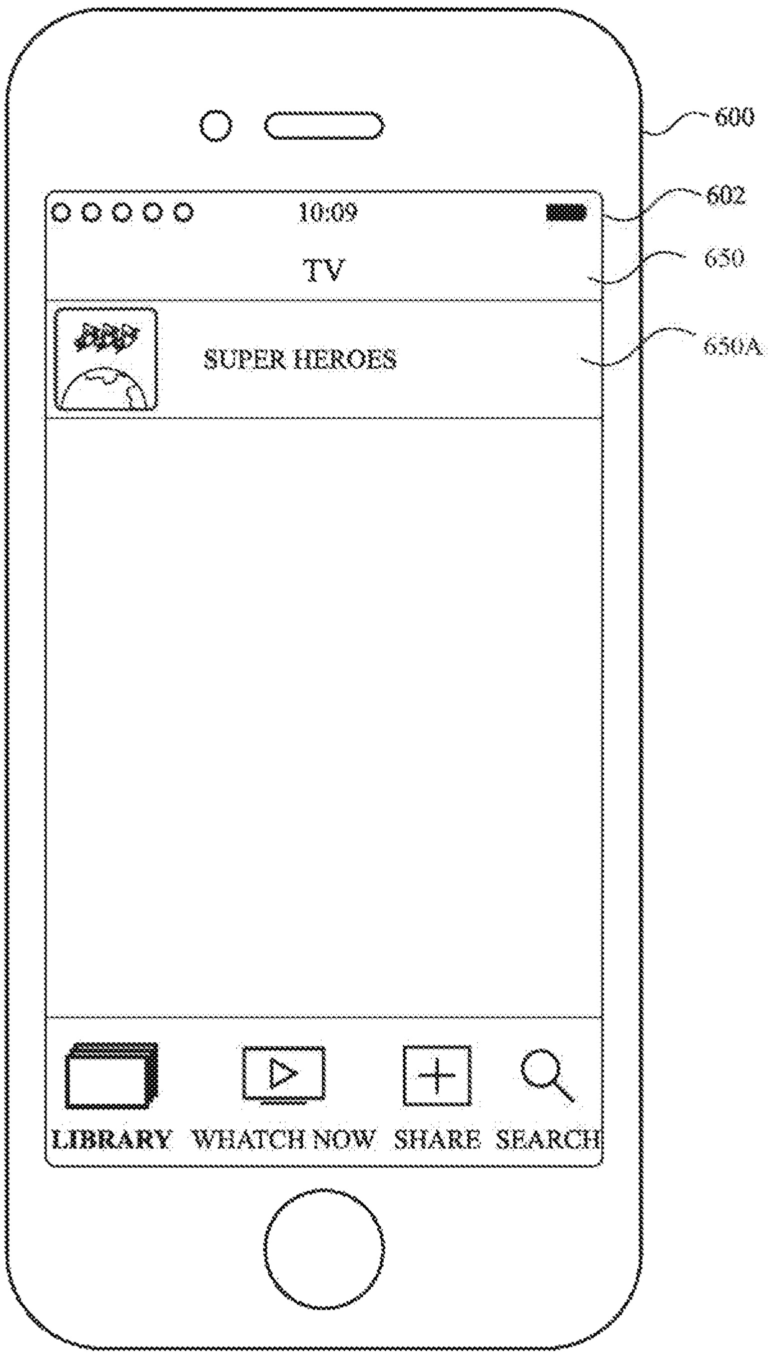
Figure 6A:
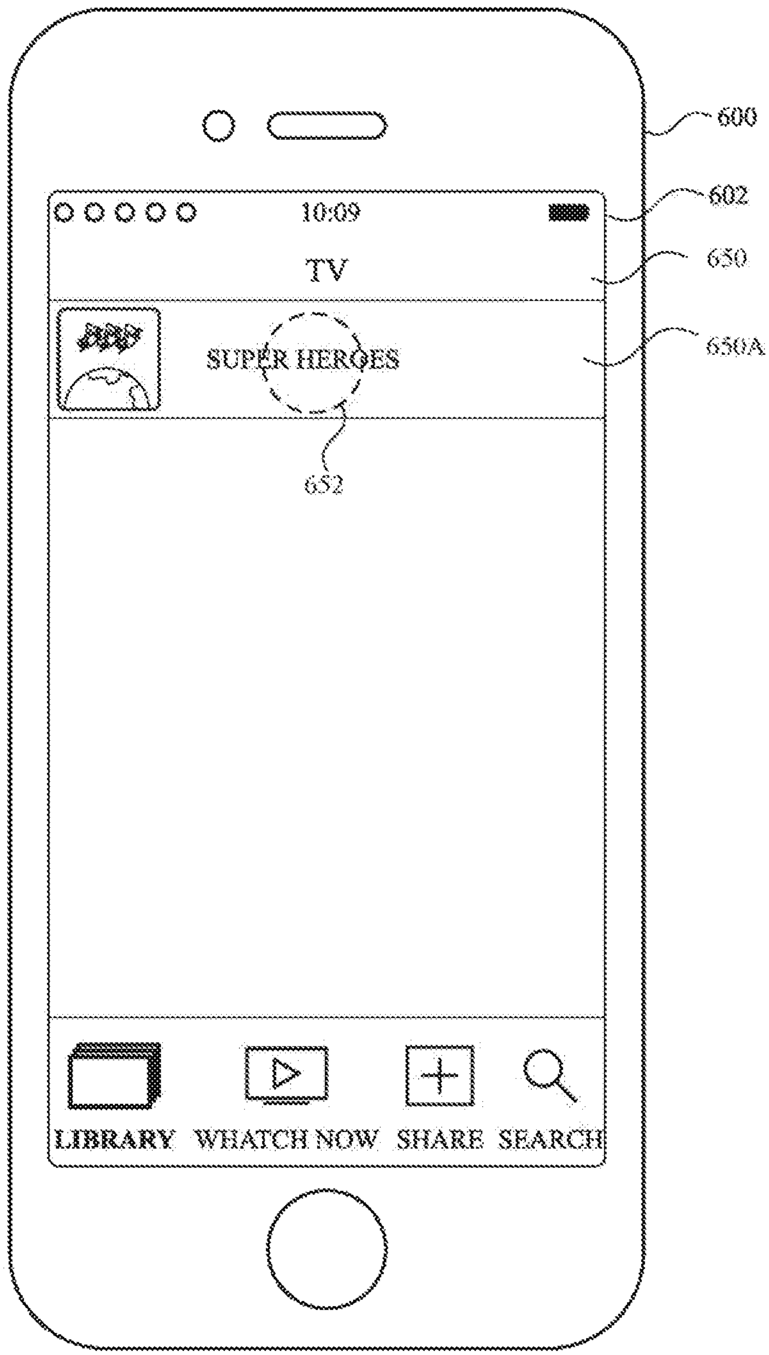
Figure 6A:
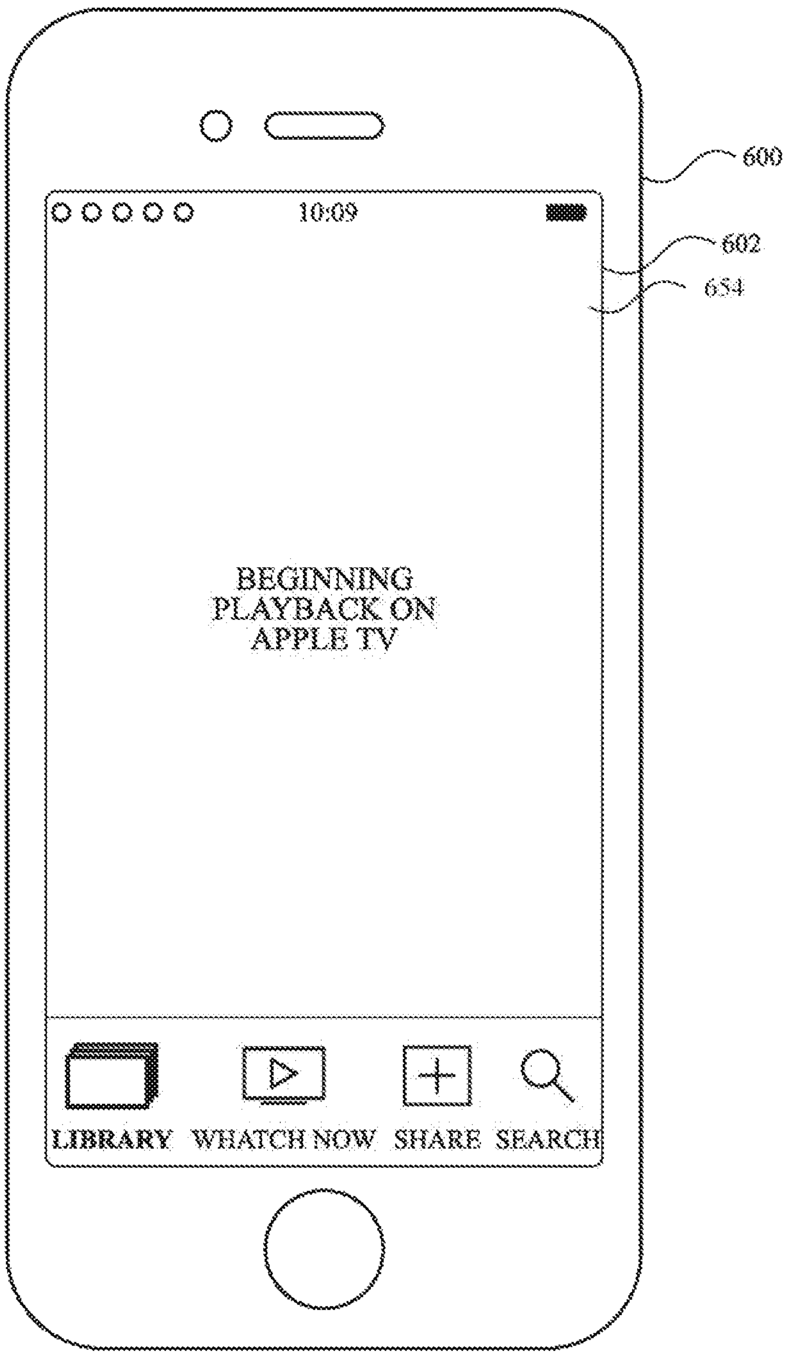
Figure 6A:
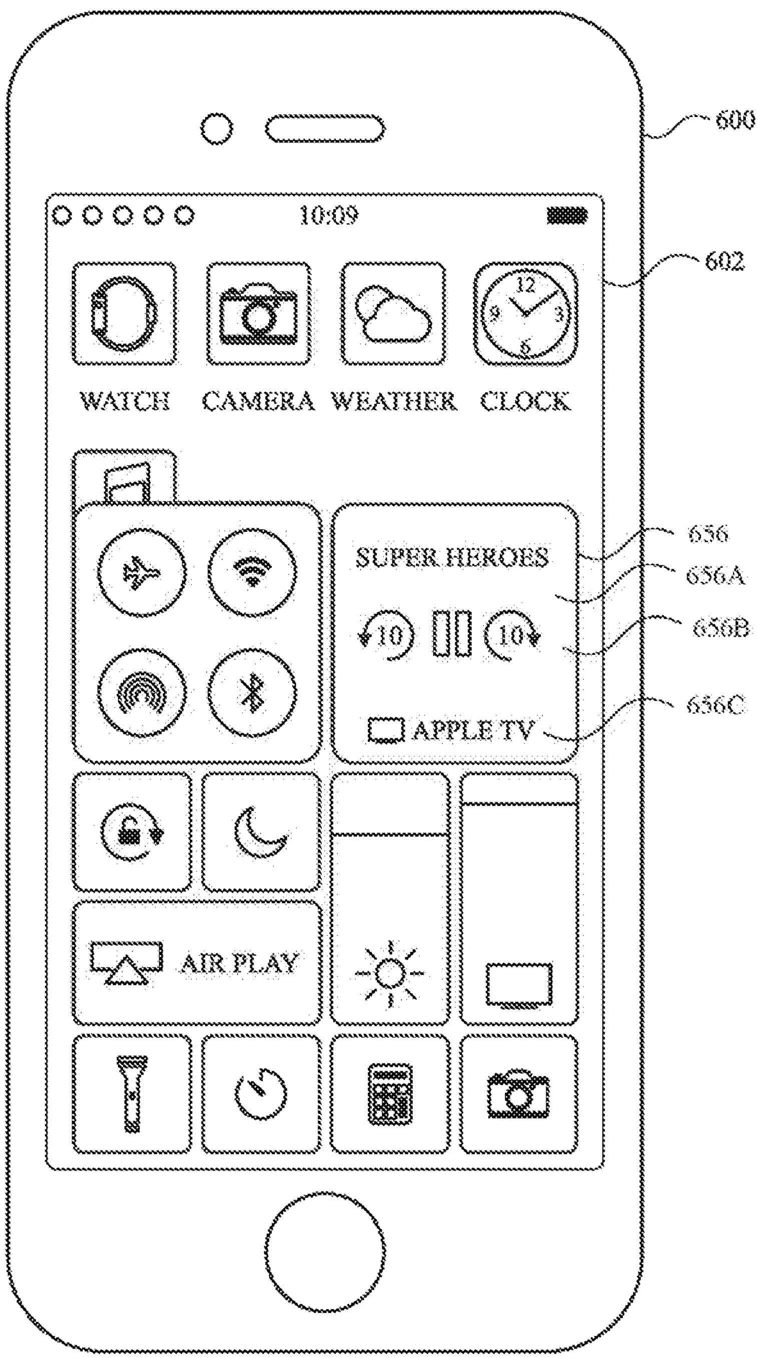
Figure 6A:
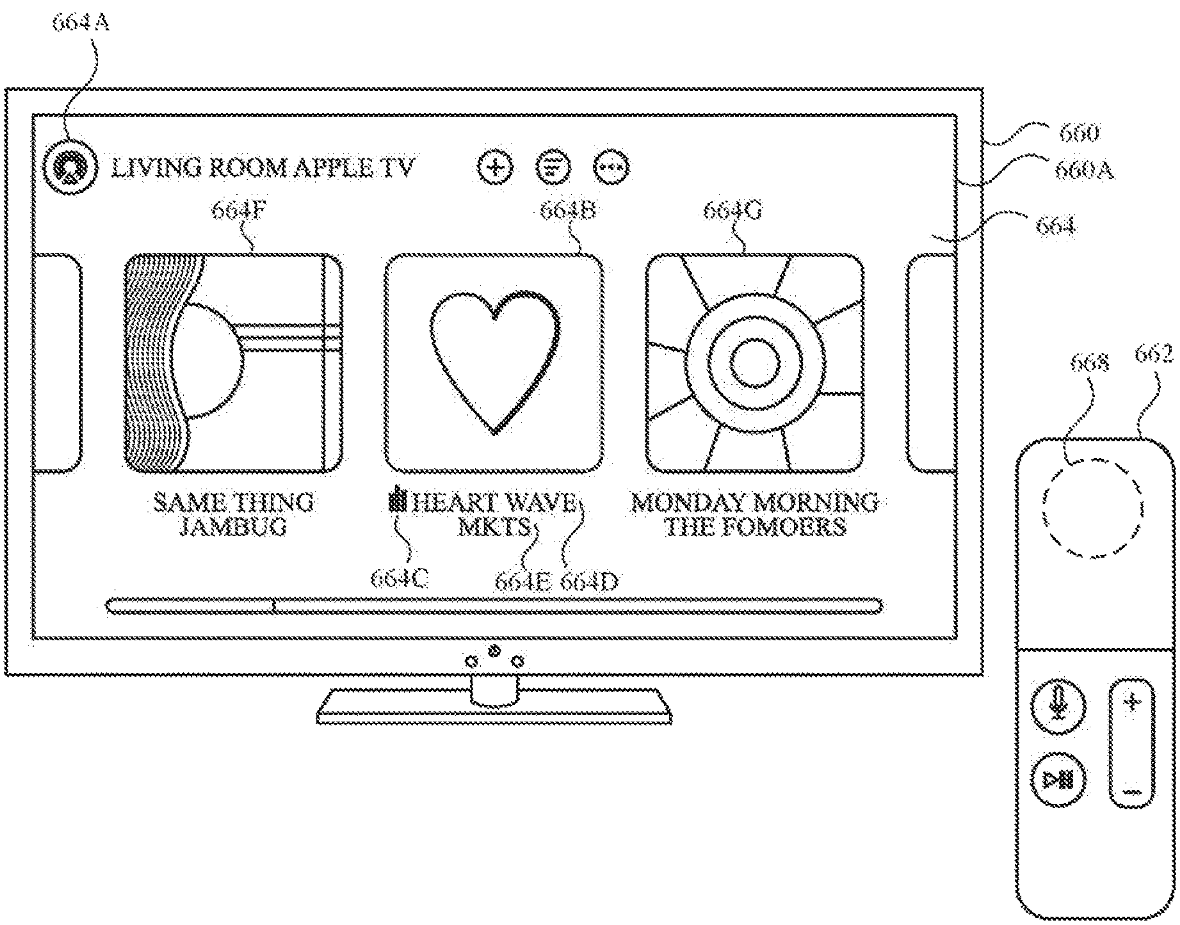
Figure 6A:
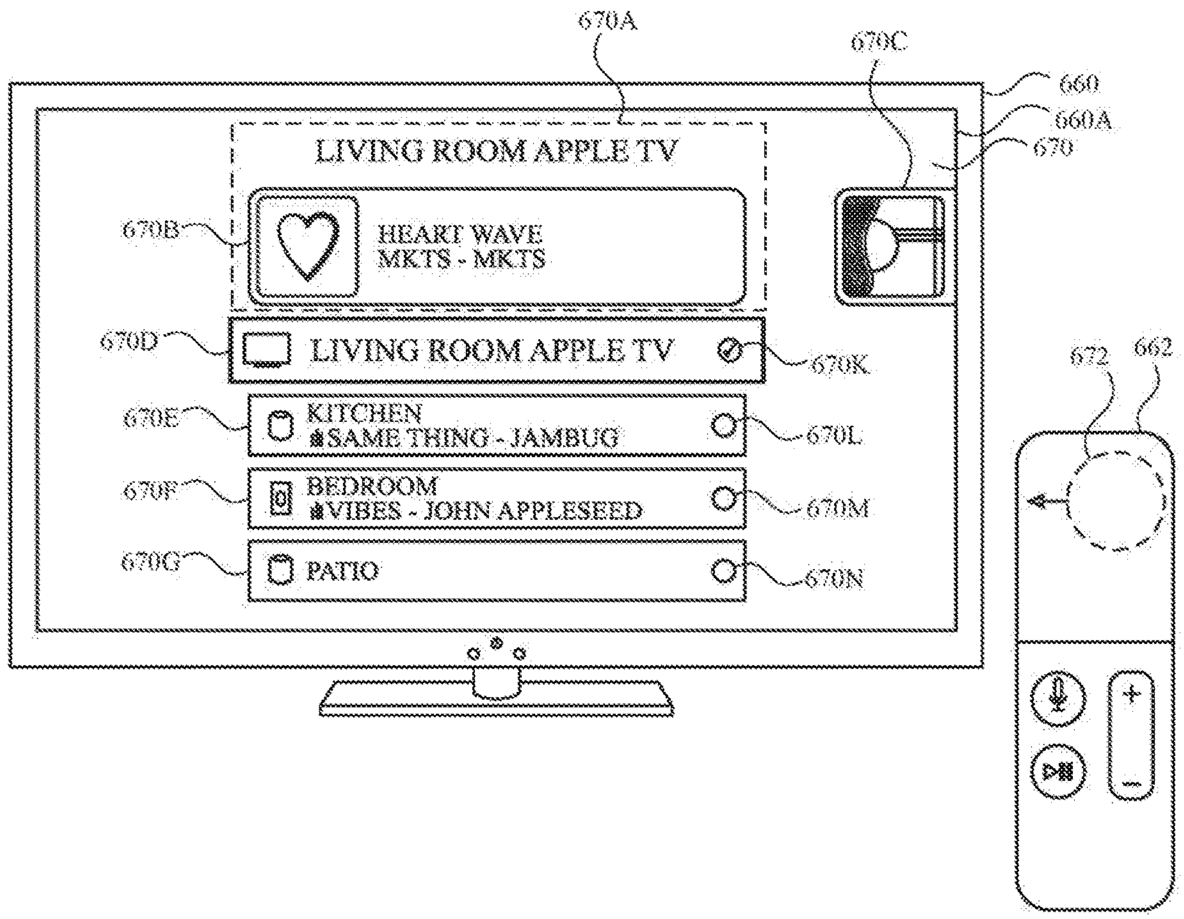
Figure 6A:
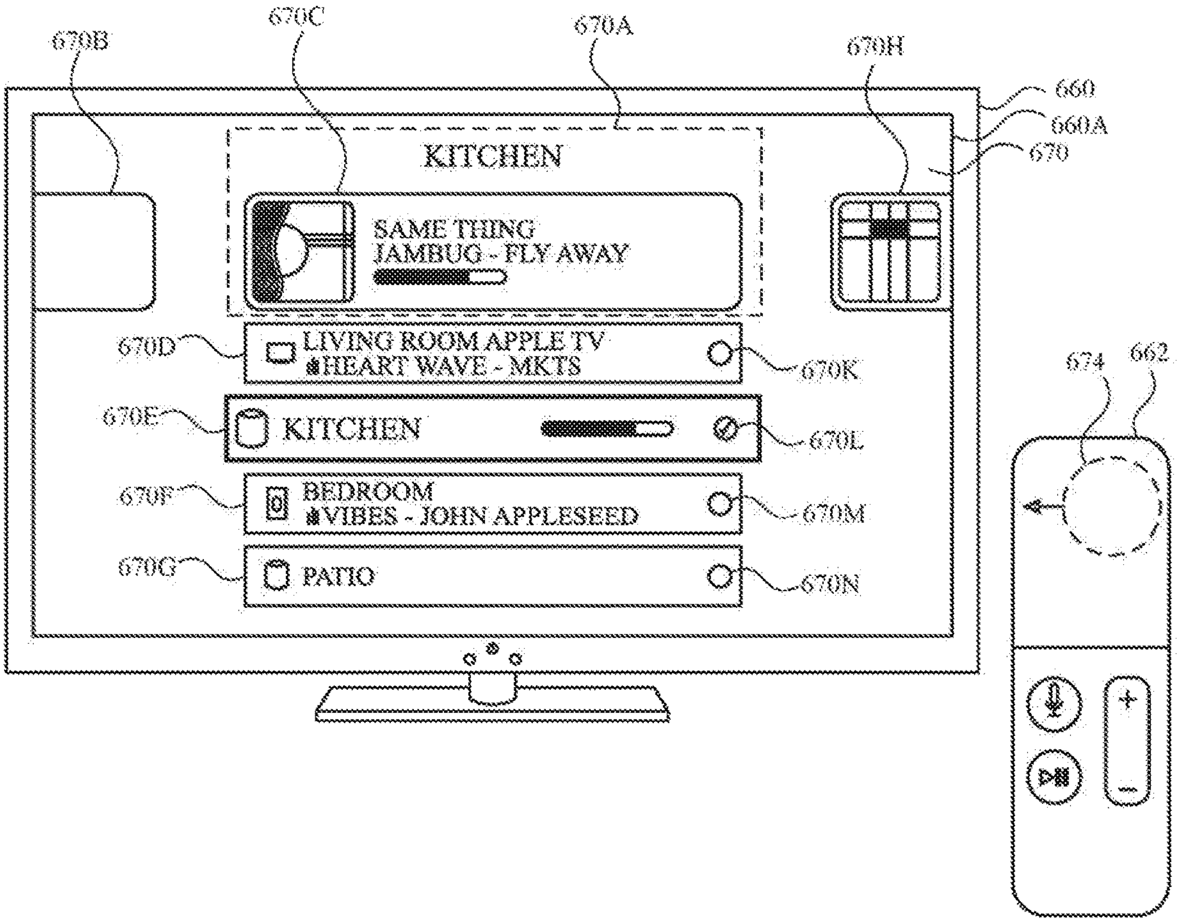
Figure 6A:
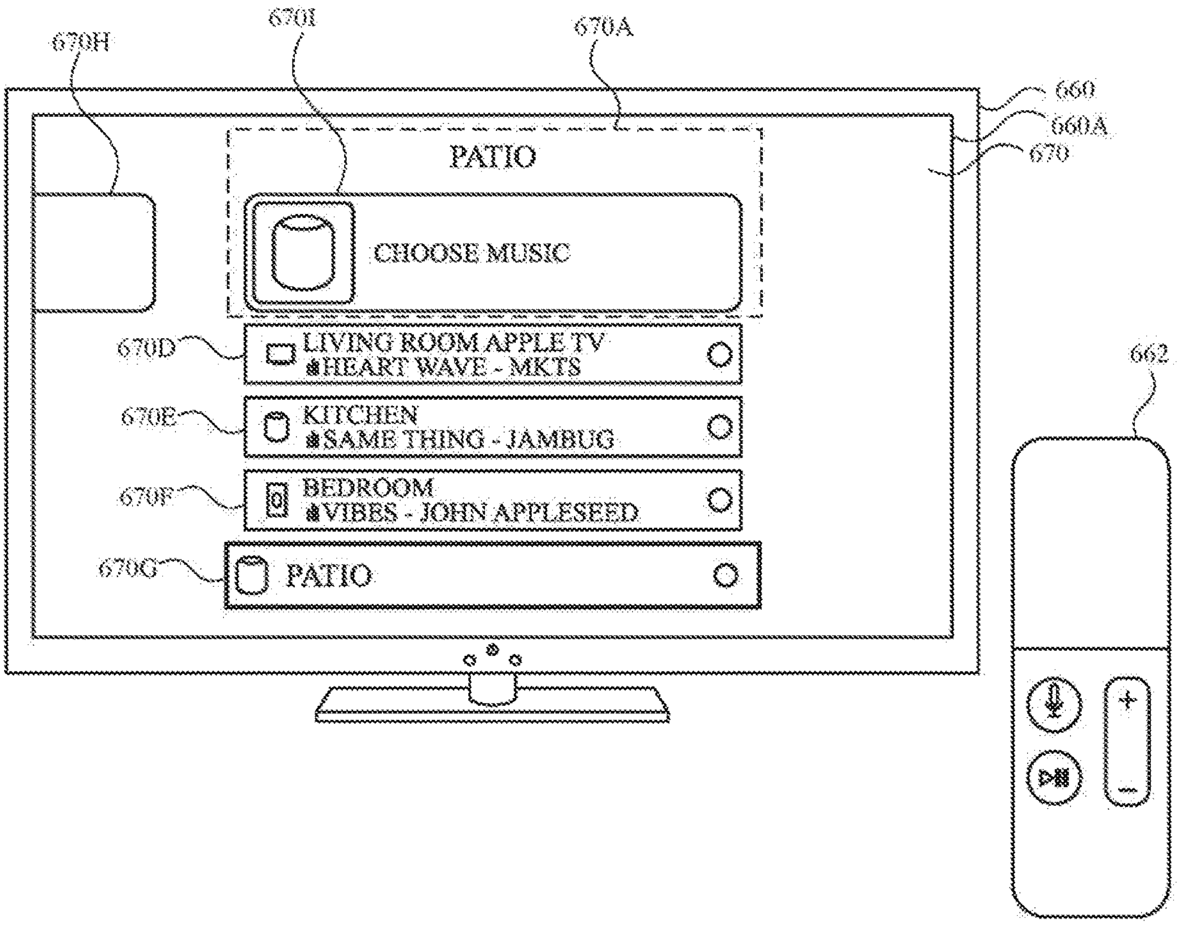
Figure 6A:
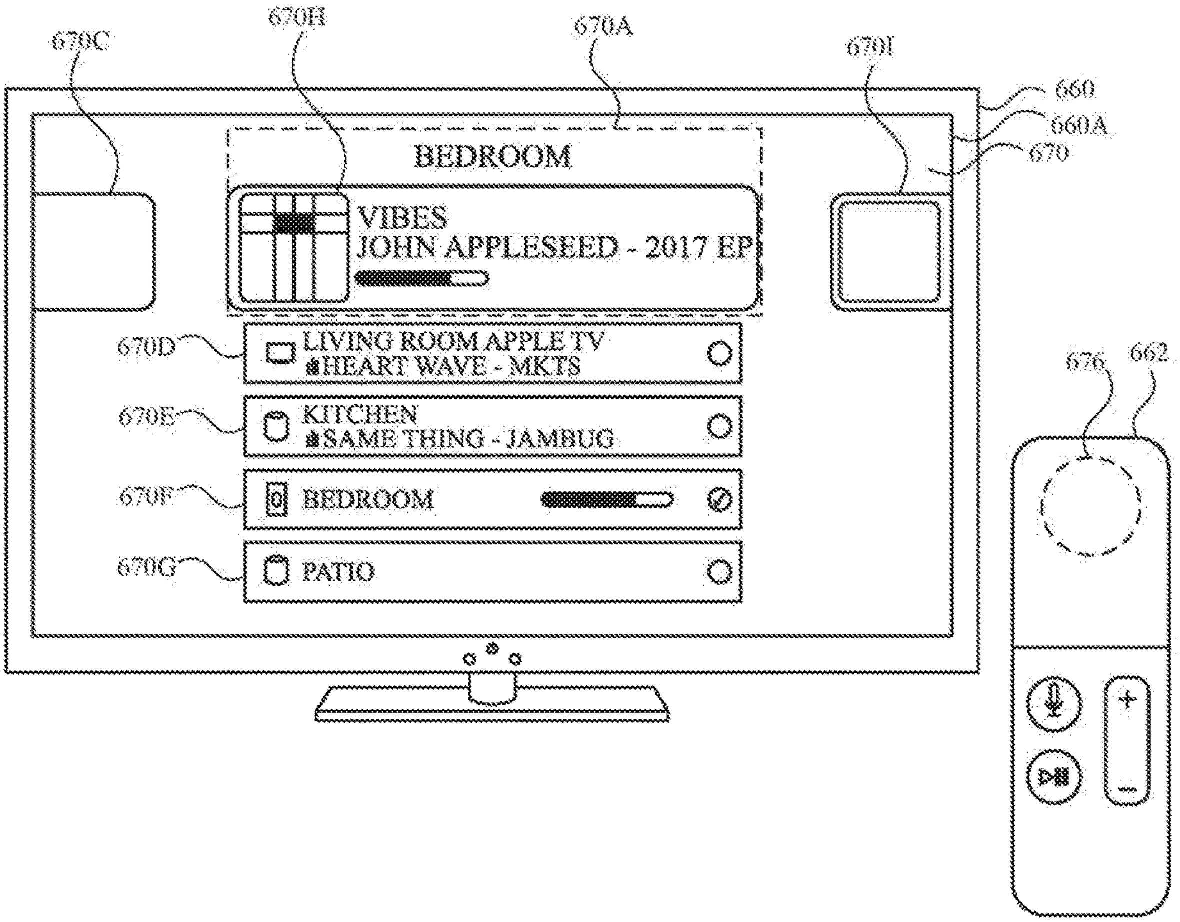
Figure 6A:
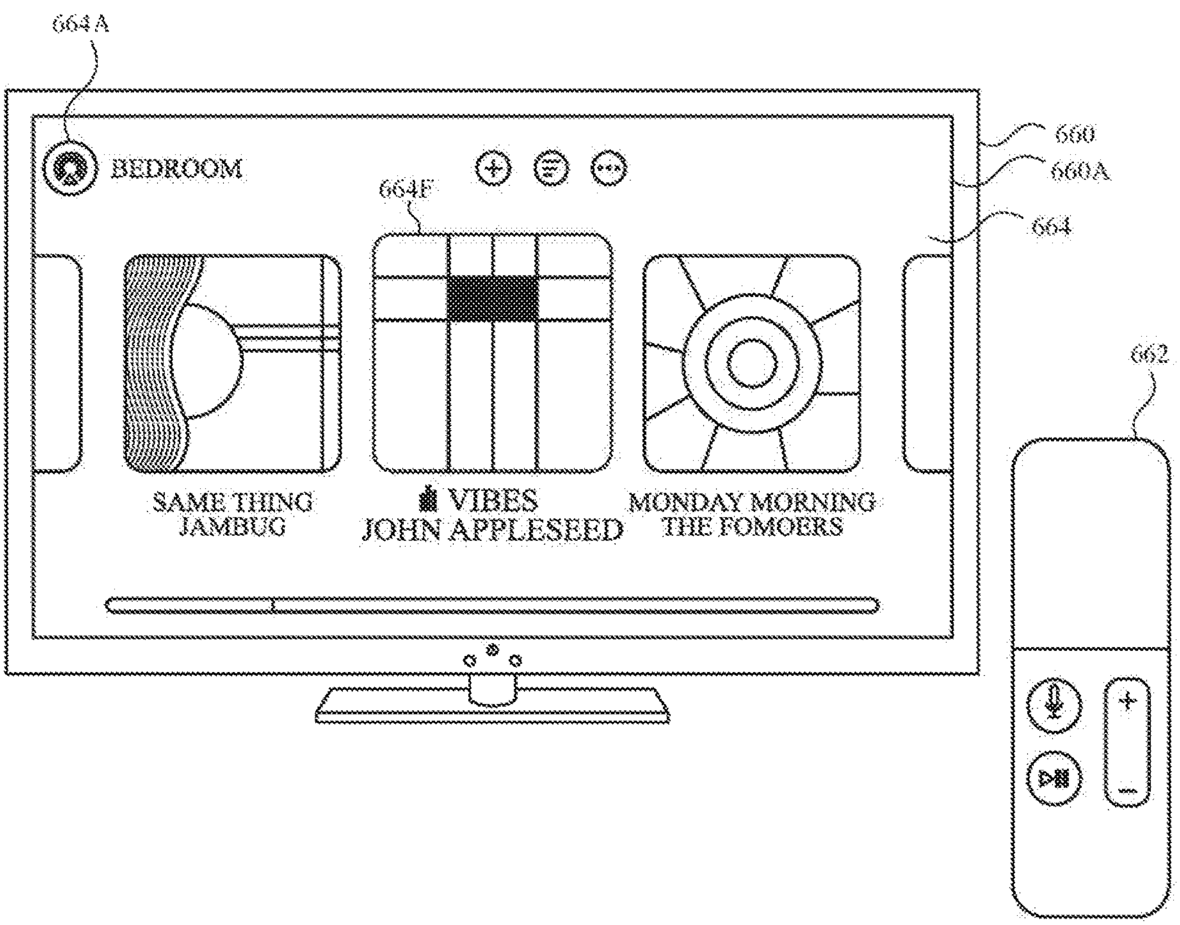
Figure 6A:
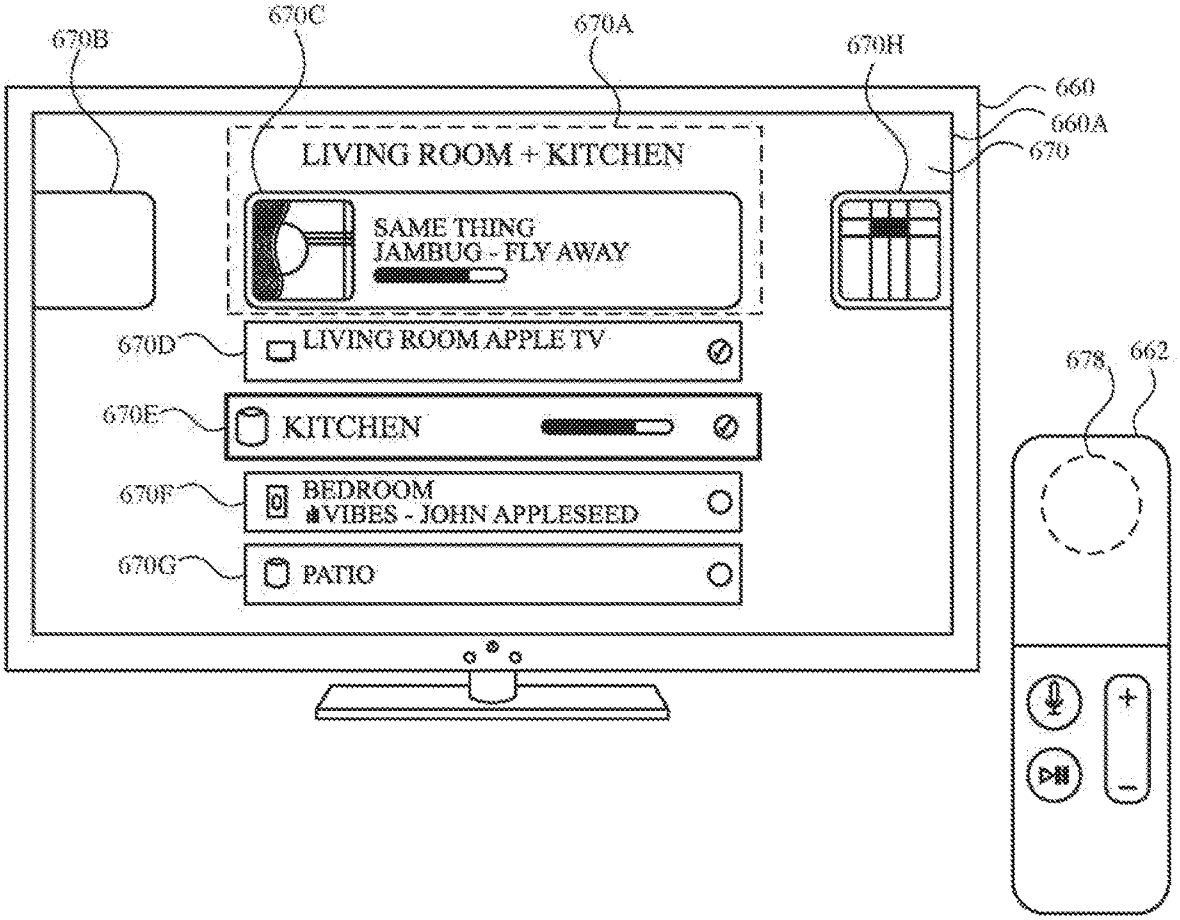
Figure 6A:
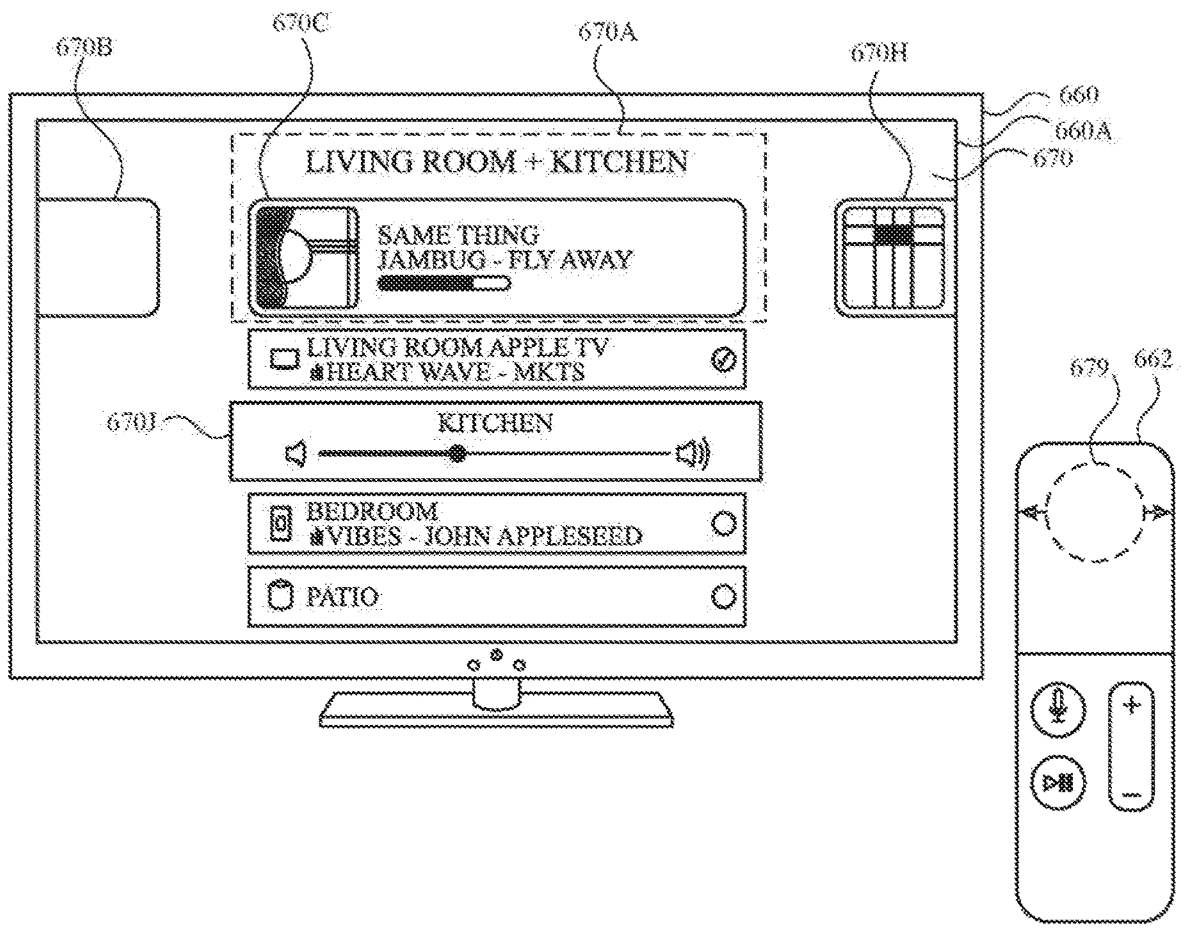
Figure 6A:
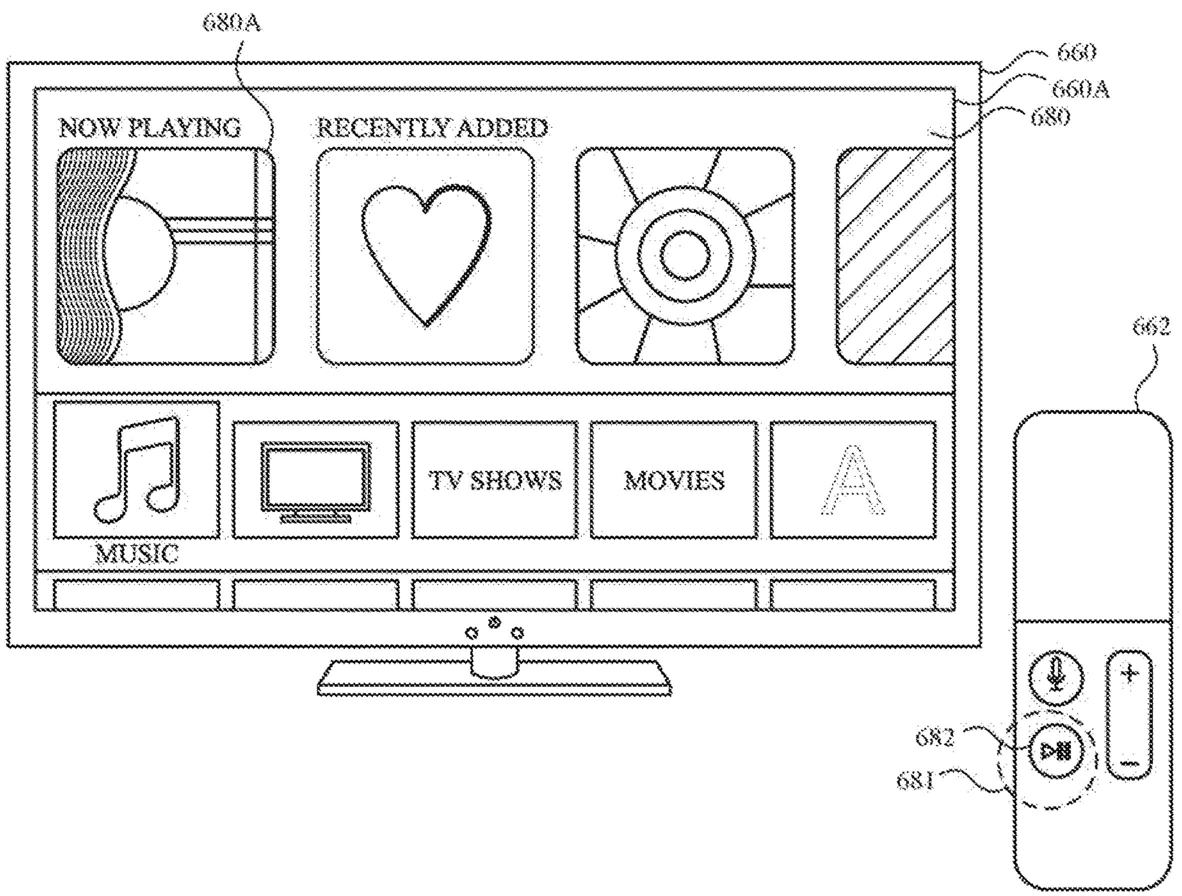
Figure 6A:
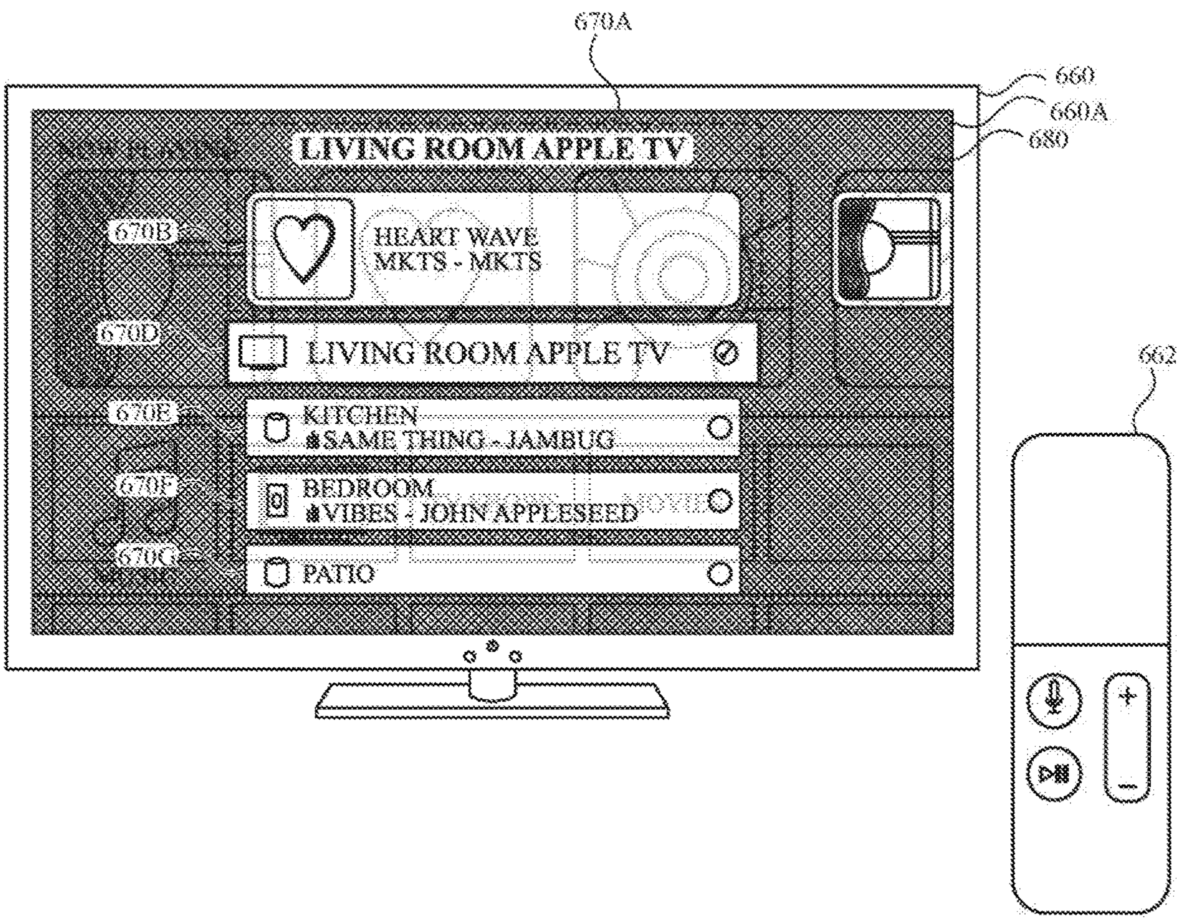
Figure 6A:
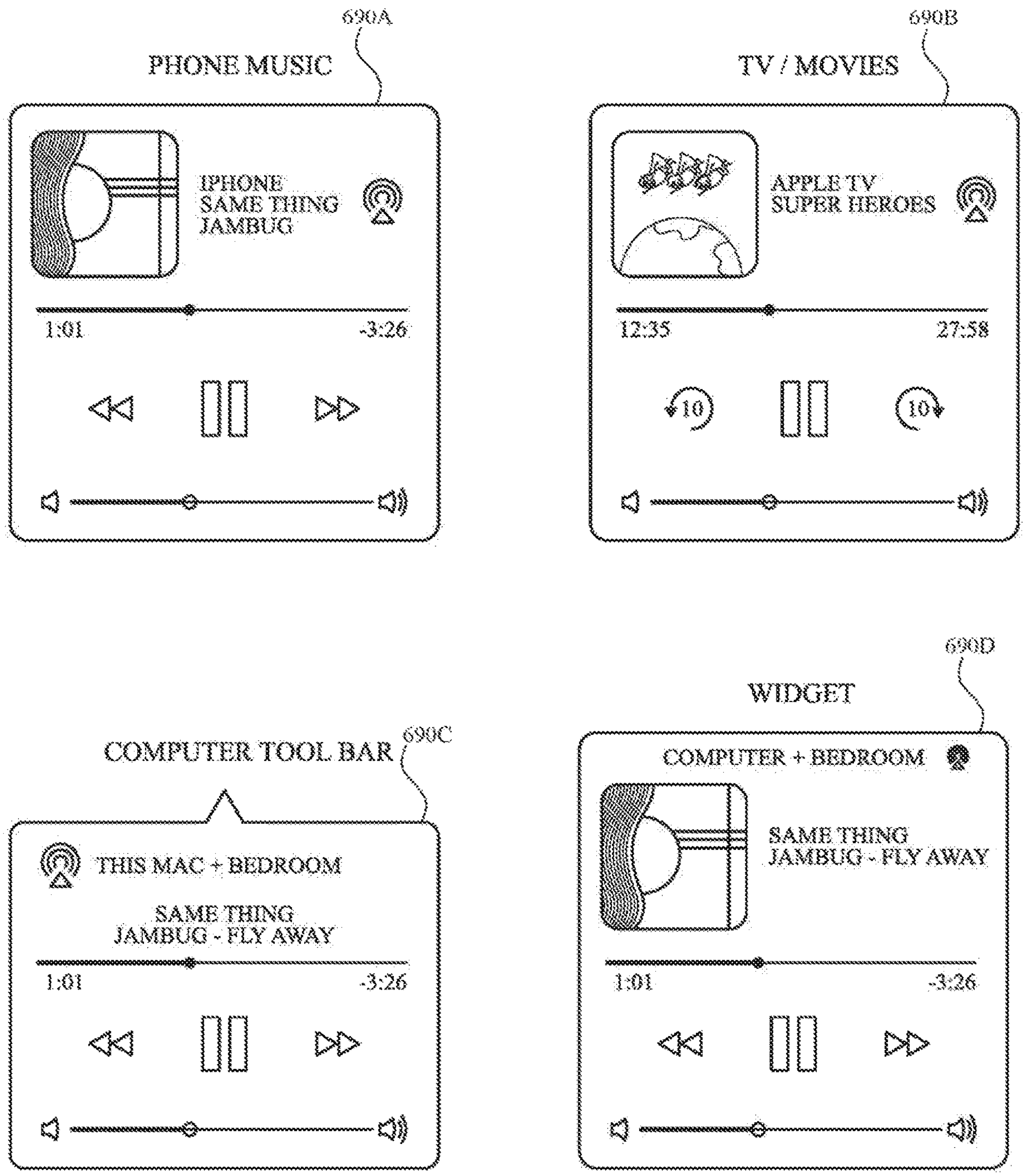
Figure 7A:
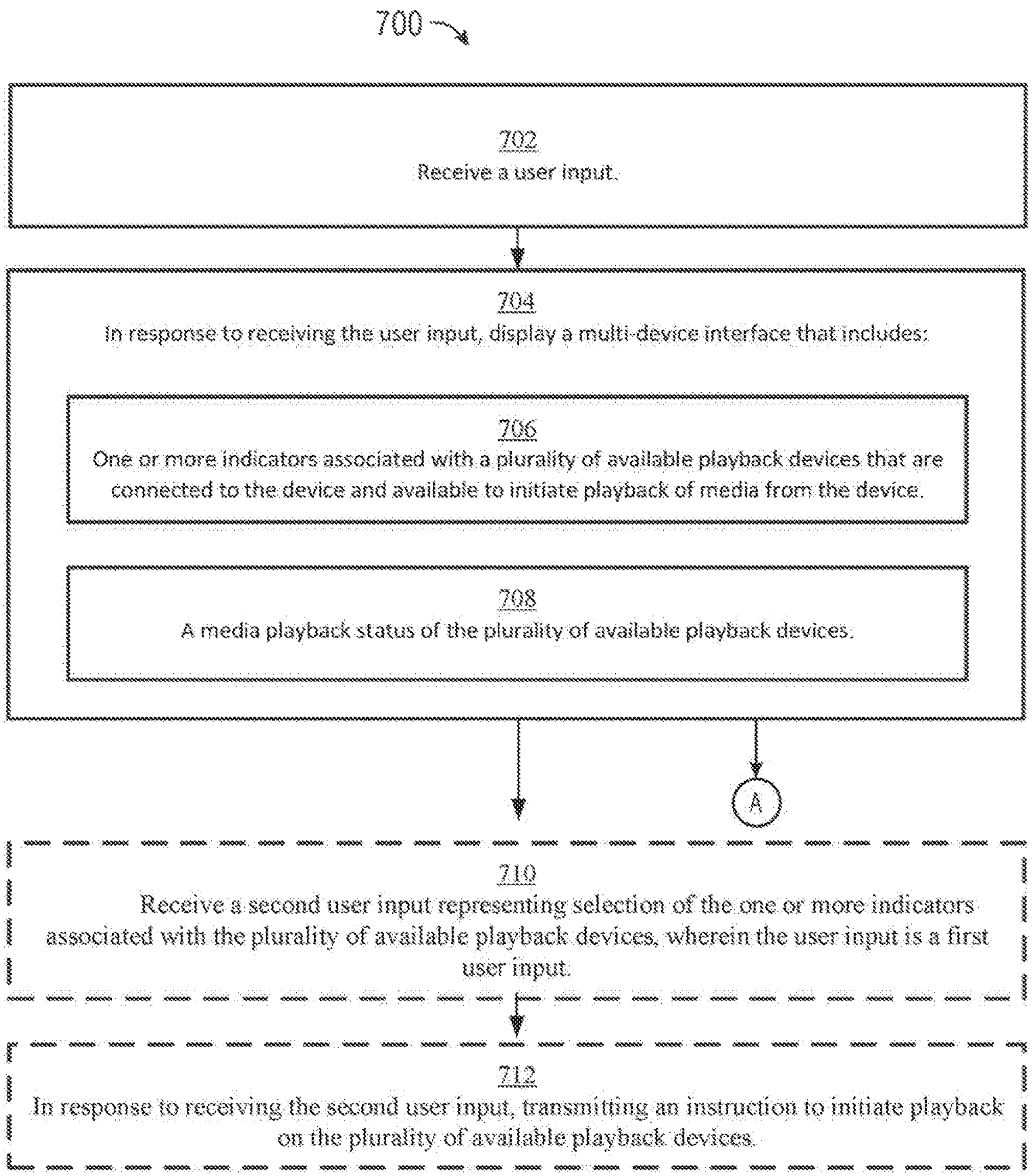
Figure 7C:
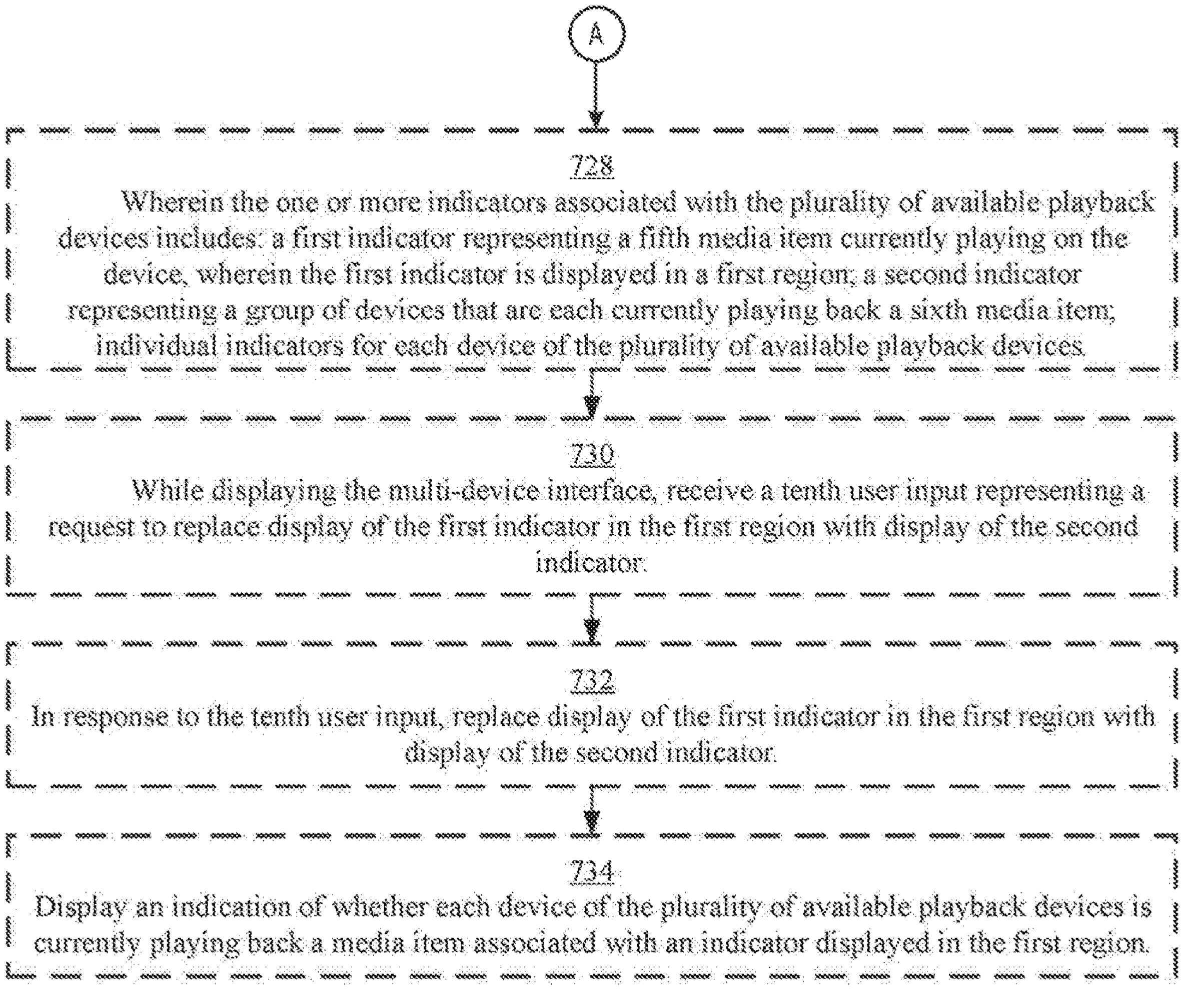
Figure 7D:
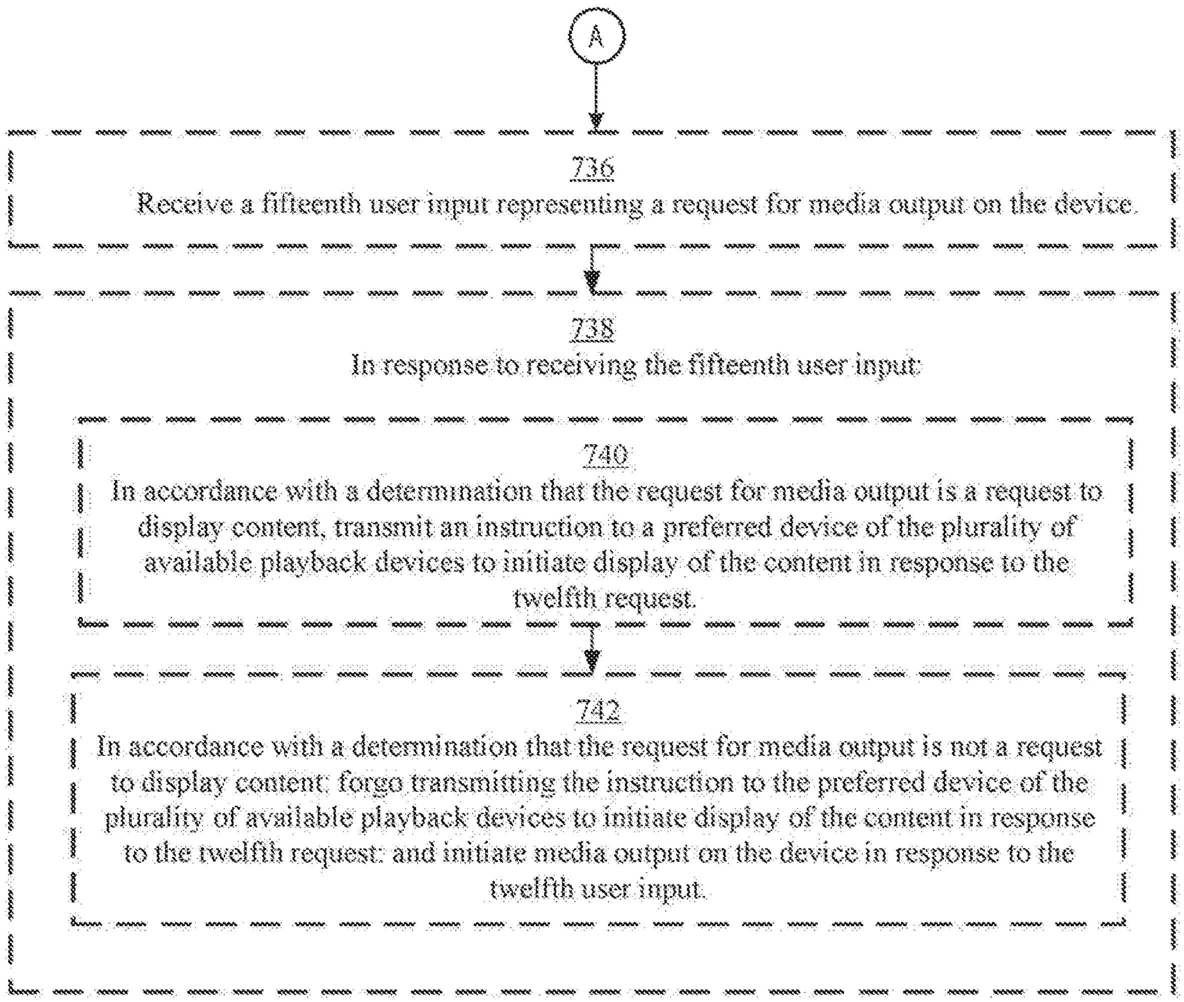

A user may desire to view the media status of the plurality of devices within their home at any time, even while viewing an interface for a non-media related application on their device. Thus, a technique for accessing a multi-device interface easily and quickly from any application executing on a device is described herein. FIGS. 6Y-6AA illustrate an exemplary technique for accessing a multi-device interface, in accordance with some embodiments. FIG. 6Y illustrates an exemplary interface for an application. Web browsing interface 640 depicts a currently displayed web browsing session (e.g., a home page of the website "Apple.com"). The web browsing interface 640 includes webpage content 640A. At FIG. 6Z, device 600 receives a user input 642. In some examples, user input 642 is a swipe gesture from an edge of a touch-sensitive surface of device 600. In some examples, in response to user input 642, device 600 displays a playback control interface. For example, in response to user input 642, device 600 displays playback control interface 606A of FIG. 6C. In some embodiments, in response to receiving user input 608A on device selection affordance 606B at playback control interface 606A, device 600 displays a multi-device interface (e.g., 610 of FIG. 6AA).

FIG. 6AA illustrates an exemplary multi-device interface visually overlaid on an application interface. As shown in FIG. 6AA, multi-device interface 610 includes individual indicators for available playback devices. In the example depicted in FIG. 6AA, there is only one media session currently active on available devices in the user's home—which includes the playback of "Same Thing" by "Jambug" on the current device 600. In some examples, the multi-device interface is concurrently displayed with previously-displayed content. For example, as shown in FIG. 6AA, the multi-device interface 610 is visually overlaid (e.g., displayed in a first region) over the web browsing interface 640 (e.g., displayed in a second region).

FIGS. 6AB-6AC illustrate exemplary techniques for adjusting a volume of available playback devices. FIG. 6AB depicts multi-device interface 610 with a single media session that includes playback of the media item "Same Thing" by "Jambug" on three devices: "iPhone" (e.g., device 600), the Kitchen set of devices, and the Living Room set of devices. FIG. 6AB depicts individual volume control affordance 610S (corresponding to the device iPhone), individual volume control affordance 610T (corresponding to the device set Kitchen), individual volume control affordance 610U (corresponding to the device set Living Room). For example, individual volume control affordances are selectable and can be manipulated (e.g., left and right) in order to adjust volume of the respective corresponding device. In some examples, an individual volume control affordance is not displayed for devices that are not included in the current media session (e.g., the device Bedroom in FIG. 6AB does not correspond to a displayed individual volume control affordance). FIG. 6AB also depicts a group volume control affordance 610D, which is selectable and can be manipulated (e.g., left and right) in order to adjust volume of the plurality of devices included the media session represented by indicator 610A. For example, at FIG. 6AB, device 600 receives user input 644 on group volume control affordance 610D, which represents a tap and slide gesture in a leftward direction (e.g., representing a request to lower the volume). In response to the user input 644, the device lowers the group volume as represented by the location of the sliding affordance 610D, as shown in FIG. 6AC. FIG. 6AC also illustrates that the individual volume control affordances for each device in the group have been correspondingly lowered.

FIGS. 6AD-6AG illustrate exemplary interfaces for initiating playback on a preferred device. In certain instances, a user may desire to initiate playback of media automatically at one or more preferred devices. For example, because media content can include a visual aspect (e.g., if the media is a video), it can be desirable to automatically initiate playback of such content on a device with a display, or on a device with a large display (e.g., larger than the device that receives the user input request to initiate playback). For example, the user may browse for media content using their personal device (e.g., device 600) that has a relatively small screen, but desire that playback of a selected media item (e.g., a feature-length film) begin on their large-screen television. In other examples, the user may request playback of media via voice commands to a device (e.g., device 580) that does not have video playback capabilities. In this latter example, the device without the video playback capability is able to receive the user's request, but hands off video playback responsibility to another device.

Turning to the figures, FIG. 6AD illustrates an exemplary browsing interface. As shown in FIG. 6AD, media browsing interface 650 includes a media item with video content. In this example, media item 650A represents an episode of a television show named "Super Heroes". At FIG. 6AE, the device 600 receives user input 652 associated with media item 650A. In some examples, user input 652 is a tap or touch on media item 650A. In some examples, user input 652 is a deep press on media item 650A.

In response to receiving the user input 652, device 600 displays message interface 654 in FIG. 6AF. Message interface 654 includes an indication that playback of the video content is or has been initiated on a different device ("Beginning playback on Apple TV") that is not device 600. In this example, the device named "Apple TV" is different than device 600, and represents a preferred device for playback of video media. For example, the device Apple TV can be connected to the user's large-screen TV. In some embodiments, in response to the user input (e.g., user input 652) the device (e.g., 600) determines whether it is currently connected to a home network. In accordance with a determination that the device is currently connected to the home network, the device initiates (e.g., transmits an instruction to initiate) playback on the preferred device. For example, if the device determines that the user is home, it forgoes initiating playback on itself, and initiates playback on the external preferred device. In accordance with a determination that the device is not currently connected to the home network, the device initiates playback on itself. For example, if the device determines that the user is not home, it initiates playback on itself. In some examples, the preferred device is a set of preferred devices (e.g., one or more). In some examples, a preferred device (or set of devices) is predetermined. For example, a preferred device can be selected by the user and saved into device or user account settings. In another example, a preferred device is automatically selected. For example, if the user's home only includes one recognized video capable external device (e.g., an Apple TV), it may be designated as the preferred device. In some embodiments, the device prompts the user whether to initiate playback on a preferred device. For example, regardless of whether a preferred device has been preconfigured by the user, the device 600 may prompt (e.g., visually or audibly) and ask "Would you like to initiate playback of "Super Heroes" on your Apple TV?" in response to user input 652.

FIG. 6AG illustrates an exemplary playback control interface for video content. Playback control interface 656 includes an indication 656A of the currently playing media content ("Super Heroes"), playback control affordances 656B (e.g., rewind 10 seconds, pause, and skip 10 seconds), and an indication 656C of the device currently playing back the media content ("Apple TV"). In some embodiments, interface 656 is displayed subsequent to message interface 654.

FIGS. 6AH-6AQ illustrate exemplary multi-device interfaces. As described herein, a multi-device interface can be used to view and control media playback status of a plurality of available playback devices throughout a set of interconnected devices (e.g., devices in a user's home and associated with the user's account). Thus, a plurality of different types of devices can be controlled and each device can have a different interface. For example, the set of devices in a home can comprise a first smart speaker (e.g., 580) made by a first manufacturer, a second smart speaker (e.g., 580) made by a second manufacturer different than the first, and home media hub (e.g., an Apple TV by Apple Inc. of Cupertino, Calif. USA). An exemplary home media hub can include or otherwise be connected to a large display (e.g., larger than the display of personal device 600), and thus can have an identical, a similar, or a different interface than those described above with respect to device 600. Additional exemplary interfaces are described in detail below.

FIG. 6AH illustrates an exemplary current media interface 664, displayed on display 660A of device 660. In some embodiments, device 660 includes one or more features of device 100, 300, or 500. Device 660 is itself a device included in the set of devices associated with the user's home (or is otherwise configured to act as a display for a device included in the set of devices associated with the user's home). Current media interface 664 includes a device selection affordance 664A (e.g., that functions similar or the same as device selection affordance 630E of FIG. 6S). Device selection affordance 664A is associated with the text "Living Room Apple TV", which indicates that the device 660 is currently targeted at itself, device 660. Current media interface 664 also includes an indication of currently playing media (e.g., indicator 664C), which is the song titled "Heart Wave" (e.g., indicator 664D) by artist "MKTS" (e.g., indicator 664E). In some examples, indicator 664C of currently playing interface 664 is an animated indictor, further communicating that the associated media item is currently playing back. Indicators 664F and 664G correspond to one or more other media items available for playback.

FIG. 6AH also illustrates an exemplary remote control for controlling device 660. In some examples, remote control 662 is connected to device 660 (e.g., paired) and used by a user to interact with interfaces displayed on device 660. Because a remote control is effectively an extension of a device that is used for controlling the device remotely, for the purposes of this disclosure, a user input received at device 662 is considered the same as a user input received at device 660, unless otherwise noted herein. For example, a tap input received on device 662 that represents a request to select an affordance is considered the same as a tap on device 660 (e.g., if device 660 included a touch-sensitive surface) representing a request to select the same affordance, unless otherwise noted. However, one of skill in the art would appreciate that a user input can be received at any device and communicated to another device (e.g., for processing and performing an action in response), and that the particular device that physically receives the user input is not important, unless specifically noted. Likewise, in the example that device 660 is an external display device (e.g., a television) used by another device (e.g., an Apple TV that is a "home device" that receives and processes user input playback commands), because device 660 is effectively an extension of the other device, device 660 as referred to herein interchangeably with said other device, unless otherwise noted. For example, a reference to the "focus" or "target" of device 660 with respect to controlling media refers to the focus or target of the other device (e.g., Apple TV), unless otherwise noted.

In FIG. 6AH, device 662 receives user input 668 on device 662. User input 668 represents selection of the device selection affordance 664A. In some examples, user input 668 is a button press on device 662 while device selection affordance 664A is highlighted or otherwise selected at interface 664. In some examples, user input 662 is a tap, a tap and hold, or a deep press on a touch-sensitive surface. In some embodiments, device 660 displays a multi-device interface (e.g., 670 of FIG. 6AI) in response to receiving user input 668.

FIG. 6AI illustrates an exemplary multi-device interface, in accordance with some embodiments. Multi-device interface 670 includes an identification of the current focus (e.g., the currently-selected media session) of device 660. Header 670A indicates that the current focus of the device is the Living Room Apple TV (e.g., device 660). Multi-device interface 670 also includes a first indicator 670B, which indicates the currently-targeted media session. For example, the media session represented by indicator 670B includes playback of the song titled "Heart Wave" by artist "MKTS" from album "MKTS". Together, header 670A and indicator 670B (which may be collectively referred to as an indicator) indicate the currently-targeted media session (e.g., media playing back, and on which devices) of interface 670. Multi-device interface 670 also includes a second indicator 670C, which corresponds to a different media session than the currently-selected media session. As shown in FIG. 6AI, indicator 670C is displayed (e.g., partially displayed) on the edge of the display.

As described above with respect to multi-device interface 610, multi-device interface 670 includes individual indicators representing available playback devices (e.g., devices in the user's home). Indicator 670D identifies the current device (named "Living Room Apple TV") and includes the selection indicator 670K. In this example, selection indicator 670K includes a checkmark, which indicates that the device 670D is currently playing back the media of indicator 670B (e.g., is included in the currently-targeted media session). Indicator 670E identifies the set of devices named "Kitchen" and includes indicator 670L, which does not include a checkmark (e.g., the Kitchen set of devices is not currently playing back the media track "Heart Wave" by "MKTS"). Indicator 670E also includes an indication that the Kitchen set of devices are currently playing back other media. For example, in FIG. 6AI, the indicator 670E includes the title of the track "Same Thing" and the artist "Jambug". Indicator 670F identifies the set of devices named "Bedroom" and includes indicator 670M, which does not include a checkmark (e.g., the Bedroom set of devices is not currently playing back the media track "Heart Wave" by "MKTS"). Indicator 670F also includes an indication that the Bedroom set of devices are currently playing back other media. For example, in FIG. 6AI, the indicator 670F includes the title of the track "Vibes" and the artist "John Appleseed". Indicator 670G identifies the set of devices named "Patio" and includes indicator 670N, which does not include a checkmark (e.g., the Patio set of devices is not currently playing back the media track "Heart Wave" by "MKTS").

While multi-device interface 670 is displayed, device 662 receives user input 672, as shown in FIG. 6AI. In some examples, user input 672 is a swipe gesture on a touch-sensitive surface of device 662. For example, user input 672 is a leftward swipe.

In response to a user input (e.g., swipe gesture), in some examples, the device updates multi-device interface 670A to focus on a different media session. As shown in FIG. 6AJ, in response to user input 672 that is a leftward swipe, device 660 replaces display of the first indicator 670B with the display of second indicator 670C, which had been displayed immediately to the right of the first indicator 670B in FIG. 6AI. Thus, the multi-device interface 670 can be used to switch between different media sessions, visually indicated by switching between corresponding indicators. In some examples, other user inputs can be used to switch the multi-device interface between media sessions. For example, other user inputs include up or down directional gestures, left or right directional gestures, selection of one or more affordances (e.g., a left or right arrow), press of a button on a device (e.g., device 662), or any other appropriate type of user input.

As shown in FIG. 6AJ, in response to the user input 672, the current media session now corresponds to indicator 670C, which includes playback on the set of devices identified as "Kitchen" (e.g., as shown in updated header 670A) of the media item titled "Same Thing" by artist "Jambug" from the album "Fly Away" (e.g., as shown in indicator 670C). Additionally, the individual device indicators 670D-670G have been updated based on the currently displayed media session associated with indicator 670C. Thus, the device set named Kitchen corresponding to indicator 670E is the only device set that includes a checkmark (e.g., in corresponding indicator 670L). Further, FIG. 6AJ shows indicator 670H (not previously displayed) is now displayed in the area of the display where indicator 670C was displayed prior to user input 672. Thus, an additional leftward swipe (e.g., 674 of FIG. 6AJ), in this example, would cause indicator 670H to replace indicator 670C. FIG. 6AJ also shows indicator 670B displayed (e.g., partially) to the left of indicator 670C. Thus, a rightward swipe, in this example, would cause indicator 670B to replace display of indicator 670C (e.g., as shown in FIG. 6AI).

FIG. 6AK illustrates multi-device interface 670 with a current media session corresponding to indicator 670I (e.g., one leftward swipe from the media session represented by indicator 670H, and two leftward swipes from the media session represented by indicator 670C). In some embodiments, a media session corresponds to a set of devices that are not currently playing back media. For example, as shown in FIG. 6AK, the current media session includes the device set named "Patio". Rather than include an identification of a currently playing media item, indicator 670I includes the text "Choose Music". Likewise, indicator 670G does not include an indication of a media item.

FIG. 6AL illustrates multi-device interface 670 with a current media session corresponding to indicator 670H (e.g., one leftward swipe from the media session represented by indicator 670C, and one rightward swipe from the media session represented by indicator 670I). As shown in FIG. 6AL, indicator 670H is currently highlighted. In this example, while the indicator 670H is highlighted, device 662 receives a user input 676. In some examples, user input 676 is a tap, touch, or press received at device 662. In response to receiving the user input 676, device 660 displays current media interface 664 as shown in FIG. 6AM. As shown in FIG. 6AM, current media interface 664, displayed in response to user input 676, indicates the device 660 is currently targeted at a media session that includes the devices named "Bedroom" (e.g., as indicated by device selection affordance 664A) that is currently playing the song titled "Vibes" by "John Appleseed" (e.g., corresponding to indicator 664F, showing the album cover for the song). Thus, the focus of the device 660 has been changed (e.g., as compared to FIG. 6AH), and selection of new media for playback (e.g., using interface 664) will affect the currently targeted media session.

FIG. 6AN illustrates an exemplary multi-device interface that includes a currently-selected media session that includes two device sets. In FIG. 6AN, both the Kitchen and Living Room sets of devices are included in the current media session (e.g., playback of the song titled "Same Thing"). As shown in FIG. 6AN, indicator 670E is currently highlighted. User input 678 is received at device 662 while indicator 670E is highlighted.

In some examples, in response to user input 678 on a selected indicator corresponding to one or more devices, a volume control affordance is displayed. As shown in FIG. 6AO, in response to the user input 678 while indicator 670E is selected, device 660 enters a volume adjustment mode for the corresponding device set named Kitchen. For example, a volume adjustment affordance 670J is displayed (e.g., replacing indicator 670E temporarily). While in the volume adjustment mode, the device 662 receives a user input 679, and in response, adjusts the volume of the Kitchen device set accordingly. In some examples, user input 679 is a directional swipe (e.g., left or right, up or down).

FIG. 6AP illustrates an exemplary browser interface, in accordance with some embodiments. As shown in FIG. 6AP, browser interface 680 includes an indicator 680A of media that is now playing, which represents the currently-targeted media session, as well as recently added media items (e.g., that when selected cause playback to initiate on the devices in the currently-selected media session). In some examples, while browser interface 680 is displayed, user input 681 is received. In some examples user input 681 is a selection of button 682 of device 662. In some examples, user input 681 is a tap and hold user input, a press and hold (e.g., of a button), a deep press, a double tap or double press, or any other appropriate user input on device 662 or device 660.

As shown in FIG. 6AQ, in response to user input 681, device 660 displays multi-device interface 670 overlaid on the browser interface 680. In some examples, multi-device interface 670 is displayed concurrently with other interfaces of device 660. For example, user input 681 provides a quick access to multi-device interface so that a user can quickly view and control the media playback status of devices throughout their home, even when performing other tasks or operations (e.g., using other, non-media related applications).

FIG. 6AR illustrates a variety of exemplary playback control interfaces. Playback control interface 690A represents an interface for controlling audio playback, in accordance with some embodiments. Playback control interface 690B represents an interface for controlling video playback, in accordance with some embodiments. Playback control interface 690C represents an interface for controlling audio, in accordance with some embodiments. For example, playback control interface 690C is suited for use as a pop-up interface (e.g., of a tool bar or web browser). For instance, in response to selection of an affordance, interface 690C can protrude from the selected affordance (e.g., from the pointed shape on one of its sides), temporarily covering currently displayed content (e.g., until dismissed). Playback control interface 690D is an alternative to 690A, for example, and can be used as a persistent "widget" in a device operating system interface.

In some embodiments, a device (e.g., device 600) is configured to receive playback coordination responsibility from another device (e.g., device 580). For example, a device that is configured to receive or perform playback coordination responsibility (also referred to as a "hero device") is a device that is configured to perform one or more of the following tasks: issue commands to one or more external devices to synchronize and/or control playback of media on the external devices; store a media item or a playback queue for playback; access a content stream from a remote location (e.g., an internet location); provide a content stream (e.g., of media) to one or more external devices for playback; and process playback control instructions for a media session (e.g., receive, process (e.g., deduplicate redundant requests), and forward instructions to appropriate devices). In some embodiments, device 600 coordinates playback on a set of device. In some embodiments, the set of devices excludes the device 600. For example, if the set of devices does not include a device configured to be hero device, device 600 retains playback coordination responsibility. In some embodiments, device 600 transfers playback coordination responsibility to a device configured to be a hero device. For example, if the set of devices includes a device configured to be hero device, device 600 transfers playback coordination responsibility to that device (e.g., such as a device 580). Playback coordination responsibility is described in more detail below.

FIGS. 7A-7D is a flow diagram illustrating a method for accessing media playback status of a plurality of available playback devices using an electronic device in accordance with some embodiments. Method 700 is performed at a device (e.g., 100, 300, 500, 580) with a display. Some operations in method 700 are, optionally, combined, the order of some operations are, optionally, changed, and some operations are, optionally, omitted.

As described below, method 700 provides an intuitive way for accessing media playback status of a plurality of available playback devices. The method reduces the cognitive burden on a user when accessing media playback status of a plurality of available playback devices, thereby creating a more efficient human-machine interface. For battery-operated computing devices, enabling a user to access media playback status of a plurality of available playback devices faster and more efficiently conserves power and increases the time between battery charges.

The electronic device (e.g., 600) receives (702) a user input. For example, the device receives user input (e.g., 608A of FIG. 6E) selection of an affordance (e.g., 606B of FIG. 6E). In some examples, the device receives a user input (e.g., 608B of FIG. 6F) associated with a playback control interface (e.g., 606A of FIG. 6C).

In response to receiving the user input, the electronic device (e.g., 600) displays (704), on the display, a multi-device interface (e.g., 610) that includes: one or more indicators (e.g., 610A, 610F, 610G) (706) associated with a plurality of available playback devices that are connected to the device (e.g., 600) and available to initiate playback of media from the device (e.g., 600), and a media playback status (e.g., as indicated by 610F and 610G) (708) of the plurality of available playback devices. In some examples, a media playback status includes one or more of: an indication of what is currently being played on the plurality of available playback devices. In some examples, the devices in the plurality of available playback devices are associated with a user, a user account, or a plurality of devices associated with a user. For example, the devices may be a collection of devices belonging to the user or designated as residing inside of a user's home. In some embodiments, an indicator of the one or more indicators can be associated with more than one available playback device. For example, devices that are currently playing the same content can be grouped and displayed as a single indicator (e.g., 610A of FIG. AB).

Displaying a multi-device interface that includes one or more indicators associated with a plurality of available playback devices that are connected to the device and available to initiate playback of media from the device, along with a media playback status of the plurality of available playback devices, provides the user with visual feedback about the state of a plurality of devices that are available for media playback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Additionally, displaying such a multi-device interface allows the user to collectively view a plurality of states for a plurality of available devices in one optimized interface. Providing an optimized interface to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, one or more devices are "connected" when data can be exchanged between the devices. For example, devices can be connected to a common Local Area Network ("LAN") that enables data exchange between the devices. In some embodiments, one or more connected devices are connected directly. In some examples, a direct connection between two devices does not rely on an intermediate device between two directly connected devices. For example, a direct connection can be formed between a device that creates a Wi-Fi connection directly to a second device, without requiring an intermediate wireless access point ("WAP") to facilitate the connection.

In some embodiments, one or more devices are connected indirectly. In some examples, an indirect connection between two devices includes (e.g., is routed through) an intermediate device between two connected devices. For example, an indirect connection can be formed between a device that is connected to a common wireless (e.g., Wi-Fi) connection through an intermediate WAP.

In some embodiments, one or more devices are "connected" by virtue of each being logged into (or otherwise associated with) the same user account. For example, a user may have two personal devices that are both logged into an account for a cloud-based service and thus are connected. For instance, the user's phone (e.g., an iPhone) and their tablet computer (e.g., an iPad) can both be logged into the user's iCloud account. In this example, the iPhone and the iPad can exchange data through the cloud-based service (e.g., a cloud server). In some embodiments, the device is connected to the available playback devices such that the device can initiate playback of media on one or more of the available playback devices. For example, an available playback device can begin playback of an media file (or stream), transfer playback (currently playing on the device) to the available device, or add the available device to concurrently play back of media a currently playing on the device).

In some embodiments, the user input (e.g., 608A of FIG. 6E) is a first user input, and the electronic device (e.g., 600), receives (710) a second user input (e.g., 615 or 616) representing selection of the one or more indicators associated with the plurality of available playback devices. In response to receiving the second user input, the electronic device transmits (712) an instruction to initiate playback on the plurality of available playback devices. In some embodiments, the plurality of devices begin playback immediately. In some embodiments, the available devices begin playback without building up a buffer of media data and then, during playback, build up a buffer. Thus, for example, delay between when a user selects a media item and hears playback is reduced. In some embodiments, playback does not begin until a certain proportion of devices of the plurality are ready to begin playback. For example, playback can begin when 75% of devices are ready (e.g., have buffered a minimum amount of media).

In some embodiments, the user input (e.g., 608A of FIG. 6E) is a first user input, and while displaying the multi-device interface (e.g., 610), the electronic device (e.g., 600) displays (714), on the display (e.g., 602), a first indicator (e.g., 610E, 610F, or 610G of FIG. 6H). The electronic device receives (716) a third user input (e.g., 612 or 616) representing selection of the first indicator (e.g., 610E or 610F). In response to receiving the third user input, the electronic device displays (718), on the display, affordances (e.g., 610H-610O of FIG. 6J or FIG. 6N), for each of the devices of the plurality of available playback devices. For example, after selecting an indicator (e.g., 610) for a group of devices (e.g., "Kitchen" and "Living Room" of FIG. 6N), the multi-device interface includes affordances (e.g., 610H, 610J, 610L, and 610N) for each device in the home (e.g., iPhone, Bedroom, Kitchen, and Living Room in the example in FIG. 6N).

In some embodiments, while the electronic device (e.g., 600) is playing back a first media item (e.g., represented by 610A of FIG. 6J), the electronic device receives (720) a fourth user input (e.g., 616) representing selection of a second indicator (e.g., 610F) of the one or more indicators, wherein the second indicator is associated with a set of playback devices that does not include the device. In some embodiments, a set of playback devices includes one or more playback devices. Subsequent to receiving the fourth user input representing selection of the second indicator, the electronic device displays (722), on the display, a browsing interface (e.g., 620), wherein the browsing interface includes an affordance (e.g., 620B) associated with a second media item. The electronic device (e.g., 600) receives (724) a fifth user input (e.g., 622) representing selection of the affordance associated with the second media item. In response to receiving the fifth user input (726), the electronic device (e.g., 600): transmits an instruction to initiate playback of the second media item on the set of playback devices that does not include the device (e.g., 600); and continues playing back the first media item (e.g., represented by 610A of FIG. 6J) on the electronic device (e.g., 600). For example, in response to the user input selection of affordance 620B (associated with media item "Monday Morning" by "The Fomoers"), the device initiates playback of the associated media item on the selected devices named "Kitchen" and "Living Room" (e.g., a shown selected in FIG. 6N). Further, playback continues on the electronic device (e.g., named iPhone in this example) of the media item titled "Same Thing" by artist "Jambug" (e.g., as shown in FIG. 6N).

In some embodiments, the browsing interface (e.g., 620) includes an affordance associated with a third media item (e.g., 620B), and the electronic device receives a sixth user input (e.g., 622) associated with the affordance associated with the third media item. In accordance with receiving the sixth user input, the electronic device displays, on the display, the multi-device interface. For example, after receiving a deep press on a media item (e.g., a song), the device displays the multi-device interface (e.g., 610 of FIG. 6J).

In some embodiments, the sixth user input (e.g., 622) is a press and hold. In some embodiments, in response to the sixth user input, the electronic device displays a menu (e.g., 624) with an affordance (e.g., 624A), selection of which causes the multi-device interface (e.g., 610) to be displayed.

In some embodiments, the sixth user input (e.g., 622) has a characteristic intensity. In accordance with a determination that the characteristic intensity of the sixth user input meets the intensity-dependent criteria, and subsequent to receiving the sixth user input, the electronic device (e.g., 600) displays, on the display (e.g., 602), the multi-device interface (e.g., 610). In some embodiments, in response to the sixth user input, the electronic device displays a menu (e.g., 624) with an affordance (e.g., 624A), selection of which causes the multi-device interface (e.g., 610) to be displayed. In accordance with a determination that the characteristic intensity of the sixth user input does not meet the intensity-dependent criteria, and subsequent to receiving the sixth user input: the electronic device forgoes displaying, on the display, the multi-device interface; and transmits an instruction to initiate playback of the third media item (e.g., 620B) on the set of playback devices that does not include the device (e.g., Living Room+Kitchen, as shown in FIG. 6N).

In some embodiments, to display the multi-device interface (e.g., 610), the electronic device (e.g., 600) concurrently displays, on the display (e.g., 602): a first region (e.g., 611A of FIG. 6U) that includes the multi-device interface (e.g., 610 of FIG. 6U); and a second region (e.g., 611B of FIG. 6U) that includes content (e.g., 630) displayed prior to displaying the multi-device interface.

In some embodiments, the first region (e.g., 6611A) is visually overlaid on the second region (e.g., 611B, as shown in FIG. 6U). In some embodiments, the second region is visually blurred, (e.g., to indicate that the first region is an active window). In some embodiments, the second region appears darkened (e.g., to indicate that the first region is an active window).

In some embodiments, the electronic device (e.g., 600) receives selection (e.g., user input 634) of an indicator (e.g., 6610F of FIG. 6V) of the one or more indicators, wherein the indicator includes a representation of a fourth media item (e.g., "Heart Wave" as shown in FIG. 6V). In some examples, the representation of the fourth media item is a thumbnail image that includes album art, an artist thumbnail, or the like. In response to receiving selection of the indicator, and while continuing to concurrently display the first and second regions, the electronic device (e.g., 600) updates display of the second region (e.g., 611B) to include at least a portion of the representation of the fourth media item (e.g., as shown in FIG. 6W). For example, the second region can be updated to reflect that the device has received user selection of a different media item than that which is currently playing back, a representation of which was displayed immediately prior to receiving the selection. Thus, the electronic device visually indicates that it has been retargeted to the devices that are playing back the fourth media item. In some examples, the second region represents a media application on the device. For example, a media application includes any application executing on the device usable for browsing, selecting, or otherwise initiating playback of media items.

In some embodiments, the user input (e.g., 608A or 608B) is a first user input, and prior to receiving the user input, the electronic device (e.g., 600) receives a seventh user input (e.g., 604 or 642). In response to receiving the seventh user input, the electronic device displays, on the display (e.g., 602), a playback control interface (e.g., 606A of FIG. 6C) that includes: one or more playback control affordances (e.g., 606M of FIG. 6C); a playback device selection affordance (e.g., 606B of FIG. 6C); and an affordance for controlling a data connection of the device (e.g., 606N). The electronic device receives the first user input (e.g., 608A of FIG. 6E, or 608B of FIG. 6F), wherein the first user input is associated with the playback control interface (e.g., selection of 606B of FIG. 6E, or a deep press of 606A of FIG. 6F).

In some embodiments, the electronic device receives the first user input (e.g., 608A or 608B), and the first user input has an input characteristic. In some embodiments, an input characteristic is a characteristic intensity of an input. In some embodiments, an input characteristic is a length of time associated with an input. In some examples, a length of time associated with an input is a length of time that a touch input was continuously detected on a touch-sensitive surface (e.g., of device 600).

The electronic device (e.g., 600) determines whether the input characteristic meets an input characteristic-dependent criteria. In some embodiments, to determine whether the input characteristic meets an input characteristic-dependent criteria, the electronic determines whether the characteristic intensity meets an intensity-dependent criteria. For example, whether the characteristic input of the input is above a threshold intensity. In some embodiments, to determine whether the input characteristic meets an input characteristic-dependent criteria, electronic device determines whether the user input meets a time-based criteria. For example, whether the touch is detected (e.g., on a touch-sensitive surface associated with the electronic device) for a predetermined amount of time. Input characteristics and input characteristic dependent criteria other than those based on intensity or time can be used. In accordance with a determination that the input characteristic meets the input characteristic-dependent criteria, the device displays, on the display, the multi-device interface. In accordance with a determination that the input characteristic intensity does not meet the input characteristic-dependent criteria, the electronic device forgoes displaying, on the display, the multi-device interface. In some embodiments, further in accordance with a determination that the input characteristic intensity does not meet the input characteristic-dependent criteria, the electronic device determines a location associated with the first user input. In accordance with a determination that the location is associated with a playback control affordance (e.g., 606M of FIG. 6C), the device performs a corresponding playback control function. For example, if the first user input does not have a characteristic intensity that exceeds a threshold intensity, and is received at a location associated with a pause playback affordance, then the device pauses playback.

In some embodiments, the seventh user input (e.g., 642) is received while displaying a user interface of an application executing on the device (e.g., 640 of FIG. 6Y). While continuing to display at least a portion (e.g., 640 of FIG. 6AA) of the user interface of the application, the electronic device (e.g., 600) displays, on the display (e.g., 602), the playback control interface (e.g., 606A). Subsequent to receiving the first user input, and while continuing to display the at least a portion of the user interface of the application, the electronic device (e.g., 600) displays, on the display, the multi-device interface (e.g., 610 of FIG. 6AA). In some embodiments, a user input (e.g., a touch or click) outside of the multi-device interface portion (e.g., outside of 610 of FIG. 6AA) causes the electronic device to cease displaying the multi-device interface (e.g., and display 640 as shown in FIG. 6Y). For example, the multi-device interface ceases being displayed overlaid on the application and the application (e.g., represented by 640 of FIG. 6Y) becomes the active user interface again.

In some embodiments, the multi-device interface (e.g., 610 of FIG. 6AB) includes a volume control affordance (e.g., 610D of FIG. 6AB) associated with the plurality of available playback devices (e.g., the devices represented by 610H, 610L, and 610N). The electronic device receives an eighth user input (e.g., 6644) associated with the volume control affordance. In response to receiving the eighth user input, the device transmits an instruction to adjust a playback volume of the plurality of available playback devices (e.g., the devices represented by 610H, 610L, and 610N). For example, the device (e.g., 600) transmits instructions to the devices "Kitchen" and "Living Room" that are currently targeted by the device and are playing back the same media content.

In some embodiments, the multi-device interface includes a plurality of individual volume control affordances (e.g., 610S, 610T, and 610U of FIG. 6AB), each associated with a single device of the plurality of available playback devices (e.g., the devices represented by 610H, 610L, and 610N, respectively). The device receives a ninth user input associated with an individual volume control affordance (e.g., 610U). For example, the electronic device receives a selection and movement of the slider 610U in FIG. AB. In response to receiving the ninth user input, the device transmits an instruction to adjust a playback volume of the associated device (e.g., device represented by 610N), wherein the associated device is different than the electronic device (e.g., 600). For example, the electronic device transmits an instruction to adjust the volume for the device associated with the affordance 610U, forgoing adjustment of volume for other devices in the group.

In some embodiments, the one or more indicators associated with the plurality of available playback devices includes (728): a first indicator (e.g., 670B of FIG. 6AI) representing a fifth media item currently playing on the electronic device (e.g., 660), wherein the first indicator is displayed in a first region (e.g., 670A of FIG. 6AI); a second indicator (e.g., 670C of FIG. 6AI) representing a group of devices (e.g., 670E of FIG. 6AJ) that are each currently playing back a sixth media item; and individual indicators (e.g., indicators 670D, 670E, 670F, and 670G of FIG. 6AI) for each device of the plurality of available playback devices. While displaying the multi-device interface, the electronic device (e.g., 600) receives (730) a tenth user input (e.g., 672) representing a request to replace display of the first indicator (e.g., 670B of FIG. 6AI) in the first region (e.g., 670A of FIG. 6AI) with display of the second indicator (e.g., 670C). In response to the tenth user input, the electronic device replaces display (732) (e.g., as illustrated in FIG. 6AJ) of the first indicator (e.g., 670B) in the first region (e.g., 670A) with display of the second indicator (e.g., 670C as illustrated in FIG. 6AJ). In some embodiments, the tenth user input is received at a second device (e.g., 662) associated with the electronic device (e.g., 600 or 660).

In some embodiments, the electronic device (e.g., 660) displays (734) an indication (e.g., 670K) of whether each device of the plurality of available playback devices is currently playing back a media item associated with an indicator displayed in the first region.

In some embodiments, the electronic device (e.g., 660) receives an eleventh user input (e.g., 678) associated with an individual indicator (e.g., 670E of FIG. 6AN) for a device of the plurality of available playback devices. The electronic device determines whether the eleventh user input represents a selection that exceeds a threshold duration. For example, the input can be a tap and hold on a touch-sensitive surface of the device or a touch-sensitive surface associated with the device (e.g., of 662). In accordance with the eleventh user input representing a selection that exceeds the threshold duration, the electronic device enters a volume adjustment mode for the device associated with the individual indicator (e.g., illustrated in FIG. 6AO). In some examples, entering the volume adjustment mode can include displaying a visual indication (e.g., 670J of FIG. 6AO) that the electronic device is in a volume adjustment mode. For the visual indication can indicate which device or devices are currently subject to volume adjustment in the volume adjustment mode. For example, indicators for other devices can be grayed out or otherwise altered in appearance in response to the eleventh user input. In some examples, a volume indicator (e.g., 670J) such as a slider or knob indicating a volume level appears, appears enlarged, or is otherwise visually altered so as to visually communicate that the electronic device is currently in the volume adjustment mode. In accordance with the eleventh user input (e.g., 678) not representing a selection that exceeds the threshold duration, forgoing entering the volume adjustment mode for the device associated with the individual indicator.

In some embodiments, the electronic device (e.g., 600, 660) receives a twelfth user input representing a request to initiate media playback on the plurality of available devices. In response to receiving the twelfth user input: in accordance with a determination that the plurality of available devices includes at least one device configured to receive playback coordination responsibility, the electronic device transfers playback coordination responsibility to the at least one device of the plurality of devices. In accordance with a determination that the plurality of available devices does not include at least one device configured to receive playback coordination responsibility, the electronic device (e.g., 600, 660) coordinates the media playback on the plurality of devices.

In some embodiments, while the electronic device (e.g., 600 or 660) is coordinating the media playback on the plurality of devices, the electronic device receives a thirteenth user input representing a request to initiate a phone call on the device. For example, the device receives user input representing a request to answer a phone call or to place a phone call. In response to receiving the thirteenth user input representing the request to initiate the phone call, the electronic device: initiates the phone call; and continues coordinating the media playback on the plurality of devices during the phone call.

In some embodiments, further in response to receiving the twelfth user input, the electronic device (e.g., 600, 660) transmits data representing a playback queue to each of the devices in the plurality of devices.

In some embodiments, the electronic device (e.g., 600 or 660) receives a fourteenth user input representing a request to initiate media playback on the plurality of available devices, wherein the fourteenth user input is associated with a first user. In some examples, the electronic device determines that a user input is associated with the first user based on detected voice input, based on a device that sent the request, or the like. In response to receiving the fourteenth user input, in accordance with a determination that the first user is subject to a playback restriction, the electronic device (e.g., 600, 660) prevents the electronic device (e.g., 600, 660) from initiating media playback on the plurality of available devices in response to the eleventh user input. In accordance with a determination that the first user is not subject to the playback restriction, the electronic device allows the device to initiate media playback on the plurality of available devices in response to the eleventh user input.

In some embodiments, the electronic device (e.g., 600 or 660) receives (736) a fifteenth user input (e.g., 652 of FIG. 6AE) representing a request for media output on the device. In some embodiments, the fifteenth user input represents a request to initiate media playback on the device. In some embodiments, the fifteenth user input represents a request to output media having a visual component. For example, media having a visual component includes, but is not limited to, images, videos, browser applications, electronic messages (e.g., emails, text messages), or the like. In response to receiving the fifteenth user input (738): in accordance with a determination that the request for media output is a request to display content (e.g., represented by 650A of FIG. 6AE), the electronic device transmits (740) an instruction to a preferred device (e.g., 660 of FIG. 6AH) of the plurality of available playback devices to initiate display of the content in response to the twelfth request. In some embodiments, a request for media output is a request to playback content having a visual component (e.g., video). For example, video content includes but is not limited to: a movie, a show, a video stream, or the like. In some embodiments, a preferred device is a device that is capable of outputting video (e.g., an Apple TV), or a device connected to a large display (e.g., predefined as preferred). In accordance with a determination that the request for media output is not a request to display content, the electronic device (e.g., 600 or 660) (742): forgoes transmitting the instruction to the preferred device of the plurality of available playback devices to initiate display of the content in response to the twelfth request; and initiates media output on the device in response to the twelfth user input. For example, if the requested playback is of audio content, the electronic device plays back the audio on the requested device instead.

Note that details of the processes described above with respect to method 700 (e.g., FIGS. 7A-7D) are also applicable in an analogous manner to the methods described below. For example, method 900, 1100, 1300, 1500, 1700, 1800, 2000, 2200, 2400, 2600, 2800, 3000, 3200, 3400, 3600, 3800, and 3900 optionally includes one or more of the characteristics of the various methods described above with reference to method 700. For brevity, these details are not repeated below.

FIGS. 8A-8P illustrate exemplary user interfaces for accessing a multi-device interface, in accordance with some embodiments. The user interfaces in these figures are used to illustrate the processes described below, including the processes in FIGS. 9A-9C.

Figure 8B:
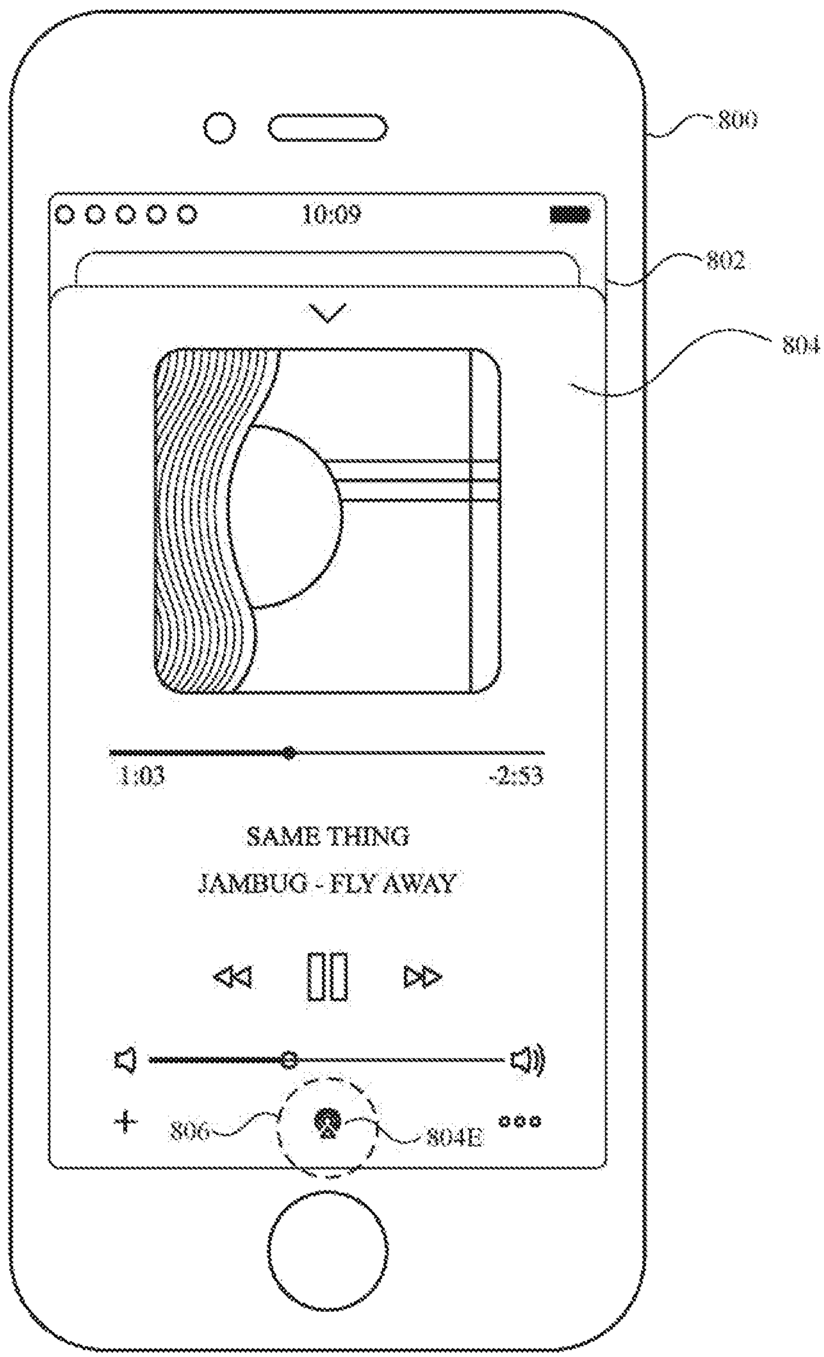

FIGS. 8A-8B illustrate an exemplary current media interface, in accordance with some embodiments. At FIG. 8A, device 800 displays, on display 802, current media interface 804. Current media interface 804 (also referred to as a "now playing interface") identifies a media item that is currently being played back. In some embodiments, device 800 includes one or more features of device 100, 300, or 500. Current media interface 804 includes album art 804A, media identifier 804B (song title "Same Thing"), media identifier 804C (artist "Jambug"), media identifier 804D (album "Fly Away"), and device selection affordance 804E. As shown in FIG. 8A, the device selection affordance 804E does not include an identifier for another device. Thus, in this example, the media item identified in the current media interface 804 is currently playing back on the current device, device 800. In some examples, the media identified by the currently media interface is currently being played back on other devices as well (e.g., in addition to the current device, or a set that excludes the current device). As shown in FIG. 8B, device 800 receives user input 806 representing selection of device selection affordance 804E. In some examples, user input 806 can be a tap or touch on a location associated with the displayed device selection affordance 804E.

Figure 8C:
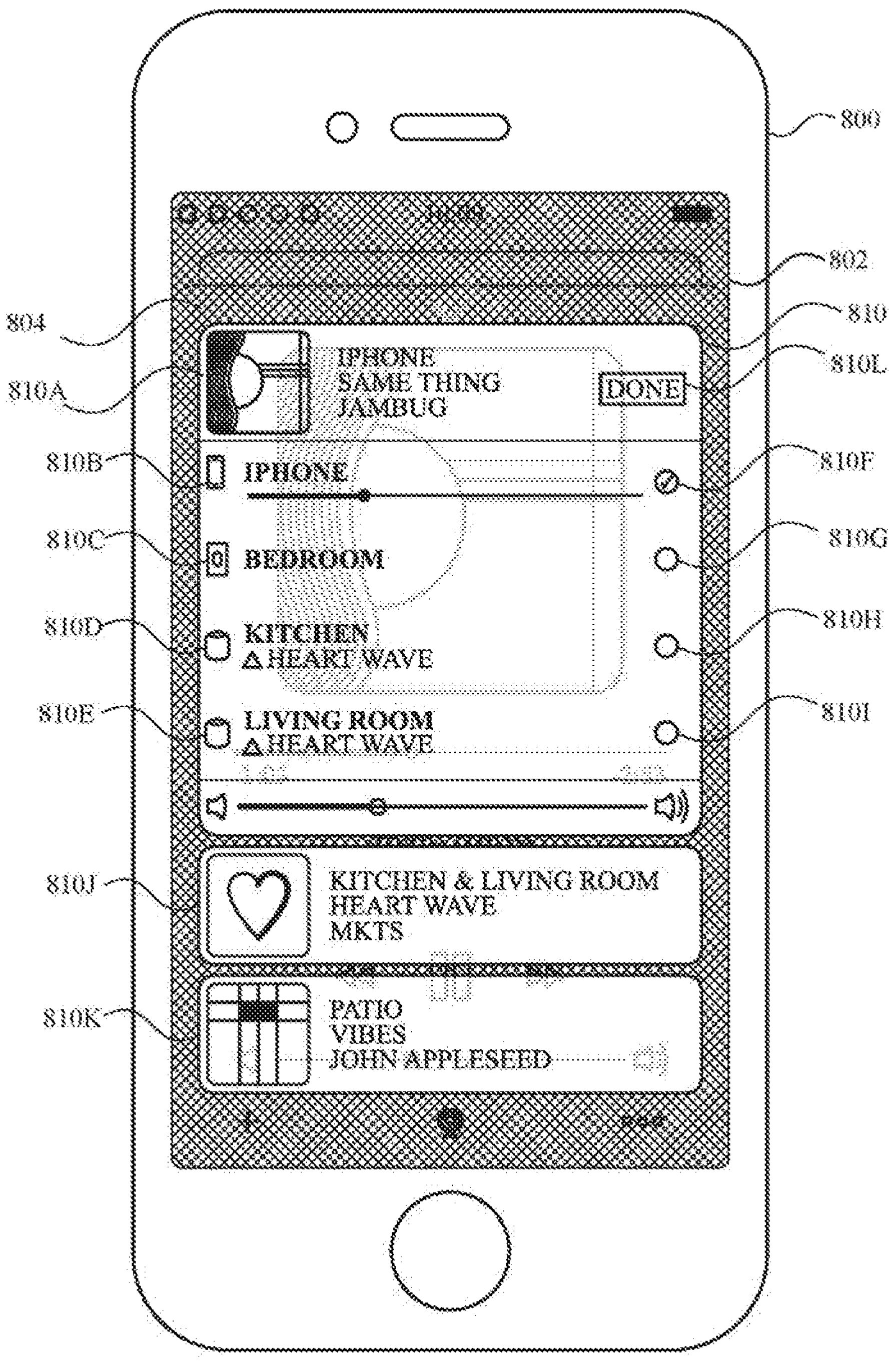

FIG. 8C illustrates an exemplary multi-device interface, in accordance with some embodiments. In some embodiments, device 800 displays multi-device interface 810 in response to user input 806. As shown in FIG. 8C, multi-device interface 810 includes indicators 810A-810K. Multi-device interface 810 is analogous to multi-device interface 610, described above (e.g., with respect to FIG. 6J). Likewise, indicators 810A-810K are analogous to the indicators of multi-device interface 610. Accordingly, the above description of a multi-device interface (e.g., 610) is hereby incorporated by reference with respect to multi-device interface 810.

In particular, FIG. 8C depicts a multi-device interface 810 that includes an indicator 810J that represents a media session that includes the device set "Kitchen+Living Room", which is comprised of the device set "Kitchen" and the device set "Living Room". In this example, the Kitchen set represents a single smart speaker device (e.g., device 580), and the Living Room set represents a different single smart speaker device (e.g., another instance of device 580). The media session represented by indicator 810J includes playback of the media item titled "Heart Wave" by artist "MKTS" on the device set "Kitchen+Living Room".

Figure 8D:
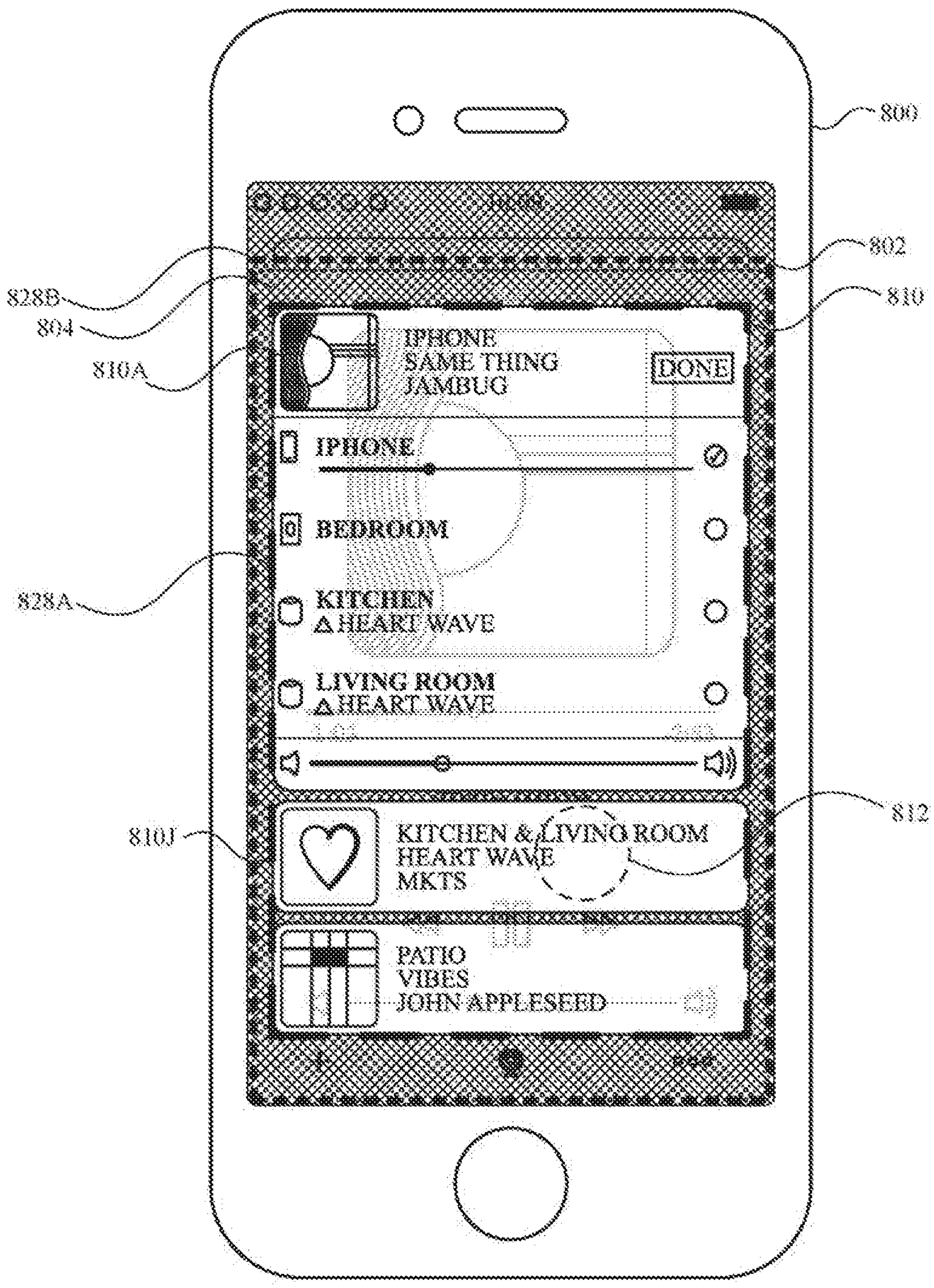

FIGS. 8D-8H illustrate exemplary techniques for refocusing a device, in accordance with some embodiments. At FIG. 8D, the device 800 receives user input 812 representing selection of indicator 810J. In some embodiments, user input 812 is a tap or touch on a location associated with the indicator 810J. In some embodiments, user input 812 is a deep press input or a tap and hold input on a location associated with the indicator 810J. As shown in FIG. 8D, the current media interface 804 is visible on display 802 concurrently with the display of multi-device interface 810. Specifically, device 800 displays multi-device interface 810 in a first region 828A that is visually overlaid on a second region 828B. Device 800 displays the current media interface 804 in the second region 828B. As shown in FIG. 8D, second region 828B (e.g., the current media interface 804) is partially obscured by the first region 828A, but it still visible. Thus, device 800 provides a visual indication (e.g., other than the multi-device interface 810) of the current focus of the device. For instance, because the album art displayed with the indicator 810A matches the album art of current media interface 804, the device indicates that the current focus of the device, or the focus of a particular application (e.g., associated with the current media interface 804), is the current device "iPhone", which is currently playing the media item associated with the matching album art.

Figure 8E:
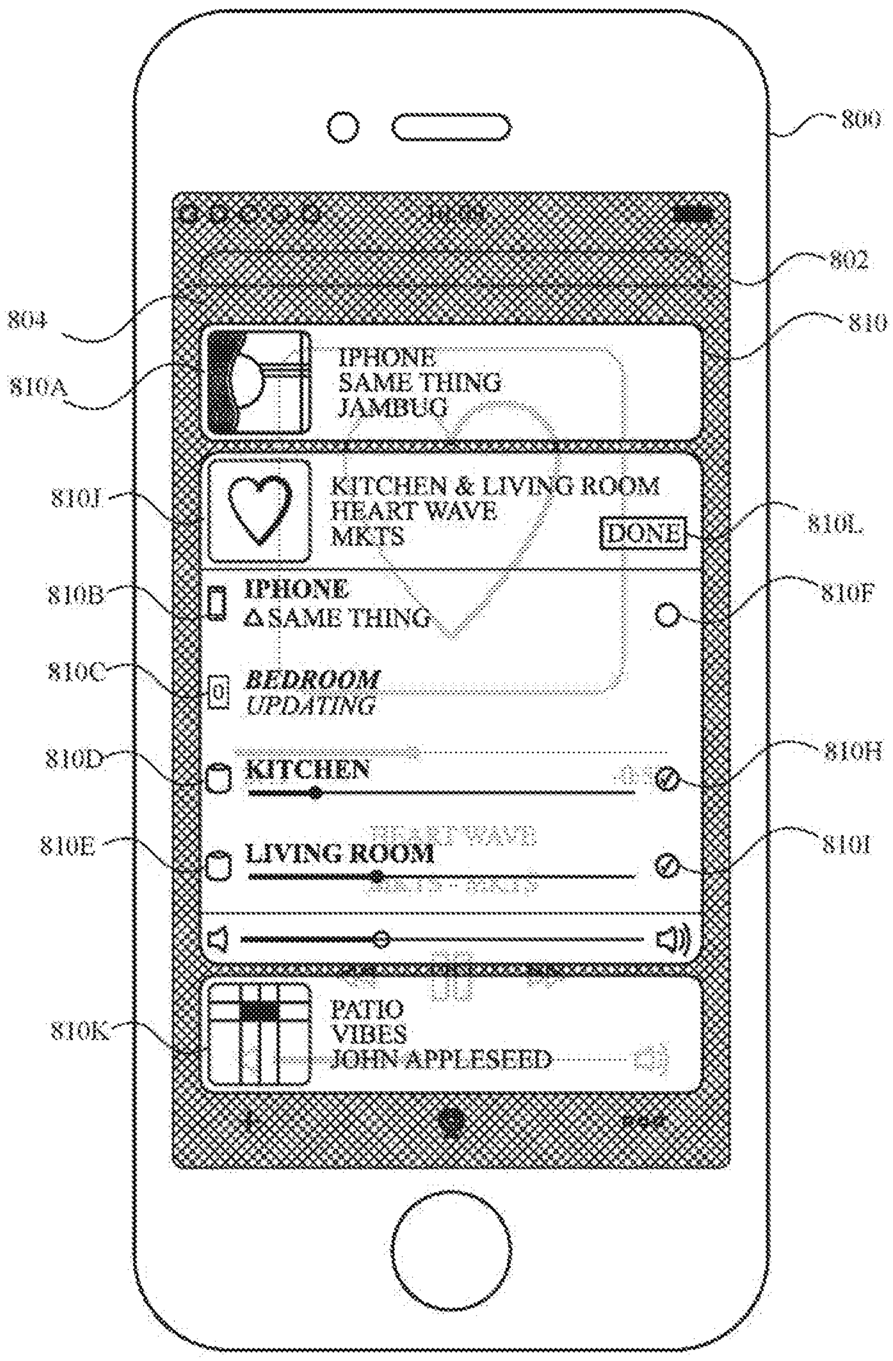

In response to receiving user input 812, device 800 displays an expanded version of indicator 810J, as shown in FIG. 8E. The expanded indicator 810J (and the reduced size of indicator 810A) of FIG. 8E provide visual indication that the focus of the device is now on the media session represented by indicator 810J. As shown in FIG. 8E, in response to changing the focus: indicator 810B no longer includes a checkmark in indicator 810F (e.g., because the iPhone is not part of the currently-selected media session), indicators 810D and 810E now include checkmarks in indicators 810H and 810I, respectively (e.g., because the Kitchen and Living Room set of devices are part of the currently-selected media session). In some examples, an indicator for one or more devices indicates that the corresponding one or more devices are unavailable. For example, an unavailable device is a device that is: offline, currently installing a software or firmware update, configured to be unavailable (e.g., via a setting or button), or the like. In some examples, a corresponding indicator is not displayed for unavailable devices. Alternatively, an indicator for such device or devices is displayed, but with an indication that the device is unavailable for media playback. For example, FIG. 8E depicts indicator 810C, which includes the text "Updating" indicating that the Bedroom device set is currently unavailable for media playback (e.g., initiated from the device 800). FIG. 8E also depicts the text and image of indicator 810C different than the other device indicators, further visually indicating that the device set Bedroom is unavailable for media playback from device 800. For example, the device 800 can display an indicator for an unavailable device in a grey color, or other suitable manner that visually distinguishes the unavailable device from available devices.

Figure 8F:
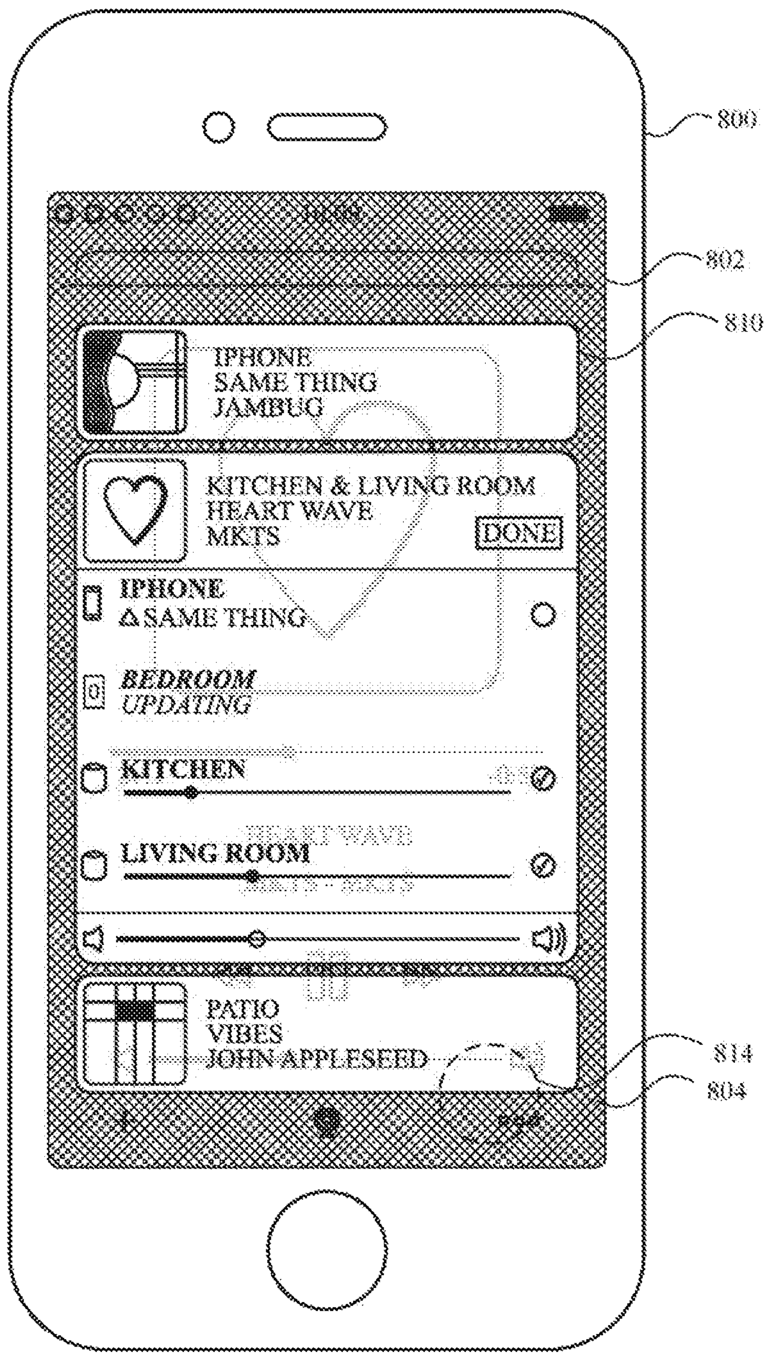

At FIG. 8F, device 800 receives user input 814. In this example, user input 814 represents a contact (e.g., touch, tap, deep press, or press and hold) on a location outside of the displayed multi-device interface 810 (e.g., on a location that does not include display of an indicator of multi-device indicator 810). In some examples, in response to receiving user input 814, device 800 ceases displaying multi-device interface 810.

Figure 8G:
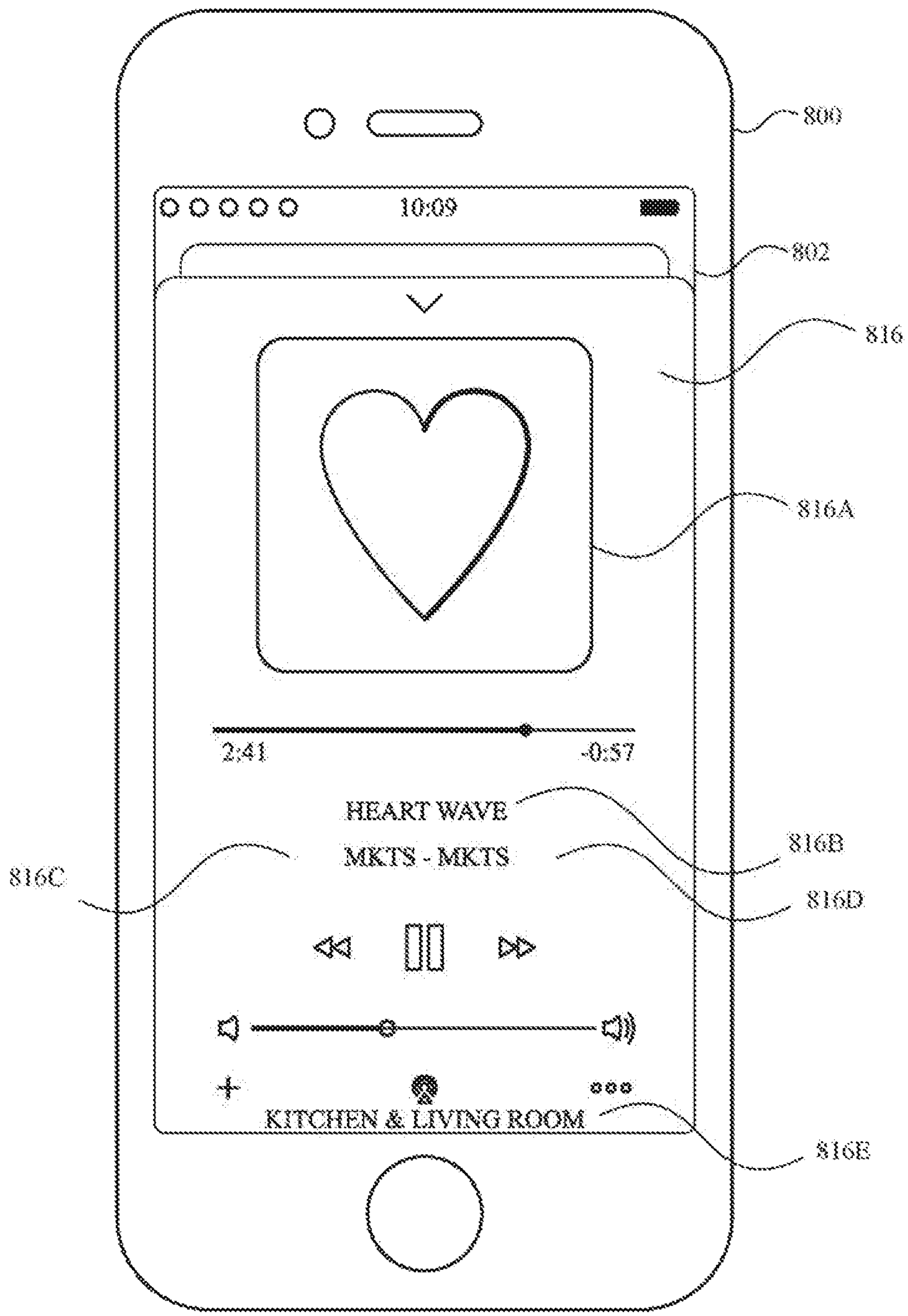
Figure 8H:
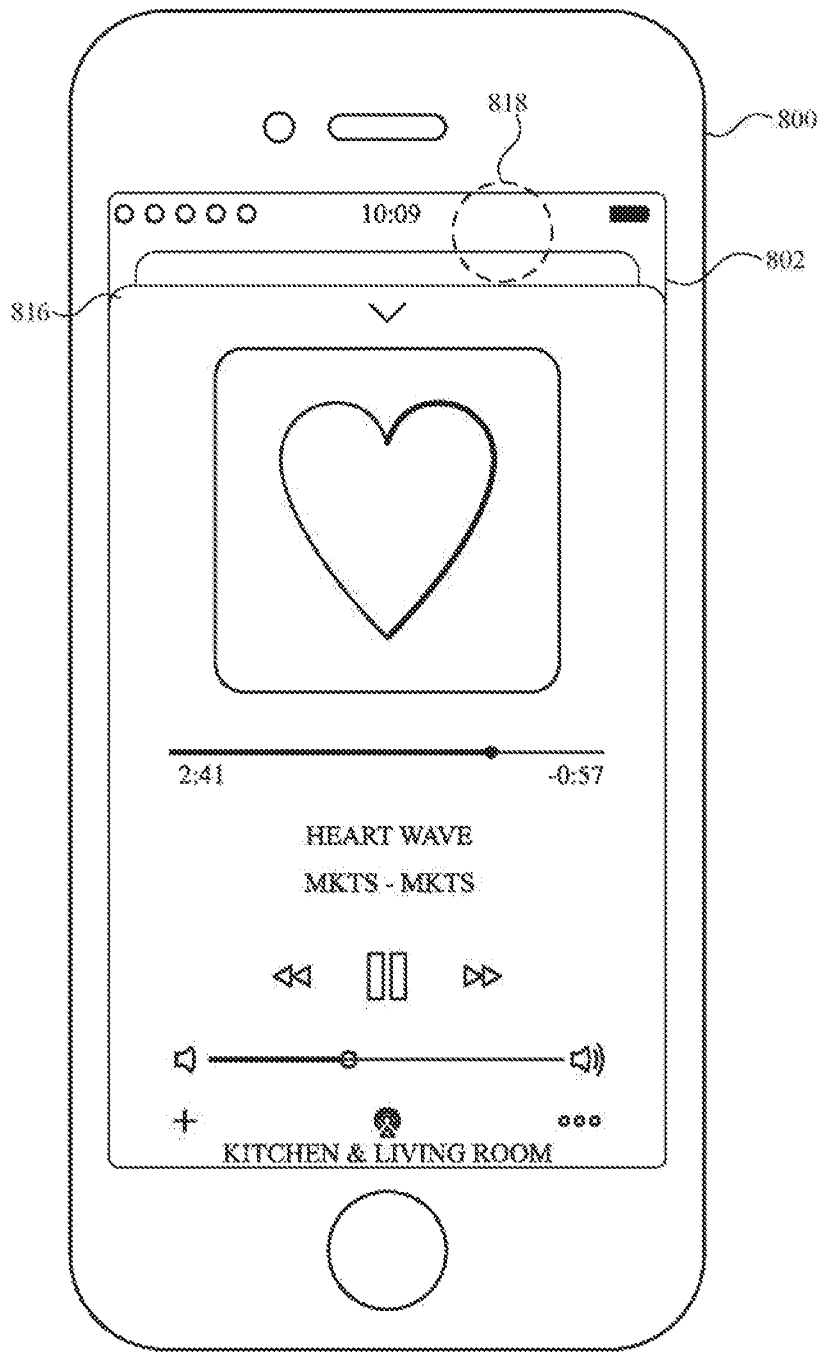

FIGS. 8G and 8H illustrate an exemplary current media interface. At FIG. 8F, device 800 displays current media interface 816. In some examples, current media interface 816 is displayed in response to user input 814 of FIG. 8F. In some examples, current media interface 816 is displayed in response to user input 812 of FIG. 8D. Current media interfaces 804 and 816 are similar, however current media interface 816 is an updated version of interface 804, and reflects that the device 800 is now targeting a different media session (e.g., set of devices and/or media). In particular, current media interface 816 includes album art 816A (e.g., different than the album art 804A) media identifier 816B (song title "Heart Wave"), media identifier 816C (artist "MKTS"), media identifier 816D (album "MKTS"), and device selection affordance 816E. As shown in FIG. 8G, the device selection affordance 816E includes an identifier for another device set, "Kitchen+Living Room". Thus, in this example, the media item identified in the current media interface 816 is currently playing back on the device set "Kitchen+Living Room" (e.g., which excludes device 800). At FIG. 8H, device 800 receives a user input 818. In this example, user input 818 represents a contact (e.g., touch, tap, deep press, or press and hold) on a location outside of the displayed current media interface 816 (e.g., on a location that does not include display of an indicator of current media interface 816). In some examples, in response to receiving user input 818, device 800 ceases displaying current media interface 816. In some examples, device 800 displays browser interface 820 in response to user input 818.

Figure 8I:
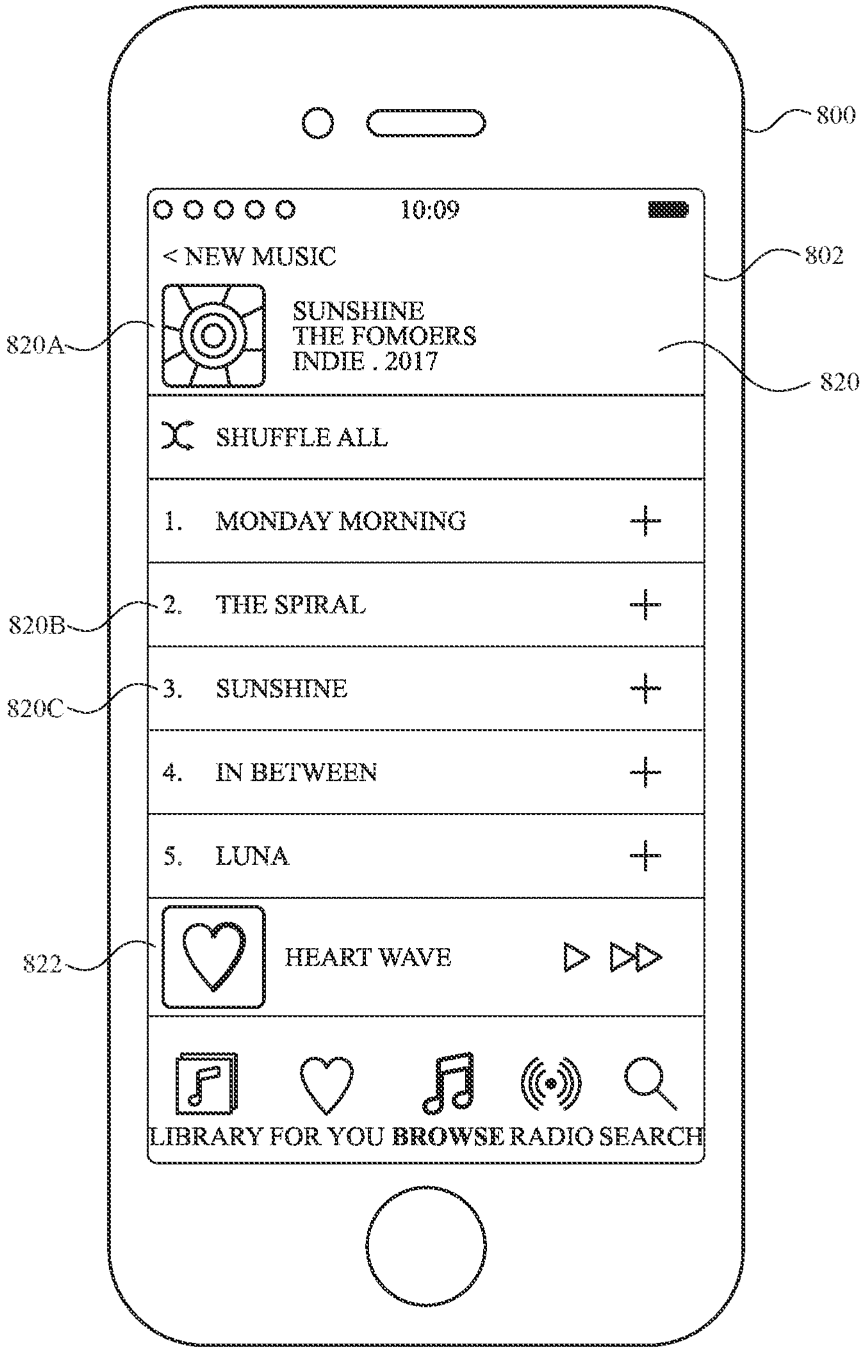
Figure 8J:
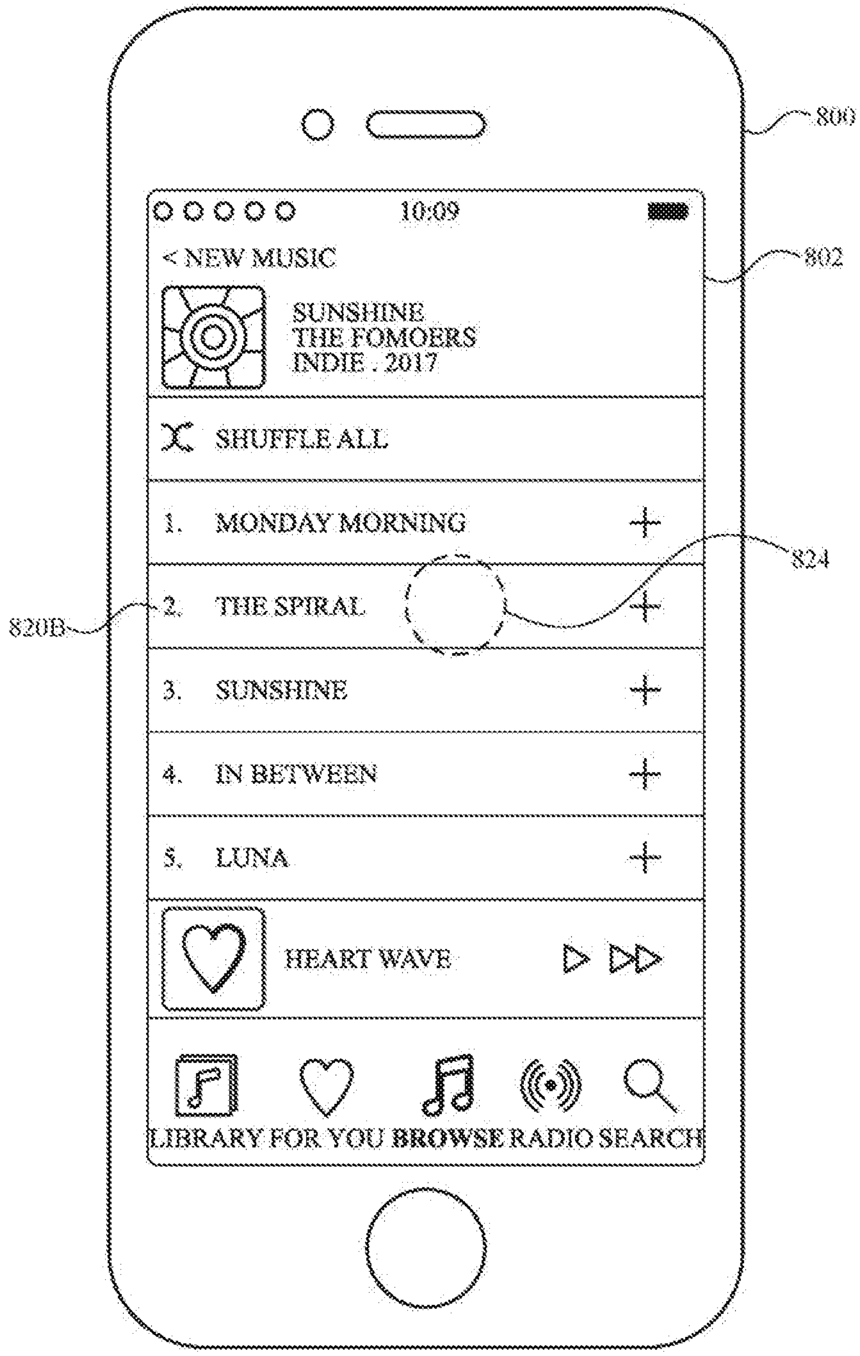

FIGS. 8I and 8J illustrate an exemplary browser interface. At FIG. 8I, device 800 displays browser interface 820 for viewing and selecting a plurality of media items. Browser interface 820 depicts a music browsing interface, and in particular, an album view of a music album. Browser interface 820 includes identifier 820A identifying the currently-selected album, as well as a plurality of affordances (e.g., 820B and 820C), each corresponding to a media item (e.g., tracks of the music album). Current media indicator 822 identifies media currently playing back as part of a currently-selected media session (e.g., the track titled "Heart Wave" playing back on the devices Kitchen+Living Room). At FIG. 8J, device 800 receives user input 824 representing selection of media item affordance 820B. In some examples, user input is a tap or touch input at a location associated with affordance 820B. In some examples, user input is a deep press or touch and hold input at a location associated with affordance 820B.

Figure 8K:
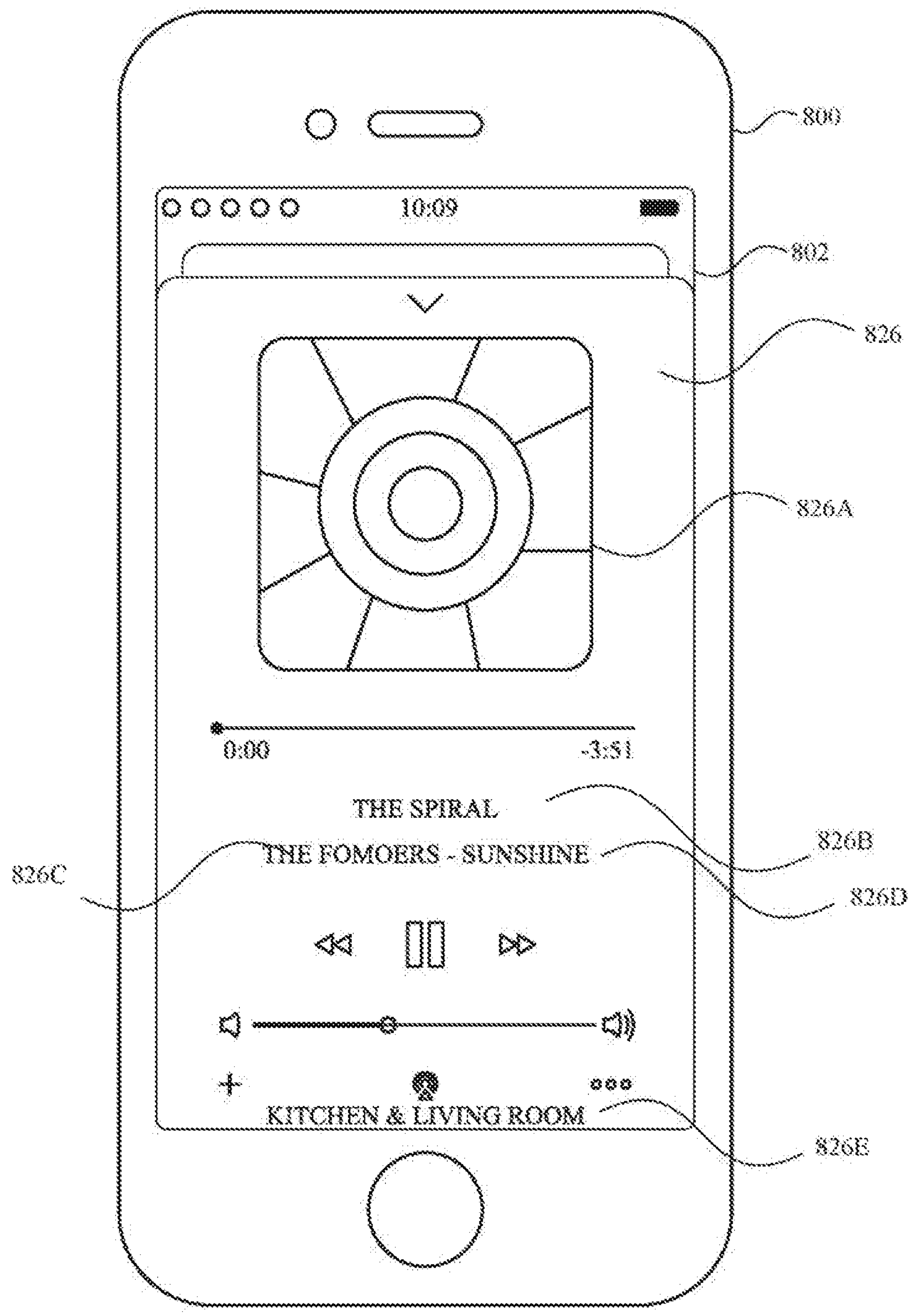

FIG. 8K illustrates an exemplary current media interface. In some examples, device 800 displays current media interface 826 in response to user input 824 (e.g., shown in FIG. 8K). In some examples, device 800 displays current media interface 826 in response one or more user inputs received subsequent to user input 824. As shown in FIG. 8K, current media interface 826 illustrates that, in response to a request to selection of a media item for playback (e.g., selection of affordance 820B) and while device 800 is targeted to a set of devices (e.g., "Kitchen+Living Room" as shown in FIG. 8H), that playback is initiated on the targeted set of devices. Thus, user input selection of affordance 820B associated with the music item titled "The Spiral" by artist "The Fomoers" causes display of current media interface 826 that includes corresponding appropriate indicators 826A-826D. Device selection affordance 826E indicates that the focus of device 800 continues to be the device set "Kitchen+Living Room" (e.g., as it was immediately prior to receiving user input 824).

Figure 8L:
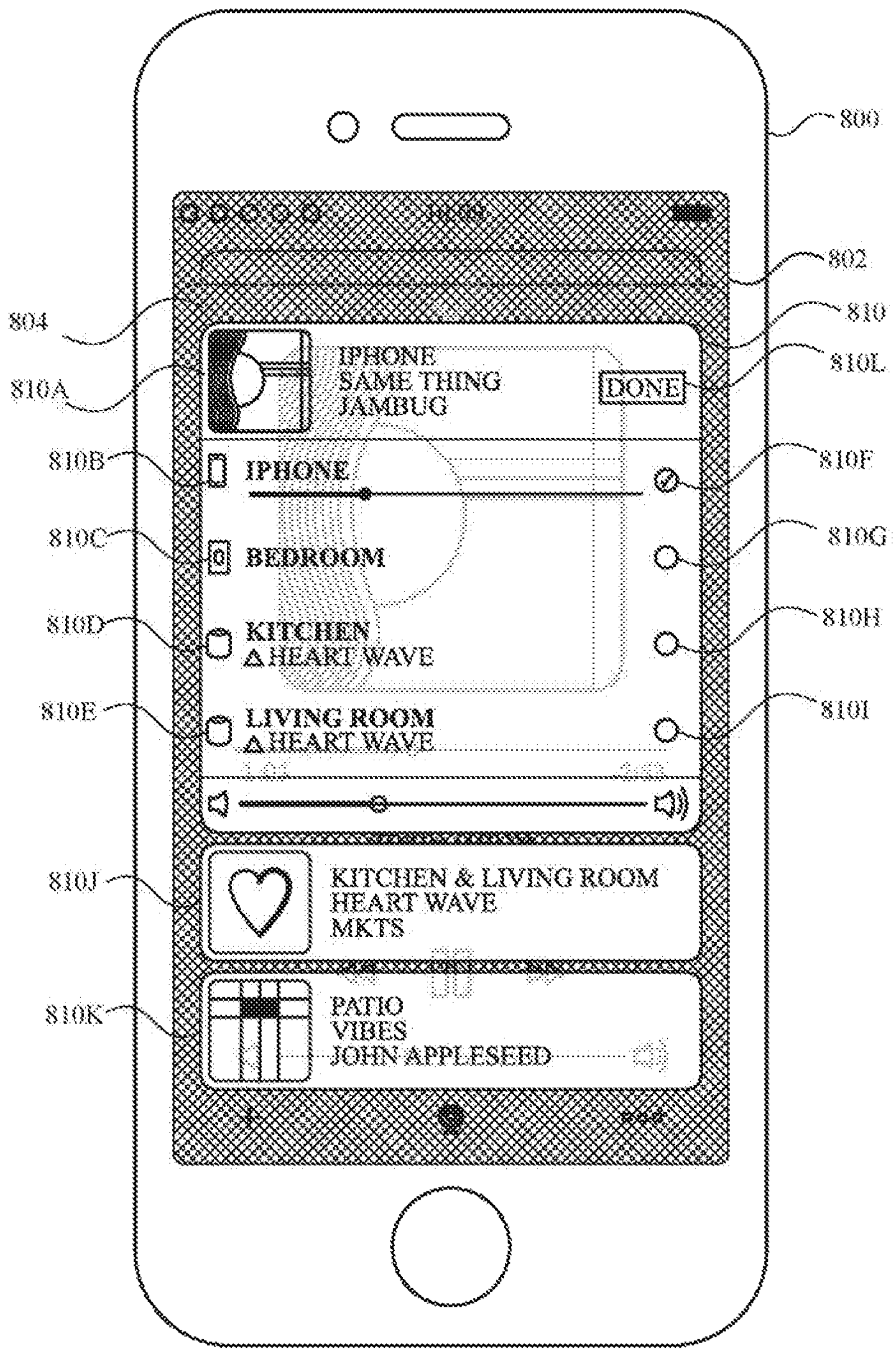
Figure 8M:
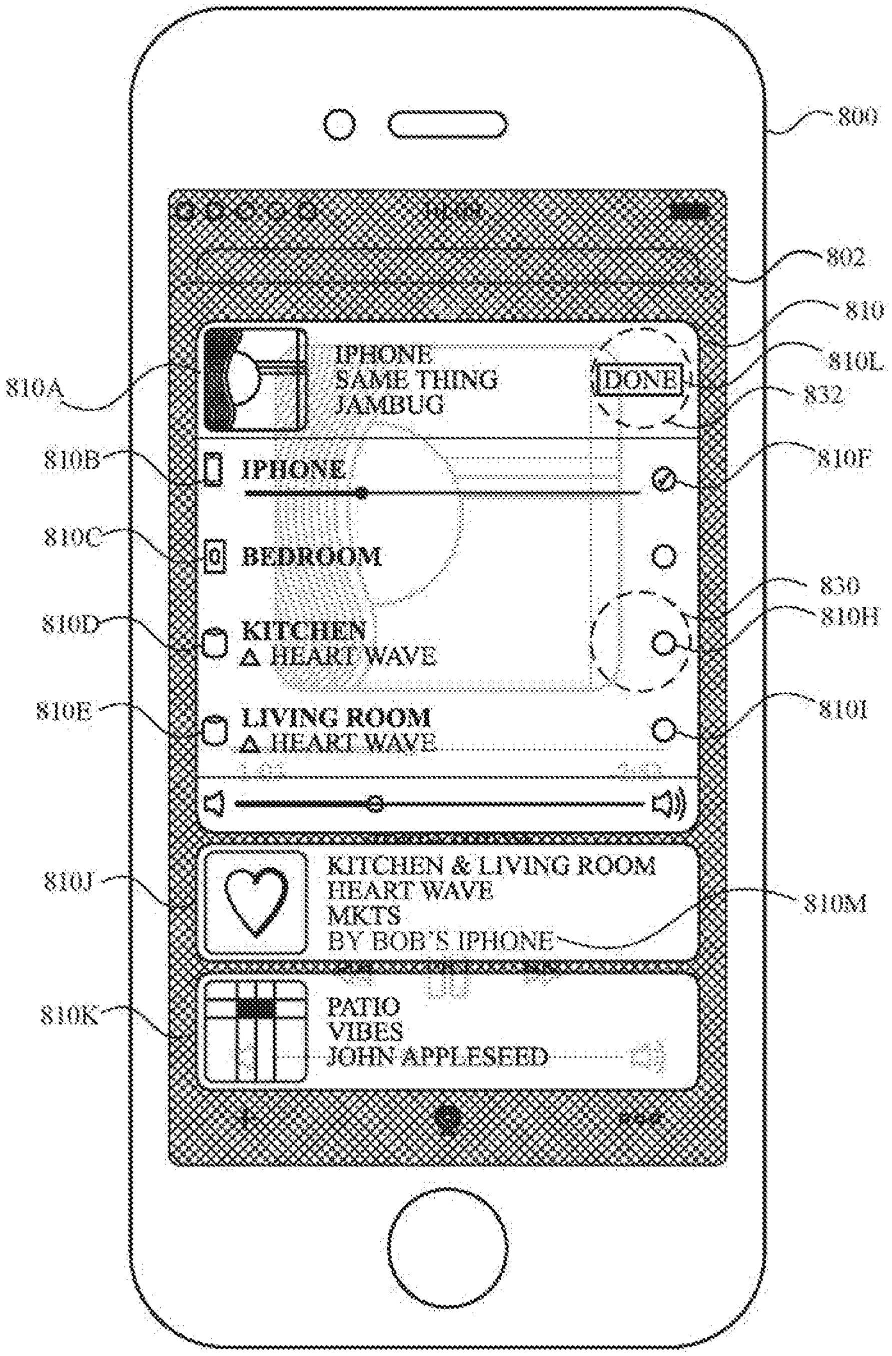
Figure 8N:
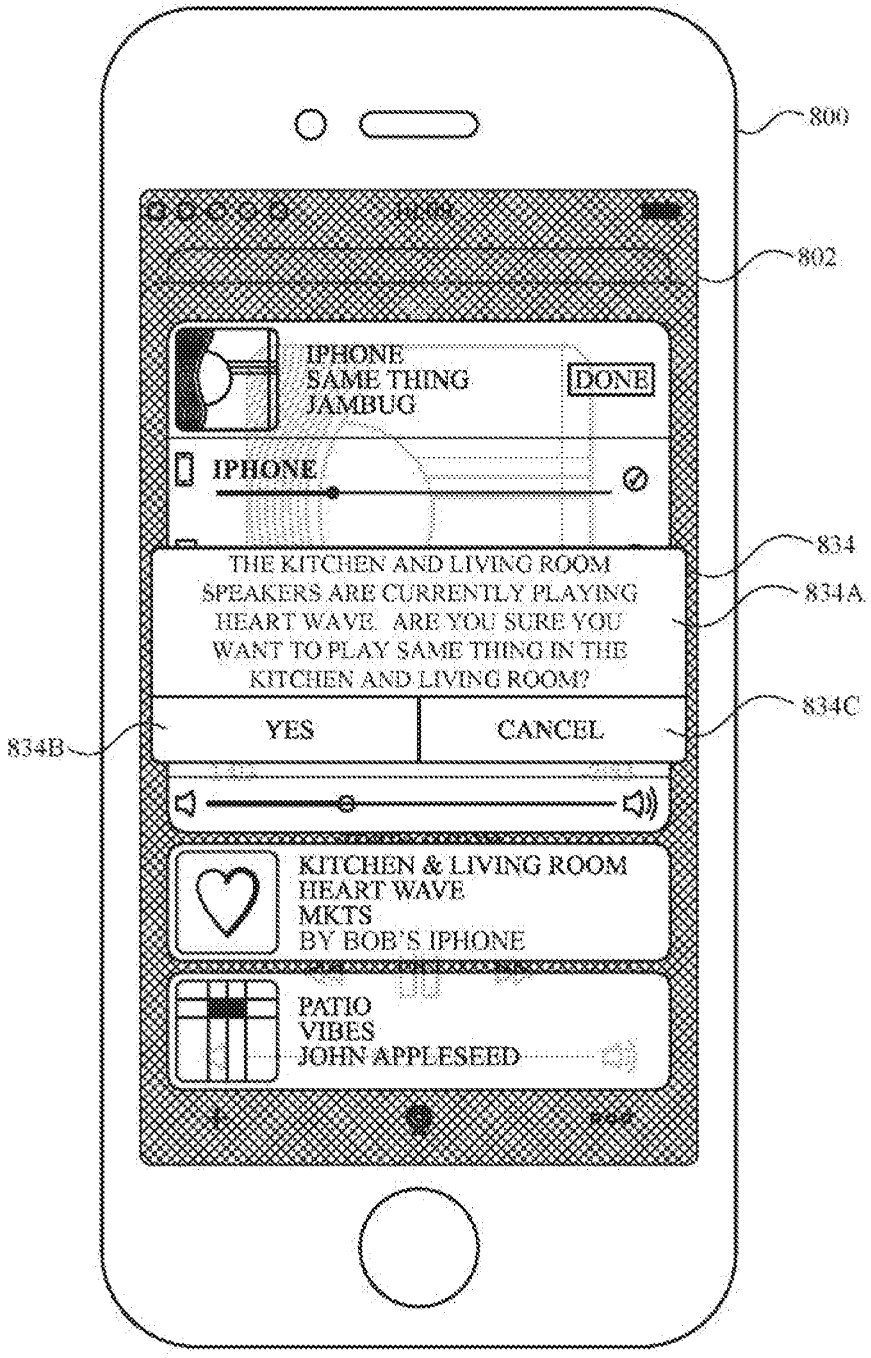
Figure 8O:
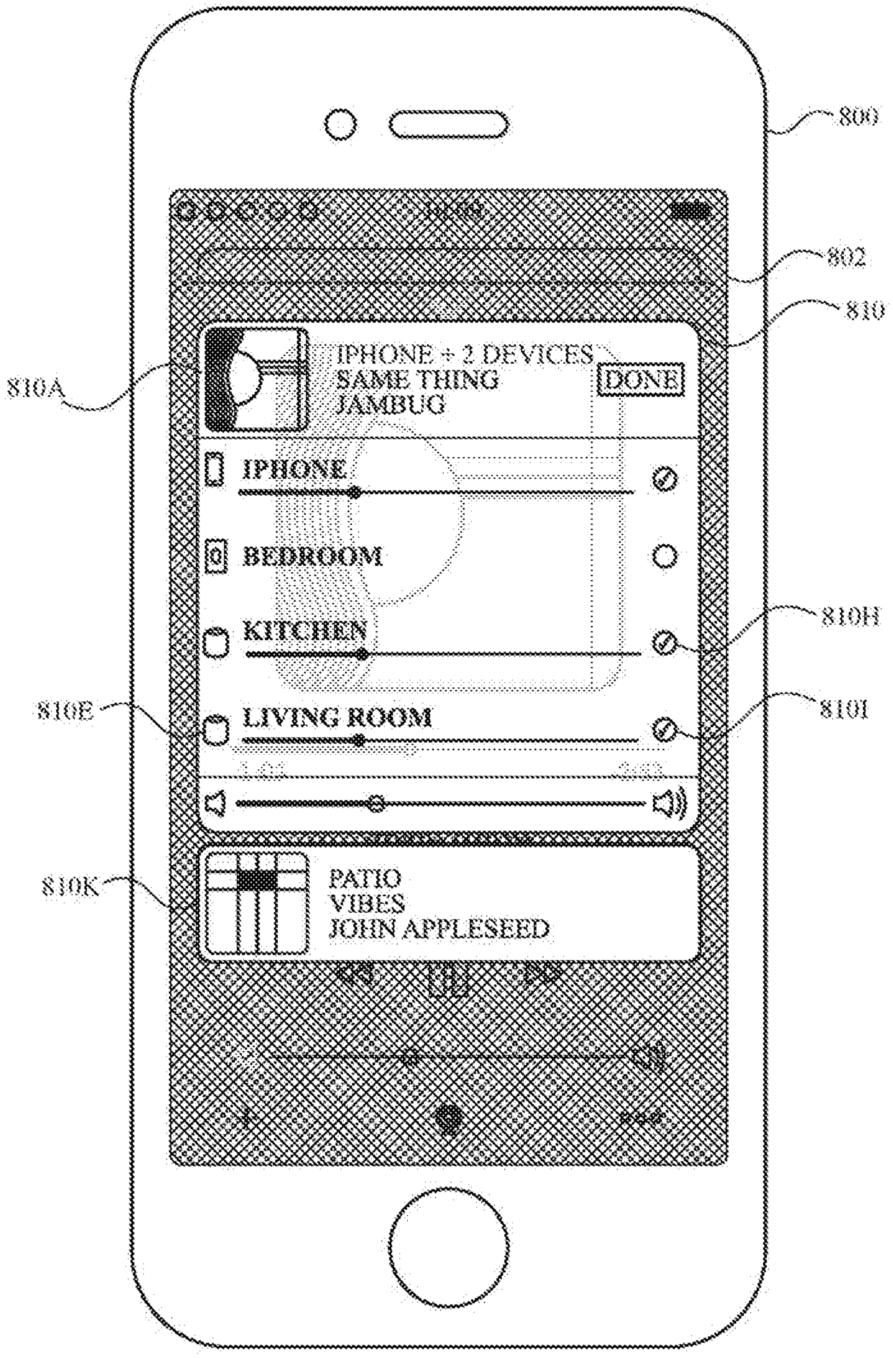
Figure 8P:
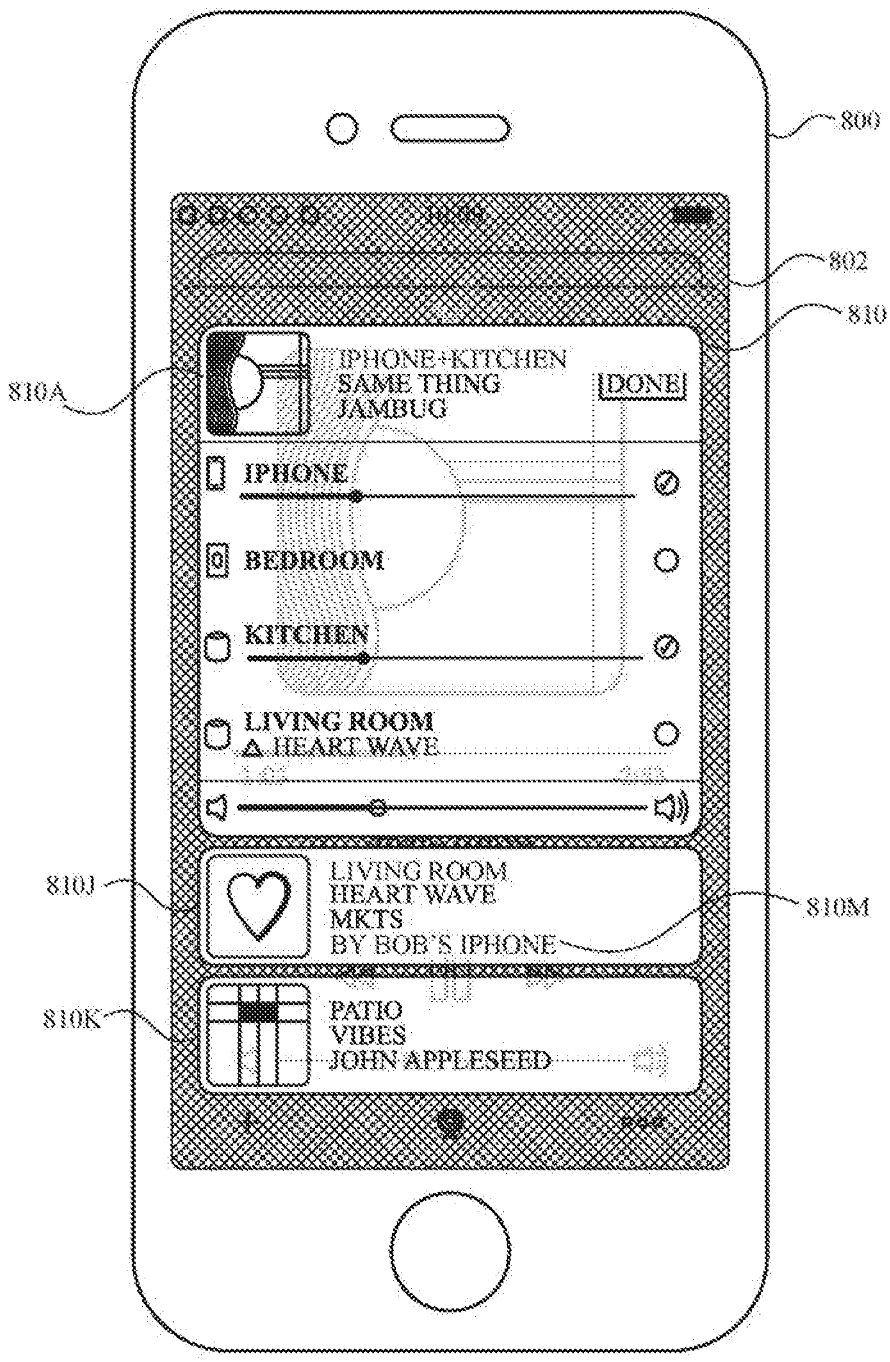

FIGS. 8L-8P illustrate exemplary interfaces for initiating playback of media on one or more devices that are currently playing back other media. FIG. 8L depicts multi-device interface 810, as described above with respect to FIG. 8C. As shown in FIG. 8L, the currently-selected media session corresponds to the device iPhone and the media track "Same Thing".

At FIG. 8M, device 800 has received user input selection of the device set Kitchen (e.g., represented by the checkmark in indicator 810H of indicator 810D) and the device set Living Room (e.g., represented by the checkmark in indicator 810I of indicator 810E). In some examples, the user input selection of a device is user input 830 at a location associated with a device indicator (e.g., indicator 810D, as shown in FIG. 8M). FIG. 8M also depicts user input 832, representing selection of affordance 810L. In some examples, user input 832 is a contact (e.g., tap, touch, deep press) at a location associated with affordance 810L. In some examples, the user input selection of a device is user input 832. FIG. 8M also depicts indicator 810I, for a non-selected media session that includes playback on the devices Kitchen and Living Room. Accordingly, the device Kitchen and Living Room are currently busy (e.g., are part of a different media session (e.g., than the media session that is selected) that includes playback of media content) playing back the media item titled "Heart Wave". Further, FIG. 8M depicts indicator 810I with identifier 810M, which identifies a media session owner. In some embodiments, a media session owner is a device. In some embodiments, a media session owner is a user or (e.g., a user account). In some embodiments, a media session owner is a device and a user. As shown in FIG. 8M, the media session owner associated with the media session of indicator 810I includes both a user and a device, "Bob's iPhone". Thus, in this example, the media session owner includes a device different than device 800, and the different device is associated with a user (e.g., Bob) that is not associated with device 800 (e.g., device 800 is not logged into an account associated with Bob).

FIG. 8N illustrates an exemplary notification prompt for taking over playback of a device. In some embodiments, device 800 displays notification prompt 834 in response to receiving user input 830. In some embodiments, device 800 displays notification prompt 834 in response to receiving user input 832. In some examples, a notification prompt is displayed when device 800 attempts to initiate (or be configured to initiate) media playback on a device that is currently busy playing back media. In some examples, a device is busy playing back media if such media was initiated by a different media session owner. Thus, if device 800 is associated with a first user account (e.g., belonging to user Tim) and the targeted device is currently playing back media that was initiated by a second user account (e.g., from a device associate with a user account belonging to Bob) that is not associated with device 800, a notification prompt such as notification prompt 834 can be displayed.

In some examples, a notification prompt for taking over playback is displayed in response to user input 830. For example, in response to a user selecting an indicator for Kitchen device in FIG. 8M, a notification prompt is displayed. In some examples, a notification prompt for taking over playback is displayed in response to user input 832. For example, in response to receiving selection of affordance 810L in FIG. 8M (e.g., after receiving selection of the Kitchen and Living Room indicators 810D and 810E), notification prompt 834 is displayed. Notification prompt 834 includes a message 834A that reads: "The Kitchen and Living Room speakers are currently playing "Heart Wave". Are you sure you would like to play "Same Thing" in the Kitchen and Living Room?". Further, notification prompt 834 includes yes affordance 834B and cancel affordance 834C. In some examples, selection of affordance 834B causes device 800 to take over the playback of the selected devices. In some examples, selection of affordance 834C causes device 800 to forgo taking over the playback of the selected devices.

FIG. 8O illustrates an exemplary multi-device interface after taking over playback from another media session owner. At FIG. 8O, device 800 displays the multi-device interface 810 depicted in FIG. 8O in response to selection of yes affordance 834B, representing confirmation of that the device 800 should take over playback and add the Kitchen and Living Room devices to the currently-selected "Same Thing" media session. Notably, in FIG. 8O, the indicator 810J (as shown in FIG. 8L) is no longer displayed. In some examples, an indicator for a media session ceases to be displayed subsequent to its devices being taken over. In this example, the media session that corresponded to indicator 810J (e.g., playback of "Heart Wave" on devices "Kitchen+Living Room") no longer exists (e.g., because each of its devices have been added to another media session). Thus, indicator 810J is not displayed in multi-device interface 810 of FIG. 8O.

FIG. 8P illustrates an exemplary multi-device interface after less than all devices of a media session have been taken over. FIG. 8P is similar to FIG. 8O except that the device set "Living Room" was not taken over (e.g., not selected at FIG. 8M) and added to the media session for the media item "Same Thing". Thus, the indicator 810J continues to be displayed in FIG. 8P, but has been updated to reflect that the Kitchen device is no longer a part of that media session. For example indicator 810J in FIG. 8P now identifies "Living Room" as the device set included in its corresponding media session, and no longer identifies "Kitchen+Living Room" (e.g., as in FIG. 8M).

FIGS. 9A-9C is a flow diagram illustrating a method for configuring an electronic device to initiate playback on a plurality of available playback devices using an electronic device in accordance with some embodiments. Method 900 is performed at a device (e.g., 100, 300, 500, 580) with a display. Some operations in method 900 are, optionally, combined, the order of some operations are, optionally, changed, and some operations are, optionally, omitted.

As described below, method 900 provides an intuitive way for configuring an electronic device to initiate playback on a plurality of available playback devices. The method reduces the cognitive burden on a user for configuring an electronic device to initiate playback on a plurality of available playback devices, thereby creating a more efficient human-machine interface. For battery-operated computing devices, enabling a user to configure an electronic device to initiate playback on a plurality of available playback devices faster and more efficiently conserves power and increases the time between battery charges.

The electronic device (e.g., 800) displays (902), on the display (e.g., 802), a first current media interface (e.g., 804 of FIG. 8A) for the device, wherein the first current media interface includes: a representation (e.g., 804A, 804B, 804C, and/or 804D of FIG. 8A) of a first media item available for playback on the device (904), and a playback device selection affordance (906) (e.g., 804E). In some examples, a current media interface is any user interface for browsing, viewing, or controlling media playback. For example, a current media interface is a "Now Playing" interface.

In some embodiments, the electronic device (e.g., 800) is currently playing the first media item. For example, the first current media interface is a "Now Playing" interface. In some embodiments, the representation of the first media item available for playback on the device is selectable (e.g., is an affordance), and can be selected to initiate playback of the first media item on the electronic device. For example, the first current media interface is a browsing interface that allows browsing of one or more media items (e.g., the first media item) while a media application on the electronic device (e.g., or the electronic device itself) is targeting the electronic device. In some embodiments, selection of a media item (e.g., the first media item) while the music application is targeted to a device causes playback of the media item to initiate on the targeted device in response.

In some embodiments, selection of a playback device selection affordance (e.g., 804E) allows one or more available playback devices to be selected. In some embodiments, the available playback devices include the electronic device.

Selection of one or more available playback devices may be referred to as "targeting", "retargeting", "focusing", "refocusing" a media application or the electronic device, as described above. For example, a media application or device can be targeted to three discrete devices: the electronic device and two external speakers connected to the device via a wireless connection. In this example, while targeted to the three discrete devices in this example, a media item is selected for playback, and playback is initiated on the three discrete devices.

The electronic device (e.g., 800) receives (908) a first user input (e.g., 806 of FIG. 8B) representing selection of the playback device selection affordance (e.g., 804E).

In response to receiving the first user input (e.g., 806), the electronic device (e.g., 800) displays (910), on the display (e.g., 802), one or more affordances (e.g., affordances 804B-804K) associated with a plurality of available playback devices (e.g., the device sets iPhone, Bedroom, Kitchen, and/or Living Room of FIG. 8C) connected to the device (e.g., 800). In some examples, available playback devices are devices that are connected to the device such that the electronic device can control or otherwise use the available playback devices to initiate playback of media content (e.g., via instructions transmitted over a communication link). In some examples, the available devices are connected (e.g., to the electronic device) via a wireless connection (e.g., via Wi-Fi, Apple Airplay, or the like). In some embodiments, the plurality of available playback devices includes the electronic device.

Displaying one or more affordances associated with a plurality of available playback devices connected to the device provides the user with visual feedback about the state of a plurality of devices that are available for media playback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying one or more affordances associated with a plurality of available playback devices connected to the device allows the user to collectively view a plurality of states for a plurality of available devices in one optimized interface. Providing an optimized interface to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device (e.g., 800) receives (912) a second user input (e.g., 812 of FIG. 8D) representing selection of the one or more affordances (e.g., affordance 810J of FIG. 8D) associated with the plurality of available playback devices. In some examples, the electronic device receives selection of several devices (e.g., via selection of indicators 810H and 810I as shown in FIG. 8E), or receives selection of a single indicator (e.g., 810J FIG. 8D) representing a plurality of devices.

In response to receiving the second user input (e.g., 812), the electronic device (e.g., 800) configures (914) the device to initiate playback on the plurality of available playback devices (e.g., the devices in the set "Kitchen+Living Room" represented by affordance 810J of FIG. 8D, and individually by affordances 804D and 804E of FIG. 8E). In some embodiments, configuring the device to initiate playback comprises initiating playback on the plurality of available playback devices. In some embodiments, playback is not initiated in response to configuring the device to initiate playback on the plurality of available playback devices, but if a command to initiate playback of media is subsequently received by the device, playback will be initiated on the plurality of available playback devices. Thus, in some examples, configuring a device to initiate media playback, on one or more devices, "retargets" the device (e.g., as described above) on the one or more devices, for example, to control and/or output playback on a plurality of available devices.

Configuring a device to initiate playback on the plurality of available playback devices allows the user to collectively control a plurality of available devices in one optimized interface. Providing an optimized interface to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, configuring the device to initiate playback on the plurality of available playback devices comprises transmitting (916) an instruction to the available playback devices to initiate playback (e.g., the devices in the set "Kitchen+Living Room" represented by affordance 810J of FIG. 8D, and individually by affordances 804D and 804E of FIG. 8E).

In some embodiments, while the electronic device (e.g., 800) is configured to initiate playback on the plurality of available playback devices (e.g., devices represented by affordances 804D and 804E of FIG. 8E), and after ceasing to display the one or more affordances (e.g., affordances 804B-804K) associated with the plurality of available playback devices (e.g., the device sets iPhone, Bedroom, Kitchen, and/or Living Room of FIG. 8C), the electronic device receives (918) a third user input (e.g., 824 of FIG. 8J), representing a request to initiate playback of a second media item (e.g., represented by 820B of FIG. 8J). For example, while the electronic device is targeting the plurality of available playback devices, the third user input is received after ceasing to display multi-device interface 810. In response to receiving the third user input, the electronic device transmits (920) a request to initiate playback of the second media on the plurality of available playback devices (e.g., the device set "Kitchen+Living Room" indicated by device selection affordance 824E of FIG. 8K). In some embodiments, the third user input is received at a browser interface (e.g., 820 of FIG. 8I). In some examples, a browser interface is an interface for browsing and selecting media items for playback (e.g., a music application, a video application). The browser interface can be displayed after configuring the device to initiate playback on the plurality of available playback device at a multi-device interface, and after ceasing to display (e.g., dismissing, exiting) the multi-device interface. In some examples, the device remembers that playback of selected media will be initiated on the plurality of available devices that were selected at the multi-device interface (e.g., as shown in FIG. 8F). In some embodiments, the third user input is selection of an affordance of the browser interface. For example, such as an affordance associated with a media item, such as a song or video. In some embodiments, transmitting a request to initiate playback of the second media comprises transmitting an address (e.g., a URL) that is usable to stream the media. In some embodiments, transmitting a request to initiate playback of the second media comprises transmitting a stream of the media from the electronic device to the plurality of available devices.

In some embodiments, the first current media interface (e.g., 804 of FIG. 8A) for the electronic device (e.g., 800) includes an indication (e.g., 804A, 804B, 804C, and/or 804D) of a media item currently playing back on the device, and further in response to receiving the first user input (e.g., 806), the electronic device (e.g., 800) concurrently displays, on the display (e.g., 802): a first region (e.g., 828A of FIG. 8D) that includes the one or more affordances (e.g., 804B-804K) associated with the plurality of available playback devices; and a second region (e.g., 828B of FIG. 8D) that includes the indication (e.g., 804A, 804B, 804C, and/or 804D) of the media item currently playing back (e.g., "Same Thing" by "Jambug" as indicated by indicator 810A of FIG. 8D) on the electronic device (e.g., 800). Further in response to receiving the second user input (e.g., 812 of FIG. 8D), the electronic device (e.g., 800) visually updates the second region (e.g., 828B of FIG. 8D) to display an indication of a media item currently playing back (e.g., "Heart Wave" by "MKTS" as indicated by indicator 810J of FIG. 810J of FIG. 8E) on the plurality of available playback devices (e.g., the device set "Kitchen+Living Room" represented by indicator 810J of FIG. 8E).

In some embodiments, the one or more affordances (e.g., 810J of FIG. 8D) associated with the plurality of available playback devices connected to the device include information (e.g., "Heart Wave" by "MKTS" as indicated by indicator 810J of FIG. 810J of FIG. 8D) identifying media currently being played back by the plurality of available playback devices.

In some embodiments, the information identifying the media currently being played back by the plurality of available playback devices includes one or more of: a song title, an artist, a movie title, an episode name, and a URL (e.g., "Heart Wave" by "MKTS" as indicated by indicator 810J of FIG. 810J of FIG. 8E).

In some embodiments, while the electronic device (e.g., 800) is configured to initiate playback on the plurality of available playback devices (e.g., the device set "Kitchen+Living Room" represented by indicator 810J of FIG. 8E), the electronic device transmits (922) an instruction to initiate media playback of a third media item (e.g., "Same Thing" by "Jambug", as indicated by the active media session indicator 810A of FIG. 8M) on the plurality of available playback devices (e.g., the device set Kitchen and the device set Living Room respectively corresponding to indicators 810D and 810E of FIG. 8M), wherein the plurality of available playback devices are currently playing a fourth media item (e.g., "Heart Wave" by "MKTS", as indicated by the active media session indicator 810J of FIG. 8M) that was initiated by another device (e.g., the device named "Bob's iPhone" identified by indicator 810J of FIG. 8M) different than the electronic device (e.g., 800). Subsequent to transmitting the instruction to initiate playback of the third media item, the electronic device (e.g., 800) receives (924) an indication (e.g., as shown by indicator 810A of FIG. 8O, checkmarks in indicators 810H and 810I) that the plurality of devices are currently playing back the third media item (e.g., "Same Thing" by "Jambug", as indicated by the active media session indicator 810A of FIG. 8O).

In some embodiments, the electronic device (e.g., 800) determines (926) that the plurality of available playback devices (e.g., the device set Kitchen and the device set Living Room respectively corresponding to indicators 810D and 810E of FIG. 8M) are currently playing content (e.g., "Heart Wave" by "MKTS", as indicated by indicator 810J of FIG. 8M) that was initiated by another device (e.g., "Bob's iPhone" as indicated by indicator 810J of FIG. 8M). In accordance with the determination that the plurality of available playback devices are currently playing content that was initiated by another device, the electronic device requests (928) (e.g., displays prompt 834 of FIG. 8N) user input confirmation (e.g., selection of affordance 834B or 834C of FIG. 8N) of the instruction to initiate media playback of a third media item on the plurality of available playback devices. The electronic device (e.g., 800) receives (930) a user input response (e.g., selection of affordance 834B or 834C of FIG. 8N) to the request for user input confirmation. In accordance with the user input response being a positive confirmation (e.g., selection of affordance 834B FIG. 8N), the electronic device transmits (932) the instruction to initiate media playback of the third media item on the plurality of available playback devices. In accordance with the user input response being a negative confirmation (e.g., selection of affordance 834C FIG. 8N), the electronic device forgoes (934) transmitting the instruction to initiate media playback of the third media item on the plurality of available playback devices.

In some embodiments, further in response to receiving the second user input (936) (e.g., 812 of FIG. 8D), the electronic device (e.g., 800) ceases displaying (e.g., replaces display with current media interface 816 of FIG. 8G) the one or more affordances (e.g., the affordances included in 810 of FIG. 8D) associated with the plurality of available playback devices.

In some embodiments, a media item includes (938) one or more of audio data, video data, or both.

Note that details of the processes described above with respect to method 900 (e.g., FIGS. 9A-9C are also applicable in an analogous manner to the methods described below/above. For example, method 700, 1100, 1300, 1500, 1700, 1800, 2000, 2200, 2400, 2600, 2800, 3000, 3200, 3400, 3600, 3800, and 3900 optionally includes one or more of the characteristics of the various methods described above with reference to method 900. For brevity, these details are not repeated below.

FIGS. 10A-10O illustrate exemplary user interfaces for configuring an electronic device, in accordance with some embodiments. The user interfaces in these figures are used to illustrate the processes described below, including the processes in FIGS. 11A-11D.

FIG. 10A illustrates an exemplary smart speaker device. Device 1000 is a smart speaker device, and can include one or more features of device 580 as described above. In some embodiments, device 1000 includes one or more features of device 100, 300, or 500. As shown in FIG. 10A, device 1000 can include one or more LED indicators, which are shown displaying a rotating swirling pattern 1004 in FIG. 10A. In some examples, the LED indicators display a pattern (e.g., also referred to as a "boot up pattern") when device 1000 is powered on for the first time (e.g., during boot up of the device). The pattern 1004 can be created by one or more LED indicators or other display elements (e.g., a display panel), which are referred to herein interchangeably, unless otherwise noted. In some examples, LED indicators are positioned under a touch-sensitive surface of device 1000. FIG. 10B illustrates three concentric rings, 1006A, 1006B, and 1006C that represent concentric rings of discrete LED indicators that comprise an LED indicator that forms pattern 1004. The rings 1006A-1006C can be used to create the boot up pattern (e.g., pattern 1004). In some examples, other arrangements of lighting elements are used. When device 1000 is finished booting up, or is otherwise ready to pair (e.g., with another device) and/or be configured, the pattern 1004, in some examples, can change. For example, the pattern may transition to a pulsing pattern (e.g., progressively lighting up each concentric ring 1006A-1006C, and then turning them off in reverse order).

As shown in FIG. 10A, device 1000 has limited display capabilities, and thus configuration of device 1000 can be made easier by the use of a second device having more robust display capabilities. In some examples, device 1000 is a smart home device (e.g., a network connected speaker) that a user places within their home (e.g., in one location, or moving between many locations). In such case, the user has physical access to the device when configuring it, and thus the use of physical proximity can be used as part of an intuitive and easy to use interface for configuring the device 1000. Thus, rather than making a user navigate various menus attempting to establish or access communication between a personal device (e.g., device 1010) and the device 1000, a user can place their personal device near device 1000, for example, as part of a configuration process.

Figure 10C:
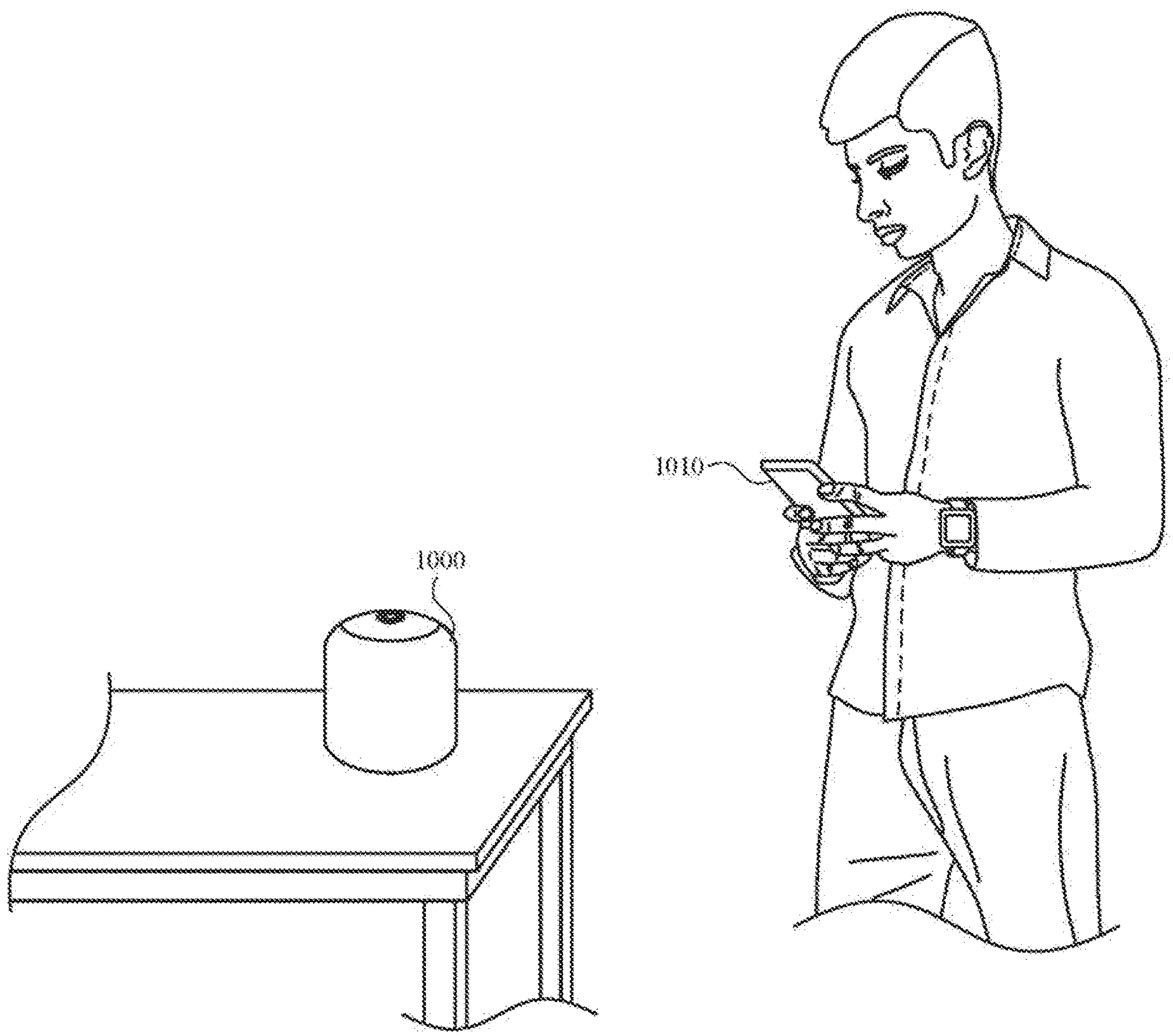
Figure 10D:
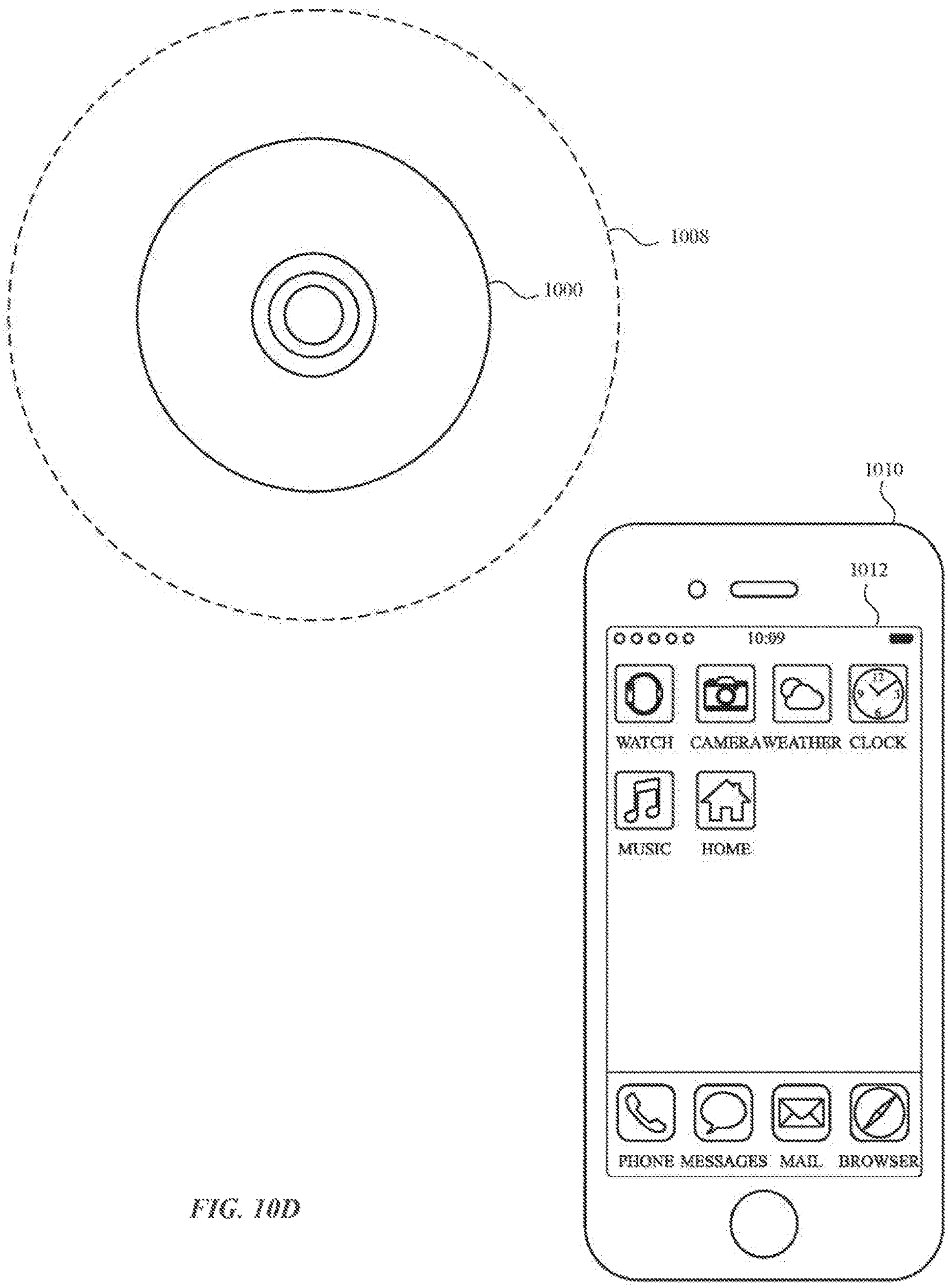

FIGS. 10C-10G illustrate exemplary physical arrangements of a first device and a second device. FIG. 10C illustrates a first scenario that includes first device (e.g., device 1000) sitting on a table, and a user holding a second device (e.g., personal device 1010) at a long distance away from the first device. In some embodiments, device 1010 includes one or more features of device 100, 300, or 500. FIG. 10D illustrates an exemplary overhead view of the first scenario. As shown in FIG. 10D, device 1000 and device 1010 are far apart. FIG. 10D includes the proximity condition range indicator 1008. A proximity condition range indicator is also referred to herein as a "proximity zone indicator" or simply as a "proximity zone". Device 1010 is not inside of proximity condition range indicator 1008. Proximity condition range indicator 1008 is included as a visual aid, and is intended to represent a physical proximity that would satisfy a proximity condition. For example, range indicator 1008 can represent the range of a near-field communication detection circuitry of device 1000. In some embodiments, any appropriate technique can be used to detect proximity between devices. For instance, in some examples, wide-band wireless connection is used. Wide-band wireless connection is used, for example, to determine one or more of: directionality, distance, and orientation, of one or more devices. Thus, presence of a detectable device within (e.g., partially or completely) within the proximity condition range indicator 1008 would satisfy a proximity condition, but would not if the detectable device is located outside of the range indicator 1008. One of skill would appreciate that a detection range of physical proximity can be non-uniform, can be affected by numerous variables (e.g., wireless interference, air humidity, or the like), and can include points in space in three dimensions, all of which are intended to be within the scope of this disclosure. Thus, the graphical representation of proximity condition range indicator 1008 is not intended to limit the scope of determining whether a proximity condition is satisfied.

Figure 10E:
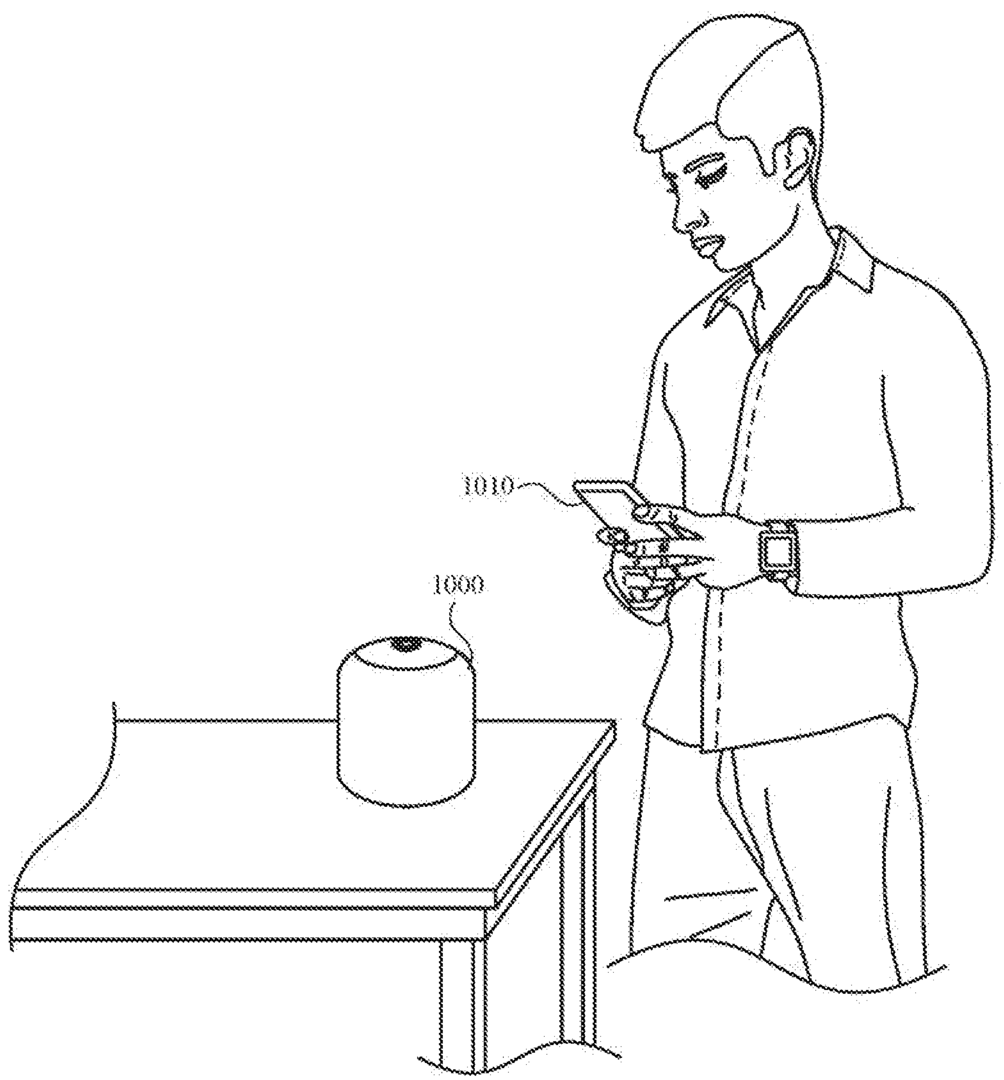
Figure 10F:
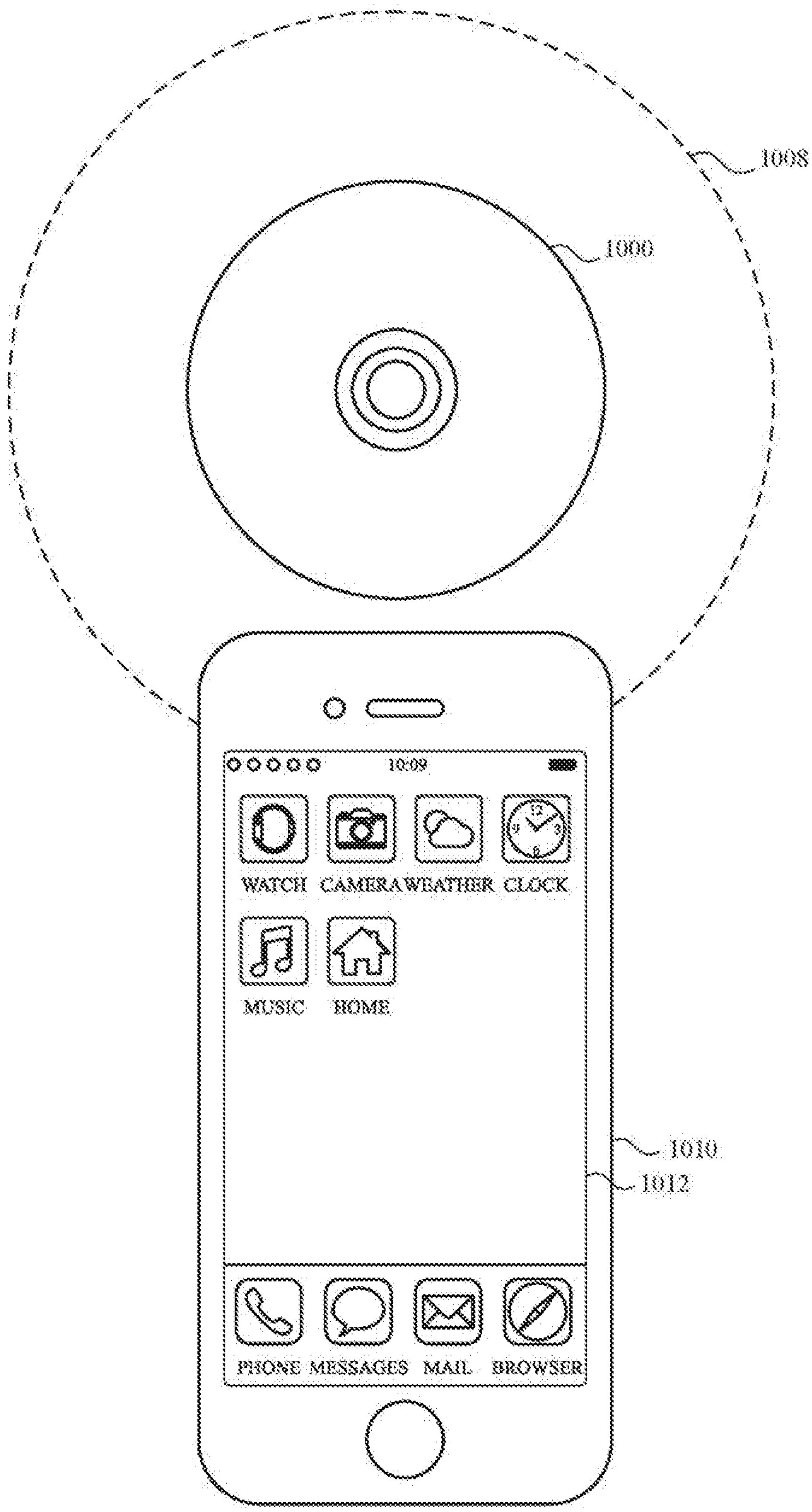

FIG. 10E illustrates a second scenario that includes first device (device 1000) sitting on a table, and a user holding a second device (personal device 1010) at a short distance away from the first device. FIG. 10F illustrates an exemplary overhead view of the second scenario. As shown in FIG. 10F, device 1000 and device 1010 are close together and now device 1010 is at least partially within the proximity condition range indicator 1008. Because proximity condition range indicator 1008 represents a physical proximity that satisfies the proximity condition, the first device 1000 detects an indication that a physical proximity between the first device and the second device 1010 satisfies the proximity condition. In some examples, in accordance with detecting that a proximity condition is satisfied, device 1000 initiates a configuration process. For example, the device 1000 can enter a configuration mode for receiving configuration data (e.g., settings, account information, and the like) from the second device. In some examples, in accordance with detecting that a proximity condition is satisfied, device 1000 proceeds to a next step in a configuration process. For example, if the device 1000 is already in a configuration mode, the satisfaction of a proximity condition can cause the device 1000 to proceed to a next step. For instance, satisfaction of the proximity condition can be required in order to verify the identity of the second device or verify that the user of the second device has physical access to device 1000 (e.g., is not a user outside of the home that is attempting to remotely access and configure device 1000).

Figure 10G:
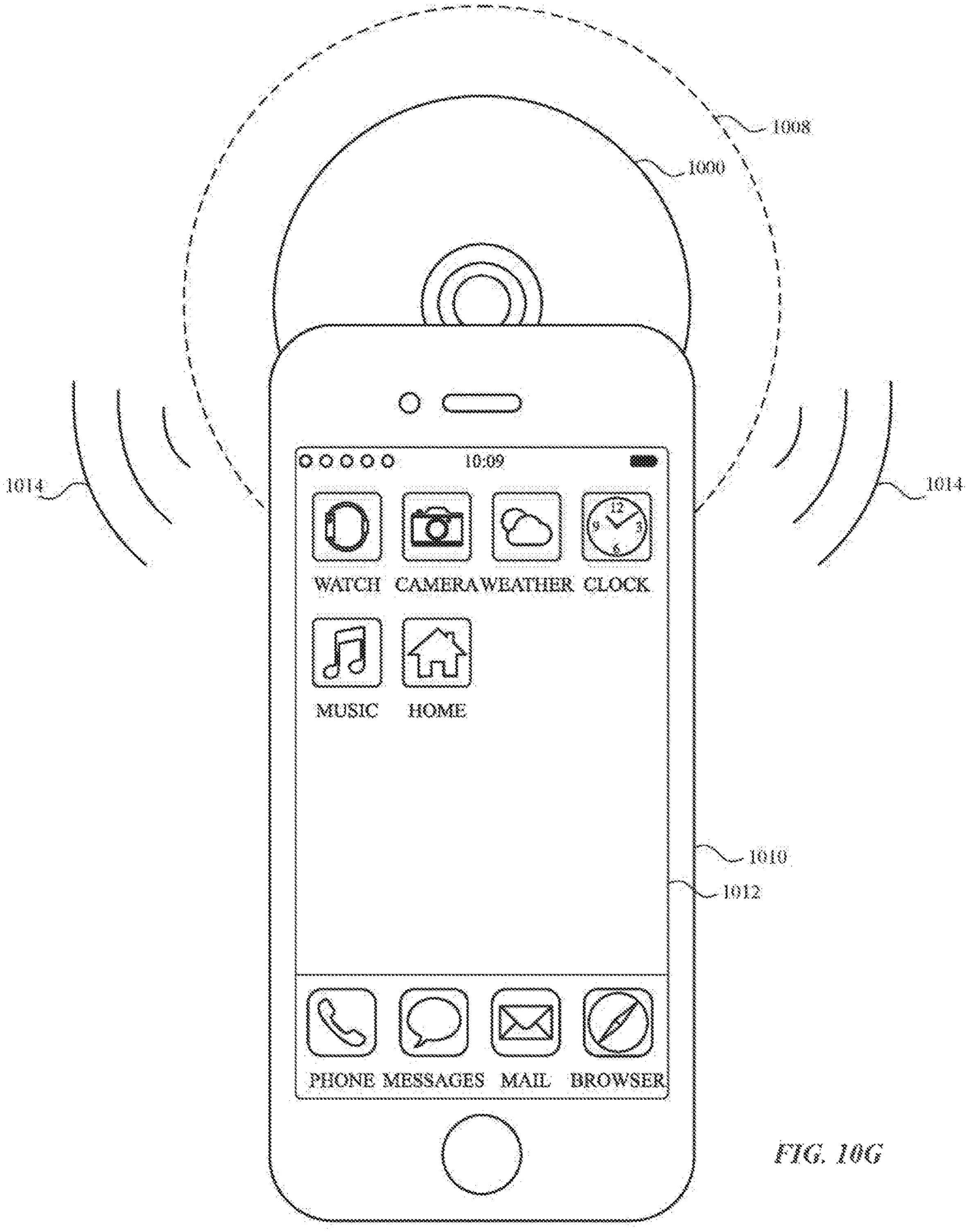

FIGS. 10G-10J illustrate exemplary techniques for using audio tone signals when configuring a device. FIG. 10G depicts an overhead view similar to FIG. 10F, but additionally depicts device 1000 outputting an audio tone signal 1014 (e.g., depicted as graphical representations of sound waves). In this example, speaker 1000 plays an audible tone. In some examples, the tone is part of a proximity handshake tone at the beginning of a configuration process (e.g., to initiate the process), or a tone later in (e.g., during) the configuration process. In some embodiments, the audio tone signal is out-of-band to a communication link between the first device and the second device. For example, the first and second devices are connected and exchange data communications over a Bluetooth wireless connection (e.g., a communication link). In this example, while the devices continue to be connected via the Bluetooth connection (e.g., the devices detect each other of Bluetooth and perform a handshake), an audio tone signal (e.g., an audible tone that includes or represents a communication between the devices) is out-of-band with the Bluetooth communication link. In some embodiments, being out-of-band to a communication link means that a signal (e.g., an audio tone signal) is not communicated using the same data exchange technique. In some examples, using a different data exchange technique can include one or more of using a different: transmission protocol (e.g., Bluetooth, Wi-Fi), data carrier technology (e.g., sound (mechanical) waves instead of light (electromagnetic) waves), hardware (e.g., wireless antenna instead of a wired connector), or the like. In some embodiments, an audio tone signal is a sound traveling through a transmission medium (e.g., that is detectable by another device). For example, an audio tone signal can include frequencies inside of the human audible frequency range (e.g., approximately 20 Hertz to 20,000 Hertz), and/or include frequencies outside of the human audible frequency range.

Figure 10H:
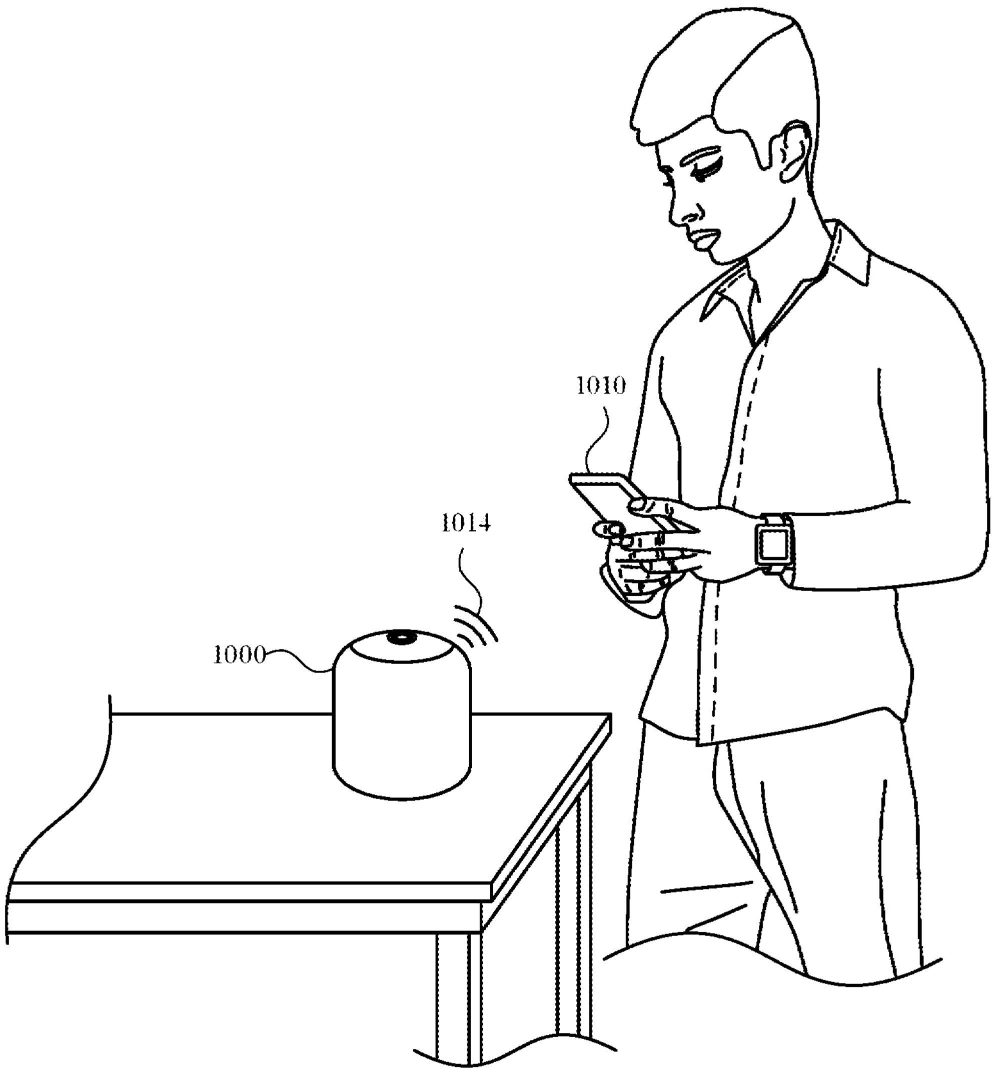

FIG. 10H illustrates an exemplary perspective view of the overhead view of FIG. 10G. As can be seen, a user is holding second device 1010 a short distance away from device 1000, which is outputting the audio tone signal 1014.

Figure 10I:
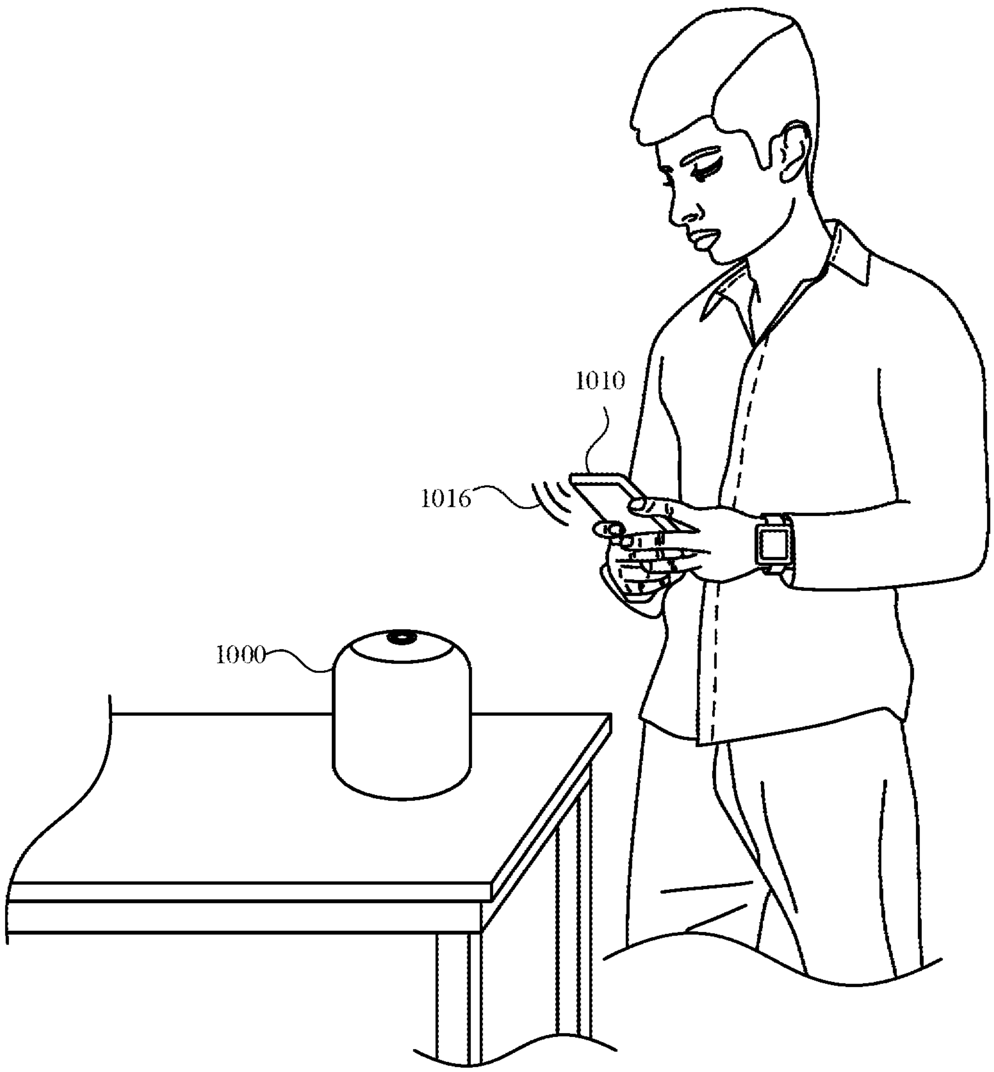

FIG. 10I illustrates an exemplary perspective view where the second device 1010 is outputting a second audio tone signal 1016 (e.g., which may referred to as a response audio tone signal). In some embodiments, a response audio tone signal 1016 (also referred to as a "second audio tone signal")

is output by the second device in response to the second device detecting the audio tone signal by device 1000. For example, device 1010 can play a response tone immediately in response to detecting the tone signal 1014, in order to communicate to the device 1000 that the first audio tone signal was received. In some embodiments, a response tone signal is a tone signal that is output by the second device at a later step in the configuration process. For example, the first tone signal (e.g., 1014) can represent an audible indication that the configuration process has been initiated (e.g., and proceeds to a first step of the process), and subsequent to initiating the configuration process for the second device (e.g., using the first device), the second device can output the second audio tone signal (e.g., 1016) at a fourth step of the configuration process. In some embodiments, the response tone signal includes encoded data. For example, as part of the configuration process for the second device, the second device (e.g., a personal device 1010 that is already associated with a user's account) can pass account login information to the first device (e.g., so that the device 1000 can access or update data associated with the user's account) via encoded data in an audio tone signal. This technique can be used, for example, when transmission of such data by other means may be unsecure (e.g., may be intercepted). In some examples, data is encoded in an audio tone signal by any appropriate technique, as one of skill in the art would appreciate. For example, an audio tone signal can include tones at a particular frequency representing data signatures. In some examples, an audio tone signal includes modulated carrier sound waves that carry data information.

In some embodiments, the first device repeats the audio tone signal until it receives a confirmation that the second device detected the audio tone signal. For example, device 1000 can repeat output of audio tone signal 1014 until receiving confirmation that device 1010 detected the signal 1014. For example, the confirmation can be a response tone (e.g., second audio tone signal 1016; "out-of-band") or a communication over the communication link (e.g., Bluetooth, Wi-Fi, or the like; "in-band") between the two devices.

In some embodiments, the first device repeats the audio tone signal for a predetermined number of times. In some embodiments, the first device repeats the audio tone signal for a predetermined number of times or until a confirmation that the second device detected the audio tone signal is received, whichever comes first. For example, device 1000 can repeat the audio tone signal 1014 three times before it ceases repeating the tone, if no confirmation is received (e.g., response tone signal 1016).

Figure 10J:
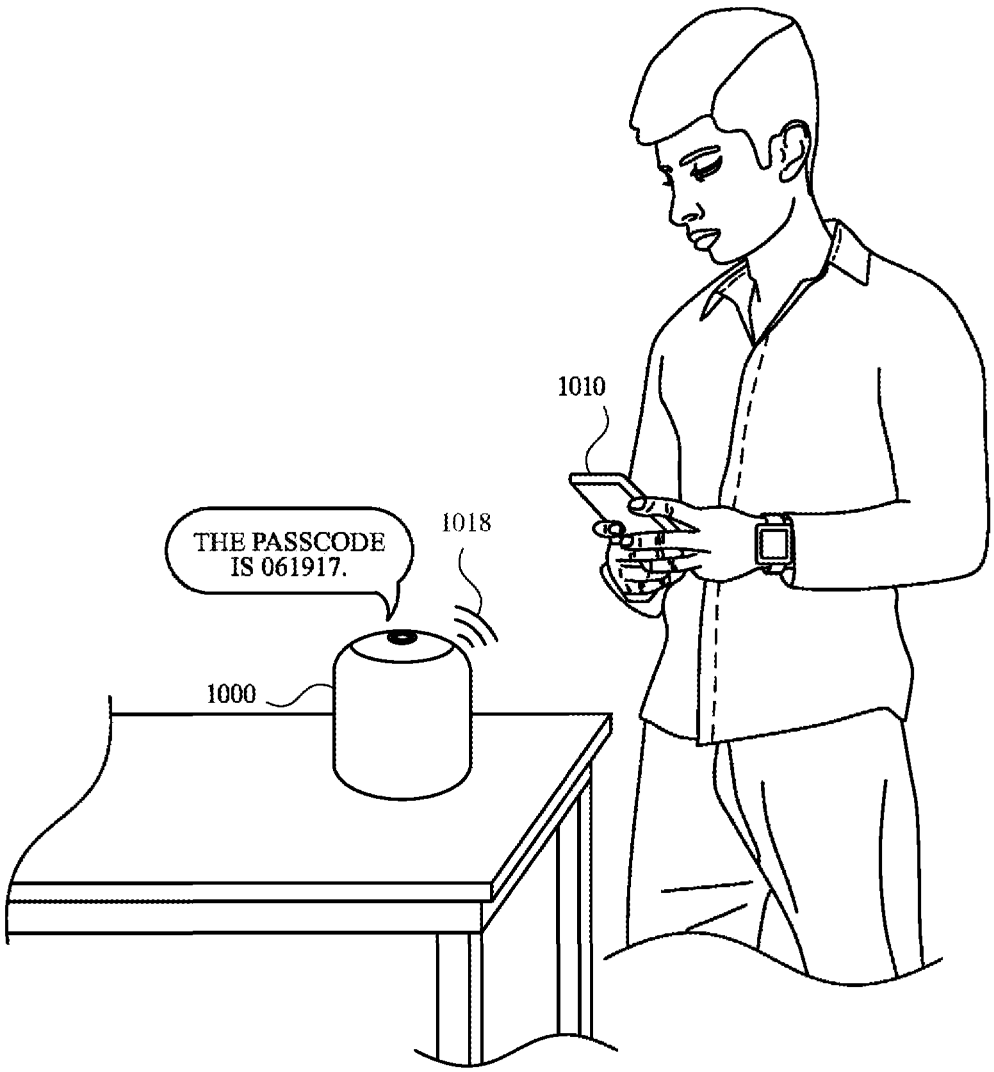

In some embodiments, the first device outputs a dictated audio passcode. As shown in FIG. 10J, device 1000 outputs an audio tone signal 1018 that includes the dictated text "The passcode is 061917". In this example, the user can enter the passcode "061917" into device 1010, for example, to initiate or proceed to a next step in the configuration process for configuring the first device 1000. Thus, if the audio tone signal is not detected by the second device (e.g., device 1000 does not receive a conformation), device 1000 can output a dictation of a passcode that can, for example, be used to proceed to a next step in the configuration process or authorize data exchange between the two devices. For example, a user can enter the dictated passcode into device 1010, or repeat the passcode back to device 1000 (e.g., using voice input). Thus, if the audio tone signal was being used as part of a process of confirming the identity of the first device or second device, but the second device cannot detect the audio tone signal, the user can use the dictated audio passcode to achieve the same effect. For example, using the passcode confirms that the device 1010 is within a relatively close physical proximity by virtue of the user hearing and entering the dictated audio passcode.

In some embodiments, device 1000 outputs encoded data visually. For example, LED indicators (e.g., 1006A-1006B) can be used to output a pattern or sequence of light emission that is detectable by another device (e.g., 1010) and that includes or otherwise represents data information. The other device can, for example, capture or record the light pattern and decode the data, or transmit the captured data back to the device to verify that the other device observed the light pattern.

In some embodiments, during a configuration process, configuration data is received and stored by device 1000. Examples of configuration data include, but are not limited to, one or more of: whether a device (e.g., 1000 or 1010) is a member of a group of devices (e.g., home devices, or a stereo pair), a name or identifier of the device, a user associated with the device, a location (e.g., a room name) of the device, user account credentials (e.g., for network or cloud-based services such as iCloud, iTunes, Apple Music, Spotify, or the like). Configuration data for device 1000 can also be added or edited in a home control application (e.g., as shown in FIG. 6A).

Figure 10K:
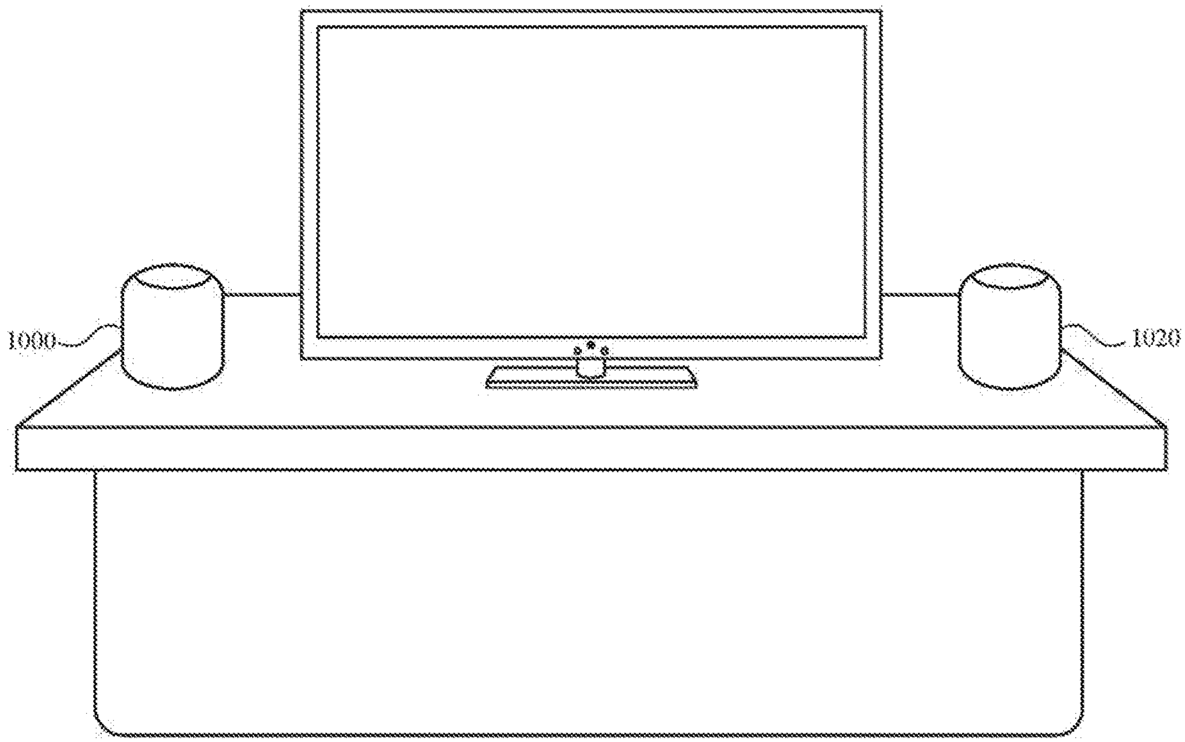
Figure 10L:
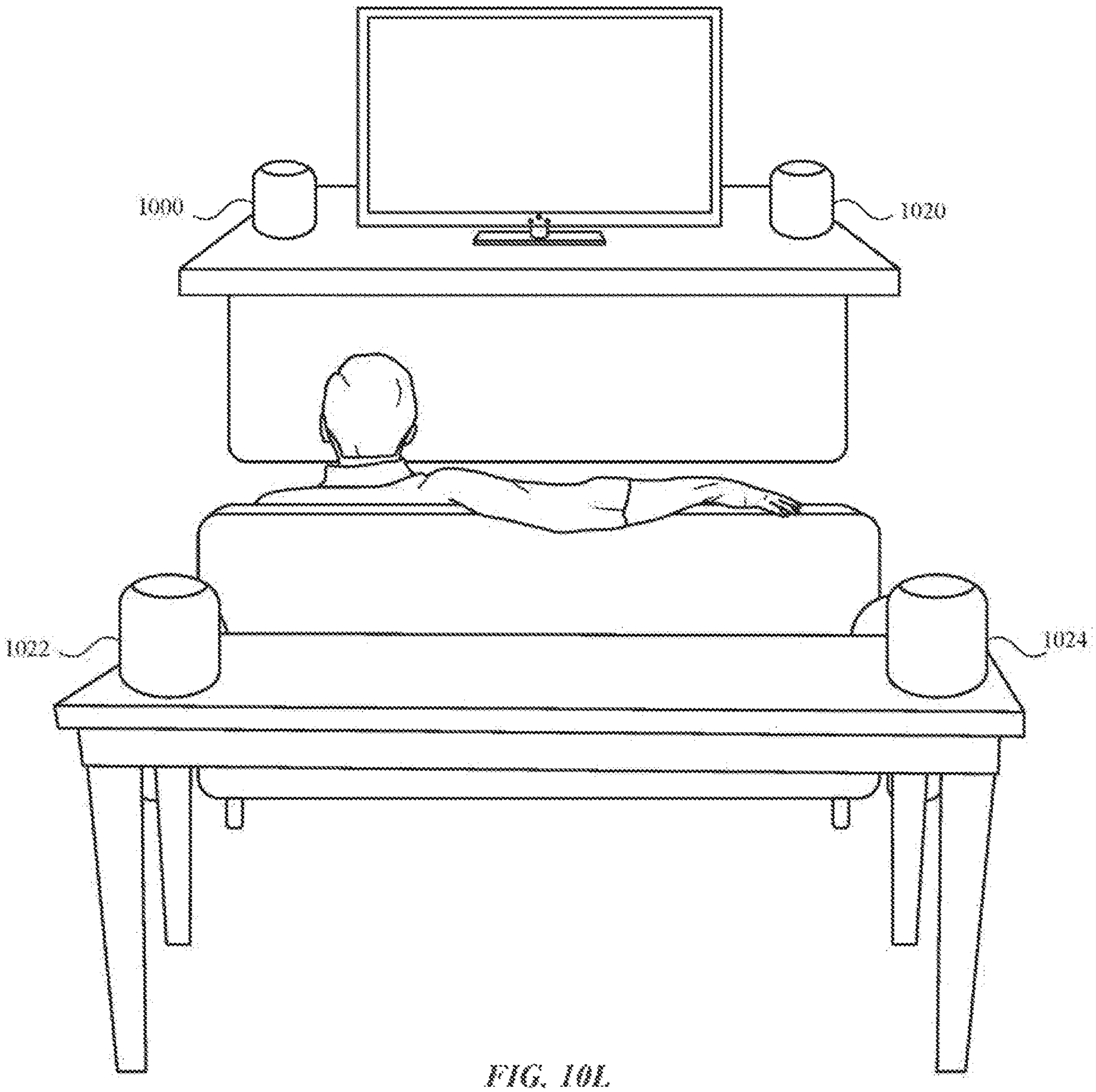

In some embodiments, the first device is configured to be included in a group of devices. FIG. 10K illustrates two devices—first device 1000 and third device 1020—that make up an exemplary group of devices. As shown in FIG. 10K, the first and third devices are both smart speaker devices (e.g., such as device 580). In some embodiments, each device in the group of devices is configured to output an audio channel. FIG. 10K shows the first and third devices placed on either side of a television. In this example, device 1000 is configured to output a left audio channel (e.g., of a stereo audio signal) and the device 1020 is configured to output a right audio channel (e.g., of a stereo audio signal). Thus, the devices in FIG. 10K can be referred to as a "stereo pair", a "stereo group", or the like. In some embodiments, devices in a group are configured to output identical channels. For example, referring gain to FIG. 10K, both devices 1000 and 1020 can be configured to output the same audio signal (e.g., monaural audio). In some examples, a group of devices includes more than two devices. For example, FIG. 10L illustrates a group of devices comprised of device 1000, device 1020, device 1022, and device 1024. As described with reference to FIG. 10K, each device in the group can be configured to output a different audio channel signal (e.g., "rear left" signal on device 1022, "rear right" signal on device 1024, "front left" signal on device 1000, and "front right" signal on device 1020).

In some embodiments, a group of devices (e.g., as shown in FIGS. 10K and 10L), are treated as one device at a user interface for selecting devices for playback. For example, the group of devices 1000 and 1020 of FIG. 10K can be configured as a device set named "Living Room". In some examples, a multi-device interface (e.g., multi-device interface 610 of FIG. 6J, as described above) would display one individual indicator (e.g., indicator 610N of FIG. 6J) corresponding to the stereo pair of devices 1000 and 1020. In some examples, the individual indicator includes an indication that it represents a group of devices (e.g., indicator 610N of FIG. 6J can include two graphical speaker icons).

In some embodiments, a group of devices (e.g., as shown in FIGS. 10K and 10L) are displayed separately at a user interface for selecting devices for playback. In some examples, a multi-device interface (e.g., multi-device interface 610 of FIG. 6J, as described above) includes an individual indicator for each device in a group of devices. For example, referring back to the group in FIG. 10K, device 1000 can be made to output a first media item while device 1020 outputs a second media item, concurrently (e.g., using a multi-device interface such as 610 of FIG. 6J).

Figure 10M:
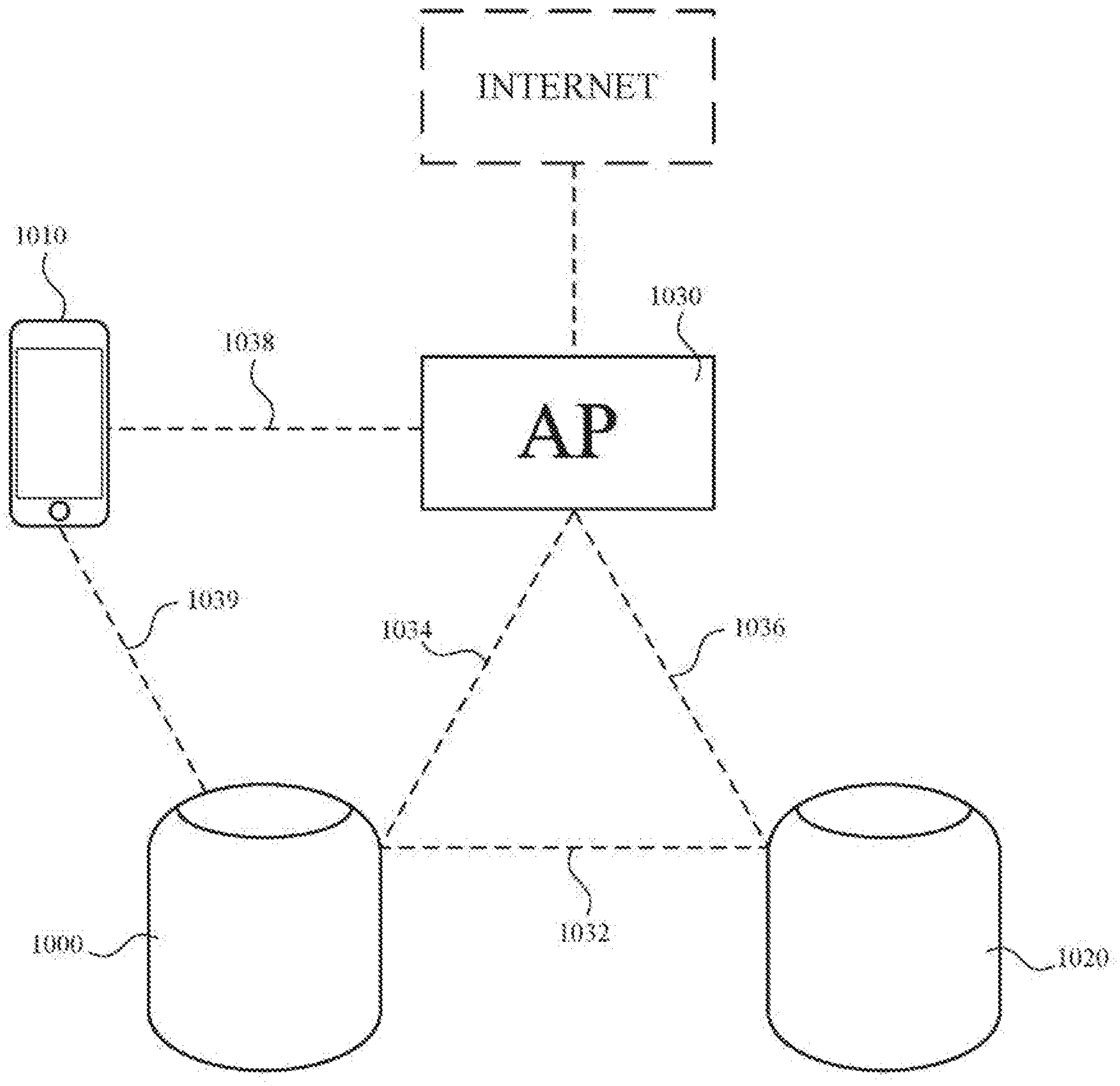

FIG. 10M depicts an exemplary simplified network diagram of a device group, in accordance with some embodiments. In some embodiments, the first device and the third device establish a communication link between, and communicate with, each other directly. For example, FIG. 10M depicts an access point 1030, which may represent a wireless router, network switch, or the like, that creates a location area network that is connected to both devices 1000 and 1020. In this example, device 1000 is connected to access point 1030 (e.g., as illustrated by communication link 1034). In this example, device 1020 is also connected to access point 1030 (e.g., as illustrated by communication link 1036). In this example, access point 1030 is a wireless router and devices 1000 and 1020 are connected to the same wireless (e.g., Wi-Fi) network generated by the access point 1030. Access point 1030 is also connected to second device 1010 (e.g., illustrated by communication link 1038) as well as to a wide area network (e.g., internet). Thus, device 1000 and 1020 are connected by access point 1030. Devices 1000 and 1020, in some examples, can communicate directly, bypassing the need to exchange communications via access point 1030. For example, devices 1000 and 1020 can create a Wi-Fi network between them (e.g., where one device acts as an access point for the other). Communication directly with each other, rather than through an access point that each device in the group is connected to, can provide useful benefits. For example, if both devices 1000 and 1020 have a poor connection to access point 1030, synchronization of simultaneous audio playback on the group of devices can be degraded due to increased latency. If devices 1000 and 1020 have a strong connection directly between them, then latency issues are reduced. Further, routing communication directly between devices 1000 and 1020 reduces usage of the access point 1030's bandwidth by reducing traffic on the network created by the access point (e.g., the user's main home Wi-Fi network). As described previously, in some examples, devices 1000 and 1020 do not have to be grouped to communicate directly. For instance, in some examples, devices 1000 and 1020 can communicate directly out-of-the-box, without being configured by the user to form a device group.

FIG. 10M also depicts communication link 1039 between device 1010 and device 1000. In some examples, link 1039 is a Bluetooth connection, a Wi-Fi connection, or the like.

In some embodiments, device 1000 receives a configuration setting of a permission level that sets a permission condition that another device (e.g., 1010) must meet in order to control the first device. For example, the condition can be that the other device must be connected to the same network (e.g., Wi-Fi network). For further example, the condition can be that the other device is in close proximity. In some examples, the condition is satisfied by either one of these example conditions. In some embodiments, the user can change the configuration setting of a permission level. In some embodiments, the user can remove the configuration setting of a permission level (e.g., any device within a communication range can control device 1000).

Figure 10N:
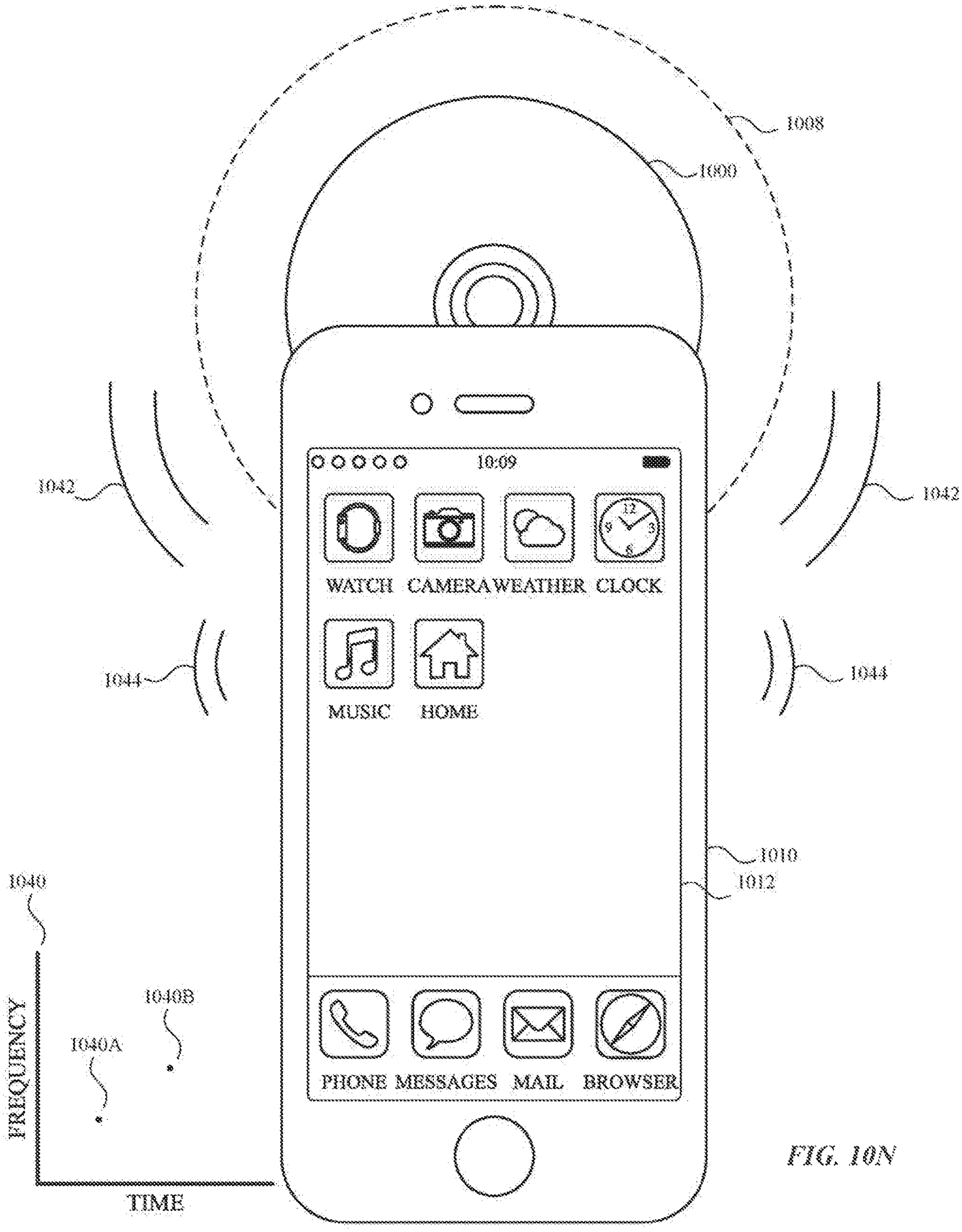
Figure 10O:
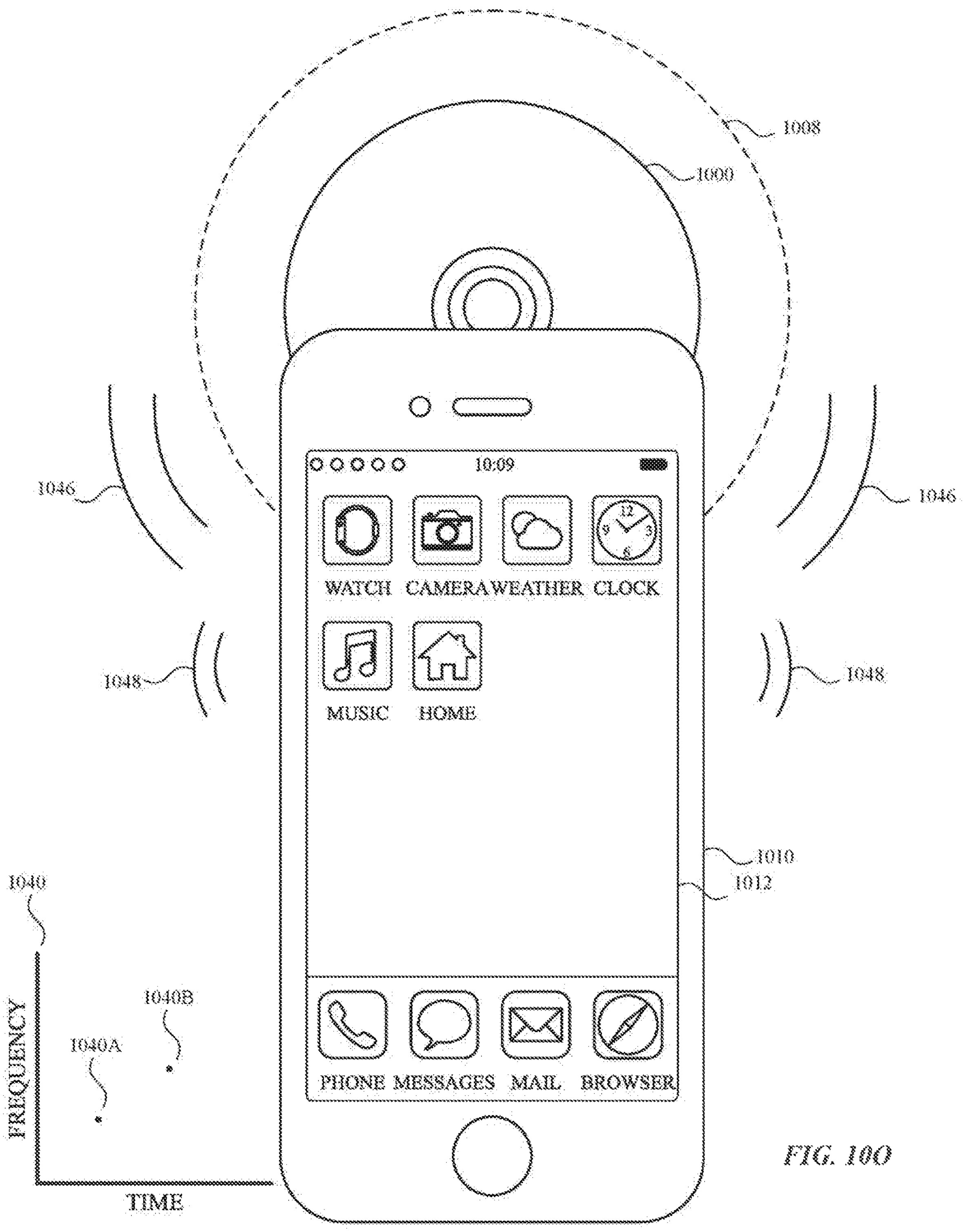
Figure 11A:
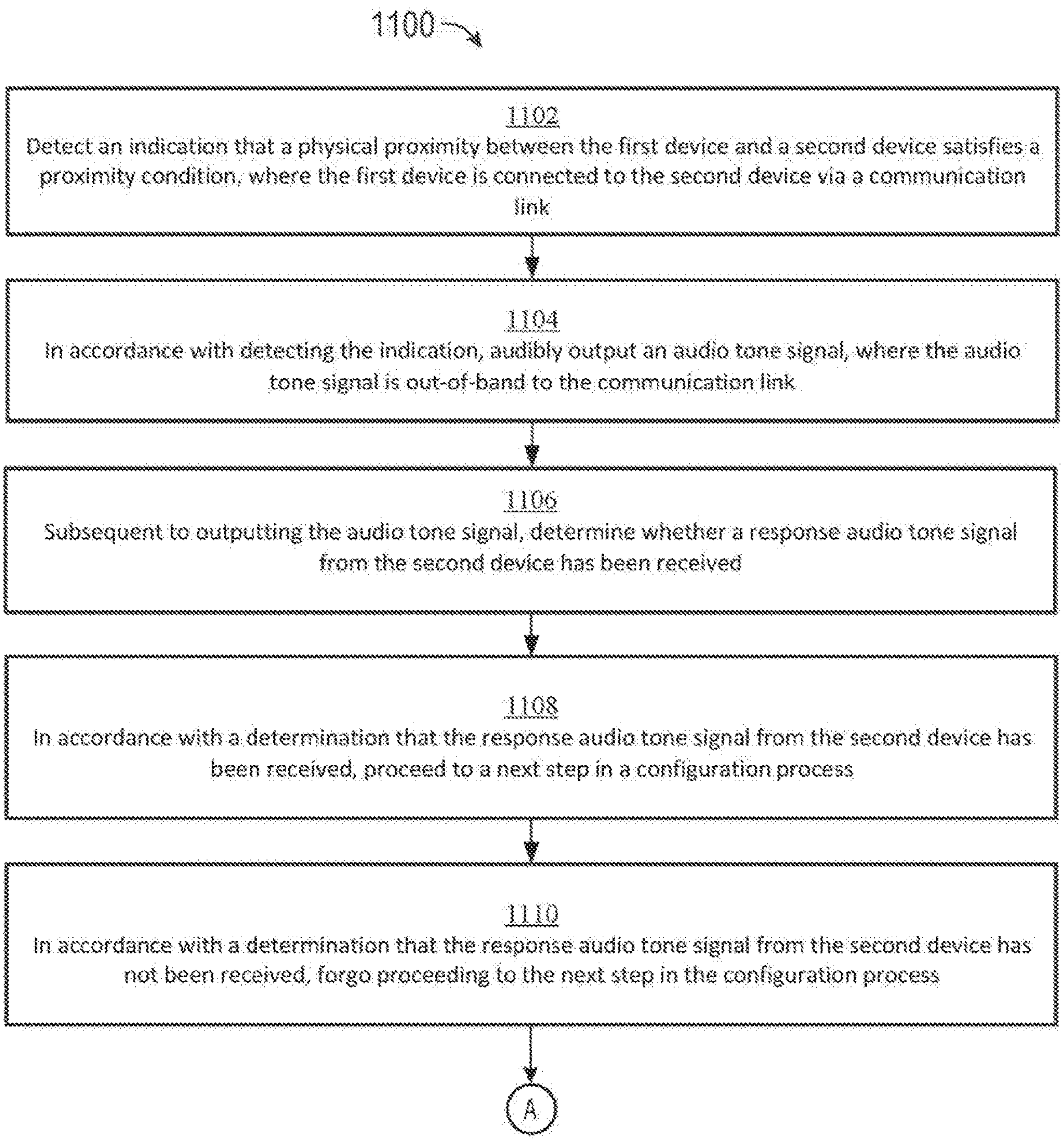
FIGS. 11A-11D is a flow diagram illustrating a process for displaying content in accordance with some embodiments.
Figure 11B:
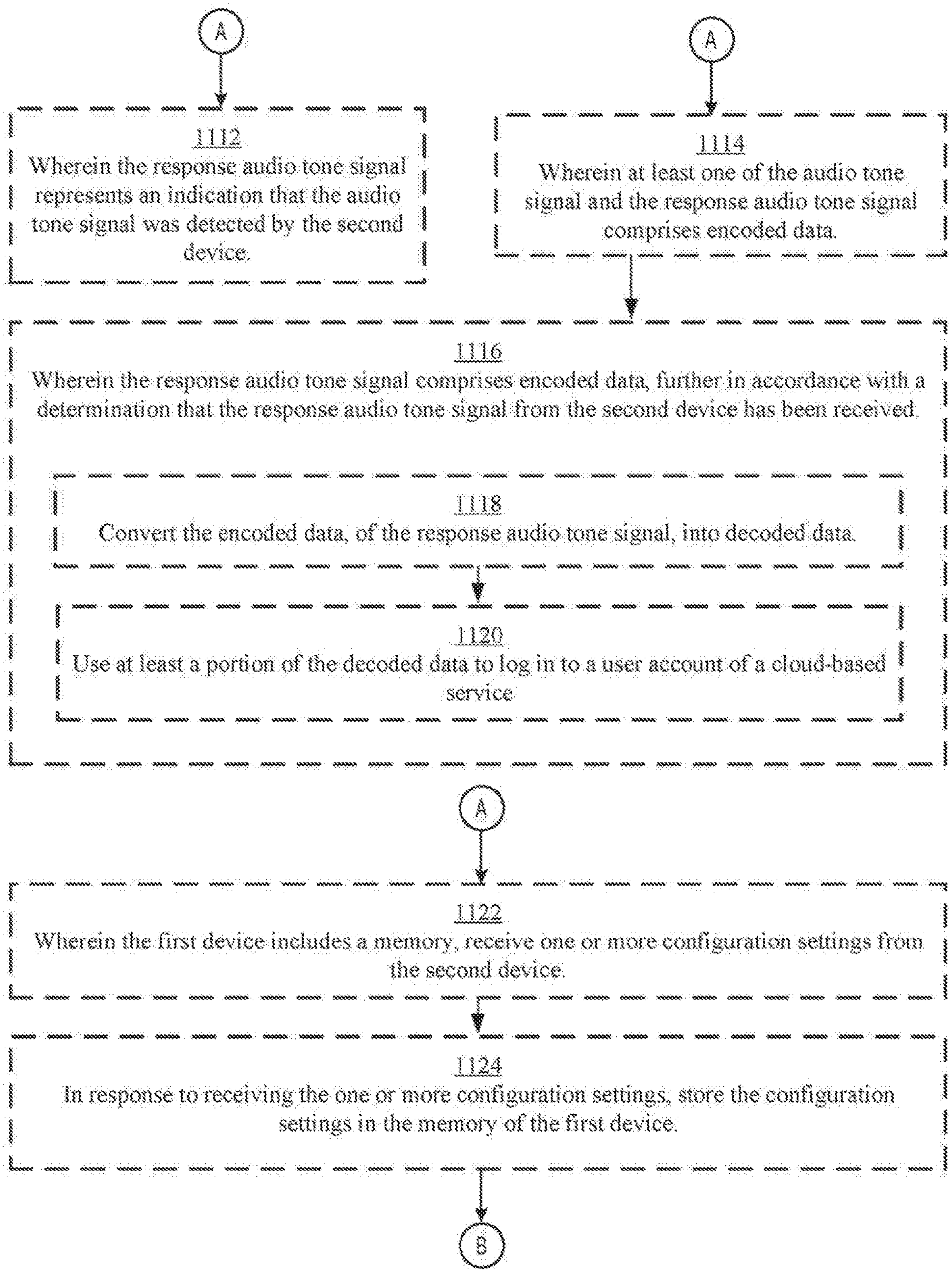
Figure 11C:
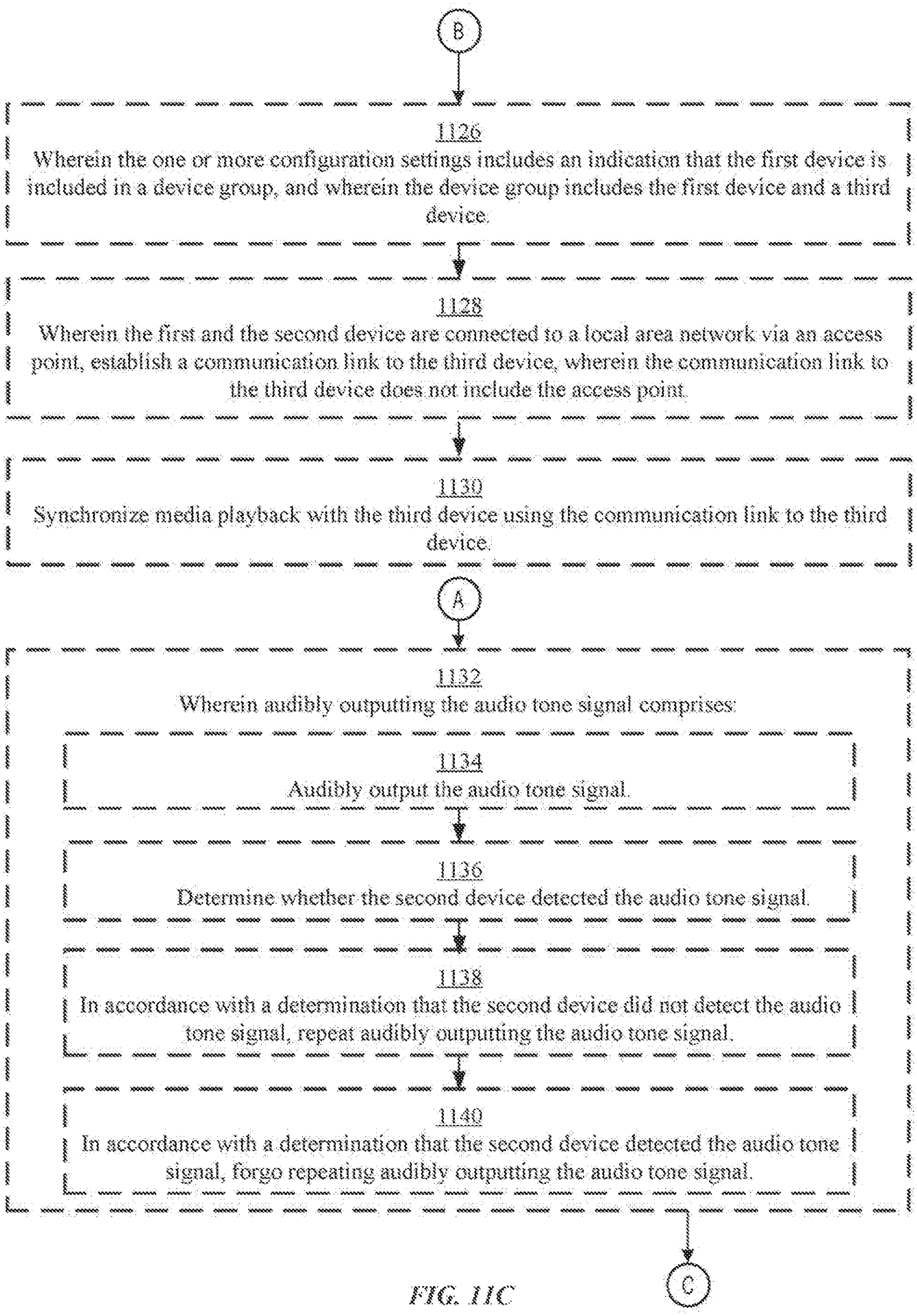
Figure 11D:
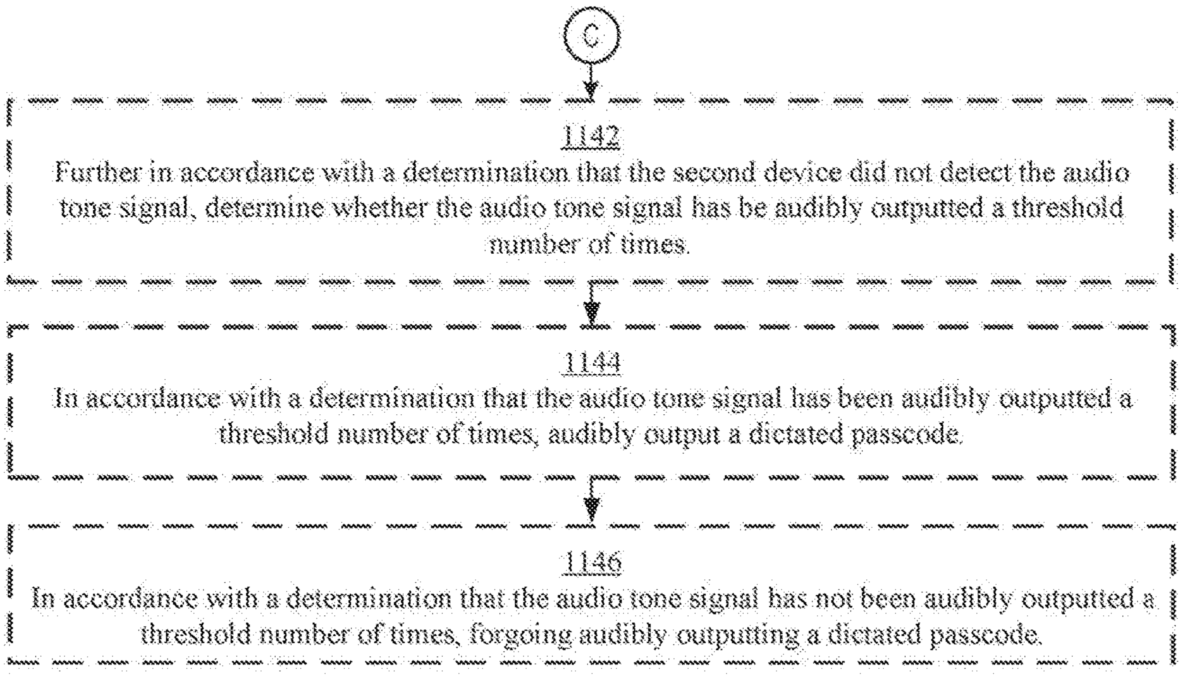

FIGS. 10N-10O illustrated exemplary techniques for indicating progress in a configuration process. In some examples, the first device and the second device output synchronized audio tone signals. The synchronized audio tone signals, for example, can be used to indicate progression through a configuration process. In some examples, the synchronized tones are output at the completion of each step of a configuration process. For example, FIG. 10N illustrates device 1000 outputting audio tone signal 1042, and device 1010 is outputting audio tone signal 1044. Audio tone signals 1042 and 1044 are outputting by their respective devices to be synchronized in time (e.g., output such that at least a portion of each tone are played during an overlapping period of time).

In some embodiments, synchronized audio tone signals are harmonics. Thus, in some examples, the synchronized audio tone signals are the same audio frequency. For example, audio tone signal 1042 has a frequency of 2000 Hertz, while audio tone signal 1044 has a frequency of 2000 Hertz. In some examples, audio frequency of one of the synchronized audio tone signals is an integer multiple of the audio frequency of the other frequency. For example, audio tone signal 1042 has a frequency of 1000 Hertz, while audio tone signal 1044 has a frequency of 2000 Hertz.

In some embodiments, synchronized audio tone signals are each a different frequency of a musical chord or a musical scale. Thus, for example, the synchronized tones sound (e.g., to a user) like they are in harmony.

In some embodiments, subsequent synchronized audio tone signals have a different audio frequency. For example, to indicate that the configuration process is progressing, the synchronized audio tone signals can increase (e.g., step up) in frequency at each subsequent step in a configuration process. In the example shown in FIG. 10N, synchronized audio tone signals 1042 and 1044 are output by their respective devices upon completion of a first step in a configuration process.

Turning now to FIG. 10O, device 1000 outputs synchronized audio tone signal 1046 and device 1010 outputs synchronized audio tone signal 1048. In this example, the signals 1046 and 1048 are output subsequent to signals 1042 and 1044, and are output upon completion of a second step in the configuration process. Further, signals 1046 and 1048 can be harmonics (e.g., the same audio frequency or integer multiples of the same frequency) or compatible tones (e.g., frequencies in the same musical chord or musical scale). To illustrate the concept that the synchronized audio tone signals change in frequency as a configuration process progress, plot 1040 of FIG. 10O is helpful. Plot 1040 depicts a first point 1040A at a frequency of 2000 Hertz and a second point 1040B at a frequency of 8000 Hertz. First point 1040A represents the frequency of audio tone signals 1042 and 1044, which are output after the first step in the configuration process. Second point 1040B represents the frequency of audio tone signals 1046 and 1048, which are output after the subsequent second step in the configuration process. In some examples, synchronized audio tone signals decrease in frequency as progress during the configuration process progresses. Thus, using synchronized audio tone signals, the first and second devices can audibly indicate progress of a configuration process to the user. For example, the audio tone signals can give the impression of approaching a crescendo or a final completion frequency. As one of skill would appreciate, synchronized audio tone signals can be used to indicate progress of other processes involving two or more devices. Further, as should be apparent, more than two devices can be configured to output synchronized audio tone signals.

FIGS. 11A-11D is a flow diagram illustrating a method for configuring an electronic device using a second device in accordance with some embodiments. Method 1100 is performed at a device (e.g., 100, 300, 500, 580). Some operations in method 1100 are, optionally, combined, the order of some operations are, optionally, changed, and some operations are, optionally, omitted.

As described below, method 1100 provides an intuitive way for configuring a first device using a second device. The method reduces the cognitive burden on a user for configuring a first device using a second device, thereby creating a more efficient human-machine interface. For battery-operated computing devices, enabling a user to configure a first device using a second device faster and more efficiently conserves power and increases the time between battery charges.

The electronic device (e.g., 1000) detects (1102) an indication that a physical proximity between the electronic device (e.g., 1000 of FIG. 10F) and a second device (e.g., 1010 of FIG. 10F) satisfies a proximity condition (e.g., device 1010 is within proximity zone 1008, as illustrated in FIG. 10F), wherein the electronic device (e.g., 1000) is connected to the second device (e.g., 1010) via a communication link (e.g., 1039). In some examples, the electronic device and second device are connected via a wireless data transmission protocol (e.g., Bluetooth, Wi-Fi, or the like). In some embodiments, the indication is detected using a near-field communication technique.

In accordance with detecting the indication, the electronic device audibly outputs (1104) an audio tone signal (e.g., 1014), wherein the audio tone signal is out-of-band to the communication link (e.g., 1039). For example, the device is a speaker that plays a tone. In some examples the tone is a proximity handshake tone at the beginning of a configuration process. In some examples the tone is played by the speaker during the configuration process (e.g., after it begins). In some embodiments, being out-of-band to a communication link means that a signal (e.g., an audio tone signal) is not communicated using the same data exchange technique.

Using a detection of physical proximity allows the user to efficiently move through a configuration process for a device with fewer required user inputs. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Subsequent to outputting the audio tone signal (e.g., 1014), the electronic device (e.g., 1000) determines (1106) whether a response audio tone signal (e.g., 1016) from the second device (e.g., 1010) has been received.

In accordance with a determination that the response audio tone signal (e.g., 1016) from the second device (e.g., 1010) has been received, the electronic device (e.g., 1000) proceeds (1108) to a next step in a configuration process. In some embodiments, a configuration process includes receiving one or more configuration settings for the electronic device. In some examples, configuration settings include one or more of: a location (e.g., room name) of the electronic device, a device identifier (e.g., a name), whether the electronic device is a member of a group of devices (e.g., a left or right channel of a stereo pair of speakers), user account credentials (e.g., allowing the electronic device to log into a cloud-based service), audio output preferences (e.g., language, volume), content restrictions (e.g., parental controls), or the like.

Proceeding to a next step in a configuration process in accordance with a determination that a response audio tone signal has been received allows the user to efficiently move through a configuration process for a device with fewer required user inputs. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the response audio tone signal from the second device has not been received, the electronic device (e.g., 1000) forgoes (1110) proceeding to the next step in the configuration process. For example, if the device does not detect a response audio tone signal (e.g., 1016) within a threshold amount of time after outputting an audio tone signal, the device can timeout (e.g., stop listening for a response audio tone signal), can repeat the tone, or dictate an audio passcode aloud.

In some embodiments, the response audio tone signal (e.g., 1016) represents (1112) an indication that the audio tone signal (e.g., 1014) was detected by the second device (e.g., 1010).

In some embodiments, at least one of the audio tone signal (e.g., 1014) and the response audio tone signal (e.g., 1016) comprises (1114) encoded data. In some embodiments, the encoded data comprises an indication of the outputting device's identity. For example, the encoded data can include an audible representation of data sent from one device to the other. Audibly outputting the data from one device such that the other device can detect it (e.g., using a microphone) can provide sufficient indication that the second device and the electronic device are within a relative close physical proximity to each other. In some embodiments, the encoded data includes user account credentials. For example, the encoded data can include data representing user account information for a cloud-based service (e.g., iCloud login information), a media streaming service (e.g., Apple Music), or data for confirming that the electronic device (e.g., 1000) should be provided access to the user's account or personal data.

In some embodiments, the response audio tone signal (e.g., 1016) comprises encoded data, and further in accordance with a determination that the response audio tone signal from the second device (e.g., 1010) has been received (1116), the electronic device (e.g., 1000) converts (1118) the encoded data, of the response audio tone signal, into decoded data. In some embodiments, the electronic device (e.g., 1000) uses (1120) at least a portion of the decoded data to log in to a user account of a cloud-based service. For example, if the encoded data includes login credentials for a cloud-based service (e.g., iCloud) the electronic device decodes the encoded data into an account user name and/or password, and logs into the cloud-based service.

In some embodiments, the response audio tone signal (e.g., 1016) comprises data that confirms the identity of the second device (e.g., 1010). For example, the data that is encoded can be data that was transmitted to the second device that is played back as a tone, or can be a unique identifier associated with the second device.

In some embodiments, the electronic device (e.g., 1000) includes a memory, and the electronic device receives (1122) one or more configuration settings from the second device (e.g., 1010). In response to receiving the one or more configuration settings, the electronic device stores (1124) the configuration settings in the memory of the electronic device. In some examples, configuration settings include one or more of the settings as described above.

In some embodiments, the one or more configuration settings includes a location identifier representing a physical location of the electronic device (e.g., 1000). For example, a location identifier can include a room identifier such as "Living Room", "Bedroom", "Bedroom 2", "Kitchen", "Tim's Room", or the like. In some embodiments, the location identifier is associated with the electronic device (e.g., 1000) and communicated to other devices (e.g., 1010). For example, the identifier can be used in a multi-device interface (e.g., 610 of FIG. 6J) or in a device management application (e.g., as shown in FIG. 6A) to provide an intuitive and/or descriptive identification of the device.

In some embodiments, the one or more configuration settings includes (1126) an indication that the electronic device (e.g., 1000) is included in a device group (e.g., a group comprised of device 1000 and 1020 of FIG. 10K), wherein the device group includes the electronic device (e.g., 1000 of FIG. 10K) and a third device (e.g., 1020 of FIG. 10K). For example, a device group includes two or more devices (e.g., smart speakers) configured to coordinate (e.g., synchronize) output of media (e.g., audio). In some embodiments, the devices in a device group (e.g., a speaker pair, such as left and right channels 1000 and 1020 of FIG. 10K, respectively) are treated as one unit. For example, the devices in a device group can be identified (e.g., at a multi-device user interface) by a single device group identifier (e.g., "Living Room") rather than as individual devices. Thus, a command to "Play audio in the Living Room" can cause all devices in the group "Living Room" to playback the audio.

In some embodiments, the first device (e.g., 1000) and the second device (e.g., 1010) are connected (1128) to a local area network via an access point (e.g., 1030). In some embodiments, the electronic device (e.g., 1000) establishes a communication link (e.g., 1032) to the third device (e.g., 1020 of FIG. 10M), wherein the communication link to the third device does not include the access point (e.g., 1030). In some embodiments, the communication link utilizes a wireless communication protocol. In some embodiments, the communication link is a wired connection between the electronic device and the third device. In some examples, the access point is a network router, a network switch, or other hardware for communicatively coupling a plurality of devices. In some embodiments, the electronic device (e.g., 1000) synchronizes (1130) media playback with the third device (e.g., 1010) using the communication link (e.g., 1032) to the third device.

In some embodiments, to audibly output the audio tone signal (1132), the electronic device (e.g., 1000) audibly outputs (1134) the audio tone signal (e.g., 1014), and determines (1136) whether the second device (e.g., 1010) detected the audio tone signal. In some embodiments, determining whether the second device detected the audio tone signal includes determining whether data is received over the communication link (e.g., 1038) representing confirmation that the second device (e.g., 1010) detected the audio tone signal (e.g., 1014). In some embodiments, the electronic device receives (e.g., detects) a response audio tone signal (e.g., 1016) from the second device (e.g., 1010) representing confirmation that the second device detected the audio tone signal (e.g., 1014). In accordance with a determination that the second device (e.g., 1010) did not detect the audio tone signal (e.g., 1014), the electronic device (e.g., 1000) repeats (1138) audibly outputting the audio tone signal (e.g., 1014). For example, the electronic device plays the tone (e.g., 1014) a second time (or an nth time). In accordance with a determination that the second device detected the audio tone signal, the electronic device forgoes (1140) repeating audibly outputting the audio tone signal.

In some embodiments, further in accordance with a determination that the second device (e.g., 1010) did not detect the audio tone signal (e.g., 1014), the electronic device (e.g., 1000) determines (1142) whether the audio tone signal has been audibly outputted a threshold number of times. In accordance with a determination that the audio tone signal has been audibly outputted a threshold number of times, the electronic device (e.g., 1000) audibly outputs (1144) a dictated passcode (e.g., 1018 of FIG. 10J). For example, the threshold number of times can be three. Thus, if the electronic device plays a tone (e.g., 1014) once and repeats the tone twice thereafter, without receiving confirmation (e.g., 1016) that the second device detected the audio tone signal, the electronic device can (e.g., on the fourth occurrence) output a dictated passcode instead of replaying the tone. In some embodiments, a passcode includes one or more alphanumeric characters. In some embodiments, audibly outputting a dictated passcode includes reading out individual characters of the passcode. For example, a text-to-speech algorithm is used to audibly output the passcode (e.g., as a phrase, as individual characters). In some embodiments, audibly outputting a dictated passcode includes reading out a phrase (e.g., formed by a plurality of alphanumeric characters). In accordance with a determination that the audio tone signal has not been audibly outputted a threshold number of times, the electronic device forgoes (1146) audibly outputting a dictated passcode. In some embodiments, the electronic device repeats outputting the audio tone signal until reaching the threshold number of times.

In some embodiments, the audio tone signal (e.g., 1014) is a first audio tone signal, and in response to progressing from a first step in the configuration process to a second step in the configuration process, the electronic device (e.g., 1000) outputs a second audio tone signal (e.g., 1042 of FIG. 10N), wherein the second audio tone signal is outputted concurrently with the output of a third audio tone signal (e.g., 1044 of FIG. 10N) outputted by the second device (e.g., 1010), and wherein the second audio tone signal and the third audio tone signal are harmonics. For example, the second audio tone signal and the third audio tone signal are the same frequency or are integer multiples of the same frequency. In some examples, concurrent output of harmonic frequencies by the electronic device and the second device can provide audible feedback to a user of progress through the configuration process. For example, higher pitched (e.g., higher frequency) tones can indicate that the configuration process is near completion. Thus, relative or absolute progress through the configuration process can be provided in an intuitive manner.

In some embodiments, in response to progressing from the second step in the configuration process to a third step in the configuration process, the electronic device (e.g., 1000) outputs a fourth audio tone signal (e.g., 1046 of FIG. 10O), wherein the fourth audio tone signal is outputted concurrently with the output of a fifth audio tone signal (e.g., 1048 of FIG. 10O) outputted by the second device (e.g., 1010), wherein the fourth audio tone signal and the fifth audio tone signal are harmonics, and wherein the fourth audio tone signal is a higher frequency tone than the second audio tone signal (e.g., as illustrated by 1040). In some examples, the concurrently played tones escalate in frequency as progression through the configuration process increases.

In some embodiments, subsequent to proceeding to the next step in the configuration process, the electronic device (e.g., 1000 or 1906) outputs an audible voice prompt by a voice assistant prompting a user to provide user voice input invoking one or more functions of the voice assistant (e.g., as shown in FIG. 19AL, where device 1906 outputs audible voice prompt "Now you try, say 'Hey, play some music.'"). The electronic device (e.g., 1000 or 1906) receives user voice input (e.g., "Hey, play some music") invoking a first function (e.g., a music function, also referred to as a music feature) of the voice assistant. In response to receiving the user voice input invoking the first function of the voice assistant, electronic device (e.g., 1000 or 1906) performs the first function (e.g., begins playing music). For example, after completion of the configuration process, device 1000 invokes a personal digital assistant that prompts the user to provide a voice command related to one or more features that device 1000 is capable of performing.

Outputting an audible voice prompt by a voice assistant prompting a user to provide user voice input invoking one or more functions of the voice assistant provides the user with information regarding the capabilities and state of a device. Providing such information to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the audible voice prompt is a prompt to provide a command for performing the first function (e.g., a music function) of the voice assistant, and the user voice input is a command to perform the first function of the voice assistant (e.g., "Hey, play some music"). For example, the prompt relates to the same function as the received command.

In some embodiments, the audible voice prompt is a prompt to provide a command for performing a second function (e.g., a weather function) of the voice assistant, and the user voice input is a command to perform the first function (e.g., a music function) of the voice assistant, different than the second function. For example, the prompt relates to a different function as the received command, but the device 1000 performs the respective action anyway. Thus, device 1000 can output the voice prompt "Now you try, say 'Hey, tell me the news,'" but perform a music function if the user responds with the voice command "Hey, play some music."

In some embodiments, in accordance with performing the first function, the electronic device (e.g., 1000 or 1906) transmits data related to the first function to the second device (e.g., device 1010 or 1900).

In some embodiments, the electronic device (e.g., 1000 or 1906) receives, from the second device, a configuration setting of a permission level that sets a permission condition that another device must meet in order to control the first device. In some embodiments, the permission condition is that the other device and the first device must be connected to the same local area network. In some embodiments, the permission condition is that the other device and the first device are within a threshold physical proximity.

In some embodiments, prior to establishing the communication link connecting the first device (e.g., 1000 or 1906) and the second device (e.g., 1010 or 1900) the electronic device (e.g., 1000 or 1906) detects an indication that a physical proximity between the first device and the second device satisfies a proximity condition. In response to detecting the indication that the physical proximity between the first device and the second device satisfies the proximity condition, the electronic device (e.g., 1000 or 1906) outputs an audio tone signal. In some embodiments, both the first and second devices (e.g., 1000 and 1010) play tones in response to satisfying the proximity condition.

Using an indication that the physical proximity between the first device and the second device satisfies the proximity condition in order to output an audio tone signal provides the user with auditory feedback regarding the state of the first device. For example, when there are other potential devices in proximity that are configurable, the audio tone signal can indicate which device will be configured. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIGS. 11A-11D) are also applicable in an analogous manner to the methods described below/above. For example, method 700, 900, 1300, 1500, 1700, 1800, 2000, 2200, 2400, 2600, 2800, 3000, 3200, 3400, 3600, 3800, and 3900 optionally includes one or more of the characteristics of the various methods described above with reference to method 1100. For brevity, these details are not repeated below.

FIGS. 12A-12AM illustrate exemplary user interfaces for controlling media playback, in accordance with some embodiments. The user interfaces in these figures are used to illustrate the processes described below, including the processes in FIGS. 13A-13F.

As described above (e.g., with respect to FIGS. 10A-10F), devices can use the satisfaction of a proximity condition to perform one or more functions. The use of proximity of one device to another device can be used as a clear indicator that a user (e.g., holding one of the devices) would like to perform some action (e.g., invoke an interface) on one or both of the devices. For example, this can prevent a waste of device resources by avoiding excessive user input (e.g., to navigate one or more menus on a device display) in order perform a function. Moreover, this can save the user time as well, for example, by reducing the number of user inputs required to perform a function (e.g., invoke an interface on a display).

In some examples, the satisfaction of a proximity condition between two devices can be used as an indication that a user (e.g., of one of the devices, a mobile device) would like to transfer media playback to or from one device (e.g., the mobile device) to the other device (e.g., a stationary smart speaker). Exemplary techniques are described below.

FIGS. 12A-12F illustrate an exemplary scenario in which a first device and a second device are not playing back media content when they are placed in close proximity.

FIG. 12A illustrates an exemplary scenario in which a user is holding device 1200 (e.g., a personal device, such as device 100, 300, 500) in close proximity to device 1202 (e.g., a smart speaker, such as device 580). In some embodiments, device 1200 includes one or more features of devices 100, 300, or 500. Thus, FIG. 12A is similar to FIG. 10E, the description of which is hereby incorporated by reference. In the example depicted in FIG. 12A, device 1200 and device 1202 are both not currently outputting audio (e.g., are not playing back media). In the example depicted in FIG. 12A, the physical distance between device 1200 and device 1202 satisfies a proximity condition. In some examples, device 1200 detects an indication that the proximity condition is satisfied (e.g., and, in response, initiates communication with device 1202, for example, to send an indication that the condition is satisfied). In some examples, device 1202 detects an indication that the proximity condition is satisfied (e.g., and, in response, initiates communication with device 1200, for example, to send an indication that the condition is satisfied).

It is noted that FIG. 12A, and the figures that follow, are not necessarily to scale and are included merely as a visual aid. Thus, unless otherwise noted, they are not intended as a limitation on a distance required to be in close proximity or to satisfy a proximity condition.

Figure 12B:
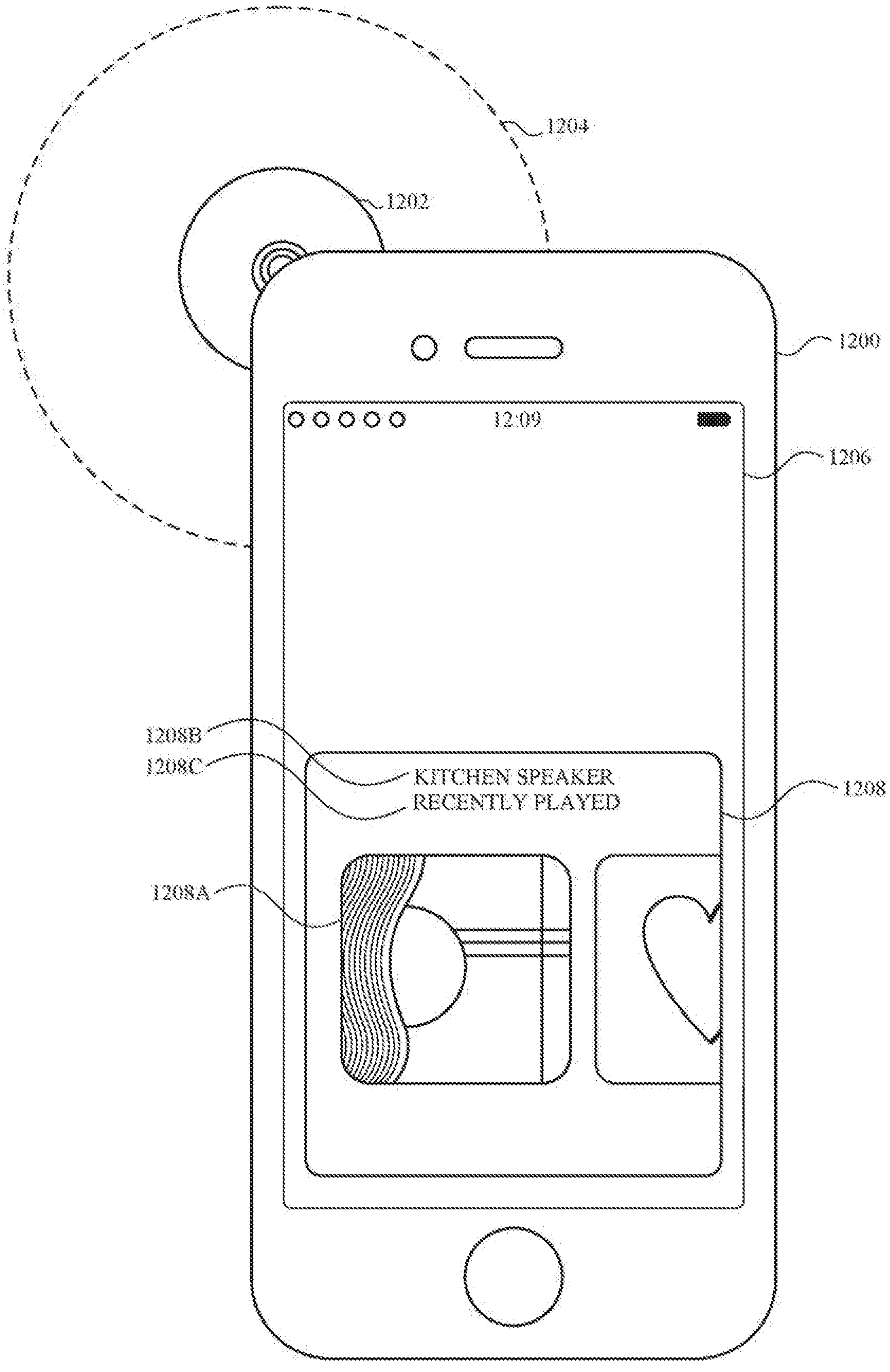

FIG. 12B illustrates an exemplary media information interface. FIG. 12B, also depicts an overhead view of the scenario of FIG. 12A. As can be seen, device 1200 is within (e.g., at least a portion of the device inside of) the proximity zone 1204 (also referred to as proximity condition range indicator 1204). Device 1200 is inside of proximity condition range indicator 1204, and thus the proximity condition is satisfied. The phrase "close proximity" or "in close proximity", as used herein, refers to a scenario in which a physical distance between two devices satisfies a proximity condition (e.g., as shown in FIG. 12B and FIG. 10F). Proximity condition range indicator 1204 is included as a visual aid, and is intended to represent a physical proximity that would satisfy a proximity condition. For example, range indicator 1204 can represent the range of a near-field communication detection circuitry of device 1202. Thus, presence of a detectable device within (e.g., partially or completely) the proximity condition range indicator 1204 would satisfy a proximity condition, but would not if the detectable device is located outside of the range indicator 1204. One of skill would appreciate that a detection range of physical proximity can be non-uniform, can be affected by numerous variables (e.g., wireless interference, air humidity, device orientation, among others), and can include points in space in three dimensions, all of which are intended to be within the scope of this disclosure. Thus, the proximity condition range indicator 1204 is not intended as a limitation on the scope of determining whether a proximity condition is satisfied.

FIG. 12B illustrates media information interface 1208 displayed on a display 1206 of device 1200. In some embodiments, device 1200 includes one or more features of device 100, 300, or 500. In some examples, media information interface 1208 is displayed in response to device 1200 being placed (e.g., briefly or continuously) in close proximity with device 1202. Thus, because media information interface 1208 displayed in response to the device being placed in close proximity, it can referred to as a type of "proximity card" or specifically a "media proximity card".

In the example shown in FIG. 12B, device 1202 is a device associated with the location (or name) "Kitchen" and is a speaker (e.g., a smart speaker). Thus, proximity card 1208 includes the title 1208B "Kitchen Speaker", visually indicating the name of the speaker that the user placed device 1200 in close proximity to. Proximity card 1208 also includes an album affordance 1208A representing media content, as well as an identifier 1208C describing the status of the media content. In this example, the media content displayed in proximity card 1208 is content that was recently played on the second device, device 1202 (e.g., Kitchen Speaker). Thus, in this example, when neither device 1200 or device 1202 are currently playing back media content, placing the devices in close proximity causes device 1200 to display an interface for viewing recently played media. In some examples, the recently played media was recently played by the first device (e.g., device 1200). In some examples, the recently played media is media that was recently played on both devices 1200 and 1202. In some embodiments, proximity card 1208 is displayed when one or more of devices 1200 and 1202 are currently playing back media.

Figure 12C:
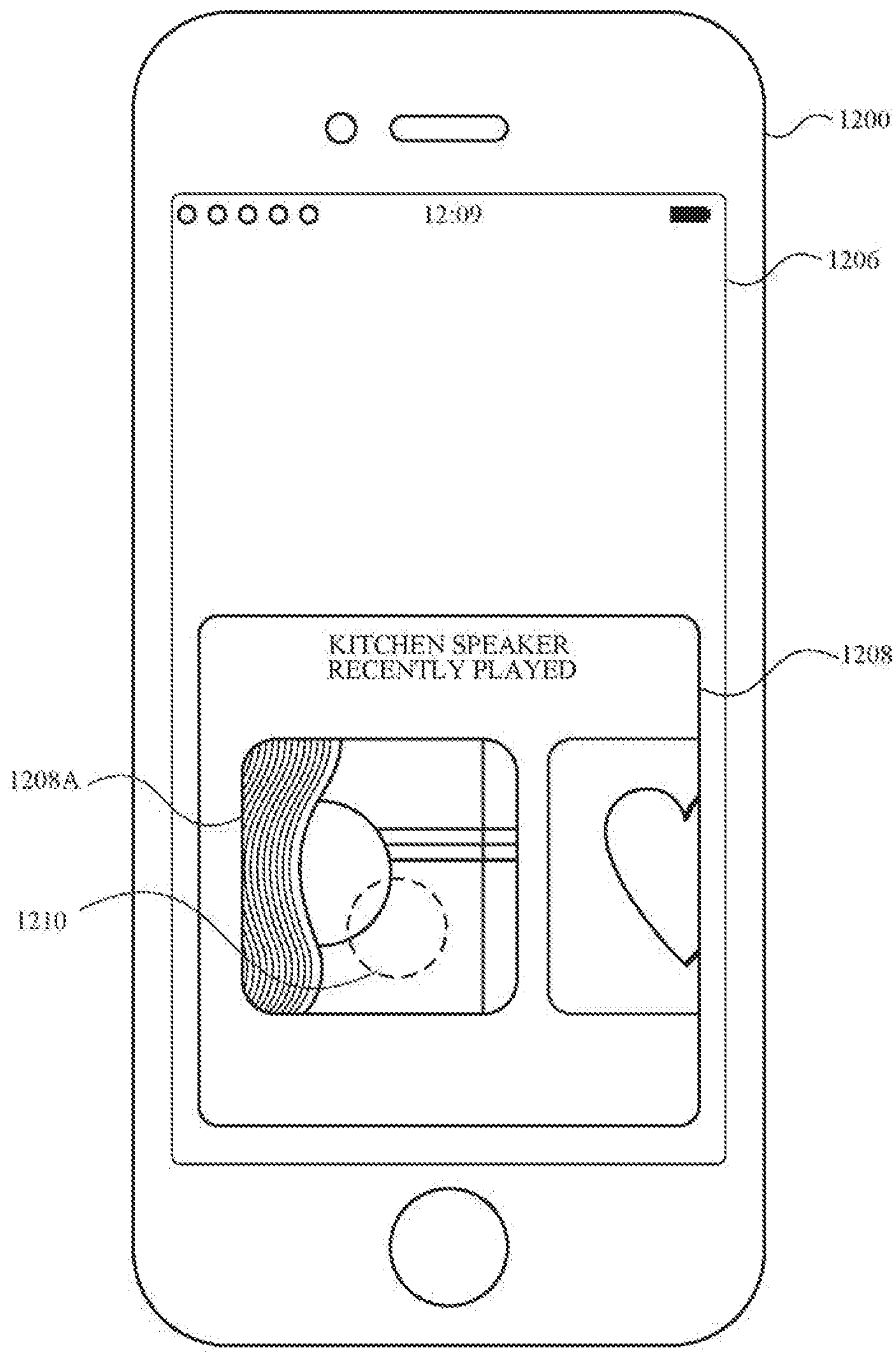

At FIG. 12C, device 1200 receives user input 1210 on album affordance 1208A. In some examples, user input 1210 is a tap, touch, deep press, or a press and hold input received at device 1200. In some examples, a first device (e.g., device 1200) continues displaying a proximity card after the first device is no longer in close proximity to a second device (e.g., device 1202).

Figure 12D:
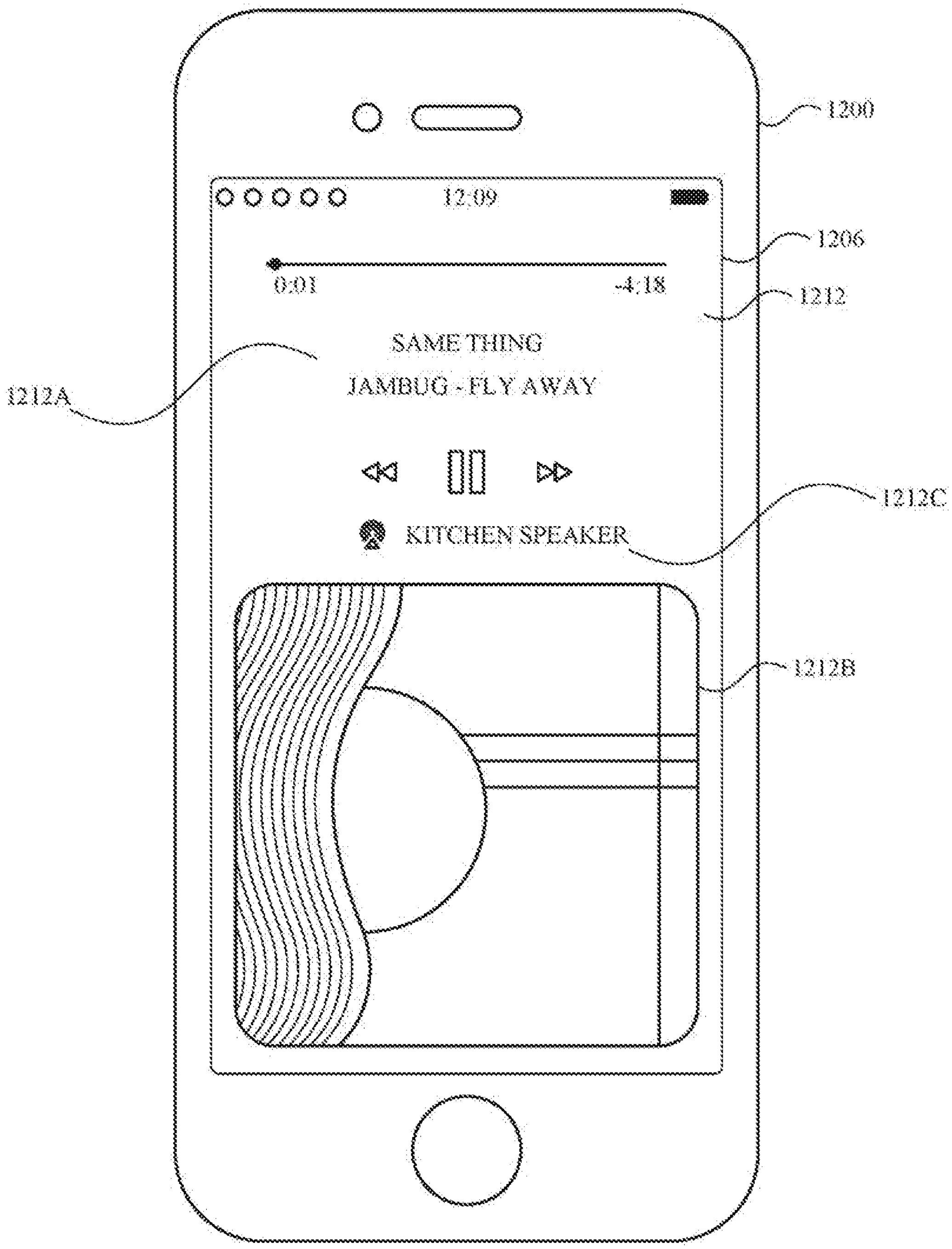

At FIG. 12D, in response to receiving user input 1210, device 1200 displays current media interface 1212. Current media interface 1212 (also referred to as "now playing screen" 1212) depicts one or more media items that are currently playing back (e.g., on the device 1202). Interface 1212 includes an identifier 1212A of a media item (e.g., the song titled "Same Thing" by artist "Jambug" from the album "Fly Away"), album art 1212B, and device selection affordance 1212C. As described above, a device selection affordance can indicate the current focus of the device. In this example, FIG. 12D depicts that the current media interface 1212 is targeting the Kitchen Speaker. Thus, in response to the user input selection of the affordance 1208A (e.g., representing a media item), device 1200 transmits an instruction to device 1202 to initiate playback of the corresponding media item, and updates the display of device 1200 to include playback controls and a media status of the device 1202. Accordingly, the user is provided a convenient technique for quickly beginning and controlling media playback on a second device (e.g., Kitchen Speaker) using a first device (e.g., person device 1200).

In some examples, current media interface is displayed on lock screen of device 1200. For example, the proximity card 1208 can be displayed while the device 1200 was locked and, while remaining locked, the device receives user input that causes the device to initiate playback of media and update the lock screen (e.g., to display interface 1212).

Figure 12E:
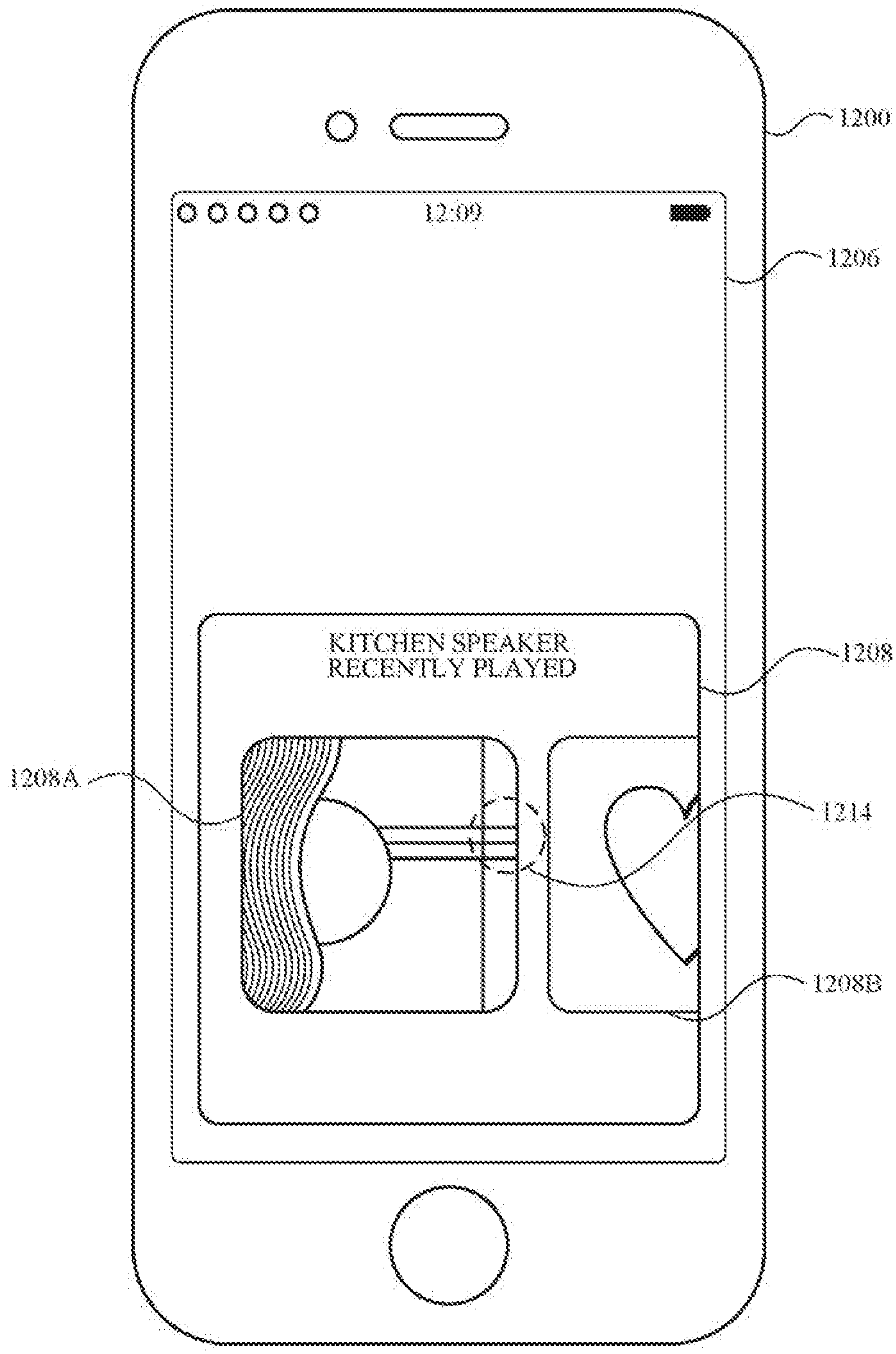
Figure 12F:
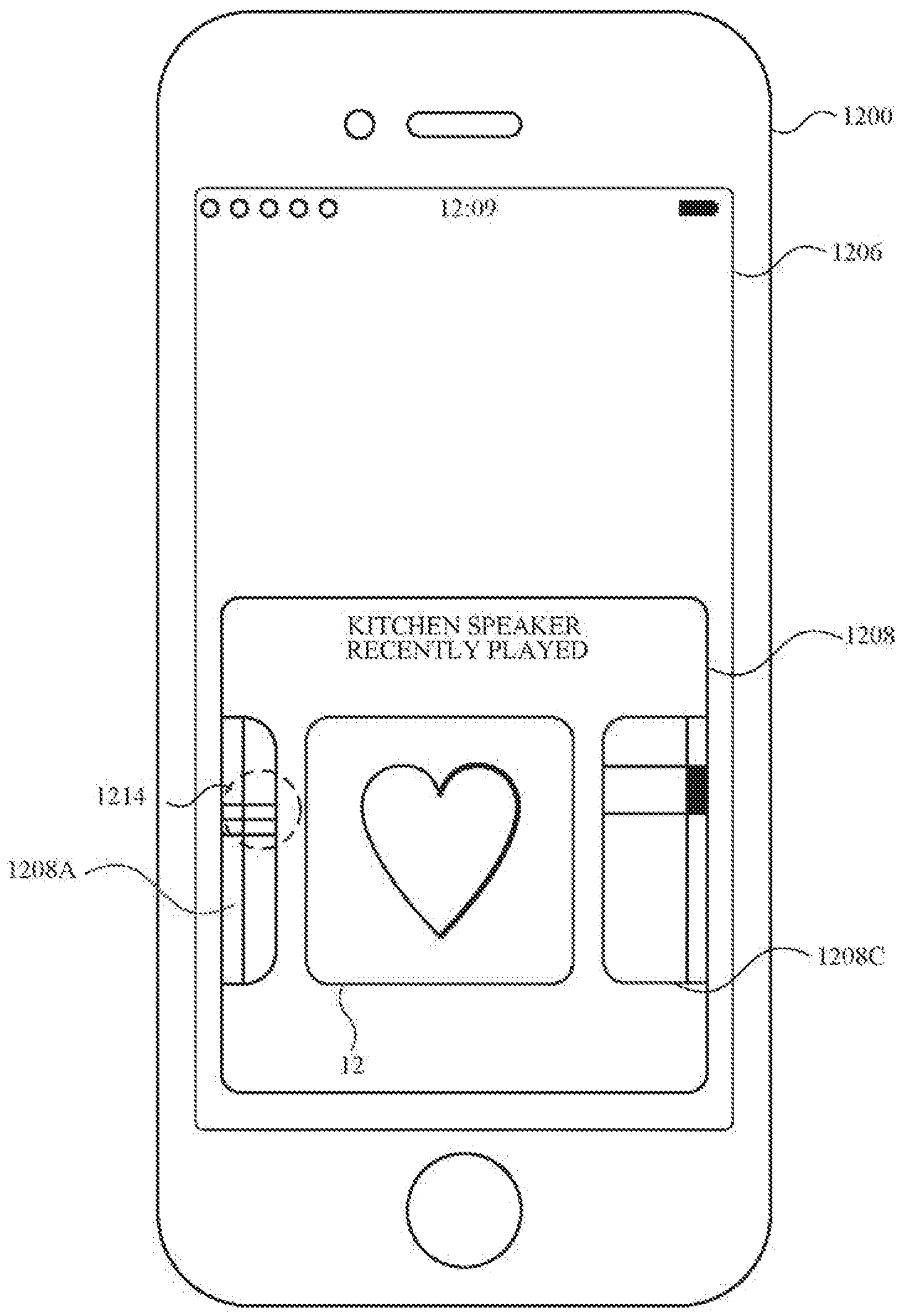

FIGS. 12E-12F illustrate exemplary techniques for browsing media within a media information interface, in accordance with some embodiments. At FIG. 12E, device 1200 receives user input 1214 on affordance 1208A, wherein affordance 1208B is visible. FIG. 12F shows user input 1214 shift to the left. In this example, user input 1214 was a leftward swipe on the recently played media affordances of proximity card 1208. In some embodiments, user input 1214 is a directional swipe in any direction (e.g., up, down, left, right, etc.). As shown in FIG. 12F, the affordances representing media items have shifted in accordance with the user input 1214. Affordance 1208B is now centered within proximity card, and affordance 1208C (e.g., representing a third media) is now visible.

FIGS. 12G-12N illustrate an exemplary scenario in which a first device and a second device are both playing back media content when they are placed in close proximity.

Figure 12G:
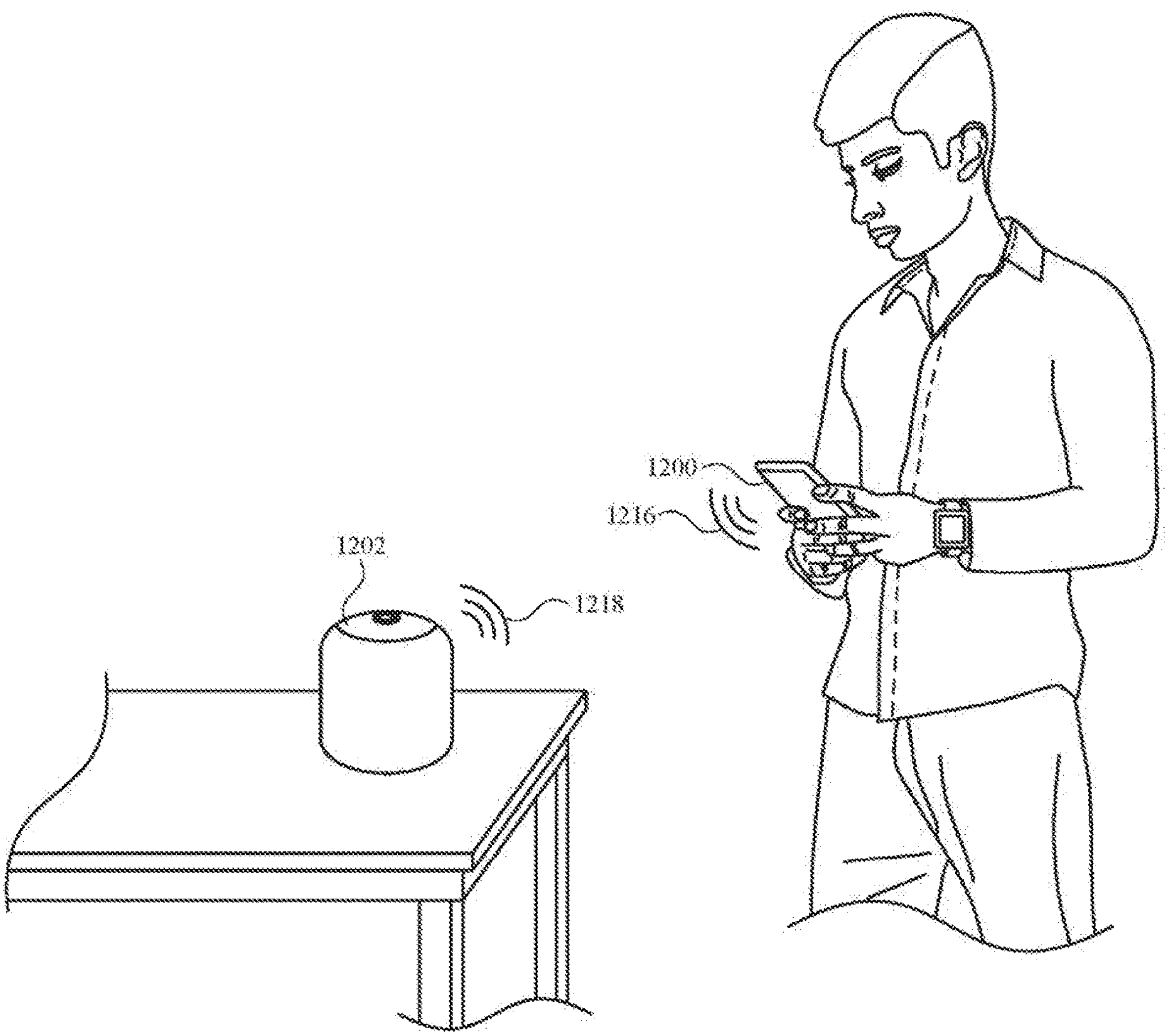

FIG. 12G illustrates an exemplary scenario in which a user is holding device 1200 (e.g., a personal device) in close proximity to device 1202 (e.g., a smart speaker). Thus, FIG. 12G is similar to FIG. 12A, the description of which is hereby incorporated by reference. In the example depicted in FIG. 12G, device 1200 and device 1202 are both currently outputting audio, as represented by sound waves 1216 (from device 1200) and sound waves 1218 (from device 1202).

Figure 12H:
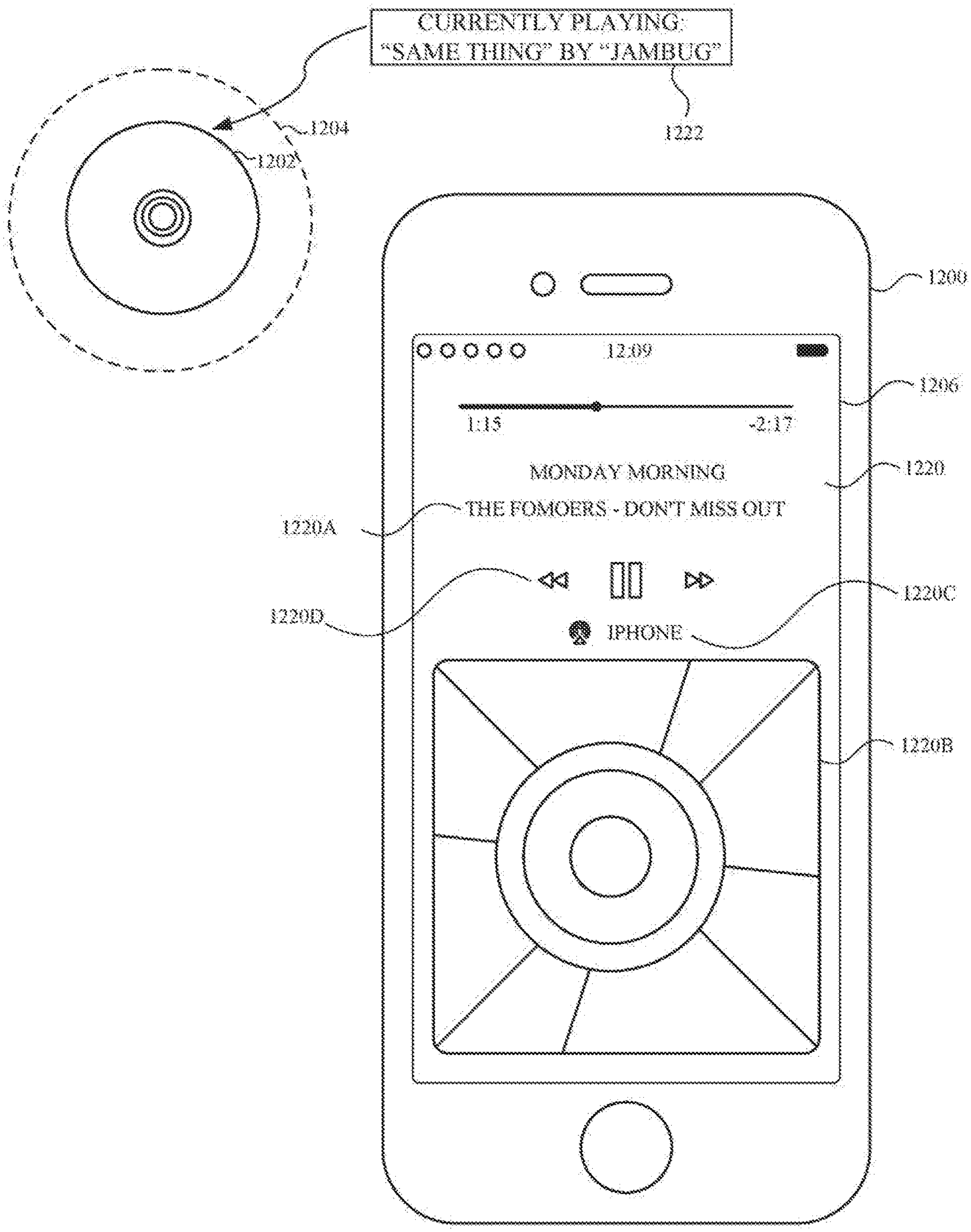

FIG. 12H illustrates the states of devices 1200 and 1202 prior to them being placed in close proximity. As can be seen, device 1200 is currently playing back a first media item, as presented by current media interface 1220. Media indicator 1220A identifies the song titled "Monday Morning" currently playing on device 1200, album art 1220B, device selection affordance 1220C (indicating that device 1200 is targeted on itself, the device named "iPhone"), and playback control affordances 1220D. Device 1202 is currently playing back a media item as well, the song titled "Same Thing" by artist "Jambug", as represented by media state 1222.

Figure 12I:
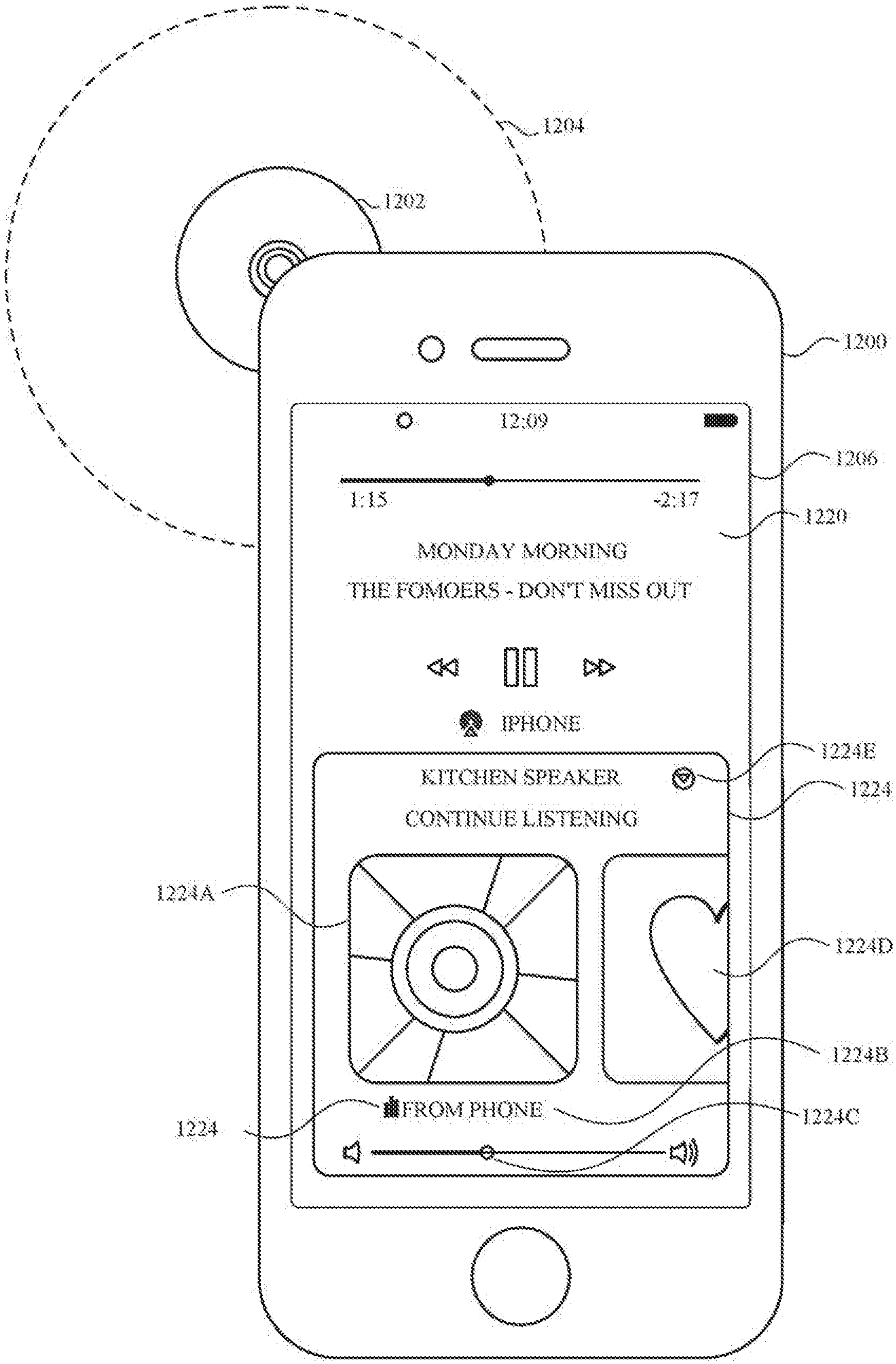

FIG. 12I illustrates an exemplary media information interface. FIG. 12I, also depicts an overhead view of the scenario of FIG. 12G. As can be seen, device 1200 is within (e.g., at least a portion of the device is inside) the proximity zone 1204 (also referred to as proximity condition range indicator 1204). Device 1200 is inside of proximity condition range indicator 1204, and thus is in close proximity (e.g., the proximity condition is satisfied).

FIG. 12I illustrates media information interface 1224 displayed on a display 1206 of device 1200. In some examples, media information interface 1224 is displayed in response to device 1200 being placed (e.g., briefly or continuously) in close proximity with device 1202. Thus, because media information interface 1224 displayed in response to the device being placed in close proximity, it is also referred to as a "proximity card" or specifically a "media proximity card".

In the example shown in FIG. 12I, device 1202 is a device associated with the location (or name) "Kitchen" and is a speaker (e.g., a smart speaker). Thus, proximity card 1224 includes the title 1224B "Kitchen Speaker", visually indicating the name of the speaker that the user placed device 1200 in close proximity to. Proximity card 1224 also includes album affordances 1224A and 1224D representing media content (e.g., media items). Proximity card 1224 also includes a volume control affordance 1224C for controlling the volume of the Kitchen Speaker. In this example, the media content displayed in proximity card 1224 is content that is currently playing on the device 1200 (e.g., affordance 1224A), and other media items (e.g., affordance 1224D), for example, media that was recently played on the first device 1200. Proximity card 1224 includes identifier 1224B below affordance 1224A, which indicates which device (e.g., if any) is currently playing back the media item corresponding to affordance 1224A. In this example, identifier 1224B includes a graphic (e.g., which can be animated to convey that music is currently playing) and the text "From iPhone", which refers to device 1200 in this example. Proximity card 1224 provides an interface that allows the user to add the device "Kitchen Speaker" into the current playback session (e.g., of "Monday Morning" on device 1200).

As shown in FIG. 12I, proximity card 1224 also includes device selection affordance 1224E. In some examples, device selection affordance 1224E can be used to change the focus of the proximity card. For example, if the user desired to add the iPhone (e.g., device 1200) to the media session of the Kitchen Speaker (e.g., playback of the song "Same Thing" as shown in FIG. 12H), they can select affordance 1224E and change the targeted device (e.g., of proximity card 1224) to iPhone, and then select the indicator associated with the media item "Same Thing". For example, after receiving user input on 1224E and selection of the device "iPhone" (e.g., via a drop down menu, or the like), device 1200 updates the display of affordance 1224A to show the album art of the song "Same Thing", and updates identifier 1224B to include the text "From Kitchen Speaker".

In some embodiments, a proximity card is displayed concurrently with a current media interface. In some embodiments, display of a proximity card replaces display of a portion of a current media interface. For example, FIG. 12I shows proximity card 1224 having replaced the album art 1220B of current media interface 1220 (of FIG. 12H). In some embodiments, a proximity card is not displayed concurrently with a current media interface. For example proximity card 1208 of FIG. 12E is not currently displayed with a current media interface (e.g., 1220 of FIG. 12H).

Figure 12J:
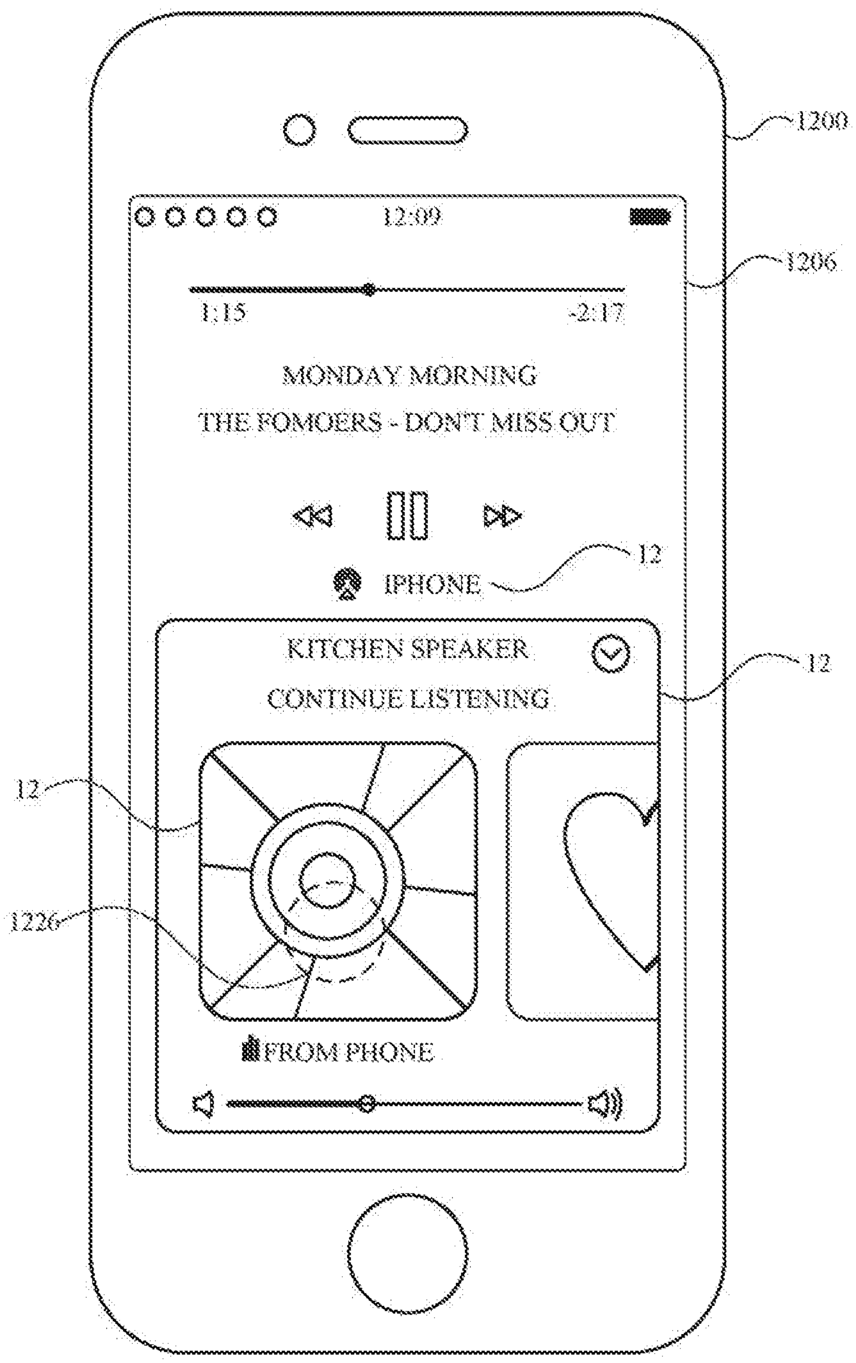
Figure 12K:
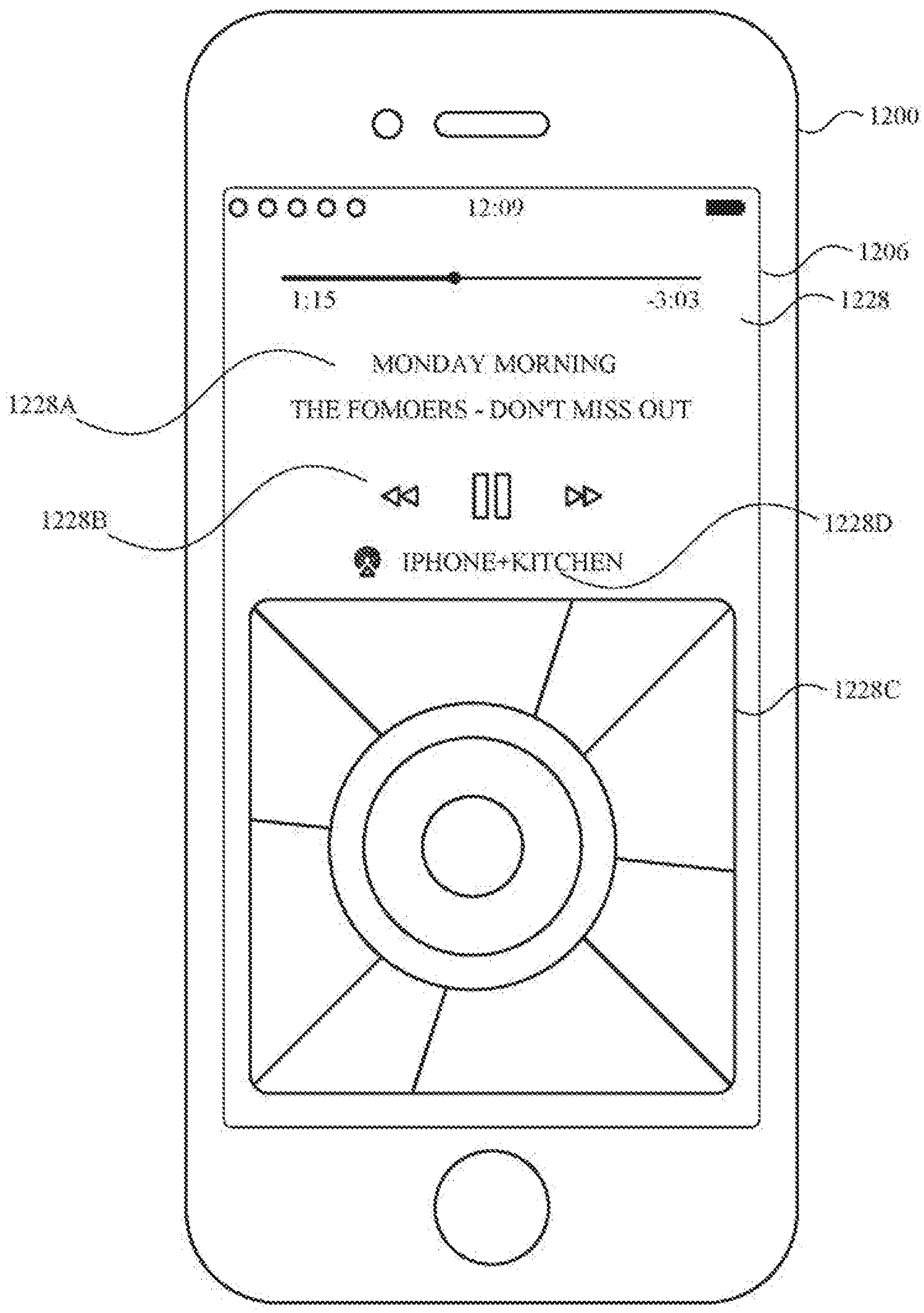

At FIG. 12J, device 1200 receives user input 1226 representing selection of affordance 1224A. In response to user input 1226, device 1200 displays current media interface 1228, as shown in FIG. 12K. Current media interface 1228 represents an updated version of interface 12H. As can been, device selection indicator 1228D has been updated to indicate that the Kitchen Speaker has been added to the media session for the song "Same Thing"—the accompanying text now states "iPhone+Kitchen". Media indicator 1228A identifies the song titled "Monday Morning" currently playing on device 1200 and device 1202, playback control affordances 1228B, album art 1228C, device selection affordance 1228D (indicating that device 1200 is targeted on itself, the device named "iPhone", and also targeted on the Kitchen device set).

Figure 12L:
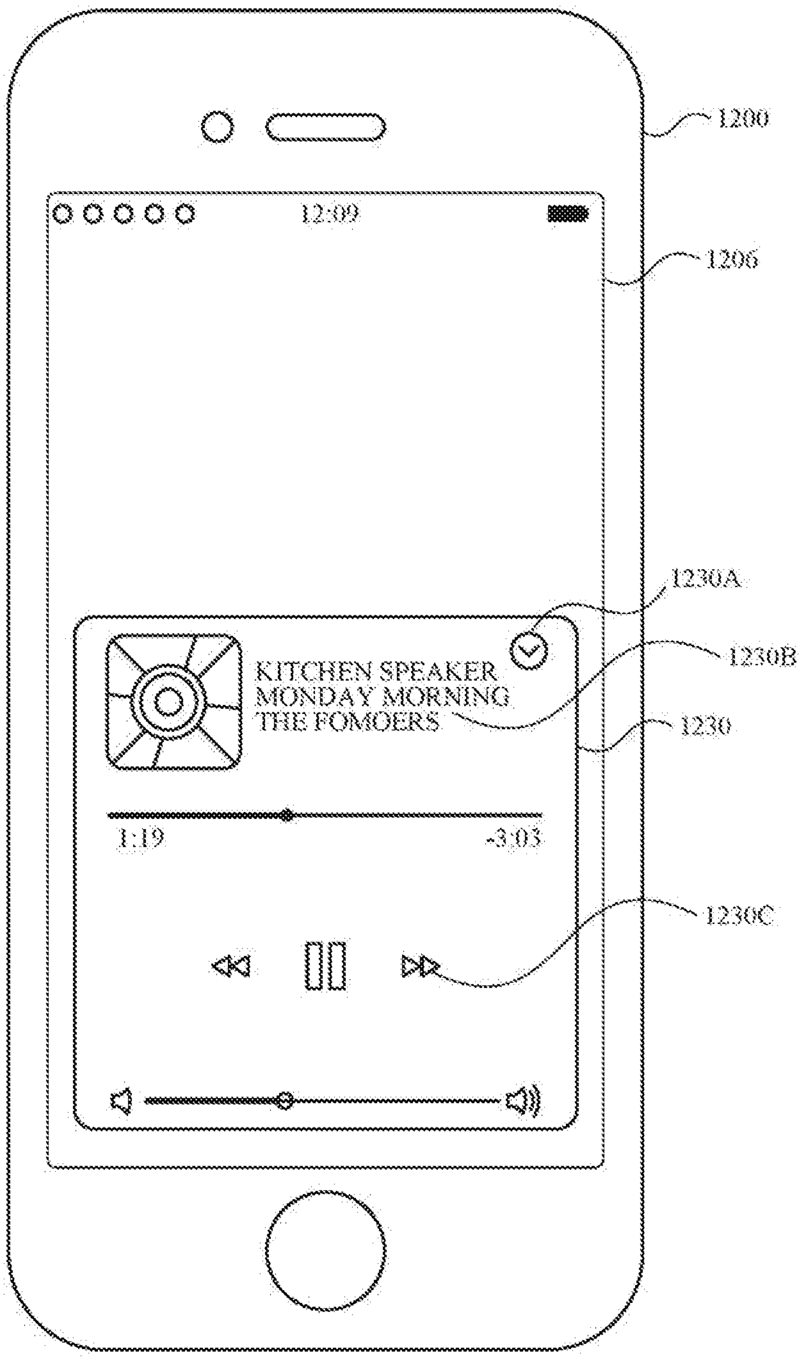
Figure 12M:
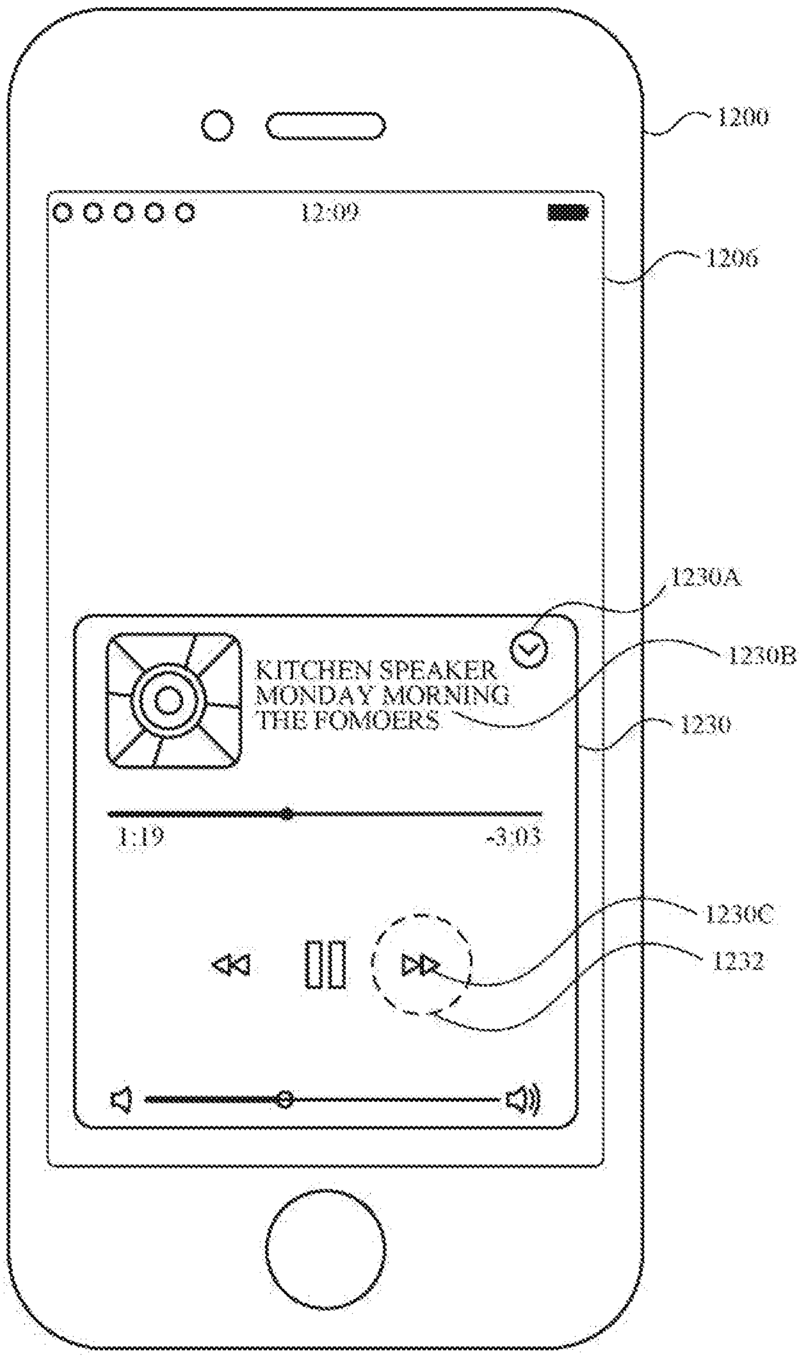
Figure 12N:
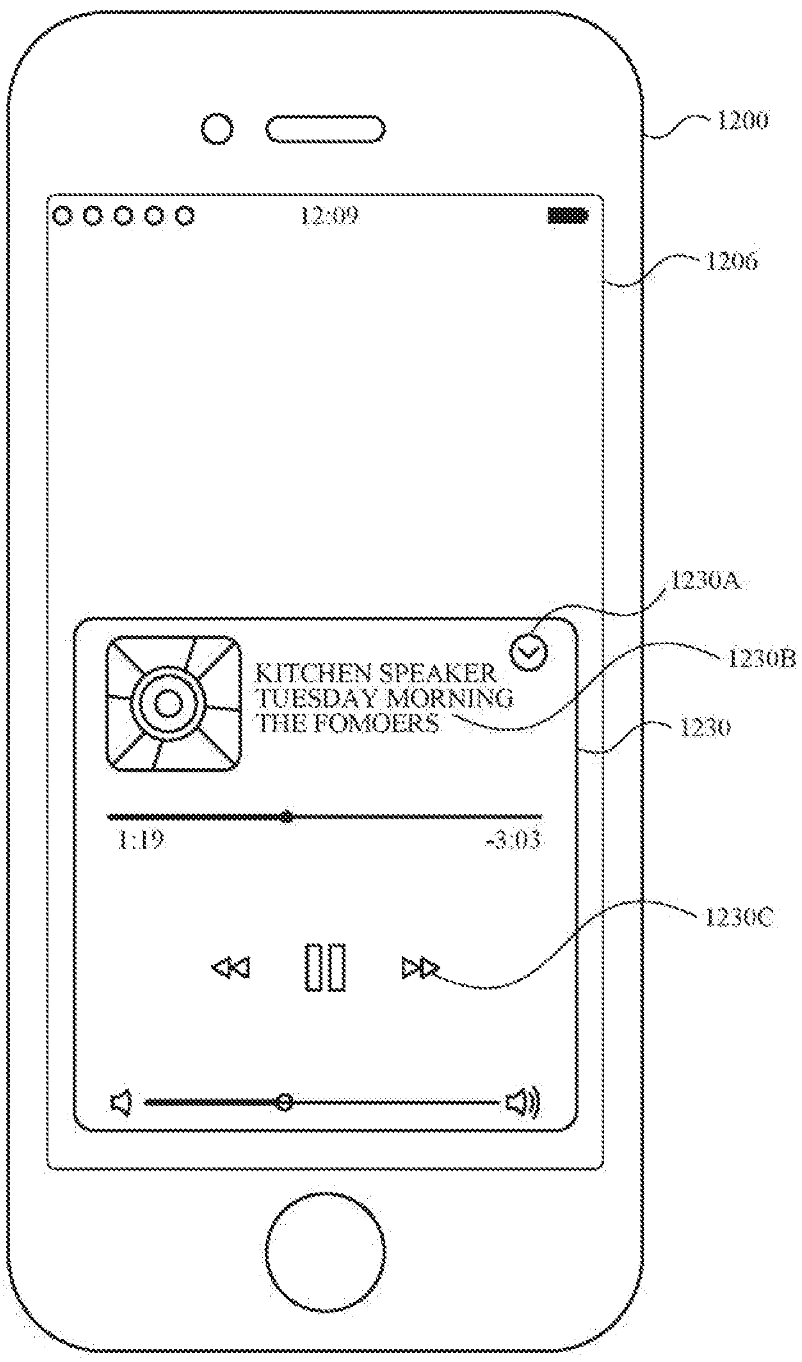

FIGS. 12L-12N illustrate exemplary interfaces for controlling media playback on a second device. In some examples, affordance 1224E of FIG. 12I can be used to change the function of the proximity card. For instance, a user may desire to control playback of the existing media session that includes the second device (e.g., device 1202) rather than to add the second device to a media session of the first device (e.g., device 1200). For example, referring back to FIG. 12H, the user may want to maintain the two separate media sessions that are currently playing back on the two devices, but wants to control playback on the second device 1202. In some examples, the device receives selection of affordance 1224E of FIG. 12I and, in accordance with the selection (e.g., with our without additional user input), subsequently changes the displayed proximity card into a current media interface proximity card 1230, as shown in FIG. 12L. In this example, proximity card 1230 of FIG. 12L replaces display of proximity card 1224 of FIG. 12I. Proximity card 1230 is a type of current media interface, but is presented visually as a proximity card (e.g., with a displayed border, and occupying less than all of the display 1206), to visually indicate that it represents a current media interface for a device that was placed in close proximity to device 1200. In some embodiments, in accordance with a selection of 1224E, device 1200 displays a current media interface such as that shown in FIG. 12H (e.g., full size).

Proximity card 1230 includes an identifier 1230A that indicates the current focus of the proximity card (e.g., Kitchen Speaker), a media identifier 1230B identifying a media item currently being played back by the targeted device (e.g., the song "Same Thing" by "Jambug"), and playback control affordances 1230C for controlling playback of the current media session.

At FIG. 12M, device 1200 receives user input 1232 associated with a playback control affordance 1230C. In this example, the user input is a selection "next track" affordance. User input 1232 can be a tap, a touch, a deep press, a tap and hold input, or the like.

At FIG. 12N, in response to user input 1232, device 1200 updates the display of media identifier 1230B to identify the next track (e.g., the song "Tuesday Morning" by "The Fomoers").

FIGS. 12O-12W illustrate an exemplary scenario in which only a first device is playing back media content when placed in close proximity with to a second device.

Figure 12O:
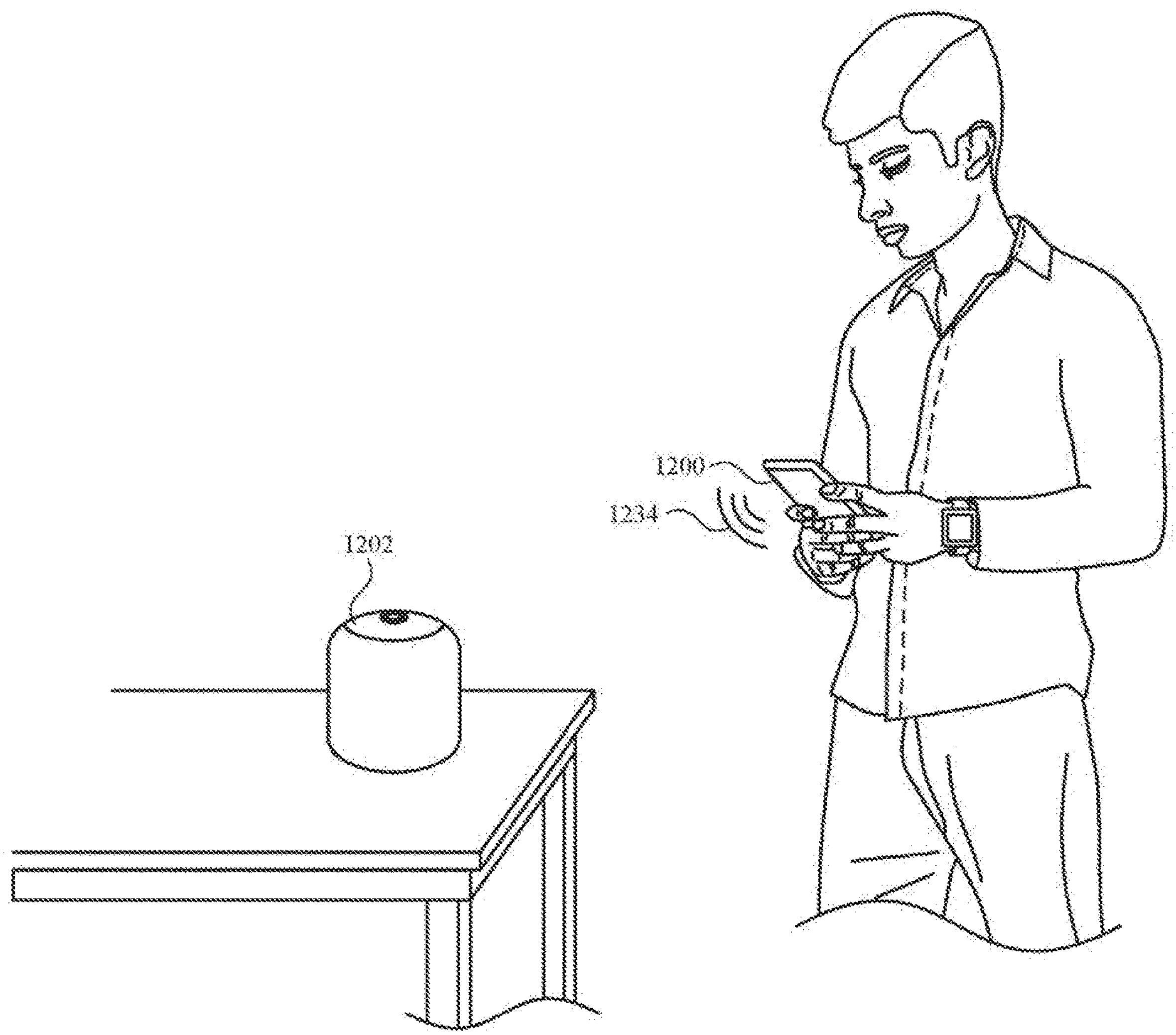

FIG. 12O illustrates an exemplary scenario in which a user is holding device 1200 (e.g., a personal device) in close proximity to device 1202 (e.g., a smart speaker). Thus, FIG. 12O is similar to FIG. 12A, the description of which is hereby incorporated by reference. In the example depicted in FIG. 12O, device 1200 is currently outputting audio, as represented by sound waves 1234 (from device 1200), and device 1202 is not currently outputting audio (e.g., no media playback).

Figure 12P:
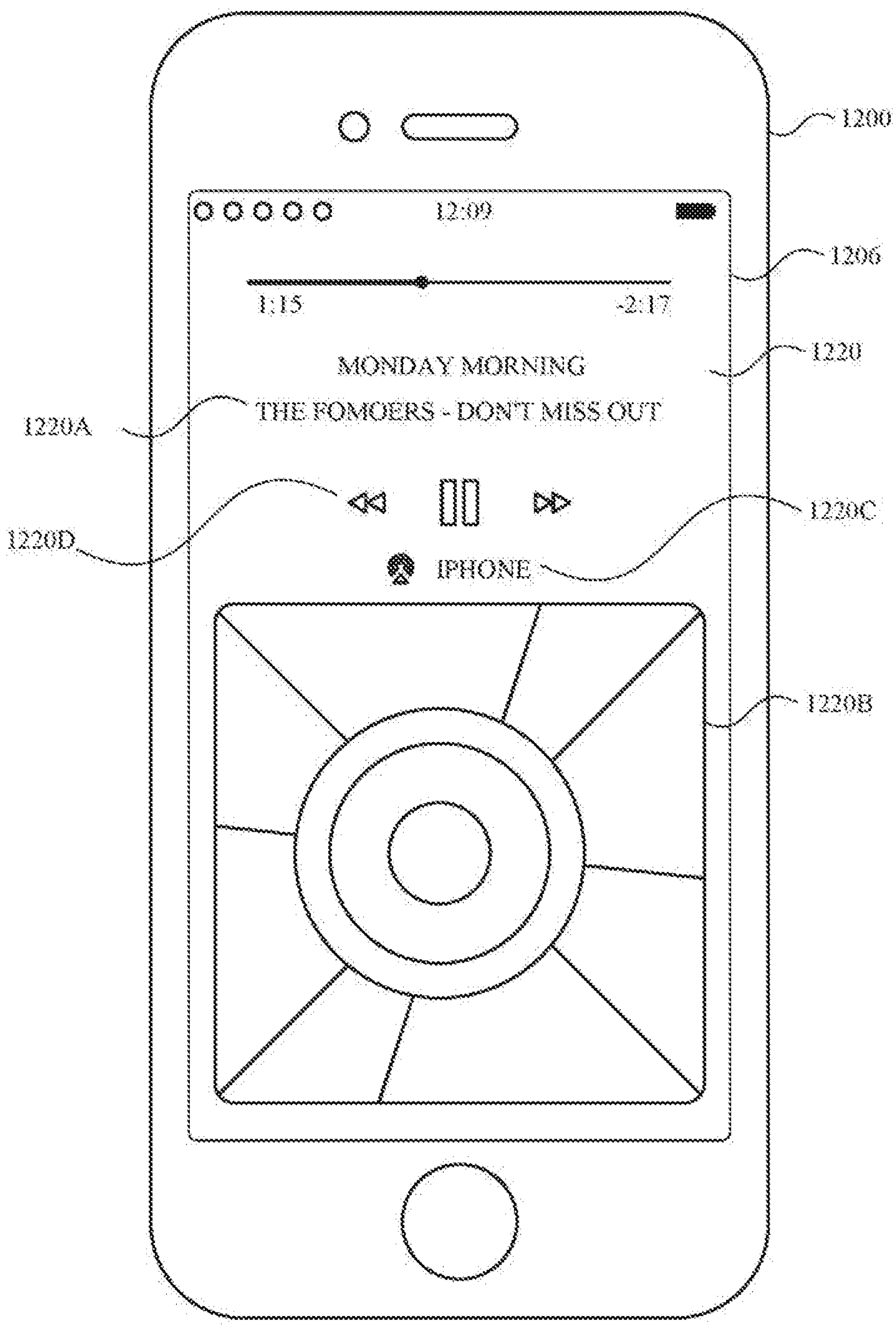

FIG. 12P illustrates the state of device 1200 immediately prior to being placed in close proximity with device 1202. As can be seen, device 1200 is currently playing back a first media item, as indicated by current media interface 1220 (e.g., described above with respect to FIG. 12H). Media indicator 1220A identifies the song titled "Monday Morning" currently playing on device 1200.

Figure 12Q:
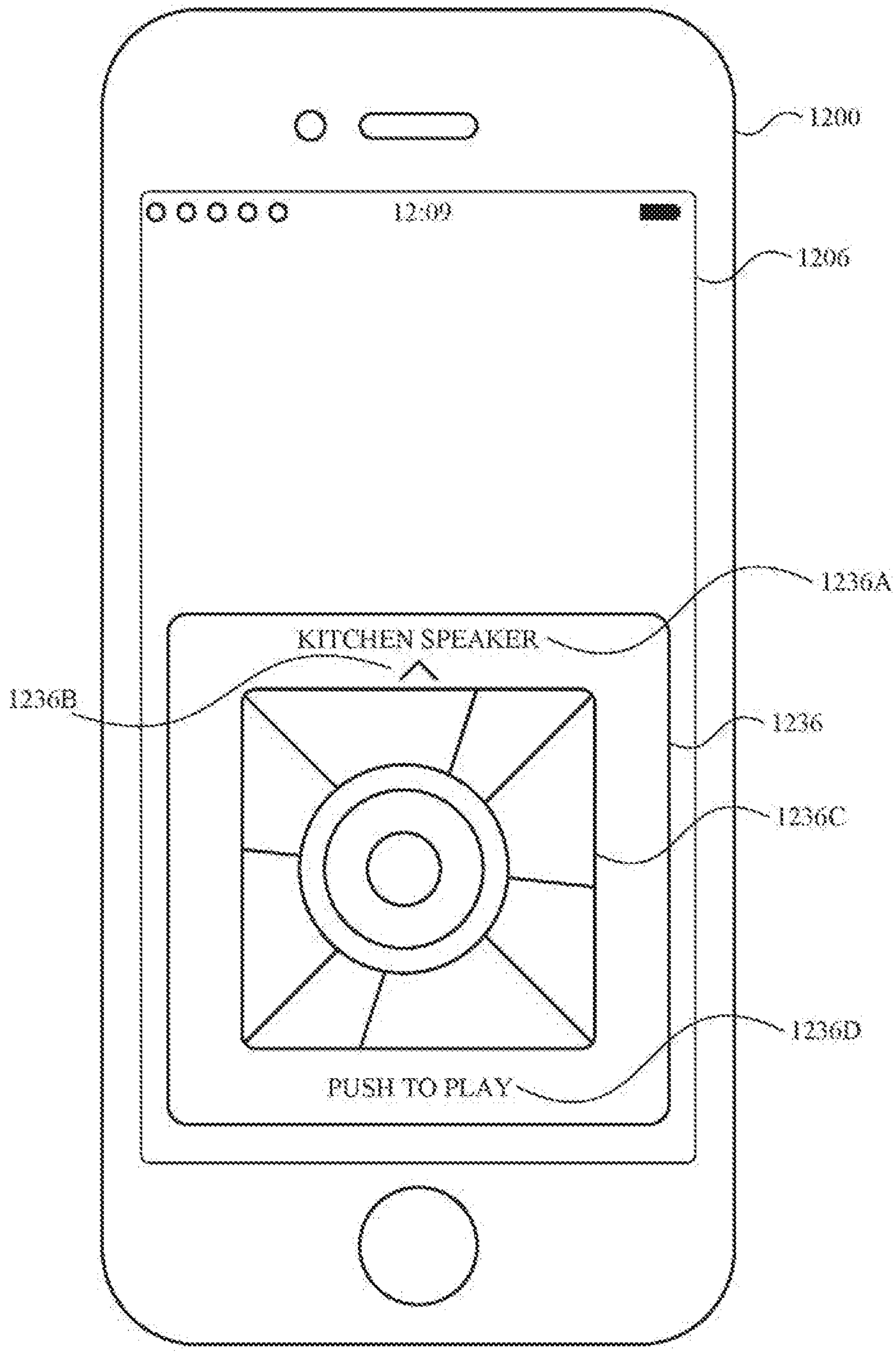

FIG. 12Q illustrates an exemplary media information interface. FIG. 12Q illustrates media information interface 1236 displayed on a display 1206 of device 1200. In some examples, device 1200 displays media information interface 1236 in accordance with detecting that device 1200 is in close proximity to device 1202. For example, media information interface 1236 is displayed in response to detecting that device 1200 is within (e.g., at least a portion of the device) the proximity zone 1204 (also referred to as proximity condition range indicator 1204) of device 1202. Thus, the proximity condition is satisfied.

In some examples, media information interface 1236 is displayed in response to device 1200 being placed (e.g., briefly or continuously) in close proximity with device 1202. Thus, because media information interface 1236 displayed in response to the device being placed in close proximity, it is also referred to as a "proximity card" or specifically a "media proximity card".

In the example shown in FIG. 12Q, device 1202 is a device associated with the location (or name) "Kitchen" and is a speaker (e.g., a smart speaker). Thus, proximity card 1236 includes the title 1236A "Kitchen Speaker", visually indicating the name of the device that the user placed device 1200 in close proximity to (e.g., also referred to as the "focus" or "target" of the proximity card). Proximity card 1236 also includes an action indicator 1236B (e.g., an arrow), indicating that a user input gesture on the proximity card (e.g., in the direction of the arrow) will cause the device to perform an action. Likewise, action indicator 1236D (the text "Push to Play") indicates to a user that a user input on the proximity card 1236 will cause the device to take action. Additionally, proximity card 1236 includes a media affordance 1236C representing media content (e.g., one or more media items). In this example, media affordance 1236C includes album art for the track titled "Monday Morning" by the artist "The Fomoers" (e.g., as shown in FIG. 12P). In some examples, media affordance 1236C includes other types of visual indications of one or more media items (e.g., text, images, or other appropriate visual representations). In this example, the media content represented (e.g., by affordance 1236C) by the proximity card 1236 is content that is currently playing on the device 1202 (e.g., the Kitchen Speaker). Proximity card 1236 provides an interface that allows the user to add the device "Kitchen Speaker" to the current media session (e.g., of playback of "Monday Morning" on device 1200).

Figure 12R:
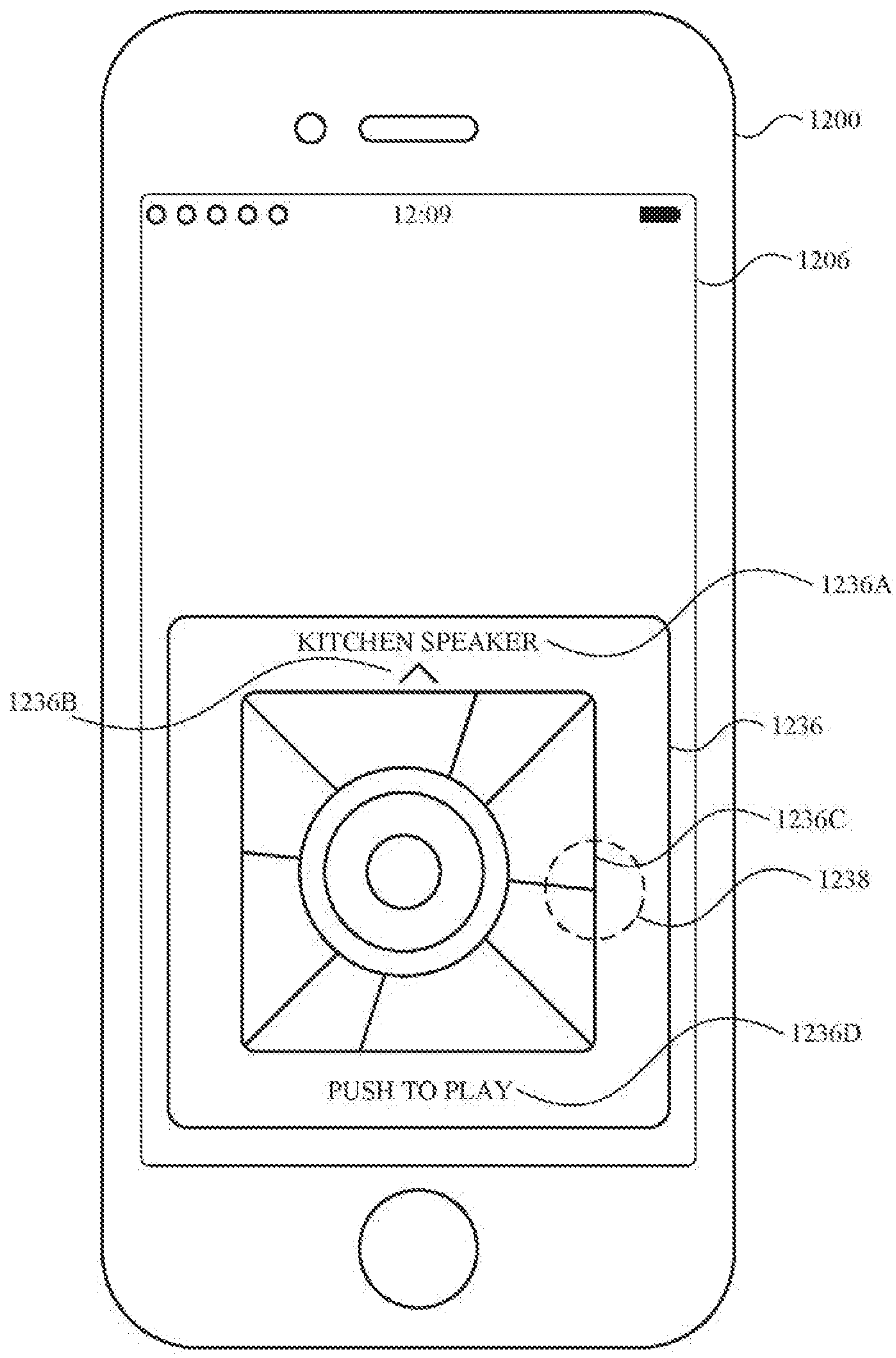
Figure 12S:
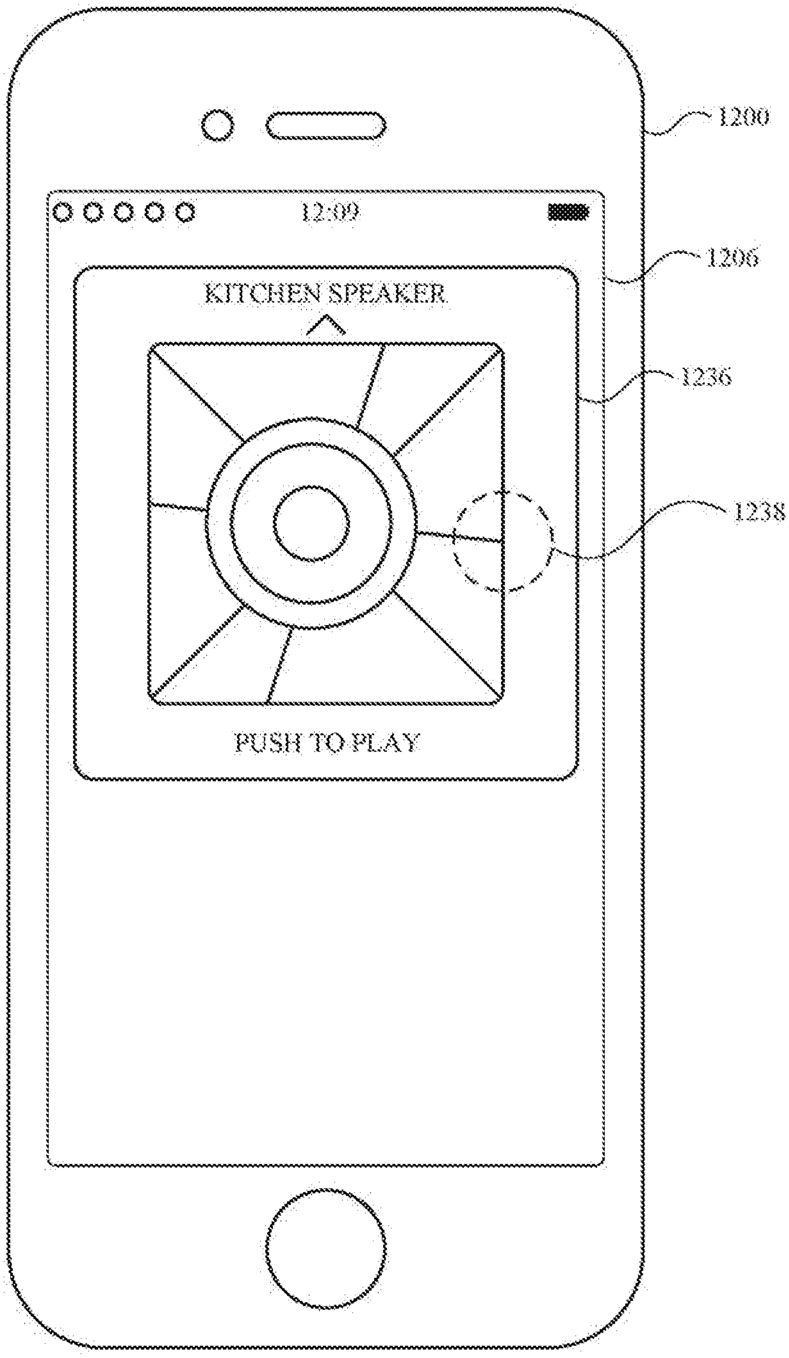

FIGS. 12R-12U illustrate and exemplary push interaction with a media control interface. At FIG. 12R, device 1200 receives user input 1238 on proximity card 1236. At FIG. 12S, user input 1238 has moved across the display (e.g., in the direction of action indicator 1236B). In this example, user input 1238 is a directional swipe gesture. FIG. 12R also illustrates proximity card 1236 has shifted position on the display 1206 in accordance with the directional swipe gesture user input 1238, which will be referred to as the "push position".

Figure 12T:
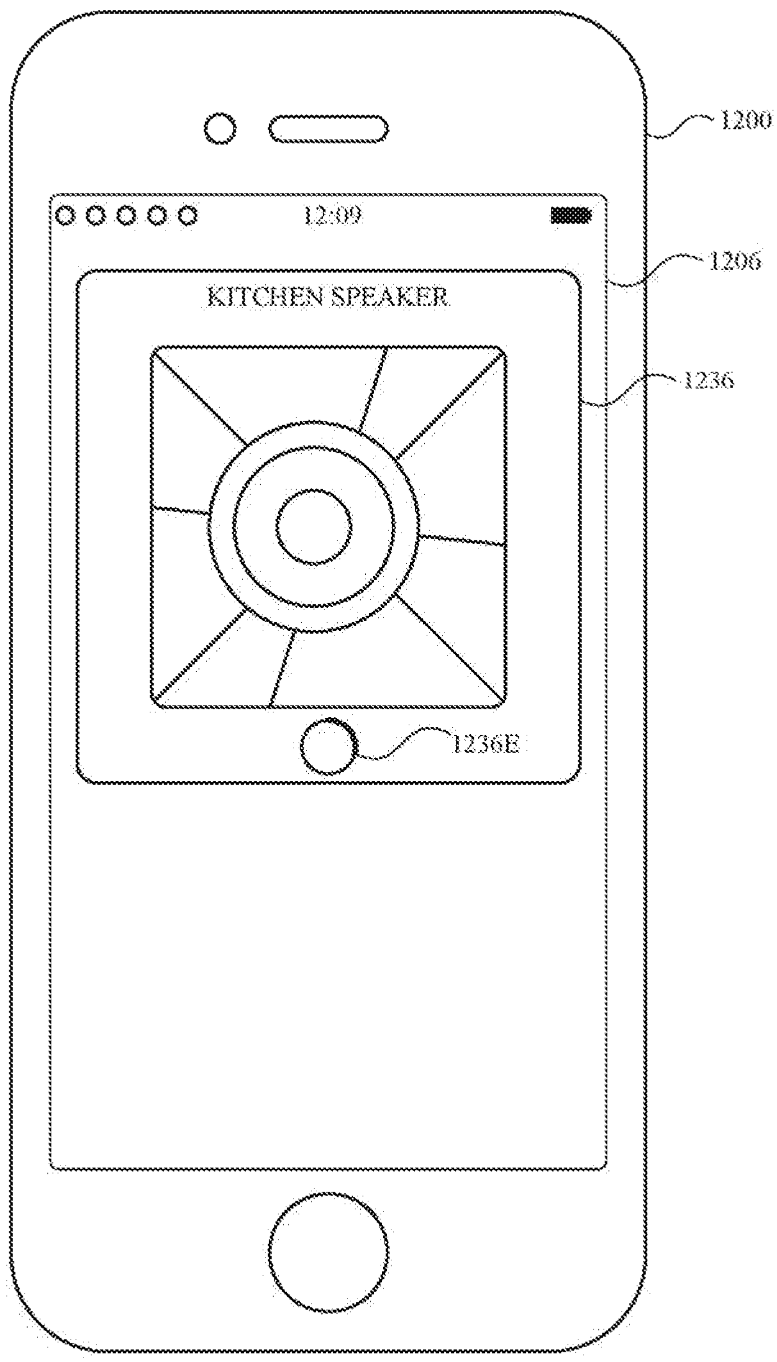

In some examples, device 1200 requires that the proximity card 1236 be held at the push position for a threshold amount of time before performing an action in response. In some examples, device 1200 provides a visual indication of the progress toward satisfying the threshold amount of time. For example, FIG. 12T illustrates push progress indicator 1236E, which is a partially completed ring. In some examples, other types of indicators can be used. Thus, in the example in FIG. 12T, the elapsed time that the proximity card 1236 has been held in the push position is approximately one-quarter of the necessary threshold time. In some embodiments, a requirement to satisfy a threshold amount of time in the push position can be bypassed (e.g., overridden) if a user input (e.g., 1238) satisfies an additional criteria. For example, if the user input is a deep press or is a swipe past an edge of the display (e.g., through the push position and off the top edge of display 1206), the device can perform the push function immediately in response.

Figure 12U:
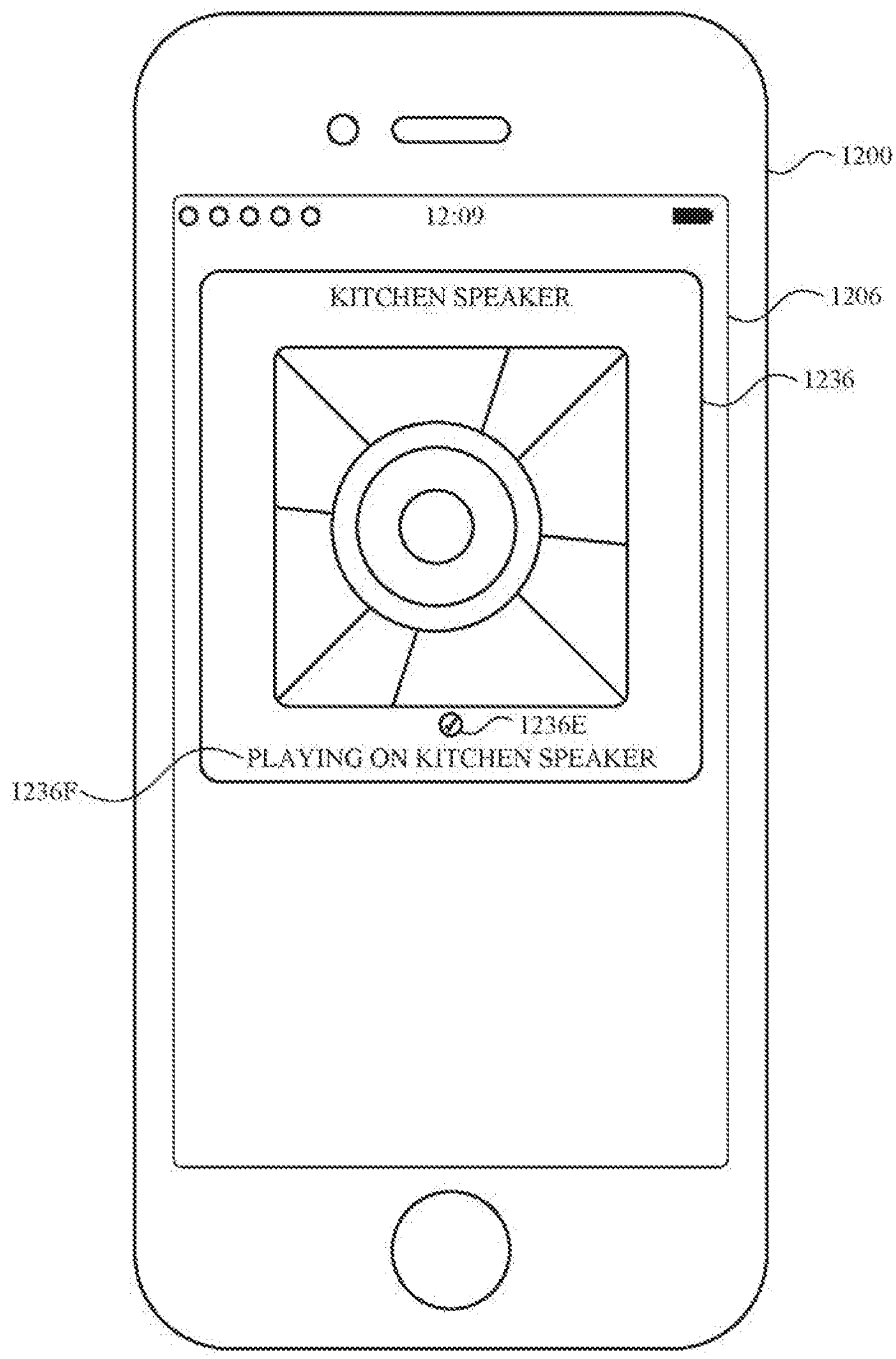

In response to the user input 1238, device 1200 performs an action in response. In some embodiments, the device 1200 "pushes" media playback onto the device 1202. In some examples, device 1200 initiates playback of the media item represented by proximity card 1236 on device 1202 (e.g., transmits an instruction to device 1202 in response to user input 1238). In some examples, playback on device 1200 ceases in response to user input 1238. FIG. 12U illustrates proximity card 1236 upon completion of the push action (e.g., user input 1238 holding the proximity card 1236 in the push position for longer than the threshold duration). As shown, proximity card 1236 now includes confirmation 1236F ("Playing on Kitchen Speaker") and push progress indicator 1236E now includes a checkmark. Thus, in this example, when the display 1206 of device 1200 appears as shown in FIG. 12U, the device 1202 is currently playing back the media item "Monday Morning".

Figure 12V:
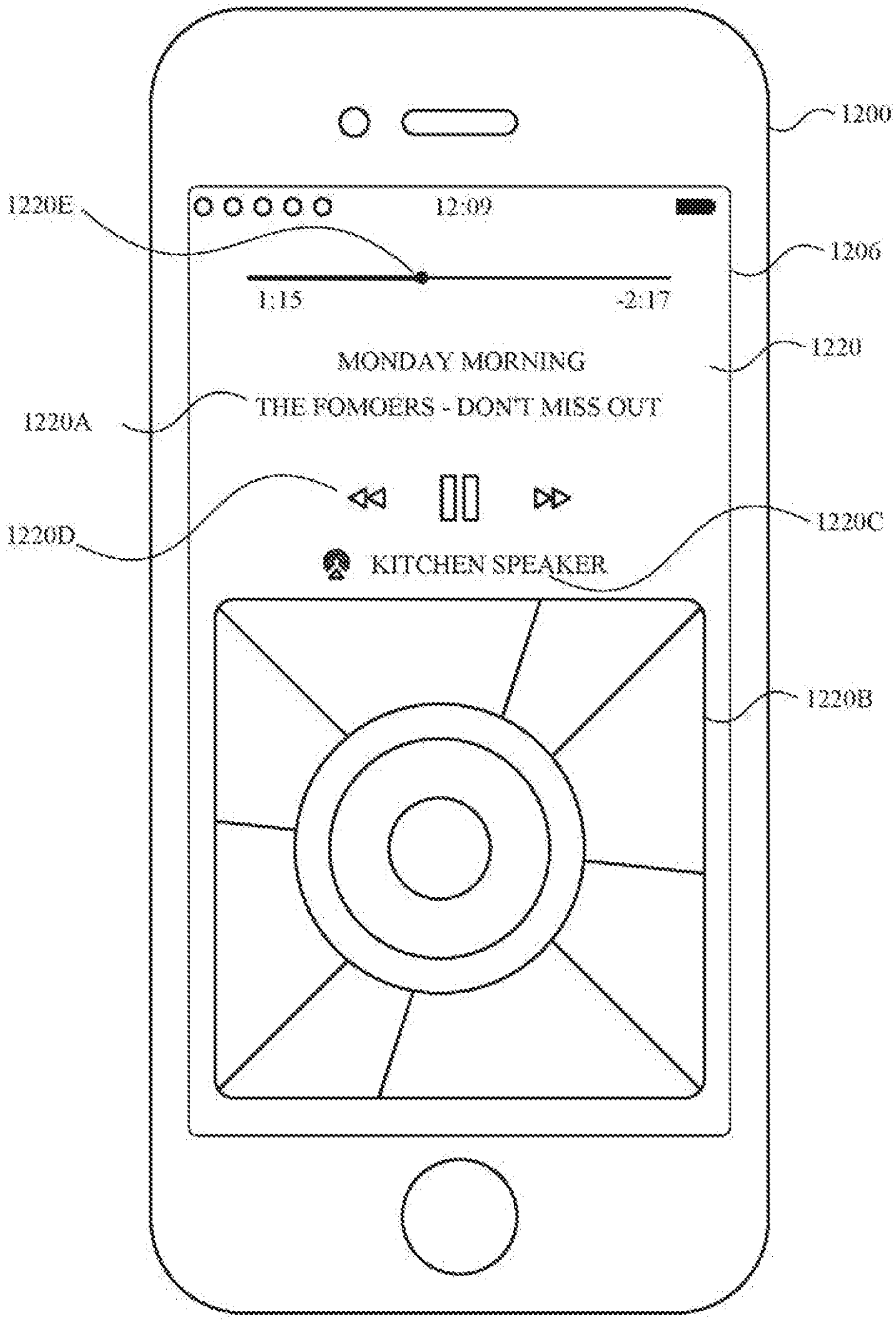

FIG. 12V illustrates an exemplary current media interface 1220. Current media interface 1220 is displayed subsequent to device 1200 receiving user input 1238 pushing the playback to the Kitchen Speaker. Thus, device 1200 updates the device selection indicator 1220C to indicate that the current focus of the device (e.g., the devices in the current media session) is the Kitchen Speaker. Thus, in this example, playback on the device iPhone (e.g., device 1200) ceased and audio playback was handed off to the Kitchen Speaker. In some embodiments, pushing playback includes initiating playback on the target device (e.g., hand off playback) and ceasing playback on the current device (e.g., 1200). In some embodiments, pushing playing includes initiating playback on the target device (e.g., hand off playback) and continuing playback on the current device (e.g., 1200).

Figure 12W:
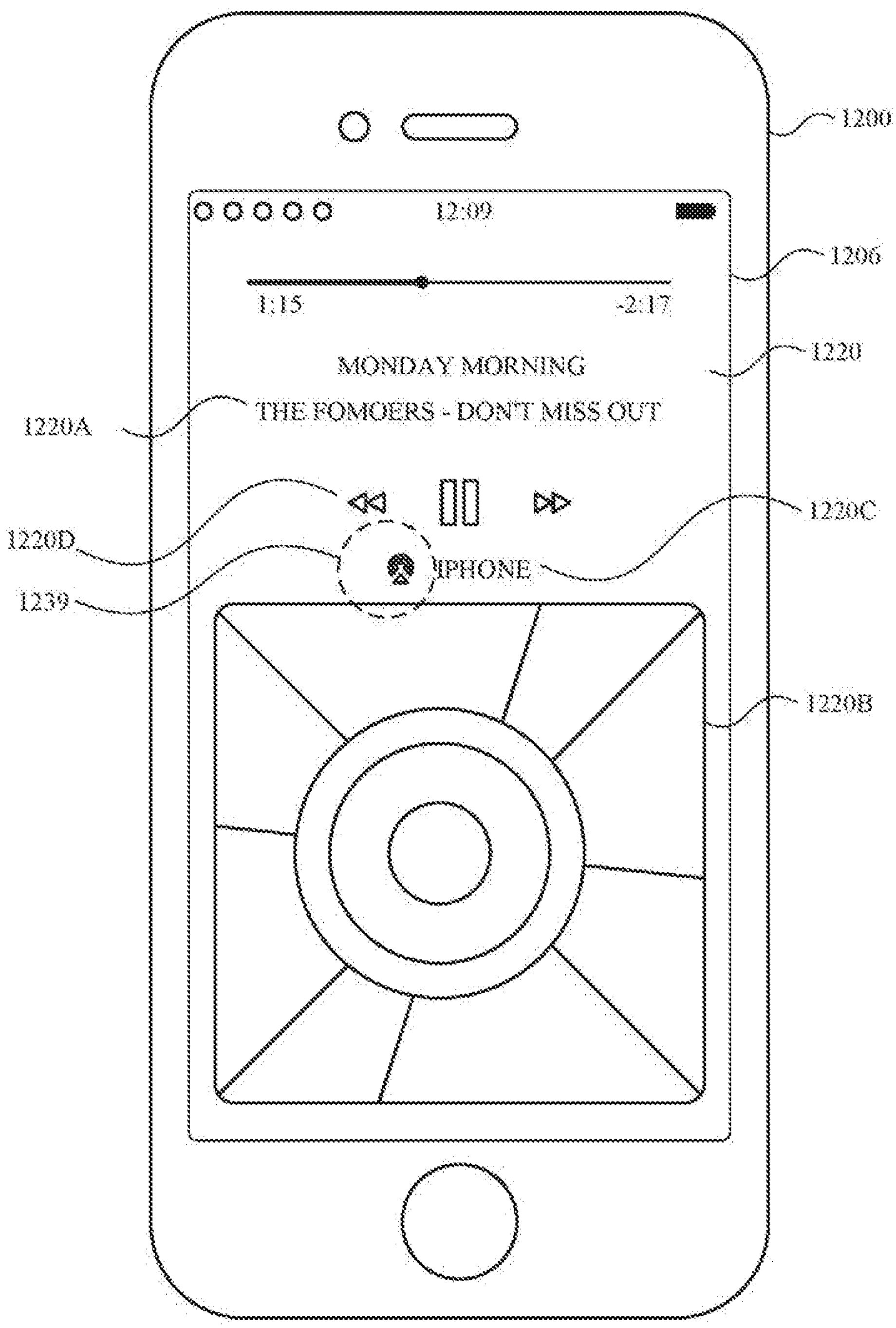

FIG. 12W illustrates an alternate technique for pushing media to a second device, in accordance with some embodiments. FIG. 12W depicts current media interface 1220, as described with respect to FIG. 12P. Notably, device 1200 is currently targeted at itself ("iPhone"). Device 1200 receives user input 1239 on device selection affordance 1220C. In some examples, a multi-device interface is displayed in response to user input 1239. As described above, the multi-device interface can be used to add the second device (e.g., 1202) to the current media session (e.g., effectively pushing playback to it).

In accordance with some embodiments, media content is automatically transferred from a first device to a second device if the devices are in close proximity for a length of time greater than a threshold length of time. For example, if device 1200 is placed in close proximity to device 1202 for longer than a threshold length of time (e.g., 5 seconds), device 1200 can automatically (e.g., without further user input) transfer playback of media to device 1202. This can be referred to as "automatic push" or "auto-push". In accordance with some embodiments, media content is automatically transferred from a second device to a first device if the devices are in close proximity for a length of time greater than a threshold length of time. For example, if device 1200 is placed in close proximity to device 1202 for longer than a threshold length of time (e.g., 5 seconds), device 1202 can automatically (e.g., without further user input) transfer playback of media to device 1200. This can be referred to as "automatic pull" or "auto-pull". When a user places a device in close proximity to another device for an extended period of time, this can be a strong indication that the user wishes playback to transfer between the devices. For example, a user can place their smartphone next to their smart speaker (e.g., 580) after entering their home and have what they were listening to on headphones begin playing on their home sound system, without further input at any device. Thus, by automatically pushing or pulling content from a personal electronic device, the number of user inputs for transferring media playback is reduced.

Figure 12X:
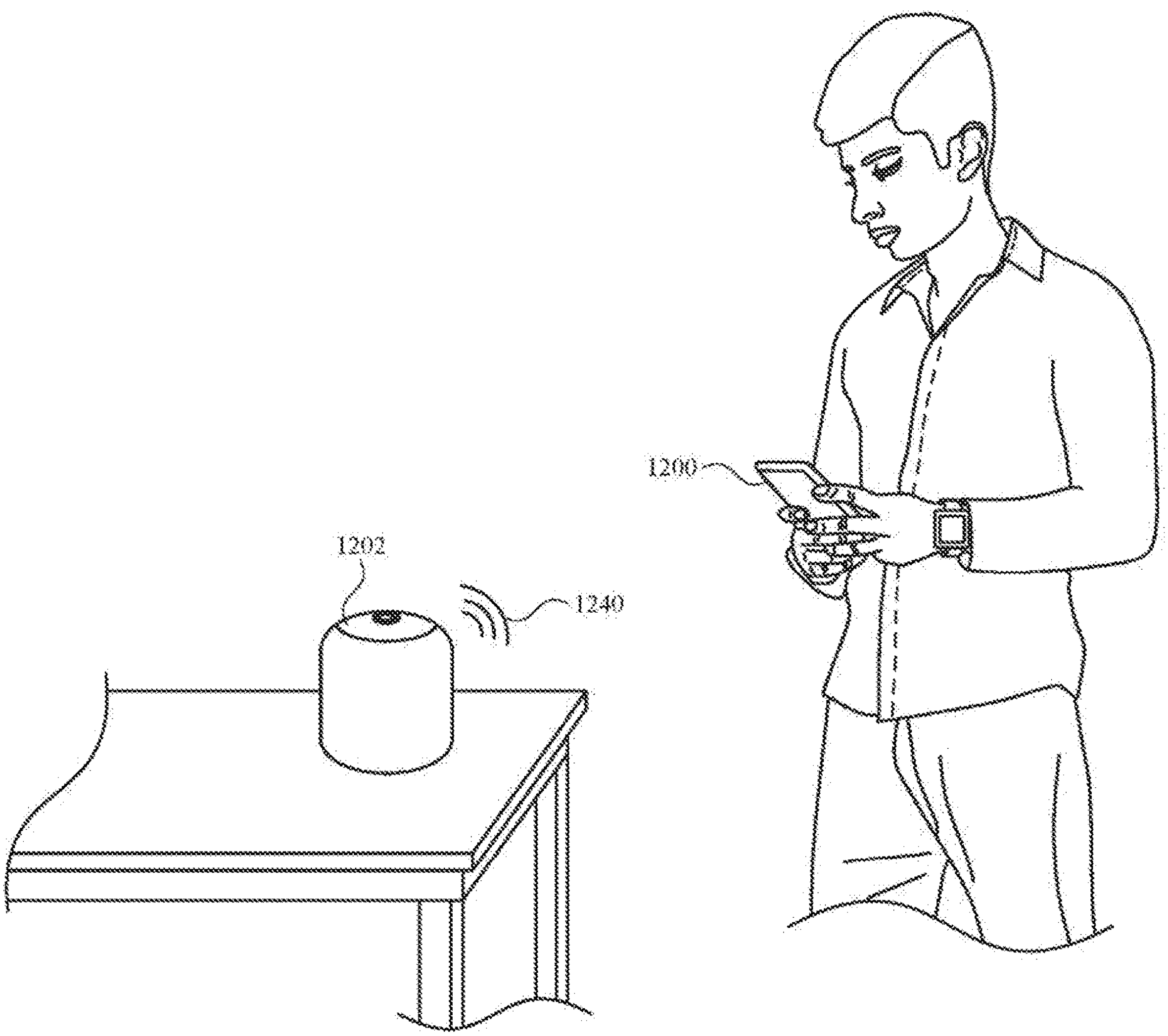

FIGS. 12X-12AG illustrate an exemplary scenario in which only a second device is playing back media content when placed in close proximity with to a first device.

FIG. 12X illustrates an exemplary scenario in which a user is holding device 1200 (e.g., a personal device) in close proximity to device 1202 (e.g., a smart speaker). Thus, FIG. 12X is similar to FIG. 12A, the description of which is hereby incorporated by reference. In the example depicted in FIG. 12X, device 1200 is not currently outputting audio, and device 1202 is currently outputting audio (e.g., media playback), as represented by sound waves 1240 (from device 1202).

Figure 12Y:
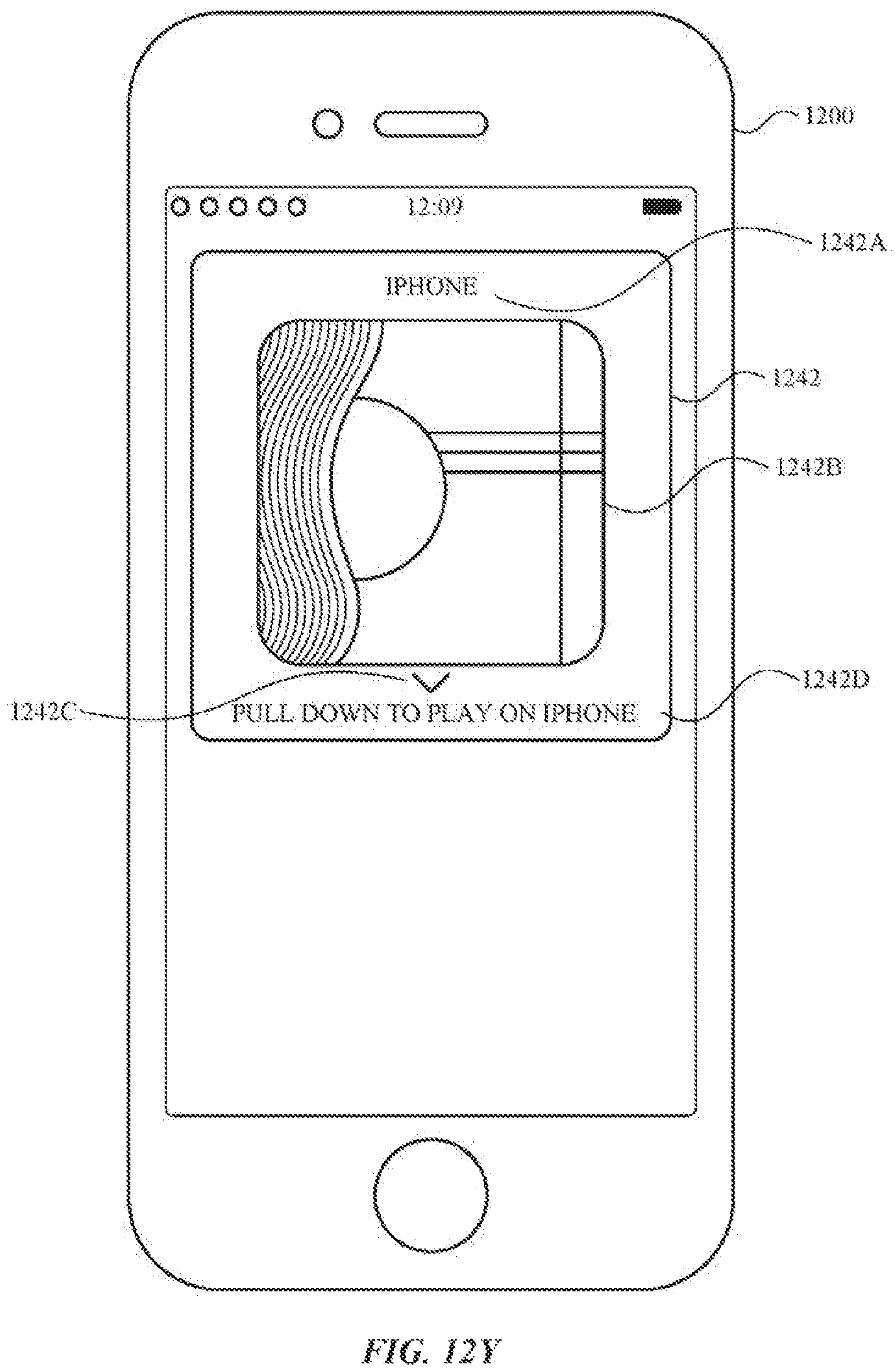

FIG. 12Y illustrates an exemplary media information interface. In some examples, device 1200 displays media information interface 1242 in accordance with detecting that device 1200 is in close proximity to device 1202. For example, media information interface 1242 is displayed in response to detecting that device 1200 is within (e.g., at least a portion of the device is inside) the proximity zone 1204 (also referred to as proximity condition range indicator 1204) of device 1202. Thus, the proximity condition is satisfied.

FIG. 12Y illustrates media information interface 1242 displayed on a display 1206 of device 1200. In some examples, media information interface 1242 is displayed in response to device 1200 being placed (e.g., briefly or continuously) in close proximity with device 1202. Thus, because media information interface 1242 displayed in response to the device being placed in close proximity, it is also referred to as a "proximity card" or specifically a "media proximity card".

In the example shown in FIG. 12Y, proximity card 1242 includes the title 1242A "iPhone", visually indicating the name of the device (e.g., device 1200) that is the target of the proximity card action (e.g., will receive media playback in response to appropriate user input on the proximity card). Proximity card 1242 also includes an action indicator 1242C (e.g., an arrow), indicating that a user input gesture on the proximity card (e.g., in the direction of the arrow) will cause the device to perform an action. Likewise, action indicator 1242D (the text "Pull down to play on iPhone") indicates to a user that a user input on the proximity card 1242 will cause the device to take action. Additionally, proximity card 1242 includes a media affordance 1242B representing media content (e.g., one or more media items). In this example, media affordance 1242B includes album art for the track titled "Same Thing" by the artist "Jambug" (e.g., that is currently playing on device 1202). In some examples, media affordance 1242B includes other types of visual indications of one or more media items (e.g., text, images, or other appropriate visual representations). In this example, the media content represented (e.g., by affordance 1242B) by the proximity card 1242 is content that is currently playing on the device 1202 (e.g., the Kitchen Speaker). Proximity card 1242 provides an interface that allows the user to add the device "iPhone" (e.g., 1200) to the current media session (e.g., of playback of "Same Thing" on device 1202) of another device in close proximity (e.g., device 1202).

Figure 12Z:
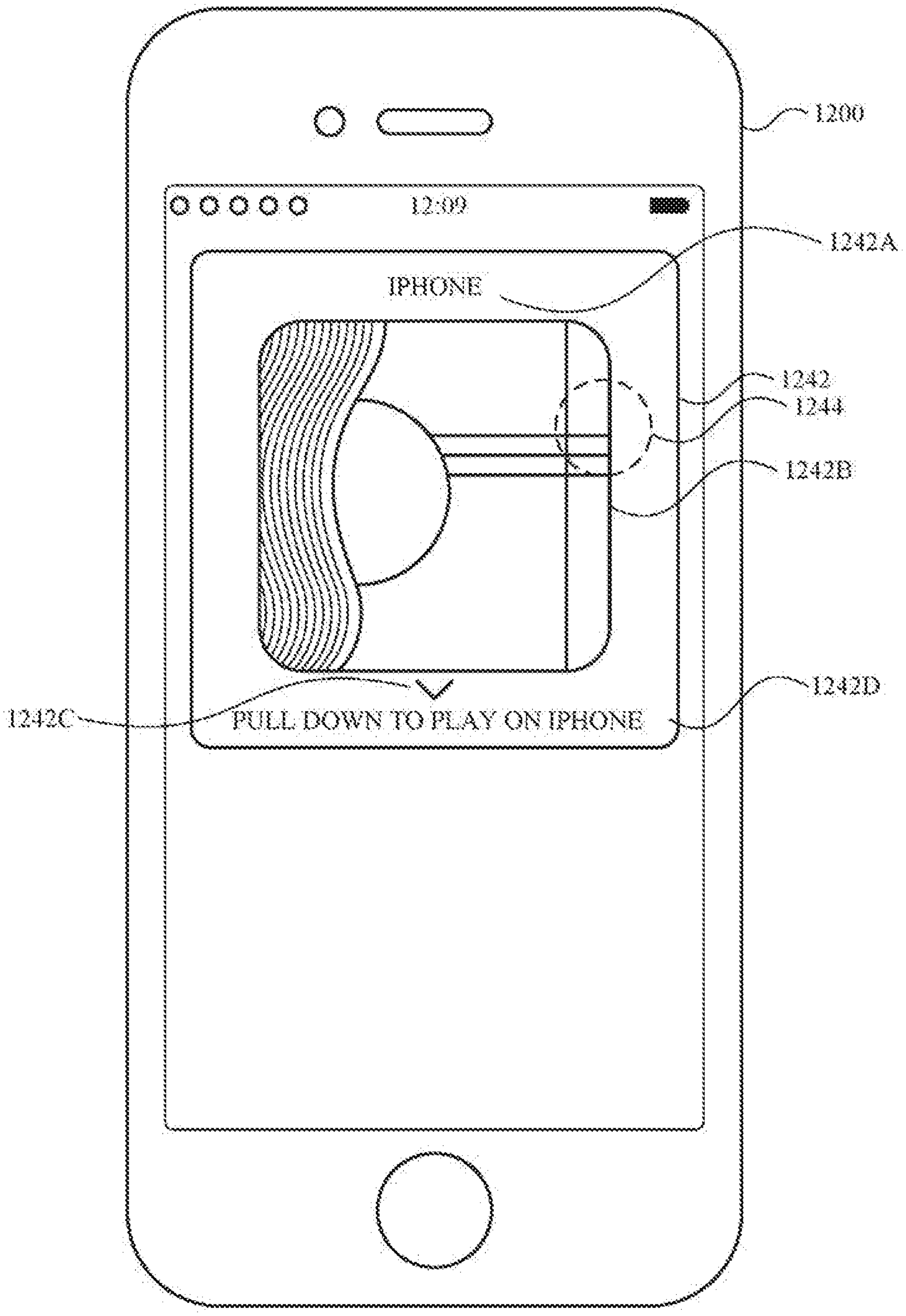
Figure 12A:
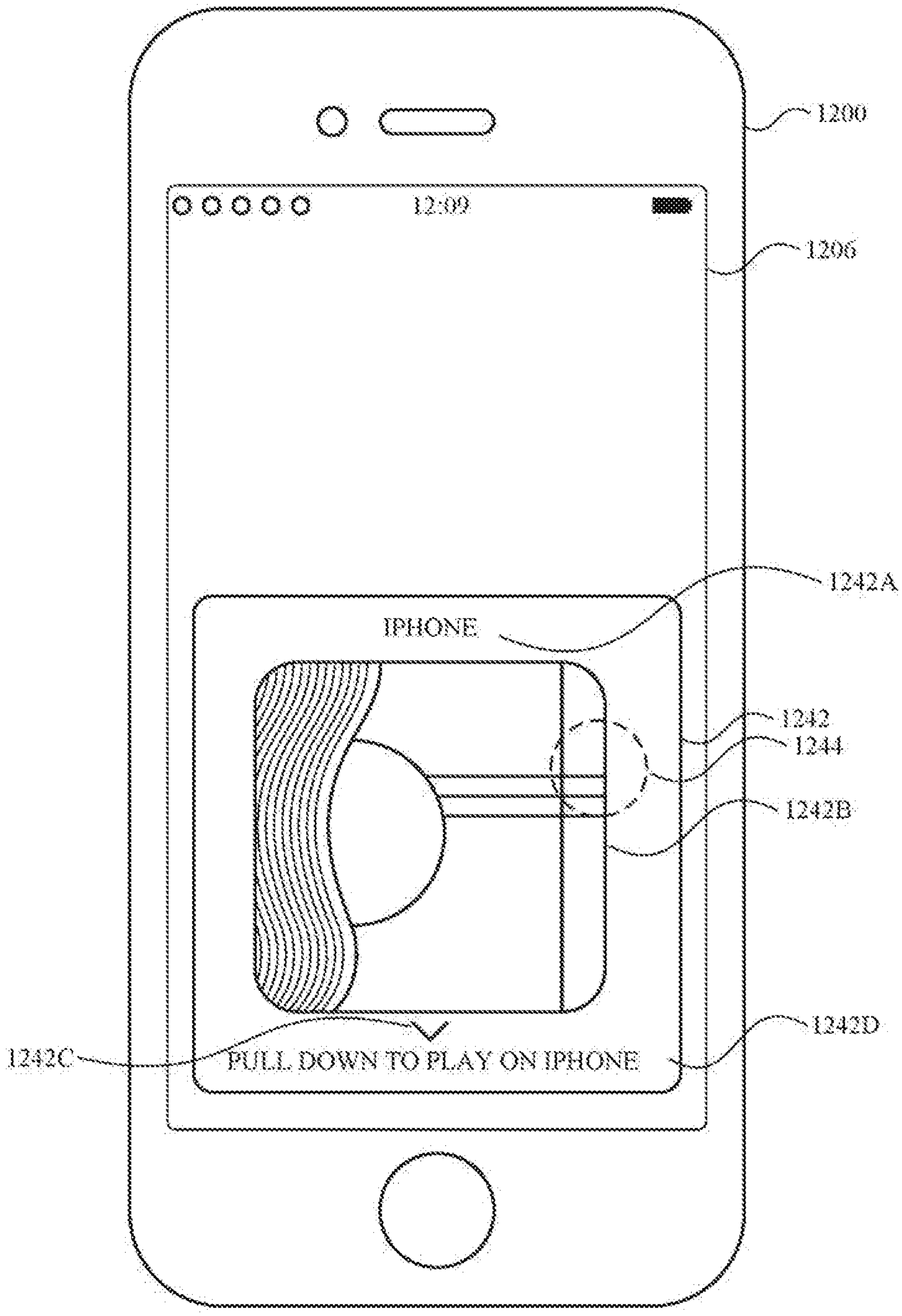
Figure 12A:
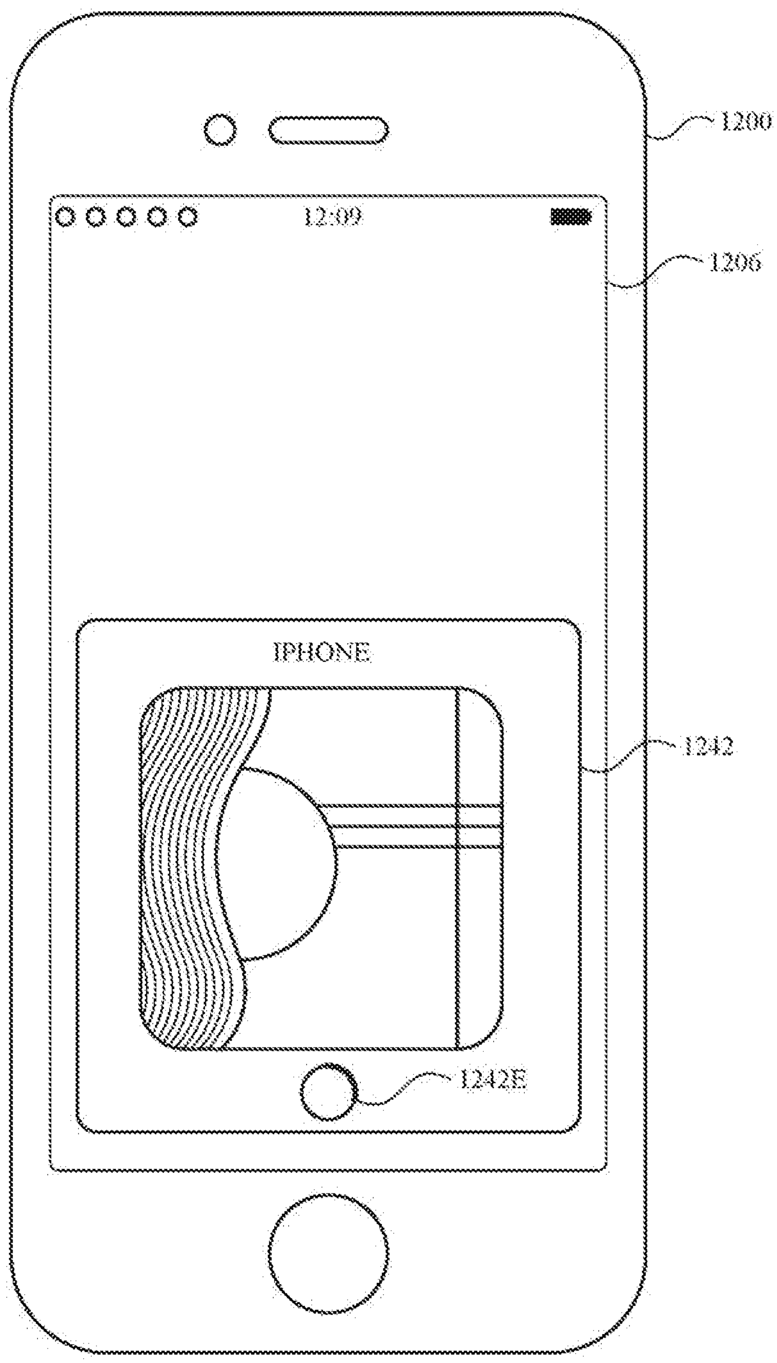
Figure 12A:
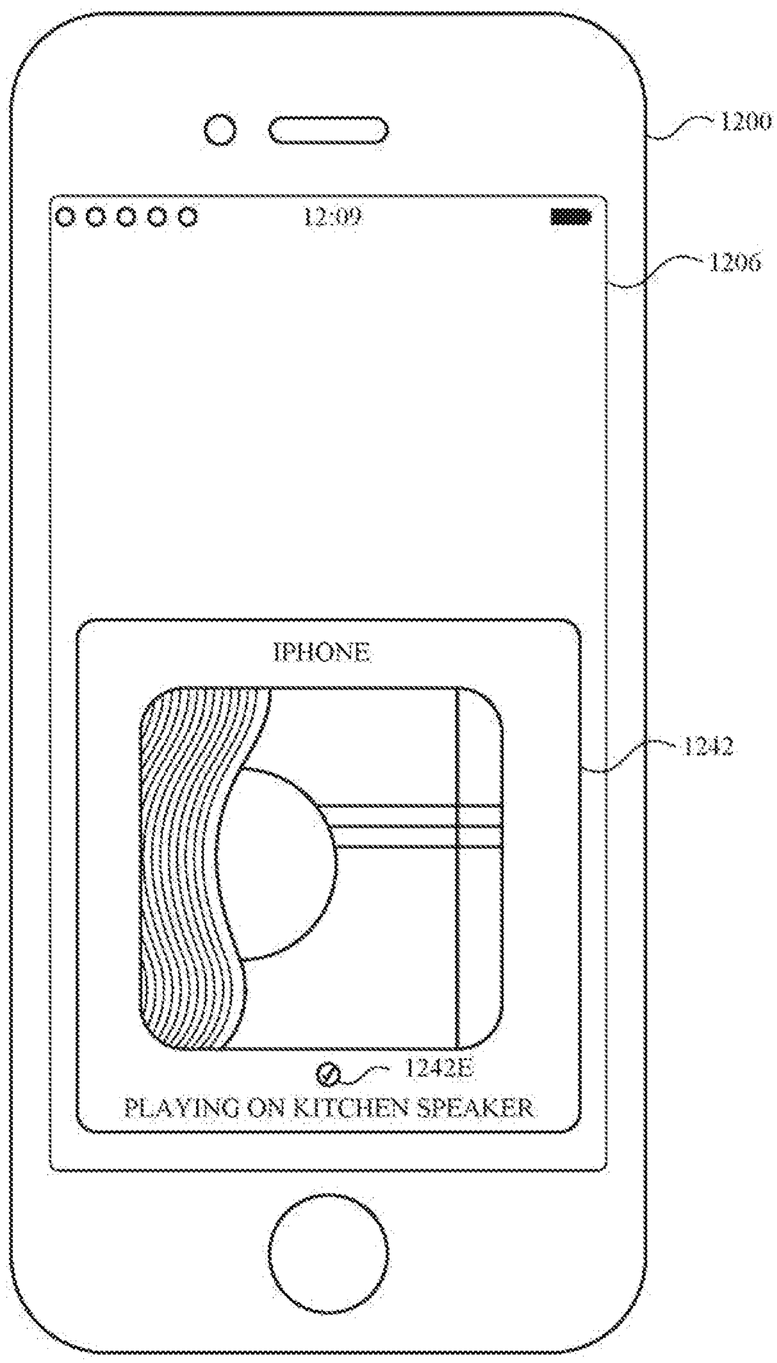
Figure 12A:
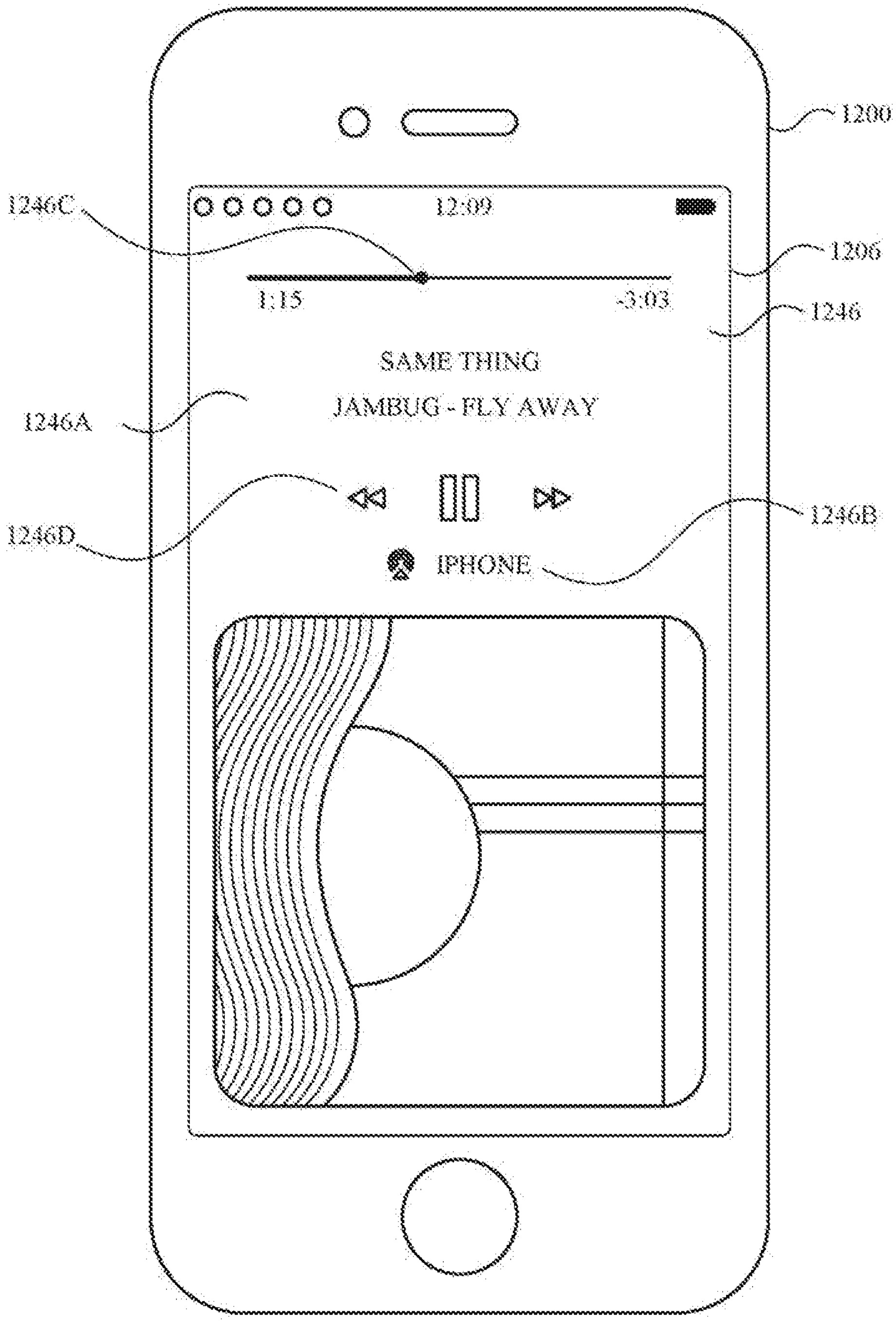
Figure 12A:
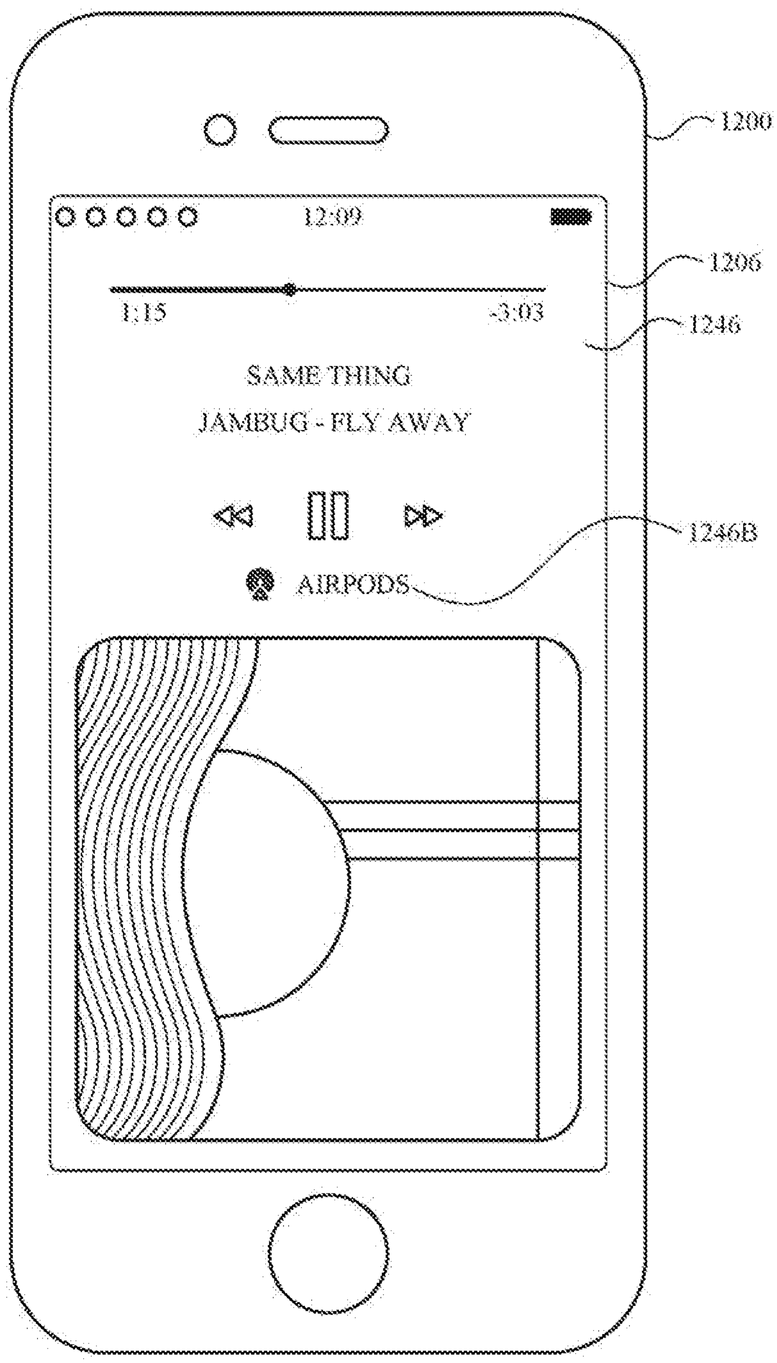
Figure 12A:
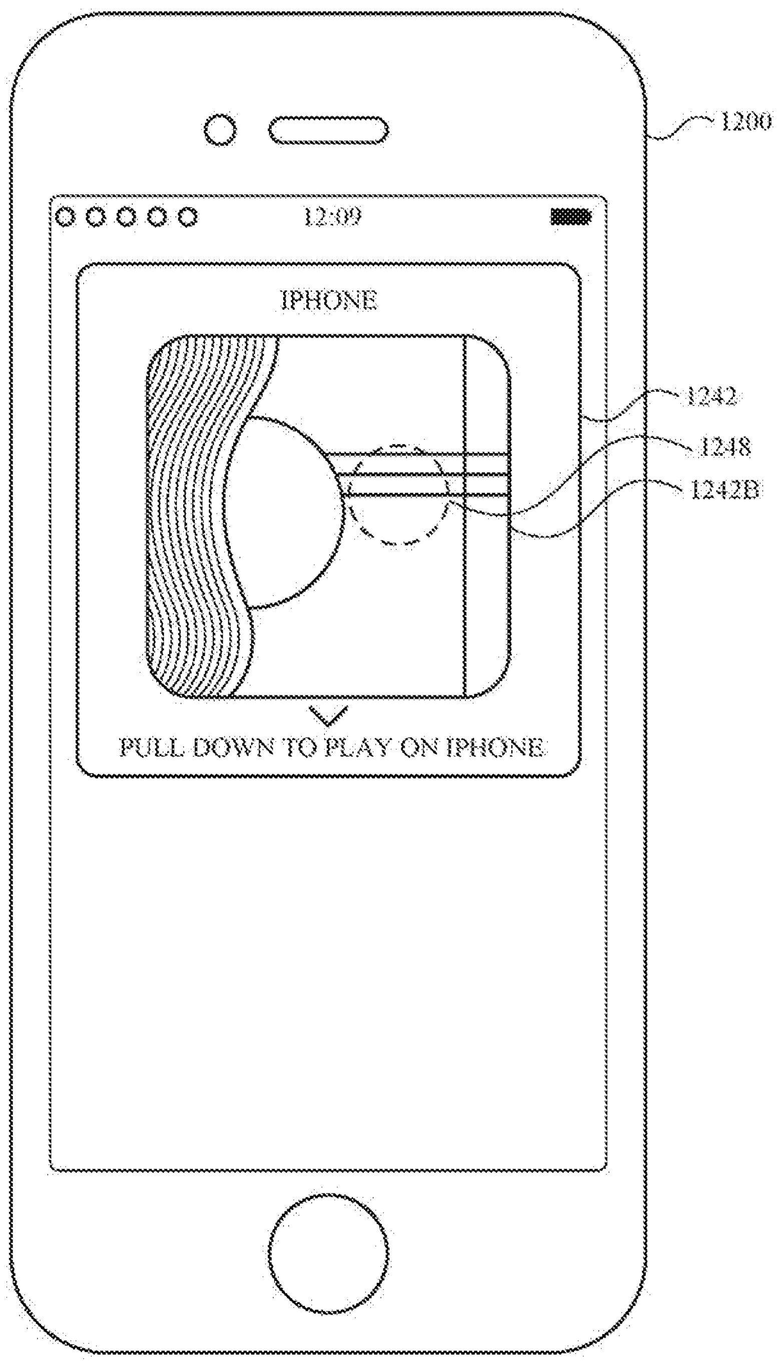
Figure 12A:
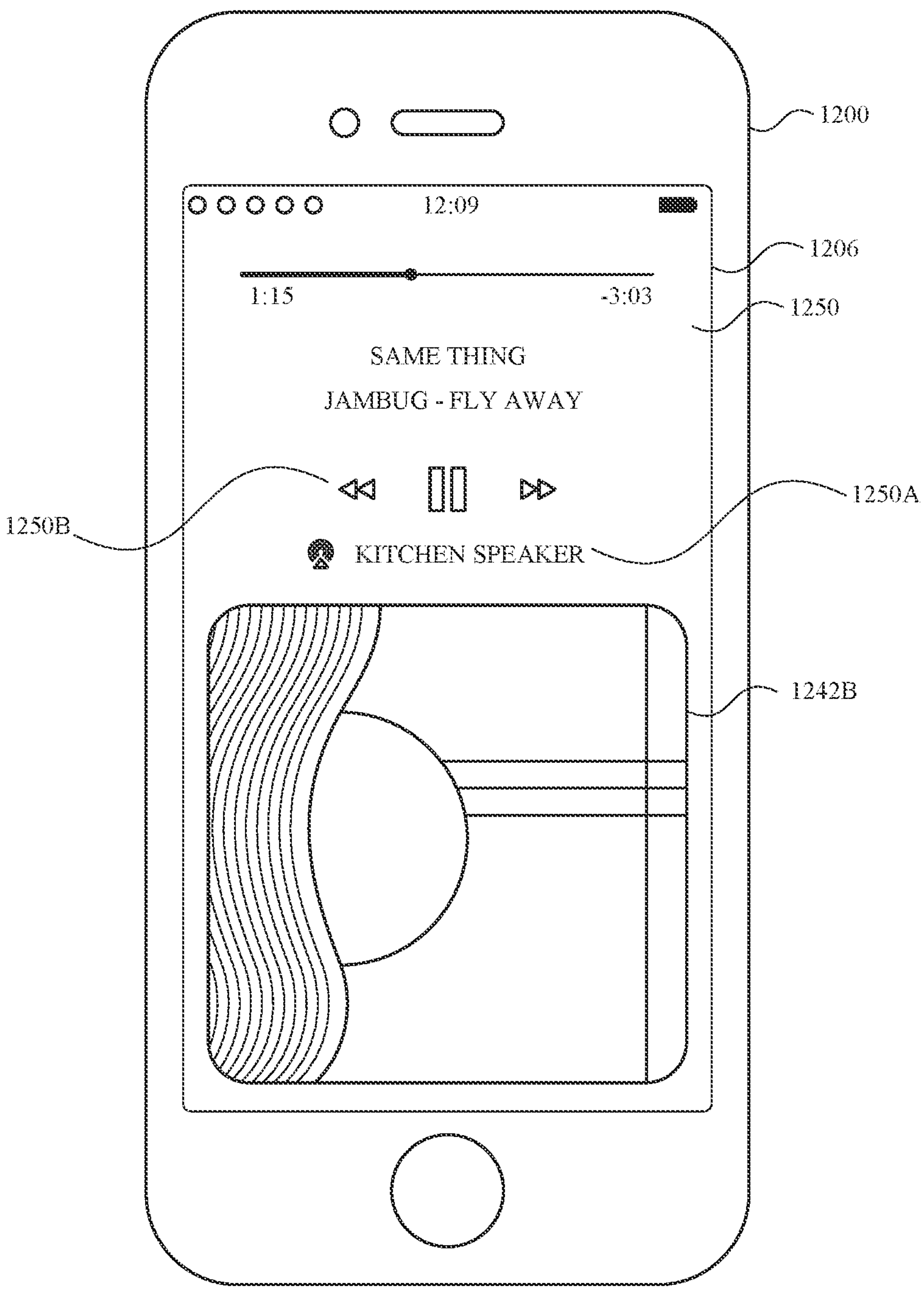
Figure 12A:
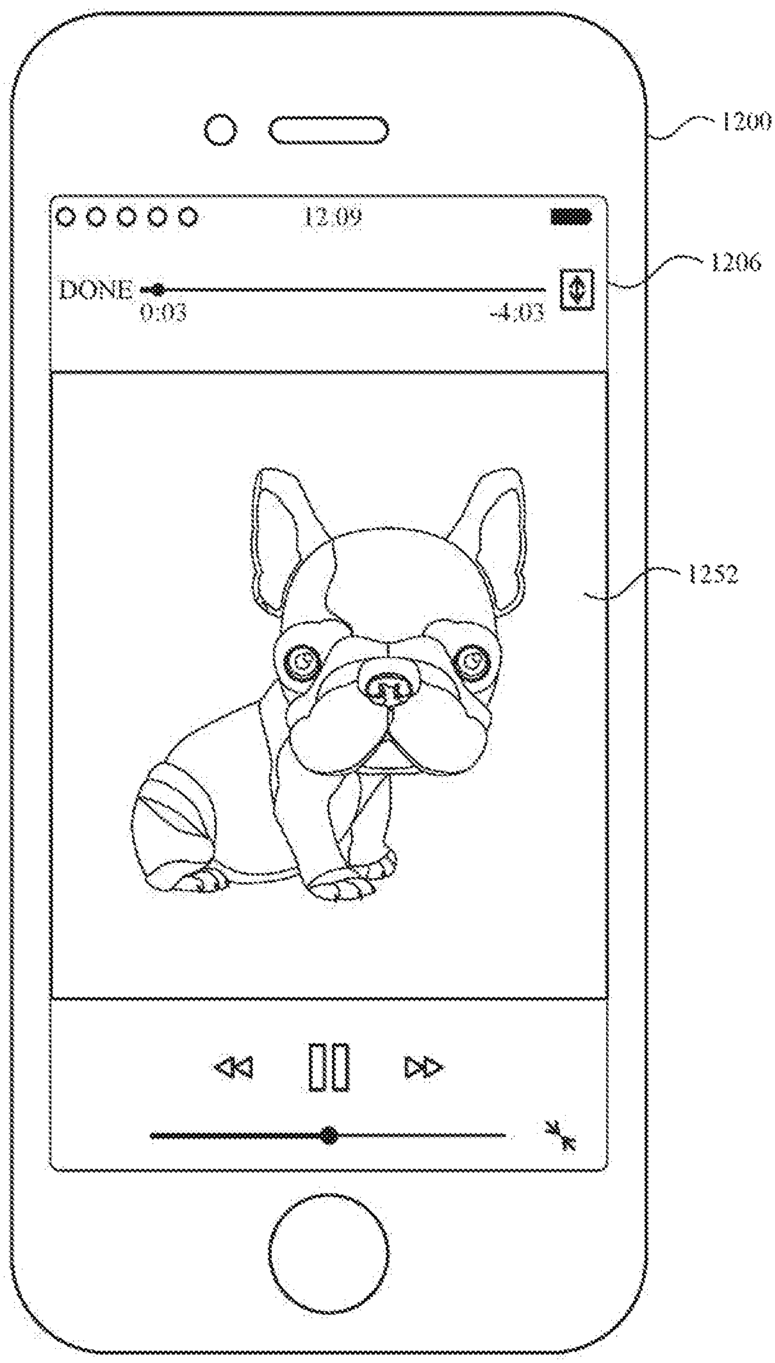
Figure 12A:
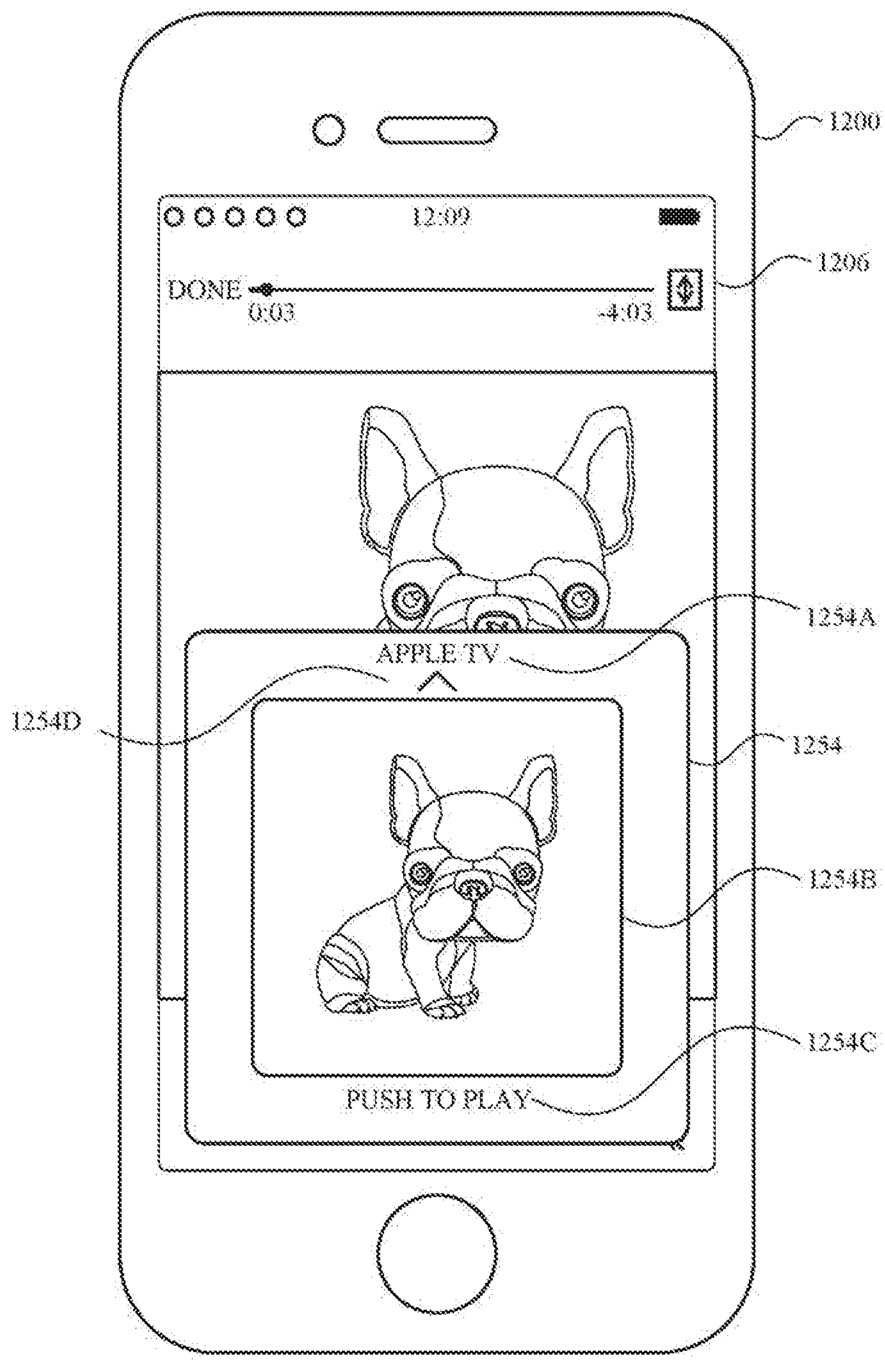
Figure 12A:
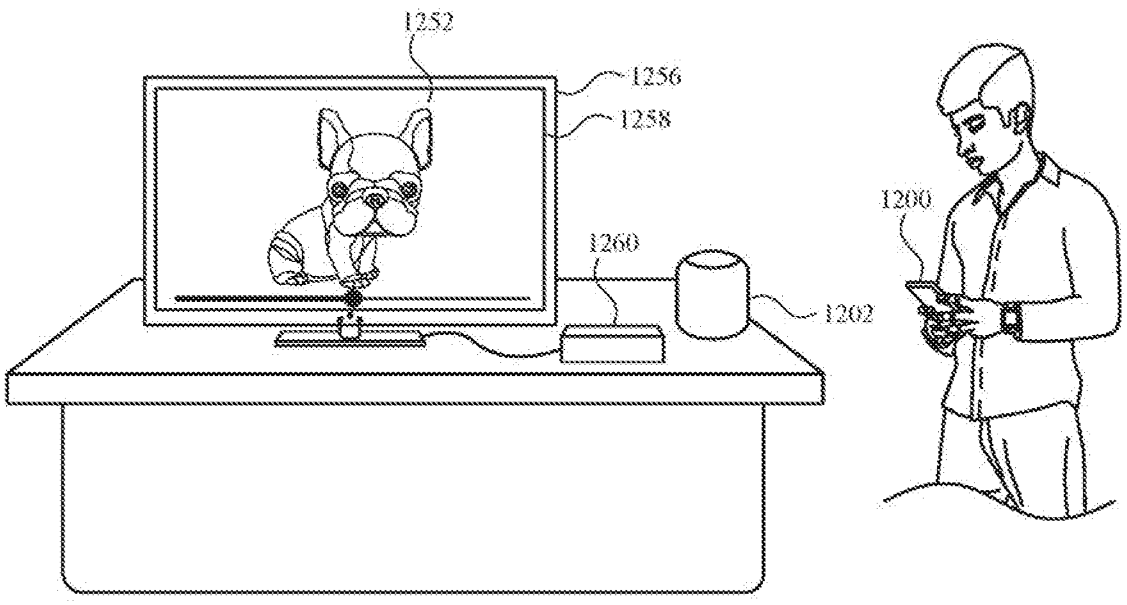
Figure 12A:
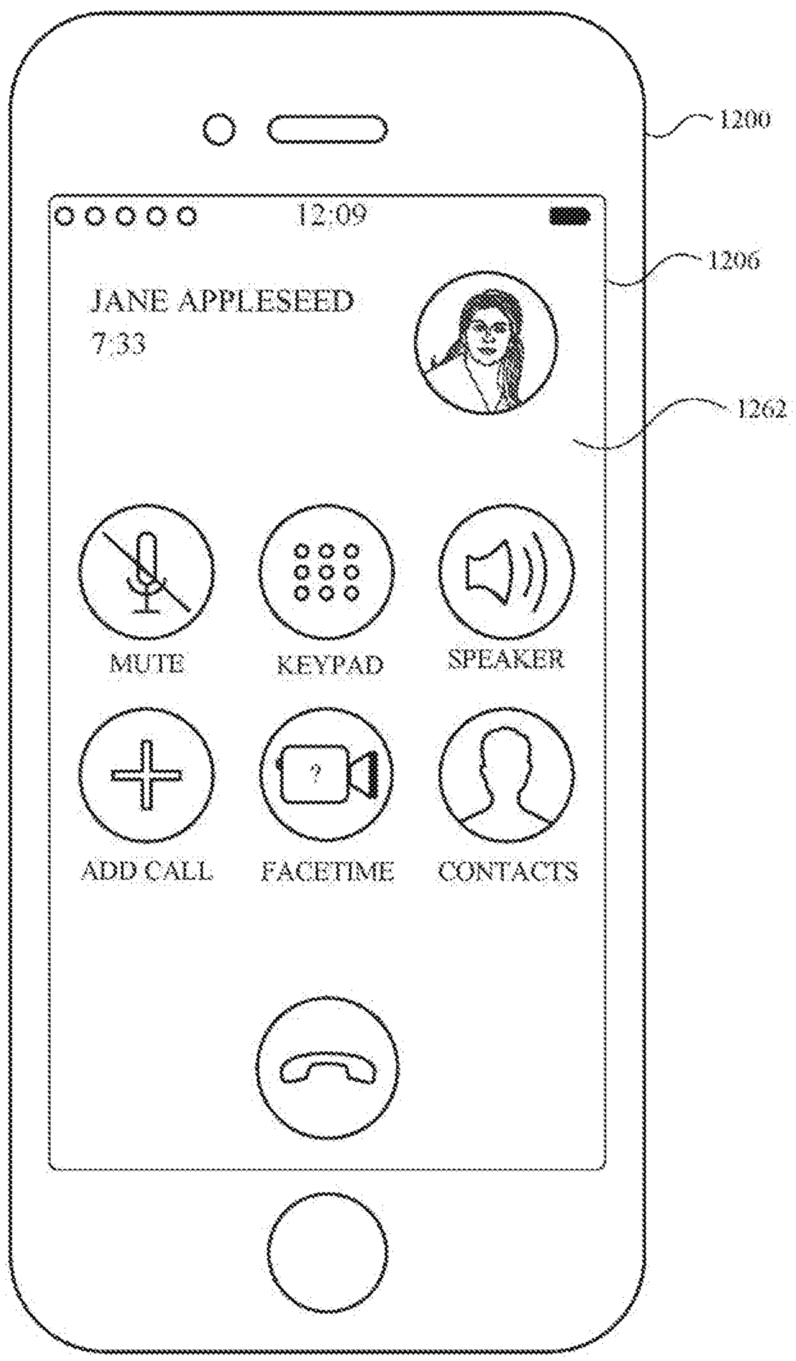
Figure 12A:
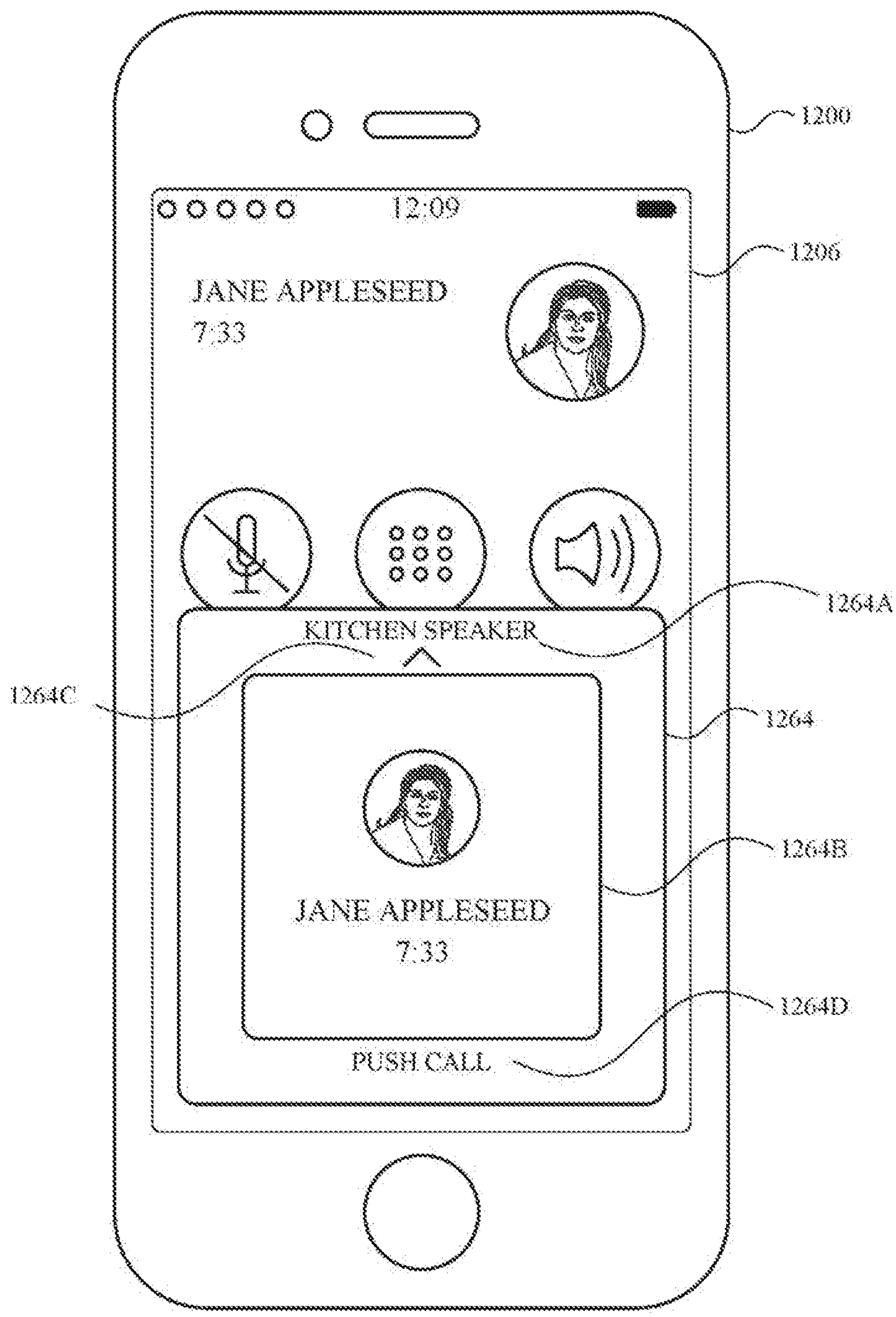
Figure 12A:
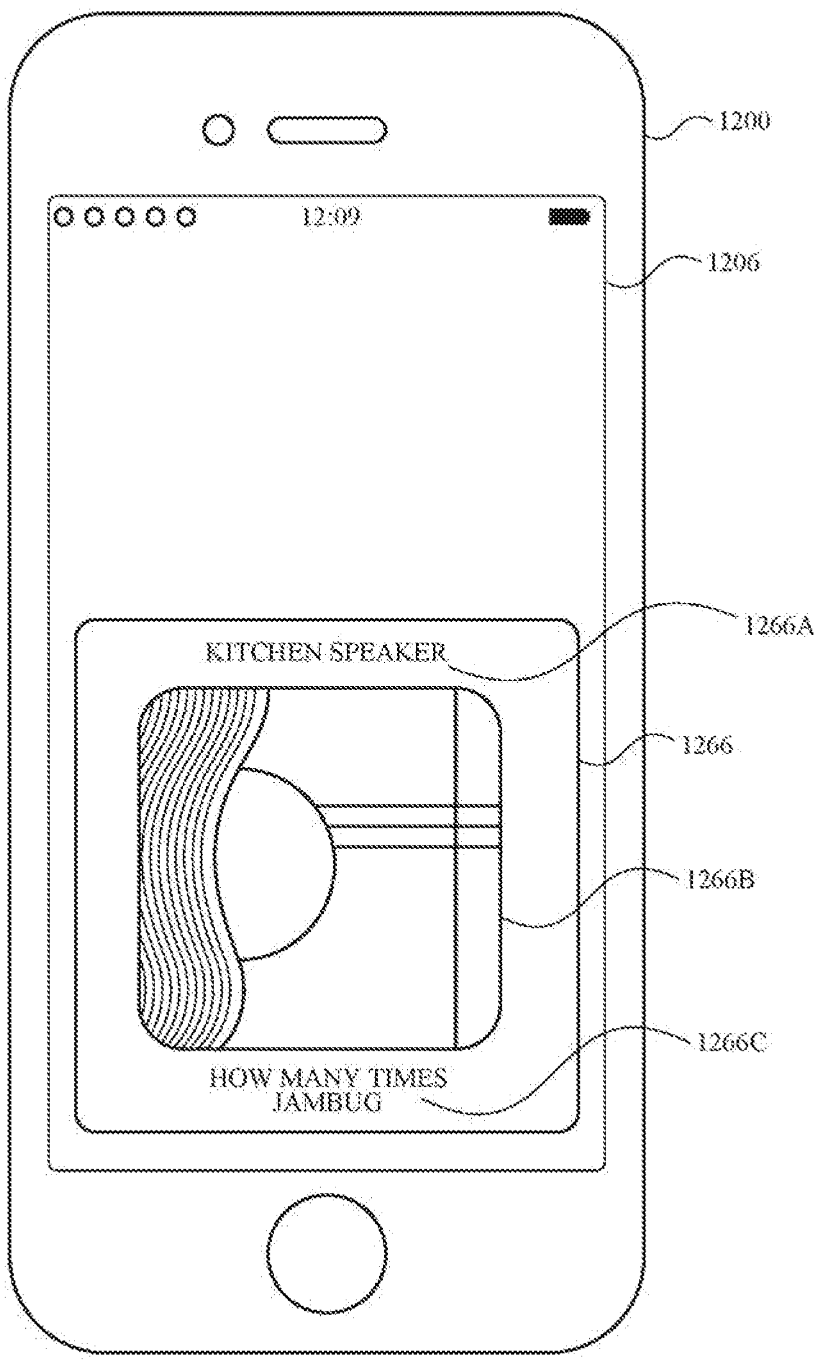
Figure 13A:
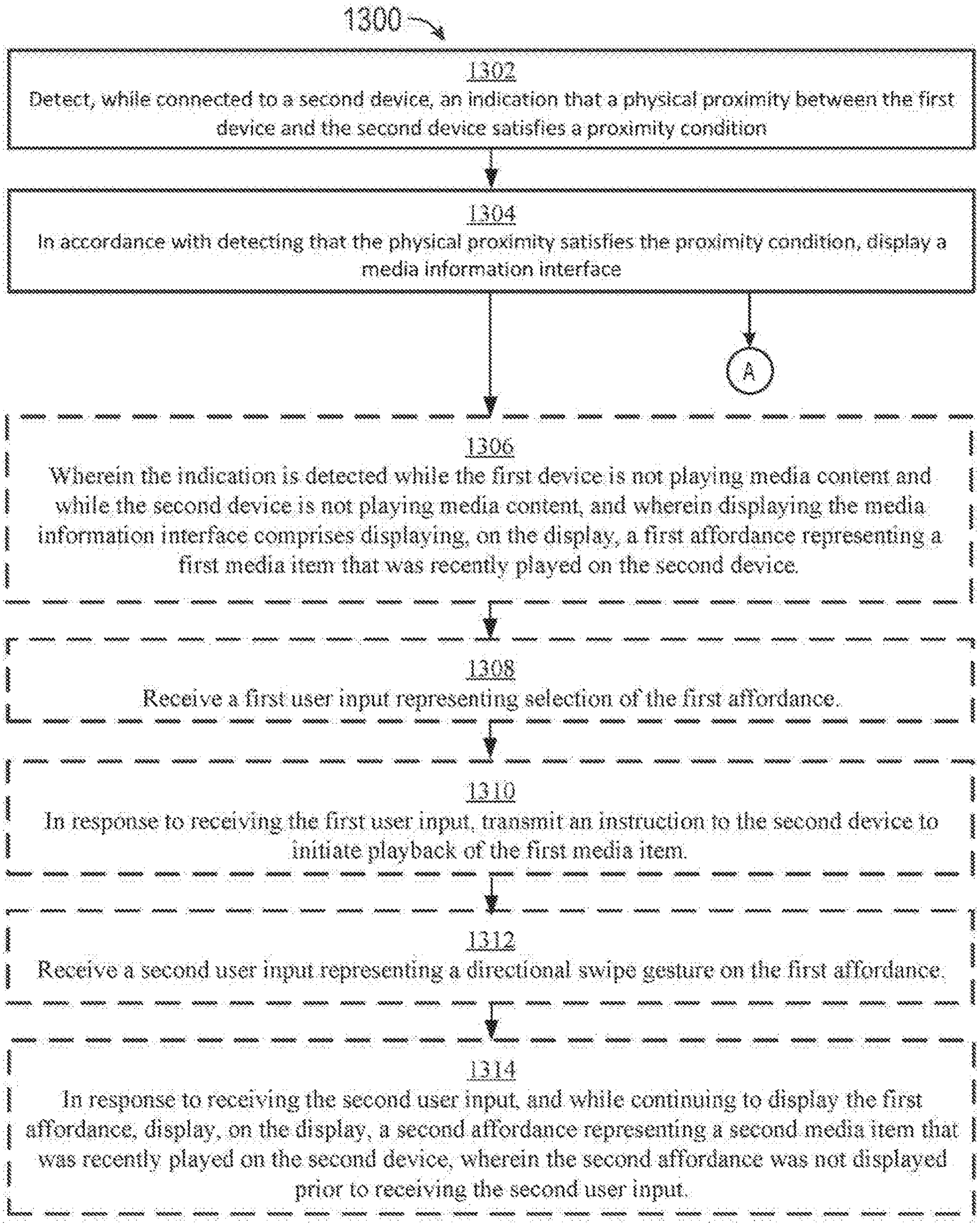
Figure 13C:
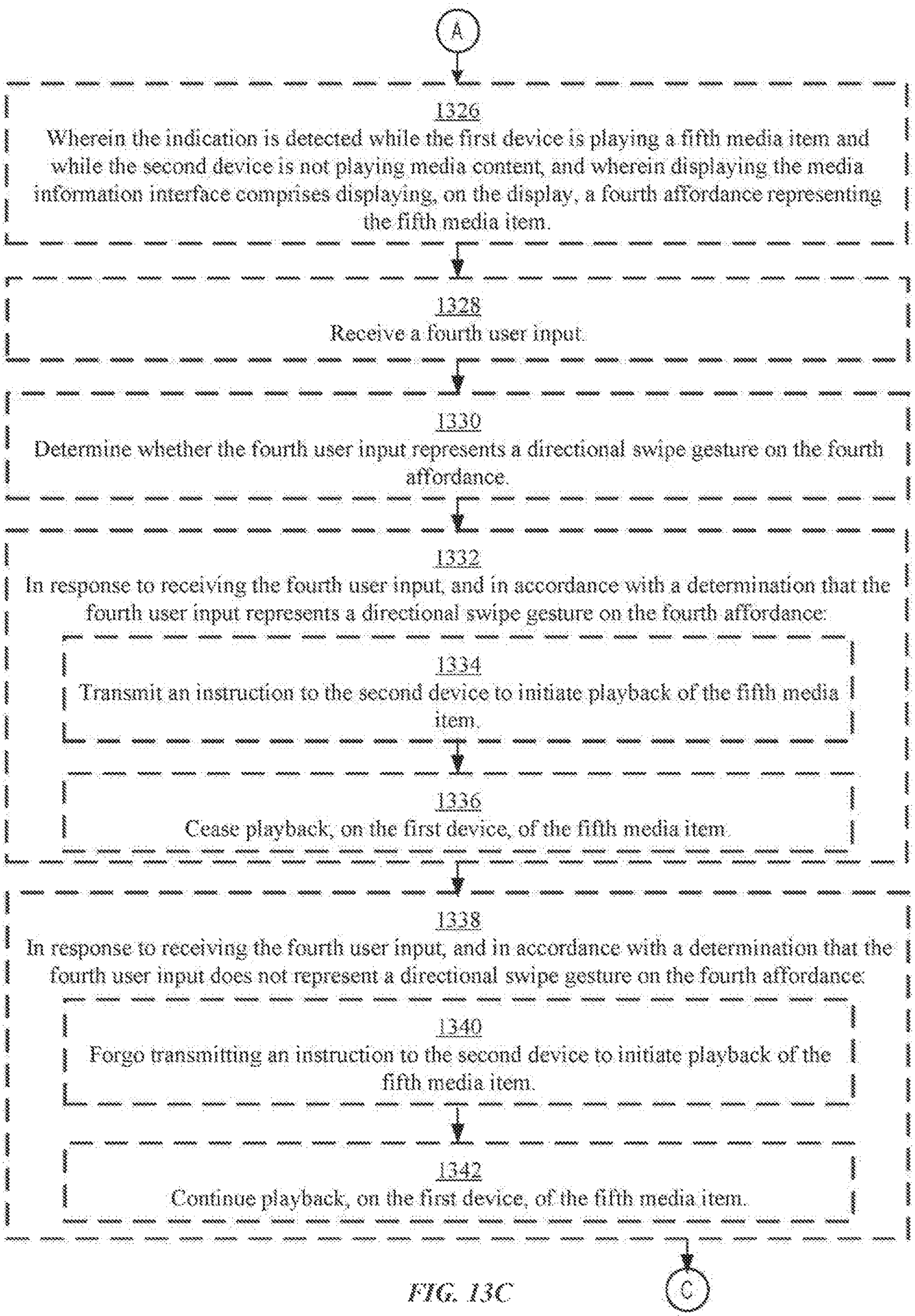
Figure 13D:
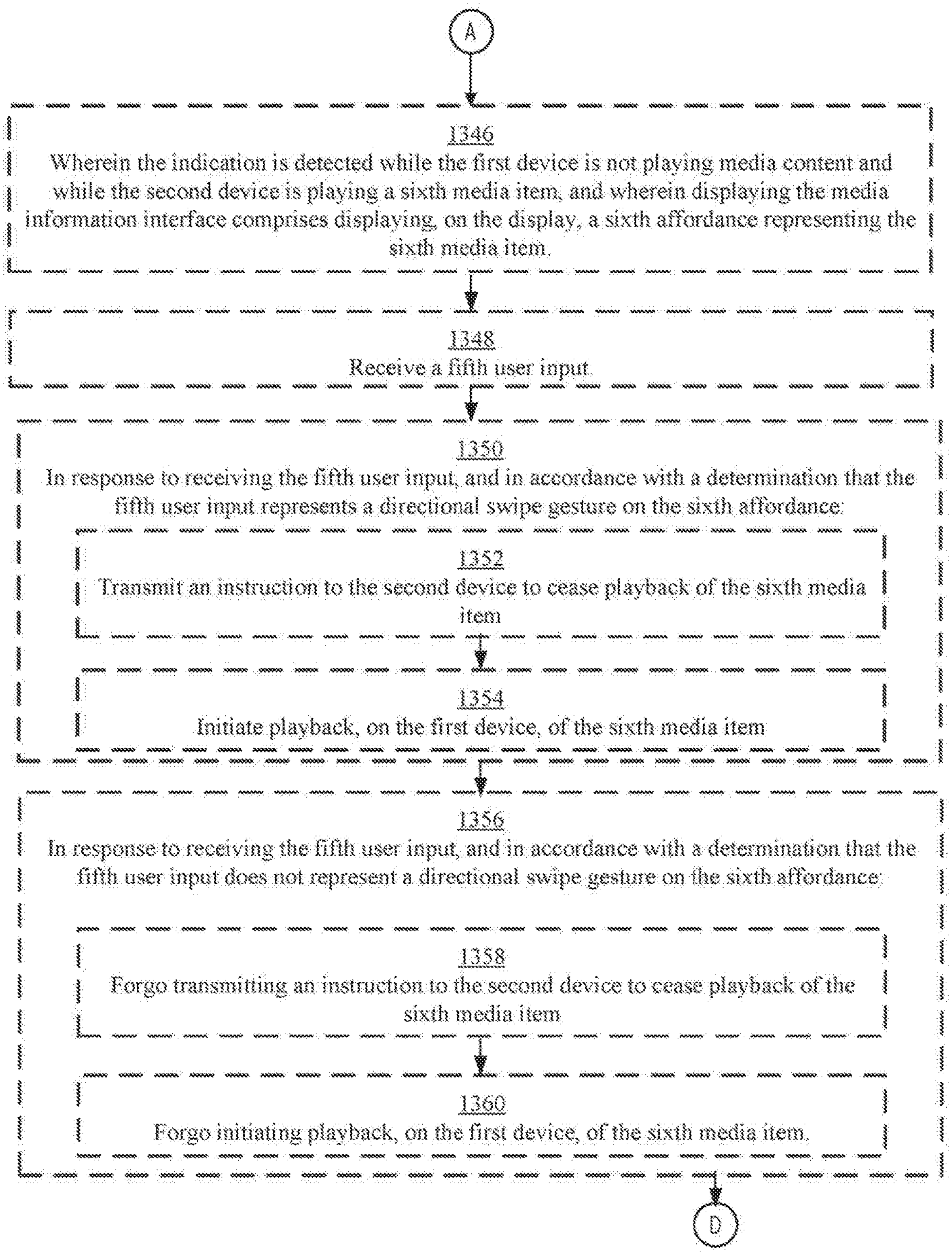
Figure 13E:
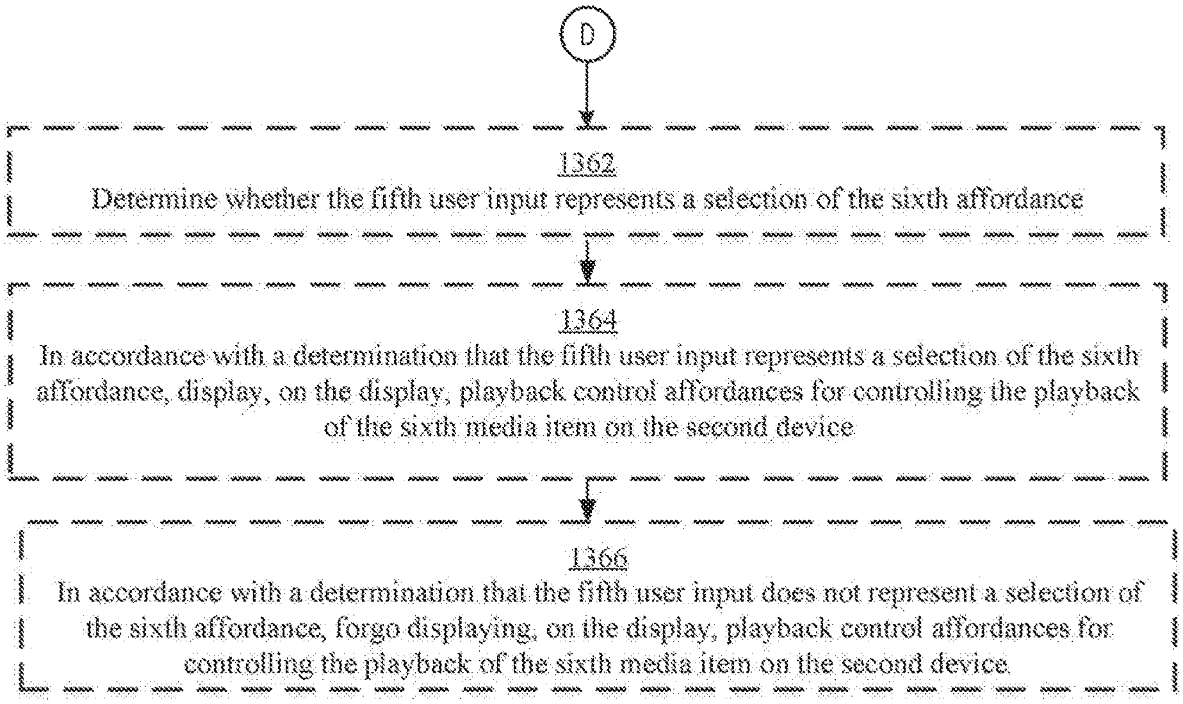

FIGS. 12Z-12AC illustrate and exemplary pull interaction with a media control interface. At FIG. 12Z, device 1200 receives user input 1244 on proximity card 1242. At FIG. 12AA, user input 1244 has moved across the display (e.g., in the direction of action indicator 1242C). In this example, display 1206 is a touch-sensitive display. In this example, user input 1244 is a directional swipe gesture. FIG. 12AA also illustrates proximity card 1242 has shifted position on the display 1206 in accordance with the directional swipe gesture user input 1244, which will be referred to as the "pull position".

In some examples, device 1200 requires that the proximity card 1242 be held at the pull position for a threshold amount of time before performing an action in response. In some examples, device 1200 provides a visual indication of the progress toward satisfying the threshold amount of time. For example, at FIG. 12AB illustrates pull progress indicator 1242E, which is a partially completed ring. In some examples, other types of indicators can be used. Thus, in the example in FIG. 12AB, the elapsed time that the proximity card 1242 has been held in the push position is approximately one-quarter of the necessary threshold time. In some embodiments, a requirement to satisfy a threshold amount of time in the push position can be bypassed (e.g., overridden) if a user input (e.g., 1244) satisfies an additional criteria. For example, if the user input is a deep press or is a swipe past an edge of the display (e.g., through the push position and off the top edge of display 1206), the device can perform the pull function immediately in response.

In response to the user input 1242, device 1200 performs an action in response. In some embodiments, the device 1200 "pulls" media playback onto the device 1200. In some embodiments, pulling playback includes initiating playback on the current device (e.g., 1200) and ceasing playback on the external device (e.g., 1202). In some embodiments, pulling playback includes initiating playback on the current device (e.g., 1200) and continuing playback on the external device (e.g., 1202).

In some examples, device 1200 initiates playback of the media item represented by proximity card 1242. In some examples, playback on device 1202 ceases in response to user input 1242 or in response to device 1200 initiating playback. FIG. 12AC illustrates proximity card 1242 upon completion of the pull action. As shown, proximity card 1242 now includes confirmation 1242F ("Playing on iPhone") and pull progress indicator 1242E now includes a checkmark. Thus, in this example, when the display 1206 of device 1200 appears as shown in FIG. 12AC, the device 1200 is currently playing back the media item titled "Same Thing".

FIG. 12AD illustrates an exemplary current media interface 1246. Current media interface 1246 is displayed subsequent to device 1200 receiving user input 1244 and pulling the playback to the iPhone. Current media interface 1246 includes a media identifier 1246A (e.g., showing the track titled "Same Thing" by "Jambug"), device selection affordance 1246B (e.g., showing focus is on the iPhone), media playback indicator 1246C (showing temporal progress of playback of the current media item), and playback control affordances 1246D. As shown in FIG. 12AD, device 1200 updates the device selection indicator 1246B to indicate that the current focus of the device (e.g., the devices in the current media session) is the iPhone (e.g., device 1200). Thus, in this example playback on the device Kitchen Speaker (e.g., device 1202) ceased and audio playback was handed off to the iPhone (e.g., device 1200).

In some examples, if device 1200 is associated with a personal listening device (e.g., headphones), device 1200 automatically pulls the media playback from device 1202 and initiates the playback on the personal listening device. For example, as shown in the current media interface 1246 of FIG. 12AE, the playback of the pulled media item "Same Thing" is currently playing back on the headphones named "AirPods" (e.g., indicated by device selection indicator 1246B). For example, if a user is about to leave their home and would like to take music with them (e.g., to go running), device 1200 routes the music to an associated set of headphones (e.g., if turned on and/or being worn by the user) without first beginning playback on a speaker of device 1200 in response to user input 1244.

FIG. 12AF-12AG illustrates an exemplary alternate technique for interacting with a proximity card, in accordance with some embodiments. FIG. 12AF depicts proximity card 1242, with a user input 1248 on the media affordance 1242B. In some examples, user input 1248 is a tap, a touch, a deep press, or a press and hold input, or the like. At FIG. 12AG, device 1200 displays a current media interface 1250 that is targeted at the Kitchen Speaker in response to user input 1248. Current media interface 1250 includes a device selection affordance 1250A (e.g., indicating the focus of the interface 1250) and playback control affordances 1250B. Thus, if a user wishes to control playback on the Kitchen speaker, rather than pull the media to the iPhone, a tap on the proximity card can be used to reveal a current media interface targeted to the Kitchen Speaker's media session.

FIGS. 12AH-12AJ illustrate exemplary interfaces for transferring playback of video content between devices. In the examples described above, reference was made to transferring playback of media, and in particular audio. In some embodiments, media content includes video content. For example, a media item can be a video file or a video stream. Thus, the techniques described above are applicable to video content as well.

For example, FIG. 12AH illustrates playback of exemplary video content 1252 on device 1200. FIG. 12AI illustrates an exemplary proximity card 1254 for transferring video content from device 1200 to another device. Proximity card 1254 is analogous to proximity card 1236 of FIG. 12Q, the description of which is hereby incorporated by reference. Similar to proximity card 1236, proximity card 1254 includes the title 1254A "Apple TV", visually indicating the name of the device that the user placed device 1200 in close proximity to. Title 1254A also visually indicates the focus of the proximity card (e.g., the device that will receive the media content in response), in this case the device named "Apple TV". Proximity card 1254 also includes an action indicator 1254D (e.g., an arrow), indicating that a user input gesture on the proximity card (e.g., in the direction of the arrow) will cause the device to perform an action. Likewise, action indicator 1254C (the text "Push to Play") indicates to a user that a user input on the proximity card 1254 will cause the device to take action. Additionally, proximity card 1254 includes a media affordance 1254B representing media content (e.g., one or more media items). In this example, media affordance 1254B includes a video screen shot (e.g., depicting a dog) of a video (e.g., 1252 of FIG. AH) currently playing on device 1200. In some examples, media affordance 1254B includes other types of visual indications of one or more media items (e.g., a video screen shot, video cover art, text, images, or other appropriate visual representations). Proximity card 1254 provides an interface that allows the user to add the device "Apple TV" to the current media session (e.g., of playback of the video media 1252).

FIG. 12AJ illustrates an exemplary result of transferring the video content depicted in FIG. 12AI from a first device 1200 to a second device 1260. In some examples, device 1260 can be a device as described above with respect to device 660 of FIG. 6. In this example, device 1260 is media device (e.g., Apple TV made by Apple Inc. of Cupertino, Calif. USA) connected to a display 1256 of device 1258 (e.g., a television). In this example, the user placed device 1200 in close proximity to device 1260, causing device 1200 to display proximity card 1254. In response to user input representing an upward swipe on proximity card 1254, playback of the video content is transferred to the device 1260. For example, device 1260 is currently playing back the video content 1252 from FIG. 12AH. In this example, device 1260 is configured to output the video content via the display of television device 1256. In some embodiments, device 1260 includes a display, which is used to playback the transferred media content.

Further, in the example depicted in FIG. 12AJ, device 1202 is currently playing back the audio portion of the video content playing back on device 1260. In some examples, device 1260 acts like a media hub, and can route video and/or audio data (e.g., for playback and output) to other devices connected to it (e.g., via wireless or wired connections). For example, as shown in FIG. 12AJ, device 1260 outputs video playback to television 1256 and audio playback (e.g., from the same media) to smart speaker 1202. In some embodiments, the device routing of a component signal (e.g., video or audio) of media content is preconfigured. For example, a user can configure device 1260 to always output audio on device 1202 and always output video on device 1256 (e.g., when a request for playback is received at either device, or a some other external device via a multi-device interface). In some embodiments, device 1260 dynamically determines the routing of a component signal (e.g., video or audio) of media content. For example, a user can configure device 1260 to always output audio on device 1202 and always output video on device 1256—however, if device 1202 is busy playing back other content, device 1260 can instead route the audio signal to be output by the speakers of television 1256. In some embodiments, device 1260 automatically detects the appropriate device (e.g., a preferred device) and automatically routes the content to that device. For example, device 1260 automatically detects speaker 1202 and automatically routes (e.g., hands off) audio playback of the audio portion of media). Likewise, device 1202, in some examples, automatically routes video to a video playback device, such as device 1260 (e.g., an Apple TV).

One of skill in the art would appreciate the numerous possible combinations of devices (e.g., two or more) that can be used to create an integrated media playback experience as described herein (e.g., with respect to FIGS. 12A-12AM). For example, the functions as described above (e.g., with respect to detecting proximity, displaying interfaces for transferring media between devices, displaying visual content, and/or outputting audible content) are not limited to being performed by a single device. In some embodiments, any number of devices are used to perform a function (e.g., and achieve a desired end result). One of skill in the art would appreciate that any number of devices can be used to perform the functions described above and, thus, to achieve the same desired end result, and the various combinations of devices possible are intended to be within the scope of this disclosure. In some examples, reducing the dependence on a single device or a limited number of devices to perform a desired media function, provides the user with a seamless and integrated media experience that can be accessed using various devices.

FIGS. 12AK-12AL illustrate exemplary interfaces for transferring a phone call between devices. In the examples described above, reference was made to transferring playback of media, and in particular audio and video. However, for example, the transfer of playback is not limited to transferring media such as songs and movies. In some embodiments, media content includes a phone call. For example, media content can be a telephone call, a voice over internet protocol "VOIP" call, a video call, or the like.

For example, FIG. 12AK illustrates an exemplary call interface 1262, displayed on device 1200. Call interface 1262 indicates that device 1200 is currently in an active phone call (e.g., a VOIP call).

FIG. 12AL illustrates an exemplary proximity card 1264 for transferring the phone call to another device (e.g., 1202). Proximity card 1264 is analogous to proximity card 1236 of FIG. 12Q, the description of which is hereby incorporated. Similar to proximity card 1236, proximity card 1264 includes the title 1264A "Kitchen Speaker", visually indicating the name of the device that the user placed device 1200 in close proximity to. Title 1264A also visually indicates the focus of the proximity card (e.g., the device that will receive the media content in response), in this case the device named "Kitchen Speaker". Proximity card 1264 also includes an action indicator 1264C (e.g., an arrow), indicating that a user input gesture on the proximity card (e.g., in the direction of the arrow) will cause the device to perform an action. Likewise, action indicator 1264D (the text "Push Call") indicates to a user that a user input on the proximity card 1264 will cause the device to take action. Additionally, proximity card 1264 includes a media affordance 1264B representing media content (e.g., a phone call). In this example, media affordance 1264B includes an image of a contact, a contact name, and a call time for the current phone call. In some examples, media affordance 1264B includes any appropriate visual indication of one or more media items (e.g., a video screen shot, video cover art, text, images, or other appropriate visual representations). Proximity card 1264 provides an interface that allows the user to add the device "Kitchen Speaker" to the current media session (e.g., of outputting audio of the phone call).

As one of skill in the art would appreciate, a phone call involves both audio output and audio input (e.g., using a microphone). In some embodiments, transferring a media item (e.g., a phone call or a video call) from one device to another device comprises transferring media output (e.g., audio or video output), but not transferring a media input function (e.g., audio or video input). For example, in the example depicted in FIG. 12AL, device 1200 can handoff audio output (e.g., so that phone call audio output is audibly output by a smart speaker 1202), but forgo handing off the media input function and continue to use its microphone to receive phone call audio (e.g., or its camera, in the case of a video call). In some embodiments, transferring a media item (e.g., a phone call or a video call) from one device to another device comprises transferring media output (e.g., audio or video output), and transferring a media input function. For example, in the example depicted in FIG. 12AL, device 1200 can handoff audio output (e.g., so that phone call audio output is audibly output by a smart speaker 1202), as well has handoff the media input function (e.g., so that smart speaker 1202 uses its microphone to receive phone call audio). In some embodiments, transferring a media item (e.g., a phone call or a video call) from one device to another device comprises transferring media input function, but not transferring a media output (e.g., audio or video output). In some embodiments, a device transfers less than all media output functions and/or media input functions. For example, if a video call is pushed to a display device with no audio output capability, the device (e.g., 1200) can transfer the visual output function to the display the device, and retain both the audio output function and the audio input function.

It should be apparent to one of skill in the art that the various interfaces and techniques described herein (e.g., with respect to FIGS. 12A-12AM) for controlling and/or transferring media content between devices is applicable to many types of media. Any media with one or more of an audio component and a visual component, and that are formatted to be communicated between electronic devices, are intended to be within the scope of this disclosure. For example, other specific examples of media that can be controlled or transferred in accordance with the techniques described herein include, but are not limited to: an electronic book (e.g., also commonly referred to as an "e-book"), a webpage, textual content (e.g., documents, spreadsheets), screen sharing (e.g., mirroring a first device's screen at a second device), and an image (e.g., photos, animations).

In certain situations, the owner of a device may not desire to allow any user that has physical access to a device to be able to control the device. For example, it may not be desirable to allow guests (e.g., via the guests' devices) to control playback on the owner's home device. FIG. 12AM illustrates an exemplary media information interface. Media information interface 1266 (also referred to as proximity card 1266) depicts an interface that is displayed, in some examples, when a guest device is placed in close proximity to a home owner's device. In some examples, a guest device is a device that is not associated with a user account that is a member of an authorized set of users (e.g., one or more). For example, an authorized set of users (e.g., user accounts) are users that have been added to a group in a device management application (e.g., a group of users 602A-602C as described above with respect to FIG. 6A). Thus, in some examples, if device 1200 is not logged into a user account associated with a user of the authorized set of users, device 1200 does not present a proximity card for controlling playback (e.g., a push proximity card, a pull proximity card, or a recently played media proximity card). Rather, in some examples, device 1200 displays proximity card 1266 in response to being placed in close proximity to a device that is associated with an authorized set of users.

Proximity card 1266 includes the title 1266A "Kitchen Speaker", visually indicating the name of the device (e.g., device 1202) that is the target of the proximity card (e.g., whose media playback information is presented on the card). Additionally, proximity card 1266 includes a media affordance 1266B representing media content (e.g., one or more media items). In this example, media affordance 1266B includes album art for the track titled "How Many Times" by the artist "Jambug" (e.g., that is currently playing on device 1202). In some examples, media affordance 1266B includes other types of visual indications of one or more media items (e.g., text, images, or other appropriate visual representations). In this example, the media content represented (e.g., by affordance 1266B) by the proximity card 1266 is content that is currently playing on the device 1202 (e.g., the Kitchen Speaker). Proximity card 1266 also includes a textual identification 1266C of the currently playing media. Thus, proximity card 1266 provides an informational interface that allows a guest to view information about media playback on a device in close proximity, without being able to affect the playback. For example, a swipe on proximity card 1266 will not push or pull media playback to device 1200.

FIGS. 13A-13F is a flow diagram illustrating a method for displaying a media information interface using an electronic device in accordance with some embodiments. Method 1300 is performed at a device (e.g., 100, 300, 500) with a display. Some operations in method 1300 are, optionally, combined, the order of some operations are, optionally, changed, and some operations are, optionally, omitted.

As described below, method 1300 provides an intuitive way for displaying a media information interface. The method reduces the cognitive burden on a user for displaying a media information interface, thereby creating a more efficient human-machine interface. For battery-operated computing devices, enabling a user to display a media information interface faster and more efficiently conserves power and increases the time between battery charges.

The electronic device (e.g., 1200) detects (1302), while connected to a second device (e.g., 1202), an indication that a physical proximity between the first device and the second device satisfies a proximity condition. For example, the devices are connected when the second device is in Bluetooth range of the first device, or is connected to the same Wi-Fi network as the first device. In some examples, the proximity condition is satisfied when a physical proximity of the electronic device (e.g., 1200) is within a proximity zone of the second device (e.g., such as proximity zone 1204 of FIG. 12B). In some embodiments, the electronic device (e.g., device 1200 or 1202) detects whether the proximity condition is satisfied using a near-field communication technique. In some embodiments, the electronic device (e.g., 1200) that determines whether the proximity condition is satisfied communicates the determination to the other device (e.g., 1202).

In accordance with detecting that the physical proximity satisfies the proximity condition (e.g., the electronic device is within the proximity zone 1204 of FIG. 12B), the electronic device (e.g., 1200) displays (1304), on the display (e.g., 1206), a media information interface (e.g., 1208 of FIG. 12B).

Using a detection of physical proximity for displaying a media information interface allows the user to efficiently invoke a device-specific user interface with fewer required user inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the indication is detected while the first device (e.g., 1200) is not playing media content and while the second device (e.g., 1202) is not playing media content. In some embodiments, displaying the media information interface (e.g., 1208) comprises displaying (1306), on the display (e.g., 1206), a first affordance (e.g., 1208A) representing a first media item that was recently played on the second device. In some embodiments, the electronic device (e.g., 1200) receives (1308) a first user input (e.g., 1210) representing selection of the first affordance. In response to receiving the first user input (e.g., 1210), the electronic device (e.g., 1200) transmits (1310) an instruction to the second device (e.g., 1202) to initiate playback of the first media item.

In some embodiments, the electronic device (e.g., 1200) receives (1312) a second user input (e.g., 1214 of FIGS. 12E and 12F) representing a directional swipe gesture on the first affordance (e.g., 1208A). In response to receiving the second user input (e.g., 1214), and while continuing to display the first affordance (e.g., 1208A of FIG. 12F), the electronic device displays (1314), on the display (e.g., 1206), a second affordance (e.g., 1208C of FIG. 12F) representing a second media item that was recently played on the second device, wherein the second affordance was not displayed prior to receiving the second user input (e.g., 1214 of FIG. 12F).

In some embodiments, the indication is detected while the first device (e.g., 1200) is playing a third media item (e.g., 1220A of FIG. 12H) and while the second device (e.g., 1202) is playing a fourth media item (e.g., 1222 of FIG. 12H) different than the third media item. In some embodiments, displaying the media information interface (e.g., 1224 of FIG. 12I) comprises displaying (1316), on the display (e.g., 1206), a third affordance (e.g., 1224A of FIG. 12I) associated with the third media item (e.g., 1220A) currently playing on the first device (e.g., 1200). In some embodiments, the electronic device (e.g., 1200) receives (1318) a third user input (e.g., 1226 of FIG. 12J) representing selection of the third affordance (e.g., 1224A). In response to receiving the third user input (e.g., 1226), the electronic device (e.g., 1200) transmits (1320) an instruction to the second device (e.g., 1202) to initiate playback of the third media item (e.g., 1220A).

In some embodiments, further in response to receiving the third user input (e.g., 1226), the electronic device (e.g., 1200) ceases playing (1322) the third media item (e.g., 1220A) on the first device (e.g., 1200).

In some embodiments, further in response to receiving the third user input (e.g., 1226), the electronic device (e.g., 1200) displays (1324), on the display, playback control affordances (e.g., 1228B of FIG. 12K) that control the playback of the third media item (e.g., 1228A of FIG. 12K, or 1230C of FIG. 12L) on the second device (e.g., 1202).

In some embodiments, the indication is detected while the first device (e.g., 1200) is playing a fifth media item (e.g., 1220A of FIG. 12P) and while the second device (e.g., 1202)

is not playing media content. In some embodiments, displaying the media information interface (e.g., 1236 of FIG. 12Q) comprises displaying (1326), on the display, a fourth affordance (e.g., 1236C of FIG. 12Q) representing the fifth media item (e.g., represented by 1236C of FIG. 12Q). In some embodiments, the electronic device (e.g., 1200) receives (1328) a fourth user input (e.g., 1238 of FIGS. 12R and 12S). In some embodiments, the electronic device (e.g., 1200) determines (1330) whether the fourth user input (e.g., 1238) represents a directional swipe gesture on the fourth affordance (e.g., 1236C). In some embodiments, the swipe gesture is an upward swipe. In some embodiments, the swipe gesture is a swipe in a direction toward the second device (e.g., 1202). For example, the swipe gesture would depend on the orientation of the first device (e.g., 1200) relative to the second device (e.g., 1202). In response to receiving the fourth user input (e.g., 1238), and in accordance with a determination that the fourth user input represents a directional swipe gesture on the fourth affordance (e.g., 1236C) (1332): the electronic device (e.g., 1200) transmits (1334) an instruction to the second device (e.g., 1202) to initiate playback of the fifth media item (e.g., represented by affordance 1236C of FIG. 12Q, or by 1220A of FIG. 12C). In some embodiments, further in response to the fourth user input (e.g., 1236C), and in accordance with a determination that the fourth user input represents a directional swipe gesture on the fourth affordance (e.g., 1236C), the electronic device (e.g., 1200) ceases playback (1336), on the first device (e.g., 1200), of the fifth media item. In some embodiments, in response to receiving the fourth user input (e.g., 1236C), and in accordance with a determination that the fourth user input does not represent a directional swipe gesture on the fourth affordance (e.g., 1236C) (1338): the electronic device (e.g., 1200) forgoes (1340) transmitting an instruction to the second device (e.g., 1202) to initiate playback of the fifth media item. In some embodiments, further in response to receiving the fourth user input (e.g., 1236C), and in accordance with a determination that the fourth user input does not represent a directional swipe gesture on the fourth affordance (e.g., 1236C), the electronic device (e.g., 1200) continues playback (1342), on the first device (e.g., 1200), of the fifth media item (e.g., represented by affordance 1236C of FIG. 12Q, or by 1220A of FIG. 12C).

In some embodiments, the first device (e.g., 1200) ceases playback of the fifth media item at a playback time (e.g., as illustrated by 1220D of FIG. 12V) of the fifth media item (e.g., represented by affordance 1236C of FIG. 12Q, or by 1220A of FIG. 12C). In some embodiments, transmitting the instruction to the second device (e.g., 1202) to initiate playback of the fifth media item comprises transmitting (1344) an instruction to the second device to begin playback at approximately the playback time of the fifth media item. For example, so that the playback is perceived as continuous by a listener. For example, the first device instructs the second device to begin playback at the same time that the first device ceases playback of the fifth media item, a certain amount of time after the time that the first device ceases playback, or within a range of time based on the time that the first device ceases playback.

In some embodiments, displaying the media information interface comprises displaying, on the display (e.g., 1206), a fifth affordance (e.g., 1220C of FIG. 12W). In some embodiments, the electronic device (e.g., 1200) determines whether the fourth user input (e.g., 1239) represents a selection of the fifth affordance (e.g., 1220C of FIG. 12W. In some embodiments, in response to receiving the fourth user input, and in accordance with a determination that the fourth user input represents a selection of the fifth affordance, displaying, on the display (e.g., 1206), a multi-device interface (e.g., 610 of FIG. 6J). In some embodiments, further in response to receiving the fourth user input, and in accordance with a determination that the fourth user input does not represent a selection of the fifth affordance, the electronic device (e.g., 1200) forgoes displaying the multi-device interface.

In some embodiments, the indication is detected while the first device (e.g., 1200) is not playing media content and while the second device (e.g., 1202) is playing a sixth media item (e.g., represented by 1242B of FIG. 12Y). In some embodiments, displaying the media information interface (e.g., 1242 of FIG. 12Y) comprises displaying (1346), on the display (e.g., 1206), a sixth affordance (e.g., 1242B of FIG. 12Y)) representing the sixth media item. In some embodiments, the electronic device (e.g., 1200) receives (1348) a fifth user input (e.g., 1244 of FIGS. 12Z and 12AA). In some embodiments, the electronic device (e.g., 1200) determines whether the fifth user input represents a directional swipe gesture on the fifth affordance (e.g., 1242B). In some embodiments, the swipe gesture is a downward swipe. In some embodiments, the swipe gesture is a swipe in a direction away from the second device (e.g., 1202). For example, the directional swipe would depend on the orientation of the first device relative to the second device. In some embodiments, in response to receiving the fifth user input (e.g., 1244), and in accordance with a determination that the fifth user input represents a directional swipe gesture on the sixth affordance (1350): the electronic device (e.g., 1200) transmits (1352) an instruction to the second device (e.g., 1202) to cease playback of the sixth media item. In some embodiments, further in response to receiving the fifth user input (e.g., 1244), and in accordance with a determination that the fifth user input represents a directional swipe gesture on the sixth affordance, electronic device (e.g., 1200) initiates playback (1354), on the first device (e.g., 1200), of the sixth media item (e.g., represented by 1242B of FIG. 12AA). For example, pulling on a displayed proximity card causes playback of media from the second device to transfer to the first device. In some embodiments, in response to receiving the fifth user input, and in accordance with a determination that the fifth user input does not represent a directional swipe gesture on the sixth affordance (1356): the electronic device (e.g., 1200) forgoes transmitting (1358) an instruction to the second device (e.g., 1202) to cease playback of the sixth media item. In some embodiments, further in response to receiving the fifth user input, and in accordance with a determination that the fifth user input does not represent a directional swipe gesture on the sixth affordance: the electronic device (e.g., 1200) forgoes initiating playback (1360), on the first device (e.g., 1200), of the sixth media item.

In some embodiments, the electronic device (e.g., 1200) determines (1362) whether the fifth user input (e.g., 1248 of FIG. 12AF) represents a selection (e.g., a tap, touch, press, deep press, or tap and hold input) of the sixth affordance (e.g., 1242B of FIG. 12AF). In some embodiments, further in response to receiving the fifth user input, and in accordance with a determination that the fifth user input (e.g., 1248) represents a selection of the sixth affordance, the electronic device (e.g., 1200) displays (1364), on the display (e.g., 1206), playback control affordances (e.g., 1250B of FIG. 12AG) for controlling the playback of the sixth media item (e.g., represented by 1242B of FIG. 12AF) on the second device (e.g., 1202, represented by 1250A of FIG.

12AG). In some embodiments, in accordance with a determination that the fifth user input does not represent a selection of the sixth affordance, the electronic device (e.g., 1200) forgoes displaying (1366), on the display (e.g., 1206), playback control affordances (e.g., 1250B of FIG. 12AG) for controlling the playback of the sixth media item on the second device (e.g., 1202).

In some embodiments, the second device (e.g., 1202) ceases playback of the sixth media item (e.g., represented by 1246A of FIG. 12AD) at a playback time (e.g., 1246C of FIG. 12AD) of the sixth media item. In some embodiments, initiating playback, on the first device (e.g., 1200), of the sixth media item comprises beginning playback at approximately the playback time (e.g., 1246C of FIG. 12AD) of the sixth media item. In some examples, the transfer of playback from the second device to the first device is perceived as continuous by a listener. For example, the first device can begin playback at the same time that the second device ceases playback, a certain amount of time after the time that the second device ceases playback, or within a range of time based on the time that the second device ceases playback.

In some embodiments, initiating playback, on the first device (e.g., 1200), of the sixth media item (e.g., represented by 1246A of FIG. 12AD) comprises displaying, on the display (e.g., 1206): an identification of the sixth media item (e.g., 1246A of FIG. 12AD), and playback control affordances (e.g., 1246D of FIG. 12AD) for controlling playback of the sixth media item on the first device (e.g., 1200).

In some embodiments, the first device (e.g., 1200) is connected to a plurality of devices, wherein the plurality of devices includes the second device (e.g., 1202), and wherein the displayed media information interface (e.g., 1208, 1224, 1236, or 1242) corresponds to the second device (e.g., 1202).

In some embodiments, the first device (e.g., 1200) is connected to the second device (e.g., 1202) via a wireless communication link.

In some embodiments, the media information interface (e.g., 1236, or 1242) comprises an indication (e.g., 1236B, 1236D, 1242C, and/or 1242D) that the media content playing back on the first device (e.g., 1200) or the second device (e.g., 1202) can be transferred to the other device not playing back the media content. For example, proximity cards can include an indication (e.g., text, an arrow) that the media content can be "pushed" to the second device (e.g., an up arrow) or "pulled" from the second device (e.g., down arrow).

In some embodiments, a media item is selected from the group consisting of an audio file, an audio stream, a video file, a video stream, a phone call, and a video call.

In some embodiments, the first device (e.g., 1200) is associated with a first user account (e.g., user 602A of FIG. 6A), and the second device (e.g., 1202) is associated with a set of user accounts. In some embodiments, the set of user accounts includes one or more user accounts. In some embodiments, further in accordance with detecting that the physical proximity satisfies the proximity condition: in accordance with a determination that the first user account is a member of the set of user accounts, the electronic device (e.g., 1200) displays (1368) an indication (e.g., 1236B, 1236D, 1242C, and/or 1242D) that media playback can be transferred between the first device (e.g., 1200) and the second device (e.g., 1202). For example, the indication provides a visual indication that media playback can be pushed from the first device to the second, or pulled from the second device to the first. In some embodiments, the device also displays playback control affordances (e.g., 1220D of FIG. 12H). In some embodiments, in accordance with a determination that the first user account is not a member of the set of user accounts, the electronic device (e.g., 1200) forgoes displaying (1370) the indication (e.g., 1236B, 1236D, 1242C, and/or 1242D) that media playback can be transferred between the first device and the second device. For example, the electronic device can instead display an interface 1266 as shown in FIG. 12AM. In some examples, interface 1266 includes an indication of what is now playing on the second device, but does not include an affordance that can be swiped to transfer playback, nor does it include arrows prompting a swipe gesture. In some embodiments, the device also forgoes displaying playback controls (e.g., as shown in FIG. 1266).

In some embodiments, in accordance with a determination (e.g., by device 1200 or 1202) that the physical proximity between the first device (e.g., 1200) and the second device (e.g., 1202) has satisfied the proximity condition continuously for a threshold amount of time, the first device automatically transfers (1372) playback of a media item between the first device and the second device. In some embodiments, automatically transferring comprises transferring without further user input and/or without requiring an additional condition be met. In some embodiments, in accordance with a determination that the physical proximity between the first device and the second device has not satisfied the proximity condition continuously for a threshold amount of time, the electronic device (e.g., 1200) forgoes automatically transferring (1374) playback of a media item between the first device and the second device.

Note that details of the processes described above with respect to method 1300 (e.g., FIGS. 13A-13F) are also applicable in an analogous manner to the methods described below/above. For example, method 700, 900, 1100, 1500, 1700, 1800, 2000, 2200, 2400, 2600, 2800, 3000, 3200, 3400, 3600, 3800, and 3900 optionally includes one or more of the characteristics of the various methods described above with reference to method 1300. For brevity, these details are not repeated below.

FIGS. 14A-14M illustrate exemplary techniques for controlling a device, in accordance with some embodiments. The user interfaces in these figures are used to illustrate the processes described below, including the processes in FIGS. 15A-15C.

FIG. 14A illustrates an exemplary device 1400, in accordance with some embodiments. In some embodiments, device 1400 includes one or more features of devices 100, 300, 500, or 580. In some embodiments, as shown in FIG. 14A, device 1400 includes a touch-sensitive surface 1402. In this example, the touch-sensitive surface is arranged on top of the device, which is a smart speaker device sitting on surface. In some embodiments, device 1400 includes a touch-sensitive display.

Figure 14B:
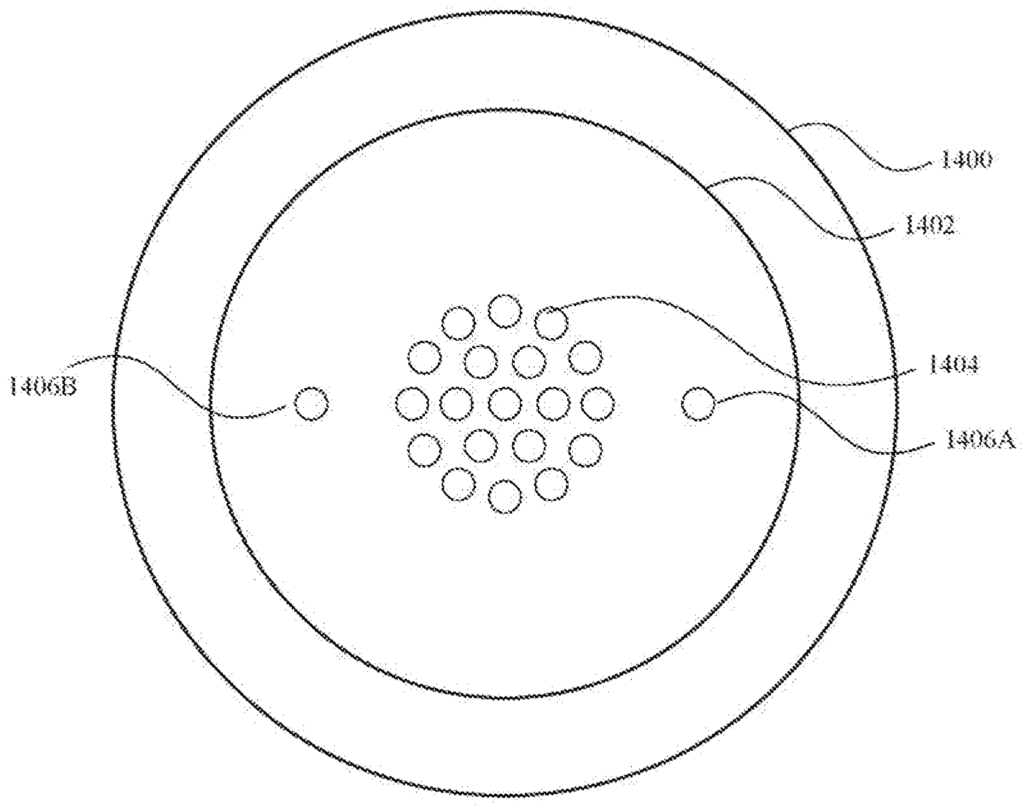

FIG. 14B illustrates an overhead view of exemplary device 1400. Touch-sensitive surface 1402 can be seen. Also visible are LED indicators 1404, 1406A, and 1406B. In some examples, one or more of the LED indicators on device 1400 are used to visually indicate a status of the device. For example, touch-sensitive surface 1402 can respond differently to the same user input (e.g., a tap at the same location) based on a state of device 1400 (e.g., at different times). Thus, device 1400 can use the LED indicators to visually communicate the current status of the device (e.g., and in turn, indicate the effect that a user input (e.g., on touch-sensitive surface 1402) will have on the device). In some examples, one or more of the following properties of one or more LED indicators are controlled by the device 1400 to communicate a state of the device: illumination (e.g., on or off), brightness, color, diameter, and shape. In some examples, other visual properties of the LED indicators can be controlled (e.g., adjusted) in order to indicate a device state (e.g., a media playback status, a state of a touch-sensitive surface or a touch-sensitive display). In some embodiments, the LED indicators are a display screen (e.g., 112 of FIG. 1B, 504 of FIG. 5A). For example, instead of using LED indicators, a device 1400 can include a display screen, such as an organic light-emitting diode (OLED) panel, an LED panel, an LCD panel, or the like. In some embodiments, LED indicators are any component(s) that can be controlled by an electronic device (e.g., 1400) to output a visual indication.

FIGS. 14C-14L depict various exemplary states of device 1400, and actions performed by the device in response to user input in accordance with the states.

Figure 14C:
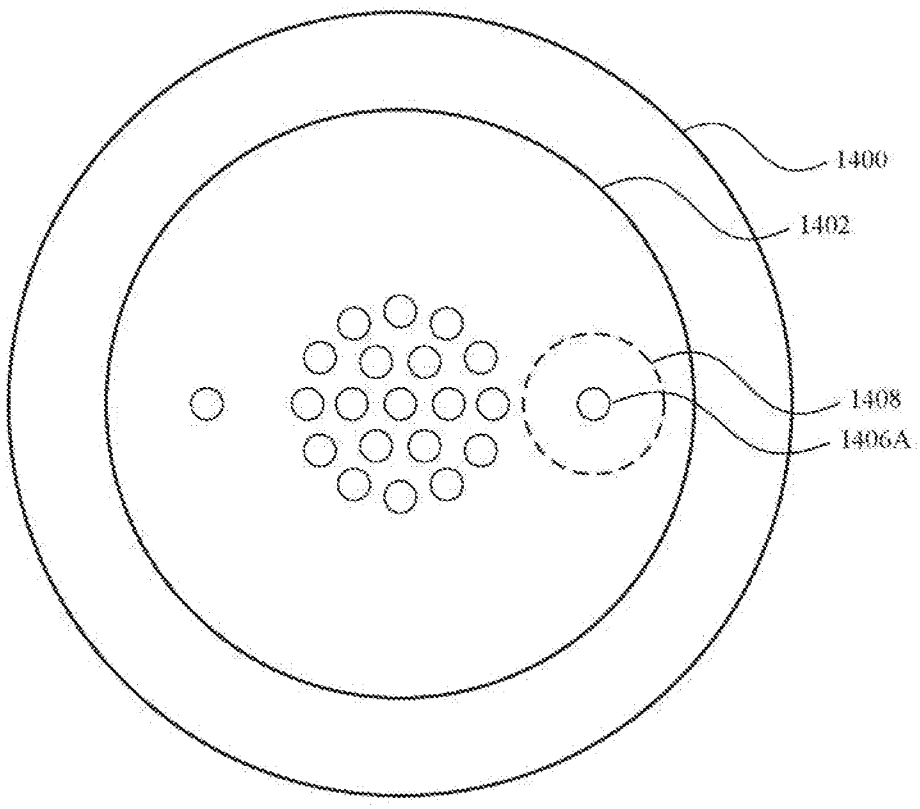

FIG. 14C illustrates the overhead view shown in FIG. 14B, but where device 1400 receives a user input 1408 at a location on the touch-sensitive surface 1402. In this example, the user input 1408 is received at a location over LED indicator 1406A. In this example, device 1400 is not playing back media content at the time when user input 1408 is received. For example, device 1400 is in a paused state during a media playback session, or is not currently a part of a media playback session.

Figure 14D:
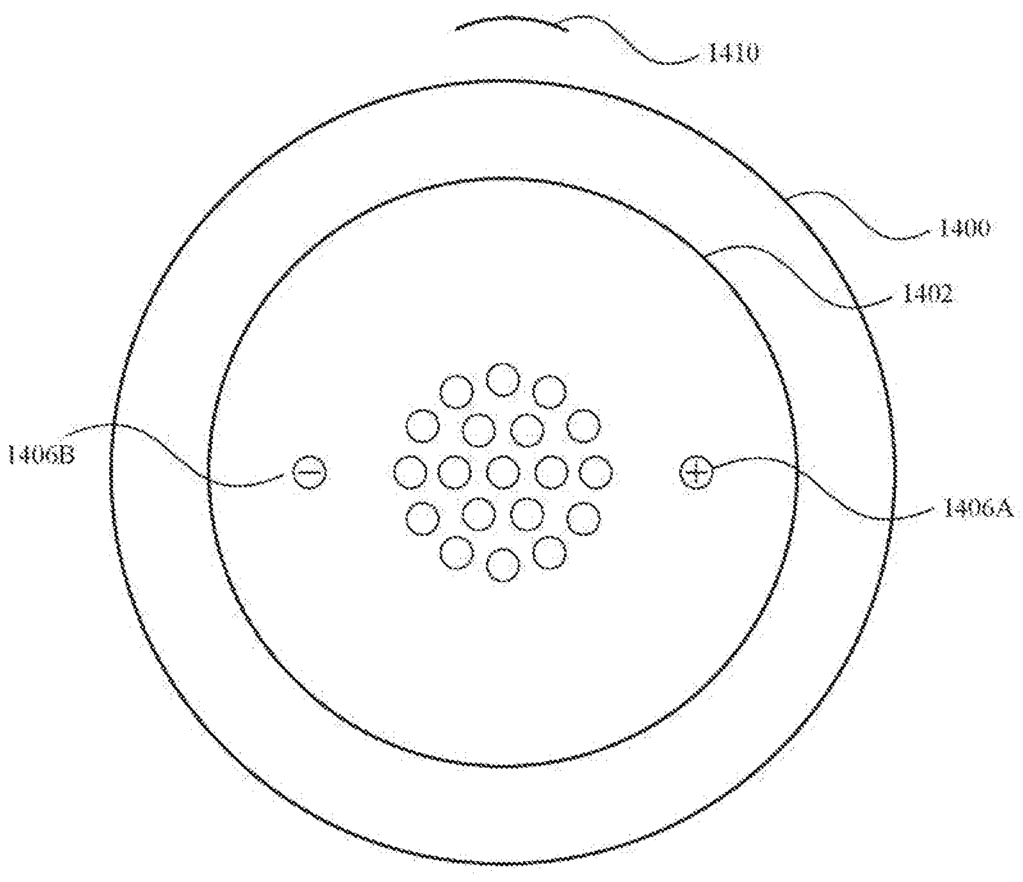

At FIG. 14D, in response to receiving user input 1408, device 1400 initiates playback of media. For example, device is now outputting media (e.g., via a speaker), as represented graphically by sound wave 1410 in FIG. 14D. In this example, device 1400 has resumed playing media playback that was paused. In some examples, if no media playback is currently paused, device 1400 still initiates playback of media in response to user input 1408. For example, the device 1400 can initiate playback of recently played media, default media (e.g., configured by user, or automatically selected), favorite media associated with a user account, preconfigured media (e.g., configured to playback during a predetermined time, day), or the like. In some examples, device 1400 updates the LED indicators to visually indicate that the device is currently playing back media content. In this example, indicator 1406A now includes a "+" icon and indicator 1406B now includes a "−" icon. In some examples, the indicators 1406A and 1406B of FIG. 14D visually communicate that the device is currently playing back media (e.g., outputting an audio signal). One of skill would appreciate that other visual indications (e.g., icons) and/or indicators (e.g., indicator 1406) can be used to visually communicate that the device is currently playing back media. Further, in some examples, indicators 1406A and 1406B of FIG. 14D visually communicate that they can be touched in order to adjust volume. One of skill would appreciate that other indications (e.g., icons) and/or indicators (e.g., indicator 1406) can be used to visually communicate the state (e.g., function in response to user input) of a touch-sensitive or touch-sensitive display.

In some embodiments, the "+" and "−" indicators 1406A and 1406B cease to be displayed in response to device 1400 performing a voice assistant function. For example, in response to detecting voice user input (e.g., "Hey Siri"), the device can cease displaying one or more of the icons within indicator 1406A and 1406B. In some examples, the illumination of one or more of indicators 1404, 1406A, and 1406B changes during a voice assistant function. For example, indicators 1404, 1406A, and 1406B can turn off, be illuminated, change color, or the like in response to a voice assistant function being performed on device 1400.

Figure 14E:
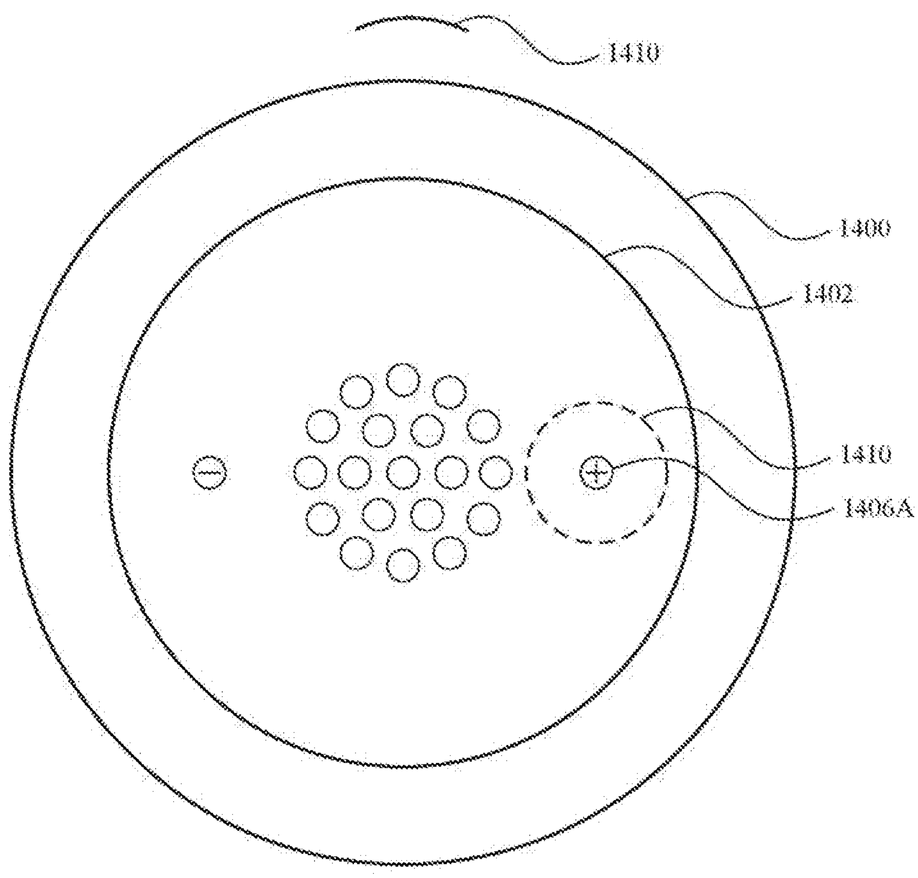

FIG. 14E illustrates the overhead view shown in FIG. 14D, but where device 1400 receives a user input 1410 at a location on the touch-sensitive surface 1402. In this example, the user input 1410 is received at a location over LED indicator 1406A, which is the same location as user input 1408. In this example, device 1400 (as shown in FIG. 14D) is currently playing back media content at the time when user input 1410 is received. For example, device 1400 is included in a media playback session (e.g., and is playing music audio, or the audio component of video playback).

In response to receiving user input 1410, device 1400 adjusts a volume of device 1400. For example, as illustrated by the volume level meter 1412 in FIG. 14F, device 1400 adjusts (e.g., increases) volume from a first level 1412A (e.g., the volume immediately prior to the user input 1410) to a second level 1412B (e.g., the volume immediately subsequent to the user input 1410), in response to user input 1410.

FIGS. 14G-14J illustrate exemplary techniques for expanding the size of a responsive area on a touch-sensitive surface, in accordance with some embodiments.

Figure 14F:
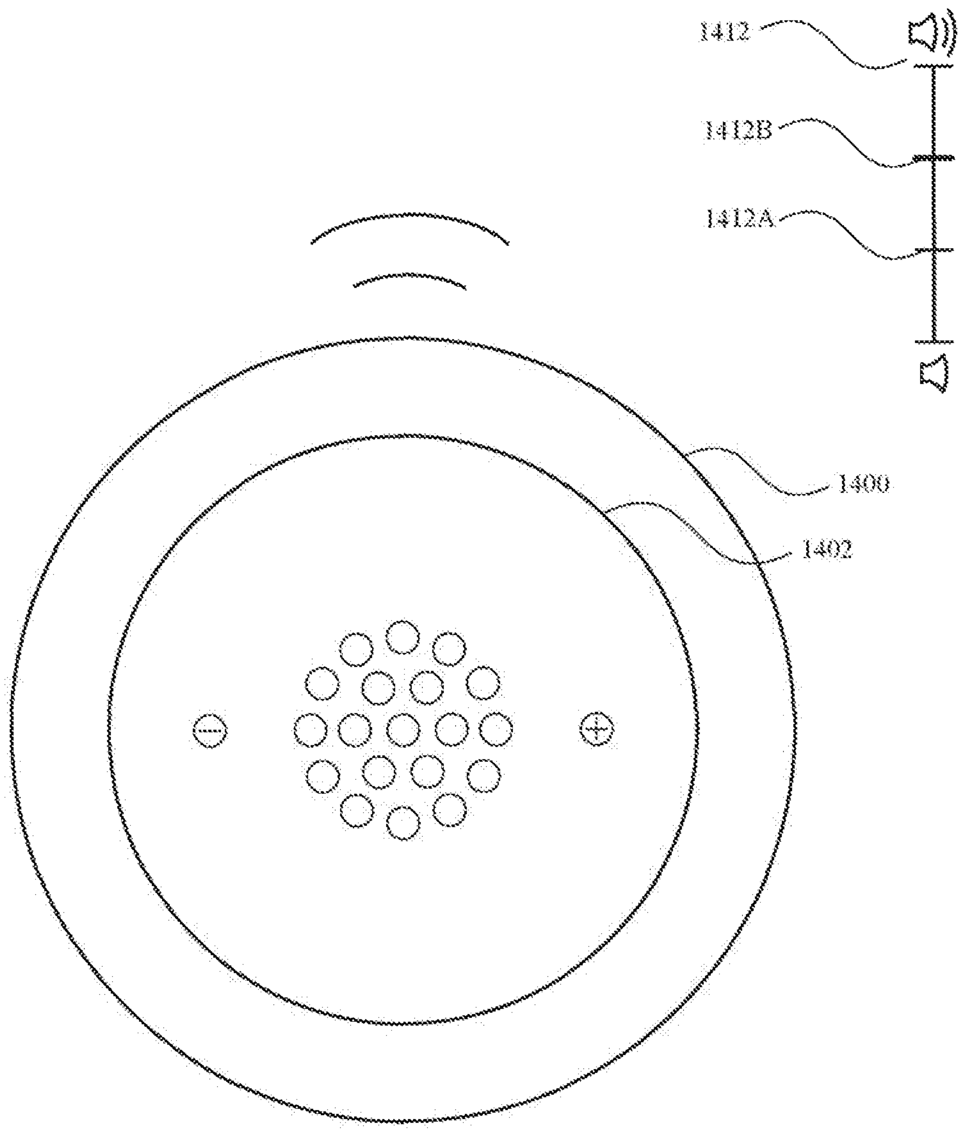
Figure 14G:
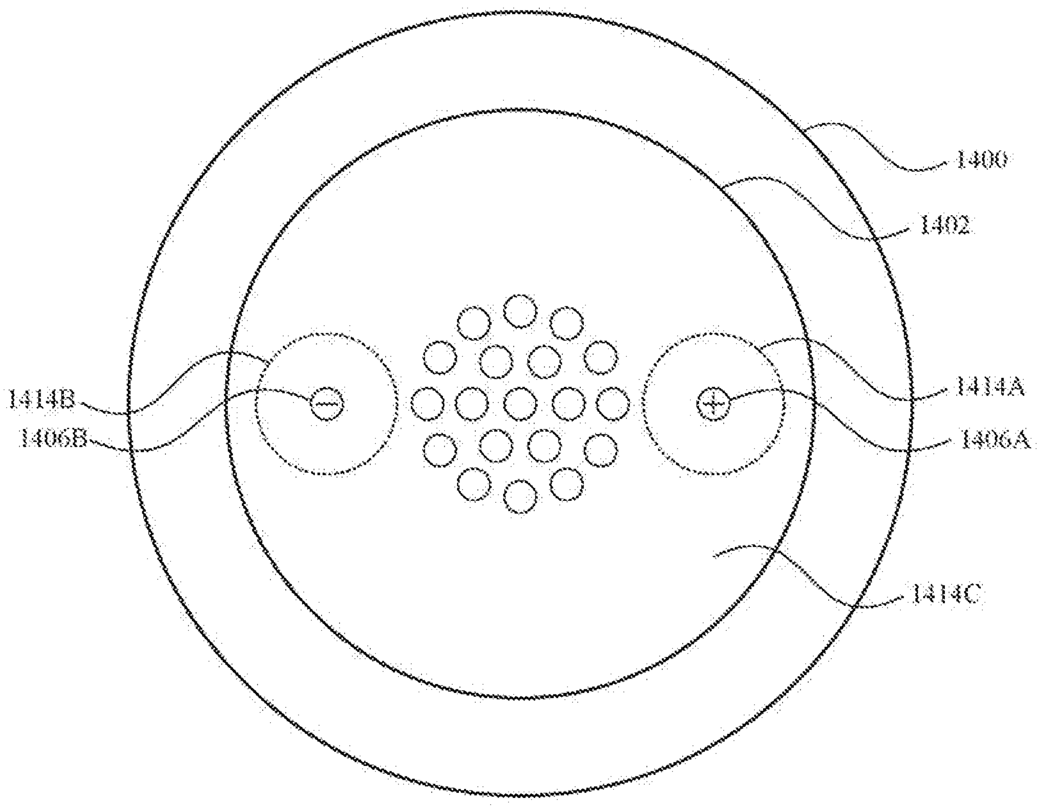

FIG. 14G illustrates an overhead view of device 1400 while it is currently playing back media content (e.g., as described in FIG. 14F). Additionally, FIG. 14G depicts the boundaries of touch-sensitive regions 1414A and 1414B over indicators 1406A and 1406B, respectively. In some examples, touch-sensitive region boundaries are not displayed or visible on an electronic device (e.g., 1400). For instance, in this example, the regions 1414A and 1414B are included for reference only and are not displayed by device 1400. In some examples, an electronic device displays boundaries of one or more touch-sensitive regions (e.g., 1414A or 1414B).

Figure 14H:
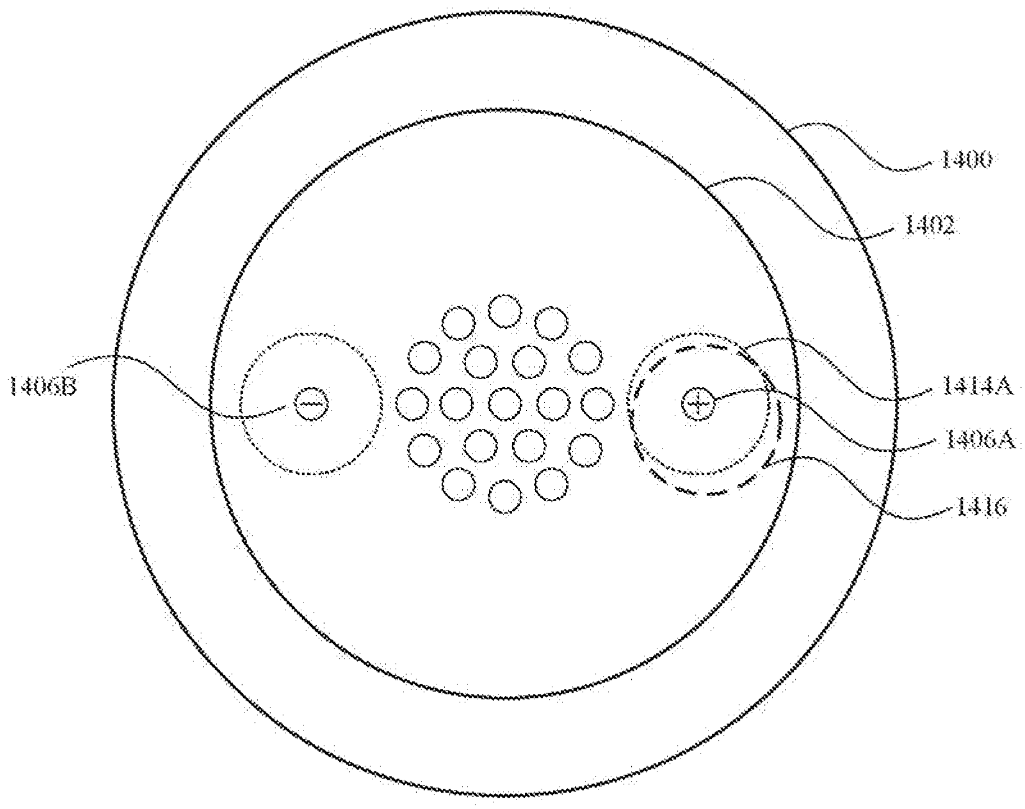

At FIG. 14H, the device (as shown in FIG. 14G) receives user input 1416 over indicator 1406A. In this example, user input 1416 is a touch on touch-sensitive surface 1402. As can be seen, at least a portion of user input 1416 is included within the touch-sensitive region 1414A. In response to user input 1416, device 1400 increases a volume (e.g., as shown in FIG. 14F).

Figure 14I:
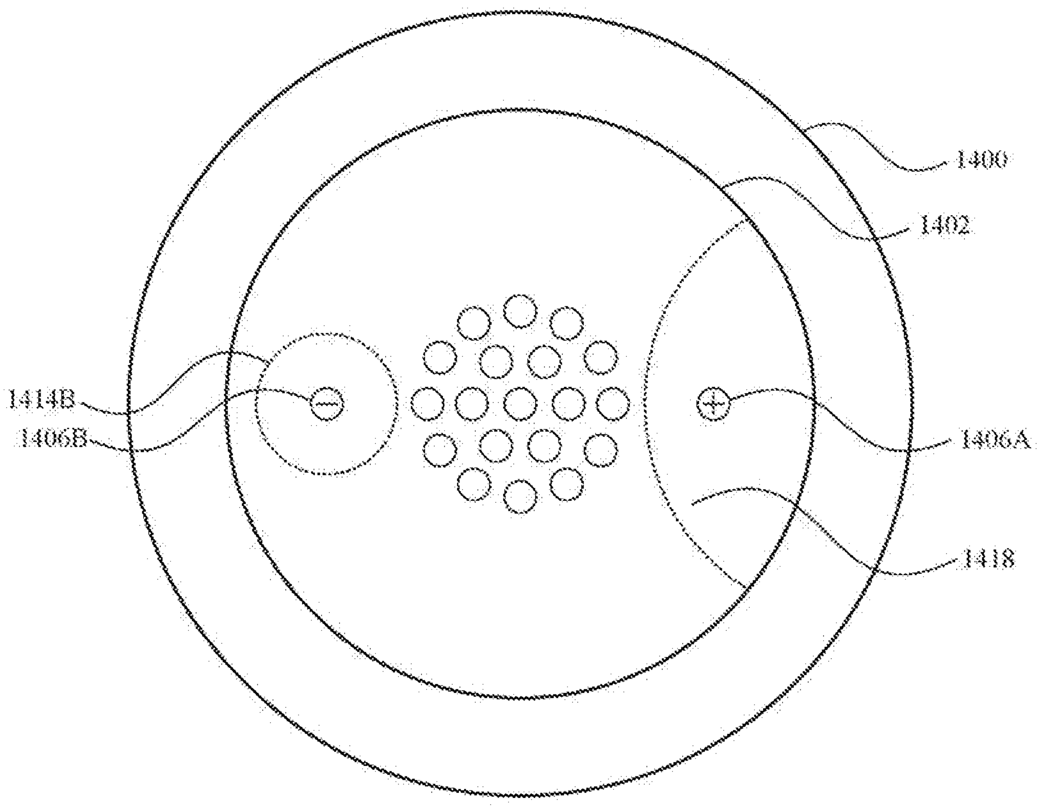

In some embodiments, further in response to receiving user input 1416 on an indicator 1406A, device 1400 temporarily expands the touch-sensitive region 1414A to form an expanded touch-sensitive region (also referred to as an "expanded region"). An exemplary expanded region 1418 is shown in FIG. 14I. As can be seen in FIG. 14I, the expanded region 1418 covers are larger area of touch-sensitive surface 1402 than region 1414A did (e.g., as shown in FIG. 14G). In some examples, an expanded region replaces a region. For instance, in this example, expanded region 1418 (e.g., which will perform the same function as region 1414A, in response to a touch within it) covers the area (and more) that region 1414A occupied, thus replacing it.

In some embodiments, the device ceases to maintain the expanded touch-sensitive region after a predetermined amount of time. In some embodiments, the device ceases to maintain the expanded touch-sensitive region after a predetermined amount of time since the last user input within the expanded region. For example, subsequent user inputs (e.g., taps) within the expanded region would cause a measure (e.g., a timer) of the amount of time since the last user input to be reset after each detect touch input. In this example, the expanded region returns to its normal size (e.g., 1414A) after the amount of time reaches the predetermined amount of time after the final user input with the expanded region.

Figure 14J:
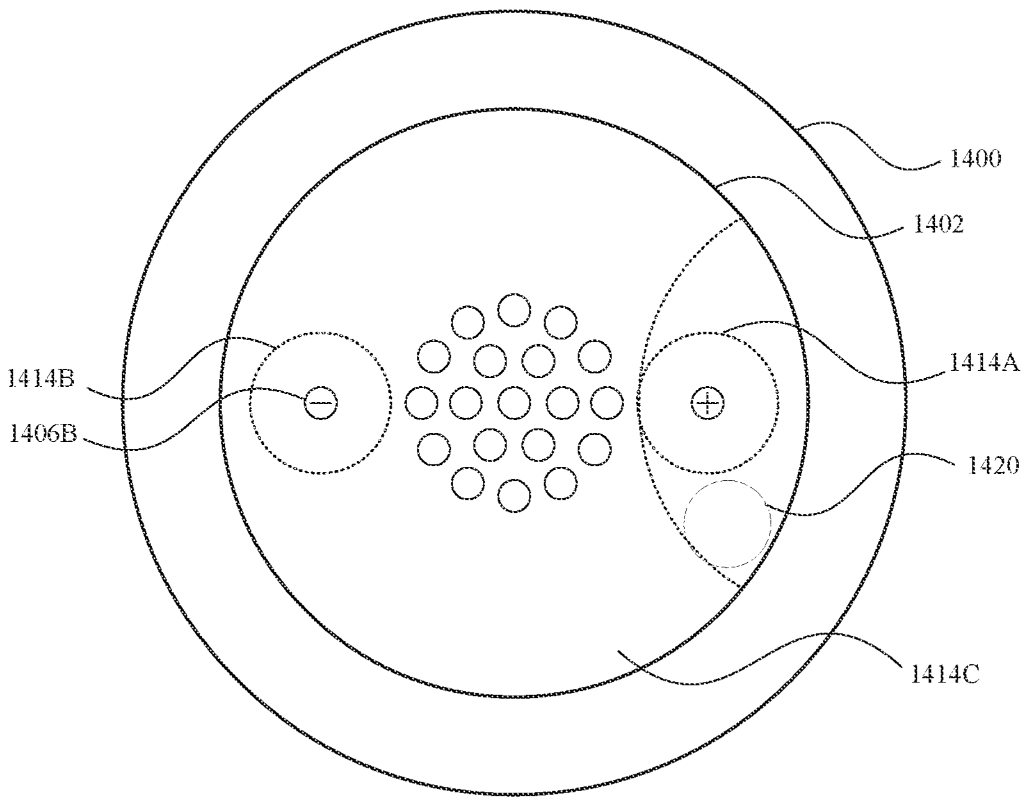
Figure 14K:
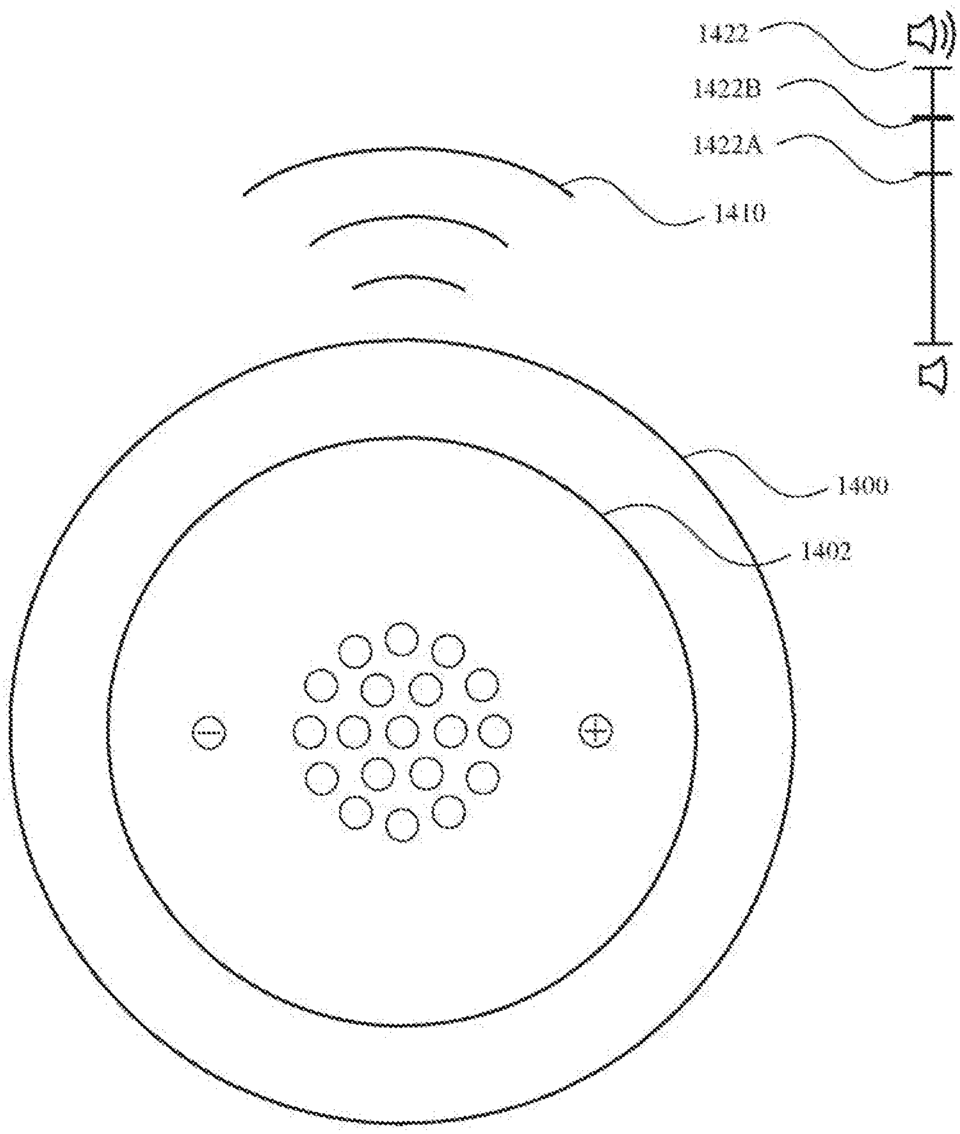

At FIG. 14J, device 1400 receives a second user input 1420 within the expanded region 1418, but outside of region 1414A. In some examples, in accordance with a determination that the second user input (e.g., 1420) was received during the predetermined amount of time after detecting the first user input (e.g., 1416), device 1400 adjusts (e.g., increases) a volume of the currently playing media. For example, as illustrated by the volume level meter 1422 in FIG. 14K, device 1400 adjusts volume from a first level 1422A (e.g., the volume immediately prior to the user input 1420) to a second level 1422B (e.g., the volume immediately subsequent to the user input 1420), in response to user input 1420.

In some examples, in accordance with a determination that the second user input (e.g., 1420) was not received during the predetermined amount of time after detecting the first touch, device 1400 ceases playing media. For example, if user input 1420 was received after a predetermined amount of time after a touch that caused the region 1414A to expand (or a subsequent touch within the expanded region 1418), and was not within the region 1414A, then the volume is not increased because the temporary expansion (e.g., increase in responsive area on a touch-sensitive surface) ended before the user input 1420 was received. In some examples, device 1400 ceases playback in response to user input 1420, when it is received after the predetermined amount of time, and is outside of the second region. For instance, in the example shown in FIG. 14J, user input 1420 is within a region 1414C that is configured to cause device 1400 to pause media playback (or resume paused playback). Thus, in response to user input 1420 when it is received after the predetermined amount of time, and is outside of the second region, device 1400 pauses playback.

Figure 14L:
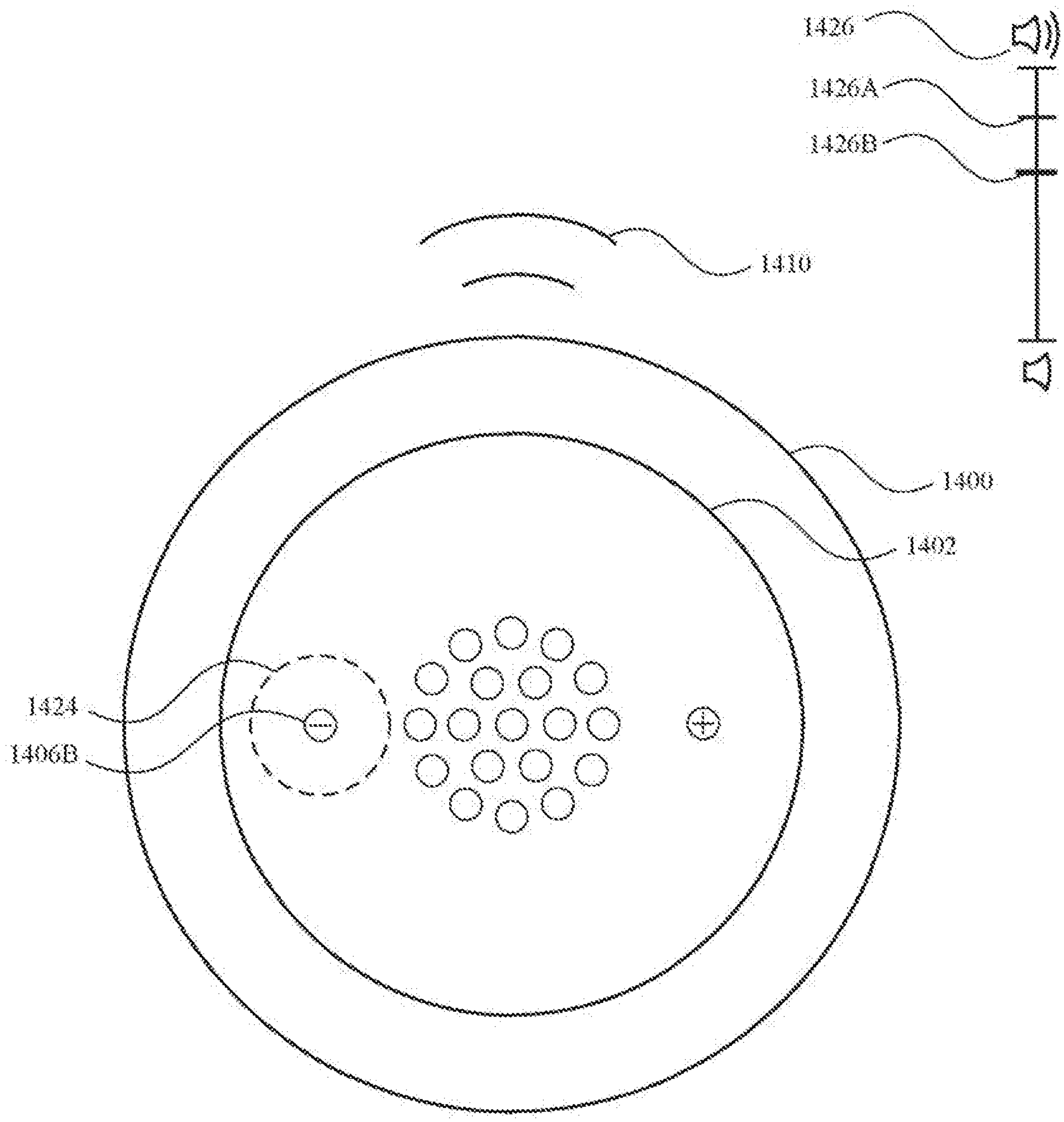

FIG. 14L illustrates an exemplary technique for adjusting the volume of a device. While the description above referenced increasing a volume of device 1400 in response to user input on a touch-sensitive surface, FIG. 19L illustrates an exemplary technique for lowering the volume of device 1400. In response to receiving user input 1410, device 1400 adjusts a volume of device 1400. For example, as illustrated by the volume level meter 1426 in FIG. 14L, device 1400 adjusts volume from a first level 1426A (e.g., the volume immediately prior to the user input 1424) to a second level 1426B (e.g., the volume immediately subsequent to the user input 1424, lower than level 1426A), in response to user input 1424.

In some embodiments, device 1400 includes a plurality of volume levels. For example, device 1400 can maintain e.g., store in memory) a volume level for a media playback function, and maintain a volume level for a voice assistant function. In some examples, the plurality of volume levels are each different. For example, device 1400 can adjust a first volume level (e.g., of media playback) to 0% of maximum (e.g., muted, no sound is produced by a speaker of device 1400) while a second volume level is set to a non-zero value of 50% of maximum (e.g., a maximum output level of the speaker, or a maximum level of a volume level meter).

Figure 14M:
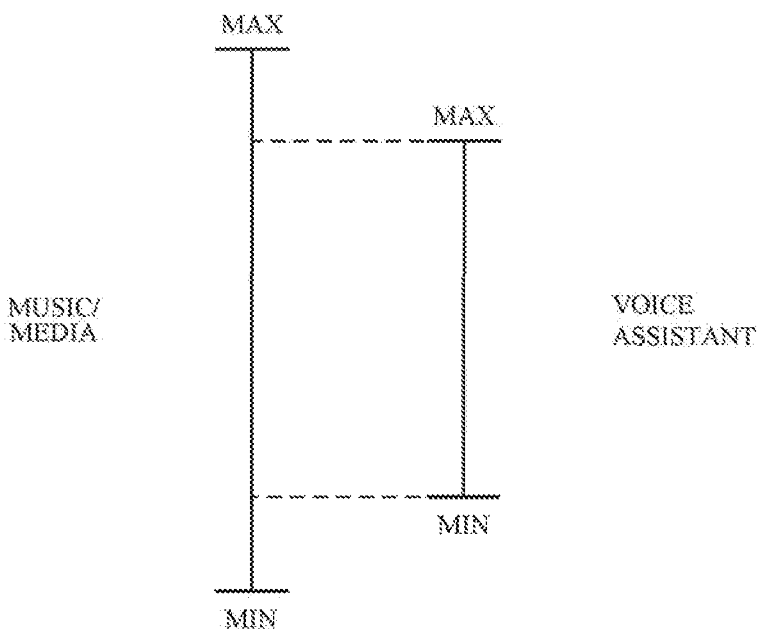
Figure 14N:
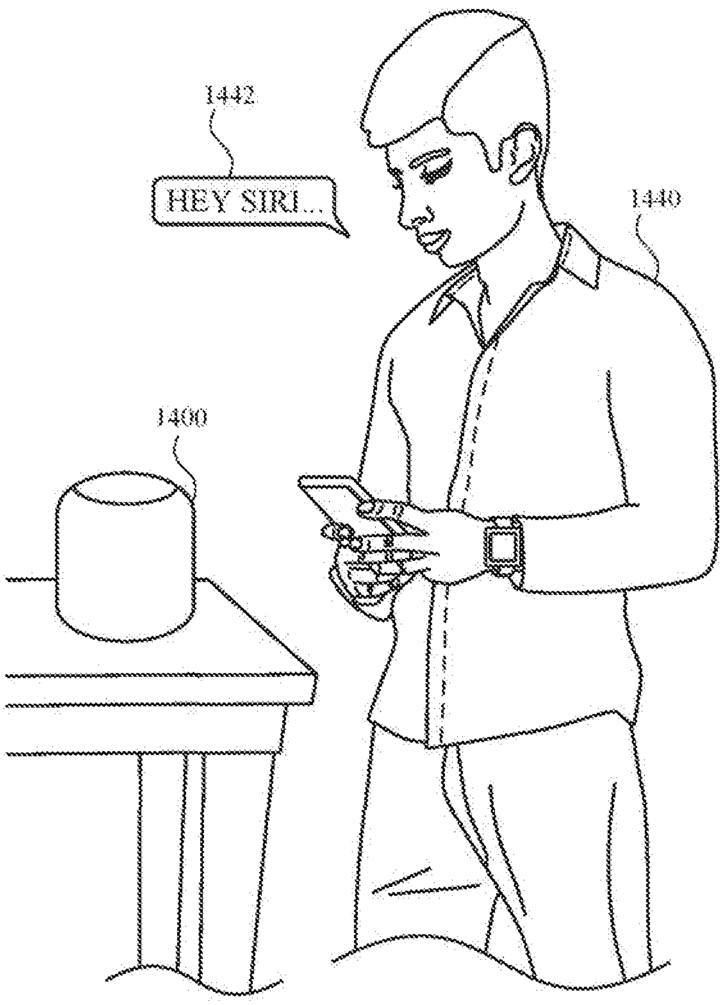

For example, FIG. 14M illustrates two volume level meters, representing two volume levels stored by device 1400. Media volume level meter 1430 includes a maximum level and a minimum level. Voice assistant volume level meter 1432 includes a maximum level and a minimum level.

In some embodiments, a second volume level is a derivative of a first volume level. For example, the volume level of a voice assistant (e.g., represented by volume meter 1432) can be mathematically derived from the volume level of media playback volume. For example, Volume(voice assistant)=(Volume (media)÷1.5). Thus, the second volume level (e.g., of the voice assistant) is derived from a first volume level (e.g., of media playback), and adjustment of the first results in an adjustment of the second.

In some embodiments, a second volume level is non-zero when a first volume level is zero. For example, as shown in FIG. 14M, the virtual assistant volume meter 1432 has a non-zero minimum. Thus, in some examples, when media volume level is set to zero, the voice assistant volume is non-zero, and thus a user can continue to hear and interact with the voice assistant. For example, the voice assistant volume can be derived as follows (where Volume(voice assistant)=((Volume(media)÷1.5)+x), where "x" is a constant representing an amount of volume added back into the result of Volume(media)÷1.5. One of skill in the art would appreciate that a volume level can be represented using a variety of units or quantities, which are not discussed in more detail here. Any appropriate representation of a volume level that an electronic device (e.g., device 1400) can use to control the volume of sound output is intended to be within the scope of this disclosure.

In some embodiments, user input on touch-sensitive surface 1402 causes device 1400 to change playback of currently playing media. For example, user input on touch-sensitive surface 1402 can cause device 1400 to skip to next media item (e.g., on a playlist), to go back to a previous media item (e.g., on a playlist), pause playback, or the like. In some embodiments, device 1400 concurrently plays back a plurality of media items. In some embodiments, in response to user input on touch-sensitive-surface 1402, device 1400 adjusts the output of each of the plurality of concurrently playing media items. In some embodiments, each of the plurality of media items are adjusted differently. For example, if device 1400 is concurrently playing back first media representing a news program (e.g., an audio stream) and second media representing music (e.g., an audio stream), a user input (e.g., a swipe gesture, a rotational swipe, a multi-contact swipe, or the like) on surface 1402 causes device 1400 to adjust an output level of the first and second media. In some embodiments, the adjustment is relative. For example, an output level of the first media is adjusted higher while an output level of the second media is adjusted lower. For example, an output level of the first media is adjusted lower while an output level of the second media is adjusted higher. For example, if the user desires to increase the volume of the news program and lower the music volume, a counter-clockwise rotational swipe gesture on surface 1402 causes device 1400 to adjust the volume of each media item accordingly. Conversely, in this example, a clockwise rotational swipe gesture on surface 1402 causes device 1400 to increase the volume of the music and lower the volume of the news program. Thus, device 1400 receives user input to control a crossfade between a plurality of currently playing media signals.

In some embodiments, device 1400 includes one or more microphones. In some examples, device 1400 detects, with the one or more microphones, a voice command user input from a voice command source. In some embodiments, the voice command source is moving. For example, the voice command source is a user that is speaking to the device, and the user may move (e.g., walk around a room) relative to the device (e.g., stationary in the room). In some embodiments, while continuing to detect the voice command user input: device 1400 determines a plurality of spatial positions of the moving voice command source, and illuminates light-emitting elements (e.g., indicators 1404) based on the plurality of spatial positions of the moving voice command source. Thus, for example, device 1400 can use (e.g., selectively illuminate) indicators 1404 based on the direction of a voice command source (e.g., a user speaking to device 1400 to invoke a voice assistant function using device 1400). For instance, when a user stands at a first position relative to device 1400 (e.g., and speaks a command to the device), indicators 1404 include one or more illuminated LEDs that visually appear to align with or indicate (e.g., "point in") the direction of the first position. Likewise, when a user stands at a second position relative to device 1400 (e.g., and speaks a command to the device), different than the first position, indicators 1404 include one or more illuminated LEDs that visually appear to align with or indicate (e.g., "point in") the direction of the second position.

In some embodiments, device 1400 detects a plurality of voice sources. In some embodiments, the device determines that one voice source, of the plurality of voice sources, represents a voice command user input. In some embodiments, device 1400 illuminates light-emitting elements (e.g., indicators 1404) based on the one voice source, of the plurality of voice sources. For example, if device 1400 is placed in a room with a plurality of speaking users and one user (or more than one) utters a voice command, the device 1400 uses indicators 1404 to visually indicate the direction of the user whose voice is currently being used to generate and/or process a voice command.

Figure 14O:
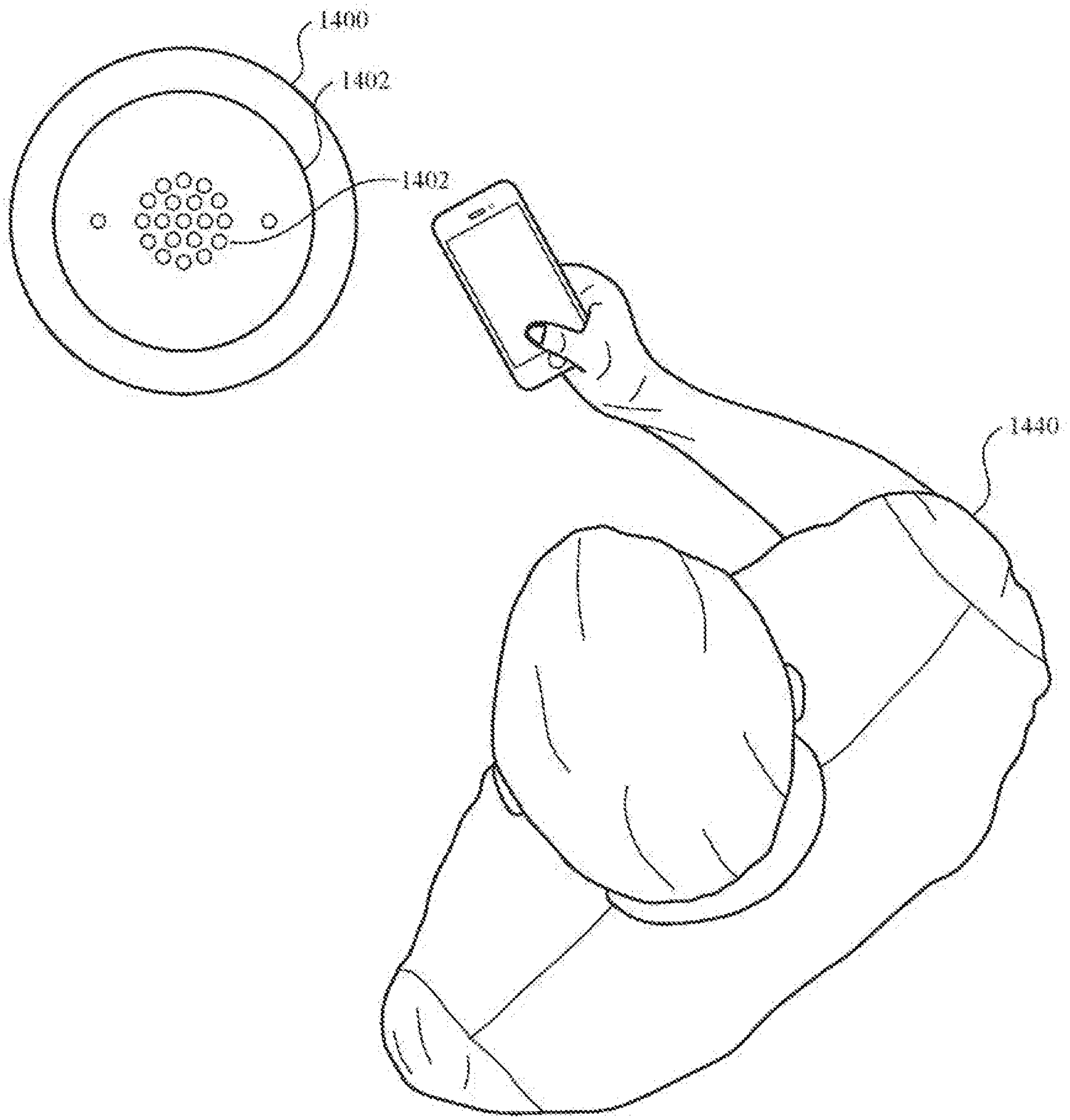

FIGS. 14N-14Q illustrate exemplary patterns created by illuminate light-emitting elements (e.g., indicators 1404) based on a spatial positions of a voice command source (e.g., 1440). At FIG. 14N, a user 1440 utters the user input voice command 1442 "Hey Siri" to invoke a personal assistant voice function on device 1400. FIG. 14O illustrates an overhead view (not to scale) of FIG. 14N, before the user utters voice command 1442. As shown, the indicator lights 1404 are not illuminated.

Figure 14P:
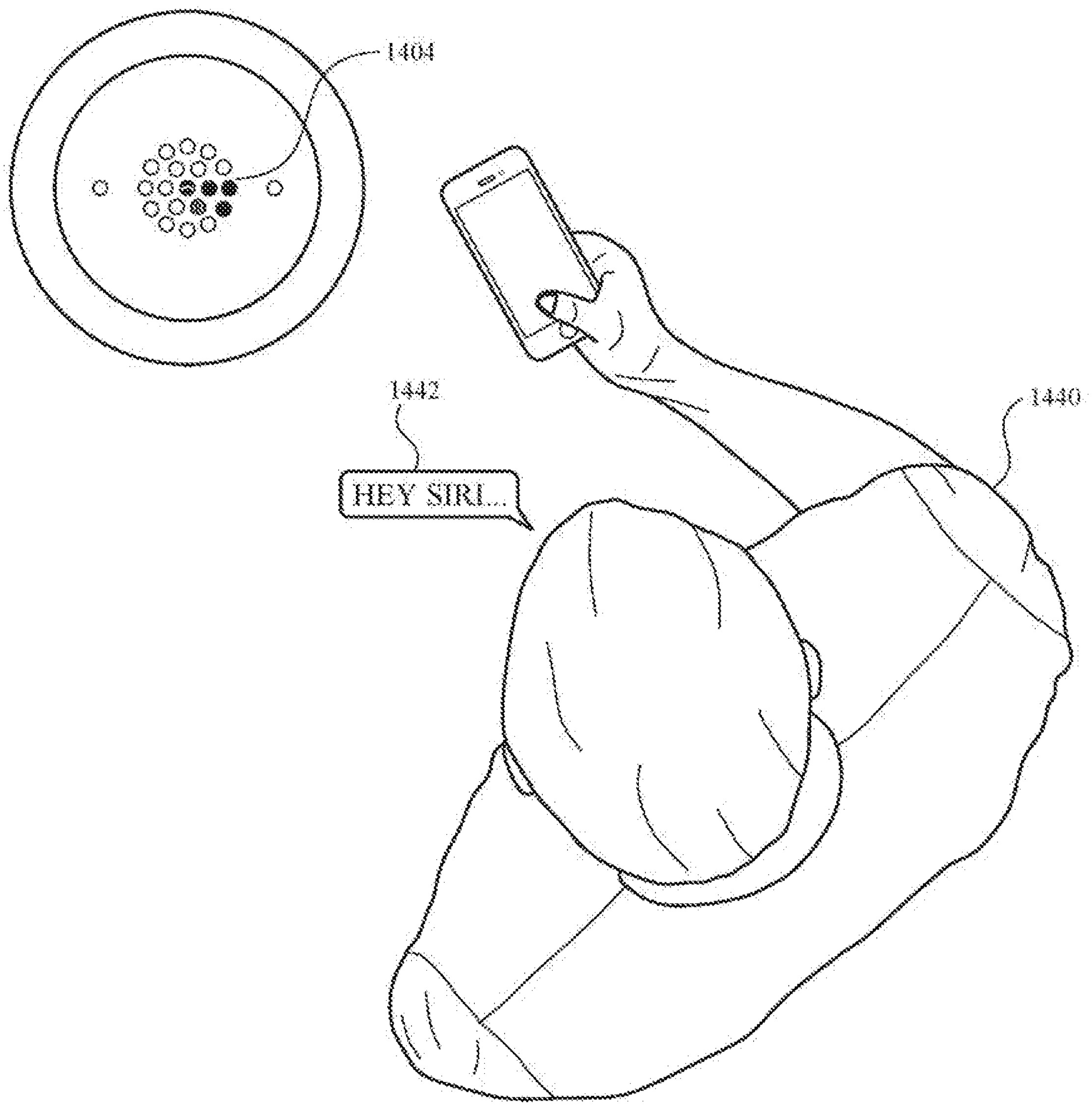

In FIG. 14P, an "input gravity" type of illumination pattern is shown, displayed in response to device 1400 detecting voice command 1442. The illuminated light-emitting elements of indicator 1404 form a semi-circular illumination pattern bordering the edge of indicators 1404. The elements that are closest to the edge and in the direction of the voice command source appear different from the surrounding elements. For example, the center of the semi-circle indicates the direction of the voice source (e.g., user 1440) being listened to by device 1400 and can appear to be brighter or a different color than the surrounding elements.

Figure 14Q:
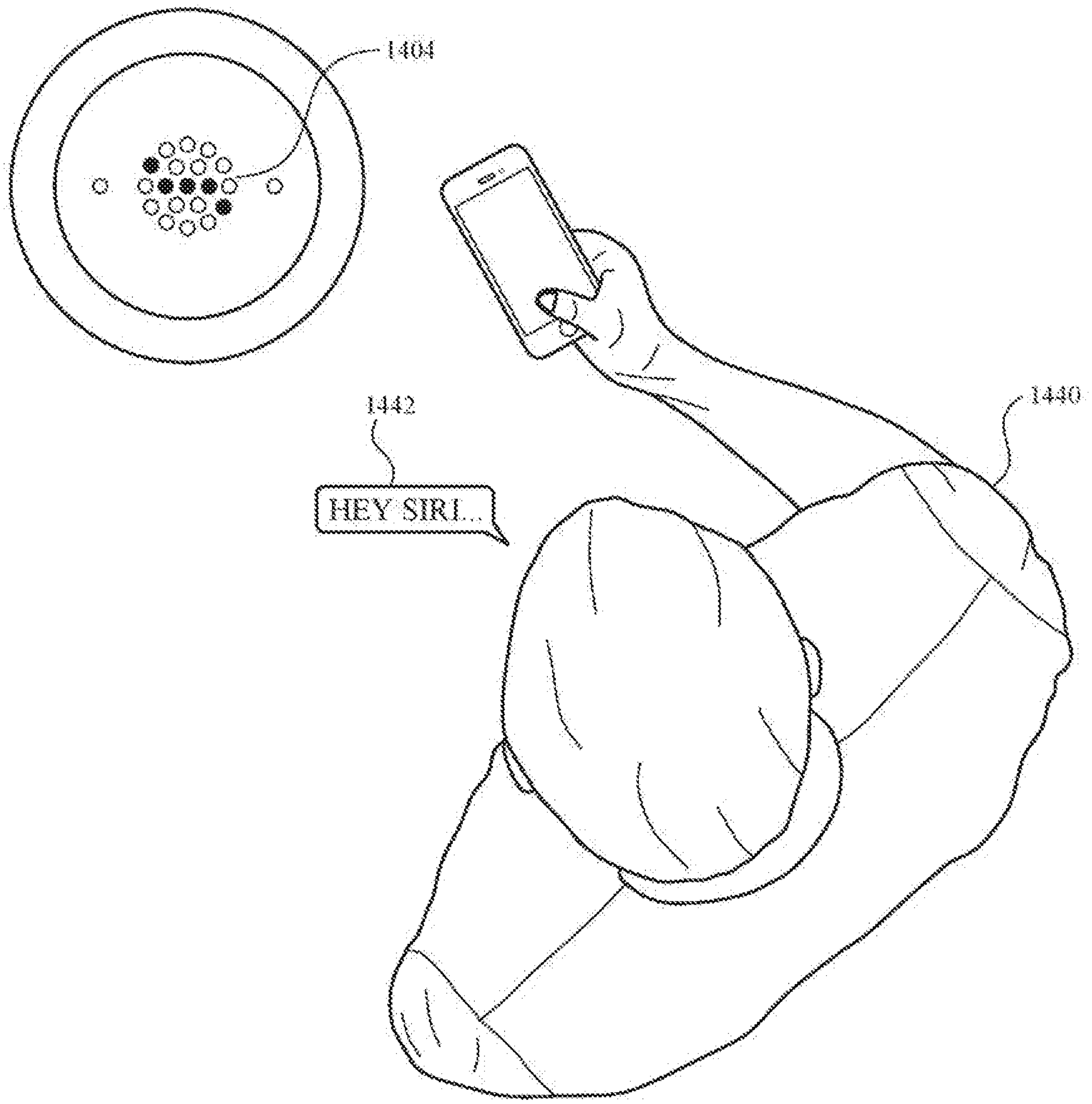

In FIG. 14Q, a "linear" type of illumination is shown (an alternative to FIG. 14P's "input gravity" type of illumination pattern), displayed in response to device 1400 detecting voice command 1442. The illuminated light-emitting elements of indicator 1404 form a substantially linear pattern within indicators 1404. Elements that align with the direction (e.g., relative to device 1400) of the voice command source appear different from the surrounding elements. For example, the elements aligned with the direction of the voice source being listened to by device 1400 and can appear to be brighter or a different color than the surrounding elements.

In some examples, other appropriate types of visual patterns can be used to indicate direction of a voice command source, and the examples above are not intended to limit the scope of this disclosure.

Figure 14R:
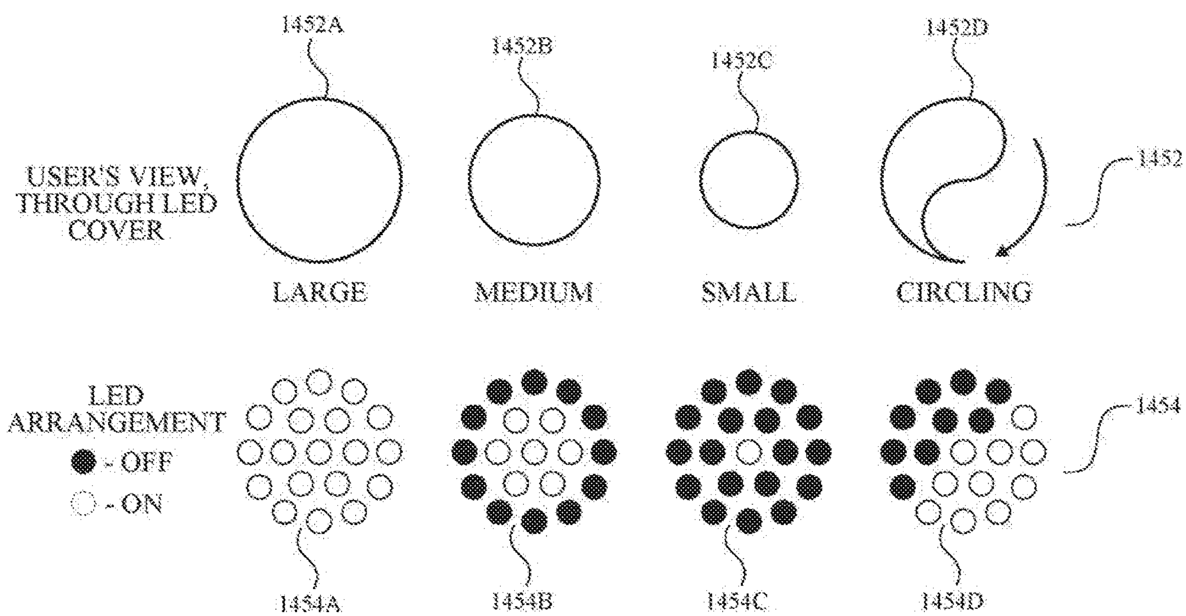
Figure 14S:
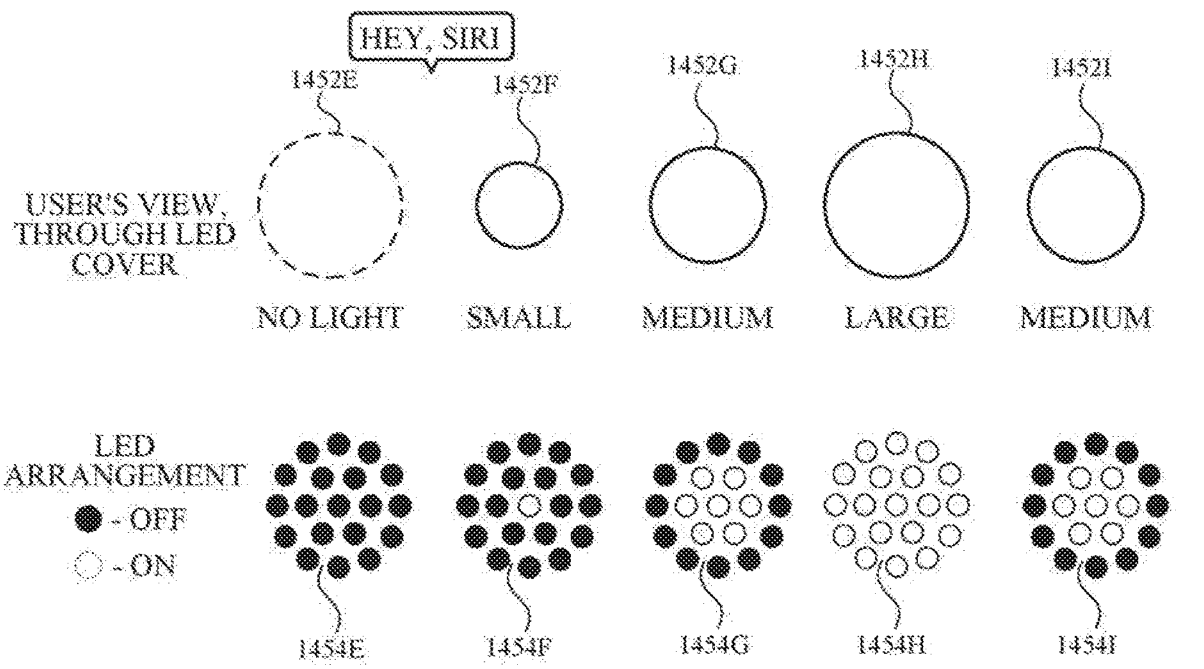
Figure 14T:
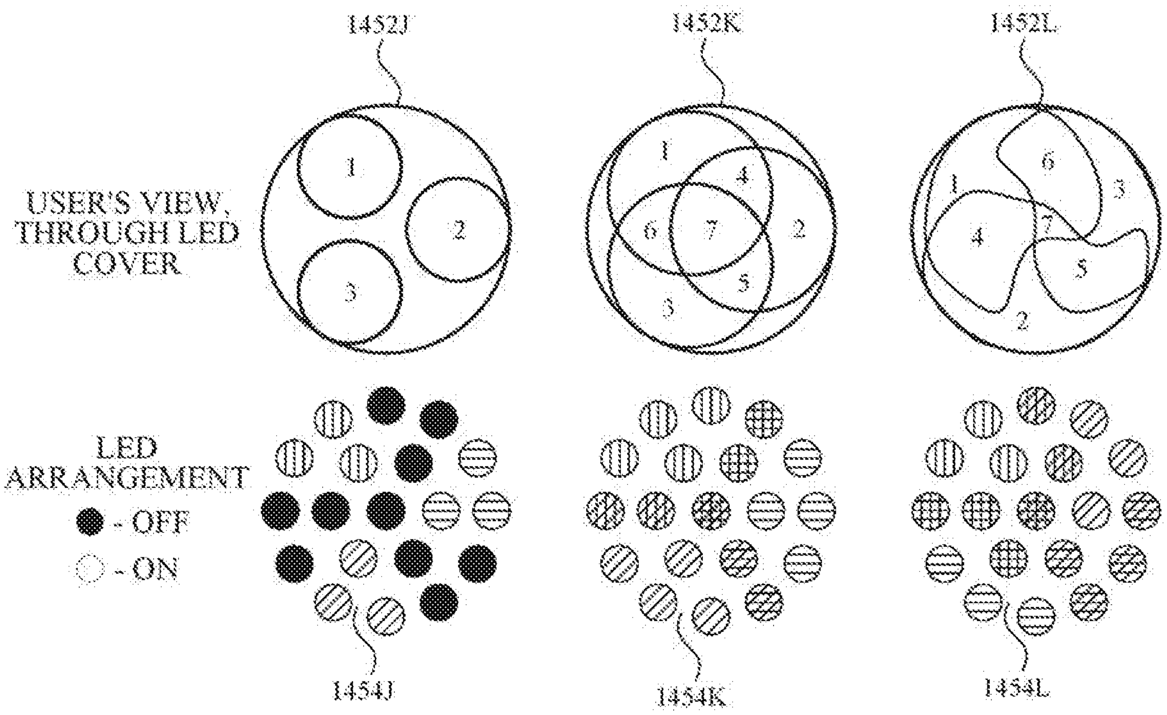

FIGS. 14R-14T illustrate exemplary arrangements and states of light-emitting indicators, in accordance with some embodiments. For example, FIGS. 14R-14T illustrate exemplary illumination patterns of indicator 1404, for communicating various states of device 1400. In some embodiments, device 1400 includes a cover over indicator 1404. For example, a partially opaque cover placed over indicator 1404 can cause the output of the light emitting elements to diffuse, and form patterns, which are also illustrated in FIGS. 14R-14T, for ease of reference.

FIG. 14R illustrates four illumination states of indicator 1404, both with and without a diffusion cover over the indicator. Pattern 1454A illustrates a large pattern (all LEDs illuminated), pattern 1454B illustrates a medium pattern (middle two rings illuminated), pattern 1454C illustrates a small pattern (e.g., inner-most ring illuminated), and pattern 1454D illustrates a circling pattern (e.g., various LEDs illuminated in a shape). In some examples, lighting elements of 1404 form the shape of 1454D and alternate illumination to give the appearance that the shape is moving (e.g., swirling a circular pattern). Covered patterns 1452A-1452D correspond to patterns 1454A-1454D, respectively, and depict how the patterns appear with a diffusion cover over indicator 1404.

FIG. 14S illustrates four illumination patterns that are presented by indicator 1404 in response to a voice user input (e.g., invoking a voice assistant), in accordance with some embodiments. As shown in FIG. 14S, pattern 1454E is displayed prior to voice input. Patterns 1454F-1454I are displayed in sequence in response to the voice input, giving the appearance of a small pattern transitioning into a large pattern, and then settling at a medium sized pattern. Covered patterns 1452E-14521 correspond to patterns 1454E-1454I, respectively, and depict how the patterns appear with a diffusion cover over indicator 1404. In some embodiments, the patterns 1454E-1454I form a series (e.g., that are displayed sequentially, in the order shown or in any order).

FIG. 14T illustrates three illumination patterns that are presented by indicator 1404, in accordance with some embodiments. For example, the patterns 1454J-1454L (and corresponding 1452J-1452L) can be displayed while device 1400 is performing a voice assistant function. In some embodiments, the patterns 1454J-1454L form a series (e.g., that are displayed sequentially, in the order shown or in any order). For example, performing a voice assistant function can include one or more of: listening to voice input (e.g., after detecting it), listening for voice input (e.g., prior to detecting it), outputting a voice assistant output (e.g., providing a text-to-speech audible response to voice input), processing user input (e.g., parsing the voice input, or performing a task in response to the voice input), or the like. In the examples depicted in FIG. 14T, each pattern includes shapes (e.g., circles) and each shape includes a number (e.g., the pattern in 1454J includes the numbers 1, 2, and, 3), wherein each number represents a color. Thus, the three circles of pattern 145J are each a different color. In patterns 1452J and 1454J, the elements in indicator 1404 are illuminated so that the colors do not appear to mix. In pattern 1452K and 1454K, the elements in indicator 1404 are illuminated so that the colors do appear to mix. For example, the colors are mixed and form new colors 4, 5, 6, and 7, based on the overlap of colors 1, 2, and 3. In pattern 1452L and 1454L, the elements in indicator 1404 are illuminated so that the colors do appear to mix, and the shapes within the pattern are less clearly defined (e.g., are no longer perfect circles, are swirling in an animated fashion). As can be seen, the colors 1 and 3 have changed relative position from pattern 1454K to 1454L. In some examples, the various patterns 1452J-1452L are be used (e.g., as sequence or part of an animation) to indicate the state of a voice assistant function.

In some examples, the color elements in indicator 1404, as described above with respect to patterns 1454J-1454L, are used to provide visual indication that the device 1400 is performing a first function (e.g., a voice assistant function), in contrast to a second function (e.g., media playback). For example, monochromatic light can be output by indicator 1404 when device 1400 is only playback media (e.g., a song), but transition to color when the device (e.g., even while continuing media playback) begins performing a voice assistant-related function (e.g., detects voice input of a token phrase, such as "Hey Siri").

FIGS. 15A-15C is a flow diagram illustrating a method for controlling media playback using an electronic device in accordance with some embodiments. Method 1500 is performed at a device (e.g., 100, 300, 500) with a touch-sensitive surface. Some operations in method 1500 are, optionally, combined, the order of some operations are, optionally, changed, and some operations are, optionally, omitted.

As described below, method 1500 provides an intuitive way for controlling media playback. The method reduces the cognitive burden on a user for controlling media playback, thereby creating a more efficient human-machine interface. For battery-operated computing devices, enabling a user to control media playback faster and more efficiently conserves power and increases the time between battery charges.

The electronic device (e.g., 1400) detects (1502) a touch (e.g., 1408 or 1410) on the touch-sensitive surface (e.g., 1402). In response to detecting the touch on the touch-sensitive surface, the electronic device (e.g., 1400) determines (1504) whether the electronic device (e.g., 1400) is currently playing media (e.g., represented by 1410 of FIG. 14D).

In accordance with a determination that the device (e.g., 1400) is currently playing media (1506): the electronic device (e.g., 1400) determines (1508) whether a location of the touch (e.g., 1408 or 1410) is within a first area (e.g., 1414C of the touch-sensitive surface (e.g., 1402) or within a second area (e.g., 1414A) of the touch-sensitive surface, wherein the first area and the second area are non-overlapping.

In accordance with a determination that the location of the touch is within the first area (e.g., 1414C) of the touch-sensitive surface, the electronic device (e.g., 1400) ceases playing media (1510).

In accordance with a determination that the location of the touch is within the second area (e.g., 1414A) of the touch-sensitive surface, the electronic device (e.g., 1400) adjusts (1512) a volume of the currently playing media (e.g., adjust up or down).

In accordance with a determination that the device is not currently playing media, the electronic device (e.g., 1400) initiates playback of media (1514).

Using a device state as well as a location of an area of a touch on a touch-sensitive surface to determine how a device responds to touch user input provides the user with a simplified interface that provides contextually relevant controls. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second area is comprised of a plurality of non-contiguous and non-overlapping areas (e.g., 1414A and 1414B of FIG. 14G) of the touch-sensitive surface (e.g., 1402 of FIG. 14G).

In some embodiments, the second area is comprised of a first sub-area (e.g., 1414A) and a second sub-area (e.g., 1414B), and wherein adjusting the volume of the currently playing media comprises: lowering the volume of the currently playing media if the location of the touch is within the first sub-area (e.g., 1414B); and raising the volume of the currently playing media if the location of the touch is within the second sub-area (e.g., 1414A).

In some embodiments, the touch is a first touch (e.g., 1416), and, subsequent to adjusting the volume of the currently playing media in accordance a determination that the location of the touch (e.g., 1416) is within the second area (e.g., 1414A): the electronic device (e.g., 1400) temporarily expands (1516) the second area to create an expanded second area (e.g., 1418 of FIG. 14I) for a predetermined amount of time after detecting the first touch (e.g., 1416) on the touch-sensitive surface (e.g., 1402). In some embodiments, the electronic device (e.g., 1400) receives (1518) a second touch (e.g., 1420) on the touch-sensitive surface. In some embodiments, the second touch (e.g., 1420) is located within the expanded second area (e.g., 1418). In some embodiments, the second touch (e.g., 1420) is not located within the second area (e.g., 1414A). In some embodiments, the electronic device (e.g., 1400) determines (1520) whether the second touch (e.g., 1420) was received during the predetermined amount of time after detecting the first touch (e.g., 1416). In accordance with a determination that the second touch was received during the predetermined amount of time after detecting the first touch, the electronic device (e.g., 1400) adjusts (1522) the volume of the currently playing media (e.g., as illustrated by 1422 of FIG. 14K). In accordance with a determination that the second touch was not received during the predetermined amount of time after detecting the first touch, the electronic device (e.g., 1400) ceases playing (1524) media. In some embodiments, ceasing playing media comprises pausing playback of currently playing media.

In some embodiments, the touch-sensitive surface includes a display (e.g., 1404A and 1404B). In some embodiments, the display is an LED array (e.g., 1406). In some embodiments, further in accordance with a determination that the device is currently playing media, the electronic device (e.g., 1400) displays (1526), on the display, an indicator (e.g., +icon in 1406A of FIG. 14D) within the second area (e.g., 1414A). In some embodiments, further in accordance with a determination that the device is not currently playing media, the electronic device (e.g., 1400) forgoes displaying (1528) the indicator within the second area.

In some embodiments, to adjust the volume of the currently playing media comprises (1530): the electronic device (e.g., 1400) adjusts (1532) a media playback volume (e.g., 1430 of FIG. 14M); and the electronic device (e.g., 1400) adjusts (1534) a virtual assistant volume (e.g., 1432 of FIG. 14M). In some embodiments, the virtual assistant volume is proportional to the media playback volume.

In some embodiments, the virtual assistant volume is non-zero when the media playback volume is zero.

In some embodiments, a maximum value of the virtual assistant volume (e.g., 1432) is lower than a maximum value of the media playback volume (e.g., 1430).

Note that details of the processes described above with respect to method 1500 (e.g., FIGS. 15A-15C) are also applicable in an analogous manner to the methods described below/above. For example, method 700, 900, 1100, 1300, 1700, 1800, 2000, 2200, 2400, 2600, 2800, 3000, 3200, 3400, 3600, 3800, and 3900 optionally includes one or more of the characteristics of the various methods described above with reference to method 1500. For brevity, these details are not repeated below.

FIGS. 16A-16P illustrate exemplary user techniques and interfaces for adding media to a playback queue, in accordance with some embodiments. The user interfaces in these figures are used to illustrate the processes described below, including the processes in FIGS. 17-18.

FIG. 16A illustrates an exemplary scenario in which a plurality of devices are connected. Specifically, device 1600 is a smart speaker that is connected to both devices 1602 and 1604 (e.g., personal devices). In some embodiments, device 1600 includes one or more features of devices 100, 300, 500, or 580. In some embodiments, devices 1602 and 1604 include one or more features of devices 100, 300, 500, or 580. In some examples, the respective users of devices 1602 and 1604 may desire to add media to a shared payback queue that is maintained by, and/or stored in, device 1600. FIGS. 16B-16P illustrate exemplary techniques for doing so.

At FIG. 16B, device 1602 displays an exemplary playlist selection interface 1606 on display 1603. Under interface heading 1606A, device 1602 displays a playlist affordance 1606B, representing the playlist titled "Tim's Birthday". As shown in FIG. 16B, the playlist "Tim's Birthday" is identified as a "Shared Playlist". In some embodiments, a shared queue (e.g., a shared playlist) is a queue that one or more users and/or one or more devices can access and/or manage (e.g., add media items, remove media items, begin playback, or the like). At FIG. 16C, device 1602 receives user input 1608, representing selection of affordance 1606B. In some embodiments, device 1602 displays interface 1610 of FIG. 16D in response to receiving user input 1608.

Figure 16D:
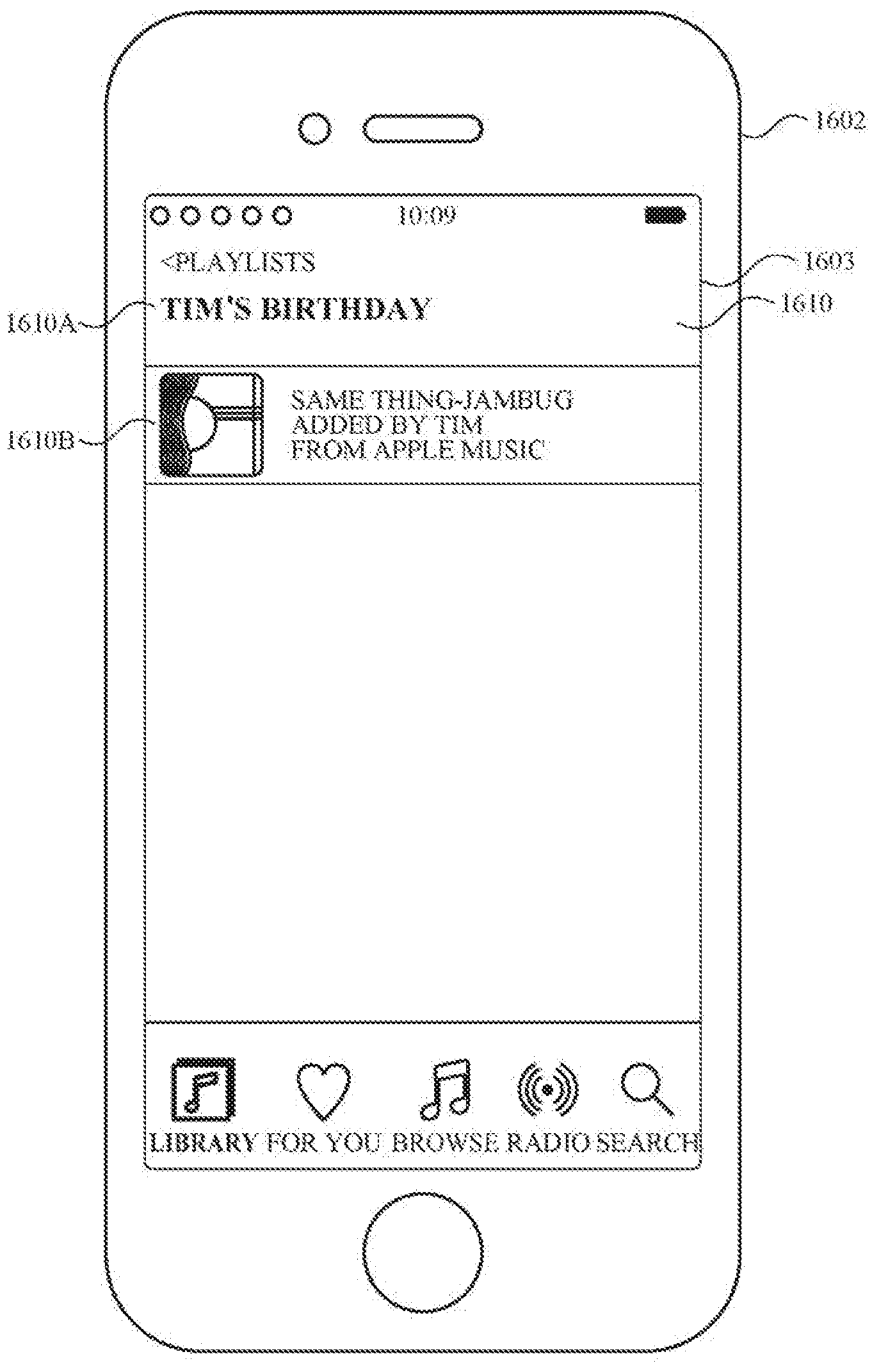

FIG. 16D illustrates an exemplary interface representing a playback queue (also referred to variously as a "media playback queue" or simply a "queue"). Playlist interface 1610 of FIG. 16D includes a single media item 1610B listed under playlist identifier 1610A. As shown in FIG. 16D, media item 1610B represents the song "Same Thing" by artist "Jambug". In some embodiments, an interface representing a playback queue includes additional information associated with a media item. For example, media item 1610B also includes an identification of the user who added the media item to the playlist (e.g., the user named Tim) and a source of the media item (e.g., a media streaming service named Apple Music).

In this example, playlist interface 1610 is displayed on device 1602. However, because the playback queue represented by playlist interface 1610 is a shared queue, it can be accessed by multiple users and/or multiple devices. In some embodiments, device 1604 displays playlist interface 1610. In some embodiments, device 1602 and device 1604 display (e.g., concurrently) playlist interface 1610. Referring back to the scenario in FIG. 16A, devices 1602 and 1604 are associated with different users.

While reference is made to a playlist of songs in this example, an exemplary playback queue is not limited to songs. In some embodiments, a playback queue is any data representing one or more media items and information usable to access the media items (e.g., for playback). In some embodiments, a playback queue includes data associated with the one or more media items. For example, the playback can include information regarding one or more of: when the media was added to the queue, when the media expires from the queue, a source of the media (e.g., file location, a URL, an identification of a streaming service, a source device (e.g., the device that stores the media item)), credentials for accessing media (e.g., login credentials or a token granting access to a media streaming service), an identifier of a user that added the media to the queue, an identifier of a device that added the media to the queue, or the like. In some embodiments, a playback queue includes, but is not limited to, one or more of the following types of media items: an audio file, a video file, an audio stream, a video stream, or the like.

Turning back to the figures, FIGS. 16E-16P illustrate exemplary interfaces for adding media items to the playlist depicted in playlist interface 1610, in accordance with some embodiments.

Figure 16E:
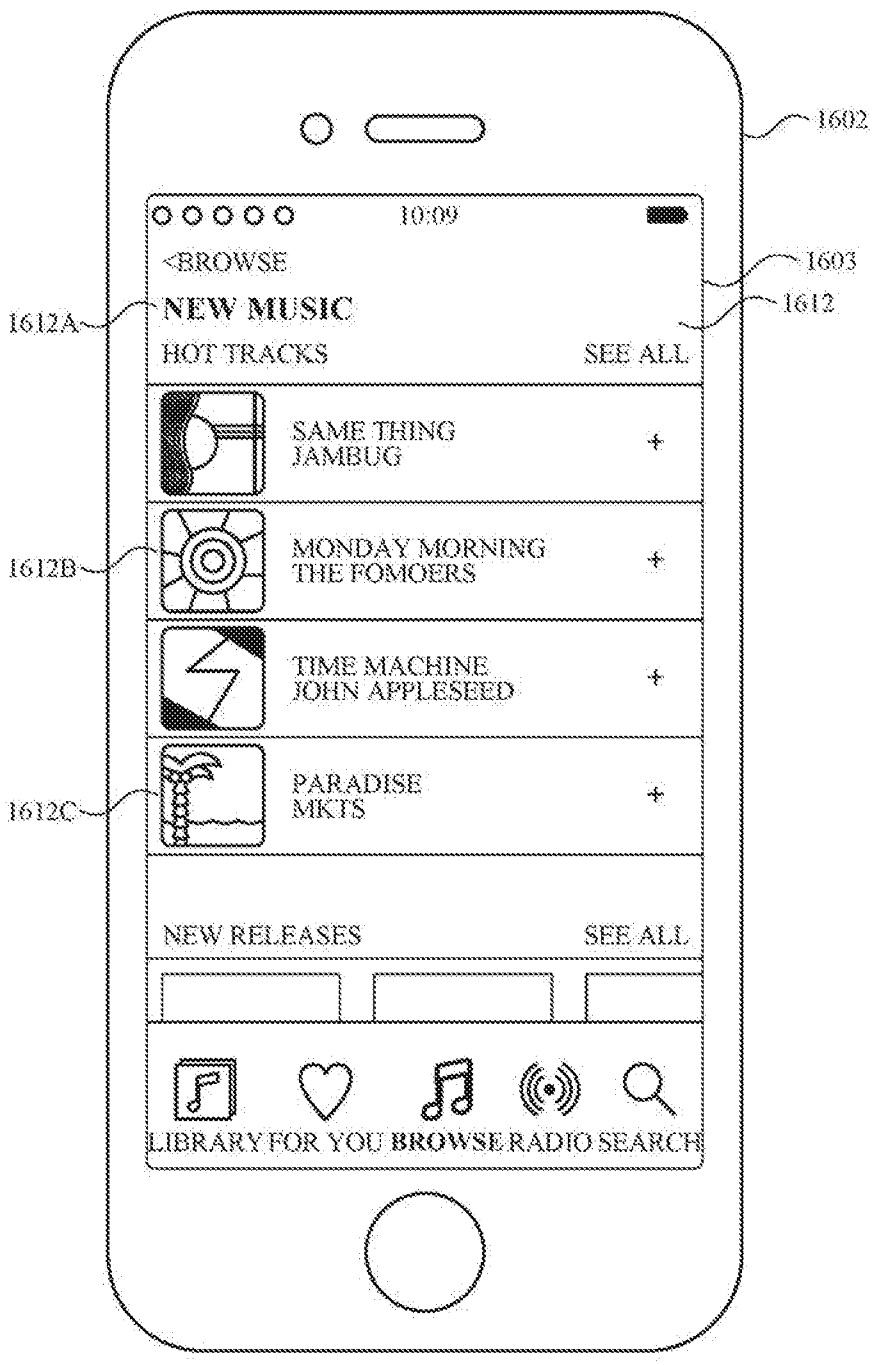
Figure 16F:
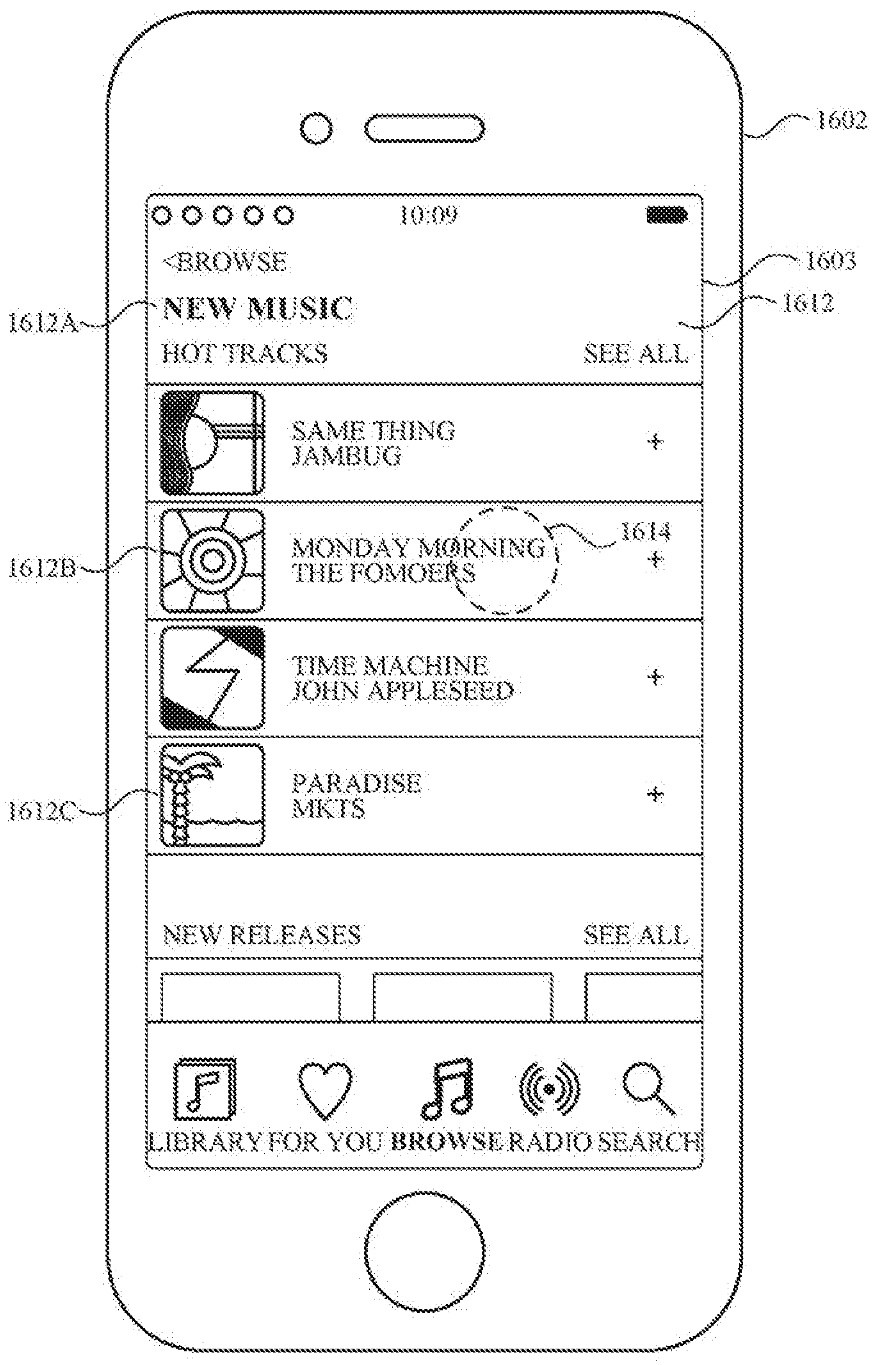

At FIG. 16E, device 1602 displays browsing interface 1612, which is identified by browsing interface header 1612A as a list of New Music. In some embodiments, device 1602 displays browsing interface 1612 subsequent to displaying playlist interface 1610. In some embodiments, a browsing interface is any interface (e.g., of a media application) for browsing and selecting media items. Browsing interface 1612 includes affordance 1612B representing a first media item (e.g., the song "Monday Morning" by artist "The Fomoers") and affordance 1612C representing a second media item (e.g., the song "Paradise" by artist "MKTS"). At FIG. 16F, device receives user input 1614, associated with affordance 1612B. In some examples, user input 1614 is a deep press or a press and hold user input.

Figure 16G:
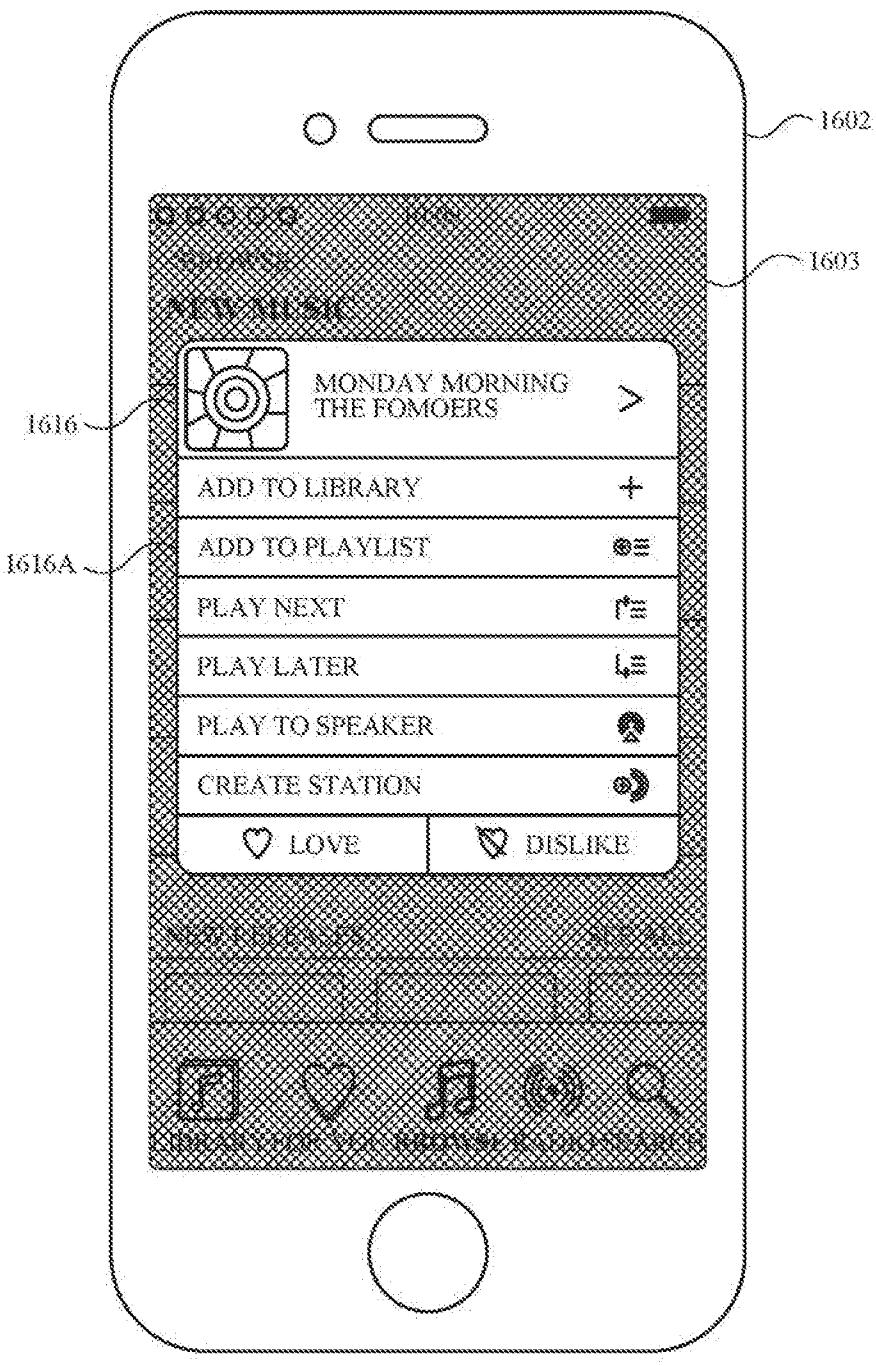
Figure 16H:
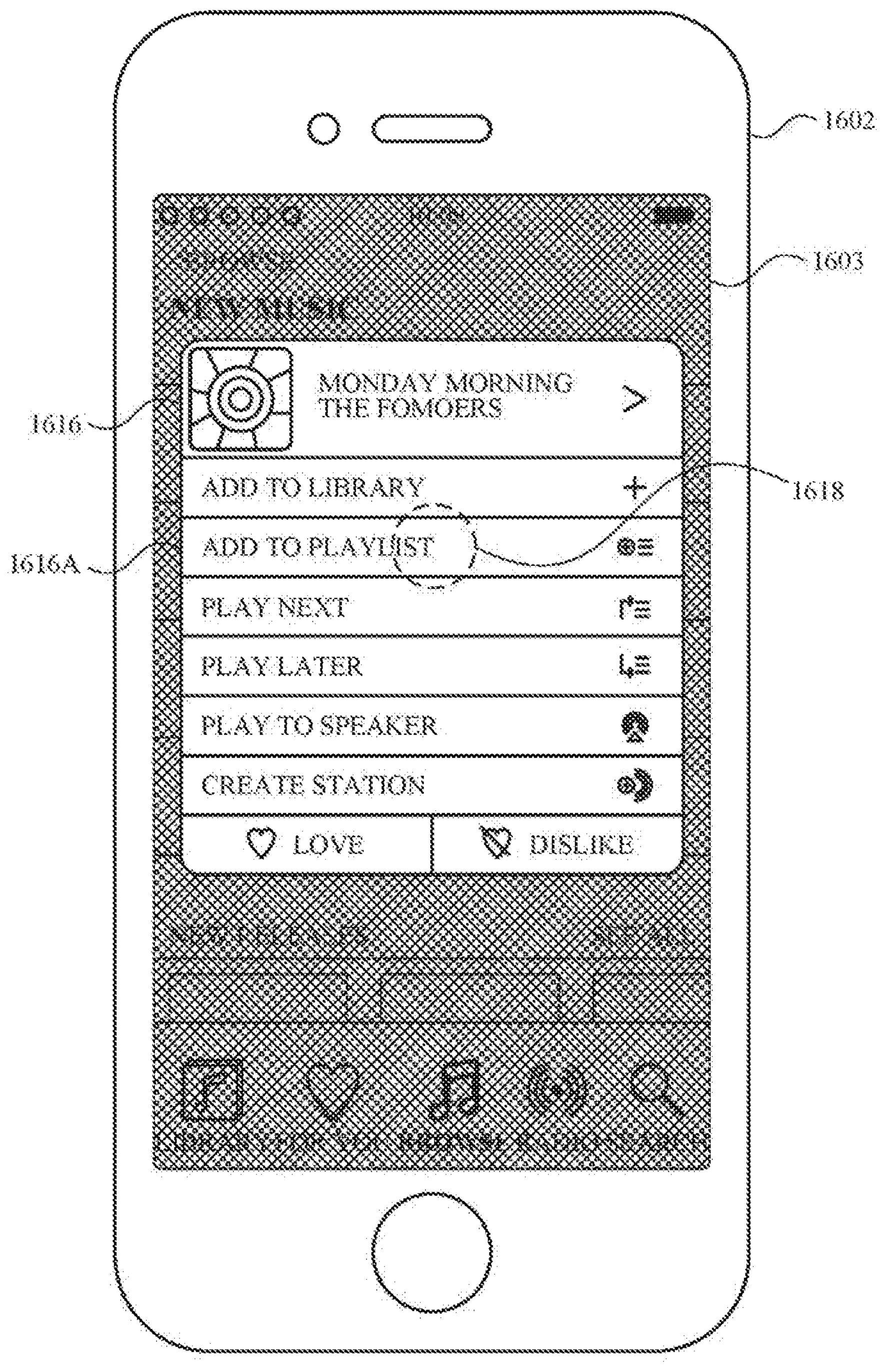

At FIG. 16G, device 1602 displays media menu 1616 in response to user input 1614. Media menu 1616 includes various items for performing actions associated with the media item of affordance 1612B. Media menu 1616 includes affordance 1616A (e.g., an "add to playlist" affordance). At FIG. 16H, device 1602 receives user input 1618 representing a selection of affordance 1616A. In some examples, user input 1618 is a tap user input.

Figure 16I:
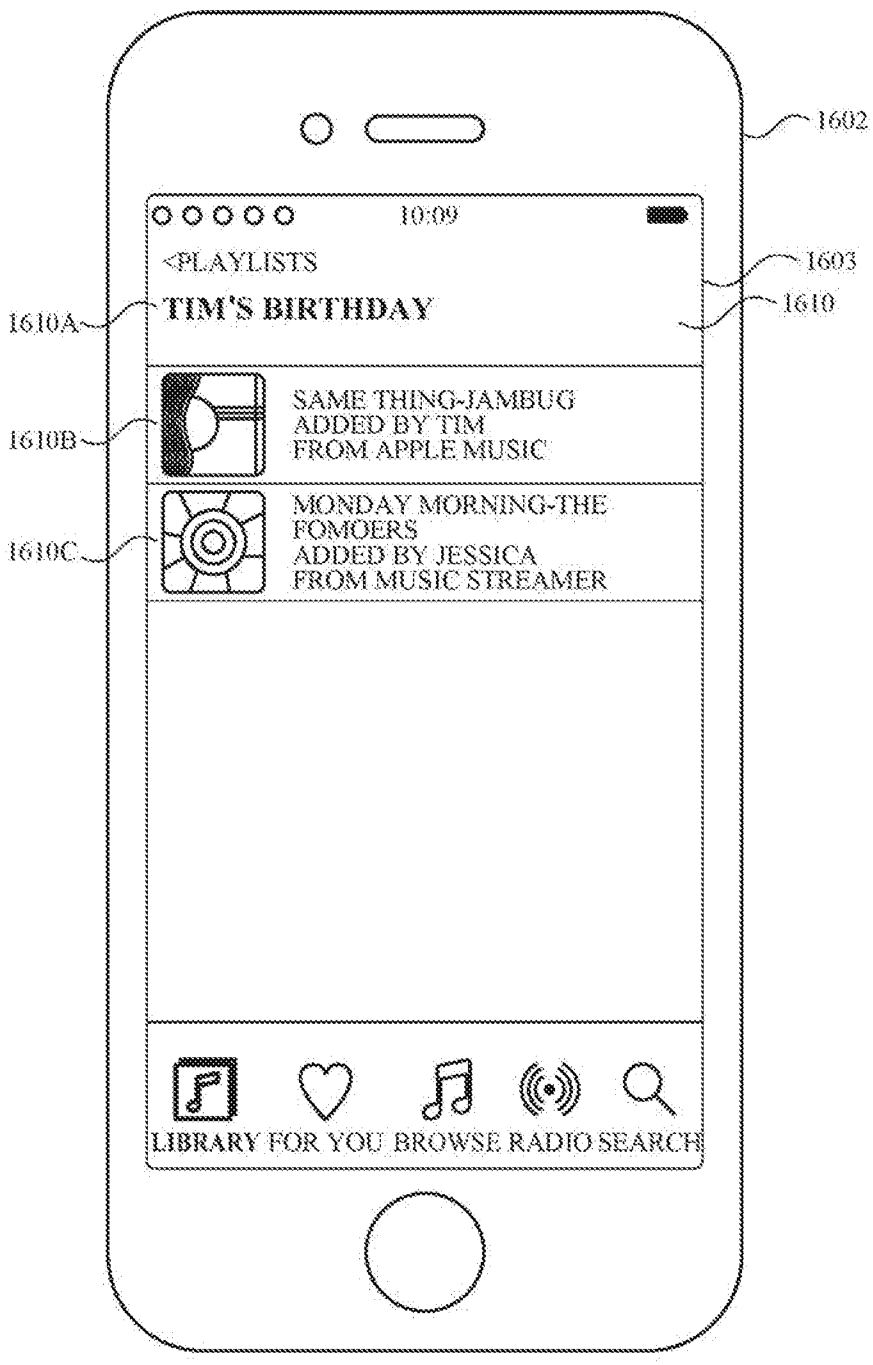

In response to user input 1618, device 1602 displays playlist interface 1610, which has been updated to include media item 1610C (FIG. 16I). Media item 1610C represents the media item associated with media menu 1616 of FIG. 16G (e.g., the song "Monday Morning" by artist "The Fomoers"). Thus, the user of device 1602 has added a media item to the shared playlist titled "Tim's Birthday". As described above, other users and devices (e.g., device 1604) can view and add media to a shared queue, as illustrated below.

Figure 16J:
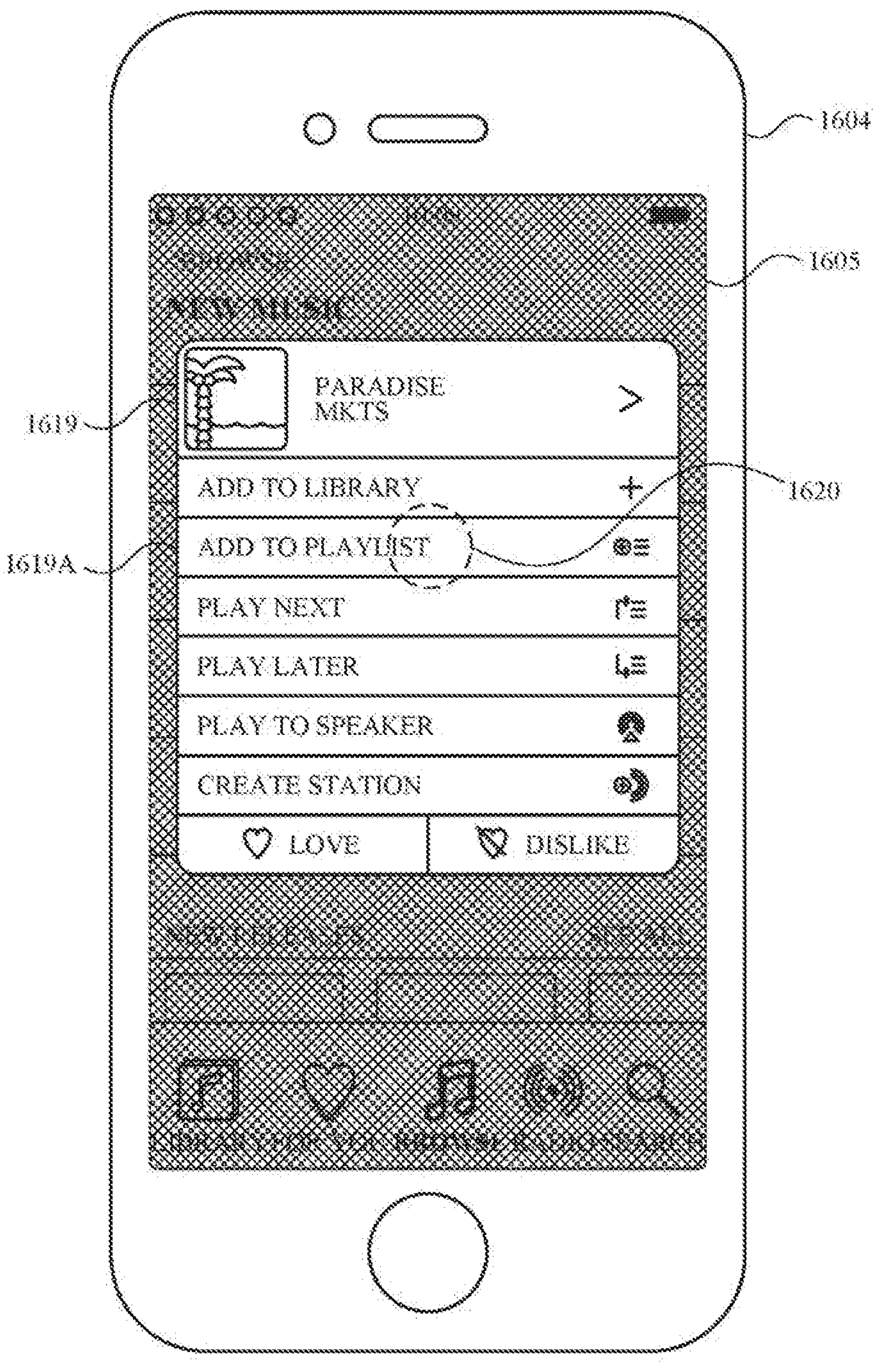

At FIG. 16J, device 1604 displays a media menu 1619 on display 1605. In some embodiments, device 1604 displays media menu 1619 in response to a user input (not illustrated) associated with affordance 1612C, of browser interface 1612 (e.g., as shown in FIG. 16E), representing the second media item (e.g., the song "Paradise" by artist "MKTS"). Media menu 1619 includes affordance 1619A (e.g., an "add to playlist" affordance). As shown in FIG. 16J, device 1604 receives user input 1620, associated with affordance 1619A. In some examples, user input 1620 is a tap user input.

Figure 16K:
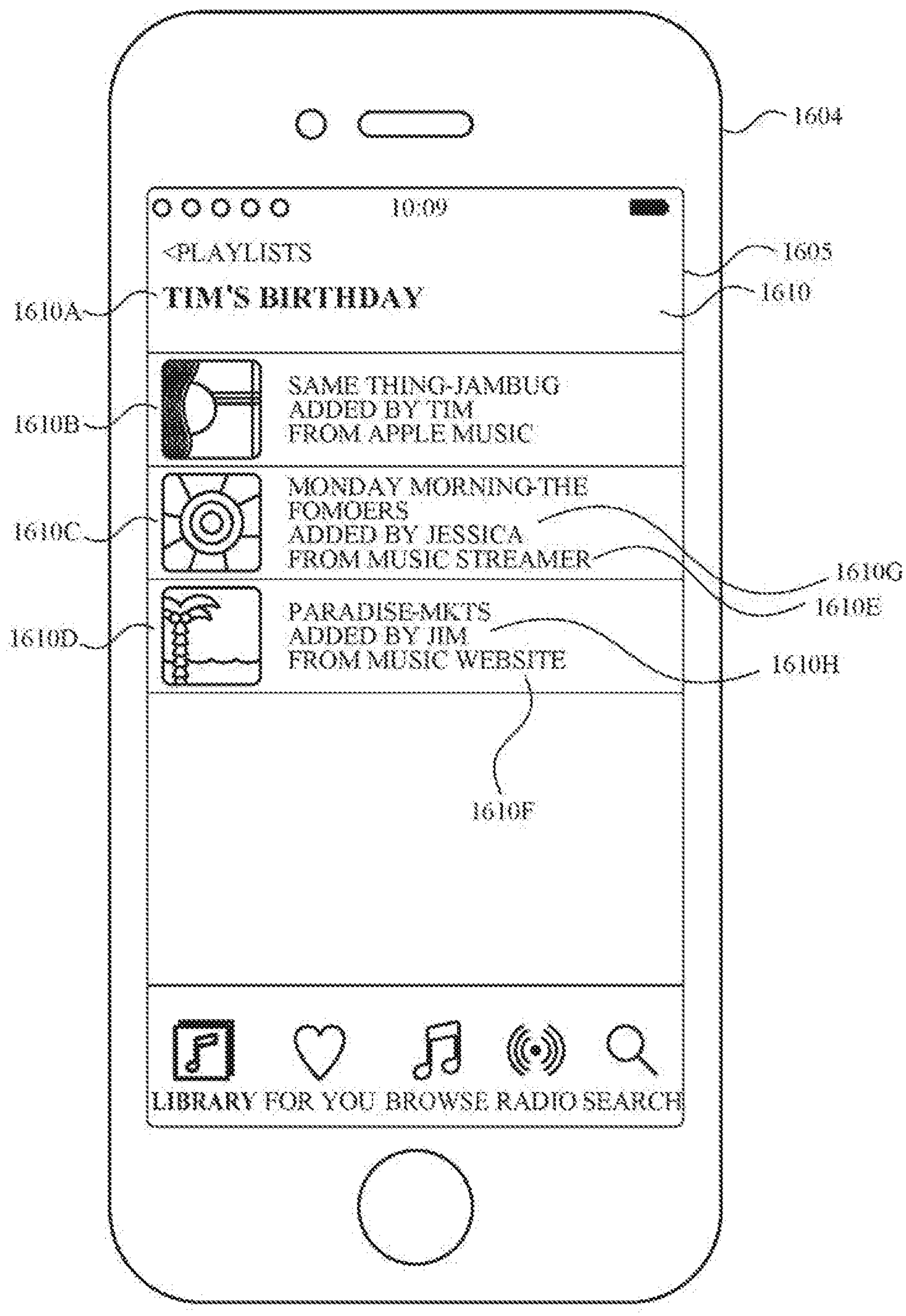
Figure 16L:
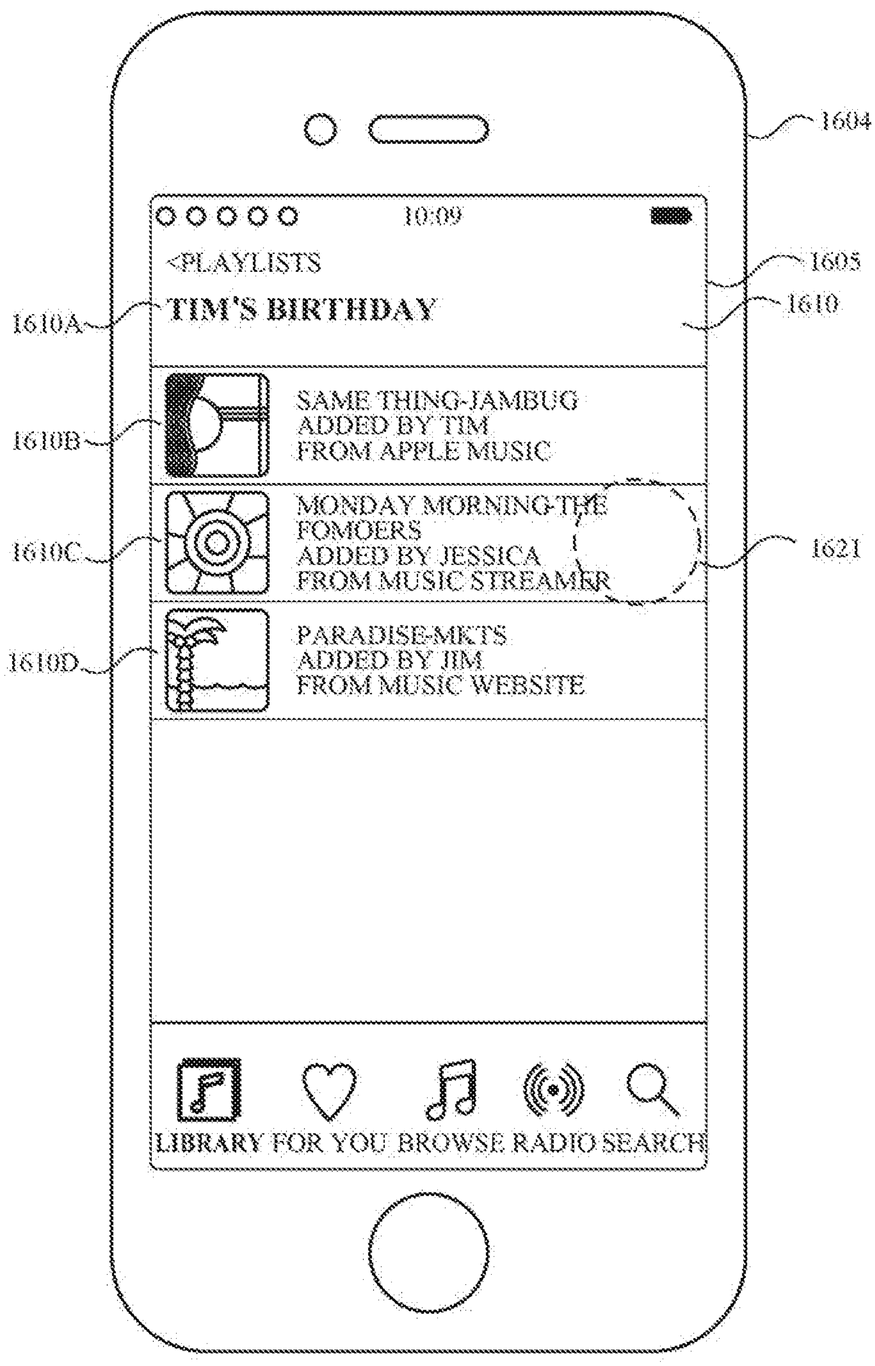

In response to input 1620, device 1604 displays playlist interface 1610, which has been updated to include media item 1610D (FIG. 16K). Media item 1610D represents the media item associated with media menu 1619 of FIG. 16J (e.g., the song "Paradise" by artist "MKTS"). Thus, the user of device 1604 has added a media item to the shared playlist titled "Tim's Birthday". Accordingly, in this example, two devices associated with two different users accessed and added media to a shared queue (e.g., the media queue "Tim's Playlist", as represented by 1610).

FIG. 16K also depicts additional information regarding one or more of the media items in the playback queue represented by playlist interface 1610, in accordance with some embodiments. As shown, each affordance includes information regarding a user (e.g., a user account) that added the corresponding media item to the queue. Additionally, each affordance includes information regarding a source (e.g., a media application) of the corresponding media item to the queue. As shown, media item 1610B was added by the user "Tim" from the source "Apple Music" (e.g., a music application, for playing local files or media streams). Media item 1610C was added by the user "Jessica" (identifier 1610G) from the source "Music Streamer" (e.g., a music streaming application) (identifier 1610E). Media item 1610D was added by the user "Jim" (identifier 1610H) from the source "Music Website" (e.g., a music streaming website) (identifier 1610F).

In some embodiments, users can remove media items from a shared queue. FIGS. 16L-16O depict exemplary interfaces for removing media items from a shared queue. At FIG. 16L, device 1604 receives user input 1621 associated with affordance 1610C of playlist interface 1610. In some examples, user input 1621 is a deep press or a press and hold user input.

Figure 16M:
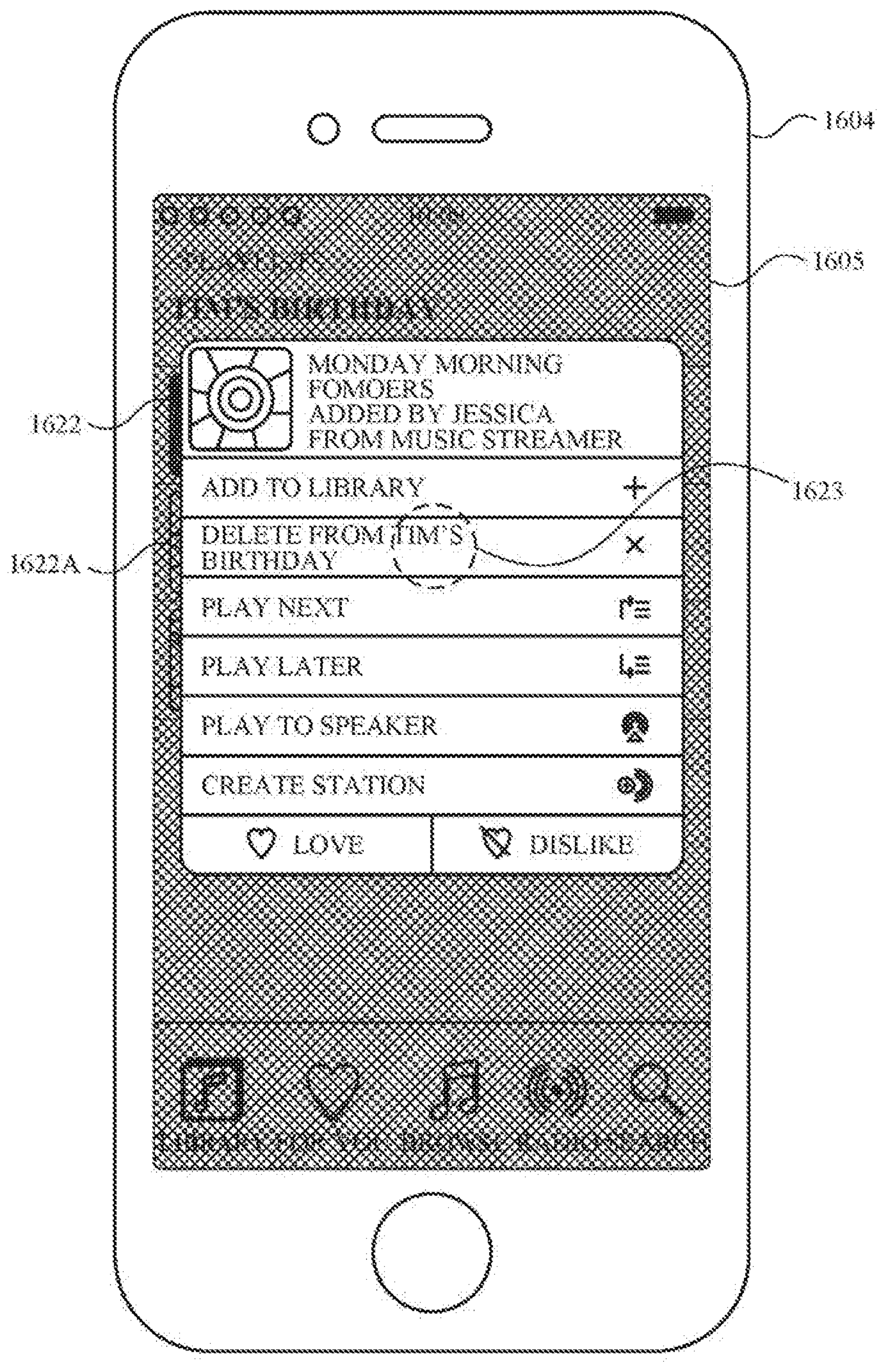

In response to input 1621, device 1604 displays media menu 1622, which includes an affordance 1622A for deleting a media item from the playlist (e.g., that includes the text "Delete from Tim's Birthday") (FIG. 16M). At FIG. 16M, device 1604 receives user input 1623 representing selection of affordance 1622A. In some examples, user input 1623 is a tap user input.

Figure 16N:
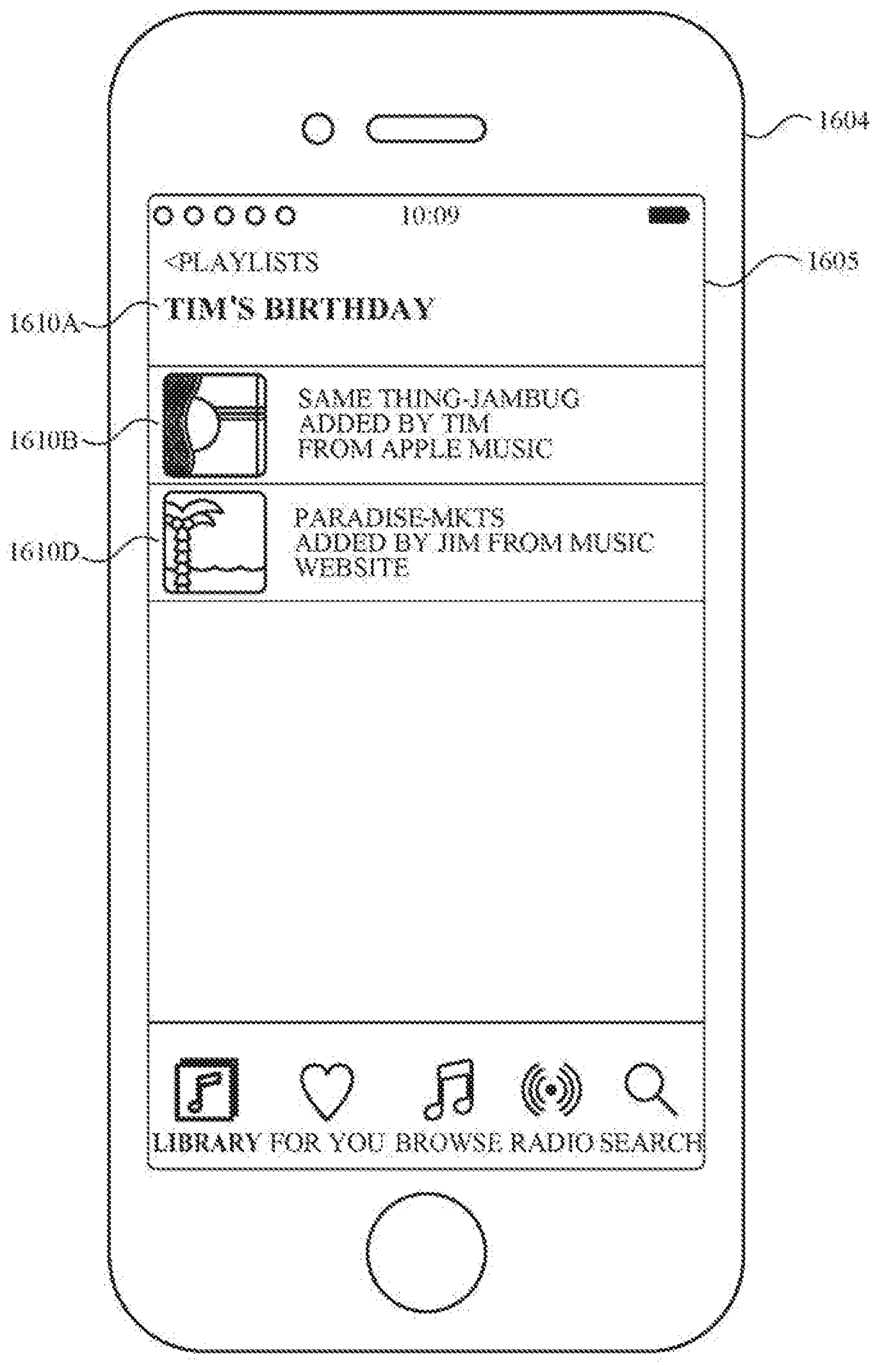

At FIG. 16N, in response to input 1623, device 1604 displays playlist interface 1610, which has been updated to remove the media item associated with affordance 1610C. Thus, in the examples shown in FIG. 16N, the user of device 1604 has deleted a media item that was added by the user of device 1602. In some embodiments, any user can delete a media item from a shared queue. In some embodiments, a user can only delete media items that were added by them. In some embodiments, a user cannot delete any media items from a queue (e.g., even if added by them). In some embodiments, a user's ability to delete media items from a queue is subject to permissions. For example, a user can lack the ability (e.g., permission) to delete media items from a shared queue, but subsequently gain such ability after being granted permission (e.g., by a member of the home). In some embodiments, a user has the ability (e.g., permission) to remove media items from a queue by virtue of being a member of a set of users (e.g., a member of the home that includes device 1600 or another device that maintains or stores the queue).

Figure 16O:
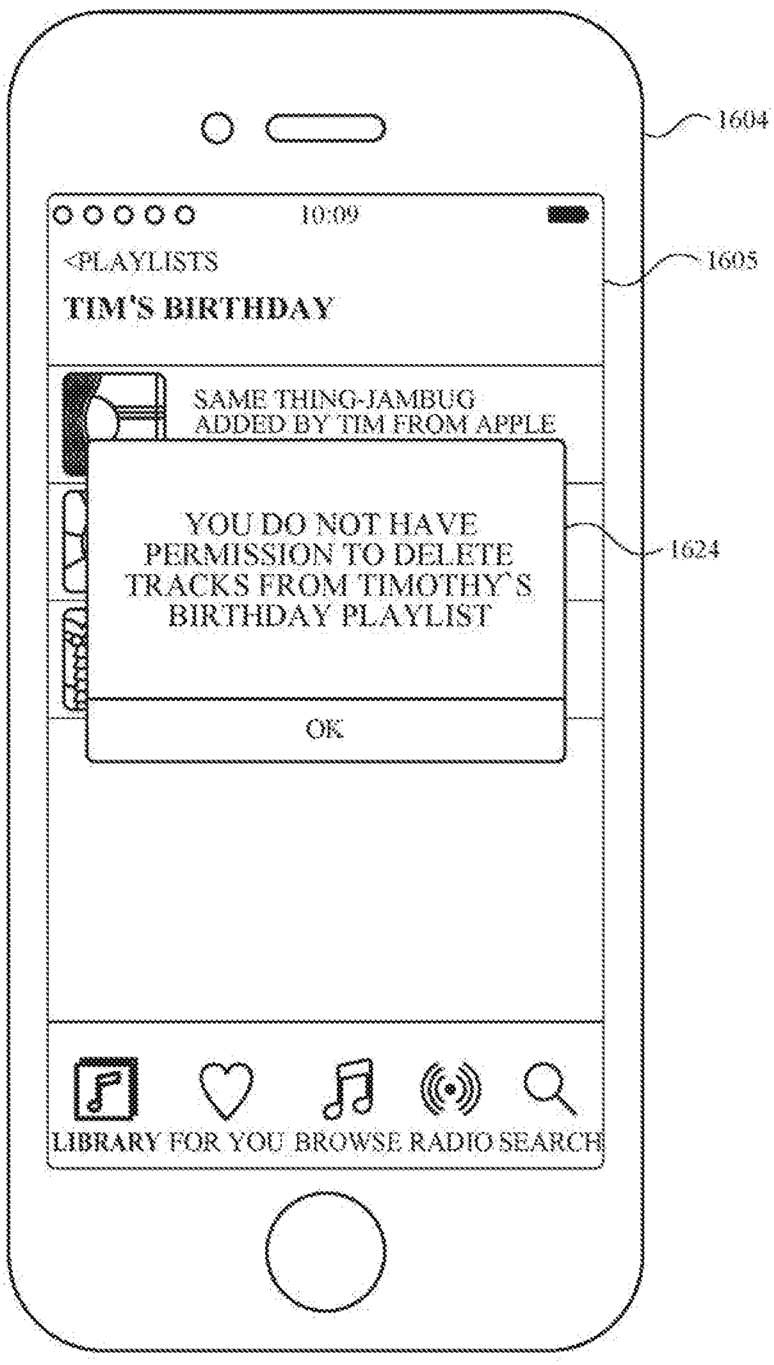

FIG. 16O illustrates an exemplary message informing a user that they do not have permission to delete an item from a shared queue. Message box 1624 includes the message "You do not have permission to delete tracks from Tim's Birthday Playlist". In some embodiments, device 1604 displays message box 1624 in response to user input 1623. Thus, as alternative to the result shown in FIG. 16N, in some examples, device 1604 displays message box 1624 as shown in FIG. 16O if the user of device 1604 does not have permission to remove the media item that was added by the user of device 1602.

In some embodiments, a user or device requires permission to add a media item to a playback queue. For example, if a user lacks permission to add a media item to a shared queue, a message box similar to 1624 can be displayed that reads "You do not have permission to add tracks to Tim's Birthday Playlist". In some embodiments, permission to add media items are subject to the same conditions or approval states and levels described above with respect to permission to remove media items, and thus are not repeated.

FIG. 16P illustrates an exemplary queue removal condition, in accordance with some embodiments. Queue removal condition 1632 indicates that the media item 1610C will "expire" (e.g., be automatically removed from the queue) in 23 hours. In some embodiments, a media item in a playback queue is subject to being removed from the queue after a condition is met (e.g., or is not met), also referred to as a "queue removal condition". In some embodiments, in accordance with a determination that a queue removal condition associated with a media item is satisfied, a device (e.g., a device that maintains or stores the queue) removes the media item from the playback queue. In some embodiments, the queue removal condition is satisfied if the requester (e.g., 1602) that added the media item (e.g., 1610C) is no longer connected to a local area network that includes the device that maintains or stores the playback queue (e.g., 1600). In some embodiments, the queue removal condition is satisfied if a predetermined amount of time passes after the first media item was added to the queue. In some embodiments, the predetermined amount of time is 24 hours. In some embodiments, the queue removal condition is satisfied if the requester (e.g., user and/or device that added the media item to the queue) is no longer connected to the local area network and the device that maintains or stores the queue (e.g., 1600) is not logged in to a media streaming service (e.g., that is the source of the media item).

Notably, a fourth device 1630 displays playback interface 1610 of FIG. 16P. In some embodiments, the fourth device is associated with a user (e.g., user account) different than the users associated with devices 1600, 1602, and 1604. Thus, as described above, FIG. 16P further illustrates that a shared playback queue can be viewed by any number of devices and any number of users. In some embodiments, a device can access a shared queue when connected (e.g., directly) to the device that maintains or stores the queue (e.g., communication link 1039 of FIG. 10M between devices 1010 and 1000). In some embodiments, a device can access a shared queue when connected to common network as a device that maintains or stores the queue (e.g., via access point 1030 of FIG. 10M between devices 1010 and 1000).

In some embodiments, a device is associated with a media preference profile (also referred to as a "taste preference profile"). For example, device 1600 can be associated with (e.g., logged into) a user account associated with a third user (e.g., not the users of devices 1602 and 1604). The third user, in some examples, may not want the media that is added to the shared playback queue on their device (e.g., 1600) to affect their media preference profile. For example, the media preference profile can include data representing one or more of: particular media items associated the third user's account, media item playback history, media recommendations based on history or taste preferences, or the like. Thus, in some embodiments, media added to the playback queue on the first device (e.g., 1600) does not affect a media preference profile of a user account associated with the first device (e.g., 1600). In some examples, if the user of device 1602 is the same as the third user (e.g., whose account is associated with device 1600), device 1600 updates the media preference profile of third user based on media added by device 1602, but not based on media added by device 1604 (e.g., associated with a different user than the third user). Thus, the owner of a device can allow others to add music to a playback queue on a device associated with the owner's user account, without affect the device owner's taste preference profile.

FIGS. 17A-17C is a flow diagram illustrating a method for playing back media from a plurality of media streaming services using an electronic device in accordance with some embodiments. Method 1700 is performed at a device (e.g., 100, 300, 500, 580, 1600). Some operations in method 1700 are, optionally, combined, the order of some operations are, optionally, changed, and some operations are, optionally, omitted.

As described below, method 1700 provides an intuitive way for playing back media from a plurality of media streaming services. The method reduces the cognitive burden on a user for playing back media from a plurality of media streaming services, thereby creating a more efficient human-machine interface. For battery-operated computing devices, enabling a user to play back media from a plurality of media streaming services faster and more efficiently conserves power and increases the time between battery charges.

The electronic device (e.g., 1600) receives (1702) a first request (e.g., represented by user input 1618 of FIG. 16H) to queue a first media item (e.g., 1612B) for playback on a set of devices (e.g., 1600). In some embodiments, the set of devices includes the first device (e.g., 1600). In some embodiments, the set of devices includes one or more devices. In some embodiments, the set of devices excludes the first device (e.g., 1600).

The electronic device (e.g., 1600) adds (1704) the first media item (e.g., 1610C as shown in FIG. 16K) to a playback queue (e.g., 1610A).

The electronic device (e.g., 1600) receives (1706) a second request (e.g., represented by user input 1620 of FIG. 16J) to queue a second media item (e.g., 1612C) for playback on the set of devices (e.g., 1600).

The electronic device (e.g., 1600) adds (1708) the second media item (e.g., 1610D as shown in FIG. 16L) to the playback queue (e.g., 1610A).

The electronic device (e.g., 1600) accesses (1710) the first media item (e.g., 1610C) from a first media streaming service (e.g., represented by 1610E of FIG. 16K).

The electronic device (e.g., 1600) initiates playback (1712) of the first media item (e.g., 1610C) on the set of devices (e.g., 1600);

The electronic device (e.g., 1600) accesses (1714) the second media (e.g., 1610D) item from a second media streaming service (e.g., represented by 1610F of FIG. 16K) different than the first media streaming service (e.g., 1610E).

The electronic device (e.g., 1600) initiates playback (1716) of the second media item (e.g., 1610D) on the set of devices (e.g., 1600).

Allowing a first media item from a first media streaming service and a second media item from a second media streaming service, different than the first media streaming service, to be added to a common playback queue, accessed, and played back allows the user to efficiently queue and manage playback of media from different sources using a single interface, thus requiring fewer user inputs to do so. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first request is received from a first requester (e.g., 1602). In some embodiments, a requester is a device (e.g., 1602). In some embodiments, a requester is a user account (e.g., a user account associated with identifier 1610G of FIG. 16K). In some embodiments, a requester is a user account associated with a device. In some embodiments, the first request includes identification of the first requester (e.g., represented by 1610G of FIG. 16K).

In some embodiments, the second request is received from a second requester (e.g., 1604) different than the first requester (e.g., 1602). In some embodiments, the second request includes identification of the second requester (e.g., represented by 1610H of FIG. 16L).

In some embodiments, the first requester is a second device (e.g., 1602) associated with a first user account (e.g., a user account associated with identifier 1610G). In some embodiments, the second requester is a third device (e.g., 1604) associated with a second user account (e.g., a user account associated with identifier 1610H).

In some embodiments, further in response to receiving the first request, the electronic device (e.g., 1600) determines whether the first requester (e.g., 1602) has permission to add a media item (e.g., 1610C) to the playback queue (e.g., 1610). In accordance with a determination that the first requester has permission to add a media item to the playback queue (e.g., 1610), the electronic device (e.g., 1600) adds the first media item to the playback queue (e.g., 1610 as shown in FIG. 16I). In accordance with a determination that first requester does not have permission to add a media item to the playback queue, the electronic device (e.g., 1600) forgoes adding the first media item to the playback queue (e.g., 1610 remains as shown in FIG. 16D).

In some embodiments, to determine whether the first requester has permission to add a media item to the playback queue, the electronic device (e.g., 1600) determines whether a user account (e.g., a user account associated with identifier 1610G) associated with the first requester (e.g., 1602) has permission to add a media item (e.g., 1610C) to the playback queue (e.g., 1610). In accordance with a determination that the user account associated with the first requester has permission to add a media item to the playback queue, the electronic device (e.g., 1600) adds the first media item (e.g., 1610C) to the playback queue (e.g., 1610 as shown in FIG. 16I). In accordance with a determination that the user account associated with the first requester does not have permission to add a media item to the playback queue, the electronic device (e.g., 1600) forgoes adding the first media item to the playback queue (e.g., 1610 remains as shown in FIG. 16D).

In some embodiments, the electronic device (e.g., 1600) receives, from the second requester (e.g., 1604), a third request (e.g., 1623) to remove the first media item (e.g., 1610C) from the playback queue (e.g., 1610). The electronic device (e.g., 1600) determines whether the second requester has permission to remove the first media item from the playback queue. In accordance with a determination that the second requester has permission to remove the first media item from the playback queue, the electronic device (e.g., 1600) removes the first media item from the playback queue (e.g., 1610 as shown in FIG. 16N). In accordance with a determination that the second requester does not have permission to remove the first media item from the playback queue, the electronic device (e.g., 1600) forgoes removing the first media item from the playback queue (e.g., 1610 remains as shown in FIG. 16K).

In some embodiments, to determine whether the second requester (e.g., 1604) has permission to remove the first media item from the playback queue, the electronic device (e.g., 1600) determines whether the second requester (e.g., 1604) is a member of a predefined set of requesters (e.g., the set of users represented by 603A-603C of FIG. 6A) associated with the first device. In accordance with a determination that the second requester is a member of a predefined set of requesters associated with the first device (e.g., 1600), the electronic device (e.g., 1600) removes the first media (e.g., 1610C) item from the playback queue (e.g., as shown in 1610 of FIG. 16N). In accordance with a determination that the second requester is a member of a predefined set of requesters associated with the first device, the electronic device (e.g., 1600) forgoes removing the first media item from the playback queue (e.g., 1610 remains as shown in FIG. 16K).

In some embodiments, the electronic device (e.g., 1600) transmits (1718), to a fourth device (e.g., 1630 of FIG. 16P), an indication of the content of the playback queue (e.g., playlist 1610 of FIG. 16P) for display on the fourth device. In some embodiments, the indication of the content of the playback queue includes: an indication (e.g., 1610G) of the first requester that is associated with the first media item (e.g., 1610C) in the playback queue (e.g., 1610 of FIG. 16P) (1720), an indication of the first media streaming service from which the first media is accessible (1722), an indication (e.g., 1610H) of the second requester that is associated with the second media item (e.g., 1610D) in the playback queue (1724), and an indication of the second media streaming service from which the second media item is accessible (1726).

In some embodiments, subsequent to adding the first media item to the playback queue: the electronic device (e.g., 1600) determines (1728) whether a queue removal condition (e.g., illustrated by 1632 of FIG. 16P) for the first media item (e.g., 1610C) is satisfied. In some embodiments, the queue removal condition is satisfied if the requester (e.g., 1602) that added the media item (e.g., 1610C) is no longer connected to a local area network that includes the first device (e.g., 1600). In some embodiments, the queue removal condition is satisfied if a predetermined amount of time passes after the first media item was added to the queue. In some embodiments, the predetermined amount of time is 24 hours. In some embodiments, the queue removal condition is satisfied if the requester is no longer connected to the local area network and the first device (e.g., 1600) is not logged in to the first media streaming service. In some embodiments, in accordance with a determination that the queue removal condition for the first media item is satisfied, the electronic device (e.g., 1600) removes (1730) the first media item from the playback queue (e.g., removal of a media item as shown in FIG. 16O). In some embodiments, in accordance with a determination that the queue removal condition for the first media item is not satisfied, the electronic device (e.g., 1600) forgoes removing (1732) the first media item from the playback queue.

In some embodiments, the first device (e.g., 1600) is not included (1734) in the set of devices.

Note that details of the processes described above with respect to method 1700 (e.g., FIGS. 17A-17C) are also applicable in an analogous manner to the methods described below/above. For example, method 700, 900, 1100, 1300, 1500, 1800, 2000, 2200, 2400, 2600, 2800, 3000, 3200, 3400, 3600, 3800, and 3900 optionally includes one or more of the characteristics of the various methods described above with reference to method 1700. For brevity, these details are not repeated below.

FIGS. 18A-18C is a flow diagram illustrating a method for playing back media requested by a plurality of devices using an electronic device in accordance with some embodiments. Method 1800 is performed at a device (e.g., 100, 300, 500, 580, 1600). Some operations in method 1800 are, optionally, combined, the order of some operations are, optionally, changed, and some operations are, optionally, omitted.

As described below, method 1800 provides an intuitive way for playing back media requested by a plurality of devices. The method reduces the cognitive burden on a user for playing back media requested by a plurality of devices, thereby creating a more efficient human-machine interface. For battery-operated computing devices, enabling a user to play back media requested by a plurality of devices faster and more efficiently conserves power and increases the time between battery charges.

The electronic device (e.g., 1600) receives (1802), from a second device (e.g., 1602) associated with a first user (e.g., a first user account), a first request (e.g., represented by user input 1618 of FIG. 16H) to queue a first media item (e.g., 1612B of FIG. 16E) for playback on a set of devices (e.g., 1600). In some embodiments, the set of devices includes the first device (e.g., 1600). In some embodiments, the set of devices includes one or more devices. In some embodiments, the set of devices excludes the first device (e.g., 1600).

The electronic device (e.g., 1600) adds (1804) the first media item (e.g., 1610C of FIG. 16K) to a playback queue (e.g., 1610 of FIG. 16K);

The electronic device (e.g., 1600) receives (1806), from a third device (e.g., 1604) associated with a second user (e.g., a second user account), a second request (represented by user input 1620 of FIG. 16J) to queue a second media item (e.g., 1612C of FIG. 16E) for playback on the set of devices (e.g., 1600). In some embodiments, the second user is different than the first.

The electronic device (e.g., 1600) adds (1808) the second media item (e.g., 1610D of FIG. 16K) to the playback queue (e.g., 1610 of FIG. 16L).

The electronic device (e.g., 1600) initiates playback (1810) of the first media item (e.g., 1610C of FIG. 16K) on the set of devices (e.g., 1600).

The electronic device (e.g., 1600) initiates playback (1812) of the second media item (e.g., 1610D of FIG. 16L) on the set of devices (e.g., 1600).

Allowing a first media item from a first device associated with a first user and a second media item from a second device associated with a second user, different than the first user, to be added to a queue for playback on a common set of devices allows a plurality of users to efficiently share and manage a common playback queue from any of a plurality of devices, thus requiring fewer user inputs to do so. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first request includes (1814) a first identifier (e.g., 1610G of FIG. 16K) of at least one of the first user and the second device.

In some embodiments, the second request includes (1814) a second identifier (e.g., 1610H of FIG. 16K) of at least one of the second user and the third device.

In some embodiments, the second device (e.g., 1602) is associated with a first user account that is associated with the first user. In some embodiments, the first user account is a user account on a media streaming service. For example, exemplary media streaming services include Apple Music, Spotify, or the like. In some embodiments, the first user account is a cloud-based service user account. For example, exemplary media streaming services include Apple iCloud, or the like.

In some embodiments, the third device (e.g., 1604) is associated with a second user account that is associated with the second user.

In some embodiments, the electronic device transmits, to a fourth device (e.g., 1630 of FIG. 16P), an indication (e.g., playlist 1610 of FIG. 16P) of the content of the playback queue for display on the fourth device, wherein the indication of the content of the playback queue includes: the first identifier (e.g., 1610G or 1610E of FIG. 16P) associated with the first media item (e.g., 1610C of FIG. 16P) in the playback queue, and the second identifier (e.g., 1610H or 1610F of FIG. 16P) associated with the second media item (e.g., 1610D of FIG. 16P) in the playback queue.

In some embodiments, further in response to receiving the second request, and in accordance with a determination that the third device (e.g., 1604) has permission to add a media item to the playback queue, the electronic device (e.g., 1600) adds the second media (e.g., 1610D of FIG. 16K) item to the playback queue. In some embodiments, in accordance with a determination that the third device does not have permission to add a media item to the playback queue, the electronic device (e.g., 1600) forgoes adding the second media item to the playback queue (e.g., 1610 remains as shown in FIG. 16I).

In some embodiments, further in response to receiving the second request (1818): in accordance with a determination that the second user (e.g., 1610H of FIG. 16K) associated with the third device (e.g., 1604) has permission to add a media item (e.g., 1610D of FIG. 16K) to the playback queue, the electronic device (e.g., 1600) adds (1820) the second media item to the playback queue (e.g., as shown in FIG. 16K). In some embodiments, in accordance with a determination that the second user associated with the third device does not have permission to add a media item to the playback queue, the electronic device (e.g., 1600) forgoes adding (1822) the second media item to the playback queue (e.g., the playback queue remains as shown in FIG. 16I, which does not include media item 1610D).

In some embodiments, the electronic device (e.g., 1600) receives (1824), from the third device (e.g., 1604), a third request (e.g., 1623 of FIG. 16M) to remove the first media item (e.g., 1610C) from the playback queue. In some embodiments, in response to receiving the third request (1826), and in accordance with a determination that the third device has permission to remove the first media item from the playback queue, the electronic device (e.g., 1600) removes (1828) the first media item from the playback queue (e.g., 1610 as shown in FIG. 16N). In some embodiments, in accordance with a determination that the third device does not have permission to remove the first media item from the playback queue, the electronic device (e.g., 1600) forgoes removing (1830) the first media item from the playback queue (e.g., and displays message 1624 of FIG. 16O).

In some embodiments, in response to receiving the third request (e.g., 1623 of FIG. 16M), and in accordance with a determination that the second user is a member of a predefined set of users (e.g., the set of users represented by 603A-603C of FIG. 6A) associated with the first device (e.g., 1600), the electronic device (e.g., 1600) removes the first media item (e.g., 1610C) from the playback queue (e.g., 1610 as shown in FIG. 16N). In some embodiments, in accordance with a determination that the second user is not a member of a predefined set of users associated with the first device, the electronic device (e.g., 1600) forgoes removing the first media item from the playback queue.

In some embodiments, subsequent to adding the first media item to the playback queue, and in accordance with a determination that a queue removal condition (e.g., illustrated by 1632 of FIG. 16P) for the first media item (e.g., 1610C) is satisfied, the electronic device (e.g., 1600) removes the first media item from the playback queue (e.g., 1610 as shown in FIG. 16N). In some embodiments, the queue removal condition is satisfied if the requester (e.g., 1602) that added the media item (e.g., 1610C) is no longer connected to a local area network that includes the first device (e.g., 1600). In some embodiments, the queue removal condition is satisfied if a predetermined amount of time passes after the first media item was added to the queue. In some embodiments, the predetermined amount of time is 24 hours. In some embodiments, the queue removal condition is satisfied if the requester is no longer connected to the local area network and the first device (e.g., 1600) is not logged in to a media streaming service (e.g., that is the source of the media item). In some embodiments, in accordance with a determination that the queue removal condition for the first media item is not satisfied, the electronic device (e.g., 1600) forgoes removing the first media item from the playback queue.

In some embodiments, the first device (e.g., 1600) is not included (1816) in the set of devices.

In some embodiments, the first device (e.g., 1600) is associated with a media preference profile, wherein the media preference profile is associated with the first user. In some embodiments, further in response to receiving, from the second device (e.g., 1602) associated with the first user, the request (e.g., 1618) to queue the first media item (e.g., 1610C) for playback, the electronic device (e.g., 1600) updates (1832) the media preference profile based on the first media item. In some embodiments, further in response to receiving, from the third device associated with the second user, the request to queue the second media item for playback, the electronic device (e.g., 1600) forgoes updating (1834) the media preference profile based on the second media item. For example, if the request to queue the first media item is received from a device or user that is not associated with an owner of device 1600 (e.g., a home member), then a request to queue the media item will not affect the owner's taste preferences (e.g., which can be based on history of media played back on device 1000, or other home devices).

Note that details of the processes described above with respect to method 1800 (e.g., FIGS. 18A-18C) are also applicable in an analogous manner to the methods described below/above. For example, method 700, 900, 1100, 1300, 1500, 1700, 2000, 2200, 2400, 2600, 2800, 3000, 3200, 3400, 3600, 3800, and 3900 optionally includes one or more of the characteristics of the various methods described above with reference to method 1800. For brevity, these details are not repeated below.

FIGS. 19A-19AL illustrate exemplary user interfaces for using a first device to configure a second device, in accordance with some embodiments. The user interfaces in these figures are used to illustrate the processes described below, including the processes in FIGS. 20A-20C.

FIG. 19A illustrates a scenario (e.g., similar to that shown in FIG. 10E) in which a user brings device 1900 into close proximity to device 1906. In this example, device 1900 is being used to configure device 1906 (e.g., an initial configuration after powering on device 1906 for the first time). As shown, device 1906 is outputting an audio tone signal 1904 (e.g., representing sound waves). In some embodiments, device 1906 outputs an audio tone signal (e.g., 1904) in response to an indication that device 1900 is in close proximity to device 1906. In some embodiments, device 1900 outputs an audio tone signal (not illustrated) in response to an indication that device 1900 is in close proximity to device 1906. In some embodiments, the audio tone signals from devices 1900 and 1906 are synchronized (e.g., are outputted concurrently). In some embodiments, one of the audio tone signals are staggered in time (e.g., device 1900 plays a tone first, followed by device 1906). In some embodiments, the audio tone signals are harmonically related or compatible (e.g., as described above with respect to FIGS. 10O-10N). For brevity, the above description regarding placement and detection of devices in close proximity (e.g., with respect to FIGS. 10A-10O) is hereby incorporated by reference, and thus not repeated.

In some embodiments, an audio tone signal is only output by one device (e.g., to be configured, such as device 1906) that is in close proximity to device 1900, other than device 1900. For example, in some situations, device 1900 is placed in close proximity to multiple other devices that can be configured using device 1900. For example, a user may have purchased two speakers (e.g., such as device 1906) and wishes to configure one of them. In such case, it is useful to the user to be aware of which speaker device 1900 has connected to and that will be configured, for example, according to the techniques described below. Thus, even though device 1900 is brought into close proximity to two configurable devices, only the configurable device (e.g., device 1906) that will be configured during the configuration process will output an audio tone in response to an indication that device 1900 is in close proximity.

Figure 19B:
Figure 19C:
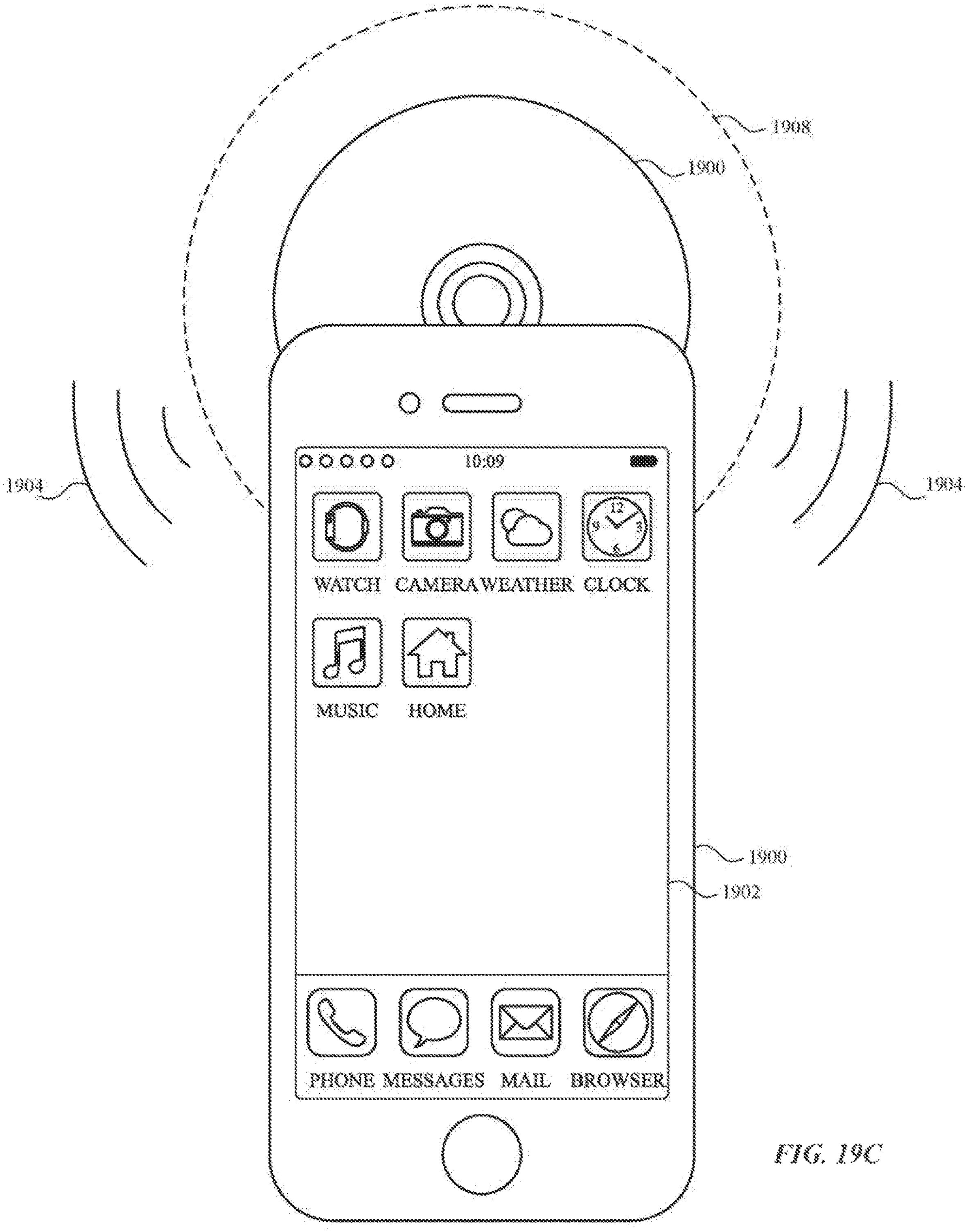

FIG. 19B depicts an exemplary state of device 1900 immediately prior to being placed in close proximity to device 1906. As shown, device 1900 displays a home screen (e.g., home screen 605 as shown in FIG. 6B) on display 1902. At FIG. 19C, device 1900 is placed into close proximity to device 1906 (e.g., is within the proximity zone 1908). In some embodiments, proximity is detected in a manner similar to that discussed with respect to FIGS. 10C-10G. In some embodiments, in response to detecting an indication that device 1900 entered into close proximity to device 1906, device 1900 displays proximity card 1910, as shown in FIG. 19D.

Figure 19D:
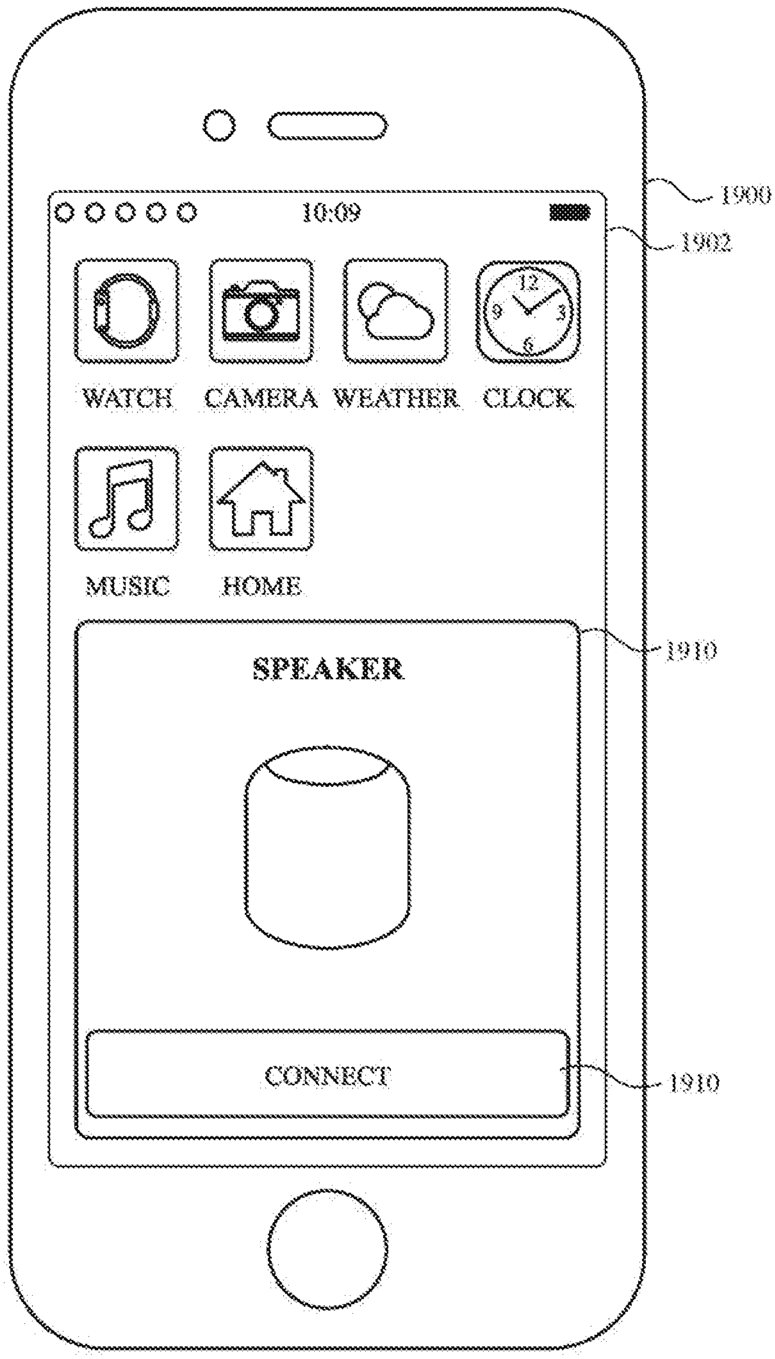

FIGS. 19D-19AJ illustrate exemplary interfaces of a configuration process, in accordance with some embodiments. In this example, the configuration process is a process for configuring a second device using a first device. Thus, as shown, the interfaces are displayed on a first device (e.g., device 1900), and the steps of the configuration process pertain to, for example, transmitting data to the second device, selecting or entering configuration settings, and the like. In some embodiments, the steps shown in FIGS. 19D-19AJ can be displayed in any order (e.g., other than that shown or described herein). In some embodiments, one or more of the steps shown in FIG. 19D-19AJ are omitted from a configuration process. In some embodiments, one or more steps other than those shown in FIG. 19D-19AJ are added to a configuration process. In some embodiments, the first device and the second device are devices that include one or more features of devices 100, 300, 500, or 580.

FIG. 19D illustrates an exemplary setup card. In some embodiments, device 1900 displays setup card 1910 in response to being placed in close proximity to device 1906. Thus, a setup card is also referred to herein as a "proximity card" as described above, the description of which is hereby incorporated by reference. In some embodiments, a device continues displaying a proximity card after being removed from close proximity to another device.

Setup card 1910 includes an identification of the device to be configured, which is the device (e.g., 1906) that device 1900 was placed in close proximity to. As shown, setup card 1910 includes the title "Speaker" (e.g., device 1906 is a smart speaker), as well as an image depicting the device (e.g., in the shape of device 1906 as shown in FIG. 19A). Setup card 1910 also includes affordance 1910A. In some embodiments, device 1900 initiates a configuration process (or otherwise proceeds to a next step in a configuration process) in response to receiving selection of affordance 1910A.

Figure 19E:
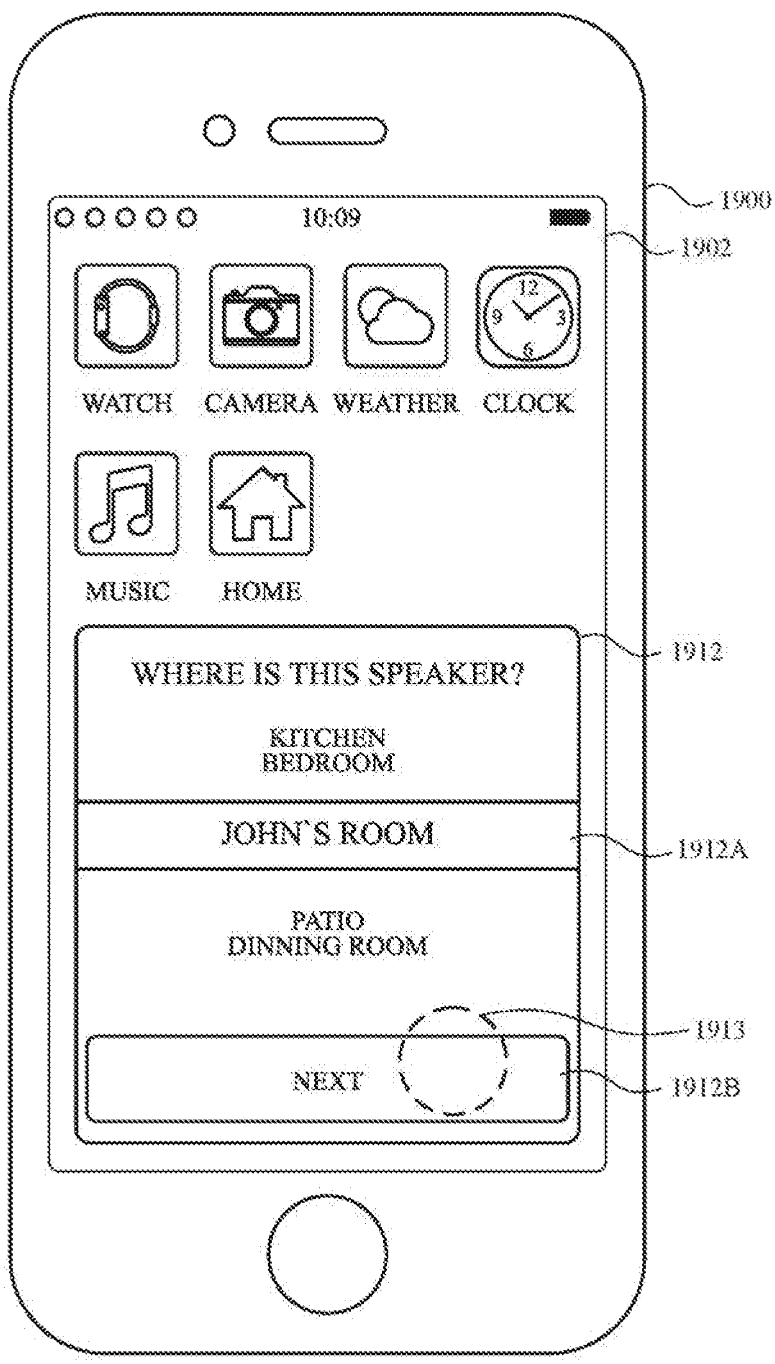

At FIG. 19E, device 1900 displays setup card 1912. In some embodiments, device 1900 displays setup card in response to user input selection (not illustrated) of affordance 1910A in FIG. 19D. Setup card 1912 depicts an exemplary location selection interface. Setup card 1912 includes a location selection affordance 1912A (e.g., which can be a scrollable list or a movable list item selector). Setup card also includes affordance 1912B, for example, for proceeding to a next step in the configuration process. In this example, the location "John's Room" is selected using affordance 1912A, and device 1900 receives user input 1913 on affordance 1912B. In some embodiments, device 1900 transmits configuration data in response to user input (e.g., 1913) associated with a setup card. In some examples, device 1900 transmits a location identifier for "John's Room" to device 1906, in response to proceeding to a next step (e.g., in response to user input 1913) while the location "John's Room" is selected. In some examples, device 1906 receives the location identifier and saves it into memory (e.g., storing it with one or more other configuration settings). In some embodiments, device 1900 transmits the configuration data to a third device (e.g., not device 1900 or 1906). For example, device 1900 can transmit configuration data to another device within the user's home (e.g., a home control hub device, such as an Apple TV by Apple Inc. of Cupertino, Calif. USA). In some embodiments, device 1900 displays setup card 1914 of FIG. 19F in response to user input 1913.

Figure 19F:
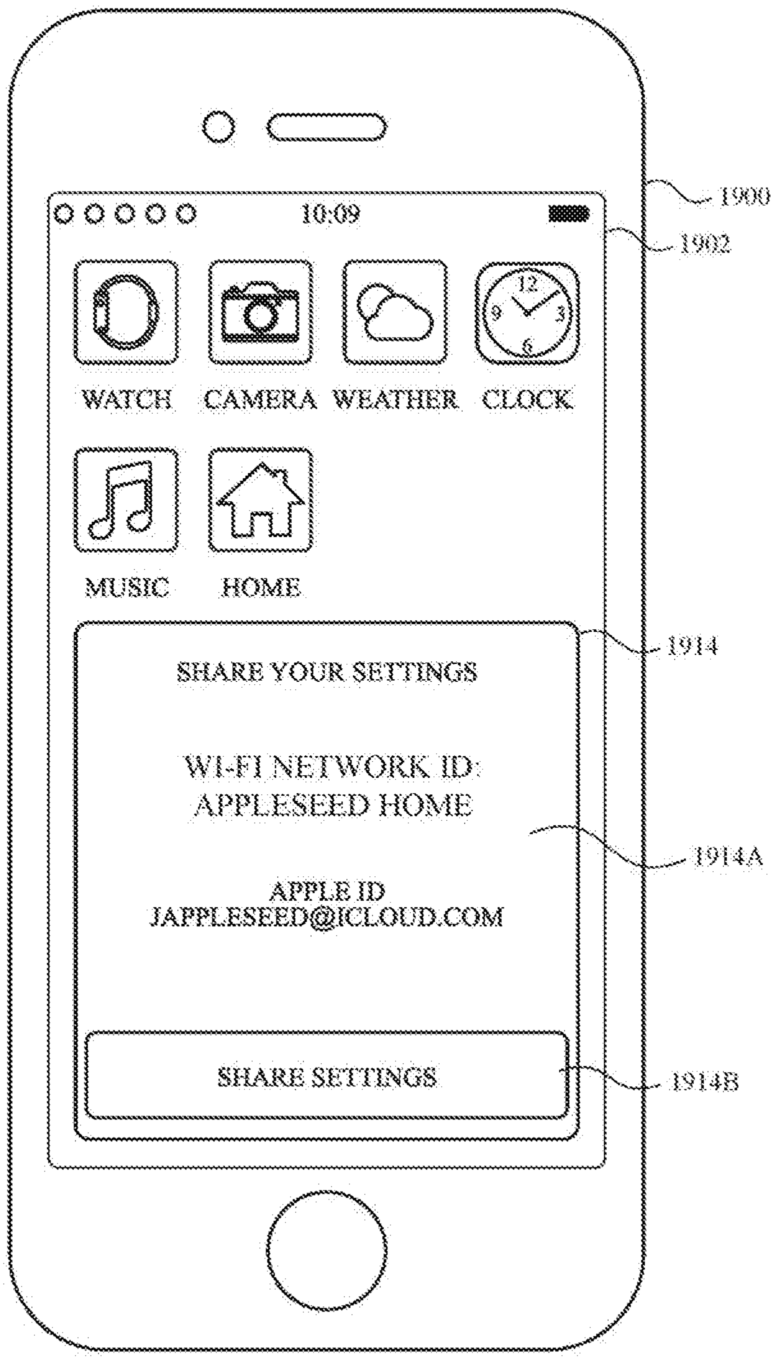

At FIG. 19F, device 1900 displays setup card 1914. Setup card 1914 includes a prompt to the user to share settings with device 1906 ("Share Your Settings"). In some embodiments, setup card 1914 includes an identification of settings to be shared with device 1906. For example, as shown in FIG. 19F, setup card identifies a user account (e.g., login credentials) and a home wireless network (e.g., connection credentials) to be transmitted to device 1906. In some embodiments, device 1900 is already connected to or logged into (or otherwise able to log into (e.g., the credentials are stored in memory)) the accounts or networks identified by setup card 1914. Thus, setup card 1914 provides an easy interface for identifying and permitting the sharing of certain settings with device 1906. In some embodiments, setup card 1914 allows selection of one or more of the settings to share with device 1906. For example, setup card 1914 can include selection affordances that allow selection of less than all of the accounts listed therein, thus allowing the user to share some (but not all) settings with device 1906. As shown in FIG. 19F, the settings to be shared in this example are:

credentials for a user account (e.g., associated with the "Apple ID" "JAppleseed@icloud.com") and credentials for a wireless network (e.g., for the Wi-Fi network named "Appleseed Home"). In some embodiments, device 1900 transmits the settings information to device 1900 in response to user input selection of affordance 1914B.

Figure 19G:
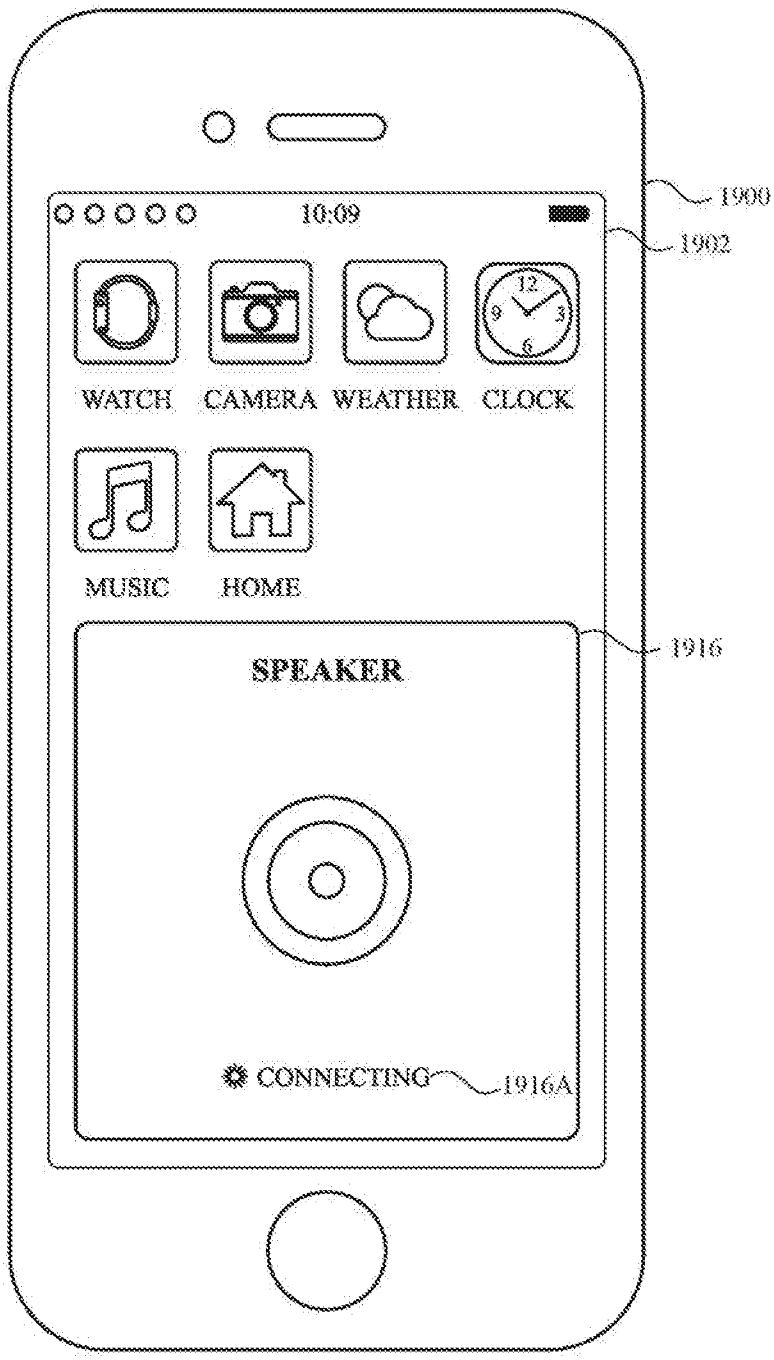

At FIG. 19G, device 1900 displays setup card 1916. In some embodiments, device 1900 displays setup card 1916 in response to user input selection of affordance 1914B. In some examples, setup card 1916 is displayed while device 1900 exchanges data with device 1906 (e.g., device 1900 transmits settings data as described above). For example, setup card 1916 includes status 1916A showing that the devices are connecting (or otherwise exchanging data).

Figure 19H:
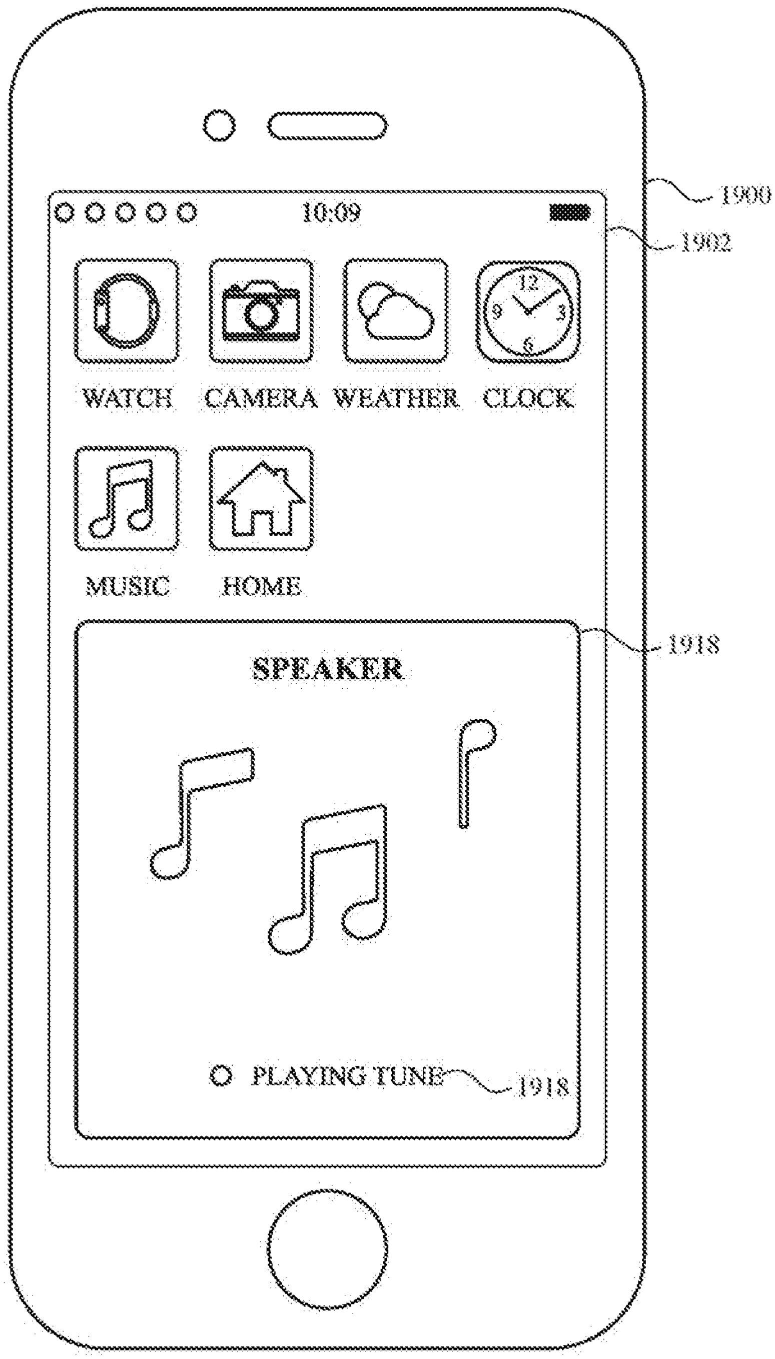

At FIG. 19H, device 1900 displays setup card 1918. In some embodiments, device 1900 displays setup card 1918 subsequent to setup card 1916. For example, device 1900 displays setup card 1916 after transmitting the settings data to device 1906. Setup card 1918 includes a message 1918A. In some embodiments, the message conveys a current state of the configuration process. For example, as shown in FIG. 19H, message 1918A says "Playing Tone". Thus, in the example depicted, device 1906 is currently playing a tone (e.g., an audio tone signal). In some embodiments, while displaying message 1916A, device 1900 is listening for the tone played by device 1906. For brevity, the description of audio tone signals above (e.g., with respect to FIGS. 10A-10O) are hereby incorporate by reference.

In some embodiments, device 1900 displays a message (not illustrated) indicating that the tone was not detected by device 1900. For example, device 1900 can update message 1916A to read "Your device is listening but cannot detect a tone, please move your phone closer".

In some embodiments, setup card 1918 includes one or more fields for entering a passcode (not illustrated). In some embodiments, device 1900 displays setup card 1972 (FIG. 19AJ), which includes a keyboard and fields for entering a passcode. For example, as described above (e.g., with respect to FIGS. 10A-10O), device 1906 can output a dictated passcode (e.g., if a tone cannot be detected by device 1900 after a threshold number of attempts). Thus, using the one or more fields of setup card 1918 or 1972, a user can enter the passcode that was dictated by device 1906, for example, in order to progress to a next step in the configuration process (e.g., complete the setup process).

Figure 19I:
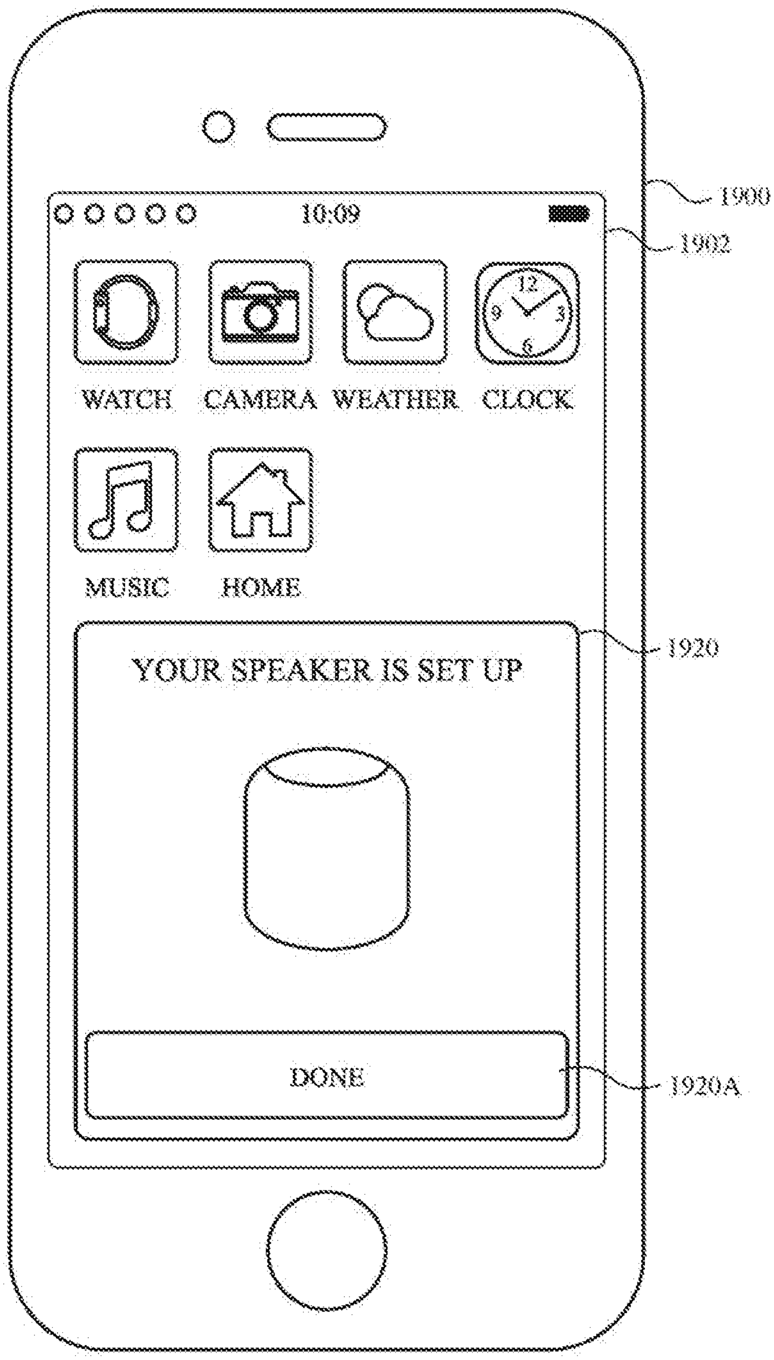

At FIG. 19I, device 1900 displays setup card 1920, which depicts a completion setup card. In some embodiments, device 1900 displays setup card 1920 after transmitting the settings data to device 1906. In some embodiments, device 1900 displays setup card 1920 after detecting an audio tone output by device 1906. Selection of the done affordance 1920A, in some examples, dismisses the setup card 1920.

Figure 19J:
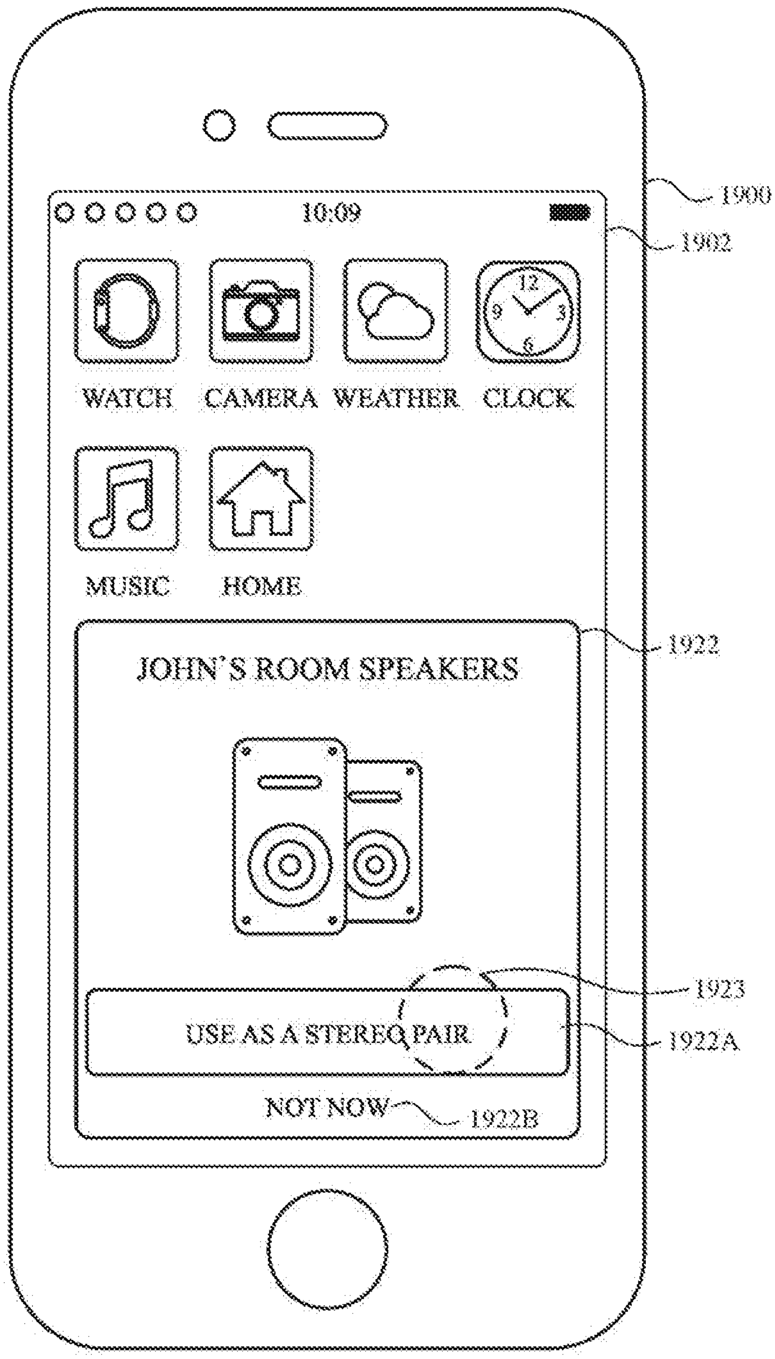
Figure 19K:
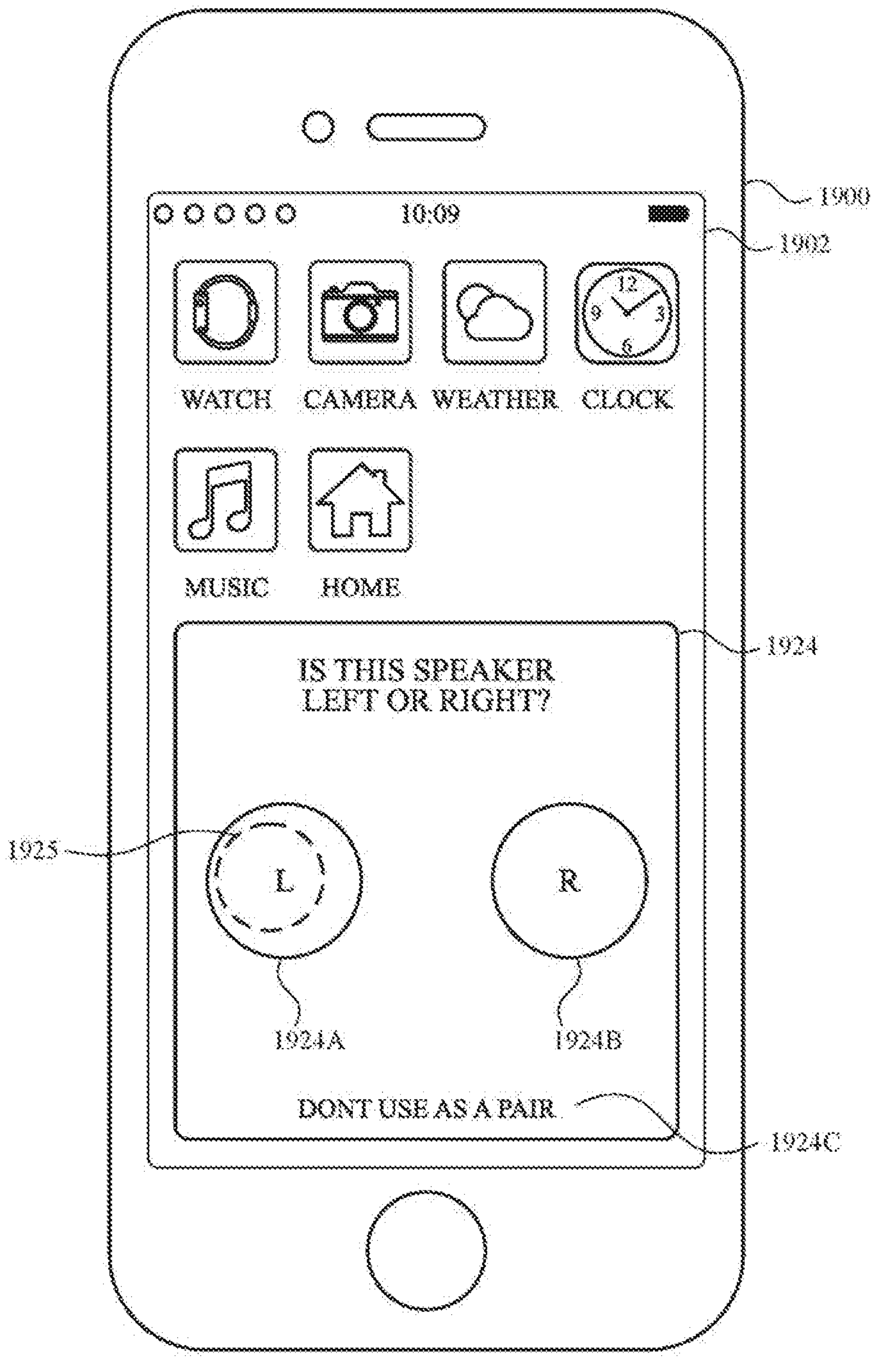
Figure 19L:
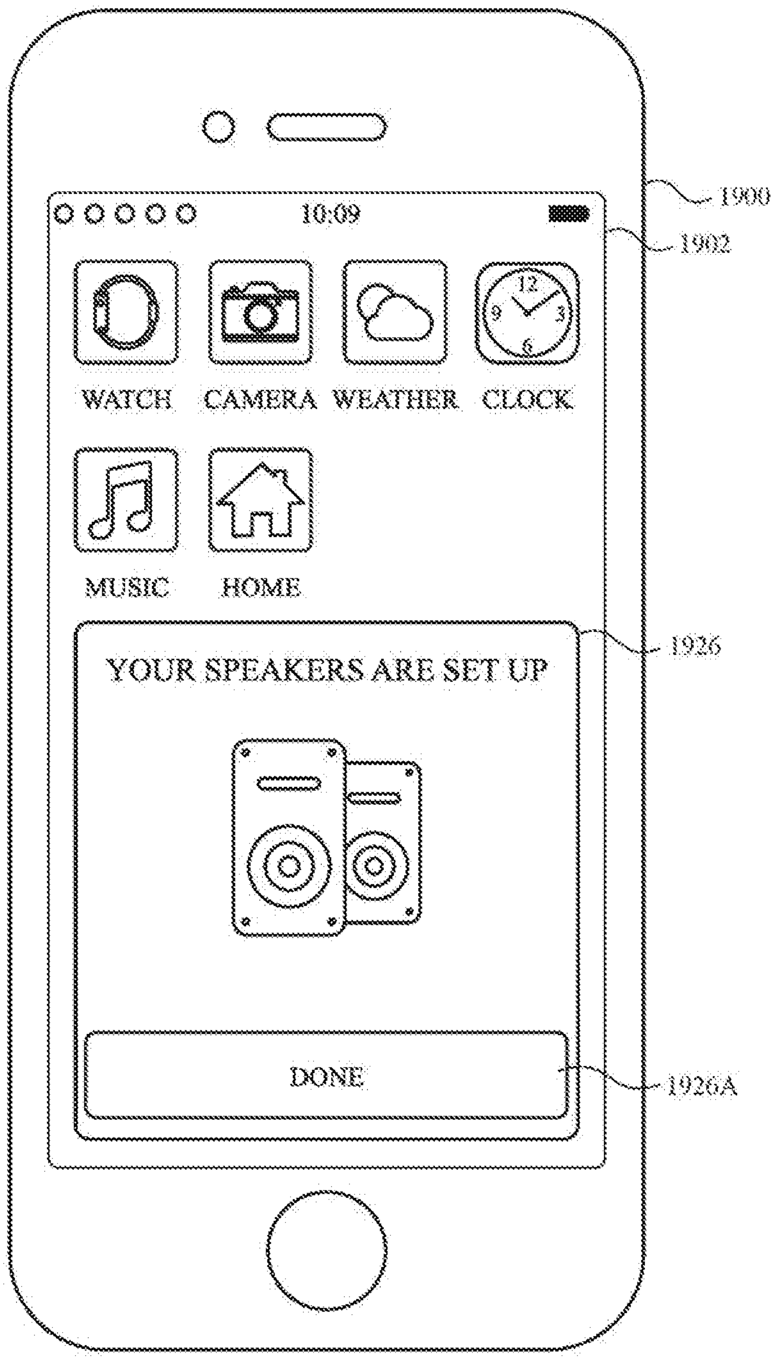

As described previously, a device (e.g., device 1906) can be configured to be part of a device group (e.g., a stereo pair). FIGS. 19J-19L illustrate exemplary interfaces for configuring a device to be part of a device group, in accordance with some embodiments.

At FIG. 19J, device 1900 displays setup card 1922. In some embodiments, device 1900 displays setup card 1922 in response to user input 1913 (e.g., representing selection of affordance 1912B of FIG. 19E, setting the location of device 1906). In the example shown in FIG. 19J, the location "John's Room" already includes an existing device (e.g., another smart speaker like device 1906), and the user is presented the option to create a device group that includes the existing device and device 1906. The user can select either affordance 1922A ("Use as a stereo pair") or affordance 1922B ("Not now"). In some examples, selection of affordance 1922B continues the configuration process as described above (e.g., display of setup card 1914). As shown in FIG. 19J, device 1900 receives user input 1923 representing selection of affordance 1922A. In some embodiments, device 1900 displays setup card 1924 in response to receiving user input 1923.

FIG. 19K illustrates an exemplary device group configuration interface. Setup card 1924 includes affordances 1924A and 1924B for selecting an audio channel for the device being configured (e.g., device 1906). In this example, the device group being created is a stereo pair (e.g., two devices that will be used to respectively output left and right channel stereo audio). In some embodiments, selection of affordance 1924C cancels the creation of a device group, and continues the configuration process as described above (e.g., display of setup card 1914). At FIG. 19K, device 1900 receives user input 1925 representing selection of the left channel (denoted "L"). Thus, device 1906 will be configured to output the left channel of a stereo audio signal for the device group named "John's Room Speakers".

In some embodiments, device 1900 displays setup card 1926 of FIG. 19L in response to receiving user input 1925. FIG. 19L indicates that the creation of the stereo pair was successful and includes affordance 1926A. In some embodiments, selection of affordance 1926A continues the configuration process as described above (e.g., display of setup card 1914).

Figure 19M:
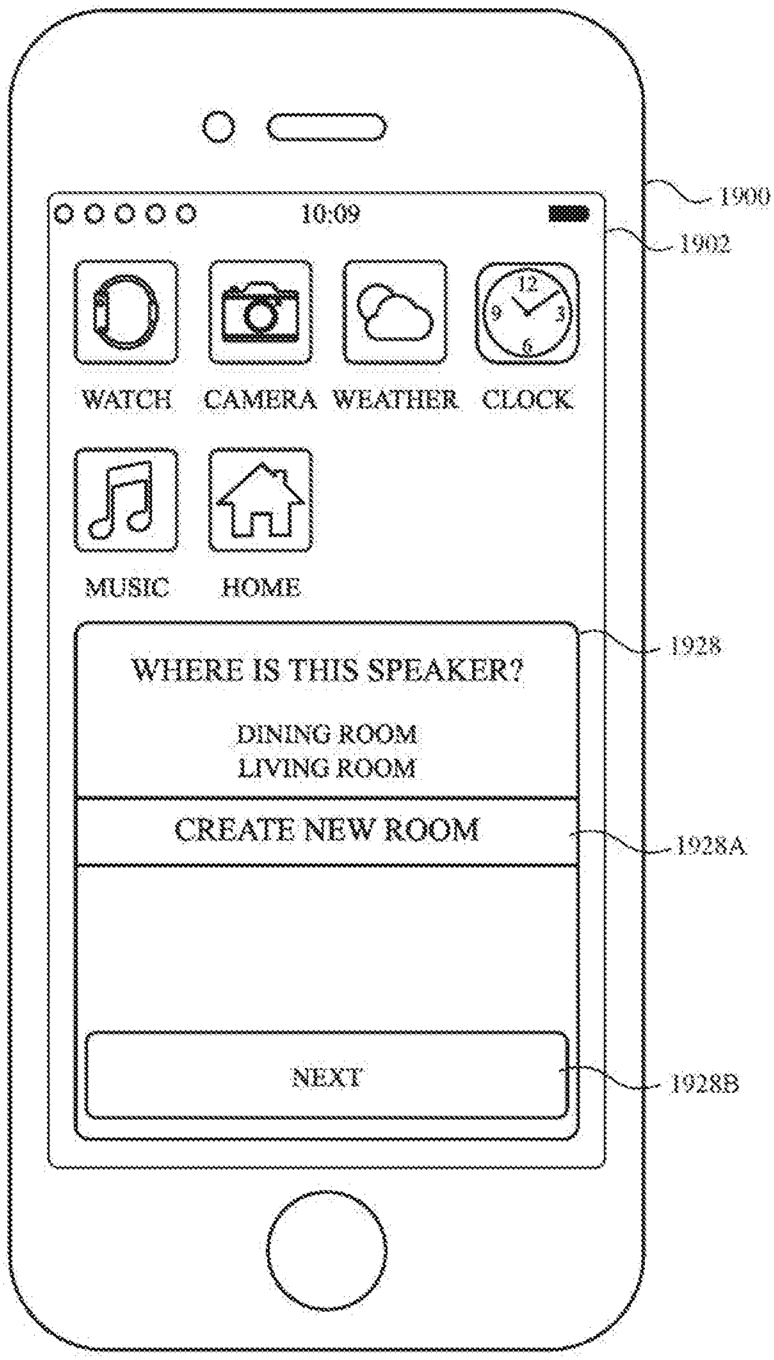
Figure 19N:
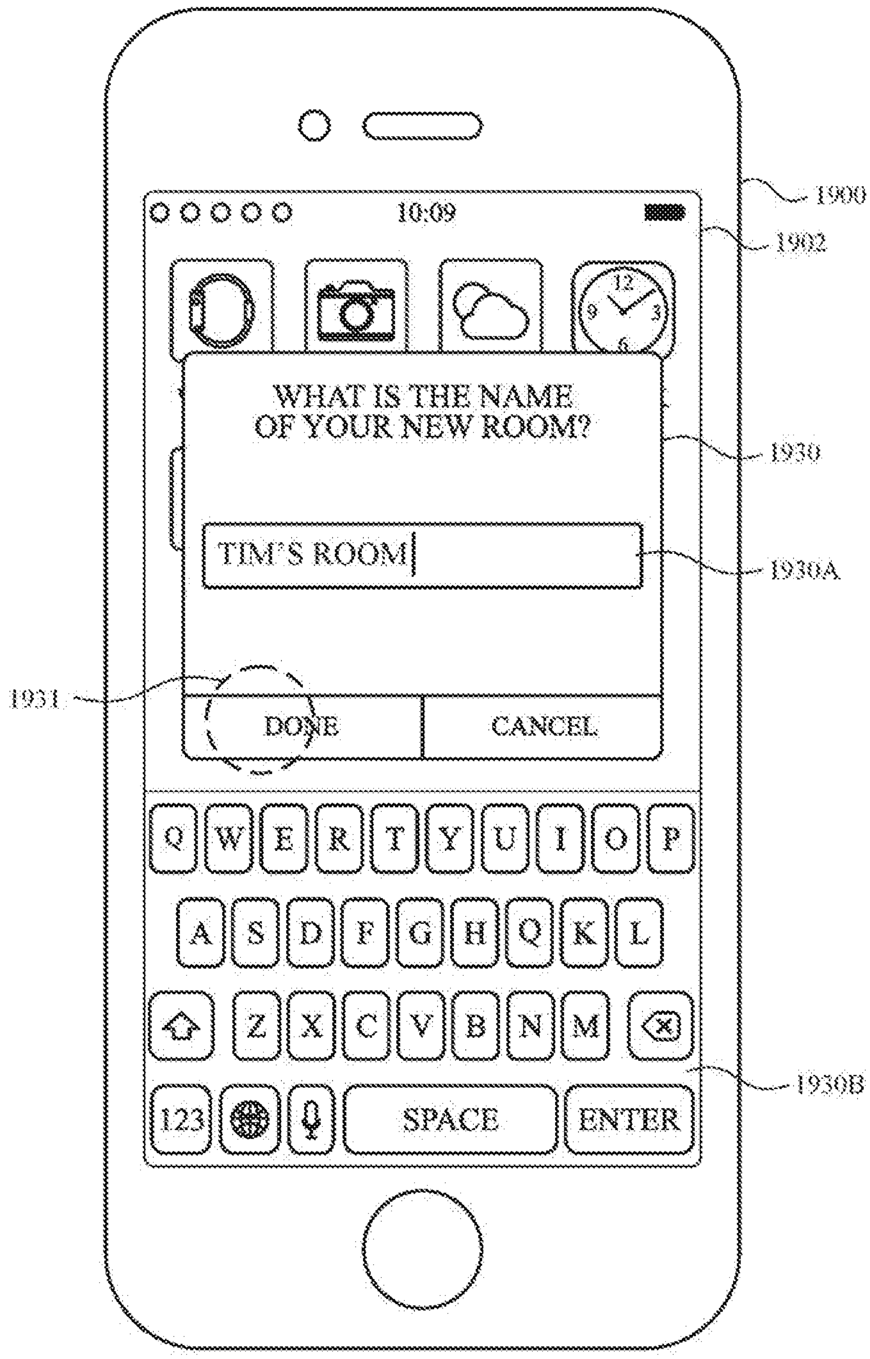

FIGS. 19M-19N illustrate exemplary interfaces for creating a new location. In some examples, the configuration process allows for a user to create a new location identifier to associate with device 1906. Setup card 1928 of FIG. 19M illustrates an alternative version of the location selection setup card 1912 of FIG. 19E. Setup card 1928 includes an option, selected by affordance 1928A, to create a new location (e.g., as indicated by the text "Create New Room"). FIG. 19N illustrates an exemplary interface 1930 for entering a location identifier. In some embodiments, interface 1930 is displayed as a proximity card. Interface 1930 includes a field 1930A for entering a name of a new location (e.g., room), for example, using displayed keyboard 1930B. As shown, the user of device 1900 has entered the name "Tim's Room" into field 1930A. Device 1900 receives user input 1931 representing selection of a done affordance. In some embodiments, device 1900 creates the location named "Tim's Room" and associates device 1906 therewith (e.g., transmits the identifier to device 1900) in response to selection of the done affordance. Thus, in some examples, the user is not required to exit, or otherwise terminate, the configuration process in order to seek out an interface (e.g., an interface of a home control application, as described above with respect to FIG. 6A) for creating a new location identifier for their home group of devices, only to return and restart the configuration process from the beginning, wasting time and device resources. In some embodiments, in response to receiving user input 1931, device displays setup card 1914. In some embodiments, in response to receiving user input 1931, device 1900 proceeds to a next step in a configuration process.

In some embodiments, a location identifier is a name associated with the device. For instance, in some examples, a location identifier does not include reference to any particular location (e.g., "Speaker 1"). Thus, the location identifier can simply be used as a name by which to identify a configured device (e.g., at a multi-device interface as described above).

Figure 19O:
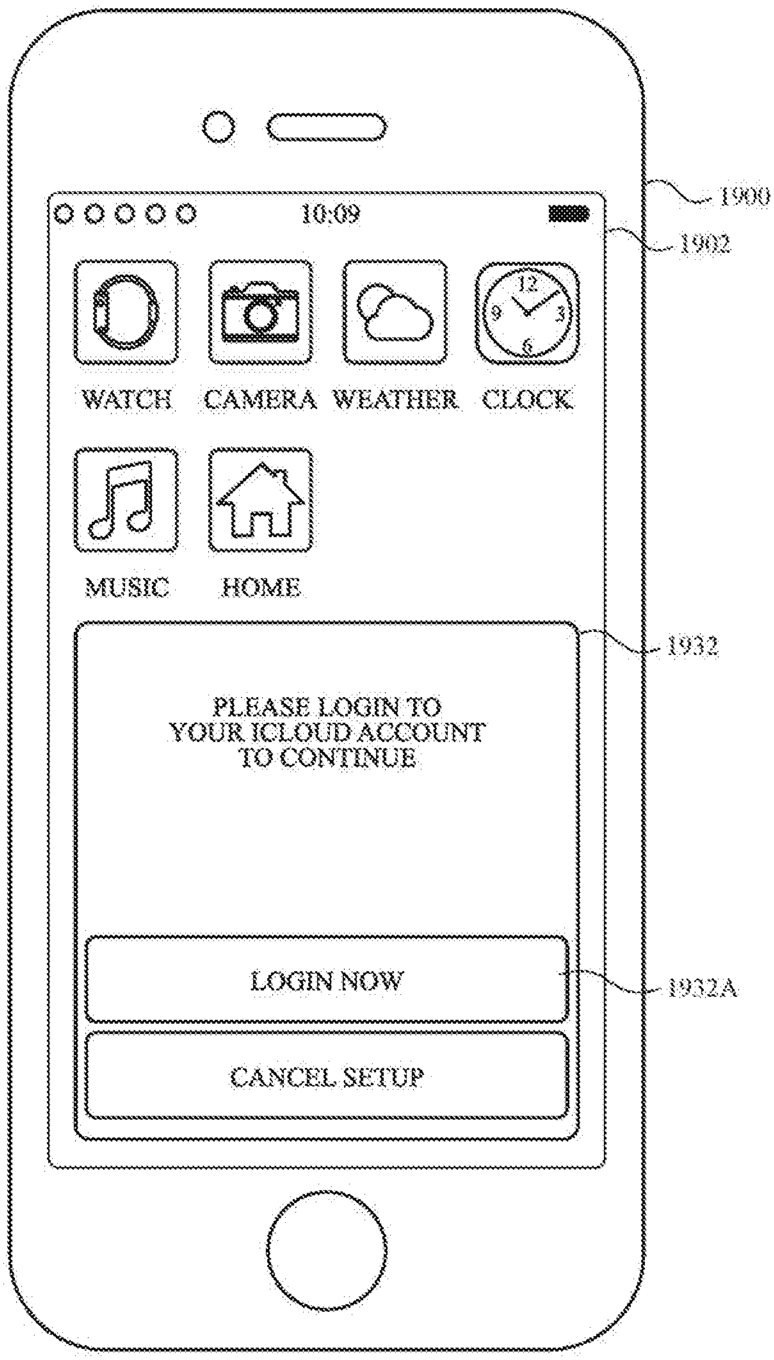
Figure 19P:
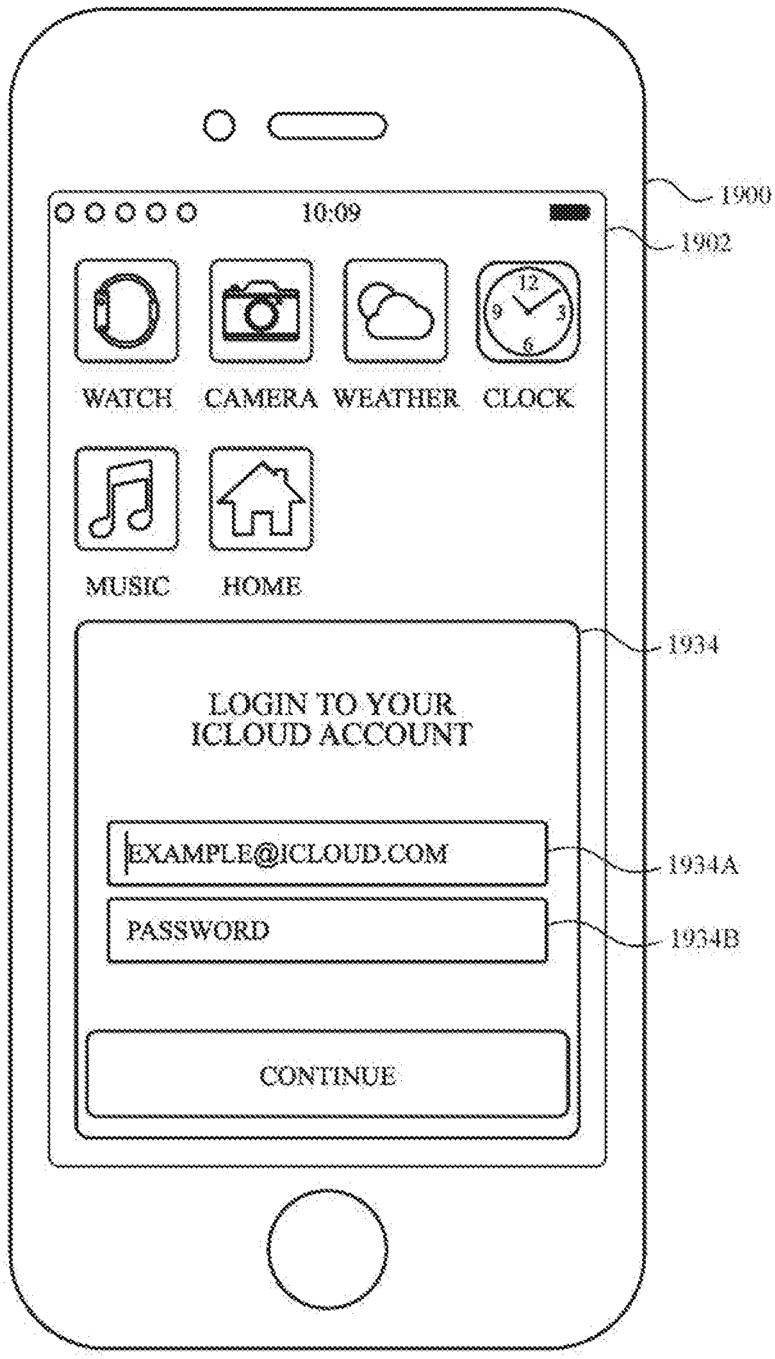

In some examples, the configuration process requires that device 1900 logs into a user account in order to proceed with the configuration process. FIGS. 19O-19P illustrate exemplary interfaces for logging into a user account during a configuration process, in accordance with some embodiments. Setup card 1932 includes the message "Please login to your iCloud account to continue", and includes an affordance 1932A that includes the option "Login Now". In some embodiments, setup card 1932 is displayed prior to setup card 1914. For example, if device 1900 determines that it is not logged into a required user account, it displays setup card 1932 in response. In some embodiments, after receiving login credentials, device 1900 displays setup card 1914. In some embodiments, device 1900 displays setup card 1932 in response to selection of affordance 1914B ("Share Settings").

At FIG. 19P, device 1900 displays a setup card 1934 with fields 1934A and 1934B for receiving login credentials during the configuration process. Thus, in some examples, the user is not required to exit, or otherwise terminate, the configuration process in order to seek out a login page, only to return and restart the configuration process from the beginning, wasting time and device resources. In some embodiments, after receiving login credentials in fields 1934A and 1934B (e.g., and after verifying them or using them to successfully login to the user account), device displays setup card 1914. In some embodiments, after receiving valid credentials (e.g., via setup card 1934), device 1900 proceeds to a next step in a configuration process.

Figure 19Q:
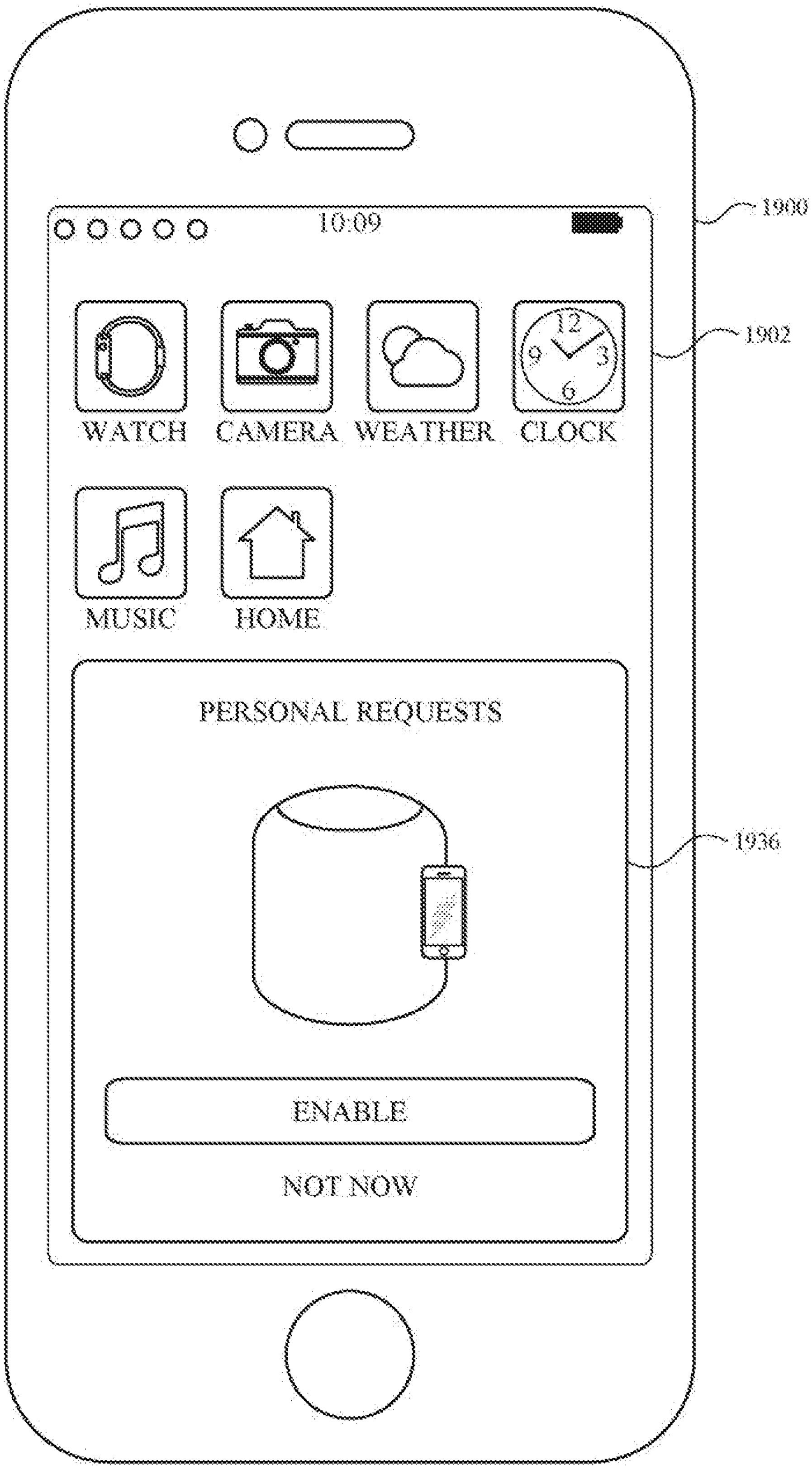
Figure 19R:
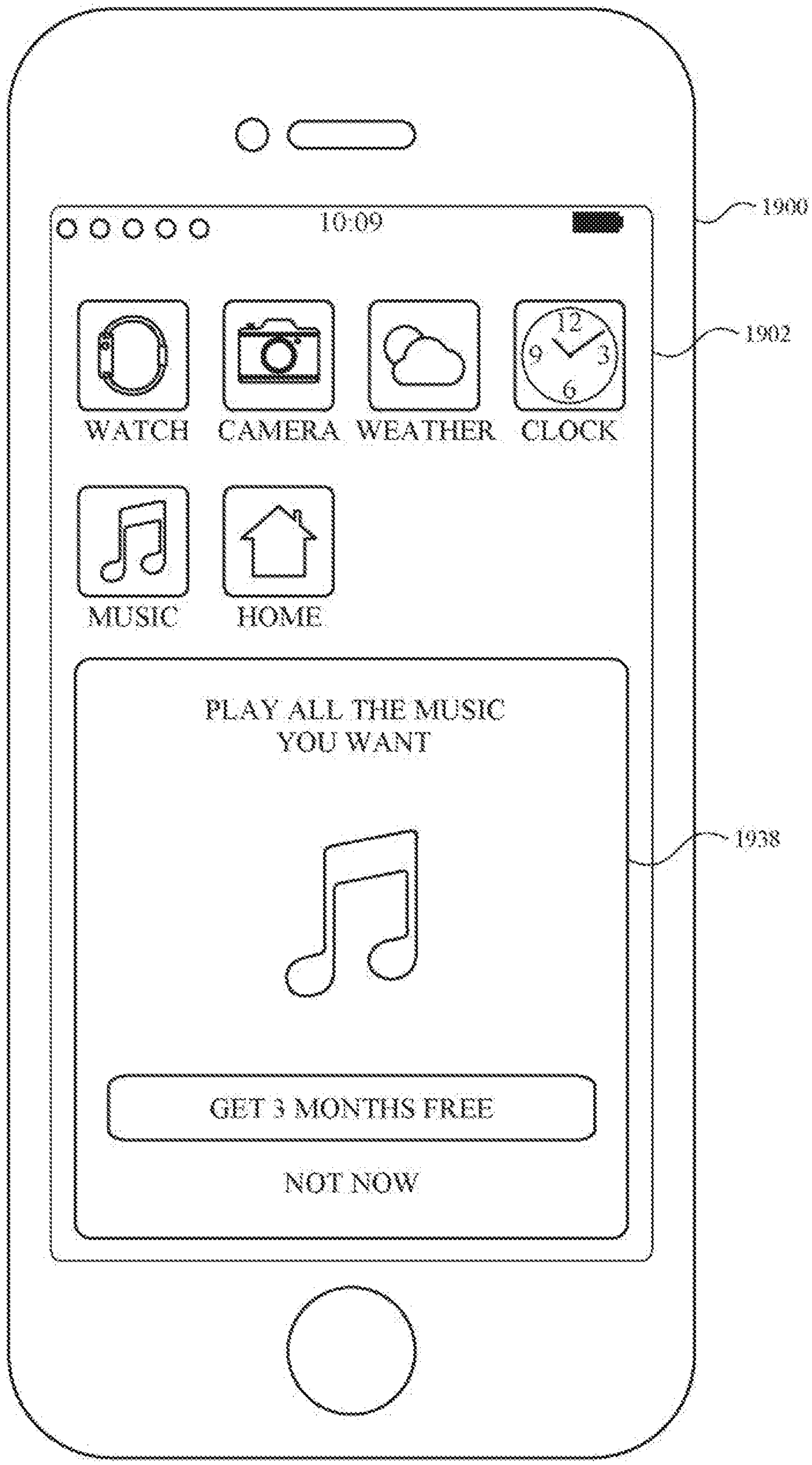

FIGS. 19Q-19R illustrate additional exemplary interfaces that can be displayed during a configuration process. FIG. 19Q illustrates an exemplary interface for enabling a voice assistant function. In some examples, the configuration process allows the user to enable a voice assistant function that allows a device (e.g., device 1906) to provide (e.g., via audio output, such as dictation) personal data associated with a user account. For example, this feature can be referred to as "personal requests". In some examples, device 1906 is used by several users (associated with respective user accounts), and thus explicit permission to enable a personal requests feature can be solicited from a user (e.g., of device 1900). Personal request setup card 1936 includes an affordance (labeled "Enable") that, when selected, enables the personal requests feature, and an affordance (labeled "Not Now") that, when selected, does not enable the personal requests feature (e.g., and dismisses the card and proceeds to a next step in the configuration process). In some embodiments, the personal requests feature can be enabled or disabled after the configuration process (e.g., via a settings menu, or the like). In some embodiments, card 1936 is optional. In some embodiments, card 1936 is displayed in any order during configuration process.

FIG. 19R illustrates an exemplary interface for enabling a music service subscription. In some embodiments, during the configuration process, a device (e.g., device 1900) determines that it does not include a valid subscription to a music service (e.g., the service is not enabled, the user account has not subscribed, or one or more credentials for accessing the music service are not accessible to the device). Setup card 1938 includes an affordance (labeled "Get 3 Months Free") that, when selected, enables the user to setup a music service subscription, and an affordance (labeled "Not Now") that, when selected, does not proceed to setup the music subscription service (e.g., and dismisses the card and proceeds to a next step in the configuration process). In some embodiments, the music service subscription can be enabled or disabled after the configuration process (e.g., via a settings menu, or the like). In some embodiments, setup card 1938 is optional. In some embodiments, card 1938 is displayed in any order during configuration process.

Figure 19S:
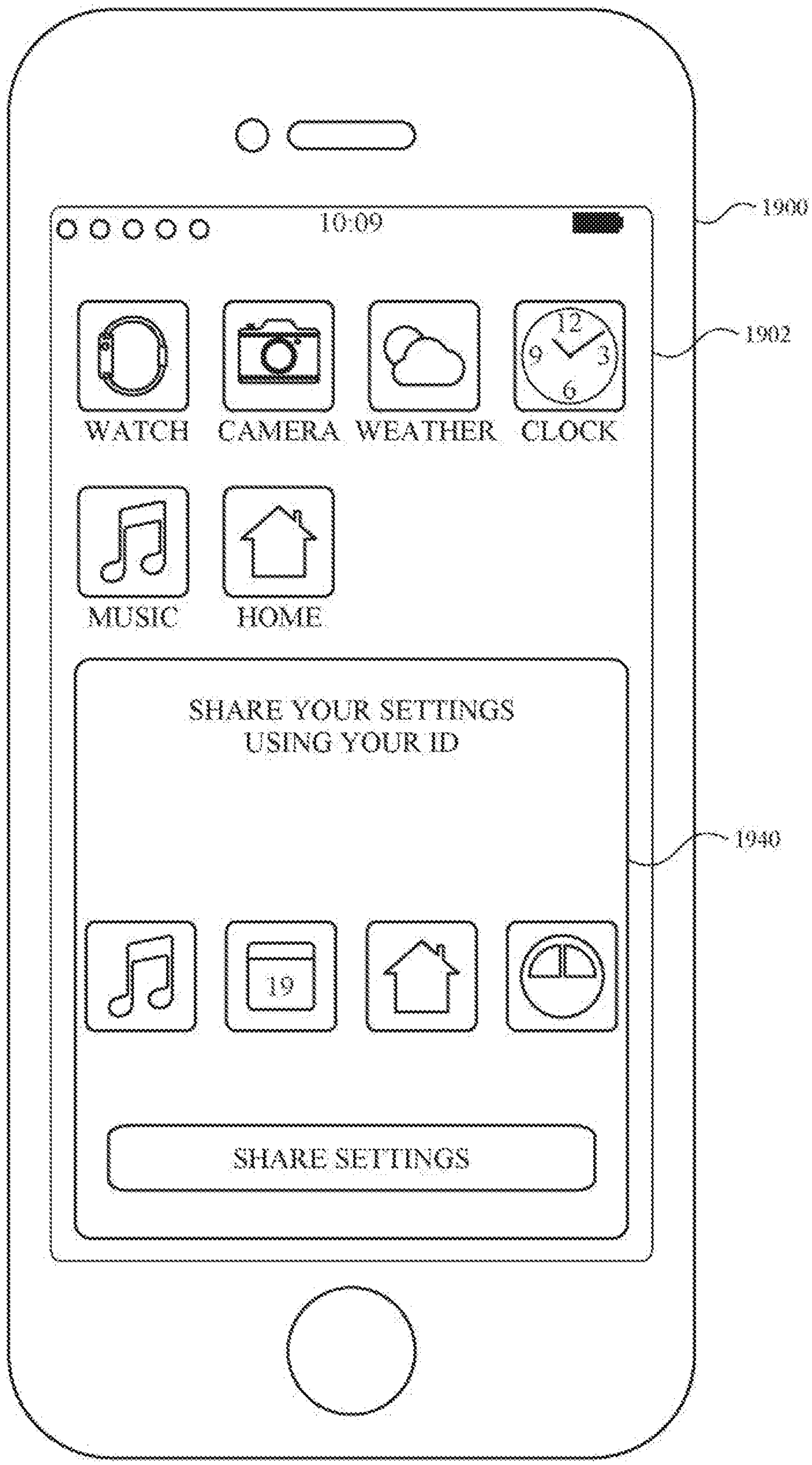

FIG. 19S illustrates an exemplary interface for sharing settings. Setup card 1940 includes a prompt to the user to share settings with device 1906 ("Share Settings"). Setup card 1940 is similar to setup card 1914, and can be displayed in place of, or in addition to, setup card 1914. Setup card 1940 includes graphical depictions representing the data that will be shared between device 1906 and device 1900 (e.g., music data, calendar data, home data, or the like). In some embodiments, setup card 1940 allows selection of one or more of the settings to share with device 1906. For example, setup card 1940 can include selection affordances that allow selection of less than all of the data depicted therein (e.g., music, calendar), thus allowing the user to share some (but not all) data with device 1906. In some embodiments, device 1900 transmits the settings information to device 1900 in response to user input selection of the affordance (labeled "Share Settings") of card 1940. In some embodiments, in response to user input selection of the "Share Settings" affordance of card 1940, device 1900 displays setup card 1916 (FIG. 19G).

Figure 19T:
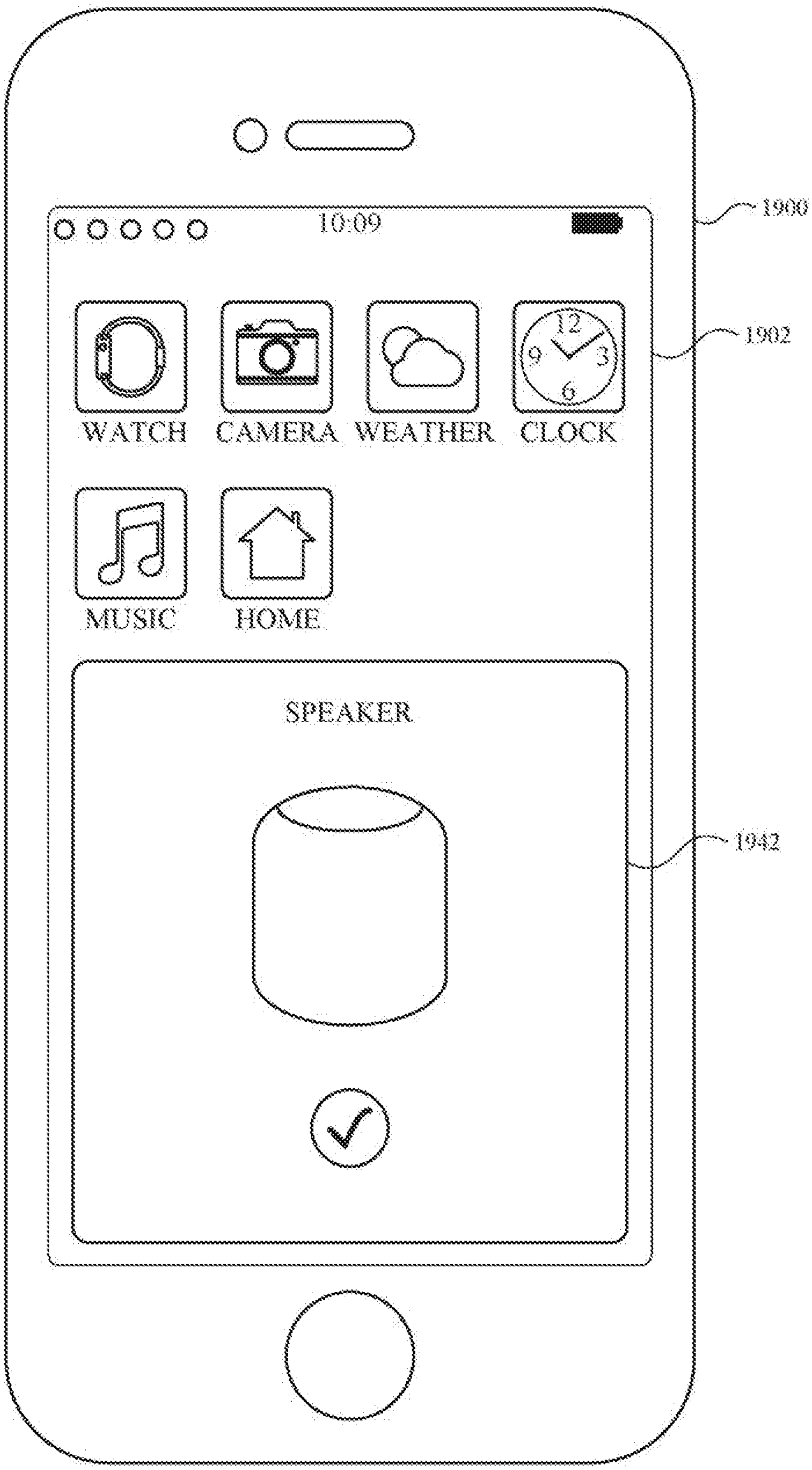

FIGS. 19T-19Y illustrate exemplary interfaces after successful configuration. FIG. 19T depicts setup card 1942, which includes a depiction of device 1906 and a check mark icon, indicating a successful data transfer (e.g., settings were successfully shared) or configuration (e.g., configuration is complete). In some embodiments, device 1900 displays setup card 1942 in response to user input selection to share settings. In some embodiments, device 1900 displays setup card 1942 after setup card 1916 (FIG. 19G) or setup card 1918 (FIG. 19H).

Figure 19U:
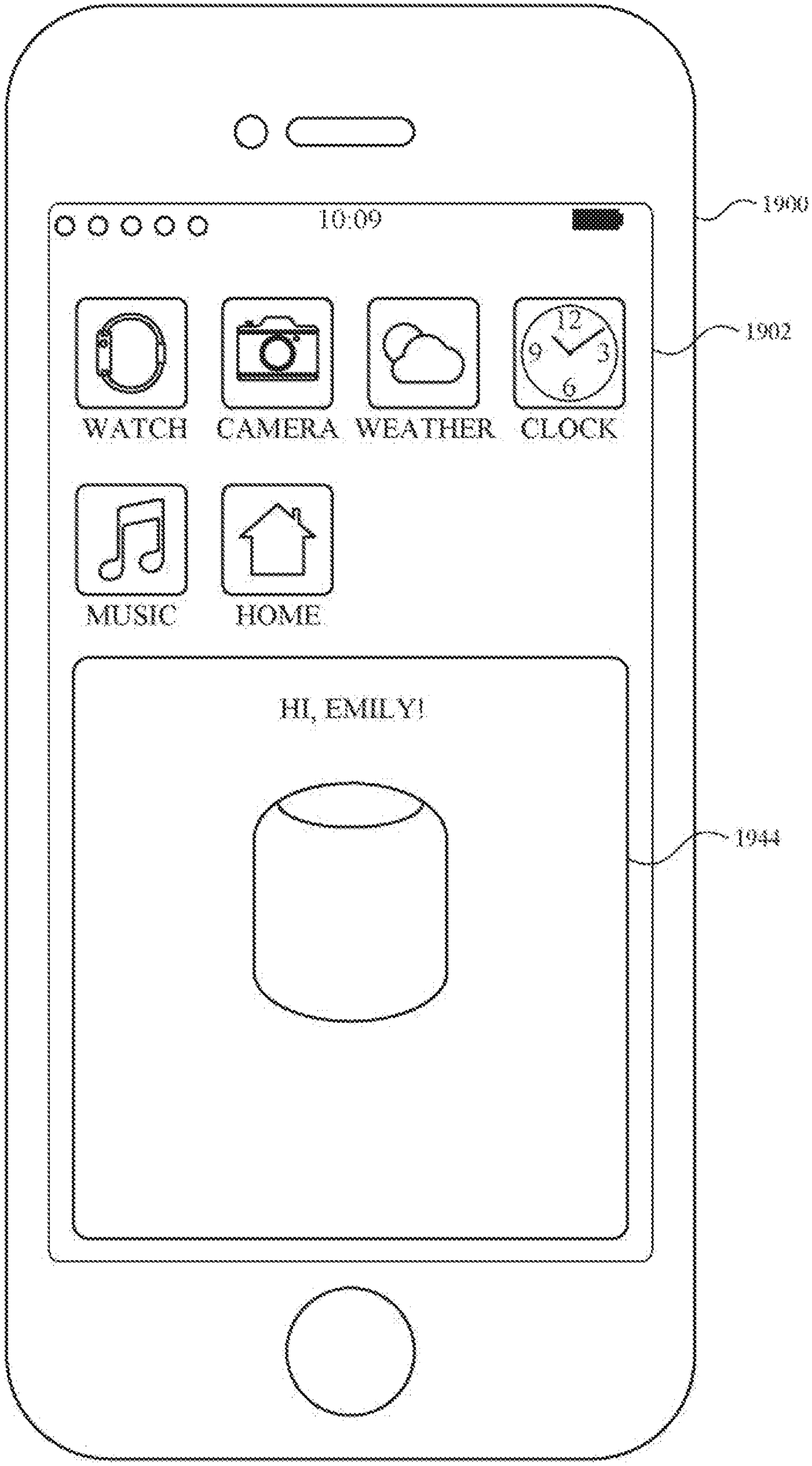

FIG. 19U depicts setup card 1944, which includes an indication of the user's name. In this example, the user ("Emily") is greeted by name ("Hi, Emily!"), indicating that device 1906 successfully received the user's account data and/or other settings data. Device 1900 optionally displays setup card 1944 after setup card 1942.

Figure 19V:
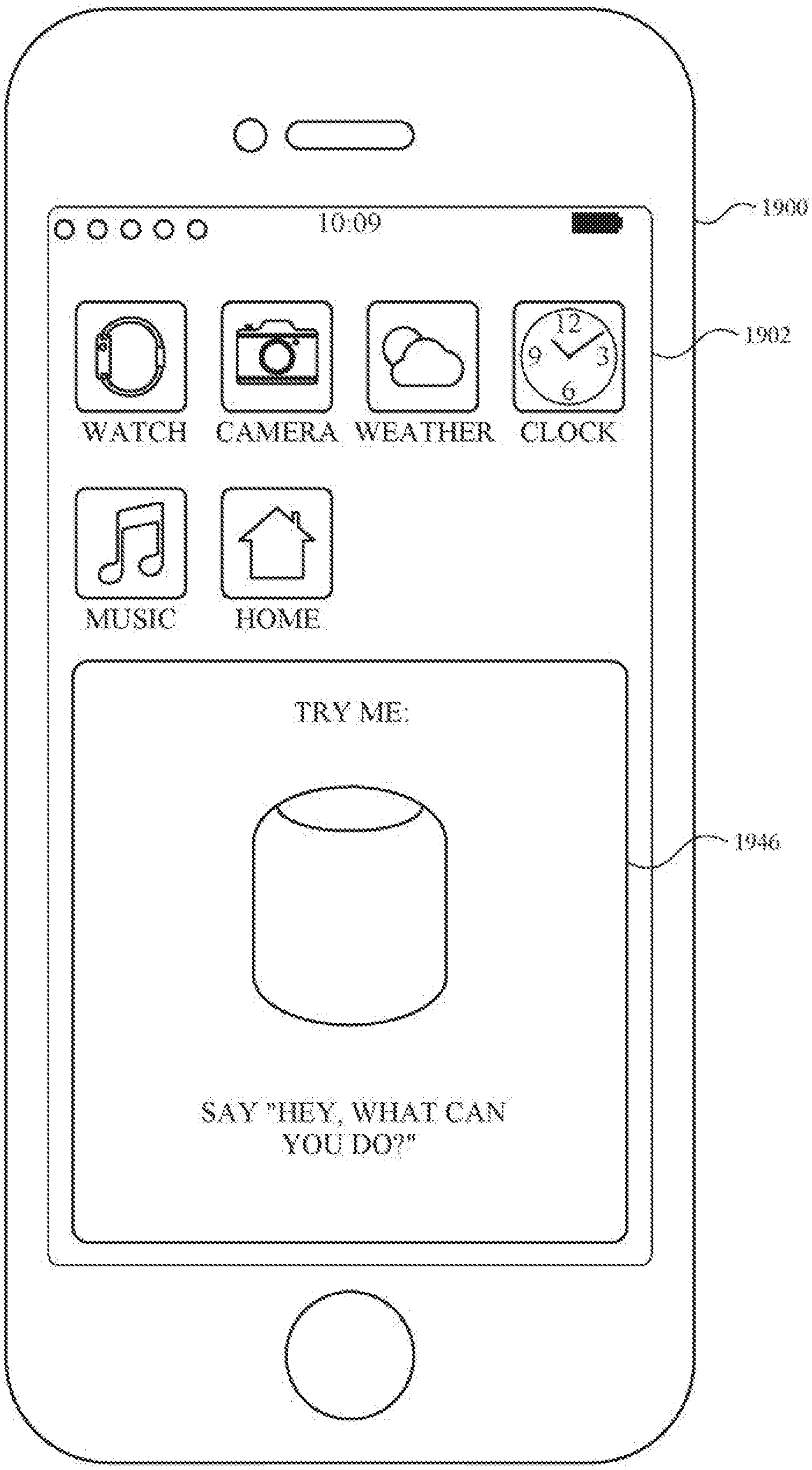

FIG. 19V depicts setup card 1946, which includes a prompt for the user to invoke a function of a voice assistant. For example, after successful configuration of device 1906, device 1900 displays setup card 1946 encouraging the user to try out one or more features of the newly-configured device 1900. Setup card 1946 includes the text "Try Me" and prompts the user to "Say 'Hey, What Can You Do?'" In some embodiments, device 1900 displays setup card 1942 after setup card 1916 (FIG. 19G), setup card 1918 (FIG. 19H), setup card 1920 (FIG. 19I), setup card 1940 (FIG. 19S), setup card 1942 (FIG. 19T), or setup card 1944 (FIG. 19U). In some embodiments, device 1906 outputs a voice prompt that matches the card displayed by device 1900, as shown in FIG. 19AK, which shows device 1906 outputting the voice prompt "Try me, say: 'Hey, What Can You Do?"

Figure 19W:
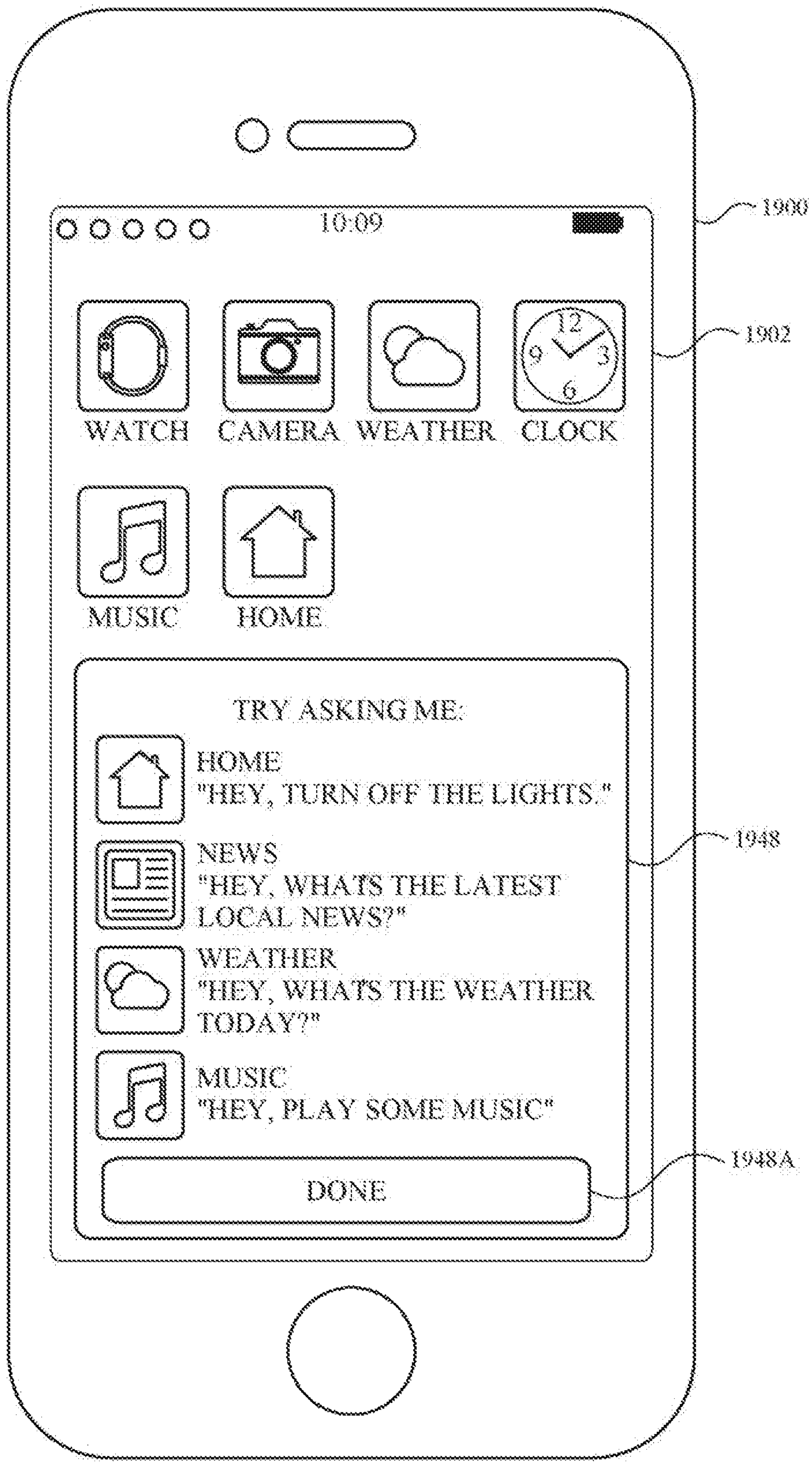

FIG. 19W depicts setup card 1948, which includes various example voice commands for invoking features of a voice assistant operation of device 1906. In some embodiments, device 1900 displays setup card 1948 in response to receiving an indication that the user provided a voice command while setup card 1946 is displayed. For example, the device 1900 determines (e.g., detects using a microphone, or receives an indication of detection by another device) that the user issued the voice command "Hey, what can you do?" while card 1946 was displayed, and in response displays setup card 1948. In some embodiments, setup card 1948 includes one or more prompts related to one or more features of a voice assistant on (e.g., accessible using) device 1906. In the example depicted, setup card 1948 includes the text "Try Asking Me:" and below that lists various prompts for invoking functions of the voice assistant. For example, setup card 1948 includes the prompt "Hey, turn off the lights" related to a home application control feature (e.g., application), the prompt "Hey, what's the latest local news?" related to a news feature (e.g., application), the prompt "Hey, what's the weather today?" related to a weather feature (e.g., application), and "Hey, play some music" related to a music feature (e.g., application). Setup card can also include done affordance 1948A that, when selected, causes the setup card 1948 to be dismissed (e.g., cease being displayed). In some embodiments, setup card 1948 remains displayed until done affordance 1948A is selected. For example, if a user invokes the weather feature by saying "Hey, what's the weather like," setup card 1948 remains displayed, which gives the user the opportunity to try invoking another example feature, such as the music feature or the news feature. In some embodiments, device 1900 ceases displaying setup card 1948 in response to a determination (e.g., detects using a microphone, or receives an indication of detection by another device) that the user issued voice command.

In some embodiments, device 1906 outputs an audible voice prompt prompting the user to provide one or more of the voice commands shown in setup card 1948 of FIG. 19W. For example, in response to the voice command "Hey, what can you do?" received at FIG. 19V, device 1906 can output the voice prompt: "I can do lots of things, like turn on the lights, give you news updates, and tell you about the weather. Now you try, say 'Hey, play some music.'" FIG. 19AL shows device 1906 outputting the voice prompt "Now you try, say: 'Hey, play some music.'" The output of device 1906 shown in FIG. 19AL can occur while device 1900 displays setup card 1948 of FIG. 19W. In this example, the voice assistant prompts the user to provide the command related to the music feature ("Hey, play some music.").

While the examples shown in setup card 1948 of FIG. 19W illustrate some functions, the user's voice command can invoke any feature of device 1906, since it is fully operational upon successful configuration. For example, the voice assistant (e.g., on device 1906) could respond correctly to a user voice command asking the voice assistant to provide information related to a calendar feature (e.g., "Hey, what meetings are on my calendar today?"), even though the calendar feature is not one of the example features/prompts illustrated in setup card 1948. Additionally, the voice assistant (e.g., on device 1906) can correctly respond to a user input voice command that is related to either the same feature prompted in the voice prompt, or can respond to a user input voice command that is related to a different feature than what is prompted in the voice prompt. For example, as described above, device 1906 can output the voice prompt: "I can do lots of things, like turn on the lights, give you news updates, and tell you about the weather. Now you try, say 'Hey, play some music.'" Following this voice prompt, if the user provides a voice command that relates to the same feature (music) (e.g., user says "Hey, play some music"), device 1906 can respond appropriately (e.g., plays some music). If instead the user provides a voice command that relates to a different feature (e.g., news), then the device 1906 still responds appropriately (e.g., by outputting news). Thus, as can be seen above in the description related to FIG. 19W, the displayed prompts (e.g., in card 1948) or the outputted voice prompts (e.g., by device 1906) provide a tutorial of one or more features of the newly-configured device 1906, which is operational (e.g., subject to the configuration settings established during the configuration process).

Figure 19X:
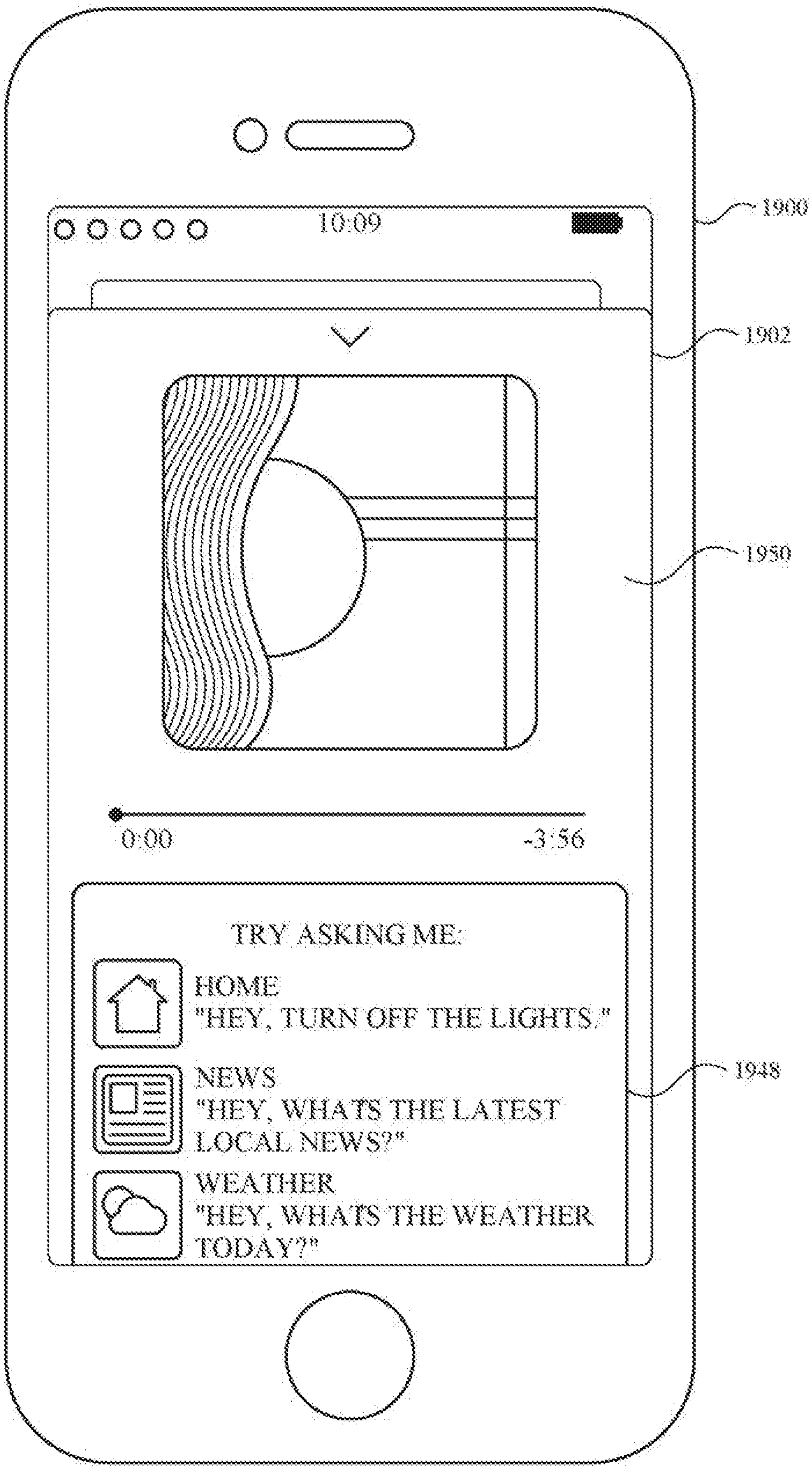

At FIG. 19X, device 1900 displays current media interface 1950 (also referred to as a "Now Playing interface") that identifies a media item that is currently being played back (e.g., by device 1906). In some embodiments, device 1900 displays current media interface 1950 in accordance with device 1906 playing music. For example, device 1906 begins playing music in response to the user input voice command "Hey, play some music" while device 1900 displays setup card 1948. In some embodiments, current media interface 1950 is displayed concurrently with setup card 1948. For example, in FIG. 19X, setup card 1948 is superimposed on top of current media interface 1950. In some examples, current media interface 1950 is superimposed on top of setup card 1948.

Additionally, FIG. 19X depicts setup card 1948 sliding off (e.g., in a downward direction) the display of device 1900. In this example, subsequent to displaying current media interface 1950, device receives user input selection of affordance 1948A (FIG. 19W) and, in response, ceases displaying setup card 1948. In some embodiments, ceasing displaying setup card 1948 includes displaying setup card 1948 gradually sliding off of the display. At FIG. 19Y, device displays current media interface 1950 after ceasing to display setup card 1948.

Figure 19Y:
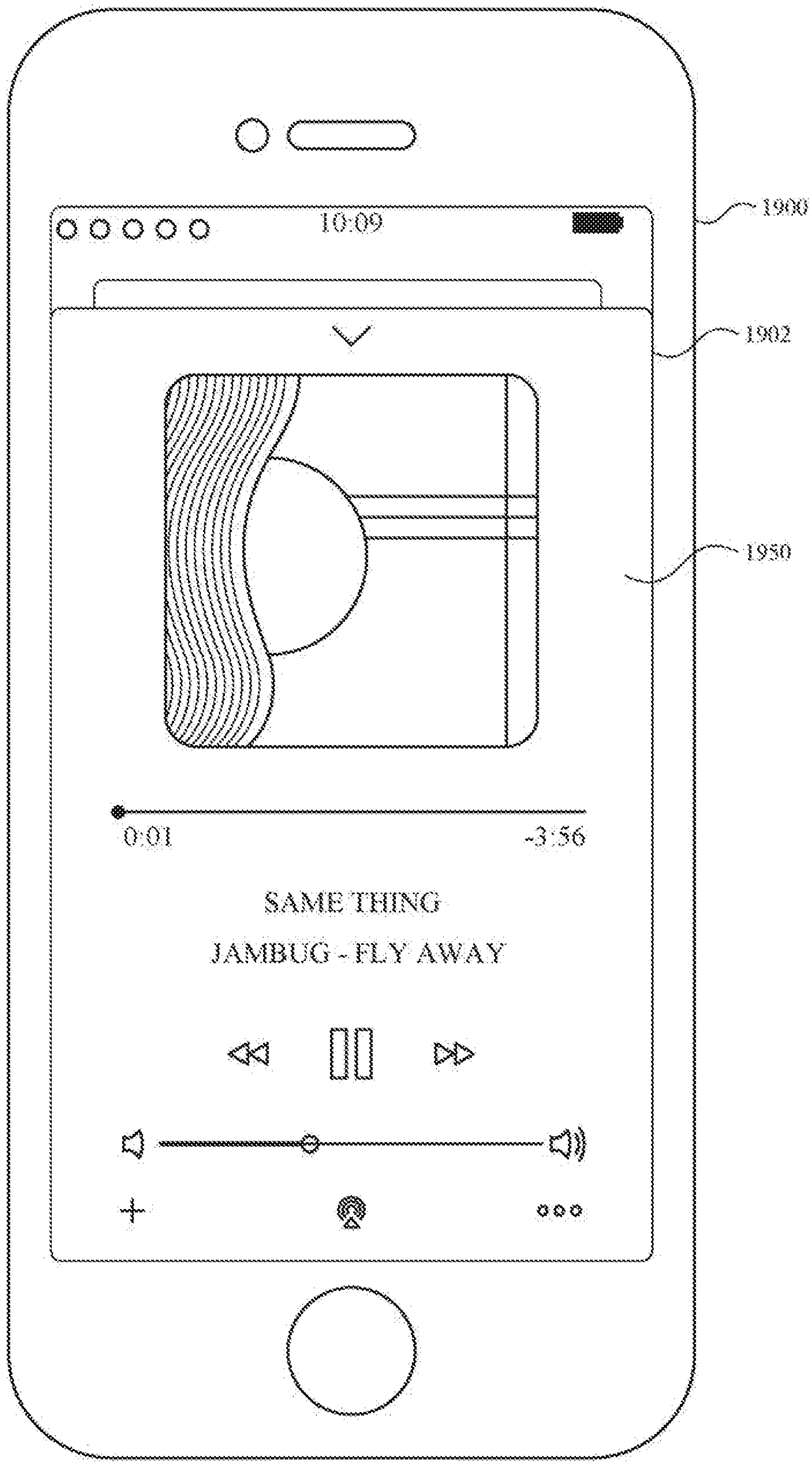
Figure 19Z:
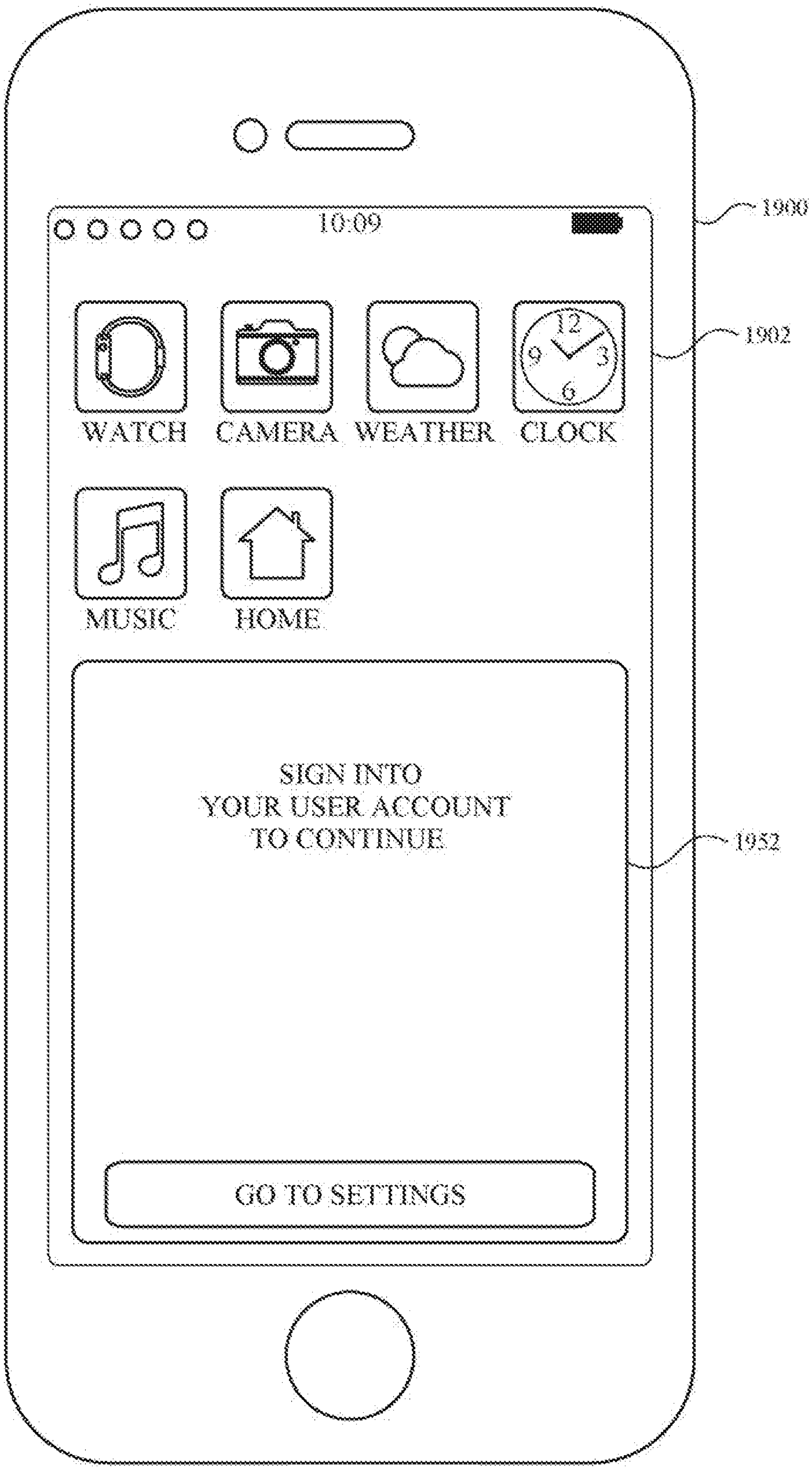
Figure 19A:
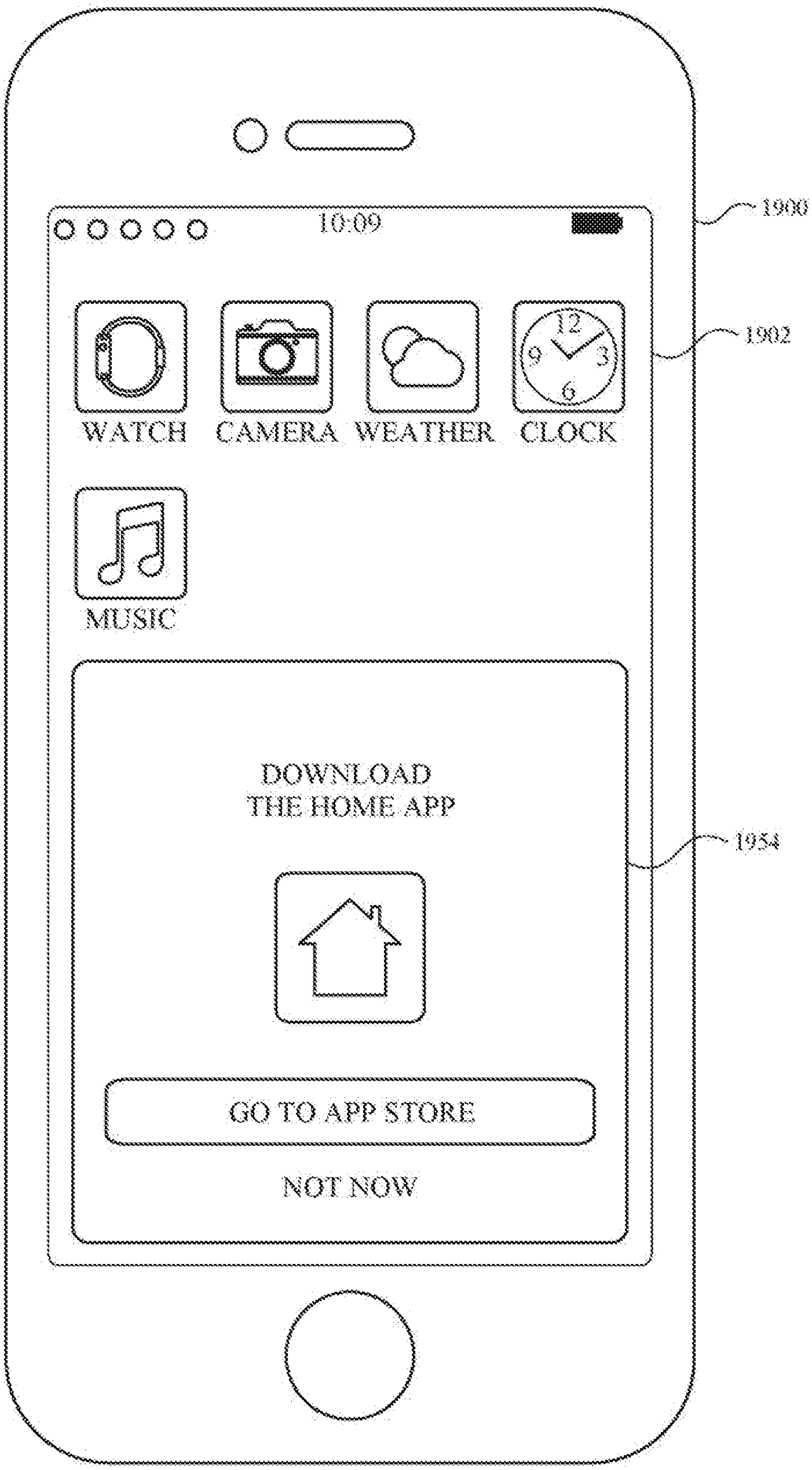
Figure 19A:
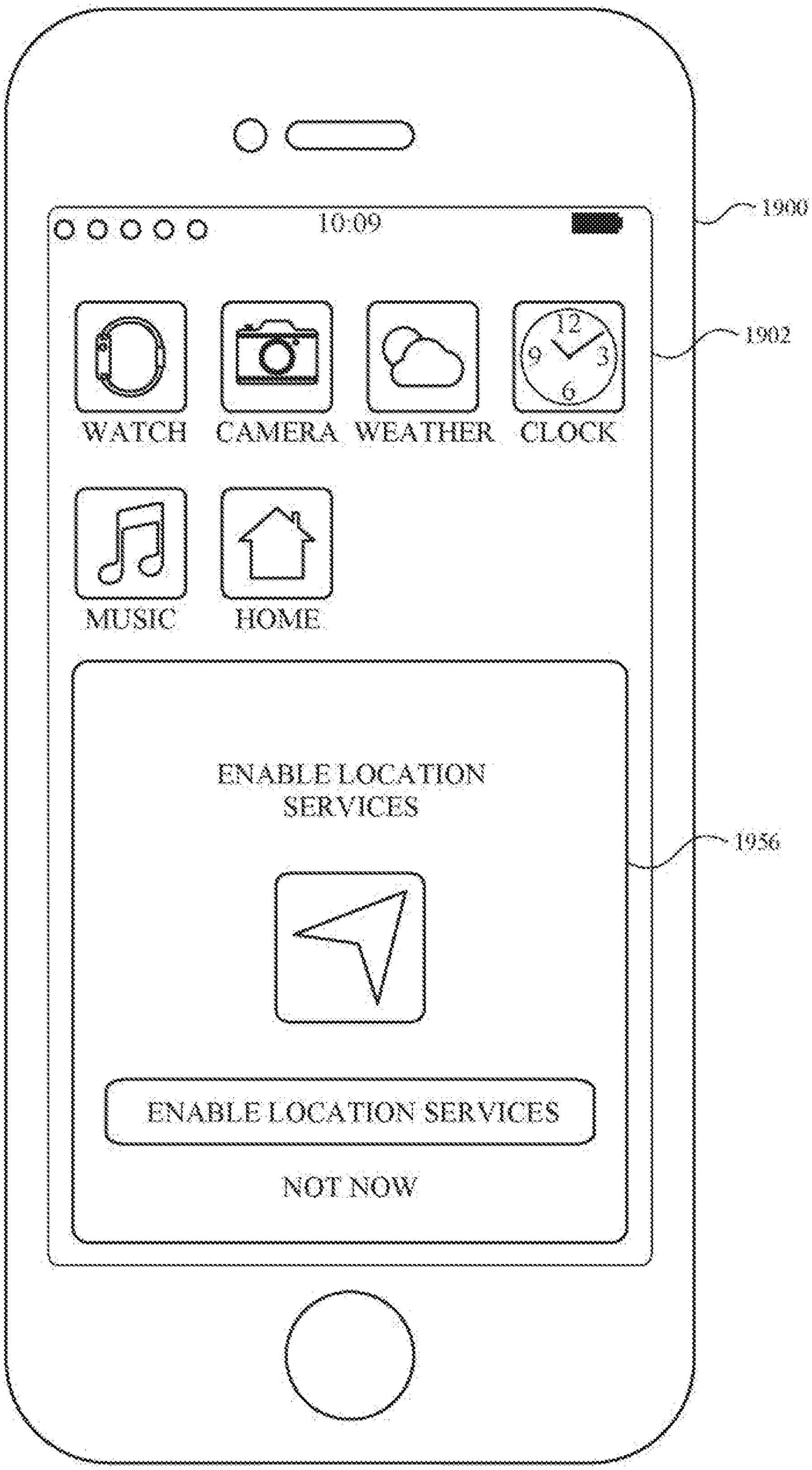
Figure 19A:
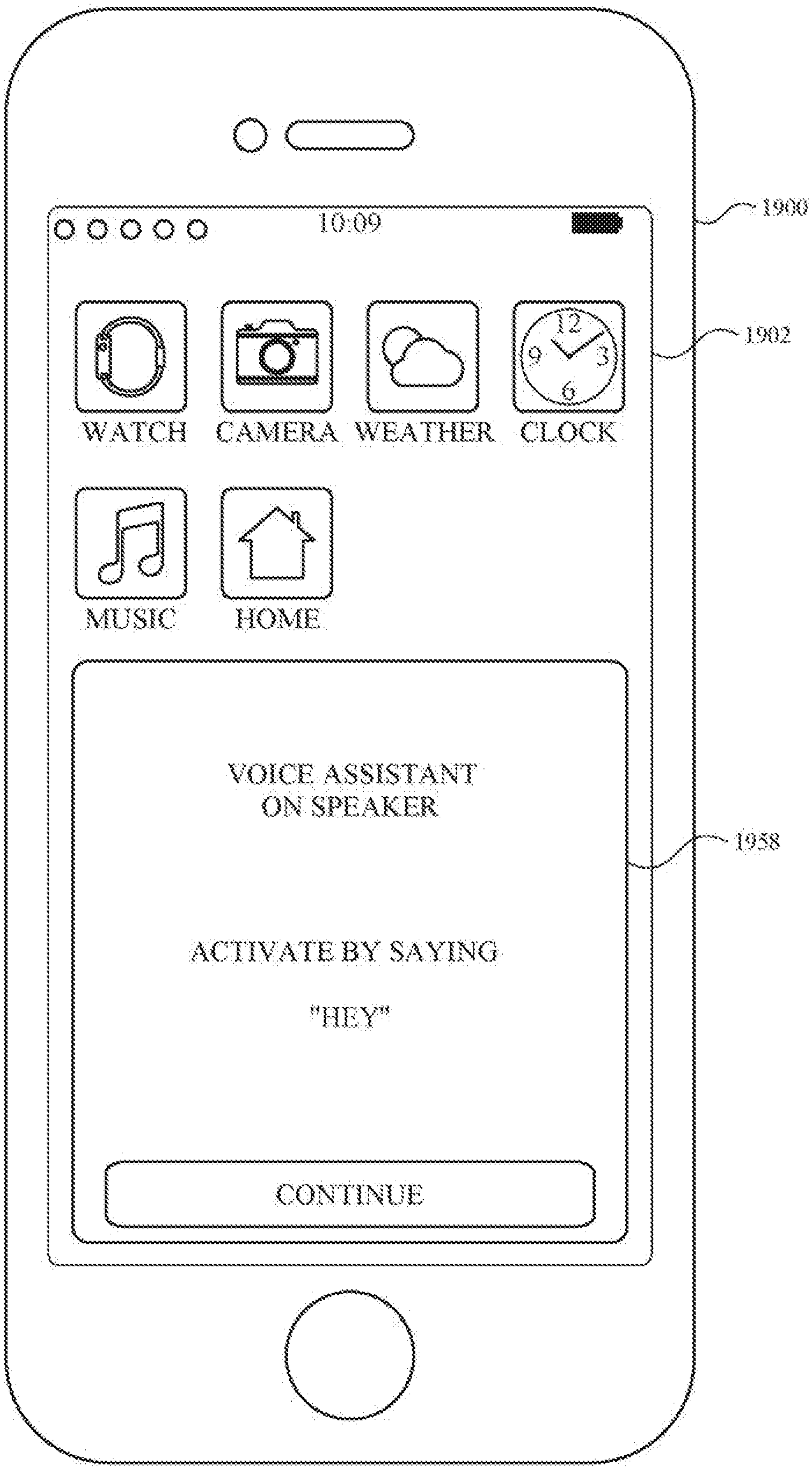
Figure 19A:
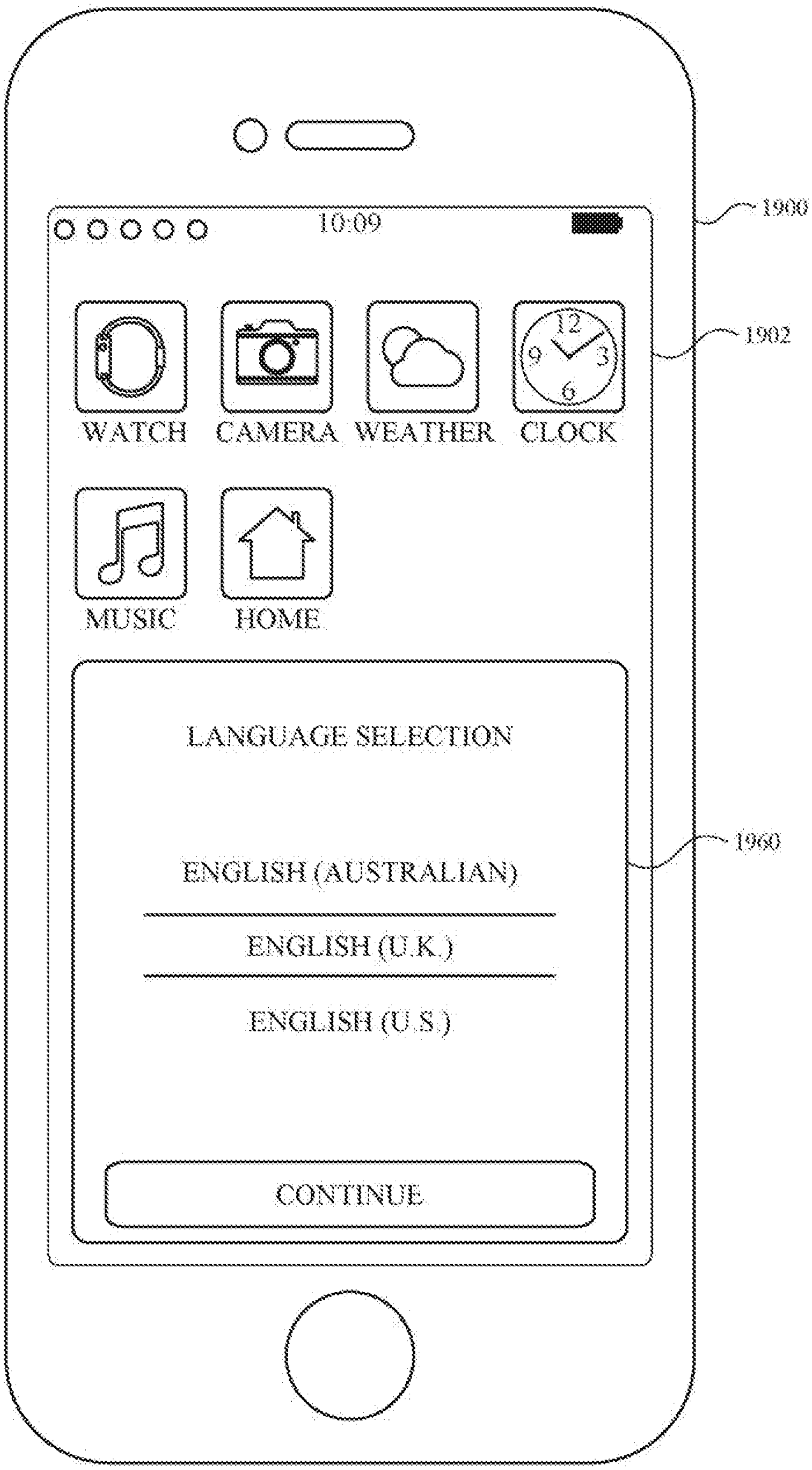
Figure 19A:
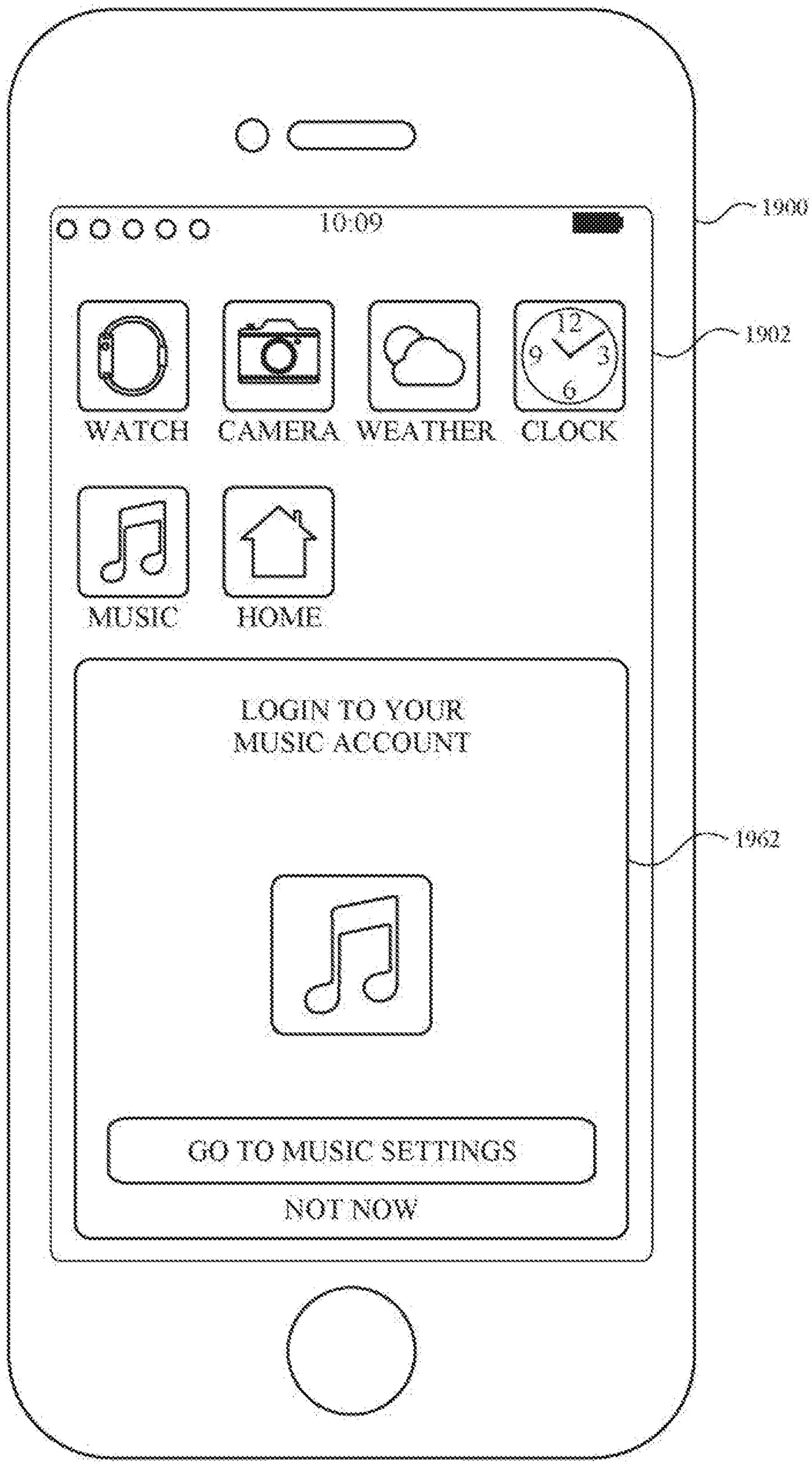
Figure 19A:
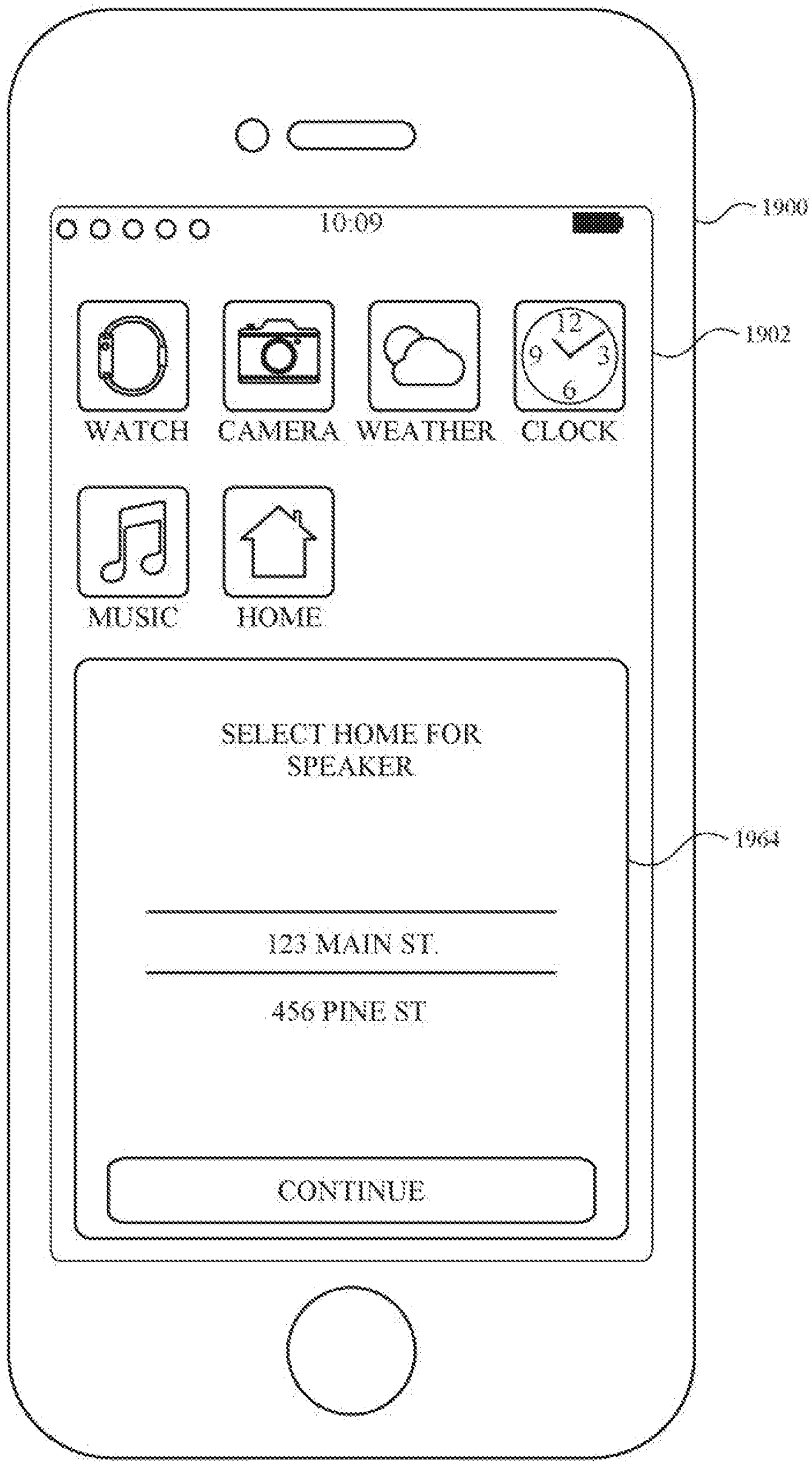
Figure 19A:
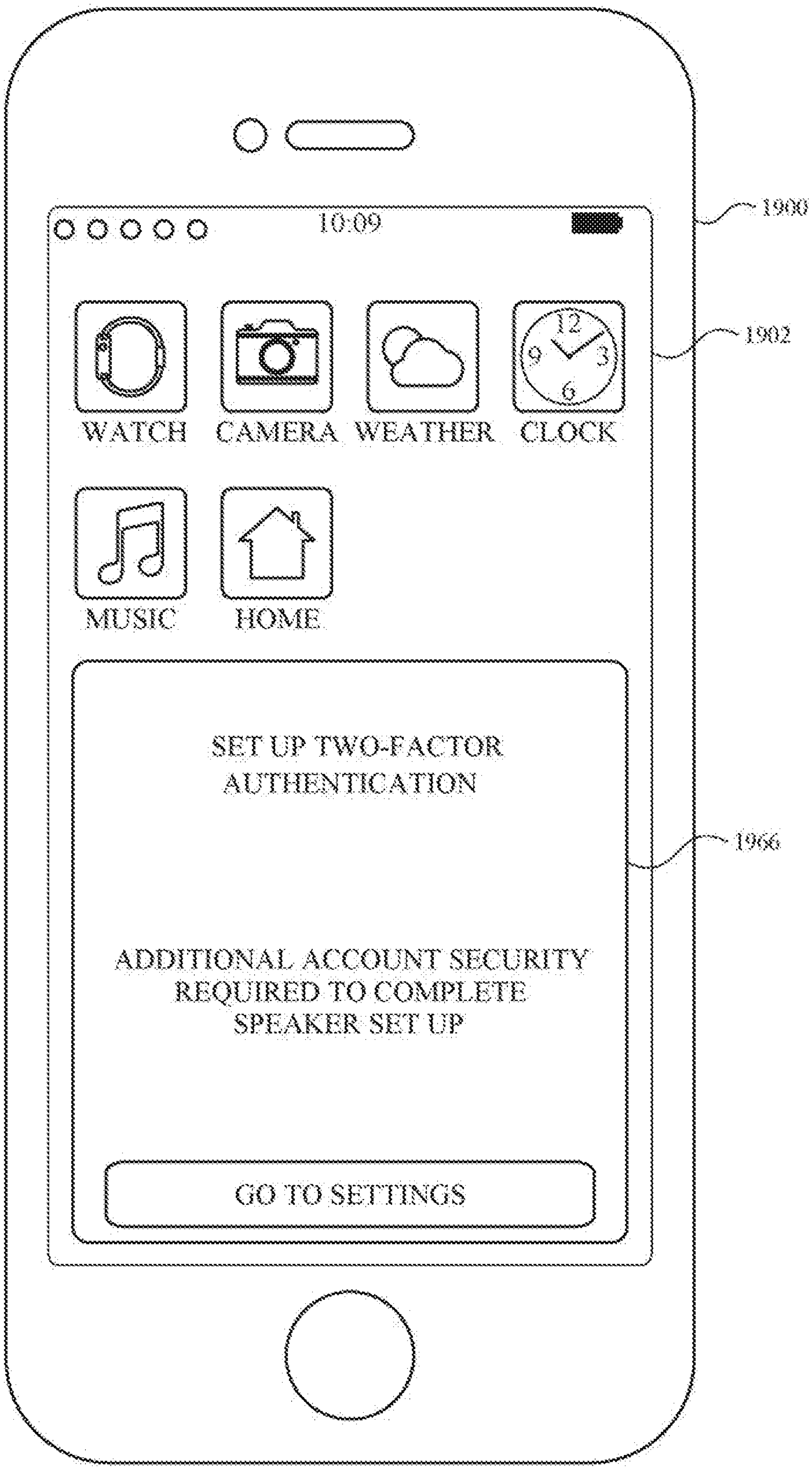
Figure 19A:
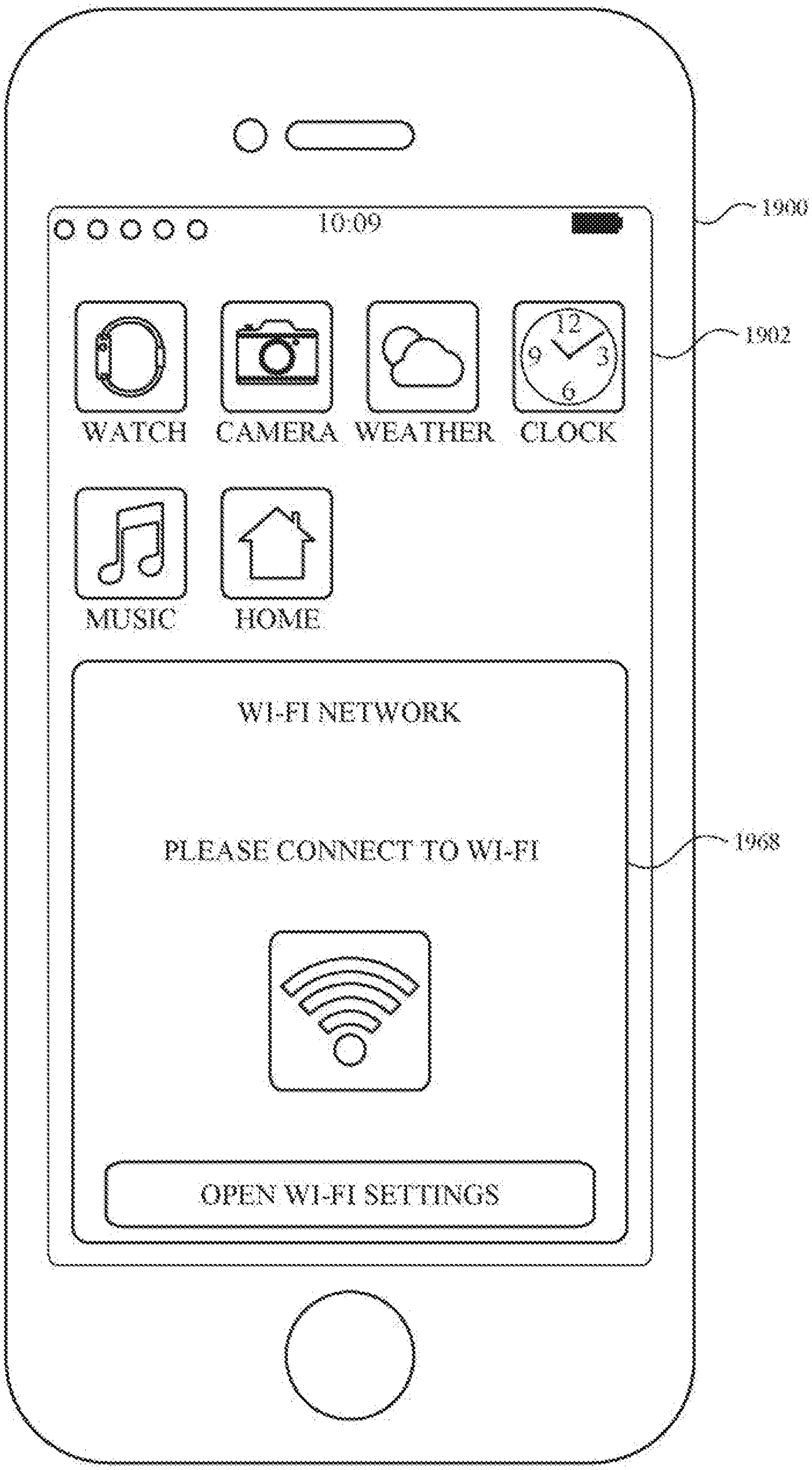
Figure 19A:
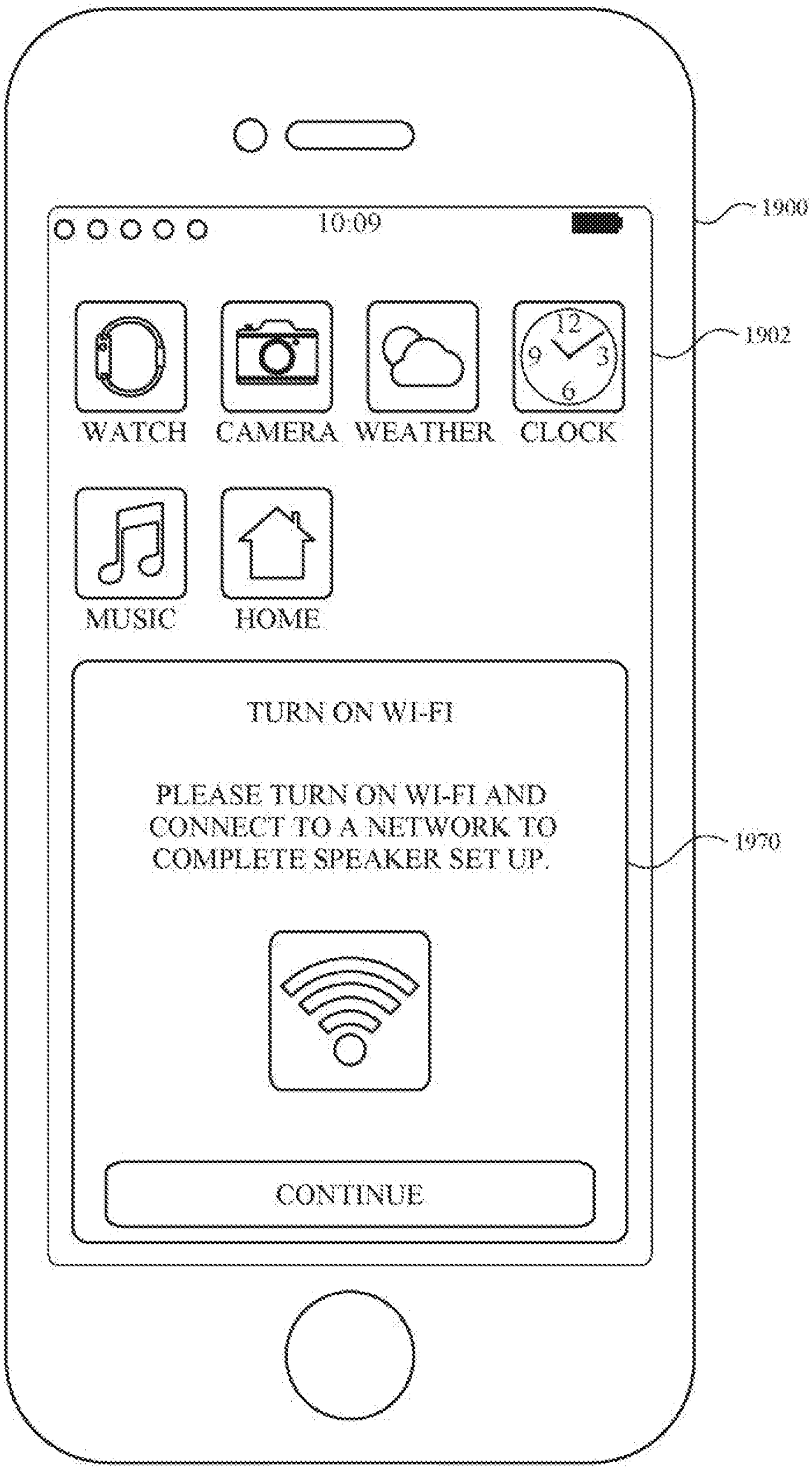
Figure 19A:
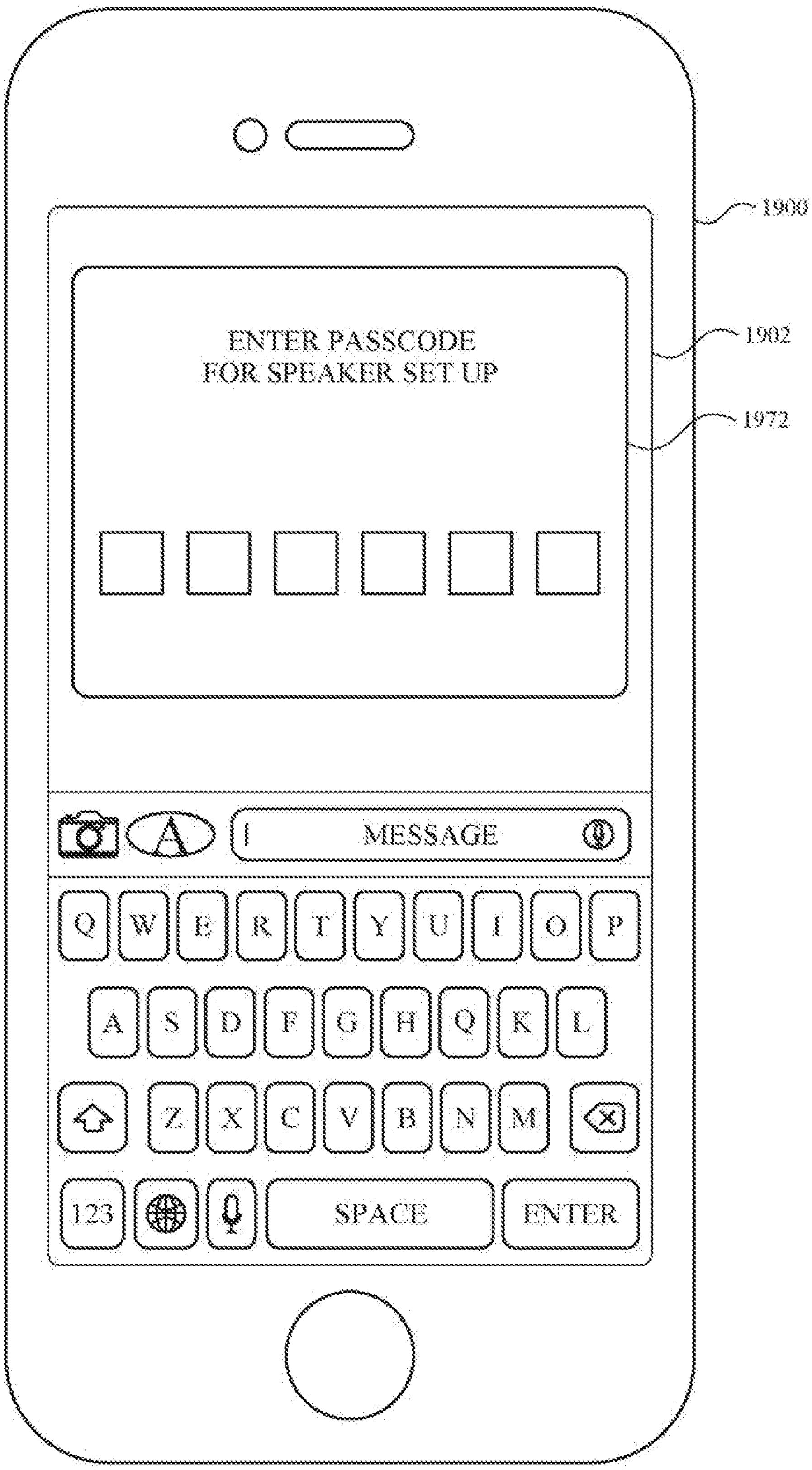
Figure 19A:
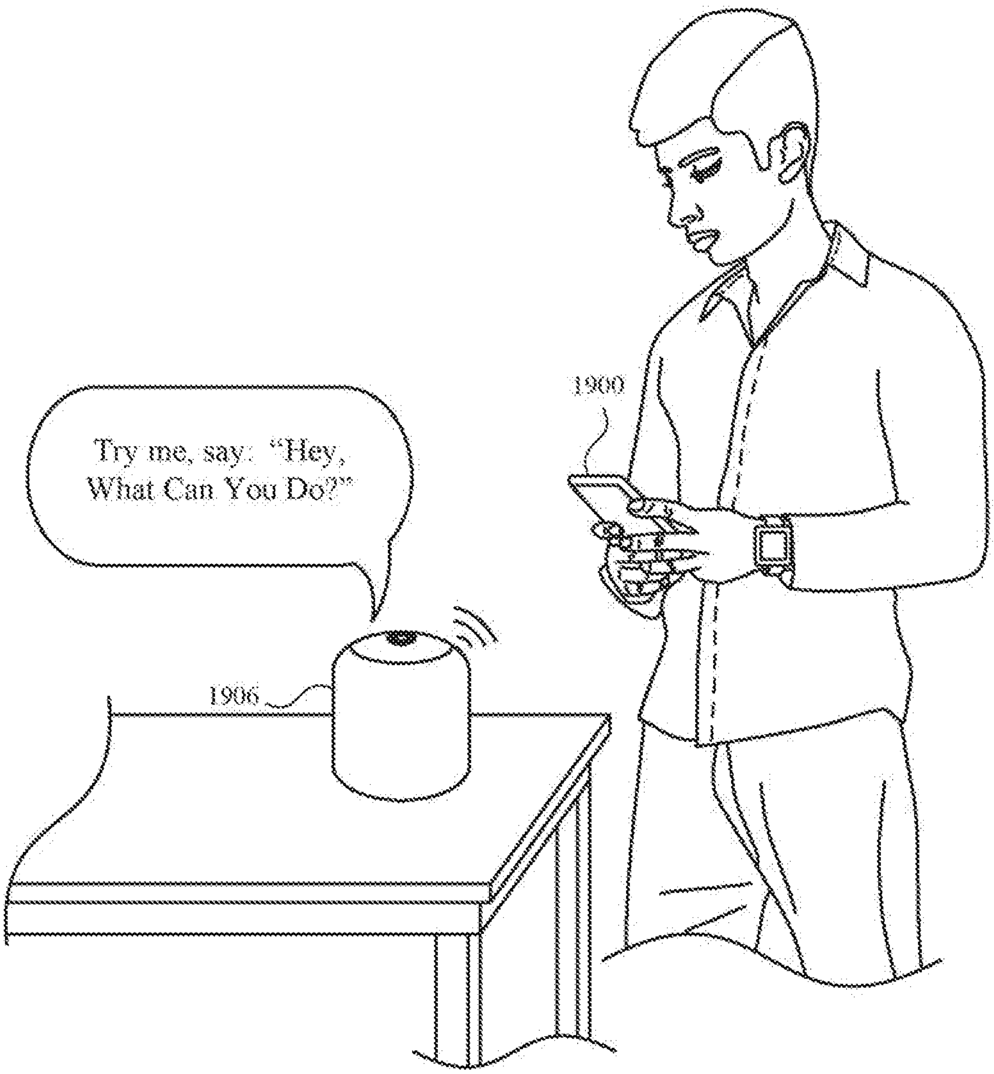
Figure 19A:

FIGS. 19Z-19AJ illustrates various interfaces that can be displayed during a configuration process. In some embodiments, one or more of the interfaces depicted in FIGS. 19Z-19AJ are optional. In some embodiments, a device (e.g., device 1900) displays one or more of the interfaces depicted in FIGS. 19Z-19AJ in any order during a configuration process for configuration another device (e.g., device 1906). For example, one or more of the interfaces depicted in FIGS. 19Z-19AJ can be displayed in addition to or in place of one or more of the interfaces depicted in FIGS. 19D-19P.

FIG. 19Z depicts setup card 1952, which prompts the user to sign in with a User ID using device 1900 in order to proceed with the configuration process. In some embodiments, signing in with a User ID (e.g., an iCloud account, an Apple ID, or other user account that can be used to identify one or more users) is required as part of the configuration process (e.g., for configuring device 1906). In this example, an affordance labeled "Go to Settings" is included in setup card 1952, and there is no option to proceed without signing in with a User ID. Setup card 1952 can be displayed in addition to or in place of card 1932 (FIG. 19O) or card 1934 (FIG. 19P).

FIG. 19AA depicts setup card 1954, which prompts the user to download a home control application (e.g., called the "home app") to device 1900. Notably, at FIG. 19AA, the device 1900 does not include the application icon labeled "Home" (as shown in FIG. 19Z). Setup card 1954 includes an affordance (labeled "Go To App Store") that, when selected, causes device 1900 to perform an action related to downloading the home control application (e.g., display an application download interface, or download the application directly), and an affordance (labeled "Not Now") that, when selected, does not perform the action related to downloading the application (e.g., and dismisses the card and proceeds to a next step in the configuration process).

FIG. 19AB depicts setup card 1956, which prompts the user to enable location services on device 1900. Setup card 1956 includes an affordance (labeled "Enable Location Services") that, when selected, causes device 1900 to perform an action related to enabling location services on device 1900 (e.g., displays a settings interface, or enables location services directly), and an affordance (labeled "Not Now") that, when selected, does not perform the action related to enabling location services (e.g., and dismisses the card and proceeds to a next step in the configuration process).

The configuration process can require that certain features be enabled on the device being configured (e.g., device 1906), even if such features are disabled on the device doing the configuring (e.g., device 1900). FIG. 19AC depicts setup card 1958, which informs the user that the voice assistant will be enabled on the speaker (e.g., device 1906). Setup card 1958 does not include an option to disable the feature (e.g., voice assistant), but informs the user that such feature will be enabled on the device being configured. In some embodiments, device 1900 displays setup card 1958 if the feature (e.g., voice assistant) is disabled on device 1900. In some embodiments, device 1900 does not display setup card 1958 if the feature (e.g., voice assistant) is enabled on device 1900. In such case, the configuration process can enable the voice assistant without notifying the user, as the user has already indicated a desire to use the voice assistant function. In some embodiments, the setup card 1958 informs the user that the feature (e.g., voice assistant) will remain disabled on device 1900 (e.g., even though it will be enabled on device 1906).

FIG. 19AD depicts setup card 1960 for selecting a language. For example, a voice assistant on device 1906 can speak in the selected language (e.g., or with a selected dialect or accent). In setup card 1960, three language options are presented for selection (e.g., English (Australian), English (U.K.), and English (U.S.)). In some embodiments, device 1900 receives user input selection of one of the languages, which will cause device 1900 to be configured with the selected language.

In some embodiments, a setting of device 1900 that is compatible with device 1906 is automatically adopted in the configuration settings of device 1906. For example, if device 1900 has English (U.S.) set as their default language on device 1900, and device 1906 is only compatible with English (U.S.), English (U.K,) and English (Australian), then device 1900 would not display setup card 1960 during the configuration process. Rather, the configuration settings of device 1906 would be automatically include English (U.S.) as the language (e.g., for a voice assistant feature).

In some embodiments, a setting of device 1900 that is not compatible with device 1906 causes device 1900 to display an interface for selecting a compatible setting. For example, if device 1900 has Latin set as their default language on device 1900, and device 1906 is only compatible with English (U.S.), English (U.K,) and English (Australian), then device 1900 would display setup card 1960 during the configuration process, prompting user to select a compatible language setting.

FIG. 19AE depicts setup card 1962, which prompts the user to sign in to a music service account using device 1900 in order to proceed with the configuration process. In some examples, if a user has a music service account but needs to log in, setup card 1962 can be displayed. In this example, setup card 1962 includes an affordance labeled "Go to Music Settings" that, when selected, causes device 1900 to perform an action related to signing into a music service (e.g., display a music settings interface), and an affordance (labeled "Not Now") that, when selected, does not perform the action related to signing into a music service (e.g., and dismisses the card and proceeds to a next step in the configuration process).

FIG. 19AF depicts setup card 1964, which prompts the user to select "home" location for the speaker (e.g., device 1906). In some embodiments, a user account is associated with more than one home location (e.g., a primary residence and a vacation residence). In such case, device 1900 displays setup card 1964, which allows the user to select the home location that device 1906 will be located in (e.g., physically). In some embodiments, device 1900 receives user input selection of one of the home locations, which will cause device 1900 to be configured with the selected location. In some embodiments, if a user account is associated with one home location, then that home location is automatically selected (e.g., a setup card 1964 is not displayed) by the configuration process. In some embodiments, setup card 1964 includes an option to create a new home location. For example, an interface for creating a new home location can operate similar to the interfaces described with respect to FIGS. 19M-19N for creating a new location identifier (e.g., room). In some embodiments, device 1900 displays a error if the user account associated with device 1900 is not the user who created the home location.

FIG. 19AG depicts setup card 1966, which prompts the user to set up an additional account security measure (e.g., two-factor authentication). In some embodiments, the additional account security measure is required as part of the configuration process (e.g., for configuring device 1906). In this example, an affordance labeled "Go to Settings" is included in setup card 1966, and there is no option to proceed without setting up two-factor authentication.

FIGS. 19AH-19AI depict exemplary interfaces for connecting to a network during the configuration process. FIG. 19AH depicts setup card 1968, which prompts the user select an affordance (e.g., labeled "Open Wi-Fi Settings) for performing an action related to connecting to a wireless network, in order to continue configuration of the device 1900. FIG. 19AI depicts setup card 1970, which prompts the user to connect to a wireless network (e.g., Wi-Fi) in order to continue configuration of the device 1900. Selection of the affordance labeled "Continue" in FIG. 19AI can cause Wi-Fi to be enabled directly, and connection to a known network automatically established, so that the configuration can proceed.

FIGS. 20A-20C is a flow diagram illustrating a method for configuring a second device using an electronic device in accordance with some embodiments. Method 2000 is performed at a device (e.g., 100, 300, 500, 580, 1900) with a display. Some operations in method 2000 are, optionally, combined, the order of some operations are, optionally, changed, and some operations are, optionally, omitted.

As described below, method 2000 provides an intuitive way for configuring a second device. The method reduces the cognitive burden on a user for configuring a second device, thereby creating a more efficient human-machine interface. For battery-operated computing devices, enabling a user to configure a second device faster and more efficiently conserves power and increases the time between battery charges.

The electronic device (e.g., 1900) (also referred to as a "first device") detects (2002) an audio tone signal (e.g., 1904) indicative of a pairing handshake with a second device (e.g., 1906). In some embodiments, the audio tone signal is an initial tone. For example the tone is played in response to the devices being place in close proximity. In some embodiments, the audio tone signal is played during a configuration process. In some embodiments, the audio tone signal represents a response to another audio tone signal played by the electronic device.

In some embodiments, the first device (e.g., 1900) is connected (2004) to the second device via a communication link (e.g., 1039 of FIG. 10M). In some embodiments, the communication link is a wireless communication link. For example, the communication can be a Bluetooth or a Wi-Fi connection, or the like.

In some embodiments, the audio tone signal (e.g., 1904) is out-of-band to the communication link (2006). For example, the audio tone signal is not transmitted using the communication link. For example, the first and second devices are connected and exchange data communications over a Bluetooth wireless connection (e.g., a communication link). In this example, while the devices continue to be connected via the Bluetooth connection (e.g., while the devices are paired), an audio tone signal (e.g., an audible tone that includes or represents a communication between the devices) is out-of-band with the Bluetooth communication link. In some embodiments, being out-of-band to a communication link means that a signal (e.g., an audio tone signal) is not communicated using the same data exchange technique.

Using an audio tone signal that is out-of-band with a communication link between two devices allows the user to efficiently move through a configuration process for a device with fewer required user inputs, while ensuring that the devices are in relatively close proximity and that the user has physical access to both devices. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with detecting the audio tone signal, the first device (e.g., 1900) initiates (2008), on the first device (e.g., 1900), a configuration process for configuring the second device (e.g., 1906).

Using a detection of an audio tone signal allows the user to efficiently move through a configuration process for a device with fewer required user inputs. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

During the configuration process, the first device (e.g., 1900) displays (2010), on the display (e.g., 1902), a configuration user interface (e.g., 1912) that includes a prompt to select a location (e.g., "Where is this speaker?" as shown in FIG. 19E).

The first device (e.g., 1900) receives (2012) user input selection (e.g., 1913) of a location (e.g., the location "John's Room" shown in 1912A of FIG. 8J).

In response to receiving the user input, the first device (e.g., 1900) configures (2014) the second device (e.g., 1906) to be associated with the location. In some embodiments, configuring the second device to be associated with the location includes transmitting configuration data that includes the location. In some embodiments, the data is transmitted to the second device (e.g., a smart speaker). In some embodiments, the data is transmitted to a third device (e.g., an Apple TV).

In some embodiments, the audio tone signal (e.g., 1904) is generated by the second device (e.g., 1906 as shown in FIG. 19A).

In some embodiments, the audio tone signal includes an audio passcode. In some embodiments, the audio passcode is dictated (e.g., as shown in FIG. 10J). In some embodiments, the audio passcode is encoded in the audio tone signal.

In some embodiments, the audio tone signal (e.g., 1904) is received while the first device (e.g., 1900) is physically positioned within a threshold physical proximity (e.g., 1908 of FIG. 19C) to the second device (e.g., as shown in FIG. 19C).

In some embodiments, the audio tone signal is a first audio tone signal, and during the configuration process (e.g., while displaying setup card 1918 of FIG. 19H) (2016): the first device (e.g., 1900) detects (2018) a second audio tone signal comprising encoded data. For example, the second audio tone signal includes one or more of user account login information, an identifier for the second device, or other data for confirming that the second device should be provided access to the user's account or personal data. In response to detecting the second audio tone signal (2020): the first device (e.g., 1900) transmits (2022) an acknowledgement to the second device (e.g., 1906); and the first device (e.g., 1900) proceeds (2024) to a next step in the configuration process (e.g., displays the setup card 1920 of FIG. 19I).

In some embodiments, further in response to receiving the user input selection (e.g., 1913) of the location (e.g., "John's Room" as shown in FIG. 19J) (2026): in accordance with a determination that a third device (e.g., device 1020 of FIG. 10K, where the second device is device 1000 of FIG. 10K) is currently associated with the location (e.g., "John's Room"), the first device (e.g., 1900) displays (2028), on the display (e.g., 1902), a configuration user interface (e.g., setup card 1922 of FIG. 19J) that includes a prompt (e.g., affordance 1922A in FIG. 19J that includes text "Use as a stereo pair") to select whether to create a device group (e.g., stereo pair) that includes the second device and the third device. In some embodiments, a device group includes two or more devices. In accordance with a determination that a third device is not currently associated with the location, the first device (e.g., 1900) forgoes displaying (2030), on the display, the configuration user interface that includes the prompt to select whether to create the device group (e.g., displays setup card 1914 of FIG. 19F instead of setup card 1922).

In some embodiments, the first device (e.g., 1900) receives user input (e.g., 1923) representing an affirmative request create the device group. In some embodiments, in response to the user input representing an affirmative request create the device group, the first device (e.g., 1900) displays, on the display, a configuration user interface (e.g., 1924 of FIG. 19K) that includes a prompt (e.g., "Is this speaker left or right?" as shown in FIG. 19K) to select an audio output channel (e.g., left or right, as shown in FIG. 19K) to associate with the second device. In some embodiments, the first device (e.g., 1900) receives user input (e.g., 1925) representing selection of an audio output channel (e.g., left, as shown in FIG. 19K). In response to receiving the user input representing selection of a selected audio output channel, the first device (e.g., 1900) associates (e.g., transmits configuration data to) the second device with the selected audio channel.

In some embodiments, the prompt to select a location includes a plurality of predetermined location identifiers (e.g., Kitchen, Bedroom, Patio, Dining Room, as shown in FIG. 19E).

In some embodiments, the plurality of predetermined location identifiers includes a user-defined location identifier (e.g., John's Room, as shown in FIG. 19E).

In some embodiments, the prompt to select a location includes a field (e.g., "Create New Room" option as shown in FIG. 19M) for creating a new location identifier. In some embodiments, the first device (e.g., 1900) receives user input (e.g., 1931) associated with the field for creating a new location identifier (e.g., text entered into field 1930A of FIG. 19N), wherein the user input includes a location identifier (e.g., "Tim's Room" a shown in FIG. 19N). The first device (e.g., 1900) creates a new location identifier based on the received user input associated with the field for creating the new location identifier, and associates the second device with the new location identifier (e.g., transmits configuration data that includes the new location identifier to the second device).

In some embodiments, during the configuration process (2032): the first device (e.g., 1900) displays (2034), on the display (e.g., 1902), a configuration user interface (e.g., setup card 1914 of FIG. 19F) that includes a prompt (e.g., "Share your settings" affordance 1914B as shown in FIG. 19F) requesting permission to transmit user account information (e.g., login credentials) to the second device (e.g., 1906). The first device (e.g., 1900) receives (2036) user input (e.g., selection of affordance 1914B) providing permission to transmit the user account information to the second device. In response to receiving the user input providing permission, the first device (e.g., 1900) transmits (2038) the user account information to the second device (e.g., 1906).

In some embodiments, prior to transmitting the user account information to the second device, and in accordance with a determination that the first device (e.g., 1900) is not currently logged into a user account associated with the user account information (e.g., is not currently logged into an iCloud account), the first device (e.g., 1900) displays, on the display (e.g., 1902), a prompt to log in to the user account (e.g., setup card 1932 that includes the text "Please login to your iCloud account to continue" as shown in FIG. 19O), and forgoes transmitting the user account information to the second device. In accordance with a determination that the first device is currently logged into the user account associated with the user account information, the first device (e.g., 1900) transmitting the user account information to the second device (e.g., 1906).

In some embodiments, in response to progressing from a first step (e.g., setup card 1912) in the configuration process to a second step (e.g., setup card 1914) in the configuration process, the first device (e.g., 1900) outputs a third audio tone signal (e.g., 1044 of FIG. 10N). In some embodiments, the third audio tone signal is outputted concurrently with the output of a fourth audio tone signal (e.g., 1042 of FIG. 10N) outputted by the second device (e.g., 1906). In some embodiments, the third audio tone signal and the fourth audio tone signal are harmonics.

In some embodiments, in response to progressing from the second step (e.g., setup card 1914) in the configuration process to a third step (e.g., setup card 1916) in the configuration process, the first device (e.g., 1900) outputs a fifth audio tone signal (e.g., 1048 of FIG. 10O). In some embodiments, the fifth audio tone signal is outputted concurrently with the output of a sixth audio tone signal (e.g., 1046 of FIG. 10O) outputted by the second device (e.g., 1906). In some embodiments, the fifth audio tone signal and the sixth audio tone signal are harmonics. In some embodiments, the fifth audio tone signal is a higher frequency tone than the third audio tone signal (e.g., as shown in plot 1040 of FIG. 10O).

In some embodiments, subsequent to initiating the configuration process, the first device (e.g., 1900) receives data regarding an output of an operation being performed by the second device (e.g., 1906). For example, the output can be audio output (e.g., dictation by a voice assistant) by device 1906 of media (e.g., music), weather information, news, calendar appointments, or the like. In response to receiving the data regarding the output of the operation being performed by the second device (e.g., 1906), the first device (e.g., 1900) displays a user interface (e.g., interface 1950 of FIG. 19X-19Y) that includes a representation of the output of the operation being performed by the second device (e.g., 1906) (e.g. interface 1950 includes information identifying a song currently being played by device 1906). In some embodiments, the representation of the output can be displayed when device 1900 is locked or unlocked. For example, when device 1906 starts playing music, device 1900 displays a Now Playing interface (e.g., interface 1950). In some embodiments, device 1900 displays a Now Playing interface whenever music is playing on device 1906 (e.g., music initiated by any device, including other devices). In some embodiments, the operation is output of weather information, and the representation of the output includes current temperature information, forecast information, or the like. In some embodiments, the operation is output of news information, and the representation of the output includes current news, or the like.

Displaying a user interface that includes a representation of the output of the operation being performed by the second device, provides the user with visual feedback about the state of a state of the second device. Providing improved visual feedback to the user enhances the operability of the second device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the operation being performed by the second device (e.g., 1906) includes audibly outputting information (e.g., playing the song identified in interface 1950). In some embodiments, receiving the data regarding the output of the operation being performed includes receiving data representing the information (e.g., song title, elapsed play time, weather forecast data, news stories). In some embodiments, displaying the user interface (e.g., interface 1950 which includes information about the song being played), that includes the representation of the output of the operation being performed by the second device, includes displaying at least a portion of the data representing the information (e.g., displaying less than all of the data, such as a song title but not an album name, or displaying one news story where there are three current news stories in the data received by device 1900).

Displaying data representing information corresponding to information being audibly outputted by the second device provides the user with visual feedback about the state of the second device, in addition to the audio feedback being provided directly by the second device. Providing improved (e.g., supplemental or additional) visual feedback to the user enhances the operability of the second device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the information includes a media item (e.g., a song), and the operation being performed by the second device (e.g., 1906) includes audibly outputting the media item. In some embodiments, displaying the data representing the information includes displaying one or more of: an artist, a media item name, an album name, album art, and a media playback progress indicator (e.g., as shown in interface 1950 of FIG. 19Y).

Displaying additional data (e.g., one or more of artist, a media item name, an album name, album art, and a media playback progress indicator) that corresponds to a media item being audibly outputted by the second device provides the user with visual feedback about the state of the second device. Providing improved (e.g., supplemental or additional) visual feedback to the user enhances the operability of the second device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the user interface that includes the representation of the output of the operation being performed by the second device includes displaying one or more of news information or weather information.

In some embodiments, during the configuration process: in accordance with a first configuration setting of the first device being compatible with the second device (e.g., 1906), the first device (e.g., 1900) configures the second device (e.g., 1906) to include the first configuration setting. For example, a configuration setting can be a language setting for a voice assistant, and a first configuration setting can be “English (U.S.)” In this example, English (U.S.) is compatible with (e.g., supported by) a voice assistant on device 1906. In some embodiments, the configuration is done automatically, without requiring user input or confirmation, if the setting is compatible. In accordance with the first configuration setting of the first device not being compatible with the second device (e.g., 1906), the first device (e.g., 1900) displays an indication that the first configuration setting is not compatible with the second device (e.g., displays a message). In some embodiments, the indication that the first setting is not compatible with the second device is the display of a setup card for selecting a different/compatible setting (e.g., setup card 1960 of FIG. 19AD for selecting a compatible language).

Using a first configuration setting of the first device that is compatible with the second device allows the user to efficiently move through a configuration process for a device with fewer required user inputs, providing an optimized configuration process. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in accordance with the first configuration setting of the first device being compatible with the second device (e.g., 1906), the first device (e.g., 1900) displays a configuration user interface that includes a prompt requesting acceptance of the first configuration setting for the second device. In response to receiving user input accepting the first configuration setting for the second device (e.g., 1906), the first device (e.g., 1900) configures the second device to include the first configuration setting.

Displaying a configuration user interface that includes a prompt requesting acceptance of the first configuration setting for the second device, provides the user with visual feedback about the state of the second device (e.g., that it is compatible with the first configuration setting). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first configuration setting is a setting disabling a device feature (e.g., a voice assistant), and wherein a second configuration setting is a setting enabling the device feature (e.g., a voice assistant). In accordance with a determination that the configuration process requires enabling the device feature on the second device (e.g., 1906): the first device (e.g., 1900) displays an indication that the device feature will be enabled on the second device (e.g., setup card 1958 of FIG. 19AC); and the first device (e.g., 1900) configures the second device (e.g., 1906) to include the second configuration setting (e.g., enabling a voice assistant on the second device).

Displaying an indication that the device feature will be enabled on the second device (e.g., even when it is disabled on the first device) provides the user with visual feedback about the state of the second device (e.g., that the feature is required on the second device). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the indication that the device feature will be enabled on the second device (e.g., 1906) includes displaying an indication that the device feature will remain disabled on the first device.

Displaying an indication that the feature will remain disabled on the first device provides the user with visual feedback about the nature of the operation and the state of the first device (e.g., that enabling the feature on the second device will not alter the state of the first device, as to the feature). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in accordance with the first configuration setting of the first device not being compatible with the second device (e.g., 1906), the first device (e.g., 1900) displays a configuration user interface (e.g., 1960 of FIG. 19AD) that includes a prompt requesting selection of a third configuration setting compatible with the second device. For example, if device 1900 has a default language set to Latin (e.g., a first configuration setting), which is not a language compatible with the voice assistant feature of device 1906, then device 1900 prompts to select a compatible language (e.g., those listed in setup card 1960). In response to receiving user input selection of the third configuration setting (e.g., "English (U.K.)"), the first device (e.g., 1900) configures the second device (e.g., 1906) to include the third configuration setting. In some embodiments, configuring the second device includes preparing a configuration setting for transfer to the second device later at a later time (e.g., during the configuration process). For example, all configuration settings may be transferred to the second device at once.

Displaying a configuration user interface that includes a prompt requesting selection of a third configuration setting compatible with the second device reduces the number of inputs needed to configure the second device by surfacing compatible options to the user and provides an optimized configuration process. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to establishing the communication link connecting the first device and the second device (e.g., 1906), the first device (e.g., 1900) detects an indication that a physical proximity between the first device and the second device satisfies a proximity condition (e.g., as shown in FIG. 19A). In response to detecting the indication that the physical proximity between the first device and the second device satisfies the proximity condition, the first device (e.g., 1900) outputs an audio tone signal (e.g., as shown in FIG. 10I, where device 1010 is outputting an audio tone signal 1016).

Using an indication that the physical proximity between the first device and the second device satisfies the proximity condition in order to output an audio tone signal provides the user with auditory feedback regarding the state of the first device. For example, when there are other potential devices in proximity that are configurable, the audio tone signal can indicate which device will be configured. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to transmitting the user account information to the second device (e.g., 1906), the first device (e.g., 1900) displays a configuration user interface (e.g., 1948 of FIG. 19W) associated with a voice assistant, wherein the configuration user interface associated with a voice assistant includes a prompt to provide user voice input invoking one or more functions of the voice assistant. In some embodiments, the one or more functions of the voice assistant include audibly outputting one or more of: media (e.g., music), weather information, news, calendar information, messages, or the like.

Displaying a configuration user interface associated with a voice assistant that includes a prompt to provide user voice input invoking one or more functions of the voice assistant provides the user with information regarding the capabilities and state of a device. Providing such information to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that user voice input invoking one or more of the features of the voice assistant has been received by either the first device or the second device (e.g., 1906), the first device (e.g., 1900) maintains display of the configuration user interface (e.g., 1948) associated with the voice assistant. In response to receiving user input selection of an affordance (e.g., affordance labeled "Done" in setup card 1948) included in the configuration user interface associated with the voice assistant, the first device (e.g., 1900) ceases display of the configuration user interface associated with the voice assistant (e.g., setup card 1948 slides off the display, as shown in FIGS. 19X-19Y).

Note that details of the processes described above with respect to method 2000 (e.g., FIGS. 20A-20C) are also applicable in an analogous manner to the methods described below/above. For example, method 700, 900, 1100, 1300, 1500, 1700, 1800, 2200, 2400, 2600, 2800, 3000, 3200, 3400, 3600, 3800, and 3900 optionally includes one or more of the characteristics of the various methods described above with reference to method 2000. For brevity, these details are not repeated below.

FIGS. 21A-21I illustrate exemplary user interfaces for adjusting a device output of an audible signal, in accordance with some embodiments. The user interfaces in these figures are used to illustrate the processes described below, including the processes in FIGS. 22A-22B.

Figure 21A:
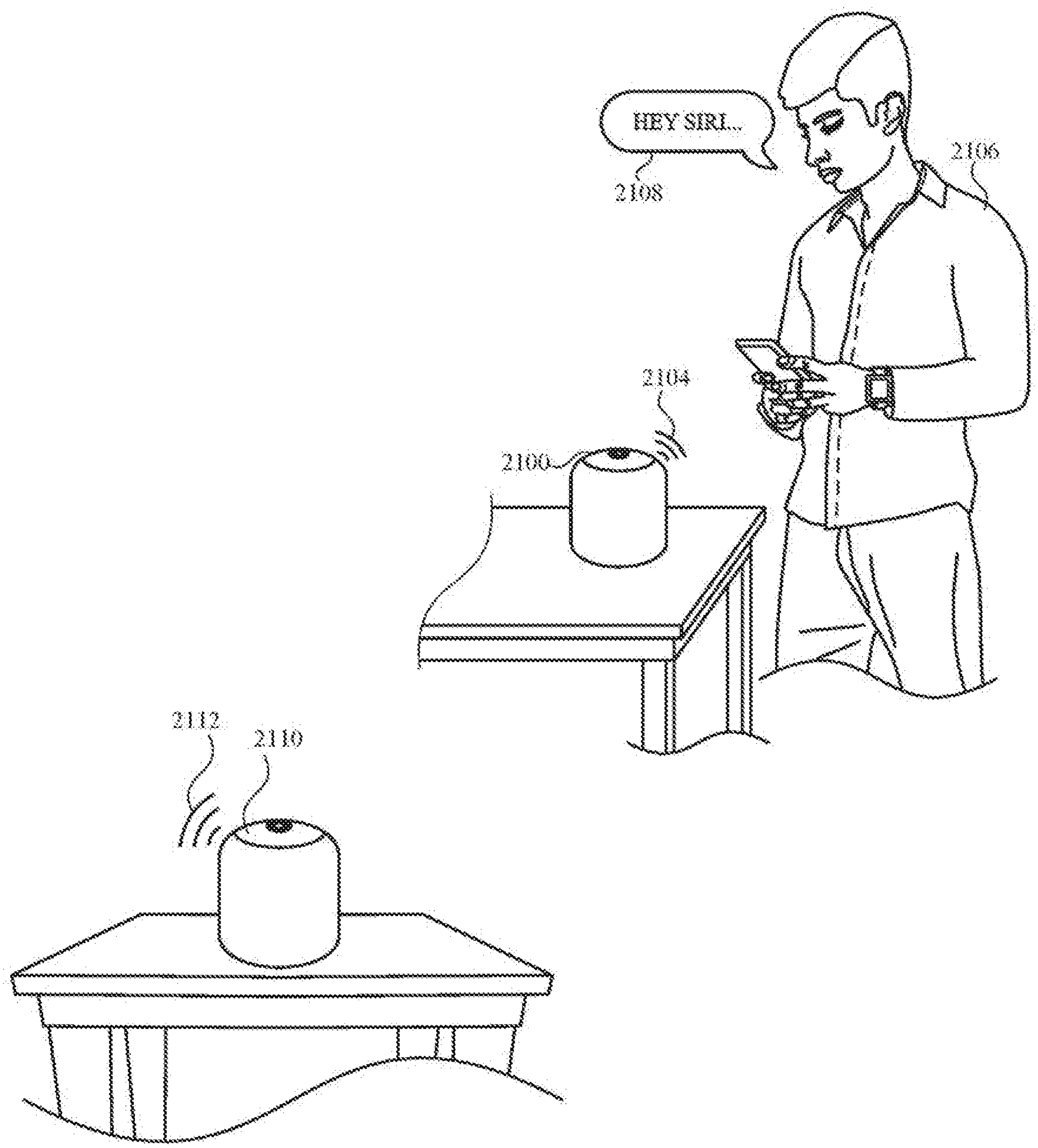
FIGS. 21A-21I illustrate exemplary techniques and user interfaces for adjusting an audible output of an electronic device in accordance with some embodiments.
Figure 22A:
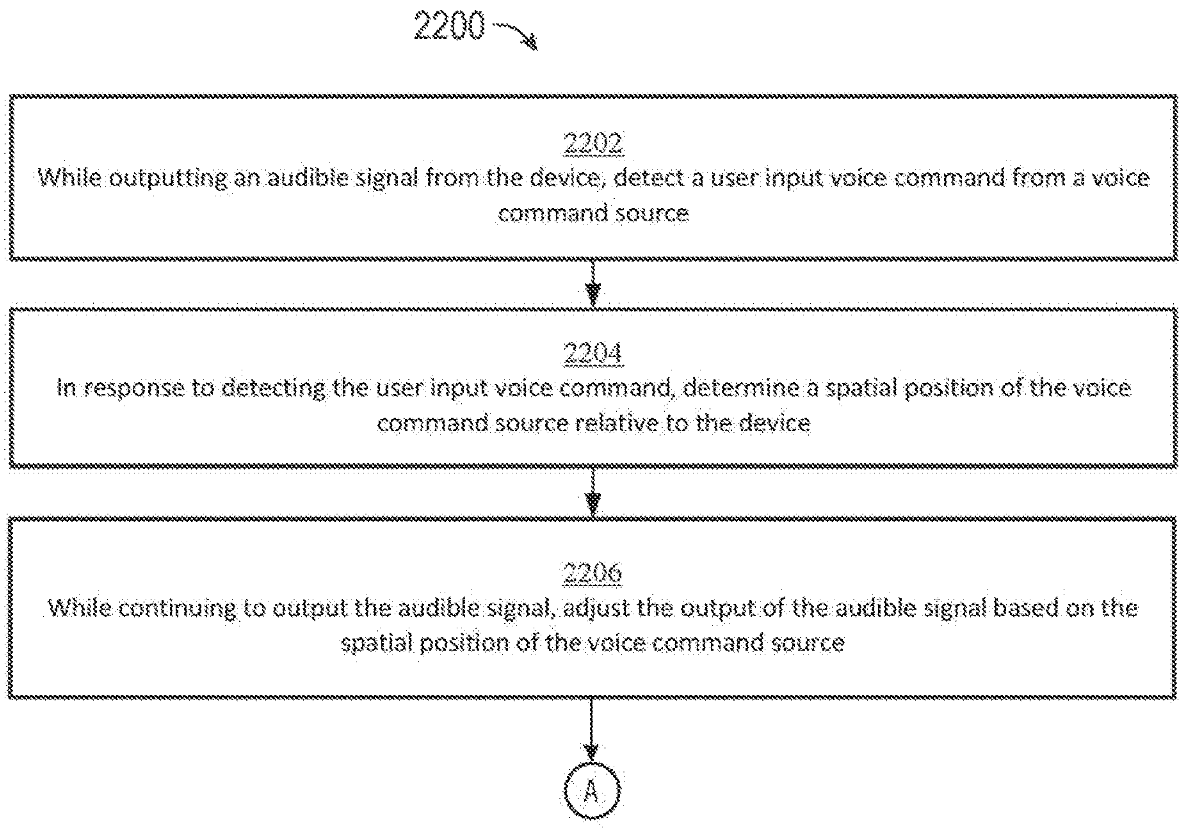
FIGS. 22A-22B is a flow diagram illustrating a process for adjusting an audible output of an electronic device in accordance with some embodiments.
Figure 22B:
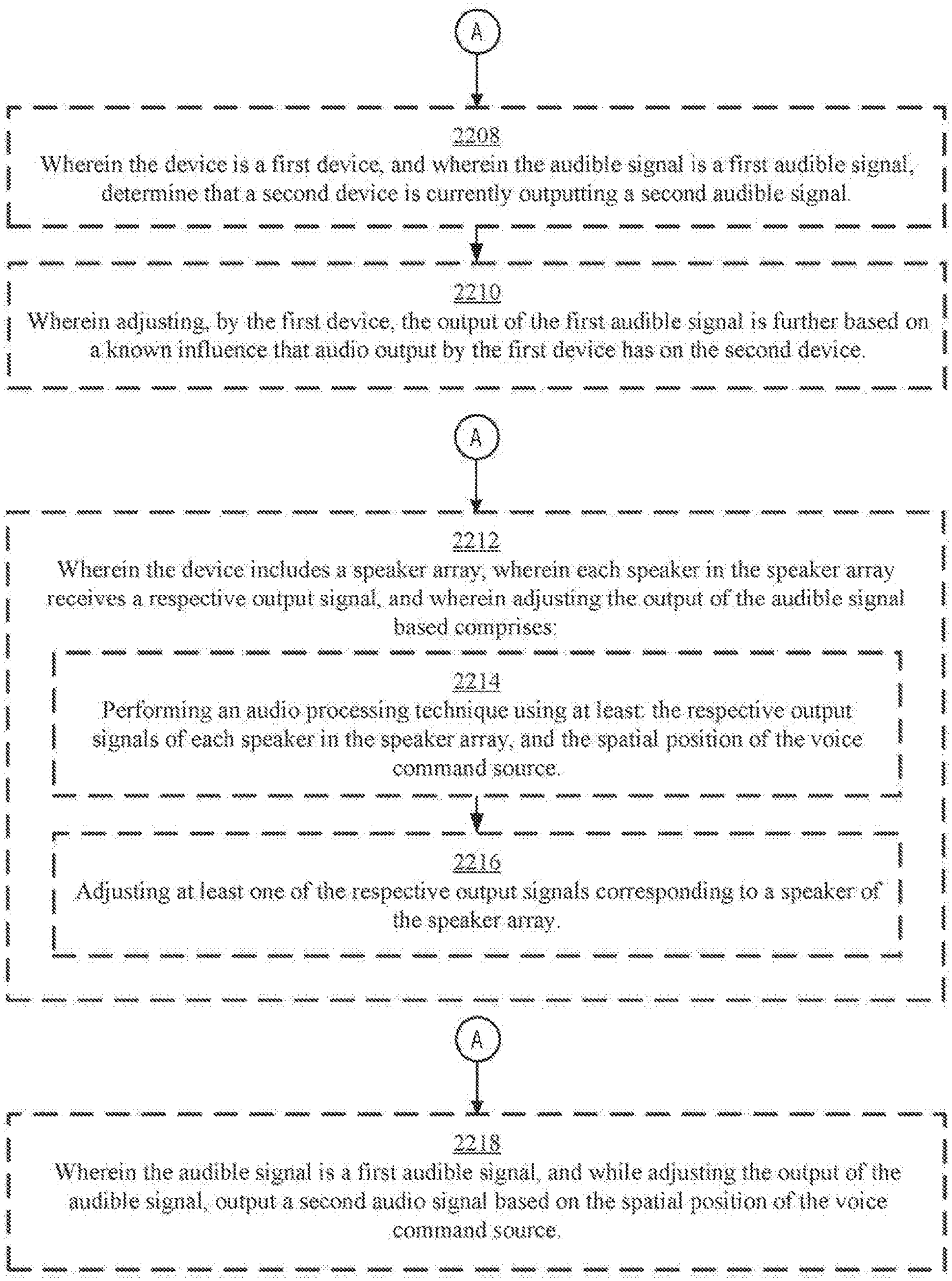

FIG. 21A illustrates an exemplary scenario in which a plurality of devices are connected. Specifically, device 2100 (also referred to as a first device) is a smart speaker that is connected to device 2110 (e.g., another smart speaker, also referred to as a second device). Device 2100 is optionally connected to the device being held by user 2106 (e.g., a personal device). In some embodiments, devices 2100, 2107, and 2110 include one or more features of devices 100, 300, 500, or 580. In some examples, device 2100 and/or device 2110 includes one or more audio signal detection components (e.g., microphones) and can detect voice user input. As shown in FIG. 21A, the user 2106 utters the voice input command 2108 "Hey Siri" aloud, which is detected by device 2100. Further, the voice input command 2108 is uttered while device 2100 is currently outputting an audible signal 2104 (e.g., media playback, voice assistant text-to-speech output), and while device 2110 is currently outputting an audible signal 2112 (e.g., media playback, voice assistant voice output). In some embodiments, device 2100 and device 2110 are concurrently outputting synchronized audible signals (e.g., are a stereo pair group, and are outputting synchronized playback of the same media item).

Figure 21B:
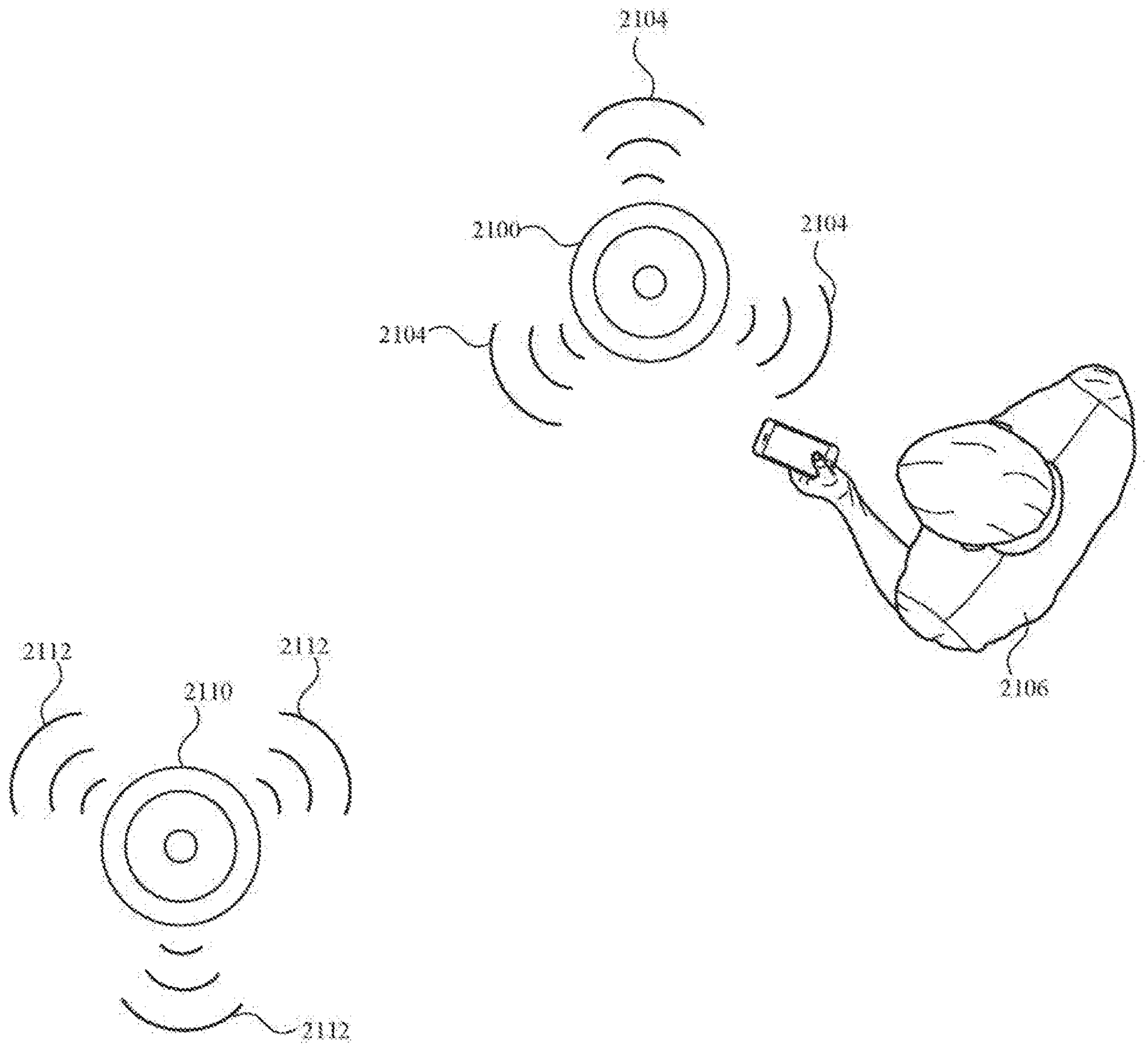

FIG. 21B depicts an overhead view of the scenario of FIG. 21A, and illustrates the relative spatial positioning of device 2100, device 2110, and user 2106 relative to each other.

In some embodiments, in response to detecting the user input voice command (e.g., 2108 by user 2106), device 2100 adjusts the output of an audible signal (e.g., 2104). In some embodiments, device 2100 adjusts the output of the audible signal based on a spatial position of the voice command source (e.g., the position of user 2106) while continuing to output the audible signal (e.g., 2104). For example, device 2100 applies spatial domain audio processing to project the sound away from the user 2106, to filter the sound with low pass, and/or band pass, and/or high pass filters, or to lower the volume (e.g., to zero) of one or more of its speakers (e.g., where device 2100 includes an array of a plurality of speakers). For example, device 2100 can lower the volume of a speaker (e.g. of an array of speakers of device 2100) that is outputting the audible signal and that is nearest the spatial position of user 2106.

Figure 21C:
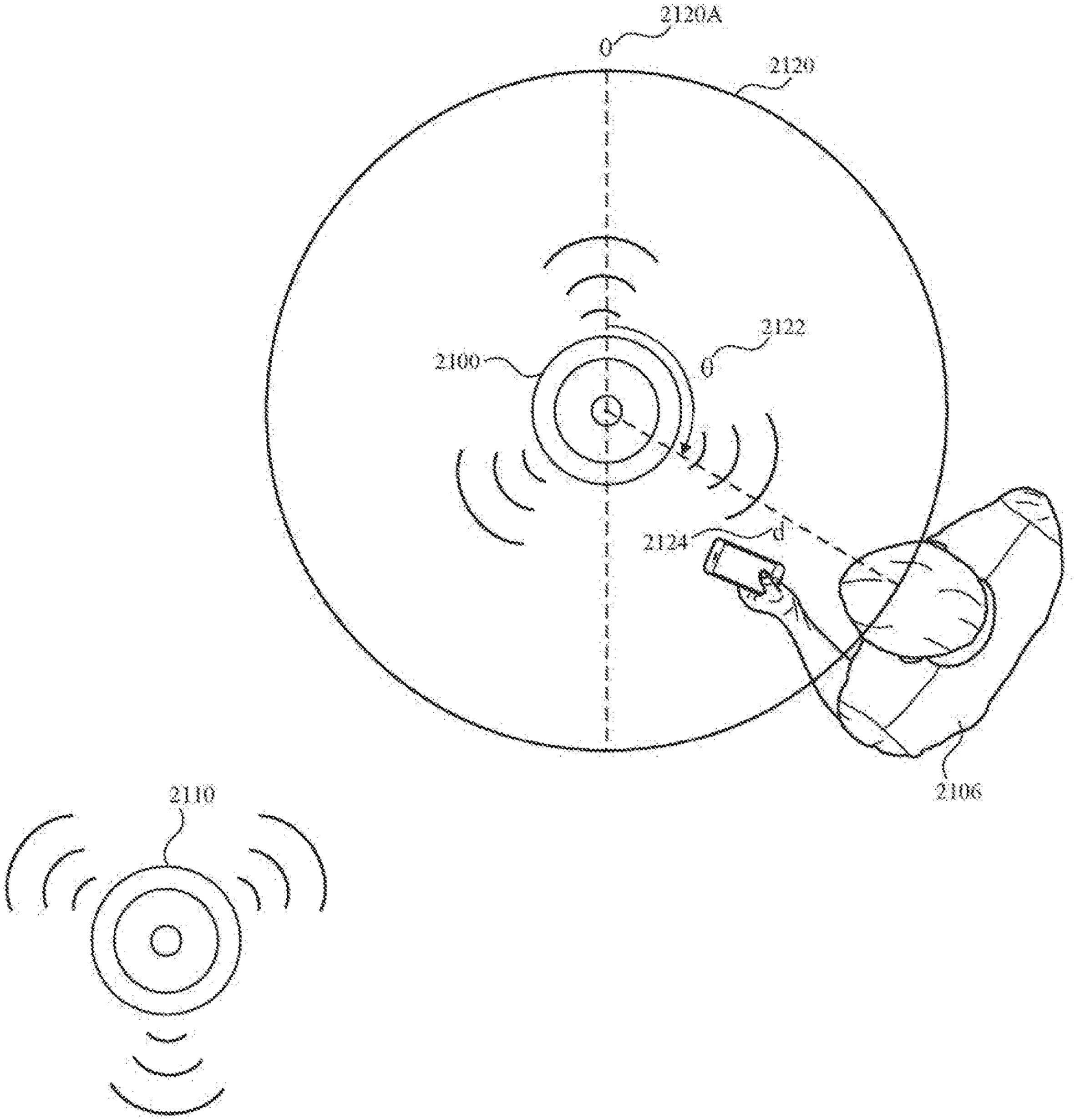

In some embodiments, in response to detecting the user input voice command (e.g., 2108), device 2100 determines a spatial position of a voice command source (e.g., user 2106). FIG. 21C illustrates exemplary values that a device (e.g., 2100) uses to determine a spatial position of a voice command source (e.g., 2106). As shown, user 2106 is standing at a position that is a lateral angle 2122 (e.g., θ (theta) degrees) from a reference point on reference marker 2120. Reference marker 2120 is included for illustrative purposes. User 2106 is standing at a distance 2124 (e.g., d units of length) away from device 2100 (e.g., which is depicted as the center of reference marker 2120). In some embodiments, device 2100 uses one or more of an angle and distance to determine a spatial position of a voice command source. In some embodiments, an angle is a lateral angle (e.g. as shown in FIG. 21C). In some embodiments, an angle is a vertical angle. For example, using a vertical angle (not illustrated), device 2100 can determine a height (e.g., in a z-direction, a third dimension) of a voice command source relative to device 2100. In some embodiments, a spatial position of the voice command source is a position relative to device 2100 (e.g., relative to a coordinate system of device 2100, as illustrated by 2120).

In some embodiments, a plurality of devices (e.g., 2100 and 2110) are used to determine a spatial position of a voice command source (e.g., user 2106). For example, both devices 2100 and 2110, as shown in FIG. 21C, can determine a distance to user 2106 and share the results with the other device. In some examples, device 2100 uses both distance measurements to determine a spatial position of user 2106. For further example, three devices can be used to triangulate a position of a voice command source (e.g., user 2106). Utilizing a plurality of approximations or measurements from a plurality of devices, in some examples, results in a more accurate determination of spatial position of a voice command source than would otherwise be achieved with a single device.

Figure 21D:
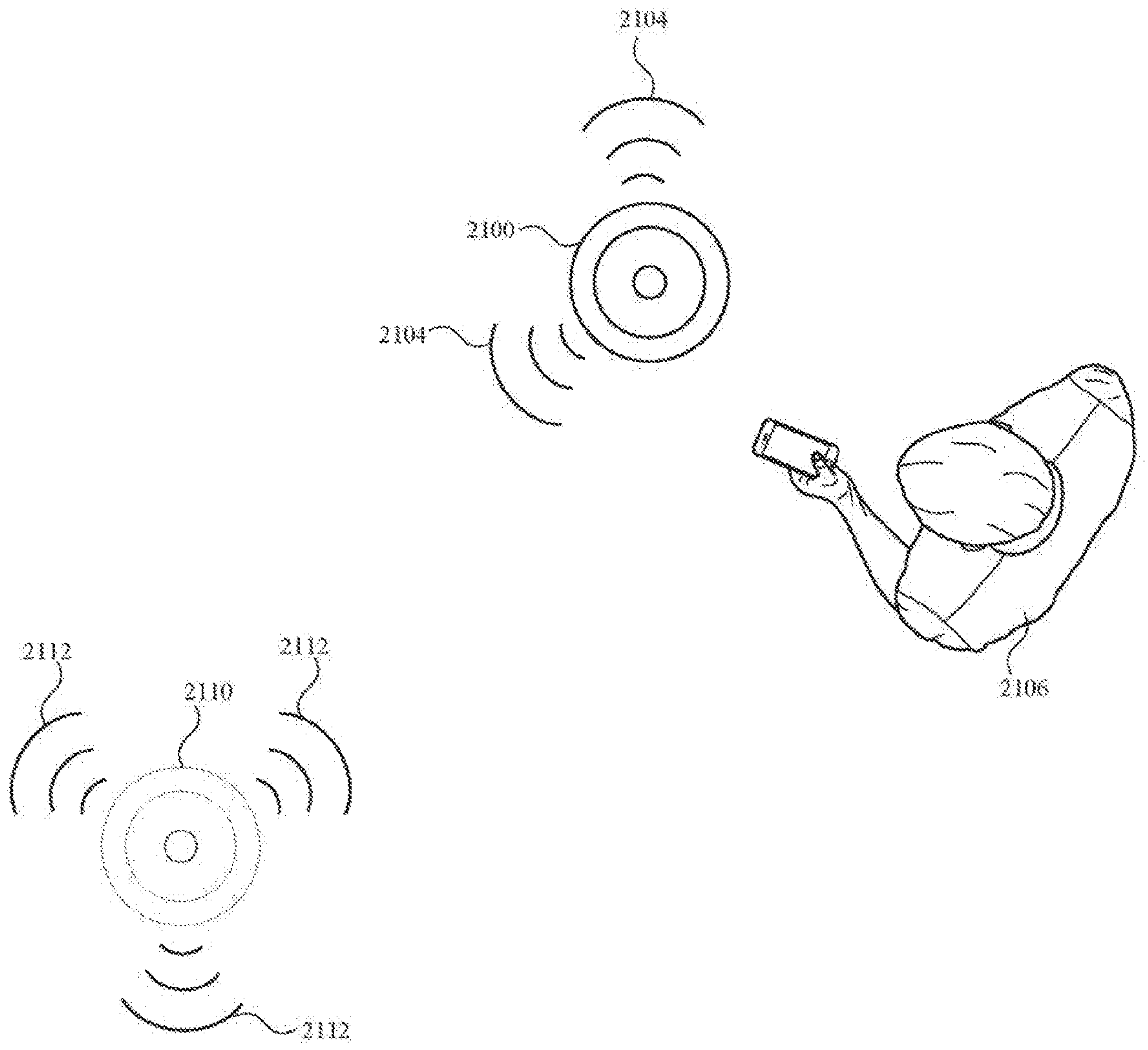

In some embodiments, device 2100 adjusts the output of the audible signal based on the spatial position of the voice command source (e.g., user 2106). FIG. 21D illustrates the overhead view of FIGS. 21C and 21D, however the output of the audible signal 2104 has been adjusted (e.g., reduced) in the direction of user 2106, as shown by the lack of sound waves emanating from device 2100 in the direction of user 2106. As seen in FIG. 21D, device 2100 continues to output audible signal 2104 in directions not directly facing the user.

Figure 21E:
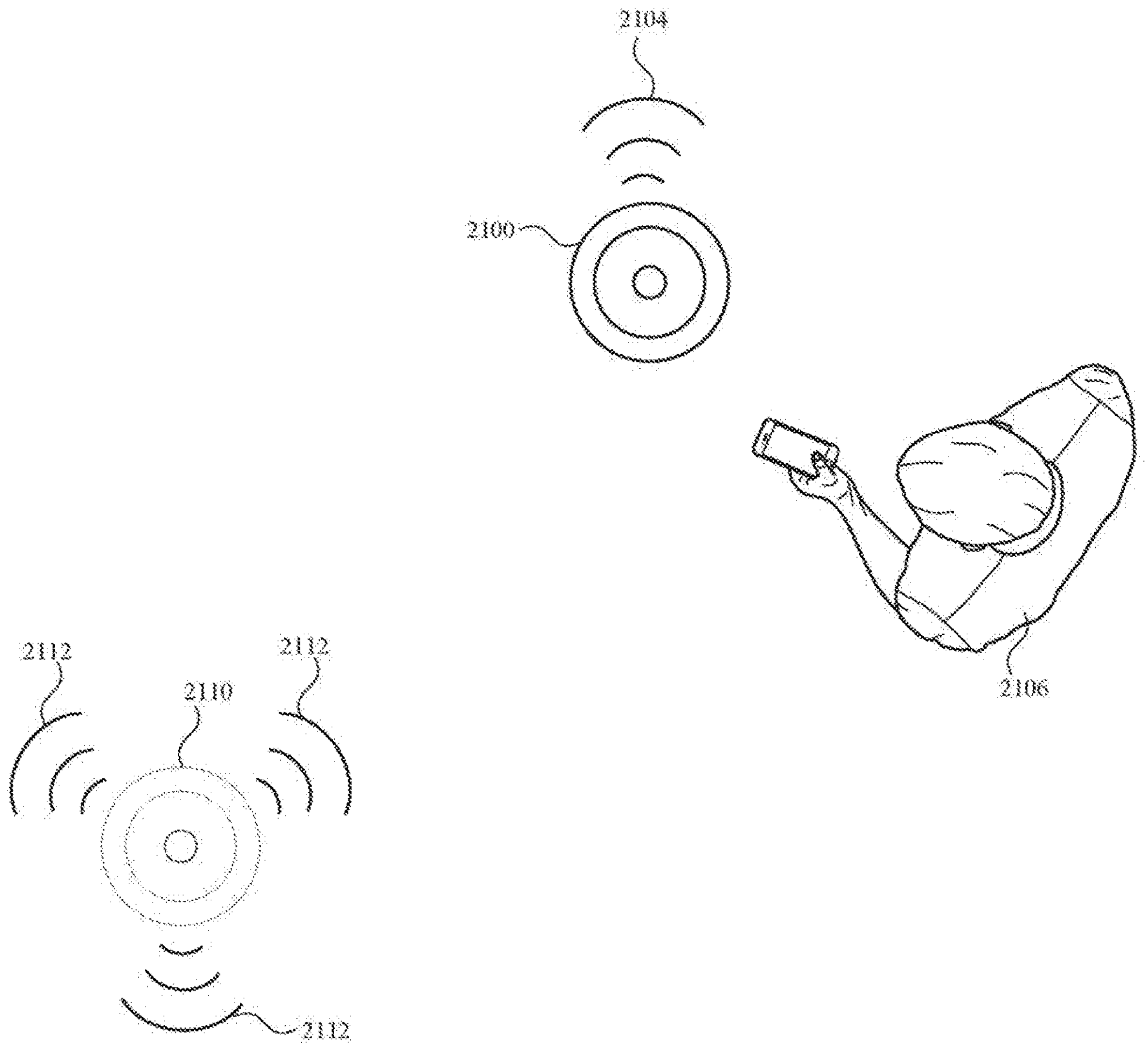

In some embodiments, device 2100 adjusts the output of the audible signal based on the second device (e.g., 2110). FIG. 21E illustrates that device 2100 has adjusted (e.g., ceased) the output of the audible signal 2104 (similar to FIG. 21D) both in the direction of user 2106 and in the direction of the second device 2110. This can be done, for example, when device 2110 is also listening to the voice command input. In some examples, devices 2100 and 2110 can both detect voice user input 2108. In such examples, device 2110 can better suited (e.g., is a shorter distance from the user, has a more sensitive microphone, has faster speech processing hardware) for detecting the voice user input (e.g., 2108). Thus, for example, device 2100 can reduce the output of an audible signal so as to reduce an influence on the device 2110 (e.g., thus reducing interference with device 2110's audio detection function). In some embodiments, the first device (e.g., device 2100) uses a known influence (e.g., that its audio output has) on the second device (e.g., device 211) to adjust output. In some embodiments, the first device (e.g., device 2100) determines a known influence based on data received from the second device (e.g., device 2110). For example, device 2100 can receive (e.g., from device 2110) data representing an influence that audio output from device 2100 has on detection circuitry (e.g., a microphone array) of device 2110. In some embodiments, a known influence is determined during playback (e.g., device 2100 determines a known influence while outputting the audible signal 2104). For instance, in some examples, device 2100 and device 2110 are outputting the same output signal, and device 2100 thus uses the known output signal to reduce interference with any input signal (e.g., voice input) from user 2106 (e.g., device 2100 subtracts one signal from the other before signal output). In some embodiments, a known influence is predetermined data retrieved from memory (e.g., previously determined and subsequently retrieved from memory of device 2100). In some embodiments, a known influence (e.g., on a second device) includes data regarding the influence of one or more of the following characteristics of audio output by the first device: frequency, volume, and direction.

Figure 21F:
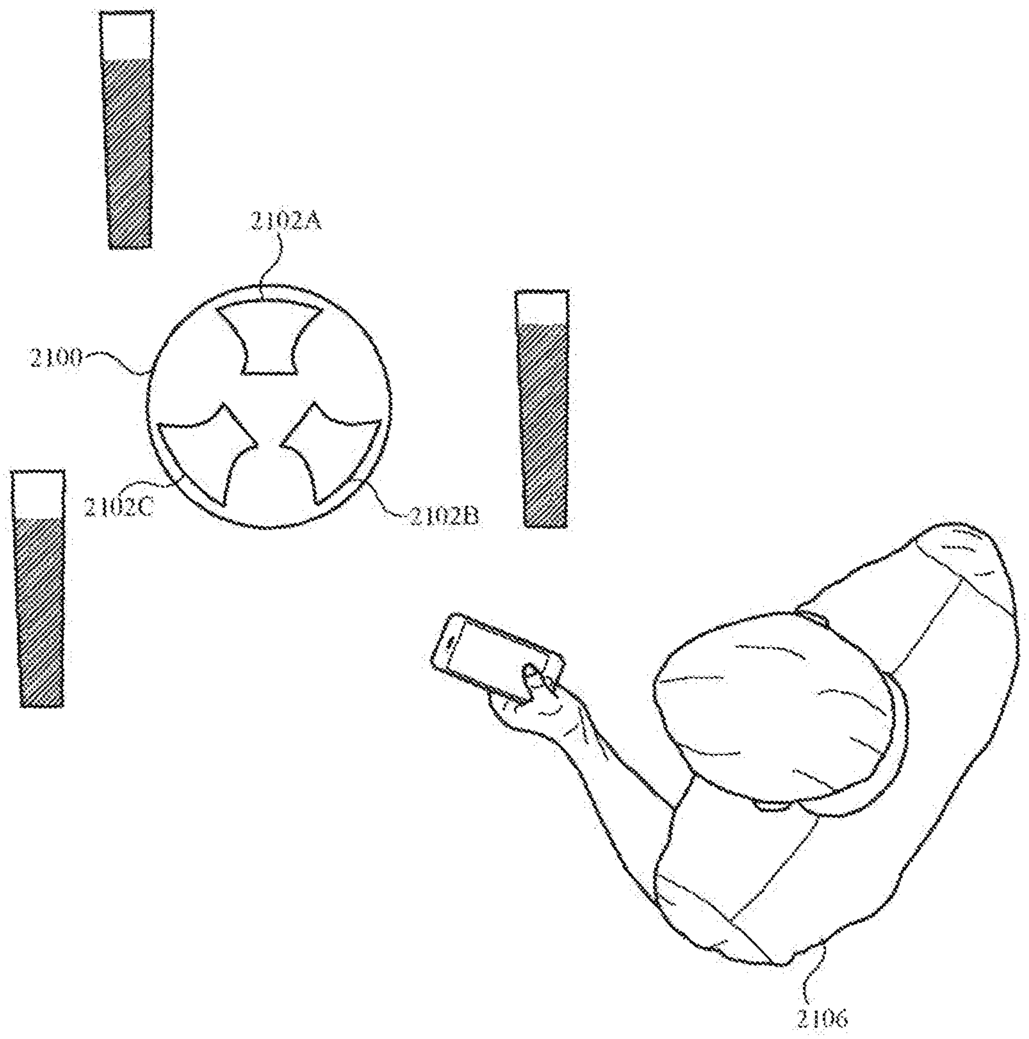
Figure 21G:
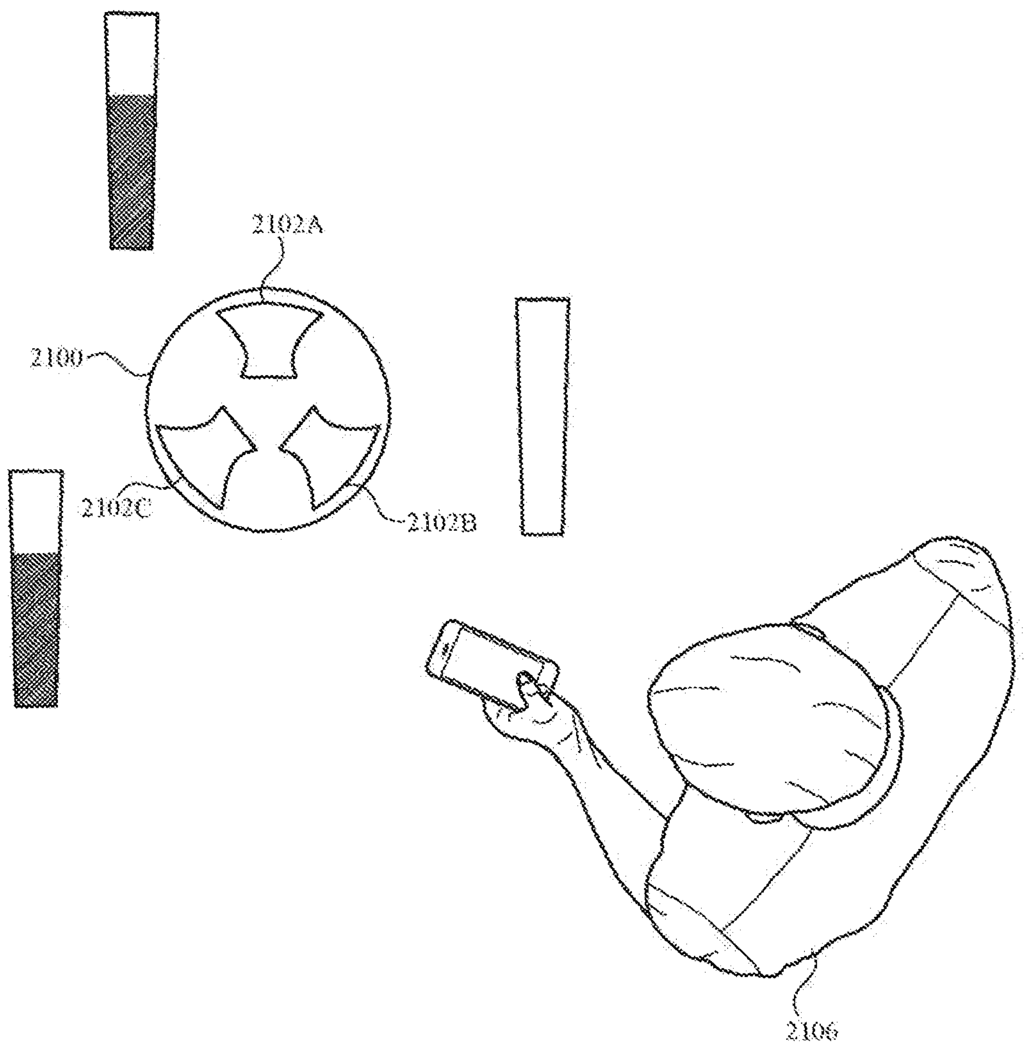

FIGS. 21F and 21G illustrate an exemplary adjustment of output of device 2100. As shown, device 2100 includes a speaker array (e.g., one or more speakers) of three speakers (e.g., 2102A-2102C), each pointing in different directions (e.g., directions 120 degrees apart). In some embodiments, a speaker array includes any number of two or more speakers. Before adjustment (e.g., before detection of voice user input 2108), the output levels of the speakers 2102A-2102C are shown in FIG. 21F. As shown in FIG. 21G, in response to detecting voice user input 2108, device 2100 reduces the output of speaker 2102B (e.g., which faces the user 2106) to zero (e.g., zero volume), and slightly reduces the output of speakers 2102A and 2102C.

In some embodiments, a first device performs an audio processing technique. For example, device 2100 can perform an audio processing technique to project the audio output so that it is perceived by a user to be in a direction away from the user. For example, device 2100 performs a spatial audio processing technique on one or more signals representing the audio output. The spatial audio processing technique, in some examples, is used to transform the one or more signals representing the audio output, when outputted by the device, is perceived by a listener to emanate from a selected spatial position. One of skill in the art would recognize that various appropriate techniques can be used for performing such audio processing, all of which are intended to be within the scope of this disclosure.

Figure 21H:
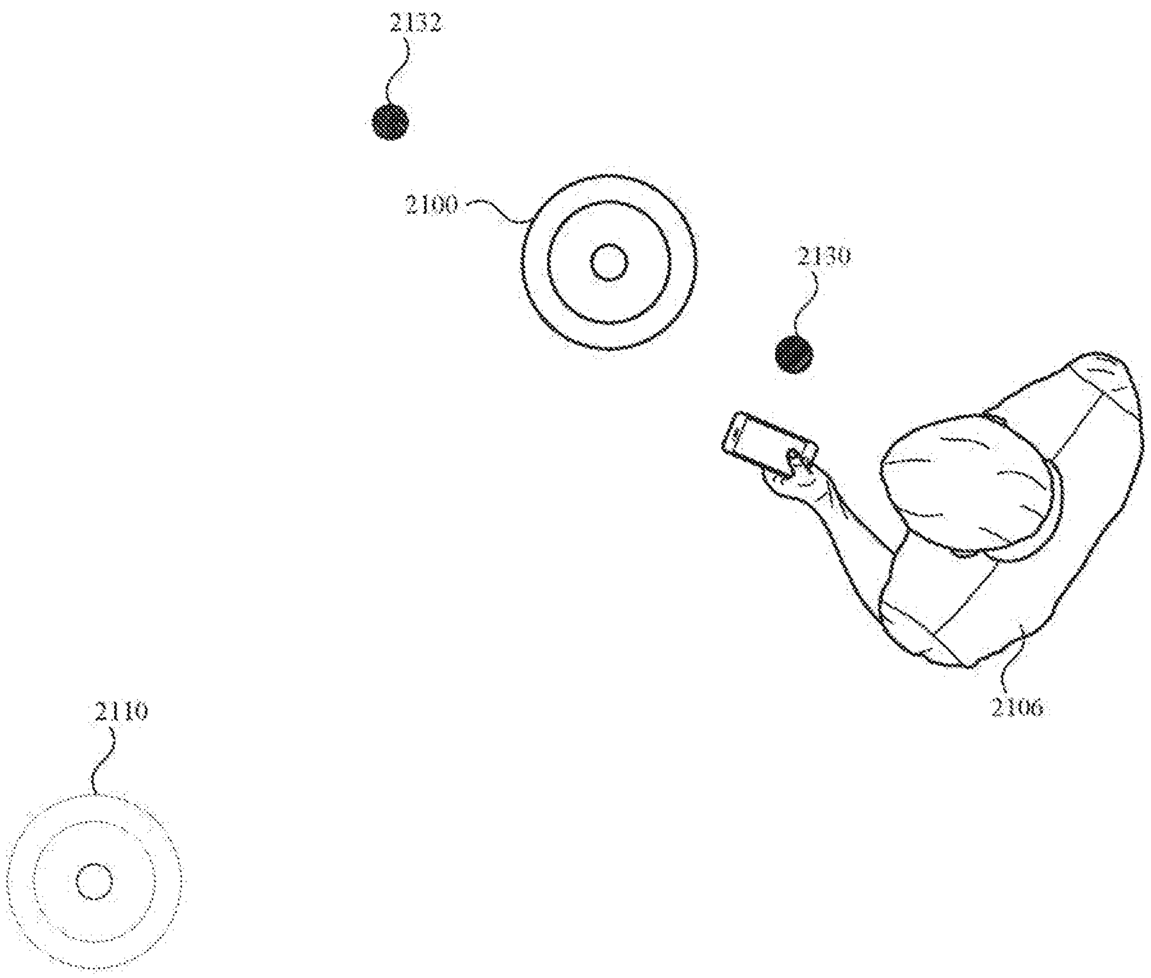

FIG. 21H illustrates the overhead view of devices 2100 and 2110 and user 2106, and includes two points—a first point 2132 (e.g., representing a spatial position) that is in a direction away from user 2106 (e.g., relative to device 2100), and a second point 2130 (e.g., representing a spatial position) that is in a direction toward the user (e.g., relative to device 2100).

Figure 21I:
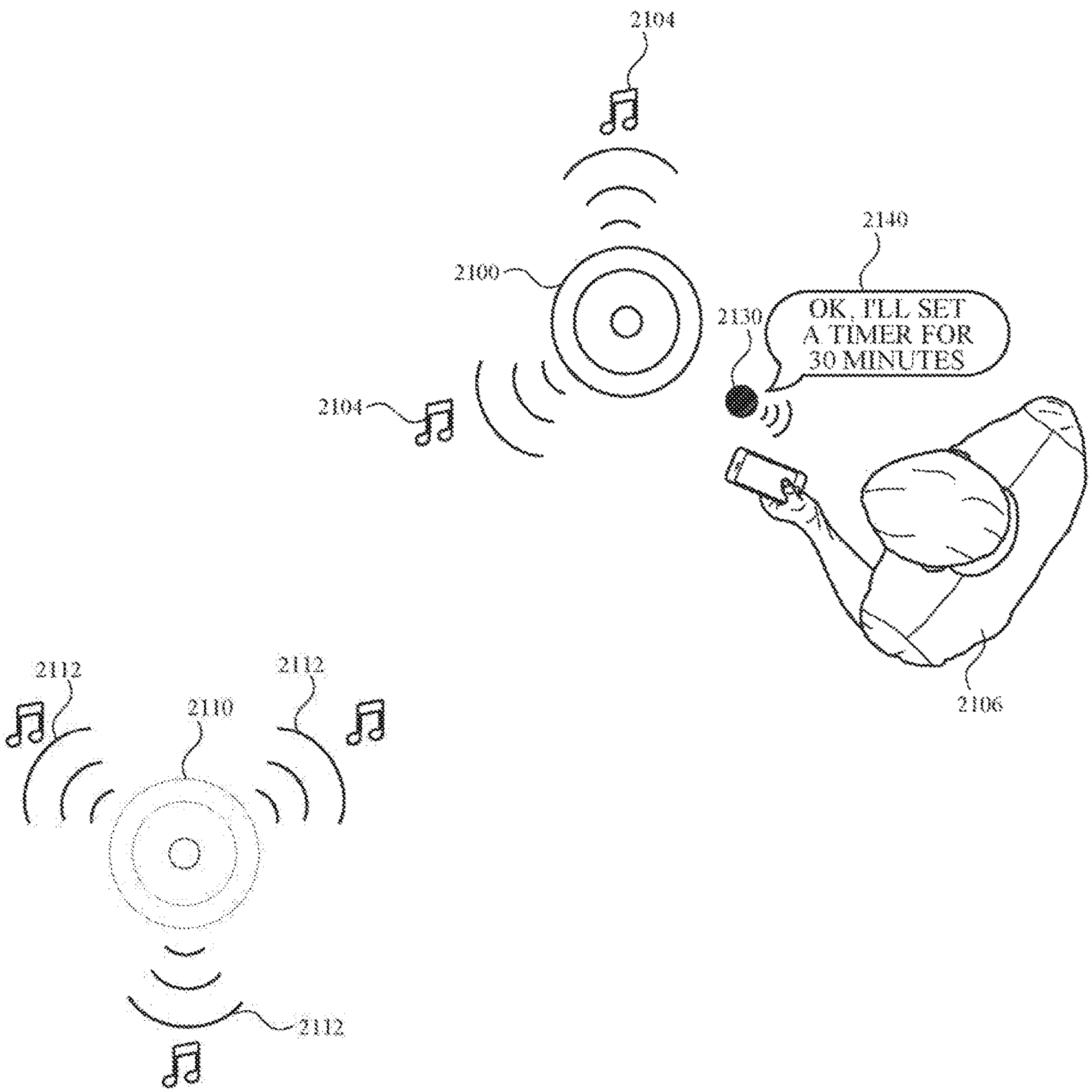

In some embodiments, device 2100 adjusts audio output such that it will be perceived by a voice command source (e.g., user 2106) to emanate from a point in a direction away from them (e.g., relative to device 2100). For example, in response to detecting voice user input 2108, the device can adjust the output of 2104 (e.g., playback of music as shown in FIG. 21I) so that the user 2106 perceives the sound to emanate from point 2132, rather than from the position of device 2100. Thus, while user is speaking, for example, they are provided an indication that device 2100 is currently listening (e.g., even though it continues playing back media) when they perceive the volume of audio output to be lowered (e.g., in comparison to the audible output prior to adjustment, as seen in FIG. 21B). Further, in this example, media playback is not interrupted (e.g., paused, stopped, muted) by a user voice command.

In some embodiments, device 2100 adjusts audio output such that it will be perceived by a voice command source (e.g., user 2106) to emanate from a point in a direction toward them (e.g., relative to device 2100). For example, as shown in FIG. 21I, in response to detecting voice user input 2108 (e.g., a command to a voice assistant function on device 2100), device 2100 outputs a response 2140 (e.g., text-to-speech output "OK, I'll set a timer for 30 minutes") in a direction toward user 2106 (e.g., toward point 2130 of FIG. 21H). In this example, voice user input 2108 included the command "Hey Siri, set a timer for 30 minutes". Thus, user 2106 perceives the response sound (e.g., 2140) to emanate from point 2130. Thus, device 2100 utilizes a known spatial position of a voice command source to target an audible response in the direction of the source. Thus, the user is provided a response that is more likely to be heard by the user. For example, if the user is in a noisy environment, targeting the audio output to the user's position can increase the likelihood that the user hears the output of device 2100. Further, in this example, media playback is not interrupted (e.g., paused, stopped, muted at least in directions facing away from the voice command source) while providing response sound 2140, since response sound 2140 is directed towards the user is therefore readily perceptible, even while media playback continues. Further, if there are multiple users in a room, device 2100's spatially-targeted output can provide increased privacy by targeting a response such that other, non-targeted users are less likely to hear.

FIGS. 22A-22B is a flow diagram illustrating a method for adjusting audible output using an electronic device in accordance with some embodiments. Method 2200 is performed at a device (e.g., 100, 300, 500, 580). Some operations in method 2200 are, optionally, combined, the order of some operations are, optionally, changed, and some operations are, optionally, omitted.

As described below, method 2200 provides an intuitive way for adjusting audible output. The method reduces the cognitive burden on a user for adjusting audible output, thereby creating a more efficient human-machine interface. For battery-operated computing devices, enabling a user to adjust audible output faster and more efficiently conserves power and increases the time between battery charges.

While outputting an audible signal (e.g., 2104) from the electronic device (e.g., 2100), the electronic device (e.g., 2100) detects a (2202) user input voice command (e.g., 2108) from a voice command source (e.g., 2106).

In response to detecting the user input voice command, the electronic device (e.g., 2100) determines (2204) a spatial position (e.g., angle 2122 and/or distance 2124 of FIG. 21C) of the voice command source (e.g., 2106) relative to the electronic device (e.g., 2100). In some embodiments, determining a spatial position includes determining one or more of a distance (e.g., 2124 of FIG. 21C) and an angle (e.g., 2122 of FIG. 21C) to the voice command source (e.g., a user speaking). For example, an angle can be a lateral angle or a vertical angle relative to a coordinate system of the electronic device.

While continuing to output the audible signal (e.g., 2104), the electronic device (e.g., 2100) adjusts (2206) the output (e.g., volume, frequency, and/or direction) of the audible signal based on the spatial position of the voice command source (e.g., as shown in FIG. 12D). In some embodiments, the electronic device (e.g., 2100) applies spatial domain audio processing to the audible signal. In some embodiments, the electronic device (e.g., 2100) projects the output of the audible signal (e.g., sound) in one or more directions other than a direction toward the voice command source (e.g., 2106). In some embodiments, the electronic device (e.g., 2100) projects the output in a direction away from the voice command source. In some embodiments, the electronic device (e.g., 2100) includes an array (e.g., two or more) of speakers. In some embodiments, the electronic device (e.g., 2100) adjusts the outputs of each speaker in the array of speakers. For example, the electronic device (e.g., 2100) adjusts the relative output of one or more speakers in the array to spatially-target output of the audible signal in a direction other than toward the voice command source. In some examples, the electronic device (e.g., 2100) lowers the output volume (e.g., to zero) of a speaker (e.g., of an array of speakers) that is outputting the audible signal and that is nearest to the spatial position.

Adjusting the output of an audible signal, while continuing to output it, based on a spatial position determined in response to a user input voice command provides the user with feedback that their voice command is being detected. Providing improved audible feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the device is a first device, and the audible signal is a first audible signal. In some embodiments, the electronic device (e.g., 2100) determines (2208) that a second device (e.g., 2110) is currently outputting a second audible signal (e.g., 2112). For example, the first and second device are currently playing the same content (e.g., are a device group), or the first device detects (e.g., via one or more microphones) that the second device is outputting audio (e.g., which can be a different audio signal).

In some embodiments, adjusting, by the first device (e.g., 2100), the output of the first audible signal is further based on (2210) a known influence that audio output by the first device has on the second device (e.g., 2110). For example, the second device may be closer to the voice command source (e.g., 2106), and thus may be the most appropriate device to listen to the user input voice command (e.g., 2108). In some embodiments, the audio output of the first device is adjusted so as to reduce interference with the second device's ability to detect and/or process the user input voice command. For example, the second device includes a microphone for detecting voice input and the first device adjusts its output so as to reduce interference with the second devices use of its microphone to detect voice user input. In some embodiments, the known influence is determined (e.g., by device 2100) based on the spatial position of the second device (e.g., relative to the position of the first device). In some embodiments, the known influence is based on data received from the second device (e.g., the second device transmits quantitative data regarding how the output of audible signals by the first device affects the audio detection circuitry (e.g., microphone) of the second device).

In some embodiments, the first device (e.g., 2100) adjusts the output (e.g., volume, frequency, and/or direction) of the audible signal based on the spatial position of second device (e.g., 2110) (e.g., as shown in FIG. 21E).

In some embodiments, the device (e.g., 2100) includes a speaker array (e.g., two or more speakers, such as speakers 2102A-2102C of FIG. 21F), wherein each speaker in the speaker array (e.g., 2102A-2102C) receives a respective output signal (2212). In some embodiments, adjusting the output of the audible signal based comprises (2212): performing (2214) an audio processing technique using at least: the respective output signals of each speaker in the speaker array (e.g., as illustrated in FIG. 21F), and the spatial position of the voice command source (e.g., as shown in FIG. 21C). In some embodiments, adjusting the output of the audible signal based comprises (2212): adjusting (2216) at least one of the respective output signals corresponding to a speaker of the speaker array (e.g., as shown in FIG. 21G, in which speaker 2102B's output volume level has been reduced).

In some embodiments, the audio processing technique includes transforming the audio output into the spatial domain and applying one or more filters (e.g., head-related transfer functions (HRTFs). For example, the filter can create a three-dimensional audio effect at a position that is laterally located in the opposite direction of the voice command source (e.g., point 2132 as shown in FIG. 21H). Thus, if a user is located at a position that is at some lateral angular position relative to the device (e.g., an angular position relative to the speaker that will be referred to as 0 degrees for reference), the speaker can apply a 3D audio effect to adjust the output of the audible signal so that the user perceives the audio to be emanating from an angular position of 180 degrees relative to the speaker (e.g., point 2132 as shown in FIG. 21H). In some embodiments, the audio processing includes a cross-talk cancellation (CTC) process. In some embodiments, the audio processing technique includes a beamforming process (e.g., using constructive and/or destructive interference of sound waves to achieve spatial selectiveness of audio output). Any technique for creating a perceived spatial audio effect to a human listener is intended to be within the scope of this disclosure.

In some embodiments, the spatial position is a first spatial position (e.g., 2130 of FIG. 21H), and wherein adjusting the output of the audible signal further comprises outputting the audible signal (e.g., 2104) such that it will be perceived, by a listener (e.g., user 2106) at the first spatial position (e.g., 2130 of FIG. 21H), to emanate from a second spatial position (e.g., 2132 of FIG. 21H) that is in a direction, relative to the device (e.g., 2100), away from the first spatial position of the voice command source. For example, device 2100 applies a 3D audio effect such that a human listener located at the user's position will perceive the output (e.g., 2104) to be emanating from the spatial position that is in a direction away from the user, relative to the device.

In some embodiments, subsequent to adjusting the output of the audible signal: the electronic device (e.g., 2100) detects that the user input voice command (e.g., 2108) from the voice command source (e.g., 2106) has ended. In response to detecting that the user input voice command from the voice command source has ended, the electronic device (e.g., 2100) ceases adjusting the output the audible signal. For example, the adjusted audio output (shown in FIG. 12G) returns to its previous unadjusted state (e.g., as shown in FIG. 21F).

In some embodiments, determining the spatial position of the voice command source relative to the device comprises: determining a distance (e.g., 2124) of the voice command source relative (e.g., 2106) to the electronic device (e.g., 2100), and determining an angular position (e.g., a lateral or vertical angle) (e.g., 2122) of the voice command source relative to the device.

In some embodiments, the audible signal (e.g., 2104) is a first audible signal, and while adjusting the output of the audible signal (e.g., 2104 as shown in FIG. 21D): the electronic device (e.g., 2100) outputs (2218) a second audio signal (e.g. 2140) based on the spatial position of the voice command source.

In some embodiments, the spatial position (e.g., position of user 2106 in FIG. 21I) is a first spatial position, and outputting the second audible signal (e.g., 2140 as shown in FIG. 21I) comprises outputting the second audible signal such that it will be perceived, by a listener at the first spatial position, to emanate from a third spatial position (e.g., point 2130) that is in a direction, relative to the device, toward the first spatial position of the voice command source.

In some embodiments, the first audible signal represents playback of a media item (e.g., a song, video audio), and wherein the second audible signal represents a virtual assistant output (e.g., a voice assistant output 2140, as shown in FIG. 21I).

In some embodiments, the electronic device (e.g., 2100) includes a plurality of microphones (e.g., a microphone array).

Note that details of the processes described above with respect to method 2200 (e.g., FIGS. 22A-22B) are also applicable in an analogous manner to the methods described below/above. For example, method 700, 900, 1100, 1300, 1500, 1700, 1800, 2000, 2400, 2600, 2800, 3000, 3200, 3400, 3600, 3800, and 3900 optionally includes one or more of the characteristics of the various methods described above with reference to method 2200. For brevity, these details are not repeated below.

FIGS. 23A-23K illustrate exemplary user interfaces for blended taste profile playback queues, in accordance with some embodiments. The user interfaces in these figures are used to illustrate the processes described below, including the processes in FIGS. 24A-24B.

Figure 23A:
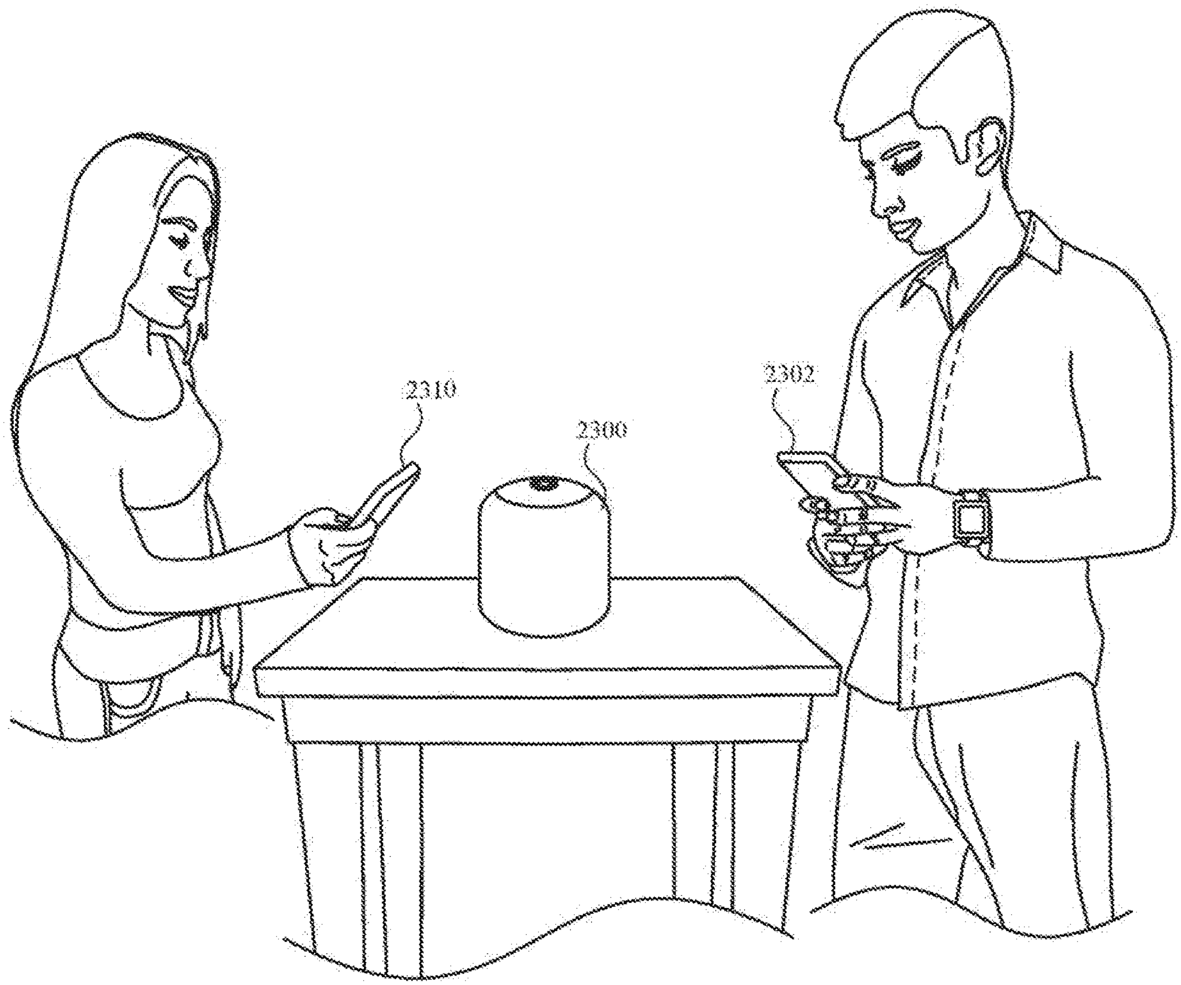
FIGS. 23A-23K illustrate exemplary techniques and user interfaces for managing a playback queue in accordance with some embodiments.

FIG. 23A illustrates an exemplary scenario in which a plurality of devices are connected. Specifically, device 2300 is a smart speaker that is connected to both devices 2302 and 2310 (e.g., personal devices). In some embodiments, device 2300 includes one or more features of devices 100, 300, 500, or 580. In some embodiments, devices 2302 and 2304 include one or more features of devices 100, 300, 500, or 580. In some examples, the respective users of devices 2302 and 2310 may desire to playback media based on both of their taste profiles. In some examples, devices 2300, 2302, and/or 2310 are used to create, maintain and/or store a playback queue based on a plurality of taste profiles. FIGS. 23B-23K illustrate exemplary interfaces for doing so.

Figure 23B:
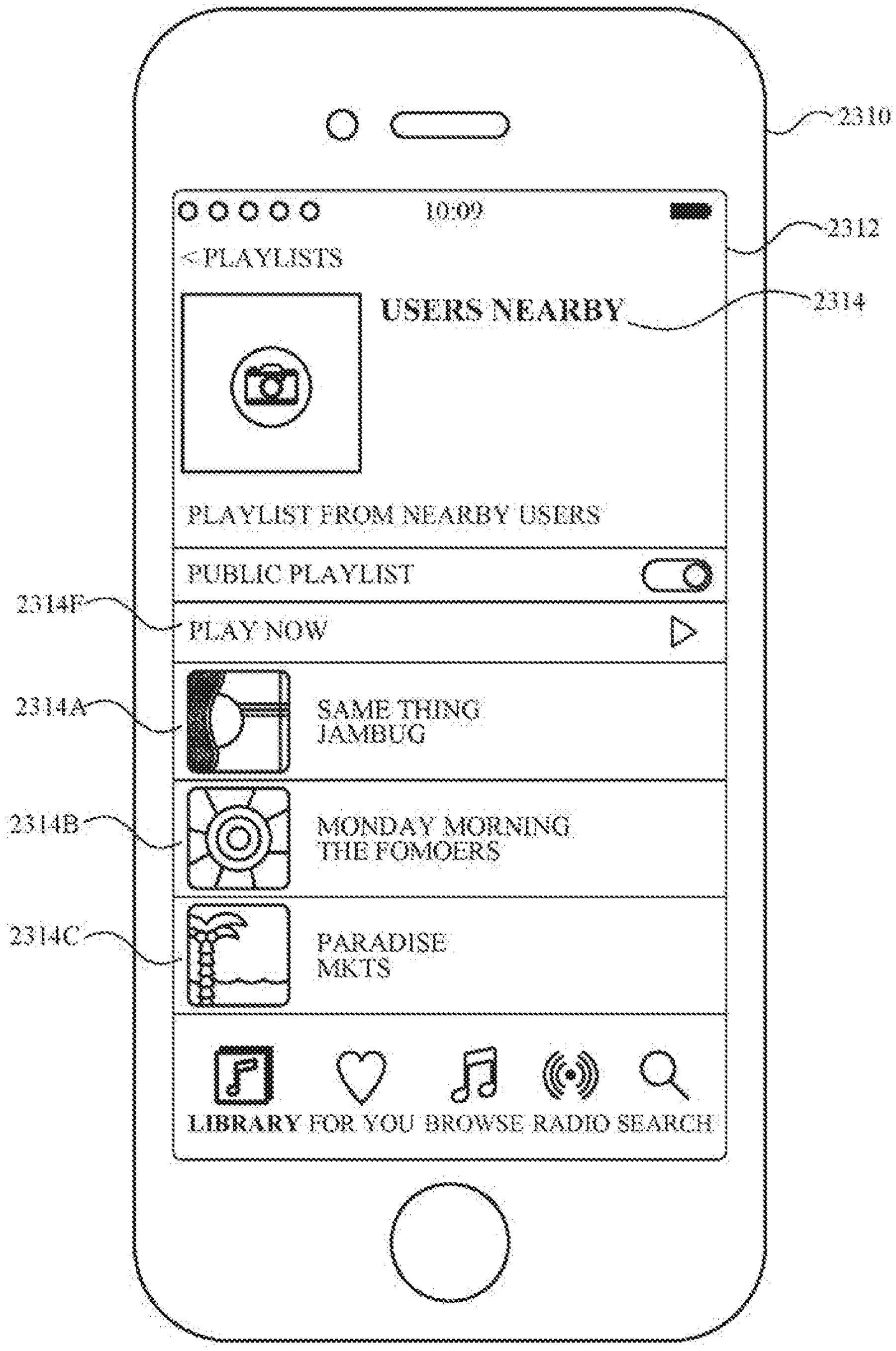
Figure 24A:
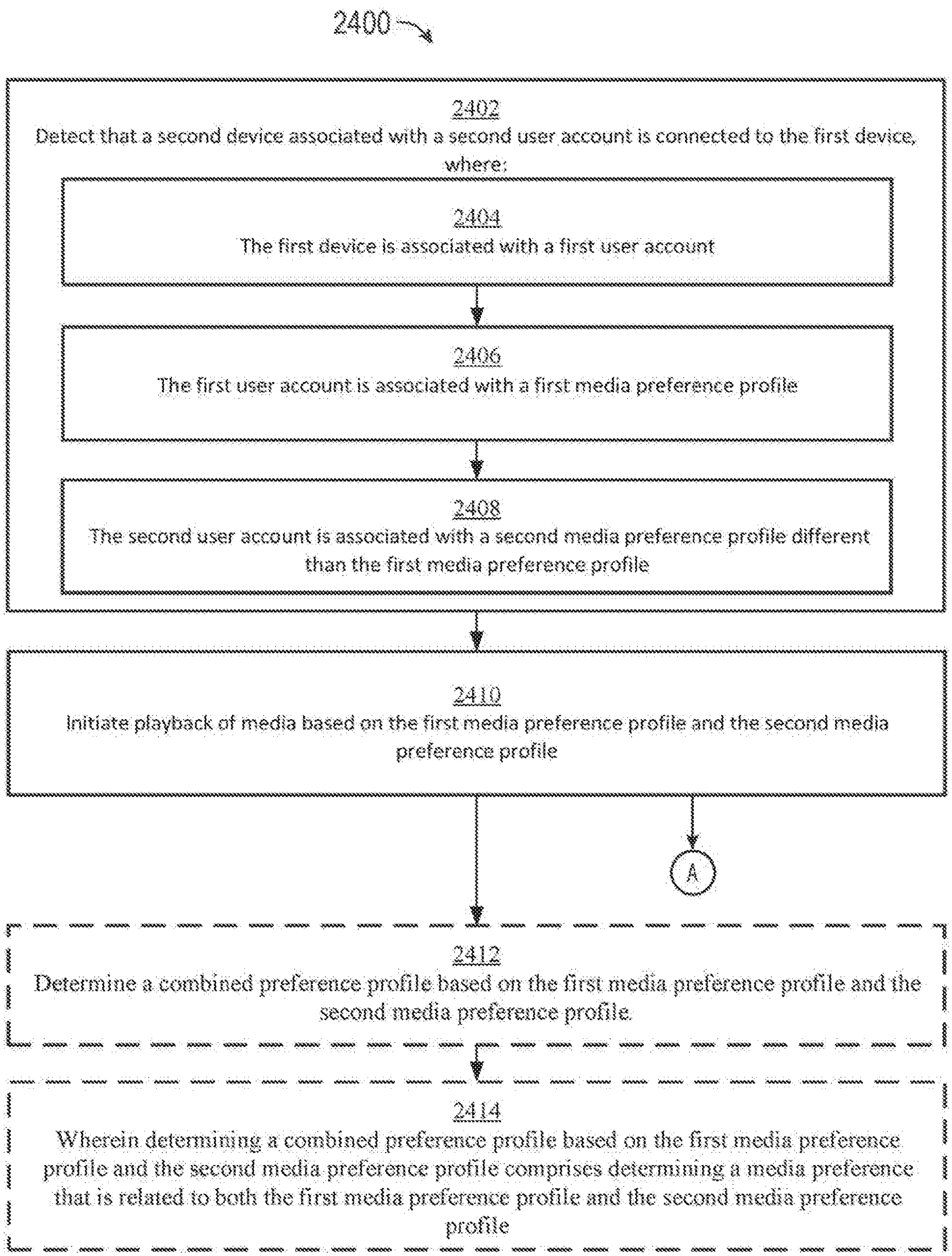
FIGS. 24A-24B is a flow diagram illustrating a process for managing a playback queue in accordance with some embodiments.
Figure 24B:
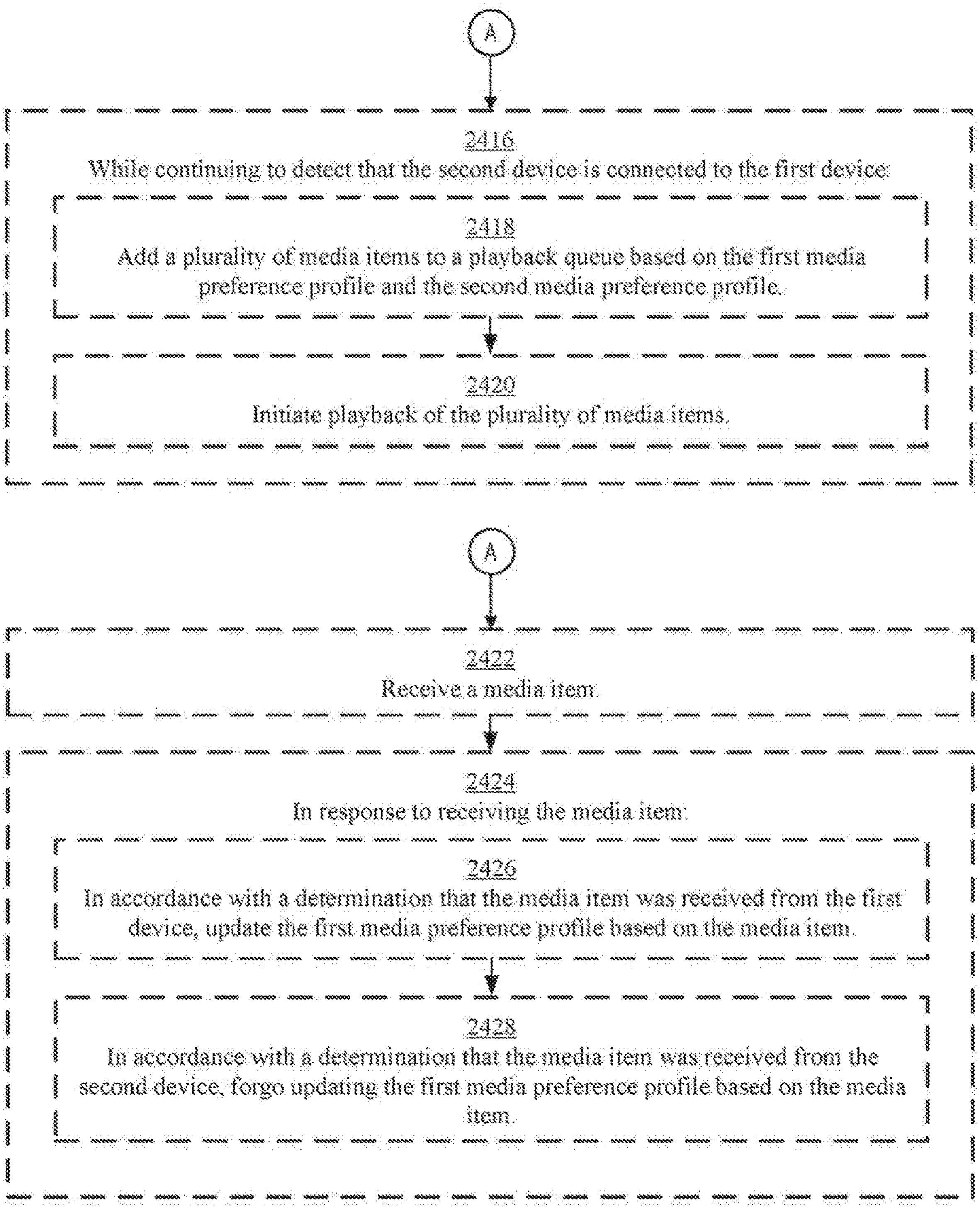

FIG. 23B illustrates an exemplary playback queue interface. In this example, playlist interface 2312 represents the playlist named "Users Nearby" and includes media items 2314A-2314C. In some embodiments, a device (e.g., 2300) automatically generates (e.g., creates or populates with media items) a media playback queue based on the taste profiles of connected devices. For example, device 2300 creates (or otherwise populate with media items) the playlist "Users Nearby" based on taste profiles associated with devices (e.g., or users associated with those devices) connected to device 2300. Thus, as shown in FIG. 23B, the playlist 2312 (displayed by device 2310) is created and the media items 2314A-2314C are added to the playlist automatically in response to detecting that a single device is connected (e.g., device 2310) to device 2300 (e.g., on the same Wi-Fi network, via Bluetooth, or the like). In some embodiments, a device (e.g., 2300) automatically generates a media playback queue (e.g., the playlist named "Users Nearby" (displayed by device 2310) depicted in FIG. 23B) in response to detecting that the device (e.g., 2300) is connected to one or more other devices (e.g., 2302 or 2310).

Figure 23C:
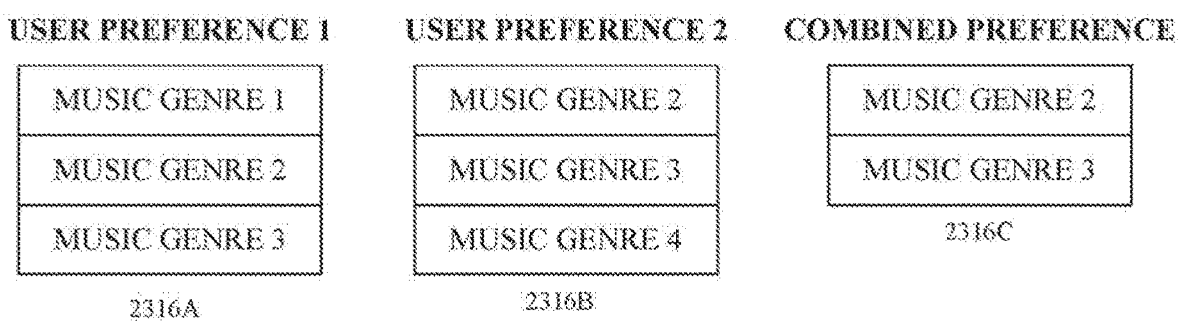
Figure 23D:
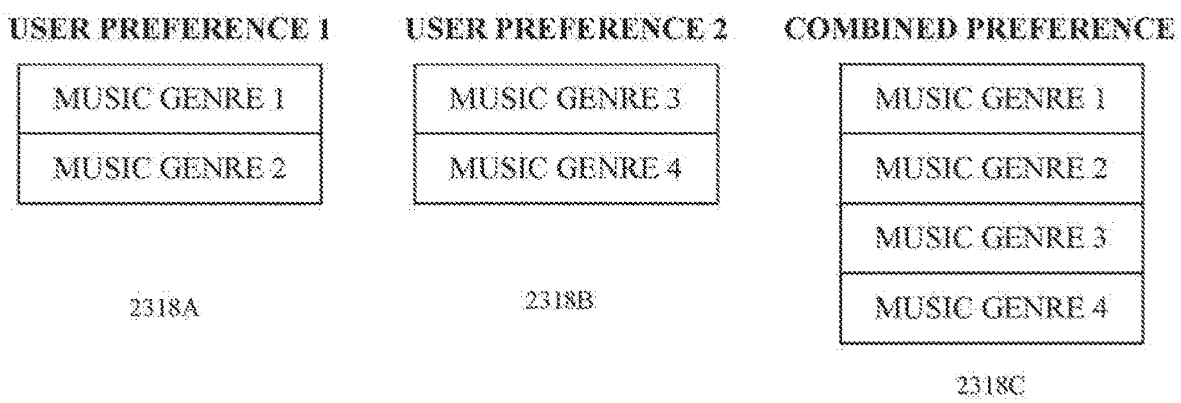

FIGS. 23C-23D illustrate depictions of exemplary taste profiles of two users, and two exemplary combined taste profiles. In some embodiments, a device (e.g., 2300) generates a playback queue based on one or more taste profiles. In some embodiments, a device (e.g., 2300) generates a playback queue based on a combined taste profile.

FIG. 23C illustrates taste profile 2316A (of a first user) and taste profile 2316B (of a second user). Taste profile 2316A includes the media preferences: Music Genre 1, Music Genre 2, and Music Genre 3. Taste profile 2316B includes the media preferences: Music Genre 2, Music Genre 3, and Music Genre 4. Thus, taste profiles 2316A and 2316B have some overlap in media preference. In some embodiments, a device (e.g., 2300) generates a combined taste profile based on an overlap of media preferences. For example, device 2300 generates combined taste profile 2316C, which includes the media preferences that are common to both taste profile 2316A and 2316B, namely the media preferences: Music Genre 2 and Music Genre 3. Thus, generating a playback queue using the combined taste profile 2316C will result in a playback queue that includes media items that the users associated with the taste profiles 2316A and 2316B are both likely to enjoy.

FIG. 23D illustrates taste profile 2318A (of a first user) and taste profile 2318B (of a second user). Taste profile 2318A includes the media preferences: Music Genre 1 and Music Genre 2. Taste profile 2318B includes the media preferences: Music Genre 3 and Music Genre 4. Thus, taste profiles 2318A and 2318B do not have overlap in media preference. In some embodiments, a device (e.g., 2300) generates a combined taste profile based on one or more media preferences for each taste profile associated with a detected. For example, device 2300 generates combined taste profile 2318C, which includes at least one media preference from each of taste profile 2318A and 2318B, namely the media preferences: Music Genre 1, Music Genre 2, Music Genre 3, and Music Genre 4. Thus, generating a playback queue using the combined taste profile 2318C will result in a playback queue includes media items that at least one user associated with the profiles 2318A and 2318B is likely to enjoy.

Figure 23E:
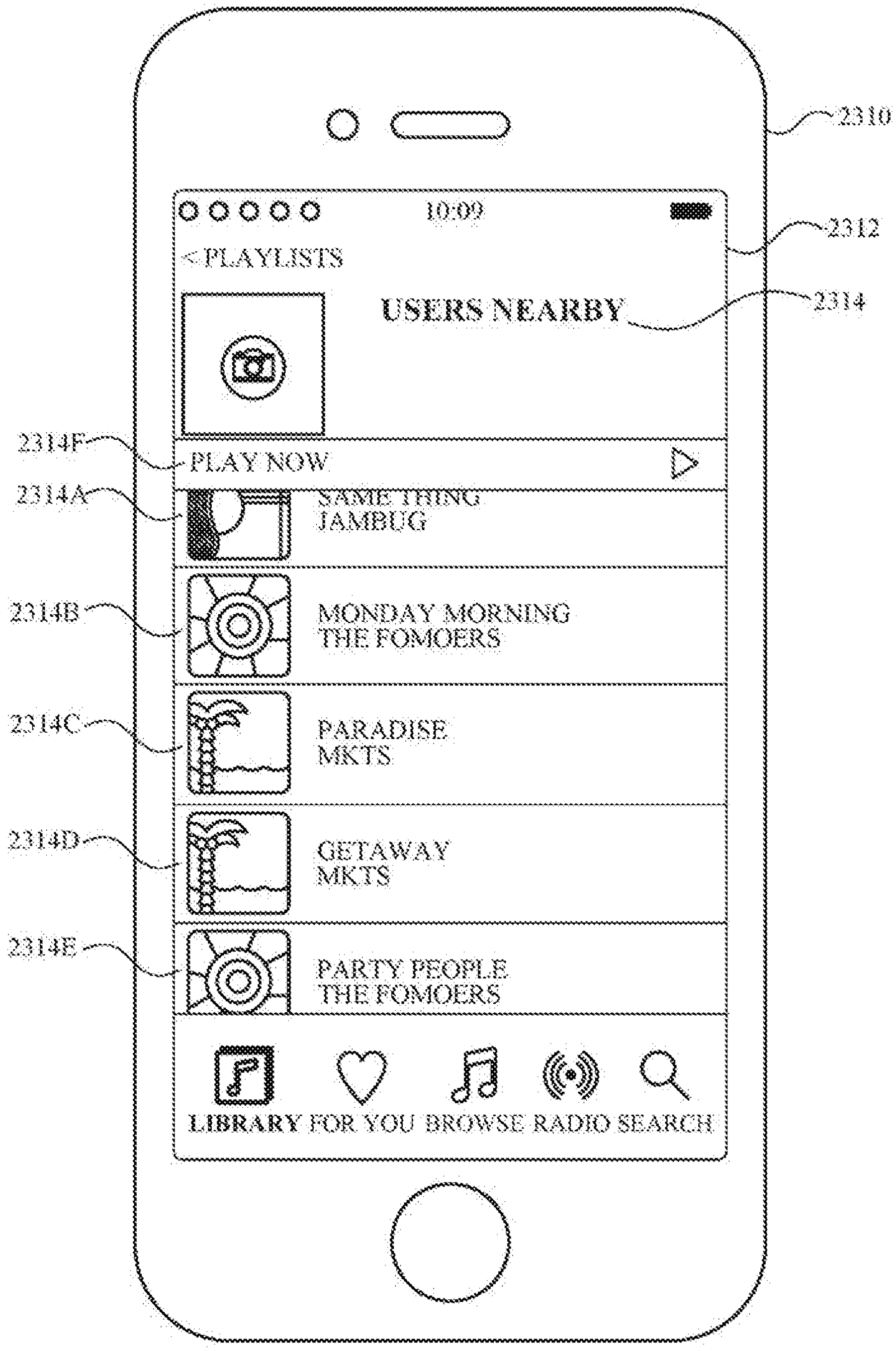

In some embodiments, a device (e.g., 2300) populates (e.g., adds media items to) an existing media playback queue in response to detecting a device associated with a taste profile. Thus, in some examples, device 2300 dynamically updates a queue based user taste profiles as more users are detected. FIG. 23E illustrates playlist 2312 (displayed by device 2310), but it has been updated to include media items 2314D and 2314E. For example, device 2300 added media items 2314D and 2314E in response to detecting connection to device 2302. In this example, device 2300 updated the combined taste profile (e.g., used to populate playlist 2312) based on the taste profile associated with device 2302.

In some embodiments, a device (e.g., 2300) removes media items from a playback queue in response to no longer detecting a device associated with a taste profile. For example, device 2300 updates a queue to cater to the users that remain connected. For instance, in response to device 2302 no longer being detected by device 2300, device 2300 can remove media items 2314D and 2314E from playlist 2312. Thus, media playback can be tailored to users who remain present in a location (e.g., connected to device 2300) even as users come and go, without requiring excessive user inputs to do so.

In some embodiments, a device (e.g., 2300) creates a playback queue based on a plurality of taste profiles in response to user input. FIGS. 23F-23K illustrate exemplary interfaces for doing so.

Figure 23F:
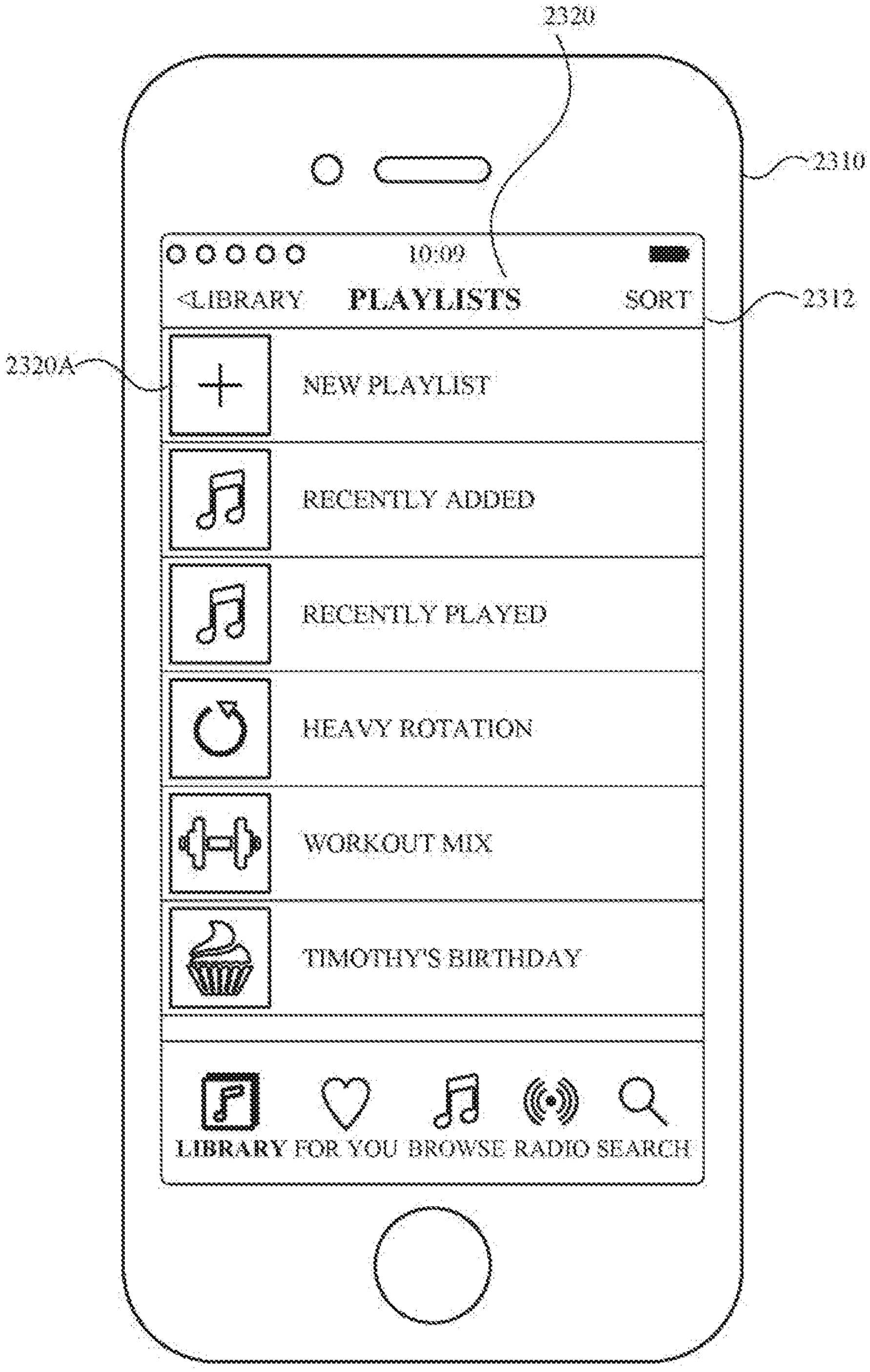
Figure 23G:
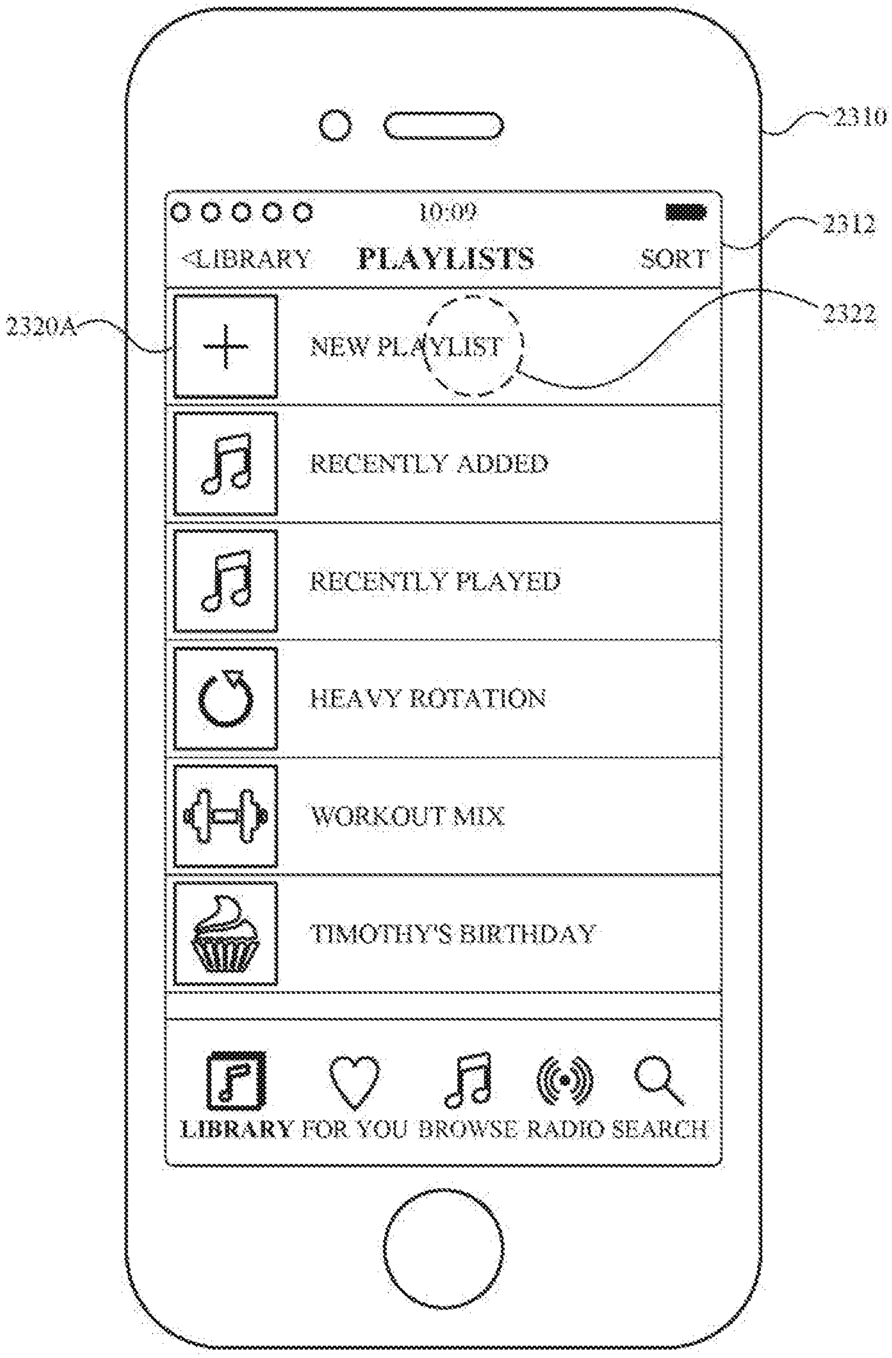

FIG. 23F illustrates an exemplary playlist selection interface 2320, that includes a playlist creation affordance 2320A. At FIG. 23G, device 2310 receives user input 2322 representing selection of affordance 2320A.

Figure 23H:
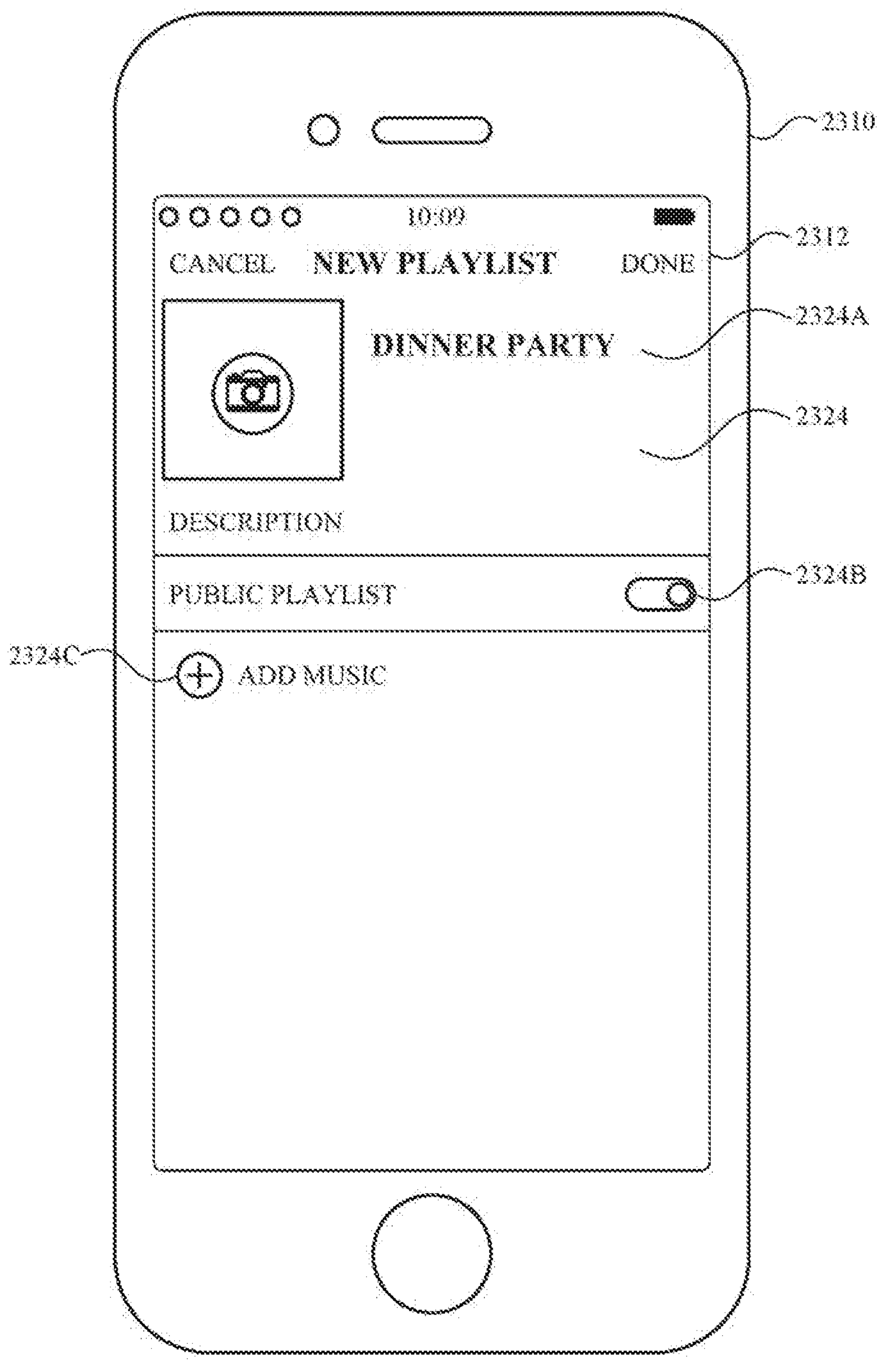
Figure 23I:
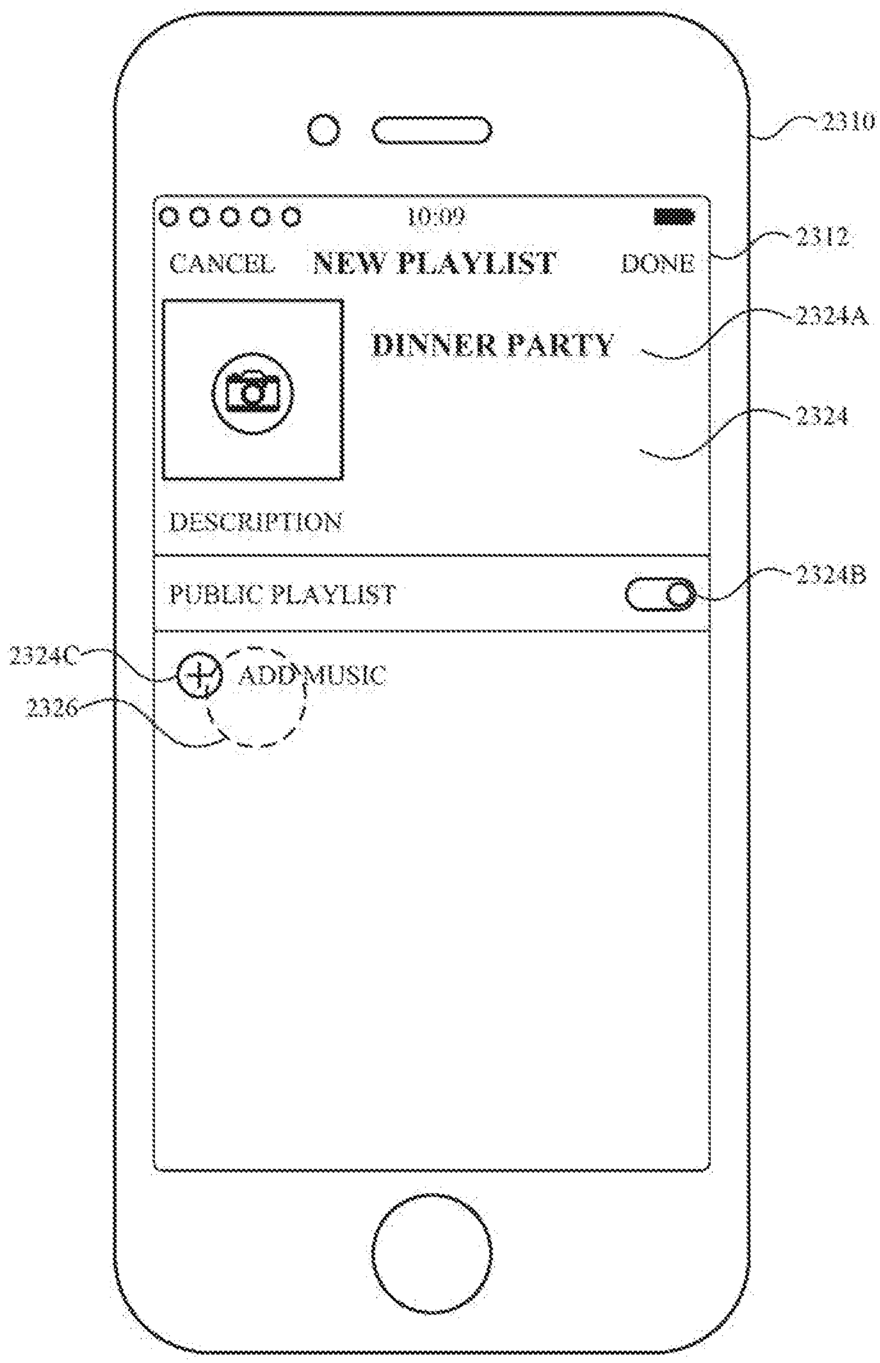

In response to user input 2320A, device 2310 displays playlist creation interface 2324 (FIG. 23H). Playlist creation interface 2324 includes a title 2324A ("Dinner Party"), an affordance 2324B for making the playlist public (e.g., make it a shared playlist that can be viewable by other users, editable by other users, or the like), and an affordance 2324C for adding music to the playlist. At FIG. 23I, device 2310 receives user input 2326 representing selection of affordance 2324C.

Figure 23J:
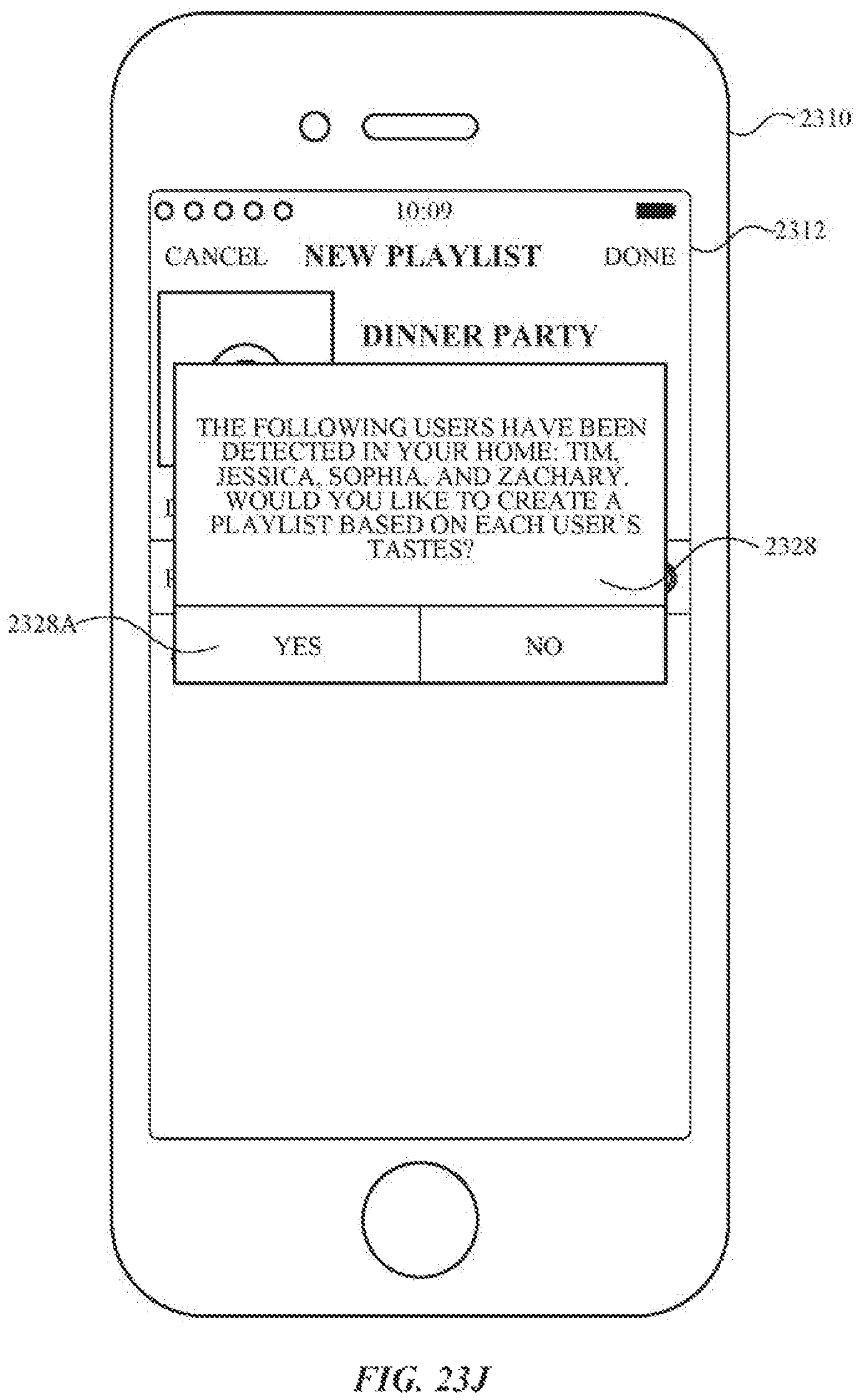

In some embodiments, a device (e.g., 2310) displays a prompt to create a queue based on a plurality of taste profiles of detected devices in response to receiving user input (e.g., 2326). As shown in FIG. 23J, in response to receiving user input 2326, device 2310 displays message 2328, which reads: "The following users have been detected in your home: Tim, Jessica, Sophia, and Zachary. Would you like to create a playlist based on each user's tastes?" In response to selection of affordance 2328A, device 2310 generates a playback queue (e.g., such as illustrated in FIG. 23E) based on the plurality of taste profiles associated with the detected devices (e.g., corresponding to the users named Tim, Jessica, Sophia, and Zachary). Thus, as shown in the example in FIGS. 23H-23J, device 2310 determines that a user is attempting to make a playlist and displays a prompt to create a queue based on the taste profiles of detected users.

Figure 23K:
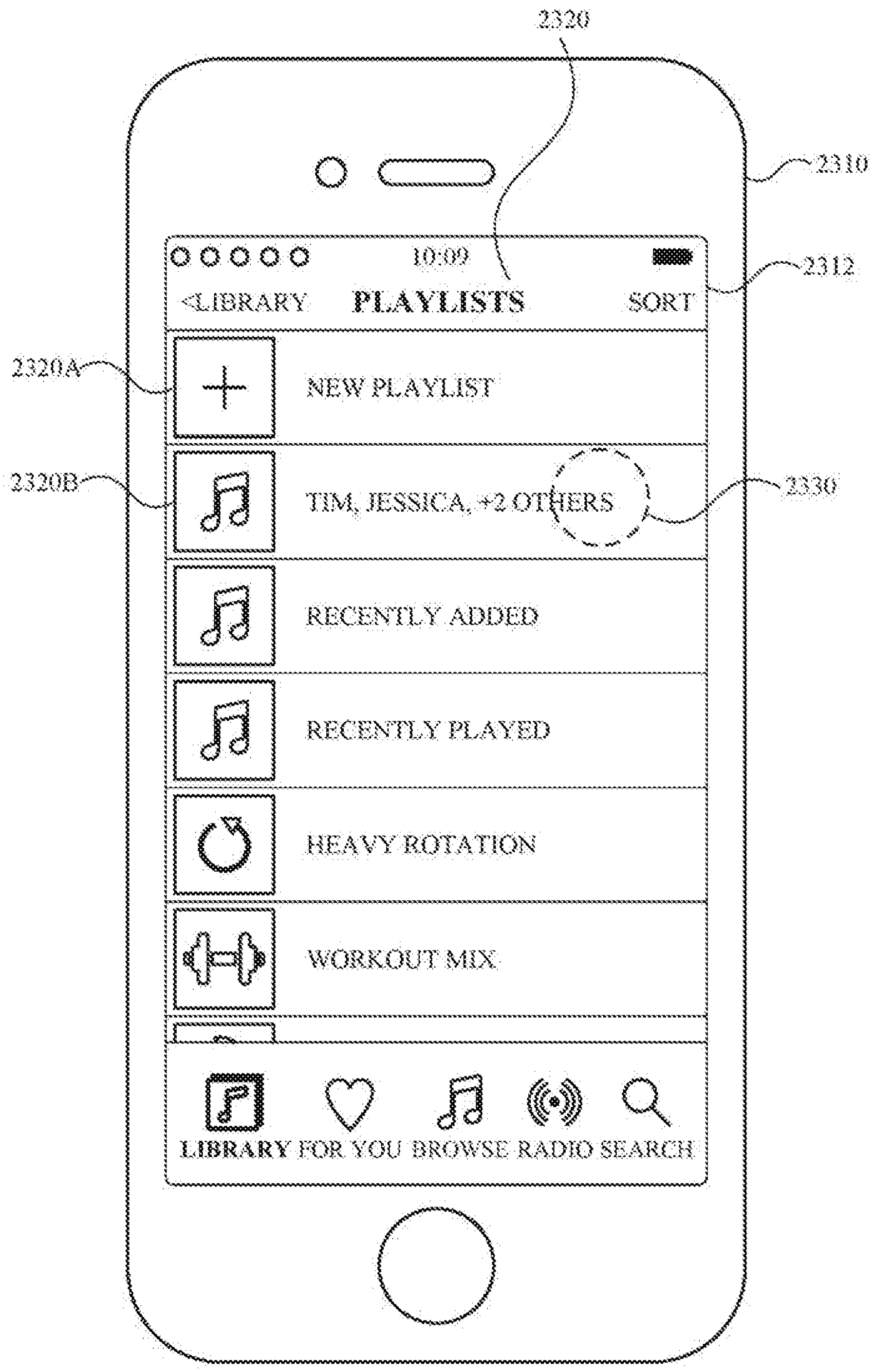

As described above, a device can automatically generate a playback queue based on a plurality of taste profiles. In some embodiments, a device (e.g., 2300, 2310) generates the queue based on a plurality of taste profile in response to user input activating (e.g., opening) a media application. For example, FIG. 23K illustrates playlist selection interface 2320 (similar to FIG. 23F), but it has been updated to include an affordance 2320B representing a playlist that was automatically generated based on the taste profiles of detected users (e.g. Tim, Jessica, and 2 others). Thus, when a user opens a music application to browse playlists, a playlist based on a combined taste profile of detected users can already exist (e.g., and be displayed), reducing the number of inputs required to create and/or access such a queue.

FIGS. 24A-24B is a flow diagram illustrating a method for maintaining a queue based on multiple user taste profiles using an electronic device in accordance with some embodiments. Method 2400 is performed at a device (e.g., 100, 300, 500, 580). Some operations in method 2400 are, optionally, combined, the order of some operations are, optionally, changed, and some operations are, optionally, omitted.

As described below, method 2400 provides an intuitive way for maintaining a queue based on multiple user taste profiles. The method reduces the cognitive burden on a user for maintaining a queue based on multiple user taste profiles, thereby creating a more efficient human-machine interface. For battery-operated computing devices, enabling a user to maintain a queue based on multiple user taste profiles faster and more efficiently conserves power and increases the time between battery charges.

The electronic device (e.g., 2300 or 2302), which is a first device, detects (2402) that a second device (e.g., 2310) associated with a second user account (e.g., an iCloud account) is connected to the first device (e.g., 2300 or 2302). For example, the second device is connected to the same Wi-Fi network, within Bluetooth range of the first device, or the like. The first device is associated (2404) with a first user account (e.g., an iCloud account). The first user account is associated (2406) with a first media preference profile (e.g., 2316A or 2318A). In some embodiments, a media preference profile includes data representing media items or information for identifying media items that represents the preferences of the owner of the first user account. In some embodiments, a preference profile includes one or more media items. For example, the profile includes identifiers for media (e.g., songs, videos) that the first user account has saved, liked, listened to (e.g., a plurality of times), or otherwise indicates that the owner of the first user account likes a media item. In some embodiments, the preference profile includes generalized information for identifying media items. For example, generalized information can include a genre (e.g., type of music), an artist, an album (e.g., comprised of a plurality of media items). Such generalized information can be used to identify media items by matching, for example, metadata associated with media items to the generalized information. The second user account is associated (2408) with a second media preference profile (e.g., 2316B or 2318B) different than the first media preference profile.

The first device (e.g., 2300 or 2302) initiates (2410) playback of media based on the first media preference profile and the second media preference profile.

Initiating playback of media based on first and second media profiles associated with first and second devices that are connected provides users with an improved media playback feature for creating playback queues according to the tastes of multiple users whose devices are connected while reducing redundant user inputs at each device. Providing improved media playback features to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first device (e.g., 2300 or 2302) determines (2412) a combined preference profile (e.g., 2316C or 2318C) based on the first media preference profile (e.g., 2316A or 2318A) and the second media preference profile (e.g., 2316B or 2318B).

In some embodiments, determining a combined preference profile based on the first media preference profile and the second media preference profile comprises: determining (2414) a media preference that is related to both the first media preference profile and the second media preference profile. In some embodiments, a media preference includes one or more of a genre of media (e.g., music), an artist, a media item (e.g., a song), or the like. In some embodiments, a media preference that is related to both is a media preference that is common to both profiles (e.g., 2316C). In some embodiments, a media preference that is related to both is a media preference that is a subset or superset of both profiles. For example, rock and roll music is a superset of rock and roll music from the year 1987.

In some embodiments, while continuing to detect that the second device (e.g., 2310) is connected to the first device (2416): the first device (e.g., 2300 or 2302) adds (2418) a plurality of media items (e.g., 2314D and 2314E of FIG. 23E) to a playback queue (e.g., the playlist "Users Nearby" shown in FIG. 23E) based on the first media preference profile (e.g., 2316A or 2318A) and the second media preference profile (e.g., 2316B or 2318B). In some embodiments, the first device (e.g., 2300 or 2302) initiates (2420) playback of the plurality of media items.

In some embodiments, the first device (e.g., 2300 or 2302) receives a request (e.g., selection of affordance 2314F) to initiate playback on the first device, and in response to receiving the request, initiates the playback of media based on the first media preference profile and the second media preference profile.

In some embodiments, the request (e.g., selection of 2314F) is received from the second device (e.g., 2310). For example, a guest device (e.g., not associated with the device or the home set of devices) initiates playback of a playback queue that includes a media items pertaining to a blended taste profile.

In some embodiments, the first device includes a display (e.g., 2302), and wherein the method further comprises: displaying, on the display, an affordance (e.g., a "play now" affordance (e.g., 2314F), a media item in a playlist (e.g., 2314D), a "shuffle all" affordance, or the like), and wherein receiving the request to initiate playback on the first device comprises receiving user input selection of the affordance (e.g., 2314F). In response to receiving user input selection of the affordance, the first device (e.g., 2300 or 2302) initiates the playback of media based on the first media preference profile and the second media preference profile.

In some embodiments, initiating playback of media based on the first media preference profile and the second media preference profile comprises: transmitting an instruction to a third device (e.g., 2300) to initiate playback.

In some embodiments, the first device (e.g., 2300 or 2302) receives (2422) a media item (e.g., an identifier of a media item, a link to the media item, or a copy of the media item). In response to receiving the media item (2424): in accordance with a determination that the media item was received from the first device, the first device (e.g., 2300 or 2302) updates (2426) the first media preference profile based on the media item (e.g., 2316A or 2318A); and in accordance with a determination that the media item was received from the second device (e.g., 2310), the first device (e.g., 2300 or 2302) forgoes updating (2428) the first media preference profile based on the media item. For example, if the media item was added to a blended taste profile queue by a device not associated with a user account of the device managing or storing the queue (e.g., the owner's device), the owner's taste profile is not updated based on the addition of that media item to the queue.

Note that details of the processes described above with respect to method 2400 (e.g., FIGS. 24A-24B) are also applicable in an analogous manner to the methods described below/above. For example, method 700, 900, 1100, 1300, 1500, 1700, 1800, 2000, 2200, 2600, 2800, 3000, 3200, 3400, 3600, 3800, and 3900 optionally includes one or more of the characteristics of the various methods described above with reference to method 2400. For brevity, these details are not repeated below.

FIGS. 25A-25I illustrate exemplary user interfaces for allowing guest playback on a set of devices, in accordance with some embodiments. The user interfaces in these figures are used to illustrate the processes described below, including the processes in FIGS. 26A-26B.

Figure 25A:
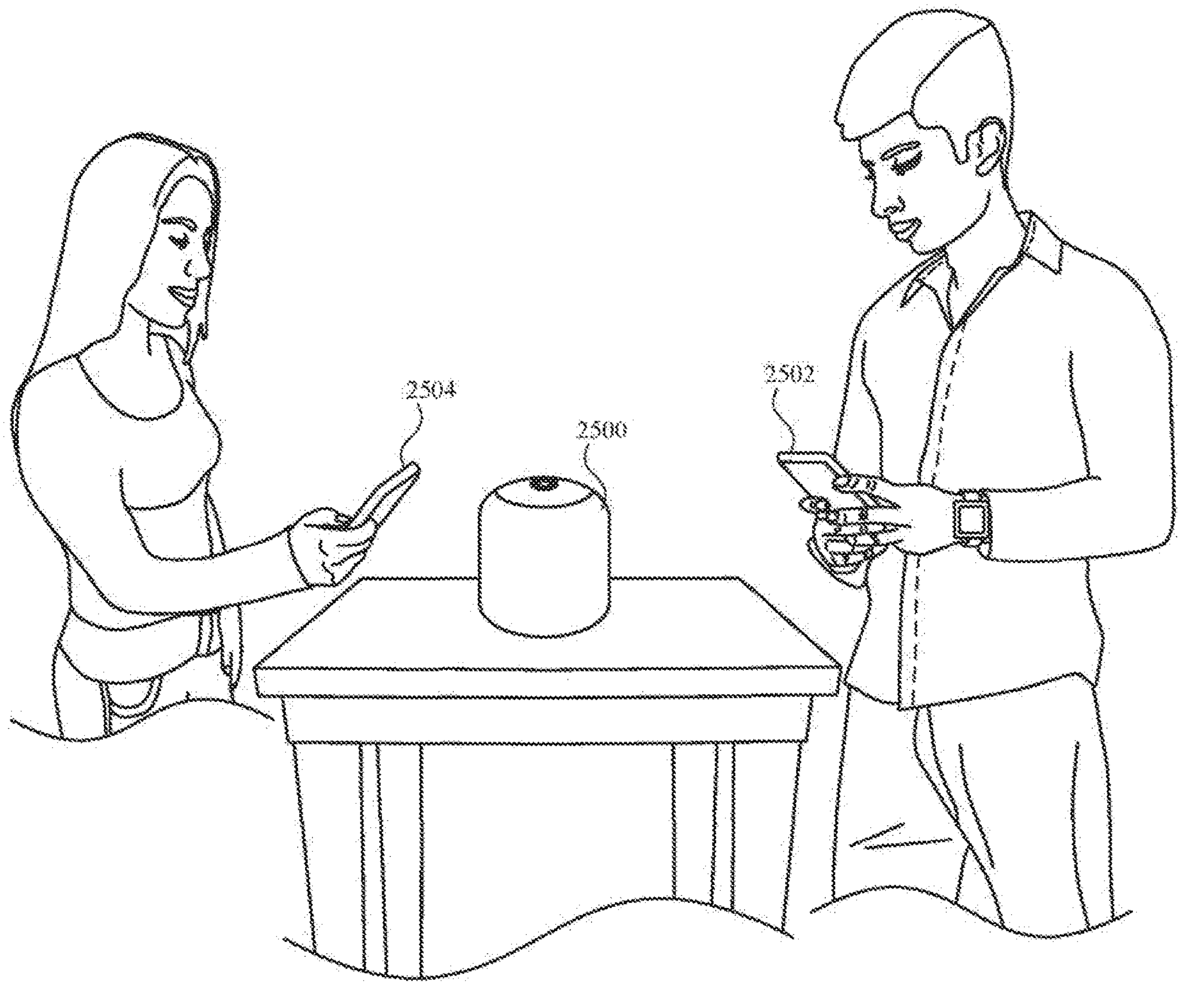
FIGS. 25A-25I illustrate exemplary techniques and user interfaces for playing back media in accordance with some embodiments.

FIG. 25A illustrates an exemplary scenario in which a plurality of devices are connected. Specifically, device 2500 is a smart speaker that is connected to both devices 2502 and 2504 (e.g., personal devices). In some embodiments, device 2500 includes one or more features of devices 100, 300, 500, or 580. In some embodiments, devices 2502 and 2504 include one or more features of devices 100, 300, 500, or 580. In this example, the user (also referred to as a first user) of device 2504 is associated with a user account that is associated with device 2500 (e.g., both device 2504 and 2500 are members of a home set of devices, as described above with respect to FIG. 6A). Further, in this example, the user of device 2502 is not associated with device 2500 (e.g., is a guest of (e.g., not a member of) the home that includes the home set of devices). The user (also referred to as a second user) of device 2502 may desire access to device 2500, for example, to initiate playback therefrom. FIGS. 25B-25I illustrate exemplary interfaces for requesting and granting access, in accordance with some embodiments.

Figure 25B:
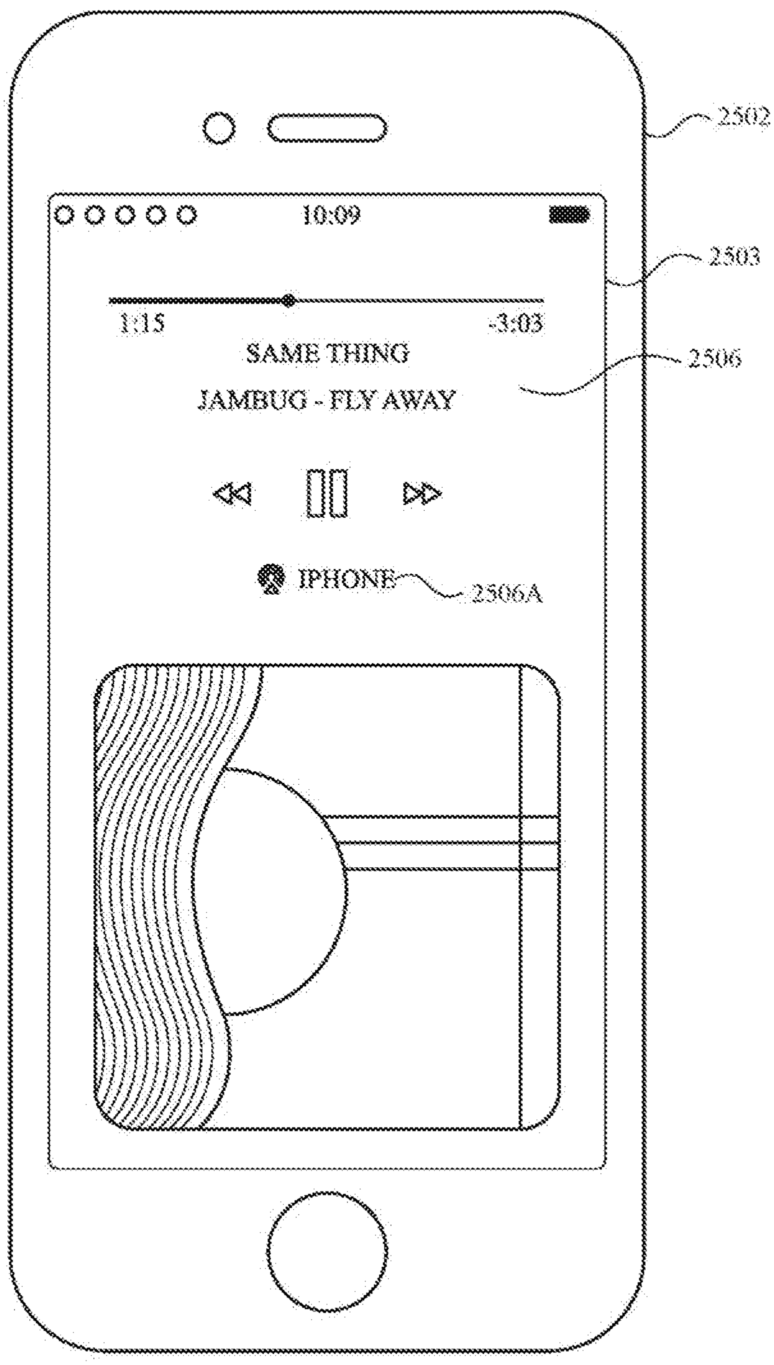
Figure 25C:
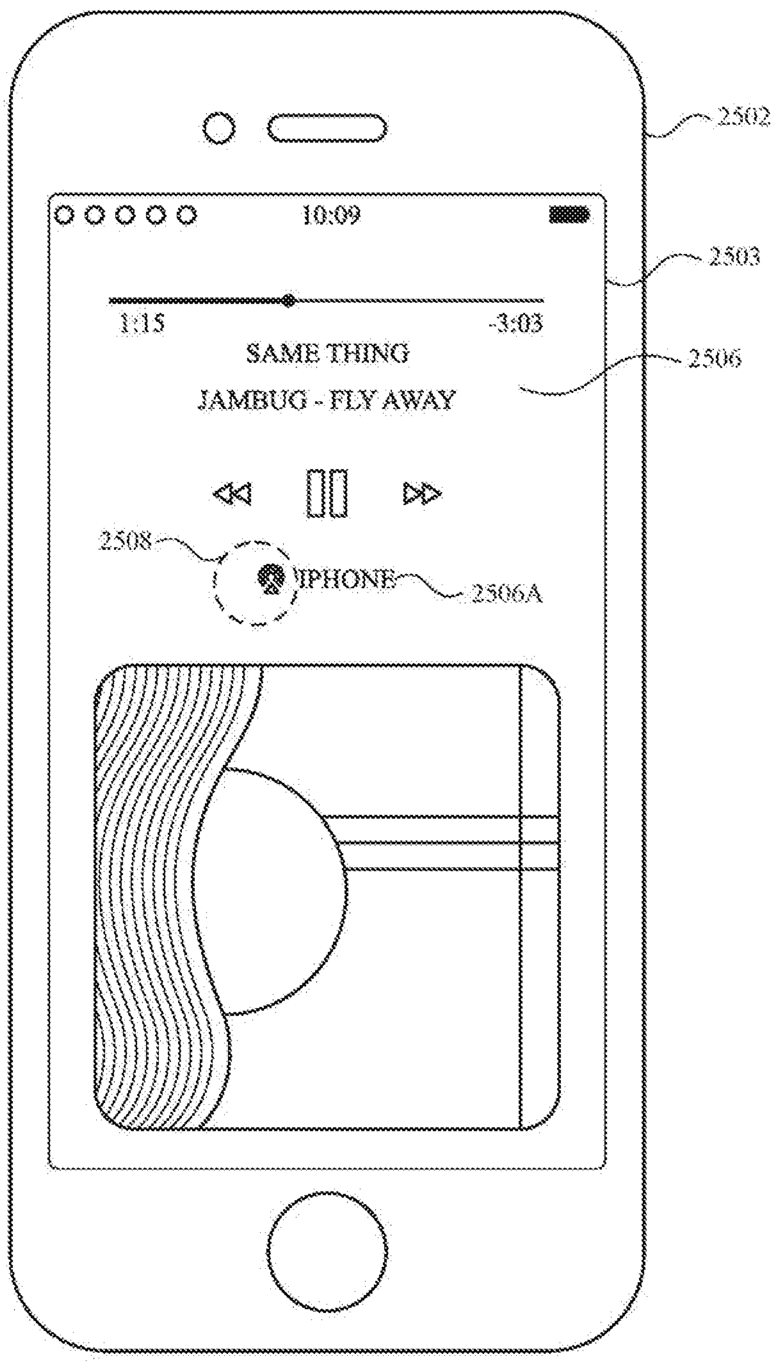
Figure 26A:
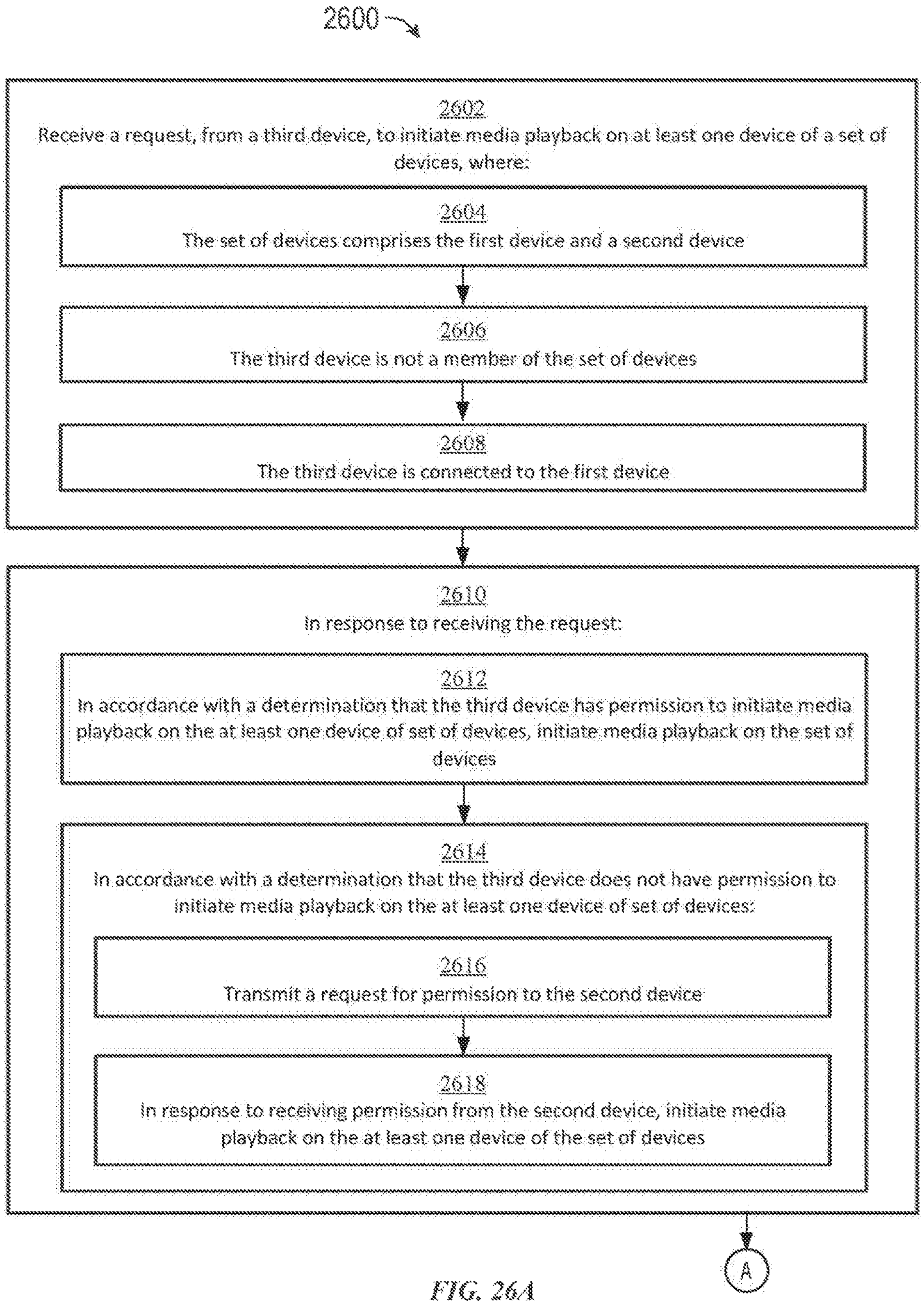

FIG. 25B illustrates an exemplary current media interface. As shown, device 2502 (e.g., the guest device) displays current media interface 2506 on display 2503. As shown, device 2502 is currently playing back a media item ("Same Thing") on itself (e.g., as indicated by device selection affordance 2506A, which identifies device 2502, named "iPhone"). At FIG. 25C, device 2502 receives user input 2508 representing selection of device selection affordance 2506A.

Figure 25D:
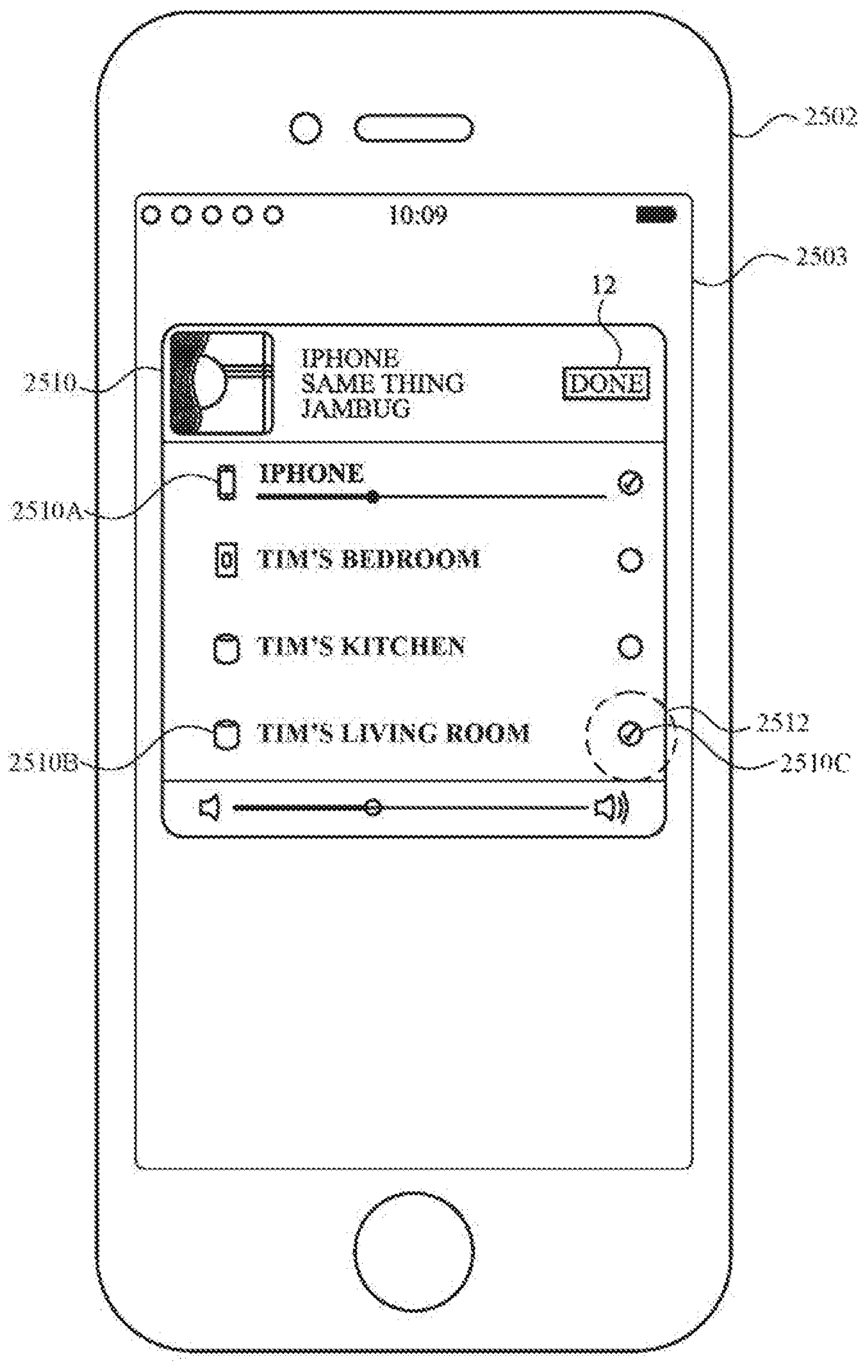
Figure 25E:
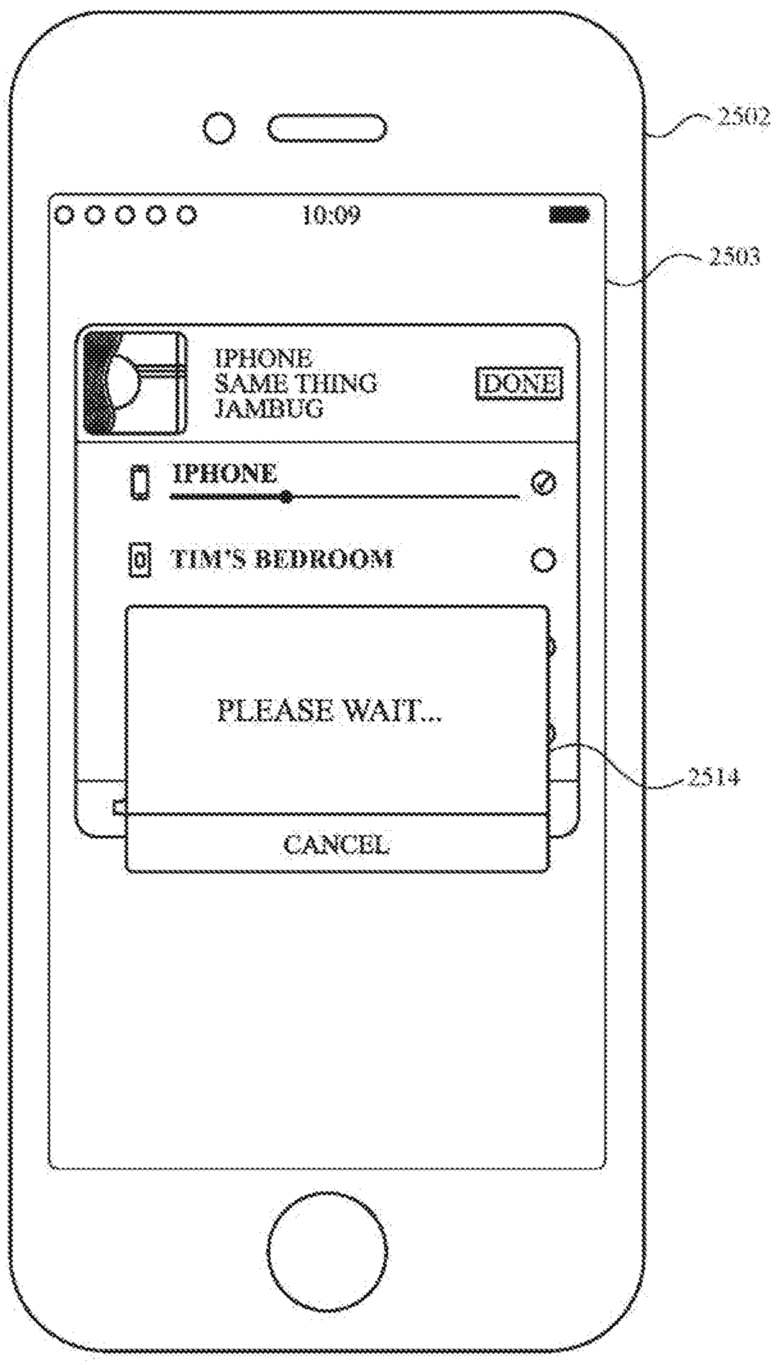

In response to user input 2508, device 2502 displays exemplary multi-device interface 2510 (FIG. 25D). In some embodiments, multi-device interface 2510 is a multi-device interface such as multi-device interface 610 of FIGS. 6H-6N and multi-device interface 810 of FIGS. 8C-8P, discussed above. In this example, the devices listed in interface 2510 (except 2510A, "iPhone", which represents device 2502) are devices associated with the first user (e.g., associated with device 2504 and device 2500) that are members of the home set of devices. At FIG. 25D, device 2502 receives user input 2512 representing selection of indicator 2510C, which is associated with indicator 2510B, representing the device named "Living Room" (e.g., device 2500). In some embodiments, device 2502 transmits a request to initiate playback on the selected set of devices (e.g., transmits a request to 2500).

In response to receiving selection of the device named "Tim's Living Room" (e.g., user input 2512), device 2502 displays message 2514 (FIG. 25E), which prompts the user to "Please wait". In some examples, message 2514 is displayed while permission for device 2502 is being requested (e.g., at another device). For example, subsequent to transmitting a request to initiate playback to device 2500 (e.g., and while device 2502 is awaiting confirmation that playback has been initiated or permission has not been granted), device 2502 displays message 2514. In some embodiments, the ability of device 2502 to initiate playback on a device with which it is not associated (e.g., device 2502 is not associated with same user account, or is not a member of a common set of devices (e.g., home set devices) with device 2500) is subject to permission from another device associated with device 2500. In some embodiments, the requesting device (e.g., 2502) transmits a request for permission to a device (e.g., device 2500 or device 2504) of the set of devices associated with (e.g., that includes) device 2500. For example, in response to a user input request to initiate playback on a device of a home set of devices, device 2502 transmits a request for permission to one or more devices in the home set of devices (e.g., device 2500, or another device in the set of devices). In some embodiments, the request is transmitted by the requesting device (e.g., 2500) to another device (e.g., with a display) of the set of devices (e.g., device 2504). For example, device 2500 receives the playback request from device 2502 and, in response, transmits the request for permission (e.g., for device 2502) to device 2504.

Figure 25F:
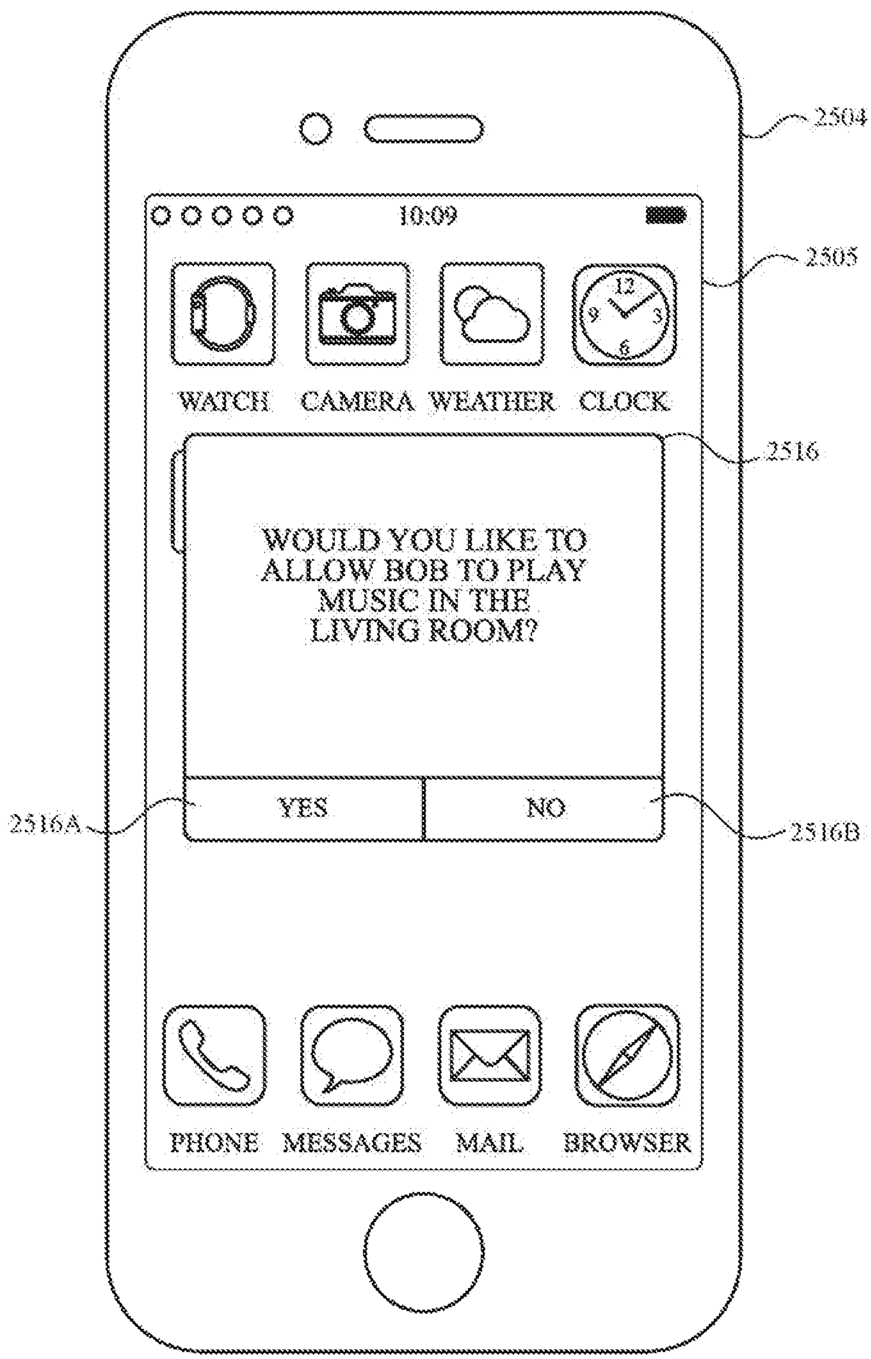
Figure 25G:
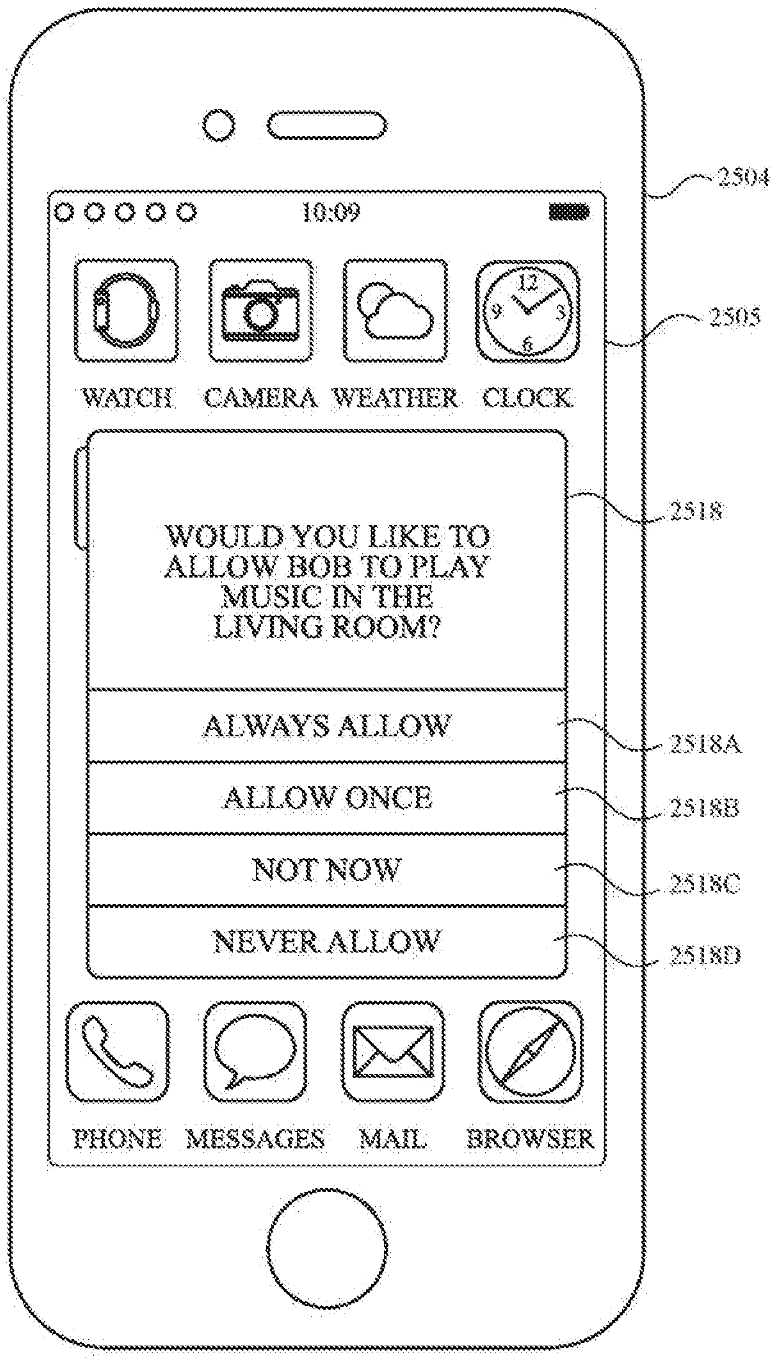

FIGS. 25F-25G illustrate exemplary permission request interfaces. In some embodiments, a permission request interface (e.g., 2516 or 2518) is displayed on a device (e.g., by device 2504) of the set of devices (e.g., 2500 and 2504) in response to a request to initiate playback on a device (e.g., 2500) of the set of devices by a device (e.g., 2502) that is not included in the set of devices.

At FIG. 25F, device 2504 (e.g., which is included in the home set of devices) displays permission request interface 2516, which includes affordances for granting permission (2516A) and denying permission (2516B). For example, user input associated with 2516A will grant device 2502 permission to initiate media playback of "Same Thing" on device 2500, and user input user input associated with 2516B will deny device 2502 such permission. In some embodiments, a permission request interface includes information about the request to initiate playback on the set of devices. In some embodiments, the information includes one or more of, but is not limited to, an identification of: the device requesting initiation of playback (e.g., 2502), a user (e.g., a user account) associated with the request (e.g., the user of 2502), and an identification of the devices on which playback is requested (e.g., the device 2500 named Living Room). As shown in FIG. 25F, interface 2516 includes the information: "Would you like to allow Bob to play music in the Living Room?", which identifies the user (e.g., named Bob) requesting initiation of playback and the device on which they are requesting it (e.g., named or located in the Living Room).

In some embodiments, a permission interface allows selection of a plurality of different permission levels. In some embodiments, a permission level grants conditional permission. For example, permission request interface 2518 (FIG. 25G) includes a plurality of permission levels (associated with affordances 2518A-2518D) that can be granted by the user of device 2504: "Always Allow" (e.g., always allow the user Bob to initiate playback), "Allow Once" (e.g., allow the current request, but not future requests from Bob), "Not Now" (e.g., deny the current request, but ask permission for future requests from Bob), and "Never Allow" (e.g., deny the currently request and all future requests from Bob).

Figure 25H:
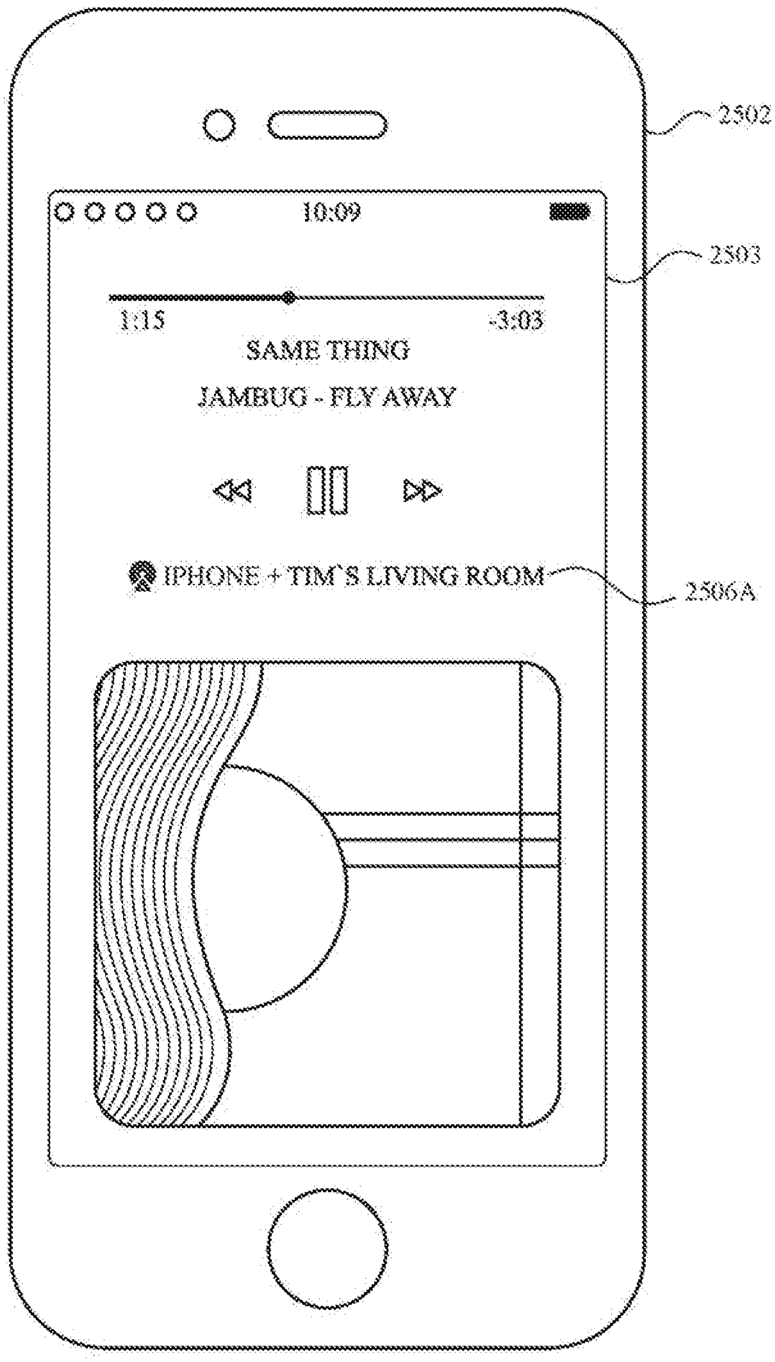
Figure 25I:
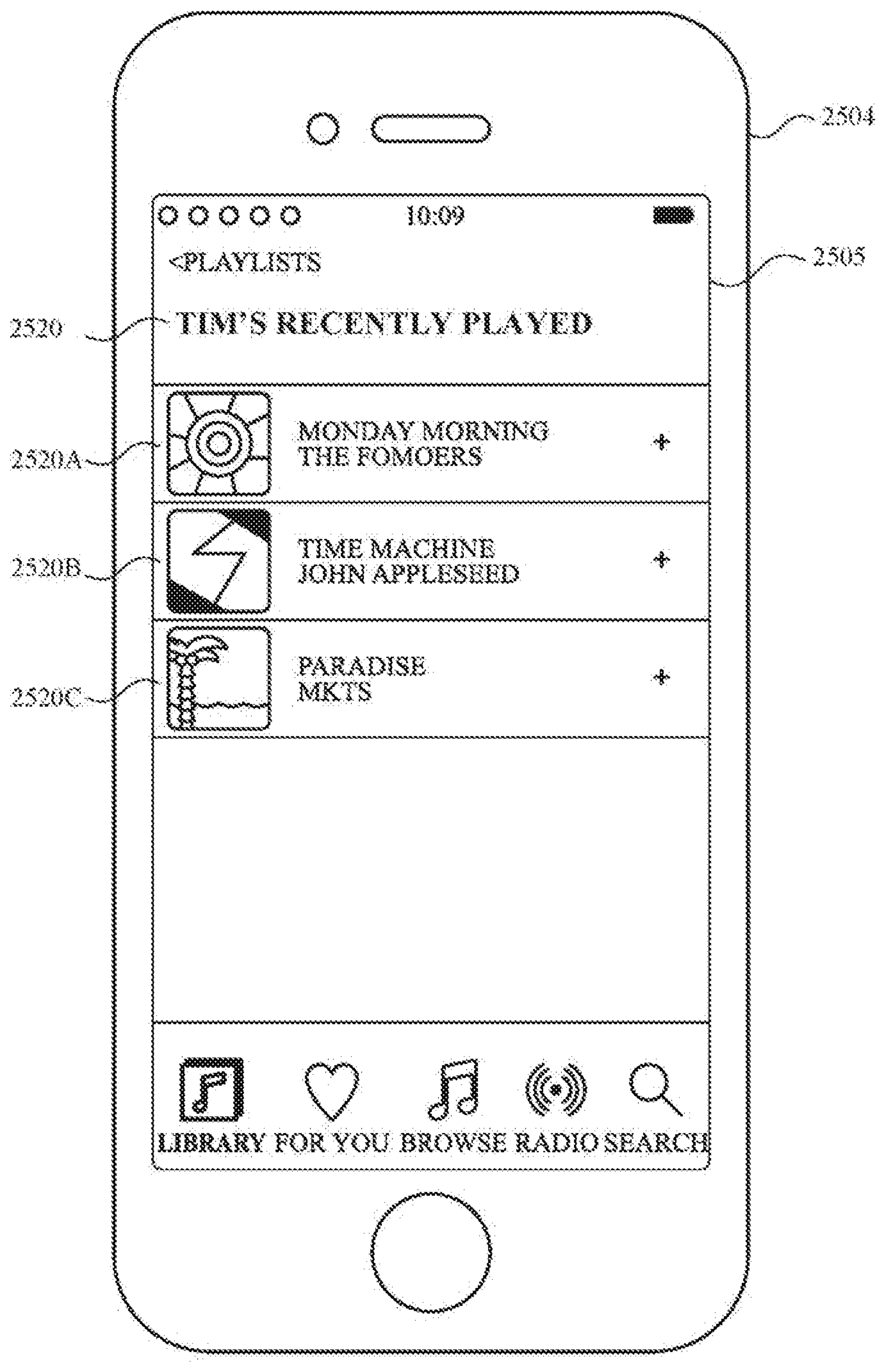

FIG. 25H illustrates an updated current media interface 2506 displayed on device 2502. In some embodiments, the updated current media interface 2506 is displayed in response to device 2502 being granted permission (e.g., user input associated with affordance 2516A at device 2504). As shown, device selection affordance 2506A indicates that playback is occurring on device 2500 and device 2502 (e.g., the devices selected at FIG. 25D). In some embodiments, the current media interface includes an indication of a user associated with the device of the set of devices. For example, as shown in FIG. 25H, device selection affordance 2506A identifies the Living Room device as "Tim's Living Room" (e.g., wherein "Tim" is a user associated with device 2500).

In some embodiments, playback of media by guests (e.g., by device 2502) on a device of the home set of devices does not affect a preference profile and/or playback history of a user associated with the set of devices. For example, FIG.

25I illustrates an exemplary interface 2520 for browsing the recently played media items by the user Tim (e.g., the user of device 2504). In some embodiments, device 2504 displays interface 2520 subsequent to user input granting permission to a device that is not a member of the set of devices (e.g., to device 2502). As shown, the recently played media items 2520A-2520C do not include the media item "Same Thing" that was played back in response to the request by device 2502.

FIGS. 26A-26B is a flow diagram illustrating a method for allowing a guest device to initiate playback using an electronic device in accordance with some embodiments. Method 2600 is performed at a device (e.g., 100, 300, 500, 580). Some operations in method 2600 are, optionally, combined, the order of some operations are, optionally, changed, and some operations are, optionally, omitted.

As described below, method 2600 provides an intuitive way for allowing a guest device to initiate playback. The method reduces the cognitive burden on a user for allowing a guest device to initiate playback, thereby creating a more efficient human-machine interface. For battery-operated computing devices, enabling a user to allowing a guest device to initiate playback faster and more efficiently conserves power and increases the time between battery charges.

The electronic device (e.g., 2500), which is a first device, receives a request (2602), from a third device (e.g., 2502), to initiate media playback on at least one device of a set of devices (e.g., a set that includes devices 2500 and 2504).

In some embodiments, the set of devices comprises (2604) the first device (e.g., 2500) and a second device (e.g., 2504). In some embodiments, the set of devices is a home set of devices (e.g., configured using a home control application as described with respect to FIG. 6A). For example, the set of devices includes one or more devices associated with one or more members of a household. In some embodiments, a member of the household is identified by device (e.g., from which a request originates) and/or by one or more user accounts associated with one or more devices (e.g., the user's devices are each logged into the user's iCloud account). Thus, a household can be defined as devices associated with a set of user accounts. In some embodiments, the set of user accounts comprises a single user account. In some embodiments, the set of user accounts comprises more than one user account.

In some embodiments, the third device is not a (2606) member of the set of devices. For example, the third device belongs to a guest or visitor to the home that includes the set of devices. For example, the third device can be associated with a user account that is not a member of the set of user accounts that comprise the set of users making up the household.), and In some embodiments, the third device (e.g., 2502) is connected to (2608) the first device (e.g., 2500). In some examples, the devices are connected via Wi-Fi, Bluetooth, or the like.

In some embodiments, in response to receiving the request (2610): in accordance with a determination that the third device (e.g., 2502) has permission (e.g., previously granted by member of the home) to initiate media playback on the at least one device (e.g., 2500) of set of devices, the electronic device (e.g., 2500) initiates (2612) media playback on the set of devices (e.g., 2500). In some embodiments, a set of devices includes one or more devices.

In accordance with a determination (2614) that the third device does not have permission to initiate media playback on the at least one device of set of devices: the electronic device (e.g., 2500) transmits (2616) a request for permission (e.g., represented by 2516 of FIG. 25F) to the second device (e.g., 2504). For example, the second device displays a prompt (e.g., as shown in 2516 of FIG. 25F).

Requesting permission, by a first device, from a second device to initiate playback based on a request from a third device in response to the request provides users with the ability to quickly and dynamically request permission for media playback while reducing the number of user inputs required to navigate permissions menus or resend a request to initiate playback after being granted permission. Providing improved media playback permissions features to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving permission from the second device, the electronic device (e.g., 2500) initiates (2618) media playback on the at least one device (e.g., 2500) of the set of devices. In some embodiments, initiating playback includes transmitting an instruction (e.g., to another device in the set of devices) to initiate playback.

In some embodiments, in accordance with a determination that a first user account associated with the third device has permission to initiate media playback on the set of devices, the electronic device (e.g., 2500) determines (2620) that the third device (e.g., 2502) has permission (e.g., device 2502 has permission by virtue being associated with a user (e.g., user account) that has permission), wherein the first user account is not associated with any device of the set of devices (e.g., is an account (e.g., iCloud) of a guest user that is not associated with any device in the home of the home set of devices). In accordance with a determination that the first user account associated with the third device does not have permission to initiate media playback on the set of devices, the electronic device (e.g., 2500) forgoes determining (2622) that the third device has permission. For example, if the user account associated with the third device does not have permission, playback does not initiate in response to a request from the third device.

In some embodiments, further in accordance with a determination that the third device does not have permission, the electronic device (e.g., 2500) transmits (2624) the request for permission to a plurality of devices (e.g., 2504 and another device (e.g., a personal device with a display), both associated with the home owner) that includes the second device (e.g., 2504). For example, the plurality of devices are devices that are associated with the first device. In some embodiments, the first device and the plurality of devices are each associated with one or more user accounts that are not associated with the third device. For example, the plurality of devices can be other devices associated with an owner (e.g., their user account) of the first device (e.g., logged into a common account belonging to the owner, or logged in to accounts associated with a predefined group of users such as a family of the owner), but the third device is associated with a guest (e.g., with the guest's user account) to the owner's home. Thus, the third device is not included in the group of users in the owner's household.

In some embodiments, initiating media playback on the at least one device of the set of devices comprises: initiating playback on the first device (e.g., 2500); and forgoing initiating playback on the second device (e.g., 2504). Thus, in some examples, the device that initiates playback is not the device that granted permission.

In some embodiments, subsequent to receiving permission from the second device (e.g., 2504): the electronic device (e.g., 2500) receives a request, from the third device (e.g., 2502), to initiate playback on a fourth device (e.g., another smart speaker device that is not device 2500), wherein the set of devices comprises the fourth device, and wherein the fourth device is not included in the at least one device of the set of devices (e.g., the original request (by device 2502) to initiate playback on device 2500 did not include a request to initiate playback on the fourth device.). In response to receiving the request to initiate playback on a fourth device, (by device 2502) initiates playback on the fourth device. In some embodiments, initiating playback includes transmitting an instruction (e.g., to another device) to initiate playback. For example, if the guest user subsequently selects additional devices (e.g., at a multi-device interface) in the home owner's home (e.g., after being granted permission to initiate playback on the first device 2500), the permission extends to other devices (e.g., all devices) associated with the home set of devices.

In some embodiments, subsequent to receiving permission from the second device: receiving a request, from the third device, to remove a media item (e.g., as shown in FIGS. 16M-16O) from a playback queue on the at least one device of the set of devices (e.g., 2500). In response to receiving the request: in accordance with a determination that the media item was added to the playback queue by the third device (e.g., was added by the guest), the electronic device (e.g., 2500) removes the media item from the playback queue. In accordance with a determination that that the media item was not added to the playback queue by the third device (e.g., not added by the guest), forgoing removing the media item from the playback queue.

In some embodiments, the first device is associated with a media preference profile (e.g., 2316A as shown in FIG. 23C), and further in response to receiving the request from the third device that is not a member of the set of devices, the electronic device (e.g., 2500) forgoes updating the media preference profile based on the request. For example, device 2500 (e.g., which is associated with the home owner) does not update a taste profile associated with the owner's user account based on media items played back in response to a request for another user (e.g., a user associated with a guest user account).

Note that details of the processes described above with respect to method 2600 (e.g., FIGS. 26A-26B) are also applicable in an analogous manner to the methods described below/above. For example, method 700, 900, 1100, 1300, 1500, 1700, 1800, 2000, 2200, 2400, 2800, 3000, 3200, 3400, 3600, 3800, and 3900 optionally includes one or more of the characteristics of the various methods described above with reference to method 2400. For brevity, these details are not repeated below.

FIGS. 27A-27E illustrate exemplary user interfaces for providing data based on a physical position, in accordance with some embodiments. The user interfaces in these figures are used to illustrate the processes described below, including the processes in FIGS. 28A-28C.

Figure 27A:
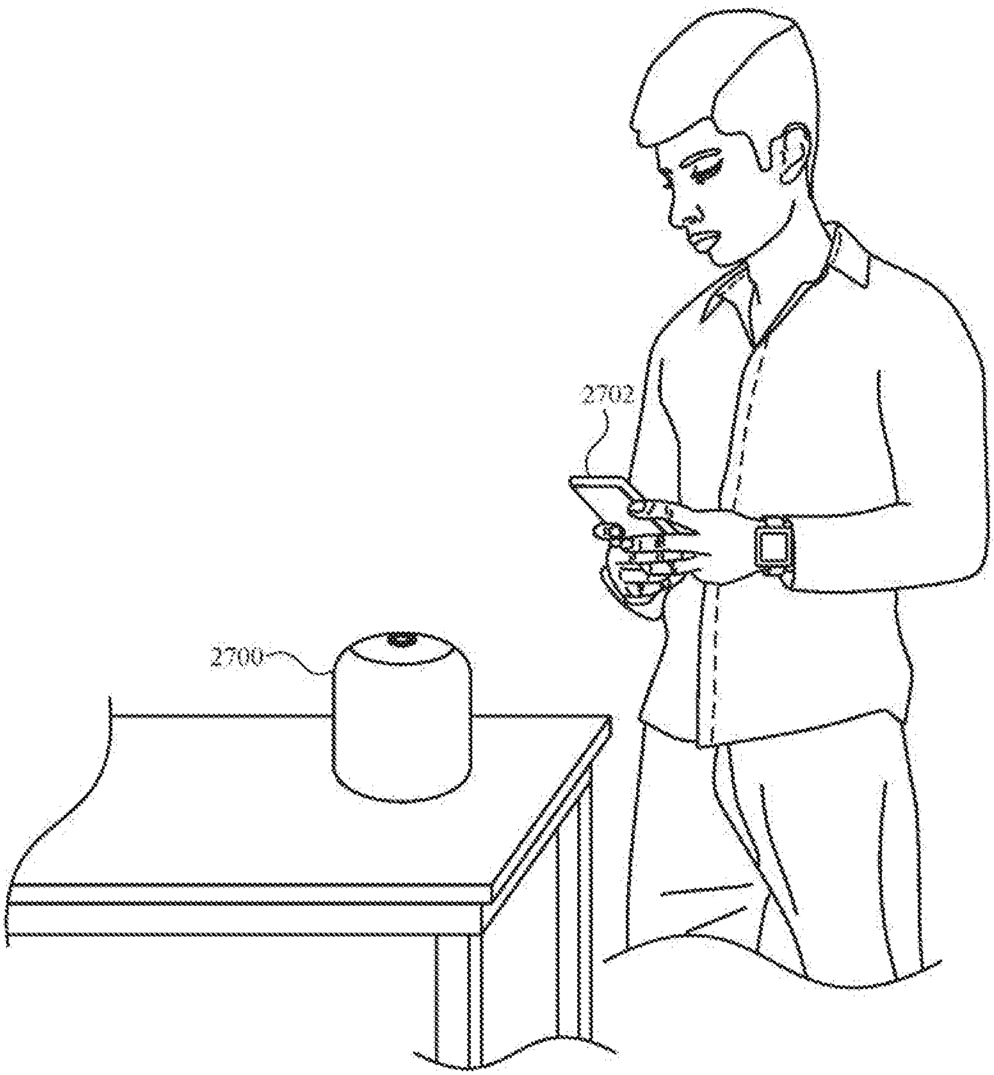
FIGS. 27A-27E illustrate exemplary techniques and user interfaces for providing access to an electronic device in accordance with some embodiments.

FIG. 27A illustrates an exemplary scenario in which two devices (2700 and 2702) are connected. In some embodiments, device 2700 includes one or more features of device 100, 300, 500, and 580. In some embodiments, device 2702 includes one or more features of device 100, 300, 500, and 580. In some examples, a user may wish to use device 2700 (e.g., a smart speaker) as an extension of device 2702 (e.g., a personal device), wherein device 2702 is associated with the user's account (e.g., a thus their account data). For example, utilizing a smart speaker as an extension of a device (e.g., to output audio, phone calls, dictated messages, or the like; and/or to detect user voice input) allows the user improved hands-free access to the functions of their personal device. Further example, such functionality can also extend the distance that a user can be from their personal device while maintaining the ability to access data from their personal device. However, providing unconditional access of data from a personal device to a public device (e.g., potentially used by more than one user in a household) can be undesirable to the owner of the personal device. Thus, access to data from the personal device can be subject to satisfaction of one or more conditions, such as physical position condition. FIGS. 27B-27E provide exemplary interfaces for facilitating the sharing of data from one device to another based on physical positioning.

Figure 27B:
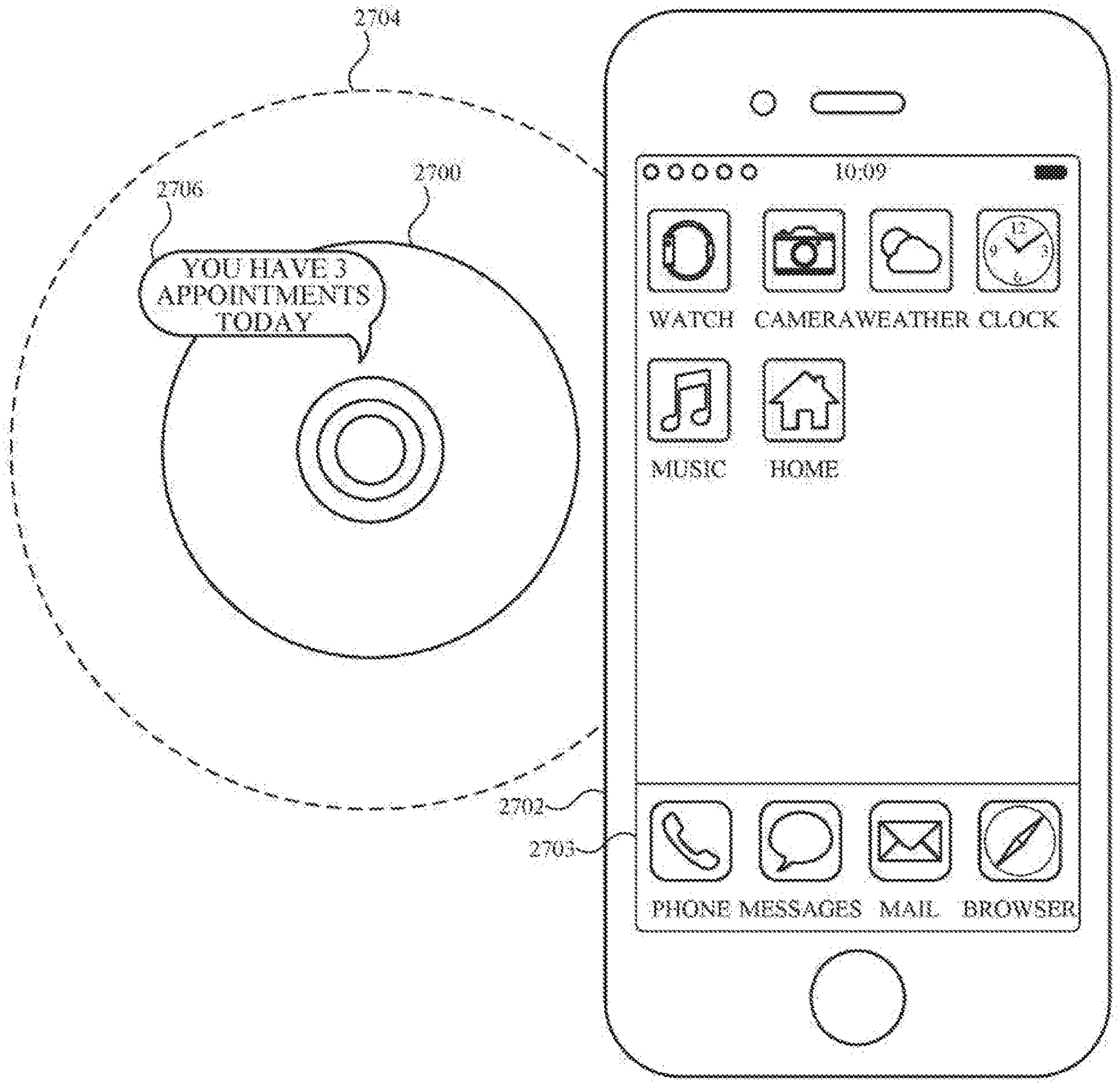
Figure 28A:
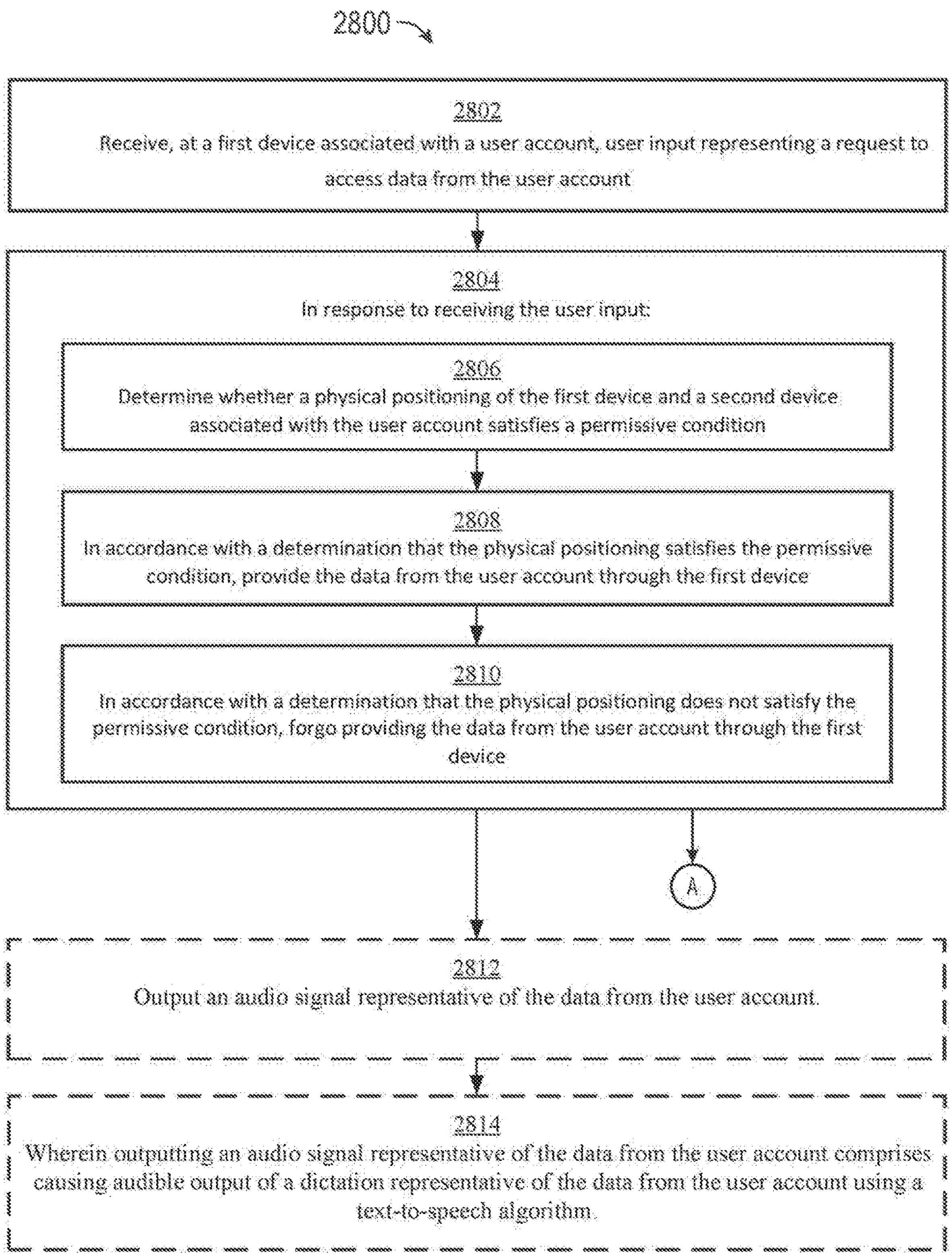
Figure 28C:
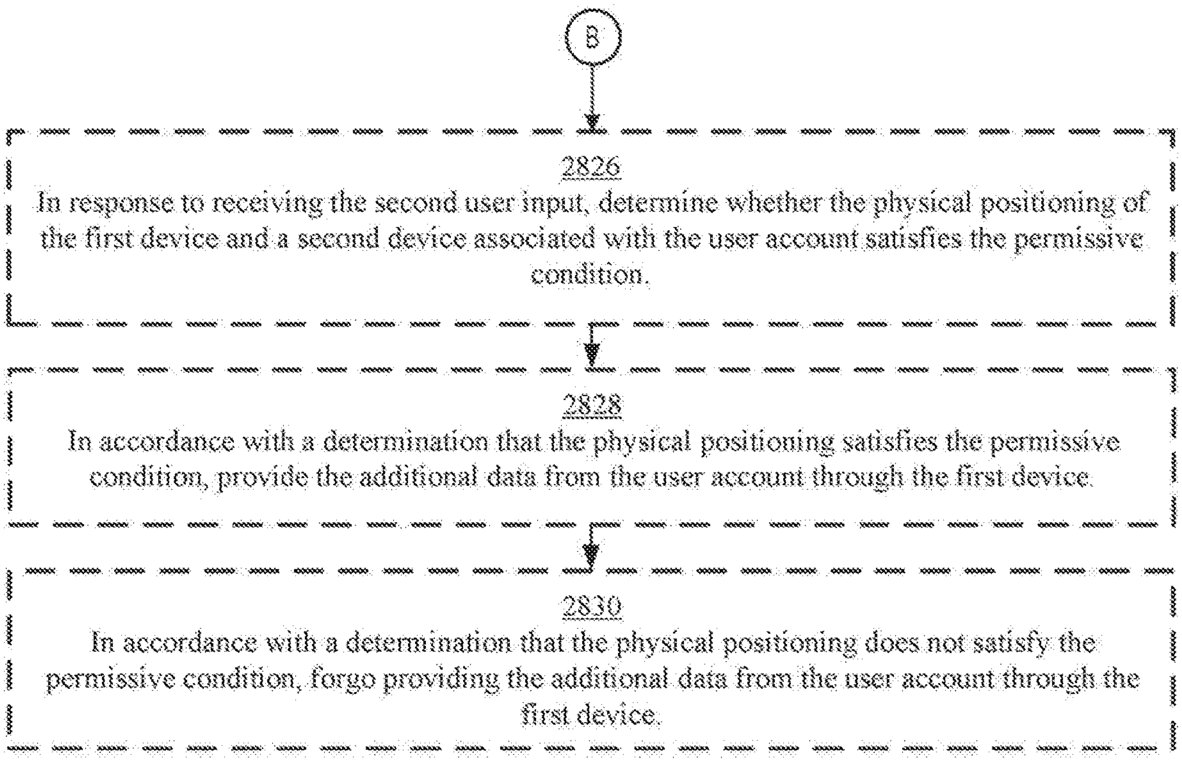

FIG. 27B illustrates an exemplary scenario in which the physical positioning of a device (e.g., 2702) satisfies a permissive condition (e.g., is placed in close proximity to device 2700). In the example of FIG. 27B, device 2700 received a user input request (e.g., a voice input), requesting the output of data from personal device 2702 through device 2700. For example, the request is a user input voice request to dictate the user's messages stored on (or otherwise associated with) device 2702. In response to the request, device 2700 determines that a physical positioning of device 2702 is in satisfaction of a physical position-based permissive condition. For example, device 2700 determines that device 2702 is in a permissive physical position (e.g., is in close proximity, such as within proximity zone 2704). In response to determining that the physical positioning of device 2702 satisfies a permissive condition, device 2700 outputs the data (e.g., dictation output 2706). Dictation output 2706 includes the response "You have 3 appointments today." In this example, dictation output 2706 is output in response to the user input voice request "Do I have any appointments today?"

Figure 27C:
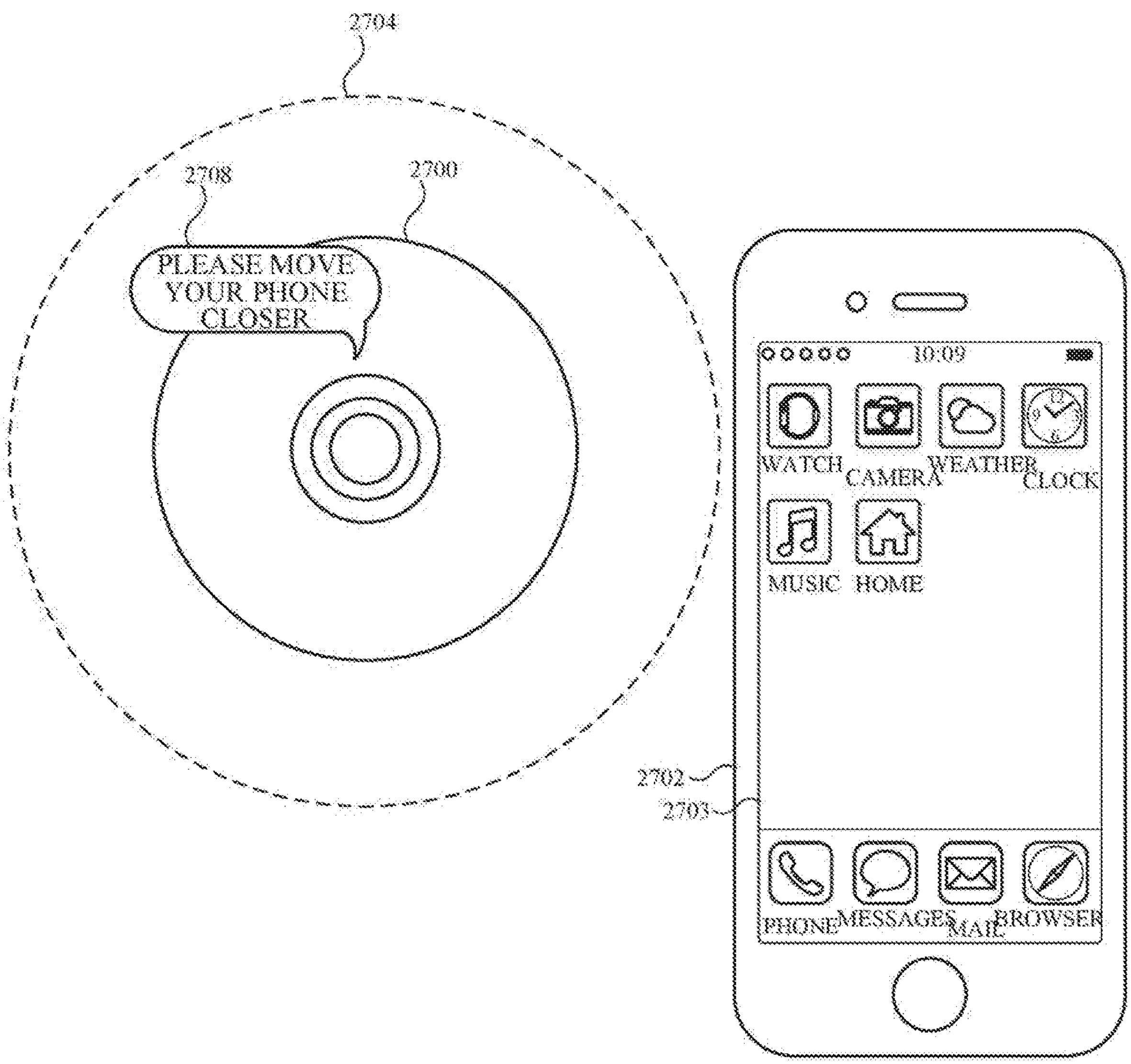

FIG. 27C illustrates an exemplary scenario in which the physical positioning of a device (e.g., 2702) does not satisfy a permissive condition. As shown, for example, device 2702 is not within proximity zone 2704 of device 2700, which is the permissive condition in this example. Thus, in response to receiving voice input "Do I have any appointments today?", device 2700 does not output the dictation shown in FIG. 27B. In some embodiments, a device (e.g., 2700) outputs an indication of how to satisfy the permissive condition. As shown, device 2700 outputs the dictation 2708 "Please move your phone closer".

Figure 27D:
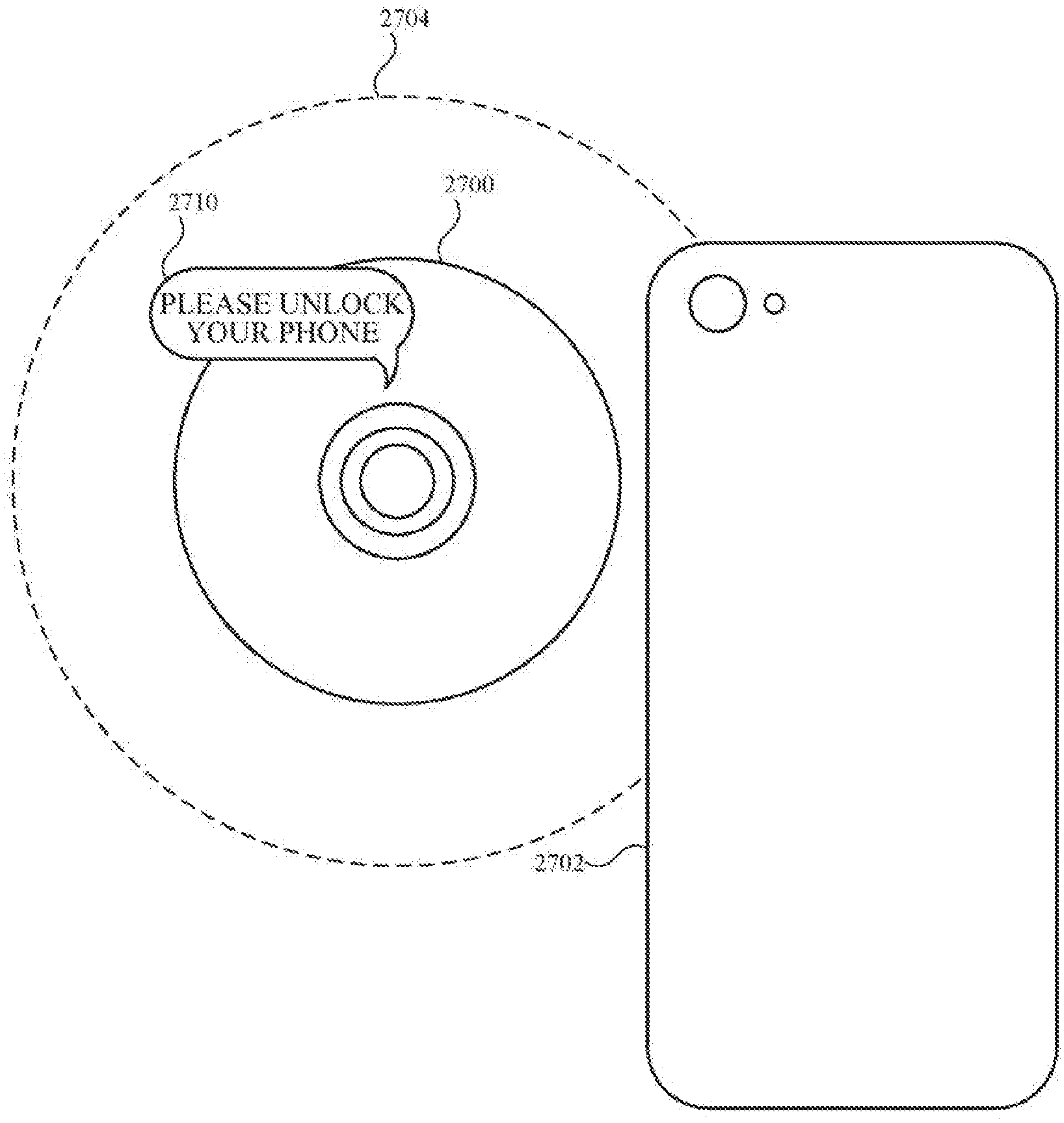

As illustrated above, a permissive condition can be based on device proximity. In some embodiments, a permissive condition is based on (or further based on) an orientation of a device (e.g., 2702). FIG. 27D illustrates an exemplary scenario in which device 2702 is within close proximity to device 2700, but does not satisfy a permissive condition. In the example shown in FIG. 27D, the permissive condition is satisfied when device 2702 is in a permissive physical orientation. In some embodiments, an orientation of a device (e.g., 2702) satisfies the permissive condition when the device is face up. For example, in FIG. 27D, the main display (e.g., the "face" or "front" of the device) the main display 2703 of device 2702 is oriented down (e.g., the device is face down). In some embodiments, an orientation of a device satisfies the permissive condition when the device (e.g., 2702) is pointing in a direction (e.g., from the top of the device) toward the second device (e.g., 2700). In some embodiments, a permissive condition is satisfied when both a physical proximity and a physical orientation condition are satisfied.

Figure 27E:
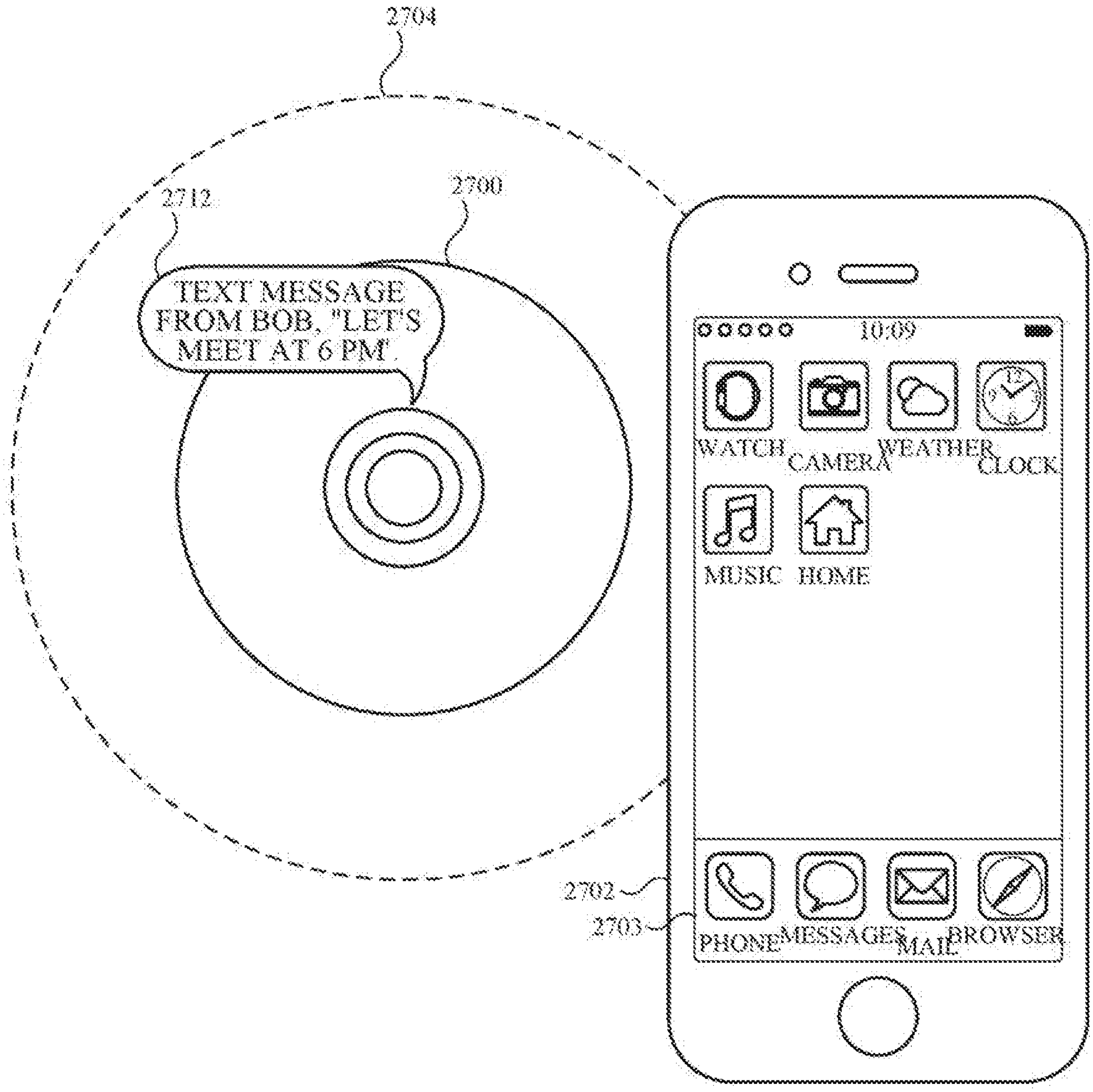

FIG. 27E illustrates an exemplary scenario in which the physical positioning of device 2702 satisfies the permissive condition. FIG. 27E illustrates that device 2700 can be used to output dictation of data from device 2702. As shown, device 2700 outputs a dictation of a text message, the dictation being: "Text message from Bob, 'Let's meet at 6 P.M.'".

FIGS. 28A-28C is a flow diagram illustrating a method for providing data based on a physical position using an electronic device in accordance with some embodiments. Method 2800 is performed at a device (e.g., 100, 300, 500, 580). Some operations in method 2800 are, optionally, combined, the order of some operations are, optionally, changed, and some operations are, optionally, omitted.

As described below, method 2800 provides an intuitive way for providing data based on a physical position. The method reduces the cognitive burden on a user for providing data based on a physical position, thereby creating a more efficient human-machine interface. For battery-operated computing devices, enabling a user to provide data based on a physical position faster and more efficiently conserves power and increases the time between battery charges.

The electronic device (e.g., 2700), which is at a first device associated with a user account (e.g., logged into user's iCloud) receives (2802) user input (e.g., a user input voice command) representing a request to access data from the user account. In some embodiments, data from a user account can include one or more of: calendar data (e.g., meetings, events, or the like), messages (e.g., text messages, iMessages, emails, voice messages, or the like), notes, reminders (e.g., audio or text reminders), or the like.

In response to receiving (2804) the user input (e.g., user input voice command), the first device (e.g., 2700) determines (2806) whether a physical positioning of the first device (e.g., 2700) and a second device (e.g., 2702) associated with the user account satisfies a permissive condition. In some embodiments, a permissive condition is satisfied when the second device is in close proximity to the first device (e.g., as shown in FIG. 27B). In some embodiments, a permissive condition is satisfied when a device orientation of the second device is a permissive orientation (e.g., lying face up on a surface) (e.g., as shown in FIG. 27B).

In accordance with a determination that the physical positioning satisfies the permissive condition, the first device (e.g., 2700) provides (2808) the data from the user account through the first device (e.g., dictates the data, as shown in FIG. 27B).

In accordance with a determination that the physical positioning does not satisfy the permissive condition, the first device (e.g., 2700) forgoes (2810) providing the data from the user account through the first device (e.g., requests that the second device is placed in close proximity, as shown in FIG. 27C; requests unlocking of second device, as shown in FIG. 27D).

Using a determination of whether the physical positioning of device satisfies a permissive condition provides the user with an easy technique for granting permission without extraneous user inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, providing the data from the user account through the first device comprises: outputting (2812) an audio signal (e.g., 2706 or 2712) representative of the data from the user account.

In some embodiments, outputting an audio signal representative of the data from the user account comprises: causing audible output (2814) of a dictation (e.g., 2706 or 2712) representative of the data from the user account using a text-to-speech algorithm In some embodiments, the dictation is in a natural language (e.g., a spoken language such as English, Spanish, French, or the like). For example, the dictation comprises data being read aloud (e.g., using a text-to-speech algorithm) through a speaker of the first device.

In some embodiments, the data from the user account comprises data from one or more of: a calendar entry (e.g., a meeting, an appointment), a notification (e.g., of an incoming text message), an email, a text message, a stored text document (e.g., a note), stored contact information, phone call audio, video call audio or video (e.g., FaceTime, Skype), a voice message, an address (e.g., user's home), and a media item (e.g., music, video).

In some embodiments, determining whether the physical positioning of the first device and second device satisfies the permissive condition comprises: determining (2816) whether a physical proximity between the first device and the second device satisfies a proximity condition (e.g., the first and second device are in close proximity to each other).

In some embodiments, determining whether the physical positioning of the first device and second device satisfies the permissive condition comprises: determining whether (2818) a physical orientation of the first device satisfies an orientation condition. In some embodiments, the physical orientation can be detected via sensors on the second device (e.g., and communicated to the first device), such as one or more of: accelerometer, ambient light sensor, camera, or the like. In some embodiments, an orientation condition is satisfied when the second device is positioned such that a main display is not covered. For example, a device that is resting face up (e.g., with its display visible, in contrast to face down) satisfies the orientation condition.

In some embodiments, further in accordance with a determination that the physical positioning does not satisfy the permissive condition, the first device (e.g., 2700) outputs (2820) an indication (e.g., 2708 or 2710) that the permissive condition is not satisfied (e.g., the devices are not in close proximity).

In some embodiments, outputting the indication that the permissive condition is not satisfied comprises: outputting (2822) an audible indication (e.g., 2708 or 2710) of a user action required to satisfy the permissive condition (e.g., a dictated output of: "Please unlock your device" or "Please bring your phone closer", or the like.).

In some embodiments, the user input representing a request to access data from the user account is a first user input, the method further comprising, subsequent to providing the data from the user account through the first device (e.g., as shown in FIG. 27B): the first device (e.g., 2700) receives (2824) a second user input (e.g., a user input voice command) representing a request to access additional data from the user account. In response to receiving the second user input, the first device (e.g., 2700) determines (2826) whether the physical positioning of the first device (e.g., 2700) and the second device (e.g., 2702) associated with the user account satisfies the permissive condition. In accordance with a determination that the physical positioning satisfies the permissive condition, the first device provides (2828) the additional data (e.g., as shown in FIG. 27E) from the user account through the first device. In accordance with a determination that the physical positioning does not satisfy the permissive condition, the first device forgoes (2830) providing the additional data from the user account through the first device (e.g., as shown in FIG. 27C).

Note that details of the processes described above with respect to method 2800 (e.g., FIGS. 28A-28C) are also applicable in an analogous manner to the methods described below/above. For example, method 700, 900, 1100, 1300, 1500, 1700, 1800, 2000, 2200, 2400, 2600, 3000, 3200, 3400, 3600, 3800, and 3900 optionally includes one or more of the characteristics of the various methods described above with reference to method 2800. For brevity, these details are not repeated below.

FIGS. 29A-29I illustrate exemplary user interfaces and techniques for managing playback of media on a plurality of devices, in accordance with some embodiments. The user interfaces in these figures are used to illustrate the processes described below, including the processes in FIGS. 30A-30C.

Figure 29A:
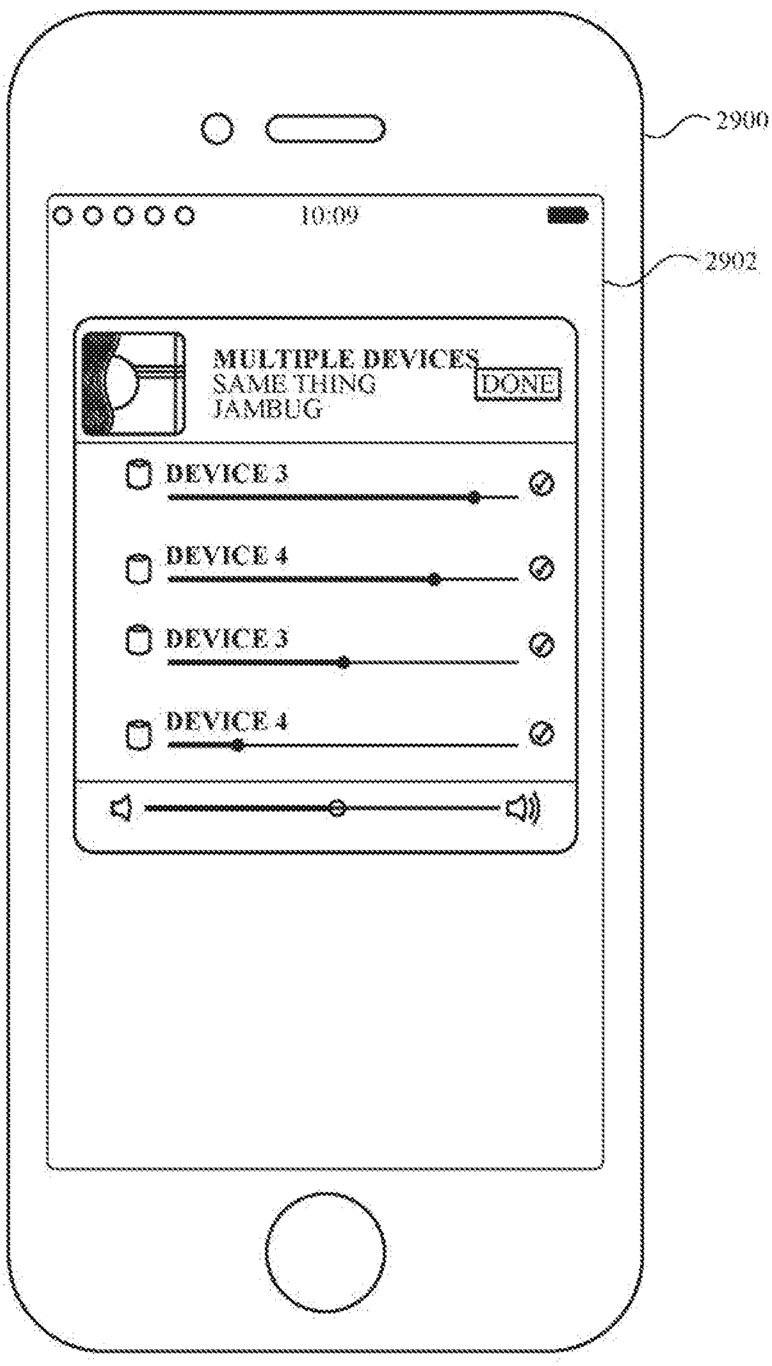
FIGS. 29A-29I illustrate exemplary techniques and user interfaces for managing media playback in accordance with some embodiments.

FIG. 29A illustrates an exemplary multi-device interface (e.g., such as multi-device interface 610 or 810 as described above with respect to FIGS. 6 and 8) that includes Devices 1 through 4, displayed on display 2902 of device 2900. In this example, a user uses device 2900 to transmit a request to initiate media playback on a set of devices that includes Devices 1 through 4. In some embodiments, device 2900 includes one or more features of devices 100, 300, 500, and 580.

Figure 29B:
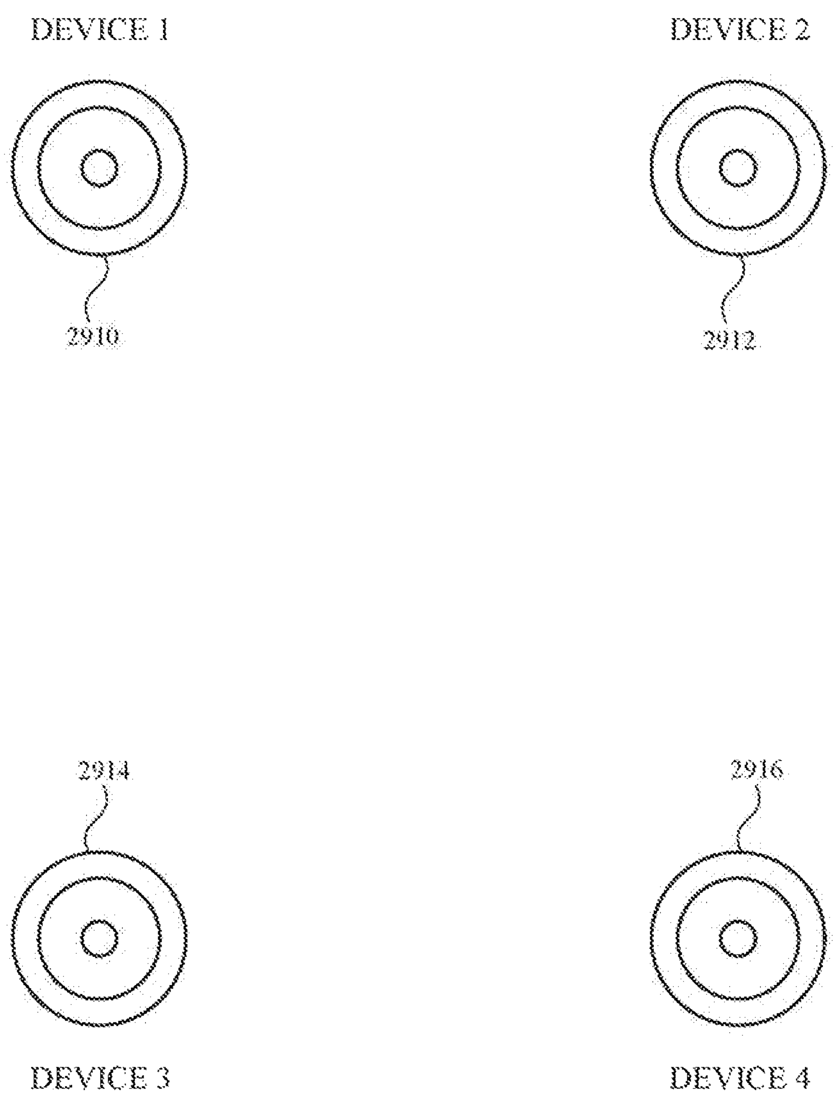

FIG. 29B illustrates an exemplary arrangement of Devices 1 through 4 (e.g., devices 2910, 2912, 2914, and 2916, respectively) that are included in the set of devices on which playback has been requested (e.g., by device 2900). In some embodiments, devices 2910, 2912, 2914, and 2916 are smart speakers that include one or more features of devices 100, 300, 500, and 580.

Figure 29C:
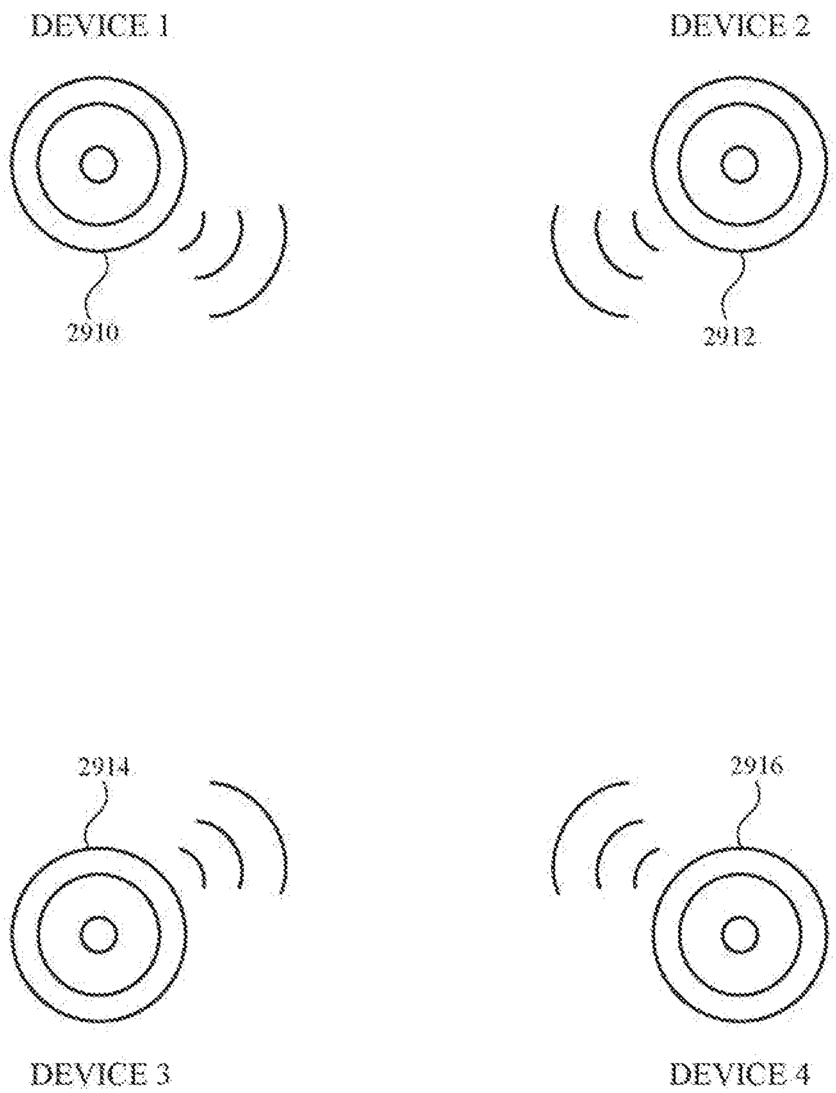

At FIG. 29C, the set of devices have initiated playback of media (e.g., are outputting audio), in response to the request form device 2900.

In some embodiments, a set of devices that is concurrently playing back media (e.g., as part the same media session) synchronizes playback of the media. In some embodiments, one device coordinates playback synchronization (e.g., also referred to as a "primary device" or "hero device"). Coordinating playback synchronization can include one or more of: processing playback control commands (e.g., pause, next track), streaming media to the other devices in the set of devices, storing and/or maintaining a playback queue, detecting whether the other devices are outputting the media in synchronization with each other (e.g., via use of a clock signal), or the like.

In some embodiments, a set of devices (e.g., for a media session) includes an heir device (also referred to as a "designated heir" or a "backup primary device"). In some embodiments, the designated heir is configured to take over responsibility of the primary device in response to the primary device no longer being able to playback media (e.g., for the media session) and/or coordinate playback synchronization. In some embodiments, several "generations" of heirs are designated (e.g., a designated heir, a designated heir to the designated heir, and so forth).

Figure 29D:
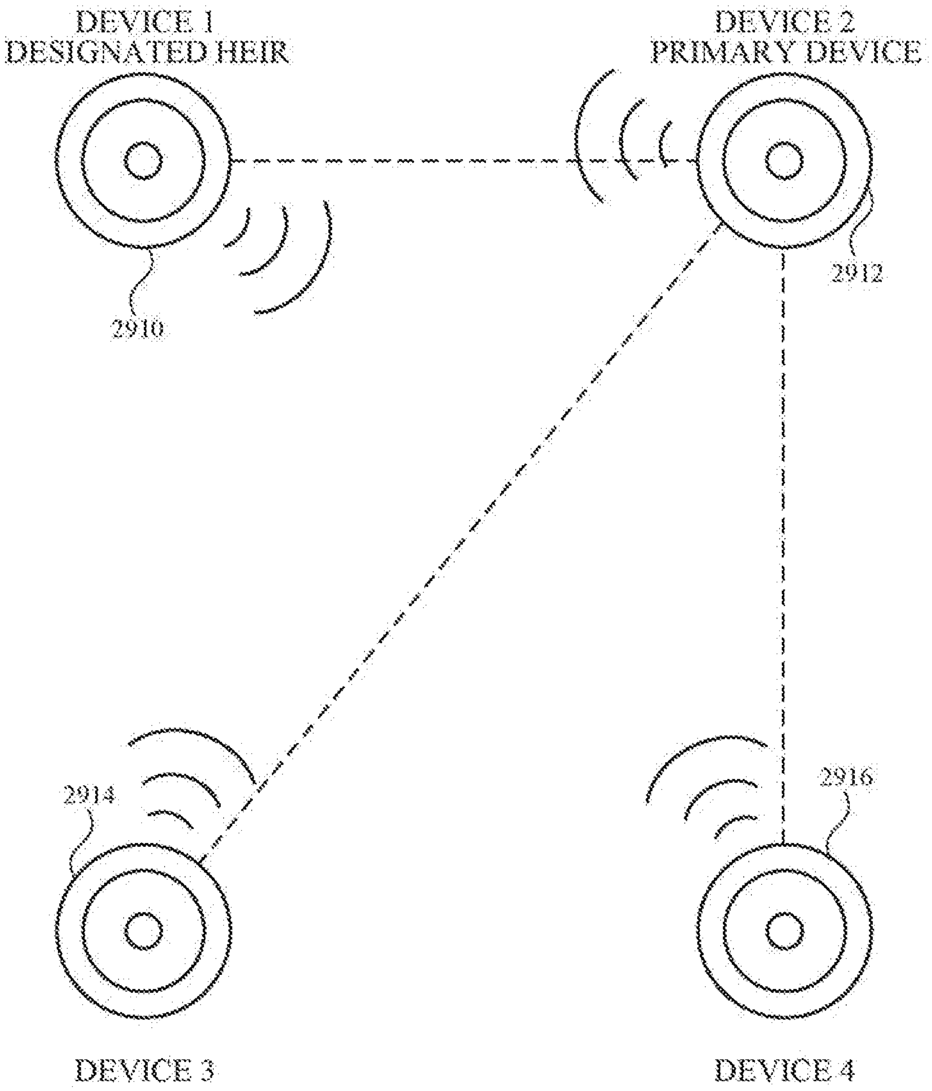

FIG. 29D depicts an exemplary scenario in which device 2910 is the designated heir to device 2912, the primary device. As shown, device 2912 (primary) connects to each of the devices in the set and, for example, synchronizes playback from each device.

Figure 29E:
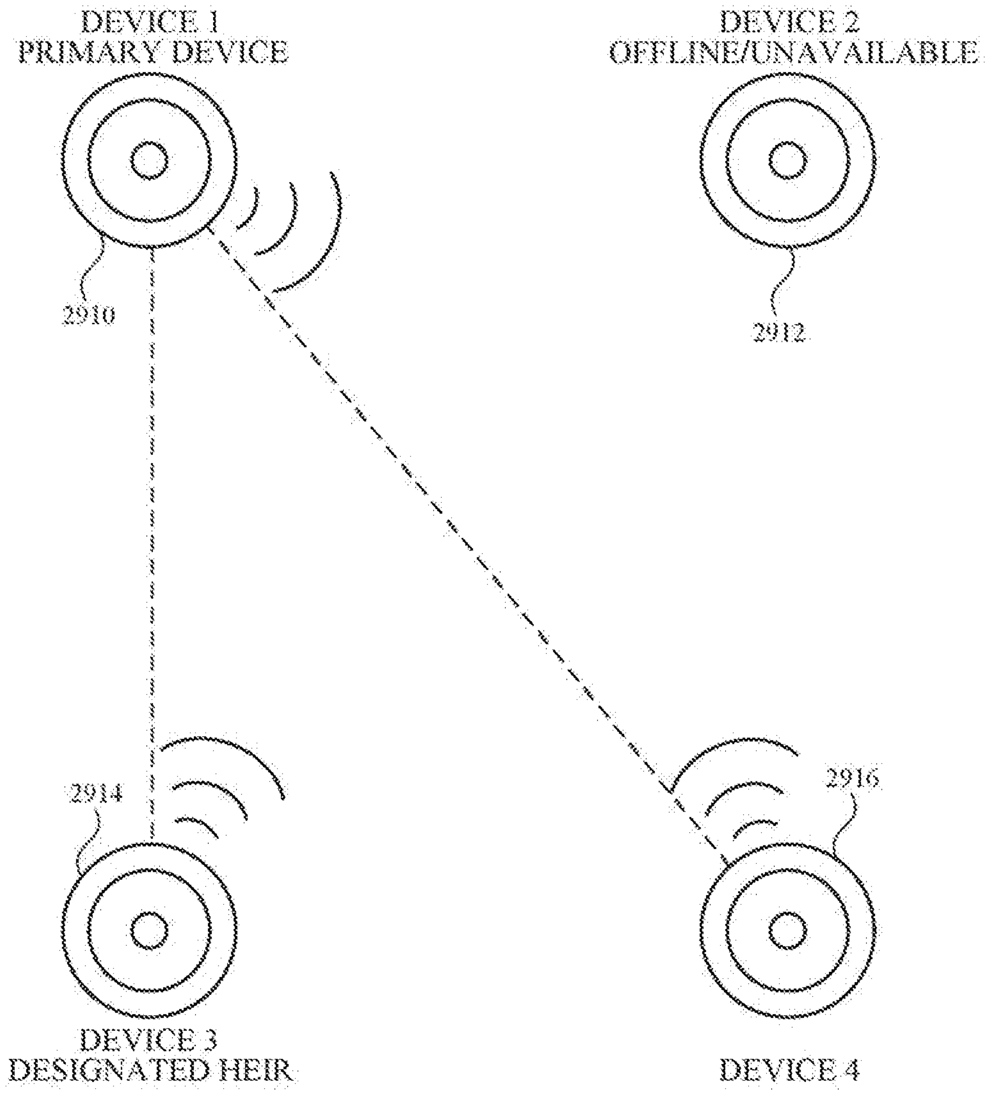

FIG. 29E depicts an exemplary scenario in which device 2910 has become the primary device and (e.g., because device 2912 is no longer available) and device 2914 is now the designated heir to device 2910, the primary device. For example, the scenario in FIG. 29E follows an event (e.g., during the scenario in FIG. 29D) in which device 2912 (e.g., the previous primary) is no longer available for playback during the media session on the set of devices. As shown, device 2910 (primary) connects to each of the remaining devices in the set (e.g., 2914 and 1216) and, for example, coordinates playback with each of these devices.

Figure 29F:
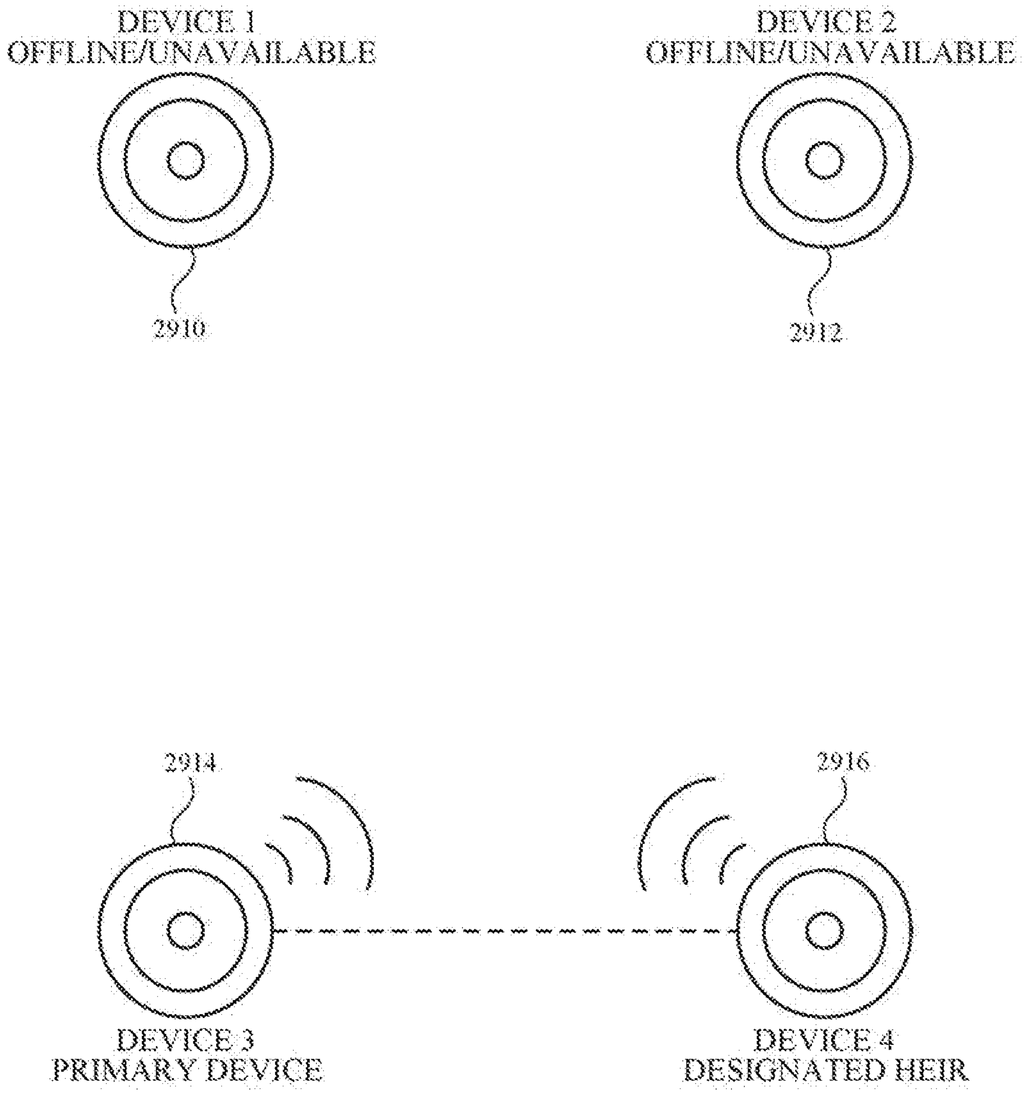

FIG. 29F depicts an exemplary scenario in which device 2914 has become the primary device and (e.g., because device 2910 is no longer available) and device 2916 is now the designated heir to device 2914, the primary device. For example, the scenario in FIG. 29F follows an event (e.g., during the scenario in FIG. 29E) in which device 2910 (e.g., the previous primary) is no longer available for playback during the media session on the set of devices). As shown, device 2914 (primary) connects to each of the remaining devices (e.g., 2916) in the set and, for example, coordinates playback with each of these devices.

Figure 29G:
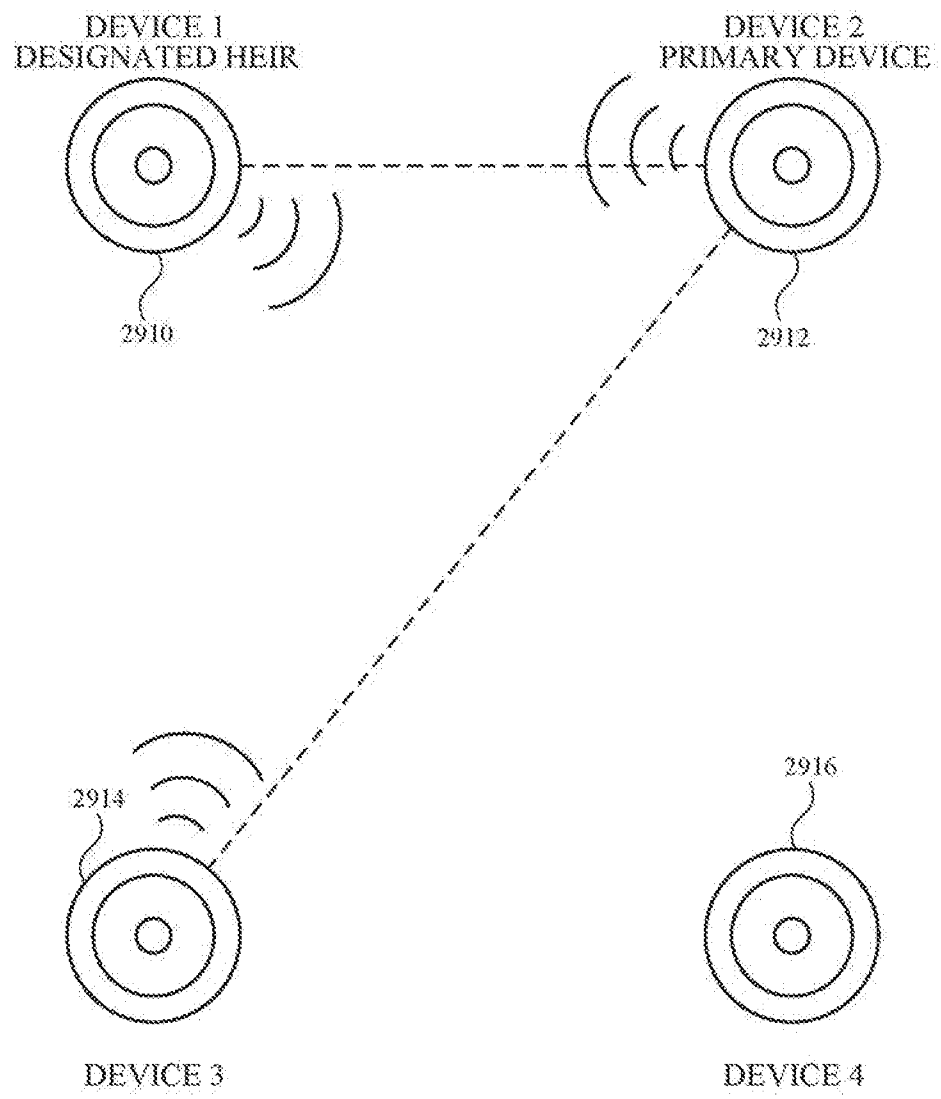

FIG. 29G depicts an exemplary scenario similar to that shown in FIG. 29D, but in which device 2916 is not part of the original set of devices selected by the user (e.g., using device 2900) for the media playback session. In some embodiments, a device that is not part of the set of devices (e.g., of the requested media session) performs the function of designating the primary device and/or the designated heir for the media playback session. For example, as shown in FIG. 29G, device 2916, even though not in the set of devices, designates device 2910 as the heir and device 2912 as the primary device. In some embodiments, the device that designates a primary device is a home media control device (e.g., an Apple TV).

In some embodiments, primary device responsibility (e.g., playback coordination) includes processing playback control commands. For example, because the devices in a set of devices are interconnected with each other (and potentially connected with other devices), a playback control command can be received by any device of the set of devices (or by the other devices). In some embodiments, the playback control command is forwarded to the primary device if it is a device that is not the primary device for a media session. In some embodiments, the primary device processes the playback control command, and then transmits instructions to the (e.g., remaining) devices in the set of devices (e.g., for enacting the playback control command).

Figure 29H:
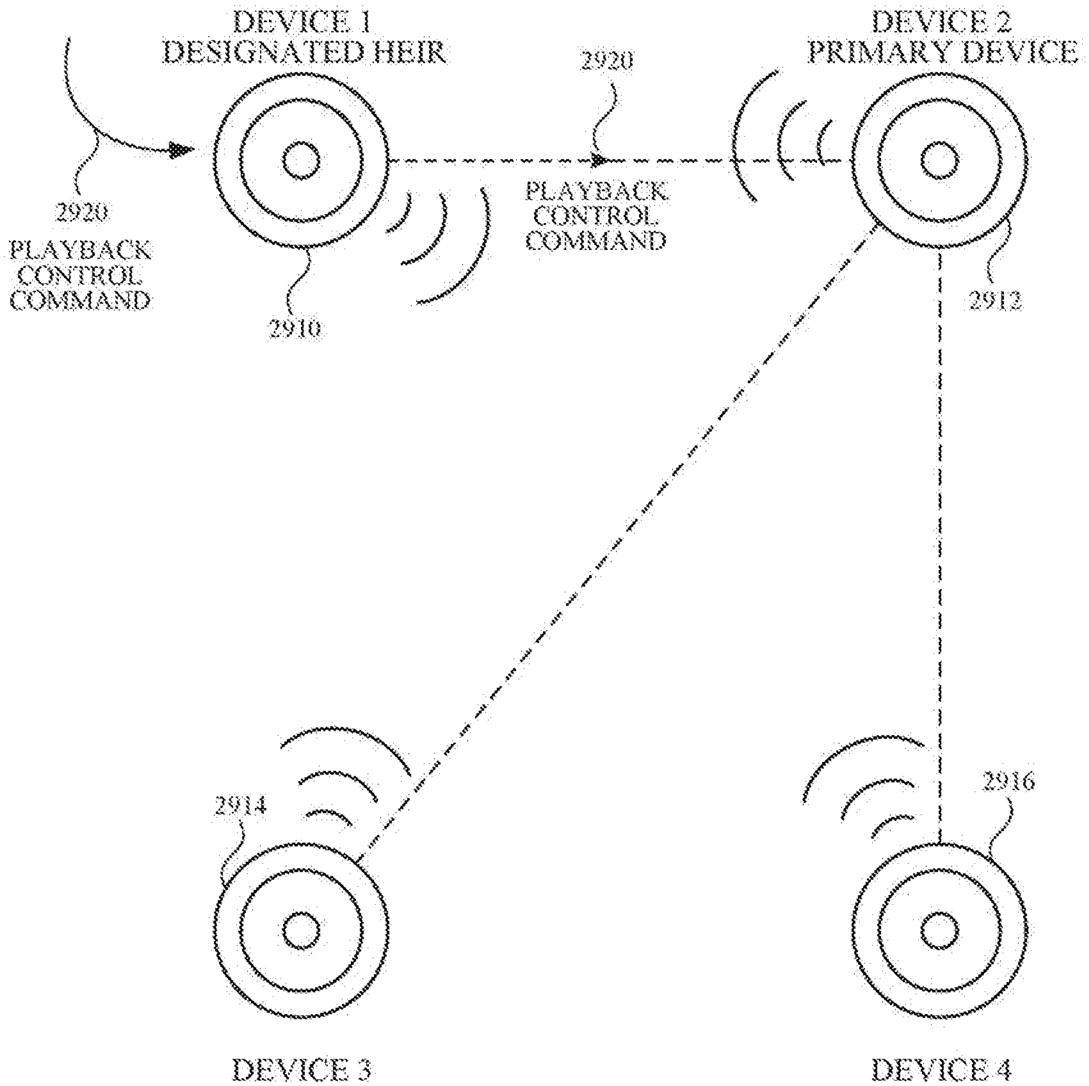

For example, FIG. 29H illustrates the exemplary scenario in which a playback control command 2920 is received at a non-primary device (e.g., designated heir, device 2910 in this example). Thus, as shown, device 2910 forwards the playback control command to the primary device. In contrast, at FIG. 29I, device 2910 is the primary device and receives the playback control command 2920. Thus, in the example depict in FIG. 29I, device 2910 processes the playback control command and transmits playback instructions (e.g., skip to next track, pause playback, or the like) to the remaining devices in the set (e.g., that are included in the media session).

FIGS. 30A-30C is a flow diagram illustrating a method for managing playback coordination using an electronic device in accordance with some embodiments. Method 3000 is performed at a device (e.g., 100, 300, 500, 580). Some operations in method 3000 are, optionally, combined, the order of some operations are, optionally, changed, and some operations are, optionally, omitted.

As described below, method 3000 provides an intuitive way for managing playback coordination. The method reduces the cognitive burden on a user for managing playback coordination, thereby creating a more efficient human-machine interface. For battery-operated computing devices, enabling a user to manage playback coordination faster and more efficiently conserves power and increases the time between battery charges.

The electronic device (e.g., 2910), which is a first device, receives (3002) a command to initiate playback of media on a set of devices comprising the first device (e.g., 2910) and a second device (e.g., 2912). In some embodiments, the first and second devices are both configured to be capable of receiving playback coordination responsibility for the set of devices.

In response to receiving the command, the first device (e.g., 2910) initiates (3004) synchronized playback of the media on the set of devices (e.g., 2910 and 2912), wherein the second device is designated (3006) as a primary device (e.g., as shown in FIG. 29D) configured to coordinate the playback of the media on the set of devices, and wherein the first device is configured (3008) to be a designated heir to the primary device (e.g., as shown in FIG. 29D). In some embodiments, coordinating playback on the set of devices includes one or more of: storing a media playback queue, synchronizing media playback start time, and receiving and routing playback commands. In some embodiments, a designated heir to the primary device is a device that will take over duty as the primary device if the current primary device becomes unavailable.

Initiating synchronized playback and automatically managing the coordination of media playback without requiring further user input reduces the burden on the user when playing back media on a plurality of devices. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 29I:
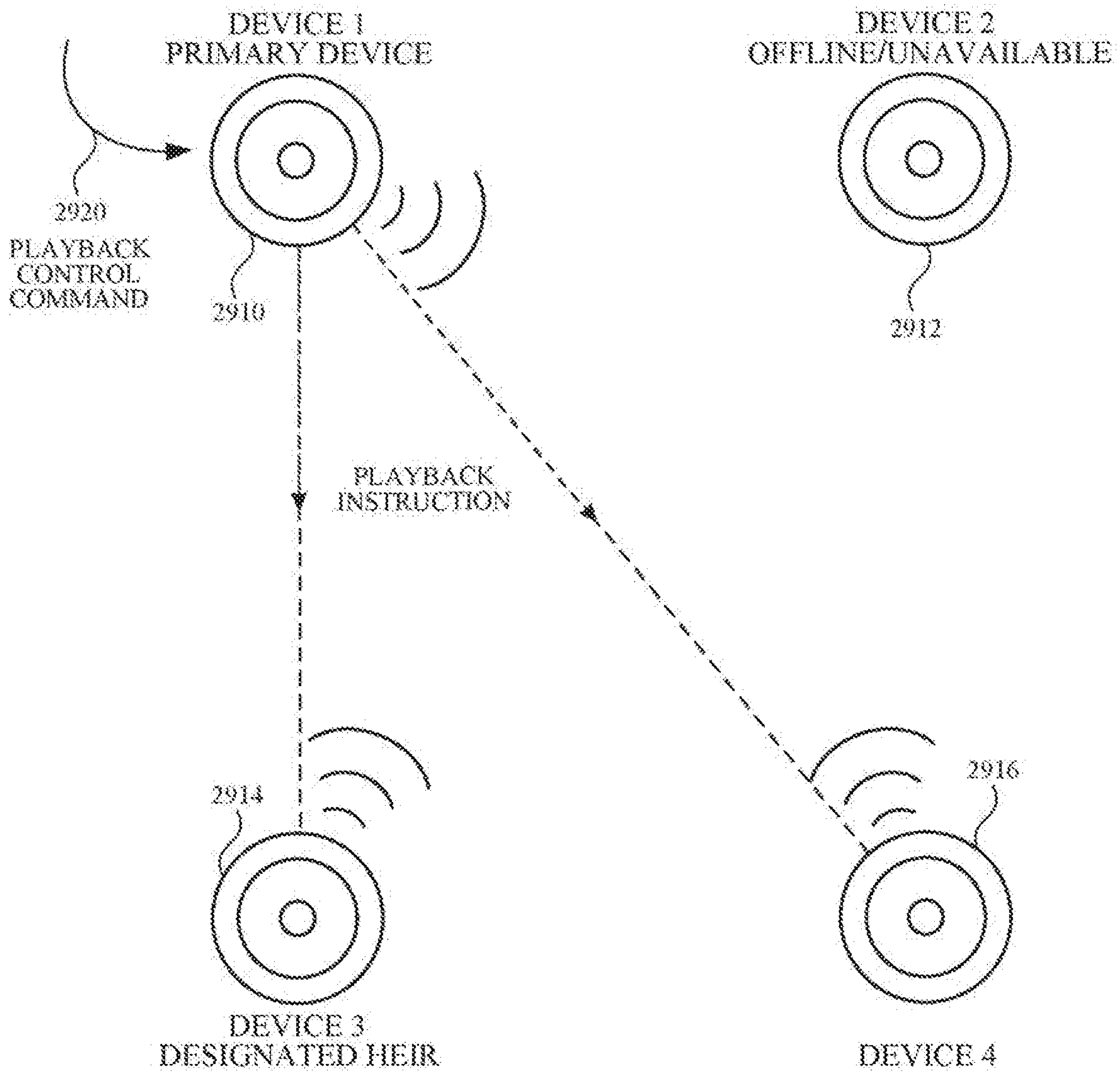

In some embodiments, the set of devices further comprises a third device (e.g., 2914 as shown in FIG. 29D), and during playback on the set of devices, the first device (e.g., 2910) detects (3010) that the second device (e.g., 2912) is no longer available for playback of the media (e.g., as shown in FIG. 29E). For example, a device is no longer available for playback if the device is requested to play something else or to cease playback, the device is disconnected, or the like. In response to detecting that the second device is no longer available to playback the media (3012): the first device (e.g., 2910) determines (3014) that the first device is designated as the primary device configured to coordinate the playback of the media on the set of devices (e.g., as shown in FIG. 29E), continues (3016) playback of the media on the first device (e.g., as shown in FIG. 29E), and coordinates (3018) the playback of the media on the third device (e.g., 2914, as shown in FIGS. 29E and 29I). In some embodiments, the first device determines that it is the primary device. In some embodiments, the first device receives notification from another device that the first device has been designated the primary device. For example, the first device assumes the role of primary device and begins coordination playback on the remaining device(s) in the set of devices. In this example, the third device is a remaining device.

In some embodiments, coordinating the playback of the media on the third device comprises one or more of (3020): providing a link to the media (e.g., a URL); providing a stream of the media (e.g., a real time or buffered stream of data representing the media); and providing a copy of the media (e.g., a media file).

In some embodiments, the first device (e.g., 2910) receives (3022) a command to cease playback of media on the first device. In response to receiving the command to cease playback of media on the first device (3024): the first device (e.g., 2910) ceases playback (3026) of media on the first device (e.g., as shown in FIG. 29F), and designates (3028) the third device to be the primary device configured to coordinate the playback of the media on the set of devices (e.g., as shown in FIG. 29F).

In some embodiments, the set of devices further comprises a third device (e.g., 2914), and during playback on the set of devices (e.g., 2910, 2912, and 2914), the first device (e.g., 2910) detects that the second device (e.g., 2912) is no longer available for playback of the media (e.g., as shown in FIG. 29E). In response to detecting that the second device is no longer available to playback the media: the first device (e.g., 2910) determines that the third device (e.g., 2914) (e.g., despite the first device being the designated heir) is designated as the primary device configured to coordinate the playback of the media on the set of devices, and the first device (e.g., 2910) continues playback of the media on the first device, and the first device (e.g., 2910) receives, from the third device (e.g., the new primary device), an instruction for coordinating playback of the media on the first device. For example, the first device does not assume the role of primary device, and thus begins receiving coordinating instructions for playback from the new primary device, the third device.

In some embodiments, the first device (e.g., 2910) receives, from a fourth device (e.g., 2916), a command to initiate playback of media on the set of devices. The first device (e.g., 2910) receives, from the fourth device, a designation that the first device is the designated heir. For example, the device that transmits the command to initiate playback and that designates the designated heir is a device different than the designated heir and the designated primary device.

In some embodiments, the fourth device is not a member of the set of devices. For example, the fourth device is a device in the home set of devices that initially coordinates playback on device(s) regardless of whether playback includes the fourth device. In some embodiments, initially coordinating playback includes designating a designated heir and/or a primary device for the playback session on the set of devices.

In some embodiments, initiating synchronized playback of the media on the set of devices comprises transmitting a copy of a playback queue to each device in the set of devices.

In some embodiments, during synchronized playback, the first device (e.g., 2910) receives, at the first device, a playback control command (e.g., 2920, such as pause, next track, seek, or the like). In response to receiving the playback control command: in accordance with the first device being designated the primary device, the first device (e.g., 2910) transmits an instruction to each of the devices in the set of devices based on the playback control command (e.g., as shown in FIG. 29I). In accordance with the first device not being designated the primary device, the first device (e.g., 2910) transmits the playback control command to a designated primary device (e.g., as shown in FIG. 29H). For example the first device forwards the command to the primary device for processing, and does not take further action until receiving an instruction from the primary device).

Note that details of the processes described above with respect to method 3000 (e.g., FIGS. 30A-30C) are also applicable in an analogous manner to the methods described below/above. For example, method 700, 900, 1100, 1300, 1500, 1700, 1800, 2000, 2200, 2400, 2600, 2800, 3200, 3400, 3600, 3800, and 3900 optionally includes one or more of the characteristics of the various methods described above with reference to method 3000. For brevity, these details are not repeated below.

FIGS. 31A-31N illustrate exemplary user interfaces for outputting an audible output based on user location, in accordance with some embodiments. The user interfaces in these figures are used to illustrate the processes described below, including the processes in FIGS. 32A-32C.

FIG. 31A illustrates in exemplary home that includes an exemplary home set of devices (e.g., the set of devices 3100, 3102, and 3104). As shown, devices 3100 and 3102 are in the room named "Living Room" (e.g., are named or otherwise associated with an identifier "Living Room") and device 3104 is in the room "Bedroom". In this example, devices 3100, 3102, and 3104 represent smart speaker devices that the user has positioned around their home, and that are connected to each other (e.g., via Wi-Fi). In some embodiments, devices 3100, 3102, and 3104 include one or more features of devices 100, 300, 500, and 580. FIG. 31A also depicts device 3106 (representing a car), which is optionally a device that is connected to the user's home set of devices (e.g., devices 3100, 3102, and 3104). In some embodiments, device 3108 includes one or more features of devices 100, 300, 500, and 580.

As described above, devices such as devices 3100, 3102, and 3104 (e.g., smart speaker devices), in accordance with some embodiments, can determine a spatial position of a user for targeting audio content to a voice command source and/or act as an extension (e.g., for notifications output) of another device (e.g., a personal device). Similarly, a device (or a set of devices) (e.g., such as devices 3100, 3102, and 3104) can be configured to automatically and selectively output audible output based on whether a user is within a range of the device (e.g., physically present near the device). FIGS. 31B-31N illustrates exemplary techniques for doing so.

Figure 31B:
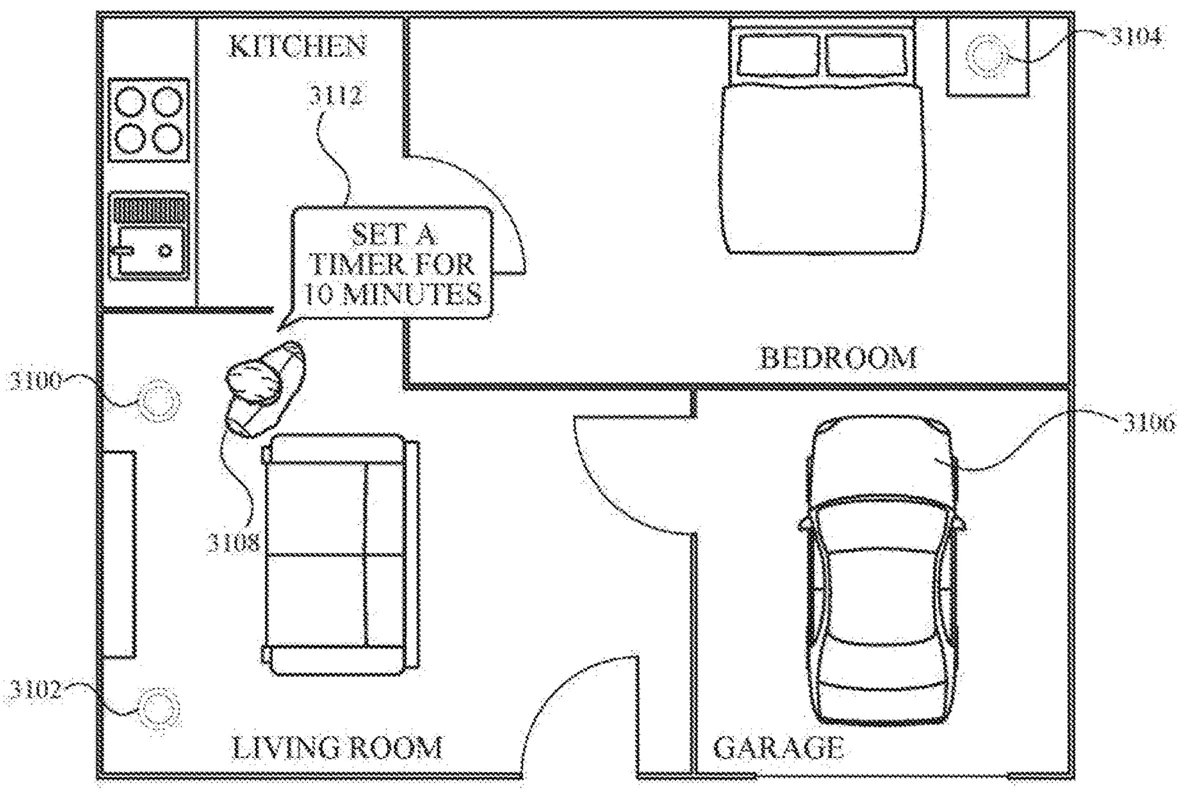

FIG. 31B depicts the scenario of FIG. 31A, however user 3108 is present in the Living Room near device 3100. In some embodiments, a device (e.g., 3100) of a set of devices (e.g., 3100, 3102, and 3104) receives an audible output trigger event. For example, in FIG. 31B, user 3108 utters the user input voice command 3112 "Hey Siri, set a timer for 10 minutes". In some embodiments, an audible output trigger event is any data configured to cause a device to output an audible output in response to a trigger event. For instance, in some examples, an audible output trigger event includes one or more of: notification settings (e.g., identifying events for which a device should issue an audible notification such as phone calls, text messages, reminders, calendar events, or the like), a user input request to set an alarm/reminder/timer, or the like. In some embodiments, the audible output trigger event is received via user input (e.g., a voice command) or data transfer (e.g., from a user's personal device, or from their user account (e.g., iCloud)). Subsequent to the user input voice command 3112, in the example shown in FIG. 31C, the user is still in the same position nearest device 3100, and so device 3100 outputs an audible alarm 3110 upon the occurrence of the trigger event (e.g., expiration of the 10 minute timer).

In some embodiments, a device (e.g., 3100) has an audible output range (e.g., a designated, predetermined, or dynamic range). In some embodiments, if a device (e.g., 3100) determines that a user is located outside of the audible output range of the device, it forgoes outputting the audible output when the trigger event occurs. For example, as shown in FIG. 31D, user 3108 is closest to device 3102 when the trigger event occurs (e.g., the expiration of the 10 minute timer), and thus device 3102 outputs the audible alarm 3110. Similarly, in FIG. 31E, the user 3108 is closest to device 3104 when the trigger event occurs (e.g., the expiration of the 10 minute timer), and thus device 3104 outputs the audible alarm 3110.

In some embodiments, determining whether a user is located within an audible output range is based on one or more of: a detected physical proximity of the device (e.g., 3100) to the user (e.g., 3108), a detected presence of the user (e.g., 3108) in the same room as the device (e.g., 3100), and the output characteristics (e.g., audio output power) of the device (e.g., 3100). In some embodiments, determining whether a user is located within an audible output range is based on detection of a device associated with the user.

An audible output range can be determined in a variety of manners. In some embodiments, the audible output range (e.g., of each device) is fixed. For example, FIG. 31F depicts the audible output range 3100A of device 3100 (e.g., is a proximity range represented by the dotted line), the audible output range 3102A of device 3102, and audible output range 3104A of device 3104, which represent fixed ranges. In some embodiments, an audible output range is independent for each device (or is not affected by whether there are other devices in the set of devices, or other devices nearby. For example, a device can have a fixed proximity range (e.g., 3100A, 3102A, or 3104A), such that it is possible for a user to be out of range (e.g., in the garage in FIG. 31F) of each device in a set of devices (e.g., 3100, 3102, and 3104).

In some embodiments, a user can be within the audible output range of a plurality of devices. For example, as shown in FIG. 31G, user 3108 is within the output range of both devices 3100 and 3102, and thus both devices are outputting audible alarm 3110. In some embodiments, only one device of the plurality of devices outputs an audible output if a user is within range of the plurality of devices.

In some embodiments, an audible output range of a device is the room in which a device is located. For example, as shown in FIG. 31H, the user is physically positioned in the Bedroom upon the occurrence of the trigger event, and thus device 3104 outputs audible alarm. Notably, in FIG. 31H, device 3104 outputs the alarm even though user 3106 is physically positioned closer to device 3100. Thus, in this example, it is the room that the user is in, and not necessarily physical proximity, that affects whether a device outputs in response to a trigger event.

In some embodiments, each device in a set of devices (e.g., 3100, 3102, and 3104) receives the audible output trigger event. As shown in FIG. 31H, even though the user's voice input (e.g., to set a timer) was received at device 3100, device 3104 responds to the trigger event by audibly outputting the alarm 3110. In some embodiments, a device (e.g., 3104) receives an audible output trigger event from another device (e.g., another device (e.g., 3100) in a set of devices, such as a home set of devices; or another device connected to the device). In some embodiments, a device (e.g., 3104)

receives an audible output trigger event from a user account (e.g., downloaded from an iCloud account).

In some embodiments, the audible output range of a device (e.g., 3100) is relative to one or more other devices (e.g., 3102), or is otherwise affected by other devices in a set of devices or nearby. For instance, FIG. 31I illustrates a scenario in which device 3100 is physically nearest to the user 3106 (or is the last device to which the user 3106 was detected to be nearest). Thus, in FIG. 31I, device 3100 outputs the audible alarm 3110, even though the user is in the next room. This, for example, can ensure that at least one device outputs the audible output. In some embodiments, a device adjusts its output (e.g., outputs at a loud volume) based on a user's positioning (e.g., if the user is detect to be positioned far away from the device).

In some embodiments, a device (e.g., 3100) of the set of devices (e.g., 3100, 3102, and 3104) detects a user voice to determine whether the user is located within the device's audible output range. For example, in FIG. 31J user 3108 speaking with user 3116 in the Living Room, as represented by user voice 3114 ("How are you?"). In some example, device 3100 detects the voice of user 3106, and determines that the user is in the Living Room (e.g., and within the audible output range of device 3100). Thus, in this example, device 3100 will output the audible alarm 3110 upon occurrence of the trigger (e.g., if user 3106 continues to be detected, or is detected within a threshold amount of time preceding the trigger event (e.g., within the last 5 minutes before the trigger)).

In some embodiments, a device (e.g., 3106) that is not one of the set of devices (e.g., 3100, 3102, and 3104) is connected to the set of devices. In this example, device 3106 is a car that connected to a personal device of user 3106 when the user entered the car. In some embodiments, the devices of the set of devices forgo outputting audible outputs in response to determining that the user is within an audible output range (e.g., while the car is powered on) of the device (e.g., 3106) that is not one of the set of devices. For example, as shown in FIG. 31K, when the user enters car 3106, the set of devices 3100, 3102, and 3104 do not output the audio output in response to trigger event (e.g., because the user is likely to be leaving their home).

In some examples, the devices of a set of devices are used as intelligent end-to-end communication tools. In some embodiments, a first device (e.g., 3100) of a set of devices (e.g., 3100, 3102, and 3104) receives a user input request (e.g., 3118) to deliver a message (e.g., 3120) to a user (e.g., 3116) that is within audible output range of at least one device of the set of devices. In some embodiments, the first device (e.g., 3100) transmits the message to a second device (e.g., 3104) (e.g., that the user 3116 is within audible output range of) of the set of devices (e.g., 3100, 3102, and 3104). For example, as shown in FIG. 31L, user 3108 is located in the Living Room and user 3116 is located in the Bedroom. At FIG. 31M, user 3108 utters the user input voice command 3118 "Send a message to Tim, dinner is ready", which is detected by device 3100. As described above, the devices of the set of devices (e.g., 3100, 3102, and 3104) can determine a physical position of a user in order to deliver output of audible notifications as appropriate. Thus, as shown in FIG. 31N, a message 3120 ("Dinner is ready") is audibly output by a second device (e.g., 3104) of the set. In this example, the user 3116 (the target of the voice input command, Tim) is located within the audible output range of device 3104, and thus device 3104 outputs the message 3120. In some embodiments, the first device transmits a request to the second device inquiring whether the user (e.g., 3116) is within the devices audible output range (e.g., and if confirmation is received, transmits the message 3120 to the second device).

In some embodiments, the audible output range of a device (e.g., 3100) is based on one or more of: other detectable indicia of a user presence or location, including footsteps (e.g., determining and detecting a footstep pattern associated with a user, tracking the location of a set of footsteps as they move around (e.g., which are presumed to be the user), determining and detecting a breathing pattern of the user, using a visual detection mechanism (e.g., a motion sensor, a camera), or the like.

FIGS. 32A-32C is a flow diagram illustrating a method for outputting an audible output based on user location using an electronic device in accordance with some embodiments. Method 3200 is performed at a device (e.g., 100, 300, 500). Some operations in method 3200 are, optionally, combined, the order of some operations are, optionally, changed, and some operations are, optionally, omitted.

As described below, method 3200 provides an intuitive way for outputting an audible output based on user location. The method reduces the cognitive burden on a user for outputting an audible output based on user location, thereby creating a more efficient human-machine interface. For battery-operated computing devices, enabling a user to outputting an audible output based on user location faster and more efficiently conserves power and increases the time between battery charges.

The electronic device (e.g., 3100), which is a first device of a set of devices (e.g., 3100, 3102, and 3104) associated with a first user account: receives (3202) an audible output trigger event. In some embodiments, an audible output trigger event is any data configured to cause a device to output an audible output in response to a trigger event. In some embodiments, an audible output trigger events is one or more of: a notification (e.g., alarm/timer/reminder) for a particular time (e.g., 5:00 PM) or some length of time in the future (e.g., in 30 minutes). In some embodiments, an audible output trigger event is a device notifications setting.

Figure 31C:
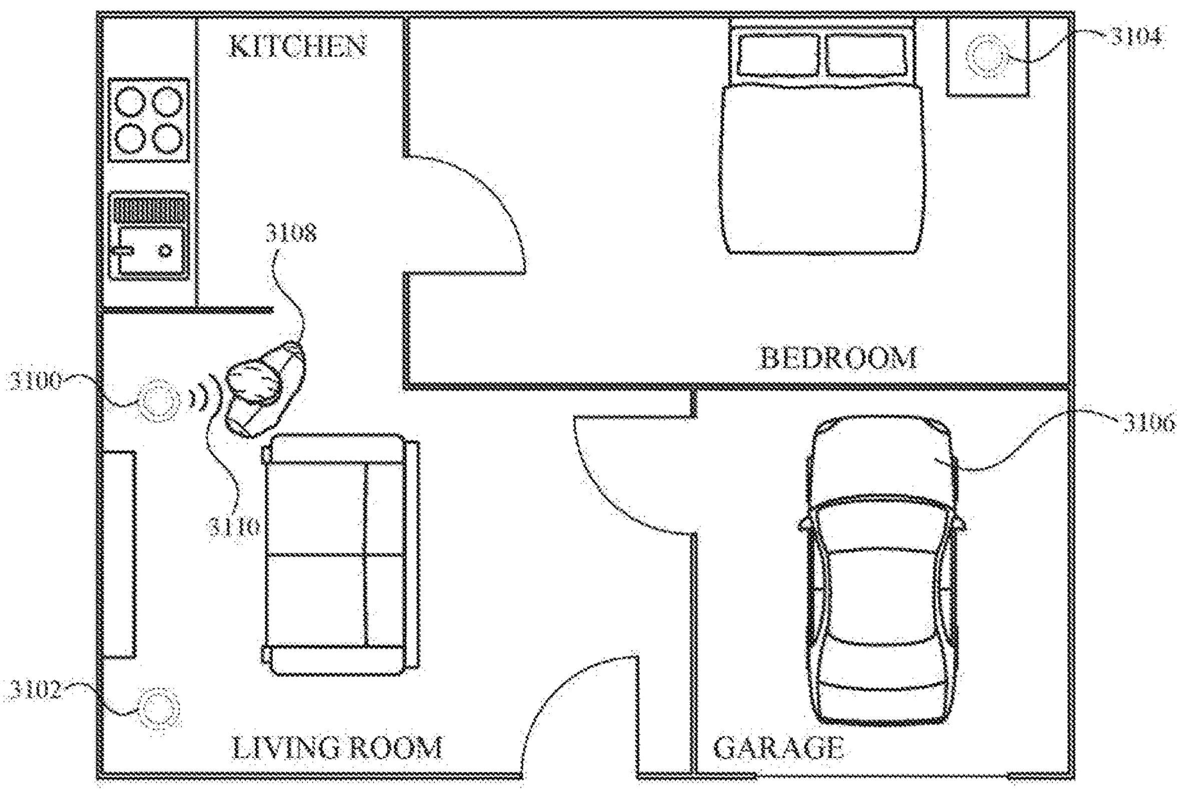
Figure 31D:
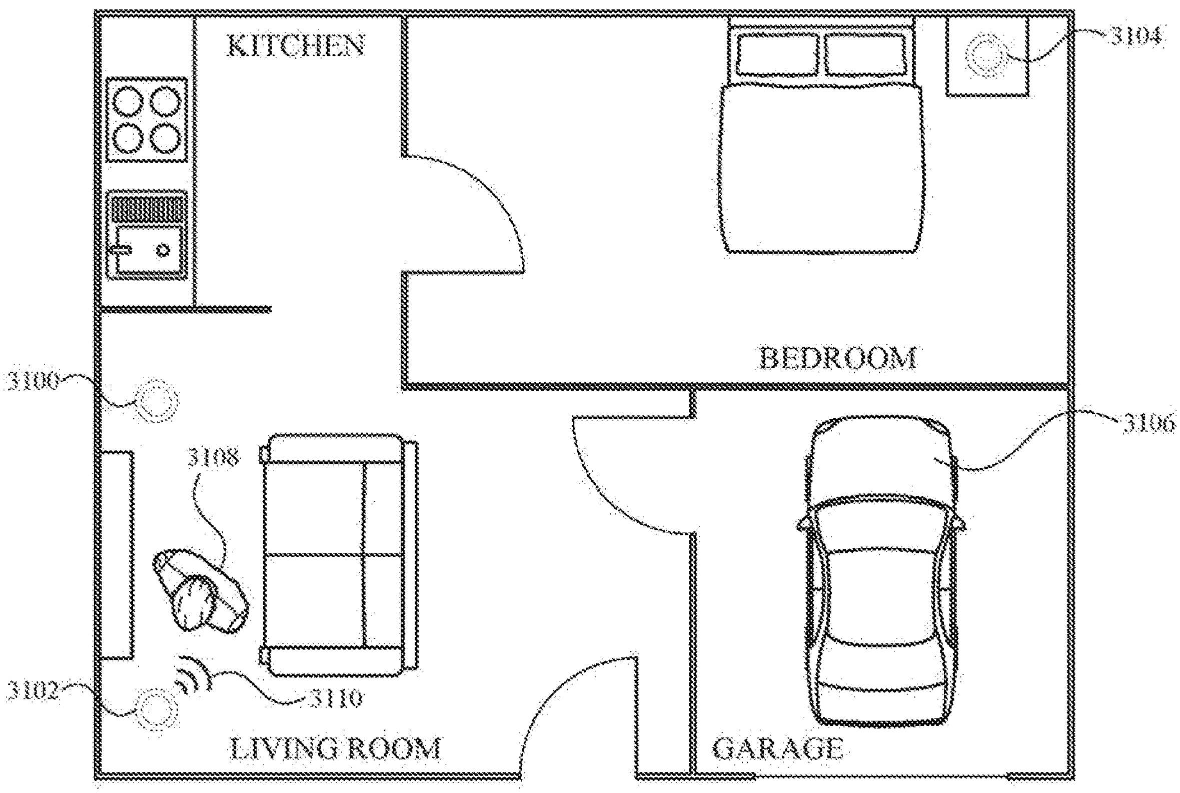
Figure 31E:
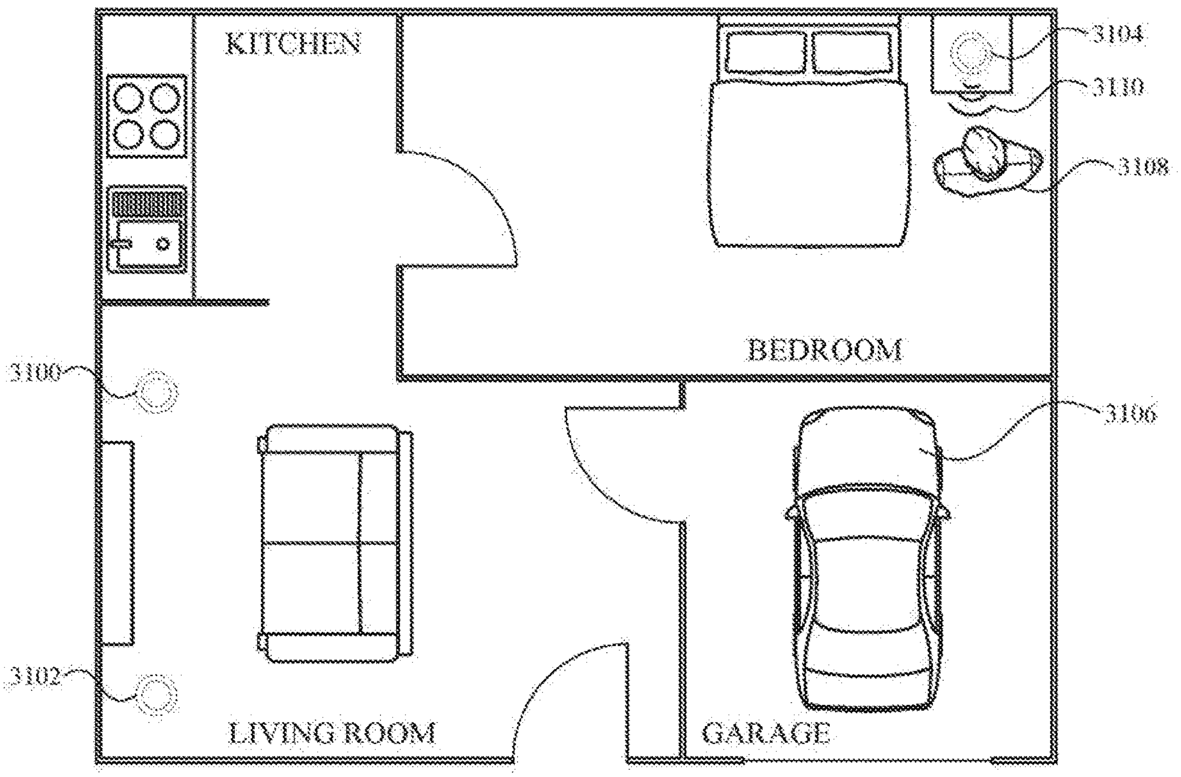
Figure 31F:
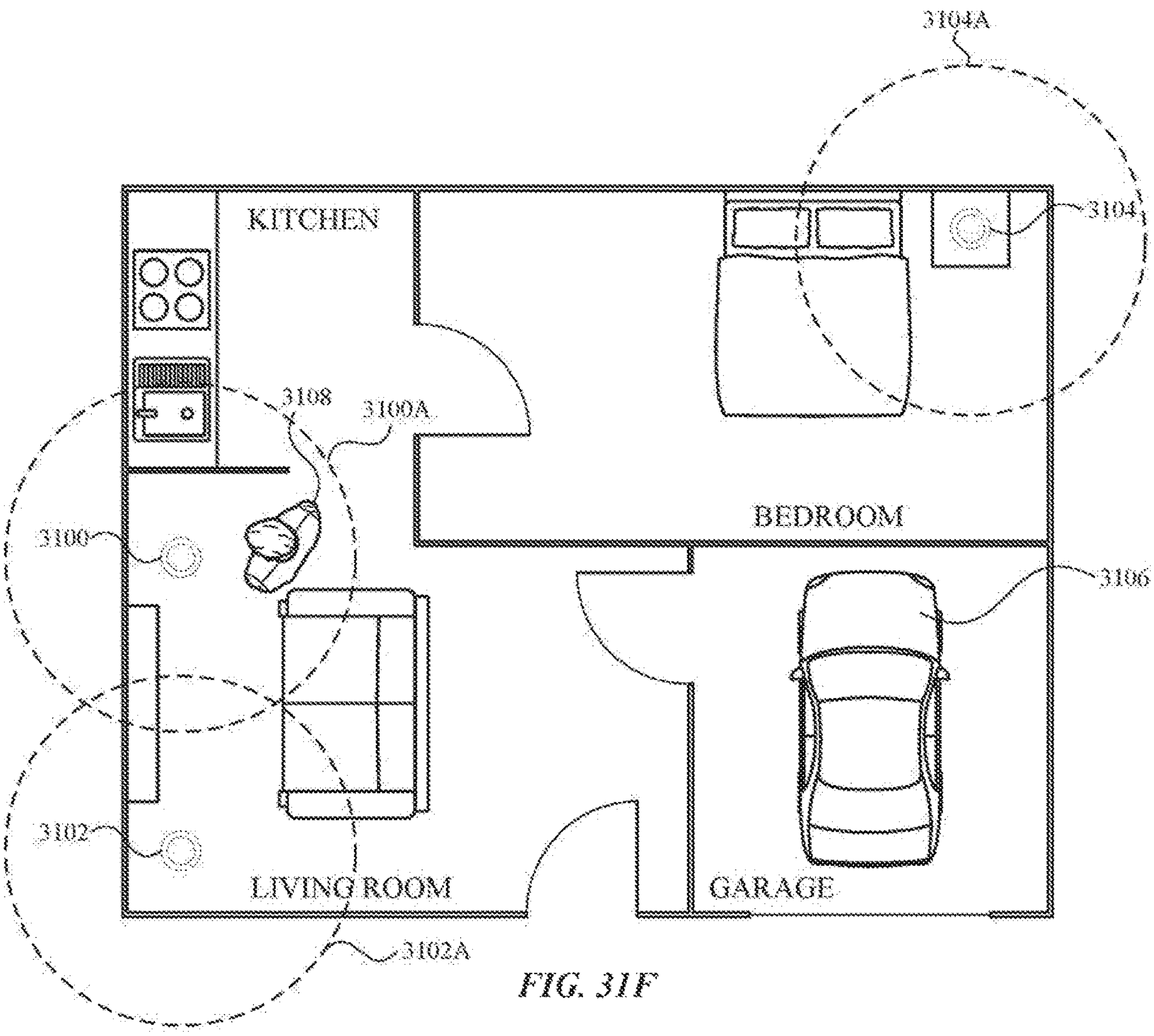
Figure 31G:
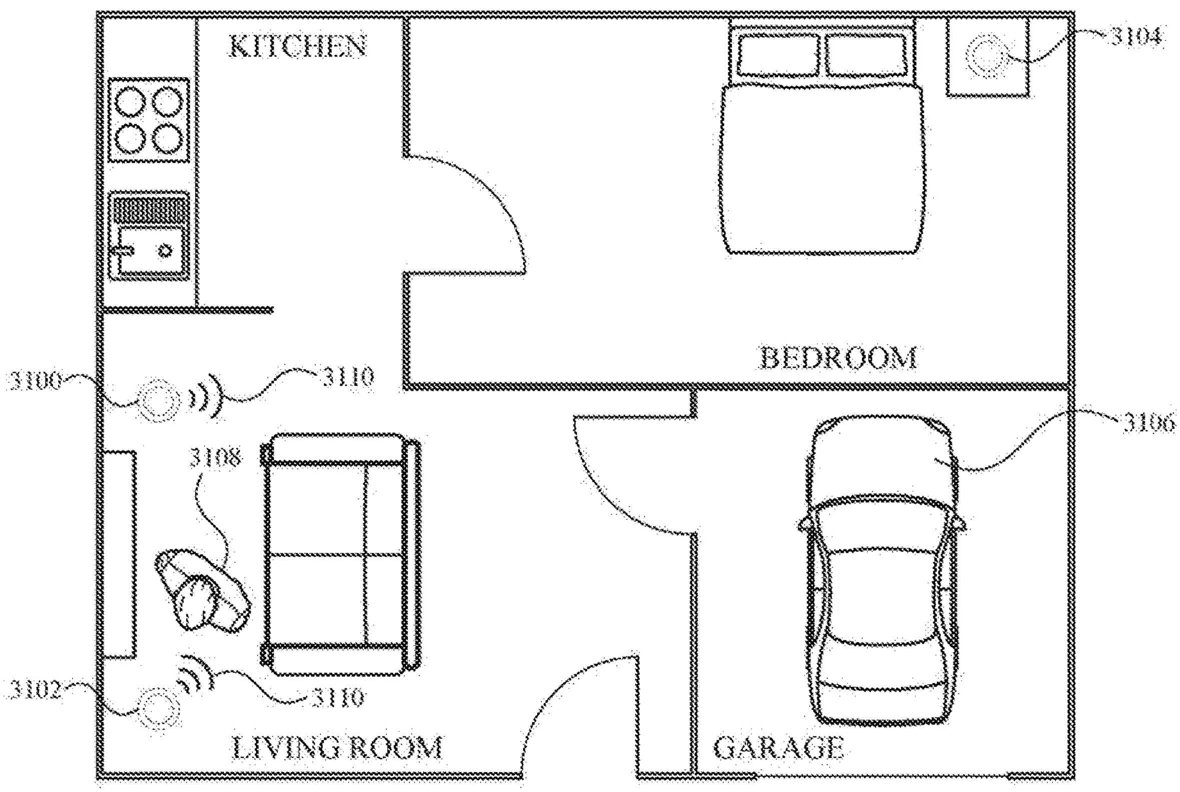
Figure 31H:
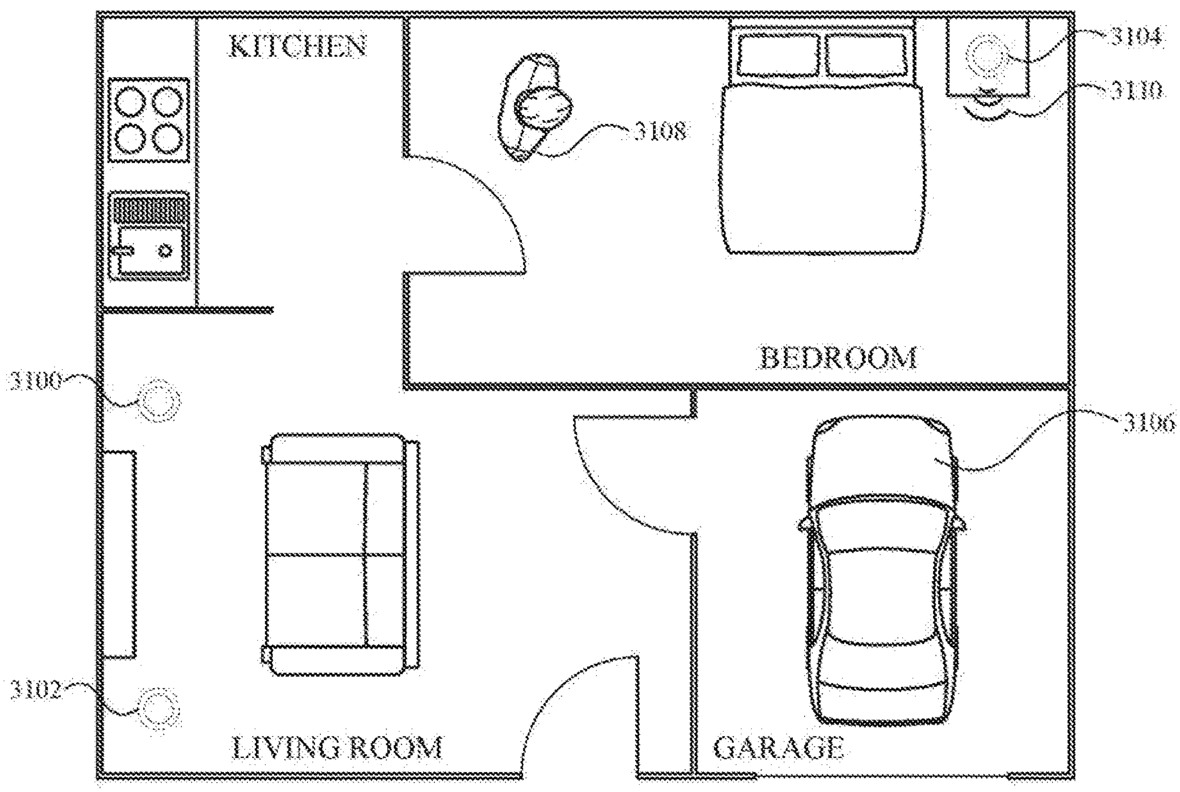
Figure 31I:
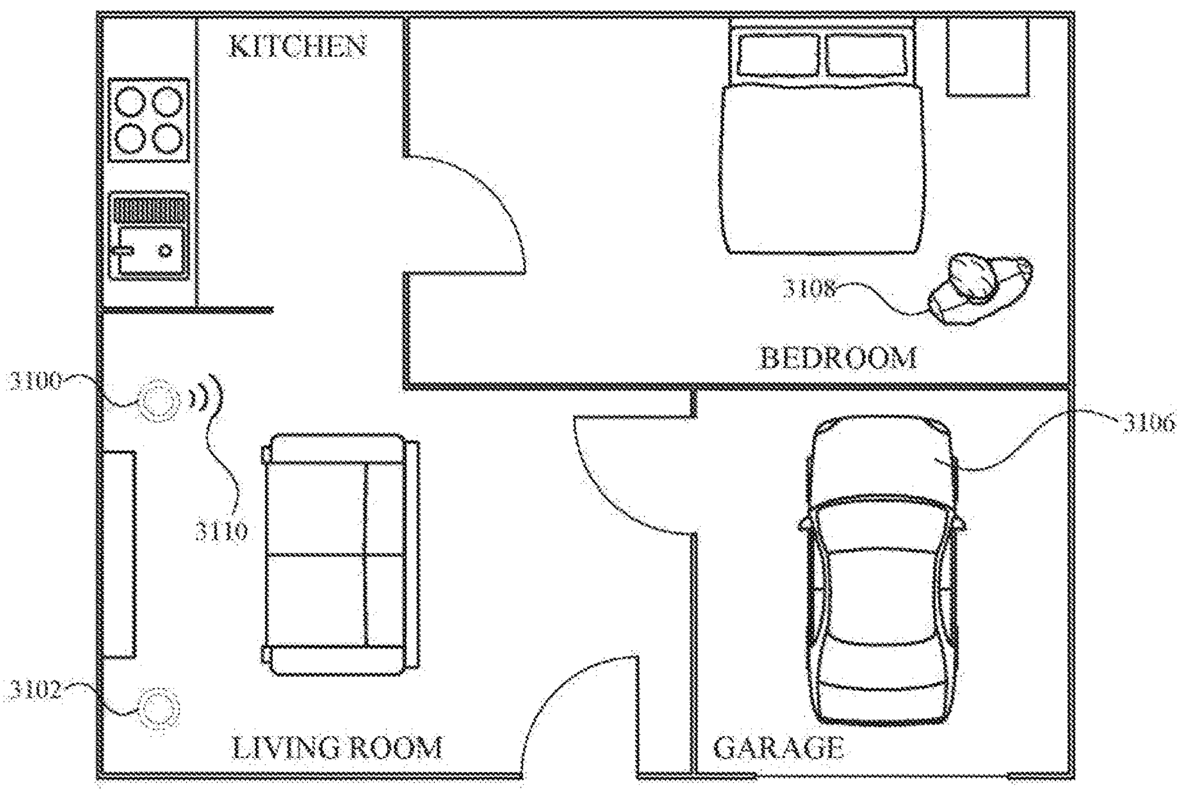
Figure 31J:
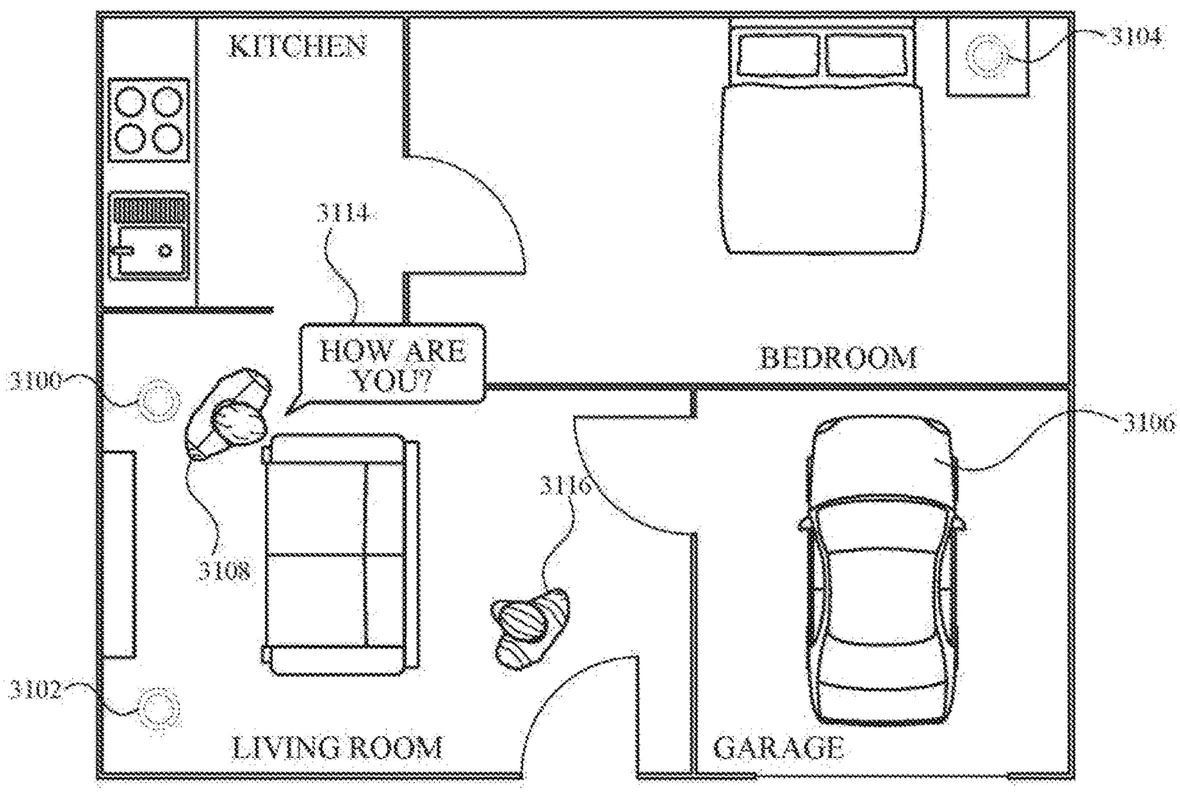
Figure 31K:
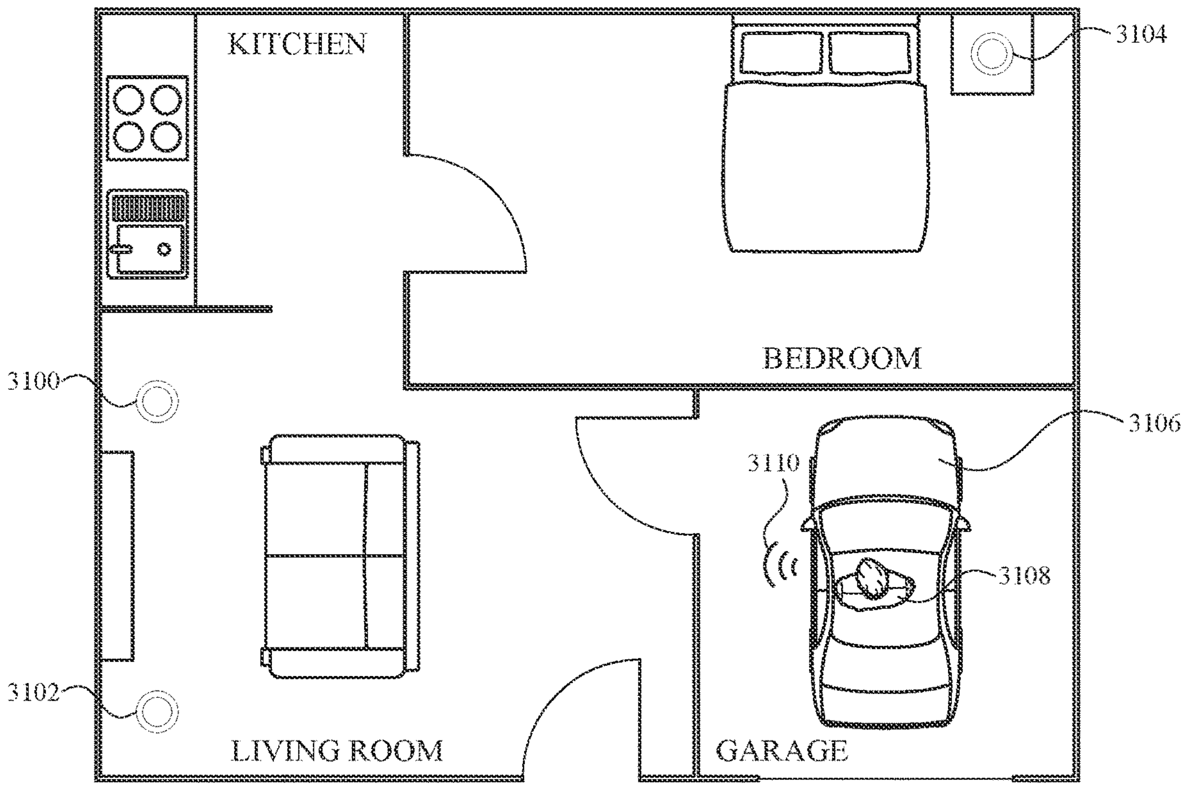
Figure 31L:
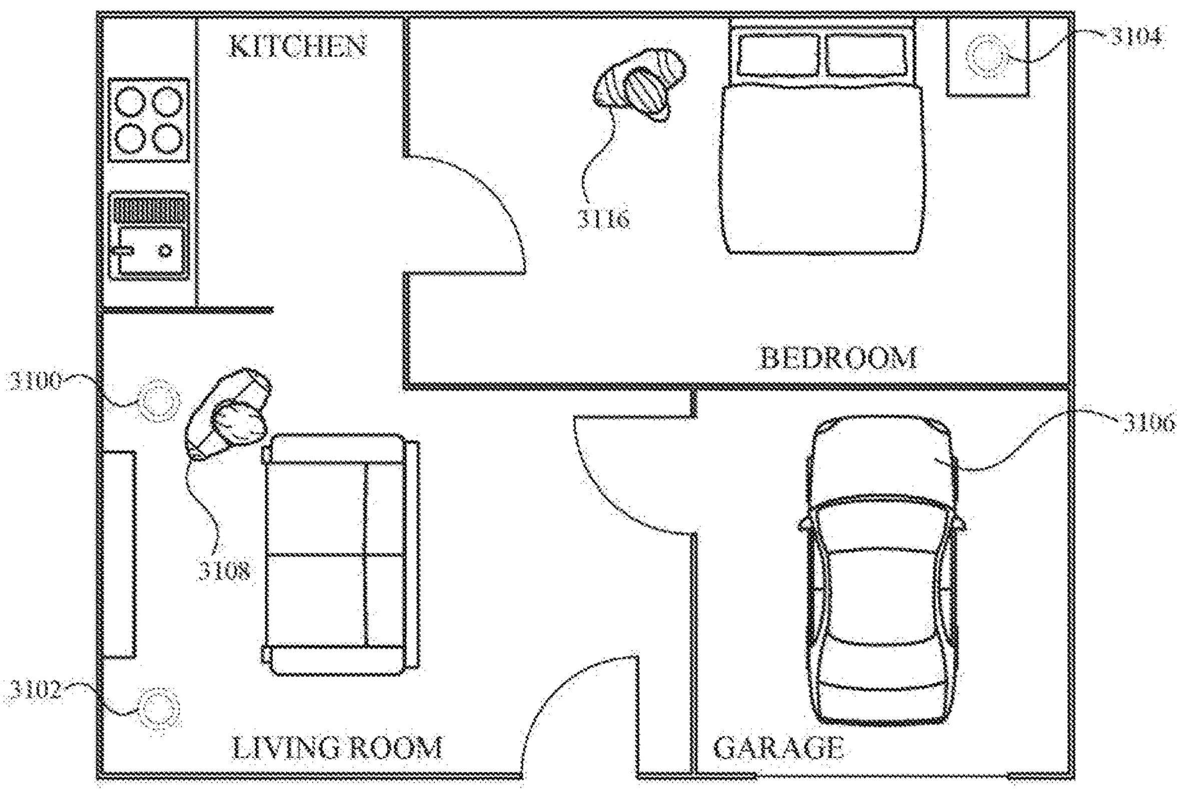
Figure 31M:
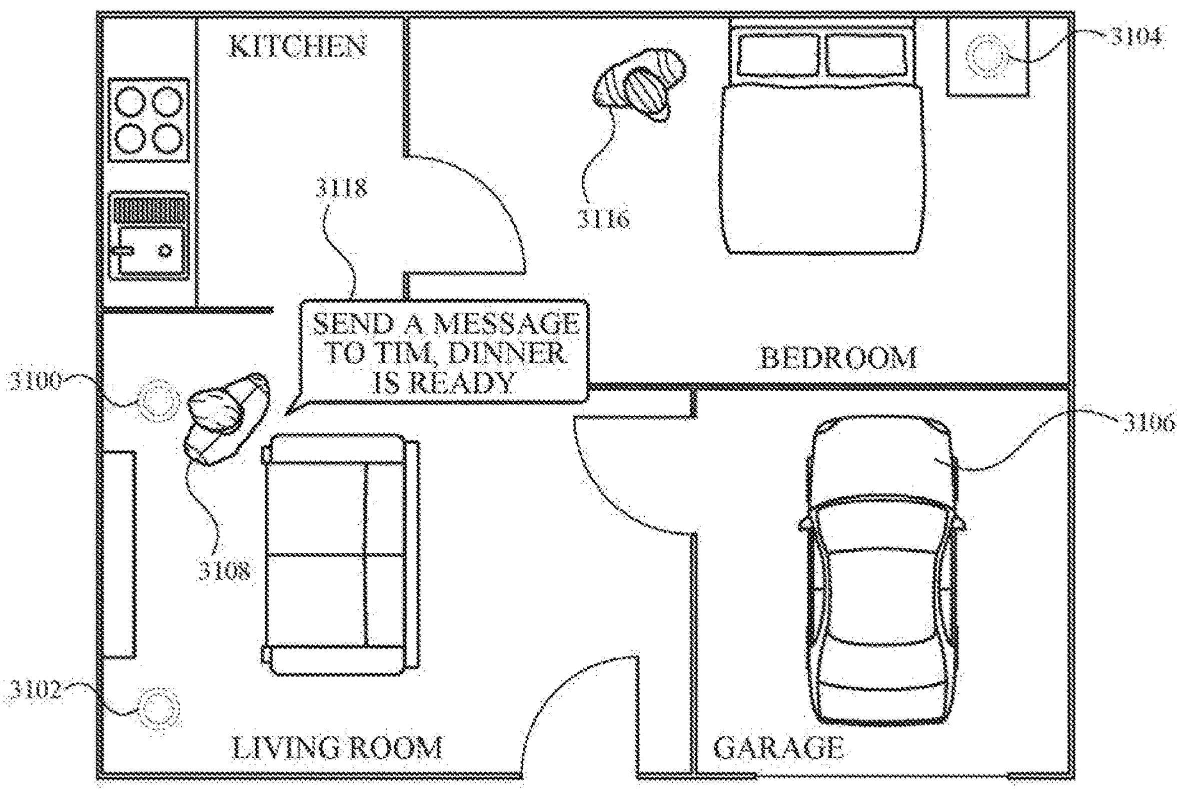

The first device (e.g., 3100) determines (3204) that a first user (e.g., 3108), associated with the first user account, is located within an audible output range (e.g., 3100A, 3102A, and/or 3104A) of a device of the set of devices. In some embodiments, an audible output range is independent for each device (or is not affected by whether there are other devices in the set of devices). For example, each device has an "fixed" proximity range, so a user (e.g., 3108) can be out of range of each device in a set of devices. In some embodiments, the audible output range of a device is relative or otherwise affected by other devices in the set of devices. For example, the user may always be within the audible output range of the closest (most proximate) device of the set (e.g., closest device responds, even if it is in the next room or 100 meters away; a shown in FIG. 31I). In some embodiments, the audible output range is the room that the device is located in (e.g., for a device located in a room that is correctly identified as being in the "Bedroom" in device settings, then a user is within the audible output range of the bedroom device (e.g., 3104) is present (physically located) in the Bedroom, as shown in FIG. 31H.);

In accordance with a determination that the first user (e.g., 3108) is within the audible output range of the first device (e.g., 3100), and in accordance with an occurrence of the audible output trigger event, the first device (e.g., 3100) outputs (3206) an audible output (e.g., 3110 as shown in FIG. 31C). For example, the first device outputs an audible tone for timer expiring, or outputs a received phone call.

Using a determination of whether the physical position of a user is within an audible output range of a device provides the user with an easy technique for receiving output from appropriately positioned devices without extraneous user inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the first user is within the audible output range of a second device (e.g., 3102 as shown in FIG. 31D), and in accordance with an occurrence of the audible output trigger event, the first device (e.g., 3100) forgoes outputting (3208) the audible output (e.g., 3100 does not output audible tone for timer expiring; as shown in FIG. 31D).

In some embodiments, the device (e.g., 3102) of the set of devices is a second device, and wherein outputting the audible output comprises transmitting (3210) an instruction to the second device (e.g., 3102) to output the audible output (e.g., 3110 as shown in FIG. 31D).

In some embodiments, outputting the audible output includes playing (3212) an audible tone (e.g., a sound, or voice dictation). In some embodiments, the device also outputs a visual output (e.g., using an LED or a display.).

In some embodiments, receiving the audible output trigger event comprises receiving (3214) user input representing configuration of the audible output trigger event (e.g., setting a timer, an alarm, or reminder; or setting up notification or phone call output settings).

In some embodiments, receiving the audible output trigger event comprises receiving (3216) data representing audible output settings associated with the first user account (e.g., whether to push one or more of: phone calls, text message notifications, email notifications, etc., to the first device (e.g., for audible output)).

In some embodiments, the audible output range of the first device is based on one or more of (3218): a detected physical proximity (e.g., distance) of the first device to the first user; a detected presence of the first user in the same room as the first device; and the output characteristics of the first device (e.g., speaker output power).

In some embodiments, determining that the first user is located within the audible output range of the device of the set of devices comprises one or more of the following (3220): detecting (3222), at the device (e.g., 3100), a voice associated with the first user (e.g., 3112 or 3114) (e.g., within a threshold time before the notification trigger event, indirectly (e.g., overhearing user), or directly (e.g., user interacts with device with a voice command)); detecting (3224), at the device, a third device (e.g., a personal device) associated with the user, wherein the third device is not a member of the set of devices (e.g., the device is the user's personal phone, and is not part of a group of stationary devices (e.g., devices 3100, 3102, and 3104)); and receiving a signal (3226), from an external sensor (e.g., a sensor on an external device, or a sensor on the device), representative of the first user being physically near the device (e.g., motion sensor, camera).

In some embodiments, subsequent to outputting the audible output (3228): in accordance with a determination that the first user (e.g., 3108) is within an audible output range of a fourth device (e.g., 3106) that is not a member of the set of devices (e.g., 3100, 3102, and 3104), and in accordance with an occurrence of the audible output trigger event, the first device (e.g., 3100) forgoes outputting (3228) the audible output. For example, the user has entered their car in the garage (e.g., which is connected to the set of devices), and the set of devices forgoes outputting the audible output even though the user is still be within range of a device of the set of devices.

In some embodiments, the first device (e.g., 3100) plays back media content. Further in accordance with a determination that the first user is within the audible output range of the fourth device (e.g., 3106) that is not a member of the set of devices, ceasing playback of the media content.

Note that details of the processes described above with respect to method 3200 (e.g., FIGS. 32A-32C) are also applicable in an analogous manner to the methods described below/above. For example, method 700, 900, 1100, 1300, 1500, 1700, 1800, 2000, 2200, 2400, 2600, 2800, 3000, 3400, 3600, 3800, and 3900 optionally includes one or more of the characteristics of the various methods described above with reference to method 3200. For brevity, these details are not repeated below.

FIGS. 33A-33G illustrate exemplary user interfaces for controlling media playback, in accordance with some embodiments. The user interfaces in these figures are used to illustrate the processes described below, including the processes in FIGS. 34A-34B.

Figure 33A:
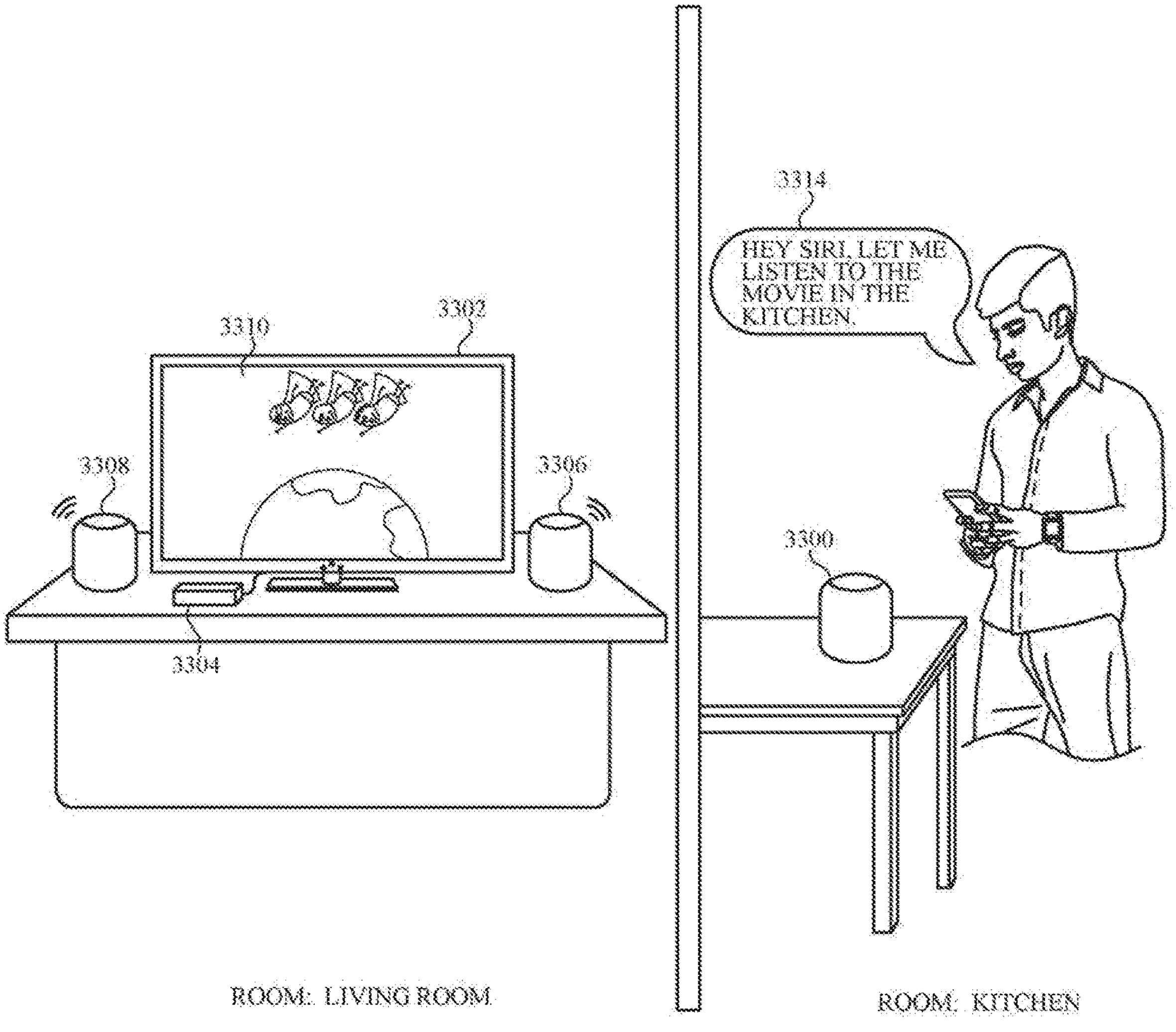
FIGS. 33A-33G illustrate exemplary techniques and user interfaces for controlling media playback in accordance with some embodiments.
Figure 33B:
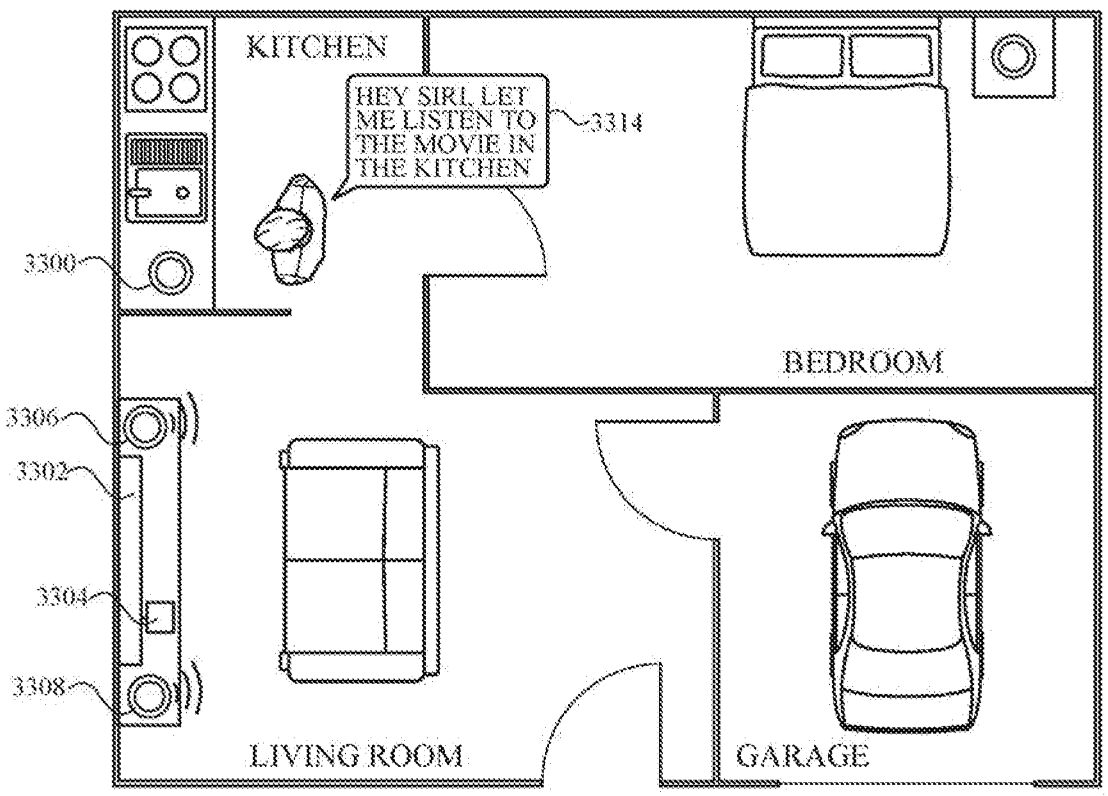
Figure 34A:
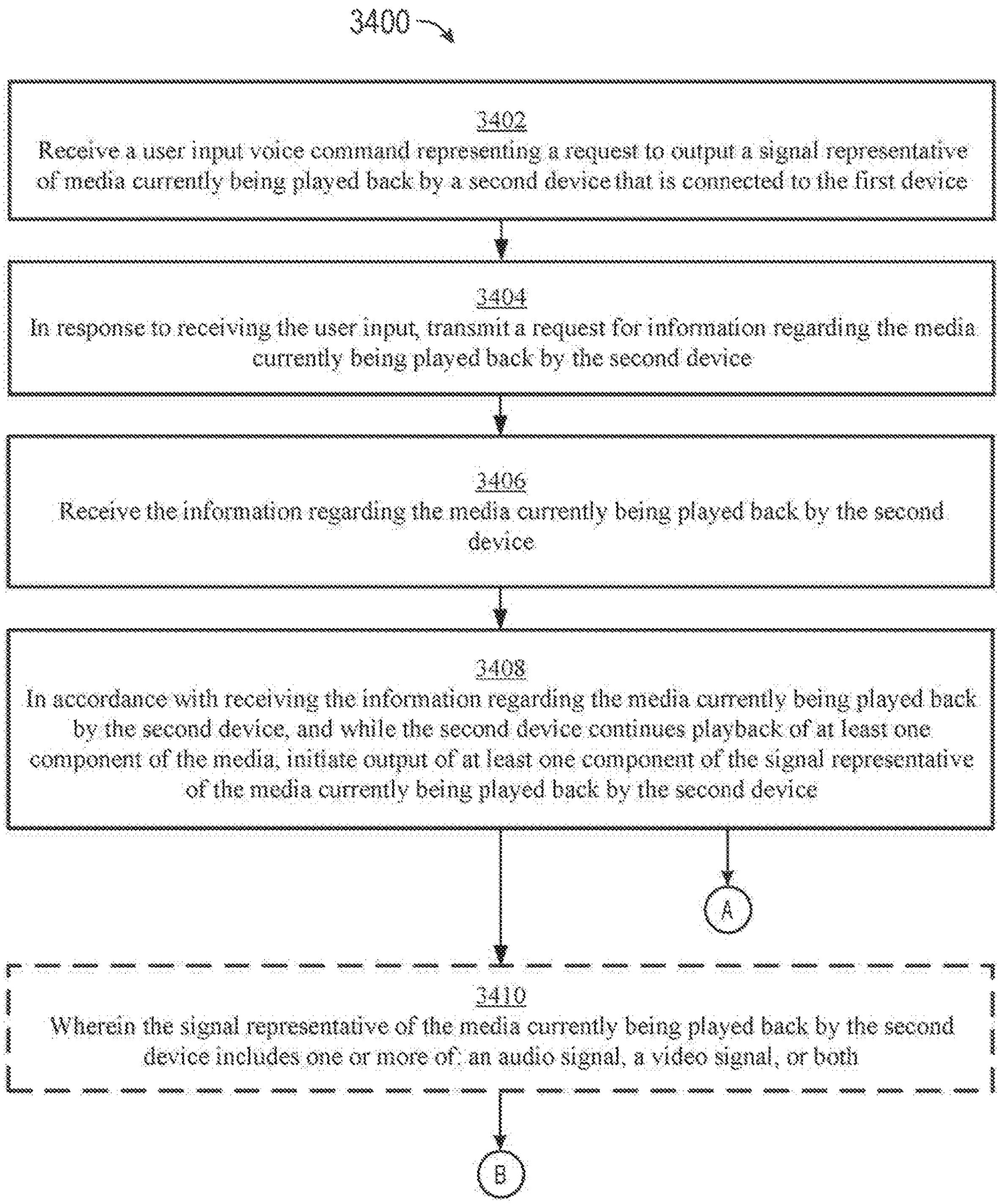
FIGS. 34A-34B is a flow diagram illustrating a process for controlling media playback in accordance with some embodiments.
Figure 34B:
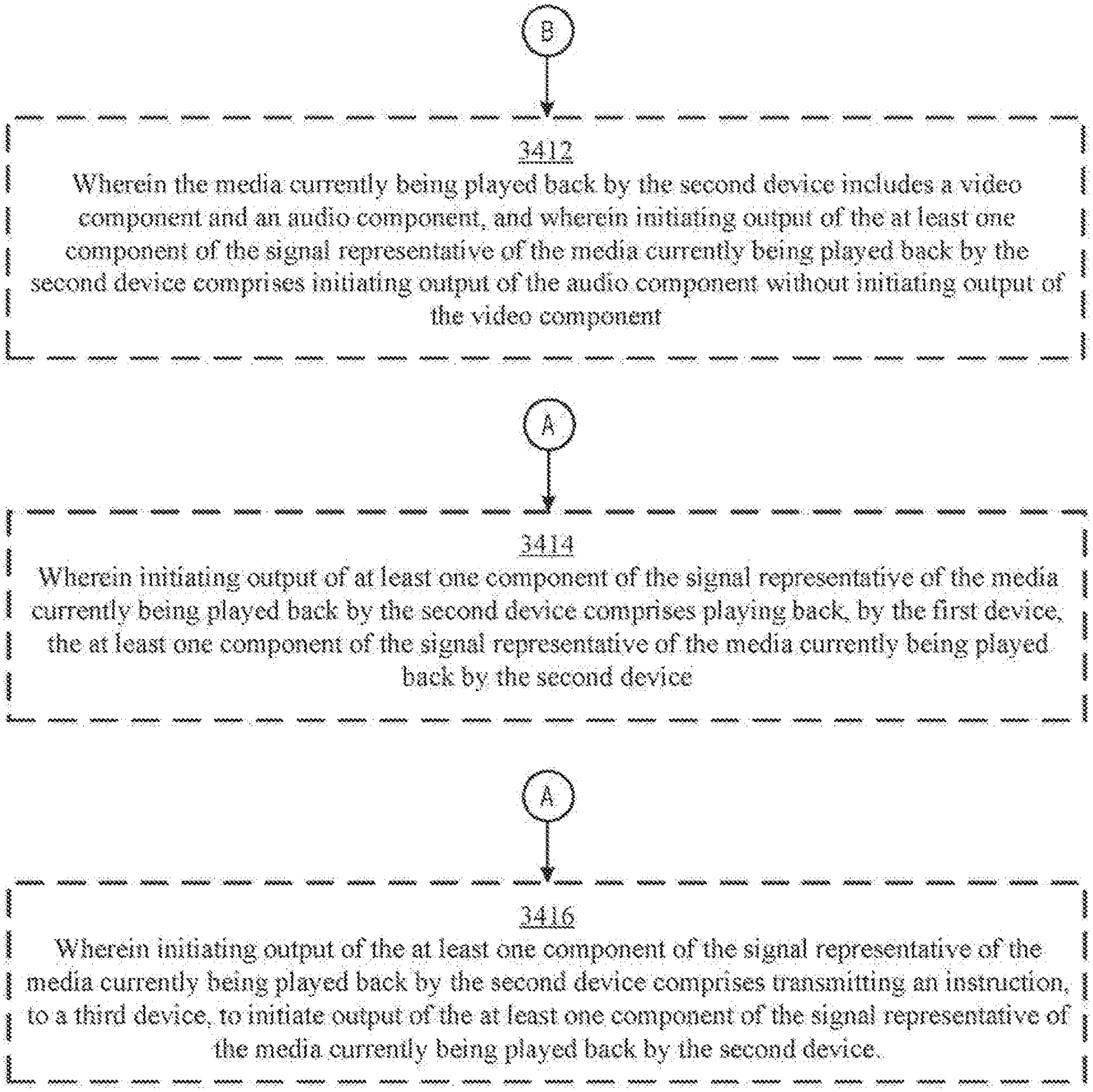

FIGS. 33A-33B illustrate an exemplary scenario that includes a plurality of connected devices, the plurality including a first device (e.g., 3300) that is not currently playing back media and a second device (e.g., 3304) that is currently playing back media. FIG. 33A depicts a home room named "Living Room" that includes: device 3302 (e.g., a television), device 3304 (e.g., a home media hub, such as an Apple TV), and devices 3306 and 3308 (e.g., smart speakers). FIG. 33A also depicts a home room named "Kitchen" that includes device 3300 (e.g., a smart speaker). In some embodiments, devices 3300, 3302, 3304, 3306, and 3308 each includes one or more features of devices 100, 300, 500, or 580. As shown, device 3302 is displaying a visual component (e.g., image 3310) representative of a media signal (e.g., a video) of media currently playing back on device 3304. Further, devices 3306 and 3308 are outputting an audio component (e.g., represented by sound waves 3312) representative of a media signal (e.g., audio) of the media currently playing back on device 3302. In this example, devices 3306 and 3308 are configured as a stereo pair of speakers, as described above. Thus, in the scenario of FIG. 33A, the interconnected living room devices (e.g., via media hub device 3304) are playing back video media content (e.g., a movie or television show), using device 3302 to output the video signal of the media and using devices 3306 and 3308 to output the audio signal of the media. Device 3300 is not currently part of the media playback session of device 3304, and is not currently outputting audio.

FIG. 33B illustrates an overhead view of the scenario of FIG. 33A, which depicts the following devices in the living room: device 3302, device 3304, device 3306 (currently outputting audio), and device 3308 (currently outputting audio). Device 3300 is shown in the kitchen.

As described above with respect to FIG. 6AH, in some examples a display device (e.g., device 3302) is itself playing back the media content (e.g., is a "smart" device), and in some examples it is used as a display by another device (e.g., device 3304)—both situations are intended to be within the scope of this disclosure. Thus, in this example, when reference is made to the device 3302 or device 3304 playing back media, either of these situations is intended to be within the scope of such disclosure, unless otherwise noted. Likewise, in some examples devices 3306 and 3308 access and/or stream audio content corresponding to the media session (e.g., are smart devices), and in some examples are used as regular speakers by (e.g., receive audio from) device 3302 or device 3304—both situations are intended to be within the scope of this disclosure.

Figure 33C:
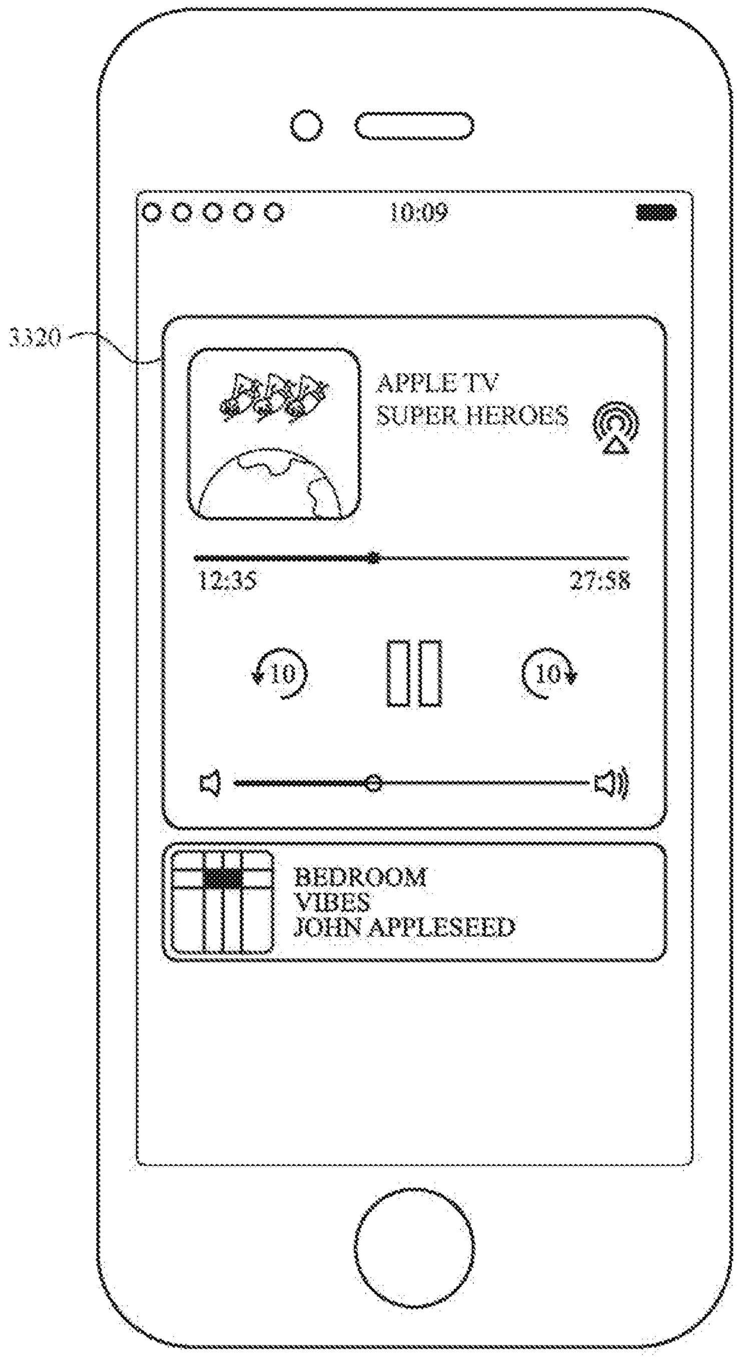

FIG. 33C illustrates an exemplary expanded media control interface for a device. As shown, expanded media interface 3320 graphically represents the scenario describe above with respect to FIGS. 33A and 33B—expanded media interface 3320 indicates that the "Apple TV" (e.g., device 3304) is currently playing back media (e.g., a movie named "Super Heroes"). In some embodiments, expanded media interface includes one or more of the features of expanded media control interface 609 of FIG. 6G.

A user may desire to listen to the media content, currently being played back by the living room devices, on a device (e.g., 3300) in the kitchen. In some embodiments, user input (e.g., voice input 3314) is received at a device (e.g., 3300) connected to the set of devices (e.g., 3302, 3304, 3306, and 3308) playing back media content (e.g., the movie "Super Heroes"). In some embodiments, in response to the user input, a new device (e.g., 3300) that is not currently part of the media session initiates output of a signal representative of the media. For example, user input received at any device that is connected to the living room devices (or is part of the living room set of devices) can be used to add the kitchen device 3300 to the "Super Heroes" media session that includes the living room devices. In some examples, the user input is voice user input. For instance, FIGS. 33A and 33B depict a user uttering the voice command "Hey Siri, let me listen to the movie in the kitchen". In this example, device 3300 receives the voice command.

Figure 33D:
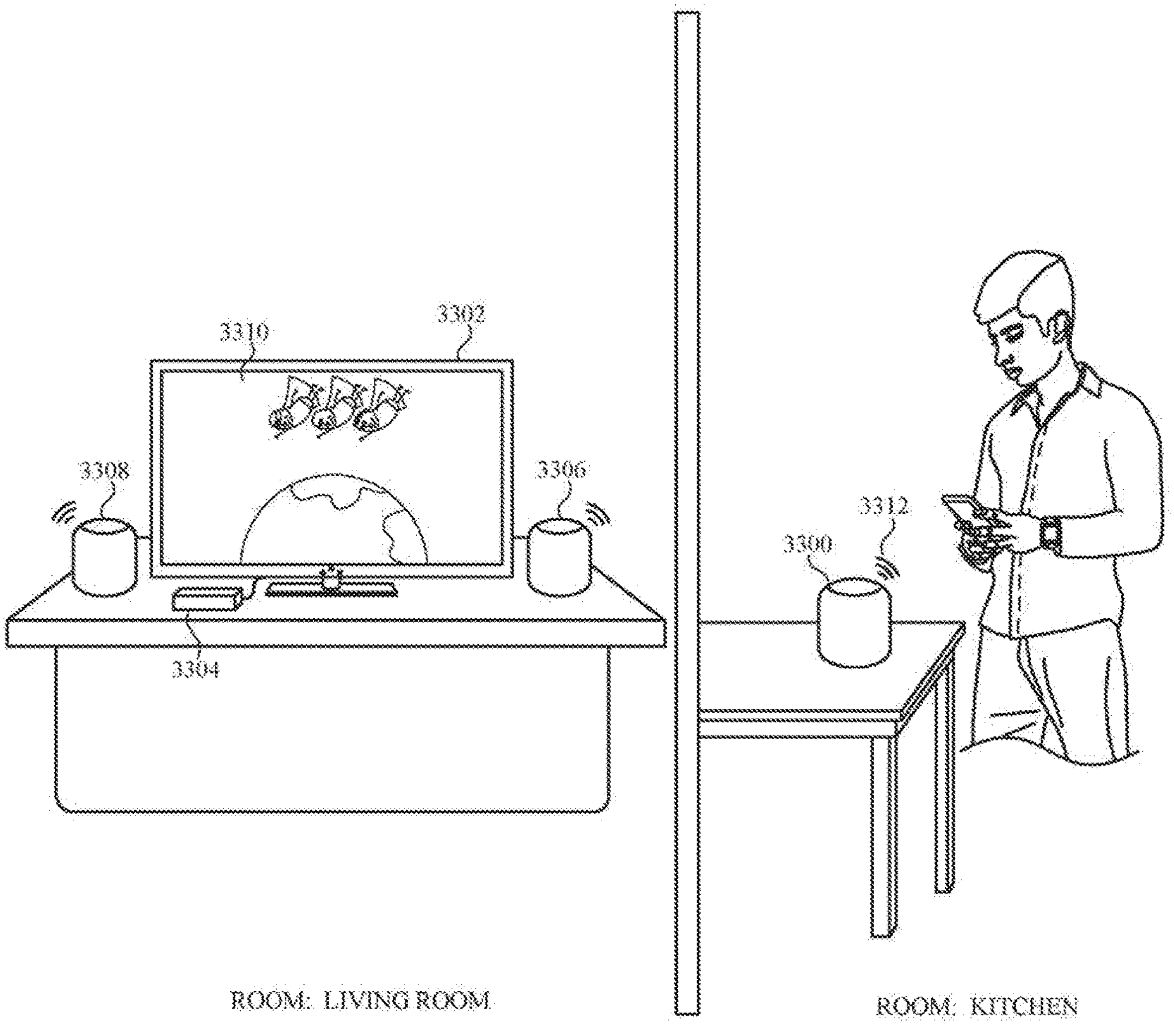
Figure 33E:
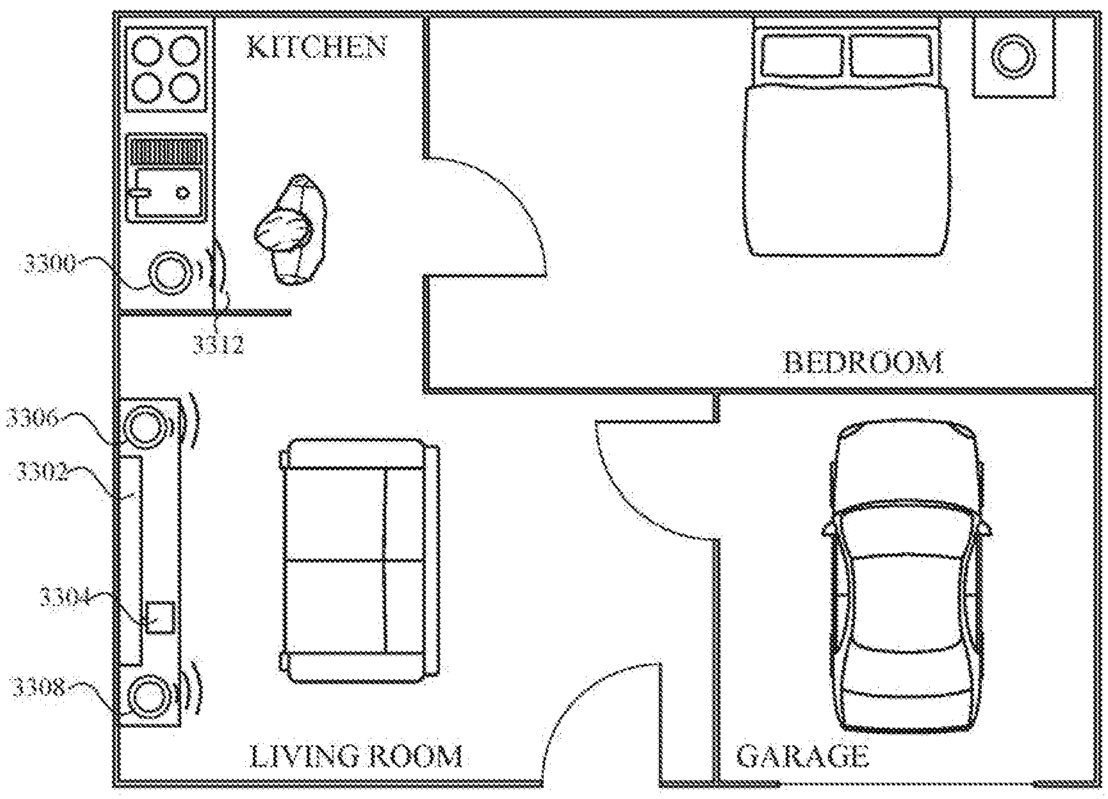

FIGS. 33D-33G illustrate exemplary techniques and interfaces for adding a new device to a media session in response to the user's utterance. FIGS. 33D and 33E depict the scenario of FIGS. 33A and 33B subsequent to device 3300 receiving voice user input 3314. As shown in FIGS. 33D and 33E, in response to user input 3314, device 3300 is now outputting audio (e.g., represented by sound waves 3312) representative of the media being played back by device 3304. In some embodiments, a device (e.g., device 3300) determines a target media session (e.g., the movie playing in the living room) and a target set of devices (e.g., one or more devices, such as device 3300) to add to the target media session. For example, if the user input is a voice user input, the input can be parsed to determine such information. In this example, in response to the voice input "Hey Siri, let me listen to the movie in the kitchen", device 3300 determined that the movie "Super Heroes" (e.g., the only movie currently playing back on a connected device in the user's home) was the target media, and that device 3300 (e.g., the only device in the kitchen) was the target set of devices (e.g., wherein a set of devices is one or more devices). Thus, kitchen speaker device 3300 initiates playback of the audio portion of the media session. In some embodiments, the user is prompted for further input. For example, if two different media sessions are concurrently playing back on different connected devices in the user's home, device 3300 may respond (e.g., using a text-to-speech output) with the prompt "Which movie would you like to listen to in the kitchen?"

Figure 33F:
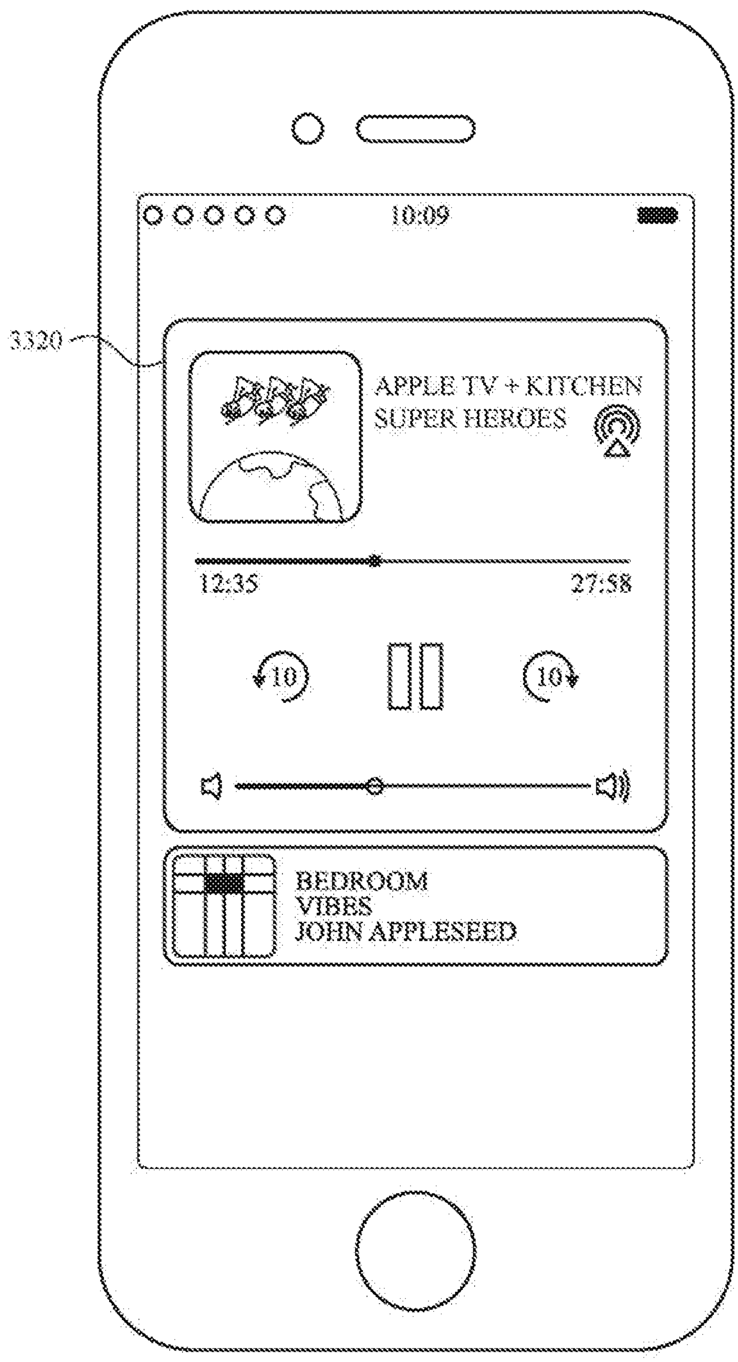

FIG. 33F illustrates expanded media interface 3320, which has been updated to reflect that the kitchen device 3300 has been added to the living room media session. Expanded media interface 3320 now indicates that the "Apple TV+Kitchen" devices (e.g., devices 3304 and 3300) are currently playing back media (e.g., a movie named "Super Heroes"). Alternatively, in some examples expanded media interface identifies all devices in the media session using room names (e.g., "Living Room+Kitchen").

In some embodiments, a signal representative of media includes a video component and/or an audio component. In some embodiments, a device initiates output of one or more of the video component and the audio component. For example, as described above, the audio portion of a media session was forwarded to a new device (e.g., 3300) in response to a user request. In some examples, a video portion of the media can be forwarded to a device in response to a user request (e.g., "Hey Siri, let me watch the movie on the display in the kitchen"). Likewise, in some examples, both the audio and video portions can be forward to a device (e.g., "Hey Siri, let me watch the movie in the home theater room.")

Figure 33G:
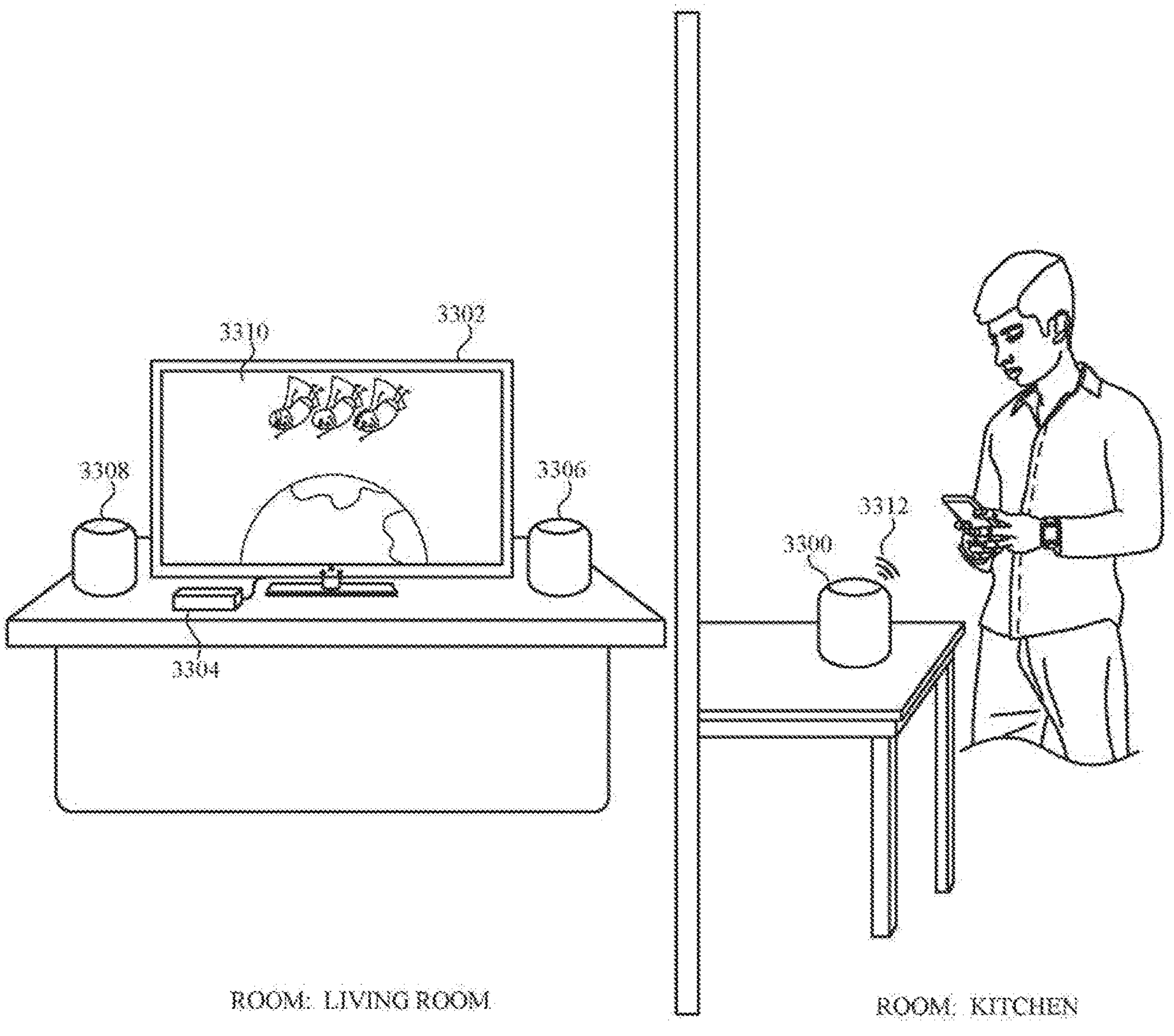

In some embodiments, a device (e.g., 3300), that is not a member of the set of devices (e.g., 3302, 3304, 3306, and 3308) currently playback back media, initiates output of a component of the media in response to a user input (e.g., 3314), and the set of devices ceases to output that portion. For example, FIG. 33G illustrates an alternative scenario to that depicted in FIG. 33D in which the kitchen device 3300 becomes the only output of audio for the media session in response to user input 3314. Thus, if a user is moving to the kitchen and no other users will be listening in the living room, the kitchen can become the lone source of audio output for the media session, but video will continue, for example, if the kitchen device does not include a display. In some embodiments, a device determines whether to cease output of the portion on the set of devices by determining whether any user remains in a room that includes the set of devices. In some embodiments, this behavior is predetermined based on a preconfigured setting (e.g., always cease output of audio when user asks to listen in another room, or do not cease output of audio when user asks to listen in another room). In some embodiments, a device prompts a user whether to cease output of a component by second device (e.g., 3306 and/or 3308) subsequent to initiating the component at the first device (e.g., 3300).

FIGS. 34A-34B is a flow diagram illustrating a method for controlling media playback using an electronic device in accordance with some embodiments. Method 3400 is performed at a device (e.g., 100, 300, 500, 580). Some operations in method 3400 are, optionally, combined, the order of some operations are, optionally, changed, and some operations are, optionally, omitted.

As described below, method 3400 provides an intuitive way for controlling media playback. The method reduces the cognitive burden on a user for controlling media playback, thereby creating a more efficient human-machine interface. For battery-operated computing devices, enabling a user to control media playback faster and more efficiently conserves power and increases the time between battery charges.

The electronic device (e.g., 3300) (also referred to as a "first device") receives (3402) a user input voice command (e.g., represented by voice input 3314) representing a request to output a signal (e.g., audio output 3312 of FIG. 33D) representative of media currently being played back by a second device (e.g., device 3302 or 3304 of FIG. 33A) that is connected to the first device (e.g., 3300). In some embodiments, the media includes at least an audio and/or video signal portion. In some embodiments, the media currently playing back on a second device includes media that the second device is playing by causing playback on one or more external device (e.g., on external speaker devices 3306 and 3308, and/or on external display 3302, as shown in FIG.

33A). In some embodiments, the first and second devices are connected via a wired or wireless connection (e.g., via Wi-Fi, Bluetooth, or the like).

In response to receiving the user input, the first device (e.g., 3300) transmits (3404) a request for information regarding the media currently being played back by the second device (e.g., 3302 or 3304). In some embodiments, the request is transmitted to the second device. In some embodiments, the request is transmitted to a device different than the second device. For instance, in some examples, the first device transmits the request to a primary device for the media session currently playing back on the second device. In some embodiments, the request is a request for one or more of: a media stream of the media, a location where the first device can stream the media from (e.g., a URL, a media service usable to access the media, login credentials for the media service, or the like), or an identification that the first device can use to locate a source of the media (e.g., identifying information of the media, such as a title, a unique number, or the like).

The first device (e.g., 3300) receives (3406) the information regarding the media currently being played back by the second device. For example, the second device (e.g., or a primary device for the media session that includes the second device) received the request, and in response, transmitted the information regarding the media to the first device.

In accordance with receiving the information regarding the media currently being played back by the second device, and while the second device continues playback of at least one component of the media, the first device (e.g., 3300) initiates (3408) output of at least one component (e.g., audio component and/or video component) of the signal representative of the media currently being played back by the second device (e.g., as shown in FIGS. 33D and 33E). In some embodiments, the media has an audio component and a video component. In some embodiments, continuing playback comprises the second device continuing to output one component (e.g., video) but ceasing to output the other component (e.g., audio). For example, the first device becomes the exclusive output of audio for the media session (e.g., as shown in FIG. 33G). In some embodiments, continuing playback comprises the second device continuing to output both audio and video components. For example, the first device becomes a supplemental source of audio output for the media session and the second device continues to output audio (e.g., as shown in FIGS. 33D and 33E).

Using a voice command to cause a device to initiate playback of a component representative of media currently playing back on another device, wherein the other device continues playing back a component representative of the media, provides the user an efficient user interface to manage the devices that are included in a media playback session that requires fewer user inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the signal representative of the media currently being played back by the second device includes (3410) one or more of: an audio signal, a video signal, or both.

In some embodiments, the media currently being played back by the second device (e.g., 3302 or 3304) includes a video component and an audio component, and initiating output of the at least one component of the signal representative of the media currently being played back by the second device comprises initiating output (3412) of the audio component without initiating output of the video component (e.g., as shown in FIG. 33D). In some embodiments, the first device (e.g., 3300) initiates output of the video component without initiating output of the audio component. In some embodiments, the first device initiates output of both the audio and video components.

In some embodiments, the second device (e.g., 3302 or 3304) continues playback of both the video component and the audio component subsequent to the first device initiating output of the at least one component of the signal (e.g., as shown in FIG. 33D).

In some embodiments, the second device (e.g., 3302 or 3304) continues playback of the video component and ceases playback of the audio component subsequent to the first device initiating output of the at least one component of the signal (e.g., as shown in FIG. 33G).

In some embodiments, initiating output of at least one component of the signal representative of the media currently being played back by the second device comprises playing back (3414), by the first device (e.g., 3300), the at least one component of the signal representative of the media currently being played back by the second device (e.g., 3302 or 3304). For example, the first device 3300 receives the user input voice command 3314 and, in response, begins output of the audio component of the media session.

In some embodiments, initiating output of the at least one component of the signal representative of the media currently being played back by the second device comprises transmitting an instruction (3416), to a third device (e.g., connected to the first device), to initiate output of the at least one component of the signal representative of the media currently being played back by the second device. For example, the first device 3300 receives the user input voice command 3314 and, in response, causes a third device to output the audio component of the media session. For instance, the third device can be one or more personal listening device, such as headphones. In some examples, the third device does not include the ability to process the user input (e.g., the third device does not include a microphone) but the user requests that output begin on the third device—thus, the first device receives the user input, but causes output on (e.g., provides a media stream to) the third device. In some embodiments, the first and third devices are connected via a wired or wireless connection (e.g., Bluetooth, or the like).

In some embodiments, the media currently being played back by the second device is being played back in a first natural language (e.g., English), and transmitting the instruction, to the third device, to initiate output of the at least one component of the signal representative of the media currently being played back by the second device comprises transmitting an instruction to initiate output of the at least one component of the signal being played back by the second device in a second natural language (e.g., Spanish) different than the first natural language. For example, the first device causes the third device (e.g., headphones) to output audio (e.g., movie dialogue) in a different language. Thus, for example, when one or more users are watching a movie in a first language, another user can concurrently watch the same movie and while listening to audio in another language using headphones.

In some embodiments, the user input voice command (e.g., 3314) is a first user input, and the first device (e.g., 3300) receives a second user input representing a playback control command. For example, as described above, a playback control command is a command for controlling media playback such as pause, next track, seek, or the like. In response to receiving the second user input, the first device (e.g., 3300) transmits the playback control command to the second device (e.g., 3304). For example, if the first device is not a primary device for the media session and the second device (e.g., 3302 or 3304) is the primary device, the first device forwards the playback control command to the primary device for processing. In some embodiments, the first device forgoes performing the playback control command. In some embodiments, the first device subsequently receives an instruction from the second device to perform the playback command. For example, the second device processes the playback control command and transmits an instruction to the first device to alter playback in accordance with the command. In some examples, relying on the primary device for processing of a command helps maintain synchronization between the devices in the media session when the first device is independently streaming the content (e.g., synchronizing whether to perform a responsive action, the timing of a responsive action, etc.). That is, when the second device is not providing a media stream to the first device, the first and second devices must coordinate their action responsive to the playback control command—otherwise, media playback on each device my become unsynchronized, which is undesirable for users.

In some embodiments, receiving the information regarding the media currently being played back by the second device comprises receiving one or more of: an identifier of the media (e.g., so the first device can determine if it has access to the media), a location where the signal representative of the media is accessible (e.g., a location or media streaming service, a URL, or the like), and a media stream of the signal representative of the media (e.g., the second device provides media stream to the first device). In some embodiments, the first device receives the information (e.g., an audio stream) from the second device. In some embodiments, the first device receives the information from a fourth device, different than the second device.).

In some embodiments, receiving the information regarding the media currently being played back by the second device comprises the first device (e.g., 3300) receiving, from a fourth device (e.g., 3308), a media stream of the at least one component of the signal representative of the media the media currently being played back by the second device. For example, a fourth device (e.g., a primary device to the second device, or a device close to the first device that is part of the media session), can provide an audio stream to the first device of the media currently playing back on the second device. In some embodiments, the first device receives the information regarding the media from the fourth device.

Note that details of the processes described above with respect to method 3400 (e.g., FIGS. 34A-34B) are also applicable in an analogous manner to the methods described below/above. For example, method 700, 900, 1100, 1300, 1500, 1700, 1800, 2000, 2200, 2400, 2600, 2800, 3000, 3200, 3600, 3800, and 3900 optionally includes one or more of the characteristics of the various methods described above with reference to method 3400. For brevity, these details are not repeated below.

FIGS. 35A-35J illustrate exemplary user interfaces for managing playback of media on a set of devices, in accordance with some embodiments. The user interfaces in these figures are used to illustrate the processes described below, including the processes in FIGS. 36A-36C.

Figure 35A:
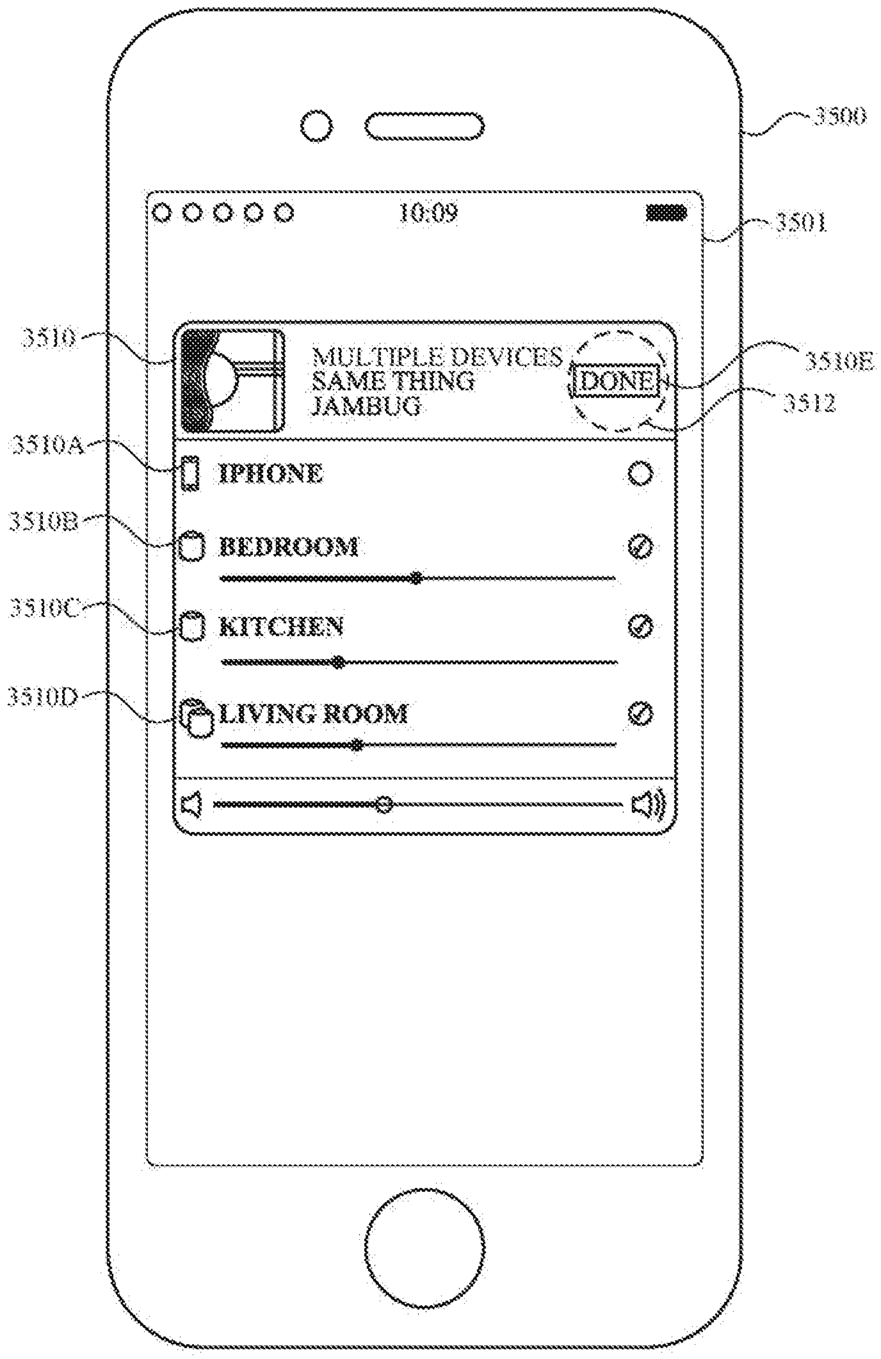
FIGS. 35A-35J illustrate exemplary techniques and user interfaces for managing media playback in accordance with some embodiments.
Figure 36A:
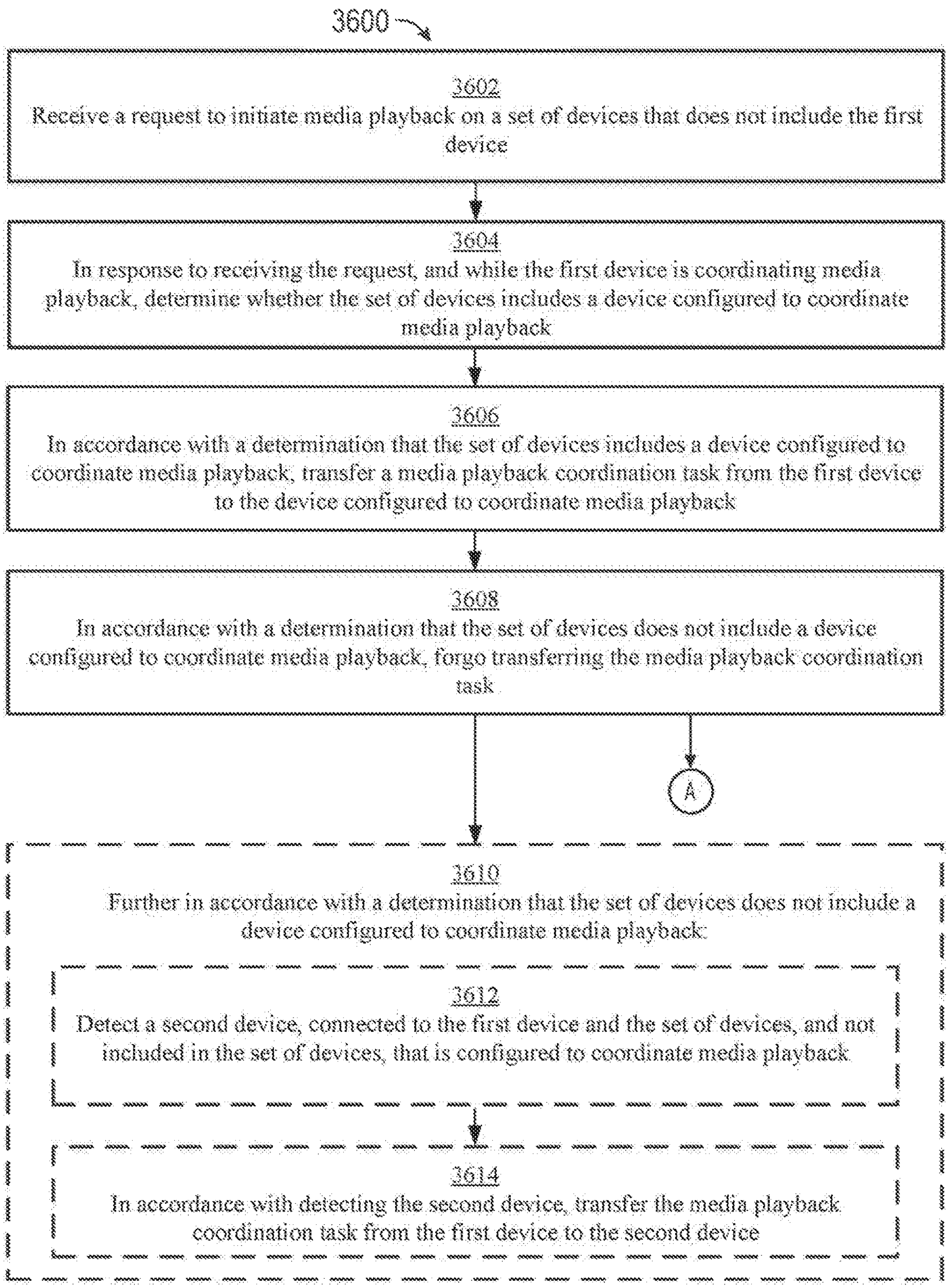
Figure 36B:
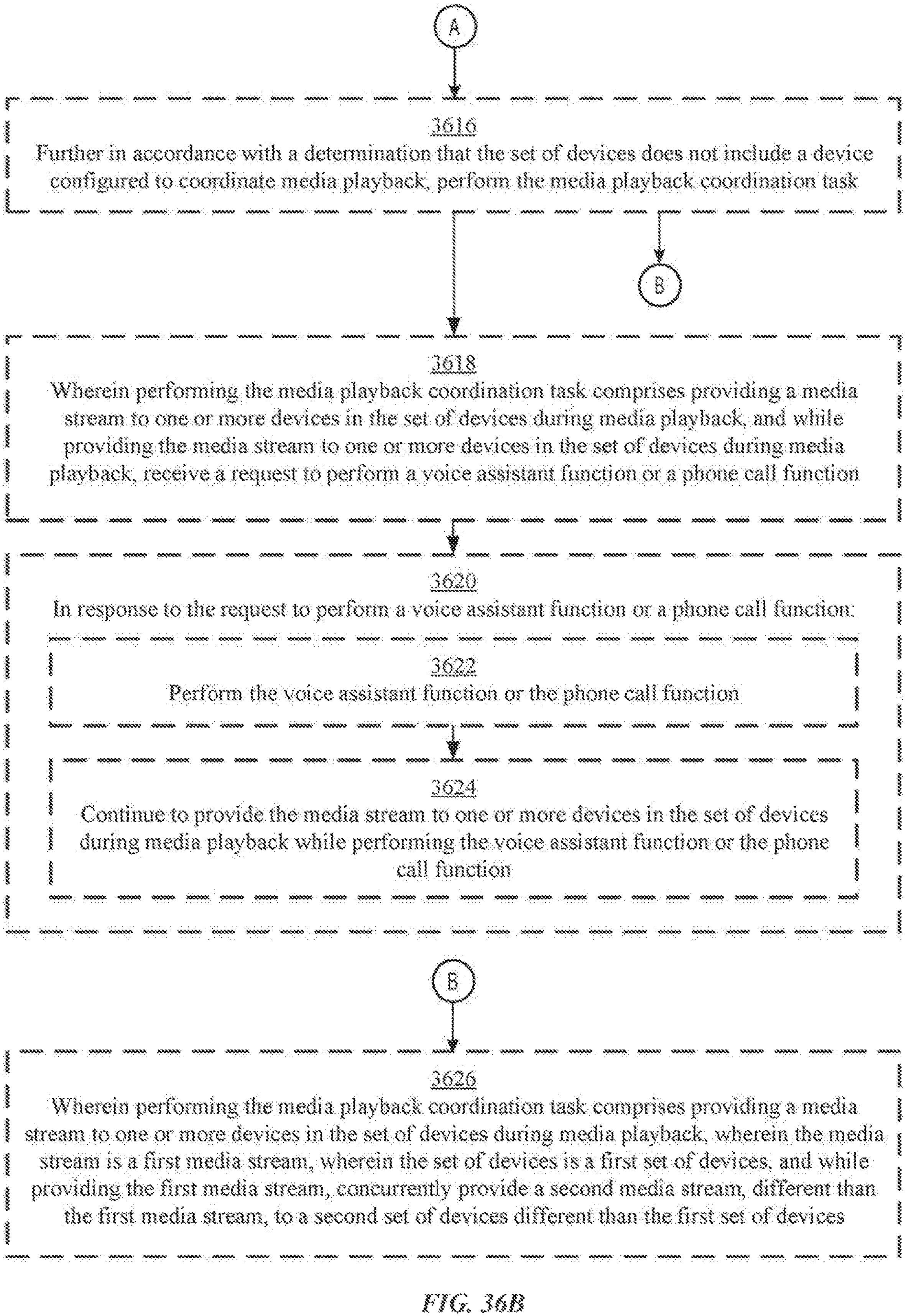

FIG. 35A illustrates an exemplary multi-device interface. As shown, device 3500 displays, on display 3501, a multi-device interface 3510. In some embodiments, device 3500 includes one or more features of device 100, 300, 500, or 580. In some embodiments, multi-device interface 3510 includes one or more of the features of multi-device interface 610, for example as described above with respect to FIG. 6J. As shown, indicators for the devices in the following rooms are selected "Bedroom" (e.g., indicator 3510B), "Kitchen" (indicator 3510C) and "Living Room" (indicator 3510D) (e.g., which corresponds to two devices, a stereo pair). The indicator (3510A) for the iPhone (e.g., device 3500) is unselected. While indicators 3510B-3510D are selected, device 3500 receives user input 3512, representing selection of the done affordance 3510E. Thus, the user wishes begin a media session that includes playback the media item titled "Same Thing" on the set of devices in the Bedroom, Kitchen, and Living Room.

Figure 35B:
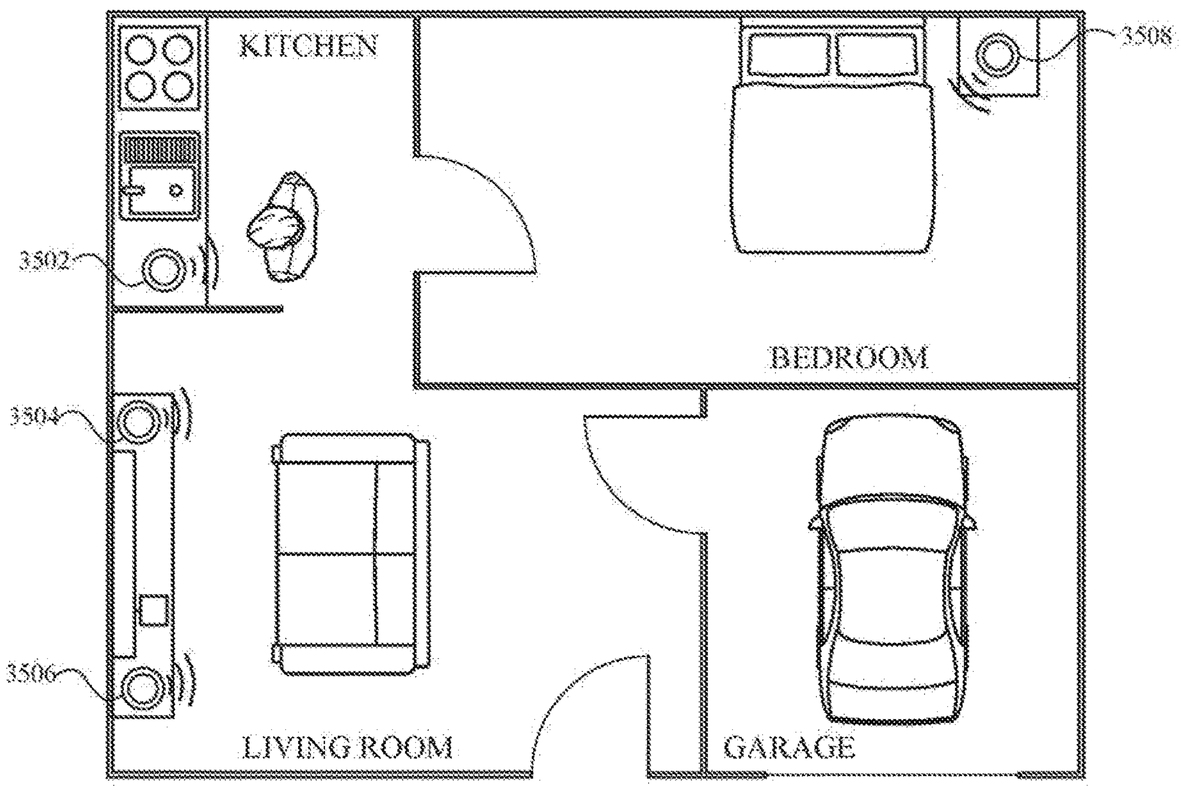

FIG. 35B illustrates an exemplary overhead view of a user's home subsequent to device 3500 receiving user input 3512. As shown, in response to the user input, the selected devices are currently playing back media (represented by the sound waves emanating from the devices): device 3502 (in the Kitchen), devices 3504 and 3506 (in the Living Room), and device 3508 (in the Bedroom). In some embodiments, devices 3502, 3504, 3506, and 3508 each includes one or more features of device 100, 300, 500, or 580.

In some embodiments, a device (e.g., 3500) receives user input (e.g., 3512) requesting playback on a set of devices (e.g., 3502, 3504, 3506, and 3508) that does not include the device. As shown in FIG. 35A, device 3500 receives user input 3512 representing a request to initiate playback on devices 3502, 3504, 3506, and 3508. Thus, in this example, the device that received the request is not a device that will be playing back the requested media. In some embodiments, the device (e.g., 3500) that received the request but that is not included in the set of devices (e.g., of the media session) determines whether it can hand off media coordination responsibility to another device. FIGS. 35C-35J illustrate exemplary techniques for doing so.

Figure 35C:
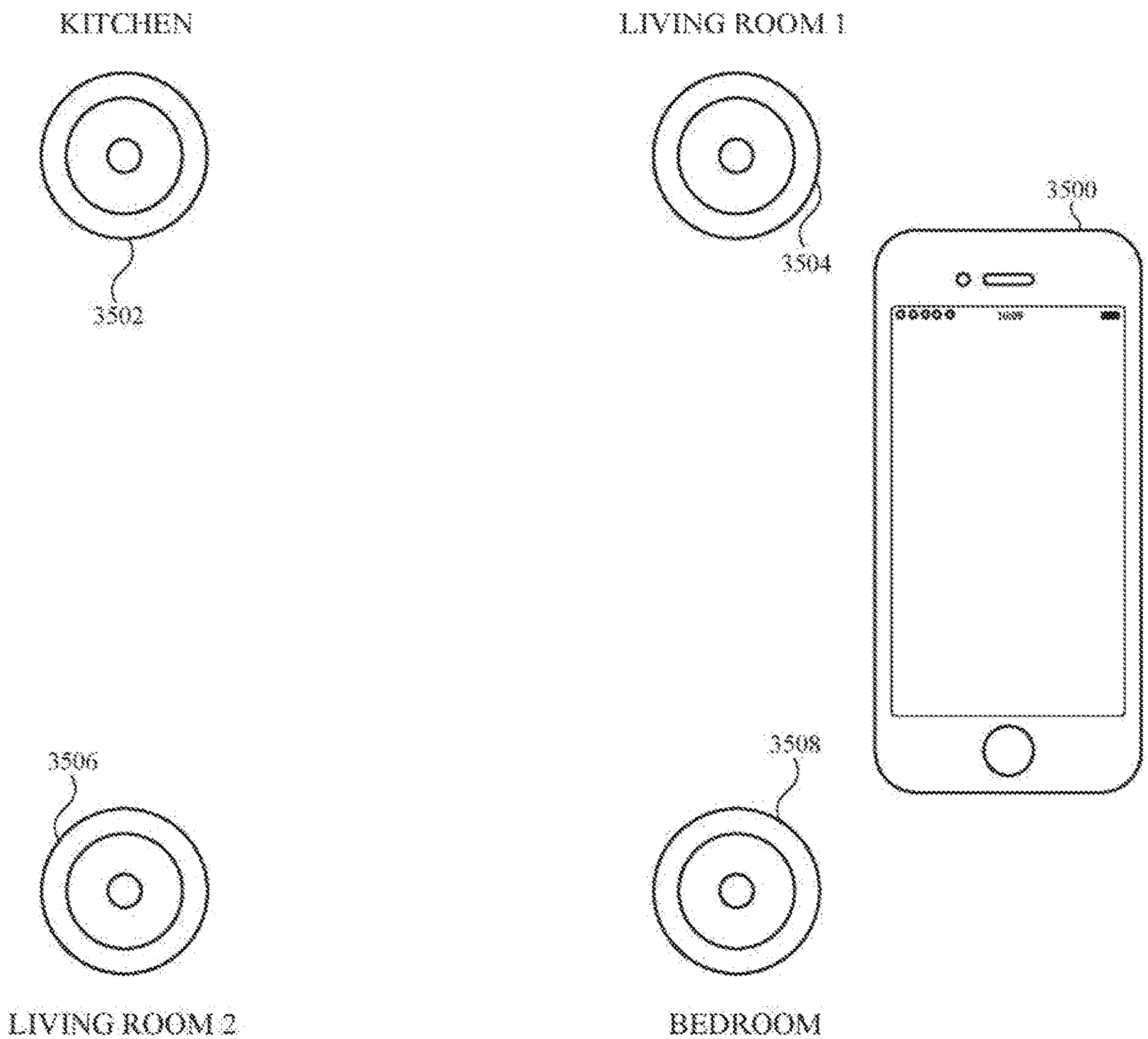

FIG. 35C illustrates a simplified depiction of the scenario of FIG. 35B, prior to device 3500 receiving the user input 3512 (e.g., thus, the set of devices are depicted as not currently playing back media). In some embodiments, in response to receiving user input (e.g., 3512) requesting media playback on a set of devices (e.g., 3502, 3504, 3506, and 3508), a device (e.g., 3500) determines whether the set of devices includes a device that is configured to coordinate media playback (e.g., configured to act as a primary device for the media session).

Figure 35D:
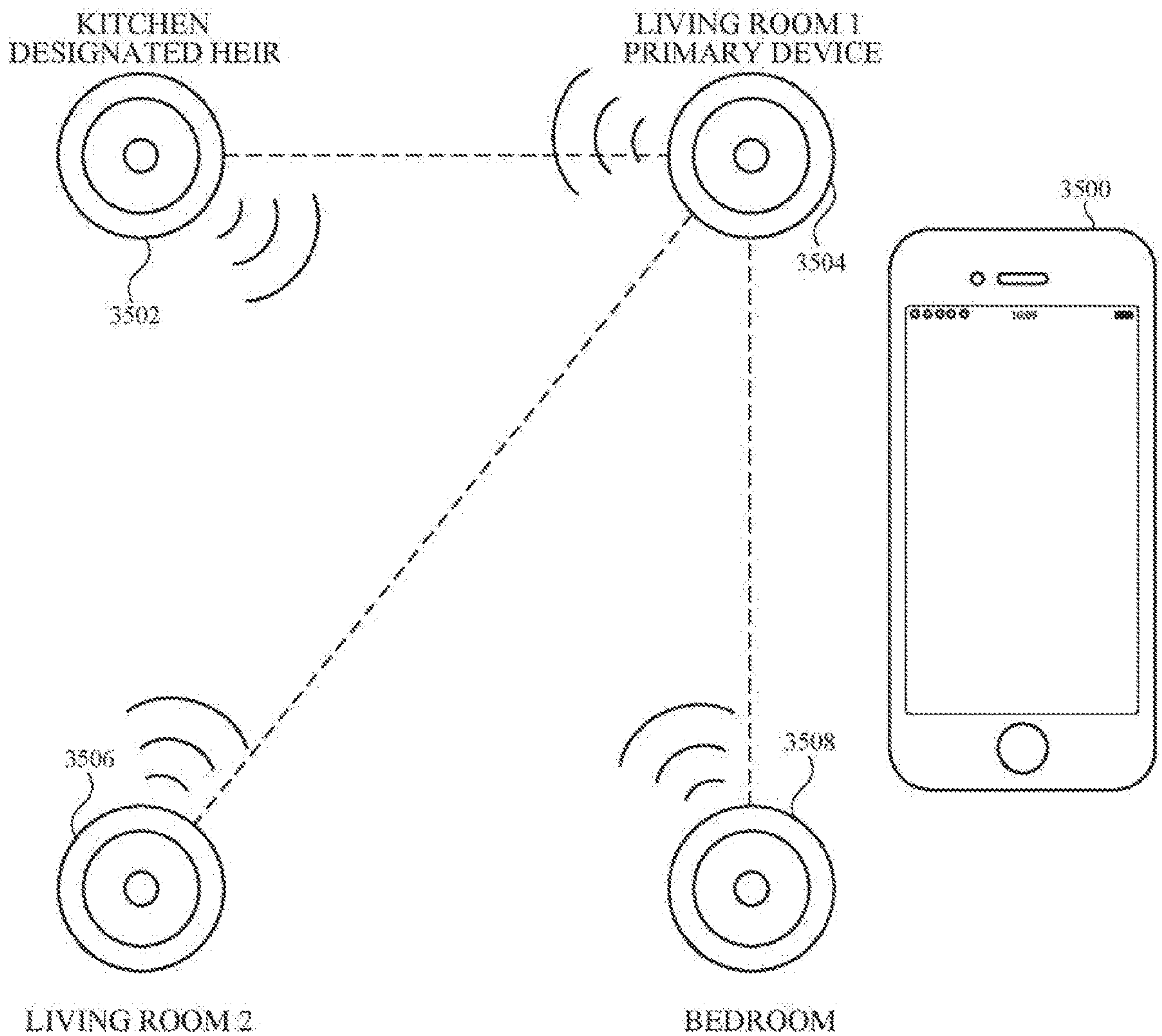

FIG. 35D illustrates an exemplary scenario in which a set of devices includes a device configured to coordinate media playback. As shown, device 3504 is selected to be the primary device for the media session (e.g., playback of the media item "Same Thing") on the set of devices (e.g., 3502, 3504, 3506, and 3508). Thus, for example, device 3504 provides a media stream to each of the other devices in the set (e.g., as depicted by the dotted lines). In some embodiments, the device (e.g., 3500) selects the primary device (e.g., 3504). In some embodiments, the device (e.g., 3500) selects a designated heir (e.g., 3502) to the primary device (e.g., 3504). As shown, device 3502 is selected as the designate heir to device 3504 (e.g., and will take over as primary device if device 3504 becomes unavailable). Thus, in the example of FIG. 35D, the set of devices included device 3504 capable of acting as a primary device, and so the first device 3500 handed over media playback coordination responsibility (e.g., one or more tasks) to that device. In some embodiments, the device (e.g., 3500) selects the primary device (e.g., 3504), which, in turn, selects the designated heir (e.g., 3502). In some embodiments, a separate device (e.g., a server) selects the primary device (e.g., 3504) and/or the designated heir (e.g., 3502).

Figure 35E:
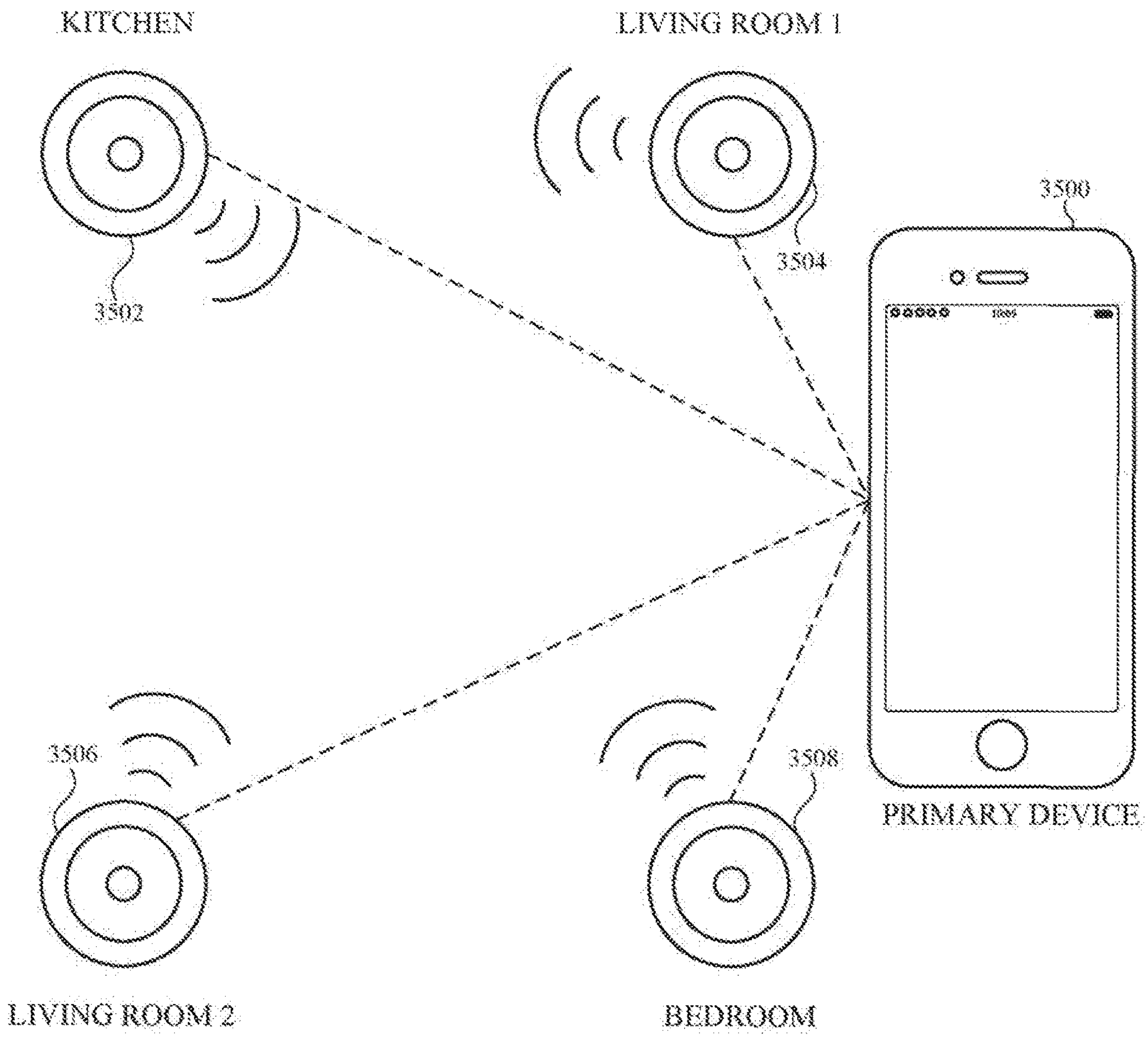

FIG. 35E illustrates an exemplary scenario in which a set of devices does not include a device configured to coordinate media playback. In the example of FIG. 35E, the set of devices does not include a device that is configured to coordinate media playback on the set of devices. For example, the set of devices does not include a device capable of (e.g., limited by hardware or software) acting as a primary device. As shown, device 3500 is the primary device for the media session (e.g., playback of the media item "Same Thing") on the set of devices (e.g., 3502, 3504, 3506, and 3508). Thus, for example, in response to user input 3512, device 3500 retains responsibility as the primary device for the media session on the set of devices, and provides a media stream to each of the other devices in the set (e.g., as depicted by the dotted lines).

Figure 35F:
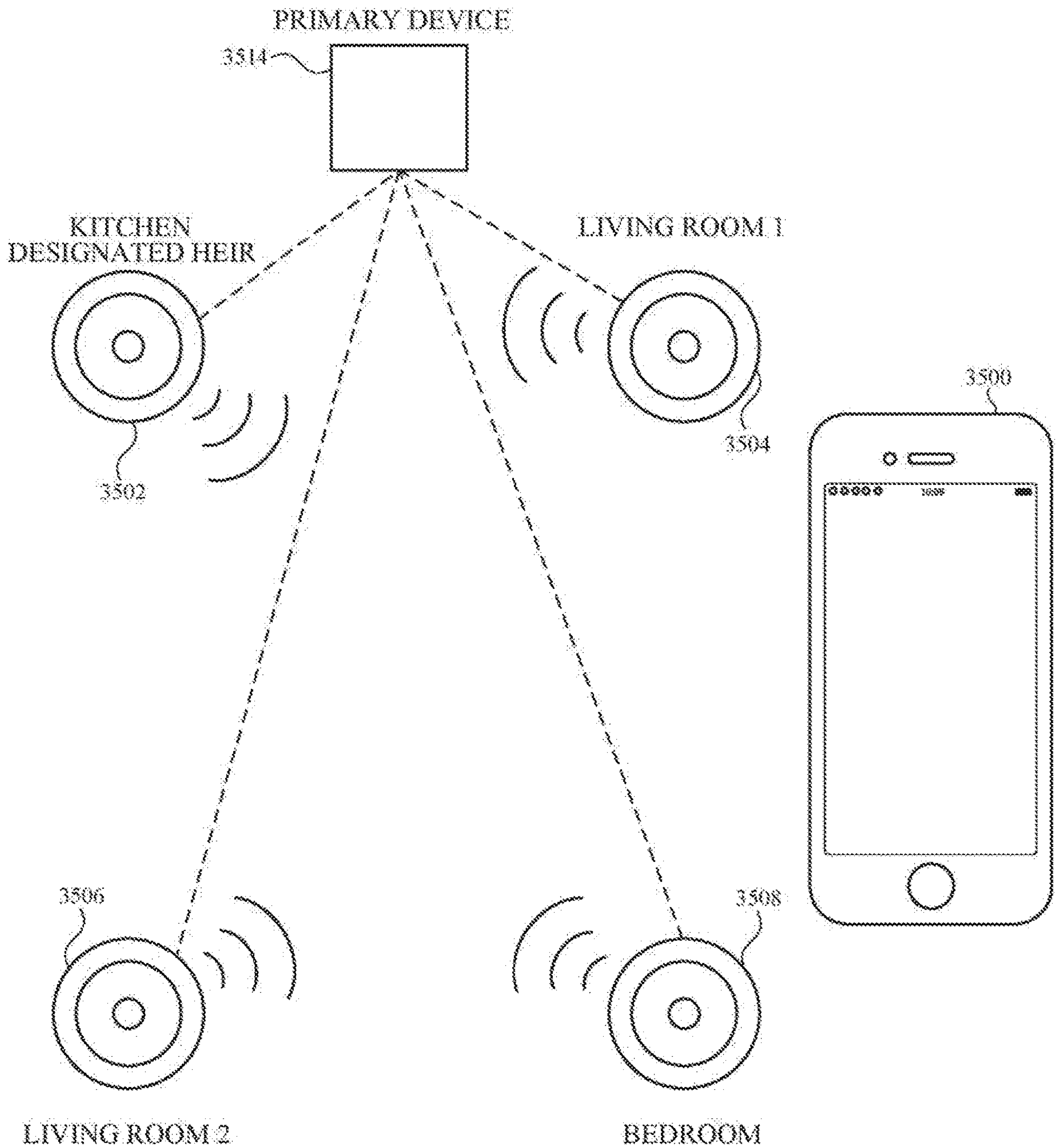

FIG. 35F illustrates an exemplary scenario in which another device (e.g., 3514), not included in the set of devices and not the device that received the request to initiate media playback, is selected as a primary device for a media session on a set of devices. In some embodiments, the device (e.g., 3500) transfers a media playback coordination task to another device (e.g., 3514) that is not in the set of devices (e.g., 3502, 3504, 3506, and 3508). As shown, device 3514 (e.g., a home media hub, such as an Apple TV) is the primary device for the media session (e.g., playback of the media item "Same Thing") on the set of devices (e.g., 3502, 3504, 3506, and 3508). Thus, for example, device 3514 provides a media stream to each of the devices in the set (e.g., as depicted by the dotted lines). A device other than the first device and not included in the set of devices can serve as a primary device even if the set of devices includes a device configured to coordinate media playback. For instance, in the example of FIG. 35F, the set of devices includes a device 3502 that is configured to coordinate media playback on the set of devices. However, device 3502 is a designated primary. In some embodiments, a device not included in the set (e.g., device 3514) is better suited to perform media playback coordination tasks, and thus becomes the primary device over a device in the set (e.g., device 3502). In some examples, the set of devices does not include a device capable of acting as a primary device (e.g., is limited by hardware or software), and thus another device such as device 3514 becomes the primary device (similar to the example in FIG. 35F, but device 3502 would not be a designated heir).

Figure 35G:
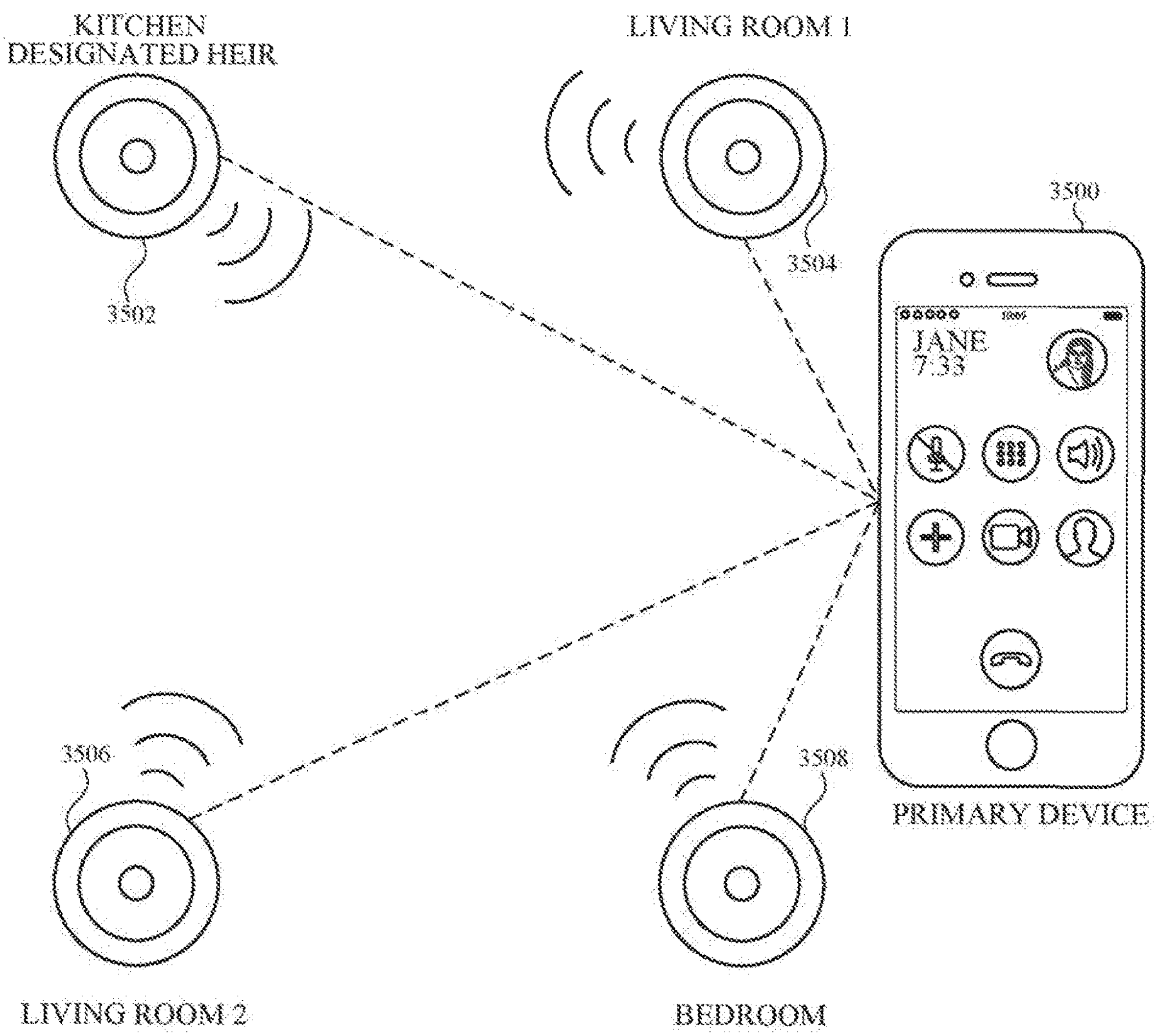

In some embodiments, a device (e.g., 3500) performs a voice assistant function while concurrently providing a media stream to a set of devices (e.g., 3502, 3504, 3506, and 3508). In some embodiments, a device (e.g., 3500) performs a phone call function while concurrently providing a media stream to a set of devices (e.g., 3502, 3504, 3506, and 3508). FIG. 35G illustrates an exemplary device (e.g., 3500) performing a phone call function while providing a media stream to a set of devices. As shown, device 3500 displays a phone call interface, indicating that the device is currently performing a phone call function. While performing the phone call function, device 3500 is also concurrently acting as primary device for the set of devices (e.g., which continue to play back media, as indicated by the sound waves outputted from each device) and providing a media stream (e.g., as depicted by the dotted lines). Thus, a device performing primary device responsibilities can, in some examples, continue to perform other functions while acting as a primary device (e.g., and providing a media stream to other devices).

Figure 35H:
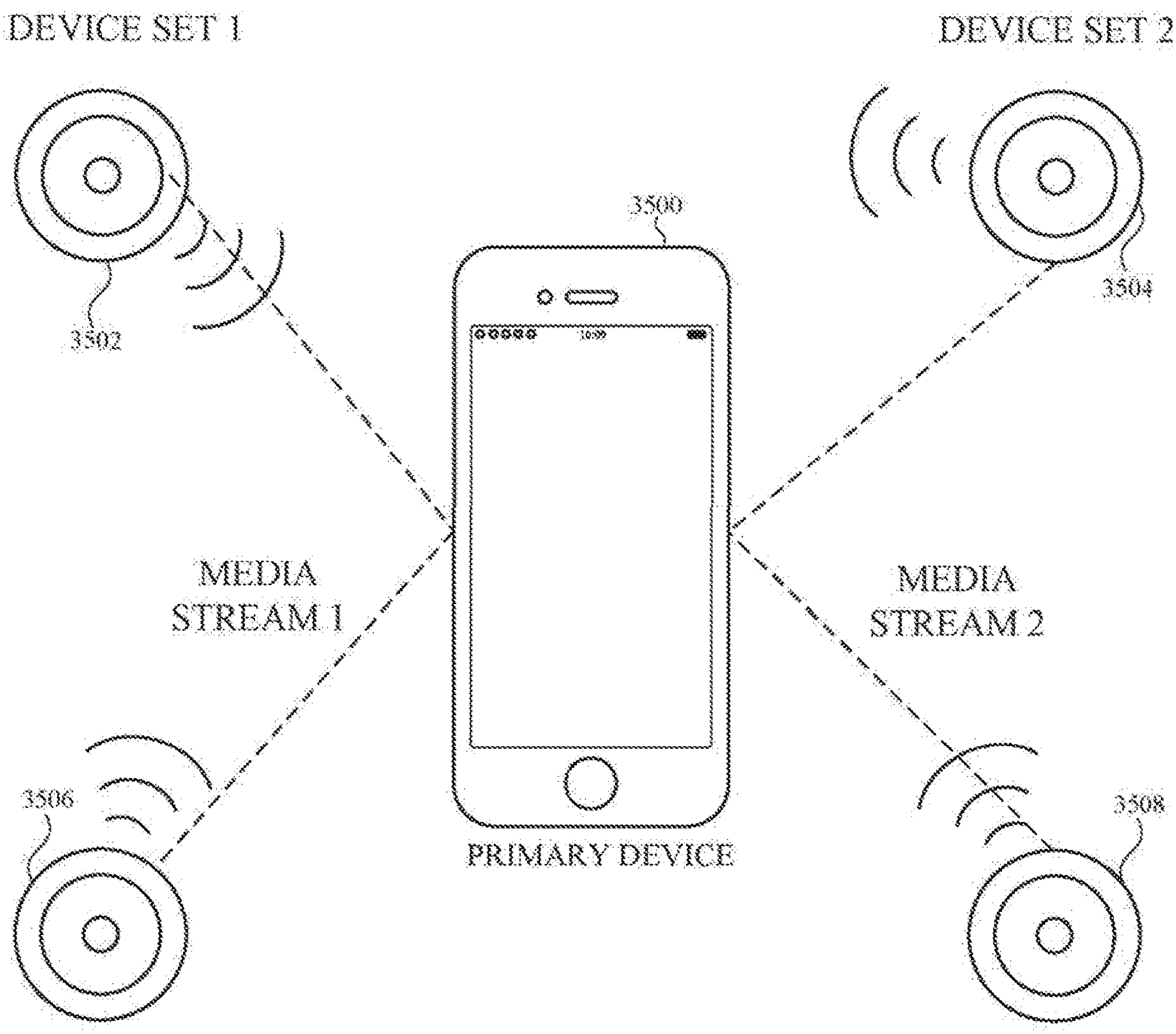

In some embodiments, a device (e.g., 3500) provides a plurality of different media streams concurrently. FIG. 35H illustrates an exemplary scenario in which a device (e.g., 3500) concurrently provides a plurality of different media streams. As shown, device 3500 is acting as primary device for two different sets of devices. Device Set 1 includes device 3502 and device 3506, and device 3500 provides the devices in Device Set 1 with a first media stream ("Media Stream 1") of first media (e.g., a first song). Device Set 2 includes device 3504 and device 3508, and device 3500 provides the devices in Device Set 2 with a second media stream ("Media Stream 2") of second media (e.g., a second song, different than the first song). Thus, in some examples, a device (e.g., 3500) performs primary device responsibilities for different, concurrent media sessions (e.g., and provides a media stream to devices in each session).

Figure 35I:
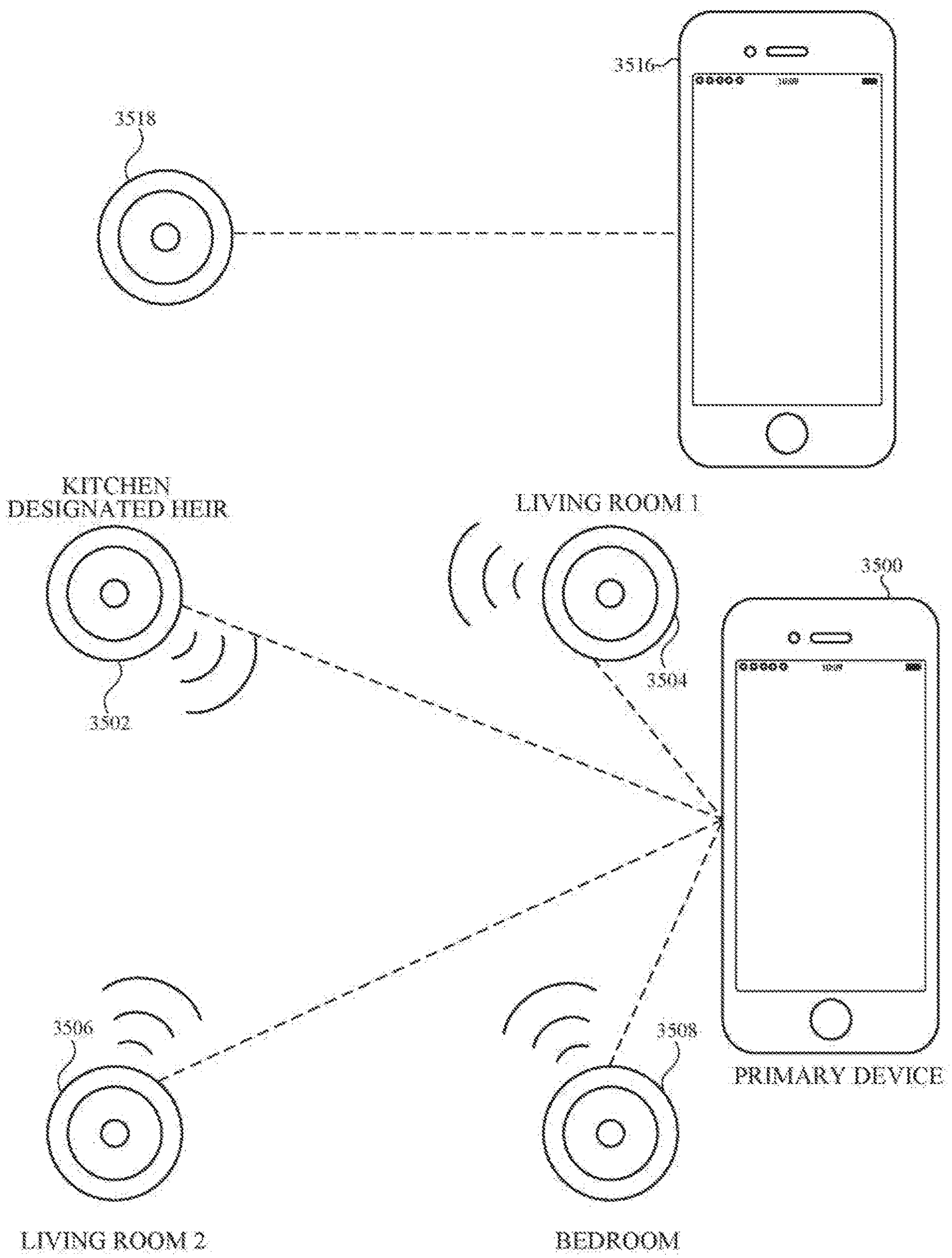
Figure 35J:
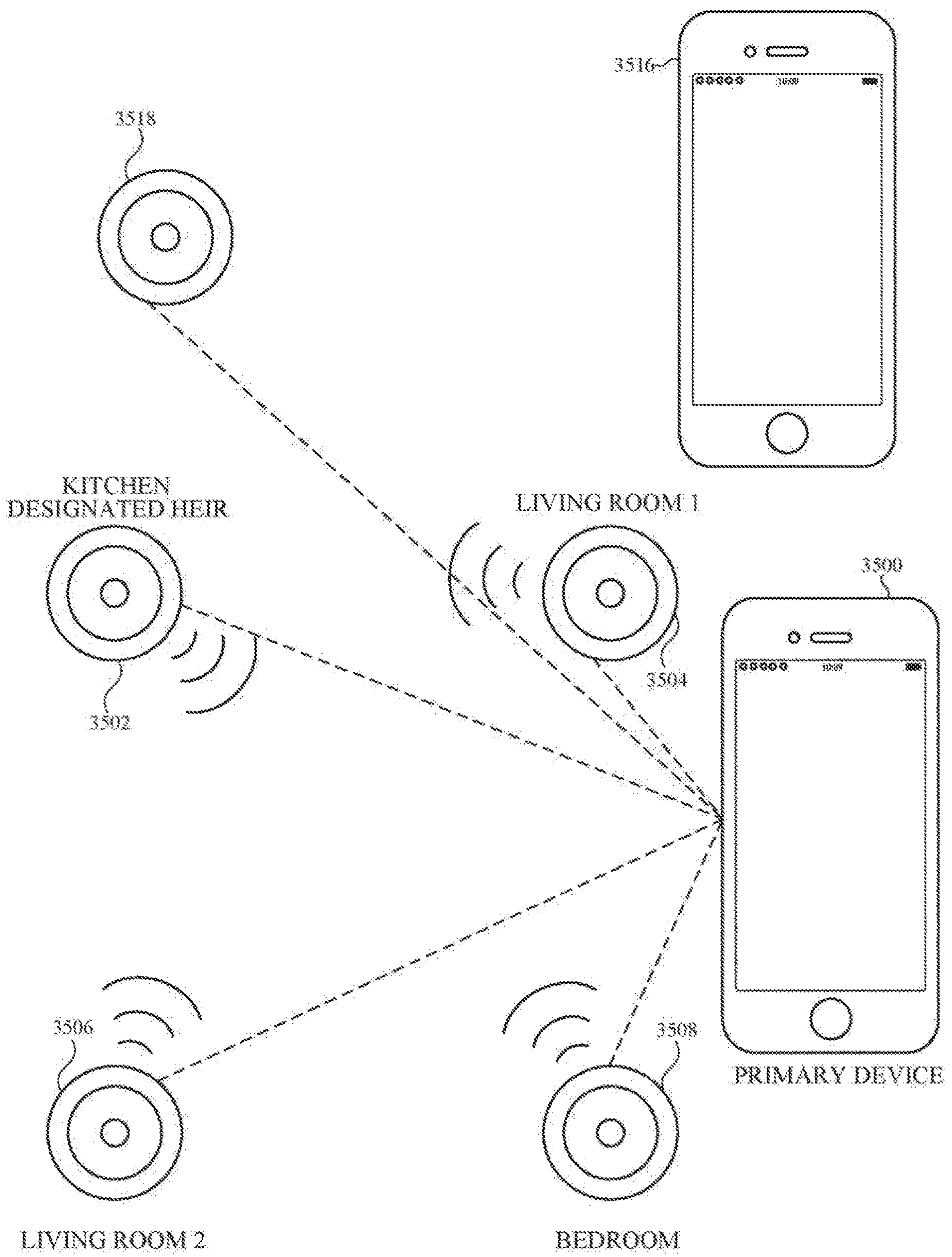

In some embodiments, another device (e.g., 3516) adds a new device (e.g., 3518) to the set of devices (e.g., 3502, 3504, 3506, and 3508). FIGS. 35I-35J illustrate an exemplary scenario in which a new device is added to the set of devices. FIG. 35I depicts device 3516 connected to device 3518, which is (though not depicted graphically) connected to the set of devices (3502, 3504, 3506, and 3508) and device 3500. In some embodiments, devices 3516 and 3518 each include one or more features of device 100, 300, 500, or 580. In this example, device 3516 receives a request to add the device 3518 to the set of devices of the media session (e.g., a user input at a multi-device interface displayed on device 3516). In some embodiments, a first device (e.g., 3500) receives an indication that the new device has been added to the set of devices. In some embodiments, in response to receiving an indication that the new device (e.g., 3518) has been added to the set of devices, the device (e.g., 3500) provides a media stream to the new device. FIG. 35J illustrates that device 3500, which is a primary device for the media session and is providing a media stream to the set of devices, is now providing a media stream (e.g., indicated by the dotted line) to the new device 3518 in response to receiving an indication (e.g., from device 3516 or 3518) that the new device was added to the set of devices of the media session.

FIGS. 36A-36C is a flow diagram illustrating a method for managing playback of media on a set of devices using an electronic device in accordance with some embodiments. Method 3600 is performed at a device (e.g., 100, 300, 500, 580). Some operations in method 3600 are, optionally, combined, the order of some operations are, optionally, changed, and some operations are, optionally, omitted.

As described below, method 3600 provides an intuitive way for managing playback of media on a set of devices. The method reduces the cognitive burden on a user for managing playback of media on a set of devices, thereby creating a more efficient human-machine interface. For battery-operated computing devices, enabling a user to manage playback of media on a set of devices faster and more efficiently conserves power and increases the time between battery charges.

The electronic device (e.g., 3500) (also referred to as a "first device") receives (3602) a request (e.g., user input 3512) to initiate media playback on a set of devices (e.g., 3502, 3504, 3506, and 3508) that does not include the first device. In some embodiments, the set of devices includes one or more devices. For example, device 3500 receives user input at a multi-device interface 3510 to initiate playback of media on the "Bedroom", "Kitchen", and "Living Room" devices (e.g., 3502, 3504, 3506, and 3508) that are connected to the first device.

In response to receiving the request, and while the first device is coordinating media playback, the first device (e.g., 3500) determines (3604) whether the set of devices includes a device configured to coordinate media playback. For example, device 3500 determines whether any device in the set of devices 3502, 3504, 3506, and 3508 include a device that is capable of becoming a primary device (e.g., as described above with respect to FIGS. 29A-29I) for the media session requested by the user (e.g., is a "smart" device). In some examples, if a device includes a device capable of becoming a primary device, it is referred to as a "smart group". In some embodiments, a device (e.g., 3514), other than the first device or the set of devices, determines whether the set of devices includes a device configured to coordinate media playback.

In accordance with a determination that the set of devices includes a device configured to coordinate media playback (e.g., is a smart group), the first device (e.g., 3500) transfers (3606) a media playback coordination task from the first device to the device (e.g., 3504 as shown FIG. 35D) configured to coordinate media playback. For example, device 3500 hands off primary device responsibility to a smart device (e.g., device 3504 as shown in FIG. 35D) that is a member of the set of devices.

Transferring a media playback coordination task, for media playback that does not include the first device, from a first device to another device configured to coordinate media playback, subsequent to the first device receiving user input, allows the first device to free up device resources and provide an improved response to further user input requests, without requiring further user input to do so. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the set of devices does not include a device configured to coordinate media playback, the first device (e.g., 3500) forgoes (3608) transferring the media playback coordination task (e.g., as shown in FIG. 35E). For example, device 3500 does not hand off primary device responsibility if the set of devices does not include a smart device (e.g., as shown in FIG. 35E). In some embodiments, the first device transfers the media playback coordination task to a device (e.g., 3514 of FIG. 35F) not in the set of devices. For example, a home media hub device (e.g., such as device 3514, an Apple TV) can serve as a primary device to the set of devices.

In some embodiments, the media playback coordination task is selected from the group consisting of: storing a media playback queue, providing a media stream to one or more devices in the set of devices during media playback, transmitting data indicating that the media stream is available (e.g., advertise to other devices that it is the primary device), synchronizing playback between devices of the set of devices, and a combination thereof. In some embodiments, the media playback coordination task includes other playback coordination tasks. Additional examples of playback coordination tasks are described above (e.g., with respect to FIGS. 6A-6AR and 29A-29I).

In some embodiments, further in accordance with a determination that the set of devices does not include a device configured to coordinate media playback (3610), the first device (e.g., 3500) detects (3612) a second device (e.g., 3514), connected to the first device and the set of devices, and not included in the set of devices, that is configured to coordinate media playback. In accordance with detecting the second device, the first device (e.g., 3500) transfers (3614) the media playback coordination task from the first device to the second device. For example, device 3500 hands off primary device responsibility to a home media hub device (e.g., such as device 3514 of FIG. 35F) that is connected to the set of devices.

In some embodiments, further in accordance with a determination that the set of devices does not include a device configured to coordinate media playback, the first device (e.g., 3500) performs (3616) the media playback coordination task. For example, device 3500 retains primary device responsibility (e.g., as shown in 35E), and thus performs a media playback coordination task as part of its role as primary device for the media session on the set of devices.

In some embodiments, performing the media playback coordination task comprises providing a media stream to one or more devices in the set of devices during media playback, and while providing the media stream to one or more devices in the set of devices during media playback, the first device (e.g., 3500) receives (3618) a request to perform a voice assistant function or a phone call function. In response to the request (3620) to perform a voice assistant function or a phone call function the first device (e.g., 3500): performs (3622) the voice assistant function or the phone call function, and continues (3624) to provide the media stream to one or more devices in the set of devices during media playback while performing the voice assistant function or the phone call function. In some embodiments, a request to perform a voice assistant function is a user input. For example, device 3500 receives voice user input, such as "Hey Siri", which invokes a personal digital assistant. In some embodiments, request to perform a phone call function is a user input. For example, device 3500 can receive user input representing a request to begin a phone call (e.g., a request to answer an incoming call, or a request to place an outgoing call). In some embodiments, a phone call this includes one or more of a telephone call, a voice over internet protocol ("VoIP") call, a video call (e.g., video chat, FaceTime, Skype, or the like), an internet-based call (e.g., a "Wi-Fi Calling" call), or the like. Thus, in accordance with some embodiments, the first device can perform other functions such as making a telephone call or using a voice assistant, without interrupting the media stream.

In some embodiments, performing the media playback coordination task comprises providing a media stream to one or more devices in the set of devices during media playback, wherein the media stream is a first media stream, and wherein the set of devices is a first set of devices. While providing the first media stream, the first device (e.g., 3500) concurrently provides (3626) a second media stream, different than the first media stream to a second set of devices different than the first set of devices (e.g., as shown in FIG. 35H). For example, the first device can provide a plurality of different media streams concurrently. For instance, the first media stream is a song, and the second media stream is a movie. Thus, one device (e.g., device 3500) can act as a primary device to a plurality of media sessions (e.g., on a plurality of devices).

In some embodiments, performing the media playback coordination task comprises providing a media stream to one or more devices in the set of devices during media playback, and while providing the media stream to one or more devices in the set of devices during media playback, the first device (e.g., 3500) receives (3628) an indication that a third device (e.g., 3516) added a new device (e.g., 3518 as shown in FIG. 35I) to the set of devices. In response to receiving the indication that the third device added the new device to the set of devices, the first device (e.g., 3500) provides (3630) the media stream to the new device (e.g., as shown in FIG. 35J).

In some embodiments, further in accordance with a determination that the set of devices does not include a device configured to coordinate media playback, the first device (e.g., 3500) receives a playback control command. In response to receiving the playback control command, the first device (e.g., 3500) transmits an instruction to the set devices in accordance with the playback control command. For instance, in some examples, the first device has media playback coordination responsibility (e.g., is a primary device) for the set of devices, and thus processes the playback control command and issues instructions to one or more devices in the set of devices to perform the appropriate corresponding action.

In some embodiments, receiving the playback control command comprises receiving user input, at the first device, representing the playback control command. For example, the first device receives the playback control command via user input.

In some embodiments, receiving the playback control command comprises receiving, from a device other than the first device, data representing the playback control command. For example, the first device receives the playback control command from another device that received input on a proximity card or other interface for controlling media playback.

In some embodiments, further in accordance with a determination that the set of devices includes a device configured to coordinate media playback, the first device (e.g., 3500) receives a playback control command, and in response to receiving the playback control command, the first device (e.g., 3500) forwards the playback control command to the device (e.g., 3504 of FIG. 35D) configured to coordinate media playback. For example, if the first device is not a primary device for the set of devices (e.g., the first device handed of primary device responsibility, as shown in FIG. 35D), the first device forwards the playback control command on to the primary device for processing.

In some embodiments, further in accordance with a determination that the set of devices includes a device configured to coordinate media playback, the first device (e.g., 3500) transmits a playback queue to the device configured to coordinate media playback. For example, if the request to initiate playback received at the first device is a request to play a playlist (e.g., a plurality of songs), the playlist is forwarded to the primary device of the set of devices.

In some embodiments, the request to initiate media playback is a request to initiate playback of first media (e.g., a song, playlist, movie, or the like). Further in accordance with a determination that the set of devices includes a device configured to coordinate media playback (3632), and in accordance with a determination that the device configured to coordinate media playback has access to the first media, the first device (e.g., 3500) transfers (3634) the media playback coordination task from the first device to the device (e.g., 3504 of FIG. 35D) configured to coordinate media playback. In accordance with a determination that the device configured to coordinate media playback does not have access to the first media, the first device (e.g., 3500) forgoes transferring (3636) the media playback coordination task. For example, the first device transfers the media playback coordination task to a device in the set of devices if that device has access to the requested first media. For instance, if the first media requested is accessed through a media streaming service that the device of the set of devices is not configured to access, then the first device forgoes transferring the media playback coordination task to that device. In some examples, the first device (e.g., which has access to the first media) retains responsibility as the primary device to the media session, and provides a media stream to the set of devices.

In some embodiments, the set of devices includes a plurality of devices configured to coordinate media playback, and further in accordance with a determination that the set of devices includes a device configured to coordinate media playback, the first device (e.g., 3500) selects a primary device from the plurality of devices configured to coordinate media playback, and transmits the media playback coordination task from the first device to the selected primary device. For example, when the set of devices includes multiple potential primary devices (e.g., that are configured to coordinate media playback), the first device selects one of the devices to act as the primary device for the media session.

In some embodiments, the first device (e.g., 3500) selects a designated heir (e.g., 3502 of FIG. 35D) to the primary device from the plurality of devices configured to coordinate media playback. For example, when the set of devices includes multiple potential primary devices (e.g., that are configured to coordinate media playback), the first device selects one of the devices to act as the primary device for the media session, and selects a designated heir to the primary device (e.g., to take over as primary device if the selected primary device becomes unavailable).

In some embodiments, the set of devices includes a plurality of devices configured to coordinate media playback, and further in accordance with a determination that the set of devices includes a device configured to coordinate media playback, the first device (e.g., 3500) receives, from a fourth device (e.g., 3514), selection of a primary device from the plurality of devices configured to coordinate media playback, and the first device (e.g., 3500) transmits the media playback coordination task from the first device to the primary device (e.g., 3504 of FIG. 35D). For example, a device other than the first device selects the primary device for the media session.

In some embodiments, the first device (e.g., 3500) transmits an instruction to the set of devices to initiate media playback. For example, the first device transmits an instruction to initiate playback, of the requested media, to the set of devices.

In some embodiments, the first device (e.g., 3500) transmits a copy of a media playback queue to at least two devices of the set of devices. For example, the first device transmits a playback queue to non-primary devices of the set of devices. In some examples, a copy of a media playback queue is stored on multiple devices of the set of devices during the media session that includes the set of devices.

Note that details of the processes described above with respect to method 3600 (e.g., FIGS. 36A-36C) are also applicable in an analogous manner to the methods described below/above. For example, method 700, 900, 1100, 1300, 1500, 1700, 1800, 2000, 2200, 2400, 2600, 2800, 3000,

3200, 3400, 3800, and 3900 optionally includes one or more of the characteristics of the various methods described above with reference to method 3600. For brevity, these details are not repeated below.

FIGS. 37A-37D illustrate exemplary user interfaces for managing playback of media on a plurality of devices, in accordance with some embodiments. The user interfaces in these figures are used to illustrate the processes described below, including the processes in FIGS. 38A-38B.

Figure 37A:
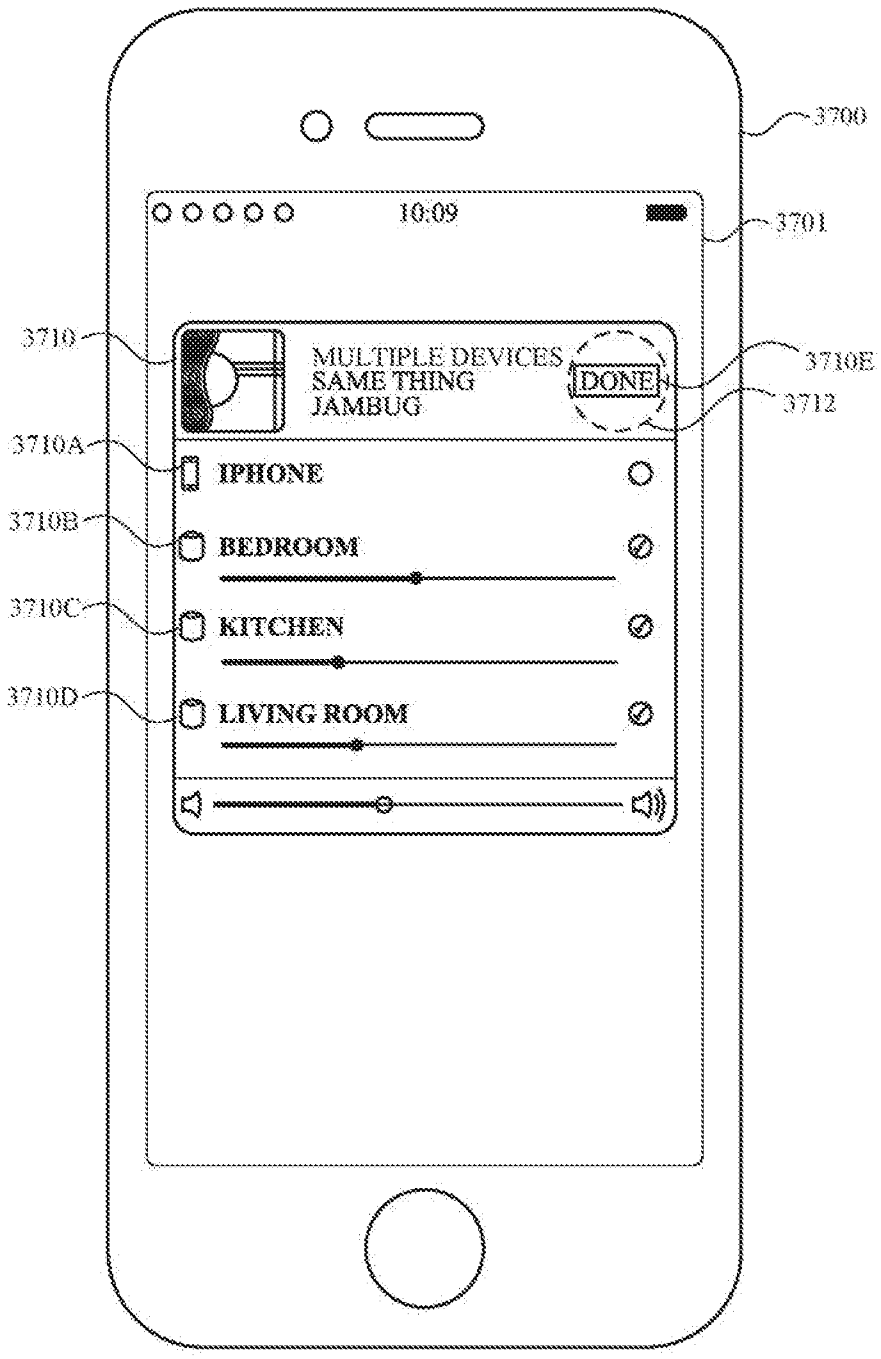
Figure 38A:
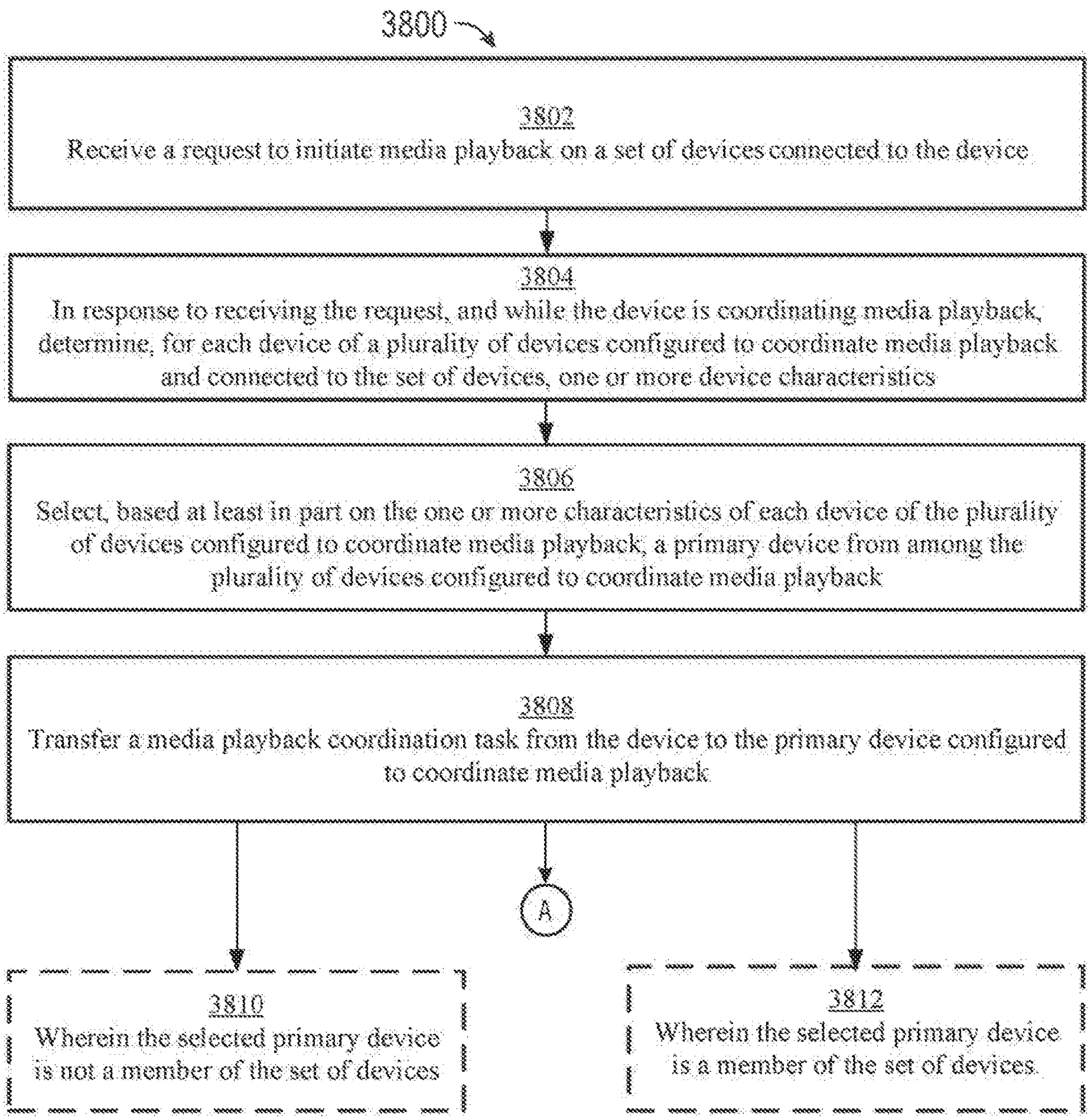

FIG. 37A illustrates an exemplary multi-device interface. As shown, device 3700 displays, on display 3701, a multi-device interface 3710. In some embodiments, device 3700 includes one or more features of device 100, 300, 500, or 580. In some embodiments, multi-device interface 3710 includes one or more of the features of multi-device interface 610, for example as described above with respect to FIG. 6J. As shown, indicators for the devices in the following rooms are selected "Bedroom" (e.g., indicator 3710B), "Kitchen" (indicator 3710C) and "Living Room" (indicator 3710D) (e.g., which corresponds to two devices, a stereo pair). The indicator (3710A) for the iPhone (e.g., device 3700) is unselected. While indicators 3710B-3710D are selected, device 3700 receives user input 3712, representing selection of the done affordance 3710E. Thus, the user wishes begin a media session that includes playback the media item titled "Same Thing" on the set of devices in the Bedroom, Kitchen, and Living Room.

Figure 37C:
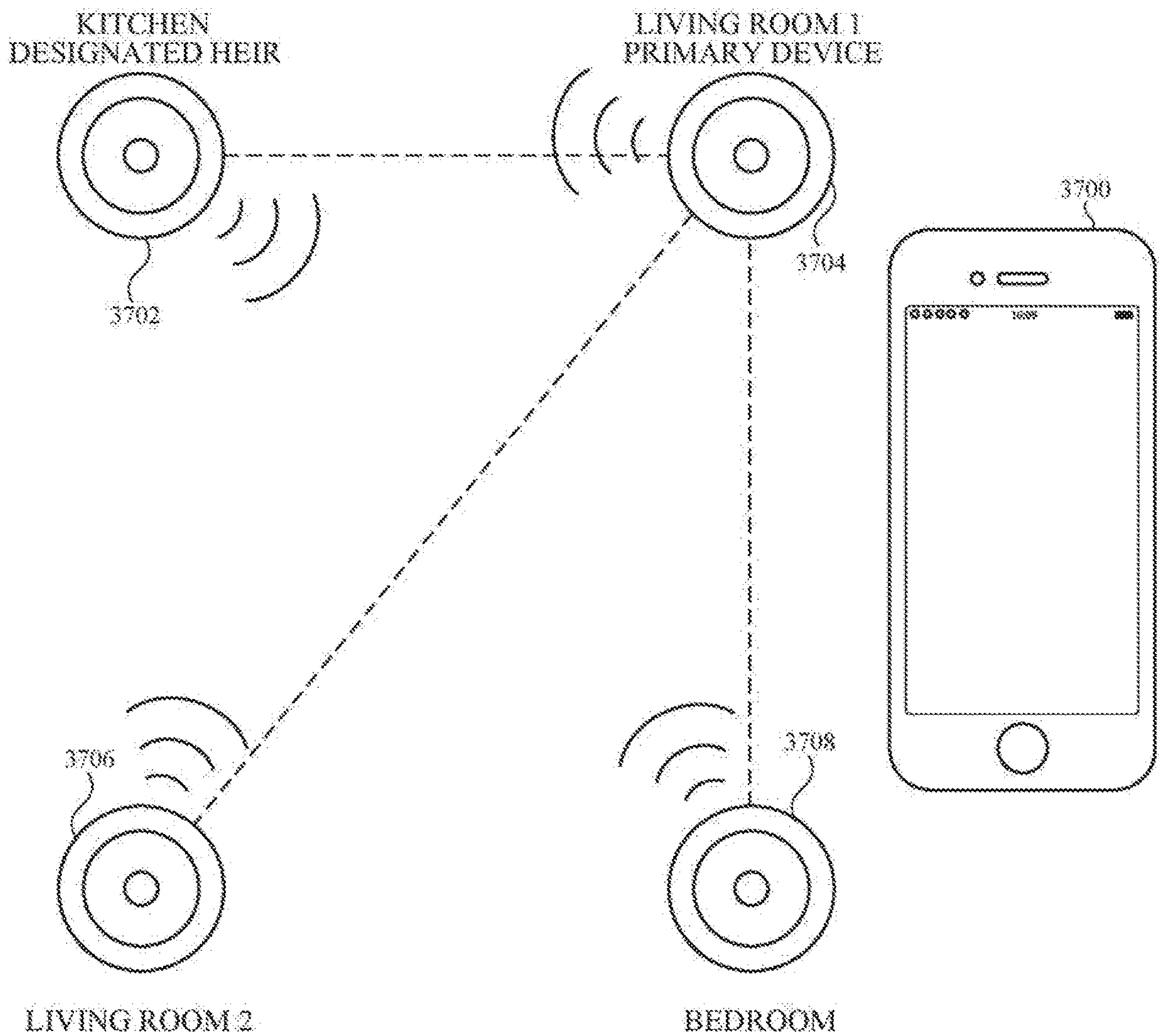
Figure 37D:
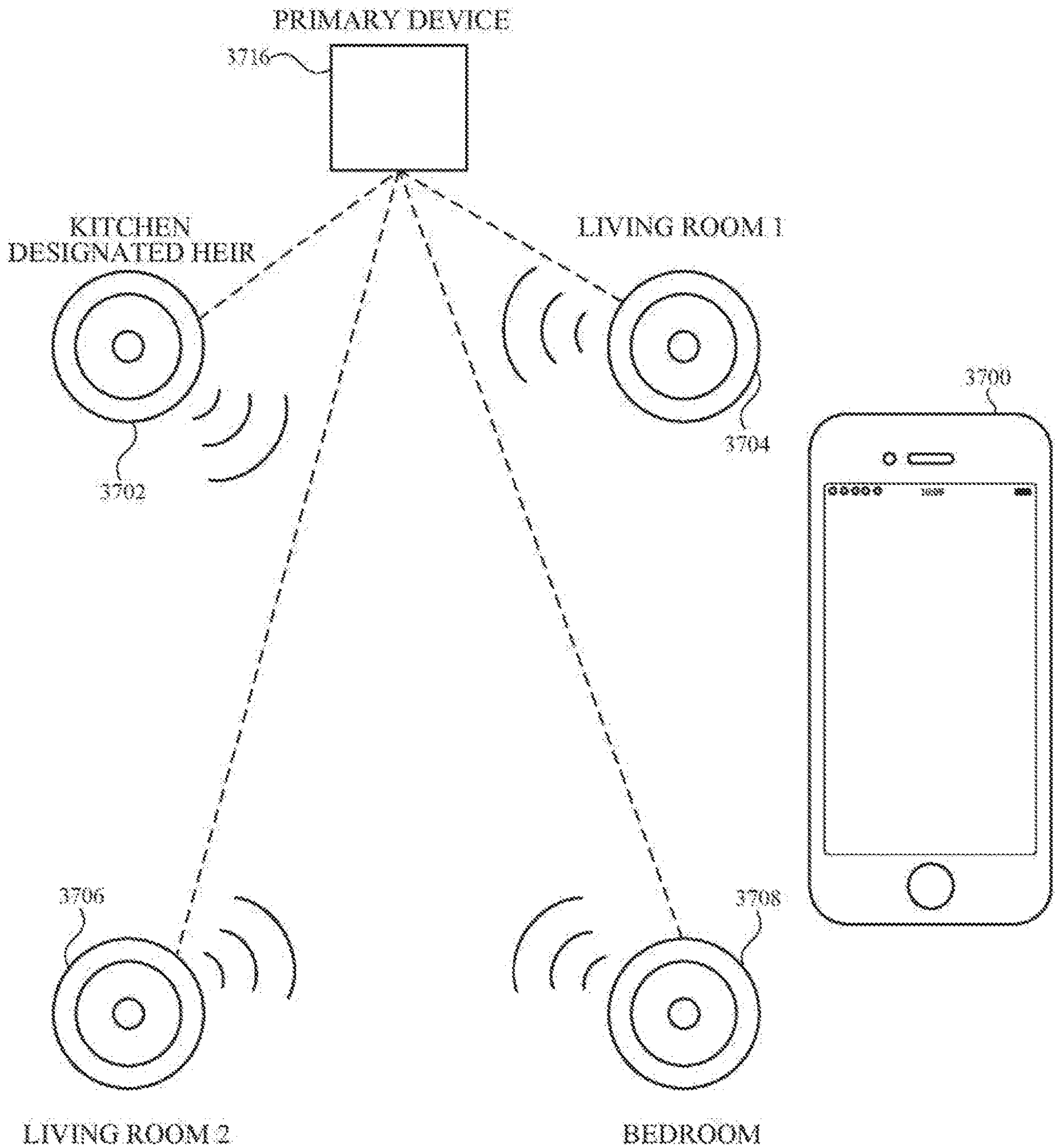

In some embodiments, a device (e.g., 3700) receives user input (e.g., 3712) requesting playback on a set of devices that does not include the device. As shown, device 3700 received user input 3712, which is request to initiate playback on devices 3702, 3704, 3706, and 3708 (shown in FIG. 37C). In some embodiments, devices 3702, 3704, 3706, and 3708 each includes one or more features of device 100, 300, 500, or 580. Thus, in this example, the device that received the request is not a device that will be playing back the requested media. In some embodiments, the device (e.g., 3700) that received the request but that is not included in the set of devices (e.g., of the media session) determines whether it can hand off media coordination responsibility to another device. However, in some examples, a device (e.g., 3700) is connected to a plurality of devices that are configured to coordinate media playback. Thus, the device can select the primary device from this plurality of devices that are configured to coordinate media playback. In some embodiments, the device selects the primary device from the plurality of devices based on one or more characteristics of each device of the plurality of devices. FIGS. 37B-37D illustrate exemplary techniques for doing so.

FIG. 37B illustrates an exemplary depiction of device characteristics for each of a plurality of devices configured to coordinate media playback for a set of devices. As shown, FIG. 37B depicts four set of device characteristics 3714A, 3714B, 3714C, and 3714D. In this example, as described in more detail below, each set of device characteristics includes characteristics related to whether the respective device is operating on battery power, a network performance characteristic of the respective device, and a quality of connection of the respective device to the each device in the set of devices of the media session. In some examples, the device (e.g., 3700) selects the primary device based on one or more device characteristics (e.g., such as those as shown in FIG. 37B). In some embodiments, the device selects a primary device based on other device characteristics (e.g., other than those shown in FIG. 37B).

In this example, each set of characteristics includes a "Power Source" characteristic, which identifies a power source of the device—for example, whether the respective device is operating on battery power or is plugged in (e.g., is operating on wall power or is otherwise charging). For example, the power source of the respective device can be a characteristic that is considered when selecting a primary device to perform playback coordination tasks, which can require an increase in power consumption by a device (e.g., due to increased data transmission activity that results from providing a media stream to the set of devices).

In this example, each set of characteristics also includes a "Network Performance" characteristic, which can include one or more indications of the quality of a respective device's connection to a network (e.g., a local area network that connects each device in the set of devices, a connection to a wide area network, or the like). For example, the network performance of the device can be a characteristic that is considered when selecting a primary device to perform playback coordination tasks, which can require an increased demand on network activity by a device (e.g., due to increased data transmission activity that results from providing a media stream to the set of devices).

In this example, each set of characteristics also includes an indication of the quality of connection between the respective device and each device in the set of devices included in the requested media session. These are identified variously as "Connection to Kitchen Device" (e.g., device 3702), "Connection to Living Room Device 1" (e.g., device 3704), "Connection to Living Room Device 2" (e.g., device 3706), and "Connection to Bedroom Device" (e.g., device 3708). For example, the quality of connection between a respective device and each device in the set of devices can be a characteristic that is considered when selecting a primary device to perform playback coordination tasks, which can require the selected primary device to transmit data to each device in the set of devices (e.g., to provide a media stream).

FIG. 37C depicts an exemplary scenario subsequent to a device (e.g., 3700) selecting a primary device (e.g., 3704). In the example of FIG. 37C, device 3700 selected device 3704 as the primary device for media playback on the set of devices 3702, 3704, 3706, and 3708. In this example, device 3700 determined that there were three devices configured to coordinate media playback: the Kitchen device 3702 (corresponding to the set of characteristics 3714A), the Living Room 1 device 3704 (corresponding to the set of characteristics 3714B), and the Living Room 2 device 3706 (corresponding to the set of characteristics 3714C). In this example, Bedroom device 3708 is not a device configured to coordinate media playback. In this example, the set of devices are arranged (e.g., in a user's home) as shown and described with respect to FIG. 35B.

In some embodiments, a device (e.g., 3700) selects, based at least in part on the one or more characteristics of each device of the plurality of devices (e.g., 3702, 3704, and 3706) configured to coordinate media playback, a primary device from among the plurality of devices configured to coordinate media playback on a set of devices (e.g., 3702, 3704, 3706, and 3708). As shown in FIG. 37C, device 3700 selects device 3704 (corresponding to the set of characteristics 3714B) as the primary device, which is operating on non-battery power, has a high network performance characteristic, and has a high quality of connection to each other device in the set except the Bedroom device (device 3708), to which it has a moderate quality of connection. In some examples, the set of characteristics 3714B are more favorable than the sets 3714A and 3714C, which are operating on battery power and have lower connection performance and quality-related characteristics. In some embodiments, selecting a primary device based in part on one or more characteristics comprises creating a comparative metric for each device of the plurality of devices configured to coordinate media playback. For example, a comparative metric can be a value, created by weighing (values associated with) each characteristic of a set of characteristics associated with a respective device, used to quantitatively compare each respective device of the plurality of devices to each other. For instance, the characteristics of being on non-battery power and having high network performance can result in a more favorable (e.g., higher) comparative metric relative to other devices being on battery power and having low network performance.

In some embodiments, the plurality of devices (e.g., 3702, 3704, 3706, and 3716) includes one or more devices (e.g., 3716) not included in the set of devices (e.g., 3702, 3704, 3706, and 3708). FIG. 37D illustrates an alternative exemplary scenario to that shown in FIG. 37C. In the example of FIG. 37D, the plurality of devices configured to coordinate media playback on the set of devices (e.g., 3702, 3704, 3706, and 3708) includes a device not in the set of devices, device 3716 (e.g., a home media hub, such as an Apple TV). In this example, device 3700 selects device 3716 as the primary device. Device 3716 corresponds to the set of characteristics 3714D shown in FIG. 37B—as shown, device 3716 is operating on non-battery power, has a high network performance characteristic, and has a high connection quality to each device in the set of devices. In this example, device 3716 has a more favorable characteristics (e.g., resulting in a more favorable comparative metric) than those of device 3704 (e.g., characteristics 3714B), and thus device 3700 selects device 3716 as the primary device.

FIGS. 38A-38B is a flow diagram illustrating a method for managing playback of media on a set of devices using an electronic device in accordance with some embodiments. Method 3800 is performed at a device (e.g., 100, 300, 500, 580). Some operations in method 3800 are, optionally, combined, the order of some operations are, optionally, changed, and some operations are, optionally, omitted.

As described below, method 3800 provides an intuitive way for managing playback of media on a set of devices. The method reduces the cognitive burden on a user for managing playback of media on a set of devices, thereby creating a more efficient human-machine interface. For battery-operated computing devices, enabling a user to manage playback of media on a set of devices faster and more efficiently conserves power and increases the time between battery charges.

The electronic device (e.g., 3700) receives (3802) a request (e.g., user input 3712) to initiate media playback on a set of devices (e.g., 3702, 3704, 3706, and 3708 of FIG. 37C) connected to the device. In some embodiments, the set of devices includes one or more devices. In some embodiments, the device and the set of devices are connected via a wired or wireless connection (e.g., Wi-Fi, Bluetooth, or the like). In some embodiments, the received request is received via user input (e.g., 3712) at the device.

In response to receiving the request, and while the device is coordinating media playback, the electronic device (e.g., 3700) determines (3804), for each device of a plurality of devices (e.g., 3702, 3704, and 3706) configured to coordinate media playback and connected to the set of devices (e.g., 3702, 3704, 3706, and 3708), one or more device characteristics For example, the set of devices includes multiple devices capable of becoming a primary device (e.g., multiple smart devices). In some embodiments, the plurality of devices includes the device (e.g., 3700). In some embodiments, the plurality of devices includes one or more devices that are not the device and that are not included in the set of devices (e.g., 3716 of FIG. 37D). For example, the plurality of devices represents devices that are capable of acting as primary device to the set of devices (that will play back media), and is not necessarily the same as the set of devices.

The electronic device (e.g., 3700) selects (3806), based at least in part on the one or more characteristics (e.g., as shown in FIG. 37B) of each device of the plurality of devices configured to coordinate media playback, a primary device (e.g., 3704 of FIG. 37C) from among the plurality of devices (e.g., 3702, 3704, and 3706) configured to coordinate media playback.

The electronic device (e.g., 3700) transfers (3808) a media playback coordination task from the device to the primary device (e.g., 3704 of FIG. 37C) configured to coordinate media playback. For example, the device hands off primary device responsibility to a device selected to be the primary device for the media session that includes the set of devices.

Transferring a media playback coordination task from a device to another device configured to coordinate media playback based on one or more device characteristics, subsequent to the device receiving user input, allows the device to free up device resources and provides an optimized delegation of a media playback coordination task, without requiring further user input to do so. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the selected primary device (e.g., 3716, as shown in FIG. 37D) is not (3810) a member of the set of devices (e.g., 3702, 3704, 3706, and 3708).

In some embodiments, the selected primary device (e.g., 3704 of FIG. 37C) is (3812) a member of the set of devices (e.g., 3702, 3704, 3706, and 3708).

In some embodiments, the one or more characteristics is selected from the group consisting of (3814): whether the respective device is operating on battery power, a network performance characteristic (e.g., signal strength, bandwidth, throughput, error rate of a network connection) of the respective device, a quality of connection of the respective device to the each device in the set of devices, and a combination thereof. In some embodiments, a quality of connection of the respective e device is based on a measure of proximity to a device in the set of devices. In some examples, other characteristics are used to select a primary device.

In some embodiments, the electronic device (e.g., 3700) selects (3816) a designated heir to the primary device from the plurality of devices configured to coordinate media playback.

In some embodiments, the electronic device (e.g., 3700) transmits an instruction to initiate media playback to the set of devices.

In some embodiments, the electronic device (e.g., 3700) transmits (3818) a copy of a media playback queue to the selected primary device. In some embodiments, the electronic device (e.g., 3700) transmits a copy of the media playback queue to two or more devices (e.g., including at least one non-primary device) in the set of devices.

In some embodiments, the request to initiate media playback is a request to initiate playback of first media (e.g., a song, playlist, movie, or the like), and wherein transferring the media playback coordination task from the device to the selected primary device is further in accordance with a determination that the selected primary device has access to the first media (3820). For example, the device forgoes handoff of primary device responsibility to a selected primary device if such device does not have access to the first media.

In some embodiments, the electronic device (e.g., 3700) receives a playback control command, and in response to receiving the playback control command, forwards the playback control command to the selected primary device. For example, a device that is not the primary device forwards the playback control command to the primary device for processing. In some embodiments, the playback control command is received via user input at the device. In some embodiments, the playback control command is received from another device.

In some embodiments, the media playback coordination task is selected from the group consisting of (3822): storing a media playback queue, providing a media stream to one or more devices in the set of devices during media playback, transmitting data indicating that the media stream is available (e.g., advertise to other devices (e.g., in the set of devices) that it is the primary device), synchronizing playback between devices of the set of devices, and a combination thereof. In some embodiments, the device transfers all or fewer than all playback coordination tasks that would otherwise be performed by a primary device.

Note that details of the processes described above with respect to method 3800 (e.g., FIGS. 38A-38B) are also applicable in an analogous manner to the methods described above. For example, method 700, 900, 1100, 1300, 1500, 1700, 1800, 2000, 2200, 2400, 2600, 2800, 3000, 3200, 3400, 3600, and 3900 optionally includes one or more of the characteristics of the various methods described above with reference to method 3800. For brevity, these details are not repeated below.

Figure 39A:
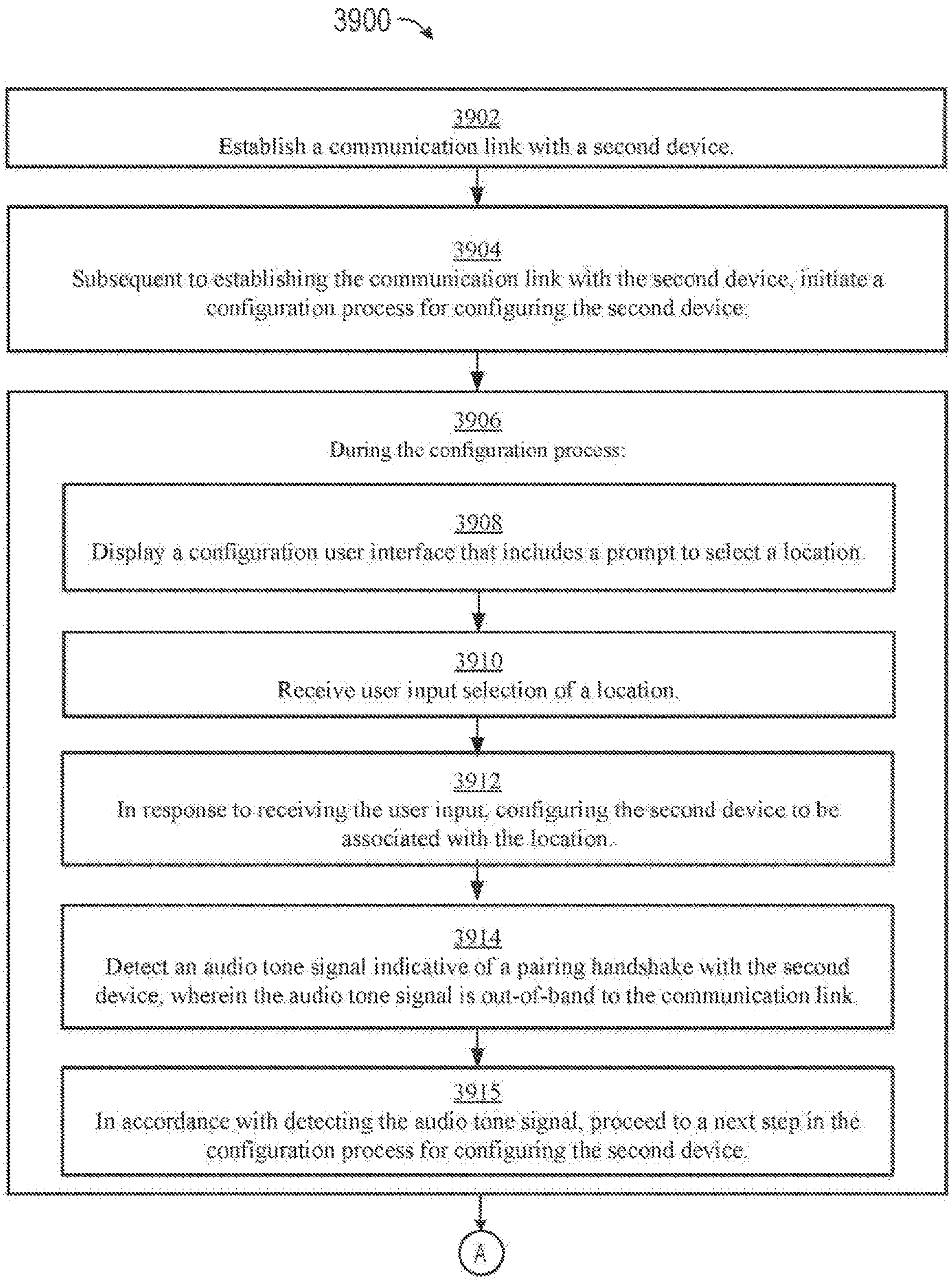
FIGS. 39A-39C is a flow diagram illustrating a process for configuring an electronic device in accordance with some embodiments.
Figure 39B:
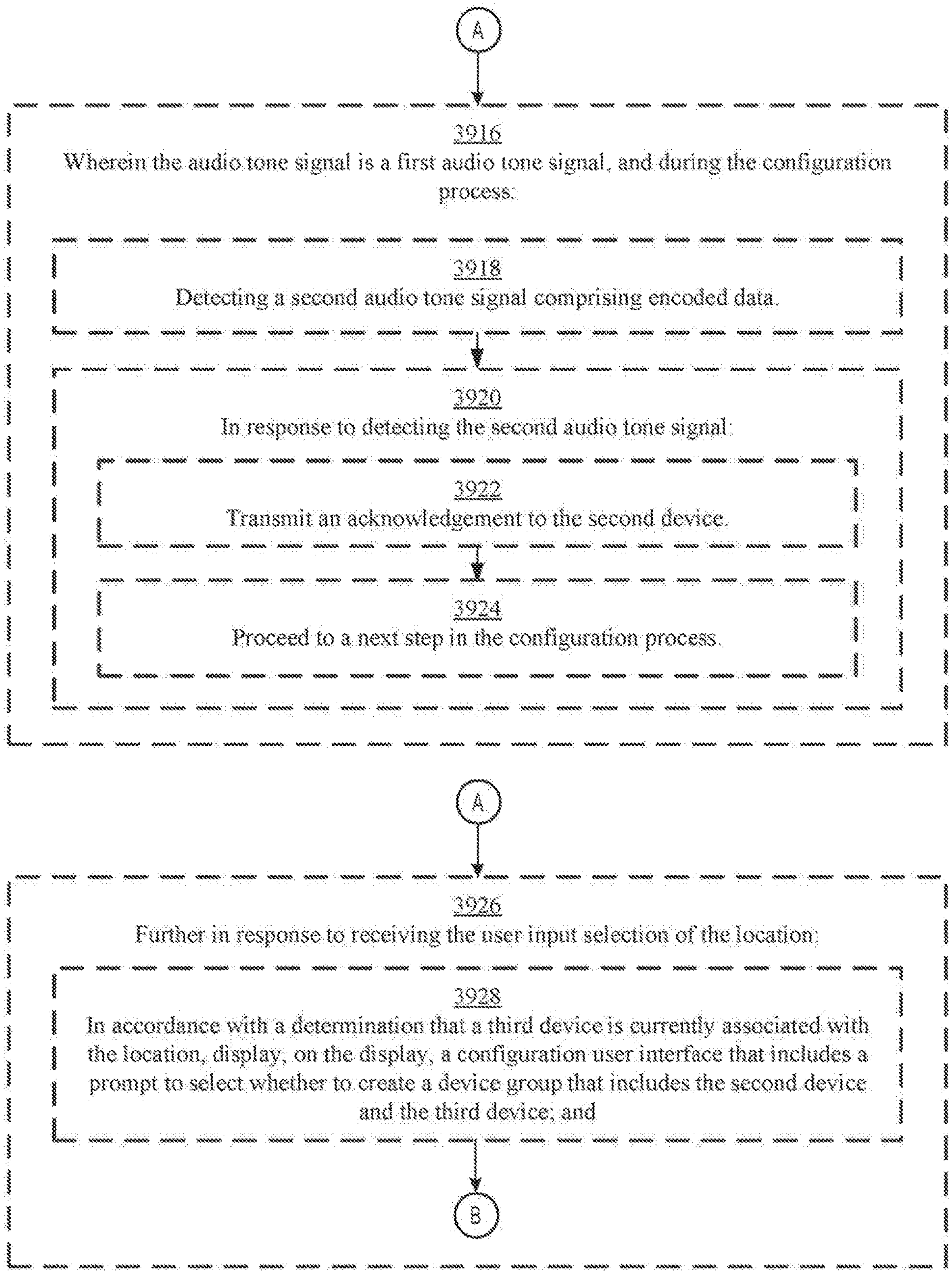
Figure 39C:
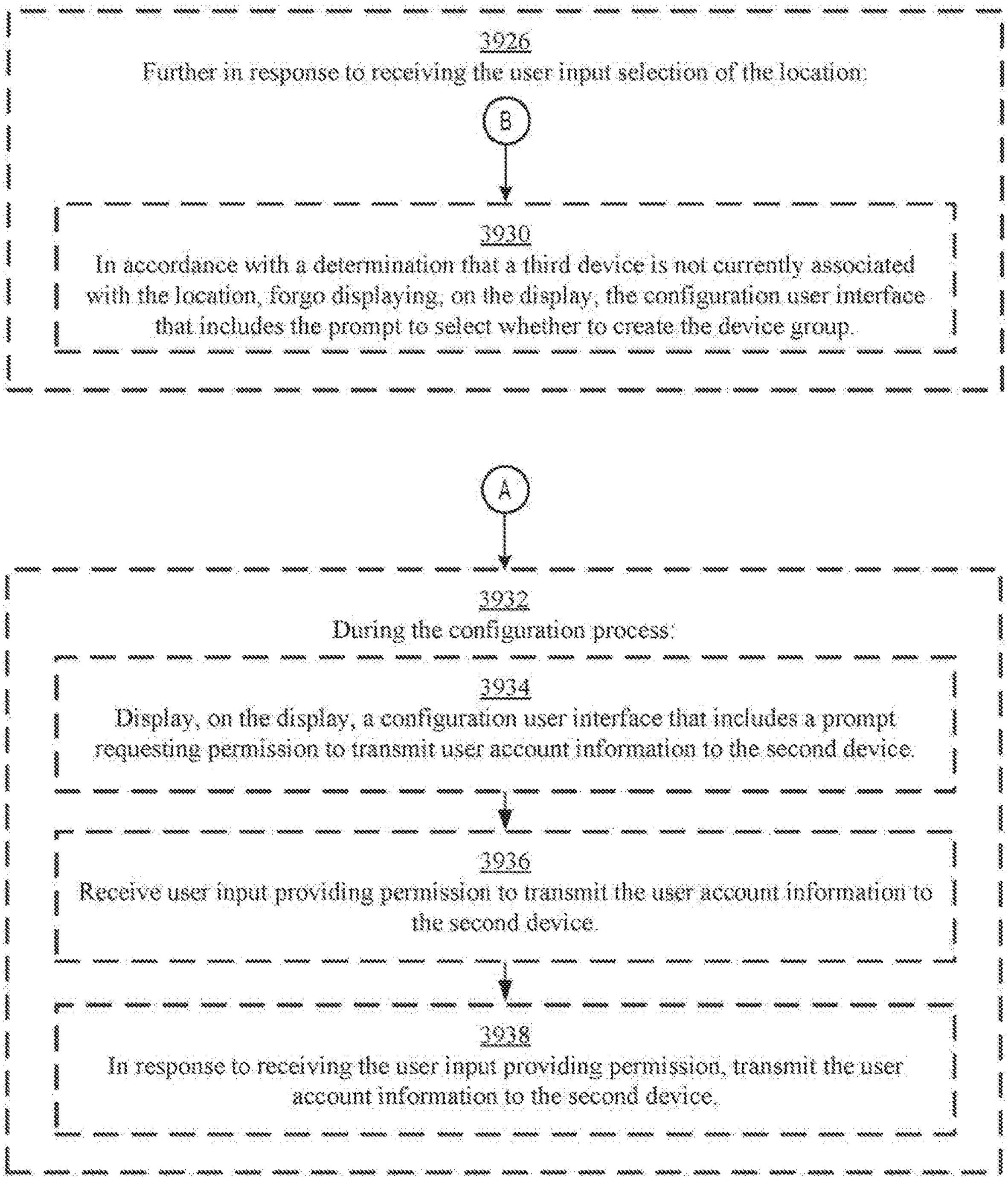

FIGS. 39A-39C is a flow diagram illustrating a method for configuring a second device using an electronic device in accordance with some embodiments. Method 3900 is performed at a device (e.g., 100, 300, 500, 580, 1010, 1900) with a display. Some operations in method 3900 are, optionally, combined, the order of some operations are, optionally, changed, and some operations are, optionally, omitted.

As described below, method 3900 provides an intuitive way for configuring a second device. The method reduces the cognitive burden on a user for configuring a second device, thereby creating a more efficient human-machine interface. For battery-operated computing devices, enabling a user to configure a second device faster and more efficiently conserves power and increases the time between battery charges.

The electronic device (e.g., 1900) (also referred to as a "first device") establishes (3902) a communication link with a second device (e.g., 1906). Subsequent to establishing the communication link with the second device, the first device (e.g., 1900) initiates (3904) a configuration process (e.g., as shown in FIGS. 19D-19AJ) for configuring the second device.

In some embodiments, during the configuration process (3906): the first device (e.g., 1900) displays (3908), on the display, a configuration user interface that includes a prompt to select a location (e.g., "Where is this speaker?" as shown in FIG. 19E). The first device (e.g., 1900) receives (3910) user input selection of a location. In response to receiving the user input, the first device (e.g., 1900) configures (3912) the second device to be associated with the location.

In some embodiments, during the configuration process (3906): the first device (e.g., 1900) detects (3914) an audio tone signal (e.g., 1014 of FIG. 10H) indicative of a pairing handshake with the second device, wherein the audio tone signal is out-of-band to the communication link. In accordance with detecting the audio tone signal, the first device (e.g., 1900) proceeds (3915) to a next step in the configuration process for configuring the second device (e.g., proceeds from setup card 1918 of FIG. 19H to setup card 1920 of FIG. 19I).

In some embodiments, the first device (e.g., 1900) detects an indication that a physical proximity between the first device and the second device the first device (e.g., 1906) satisfies a proximity condition; and in response to detecting the indication that the physical proximity between the first device and the second device satisfies the proximity condition, establishes the communication link with the second device.

Using an audio tone to establish a communication link between two devices allows the user to efficiently move through a configuration process for a device with fewer required user inputs, while ensuring that the devices are in relatively close proximity and that the user has physical access to both devices. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the audio tone signal is a first audio tone signal, the method further comprising: further in response to detecting the indication that the physical proximity between the first device and the second device satisfies the proximity condition, outputting a second audio tone signal.

In some embodiments, proceeding to the next step of the configuration process includes completing the configuration process (e.g., proceeding to display setup card 1942 of FIG. 19T).

In some embodiments, the audio tone signal (e.g., 1904) is generated by the second device (e.g., 1906 as shown in FIG. 19A).

In some embodiments, the audio tone signal includes an audio passcode. In some embodiments, the audio passcode is dictated (e.g., as shown in FIG. 10J). In some embodiments, the audio passcode is encoded in the audio tone signal.

In some embodiments, the audio tone signal (e.g., 1904) is received while the first device (e.g., 1900) is physically positioned within a threshold physical proximity (e.g., 1908 of FIG. 19C) to the second device (e.g., as shown in FIG. 19C).

In some embodiments, the audio tone signal is a first audio tone signal, and during the configuration process (e.g., while displaying setup card 1918 of FIG. 19H) (3916): the first device (e.g., 1900) detects (3918) a third audio tone signal comprising encoded data. For example, the third audio tone signal includes one or more of user account login information, an identifier for the second device, or other data for confirming that the second device should be provided access to the user's account or personal data. In response to detecting the third audio tone signal (3920): the first device (e.g., 1900) transmits (3922) an acknowledgement to the second device (e.g., 1906); and the first device (e.g., 1900) proceeds (3924) to a next step in the configuration process (e.g., displays the setup card 1920 of FIG. 19I).

In some embodiments, further in response to receiving the user input selection (e.g., 1913) of the location (e.g., "John's Room" as shown in FIG. 19J) (3926): in accordance with a determination that a third device (e.g., device 1020 of FIG. 10K, where the second device is device 1000 of FIG. 10K) is currently associated with the location (e.g., "John's Room"), the first device (e.g., 1900) displays (3928), on the display (e.g., 1902), a configuration user interface (e.g., setup card 1922 of FIG. 19J) that includes a prompt (e.g., affordance 1922A in FIG. 19J that includes text "Use as a stereo pair") to select whether to create a device group (e.g., stereo pair) that includes the second device and the third device. In some embodiments, a device group includes two or more devices. In accordance with a determination that a third device is not currently associated with the location, the first device (e.g., 1900) forgoes displaying (3930), on the display, the configuration user interface that includes the prompt to select whether to create the device group (e.g., displays setup card 1914 of FIG. 19F instead of setup card 1922).

In some embodiments, the first device (e.g., 1900) receives user input (e.g., 1923) representing an affirmative request create the device group. In some embodiments, in response to the user input representing an affirmative request create the device group, the first device (e.g., 1900) displays, on the display, a configuration user interface (e.g., 1924 of FIG. 19K) that includes a prompt (e.g., "Is this speaker left or right?" as shown in FIG. 19K) to select an audio output channel (e.g., left or right, as shown in FIG. 19K) to associate with the second device. In some embodiments, the first device (e.g., 1900) receives user input (e.g., 1925) representing selection of an audio output channel (e.g., left, as shown in FIG. 19K). In response to receiving the user input representing selection of a selected audio output channel, the first device (e.g., 1900) associates (e.g., transmits configuration data to) the second device with the selected audio channel.

In some embodiments, the prompt to select a location includes a plurality of predetermined location identifiers (e.g., Kitchen, Bedroom, Patio, Dining Room, as shown in FIG. 19E).

In some embodiments, the plurality of predetermined location identifiers includes a user-defined location identifier (e.g., John's Room, as shown in FIG. 19E).

In some embodiments, the prompt to select a location includes a field (e.g., "Create New Room" option as shown in FIG. 19M) for creating a new location identifier. In some embodiments, the first device (e.g., 1900) receives user input (e.g., 1931) associated with the field for creating a new location identifier (e.g., text entered into field 1930A of FIG. 19N), wherein the user input includes a location identifier (e.g., "Tim's Room" a shown in FIG. 19N). The first device (e.g., 1900) creates a new location identifier based on the received user input associated with the field for creating the new location identifier, and associates the second device with the new location identifier (e.g., transmits configuration data that includes the new location identifier to the second device).

In some embodiments, during the configuration process (3932): the first device (e.g., 1900) displays (3934), on the display (e.g., 1902), a configuration user interface (e.g., setup card 1914 of FIG. 19F) that includes a prompt (e.g., "Share your settings" affordance 1914B as shown in FIG. 19F) requesting permission to transmit user account information (e.g., login credentials) to the second device (e.g., 1906). The first device (e.g., 1900) receives (3936) user input (e.g., selection of affordance 1914B) providing permission to transmit the user account information to the second device. In response to receiving the user input providing permission, the first device (e.g., 1900) transmits (3938) the user account information to the second device (e.g., 1906).

In some embodiments, prior to transmitting the user account information to the second device, and in accordance with a determination that the first device (e.g., 1900) is not currently logged into a user account associated with the user account information (e.g., is not currently logged into an iCloud account), the first device (e.g., 1900) displays, on the display (e.g., 1902), a prompt to log in to the user account (e.g., setup card 1932 that includes the text "Please login to your iCloud account to continue" as shown in FIG. 19O), and forgoes transmitting the user account information to the second device. In accordance with a determination that the first device is currently logged into the user account associated with the user account information, the first device (e.g., 1900) transmitting the user account information to the second device (e.g., 1906).

In some embodiments, in response to progressing from a first step (e.g., setup card 1912) in the configuration process to a second step (e.g., setup card 1914) in the configuration process, the first device (e.g., 1900) outputs a fourth audio tone signal (e.g., 1044 of FIG. 10N). In some embodiments, the fourth audio tone signal is outputted concurrently with the output of a fifth audio tone signal (e.g., 1042 of FIG. 10N) outputted by the second device (e.g., 1906). In some embodiments, the fourth audio tone signal and the fifth audio tone signal are harmonics.

In some embodiments, in response to progressing from the second step (e.g., setup card 1914) in the configuration process to a third step (e.g., setup card 1916) in the configuration process, the first device (e.g., 1900) outputs a sixth audio tone signal (e.g., 1048 of FIG. 10O). In some embodiments, the sixth audio tone signal is outputted concurrently with the output of a seventh audio tone signal (e.g., 1046 of FIG. 10O) outputted by the second device (e.g., 1906). In some embodiments, the sixth audio tone signal and the seventh audio tone signal are harmonics. In some embodiments, the sixth audio tone signal is a higher frequency tone than the fourth audio tone signal (e.g., as shown in plot 1040 of FIG. 10O).

In some embodiments, subsequent to initiating the configuration process, the first device (e.g., 1900) receives data regarding an output of an operation being performed by the second device (e.g., 1906). For example, the output can be audio output (e.g., dictation by a voice assistant) by device 1906 of media (e.g., music), weather information, news, calendar appointments, or the like. In response to receiving the data regarding the output of the operation being performed by the second device (e.g., 1906), the first device (e.g., 1900) displays a user interface (e.g., interface 1950 of FIG. 19X-19Y) that includes a representation of the output of the operation being performed by the second device (e.g., 1906) (e.g. interface 1950 includes information identifying a song currently being played by device 1906). In some embodiments, the representation of the output can be displayed when device 1900 is locked, unlocked, or either. For example, when device 1906 starts playing music, device 1900 displays a Now Playing interface (e.g., interface 1950). In some embodiments, device 1900 displays a Now Playing interface whenever music is playing on device 1906 (e.g., music initiated by any device, including other devices). In some embodiments, the operation is output of weather information, and the representation of the output includes current temperature information, forecast information, or the like. In some embodiments, the operation is output of news information, and the representation of the output includes current news, or the like.

Displaying a user interface that includes a representation of the output of the operation being performed by the second device, provides the user with visual feedback about the state of a state of the second device. Providing improved visual feedback to the user enhances the operability of the second device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the operation being performed by the second device (e.g., 1906) includes audibly outputting information (e.g., playing the song identified in interface 1950), wherein receiving the data regarding the output of the operation being performed includes receiving data representing the information (e.g., song title, elapsed play time, weather forecast data, news stories), and wherein displaying the user interface, that includes the representation of the output of the operation being performed by the second device, includes displaying (e.g., interface 1950) at least a portion of the data representing the information.

Displaying data representing information corresponding to information being audibly outputted by the second device provides the user with visual feedback about the state of the second device, in addition to the audio feedback being provided directly by the second device. Providing improved (e.g., supplemental or additional) visual feedback to the user enhances the operability of the second device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the information includes a media item (e.g., a song), and the operation being performed by the second device (e.g., 1906) includes audibly outputting the media item. In some embodiments, displaying the data representing the information includes displaying one or more of: an artist, a media item name, an album name, album art, and a media playback progress indicator (e.g., as shown in interface 1950 of FIG. 19Y).

Displaying additional data (e.g., one or more of artist, a media item name, an album name, album art, and a media playback progress indicator) that corresponds to a media item being audibly outputted by the second device provides the user with visual feedback about the state of the second device. Providing improved (e.g., supplemental or additional) visual feedback to the user enhances the operability of the second device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the user interface that includes the representation of the output of the operation being performed by the second device includes displaying one or more of news information or weather information.

In some embodiments, during the configuration process: in accordance with a first configuration setting of the first device being compatible with the second device (e.g., 1906), the first device (e.g., 1900) configures the second device (e.g., 1906) to include the first configuration setting. For example, a configuration setting can be a language setting for a voice assistant, and a first configuration setting can be "English (U.S.)" In this example, English (U.S.) is compatible with (e.g., supported by) a voice assistant on device 1906. In some embodiments, the configuration is done automatically, without requiring user input or confirmation. In accordance with the first configuration setting of the first device not being compatible with the second device (e.g., 1906), the first device (e.g., 1900) displays an indication that the first configuration setting is not compatible with the second device (e.g., displays a message). In some embodiments, the indication that the first setting is not compatible with the second device is the display of a setup card for selecting a different/compatible setting (e.g., setup card 1960 of FIG. 19AD for selecting a compatible language).

Using a first configuration setting of the first device that is compatible with the second device allows the user to efficiently move through a configuration process for a device with fewer required user inputs, providing an optimized configuration process. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in accordance with the first configuration setting of the first device being compatible with the second device (e.g., 1906), the first device (e.g., 1900) displays a configuration user interface that includes a prompt requesting acceptance of the first configuration setting for the second device. In response to receiving user input accepting the first configuration setting for the second device (e.g., 1906), the first device (e.g., 1900) configures the second device to include the first configuration setting.

Displaying a configuration user interface that includes a prompt requesting acceptance of the first configuration setting for the second device, provides the user with visual feedback about the state of the second device (e.g., that it is compatible with the first configuration setting). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first configuration setting is a setting disabling a device feature (e.g., a voice assistant), and wherein a second configuration setting is a setting enabling the device feature (e.g., a voice assistant). In accordance with a determination that the configuration process requires enabling the device feature on the second device (e.g., 1906): the first device (e.g., 1900) displays an indication that the device feature will be enabled on the second device (e.g., setup card 1958 of FIG. 19AC); and the first device (e.g., 1900) configures the second device (e.g., 1906) to include the second configuration setting (e.g., enabling a voice assistant on the second device).

Displaying an indication that the device feature will be enabled on the second device (e.g., even when it is disabled on the first device) provides the user with visual feedback about the state of the second device (e.g., that the feature is required on the second device). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the indication that the device feature will be enabled on the second device (e.g., 1906) includes displaying an indication that the device feature will remain disabled on the first device.

Displaying an indication that the feature will remain disabled on the first device provides the user with visual feedback about the nature of the operation and the state of the first device (e.g., that enabling the feature on the second device will not alter the state of the first device, as to the feature). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in accordance with the first configuration setting of the first device not being compatible with the second device (e.g., 1906), the first device (e.g., 1900) displays a configuration user interface (e.g., 1960 of FIG. 19AD) that includes a prompt requesting selection of a third configuration setting compatible with the second device. For example, if device 1900 has a default language set to Latin (e.g., a first configuration setting), which is not a language compatible with the voice assistant feature of device 1906, then device 1900 prompts to select a compatible language (e.g., those listed in setup card 1960). In response to receiving user input selection of the third configuration setting (e.g., "English (U.K.)"), the first device (e.g., 1900) configures the second device (e.g., 1906) to include the third configuration setting. In some embodiments, configuring the second device includes preparing a configuration setting for transfer to the second device later at a later time (e.g., during the configuration process). For example, all configuration settings may be transferred to the second device at once.

Displaying a configuration user interface that includes a prompt requesting selection of a third configuration setting compatible with the second device reduces the number of inputs needed to configure the second device by surfacing compatible options to the user and provides an optimized configuration process. Providing an optimized configuration process to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to establishing the communication link connecting the first device and the second device (e.g., 1906), the first device (e.g., 1900) detects an indication that a physical proximity between the first device and the second device satisfies a proximity condition (e.g., as shown in FIG. 19A). In response to detecting the indication that the physical proximity between the first device and the second device satisfies the proximity condition, the first device (e.g., 1900) outputs an audio tone signal (e.g., as shown in FIG. 10I, where device 1010 is outputting an audio tone signal 1016).

Using an indication that the physical proximity between the first device and the second device satisfies the proximity condition in order to output an audio tone signal provides the user with auditory feedback regarding the state of the first device. For example, when there are other potential devices in proximity that are configurable, the audio tone signal can indicate which device will be configured. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to transmitting the user account information to the second device (e.g., 1906), the first device (e.g., 1900) displays a configuration user interface (e.g., 1948 of FIG. 19W) associated with a voice assistant, wherein the configuration user interface associated with a voice assistant includes a prompt to provide user voice input invoking one or more functions of the voice assistant. In some embodiments, the one or more functions of the voice assistant include audibly outputting one or more of: media (e.g., music), weather information, news, calendar information, messages, or the like.

Displaying a configuration user interface associated with a voice assistant that includes a prompt to provide user voice input invoking one or more functions of the voice assistant provides the user with information regarding the capabilities and state of a device. Providing such information to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that user voice input invoking one or more of the features of the voice assistant has been received by either the first device or the second device (e.g., 1906), the first device (e.g., 1900) maintains display of the configuration user interface (e.g., 1948) associated with the voice assistant. In response to receiving user input selection of an affordance (e.g., affordance labeled "Done" in setup card 1948) included in the configuration user interface associated with the voice assistant, the first device (e.g., 1900) ceases display of the configuration user interface associated with the voice assistant (e.g., setup card 1948 slides off the display, as shown in FIGS. 19X-19Y).

Note that details of the processes described above with respect to method 3900 (e.g., FIGS. 39A-39C) are also applicable in an analogous manner to the methods described below/above. For example, method 700, 900, 1100, 1300, 1500, 1700, 1800, 2000, 2200, 2400, 2600, 2800, 3000, 3200, 3400, 3600, and 3800 optionally includes one or more of the characteristics of the various methods described above with reference to method 3900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
a display;
one or more processors; and
memory storing one or more programs configured to be executed by the one or more processors, the one or more programs including instructions for:
detecting an audio tone signal indicative of a pairing handshake with a second device,
wherein the electronic device is connected to the second device via a communication link, and
wherein the audio tone signal is out-of-band to the communication link;
in response to detecting the audio tone signal, initiating, on the electronic device, an initial configuration process for configuring the second device, the initial configuration process including a sequential display of a plurality of different user interfaces corresponding to a plurality of different operations in the initial configuration process, the order of the display of the display of the interfaces being predefined by the electronic device, wherein at least one of the different user interfaces requests user input to share network settings from a user account with the second device and/or requests user confirmation that a connection should be made to the second device;
during the initial configuration process that was initiated in response to detecting the audio tone signal and before providing an indication that the initial configuration process is complete, displaying, on the display, a configuration user interface that includes a prompt to select a location, the prompt indicating that the selected location will be assigned to the second device, wherein the configuration user interface is one of the plurality of different user interfaces in the initial configuration process;
receiving user input indicating selection of a respective location; and
in response to receiving the user input indicating selection of the respective location, configuring the second device to be assigned to the respective location.

2. The electronic device of claim 1, wherein the one or more programs further include instructions for:
in response to receiving the user input selection of the respective location:
in accordance with a determination that a third device is currently associated with the respective location, displaying, on the display, a configuration user interface that includes a prompt to select whether to create a device group that includes the second device and the third device; and in accordance with a determination that a third device is not currently associated with the respective location, forgoing displaying, on the display, the configuration user interface that includes the prompt to select whether to create the device group.

3. The electronic device of claim 2, wherein the one or more programs further include instructions for:

receiving user input representing an affirmative request to create the device group;

in response to the user input representing the affirmative request to create the device group, displaying, on the display, a configuration user interface that includes a prompt to select an audio output channel to associate with the second device;

receiving user input representing selection of a respective audio output channel; and in response to receiving the user input representing selection of the respective audio output channel, associating the second device with the respective audio output channel.

4. The electronic device of claim 1, wherein the one or more programs further include instructions for, during the initial configuration process:

displaying, on the display, a configuration user interface that includes a prompt requesting permission to transmit first user account information to the second device;

receiving user input providing permission to transmit the first user account information to the second device; and in response to receiving the user input providing permission, transmitting the first user account information to the second device.

5. A non-transitory computer-readable storage medium storing one or more programs configured to be executed by one or more processors of an electronic device with a display, the one or more programs including instructions for:

detecting an audio tone signal indicative of a pairing handshake with a second device, wherein the electronic device is connected to the second device via a communication link, and wherein the audio tone signal is out-of-band to the communication link;

in response to detecting the audio tone signal, initiating, on the electronic device, an initial configuration process for configuring the second device, the initial configuration process including a sequential display of a plurality of different user interfaces corresponding to a plurality of different operations in the initial configuration process, the order of the display of the user interfaces being predefined by the electronic device, wherein at least one of the different interfaces requests user input to share network settings from a user account with the second device and/or requests user confirmation that a connection should be made to the second device;

during the initial configuration process that was initiated in response to detecting the audio tone signal and before providing an indication that the initial configuration process is complete, displaying, on the display, a configuration user interface that includes a prompt to select a location, the prompt indicating that the selected location will be assigned to the second device, wherein the configuration user interface is one of the plurality of different user interfaces in the initial configuration process;

receiving user input indicating selection of a respective location; and in response to receiving the user input indicating selection of the respective location, configuring the second device to be assigned to the respective location.

6. The non-transitory computer-readable storage medium of claim 5, the one or more programs further including instructions for:

in response to receiving the user input selection of the respective location:

in accordance with a determination that a third device is currently associated with the respective location, displaying, on the display, a configuration user interface that includes a prompt to select whether to create a device group that includes the second device and the third device; and in accordance with a determination that a third device is not currently associated with the respective location, forgoing displaying, on the display, the configuration user interface that includes the prompt to select whether to create the device group.

7. The non-transitory computer-readable storage medium of claim 6, the one or more programs further including instructions for:

receiving user input representing an affirmative request to create the device group;

in response to the user input representing the affirmative request to create the device group, displaying, on the display, a configuration user interface that includes a prompt to select an audio output channel to associate with the second device;

receiving user input representing selection of a respective audio output channel; and in response to receiving the user input representing selection of the respective audio output channel, associating the second device with the respective audio output channel.

8. The non-transitory computer-readable storage medium of claim 5, the one or more programs further including instructions for, during the initial configuration process:

displaying, on the display, a configuration user interface that includes a prompt requesting permission to transmit first user account information to the second device;

receiving user input providing permission to transmit the first user account information to the second device; and in response to receiving the user input providing permission, transmitting the first user account information to the second device.

9. A computer-implemented method for configuring an electronic device with a display to be associated with a location, comprising:

detecting an audio tone signal indicative of a pairing handshake with a second device, wherein the electronic device is connected to the second device via a communication link, and wherein the audio tone signal is out-of-band to the communication link;

in response to detecting the audio tone signal, initiating, on the electronic device, an initial configuration process for configuring the second device, the initial configuration process including a sequential display of a plurality of different user interfaces corresponding to a plurality of different operations in the initial configuration process, the order of the display of the user interfaces being predefined by the electronic device, wherein at least one of the different interfaces requests user input to share network settings from a user account with the second device and/or requests user confirmation that a connection should be made to the second device;

during the initial configuration process that was initiated in response to detecting the audio tone signal and before providing an indication that the initial configuration process is complete, displaying, on the display, a configuration user interface that includes a prompt to select a location, the prompt indicating that the selected location will be assigned to the second device, wherein the configuration user interface is one of the plurality of different user interfaces in the initial configuration process;

receiving user input indicating selection of a respective location; and in response to receiving the user input indicating selection of the respective location, configuring the second device to be assigned to the respective location.

10. The method of claim 9, the method further comprising:

in response to receiving the user input selection of the respective location:

in accordance with a determination that a third device is currently associated with the respective location, displaying, on the display, a configuration user interface that includes a prompt to select whether to create a device group that includes the second device and the third device; and in accordance with a determination that a third device is not currently associated with the respective location, forgoing displaying, on the display, the initial configuration user interface that includes the prompt to select whether to create the device group.

11. The method of claim 10, the method further comprising:

receiving user input representing an affirmative request to create the device group;

in response to the user input representing the affirmative request to create the device group, displaying, on the display, a configuration user interface that includes a prompt to select an audio output channel to associate with the second device;

receiving user input representing selection of a respective audio output channel; and in response to receiving the user input representing selection of the respective audio output channel, associating the second device with the respective audio output channel.

12. The method of claim 9, the method further comprising, during the initial configuration process:

displaying, on the display, a configuration user interface that includes a prompt requesting permission to transmit first user account information to the second device;

receiving user input providing permission to transmit the first user account information to the second device; and in response to receiving the user input providing permission, transmitting the first user account information to the second device.

13. An electronic device, comprising:

a display;

one or more processors; and memory storing one or more programs configured to be executed by the one or more processors, the one or more programs including instructions for:

establishing a communication link with a second device;

subsequent to establishing the communication link with the second device, initiating an initial configuration process for configuring the second device, the initial configuration process including a sequential display of a plurality of different user interfaces corresponding to a plurality of different operations in the initial configuration process, the order of the display of the display of the interfaces being predefined by the electronic device, wherein at least one of the different user interfaces requests user input to share network settings from a user account with the second device and/or requests user confirmation that a connection should be made to the second device; and during the initial configuration process and before providing an indication that the initial configuration process is complete:

displaying, on the display, a configuration user interface that is included in the plurality of different user interfaces and that includes a prompt to select a location, the prompt indicating that the selected location will be assigned to the second device;

receiving user input indicating selection of a respective location;

in response to receiving the user input indicating selection of the respective location, configuring the second device to be assigned to the respective location;

detecting an audio tone signal indicative of a pairing handshake with the second device, wherein the audio tone is out-of-band to the communication link; and in response to detecting the audio tone signal, proceeding to a next step in the initial configuration process for configuring the second device.

14. The electronic device of claim 13, the one or more programs further including instructions for:

detecting an indication that a physical proximity between the first device and the second device satisfies a proximity condition; and in response to detecting the indication that the physical proximity between the first device and the second device satisfies the proximity condition, establishing the communication link with the second device.

15. The electronic device of claim 14, wherein the audio tone signal is a first audio tone signal, the one or more programs further including instructions for:

in response to detecting the indication that the physical proximity between the first device and the second device satisfies the proximity condition, outputting a second audio tone signal.

16. The electronic device of claim 13, wherein proceeding to the next step of the configuration process includes completing the configuration process.

17. The electronic device of claim 13, wherein the audio tone signal is generated by the second device.

18. The electronic device of claim 13, wherein the audio tone signal includes an audio passcode.

19. The electronic device of claim 13, wherein the audio tone signal is received while the first device is physically positioned within a threshold physical proximity to the second device.

20. The electronic device of claim 13, wherein the audio tone signal is a first audio tone signal, the one or more programs further including instructions for, during the configuration process:

detecting a third audio tone signal comprising encoded data; and in response to detecting the third audio tone signal:
transmitting an acknowledgement to the second device; and
proceeding to a next step in the configuration process.

21. The electronic device of claim 13, the one or more programs further including instructions for:
in response to receiving the user input selection of the location:
in accordance with a determination that a third device is currently associated with the location, displaying, on the display, a configuration user interface that includes a prompt to select whether to create a device group that includes the second device and the third device; and
in accordance with a determination that a third device is not currently associated with the location, forgoing displaying, on the display, the configuration user interface that includes the prompt to select whether to create the device group.

22. The electronic device of claim 21, the one or more programs further including instructions for:
receiving user input representing an affirmative request to create the device group;
in response to the user input representing an affirmative request to create the device group, displaying, on the display, a configuration user interface that includes a prompt to select an audio output channel to associate with the second device;
receiving user input representing selection of an audio output channel; and
in response to receiving the user input representing selection of a selected audio output channel, associating the second device with the selected audio channel.

23. The electronic device of claim 13, wherein the prompt to select a location includes a plurality of predetermined location identifiers.

24. The electronic device of claim 23, wherein the plurality of predetermined location identifiers includes a user-defined location identifier.

25. The electronic device of claim 13, wherein the prompt to select a location includes a field for creating a new location identifier, the one or more programs further including instructions for:
receiving user input associated with the field for creating a new location identifier, wherein the user input includes a location identifier;
creating a new location identifier based on the received user input associated with the field for creating the new location identifier; and
associating the second device with the new location identifier.

26. The electronic device of claim 13, the one or more programs further including instructions for, during the configuration process:
displaying, on the display, a configuration user interface that includes a prompt requesting permission to transmit user account information to the second device;
receiving user input providing permission to transmit the user account information to the second device; and
in response to receiving the user input providing permission, transmitting the user account information to the second device.

27. The electronic device of claim 26, the one or more programs further including instructions for:
subsequent to transmitting the user account information to the second device, displaying a configuration user interface associated with a voice assistant, wherein the configuration user interface associated with a voice assistant includes a prompt to provide user voice input invoking one or more functions of the voice assistant.

28. The electronic device of claim 27, the one or more programs further including instructions for:
in accordance with a determination that user voice input invoking one or more of the features of the voice assistant has been received by either the first device or the second device, maintaining display of the configuration user interface associated with the voice assistant; and
in response to receiving user input selection of an affordance included in the configuration user interface associated with the voice assistant, ceasing display of the configuration user interface associated with the voice assistant.

29. The electronic device of claim 13, the one or more programs further including instructions for, prior to transmitting the user account information to the second device:
in accordance with a determination that the first device is not currently logged into a user account associated with the user account information:
displaying, on the display, a prompt to log in to the user account; and
forgoing transmitting the user account information to the second device; and
in accordance with a determination that the first device is currently logged into the user account associated with the user account information, transmitting the user account information to the second device.

30. The electronic device of claim 13, the one or more programs further including instructions for:
in response to progressing from a first step in the configuration process to a second step in the configuration process, outputting a fourth audio tone signal,
wherein the fourth audio tone signal is outputted concurrently with the output of a fifth audio tone signal outputted by the second device, and
wherein the fourth audio tone signal and the fifth audio tone signal are harmonics.

31. The electronic device of claim 30, the one or more programs further including instructions for:
in response to progressing from the second step in the configuration process to a third step in the configuration process, outputting a sixth audio tone signal,
wherein the sixth audio tone signal is outputted concurrently with the output of a seventh audio tone signal outputted by the second device,
wherein the sixth audio tone signal and the seventh audio tone signal are harmonics, and
wherein the sixth audio tone signal is a higher frequency tone than the fourth audio tone signal.

32. The electronic device of claim 13, the one or more programs further including instructions for:
subsequent to initiating the configuration process, receiving data regarding an output of an operation being performed by the second device; and
in response to receiving the data regarding the output of the operation being performed by the second device, display a user interface that includes a representation of the output of the operation being performed by the second device.

33. The electronic device of claim 32, wherein the operation being performed by the second device includes audibly outputting information,
wherein receiving the data regarding the output of the operation being performed includes receiving data representing the information, and wherein displaying the user interface, that includes the representation of the output of the operation being performed by the second device, includes displaying at least a portion of the data representing the information.

34. The electronic device of claim 33, wherein the information includes a media item, wherein the operation being performed by the second device includes audibly outputting the media item, and wherein displaying the data representing the information includes displaying one or more of: an artist, a media item name, an album name, album art, and a media playback progress indicator.

35. The electronic device of claim 33, wherein displaying the user interface that includes the representation of the output of the operation being performed by the second device includes displaying one or more of news information or weather information.

36. The electronic device of claim 13, the one or more programs further including instructions for:

during the configuration process:

in accordance with a first configuration setting of the first device being compatible with the second device, configuring the second device to include the first configuration setting; and in accordance with the first configuration setting of the first device not being compatible with the second device, displaying an indication that the first configuration setting is not compatible with the second device.

37. The electronic device of claim 36, the one or more programs further including instructions for:

further in accordance with the first configuration setting of the first device being compatible with the second device, displaying a configuration user interface that includes a prompt requesting acceptance of the first configuration setting for the second device; and in response to receiving user input accepting the first configuration setting for the second device, configuring the second device to include the first configuration setting.

38. The electronic device of claim 36, wherein the first configuration setting is a setting disabling a device feature, and wherein a second configuration setting is a setting enabling the device feature, the one or more programs further including instructions for:

in accordance with a determination that the configuration process requires enabling the device feature on the second device:

displaying an indication that the device feature will be enabled on the second device; and configuring the second device to include the second configuration setting.

39. The electronic device of claim 38, wherein displaying the indication that the device feature will be enabled on the second device includes displaying an indication that the device feature will remain disabled on the first device.

40. The electronic device of claim 36, the one or more programs further including instructions for:

further in accordance with the first configuration setting of the first device not being compatible with the second device, displaying a configuration user interface that includes a prompt requesting selection of a third configuration setting compatible with the second device; and in response to receiving user input selection of the third configuration setting, configuring the second device to include the third configuration setting.

41. The electronic device of claim 13, the one or more programs further including instructions for:

prior to establishing the communication link connecting the first device and the second device, detecting an indication that a physical proximity between the first device and the second device satisfies a proximity condition; and in response to detecting the indication that the physical proximity between the first device and the second device satisfies the proximity condition, outputting an audio tone signal.

42. A non-transitory computer-readable storage medium storing one or more programs configured to be executed by one or more processors of an electronic device with a display, the one or more programs including instructions for:

establishing a communication link with a second device;

subsequent to establishing the communication link with the second device, initiating an initial configuration process for configuring the second device, the initial configuration process including a sequential display of a plurality of different user interfaces corresponding to a plurality of different operations in the initial configuration process, the order of the display of the display of the interfaces being predefined by the electronic device, wherein at least one of the different user interfaces requests user input to share network settings from a user account with the second device and/or requests user confirmation that a connection should be made to the second device; and during the initial configuration process and before providing an indication that the initial configuration process is complete:

displaying, on the display, a configuration user interface that is included in the plurality of different user interfaces and that includes a prompt to select a location, the prompt indicating the selected location will be assigned to the second device;

receiving user input indicating selection of a respective location;

in response to receiving the user input indicating selection of the respective location, configuring the second device to be assigned to the respective location;

detecting an audio tone signal indicative of a pairing handshake with the second device, wherein the audio tone is out-of-band to the communication link; and in response to detecting the audio tone signal, proceeding to a next step in the initial configuration process for configuring the second device.

43. The non-transitory computer-readable storage medium of claim 42, the one or more programs further including instructions for:

detecting an indication that a physical proximity between the first device and the second device satisfies a proximity condition; and in response to detecting the indication that the physical proximity between the first device and the second device satisfies the proximity condition, establishing the communication link with the second device.

44. The non-transitory computer-readable storage medium of claim 43, wherein the audio tone signal is a first audio tone signal, the one or more programs further including instructions for:

in response to detecting the indication that the physical proximity between the first device and the second device satisfies the proximity condition, outputting a second audio tone signal.

45. The non-transitory computer-readable storage medium of claim 42, wherein proceeding to the next step of the configuration process includes completing the configuration process.

46. The non-transitory computer-readable storage medium of claim 42, wherein the audio tone signal is generated by the second device.

47. The non-transitory computer-readable storage medium of claim 42, wherein the audio tone signal includes an audio passcode.

48. The non-transitory computer-readable storage medium of claim 42, wherein the audio tone signal is received while the first device is physically positioned within a threshold physical proximity to the second device.

49. The non-transitory computer-readable storage medium of claim 42, wherein the audio tone signal is a first audio tone signal, the one or more programs further including instructions for, during the configuration process:

detecting a third audio tone signal comprising encoded data; and in response to detecting the third audio tone signal:

transmitting an acknowledgement to the second device; and proceeding to a next step in the configuration process.

50. The non-transitory computer-readable storage medium of claim 42, the one or more programs further including instructions for:

in response to receiving the user input selection of the location:

in accordance with a determination that a third device is currently associated with the location, displaying, on the display, a configuration user interface that includes a prompt to select whether to create a device group that includes the second device and the third device; and in accordance with a determination that a third device is not currently associated with the location, forgoing displaying, on the display, the configuration user interface that includes the prompt to select whether to create the device group.

51. The non-transitory computer-readable storage medium of claim 50, the one or more programs further including instructions for:

receiving user input representing an affirmative request to create the device group;

in response to the user input representing an affirmative request to create the device group, displaying, on the display, a configuration user interface that includes a prompt to select an audio output channel to associate with the second device;

receiving user input representing selection of an audio output channel; and in response to receiving the user input representing selection of a selected audio output channel, associating the second device with the selected audio channel.

52. The non-transitory computer-readable storage medium of claim 42, wherein the prompt to select a location includes a plurality of predetermined location identifiers.

53. The non-transitory computer-readable storage medium of claim 52, wherein the plurality of predetermined location identifiers includes a user-defined location identifier.

54. The non-transitory computer-readable storage medium of claim 42, wherein the prompt to select a location includes a field for creating a new location identifier, the one or more programs further including instructions for:

receiving user input associated with the field for creating a new location identifier, wherein the user input includes a location identifier;

creating a new location identifier based on the received user input associated with the field for creating the new location identifier; and associating the second device with the new location identifier.

55. The non-transitory computer-readable storage medium of claim 42, the one or more programs further including instructions for, during the configuration process:

displaying, on the display, a configuration user interface that includes a prompt requesting permission to transmit user account information to the second device;

receiving user input providing permission to transmit the user account information to the second device; and in response to receiving the user input providing permission, transmitting the user account information to the second device.

56. The non-transitory computer-readable storage medium of claim 55, the one or more programs further including instructions for:

subsequent to transmitting the user account information to the second device, displaying a configuration user interface associated with a voice assistant, wherein the configuration user interface associated with a voice assistant includes a prompt to provide user voice input invoking one or more functions of the voice assistant.

57. The non-transitory computer-readable storage medium of claim 56, the one or more programs further including instructions for:

in accordance with a determination that user voice input invoking one or more of the features of the voice assistant has been received by either the first device or the second device, maintaining display of the configuration user interface associated with the voice assistant; and in response to receiving user input selection of an affordance included in the configuration user interface associated with the voice assistant, ceasing display of the configuration user interface associated with the voice assistant.

58. The non-transitory computer-readable storage medium of claim 42, the one or more programs further including instructions for, prior to transmitting the user account information to the second device:

in accordance with a determination that the first device is not currently logged into a user account associated with the user account information:

displaying, on the display, a prompt to log in to the user account; and forgoing transmitting the user account information to the second device; and in accordance with a determination that the first device is currently logged into the user account associated with the user account information, transmitting the user account information to the second device.

59. The non-transitory computer-readable storage medium of claim 42, the one or more programs further including instructions for:

in response to progressing from a first step in the configuration process to a second step in the configuration process, outputting a fourth audio tone signal, wherein the fourth audio tone signal is outputted concurrently with the output of a fifth audio tone signal outputted by the second device, and wherein the fourth audio tone signal and the fifth audio tone signal are harmonics.

60. The non-transitory computer-readable storage medium of claim 59, the one or more programs further including instructions for:

in response to progressing from the second step in the configuration process to a third step in the configuration process, outputting a sixth audio tone signal, wherein the sixth audio tone signal is outputted concurrently with the output of a seventh audio tone signal outputted by the second device, wherein the sixth audio tone signal and the seventh audio tone signal are harmonics, and wherein the sixth audio tone signal is a higher frequency tone than the fourth audio tone signal.

61. The non-transitory computer-readable storage medium of claim 42, the one or more programs further including instructions for:

subsequent to initiating the configuration process, receiving data regarding an output of an operation being performed by the second device; and in response to receiving the data regarding the output of the operation being performed by the second device, display a user interface that includes a representation of the output of the operation being performed by the second device.

62. The non-transitory computer-readable storage medium of claim 61, wherein the operation being performed by the second device includes audibly outputting information, wherein receiving the data regarding the output of the operation being performed includes receiving data representing the information, and wherein displaying the user interface, that includes the representation of the output of the operation being performed by the second device, includes displaying at least a portion of the data representing the information.

63. The non-transitory computer-readable storage medium of claim 62, wherein the information includes a media item, wherein the operation being performed by the second device includes audibly outputting the media item, and wherein displaying the data representing the information includes displaying one or more of: an artist, a media item name, an album name, album art, and a media playback progress indicator.

64. The non-transitory computer-readable storage medium of claim 62, wherein displaying the user interface that includes the representation of the output of the operation being performed by the second device includes displaying one or more of news information or weather information.

65. The non-transitory computer-readable storage medium of claim 42, the one or more programs further including instructions for:

during the configuration process:

in accordance with a first configuration setting of the first device being compatible with the second device, configuring the second device to include the first configuration setting; and in accordance with the first configuration setting of the first device not being compatible with the second device, displaying an indication that the first configuration setting is not compatible with the second device.

66. The non-transitory computer-readable storage medium of claim 55, the one or more programs further including instructions for:

further in accordance with the first configuration setting of the first device being compatible with the second device, displaying a configuration user interface that includes a prompt requesting acceptance of the first configuration setting for the second device; and in response to receiving user input accepting the first configuration setting for the second device, configuring the second device to include the first configuration setting.

67. The non-transitory computer-readable storage medium of claim 55, wherein the first configuration setting is a setting disabling a device feature, and wherein a second configuration setting is a setting enabling the device feature, the one or more programs further including instructions for:

in accordance with a determination that the configuration process requires enabling the device feature on the second device:

displaying an indication that the device feature will be enabled on the second device; and configuring the second device to include the second configuration setting.

68. The non-transitory computer-readable storage medium of claim 67, wherein displaying the indication that the device feature will be enabled on the second device includes displaying an indication that the device feature will remain disabled on the first device.

69. The non-transitory computer-readable storage medium of claim 65, the one or more programs further including instructions for:

further in accordance with the first configuration setting of the first device not being compatible with the second device, displaying a configuration user interface that includes a prompt requesting selection of a third configuration setting compatible with the second device; and in response to receiving user input selection of the third configuration setting, configuring the second device to include the third configuration setting.

70. The non-transitory computer-readable storage medium of claim 42, the one or more programs further including instructions for:

prior to establishing the communication link connecting the first device and the second device, detecting an indication that a physical proximity between the first device and the second device satisfies a proximity condition; and in response to detecting the indication that the physical proximity between the first device and the second device satisfies the proximity condition, outputting an audio tone signal.

71. A computer-implemented method for configuring an electronic device with a display to be associated with a location, comprising:

establishing a communication link with a second device;

subsequent to establishing the communication link with the second device, initiating an initial configuration process for configuring the second device, the initial configuration process including a sequential display of a plurality of different user interfaces corresponding to a plurality of different operations in the initial configuration process, the order of the display of the display of the interfaces being predefined by the electronic device, wherein at least one of the different user interfaces requests user input to share network settings from a user account with the second device and/or requests user confirmation that a connection should be made to the second device; and during the initial configuration process and before providing an indication that the initial configuration process is complete:

displaying, on the display, a configuration user interface that is included in the plurality of different user interfaces and that includes a prompt to select a location, the prompt indicating the selected location will be assigned to the second device;

receiving user input indicating selection of a respective location;

in response to receiving the user input indicating selection of the respective location, configuring the second device to be assigned to the respective location;

detecting an audio tone signal indicative of a pairing handshake with the second device, wherein the audio tone is out-of-band to the communication link; and in response to detecting the audio tone signal, proceeding to a next step in the initial configuration process for configuring the second device.

72. The method of claim 71, further comprising:

detecting an indication that a physical proximity between the first device and the second device satisfies a proximity condition; and in response to detecting the indication that the physical proximity between the first device and the second device satisfies the proximity condition, establishing the communication link with the second device.

73. The method of claim 72, wherein the audio tone signal is a first audio tone signal, the method further comprising:

in response to detecting the indication that the physical proximity between the first device and the second device satisfies the proximity condition, outputting a second audio tone signal.

74. The method of claim 71, wherein proceeding to the next step of the configuration process includes completing the configuration process.

75. The method of claim 71, wherein the audio tone signal is generated by the second device.

76. The method of claim 71, wherein the audio tone signal includes an audio passcode.

77. The method of claim 71, wherein the audio tone signal is received while the first device is physically positioned within a threshold physical proximity to the second device.

78. The method of claim 71, wherein the audio tone signal is a first audio tone signal, the method further comprising, during the configuration process:

detecting a third audio tone signal comprising encoded data; and in response to detecting the third audio tone signal:

transmitting an acknowledgement to the second device; and proceeding to a next step in the configuration process.

79. The method of claim 71, further comprising:

in response to receiving the user input selection of the location:

in accordance with a determination that a third device is currently associated with the location, displaying, on the display, a configuration user interface that includes a prompt to select whether to create a device group that includes the second device and the third device; and in accordance with a determination that a third device is not currently associated with the location, forgoing displaying, on the display, the configuration user interface that includes the prompt to select whether to create the device group.

80. The method of claim 79, further comprising:

receiving user input representing an affirmative request to create the device group;

in response to the user input representing an affirmative request to create the device group, displaying, on the display, a configuration user interface that includes a prompt to select an audio output channel to associate with the second device;

receiving user input representing selection of an audio output channel; and in response to receiving the user input representing selection of a selected audio output channel, associating the second device with the selected audio channel.

81. The method of claim 71, wherein the prompt to select a location includes a plurality of predetermined location identifiers.

82. The method of claim 81, wherein the plurality of predetermined location identifiers includes a user-defined location identifier.

83. The method of claim 71, wherein the prompt to select a location includes a field for creating a new location identifier, the method further comprising:

receiving user input associated with the field for creating a new location identifier, wherein the user input includes a location identifier;

creating a new location identifier based on the received user input associated with the field for creating the new location identifier; and associating the second device with the new location identifier.

84. The method of claim 71, further comprising, during the configuration process:

displaying, on the display, a configuration user interface that includes a prompt requesting permission to transmit user account information to the second device;

receiving user input providing permission to transmit the user account information to the second device; and in response to receiving the user input providing permission, transmitting the user account information to the second device.

85. The method of claim 84, further comprising:

subsequent to transmitting the user account information to the second device, displaying a configuration user interface associated with a voice assistant, wherein the configuration user interface associated with a voice assistant includes a prompt to provide user voice input invoking one or more functions of the voice assistant.

86. The method of claim 85, further comprising:

in accordance with a determination that user voice input invoking one or more of the features of the voice assistant has been received by either the first device or the second device, maintaining display of the configuration user interface associated with the voice assistant; and in response to receiving user input selection of an affordance included in the configuration user interface associated with the voice assistant, ceasing display of the configuration user interface associated with the voice assistant.

87. The method of claim 71, further comprising, prior to transmitting the user account information to the second device:

in accordance with a determination that the first device is not currently logged into a user account associated with the user account information:

displaying, on the display, a prompt to log in to the user account; and forgoing transmitting the user account information to the second device; and in accordance with a determination that the first device is currently logged into the user account associated with the user account information, transmitting the user account information to the second device.

88. The method of claim 71, further comprising:

in response to progressing from a first step in the configuration process to a second step in the configuration process, outputting a fourth audio tone signal, wherein the fourth audio tone signal is outputted concurrently with the output of a fifth audio tone signal outputted by the second device, and wherein the fourth audio tone signal and the fifth audio tone signal are harmonics.

89. The method of claim 88, further comprising:

in response to progressing from the second step in the configuration process to a third step in the configuration process, outputting a sixth audio tone signal, wherein the sixth audio tone signal is outputted concurrently with the output of a seventh audio tone signal outputted by the second device, wherein the sixth audio tone signal and the seventh audio tone signal are harmonics, and wherein the sixth audio tone signal is a higher frequency tone than the fourth audio tone signal.

90. The method of claim 71, further comprising:

subsequent to initiating the configuration process, receiving data regarding an output of an operation being performed by the second device; and in response to receiving the data regarding the output of the operation being performed by the second device, display a user interface that includes a representation of the output of the operation being performed by the second device.

91. The method of 90, wherein the operation being performed by the second device includes audibly outputting information, wherein receiving the data regarding the output of the operation being performed includes receiving data representing the information, and wherein displaying the user interface, that includes the representation of the output of the operation being performed by the second device, includes displaying at least a portion of the data representing the information.

92. The method of 91, wherein the information includes a media item, wherein the operation being performed by the second device includes audibly outputting the media item, and wherein displaying the data representing the information includes displaying one or more of: an artist, a media item name, an album name, album art, and a media playback progress indicator.

93. The method of 91, wherein displaying the user interface that includes the representation of the output of the operation being performed by the second device includes displaying one or more of news information or weather information.

94. The method of claim 71, further comprising:

during the configuration process:

in accordance with a first configuration setting of the first device being compatible with the second device, configuring the second device to include the first configuration setting; and in accordance with the first configuration setting of the first device not being compatible with the second device, displaying an indication that the first configuration setting is not compatible with the second device.

95. The method of claim 94, further comprising:

further in accordance with the first configuration setting of the first device being compatible with the second device, displaying a configuration user interface that includes a prompt requesting acceptance of the first configuration setting for the second device; and in response to receiving user input accepting the first configuration setting for the second device, configuring the second device to include the first configuration setting.

96. The method of claim 94, wherein the first configuration setting is a setting disabling a device feature, and wherein a second configuration setting is a setting enabling the device feature, the method further comprising:

in accordance with a determination that the configuration process requires enabling the device feature on the second device:

displaying an indication that the device feature will be enabled on the second device; and configuring the second device to include the second configuration setting.

97. The method of claim 96, wherein displaying the indication that the device feature will be enabled on the second device includes displaying an indication that the device feature will remain disabled on the first device.

98. The method of claim 94, further comprising:

further in accordance with the first configuration setting of the first device not being compatible with the second device, displaying a configuration user interface that includes a prompt requesting selection of a third configuration setting compatible with the second device; and in response to receiving user input selection of the third configuration setting, configuring the second device to include the third configuration setting.

99. The method of claim 71, further comprising:

prior to establishing the communication link connecting the first device and the second device, detecting an indication that a physical proximity between the first device and the second device satisfies a proximity condition; and in response to detecting the indication that the physical proximity between the first device and the second device satisfies the proximity condition, outputting an audio tone signal.

* * * * *

UNITED STATES PATENT AND TRADEMARK OFFICE

CERTIFICATE OF CORRECTION

PATENT NO. : 11,283,916 B2
APPLICATION NO. : 16/807604
DATED : March 22, 2022
INVENTOR(S) : Patrick L. Coffman et al.

It is certified that error appears in the above-identified patent and that said Letters Patent is hereby corrected as shown below:

In the Claims

Column 213, Line 32, Claim 10, delete "the initial" and insert -- the --.

Column 221, Line 66, Claim 66, delete "claim 55," and insert -- claim 65, --.

Column 222, Line 11, Claim 67, delete "claim 55," and insert -- claim 65, --.

Column 225, Line 36, Claim 91, delete "method of" and insert -- method of claim --.

Column 225, Line 46, Claim 92, delete "method of" and insert -- method of claim --.

Column 225, Line 54, Claim 93, delete "method of" and insert -- method of claim --.

Signed and Sealed this
Twelfth Day of July, 2022

Katherine Kelly Vidal

Katherine Kelly Vidal
*Director of the United States Patent and Trademark Office*